US009020634B2

(12) United States Patent
Bailey et al.

(10) Patent No.: US 9,020,634 B2
(45) Date of Patent: Apr. 28, 2015

(54) FACILITY WIDE MIXED MAIL SORTING AND/OR SEQUENCING SYSTEM AND COMPONENTS AND METHODS THEREOF

(71) Applicant: Lockheed Martin Corporation, Bethesda, MD (US)

(72) Inventors: David Bailey, Vestal, NY (US); David Benninger, Endwell, NY (US); Wayne Blackwell, Chenango Forks, NY (US); Matthew Bossard, Montrose, PA (US); Bryan Dalton, Endicott, NY (US); Thomas Erb, Endicott, NY (US); Michael Finney, Endicott, NY (US); Mark Gaug, Vestal, NY (US); John Hartman, Apalachin, NY (US); Kenneth Marks, Bridge City, TX (US); Jamie Micha, Binghamton, NY (US); John Nasakaitis, Elmira, NY (US); William Olver, Binghamton, NY (US); Daniel Ondreyko, Binghamton, NY (US); John Patrick, Endicott, NY (US); Joseph Porter, Conklin, NY (US); Kalon Riehle, Johnson City, NY (US); Leslie Scrivener, Sayre, PA (US); Gerald Sensenig, Vestal, NY (US); Clifford Solowiej, Apalachin, NY (US); Frank Sweet, Greene, NY (US); Jamie Swetland, Gillette, PA (US); Jonathan Wee, Endicott, NY (US); Bruce Williams, Endwell, NY (US); Kevin Zimmer, Greene, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/909,782

(22) Filed: Jun. 4, 2013

(65) Prior Publication Data

US 2014/0148944 A1 May 29, 2014

Related U.S. Application Data

(63) Continuation of application No. 12/677,720, filed as application No. PCT/US2008/010715 on Sep. 12, 2008, now Pat. No. 8,457,781.

(60) Provisional application No. 60/960,050, filed on Sep. 13, 2007, provisional application No. 61/071,860, filed on May 22, 2008.

(51) Int. Cl.
*B07C 3/00* (2006.01)
*B07C 5/00* (2006.01)

(52) U.S. Cl.
CPC ... *B07C 3/00* (2013.01); *B07C 5/00* (2013.01); *Y10S 209/90* (2013.01)

(58) Field of Classification Search
USPC ........................ 209/584, 900; 271/2; 700/224
See application file for complete search history.

(56) References Cited

U.S. PATENT DOCUMENTS 5,833,076 A 11/1998 Harres et al.
5,857,830 A 1/1999 Harres et al.

(Continued)

FOREIGN PATENT DOCUMENTS

WO WO-03011484 2/2003
WO WO-2006110484 10/2006

OTHER PUBLICATIONS

Extended European Search Report for Application No. 08830359.9 dated Jun. 21, 2012.

(Continued)

*Primary Examiner* — Leslie A Nicholson, III

(74) *Attorney, Agent, or Firm* — Marcus P. Efthimiou; Andrew M. Calderon; Roberts Mlotkowski Safran & Cole, P.C.

(57) ABSTRACT

The invention generally relates to a facility wide sorting and/or sequencing system for improving product processing operations and, more particularly, to a facility wide system and related functionality for simultaneously sorting and sequencing mixed mail pieces such as, for example, flats and letter mail pieces. The flats and letter mail pieces are placed in frames so that all types of mail pieces can be sorted and/or sequenced simultaneously through merging and diverting a stream of filled trays into and out of different streams at a full or substantially full transport speed.

15 Claims, 312 Drawing Sheets

(56) References Cited

U.S. PATENT DOCUMENTS

| | | | |
|---|---|---|---|
| 5,947,468 | A | 9/1999 | McKee et al. |
| 5,993,132 | A | 11/1999 | Harres et al. |
| 6,026,967 | A | 2/2000 | Isaacs et al. |
| 6,135,697 | A | 10/2000 | Isaacs et al. |
| 6,183,191 | B1 | 2/2001 | Mondie et al. |
| 6,390,756 | B1 | 5/2002 | Isaacs et al. |
| 2003/0038065 | A1 | 2/2003 | Pippin et al. |
| 2003/0168388 | A1 | 9/2003 | Malatesta |
| 2005/0230222 | A1 | 10/2005 | Olson et al. |
| 2005/0247606 | A1 | 11/2005 | Redford et al. |
| 2007/0056886 | A1 | 3/2007 | Yui |
| 2009/0000996 | A1 | 1/2009 | Stemmle |
| 2010/0049360 | A1 | 2/2010 | Stemmle |
| 2010/0070070 | A1 | 3/2010 | Stemmle |

OTHER PUBLICATIONS

European Office Action for Application No. 08830359.9 dated Aug. 19, 2014; 3 Pages.

(Front View)

Pinch-belt Folder
(Shown in its Normal Position)

(Back View)

FIG. 17D

Single Recirculation Zone

FIG. 33E
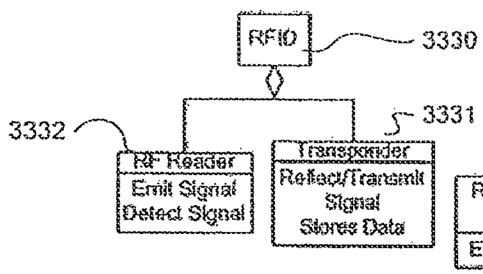
FIG. 33D
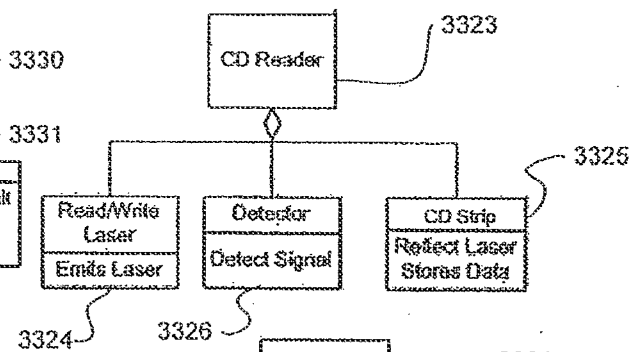
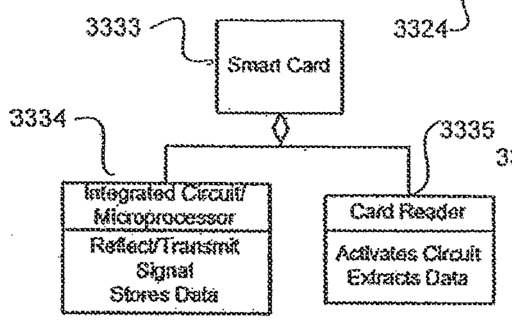
FIG. 33F
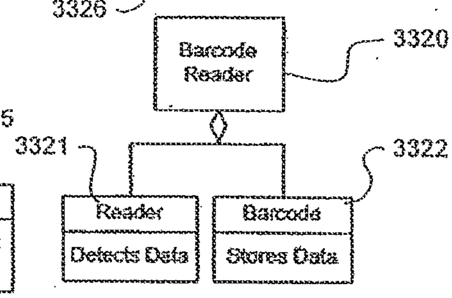
FIG. 33C
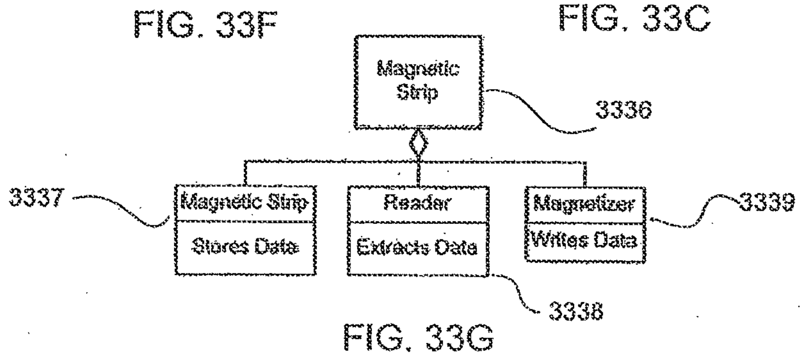
FIG. 33G

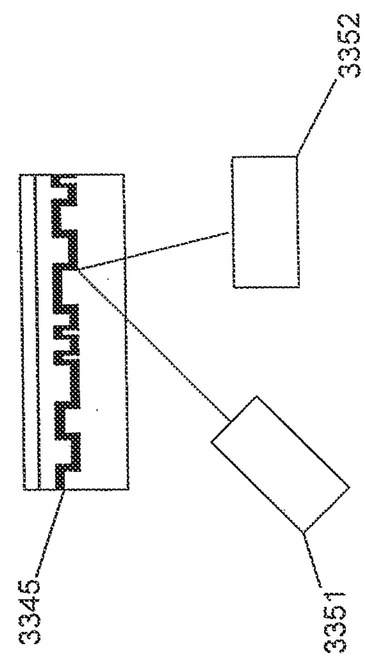
FIG. 33I(ii)

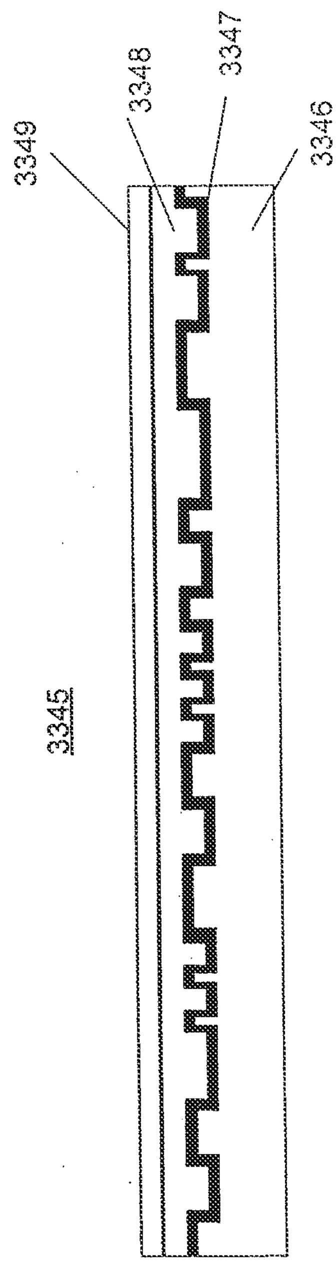
FIG. 33I(iii)

Typical Smart Card
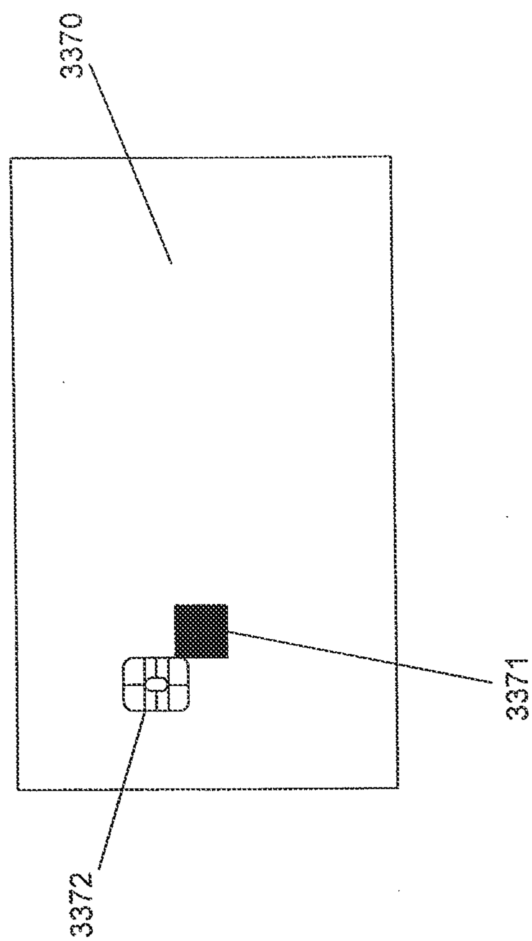
FIG. 33K(ii)

3390

Presorted mail skew
(dynamic allocation - ideal)

Accumulator Tubes (4 foot tubes)

| 2 feet | 2 feet |
|---|---|
| Group 1 | Group 1 |
| Group 2 | Group 1 |
| Group 3 | Group 3 |
| Group 4 | Group 4 |
| Group 5 | Group 4 |
| Group 6 | Group 6 |
| Group 7 | Group 7 |
| Group 8 | Group 8 |
| Group 9 | Group 9 |
| Group 10 | Group 10 |

| Item base 10 values | Item base 3 values | Breakdown of item values (base 3) | | |
|---|---|---|---|---|
| | | Third pass: | Second pass: | First pass: |
| 0 | 000 | 0 | 0 | 0 |
| 1 | 001 | 0 | 0 | 1 |
| 2 | 002 | 0 | 0 | 2 |
| 3 | 010 | 0 | 1 | 0 |
| 4 | 011 | 0 | 1 | 1 |
| 5 | 012 | 0 | 1 | 2 |
| 6 | 020 | 0 | 2 | 0 |
| 7 | 021 | 0 | 2 | 1 |
| 8 | 022 | 0 | 2 | 2 |
| 9 | 100 | 1 | 0 | 0 |
| 10 | 101 | 1 | 0 | 1 |
| 11 | 102 | 1 | 0 | 2 |
| 12 | 110 | 1 | 1 | 0 |
| 13 | 111 | 1 | 1 | 1 |
| 14 | 112 | 1 | 1 | 2 |
| 15 | 120 | 1 | 2 | 0 |
| 16 | 121 | 1 | 2 | 1 |
| 17 | 122 | 1 | 2 | 2 |
| 18 | 200 | 2 | 0 | 0 |
| 19 | 201 | 2 | 0 | 1 |
| 20 | 202 | 2 | 0 | 2 |
| 21 | 210 | 2 | 1 | 0 |
| 22 | 211 | 2 | 1 | 1 |
| 23 | 212 | 2 | 1 | 2 |
| 24 | 220 | 2 | 2 | 0 |
| 25 | 221 | 2 | 2 | 1 |
| 26 | 222 | 2 | 2 | 2 |

FIG. 42GG

| Item # | 1st Pass (mod 4) | 2nd Pass (mod 3) | 3rd Pass (mod 2) | 1st Pass (mod 2) | 2nd Pass (mod 3) | 3rd Pass (mod 4) | 1st Pass (mod 3) | 2nd Pass (mod 2) | 3rd Pass (mod 3) |
|---|---|---|---|---|---|---|---|---|---|
| 0 | 0 | 0 | 0 | 0 | 0 | 0 | 0 | 0 | 0 |
| 14 | 2 | 0 | 1 | 0 | 1 | 2 | 2 | 0 | 2 |
| 10 | 2 | 2 | 0 | 0 | 2 | 1 | 1 | 1 | 1 |
| 5 | 1 | 1 | 0 | 1 | 2 | 0 | 2 | 1 | 0 |
| 15 | 3 | 0 | 1 | 1 | 1 | 2 | 0 | 1 | 2 |
| 7 | 3 | 1 | 0 | 1 | 0 | 1 | 1 | 0 | 1 |
| 2 | 2 | 0 | 0 | 0 | 1 | 0 | 2 | 0 | 0 |
| 13 | 1 | 0 | 1 | 1 | 0 | 2 | 1 | 0 | 2 |
| 9 | 1 | 2 | 0 | 1 | 1 | 1 | 0 | 1 | 1 |
| 1 | 1 | 0 | 0 | 1 | 0 | 0 | 1 | 0 | 0 |
| 8 | 0 | 2 | 0 | 0 | 1 | 1 | 2 | 0 | 1 |
| 4 | 0 | 1 | 0 | 0 | 2 | 0 | 1 | 1 | 0 |
| 12 | 0 | 0 | 1 | 0 | 0 | 2 | 0 | 0 | 2 |
| 6 | 2 | 1 | 0 | 0 | 0 | 1 | 0 | 0 | 1 |
| 3 | 3 | 0 | 0 | 1 | 1 | 0 | 0 | 1 | 0 |
| 11 | 3 | 2 | 0 | 1 | 2 | 1 | 2 | 1 | 1 |

FIG. 42AAA

FACILITY WIDE MIXED MAIL SORTING AND/OR SEQUENCING SYSTEM AND COMPONENTS AND METHODS THEREOF

CROSS REFERENCE TO RELATED APPLICATIONS

The present application claims priority to U.S. Provisional Application No. 60/960,050 filed on Sep. 13, 2007 and U.S. Provisional Application No. 61/071,860 filed on May 22, 2008, the disclosures of which are incorporated by reference in their entireties herein.

DESCRIPTION

1. Field of the Invention

The invention generally relates to a facility wide sorting and sequencing system for improving product processing operations and, more particularly, to a facility wide system and related functionality for simultaneously sorting and sequencing mixed mail pieces such as, for example, flats and letter mail pieces.

2. Background Description

The sorting of mail is a very complex, time consuming task. In general, the sorting of mail is processed through many stages, including front end and back end processes, which sort and sequence the mail in delivery order sequence. These processes can either be manual or automated, depending on the mail sorting facility or the type of mail to be sorted such as packages, flats, letter and the like. A host of other factors may also contribute to the automation of the mail sorting, from budgetary concerns to modernization initiatives to access to appropriate technologies to a host of other factors.

Many form factors of mail pieces make sortation machines difficult to design and easy to jam. That is, mail pieces come in many sizes and shapes. These sizes and shapes create the opportunities for sortation jams. Frequent jamming is a major factor of not being able to operate a sortation operation automatically. However, in a facility wide sortation system, it is necessary to be able to sort millions of mail pieces a day. To accomplish this, mail pieces in a stream must be conveyed at very high rates from many inputs and selectively diverted to one of many outputs.

Currently, most mail processing of flats and letter mail use many passes with different machines to effectively sequence the mail. For example, flats are sorted and sequenced on one type of machine, whereas, letter mail pieces are sorted and sequenced on another type of machine. In fact, due to the different shapes, sizes and other considerations that must be taken into account with each type of mail piece, e.g., flat and letter mail pieces, there is no current machine or facility wide system that can sort, sequence, track and perform other processes simultaneously for each type of mail piece.

As an example, the current method of moving mail pieces is either end-to-end on a belt or in a tub or container. There are many disadvantages in such systems. For example, belts with non-uniform mail pieces of mail cause many opportunities for jamming. Also, belts are physically limited to about 40,000 letters/hour. Also, the different sizes of mail pieces results in handling flats, letters, and parcels in three separate streams, requires three times as many mail processing machines to maintain and operate. Also, such processes result in many manual operations, e.g., moving mail in tubs from machine to machine, which is labor intensive.

SUMMARY OF THE INVENTION

In aspects of the invention, a system comprises a facility-wide mail sorting and/or sequencing system. As used herein, in all embodiments, articles, objects and/or products include mail pieces, e.g., flat and letter mail pieces (and small parcels). Similarly, mail pieces, e.g., flat and letter mail pieces (and small parcels), may be articles, products and/or objects. Accordingly, as disclosed herein, limitations should not be placed on the terminology, either singularly or in the plural, for mail pieces, articles, products and/or objects. However, distinction should be given to the use of mail pieces as either flats, letters and/or small parcels. Also, it should be understood that the system and method of the present invention can be used in many different combinations and alternatives and that unless known by those of skill in the art to be exclusively mutual, each embodiment can be practiced alone or any combination thereof By way of non-limiting examples, the following is a list of acronyms that may be used in the instant application. This list should not be considered exhaustive of all acronyms used herein, and is provided merely for reference and convenience. These acronyms may also be defined within the instant application.

| Acronym | Description |
|---|---|
| AFCS | Advanced Facer Canceller System |
| AFSM 100 | Automated Flat Sorting Machine 100 |
| APPS | Automated Package Processing System |
| AMC | Airport Mail Center |
| AO | Associate Office |
| API | Application Programming Interface |
| ATHS | Automatic Tray Handling System |
| BCR | Bar Code Reader |
| BMC | Bulk Mail Center |
| BODS | Barracuda Operational Data Store |
| CIOSS | Combined Input/Output Subsystem |
| CPU | Central Processing Unit |
| DBA | Database Administrator |
| DBCS | Delivery Bar Code Sorter |
| DBCS-OSS | Delivery Bar Code Sorter/Output Subsystem |
| DIOSS | Delivery Bar Code Sorter Input/Output Subsystem |
| DPS | Delivery Point Sequencing |
| DU | Delivery Unit |
| EFFS | External File Format Specification |
| EOR | End of Run |
| FCM | First Class Mail |
| FICS | Flats Identification Code Sort |
| FIFO | First In First Out |
| FIM | Facing Identification Mark is a bar code designed by the United States Postal Service to assist in the automated processing of mail. In embodiments, FIM can be a set of vertical bars printed on the mail pieces. FIM is intended for use primarily on preprinted mail pieces printed by a sender. |
| FRU | Field Replaceable Unit |
| FSM | Flat Sorting Machine |
| FSS | Flat Sequence System |
| GPS | Global Positioning System |
| GUI | Graphical User Interface |
| HMI | Human Machine Interface |
| HTTP | Hypertext Transfer Protocol |
| ICD | Interface Control Document |
| ID | Identification |
| IDS | Integrated Data System |
| JDBC | Java Database Connectivity |
| LAN | Local Area Network |
| MPE | Mail Processing Equipment |
| MTE | Mail Transport Equipment |
| NDSS | National Directory Support System |
| OCR | Optical Character Reader |
| ODBC | Open Database Connectivity |
| PICS | Postal Identification Code Sort |
| PMPC | Priority Mail Processing Center |
| P&DC | Processing and Distribution Center |
| P&DF | Processing and Distribution Facility |
| RBCS | Remote Bar Coding System |
| RCR | Remote Computer Reader |
| RDBMS | Relational Database Management System |
| REC | Remote Encoding Center |
| RMA | Reliability, Maintainability, Availability |

-continued

| Acronym | Description |
|---|---|
| SAD | System Architecture Document |
| SOP | System Operating Procedure |
| SQL | Sequential Query Language |
| SSS | System/Subsystem Specification |
| TCP/IP | Transmission Control Protocol/Internet Protocol |
| TPM | Technical Performance Measurement |
| UFSM | Upgraded Flat Sorting Machine |
| URS | Universal Recognition System |
| USPS | United States Postal Service |
| ZIP | Zone Improvement Program |

By way of non-limiting explanation, the following is a list of exemplary definitions that may be used in conjunction with terminology disclosed in the instant application. This list should not be considered exhaustive of all definitions used herein, nor should this list be considered, in any way, to limit the terminology used in the instant application. These definitions are provided for reference, convenience and by way of further explanation and are in no way to be construed as limiting to the present invention. Additionally, it is noted that variations of the below terminology may be used in the instant application, which also should not be considered to be limiting the present invention, in view of the below definitions.

| | |
|---|---|
| Bucket | A segment of the transport system, conveyance system or the like used in the facility-wide sorting and/or sequencing system of the invention For example, a bucket can be a transport tube or section of the conveyance mechanism that transports frames, prior to a divert. |
| Chain | The shortest consecutive series of shuttles whose mail is in DPS order. In embodiments, a chain is formed from approximately 10 shuttles after primary sequencing. |
| Container | An object that holds multiple mail pieces for dispatch. Mail pieces are removed from frames and placed into containers. The term "container" is synonymous with the term "tray" or "mail tray". |
| Container Dispatcher | A subsystem that transports containers filled with sorted/sequenced mail pieces to dispatch areas within the mail center. |
| Container Induction Station | A physical component that allows empty containers and container labels to be received into the system. |
| Container Loader | A subsystem that loads containers for dispatch. |
| Cross-belt Transport Unit | A transport unit that is used to transport shuttles within a matrix. In embodiments, cross-belt transport units are energized in powered elevators and run on that charge during non-powered elevator and lane travel. Each matrix contains several cross-belt transport units. |
| Destinating Segment | A section of the system that handles induction, sequencing, and storage for, in embodiments, approximately 100,000 mail pieces. Each destinating segment receives frames from a unique Presort Accumulator tube. In embodiments, each destinating segment is comprised of 5 destinating units, including 1 Presorting Unit, 1 presequencing Unit, and 3 Primary Sequencing Units. |
| Destinating Unit | This is part of a destinating segment that provides sequencing functions and storage in a destinating segment. In embodiments, there can be three types of destinating units - a Presorting Unit, a presequencing Unit, and a Primary Sequencing Unit. |
| Dispatch Matrix | This is a matrix within a destinating unit in which frames are loaded back into shuttles for sequencing functions and carts are staged for dispatch. |
| Divert | This is the action of moving a frame from one path onto another path within the system. |
| Docking Elevator | A non-powered or powered elevator that allows shuttle docking and undocking. |
| Docking Station | A component in the system that loads and unloads individual frames into and out of a shuttle. |
| Elevator | A vertical path within a matrix or grid. |
| Final Sequencing | The last level of sequencing of destinating mail that occurs after initial sequencing, during dispatch. Final sequencing combines groups of frames that is to be sent to the same AO/DU, separated by carrier route or box section. |
| Frame | An object that contains a single mail piece. |
| Frame ID | A number or other indicia that uniquely identifies every frame at a P&DC and is physically located on the frame. |
| Frame Induction Station | A component that allows empty frames to be received into the system. |
| Frame Inserter | A subsystem that inserts mail pieces into frames. |
| Frame Inspector | A subsystem that inspects frames for signs of degradation in order to remove frames from the system prior to failure. |
| Frame Transport Tube | A horizontal tube adjacent to a matrix that moves individual frames in lead screws to accomplish the sequencing functions. |
| Frame Unloaders/ Extractor | A function in the system that unloads mail pieces from frames into delivery trays for dispatch. |
| Grid | See, definition for Matrix. |
| Induct Crossover Elevator | A powered elevator, found in a Dispatch Matrix in a Presorting Unit, that stages shuttles containing empty frames needed for mail induction and returns empty shuttles to the Dispatch Matrix. |
| Induction Unit | A front-end interface for mail induction into the system that consists of multiple mail feeders and frame inserters. An induction unit is part of a Presorting Unit. |
| Initial Sequencing/Presquencing | The first level of sequencing of destinating mail that occurs after presorting and before final sequencing. Initial sequencing is performed on groups of frames. |

-continued

| | |
|---|---|
| Initial Sorting | The first level of sorting that occurs after presorting and before final sequencing. Initial sorting divides groups of frames into sets of routes across multiple ZIP codes. |
| Input Segment | The physical components that perform the entire process of mail induction, which includes the Induction Manager and Frame Inserter subsystems. |
| Load Manifest | A list of frame IDs that identifies a group of frames, which are ready for container loading, in the order of the frames in the group. Load manifests are created during final sorting/sequencing. |
| Matrix (Grid) | A component of a destinating unit that consists of multiple levels (rows) and elevators (columns) and manipulates shuttles for sorting and sequencing. Shuttles move along travel lanes in the horizontal (x-axis) direction and elevators in the vertical (y-axis) direction. |
| Matrix Crossover | The transfer of shuttles between the Storage Matrix and the Dispatch Matrix through adjacent elevators. |
| Matrix Crossover Down-Elevator | A non-powered elevator in both the Storage Matrix and the Dispatch Matrix that moves shuttles to the lowest level for crossover into the other matrix. |
| Matrix Crossover Up-Elevator | A powered elevator in both the Storage Matrix and the Dispatch Matrix that moves shuttles to the highest level for crossover into the other matrix and also energizes cross-belt transport units. |
| Presequence Sorter | The part of a Presequencing Unit in which presequence sorting is accomplished to divide the allocated mail flow into equitable sets of routes by mail volume. The presequence Sorter utilizes the storage and dispatch matrices needed to perform presequencing. |
| Presequencing Unit | A type of destinating unit that is used for presequencing and consists of shuttle docking and undocking, a storage matrix and dispatch matrix, and a storage block in a destinating segment. It also moves frames for dispatch into frame unloaders/container loaders. |
| Presort Accumulator | A subsystem that consists of "n" accumulator tubes and performs the initial separation of mail pieces contained in frames and loads the frames into shuttles for transport. |
| Presorting Unit | A type of destinating unit that is used for presorting and may include, for example, a Presort Accumulator, a storage matrix and dispatch matrix, shuttle docking and undocking, and a storage block. It also moves frames for dispatch into frame unloaders/container loaders. |
| Primary Local Transport | The transport conveyor that moves shuttles to and from the system transport and between destinating units within a destinating segment. The primary local transport is located at the highest level of the storage matrix and moves in the same direction as the system transport. |
| Primary Sequencing Unit | A type of destinating unit that is used for initial sequencing of the mail flow to DPS and consists of shuttles docking and undocking, a storage matrix and dispatch matrix, and a storage block. It can also move frames for dispatch into frame unloaders/container loaders. |
| Right angle divert (RAD) | The action of moving a frame from one path onto another path, such that the frame moves at a right angle (left or right). |
| (Secondary) Local Transport | The transport conveyor that moves shuttles between destinating units within a destinating segment. |
| Sequencer | A subsystem that performs several sequencing steps, including sorting/pre-sequencing, initial sequencing, and post-sequencing. |
| Sequencing | A term that refers to the operations that are performed on destinating mail to prepare it for dispatch. Sequencing results in a combined letters/flats mail flow being put into DPS order. |
| Shuttle | A specialized apparatus or device that holds and moves a set of frames through the system. |
| Snake | A longer consecutive series of shuttles whose mail is in DPS order. In one contemplated embodiment, a snake is formed from approximately 100 shuttles after post-sequencing. |
| Sorting | A term that refers to the operations that break up the mail stream into ZIP codes and delivery routes for sequencing. |
| Storage Block | The storage area in each destinating unit. A storage block consists of multiple storage towers. |
| Storage Down-Elevator | A non-powered elevator that transports shuttles in a Storage Matrix from a higher level to a lower level. |
| Storage Manager | A subsystem that manages the storage of mail pieces contained in frames that are waiting for final sorting/sequencing and dispatch. |
| Storage Matrix | The matrix within a destinating unit in which shuttles are moved into and out of the storage block and frames are unloaded from shuttles for sequencing and dispatch functions. |
| Storage Tower (or unit) | A vertical column of storage within a storage block. |
| Storage Up-Elevator | An elevator that transports shuttles in a Storage Matrix from a lower level to a higher level and also energizes cross-belt transport units. |
| Storage U-tube (U-tube for short) | The smallest area of storage within a storage block that is "U"-shaped and can contain up to 24 shuttles. |
| Stream | The longest consecutive series of shuttles whose mail is in DPS order. A stream is formed during final sequencing in which all frames in all shuttles in a storage block are sequenced for dispatch. |

-continued

| | |
|---|---|
| System Manager | A subsystem that performs several types of system functions, including configuration management, data management, reporting, maintenance and diagnostics, etc. |
| System Transport | The transport conveyor that moves shuttles between destinating segments. The system transport moves in one direction and interfaces to the local transport within each destinating segment. The system transport also interfaces to the frame and shuttle management functions. |
| Transport Controller | A subsystem that physically moves frames between other subsystems. |
| Travel Lane (or just Lane) | A horizontal path within a matrix for shuttle travel. Shuttles travel in one direction only on the lowest and highest levels of the matrix. The travel lane on the lowest level is used to move shuttles to a Storage Elevator to be sent to a higher level in the matrix. The travel lane on the highest level is used to move shuttles to and from the Primary Local Transport and to a Storage Elevator to be sent to a lower level in the matrix. |

In aspects of the invention, the system comprises an existing equipment interface for interfacing the input section with the facility-wide mail sorting and/or sequencing system. In embodiments, the existing equipment interface comprises at least one of: a physical interface; a mail piece synchronization data stream interface; a mail piece attribute data stream interface; a control interface; an emergency stop signal interface; and an interface logic module. The physical interface is operable to receive one or more mail pieces from the input section of the existing equipment. The mail piece synchronization data stream interface is operable to relate mail piece attribute data of a mail piece with a position of the mail piece. The mail piece attribute data stream interface is operable to transmit mail piece attribute data between the existing equipment and the facility-wide mail sorting and/or sequencing system. The control interface is operable to provide a control signal between the existing equipment and the facility-wide mail sorting and/or sequencing system. The emergency stop signal interface is operable to provide an emergency stop signal that removes power for the existing equipment and the facility-wide mail sorting and/or sequencing system. The interface logic module is operable to simulate signals and commands to unused sections of the existing equipment. The interface logic module is modular and configured to support interface to input sections of one or more existing equipment.

In aspects of the invention, an existing equipment interface system is configured to interface with an existing equipment with a facility-wide mail sorting and/or sequencing system. The interface comprises at least one of: a physical interface; a mail piece synchronization data stream interface; a mail piece attribute data stream interface; a control interface; an emergency stop signal interface; and an interface logic module.

In aspects of the invention, a method of processing mail pieces comprises: providing an existing equipment interface; interfacing input sections of existing equipment with a facility-wide mail sorting and/or sequencing system using the existing equipment interface; receiving new mail piece attribute data via the existing equipment interface; receiving new mail piece synchronization data via the existing equipment interface; associating the new mail piece attribute data with a particular mail piece using the new mail piece synchronization data; storing the association of the new mail piece attribute data with the particular mail piece in a storage system; detecting the particular mail piece via the existing equipment interface; updating the association of the new mail piece attribute data with the particular mail piece from the storage system to indicate the particular mail piece was received by the facility-wide mail sorting and/or sequencing system; and sorting and/or sequencing the particular mail piece using the facility-wide mail sorting and/or sequencing system. The method further comprises: determining if the association of the new mail piece attribute data with the particular mail piece exists yet in the storage system; determining if a predetermined time period has expired if the association of the new mail piece attribute data with the particular mail piece does not yet exist in the storage system; and triggering an error signal if the predetermined time period has expired.

In aspects of the invention, a machine or method is provided for automatically culling, facing and canceling mail pieces that are to be sequenced by a sequencing system. A first unit culls products that are unsuitable for sequencing. A second unit faces the products, which have not been culled, by determining the existence and location of a valid indicia and then orienting the products. A third unit cancels the faced products having a valid indicia. A fourth unit monitors whether the culling, facing and canceling units are functioning normally and provides a warning signal when the units are not functioning normally. A fifth unit inducts the products. A sixth unit or sequencing system performs the actual sequencing, and it is responsive to the warning signal from the monitoring unit. The system further comprises a redundant back up system for performing the culling, facing and canceling functions when the monitoring unit indicates that the units are not functioning normally.

In aspects of the invention, a method for use with a sequencing system comprises: culling and rejecting products that are unsuitable for sequencing; facing the remaining products, which have not been culled, by determining the existence and location of a valid indicia and by orienting the products; canceling the faced products having a valid indicia; and monitoring whether the culling, facing and canceling are functioning normally and to provide a warning to the sequencing system when there is abnormal functioning.

In aspects of the invention, a transportable facility comprises a unit comprising: a plurality of parallel adjacent aisles which may be internal adjacent aisles; a conveyor aisle provided in each storage aisle to transport mail pieces along a respective storage aisle; a conveyor aisle extending in a direction transverse to the parallel storage aisles; a conveyor aisle conveyor provided in the conveyor aisle to transport mail pieces along the conveyor aisle; a transport device that transfers the mail pieces between the conveyor aisle conveyor and the storage aisle conveyors; and a port that provides access between the exterior and the interior of the unit. The transportable facility further comprises: a plurality of vertically stacked adjacent storage aisles; and a plurality of vertically stacked conveyor aisles. The transportable facility further comprises an elevator to raise and lower the mail pieces between respective vertically stacked adjacent storage aisles and vertically stacked conveyor aisles. The transportable facility further comprises a conveying device that transports mail pieces between the port of the shipping container storage unit and a processing and distribution center. The container unit comprising a trailer configured to be connected to a driving device.

In aspects of the invention, a method of expanding an existing processing and distribution center comprises transporting mail pieces between an existing structure to outside of the existing structure by a conveyance system that physically connects processes inside the existing structure to a moveable container unit (e.g., transportable facility) which includes equipment for further processes of the mail pieces. The method further comprises transporting the mail pieces through a port that provides access between an exterior and the interior of the container unit. The method further comprises disconnecting the conveyance system and processing mail pieces while the container unit is being driven.

In further aspects of the invention, a method of automatically sequencing mail pieces within a movable container unit that is external to a building structure comprises protecting the mail pieces from the elements. The method further comprises transporting the sequenced mail pieces near or through a port that provides access between an exterior and the interior of the container unit. The method further comprises sequencing the mail while the container unit is being driven.

In aspects of the invention, a system comprises: a system management subsystem; a plurality of subsystems; a system management local area network (LAN) providing a communication channel between the system management subsystem and the plurality of subsystems; and at least one local LAN providing a communication channel between at least two of the plurality of subsystems. The system further comprises a modem access to the system management subsystem. The at least one local LAN provides the communication channel between high-use subsystems. The at least one local LAN reduces network congestion on the system management LAN. The system management subsystem is operable to provide network routing and control. The overall system management and control signals are communicated on the system management LAN. The authorized and authenticated users access the system via the system management LAN.

In aspects of the invention, a method of configuring a networked system comprises: providing a system management local area network (LAN) between a system management subsystem and a plurality of subsystems; and providing at least one local LAN between at least two subsystems of the plurality of subsystems. The system management LAN is operable to provide at least one of: overall system management and control signals between the system management subsystem and the plurality of subsystems; and authorized and authenticated users access to the system. The at least one local LAN is operable to provide a communication channel between high-use subsystems of the plurality of subsystems.

In aspects of the invention, a system and method is provided for centralized address recognition in a facility wide sorting machine with multiple layers of “onboard address recognition”. The invention also provides, in embodiments, a system and method for associating video coding returns with mail pieces and frame/clamp IDs. The invention also provides, in embodiments, a centralized address recognition system comprising a centralized address recognition sub-system and at least one of a facing canceling sub-system, a mail piece feeding sub-system, a flats feeding sub-system, and a parcel feeding sub-system. The invention also provides, in embodiments, that the centralized address recognition sub-system receives information from the at least one of the facing canceling sub-system, the mail piece feeding sub-system, the flats feeding sub-system, and the parcel feeding sub-system. The invention also provides, in embodiments, that the centralized address recognition sub-system provides information to one or more banks of centralized video coding.

The invention also provides, in embodiments, that the centralized address recognition sub-system communicates with one or more banks of centralized video coding and the at least one of the facing canceling sub-system, the mail piece feeding sub-system, the flats feeding sub-system, and the parcel feeding sub-system. The invention also provides, in embodiments, that the centralized address recognition system further comprises a mail piece buffering system. The centralized address recognition sub-system communicates with a mail piece buffering system, one or more banks of centralized video coding, and the at least one of the facing canceling sub-system, the mail piece feeding sub-system, the flats feeding sub-system, and the parcel feeding sub-system. The centralized address recognition sub-system provides information to a mail piece buffering system, provides information to one or more banks of centralized video coding, and receives information from the at least one of the facing canceling sub-system, the mail piece feeding sub-system, the flats feeding sub-system, and the parcel feeding sub-system.

The invention also provides, in embodiments, a method for centralized address recognition comprising utilizing at least one system recited above to provide information to a mail piece buffering system. The invention also provides, in embodiments, a method for centralized address recognition comprising utilizing at least one system recited above to provide information to one or more banks of centralized video coding. The method for centralized address recognition comprises utilizing at least one system recited above to receive information from the at least one of the facing canceling sub-system, the mail piece feeding sub-system, the flats feeding sub-system, and the parcel feeding sub-system.

In aspects of the invention, a system comprising a server associated with a facility-wide sorting and/or sequencing system is provided. The server receives and obtains external data from at least one external source associated with mail inbound to a facility utilizing the facility-wide sorting and/or sequencing system, and based upon the external data, the server generates assignments for handling the mail within the facility. In embodiments, the external data comprises at least one of: GPS data associated with an incoming truck; delivery data from a processing and distribution center; delivery data from a presort house; delivery data from a surface visibility database; and manually or automatically entered data from mail carried on a truck. In embodiments, the assignments include at least one of: receipt location, time and location to move the mail within the facility, storage location of the mail within the facility-wide sorting and/or sequencing system, identification of a feeder of the facility-wide sorting and/or sequencing system to input the mail into, time to enter the mail into the feeder of the facility-wide sorting and/or sequencing system, dispatch time from the facility-wide sorting and/or sequencing system, and output location. In embodiments, the mail comprises letter and flat mail pieces that are sequenced together in the facility-wide sorting and/or sequencing system.

Based upon the data, the server may generate handling assignments for processing and/or transporting other mail within the facility utilizing the facility-wide sorting and/or sequencing system. In embodiments, based upon the data being updated, the server generates new assignments for handling the mail within the facility. In embodiments, the server is implemented in a computer infrastructure comprising hardware and software stored on a tangible storage medium. In embodiments, the server receives and/or obtains internal data from at least one source internal to the facility, and the server generates the assignments based upon both the external data and the internal data. The internal data comprises operating status of a component of the facility-wide sorting and/or sequencing system. In embodiments, the server transmits the assignments to an operator through an interface displayed on a personal digital assistant.

In aspects of the invention, a processing system comprises: a base module capable of performing all of the processes of the processing system; and at least one expansion module configured to be connected to the base module so as to increase a processing capacity of the processing system. The processing system is a mail processing system. The base module and at least one expansion module are provided in a number corresponding to a mail processing capacity of a particular mail processing facility. The base module comprises a system manager that manages the systems of the base module, the system manager is configured to manage the systems of the at least one expansion module when the at least one expansion module is added to the mail processing system. The at least one expansion module comprises less than all of the subsystems contained in the base module and is plug and play compatible with the base module. Each of the at least one expansion module has a processing capacity equal to a processing capacity of the base module.

In aspects of the invention, a mail processing system comprises: at least one mail processing module having a plurality of parallel branches configured to independently process mail pieces. The at least one mail processing module comprises a base module. The at least one mail processing module comprises a base module and at least one expansion module. The plurality of parallel branches comprises at least one additional parallel branch in excess of a number of parallel branches required to meet a mail processing capacity of a mail processing facility. The at least one additional parallel branch in excess of a number of parallel branches required to meet the mail processing capacity of the mail processing facility is maintained in an out-of-service state when a mail processing capacity of the at least one additional branch is not required to meet the mail processing capacity of the mail processing facility. The at least one additional parallel branch in excess of a number of parallel branches required to meet the mail processing capacity of the mail processing facility is maintained in an in-service state when a mail processing capacity of the at least one additional branch is required to meet the mail processing capacity of the mail processing facility. The at least one additional branch which is maintained in an out-of-service state is selected by routinely rotating each of the plurality of parallel branches from the in-service and out-of-service states such that wear on the plurality of parallel branches, due to processing the mail pieces, is evenly distributed among the plurality of parallel branches. The plurality of parallel branches comprise units of the base module and at least one expansion module, each unit of the base module being aligned linearly with a corresponding unit of the at least one expansion module so as to define the plurality of parallel branches. A segment level is defined by arranging similar processing segments of the at least one mail processing module in parallel with each other. A subsystem level is defined by arranging subsystems of the at least one mail processing module in parallel with each other. A component level is defined by arranging components of the at least one mail processing module in parallel with each other.

In aspects of the invention, a system comprises: one or more regional command centers; at least one processing and delivery center hierarchically arranged below each of the one or more regional centers; and at least one mail processing/handling equipment (MPE/MHE) hierarchically arranged below the at least one processing and delivery center. The one or more regional centers, the at least one processing and delivery center and the at least one mail processing/handling equipment utilize a service oriented architecture. A national command center is hierarchically arranged above the one or more regional command centers, wherein the national command center utilizes the service oriented architecture.

In embodiments, the system is configured to stage information on at least one of the at least one mail processing/handling equipment, centrally within the at least one processing and delivery center and centrally within one of the one or more regional command centers. The information comprises at least one of mail piece messages detailing a mail piece ZIP and bar code information; MPE statuses; data point of a key state and data variables on the MPE/MHE; mail piece location information; end-of-run information; start-of-run information; command interface information; sort plan information; operator information; throughput information; fault information; a communication network heartbeat status; and end-of-run summary information. The messages to and from the at least one mail processing/handling equipment and the one or more regional command centers comprise at least one of extensible mark-up language (XML) format messages and simple object access protocol (SOAP) format messages. A commercial off-the-shelf software business engine implements at least one of basic message routing, tracking, authentication, message delivery, and associated business rules. The new functionality is added to the system with only changes to a scripting language.

The system is operable to monitor and collect information for disparate mail processing/handling equipment from the at least one processing and delivery center using the service oriented architecture. The at least one of the national command center and one of the one or more regional command centers are configured to perform centralized management functions, including at least one of: property management and inventory, software inventory, distribution, and configuration management, and remote hardware, network or software diagnostics.

In embodiments, the system is operable to provide at least one of: alarm, error, warning event and status notification, and escalation; data archiving, backup, purging and management; remote access to at least one of MPE/MHE assets and/or command center assets; user and system authentication setup; auditing of all actions taken; auditing of all messages received; routing of command signals; remote configuration of individual mail processing equipment; a scoring of an accuracy of MPE/MHE operators; staged storage of images and data; interpretation and reporting MPE/MHE performance data; remote viewing of MPE/MHE images; searching, displaying, and managing threat data over a distributed network; an update of MPE/MHE libraries/software; an operator performance measurement and efficiency reporting; operator/supervisor communication; a linking of passenger identification between a remote database and MPE/MHEs; a linking of other MPE/MHE scans of a specific article; a scheduling update or software download of files; remote control of operator/user functions; command and control of MPE; a gathering of computer/system/user diagnostic data; remote training of users; storing and queuing of information; configuration of a scanning machine; report generation; remote desktop sharing; report threat scanning machine utilization; report machine performance; communication of data, image, training, configuration, audit, database registry to at least one of the national control center and one of the plurality of regional control centers for at least one of centralized management, archiving, and temporary storage; capturing and reporting of technical performance measurement (TPM) operator keystroke information; remote restart monitoring; operator user tracking and time keeping; traveler identification information gathering, comparing to existing databases of MPE/MHEs, and correlating to baggage; and a security encryption of a data stream.

In embodiments, the system is operable to provide remote and system management functions including at least one of: access security and auditing; property management and inventory; software inventory, distribution and configuration management; remote hardware/network/software diagnostics; event and status notification and escalation; data archiving, backup, purging and management; remote access to MPE/MHE and airport command center assets; and remote restart monitoring. The system is operable to provide equipment specific processing including at least one of: remote configuration of individual MPE/MHE; a configuration file of MPE/MHEs; staged storage of images and data; interpreting and reporting MPE/MHE performance data; remote viewing of MPE/MHE images; searching, displaying, and managing configuration files and executables over a distributed network; interfacing to existing MPE/MHE units; update of MPE/MHE libraries; an operator performance measurement and efficiency reporting; escalation of detected threats; operator/supervisor communication; linking of operator training certification between different operator stations; linking other MPE/MHE scans of the specific article; and mail image distribution prior to video coding terminal identification.

In aspects of the invention, a conveyance system for transporting a plurality of frames comprises: a plurality of input conveyance paths; a plurality of output conveyance paths; and at least one conveyance mechanism. The plurality of frames is directed through the plurality of input and output conveyance paths. The at least one conveyance mechanism is a divert mechanism configured to divert at least one of the plurality of frames from one of the plurality of input conveyance paths to at least one of the output conveyance paths at a generally constant conveyance speed (e.g., full transport speed during a right angle divert). The plurality of input and output conveyance paths are lead screw conveyance paths. The divert mechanism is a rotating cam divert mechanism including a rotating cam having a bypass setting and a divert setting. The rotating cam further includes a front wall, a flared back wall, and a channel defined therebetween for selectively directing a conveyance direction of the plurality of frames. The plurality of input and output conveyance paths are tooth belt conveyance paths.

In embodiments, the divert mechanism is a pinch belt divert mechanism including a pinch belt conveyance mechanism configured to run continuously and to engage a projecting pin from an upper portion of at least one of the plurality of frames being transported, and at least two lifting mechanisms configured for selectively lifting the plurality of frames from the tooth belt conveyance path to the pinch belt conveyance mechanism. The plurality of input and output conveyance paths comprises timing belt conveyance paths. In embodiments, the divert mechanism is a vertical divert mechanism including a rotatable gate for selectively diverting the plurality of frames in a vertical direction from at least one of the plurality of input conveyance paths, and a guide for bridging a gap between an intersection of the at least one of the plurality of input conveyance paths and at least one of the plurality of output conveyance paths. The plurality of input and output conveyance paths are threaded roller conveyance paths. In embodiments, the divert mechanism is a rotatable slotted cam divert mechanism configured to selectively divert at least one of the plurality of frames. The at least one conveyance mechanism is a compression mechanism configured to adjust the gaps between adjacent frames in the conveyance system.

In embodiments, a plurality of lead screws is arranged in parallel and configured to rotate, each screw having a predetermined pitch and bevel provided at least one end thereof. The conveyance system further includes a plurality of inset compression screws inset from and parallel to the plurality of lead screws configured to adjust the gaps between adjacent frames. The conveyance system further includes a plurality of outset compression screws outset from and parallel to the plurality of lead screws configured to adjust the gaps between adjacent frames. The conveyance system further includes a plurality of inline compression screws configured to adjust the gaps between adjacent frames and disposed along a horizontal axis shared by the plurality of lead screws.

In aspects of the invention, methods and apparatus are adapted for use in a mail processing system, but for use in systems more generally for processing other products. The apparatus includes a succession of frames adapted to be transported within the mail processing system along a transport path, each of such frames adapted to contain a single mail piece during processing within the mail processing system. The processing includes sorting and sequencing. Each of the frames has an extraction opening, such as at the bottom and/or sides, through which the single mail piece is extracted. The invention includes an extraction arrangement to extract the single mail pieces from the succession of frames for subsequent placement in delivery containers. Each of the frames has a common shape factor, which facilitates the processing of the mail pieces, or other products. The frames can also have different shapes. According to a particular embodiment, the frames have a rectangular, or substantially rectangular, shape.

In embodiments, the extraction arrangement, according to a particular embodiment, is positioned along the transport path and is structured and arranged to extract the mail pieces successively from the frames as the frames are fed to the extraction arrangement. Alternatively, a plurality of mail pieces can be simultaneously extracted from a plurality of frames from the succession of frames. The extraction arrangement according to the invention encompasses a vacuum extractor adapted to engage the mail pieces by means of a vacuum while the mail pieces are contained within respective ones of the frames. Alternatively, grippers and/or pushers can be used. Still further, the invention encompasses a gravity-extraction device to extract mail pieces via gravity through the extraction openings, such as at the bottom of the frames. In a further alternative according to the invention, the extraction arrangement comprises an extraction frame adapted to be transported along the transport path. In such an embodiment, the extraction opening of each of the mail frames is at a side of each of the frames. The extraction frame is configured and arranged to have a mail piece extracted from a mail frame while the mail frame moves along the transport path. In such alternative, the succession of extractor frames is movable along a path merging with the transport path of the succession of mail frames at a merge region, the extractor frames being engageable with mail pieces in respective ones of the mail frames at the merge region and effect extraction of the mail piece after the mail frame is transported through the merge.

In embodiments, a mail-engaging extractor, such as any of those mentioned above, is positioned and adapted to acquire a mail piece upon movement of such mail piece beyond the mail frame. Further, in such alternative, movement of the succession of extractor frames along the aforementioned path can be uni-directional only or bi-directional. In the latter, the movement of the extractor frames is bi-directional between a pair of buffer storage areas. In addition, in such alternative, one or more mail-loaded shuttles is adapted to be positioned at a docking station for unloading the mail frames to the transport path and for extracting the mail pieces during movement of the extractor frames in a first direction along the path in the bi-directional movement of the extractor frames. After unloading of the mail frames, a shuttle is adapted to receive a plurality of empty mail frames at a docking station during movement of the extractor frames in a second direction along the path in the bi-directional movement of the extractor frames. The extraction frames themselves can each include a pop-up, movable from a non-pop-up position for maintaining the extraction frame with a thin profile for insertion within the mail frame, to a pop-up position for engagement with a mail piece within the mail frame to effect extraction of the mail piece. A mail frame particularly configured for use with such extractor frames includes slots for sliding engagement with the tabs of the extractor frames.

In aspects of the invention, a mail piece container is adapted to maintain a single mail piece in a mail processing system. The container comprises: a frame comprising at least a pair of engageable portions adapted to be engaged by a driving mechanism for transporting a plurality of successive containers within the mail processing system; a folder having at least one portion movably connected to the frame, the folder having at least a portion movable relative to the frame between: a first position for facilitating selective insertion and extraction of a single mail piece within the container; and a second position, wherein the folder is empty of any mail piece.

In embodiments, the frame has a length and a width and the engageable portions are positioned to orient the frame during travel within the mail processing system other than in a direction along the length of the frame. The direction the frame is oriented is an angle of 45° with respect to the direction of travel. In the first position of the folder, insertion and extraction of the mail piece is facilitated; and in the second position of the folder, no mail piece is contained in the folder and the folder has a minimized width. The frame is rigid and the movable portion of the folder is movable away from the rigid frame to the first position. The frame is generally rectangular and the folder is generally rectangular. The movable portion of the folder is pivotable away from the rigid frame to contain a mail piece at a common connection between the frame and the folder. The folder includes at least one actuator tab adapted to be manipulated by a mechanism for moving the folder to the first position. The movable portion of the folder is slidable relative to the frame. The movable portion of the folder is maintained generally parallel to the frame during movement to the first position. At least one opening is maintained between the frame and the folder for insertion and extraction of a mail piece relative to the container. The at least one opening is located at a top and/or at a side of the container.

In aspects of the invention, an apparatus for output packaging of mixed mail pieces after the mail pieces have completed processing in a mail processing system is provided. The apparatus comprises: a staging area for receiving a stream of stacked mixed mail pieces; a stream of empty containers, each of the empty containers being adapted to contain a predetermined segment of the mixed mail pieces; a plurality of stack-segmenting elements movable selectively and individually from outside the stream of stacked mail pieces to within the stream; a containerable stack segment being created at the staging area by at least a downstream one of the stack-segmenting elements and an upstream one of the stack-segmenting elements; and a slide panel for receiving, from the staging area, the containerable stack segment held by the upstream and downstream stack-segmenting elements. The slide panel is movable from a receiving position to a releasing position, whereby movement of the slide panel to the releasing position exposes the containerable stack segment held by the upstream and downstream stack-segmenting elements to one of the empty containers. The stack segment is released by the stack-segmenting elements and the stack segment is positioned within the one of the empty containers.

In embodiments, the plurality of stack-segmenting elements comprises a plurality of paddles selectively positionable within the stream of mixed mail pieces. The plurality of stack-segmenting elements comprise a plurality of paddles selectively positionable within the stream of mixed mail pieces to maintain perpendicularity of the mail pieces relative to a reference support surface. The plurality of paddles comprises three paddles. A first of the three paddles is a downstream paddle for engaging a downstream end of the containerable stack segment. A second and a third of the three paddles are upstream paddles, the upstream paddles being movable to alternate in replacing one another in positions of (1) retaining the stream of mixed mail pieces, and (2) creating the containerable stack segment with the downstream paddle. The stream of empty containers is positioned along a path lower than a height of the slide panel. Successive ones of the empty containers are positionable directly beneath the slide panel, whereby the release of the containerable stack segment by the stack-segmenting elements allows the stack segment to fall by means of gravity into the one of the successive ones of the empty containers. The slide panel is movable to the release position in a direction away from containers containing respective mixed mail stack segments. Each of the empty containers of the stream of empty containers has a volume substantially equal to a volume of respective ones of the containerable stack segments formed by the apparatus. The containerable stack segment is held by the upstream and downstream stack-segmenting elements by means of pressure toward each other to compress the stack segment. The containerable stack segment is released by the upstream and downstream stack-segmenting elements releasing the pressure.

In aspects of the invention, there is a method of sequencing objects or products, e.g., mail pieces, in a facility-wide system. The method comprises: obtaining a system-wide sort plan from a centralized server; and distributing the system-wide sort plan to a plurality of subsystems of the facility-wide mail sorting and/or sequencing system. In embodiments, the method further comprises creating a modified sort plan based upon the system-wide sort plan and system data. The system data may include an operating status of at least one component of the facility-wide mail sorting and/or sequencing system. The method may further comprise modifying the modified sort plan at one of the plurality of subsystems. In embodiments, the method further comprises executing the modified sort plan on a plurality of components of facility-wide mail sorting and/or sequencing system to provide an output of objects arranged in a delivery point sequence. The objects comprise letters and flats. In embodiments, the obtaining, the creating, and the distributing are performed by a sort plan server. In further embodiments, the sort plan server receives and/or obtains the system data from a system manager. The sort plan server comprises software embodied in a tangible storage medium. In embodiments, the system-wide sort plan directs objects through a path, the system data indicates that the path is unavailable, and the modified sort plan directs the objects on an alternate path instead of the path. In embodiments, the system wide sort plan is created by the centralized server and is obtained via a postal service wide area network (WAN).

In aspects of the invention, a method is provided for correlating mail piece and frame identifiers. The method comprises: determining at least one mail piece identifier of a mail piece; determining a frame identifier of a frame to contain the mail piece; creating an association between the at least one mail piece identifier and the frame identifier; and storing the association in a data store so that the mail piece is identifiable by the frame identifier. The method further comprises: determining at least one mail piece attribute; and including the at least one mail piece attribute in the association between the at least one mail piece identifier and the frame identifier. The at least one mail piece attribute comprises at least one of: a weight; a length; a width; a height; an address; a return address; destination information; and data contained in indicia. The at least one mail piece identifier comprises at least one of: one or more bar codes; an address; a zone improvement plan (ZIP) code; a radio frequency identification (RFID) tag; and an indicia identifier. Each individual mail piece is associated with an individual frame used to transport the mail piece. Each frame identifier is permanently associated with a particular frame. The method further comprises performing a mail piece attribute information retrieval process. The mail piece attribute information retrieval process comprises: identifying a particular frame identifier; and retrieving at least one of the at least one mail piece identifier and the at least one mail piece attribute information based on the particular frame identifier from the data store. The data store is a database.

In aspects of the invention, a system comprises: a mail piece identifier tool configured to determine at least one mail piece identifier of a mail piece; a frame identifier tool configured to determine a frame identifier of a frame to contain the mail piece; an association tool configured to create an association between the at least one mail piece identifier and the frame identifier; and a data store configured to store the association so that the mail piece is identifiable by the frame identifier.

According to aspects of the invention, a system comprises a server comprising a frame routing agent that operates to: store a system transport map of a transportation network associated with a facility wide sorting and/or sequencing system; and determine a path for transporting a product through a portion of the transportation network based upon the system transport map. In embodiments, the system transport map is a data structure, and the frame routing agent updates the data structure upon receipt of a notification of a change in operational status of a component of the transportation network.

In particular embodiments, the transportation network comprises redundant paths between subsystems of the facility wide sorting and/or sequencing system. For example, the transportation network comprises a plurality of transport lanes and a plurality of switches arranged to physically transport the object. Also, the system transport map may contain a definition of the plurality of switches. Additionally, the definition of each one of the plurality of switches comprises a status of at least one output of the respective switch. Moreover, the determining may be based upon a starting destination, an ending destination, and available ones of the plurality of switches as defined in the system transport map. In further embodiments, the frame routing agent comprises a routing advisor and a divert watchdog. The server may be implemented in a computer infrastructure comprising a computer program product stored in a tangible storage medium.

In aspects of the invention, a presorting unit comprises at least one induction unit configured to split mail pieces into a plurality of split pathways for placement into frames. In embodiments, the induction unit includes at least one feeder, a first pathway having a plurality of diverter gates. The at least one feeder may be configured to direct mail pieces into the first pathway, and the mail pieces may be given a source identifier at the at least one feeder. The plurality of split pathways may have spaced intervals adjacent a side of the first pathway. The presorting unit further includes a plurality of frame inserters provided adjacent second ends of the plurality of split pathways. The plurality of diverter gates may selectively divert mail pieces from the first pathway to one of the plurality of split pathways, and the plurality of frame inserters may be configured to place the mail pieces into the frames.

In embodiments, the presorting unit may further comprise a pre-sort accumulator configured for presorting frames comprising a plurality of frame storage areas for storing frames for transit and a plurality of docking stations configured to receive shuttles to transport the frames from the plurality of frame storage areas. In further embodiments, the presorting unit includes a transport pathway that directs the frames from the plurality of frame inserters to the pre-sort accumulator. Lanes extend from the frame inserters towards the transport pathway. In still further embodiments, the plurality of frame inserters receive frames from a plurality of frame induction pathways. The plurality of frame induction pathways may be lead screws, and the first pathway may be a pinch belt. Similarly, the lanes and transport pathway may be lead screws, and the plurality of split pathways may be pinch belts.

In aspects of the invention, a method of inducting and extracting mail pieces within a presorting unit is provided. The method comprises: directing mail pieces into an induction unit; directing the mail pieces through a first pathway; diverting the mail pieces among a plurality of split pathways to a plurality of frame inserters; and inducting the mail pieces into frames at the plurality of frame inserters associated with each of the plurality of split pathways. In embodiments, the method further comprises directing the frames from the plurality of frame inserters to a transport pathway; directing the frames into a presort accumulator having a plurality of frame storage areas; storing the frames in the plurality of frame storage areas for transport; docking shuttles to the plurality of frame storage areas; and loading the shuttles with frames for entry into a mail sorting and sequencing system.

In aspects of the invention, a system and method for inducting, inspecting, and replacing individual mail containers, e.g., frames, in a facility-wide letters/flats mail sorting and/or sequencing system is provided. The invention also provides, in embodiments, a frame manager system comprising an empty frame receiving system, a frame inspection system, and a system for loading frames onto transports. The transports comprise shuttles which transport the frames to one or more locations in a facility-wide letters/flats mail sorting and/or sequencing system. The frame manager system may communicate with and/or send and receive data to and from at least one of a transport controller system, a storage manager system, a shuttle manager system, and a system manager system. The frame manager system may further comprise at least one of a frame identification table, a frame induction controller, a machine control operational interface, and a frame manager operator console.

The invention also provides, in embodiments, a method of managing frames in a facility-wide letters/flats mail sorting and/or sequencing system, wherein the method comprises utilizing at least one system discussed above to at least one of induct frames, manage frames, inspect frames, and load frames. The invention also provides, in embodiments, a shuttle manager system comprising an empty shuttle receiving system and a shuttle reading system. The shuttle transports frames to one or more locations in a facility-wide letters/flats mail sorting and/or sequencing system. The shuttle manager system may communicate with and/or sends and receives data to and from at least one of a frame manager system and a system manager system. The shuttle manager system may further comprise at least one of a shuttle identification table, a shuttle induction controller, a machine control operational interface, and a shuttle manager operator console. The invention also provides, in embodiments, a method of managing shuttles in a facility-wide letters/flats mail sorting and/or sequencing system. The method comprises utilizing at least one system recited above to at least one of induct shuttles, manage shuttles, inspect shuttles, and read shuttles.

In aspects of the invention, a transportation and storage system for vertical and horizontal transportation of shuttles comprises: a matrix grid including a plurality of intersecting tracks defining a plurality of horizontal paths and a plurality of vertical paths; a plurality of transport elements configured to move on the tracks along the plurality of horizontal and vertical paths and transport the shuttles; and a driving mechanism that drives each of the plurality of transport elements on the tracks along the plurality of horizontal and vertical paths. The driving mechanism comprises: a plurality of pinion gears provided on each transport element; a rack provided on each of the tracks, each rack is configured to cooperate with the respective pinion gears; and a power source provided on each of the transport elements to propel a respective transport element on the tracks along the plurality of horizontal and vertical paths. The power source comprises one of a charging device or a power storage device. Each transport element further comprises a cross belt conveyor configured to support contents thereon, to load contents thereon, and to eject contents therefrom.

The transportation system further comprises a plurality of shuttles to hold mail pieces therein, where each shuttle is configured to be supported on a respective transport element. A wireless device is configured to send and/or receive commands to sort the mail pieces held in the shuttles. The matrix grid further comprises a buffer system comprising a portion of the intersecting tracks. The buffer system is configured to hold a plurality of shuttles therein during loading of shuttles into the matrix grid. The matrix grid further comprises a plurality of tubes comprising an elongated portion of the intersecting tracks. The tubes are configured to hold a plurality of shuttles therein during sorting or sequencing.

In aspects of the invention, a system of vertical and horizontal transportation of shuttles comprises: providing a transportation system including: a matrix grid including a plurality of intersecting tracks defining a plurality of horizontal paths and a plurality of vertical paths; a plurality of transport elements configured to move on the tracks along the plurality of horizontal and vertical paths; a driving mechanism that drives each of the plurality of transport elements on the tracks along the plurality of horizontal and vertical paths; a plurality of shuttles to hold a plurality of frames that have mail pieces therein, each shuttle being configured to be supported on a respective transport element; and a buffer system comprising a portion of the intersecting tracks. The buffer system configured to hold a plurality of shuttles therein during loading of shuttles into the matrix grid.

In aspects of the invention, a method comprises: storing a plurality of shuttles in a transportation system; filling the shuttles with frames containing mail pieces; positioning the filled shuttles in respective transportation elements; positioning respective transportation elements with shuttles thereon in a buffer system; and moving the transportation elements with shuttles thereon along horizontal and vertical paths to store the shuttles for ordering.

In aspects of the invention, a system and method is provided for buffering mail pieces for address recognition completion in a facility-wide letters/flats mail sequencing system. The invention provides, in embodiments, a frame buffer system comprising a frame receiving system and a buffer controller system. The frame receiving system may receive frames from a frame inserter. The frame buffer system comprises a frame reader. The frame buffer system comprises a mail piece extractor. The frame buffer system may further comprise a frame staging buffer. The frame buffer system may further comprise a frame and mail piece association table. The frame buffer system may further comprise at least one of frame locator and an address receiver.

In aspects of the invention, the invention provides, in embodiments, a method of: buffering frames comprising utilizing at least one system recited above to at least one of receive frames with mail; read frames with mail; buffer frames; and extract mail from the frames. The invention provides, in embodiments, a method of buffering frames in a facility-wide mail sorting and/or sequencing system. The method comprises: utilizing at least one system recited above to at least one of receive frames with mail; read frames with mail; buffer frames; and extract mail from the frames.

In aspects of the invention, the invention provides, in embodiments, a method of buffering frames comprising receiving and accepting frames and reading the frames, placing the frames into at least one frame staging buffer, retrieving address results, comparing a frame ID to a mail ID, locating a frame in the at least one frame staging buffer, providing ID and position data to a buffer controller, identifying and removing expired frames, and sending expired frames to a mail piece extractor.

In aspects of the invention, a mail-merger processing system for merging DPS letters and DPS flats together, comprise: a DPS letters frame inserter which receives DPS letters and inserts the DPS letters into frames; a DPS flats frame inserter which receives DPS flats and inserts the DPS flats into frames; and a conveying system for the DPS letters and DPS flats to be combined into a mixed stream containing both DPS letters and DPS flats. The DPS letters are sequenced prior to being inserted into the DPS letters frame inserter and the DPS flats are sequenced prior to being inserted into the DPS flats frame inserter. The prior sequencing of the DPS letters are performed, for example, by Delivery Bar Code Sorters (DBCSs) and the prior sequencing of the DPS flats are performed, for example, by a Flats Sequencing System (FSS). A transportation subsystem connects an output of the DBCSs to an input of the DPS letters frame inserter, and the transportation subsystem connects an output of the FSS to an input of the DPS flats frame inserter. The merger of DPS letter and DPS flats include diverting both the DPS letter and DPS flats at right angles within a transportation subsystem. The mixed stream is a plurality of mixed streams. A buffer is configured to temporarily store at least one of DPS letters and DPS flats prior to inserting the DPS letters and DPS flats into the DPS letters frame inserter and DPS flats frame inserter. A buffer is configured to temporarily store at least one of DPS letters and DPS flats after inserting the DPS letters and DPS flats into the DPS letters frame inserter and DPS flats frame inserter, and before merging the DPS letters and DPS flats into the mixed stream. A base module is capable of performing all of the processes of the mail merger processing system. The least one expansion module is configured to be connected to the base module so as to increase a processing capacity of the processing system. The DPS letters and DPS flats are extracted from the frames and placed into at least one delivery tray, and wherein the frames from which the DPS letters and DPS flats are extracted are returned to a point in the mail-merger processing system so as to receive other DPS letters and other DPS flats from the DPS letters frame inserter and the DPS flats frame inserter.

In aspects of the invention, a computer implemented method of providing a user interface for a handling facility is provided. The method comprises: presenting a user interface on at least one of: a console associated with a unit of handling equipment (MHE), a networked computer of the handling facility, a personal data assistant, and a smart telephone; and utilizing the user interface to perform: operator training, system monitoring, event handling, and personnel monitoring. In embodiments, the utilizing comprises utilizing the user interface to perform all of: the operator training, the system monitoring, the event handling, and the personnel monitoring. In embodiments, the utilizing comprises utilizing the user interface to perform the operator training, which comprises: receiving a request from an operator to operate a machine; verifying whether the operator is qualified to operate the machine; based upon the verifying, when the operator is not qualified to use the machine, providing training to the operator via the user interface; and, based upon the verifying, when the operator is qualified to use the machine, permitting the operator to operate the machine via the user interface.

In embodiments, the utilizing comprises utilizing the user interface to perform the system monitoring, which comprises: at least one of gathering and receiving system data associated with at least one machine of the mail processing facility; and presenting statistical data, based upon the system data, to a user via the user interface. The system data comprises at least one of: operator action associated with the at least one machine, maintenance action associated with the at least one machine, throughput of the at least one machine, and status of the at least one machine. Moreover, the statistical data comprises at least one of: processing volume associated with the at least one machine, jam status associated with the at least one machine, unavailability of the at least one machine, and deviation of an operational parameter of the at least one machine by more than a predetermined value from a mean value.

In embodiments, the utilizing comprises utilizing the user interface to perform the event handling, which comprises: detecting an event associated with a machine; presenting a portion of a user manual associated with the event to an operator via the user interface; receiving at least one annotation from the user via the user interface; and updating the portion of the user manual based upon the at least one annotation. The portion of the user manual may contain at least one hyperlink to at least one other portion of the user manual.

In embodiments, the utilizing comprises utilizing the user interface to perform the personnel monitoring, which comprises: at least one of gathering and receiving personnel data associated with at least one operator; and presenting statistical data, based upon the personnel data, to a user via the user interface. The personnel data comprises at least one of: attendance, compliance with training, throughput while operating a machine, time operating the machine, amount of mail feed starvation while operating the machine, amount of mail processed while operating the machine. In embodiments, a software program that defines the user interface is stored on a tangible storage medium in the at least one of: the console associated with a unit of mail handling equipment (MHE), the networked computer of the mail handling facility, the personal data assistant, and the smart telephone. In embodiments, the handling facility is a mail handling facility and the handling equipment (MHE) is mail handling equipment In aspects of the invention, an induction system or method is used to induct products into a sequencing system. A feeder conveys the products into the induction system, and an optical imaging unit captures an image of the products being conveyed into the system. A unit decodes barcodes on the products, and another unit decodes ID tags on the products. A unit profiles the physical attributes of the products including the dimensions, shape and weight of the products. The addresses or redirected addresses on the products are recognized, and then verified to determine whether the recognized addresses are deliverable addresses. A staging area is used to buffer products that include an address that cannot be immediately recognized or verified. At least one holdout bin is used for receiving products that cannot be inducted into the sequencing system. An optical character recognition (OCR) unit is provided for recognizing optical characters on the products. A unit is provided for applying an ID tag to the products. An interface to a system is provided that performs video coding of the products. A unit is provided for performing indicia verification. The induction system further includes software logic to perform address arbitration between an address result determined by online address recognition and video coding. The induction system further comprises an interface to a system that determines if addresses on products are redirected addresses. The induction system further comprises an interface to a video coding system. The induction system further comprises at least one holdout bin for receiving products that are determined to have redirected addresses. The induction system further comprises a unit for applying ID tags onto the products. The induction system further includes at least one holdout bin for receiving products that contain specific indicia.

In aspects of the invention, a method is provided for inducting products into a sequencing system. The method comprises: conveying the products for further processing; capturing an image of the products being conveyed; decoding barcodes on the products; decoding ID tags on the products; profiling the physical attributes of the products including the dimensions, shape and weight of the products; recognizing the addresses or redirected addresses on the products and for verifying whether the recognized addresses are deliverable addresses; buffering products that include an address that cannot be immediately recognized or verified; and directing products that cannot be inducted into the sequencing system into at least one holdout bin. The method further comprises recognizing optical characters on the products. The method further comprises applying an ID tag to a product. The method further comprises an interface to a system that performs video coding of the products. The method further comprises performing indicia verification. The method further comprises arbitration between an address result determined by online address recognition and video coding. The method further comprises interfacing to a system that determines if addresses on products are redirected addresses. The method further comprises interfacing to a system that performs video coding. The method further comprises interfacing to an Identification Code Sort (ICS) system to look up address results and redirection status. The method further comprises directing products that contain redirected addresses into at least one holdout bin. The method further comprises applying ID tags to the products. The method further comprises directing products that contain specific indicia into at least one holdout bin. The method further comprises performing mail indicia verification on product.

In aspects of the invention, the invention relates to apparatus and methods of inserting mail pieces, such as letters and flats, into frames/folders while maintaining the forward transport motion of the articles. The apparatus is for use in a mail processing system, or in a processing system for any of a wide range of articles, such as flat articles, and comprises a succession of frames adapted to be transported within the mail processing system along a transport path, each of the frames being adapted to contain a single mail piece during processing within the mail processing system, the processing including sorting and sequencing, each of the frames having an opening through which the single mail piece is adapted to be inserted. More specifically, the apparatus includes an arrangement adapted to synchronize movement of the mail pieces with movement of respective ones of the succession of frames and to insert each of the mail pieces within the respective ones of the succession of frames without stopping the mail pieces between such synchronizing and inserting. The opening of each of the frames can be at a side or at the top of the frames. In addition, each of the frames can have a common shape, such as a rectangular shape, or substantially rectangular shape. The arrangement for synchronizing movements of the mail pieces and frames include one or more inserters which can be caused to move relative to empty frames of the succession of frames. Alternatively, movement of the frames can be varied during such synchronization or movement of both the frames and the inserters of the mail pieces can be varied during such synchronization.

In aspects of the invention, a system comprises a server comprising a frame tracking agent that tracks locations of a plurality of frames throughout a facility-wide sorting and/or sequencing system based upon data received from subsystems of the facility-wide sorting and/or sequencing system. The data comprises a plurality of manifests. Each one of the plurality of manifests may include at least one of: frame ID of each frame in a shuttle; shuttle ID; order that frames arranged in the shuttle; a timestamp; a subsystem ID; a component ID; and an address result associated with each frame ID. The server may be implemented in a computer infrastructure comprising hardware and software stored on a tangible storage medium.

In aspects of the invention, a method is provided for tracking frames in a facility-wide sorting and/or sequencing system. The method comprises: generating a manifest; sending the manifest to a frame tracking agent and a receiver; updating a location repository based upon the manifest; updating the manifest; sending the updated manifest to the frame tracking agent; updating the location repository based upon the updated manifest; and generating a new manifest. In embodiments, the updating the location repository based upon the manifest and the updating the location repository based upon the updated manifest are performed by the frame tracking agent. The generating and sending of the manifest may be performed by a sender. Moreover, the updating the manifest, the sending the updated manifest, and the generating the new manifest may be performed by the receiver. In embodiments, the method further comprises: performing a missing frame analysis based upon data in the location repository; and storing results of the missing frame analysis in a validation metrics data store. In even further embodiments, the method comprises at least one of: retrieving by frame ID a location of a frame in the facility-wide sorting and/or sequencing system; retrieving by subsystem ID a list of frames contained within a subsystem in the facility-wide sorting and/or sequencing system; retrieving by component ID a list of frames contained within a component in the facility-wide sorting and/or sequencing system; retrieving by frame ID an entire path that a frame has been routed through; generating by subsystem ID a summation of frame counts through a subsystem over a time period; and generating by component ID a summation of frame counts through a component over a time period.

In aspects of the invention, a stackable cart is provided. The stackable cart comprises: frame having a front, back, and sides; and a bottom hingedly connected to a lower end of the back. In a side view, a height of the back is less than a height of the front and in a top-down view, a width of the back is less than a width of the front such that the cart has a generally trapezoidal footprint. The bottom is biased to an intermediate angular position. The stackable cart further comprises a plurality of rollers connected to the frame of the cart. The bottom is structured and arranged such that: when an object is placed on the bottom, the bottom rotates downwardly from the intermediate position to a substantially horizontal position, and when an other cart is nested into the cart, the bottom rotates upwardly from the intermediate position to an almost vertical position. The intermediate position is at about 45° relative to vertical. At least one pin is connected to the frame of the cart. At least one hole is in the bottom, wherein the hole is structured and arranged to engage the pin. The pin limits downward rotation of the bottom. More specifically, the pin limits downward rotation of the bottom when the bottom reaches a substantially horizontal position. The at least one pin comprises two pins, and the at least one hole comprises two holes. The dimensions include, for example: a height of the back is about 66 inches, a height of the front is about 70 inches, a width of the back is about 40 inches, a width of the front is about 44 inches, and a depth of the frame is about 29 inches.

In aspects of the invention, the invention provides, in embodiments, a system and method for distributing filled trays of destination mail in a facility-wide letters/flats mail sorting and/or sequencing system. In embodiments, the invention also includes a container dispatch distributor (CDD) system for a facility-wide letters/flats mail sorting and/or sequencing system. In embodiments, a system for distributing filled trays of destination mail comprises at least one dispatch lane unit receiving mail trays loading carts with the mail trays.

The invention also provides, in embodiments, that the at least one dispatch lane unit receives the trays from a conveyor transport. The system further comprises at least one reader for reading the trays before the trays are loaded onto the carts. The trays are loaded onto the at least one of the carts at least based on a dispatch allocation plan and/or according to a predetermined plan. The system further comprises transport devices which transport the trays from sequencing units to a conveyor transport. The system further comprises a tray lift device for lifting the tray and loading the trays onto the carts. In embodiments, the system further comprises a device for printing an identification and applying the identification onto the carts. The system further comprises a device for activating a tray retainer arranged on each cart.

The invention provides, in embodiments, a method of distributing filled trays of destination mail comprising utilizing at least one system recited above to at least one of: load trays onto carts, load trays onto carts in an automated manner, and load trays onto carts according to a dispatch allocation plan. The invention also provides, in embodiments, a method of distributing filled trays of destination mail comprising utilizing at least one system recited above to load trays onto a cart, print an identification and apply the identification onto the cart, and activate a tray retainer arranged on the cart.

In aspects of the invention, a method for sequencing products within a storage unit is provided. The method comprises: cycling the products through the storage unit in at least a first cyclic path and a second cyclic path; and diverting selected products from the first cyclic path to the second cyclic path. The products are diverted between the first cyclic path and the second cyclic path, in accordance with a sequencing control which places all the products in a predetermined delivery point sequence within the storage unit. The sequencing control includes: determining a plurality of blocks of consecutively numbered products to sequence; capturing each consecutively numbered product of the first block from the flow of the first cyclic path in a sequential order; placing each captured consecutively numbered product into the second cyclic path; releasing the captured consecutively numbered products from the second cyclic path back into the first cyclic path; and repeating the steps for the remaining blocks until all of the products are placed in the delivery point sequence. The sequencing control includes: capturing a predetermined number of numbered products from the first cyclic path and diverting the captured numbered products to the second cyclic path; pushing the bottom numbered product in the second cyclic path behind the next lower numbered product in the second cyclic path; releasing the bottom numbered product from the second cyclic path back into the first cyclic path, if the bottom numbered product cannot be pushed behind the lower numbered product or if there is no lower numbered product in the second cyclic path; adding a new numbered product from the first cyclic path to the second cyclic path, after the bottom numbered product has been released back into the first cyclic path; and repeating the steps until all of the numbered products are placed in the delivery point sequence in the first cyclic path. The sequencing control can include: diverting the lowest numbered product from the first cyclic path to the second cyclic path; determining when the next lowest numbered product in the first cyclic path is approaching the second cyclic path; diverting the next lowest numbered product from the first cyclic path to the second cyclic path; and repeating the steps until all of the numbered products are placed in the delivery point sequence in the second cyclic path. The sequencing of products occurs in a plurality of storage units in parallel.

In aspects of the invention, a system for sequencing products within a storage unit comprises: an input lane for transporting unsequenced products to an input of the storage unit; a conveyor for cycling the products through the storage unit in at least a first cyclic path and a second cyclic path; a diverter for diverting selected products from the first cyclic path to the second cyclic path; and an output lane for transporting sequenced products from an output of the storage unit. The products are diverted between the first cyclic path and the second cyclic path, in accordance with a sequencing control which places all the products in a predetermined delivery point sequence within the storage unit. The products are transported in frames which are at an angle of substantially 45 degrees to a direction of flow. The conveyor conveys the frames from the input lane into the storage unit using a right angle diverting mechanism. The diverted frames are reoriented in a direction perpendicular to the direction, and the diverter diverts the perpendicularly oriented frames vertically between the first cyclic path and second cyclic path in accordance with the sequencing control. The conveyor orients the perpendicularly oriented frames back into an angle of substantially 45 degrees to a direction of flow before discharging the frames from the storage unit and onto the output lane. The conveyor and the diverter are controlled by a control unit that causes the frames to be diverted in accordance with the sequencing control.

In aspects of the invention, a clamp system comprises a first clamp. The first clamp comprises: a backing having a gap or notch at an upper edge thereof; a divert pin extending upward from the backing and configured to interact with a divert mechanism or angle compensating mechanism; and an upward extending arm from the backing and at a side of the gap or notch. In embodiments, the first clamp further comprises a grasping mechanism extending downward from the upward extending arm and contacting the backing. The upward extending arm includes a vertical extending portion and two horizontal extending portions. The two horizontal extending portions are parallel to one another. A second clamp comprises: a backing having a gap or notch at an upper edge thereof; a divert pin extending upward from the backing and configured to interact with a divert mechanism or angle compensating mechanism; an upward extending arm from the backing and at a side of the gap or notch; and a grasping mechanism which is configured to nest with the gap or notch of the first clamp in order to control a mail piece on the first clamp and minimize a thickness dimension of the nested first clamp and second clamp.

In aspects of the invention, a container comprises: sidewalls and a bottom surface a locking bar extending from at least the sidewalls and configured to pivot between a locked position and an open position, the locking bar including wedge shaped protections configured to interact and contact with a backing of clamps; offsetting channels "CH" or other holding mechanism projecting upwards from the bottom surface and configured to mate with upward extending arms of the clamps; an upward extending substantially centrally located locking tab positioned between the channels, the locking tab being configured to interact with the upward extending arms of the clamps such that when the locking bar is lowered, the wedge shaped projections contact the backing of the clamps, pushing the upward extending arms of the clamps into frictional engagement with the locking tab, effectively holding the clamps in a stationary position. The container includes openings which allow a portion of the upward extending arms of the clamps to extend outside of the container and engage with a driving mechanism.

In aspects of the invention, a storage unit comprises: a drawer having a sliding mechanism to allow access to the drawer; and a channel or transport mechanism for holding clamps therein, wherein a channel or transport mechanism of a first storage unit is at an incline with respect to a channel or transport mechanism of a second storage unit. The storage unit comprises different levels. The storage unit comprises at least one maintenance aisle. The storage unit comprises dual offset channels to store mail pieces with clamps.

In aspects of the invention, the present invention relates to a system and method for automatically identifying frames in a sequencing system. The frames contain products destined to certain delivery points. Machine readable unique frame identification data is associated with each frame. A plurality of readers reads and decodes the unique frame identification data at predefined locations within the sequencing system. A processing unit provides tracking information as the frames move through the sequencing system past the plurality of readers. The tracking information is utilized to place the frames into a destination delivery sequence. The machine readable frame identification data is encoded into a barcode, a linear CD strip, an RFID tag, a smart card or a magnetic stripe.

In aspects of the invention, a method is provided for automatically identifying frames in a sequencing system, the frames containing individual products associated with delivery destinations. The method comprises: associating unique frame identification data with each frame; associating product profile data with the frame identification data of its containing frame; reading and decoding the unique frame identification data at predefined locations within the sequencing system; providing tracking information, as the frames move through the sequencing system. The tracking information is utilized to place the frames into a delivery point sequence. The product profile data is utilized to place the frames into greater levels or sort in addition to the delivery point sequence.

In aspects of the invention, the invention provides a system and method for buffering frames with and/or containing mail pieces in a facility-wide letters/flats mail sorting and/or sequencing system. The invention provides a frame with mail buffer system comprising a presort accumulator. The invention provides a frame with mail buffer system comprising a frame receiving system and a buffer controller system. In embodiments, the frame receiving system may receive frames from at least one mail induction unit. The frame with mail buffer system may further comprise a frame reader. The frame with mail buffer system may further comprise a presort accumulator. The frame with mail buffer system may further comprise a system for transporting the frames along a first path and diverting the frames into at least one accumulator tube. The frame with mail buffer system may further comprise a system for transporting the frames on shuttles along a first path after the frames exit from at least one accumulator tube. The frame with mail buffer system may implement an accumulator allocation plan. The frame with mail buffer system may further comprise a system for presorting the frames and then placing the frames onto shuttles.

In aspects of the invention, the invention also provides, in embodiments, a method of buffering frames containing mail wherein the method utilizes at least one system recited above to at least one of receive frames with mail, and reads frames containing mail, buffers frames containing mail from at least one induction unit, and pre-sorts the frames containing mail in a presort accumulator. The invention additionally provides, in embodiments, a method of buffering frames containing mail comprising receiving and accepting frames containing mail and reading the frames, placing the frames into at least one accumulator tube, presorting the frames, and loading the pre-sorted frames onto shuttles.

In aspects of the invention, a presort accumulator system architecture comprises: a frame reader which receives frames that each have a mail piece from one or more mail induction units, the frame reader reads a frame identification (ID) and communicates with a control function sub-system which includes: a multiplex controller; an accumulator controller, and an accumulator selector, the accumulator selector interfaces with an accumulator allocation plan; a system of accumulator tubes receives the read frames from the frame reader and places the frames into a buffer segment of one or more of the accumulator tubes. Each accumulator tube has an arrangement for moving the frames within the tubes including a buffer segment and a collector segment.

In aspects of the invention, a computer implemented method embodied on a tangible storage medium comprises ascertaining attributes on at least one object using a profiler and determining dimensional data for the at least one object based on the attributes. The method further comprises determining whether the dimensional data is within predefined dimensions, identifying a frame having dimensions larger than the dimensional data, and matching the at least one object with the frame that has dimensions larger than the dimensional data. The method may also comprise associating an identifier for the frame with an attribute of the mail piece, therefore allowing at least one mail piece attribute to be recalled by the frame identifier that holds the mail piece. In embodiments the method may also comprise routing the at least one mail piece to an insertion area where the at least one mail piece can be inserted into the frame. The method may further comprise routing the at least one mail piece that exceeds the predefined dimensions to a holdout to be manually sorted.

In aspects of the invention, the method comprises collecting additional attributes to determine whether the at least one mail piece can be inserted into the frame. The attributes may include at least one of a height, length, width, weight, stiffness, projections, and delivery area of the at least one mail piece. One or more of these attributes may be obtained using one or more of a camera, a light-emitting diode (LED), a charge-coupled device (CCD) or camera, a weight sensor, and a probe.

In aspects of the invention, a system comprises a profiler configured to obtain one or more object attributes, a data storage unit configured to store dimensional data about the obtained one or more object attributes, and an insertion machine configured to insert an object into an appropriately sized frame based on the dimensional data. In embodiments, the object may be a mail piece. The insertion machine may insert the mail piece into the frame with frame dimensions closest to but still larger than the dimensional data. The frame may be at least partially elastic.

In aspects of the invention, the present invention includes a self monitoring and testing unit. In embodiments, the self monitoring and testing unit (i.e., S.M.A.R.T. unit) includes a rugged, portable processing unit configured to pass through a machine including a plurality of sensors and monitors configured to detect and monitor changes in operating conditions of the machine. The plurality of sensors and monitors collect data along a conveyance path through the machine and transmits the collected data to a control unit. The data collected by the plurality of sensors and monitors is analyzed such that machine problems are diagnosed before a failure of the machine. In embodiments, the plurality of sensors and monitors may include at least one camera configured to provide at least one of a plurality of still images and video images so as to monitor mechanical conditions of the conveyance path, and at least one light configured to provide illumination for the at least one camera. In embodiments, the plurality of sensors and monitors may include at least one microphone configured to record audible noises throughout the machine to detect vibration and bearing squeal, at least one infrared thermometer to detect hot spots along the conveyance path before a system failure occurs, and at least one static sensor to monitor buildup of static electricity to prevent damage to equipment along the conveyance path.

In further or other embodiments, the plurality of sensors and monitors may further include at least one force and strain gauge configured to measure forces and strains on parts of a frame that interacts with various structures along the conveyance path, a plurality of accelerometers configured to detect vibrations, shocks, and accelerations experienced by the frames during transport throughout the machine, and at least one humidity sensor configured to monitor humidity changes along the conveyance path. In embodiments, the processing unit may further include a solid state memory configured to store data from at least the plurality of sensors and monitors, and a processor configured to collect the stored data, organize it, and transmit it via a wireless communication transmitter to the control unit. In other embodiments, the processing unit may further include a plurality of connectors provided to allow the processing unit to communicate with peripheral devices to transmit the collected data and receive updated data and other information. In still other embodiments, the processing unit may further include a battery to provide power to the plurality of sensors and monitors, and at least one charge pad configured to recharge the battery and which is configured to contact contacts located along the conveyance path and a remote recharging station. In embodiments, the processing unit may be secured to the frame to provide stable support within the frame during transport.

In aspects of the invention, a method is provided for monitoring and diagnosing operating conditions within a machine. The method comprises: initiating an initial run of a processing unit through the machine to collect base line data of handling characteristics of the machine, collecting operating conditions data on subsequent runs through the machine; comparing the operating conditions data with the base line data; and determining a difference in the operating conditions data and the base line data in order to take at least one of the preventative measures and reactive measures with regard to at least one failing component to prevent a failure from occurring within the machine.

In aspects of the invention, a shuttle mechanism is provided for conveying a plurality of frames to a machine. The shuttle mechanism comprises a shuttle and a docking station of a machine for loading and unloading the plurality of frames. In embodiments, the shuttle comprises a frame member comprising at least two open end walls, a plurality of non-powered transport screws extended between the two open end walls, and side posts having at least two notches to accommodate portions of the plurality of non-powered transport screws. In embodiments, the at least two open ends are generally angled at 45 degrees, wherein the plurality of non-powered transport screws include a plurality of threads, and wherein the plurality of frames are generally angled at 45 degrees and supported by the plurality of non-powered transport screws. In embodiments, the plurality of non-powered transport screws may include at least one female connector for engaging a male connector of a transport screw extending from the docking station, wherein the at least one female connector includes a broached hole, a countersunk rim, a plurality of countersunk notches at spaced intervals along the countersunk rim, and wherein the male connector includes a tapered square tang for self alignment and engagement with the broached hole.

In aspects of the invention, the shuttle may include at least one braking mechanism. The braking mechanism comprises: a guide rod, a plurality of guide rod support blocks; a cam; a brake arm; a brake arm mount; at least first and second elastic members; a deflectable roller cam; and a third elastic member. The brake arm is configured to frictionally engage at least one of the plurality of non-powered transport screws. In embodiments, the cam is displaceable to disengage the brake arm from the at least one non-powered transport screw, and wherein when the guide rod contacts a stationary stopper of the docking station, the cam is displaced. In embodiments, the guide rod support blocks are secured to the shuttle at the bottom wall and the top wall, and the guide rod is supported by and extends through the guide rod support blocks, wherein the guide rod support blocks include an apertures for receiving a portion of the guide rod to slidably pass through, wherein the guide rod support blocks rotatably support at least a lower side of the non-powered transport screws, and wherein a height of the guide rod and the guide rod support blocks with respect to the bottom wall of the shuttle is generally lower than a height at which the non-powered lead screws are mounted to the guide rod support blocks.

In aspects of the invention, the docking station includes at least one swing clamp mechanism having a motor, a telescoping arm, a swing clamp arm, and a grasp element. The swing clamp arm is pivotally attached to an end of the telescoping arm, and wherein the grasp element engages the shuttle for loading and unloading of the plurality of frames.

In aspects of the invention, a method is provided for docking and deploying a shuttle. In embodiments, the method may include detecting an approaching shuttle on a conveyance path leading to a docking station, actuating a swing clamp mechanism by extending a telescoping arm of the swing clamp, rotating the swing clamp arm into the conveyance path of the approaching shuttle; engaging a portion of the shuttle with the swing clamp arm, retracting the telescoping arm, pulling the shuttle towards the docking station such that powered transport screws extending from the docking station engage non-powered transport screws of the shuttle, and mating the non-powered transport screws with the powered transport screws.

In further embodiments the method may include disengaging a plurality of braking mechanisms frictionally engaged to the non-powered transport screws, wherein the braking mechanism includes a brake arm frictionally engaging the non-powered transport screws and a cam, displacing the cam such that the braking mechanisms release the frictional engagement, actuating the powered transport screws such that the engaged non-powered transports screws rotate, and loading a plurality of frames from the machine to the shuttle. In still further embodiments, the method may comprise disengaging the swing clamp mechanism from the shuttle for deployment, extending the telescoping arm and swing clamp arm, rotating the swing clamp arm out of the conveyance path, engaging the braking mechanisms, wherein the brake arm frictionally engages the non-powered transport screws, and deploying the shuttle to a subsequent destination.

In aspects of the invention, the invention provides, in embodiments, a system architecture for a facility-wide letters/flats mail sorting and/or sequencing system comprising at least one processing system, at least one input system, at least one management system, and at least one output system. The at least one processing system comprises at least one of a presort accumulator, a transport controller, and a sequencer. The at least one input system comprises at least one of an induction manager and a frame inserter. The at least one processing system comprises at least one of a frame tracking agent, a frame manager, a storage manager, a system manager, and a shuttle manager. The at least one output system comprises at least one of a container loader and a container dispatcher. The frame inserter may receive frames from the induction manager and send filled frames and empty shuttles to the presort accumulator. The transport controller may receive frames from the frame inserter and the presort accumulator and send filled frames to the sequencer. The frame manager may receive empty frames in shuttles from the transport controller and empty shuttles from a shuttle manager.

In aspects of the invention, the invention provides, in embodiments, a process configuration for a facility-wide letters/flats mail sorting and/or sequencing system utilizing the system described above as well as a method of utilizing the system recited described above to manage mail from input to dispatch. The invention provides, in embodiments, a system configuration for a facility-wide letters/flats mail sorting and/or sequencing system comprising at least one input segment, at least one sequencer segment, at least one storage segment, and a master configuration. The system may further comprise at least one container loader segment. The system may also further comprise at least one dispatch area. The at least one input segment comprises at least one of a presort accumulator and a plurality of presort accumulator tubes. The at least one sequencer segment comprises at least one of a pre-sequence sorter and plural sequencers. The at least one sequencer segment may utilize data from at least one of a sort allocation plan and a sequence plan. The at least one storage segment comprises at least one of a post-sequence collector and plural aisles. The at least one storage segment may utilize data from at least one of a storage allocation plan, a sort allocation plan, and a sequence plan.

In aspects of the invention, the invention also provides, in embodiments, a process configuration for a facility-wide letters/flats mail sorting and/or sequencing system utilizing the system described above and comprising a system manager and a system configuration plan. In further aspects of the invention, the invention also provides, in embodiments, a method of utilizing the system recited above to manage mail from input to dispatch.

In aspects of the invention, a method is provided for performing a sequencing/sorting process of mail pieces. The method comprises: determining a proper sequence for a batch of the mail pieces using one of an N×N sequencing/sorting methodology, an N×M sequencing/sorting methodology and an applied radix sequencing/sorting methodology; and performing a sequencing/sorting of the batch of mail pieces using a plurality of right-angle diverts (RADs), right-angle merges and a plurality of frame transport tubes to rearrange the mail pieces into the proper sequence. The plurality of frame transport tubes are arranged in at least one of a cascading arrangement and a looping arrangement in order to perform the sequencing/sorting of the batch of mail pieces. More specifically, the plurality of frame transport tubes are arranged in at least one of a cascading arrangement and a looping arrangement in order to perform the sequencing/sorting of the batch of mail pieces in a single pass. An output stream of mail pieces of an $n^{th}$ stage of the sequencing/sorting is an input stream for an $(n+1)^{th}$ stage of the sequencing/sorting. The N×M sequencing/sorting methodology comprises building a current list of mail pieces by selecting an available mail piece having a lowest item number from a plurality of input frame transport tubes which is higher than a last item number in the current list. The method further comprises: loading the mail pieces indicated by the mail piece item numbers in the current list into an output frame transport tube if there is no available mail piece having an item number which is higher than the last item number in the current list; and establishing a new current list. The available mail piece is a mail piece exposable to a RAD by removing all mail pieces from the frame transport tubes that are in the current list. The N×M sequencing/sorting methodology utilizes a number of input frame transport tubes and a different number of output frame transport tubes. The applied radix sequencing/sorting methodology utilizes a differing number of frame transport tubes in subsequent stages of the applied radix sequencing/sorting methodology.

In aspects of the invention, a system is provided for performing a sequencing/sorting process of mail pieces. The system comprises: a tool operable to determine a proper sequence for a batch of the mail pieces using one of an N×N sequencing/sorting methodology, an N×M sequencing/sorting methodology and an applied radix sequencing/sorting methodology; and a plurality of right-angle diverts, a plurality of right-angle mergers, and a plurality of frame transport tubes operable to rearrange the batch of the mail pieces into the proper sequence.

BRIEF DESCRIPTION OF THE DRAWINGS

The present invention is described in the detailed description which follows, in reference to the noted plurality of drawings by way of non-limiting examples of exemplary embodiments of the present invention.

FIG. 9I(B) shows a four lead screw conveyance system, as further described with respect to FIG. 9W and FIG. 9X, in accordance with aspects of the invention.

FIG. 11I shows an alternative frame design in accordance with aspects of the invention.

FIG. 17D shows a top view of a first pathway having a plurality of diverter gates in accordance with aspects of the invention.

FIG. 25A is a flow diagram of the mail induction process for a facility wide sequencing system in accordance with aspects of the invention.

FIG. 25B is a detailed flow chart of steps S2506-S2510 of FIG. 25A.

FIG. 25C is a detailed flow diagram of the address arbitration rules of step S2510 in accordance with aspects of the invention.

Figure 26A:
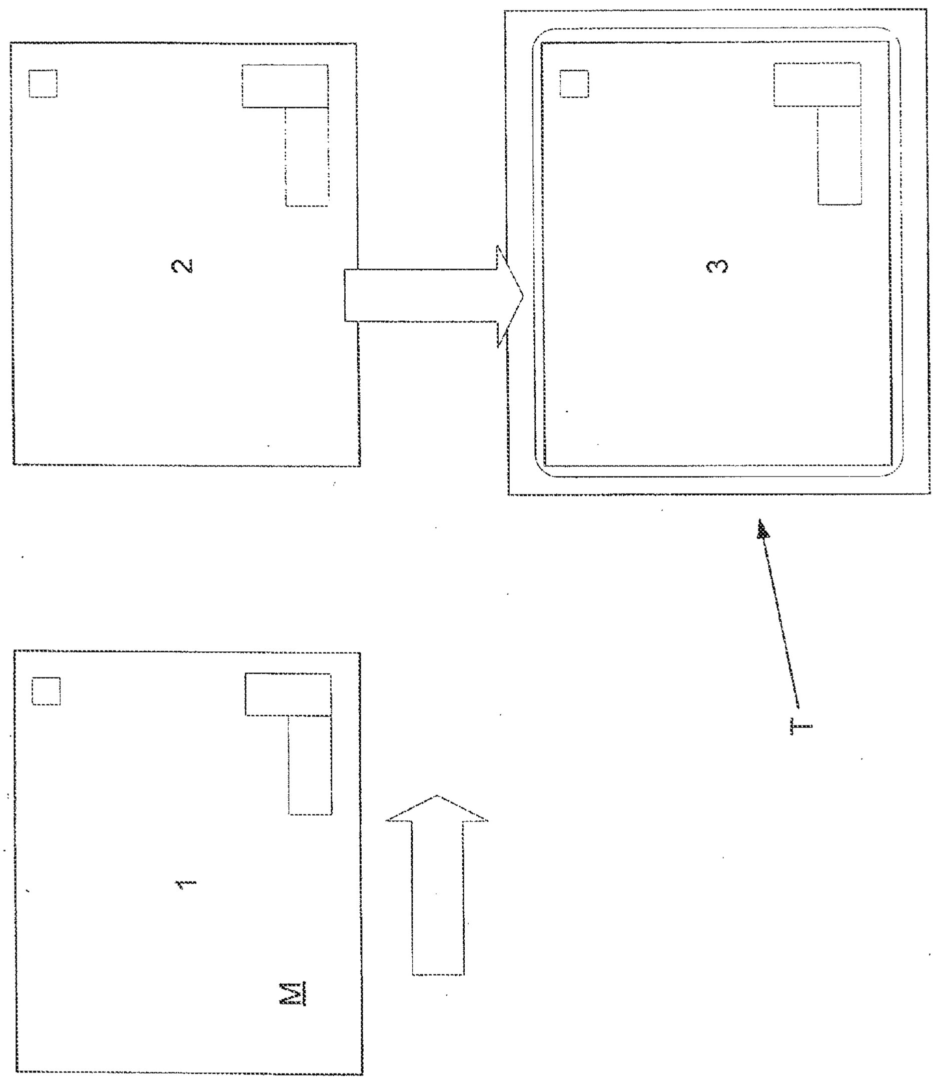

FIG. 26A schematically illustrates a mail piece being inserted into a cartridge in accordance with aspects of the invention.

Figure 26B:
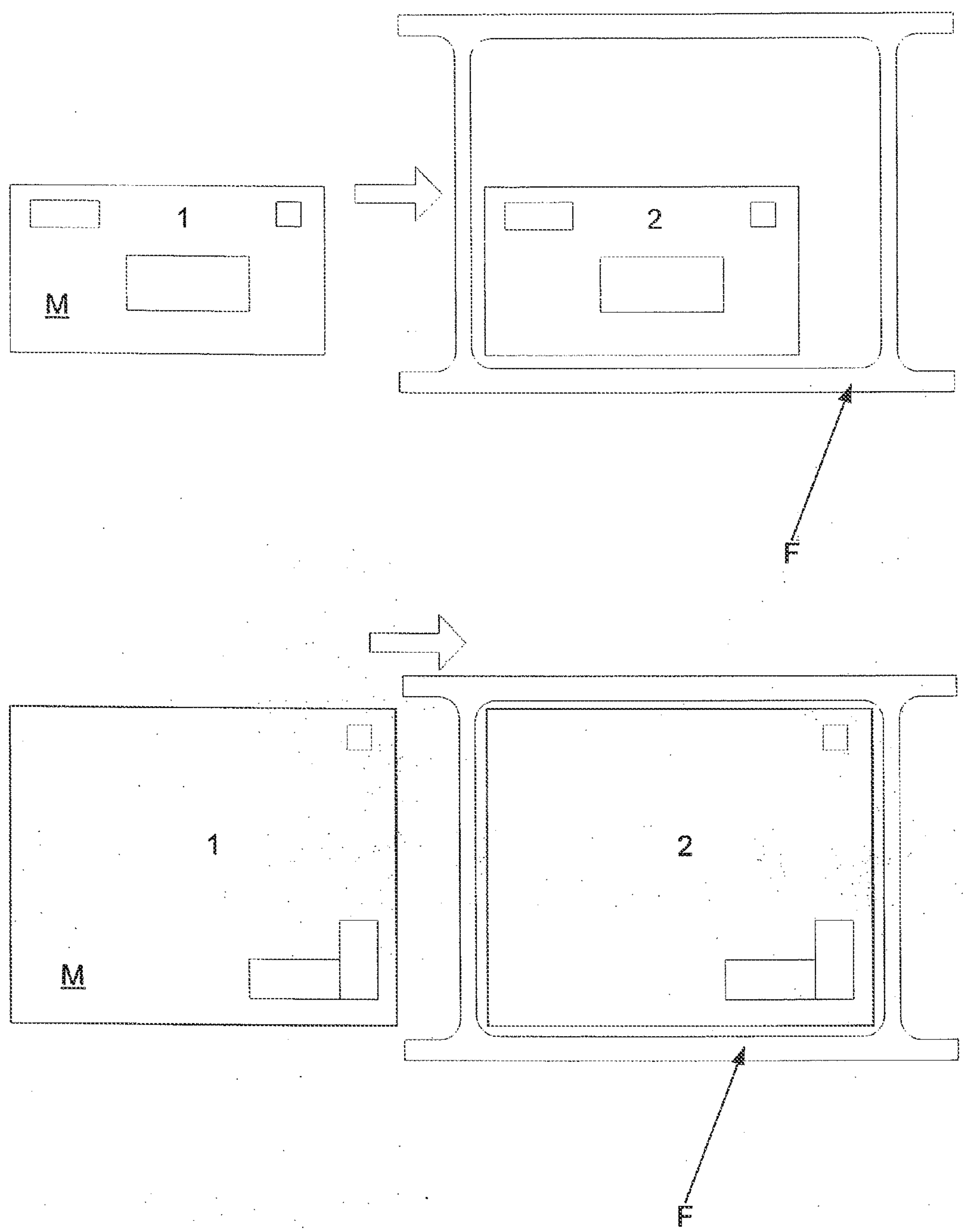

FIG. 26B schematically illustrates two examples of mail pieces, in the forms of a letter (in an upper view) and a flat (in a lower view), respectively, inserted through the side of a common sized frame/folder moving along a mail stream within a stream of successive frame/folders, in accordance with aspects of the invention.

Figure 26C:
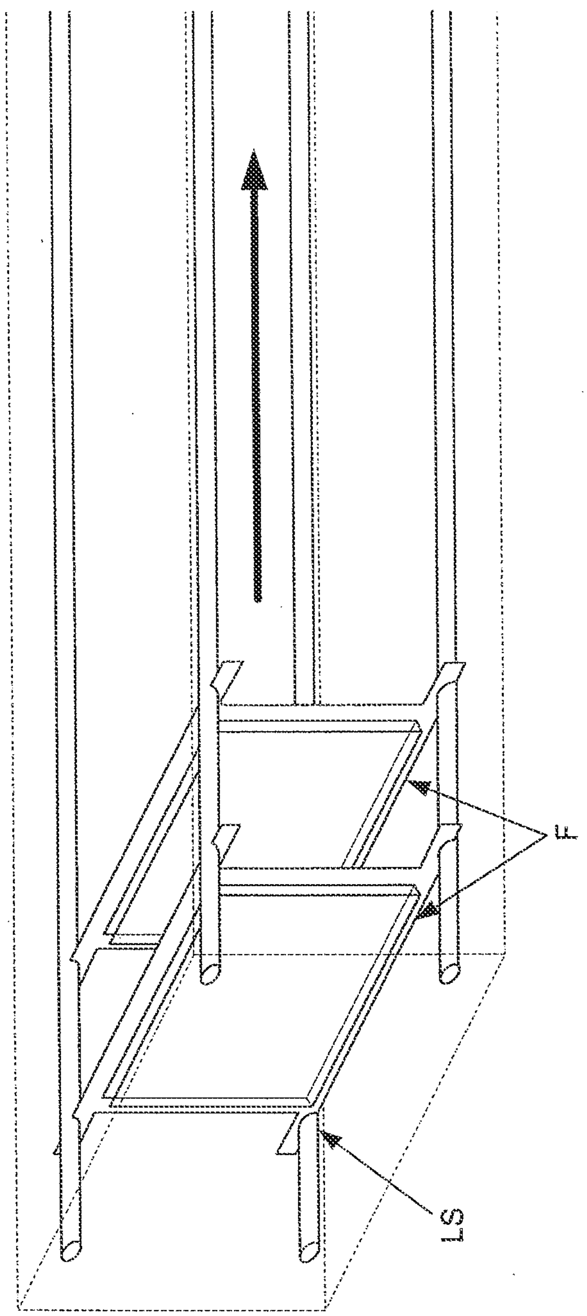

FIG. 26C schematically illustrates, in perspective, an exemplary pair of frame/folders which form a portion of a mail stream of successive frame/folders into which mail pieces are inserted in accordance with aspects of the invention.

Figure 26D:
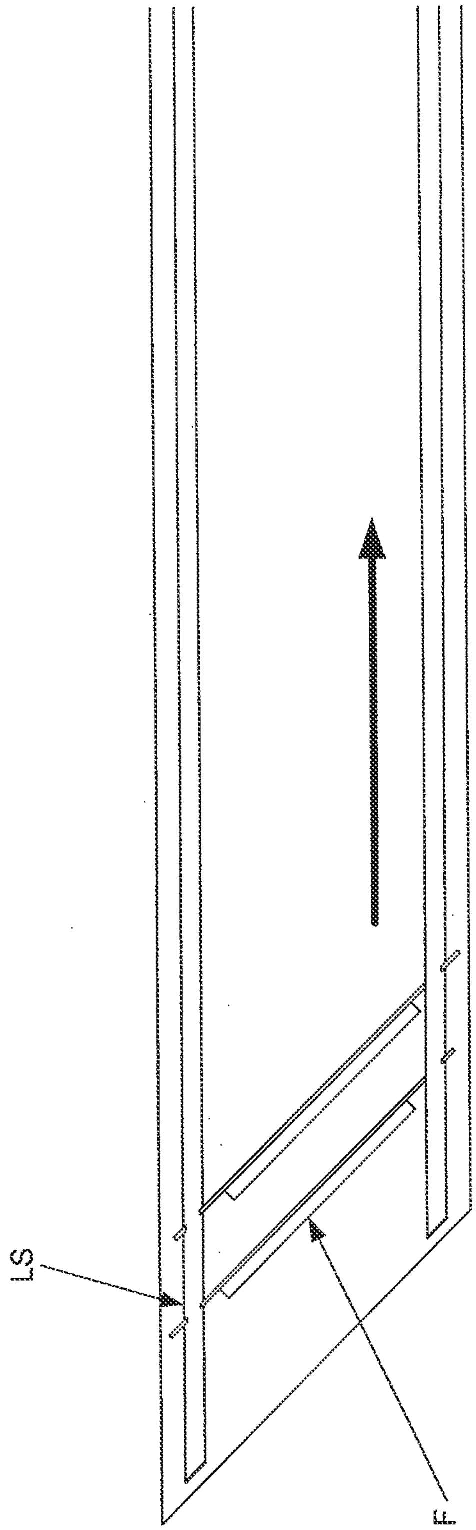

FIG. 26D shows the mail stream of FIG. 26C in a top view.

Figure 26E:
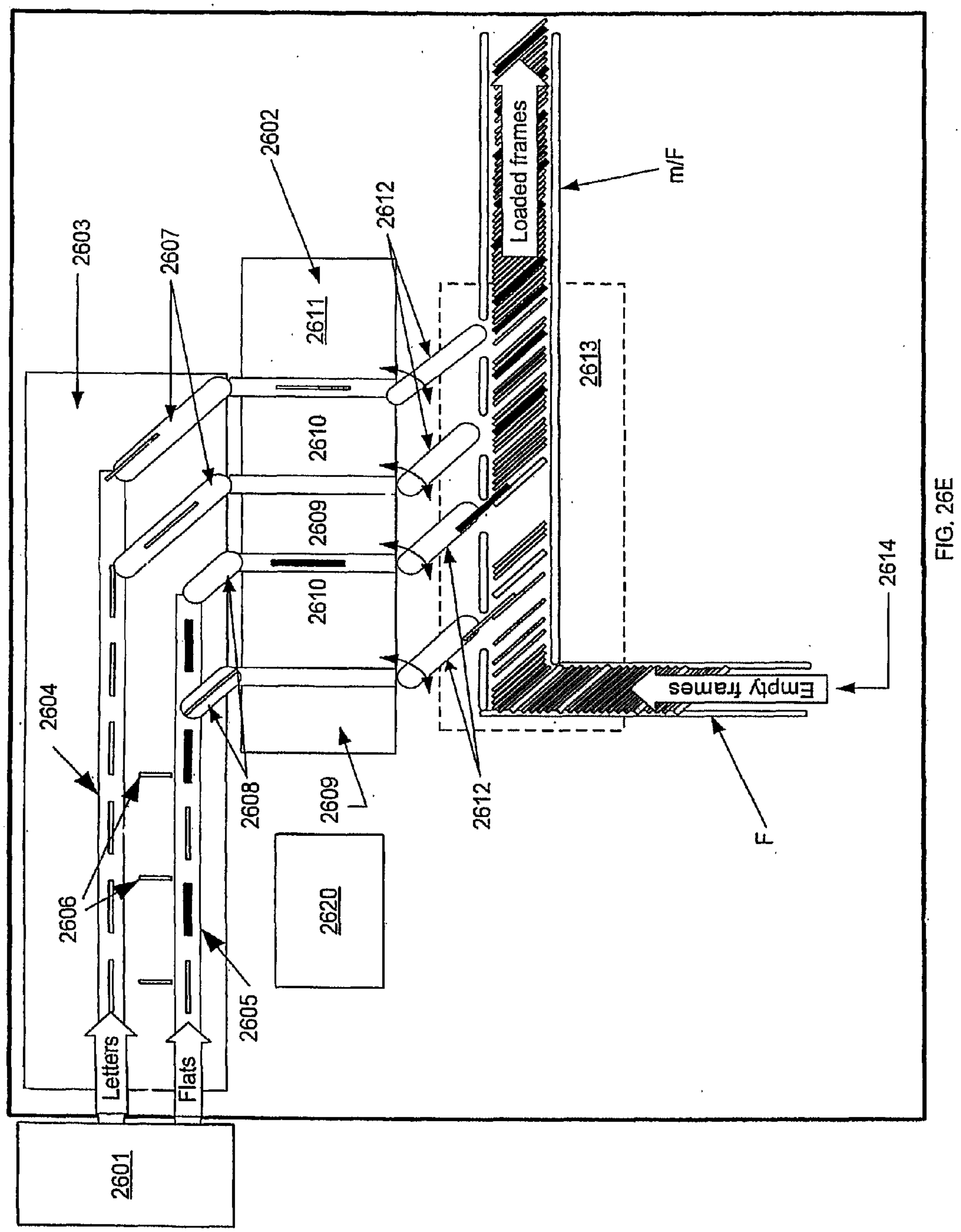

FIG. 26E schematically illustrates, in a top view, an exemplary arrangement of inserters synchronized with the movement of a succession of empty mail frames along a transport path, for inserting mail pieces into respective ones of the frames in accordance with aspects of the invention.

Figure 26F:
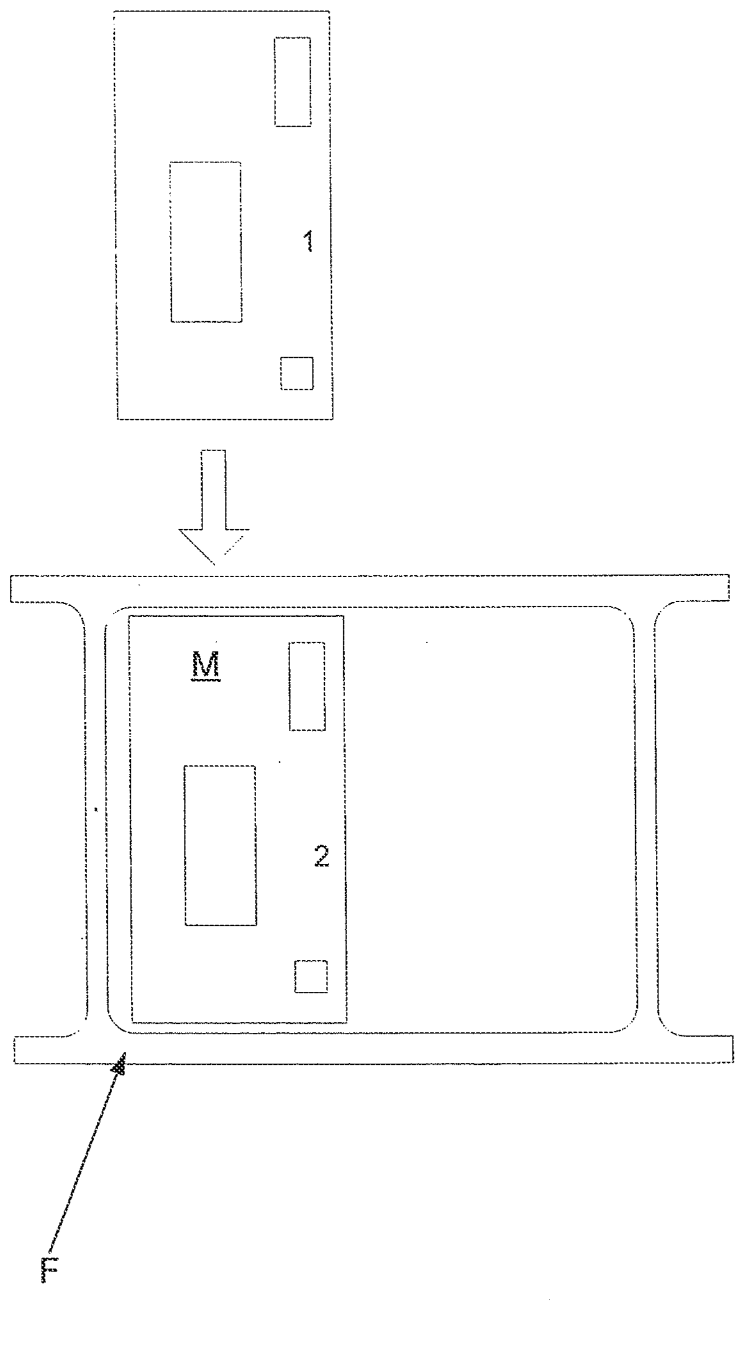

FIG. 26F schematically illustrates an alternative embodiment, whereby a mail piece is inserted into a moving frame/folder from above in accordance with aspects of the invention.

Figure 26G:
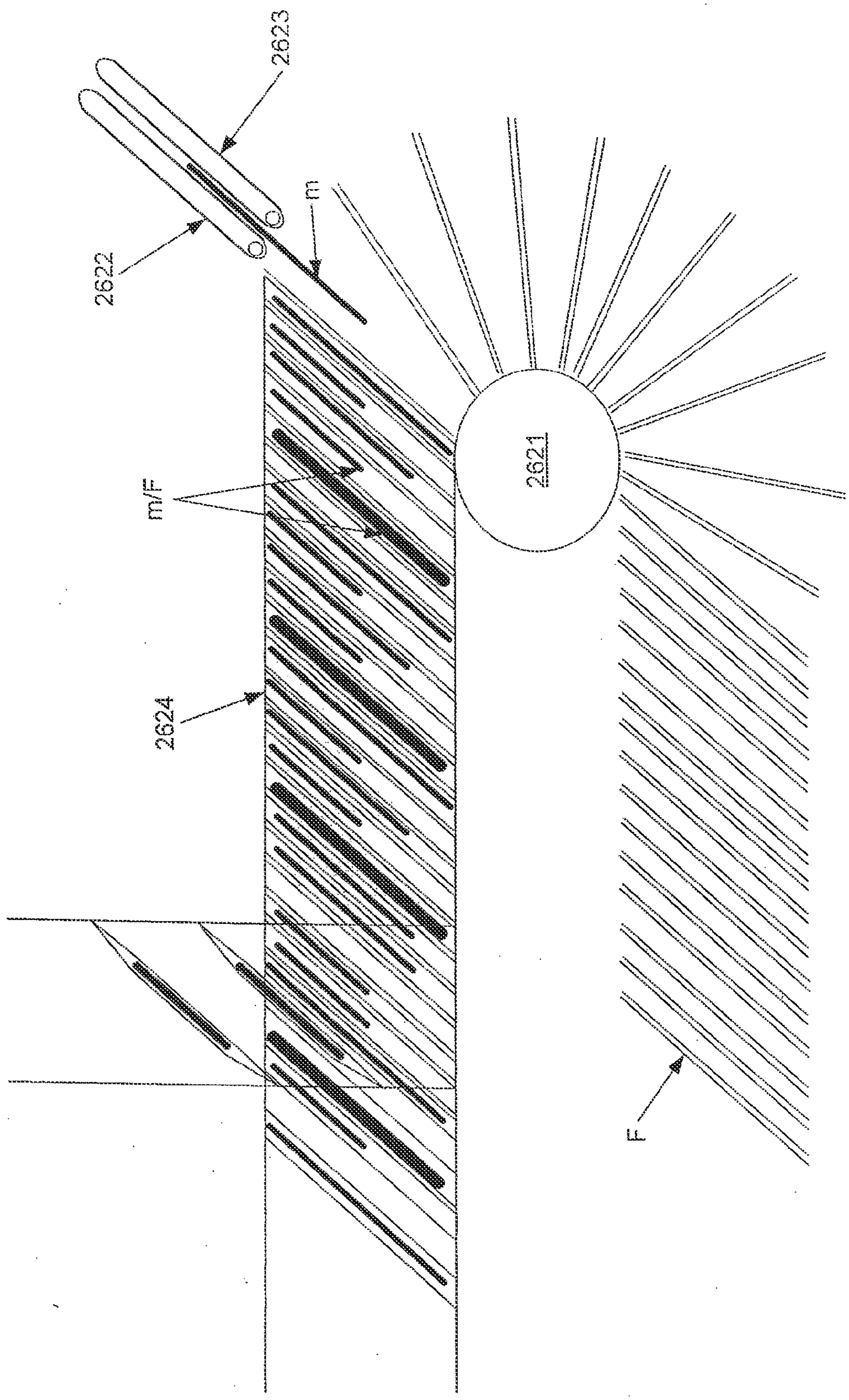

FIG. 26G illustrates an alternative inserter arrangement in accordance with aspects of the invention.

Figure 27A:
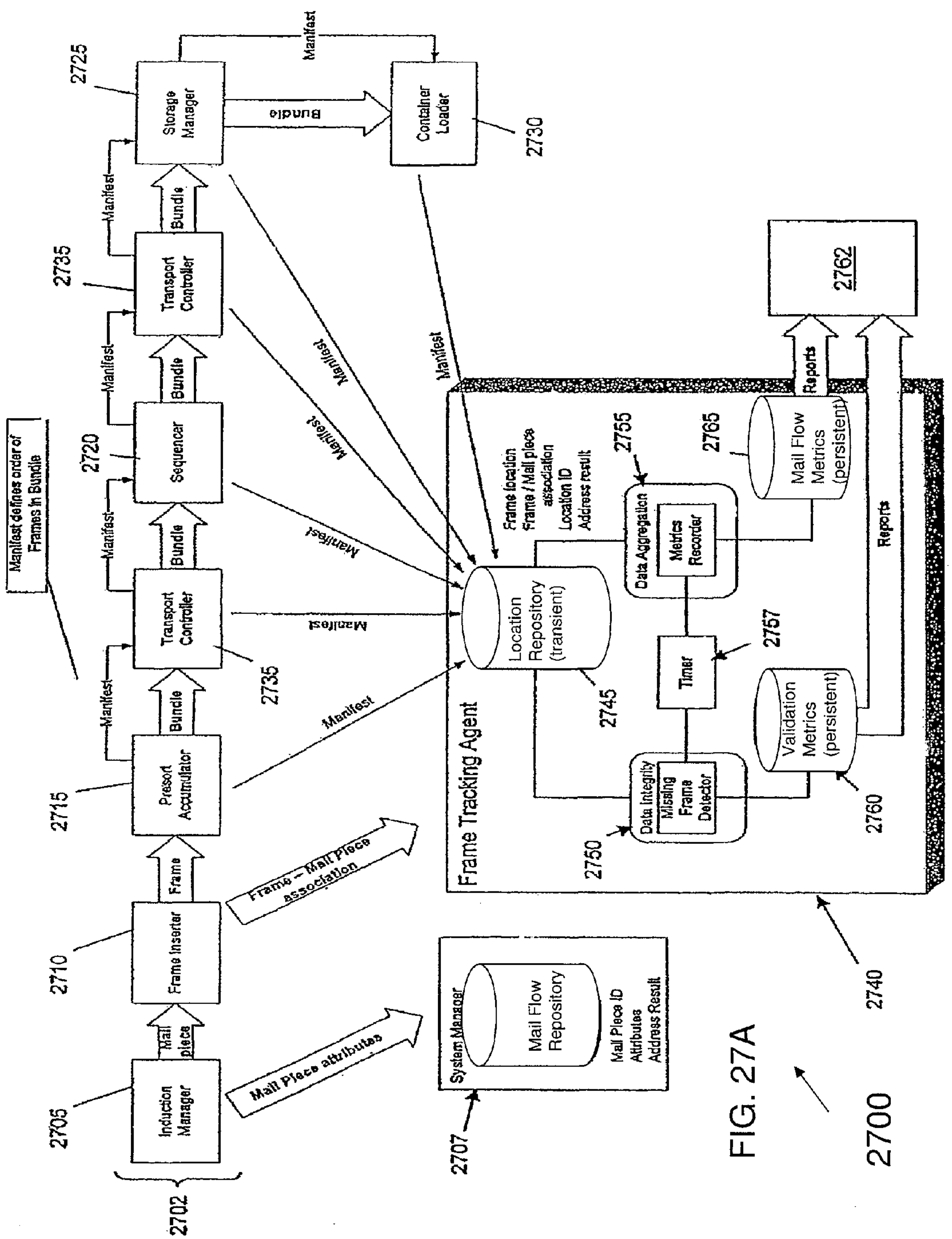

FIG. 27A shows a block diagram of a system in accordance with aspects of the invention.

Figure 27B:
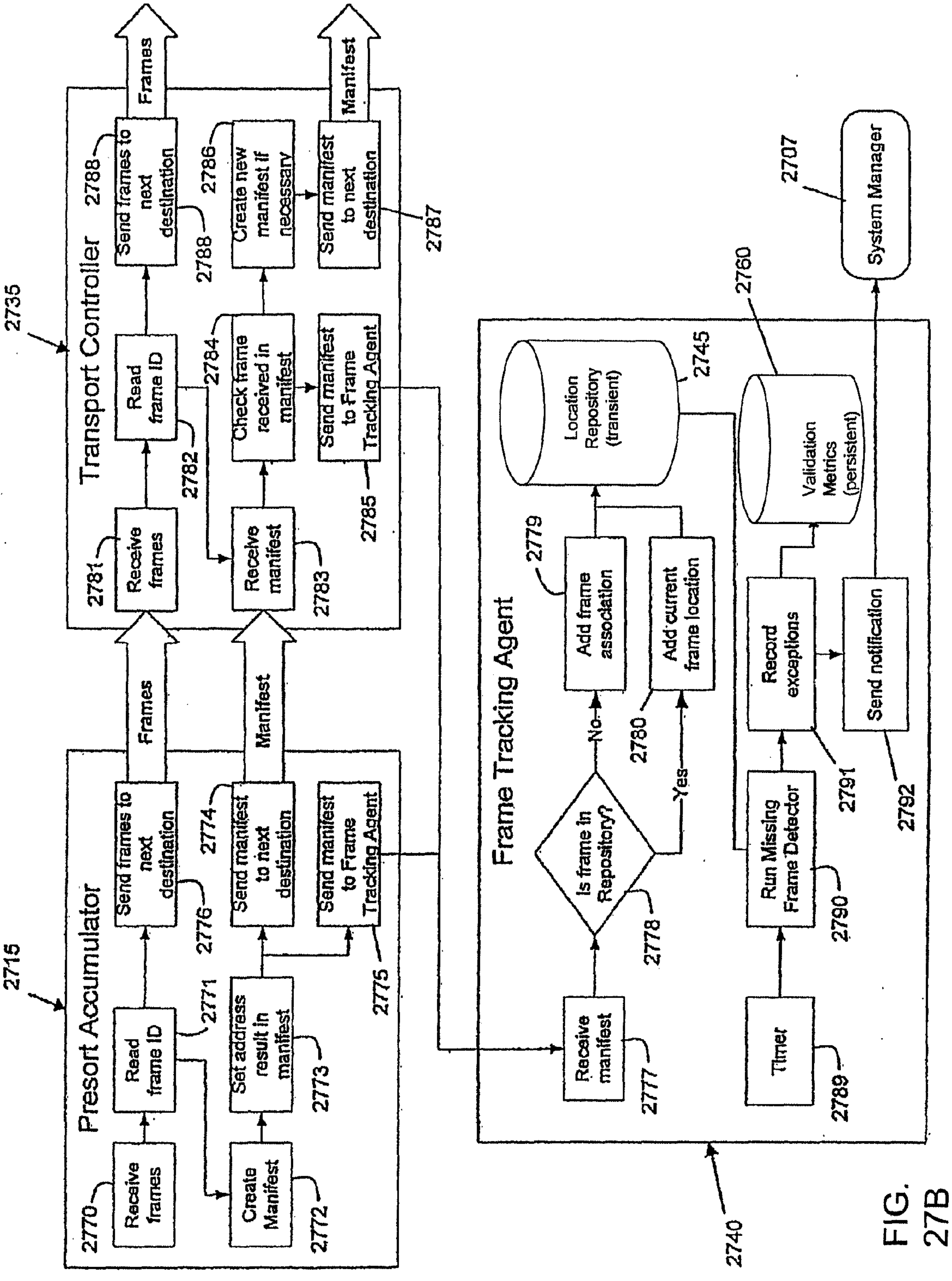
Figure 28A:
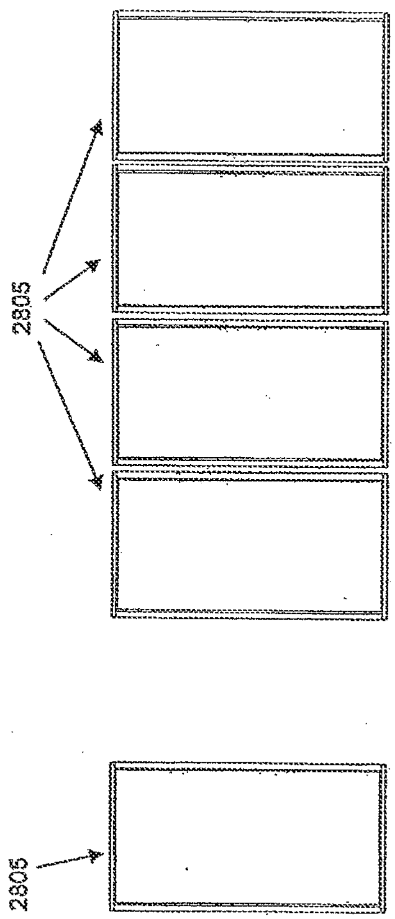
Figure 28B:
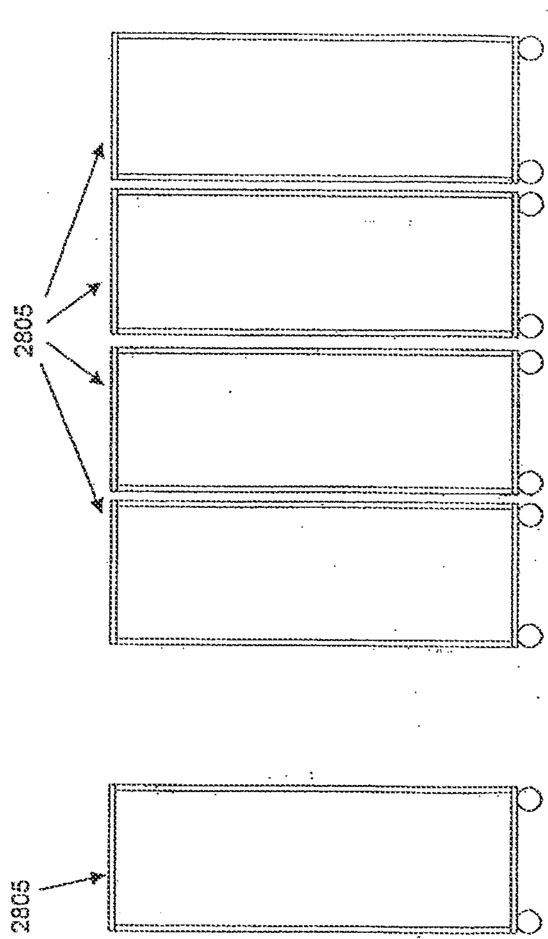

FIG. 27B shows a block diagram depicting steps of a process in accordance with aspects of the invention FIGS. 28A and 28B show a plurality of conventional carts.

Figure 28C:
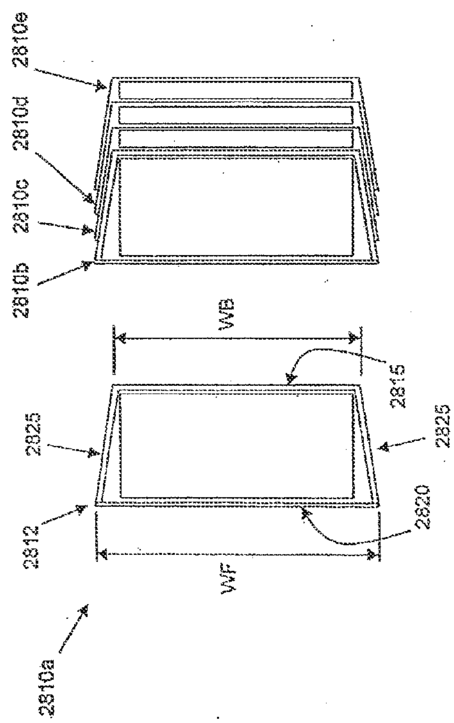

FIG. 28C shows a top view of plurality of stackable carts in accordance with aspects of the invention.

Figure 28D:
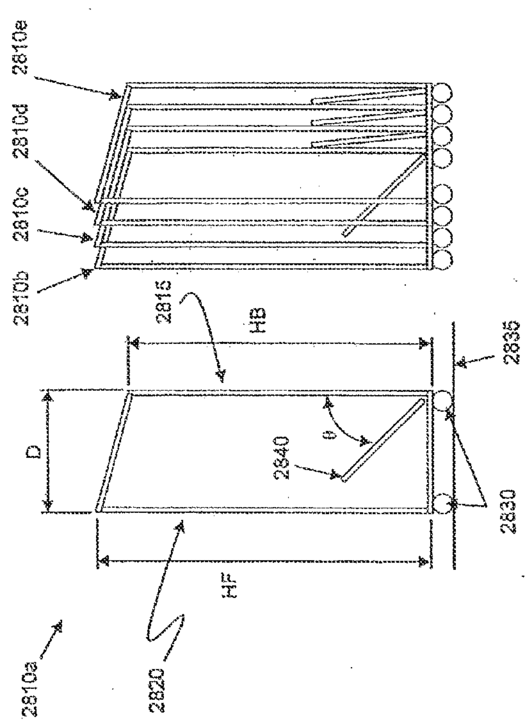

FIG. 28D shows a side view of plurality of stackable carts in accordance with aspects of the invention.

Figure 28E:
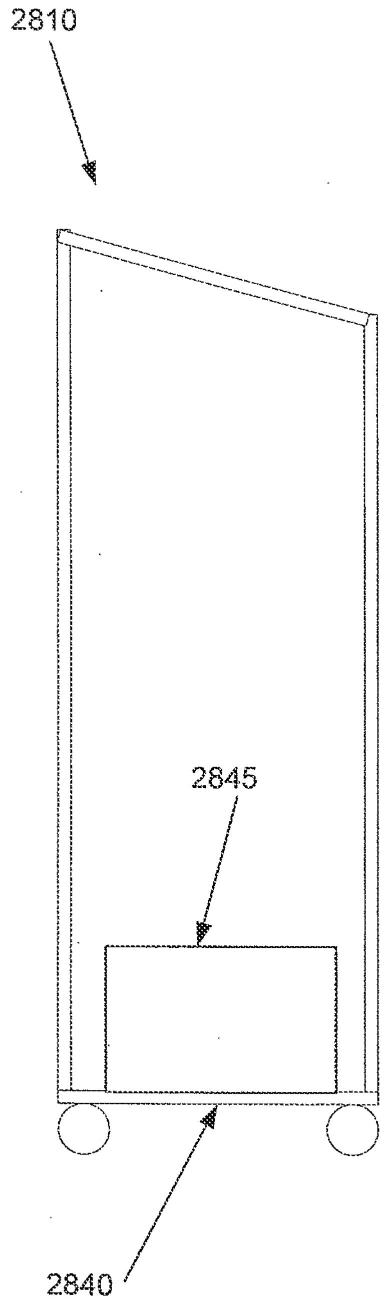

FIG. 28E shows a side view of a stackable cart in accordance with aspects of the invention.

Figure 28F:
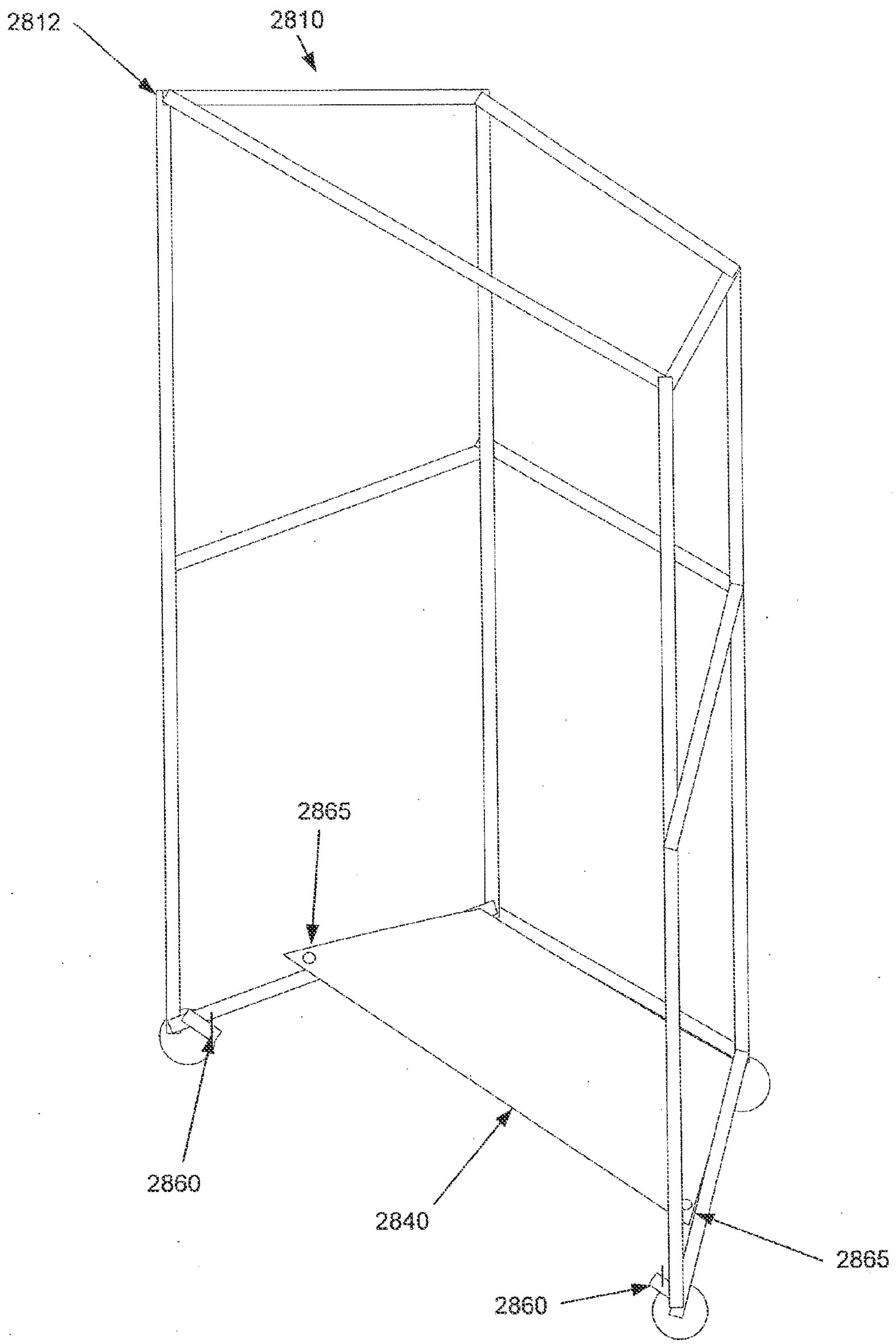

FIG. 28F shows an isometric view of a unloaded stackable cart in accordance with aspects of the invention.

Figure 28G:
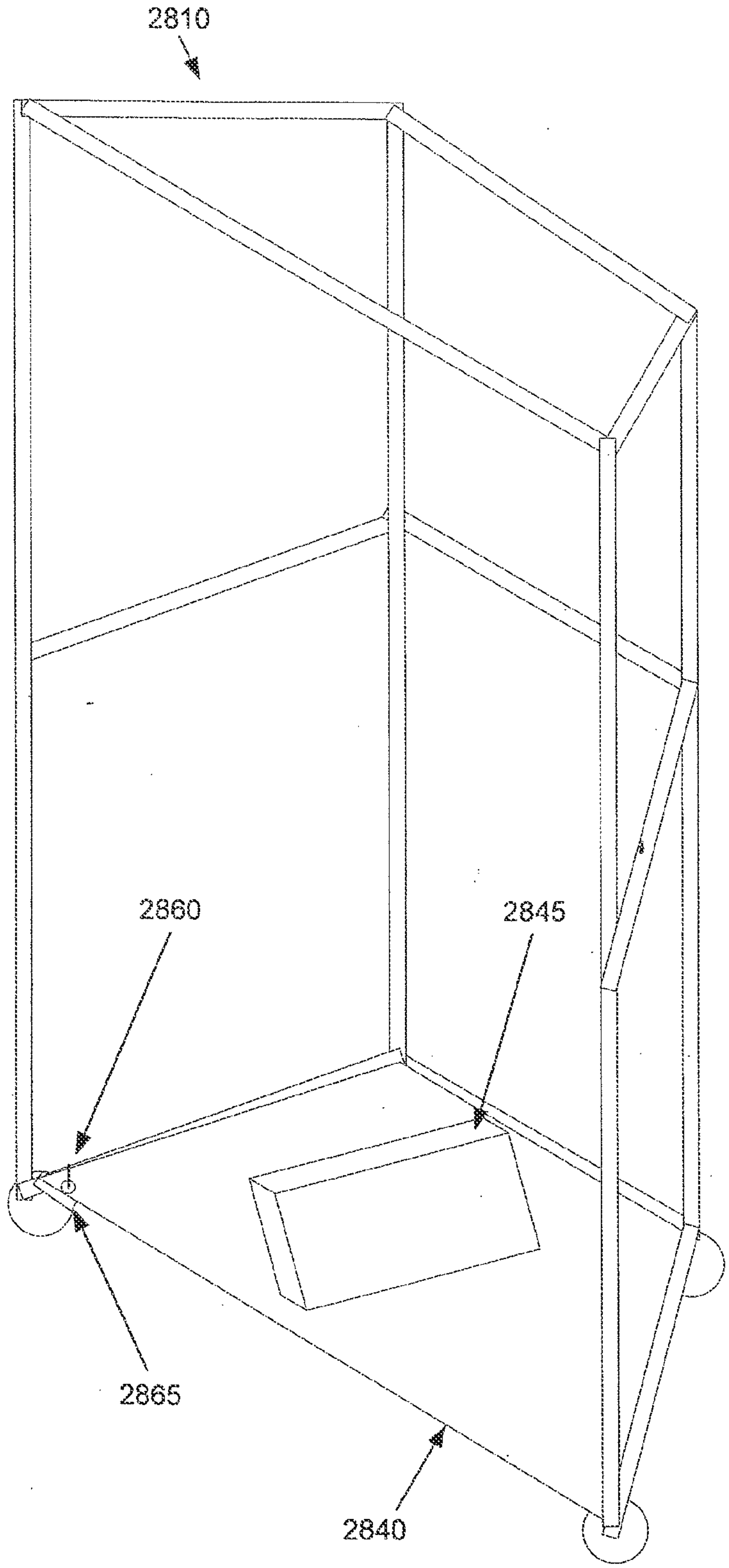

FIG. 28G shows an isometric view of a loaded stackable cart in accordance with aspects of the invention.

Figure 29A:
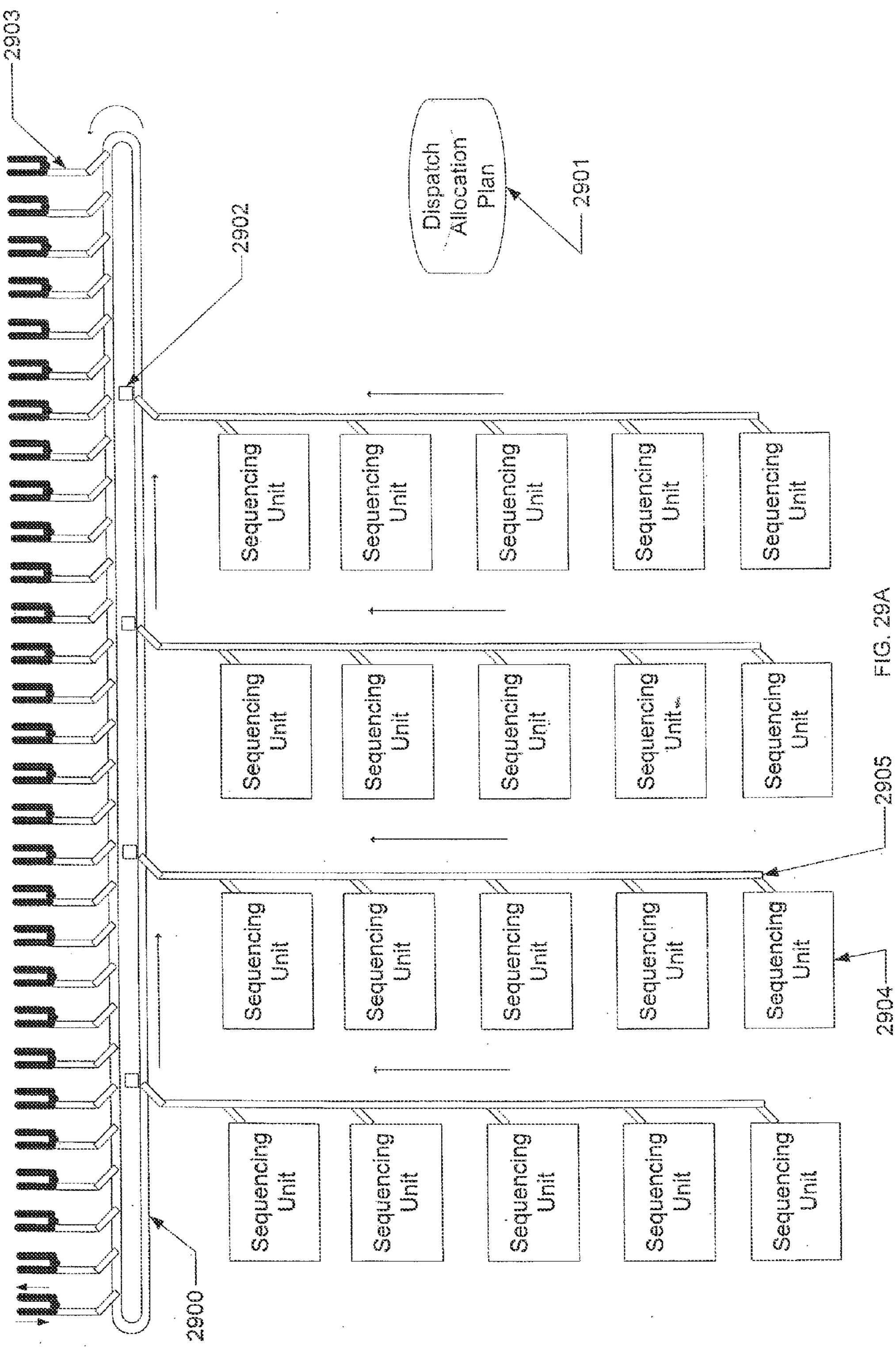

FIG. 29A shows a number of sequencing units feeding filled mail trays to a conveyor transport backbone which in turn transports the mail trays to a number of dispatch loading lanes in accordance with aspects of the invention.

Figure 29B:
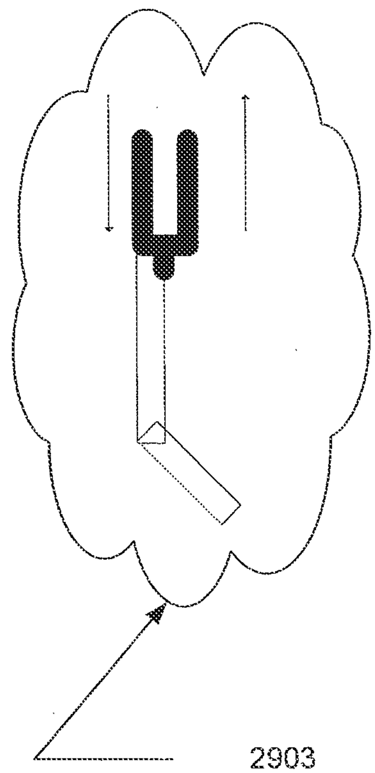

FIG. 29B shows a top view one dispatch loading lane of FIG. 29A in accordance with aspects of the invention.

Figure 29C:
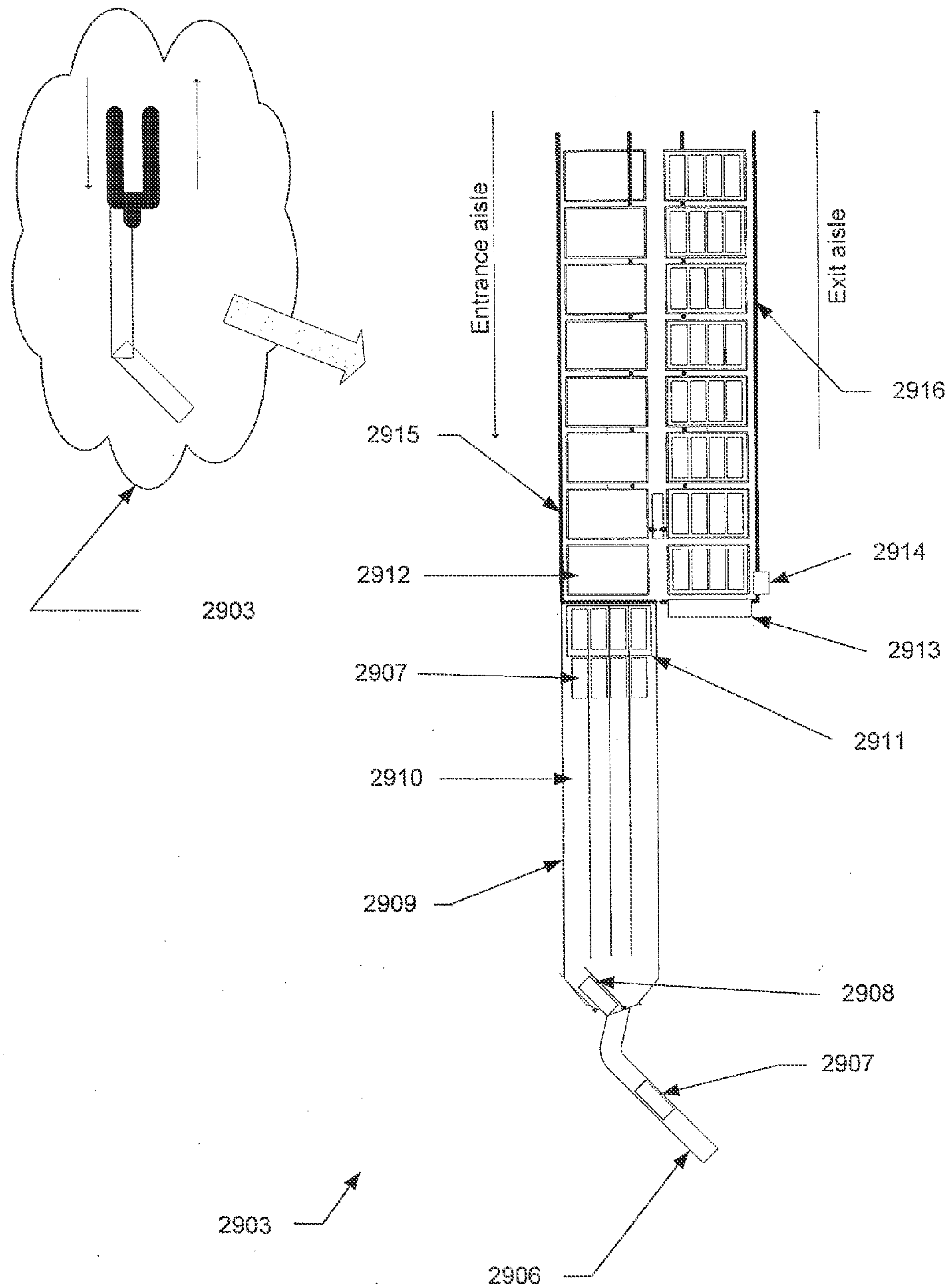

FIG. 29C shows an enlarged top view of the dispatch loading lane of FIG. 29B in accordance with aspects of the invention.

Figure 29D:
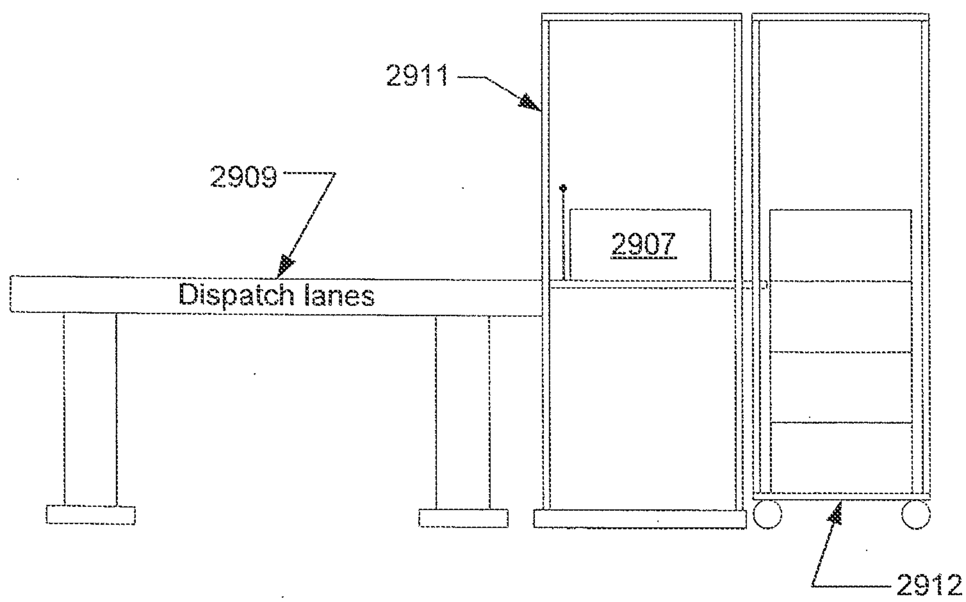

FIG. 29D shows a side view of a portion of the dispatch loading lane of FIG. 29C in accordance with aspects of the invention.

Figure 29E:
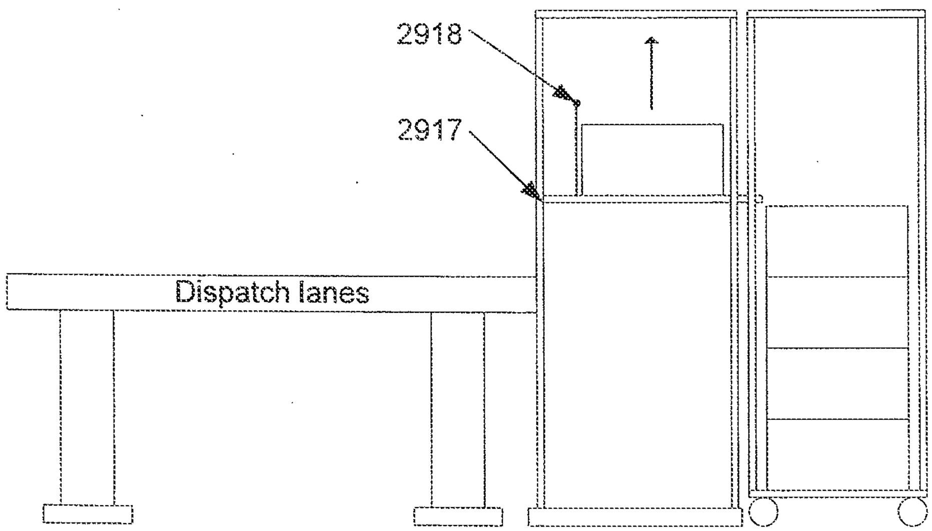

FIG. 29E shows another side view of FIG. 29D in accordance with aspects of the invention.

Figure 29F:
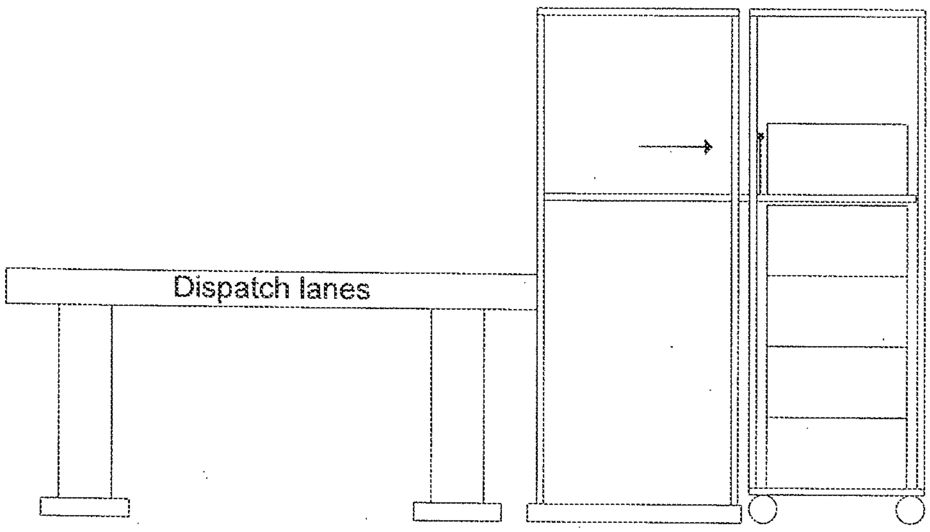

FIG. 29F shows another side view of FIG. 29D in accordance with aspects of the invention.

Figure 29G:
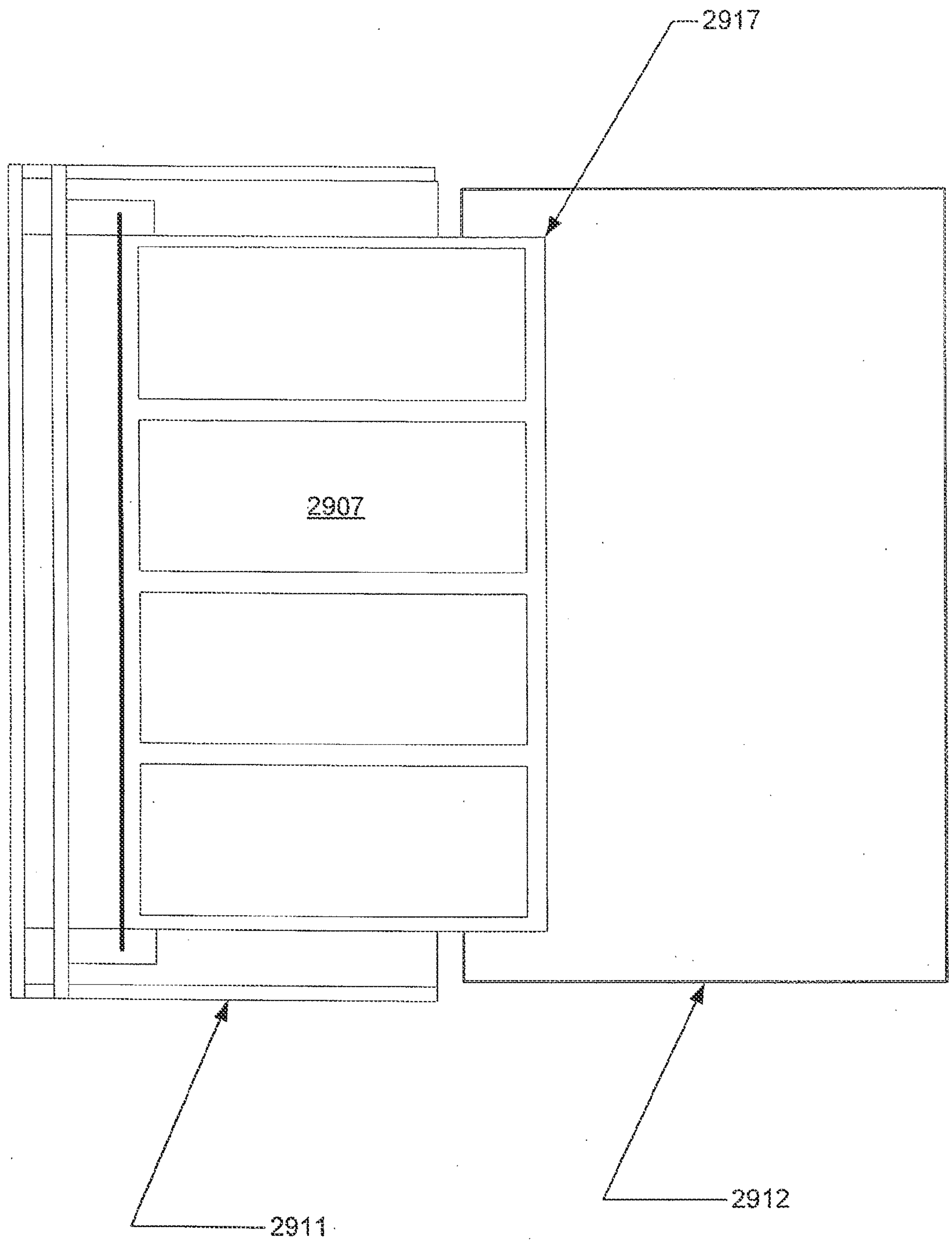

FIG. 29G shows a top view of a portion of the dispatch loading lane of FIG. 29C in accordance with aspects of the invention.

Figure 29H:
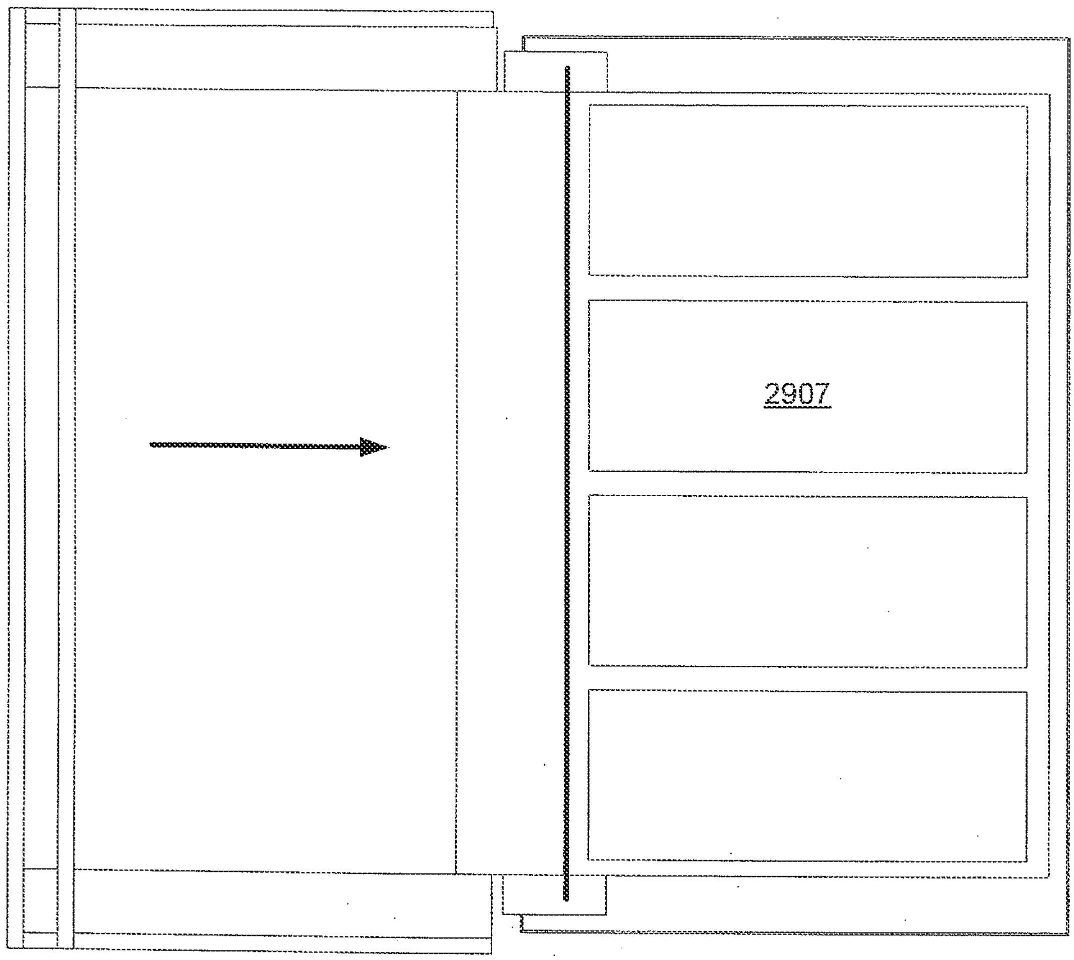

FIG. 29H shows a top view of FIG. 29G in accordance with aspects of the invention.

Figure 30:
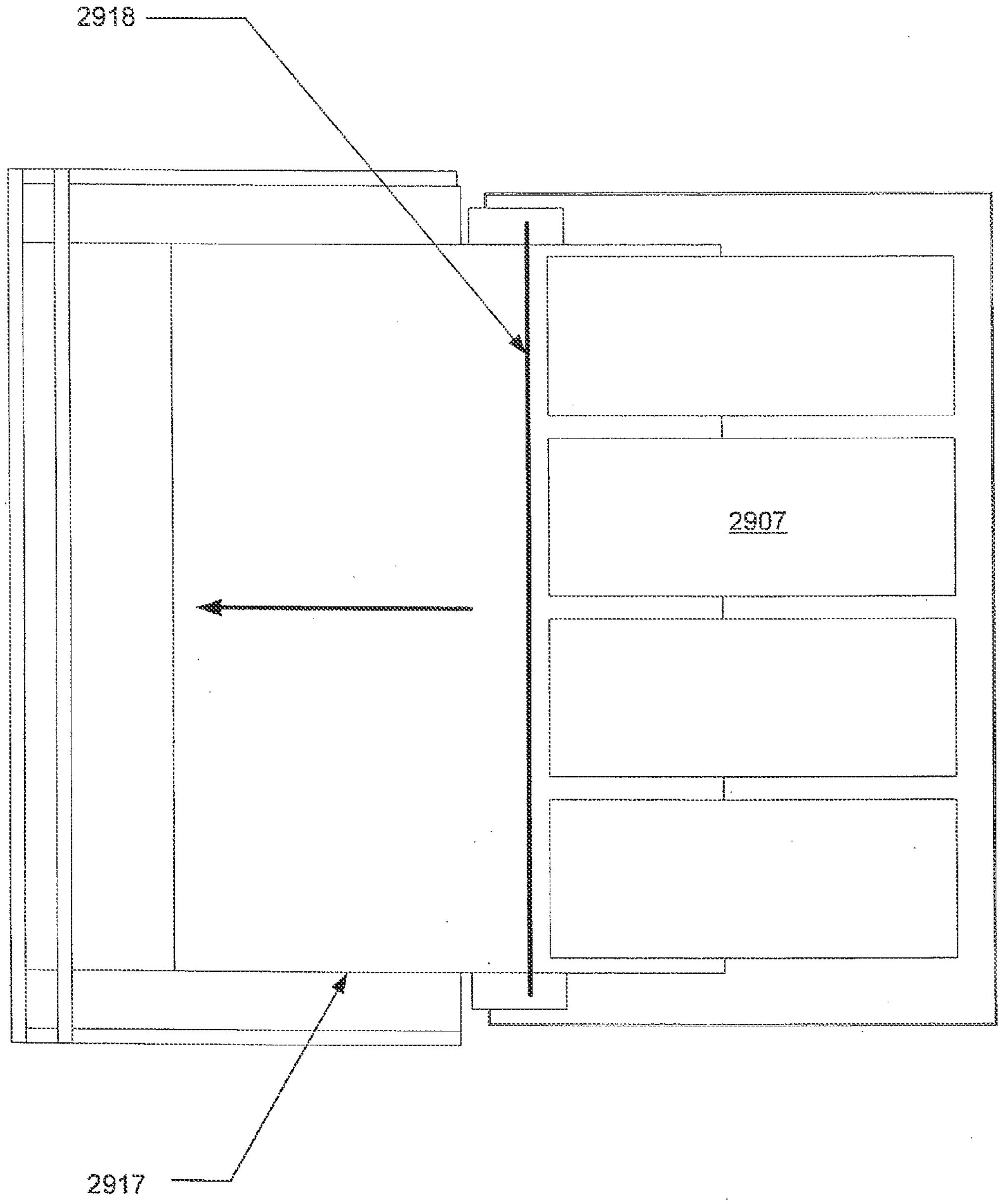

FIG. 30 shows a side view of FIG. 29G in accordance with aspects of the invention.

Figure 31A:
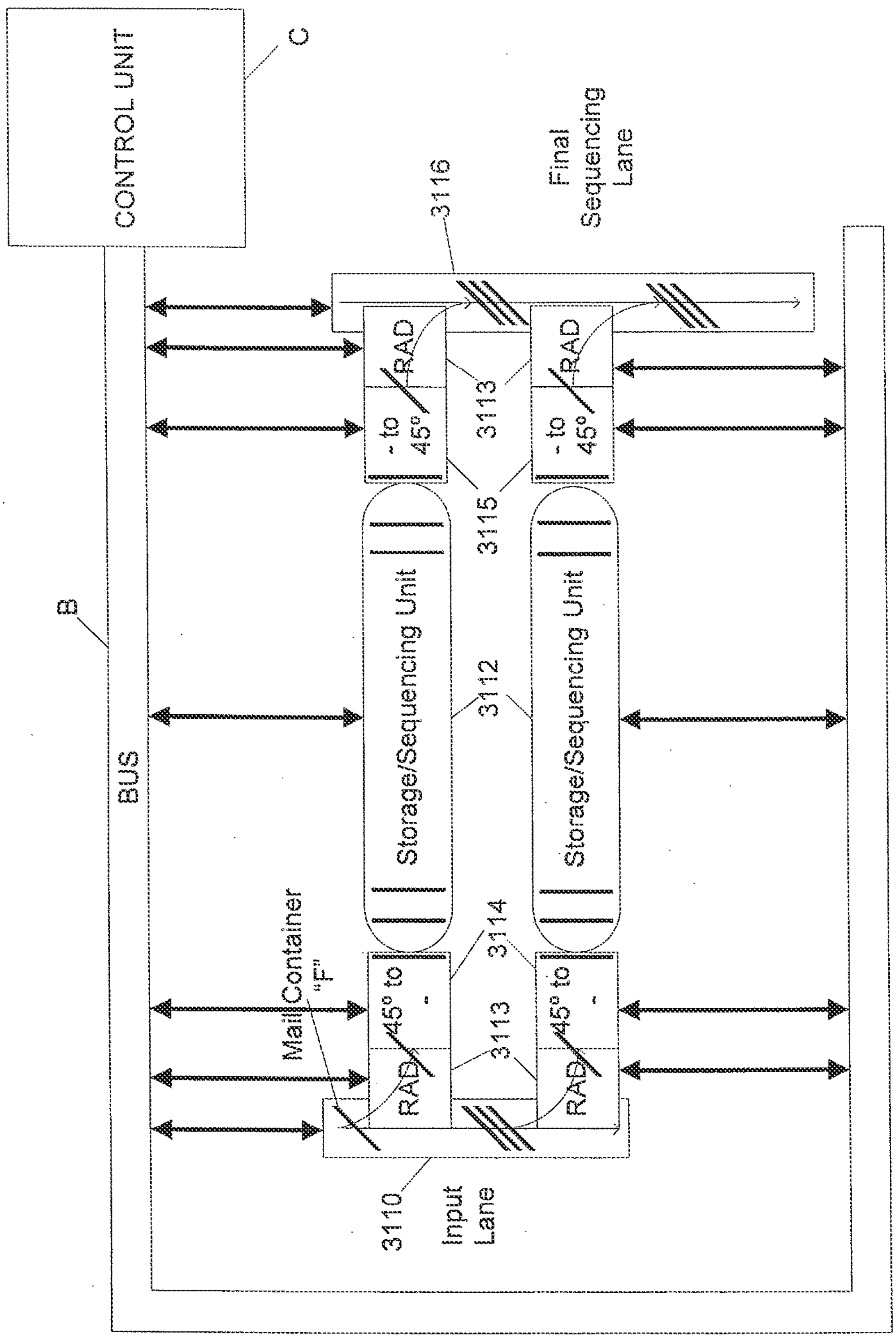

FIG. 31A is a block diagram of a storage/sequencing unit and the general flow of mail frames between an input lane and a final sequencing lane in accordance with aspects of the invention.

Figure 31B:
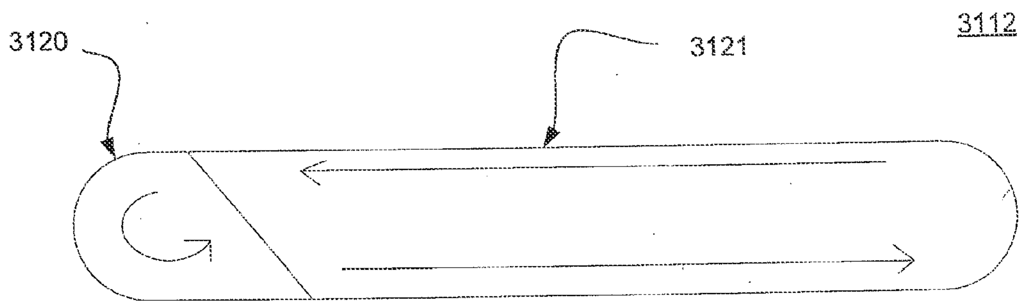
Figure 31C:
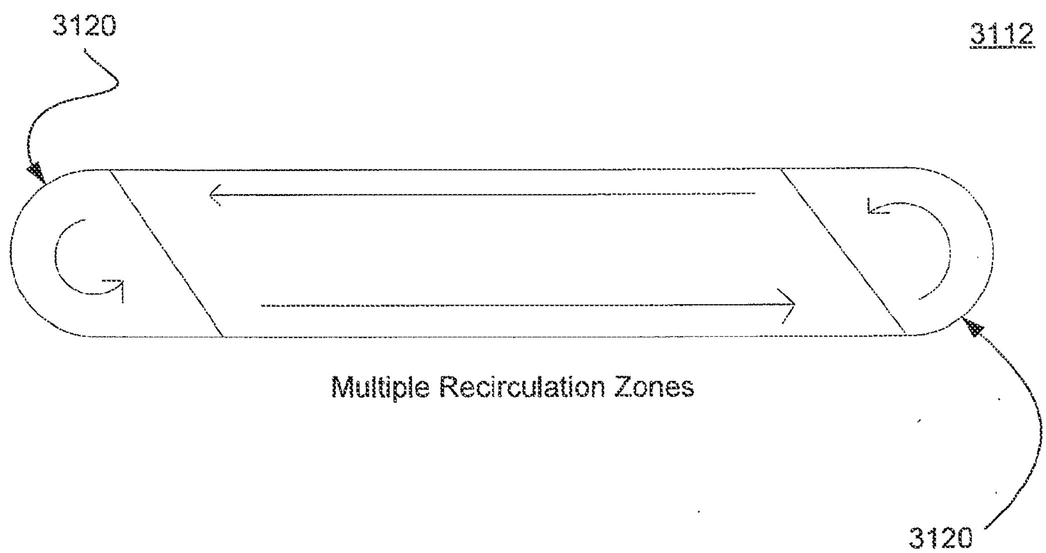

FIGS. 31B and 31C are embodiments of the present invention which include a recirculation zone where the actual sequencing is accomplished within the storage units in accordance with aspects of the invention.

Figure 31D:
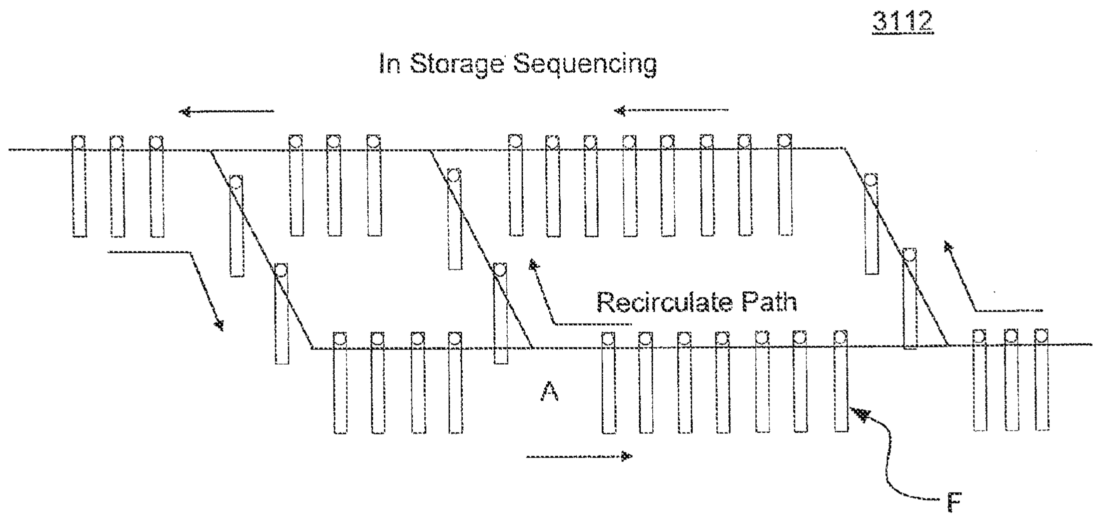

FIG. 31D is a more detailed side view illustration of the sequencing of frames within a storage unit/sequencing unit in accordance with aspects of the invention.

Figure 31E:
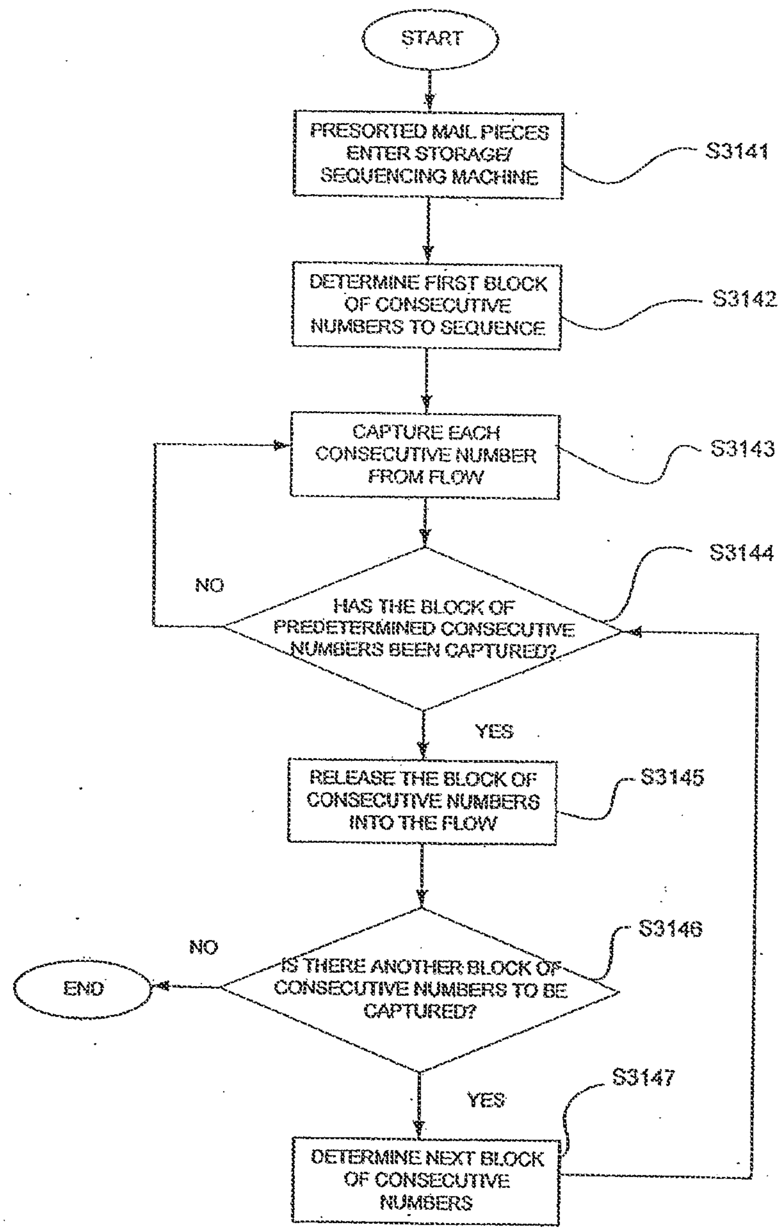

FIG. 31E is a flow diagram which illustrates the steps of the "hold" approach for sequencing in accordance with aspects of the invention.

Figure 31F:
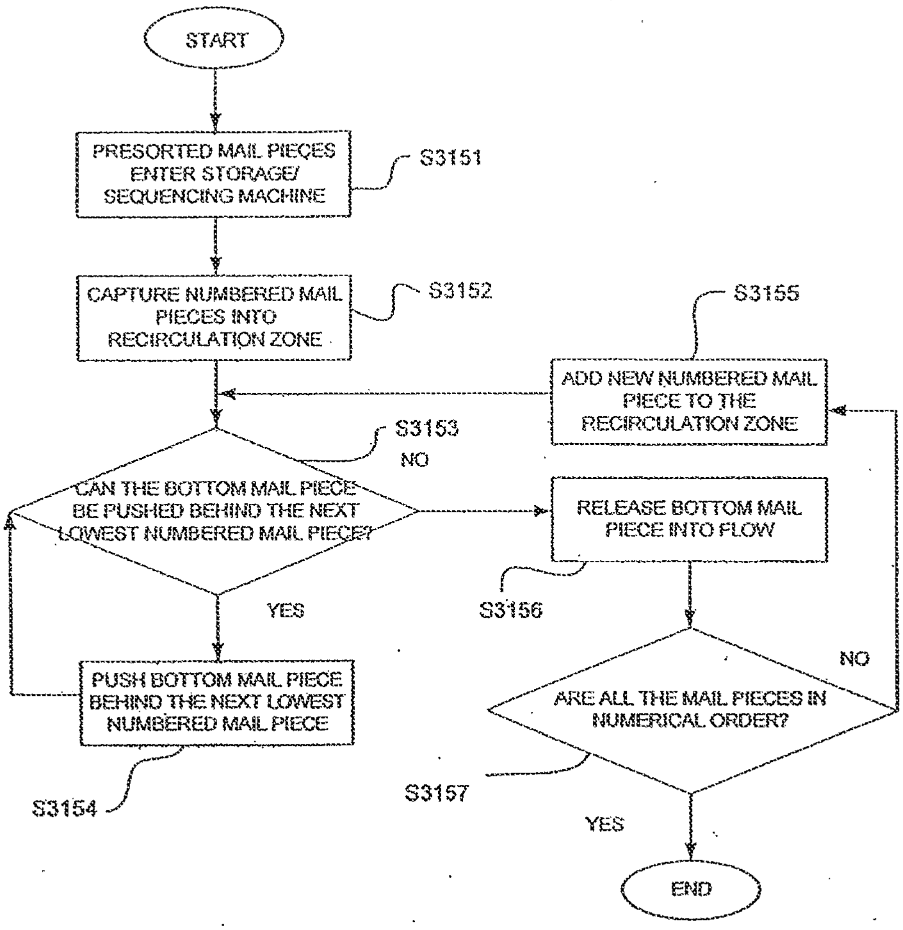

FIG. 31F is a flow diagram which illustrates the steps of the "push back" approach for sequencing in accordance with aspects of the invention.

Figure 31G:
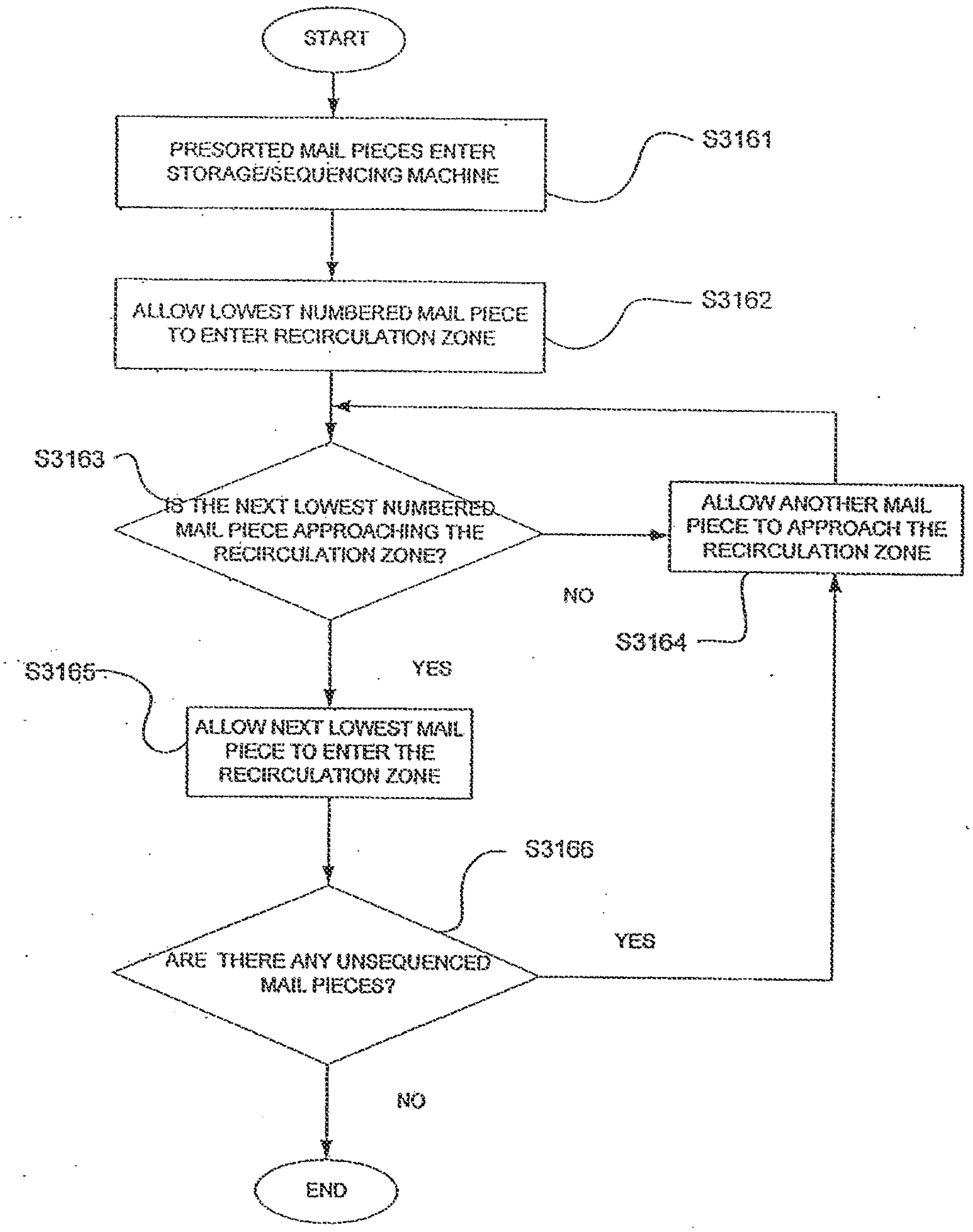

FIG. 31G is a flow diagram which illustrates the steps of the "floating divert" approach for sequencing in accordance with aspects of the invention.

Figure 32A:
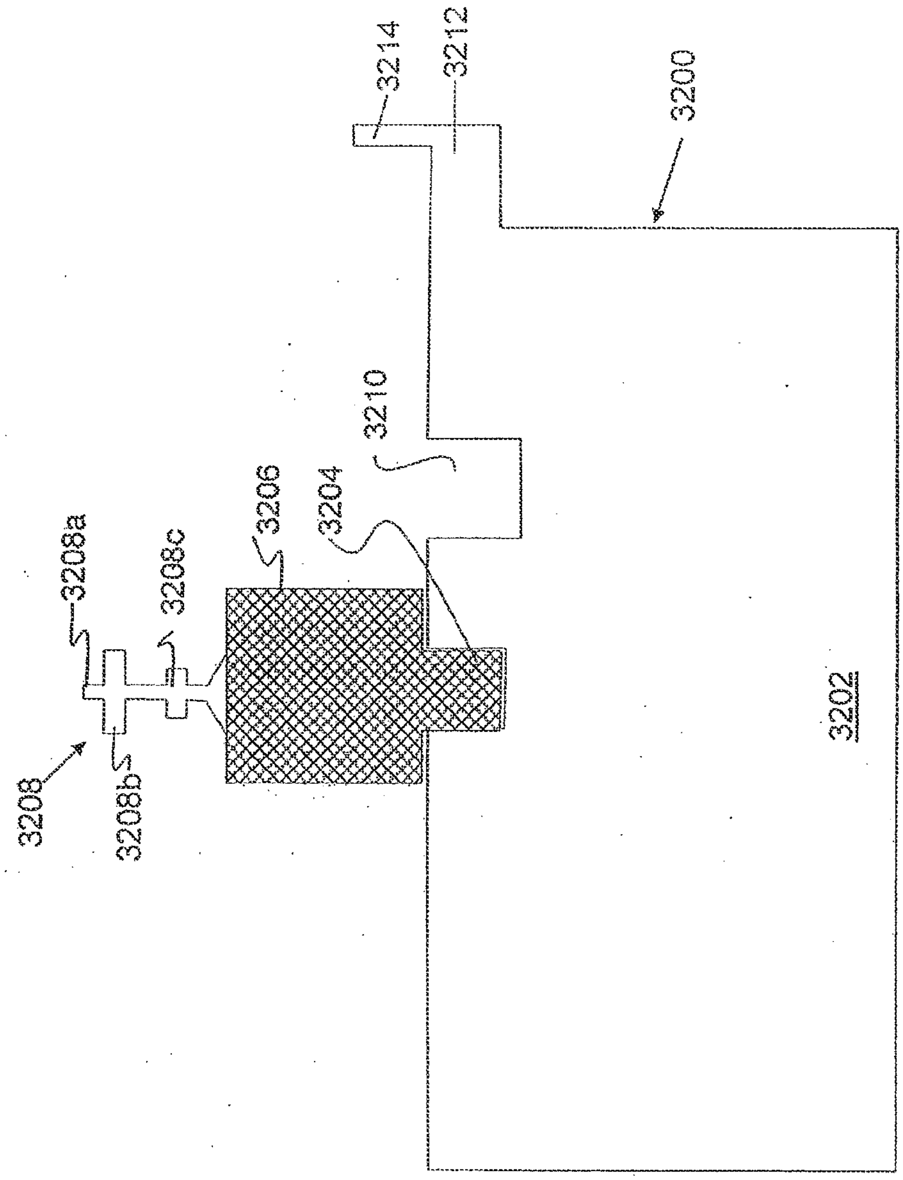

FIG. 32A shows a mail clamp in accordance with one aspect of the invention.

Figure 32B:
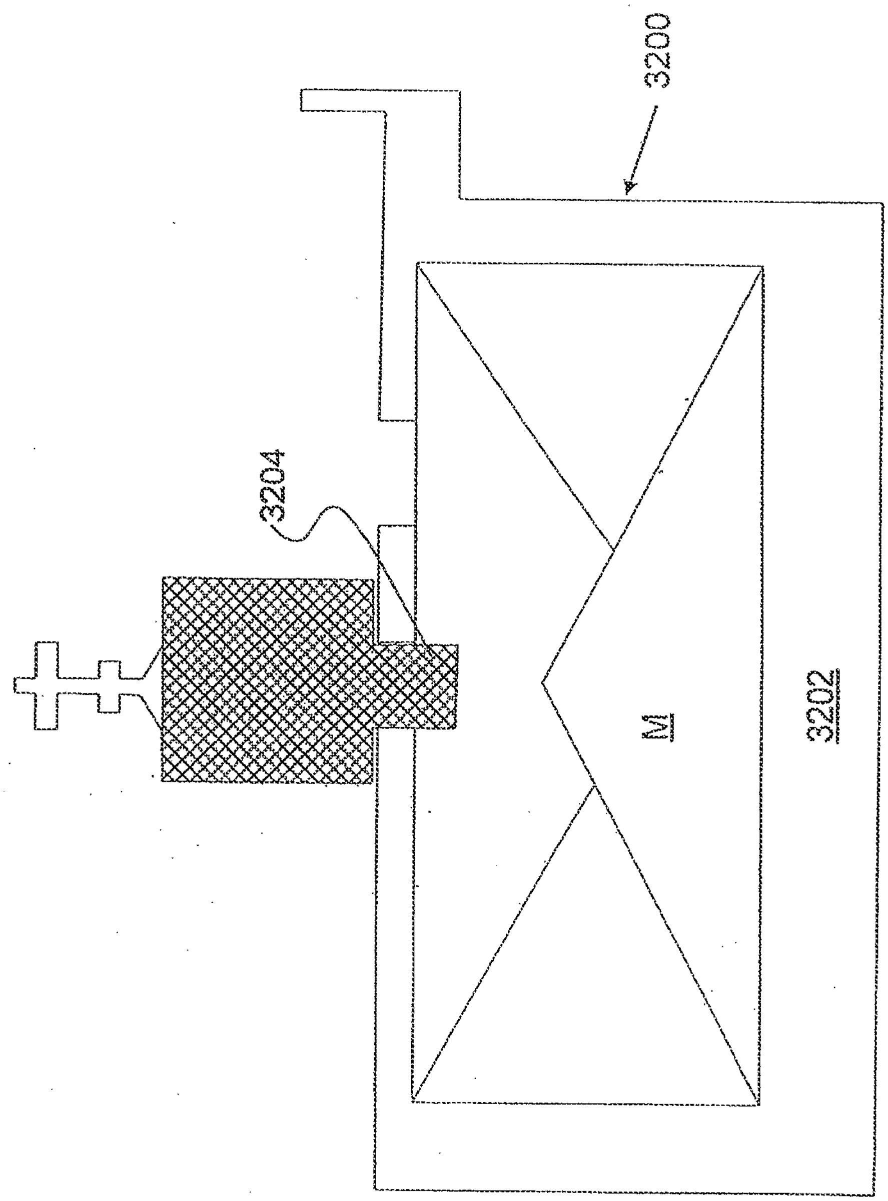

FIG. 32B shows a clamp holding or grasping a mail piece in accordance with aspects of the invention.

Figure 32C:
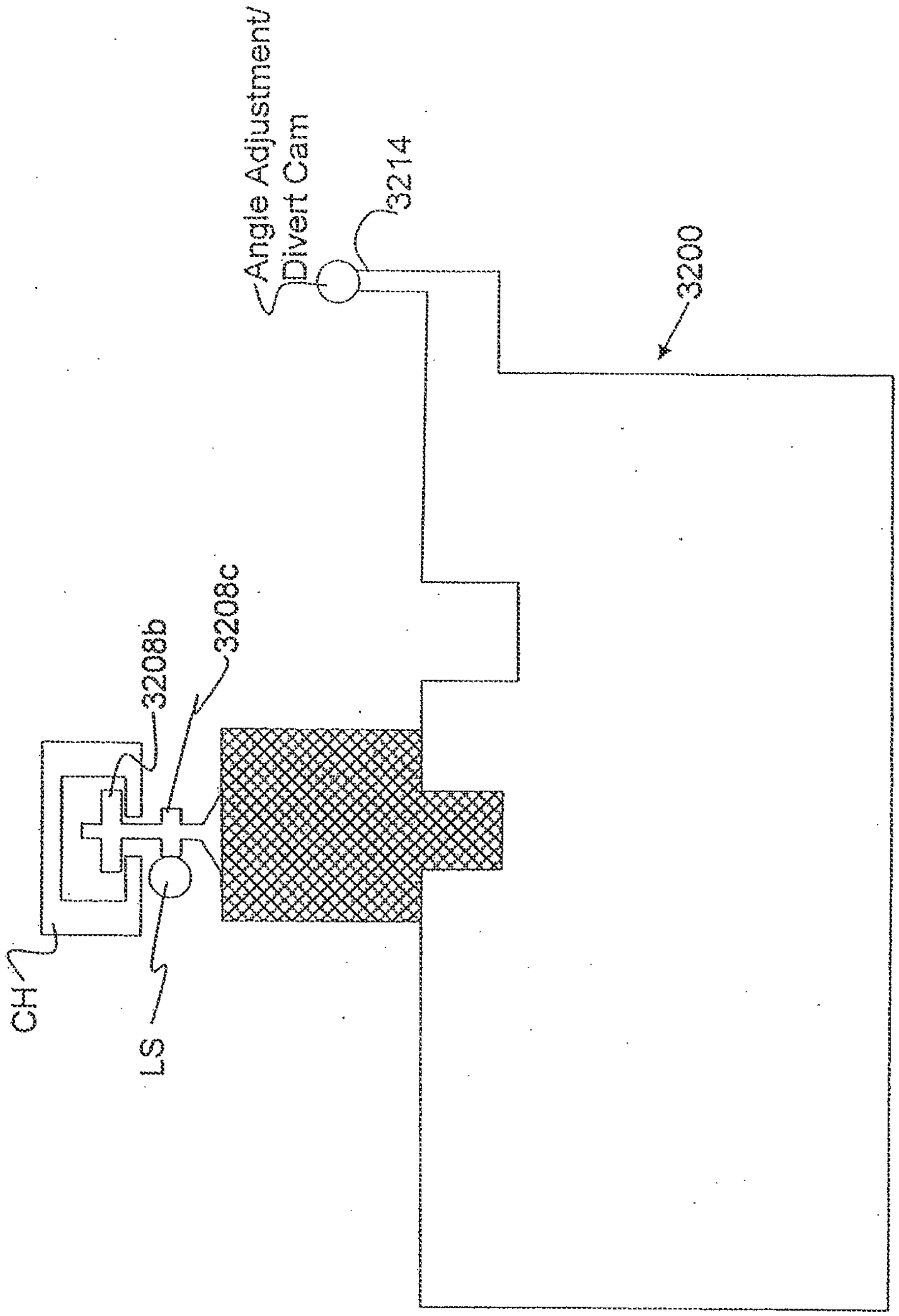

FIG. 32C shows the clamp interacting with components of the sorting and sequencing system in accordance with aspects of the invention.

Figure 32D:
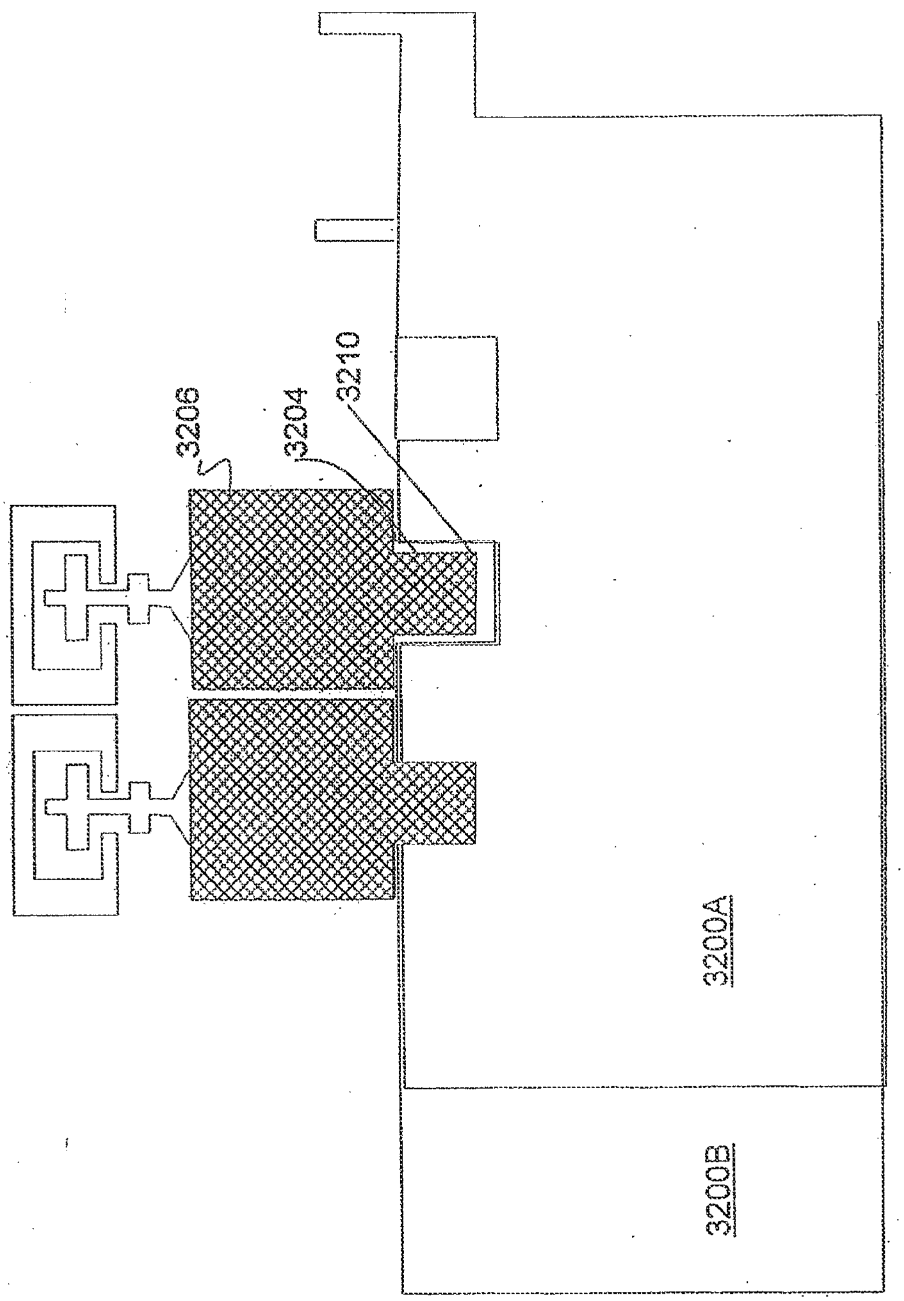

FIG. 32D shows two clamps in a nested position in accordance with aspects of the invention.

Figure 32E:
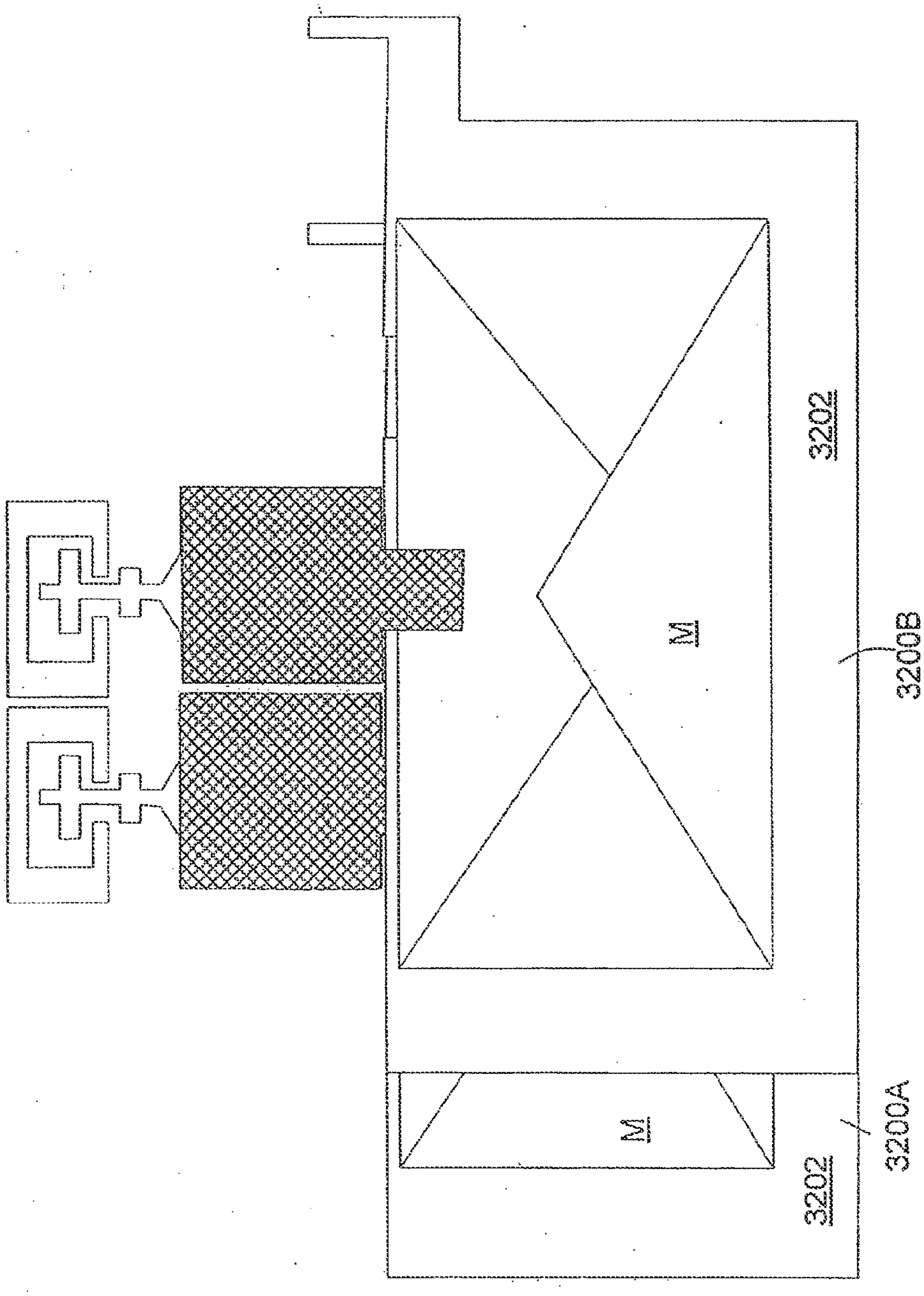

FIG. 32E shows two clamps in a nested position with mail pieces held thereon in accordance with aspects of the invention.

Figures 32F, 32G:
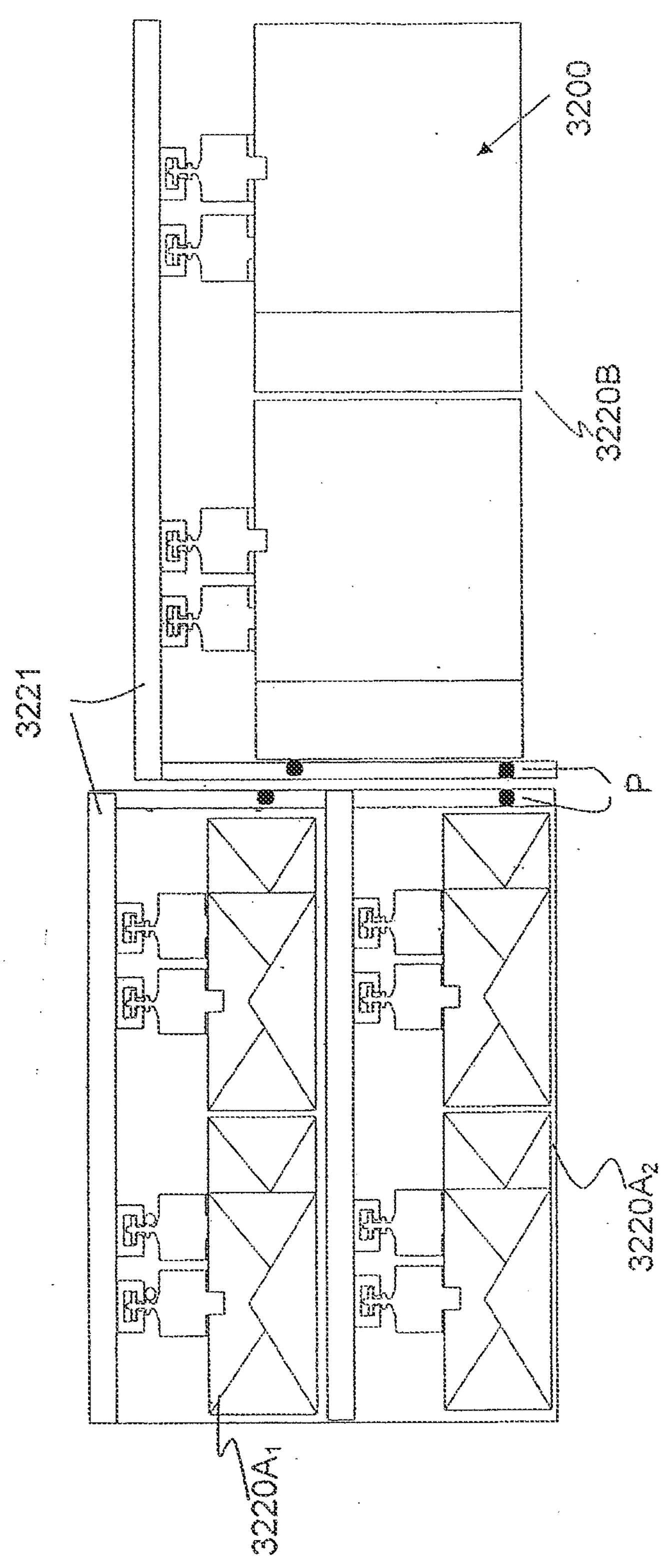

FIGS. 32F and 32G show sectional views of storage units in accordance with aspects of the invention.

Figure 32H:
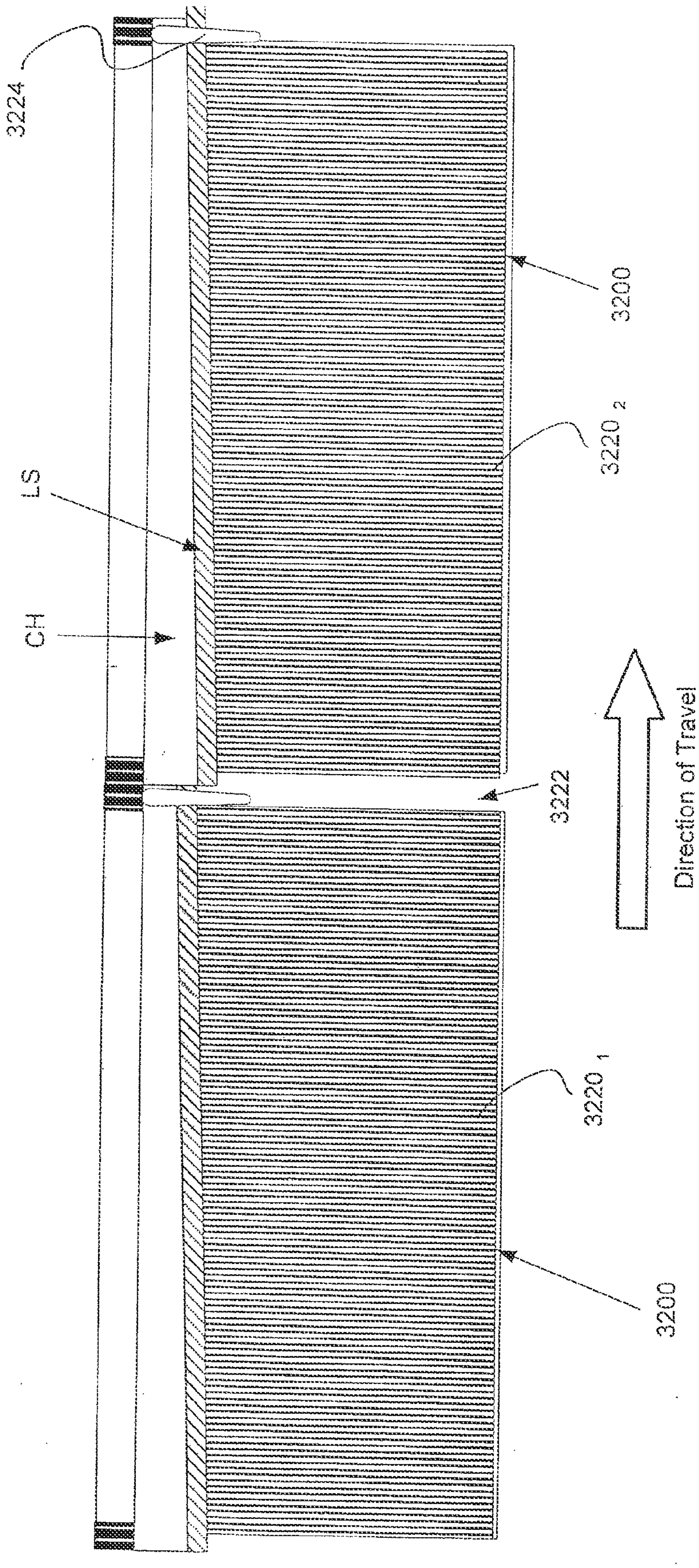

FIG. 32H shows sectional views of two storage units in the direction of travel in accordance with aspects of the invention.

Figure 32I:
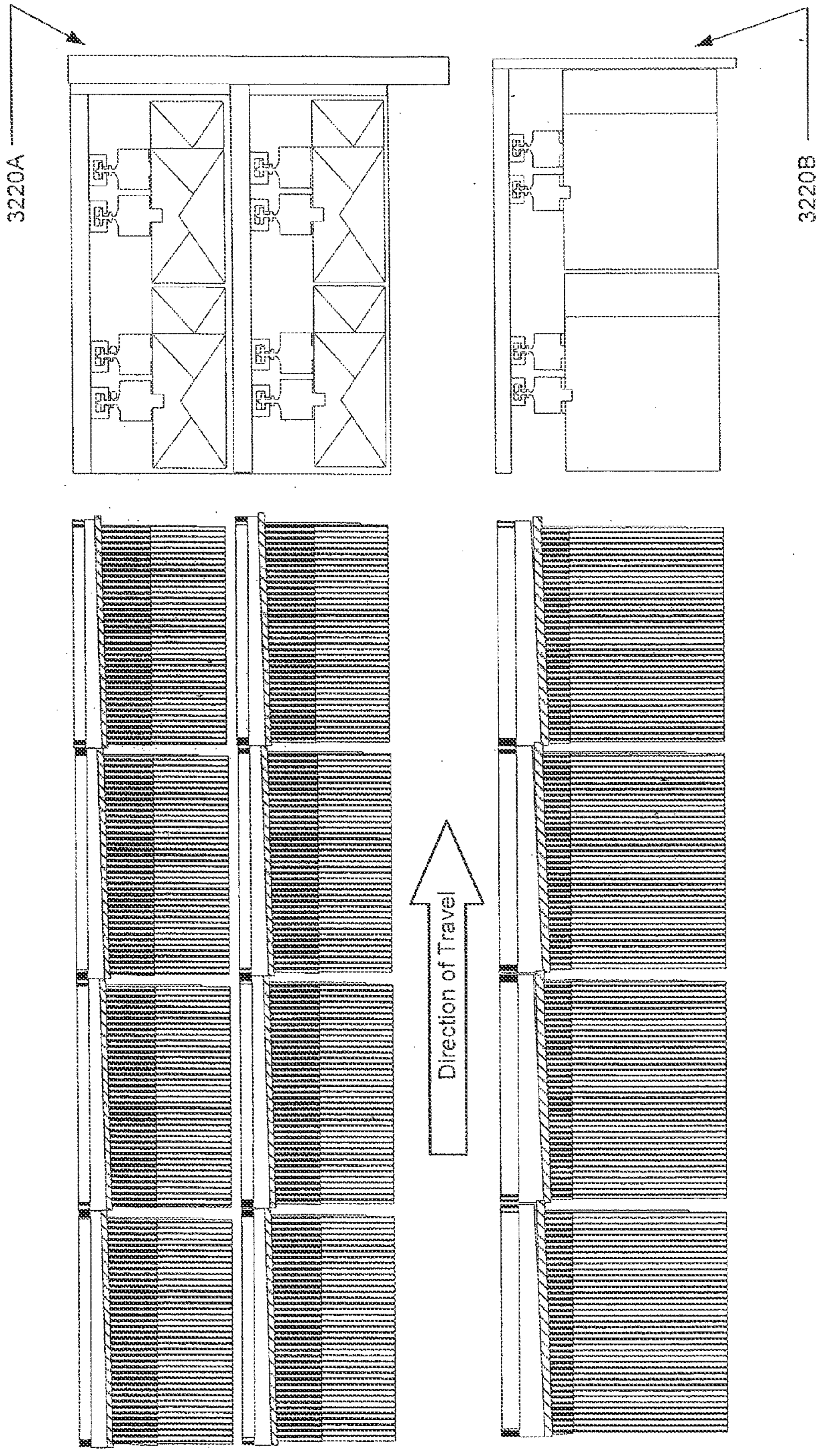

FIG. 32I shows the different storage units shown in, for example, FIGS. 32F and 32G.

Figure 32J:
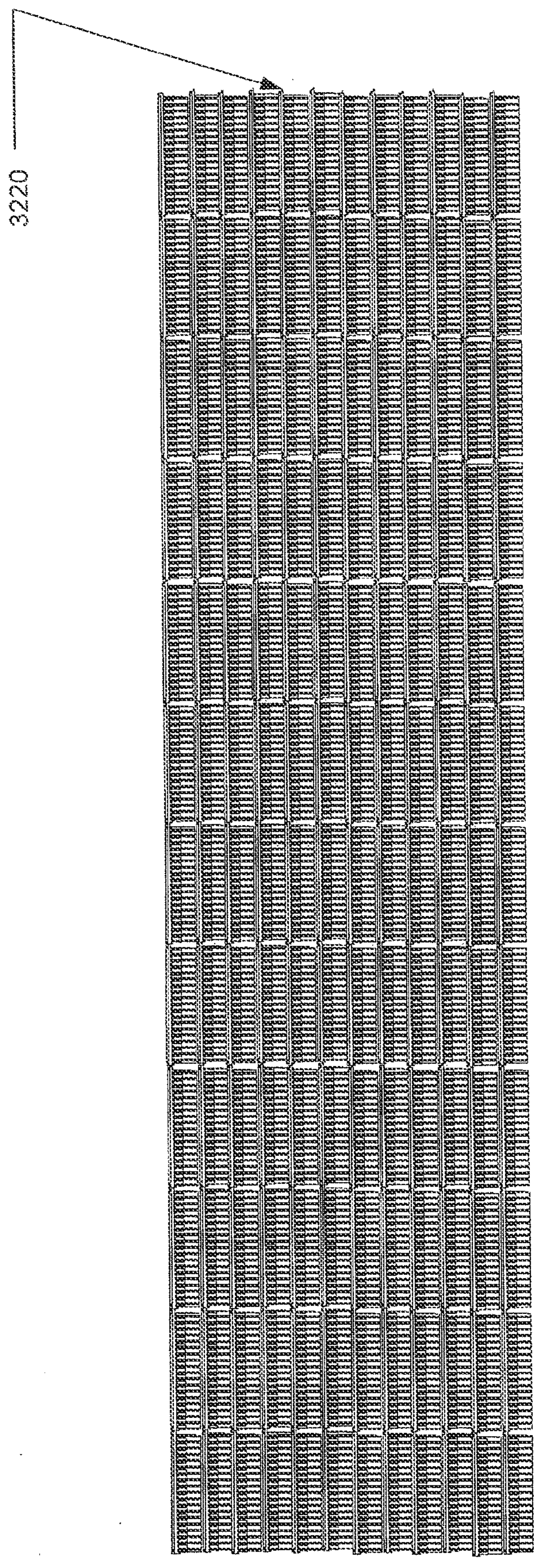

FIG. 32J shows a side view of stacked storage units in accordance with aspects of the invention.

Figure 32K:
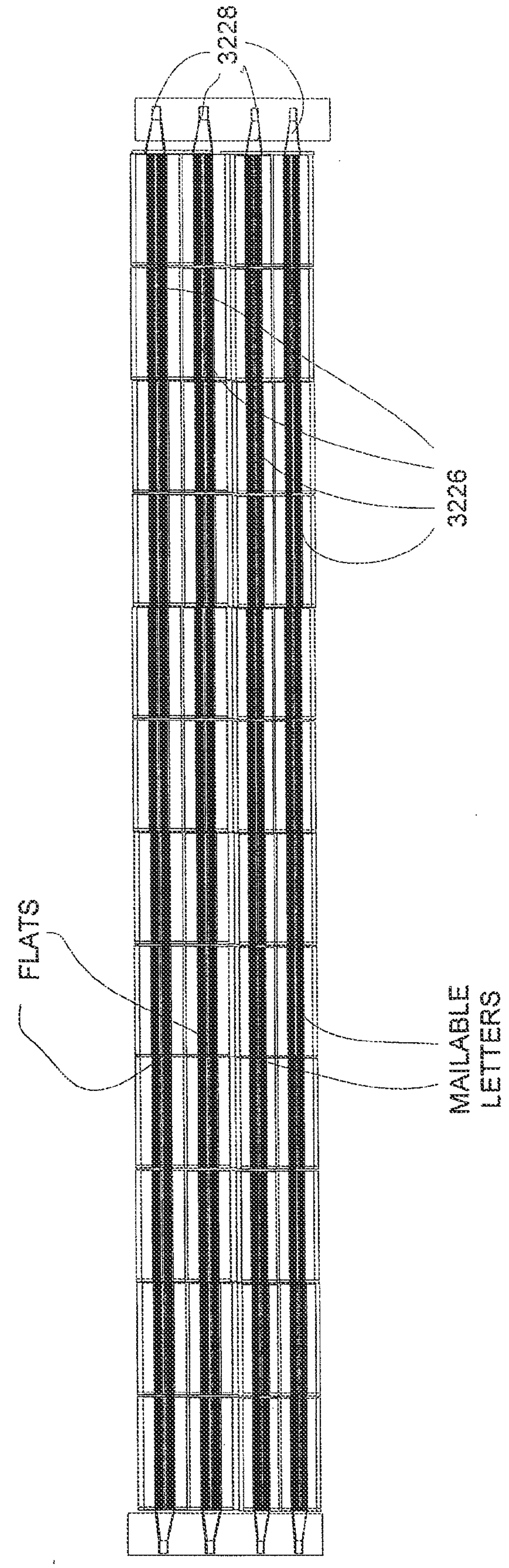

FIG. 32K shows a top view of the storage units in accordance with aspects of the invention.

Figure 32L:
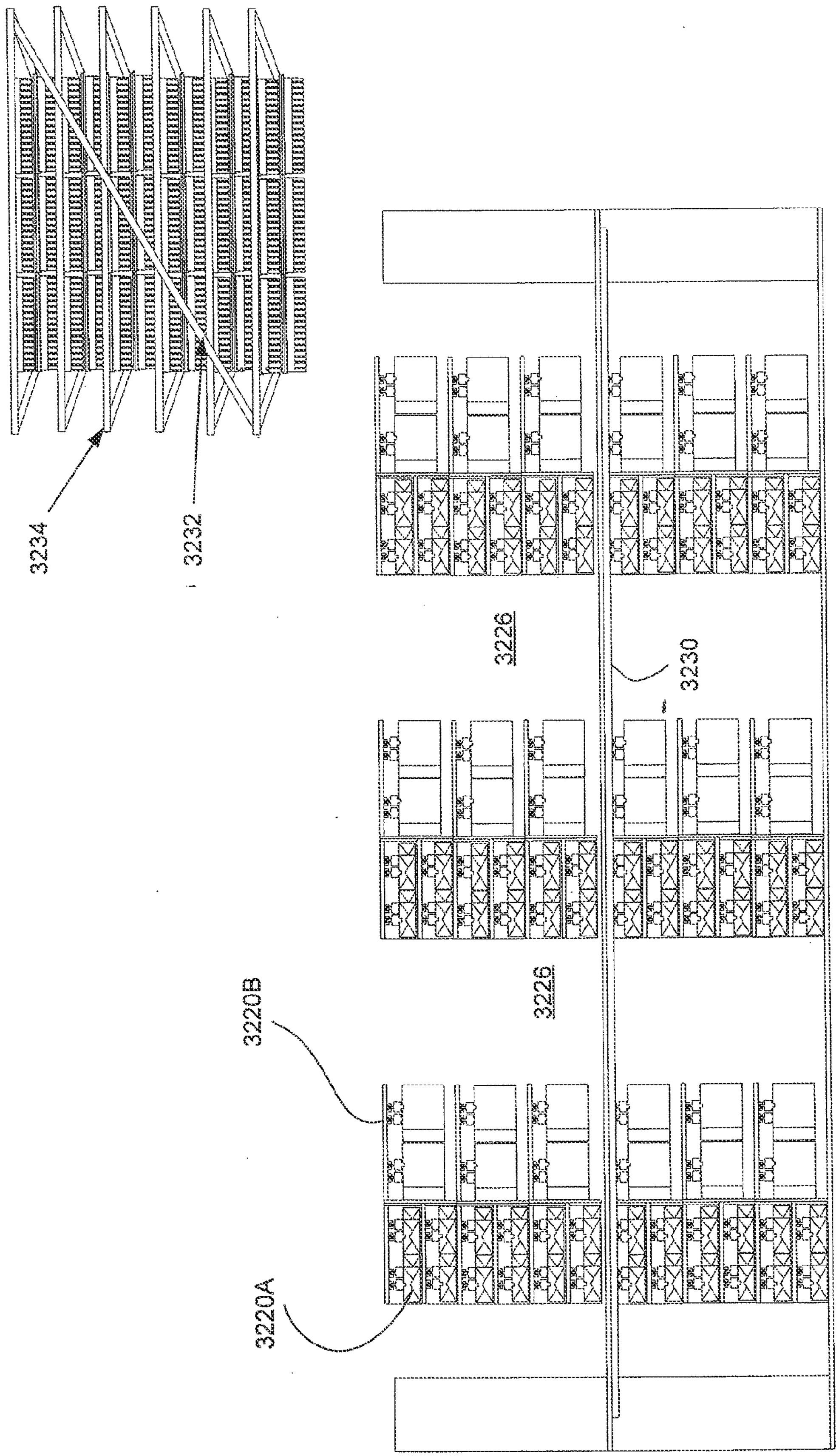

FIG. 32L shows a storage rack in accordance with aspects of the invention.

Figure 32M:
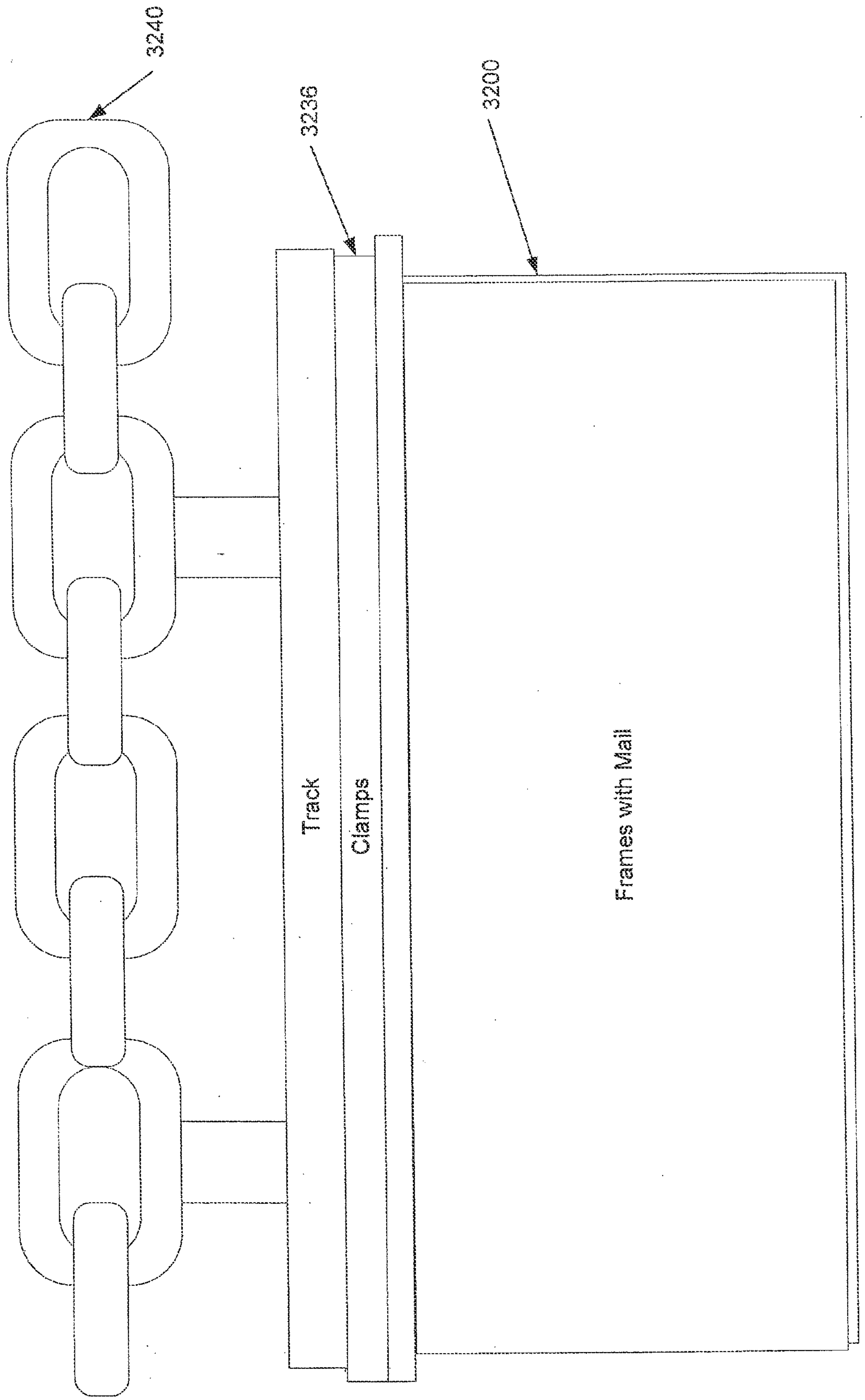

FIG. 32M shows a shuttle in accordance with aspects of the invention.

Figure 32N:
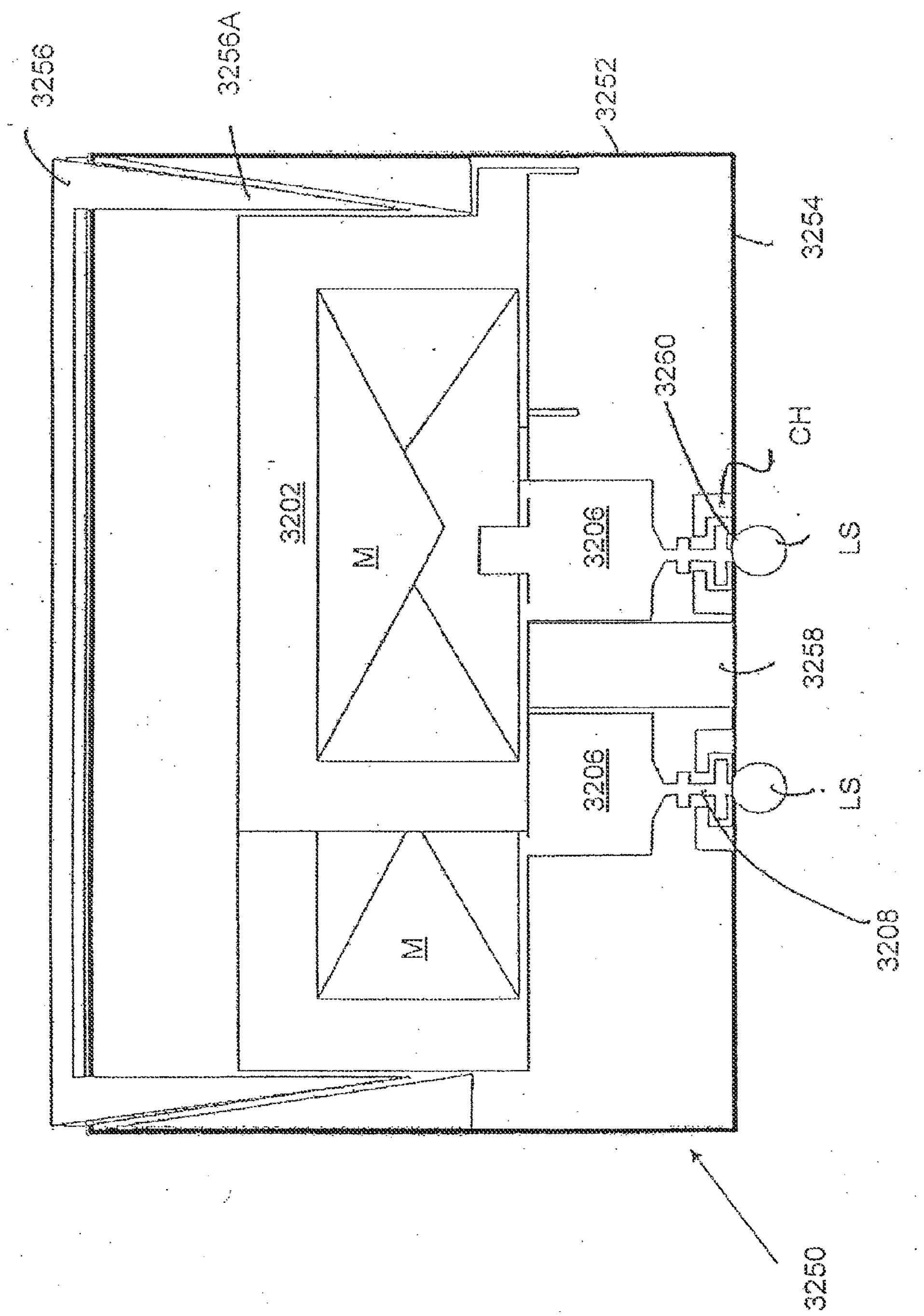

FIG. 32N shows a container for transporting clamps in accordance with aspects of the invention.

Figure 33A:
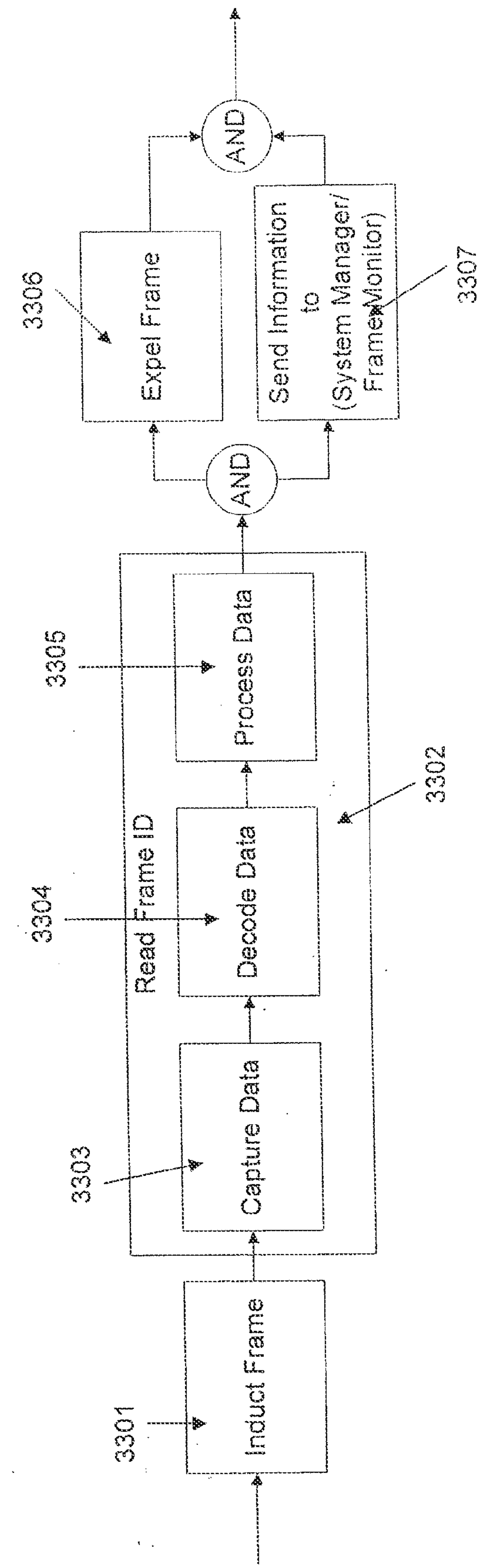

FIG. 33A is a functional flow block diagram that illustrates the operation of a frame ID reader system which is controlled by a system manager in accordance with aspects of the invention.

Figure 33B:
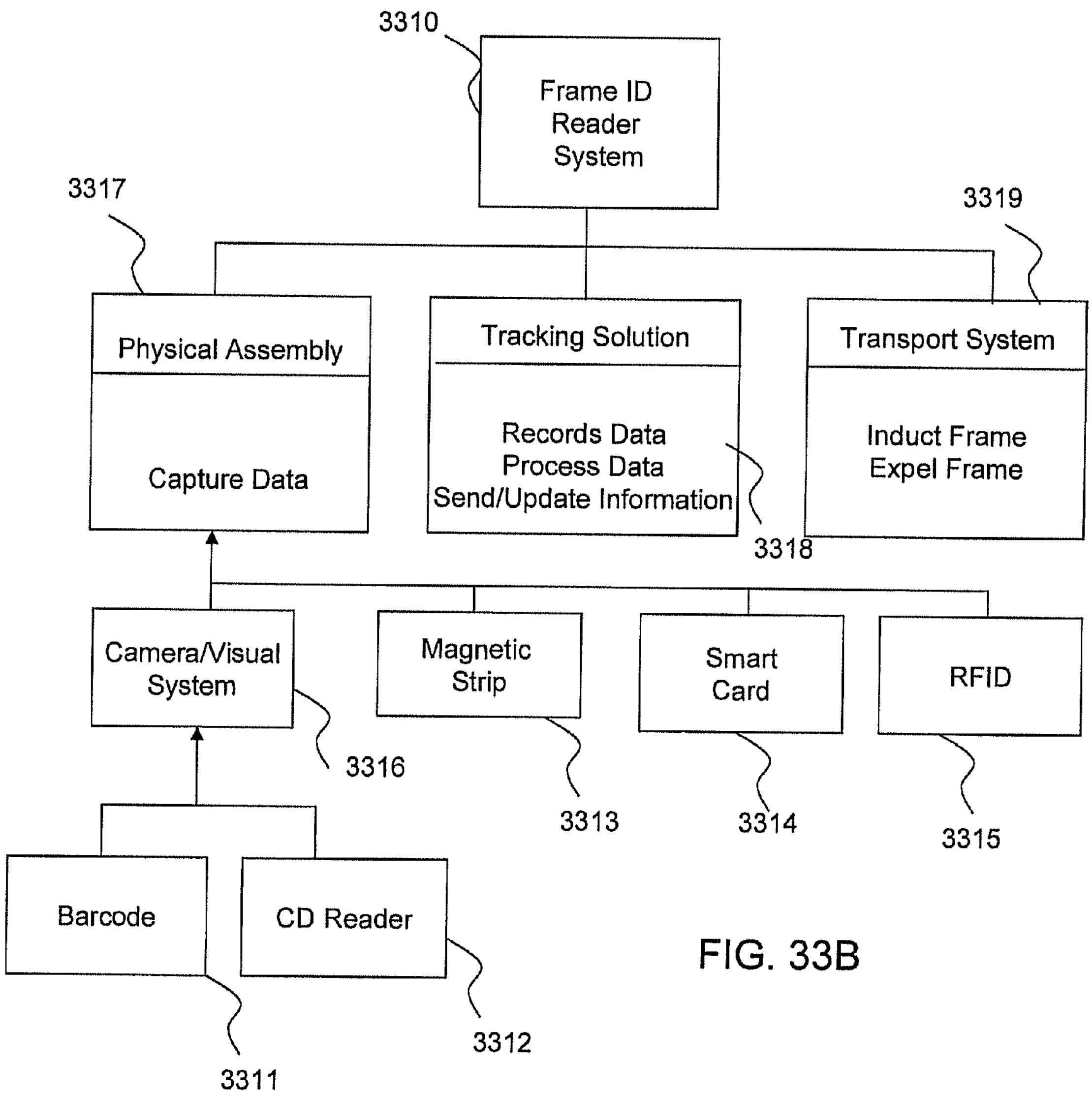

FIG. 33B is a block diagram illustrating a frame ID reader system and five possible types of readable data in accordance with aspects of the invention.

FIG. 33C is a block diagram for a barcode reading system in accordance with aspects of the invention.

FIG. 33D is a block diagram for a CD reading system in accordance with aspects of the invention.

FIG. 33E is a block diagram for a RFID reading system in accordance with aspects of the invention.

FIG. 33F is a block diagram for a smart card reading system in accordance with aspects of the invention.

FIG. 33G is a block diagram for a magnetic stripe reading system in accordance with aspects of the invention.

Figure 33H:
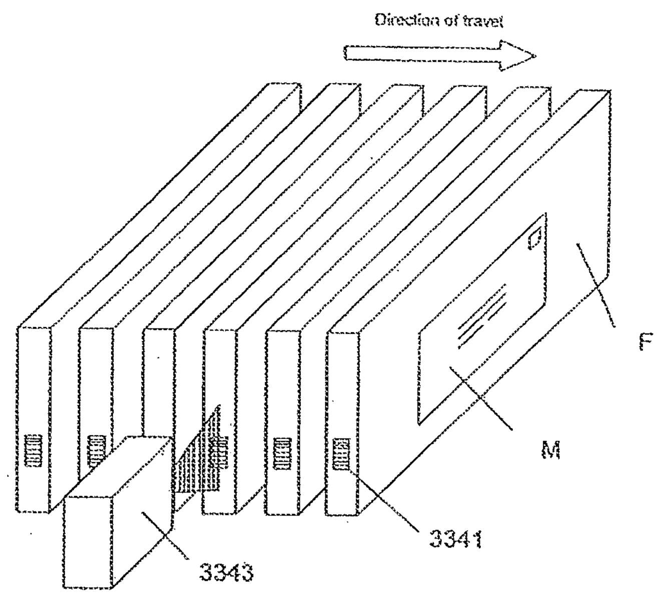

FIG. 33H is an illustration of a barcode reader and a barcode fixed to an individual mail frame in accordance with aspects of the invention.

Figure 33I:
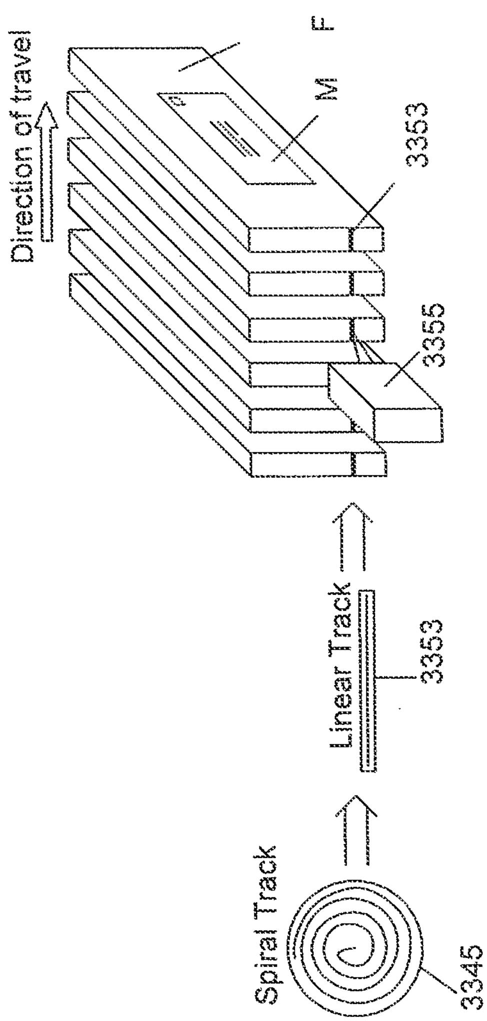

FIG. 33I(i)-(iii) are illustrations of a CD, CD reader and a CD data strip fixed to an individual mail frame in accordance with aspects of the invention.

Figure 33J:
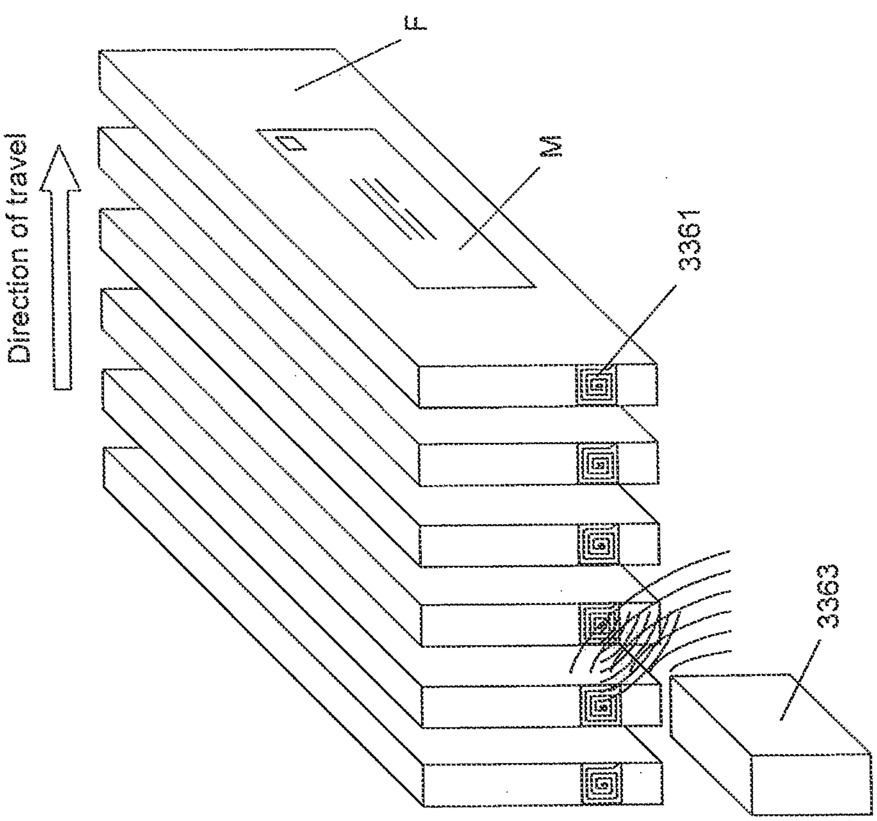

FIG. 33J is an illustration of an RFID tag reader and an RFID tag fixed to an individual mail frame in accordance with aspects of the invention.

Figure 33K:
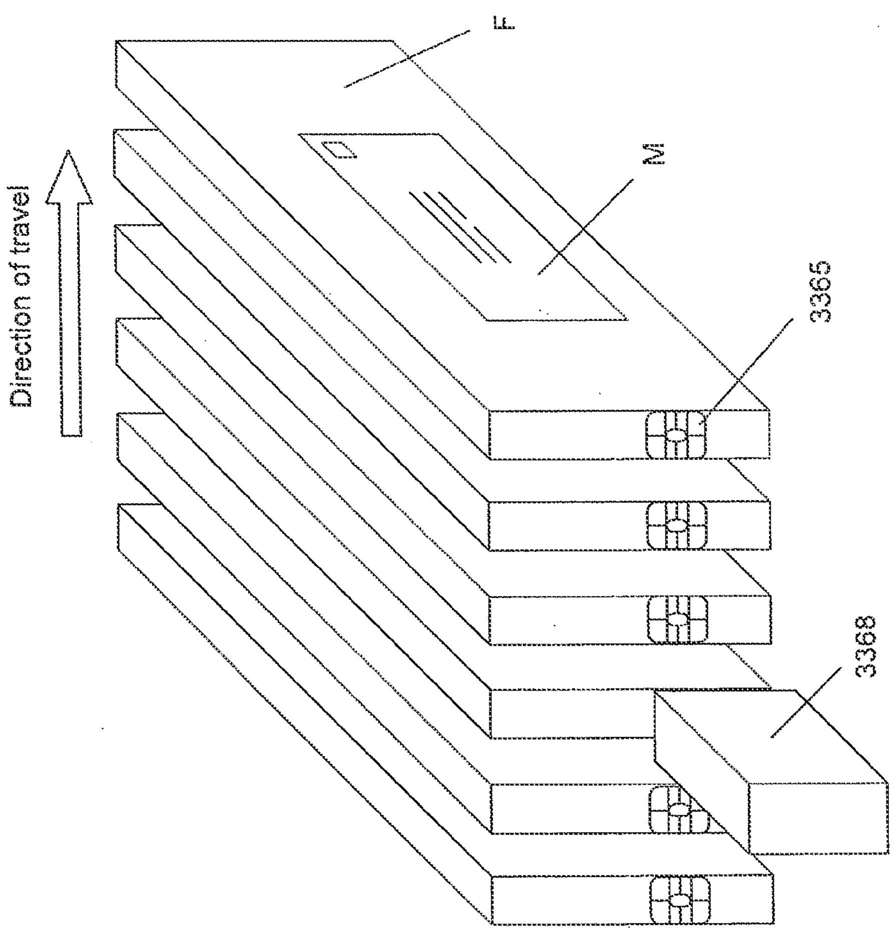

FIG. 33K(i) and (ii) are illustrations of a typical smart card, smart card reader and a smart card fixed to an individual mail frame in accordance with aspects of the invention.

Figure 33L:
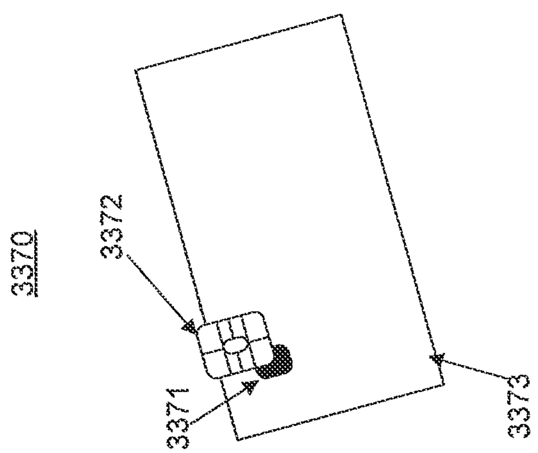

FIG. 33L is an exploded view of a contact smart card in accordance with aspects of the invention.

Figure 33M:
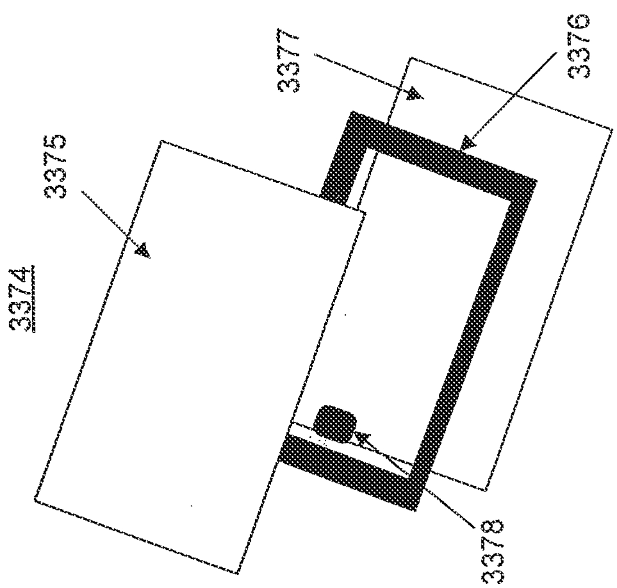

FIG. 33M is an exploded view of a contactless smart card in accordance with aspects of the invention.

Figure 33N:
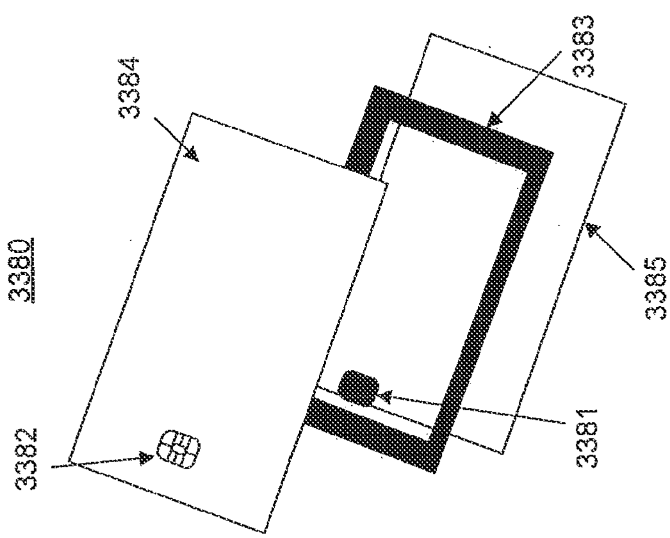

FIG. 33N is an exploded view of a dual or "combination" smart card in accordance with aspects of the invention.

Figure 33O:
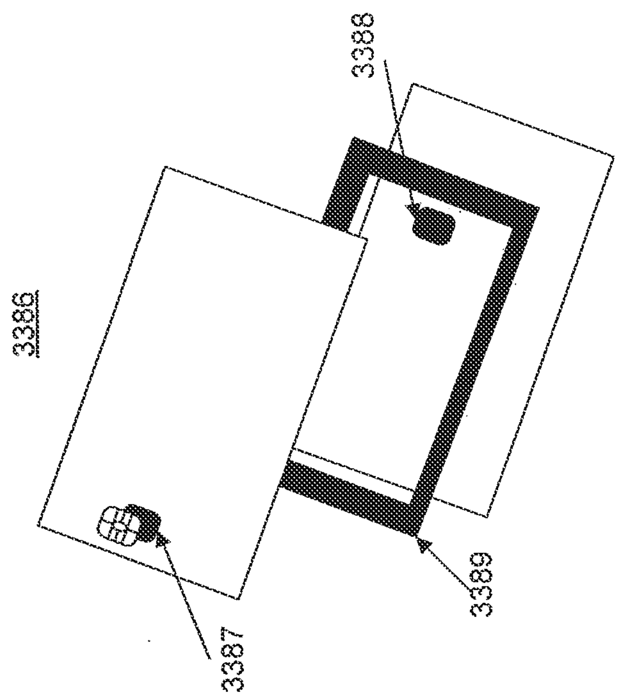

FIG. 33O is an exploded view of a hybrid smart card in accordance with aspects of the invention.

Figure 33P:
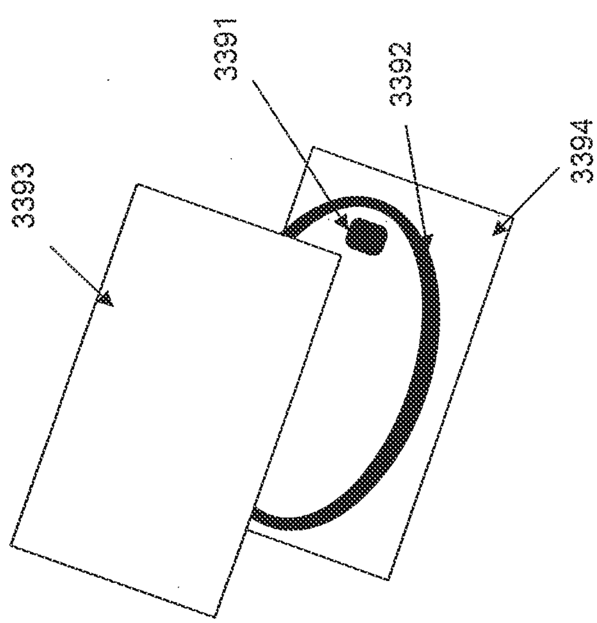

FIG. 33P is an exploded view of a proximity or "prox" card in accordance with aspects of the invention.

Figure 33Q:
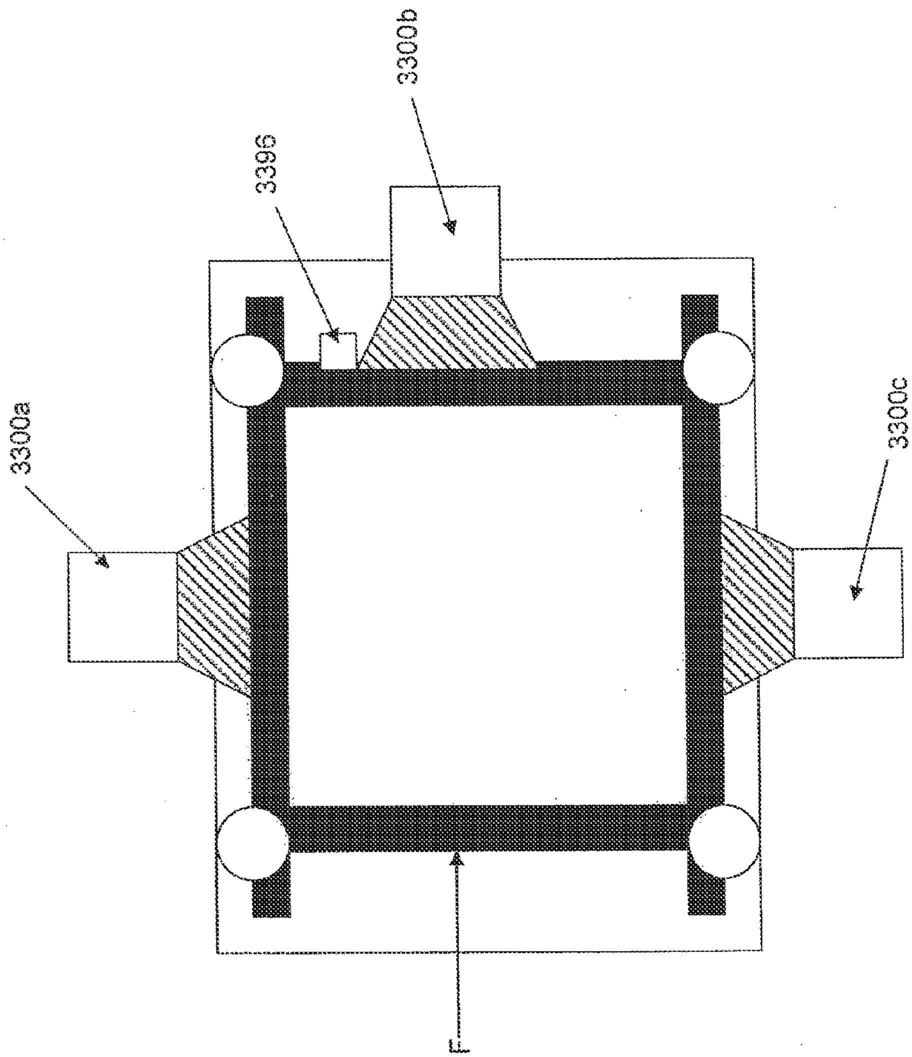

FIG. 33Q is an illustration of a frame and possible locations of a reader for reading frame identity data in accordance with aspects of the invention.

Figure 34A:
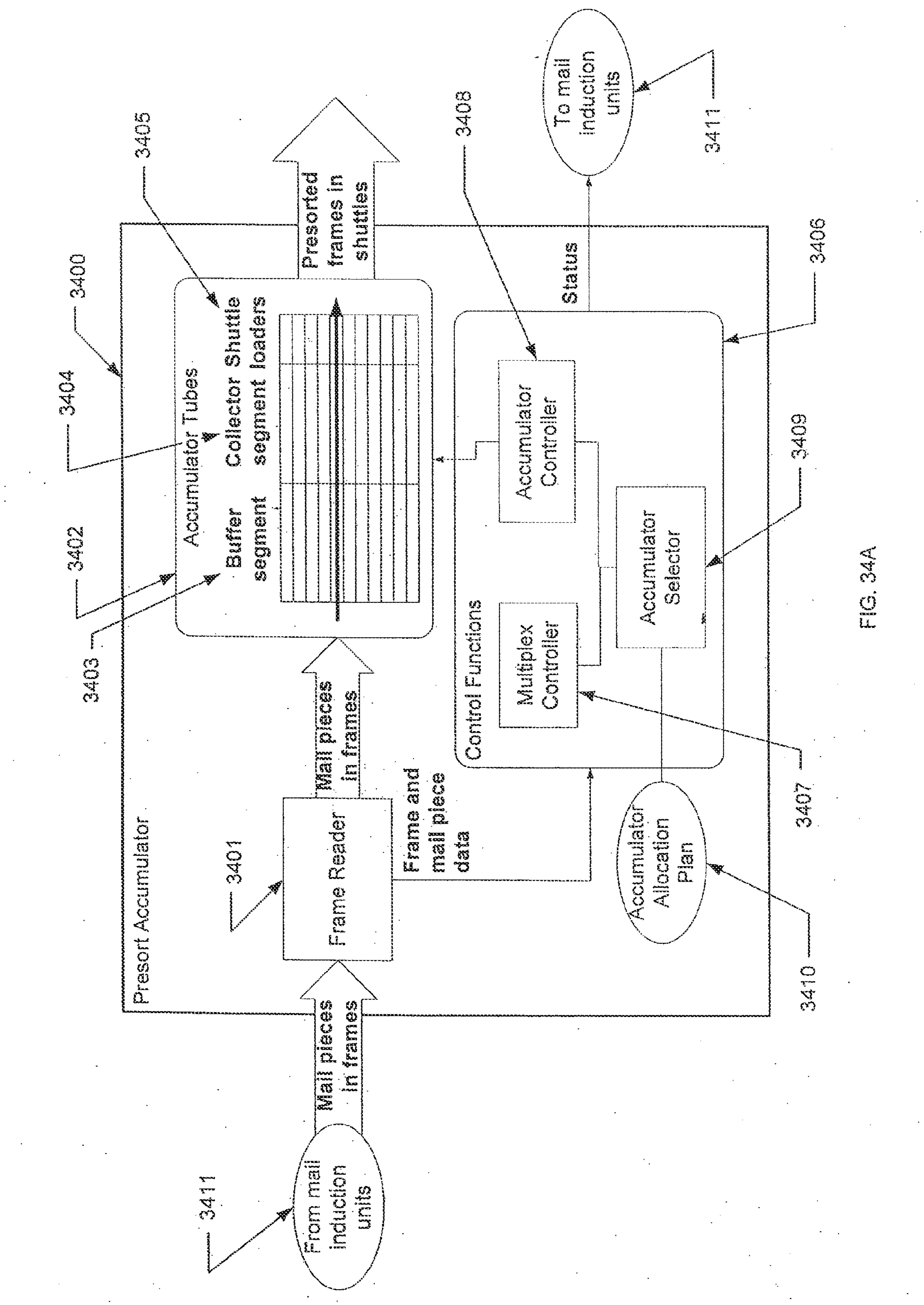

FIG. 34A shows a pre-sort accumulator system architecture for buffering frames containing mail in accordance with aspects of the invention.

Figure 34B:
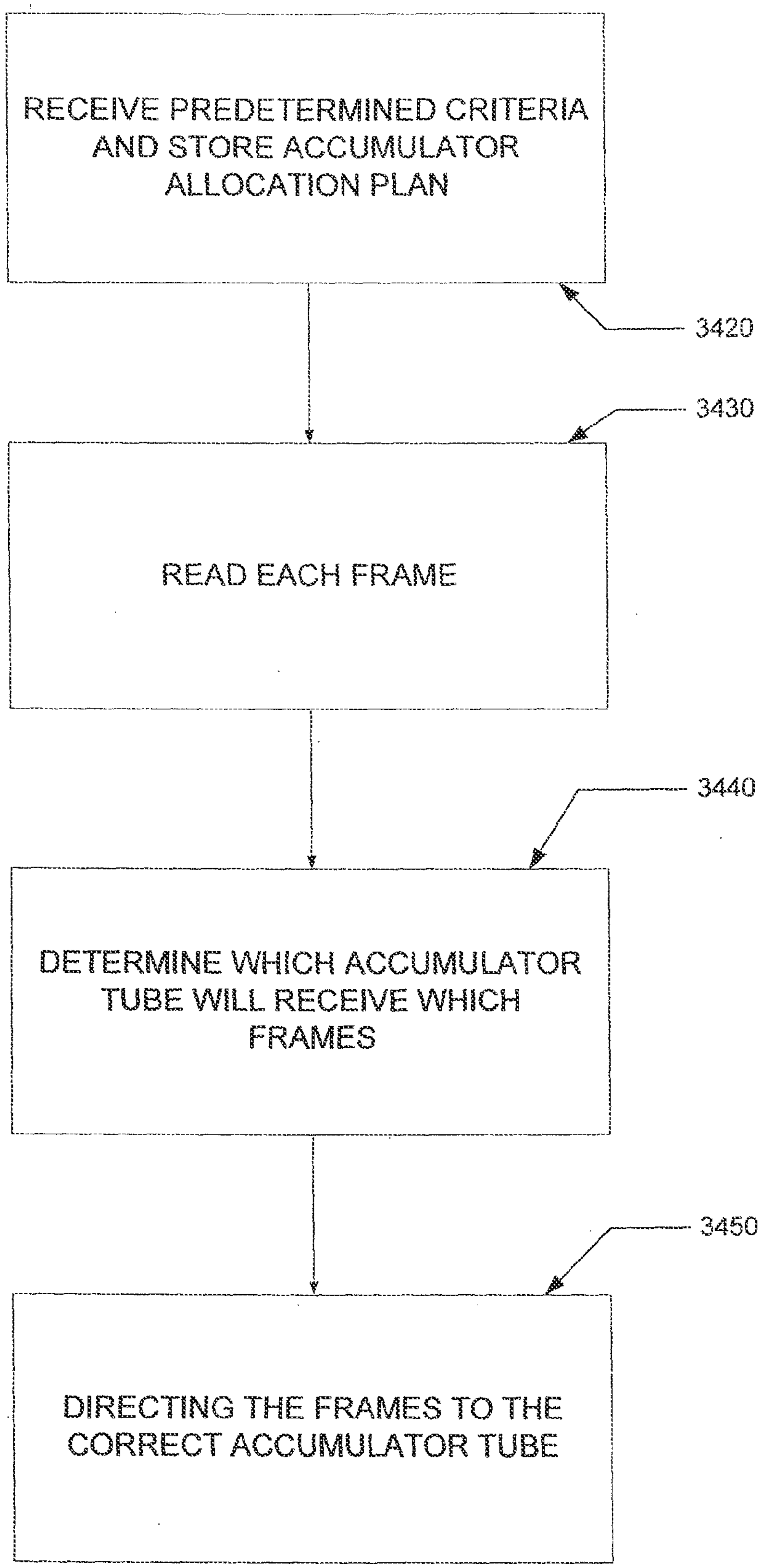

FIG. 34B shows a frame with mail buffer method in accordance with aspects of the invention.

Figure 34C:
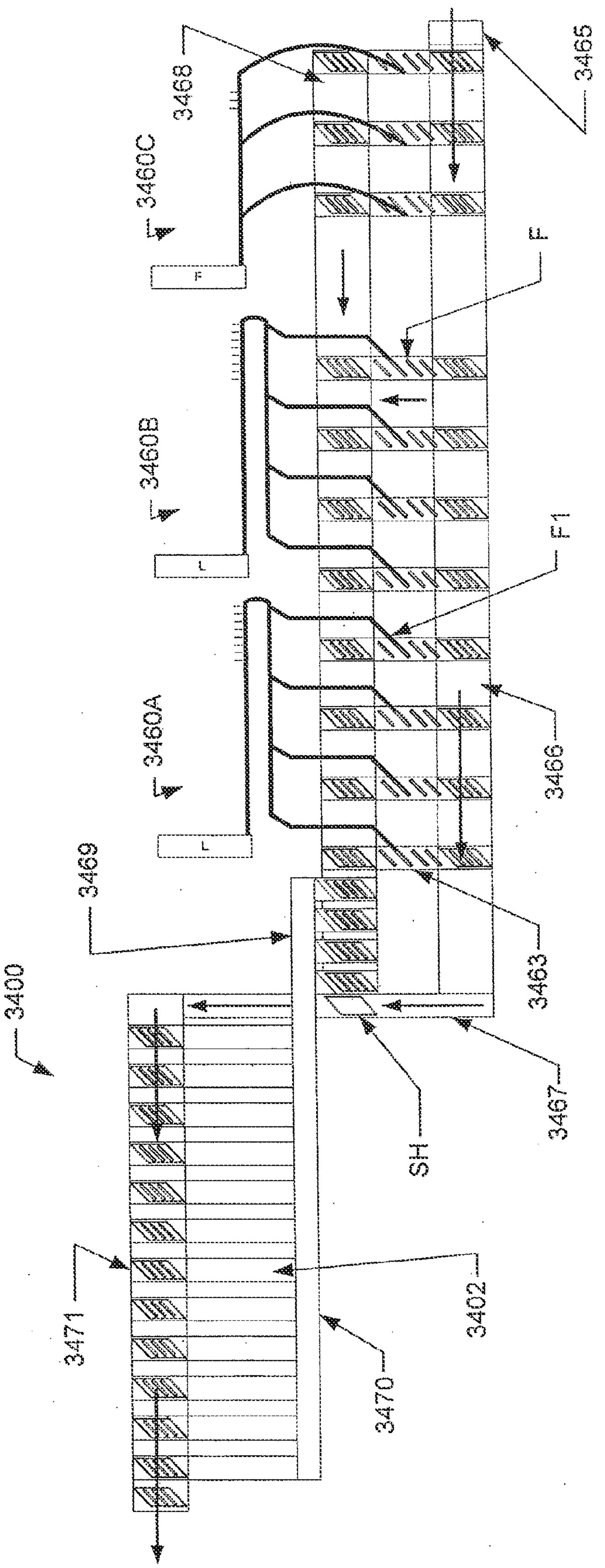

FIG. 34C shows a top view of presort accumulator system receiving frames from induction units in accordance with aspects of the invention.

Figure 34D:
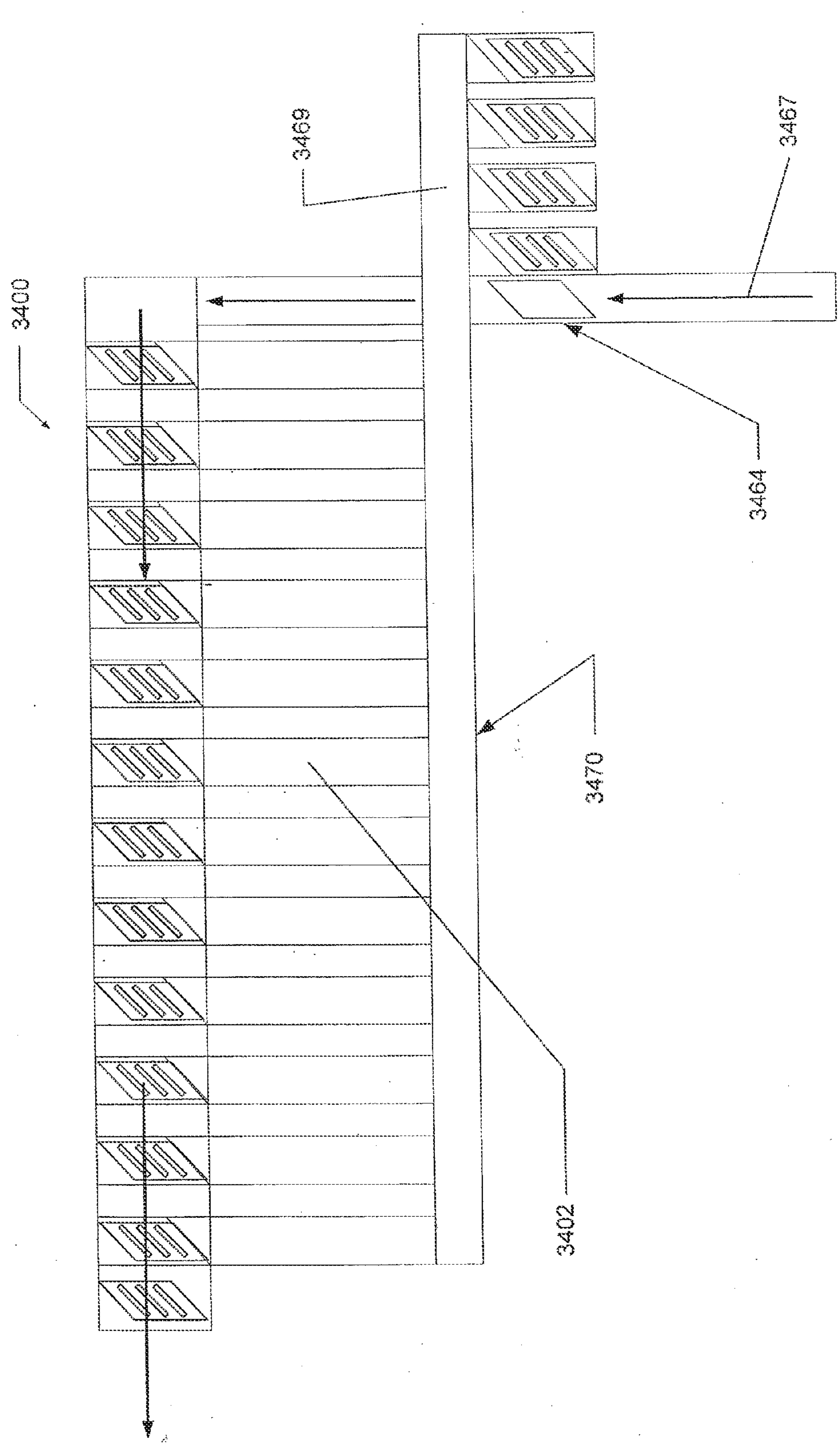

FIG. 34D shows a top view of the presort accumulator system illustrated in FIG. 34C in accordance with aspects of the invention.

Figure 34E:
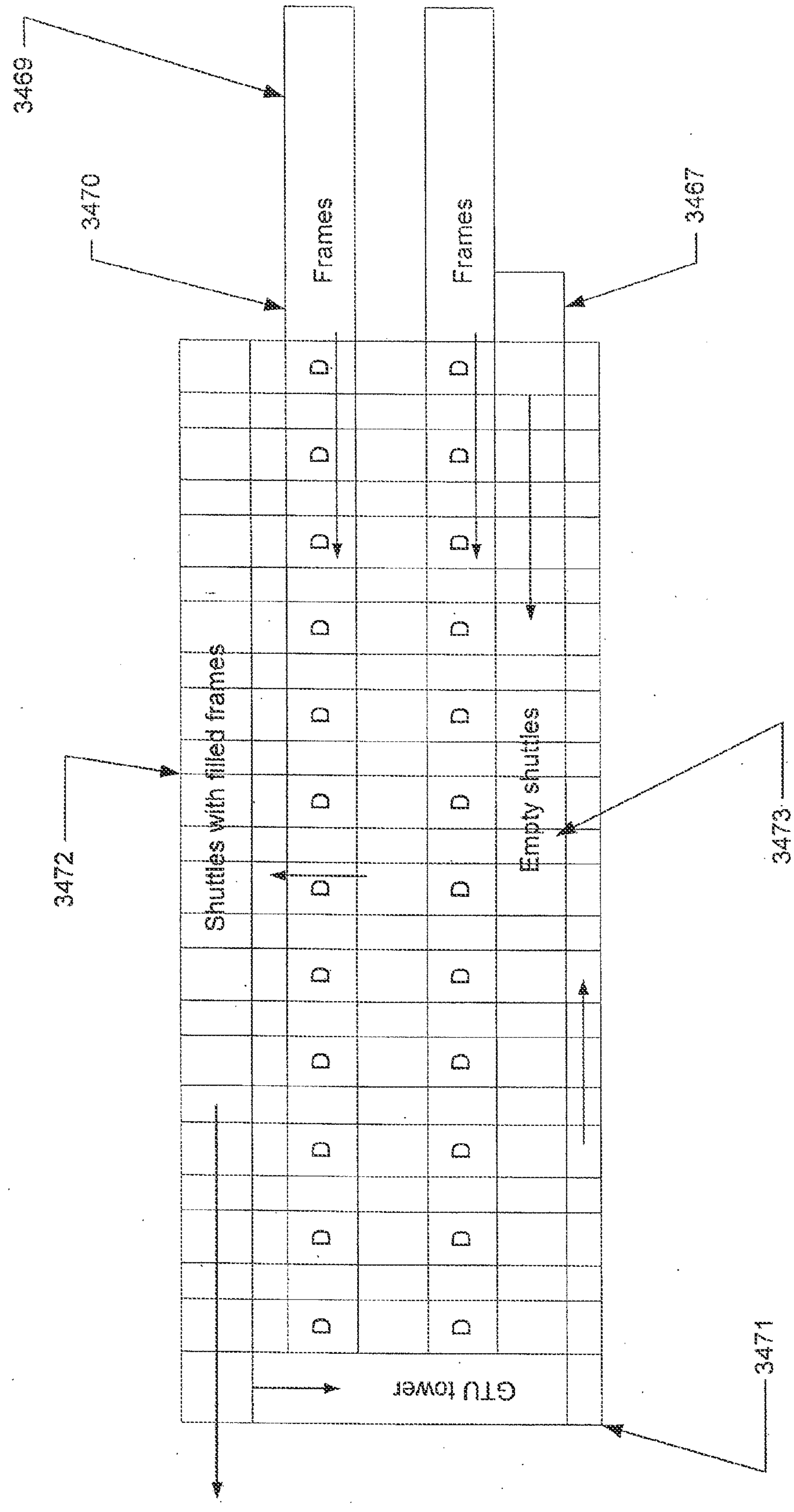

FIG. 34E shows a front side view of the presort accumulator system illustrated in FIG. 34D in accordance with aspects of the invention.

Figure 35A:
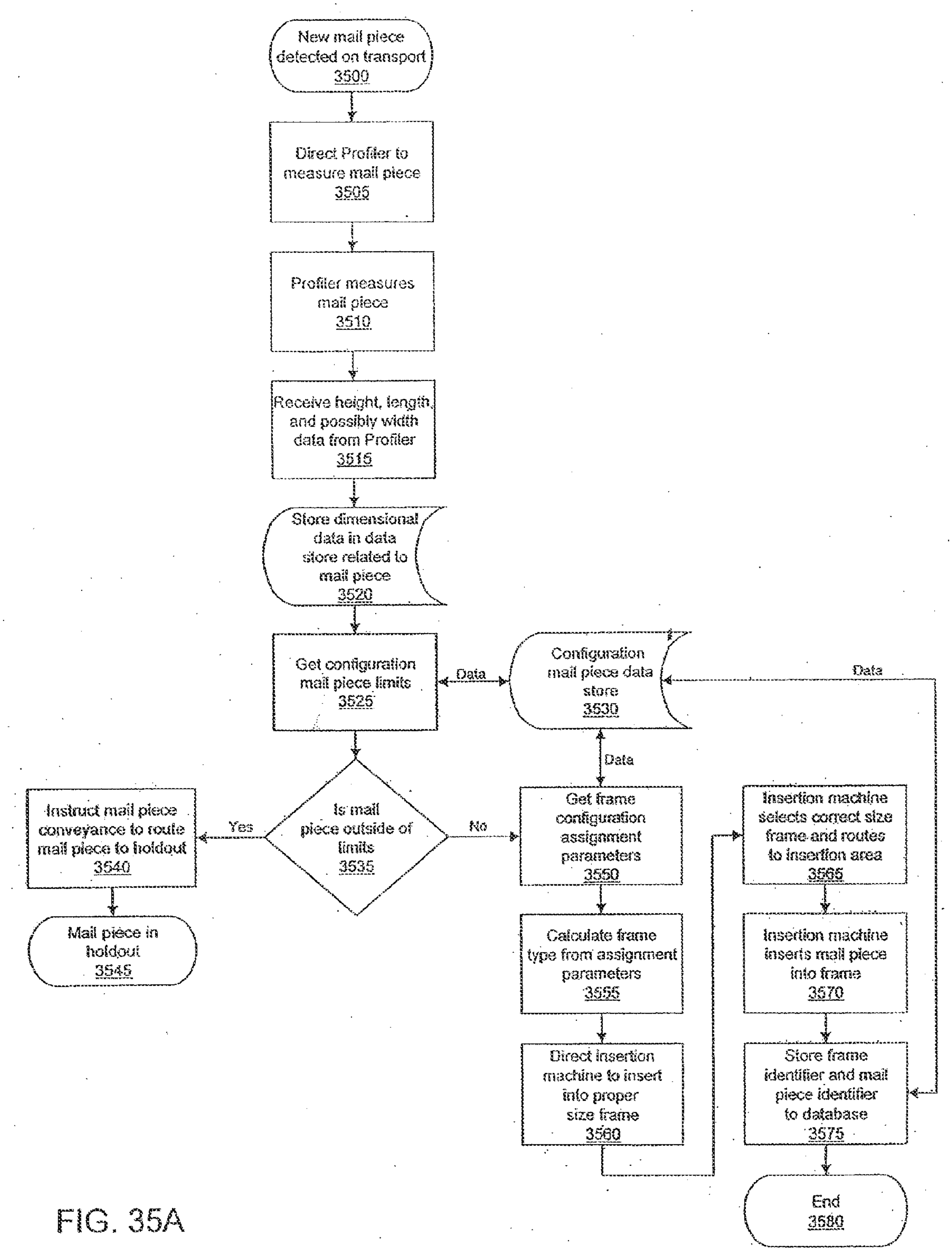

FIG. 35A shows a flow diagram depicting steps of a method for profiling mail pieces and determining a frame size in accordance with aspects of the invention.

Figure 35B:
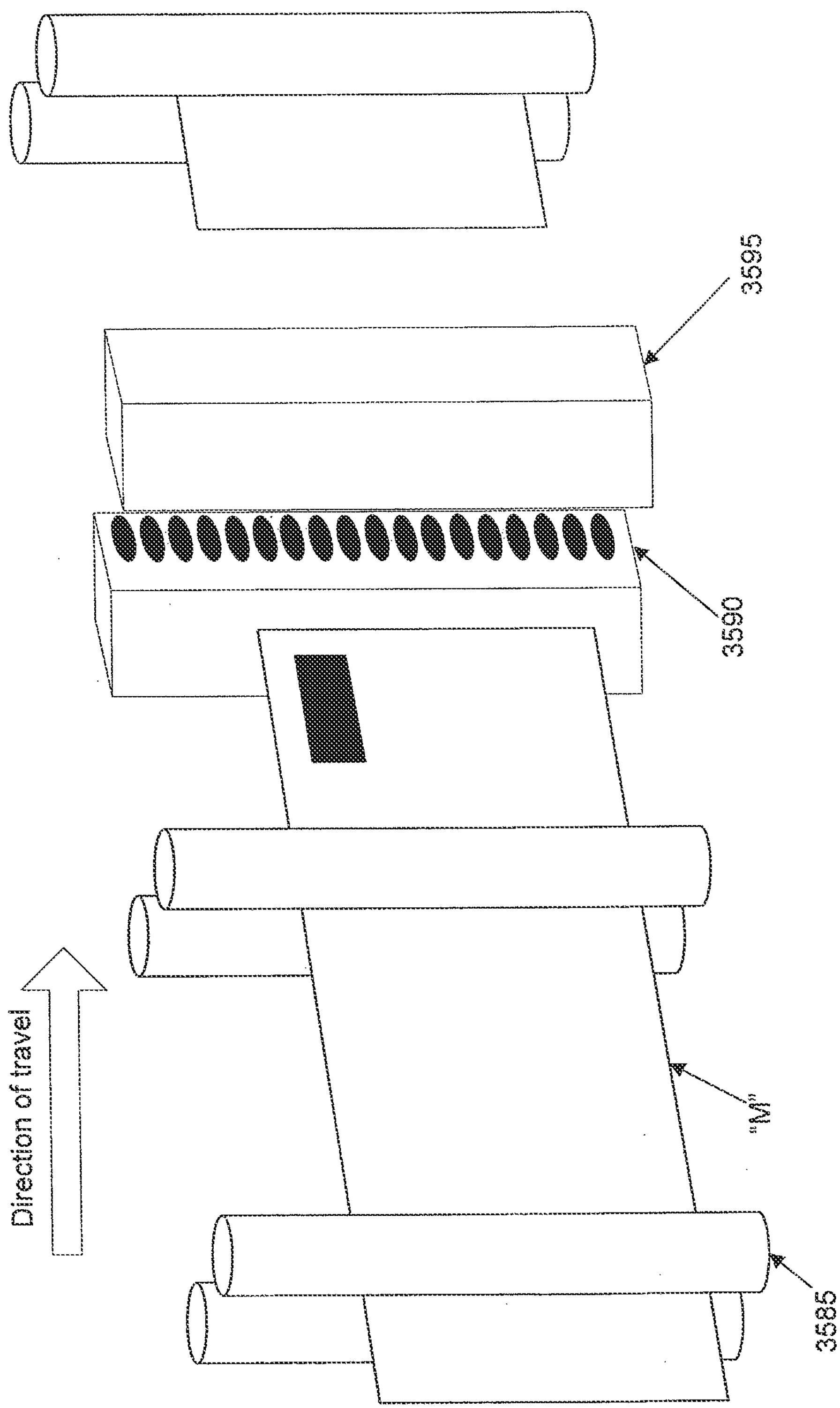

FIG. 35B shows an exemplary illustration of profiling a mail piece using light-emitting diodes (LEDs) and charge-coupled devices (CCDs) in accordance with aspects of the invention.

Figure 36:
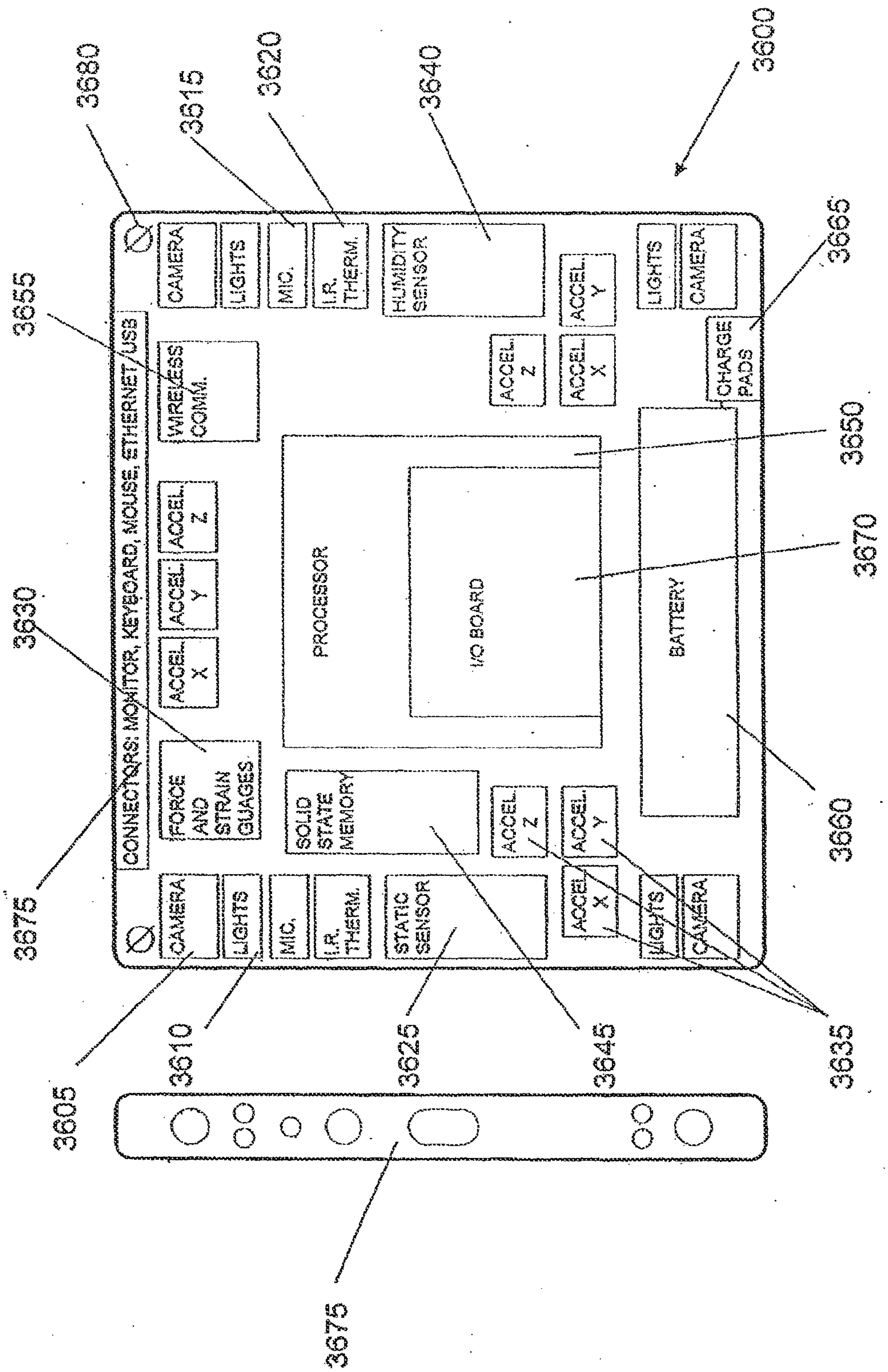

FIG. 36 shows a side view of a self monitoring and remote testing unit in accordance with aspects of the invention.

Figure 37A:
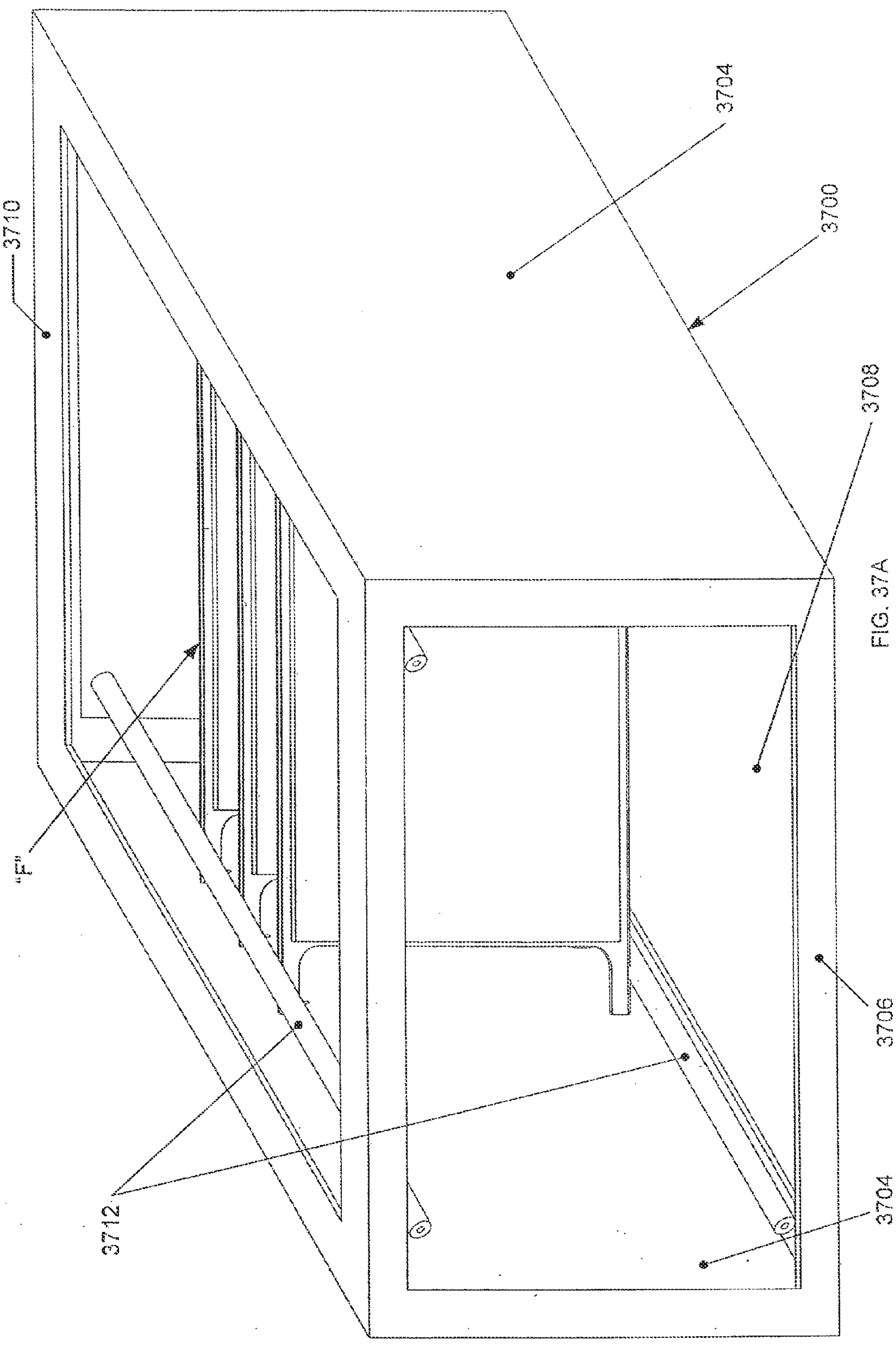

FIG. 37A shows a perspective view of an exemplary embodiment of a shuttle in accordance with aspects of the invention.

Figure 37B:
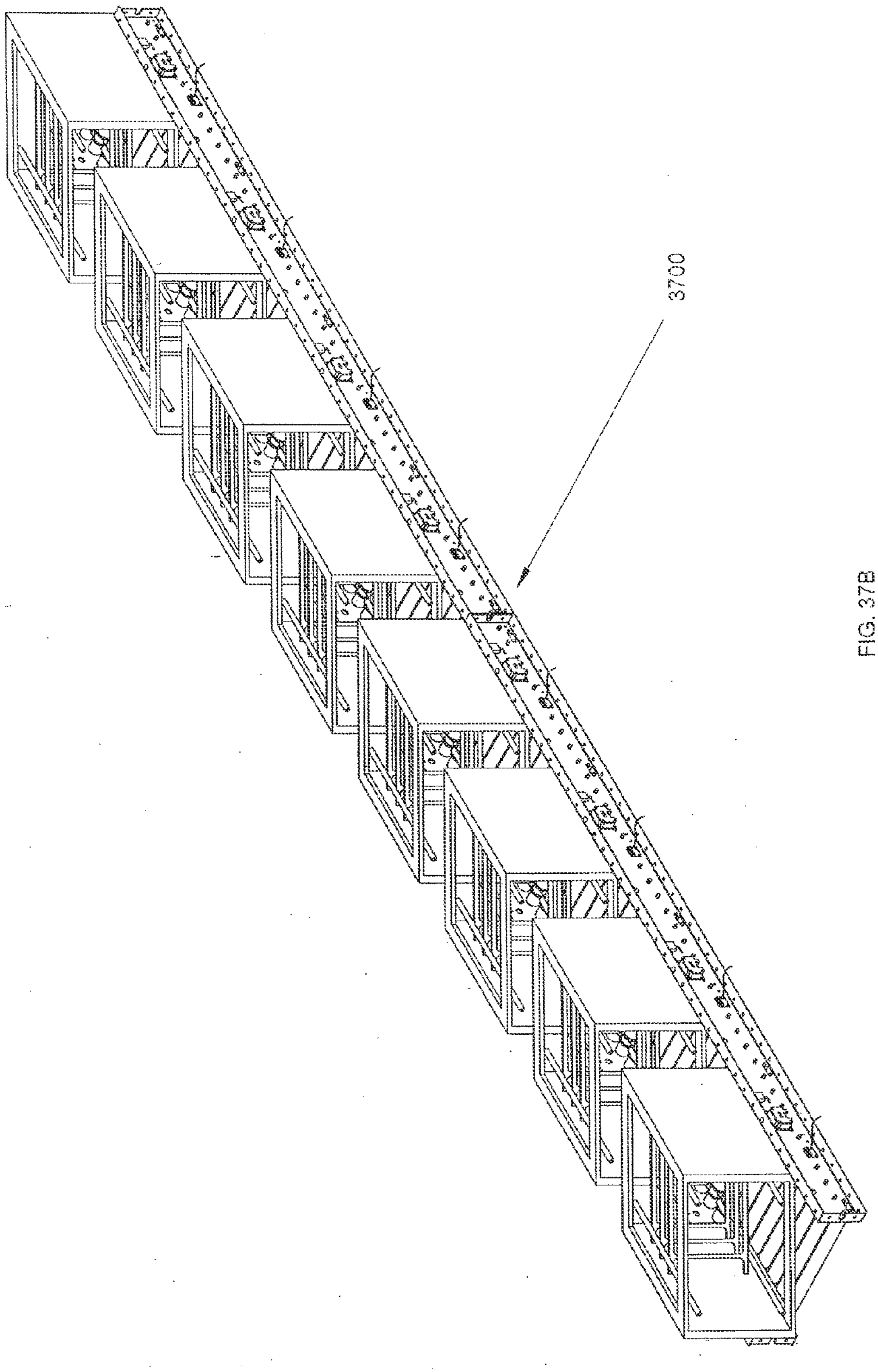

FIG. 37B shows a perspective view of a plurality of shuttles nested in accordance with aspects of the invention.

Figure 37C:
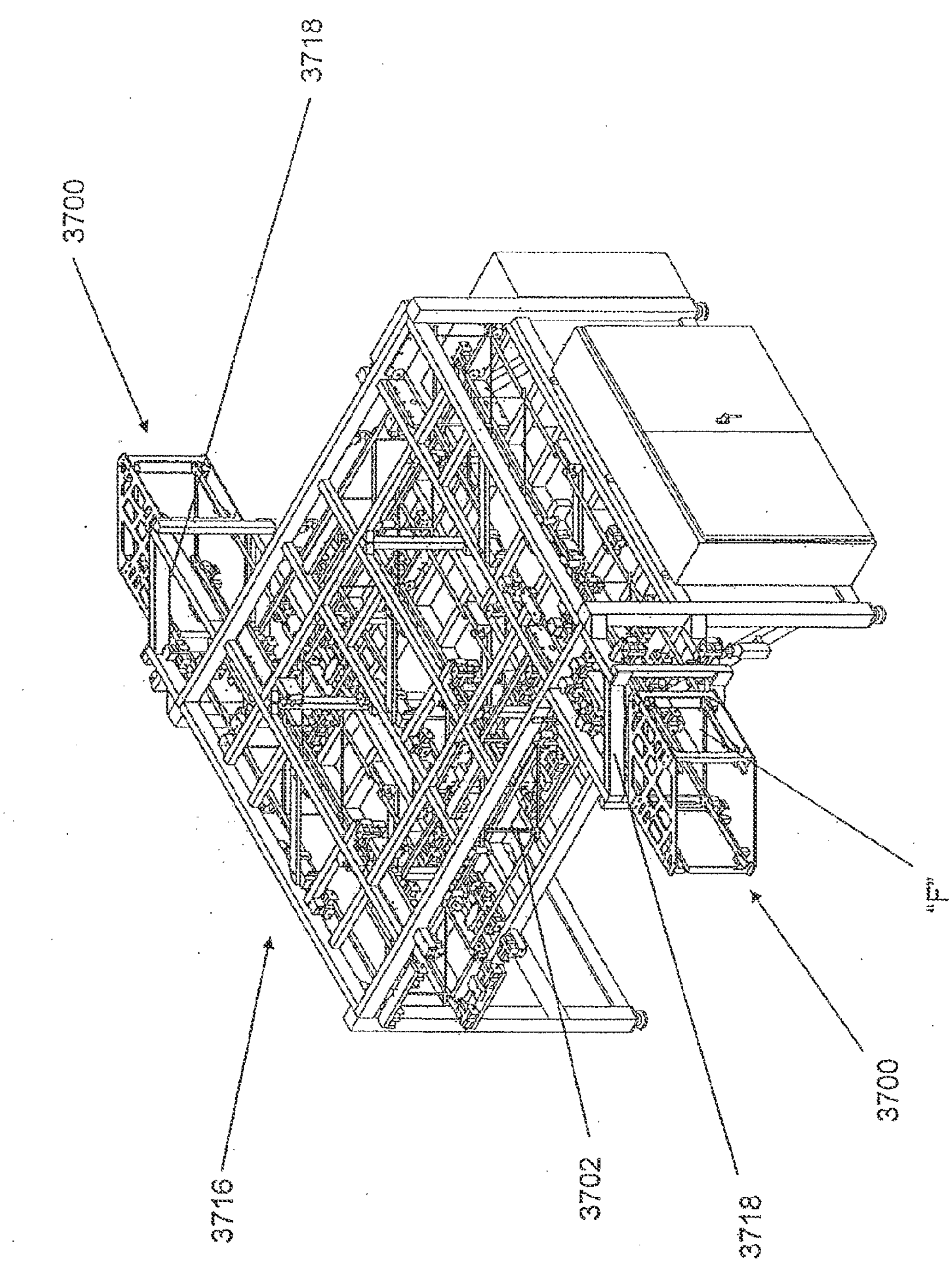

FIG. 37C shows a perspective view of a machine having shuttles docked at an entrance and an exit in accordance with aspects of the invention.

Figure 37D:
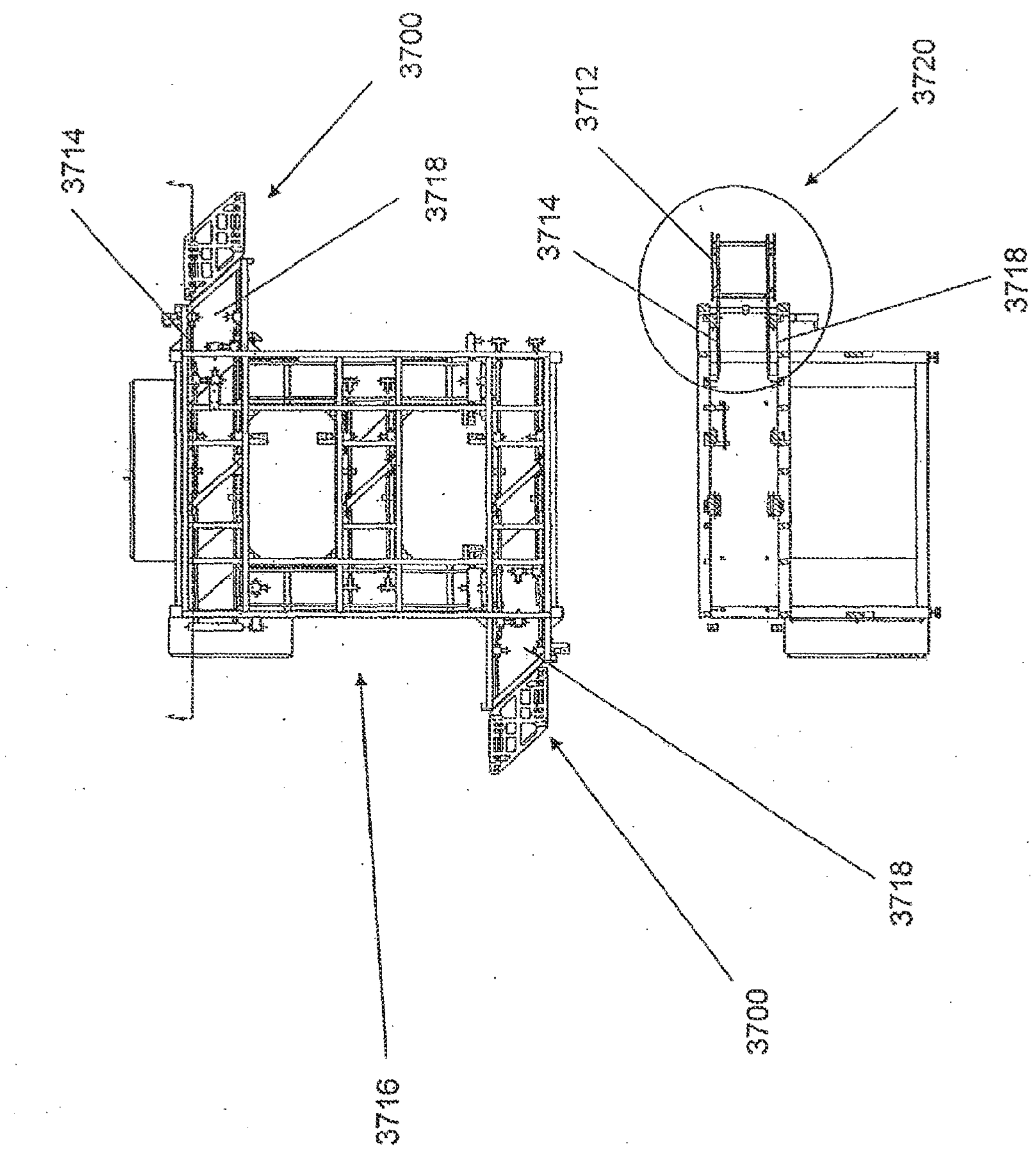

FIG. 37D shows a top and elevation view of the machine of FIG. 37C in accordance with aspects of the invention.

Figure 37E:
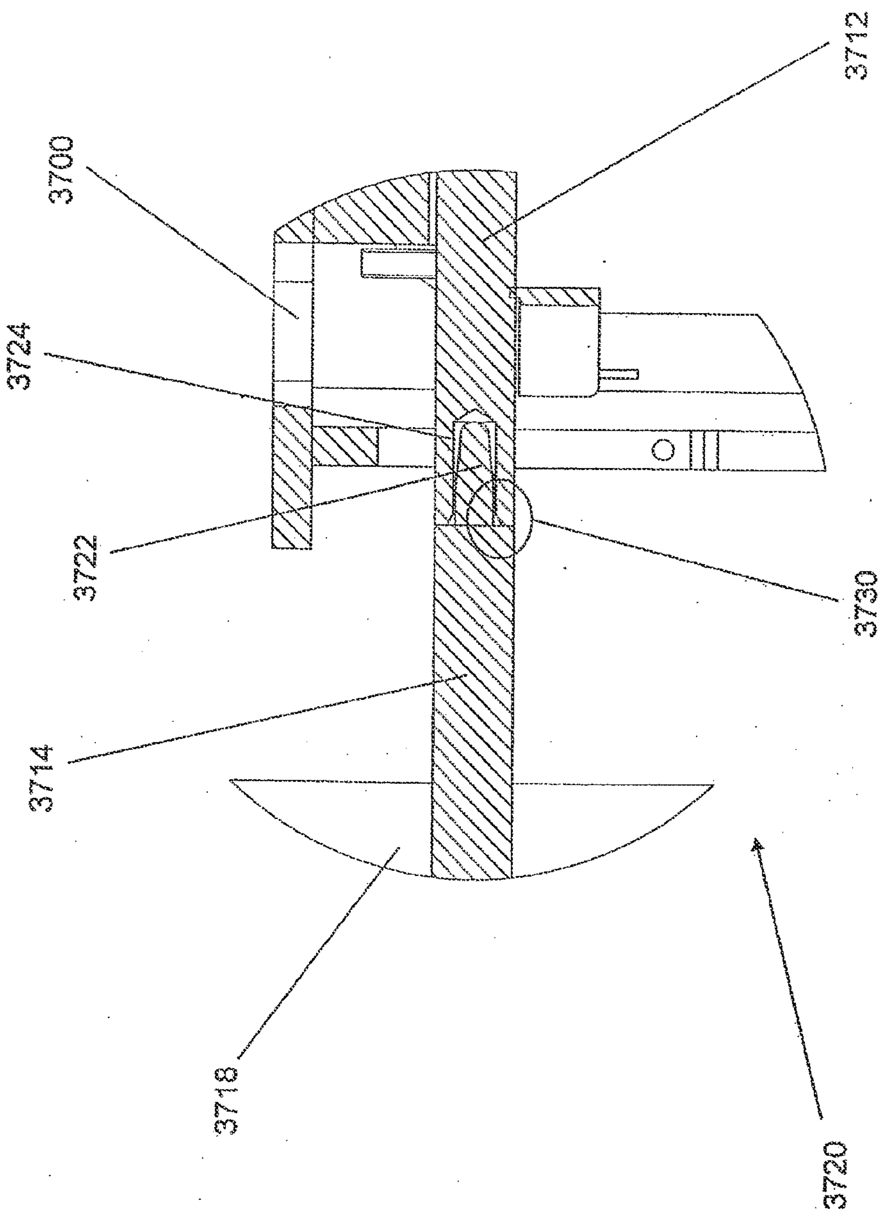

FIG. 37E shows a cross section side view of a docking joint in accordance with aspects of the invention.

Figure 37F:
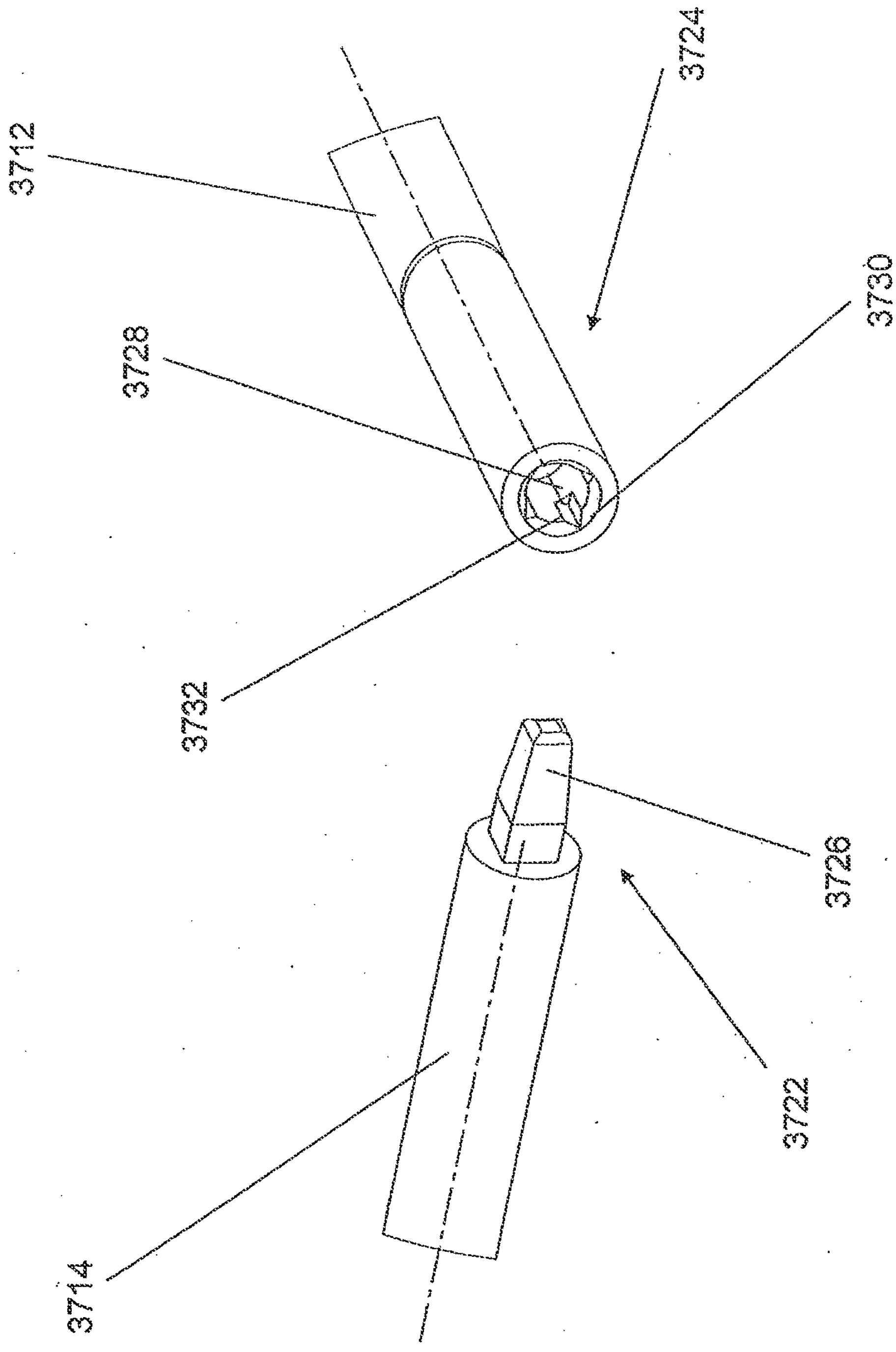

FIG. 37F shows a perspective view of male and female engagement members used at a docking joint in accordance with aspects of the invention.

Figure 37G:
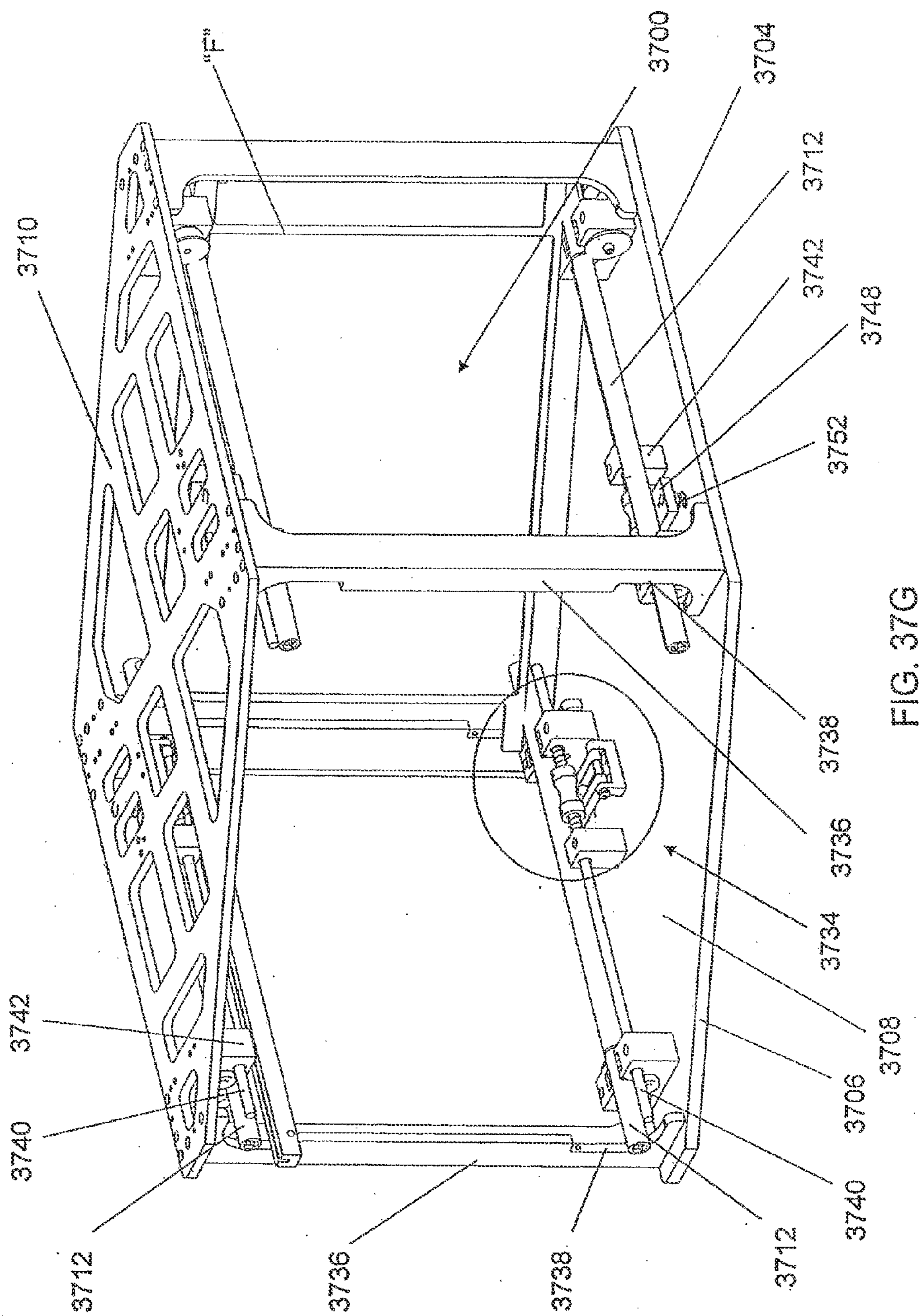

FIG. 37G shows a perspective view of an alternative embodiment of a shuttle including a braking system in accordance with aspects of the invention.

Figure 37H:
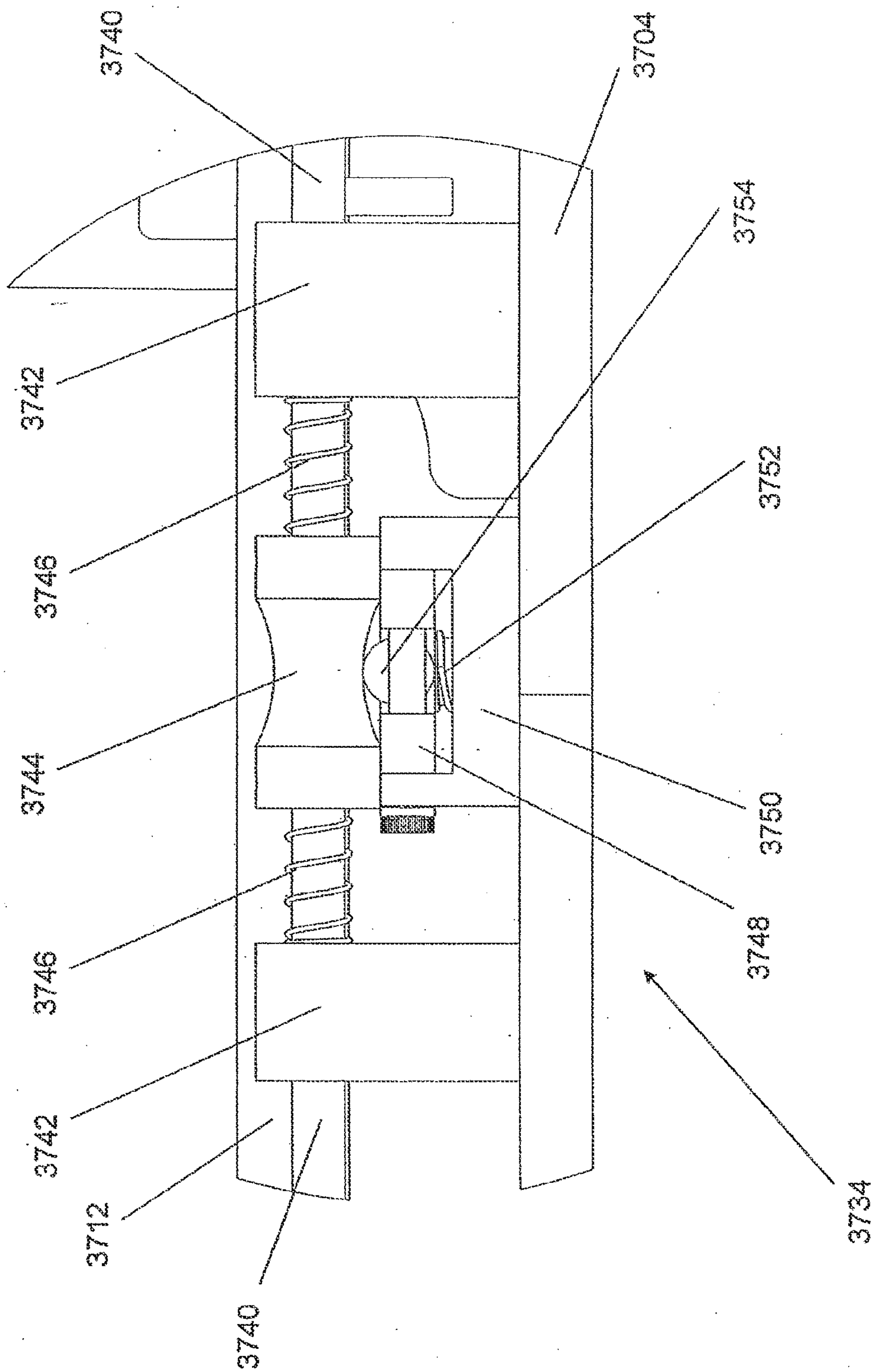

FIG. 37H shows a side view of a braking mechanism in an activated position in accordance with aspects of the invention.

Figure 37I:
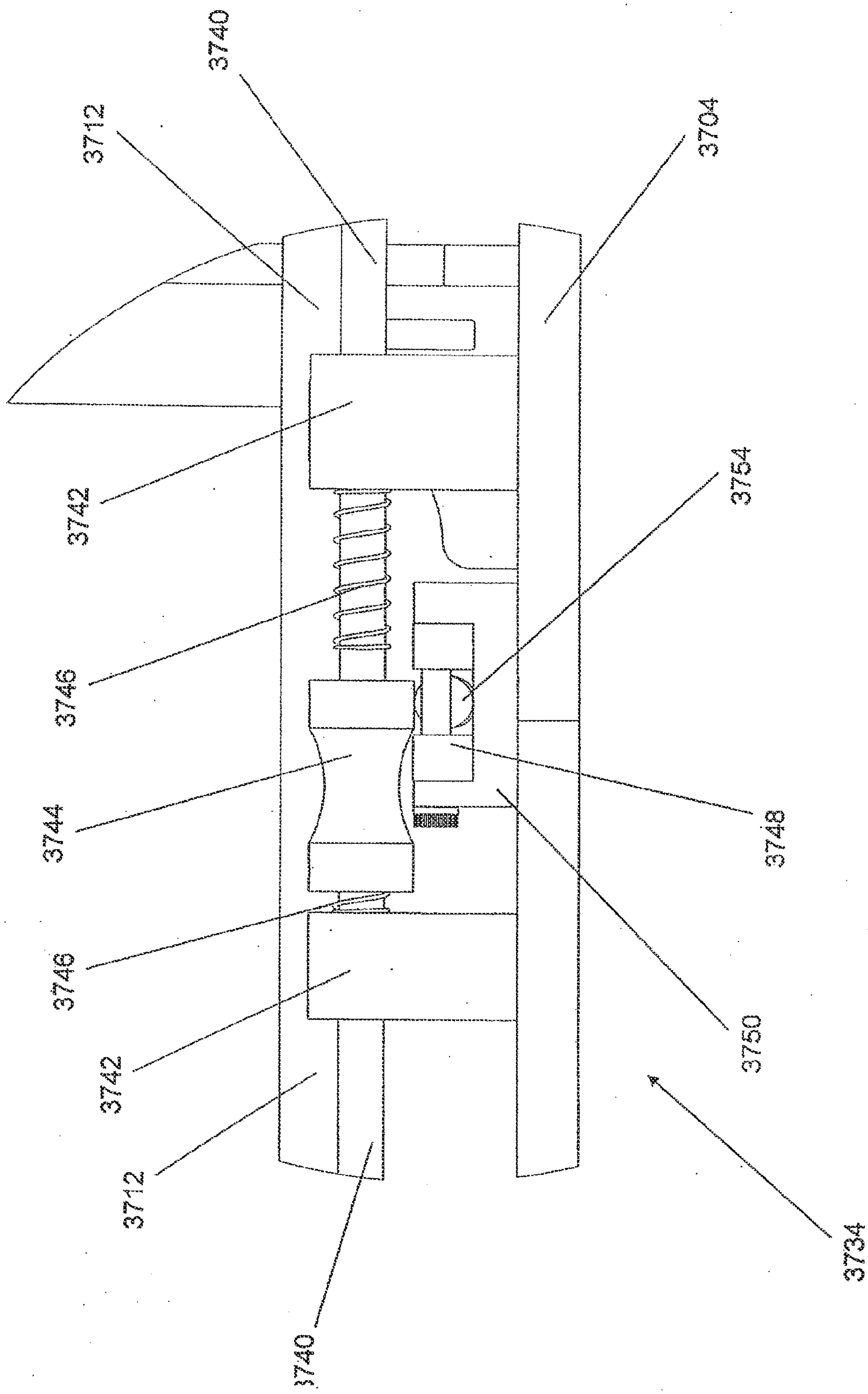

FIG. 37I shows a side view of a braking mechanism in a deactivated position in accordance with aspects of the invention.

Figure 37J:
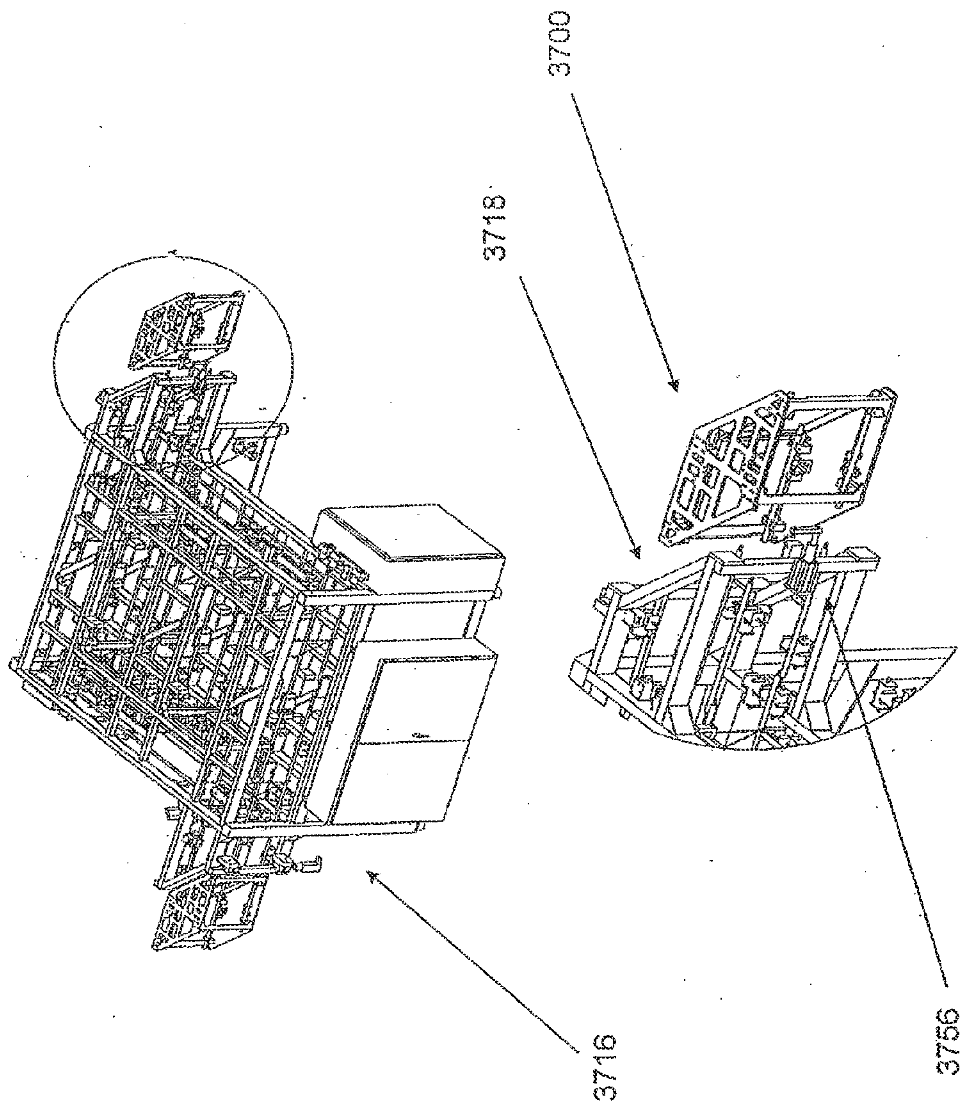

FIG. 37J shows perspective views of a machine receiving a shuttle for shuttle clamping in accordance with aspects of the invention.

Figure 37K:
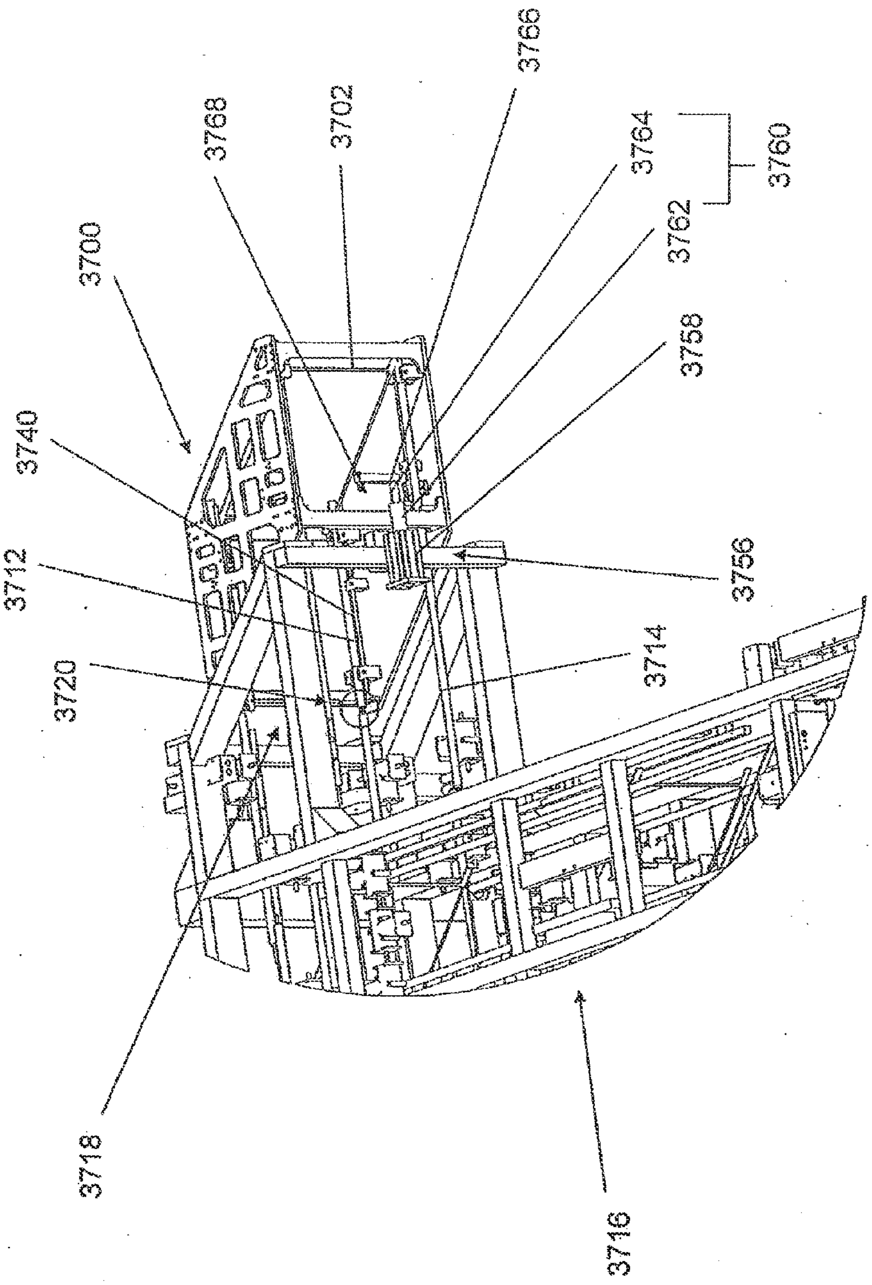

FIG. 37K shows a perspective view of a swing clamp mechanism disengaged from a shuttle in accordance with aspects of the invention.

Figure 37L:
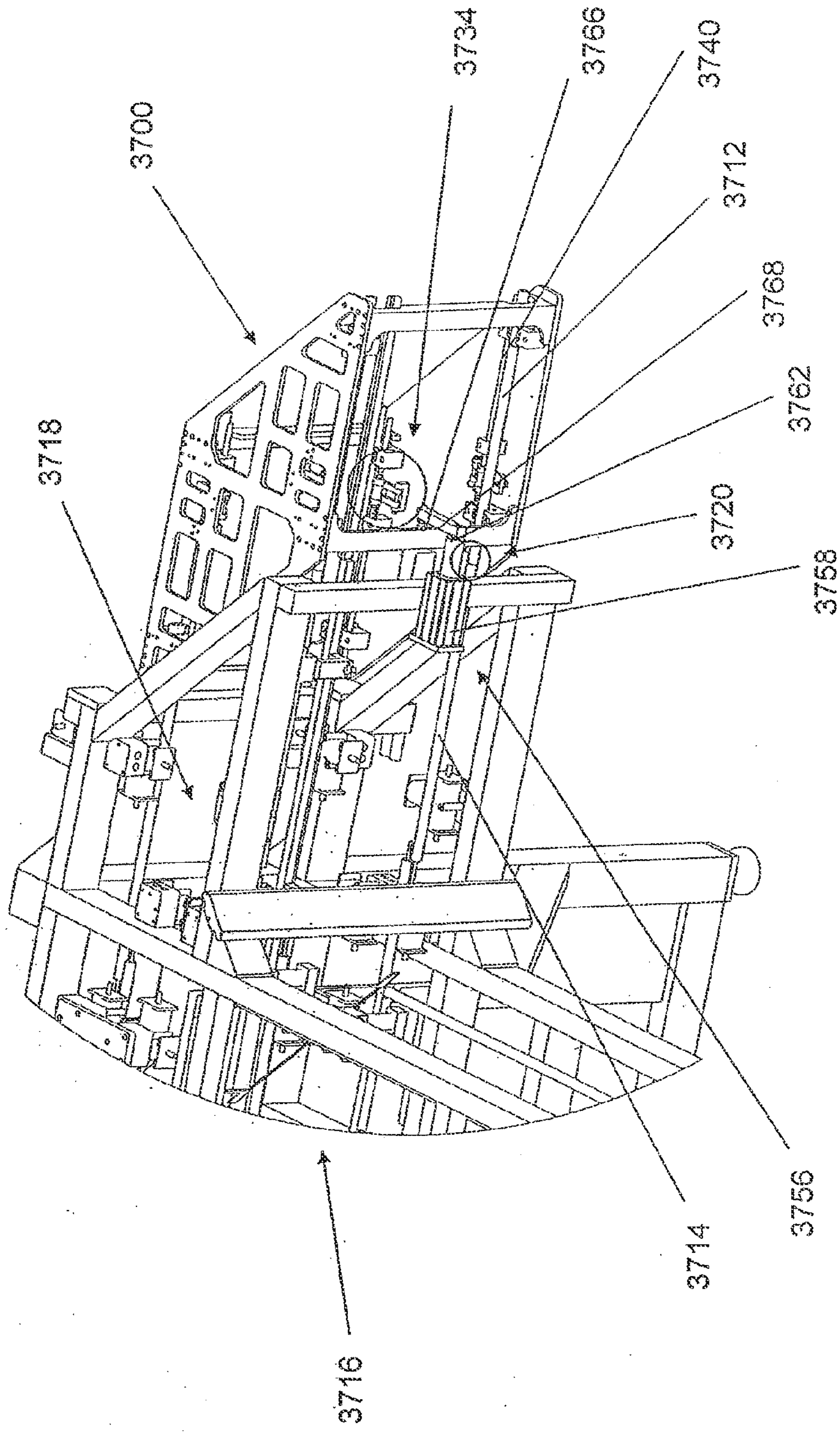

FIG. 37L shows a perspective view of a swing clamp mechanism in engagement with a shuttle in accordance with aspects of the invention.

Figure 38A:
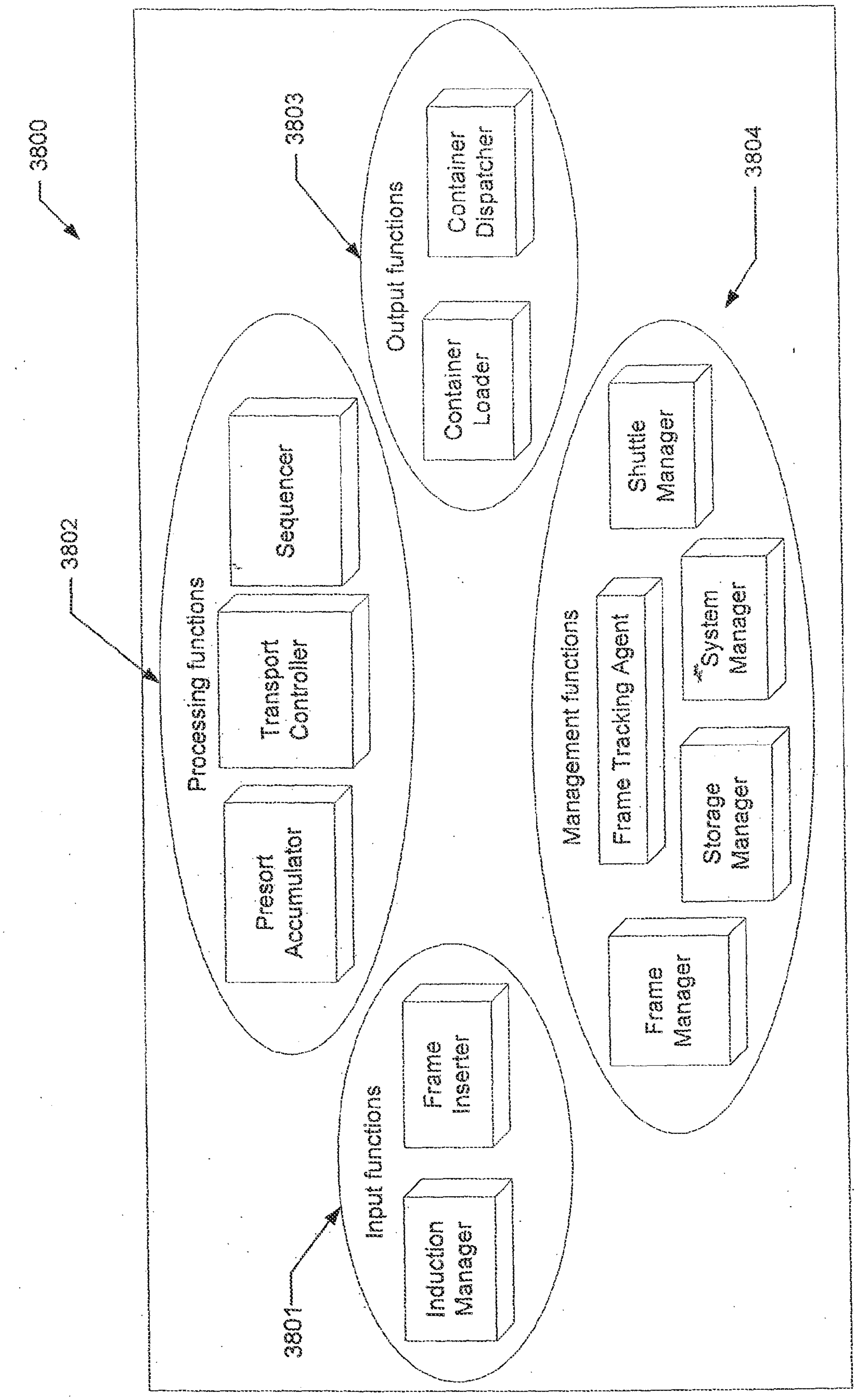

FIG. 38A shows an overall system configuration in accordance with aspects of the invention.

Figure 38B:
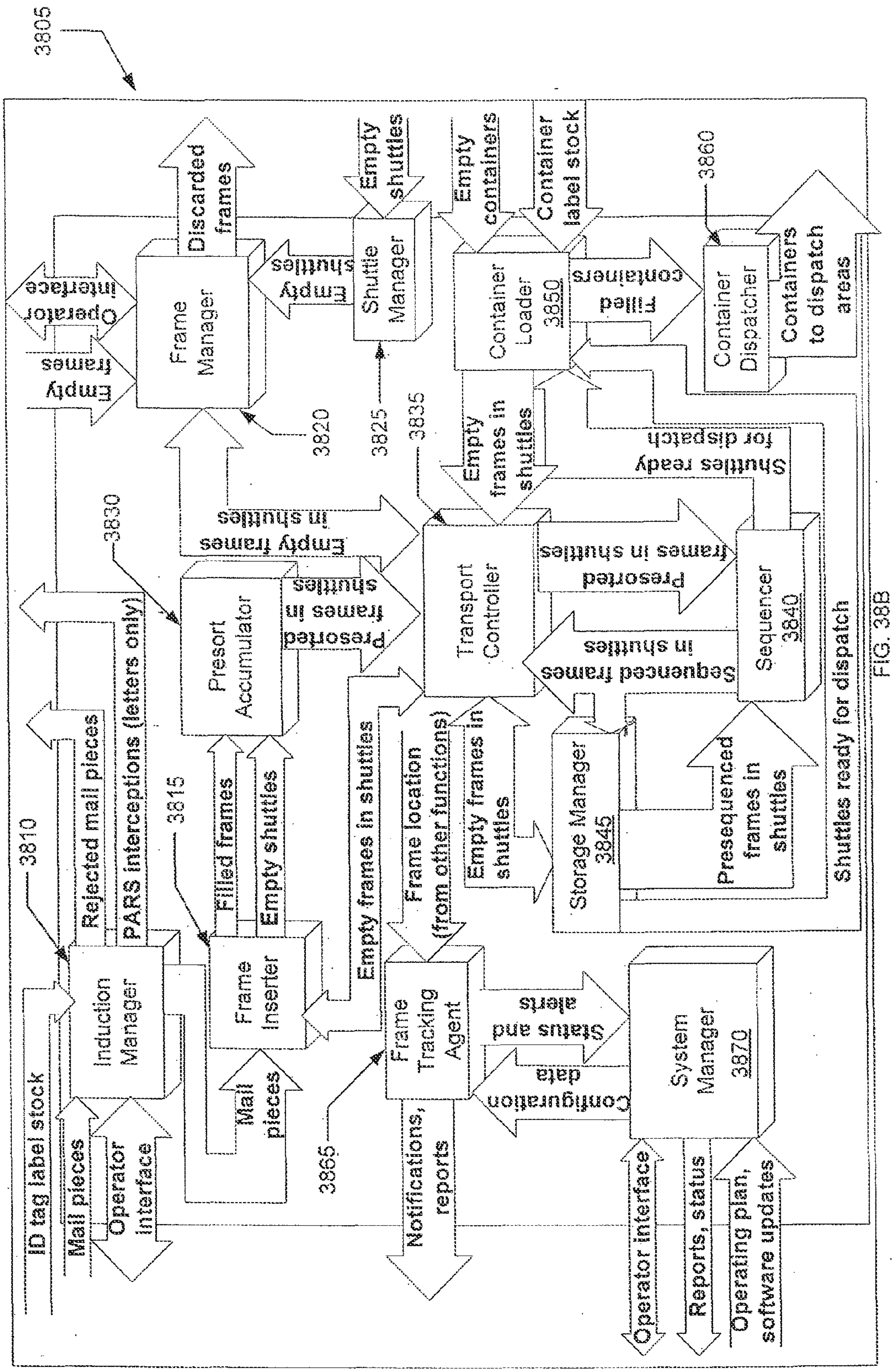

FIG. 38B shows a system logical architecture in accordance with aspects of the invention.

Figure 38C:
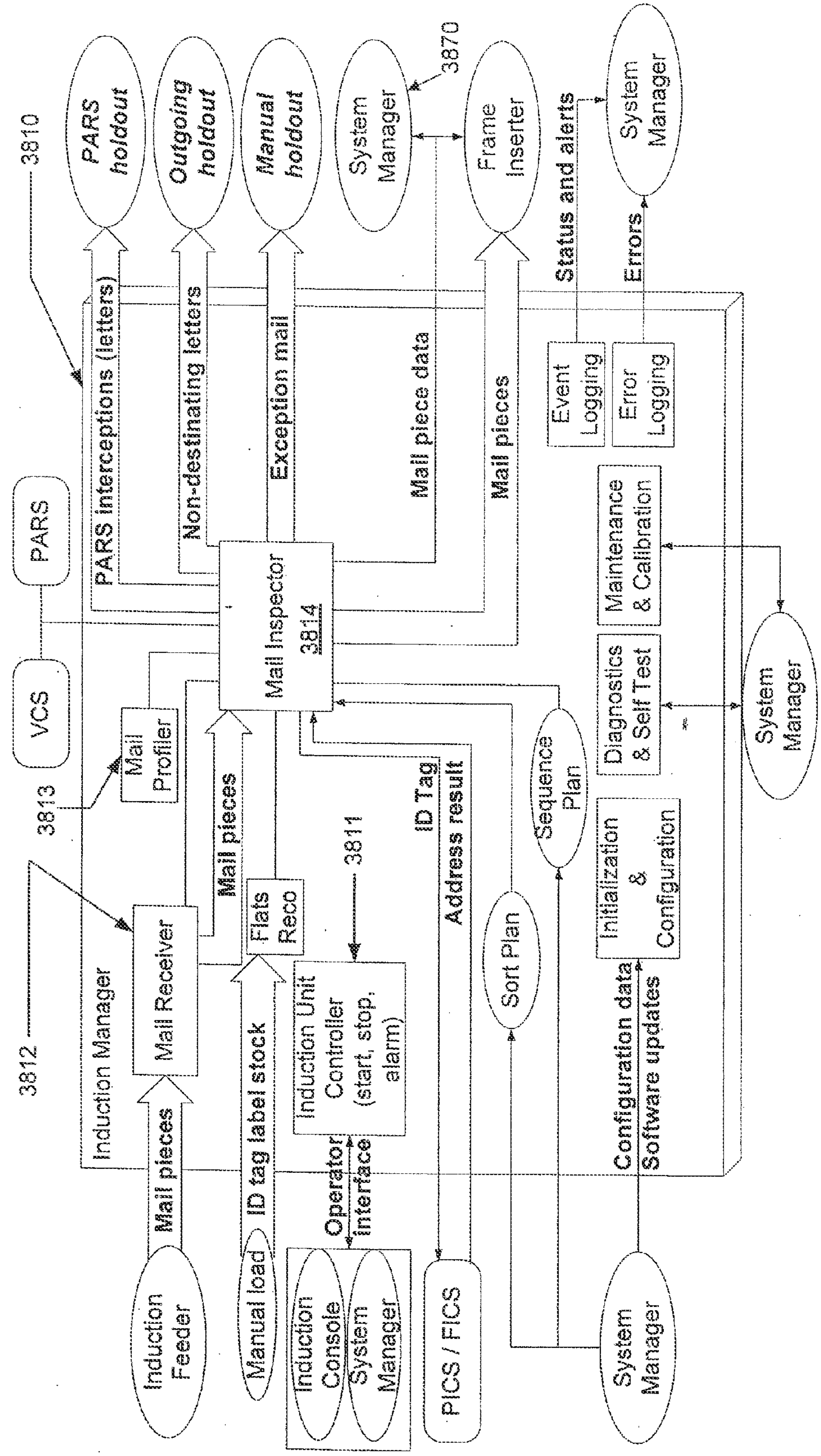

FIG. 38C shows an induction manager architecture in accordance with aspects of the invention.

Figure 38D:
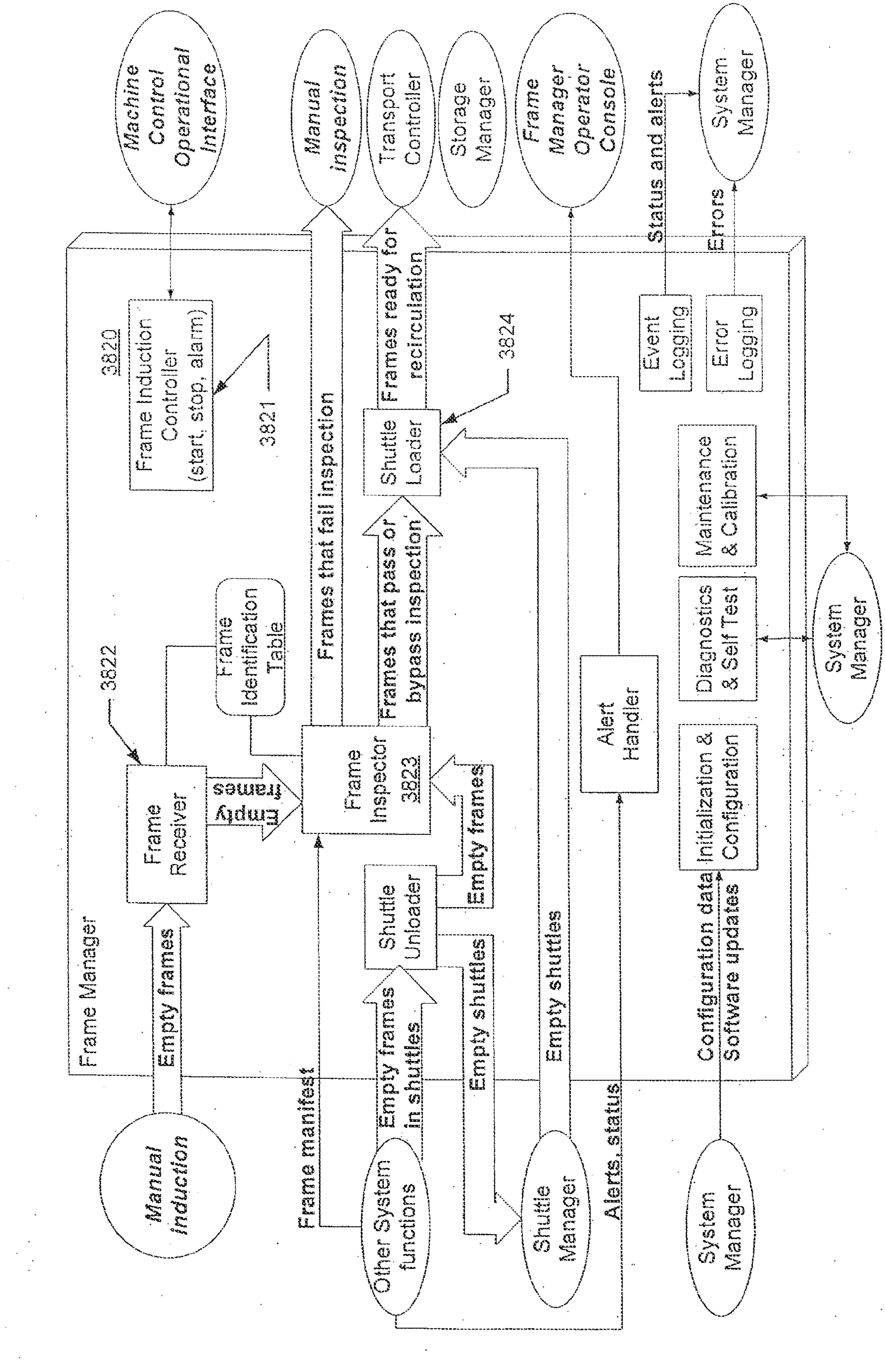

FIG. 38D shows a frame manager architecture in accordance with aspects of the invention.

Figure 38E:
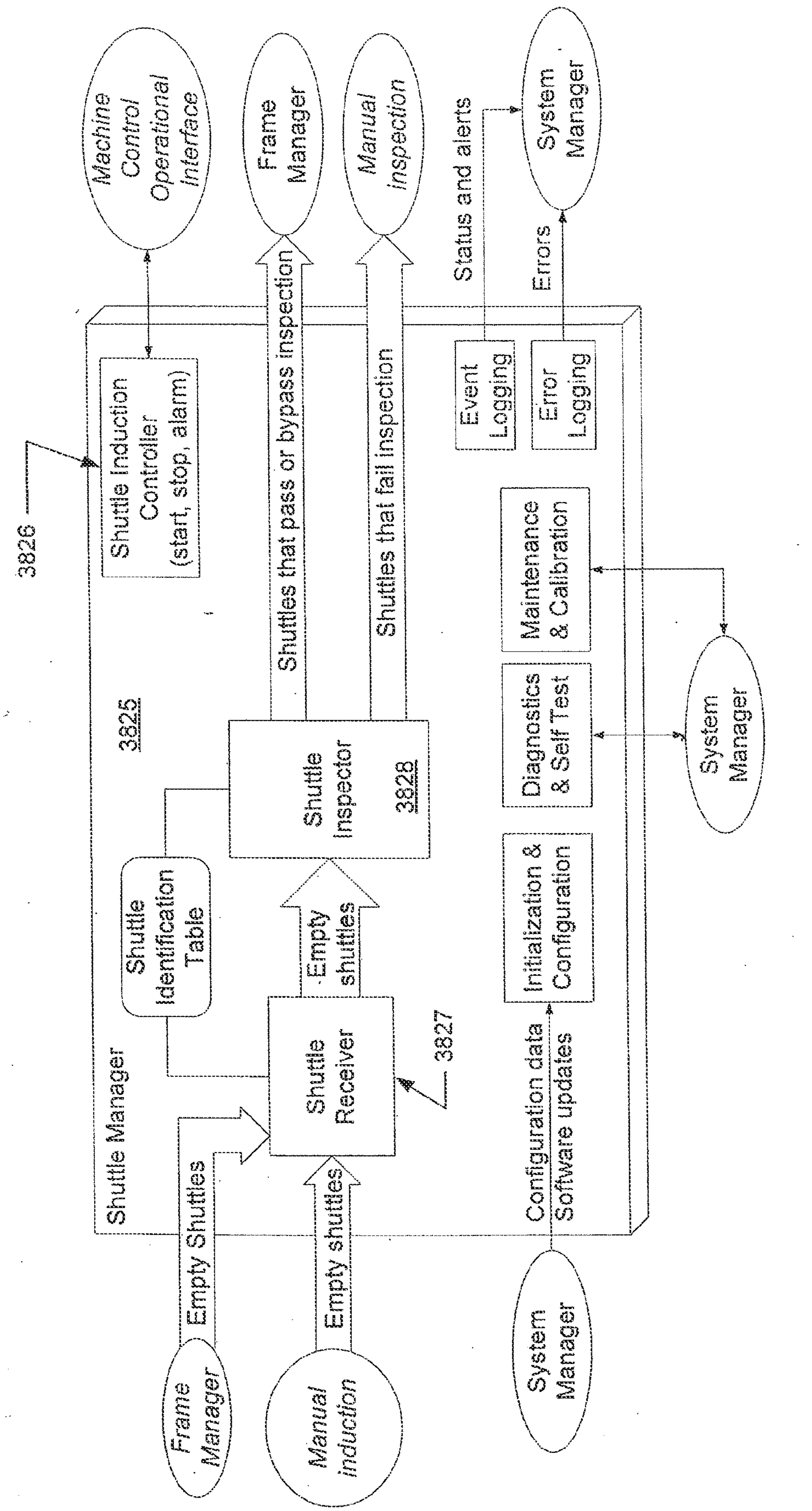

FIG. 38E shows a shuttle manager architecture in accordance with aspects of the invention.

Figure 38F:
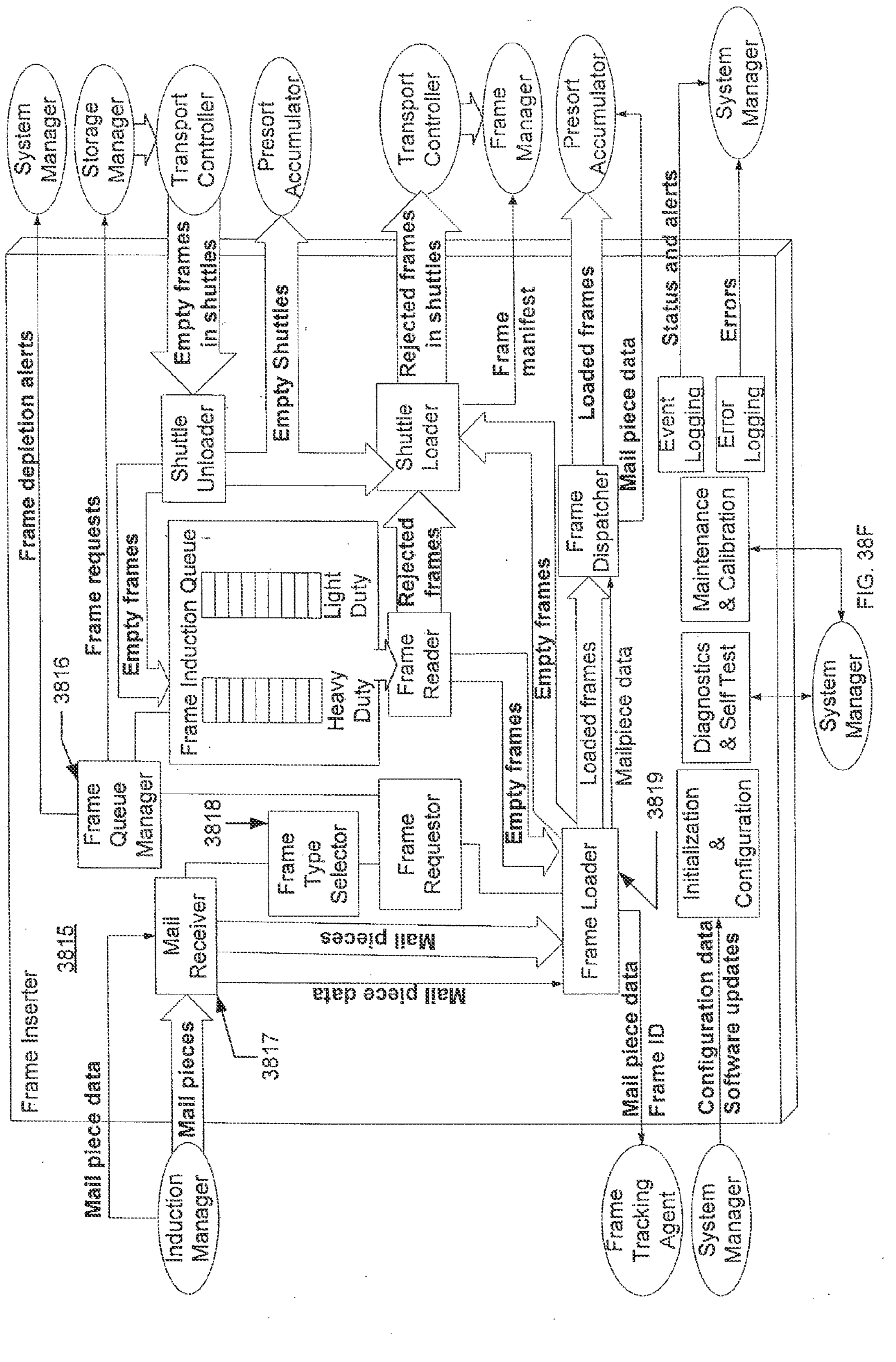

FIG. 38F shows a frame inserter architecture in accordance with aspects of the invention.

Figure 38G:
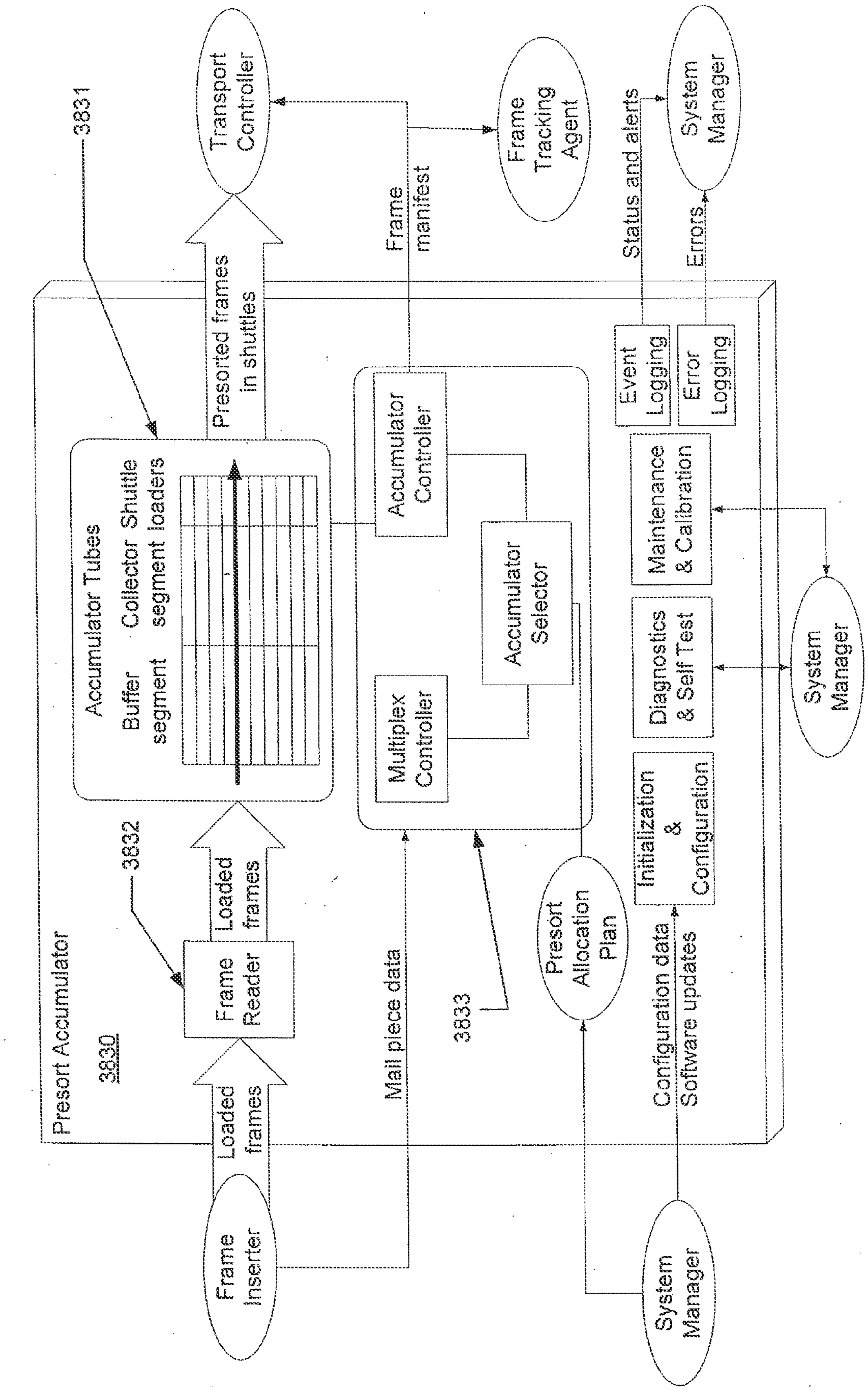

FIG. 38G shows a presort accumulator architecture in accordance with aspects of the invention.

Figure 38H:
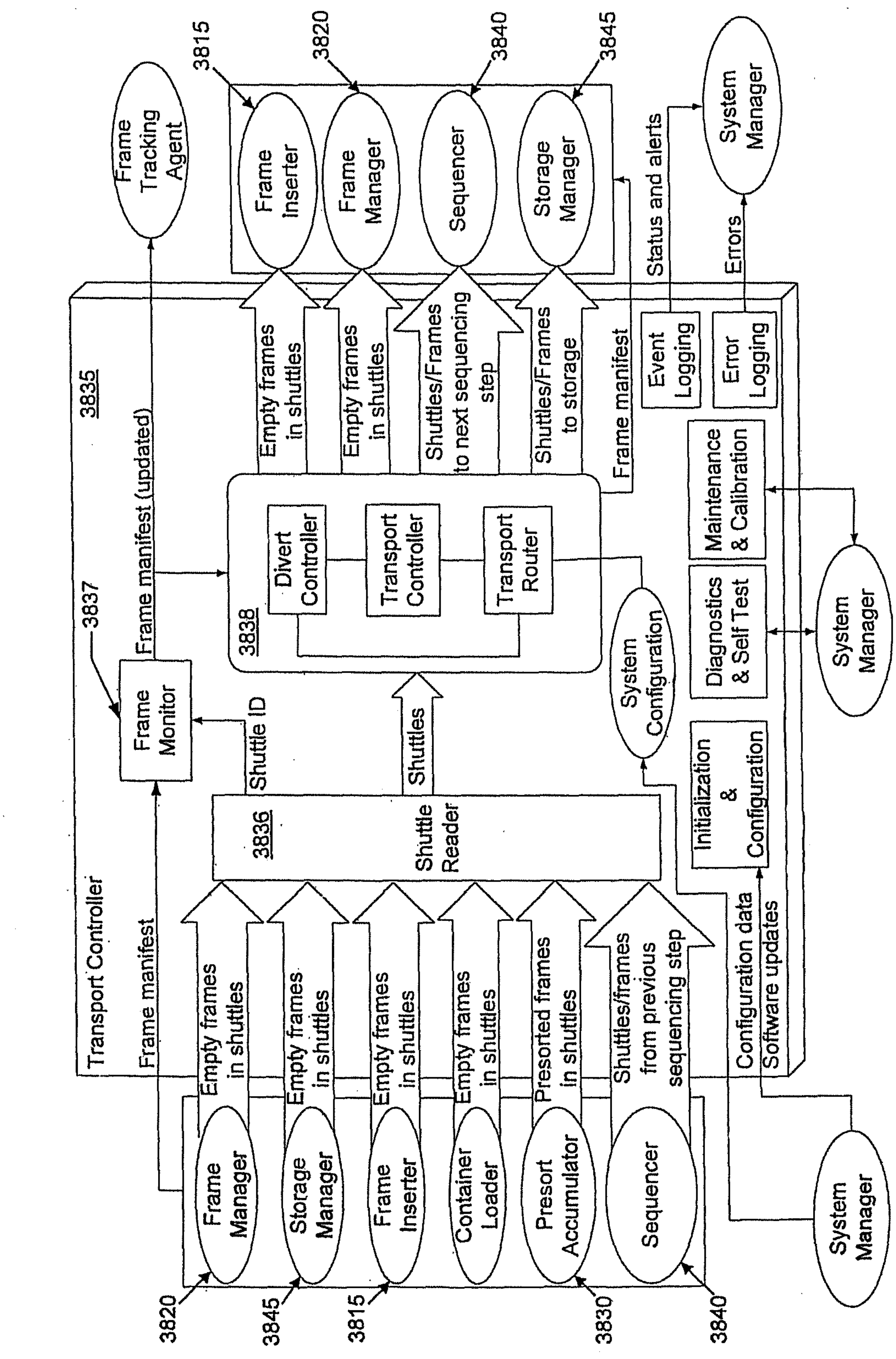

FIG. 38H shows a transport controller architecture in accordance with aspects of the invention.

Figure 38I:
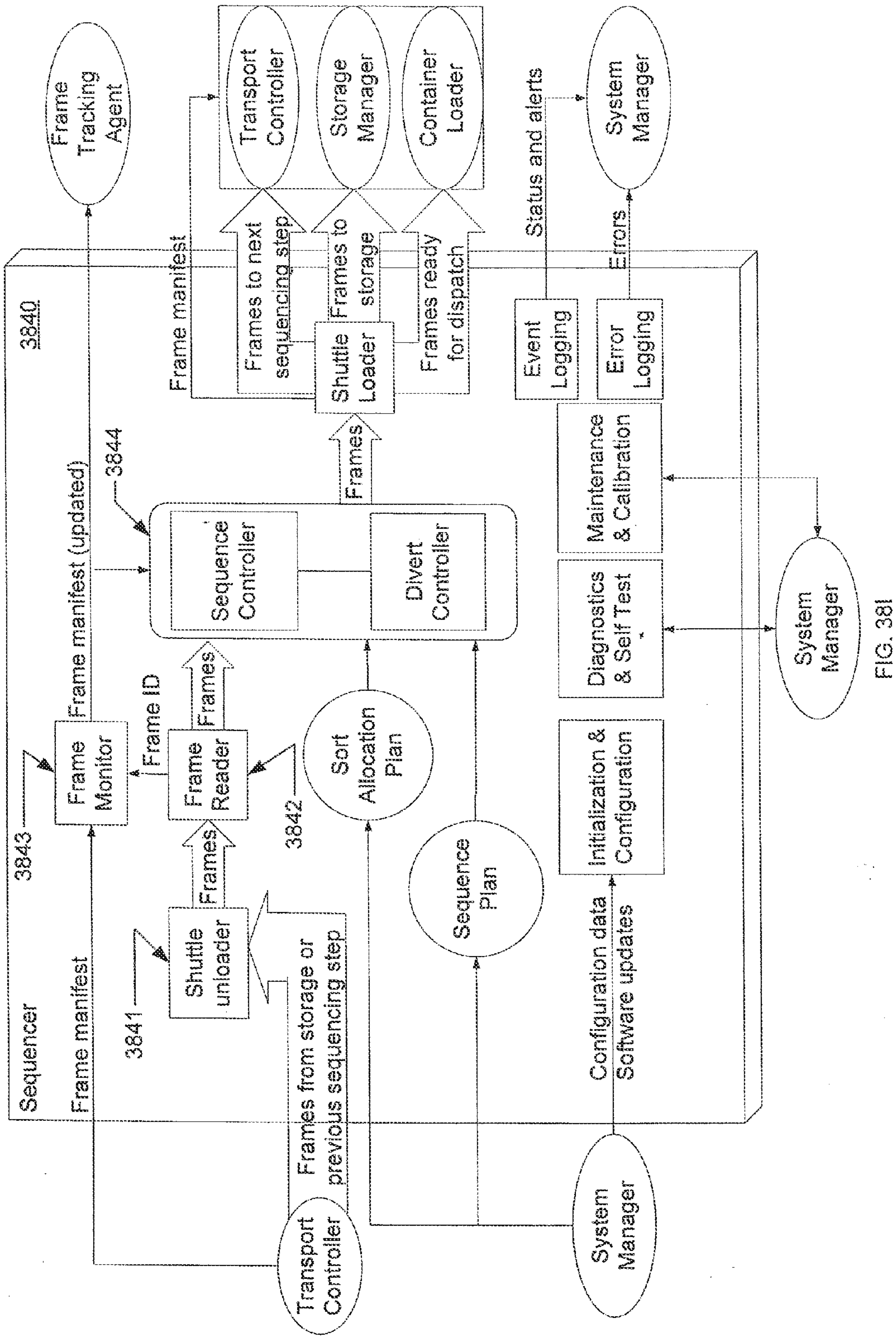

FIG. 38I shows a sequencer architecture in accordance with aspects of the invention.

Figure 38J:
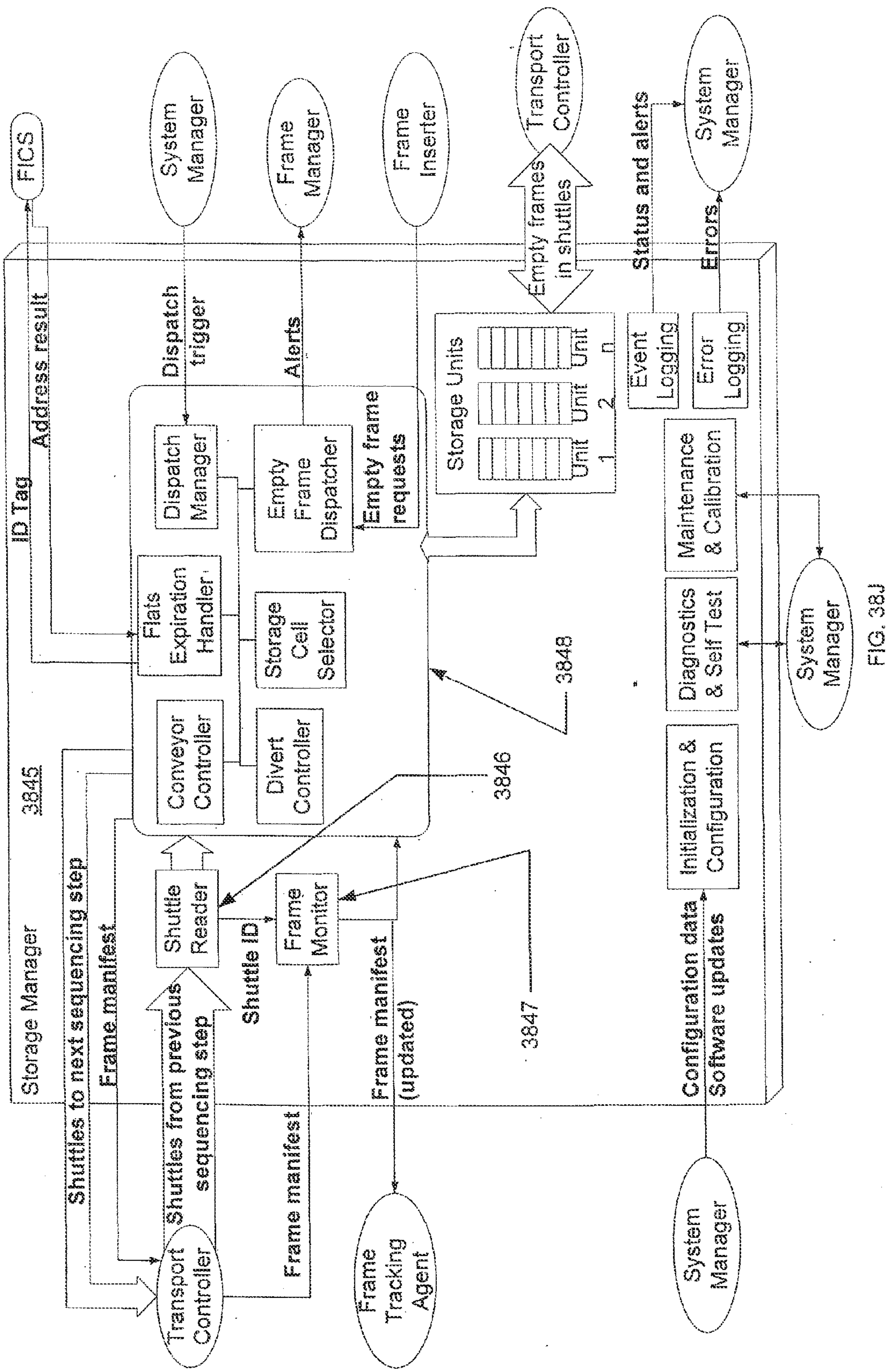

FIG. 38J shows a storage manager architecture in accordance with aspects of the invention.

Figure 38K:
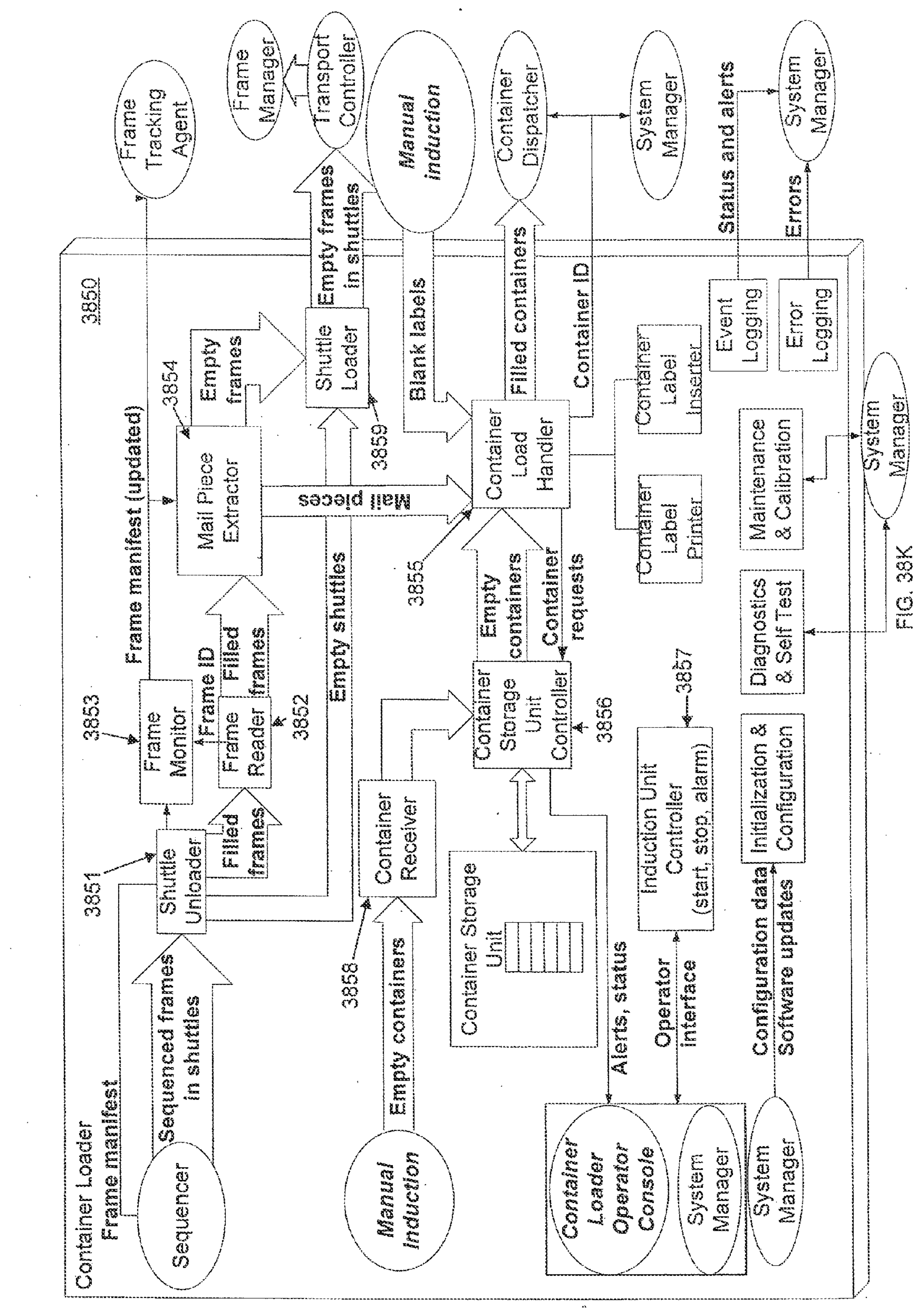

FIG. 38K shows a container loader architecture in accordance with aspects of the invention.

Figure 38L:
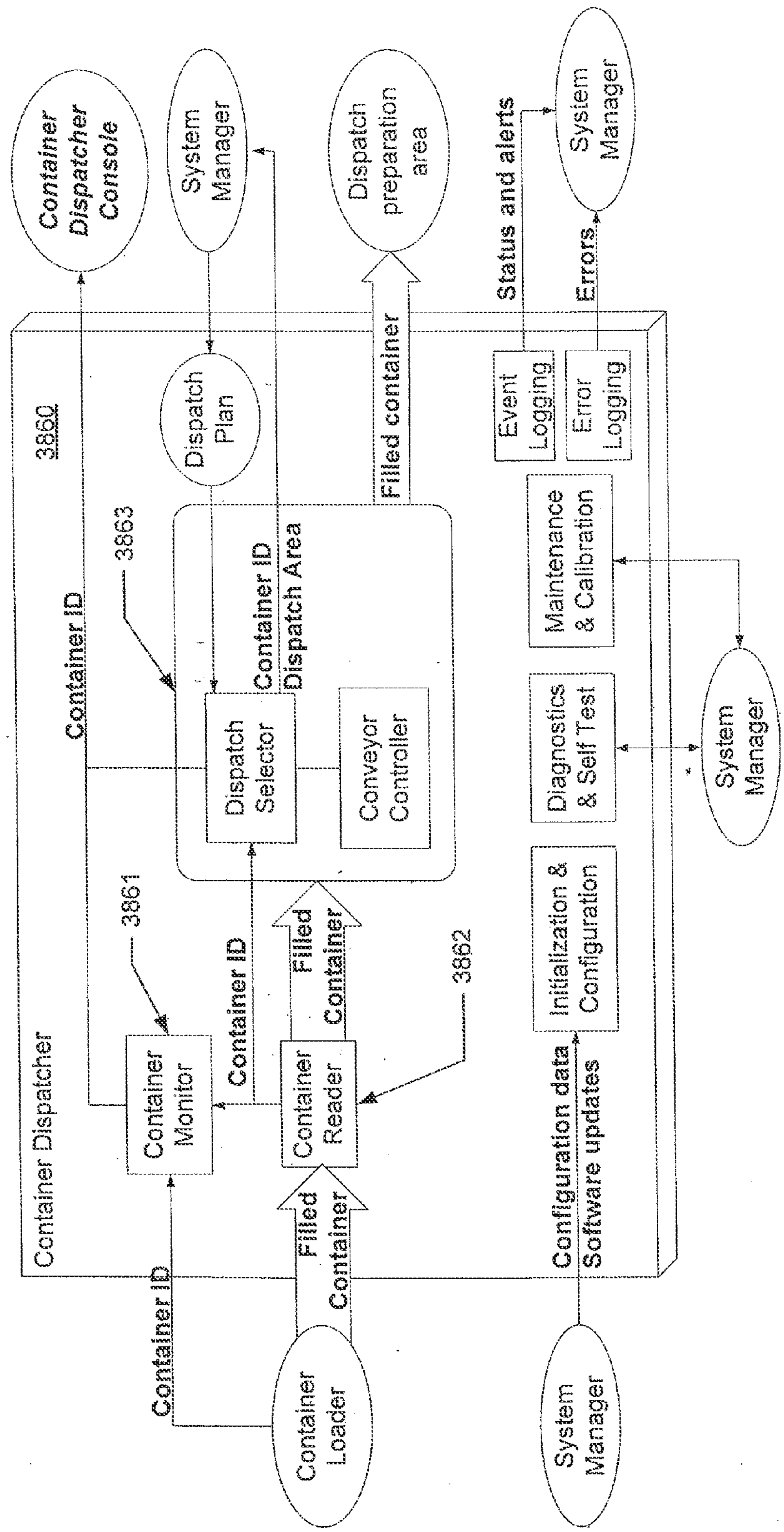

FIG. 38L shows a container dispatcher architecture in accordance with aspects of the invention.

Figure 38M:
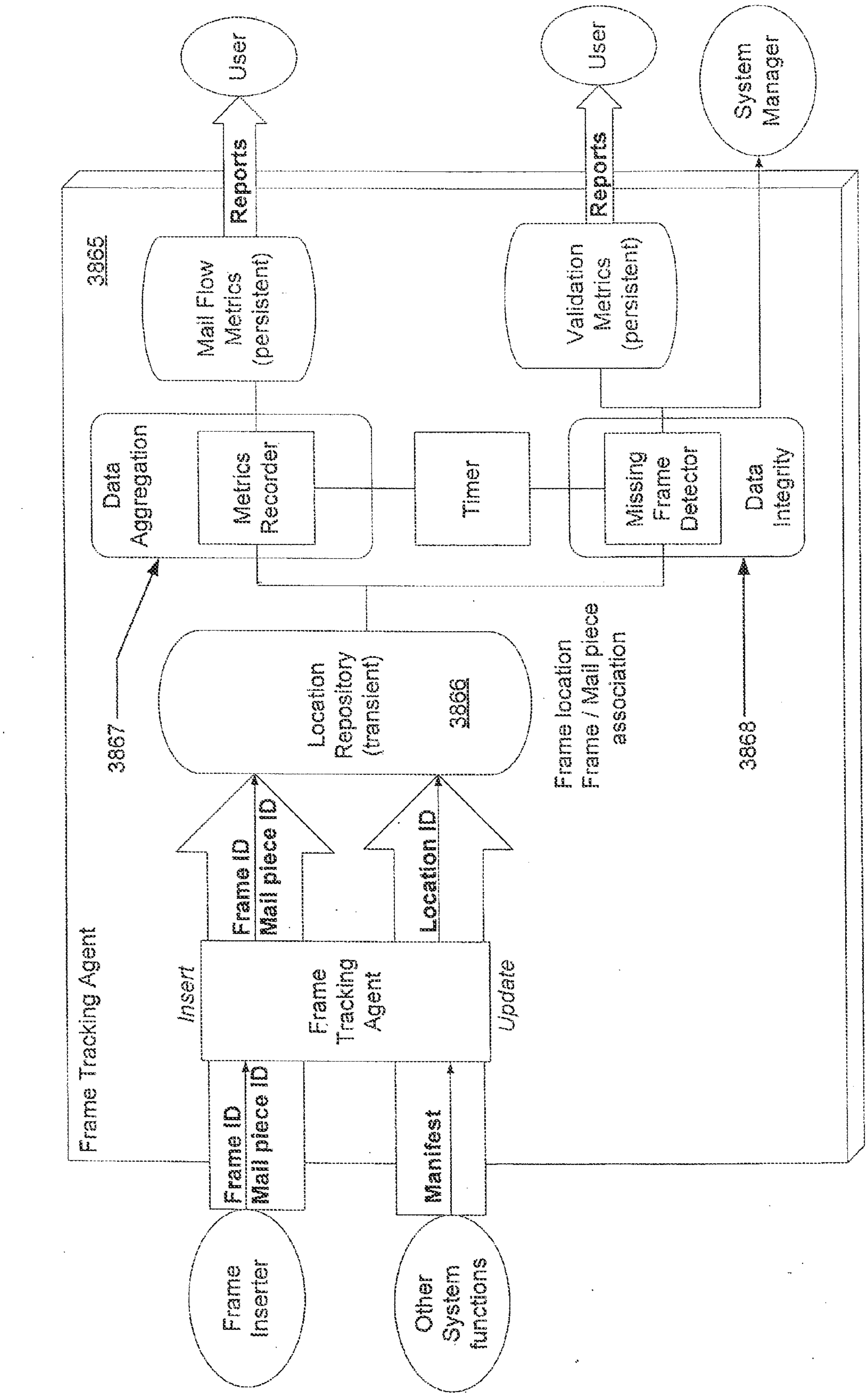

FIG. 38M shows a frame tracking agent architecture in accordance with aspects of the invention.

Figure 39:
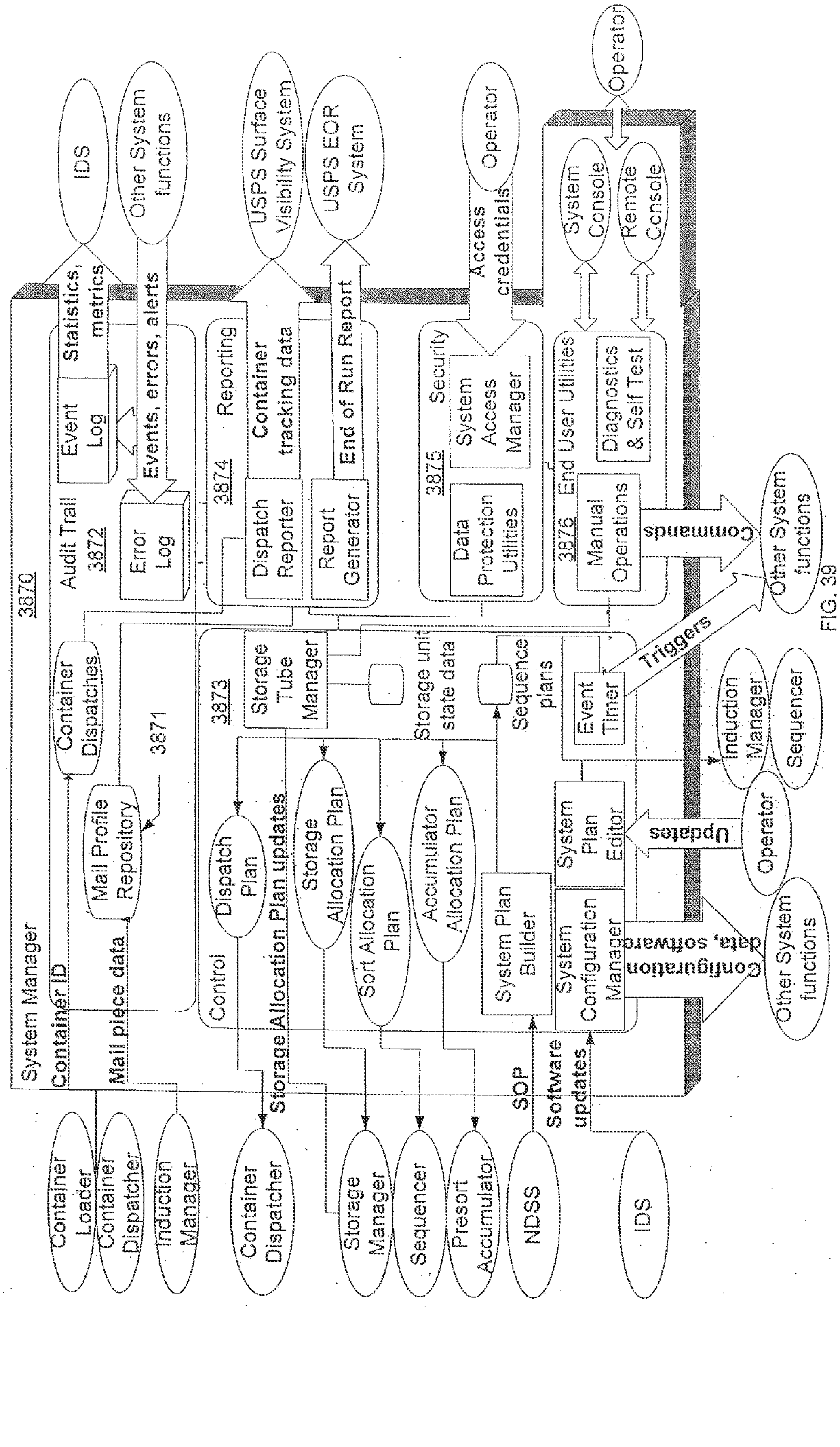

FIG. 39 shows a system manager architecture in accordance with aspects of the invention.

Figure 40A:
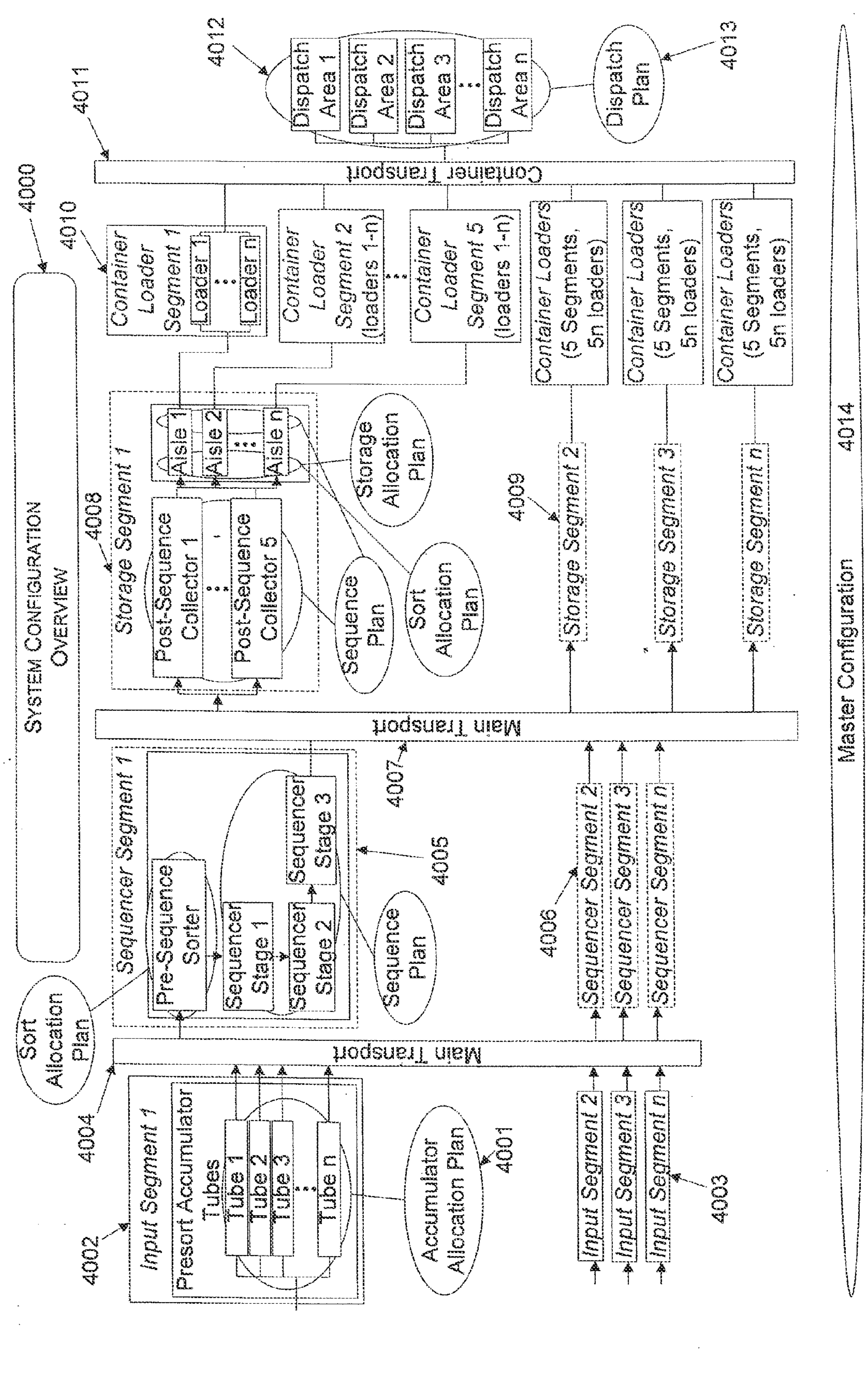

FIG. 40A shows a system configuration in accordance with aspects of the invention.

Figure 40B:
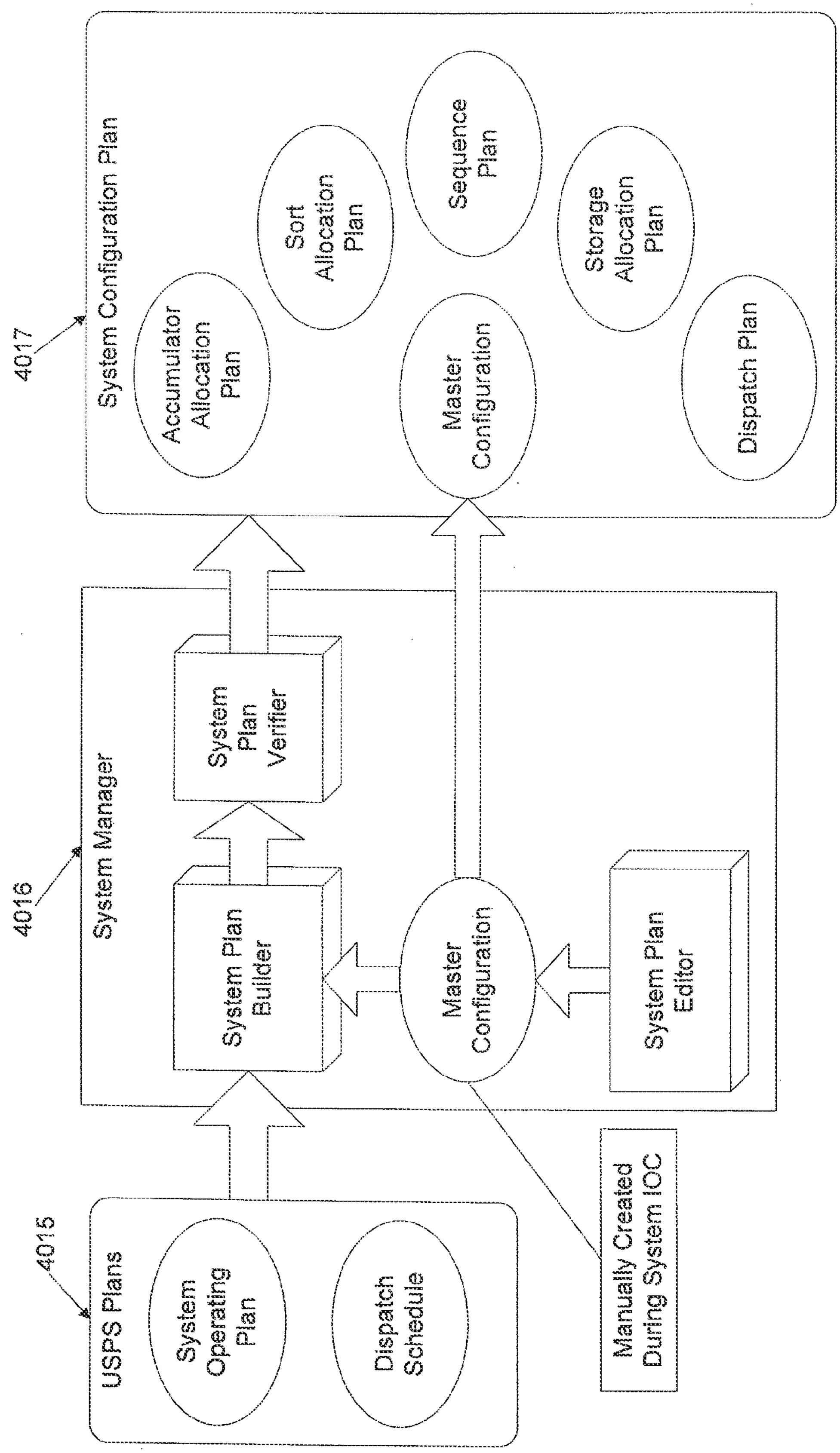

FIG. 40B shows a configuration plan build in accordance with aspects of the invention.

Figure 40C:
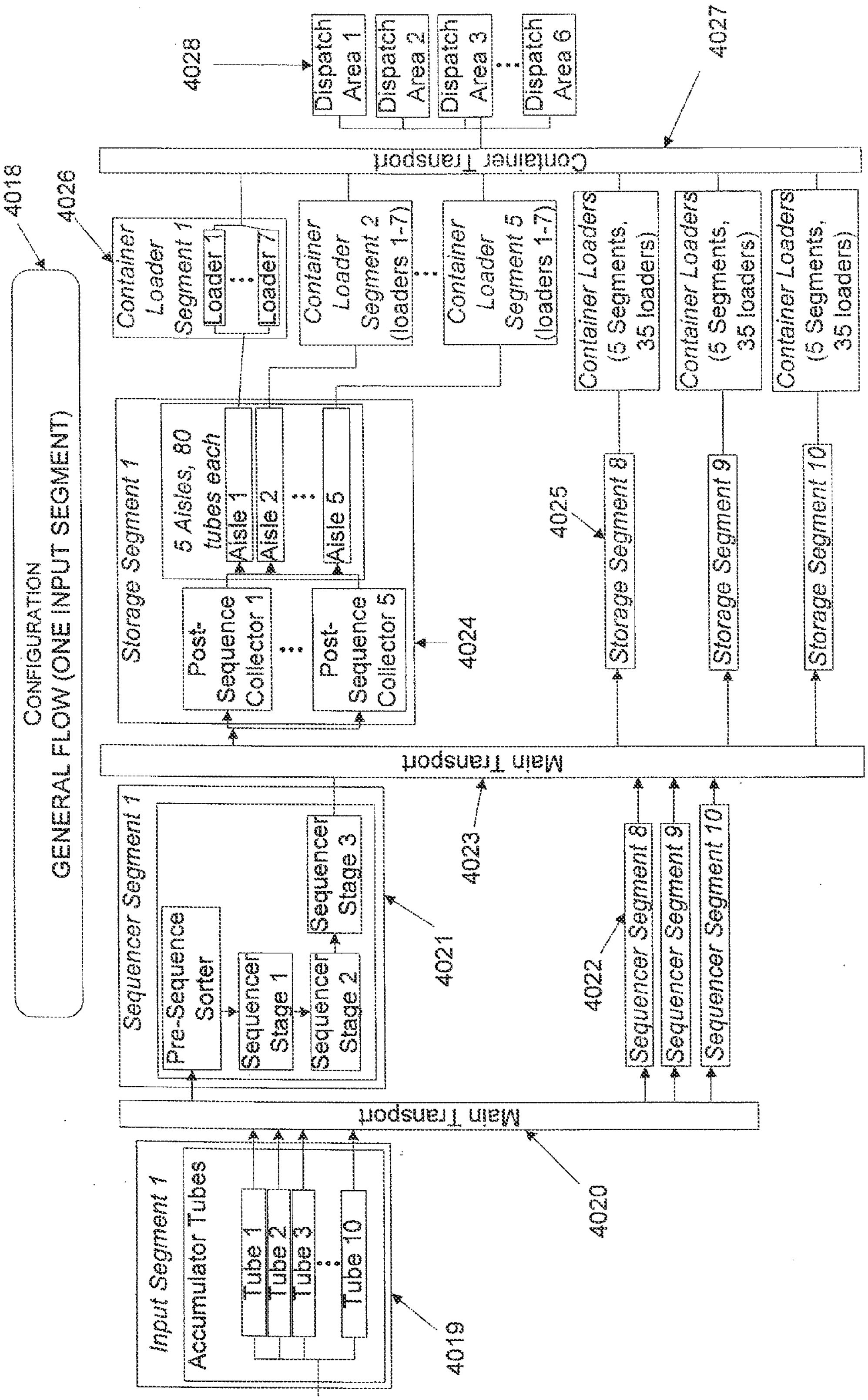

FIG. 40C shows a system configuration for an input segment in accordance with aspects of the invention.

Figure 40D:
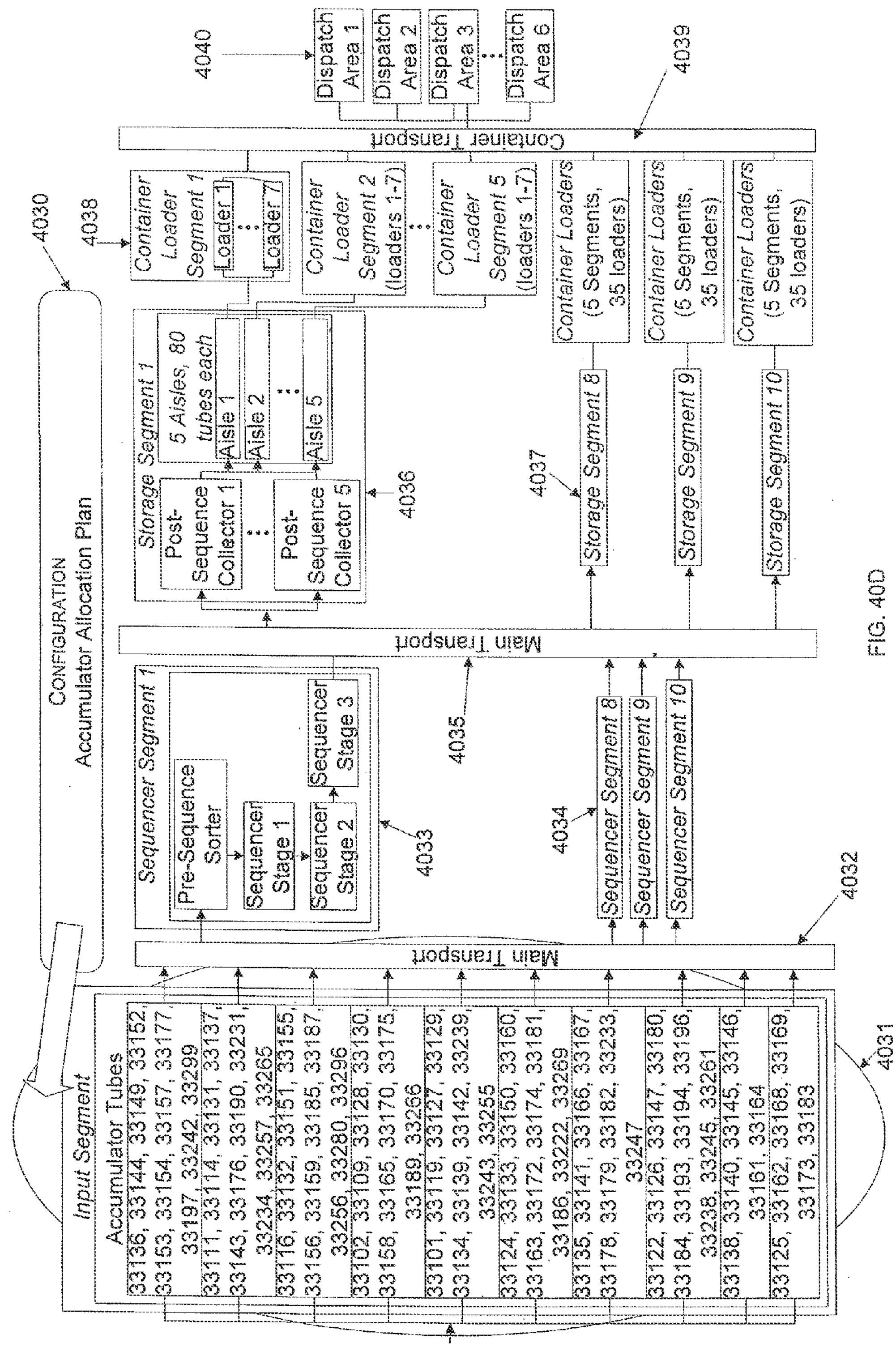

FIG. 40D shows a system configuration with an accumulator allocation plan in accordance with aspects of the invention.

Figure 40E:
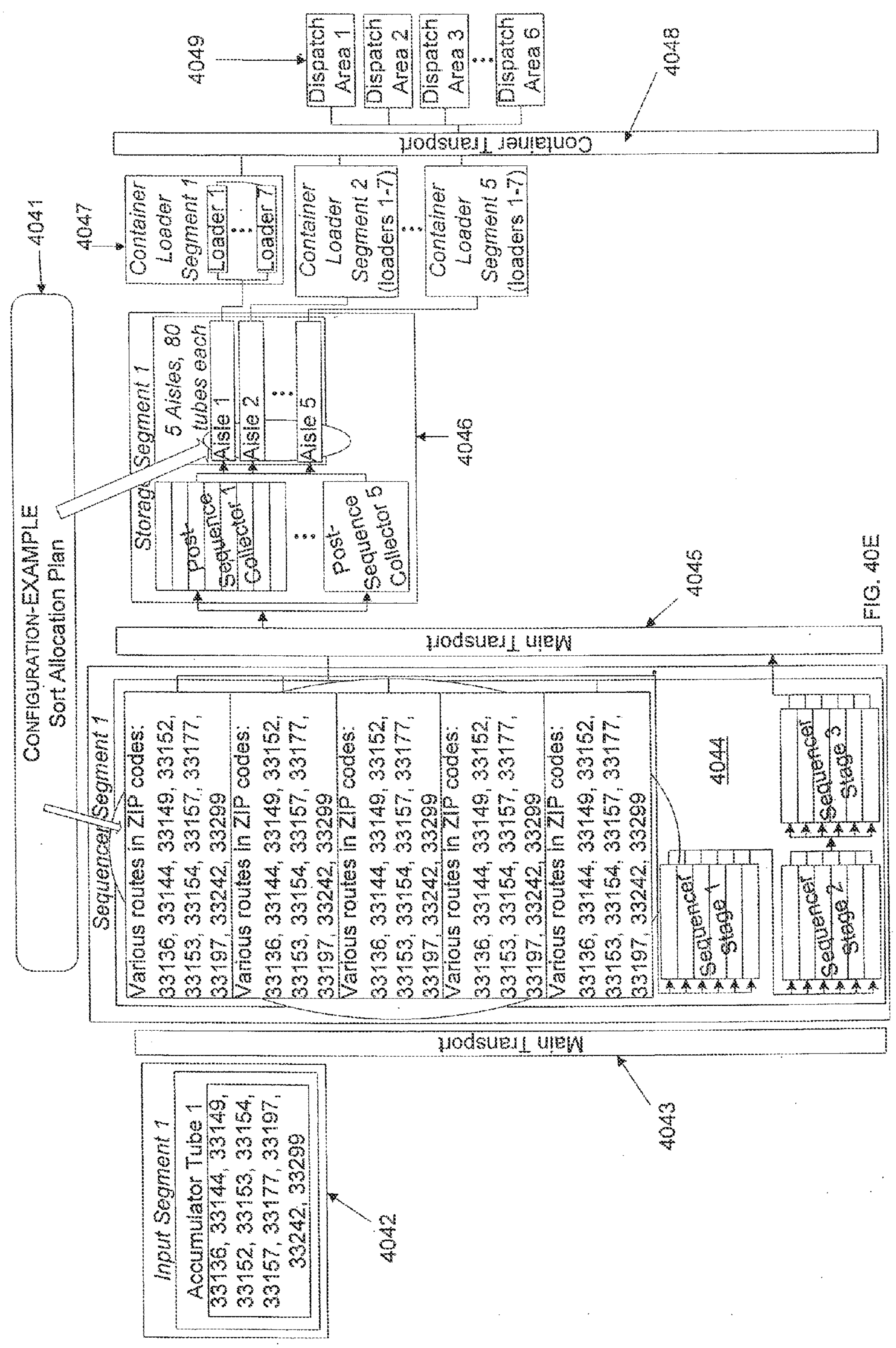

FIG. 40E shows a system configuration with a sort allocation plan in accordance with aspects of the invention.

Figure 40F:
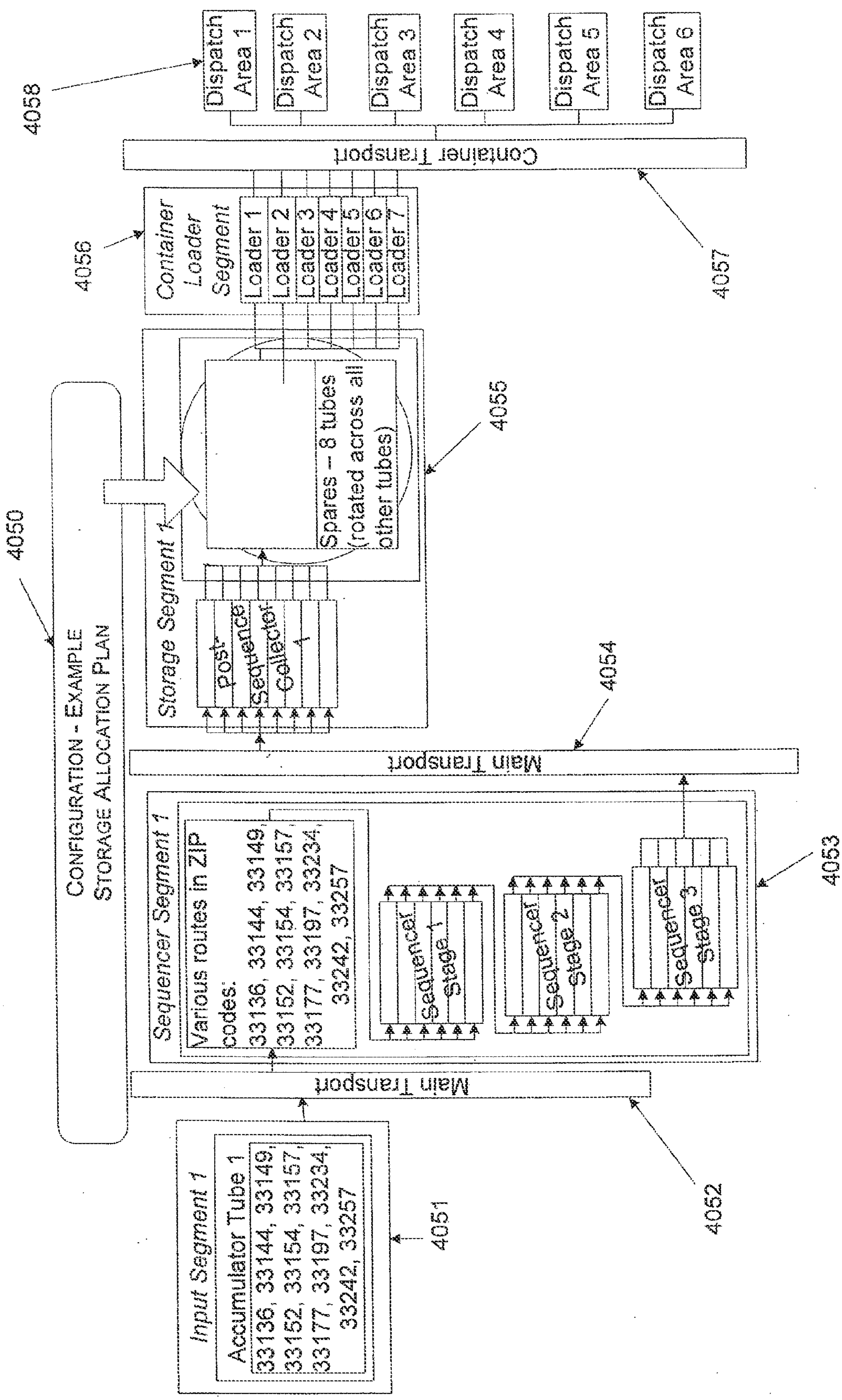

FIG. 40F shows a system configuration with a storage allocation plan in accordance with aspects of the invention.

Figure 40G:
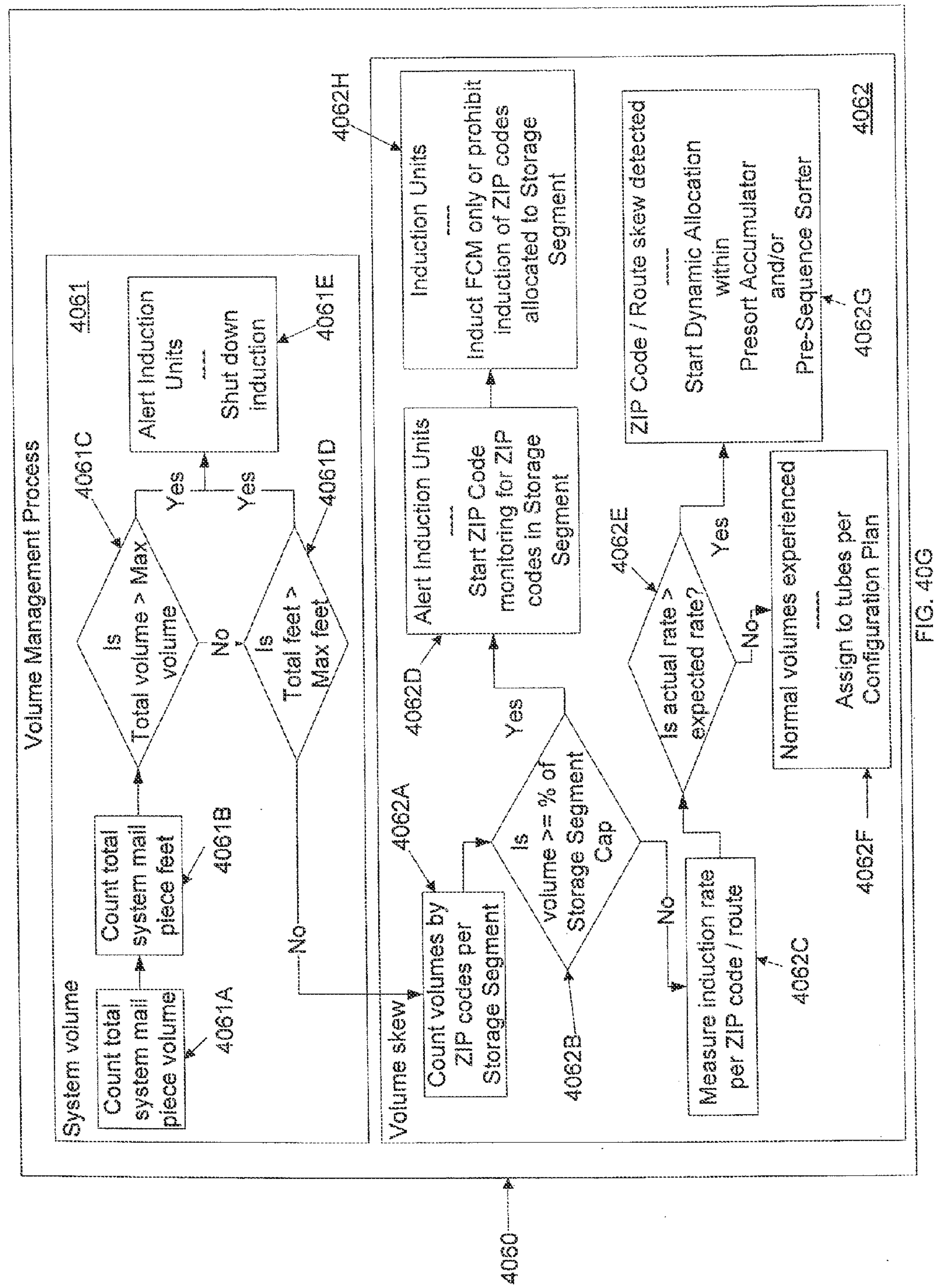

FIG. 40G shows a volume management process in accordance with aspects of the invention.

Figure 40H:
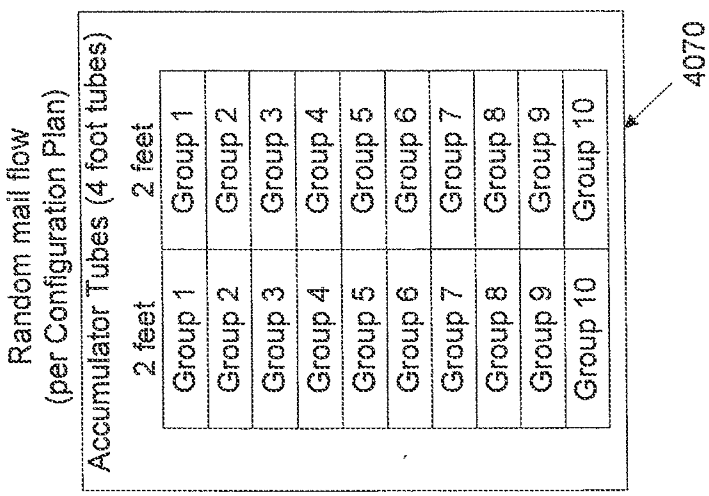
Figure 41:
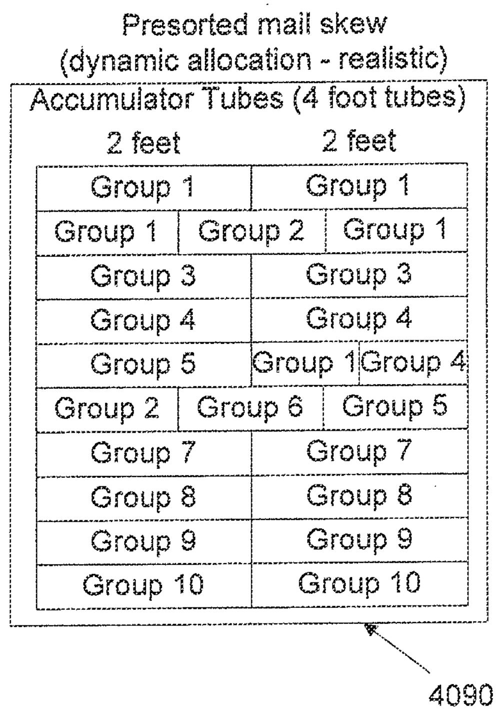

FIGS. 40H-41 show various dynamic allocation configurations in accordance with aspects of the invention.

Figure 42A:
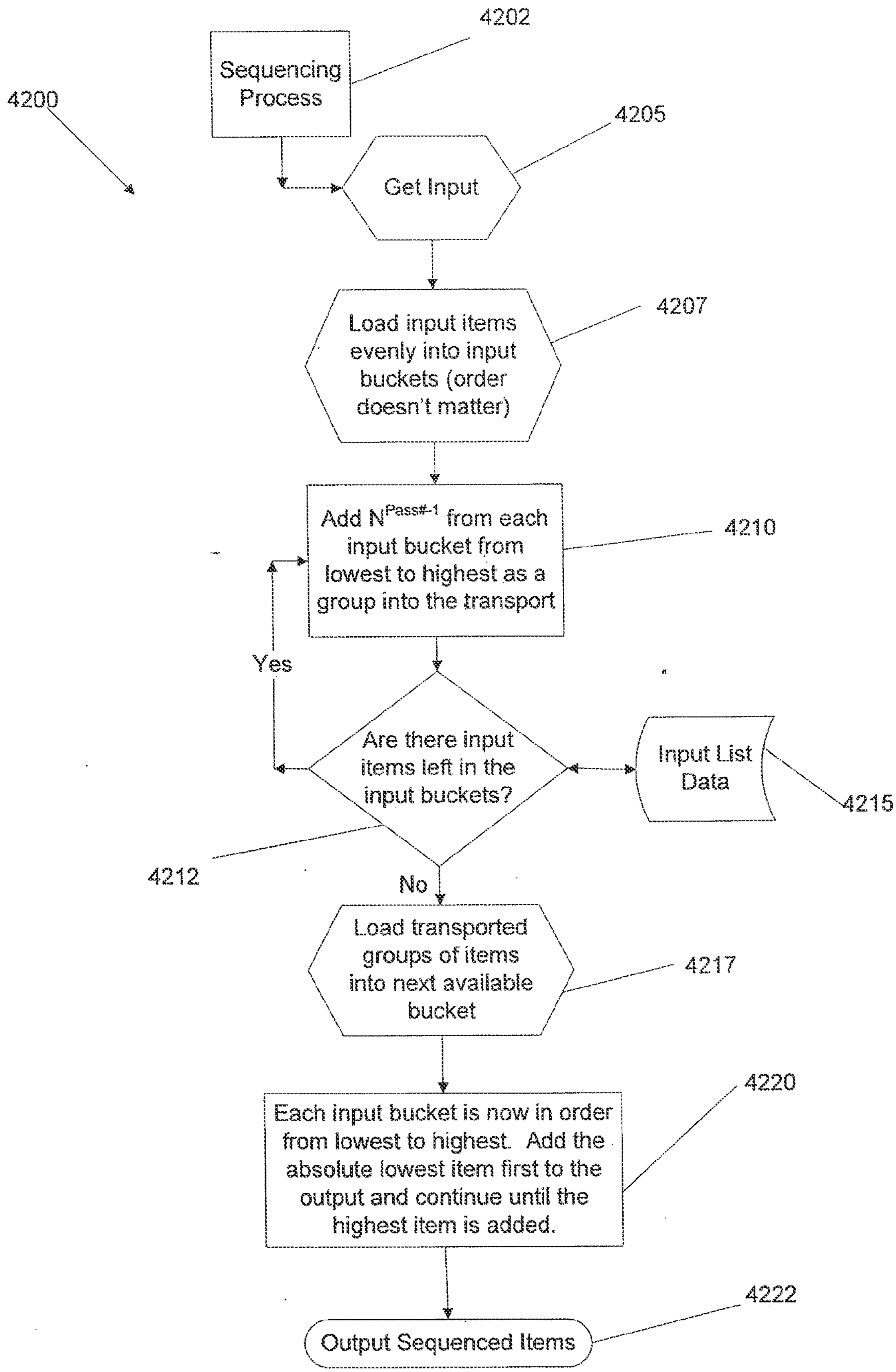

FIG. 42A shows an exemplary flow for performing an exemplary N×N sequencing/sorting process in accordance with aspects of the present invention.

Figure 42B:
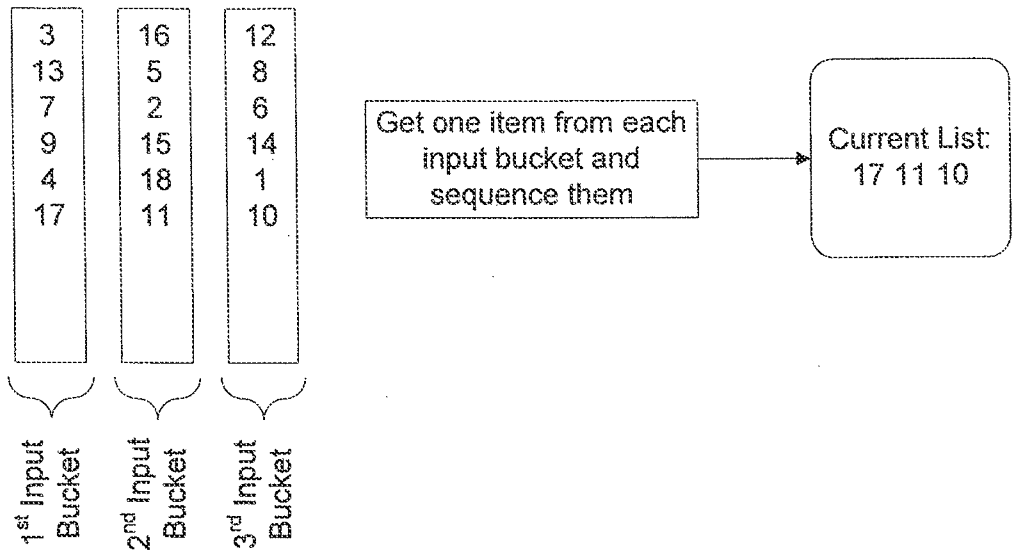
Figure 42C:
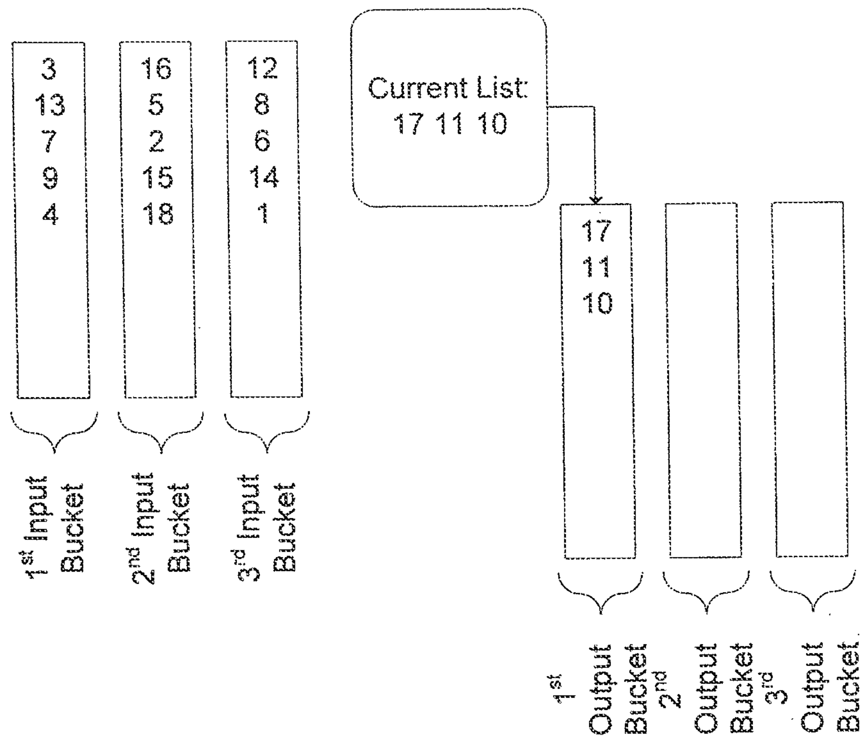
Figure 42D:
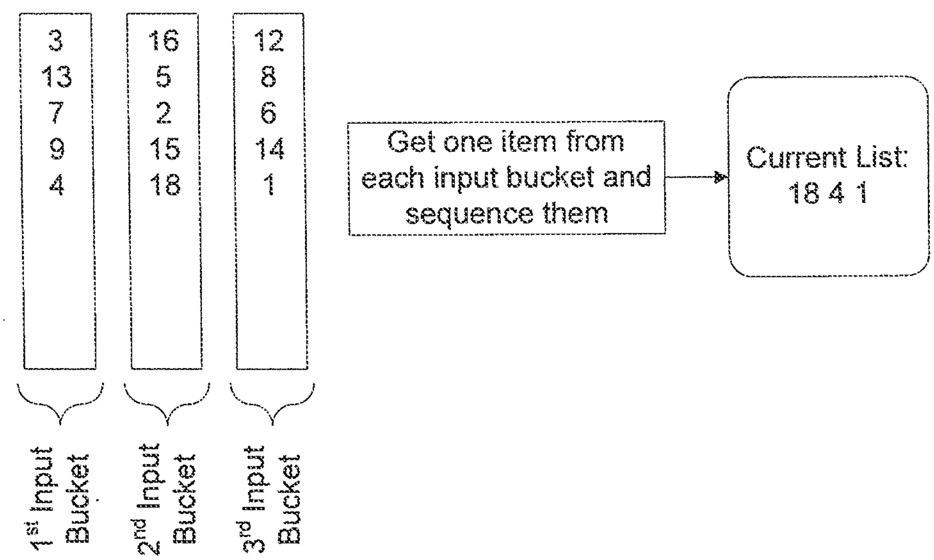
Figure 42E:
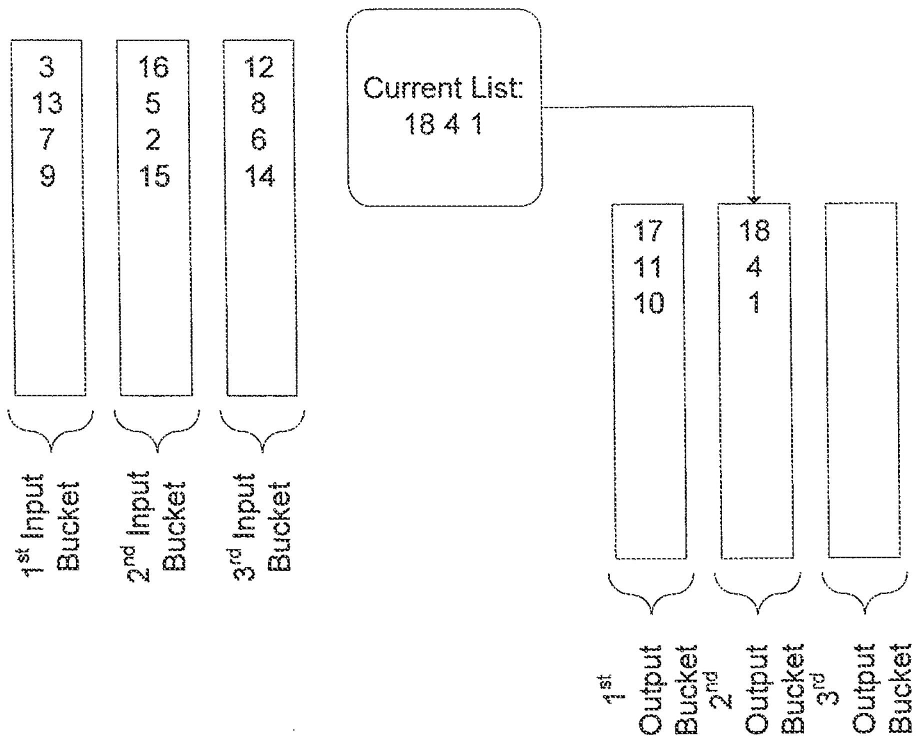
Figure 42F:
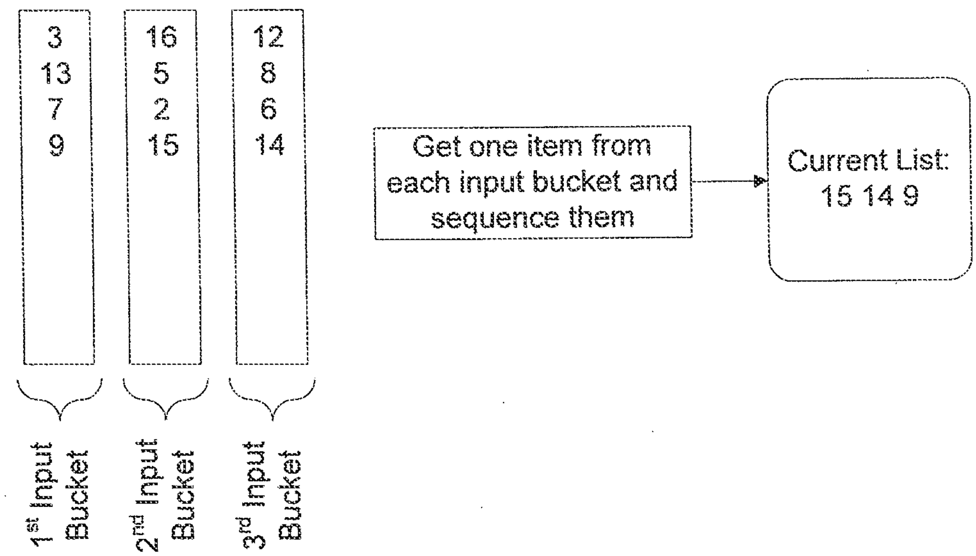
Figure 42G:
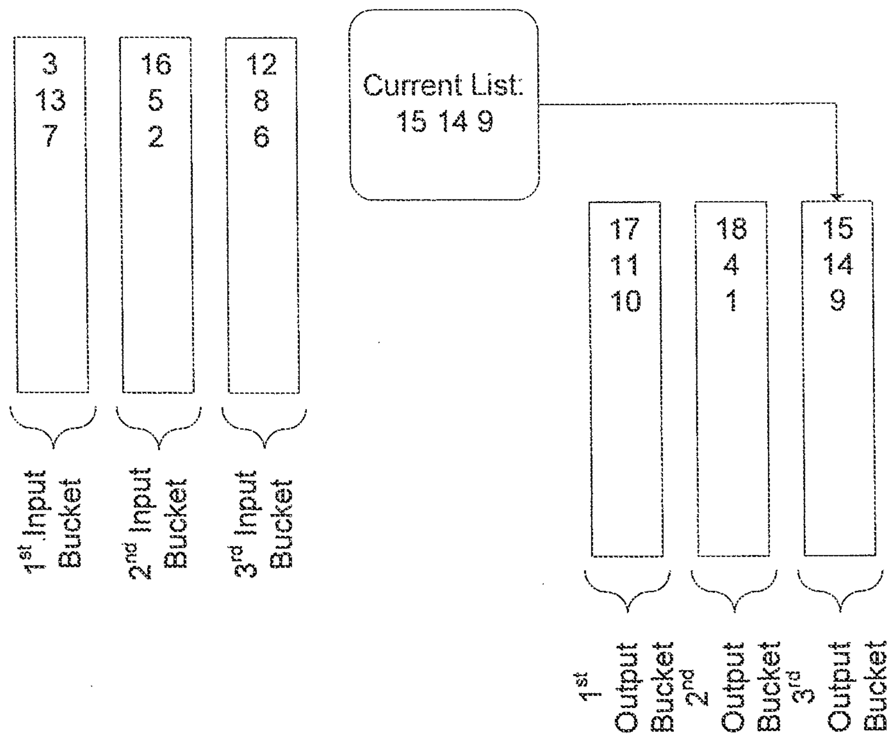
Figure 42H:
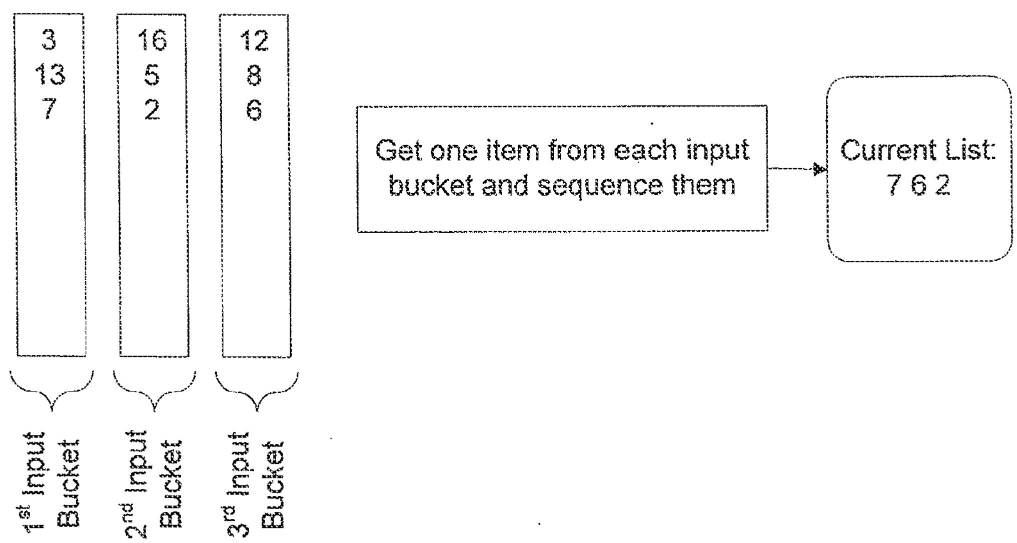
Figure 42I:
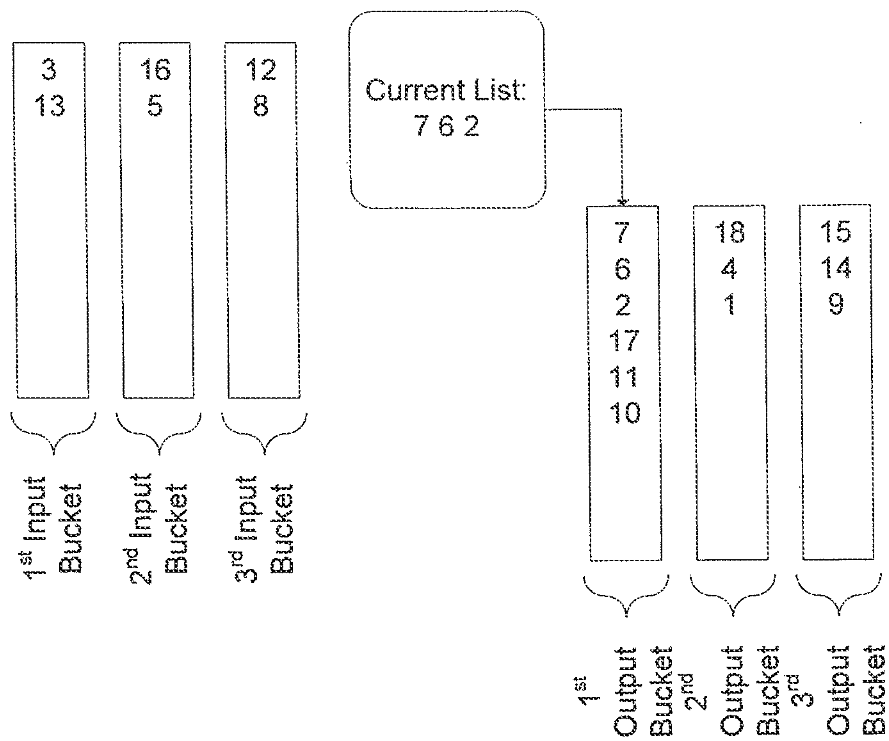
Figure 42J:
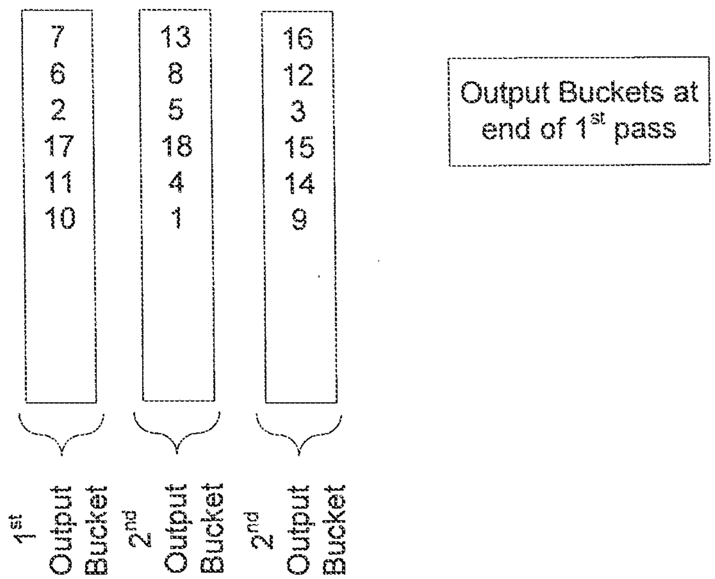
Figure 42K:
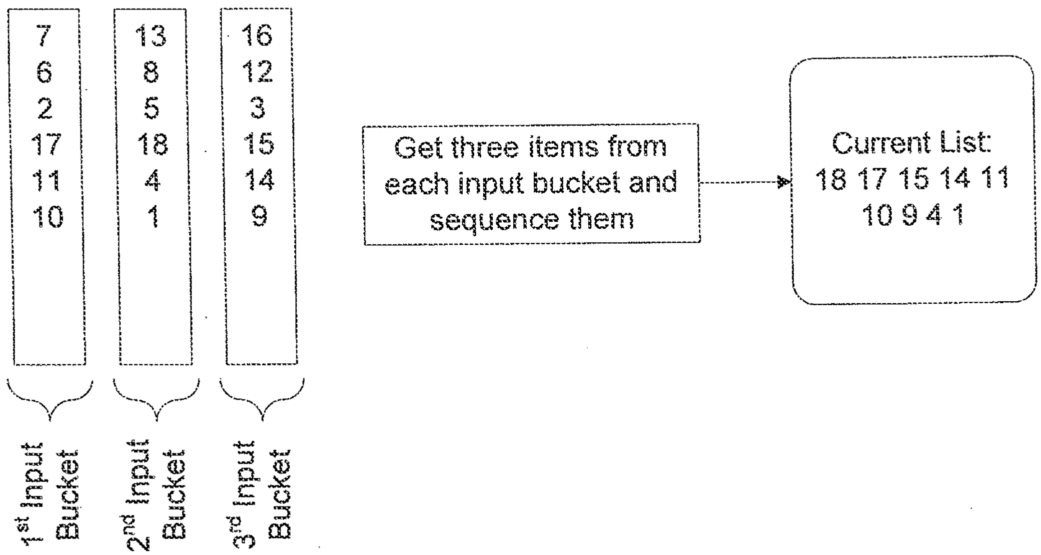
Figure 42L:
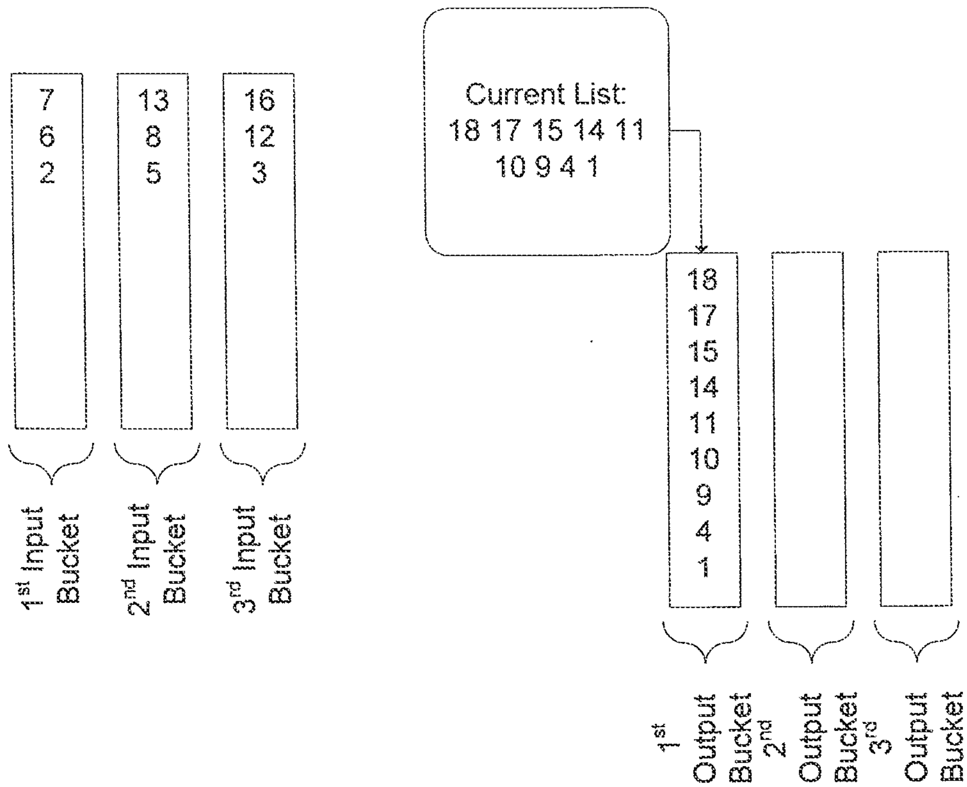
Figure 42M:
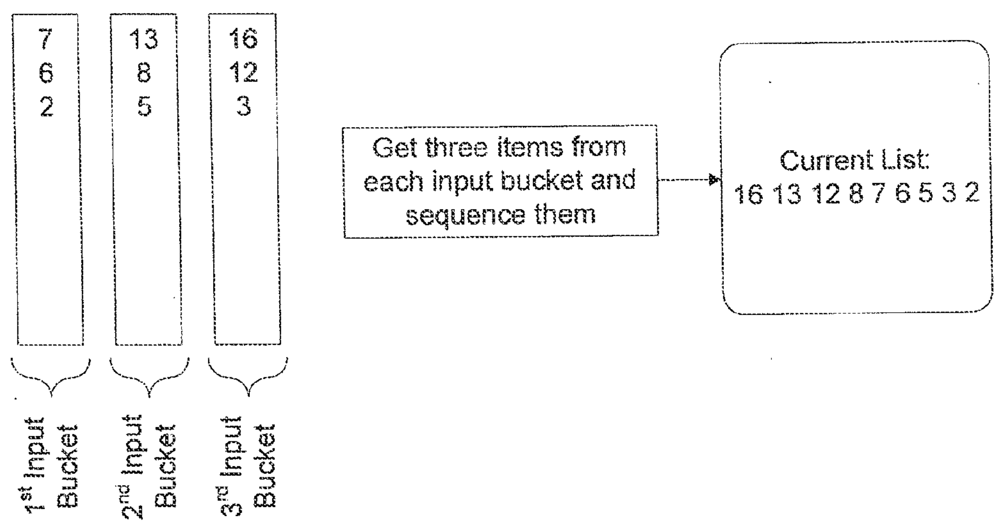
Figure 42N:
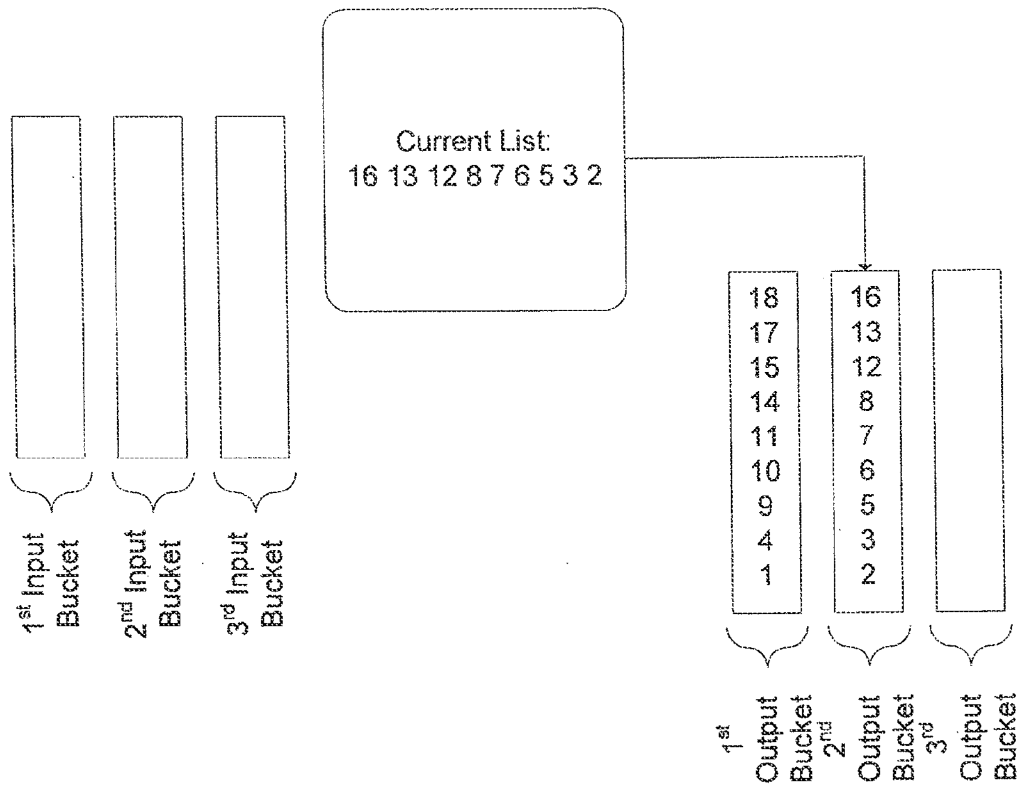
Figure 42O:
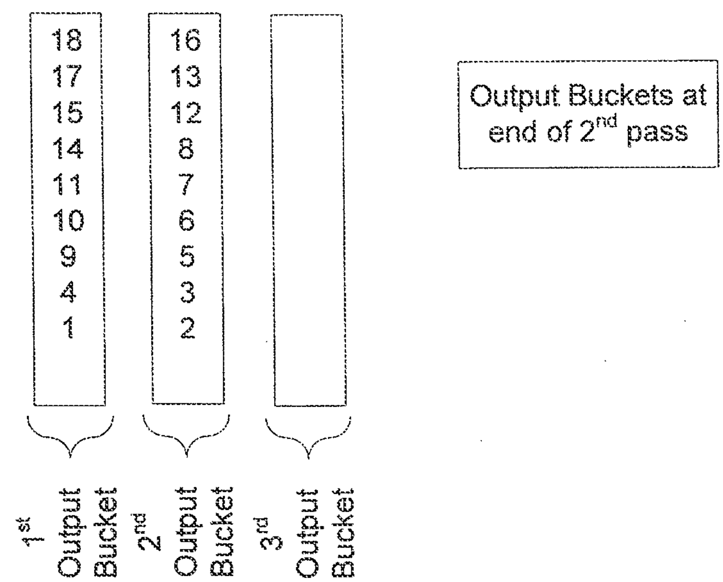
Figure 42P:
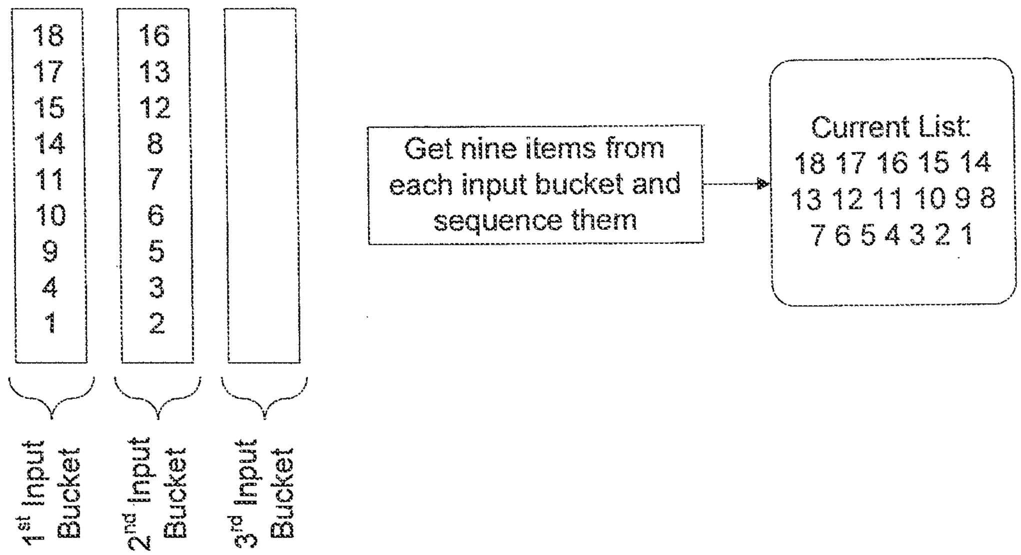
Figure 42Q:
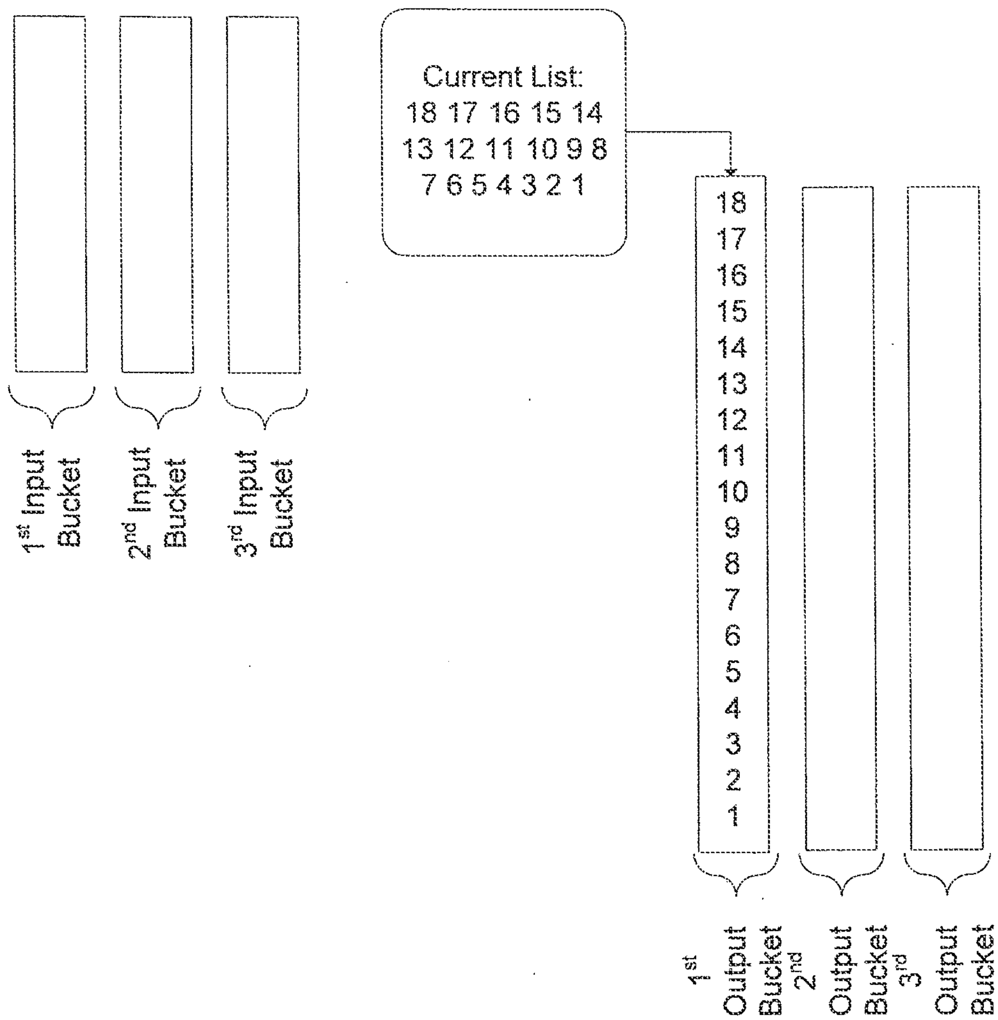
Figure 42R:
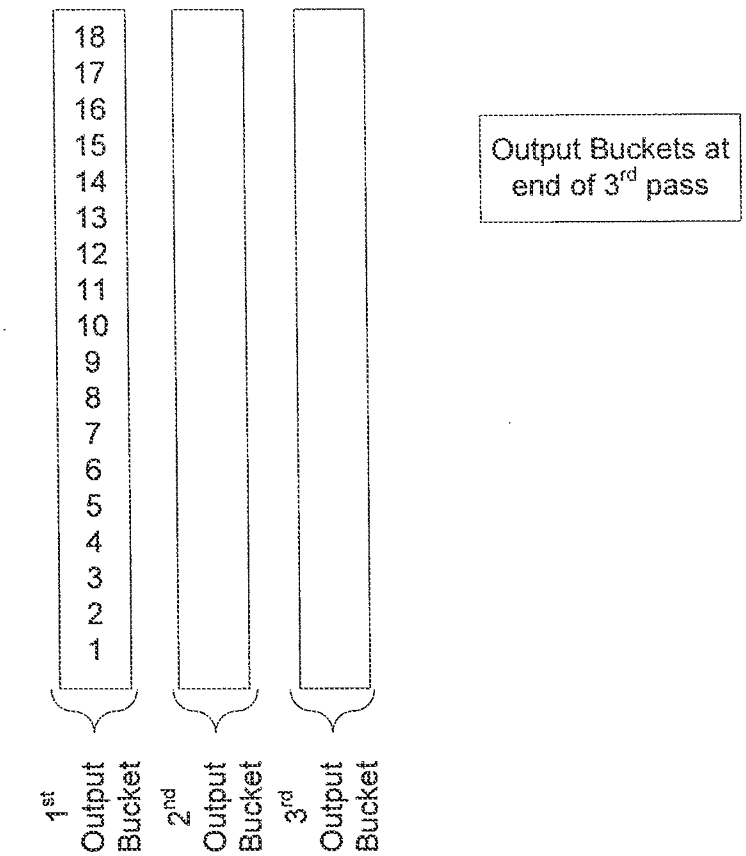

FIGS. 42B-42R show steps in an exemplary N×N sequencing/sorting process in accordance with aspects of the present invention.

Figure 42S:
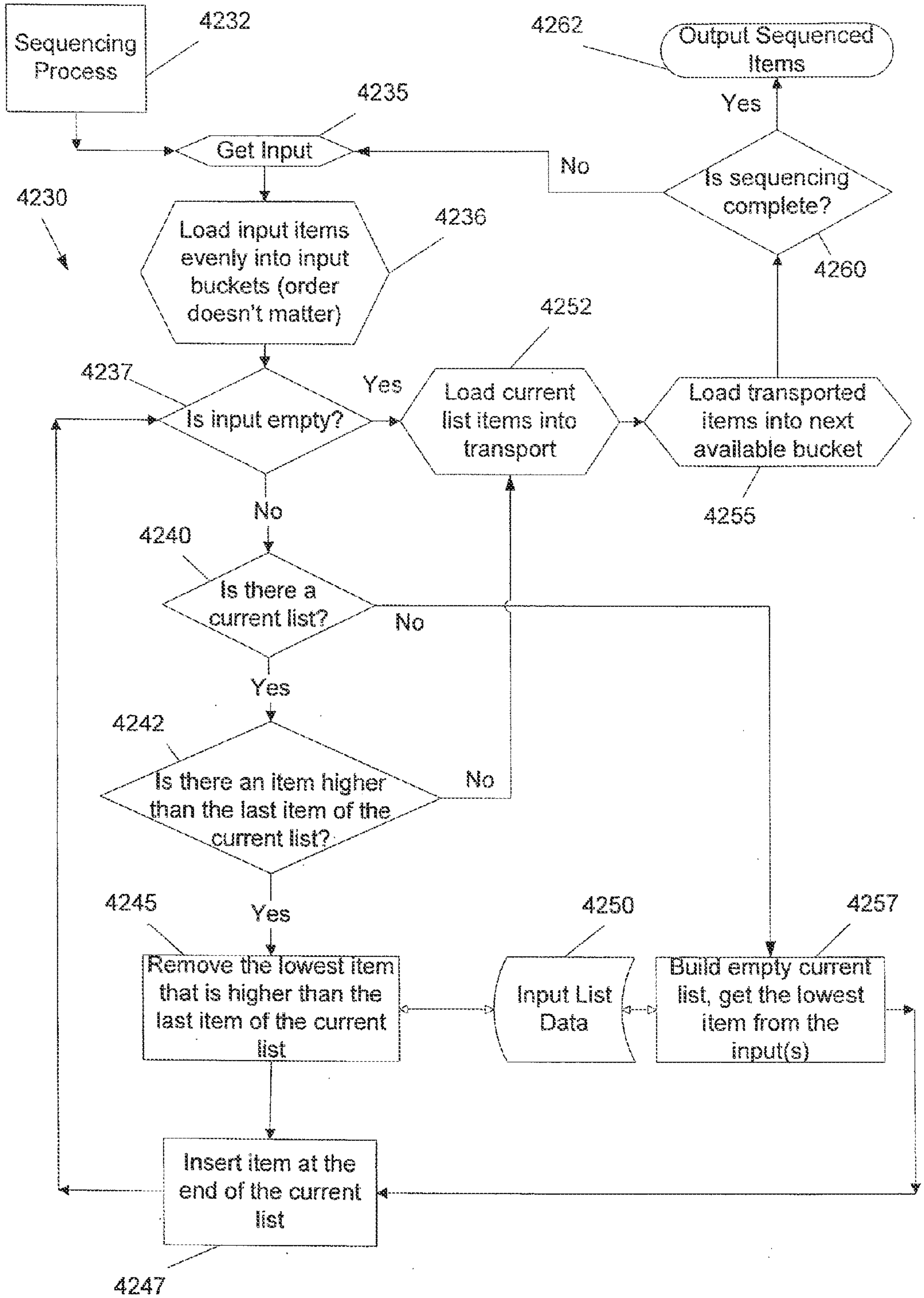

FIG. 42S shows an exemplary flow for performing an exemplary N×M sequencing/sorting process in accordance with aspects of the present invention.

Figure 42T:
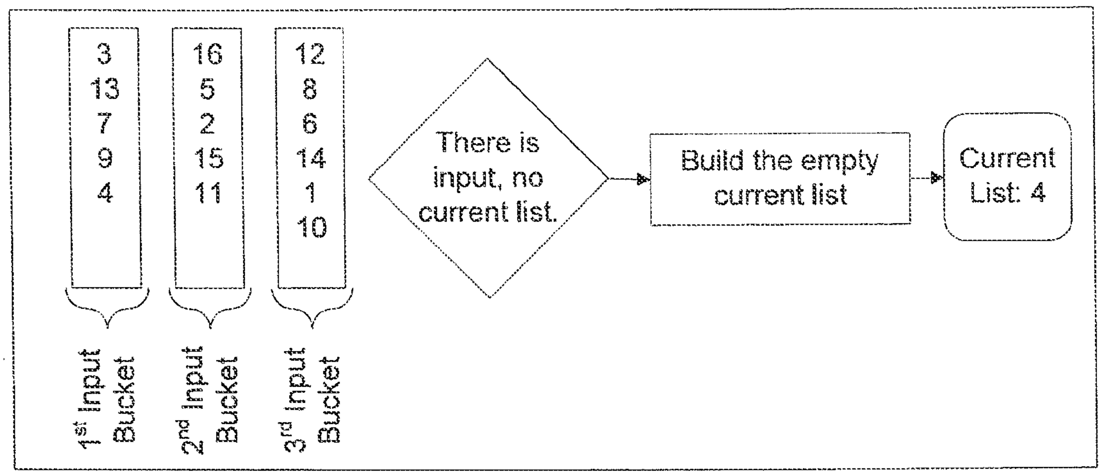

FIGS. 42T-42FF show steps in an exemplary N×M sequencing/sorting process in accordance with aspects of the present invention.

FIG. 42GG shows an exemplary table for determining item base values for an applied radix sequencing/sorting process in accordance with aspects of the present invention.

FIG. 42HH shows an exemplary flow for performing an applied radix sequencing/sorting process in accordance with aspects of the present invention.

FIGS. 42II-42ZZ show steps in an exemplary applied radix sequencing/sorting process in accordance with aspects of the present invention.

FIG. 42AAA shows an exemplary table indicating output buckets for three different sequencing scenarios for an applied radix sort in accordance with aspects of the invention.

Figure 43:
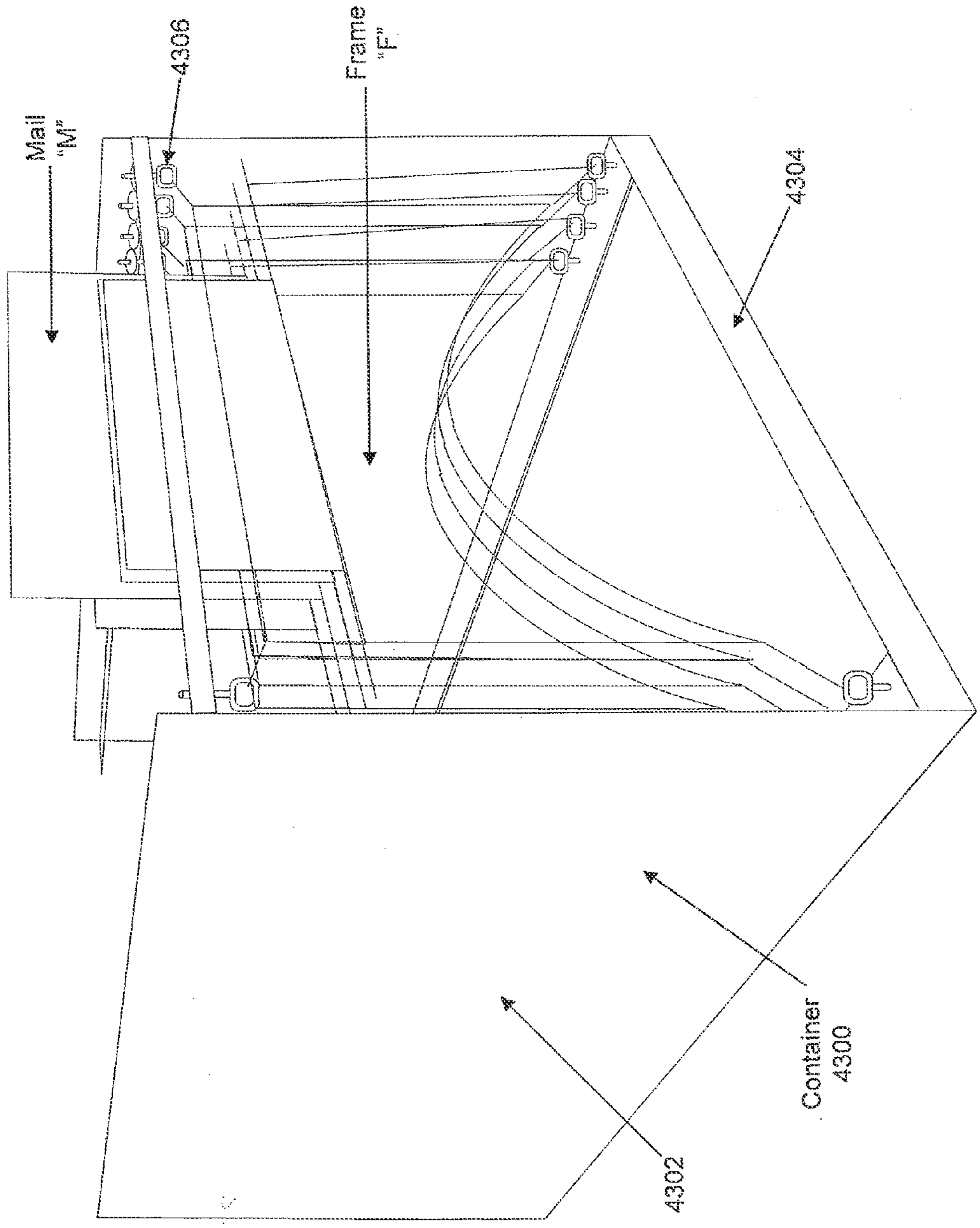

FIG. 43 shows a container in accordance with aspects of the invention.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of System

The invention generally relates to improving product processing operations and, more particularly, to a method and system of sorting and/or sequencing letter mail, flats and parcels and other objects. The system and method can be implemented in a warehouse, or mail sorting or any type of sorting facility. Implementing the present invention allows for the continuous sorting of mail pieces to any level of sortation using a single pass. To accomplish the advantages of the invention, the system and method uses multiple stages of diverts and merges, e.g., individual mail pieces are diverted into a sortation system composed of multiple stages each with many parallel paths. The mail pieces are merged and combined into sequenced order at the conclusion of sorting. Moreover, in accordance with aspects of the invention, the mail pieces are sorted and/or sequenced in a stacked configuration, e.g., face-to-face (i.e., not end-to-end), in frames thus resulting in high throughput at low conveyor speeds. The present invention also relates to controls and methods for processing mail pieces throughout a facility and provides a seamless integration of computing functionality, e.g., sorting and sequencing methodologies, controls, etc., as further discussed below. The present invention represents a quantum leap over current mail sortation and sequencing operations.

More specifically, with the present invention, a facility-wide sorting and/or sequencing system incorporates the sorting and/or sequencing of flat mail, letter mail and, in embodiments, small parcels in a one pass stream. In embodiments, flat mail, letter mail and, in embodiments, small parcels, are placed into frames which are transported in a face-to-face orientation, which significantly increases throughput while potentially decreasing the footprint of the facility wide machine. The facility wide system includes input feeders, where mail pieces are singulated, the mail piece address and/or bar codes are recognized, and the mail pieces are transported individually into the induction and sequencing portions of the system. The input feeders, in embodiments, can be conventional flat and letter feeders which are integrated into the system of the present invention. The system further includes a mail frame induction system, where the mail pieces are matched with a frame, inducted into the frames, and transported and merged into a sequence or certain sort depth using a diverting and merging methodology as discussed in further detail below. Throughout the system, the frames can be managed by controls, e.g., compressed and or expanded, merged, diverted, sorted and/or sequenced, and shuttled throughout subcomponents in an efficient and cost effective manner. Once the combined mail pieces are in a sequence or a certain sort depth, the mail pieces are extracted from the frames using a mail piece extraction subsystem. Advantageously, the frames and mail pieces can be transported through various stages, e.g., between many different subsystems, using transports such as, for example, shuttles. The shuttles allow the frames and mail pieces to move quickly and efficiently throughout the facility.

Also, the system of the present invention is modular, which allows it to be expanded depending on the needs of a particular facility. The modularity of the system of the present invention also allows the system to be used with current machinery such that sorting and sequencing processes can continue without any significant interruption during the assembly of the facility wide system. Additionally, as discussed in more detail below, the system and method of the present invention includes unique sorting and/or sequencing schemes, transport systems, e.g., lead screws, right angle diverts, etc., as well as computing functions, storage facilities, and preventive detection of maintenance issues. In addition, the present invention contemplates the use of certain architectures, facility and postal wide schemes, methodologies and systems that result in great savings to the postal system and increased efficiency of sorting and/or sequencing and floor space.

Figure 1:
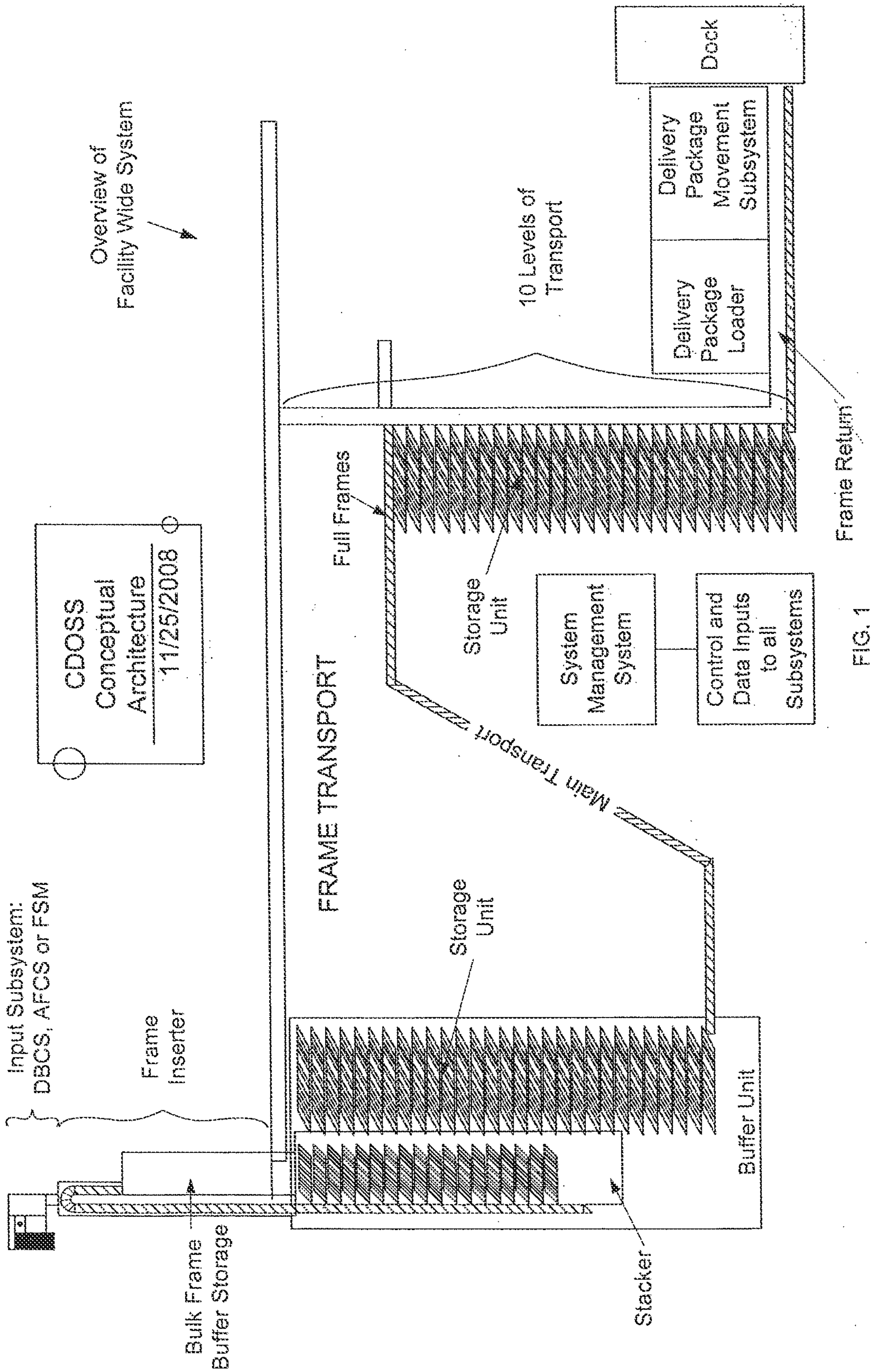
FIG. 1 shows an exemplary overview of a system architecture in accordance with aspects of the invention.

More particularly, the present invention includes, in addition to other systems, components, etc, a facility wide mail sortation and/or sequencing system having the following functionality, components, etc. as shown in FIG. 1. It should be noted that FIG. 1 is representative of a general overview of the system and, as such, additional features, capabilities, functions, etc. are contemplated by the present invention as described throughout the instant application.

Input Devices

The input devices are a series (1 to many) of mail piece feeders such as, for example, letter feeders, flat feeders and parcel feeders. These input devices comprise a barcode or address scanner, an algorithm that calculates the output bin associated with the input mail piece, a mechanical interface to convey mail from the output into the facility wide system, and a computing interface to communicate the associated address information to the remaining portions of the system. The bar code sorter may also communicate other information associated with a mail piece including mail image(s), indicia image(s) or characteristics, dimensions, barcodes, weights, sorter identification, and sortation information. More specifically, information that may be received, tracked and communicated throughout the system includes, for example, the following mail piece information from each induction subsystem:

Length;
Width;
Height;
Volume;
Orientation;
Overall Length;
Overall Width;
Transverse Position;
Barcode Information on the mail piece;
Address information returned form the AARS;
Weight;
Location; and
Mail type.

Facility Wide Sorting and/or Sequencing System

The Facility Wide Sorting System includes many subsystems such as, for example, mail frame inductors to induct many different types of mail pieces, e.g., letters, flats, small parcels, into frames for transportation throughout the system; right angle diverts and merging points to sort and sequence mail pieces in the frames, shuttles for transporting the frames between subsystems and components, mail frame extractors and controls such as, for example, management systems for controlling the functions of the system, e.g., sorting and sequencing processes. The system further includes inter and ultra facility components and networks and related functions and visibilities, as discussed herein. Some systems include, as an example, an identification subsystem that takes input data from the input devices and associates one or more electronic identifier uniquely to each mail piece. These electronic identifiers are used to track mail piece and to associate all related data to the mail piece.

Storage Subsystem

The storage subsystem is capable of storing mail between the receipt of mail to the dispatch of it. The storage system may be modular in nature, to be able to be sized to handle the volume of mail pieces from many different sizes of facilities. The association of a unique identification of the mail determines storage operations with its position in the system.

Input Subsystem

The Input Subsystem includes the Delivery Bar Code Sorters (DBCS) and the Flat Sorter Machines (FSM). In some embodiments, to take advantage of current USPS investments, the system of the invention uses the input sections (including induction stations, singulation, Optical Character recognition, barcode assignment, and facing canceling) of existing sortation systems. The portions of these systems used are the singulation, address/barcode assigning/reading/interpretation of the units.

Frame Inserter

The Frame Inserter places individual mail pieces into frames. It is assumed that mail piece frames will come in many different sizes. The inserter or its computing subsystem will choose the proper size of mail frame and insert the mail inside by using, e.g., optical recognition technology, photodiodes, or other known technologies all of which are capable of being implemented by one of skill in the art. In embodiments, the inserter shall be capable of inserting flat and letter mail at the rate of about 35,000 mail pieces per hour. In embodiments, the inserter can be a rotary inserter. By way of example, the rotary inserters include two pinch belts. As the mail passes between the pinch belts, it will be inserted within the frames as they are automatically expanded about a radius of the frame. (The frames open as they revolve around a carousel.) The rotary inserter, in embodiments, has the capability of about 35,000 insertions per hour. In implementation, it is contemplated that there would be one inserter for every DBCS or every two FSM machines.

Frames

The frames are designed to hold mail pieces. Although many different sizes of frames are contemplated by the present invention, two specific sizes of frames can include one full-height (which can contain any size mail piece) and one half-height that shall convey mail pieces smaller than 6 inches tall. Frames are capable of being measured for minimal thickness necessary for diversion. A frame maximum thickness when stacked empty can be less than 0.1 inch. Also, frames containing mail pieces of less than or equal to 0.1 thickness can store the resulting mail pieces on ⅛ inch centers. The frames are also configured and structured to be closed (sealed to prevent mail piece from escaping during sortation and transportation) at the end of insertion operations. In still further embodiments, the frames should be able to be stored in variably spaced storage units (only occupy the thickness of the mail piece). Also, the frames are designed such that they are able to be stored, diverted, retrieved and conveyed during normal truck transportation vibration at full conveyor speed. Also, the frames are conveyed and diverted with only the drive power from the conveyor, e.g., transportation system.

Buffer Subsystem

In certain embodiments, the Buffer Subsystem assures that surges in mail input do not result in overstressing the transport and assures that mail pieces get routed to the proper transport layer.

Transport Subsystem

The Transport Subsystem includes the numerous conveyors that transport the mail frames internally through the system. The transports carry the frames from the inserters throughout the system. In embodiments, the transport can handle about 80,000 mail pieces per hour (or 800,000 per hour for the main trunk). Transports include straight, curved, and ramped conveyors preferably of a lead screw type. The transport, in one embodiment, may be stacked layers.

Storage Subsystem

The Storage Subsystem automatically stores and retrieves mail pieces (in frames). This system can include buffers or storage areas for shuttles, which are designed to hold the frames during transport between different components.

Delivery Container Loader

The Delivery Container Loader packs the mail pieces into Delivery Containers. In embodiments, the loader resembles a conveyor other than the walls are a series of delivery containers. The containers are loaded at the speed of the conveyor. There is a small buffer to allow switching between full and empty containers. In embodiments, the following is noted.

- The delivery container loader is configured to not require additional packaging machinery (like lidders/banders) to make the packages ready for delivery.
- The delivery container loader is configured to automatically load an empty container when a previous container is full.
- The delivery container loader is configured to at least operate 10 minutes without requiring manual intervention including adding new packages, or removing full packages.

System Management Subsystem

The System Management Subsystem controls and coordinates all system operations and maintains the identity of all mail pieces and/or frames. The system management subsystem is the series of computers that control and schedule all system movements, keep track of all mail piece identification by position, interface with human operators, and that interface all information between subsystems. The system management subsystem can include known algorithms to sort/ sequence the mail (in the frames), as well as controls to control the ejection of the mail from the frames, the stacking thereof, etc.

Delivery Container Movement Subsystem

The Delivery Container Movement Subsystem moves the Delivery Containers from the loader to the point of delivery (dock). This system can include specially designed carts that may be nestable as discussed in the instant application.

The system of the present invention should have as small a space footprint as possible. The footprint includes all major components and working areas for personnel associated with the equipment. As such, the components are designed to be located within existing USPS processing and delivery facilities. In addition, it is contemplated that the throughput of the sorting and/or sequencing is significantly increased compared to conventional systems, e.g., upwards of 80,000 frames or more per hour. Additionally, and advantageously, the system is designed to handle all types of mail, simultaneously, while still using some existing sortation equipment such as, for example, letter, flat and parcel input feeders.

Additional Systems and Components

Although not specifically shown, the system can also include additional components and systems such as, for example, an unpackaging subsystem, Dispatch Packaging system, Receipt Packaging system, and Input Multiplexing subsystem. More specifically, the Unpackaging subsystem removes mail pieces from the standard mail packages and puts the resultant mail into tubs or containers, directly into transportation vehicles, or delivery point packaging. The Dispatch Packaging system packages standard mail packages into containers for shipping to the processing facilities without removing the individual mail piece container. The Dispatch Packaging system also packages standard mail packages into shipping containers, rolling stock or directly into transportation vehicles to other processing facilities without removing the individual mail piece container. The Receipt Packaging system unpacks standard mail packages from shipping containers, rolling stock, or directly for transportation vehicles from other processing facilities without removing the individual mail piece container. The Input Multiplexing subsystem takes mail from many different input devices and delivers them to the many modular storage and sortation subsystems, described herein. This subsystem associates a mail unique identification with its position in the system. Multiplexing operations are determined by this association.

System Environment

Figure 1A:
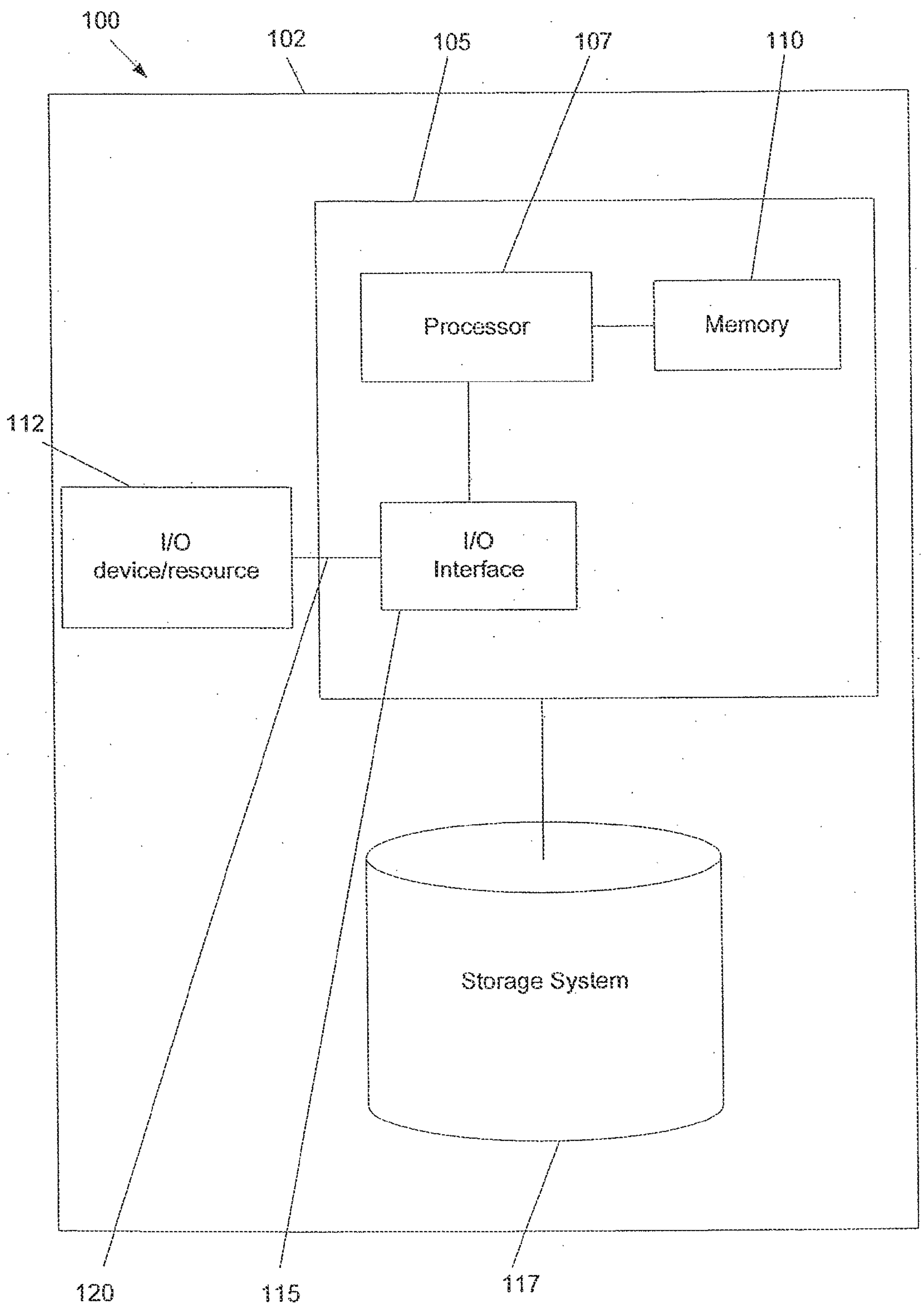
FIG. 1A shows an exemplary computer system environment for implementing a facility-wide mail sorting and/or sequencing system in accordance with aspects of the invention.

FIG. 1A shows an exemplary computer system environment 100 for implementing a facility wide mail sorting and/or sequencing system in accordance with the invention. As shown in FIG. 1A, the exemplary computer system environment 100 includes a computer infrastructure 102 that is operable to perform the processes described herein using a computing device 105. The computer infrastructure 102 can be, for example, one or more servers that are accessible by different computing devices throughout the facility or remotely from the facility.

The computing device 105 includes a processor 107, a memory 110, an input/output (I/O) interface 115, and a bus 120. The bus 120 provides a communications link between each of the components in the computing device 105. The communications link may be a wire or wireless link such as, for example, a LAN, WAN, intranet or the Internet. Additionally, the computer system environment 100 includes a storage system 117, e.g., database. While only a single storage system 117 is shown, it should be understood that the computer infrastructure 102 may include any number of storage systems 117. Moreover, it should be understood that, in embodiments, the storage system 117 may include one or more local storage systems implemented throughout the facility wide system and/or one or more remote storage systems. For example, the one or more storage systems 117 can be utilized to store information such as, for example, sorting and/or sequencing schemes, allocation plan, mail piece position within the facility, dock management information, control of different subcomponents, frame and mail piece size, identification and other attribute information, frame manifest, system wide functions, maintenance information, etc, as discussed in further detail below.

The processor 107 executes computer program code processes on computer storage media, which may be stored in the memory 110 and/or storage system 117. The computer storage media may be, for example, a magnetic or optical portable disk, a hard drive, random access memory (RAM), read-only memory (ROM), an erasable programmable read-only memory, etc. to name a few. While executing computer program code, the processor 107 can read and/or write data to/from the memory 110, storage system 117, and/or I/O interface 115. The memory 110 may include, for example, local memory employed during actual execution of program code, bulk storage, and/or cache memories which provide temporary storage of at least some program code to reduce the number of times code must be retrieved from bulk storage during execution.

Further, the computing device 105 is in communication with an external I/O device/resource 112. The I/O device 112 can interact with the computing device 105. In embodiments, the external I/O device/resource 112 may be, for example, a keyboard, one or more interfaces, one or more pointing devices, etc.

Thus, for example, as described herein further below, the computer infrastructure 102 may include one or more computing devices, e.g., for each processing and delivery center (P&DC) or for each regional command center. Moreover, in embodiments, the computer infrastructure 102 may be provided for each regional command center, wherein the computer infrastructure 102 of each regional command center is in communication with the other computer infrastructures 102 of the other regional command centers of the system-wide mail sorting and/or sequencing system.

Exemplary Processing Flow

Figure 1B:
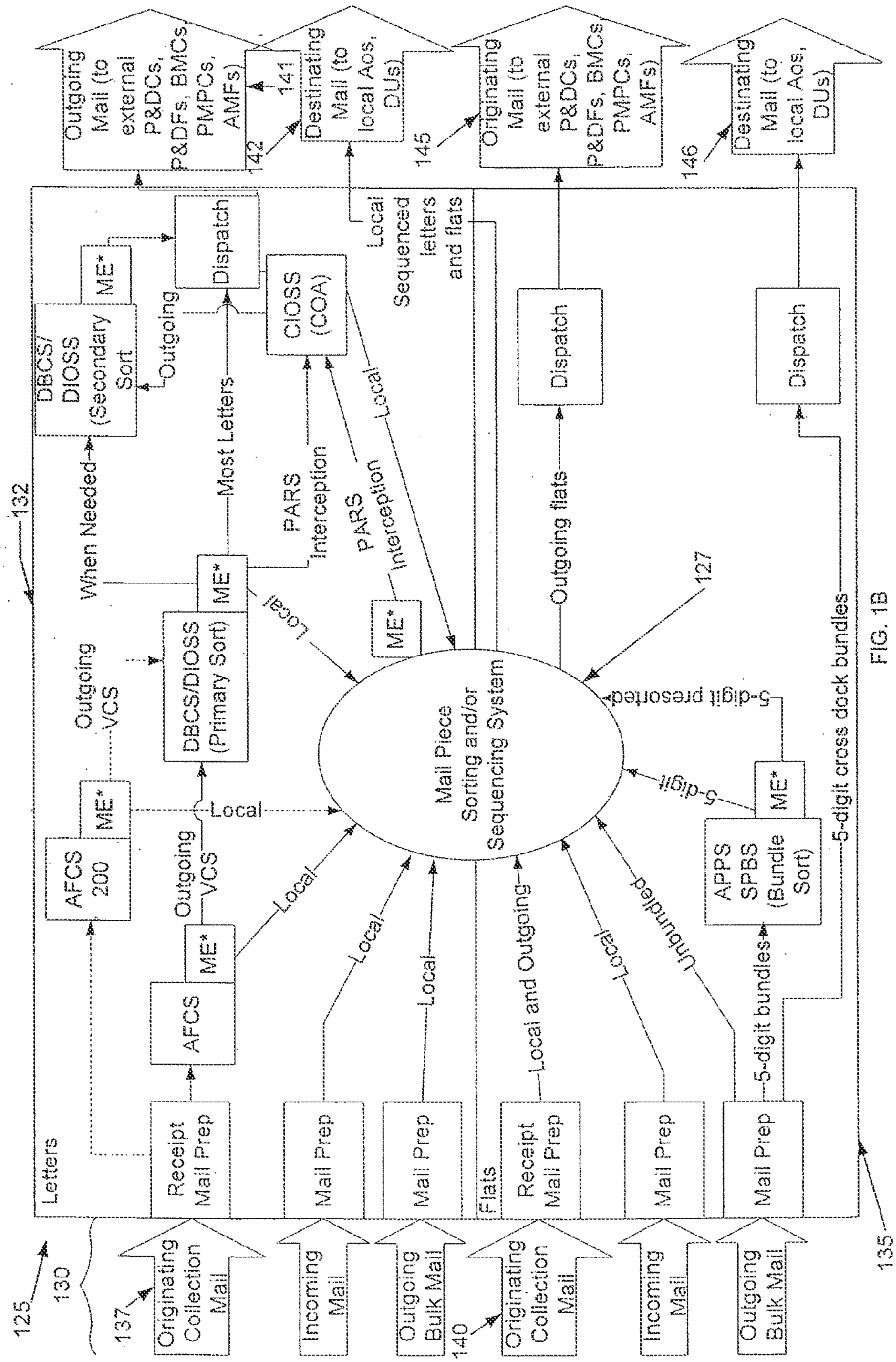
FIG. 1B illustrates an exemplary processing and delivery center (P&DC) mail piece flow for letters and flats in accordance with aspects of the present invention.

FIG. 1B illustrates an exemplary processing and delivery center (P&DC) mail piece flow 125 for letter and flat mail pieces in accordance with aspects of the present invention. As shown in FIG. 1B, incoming mail pieces M include originating collection mail, incoming mail and originating bulk mail that are received, for example, at a receiving dock. Additionally, subsequent to a sorting and/or sequencing by the facility-wide mail sorting and/or sequencing system 127, outgoing mail pieces M are output by the system in a sorted and/or sequenced order. However, in some embodiments as shown in FIG. 1B, the outgoing letters and the 5-digit cross dock bundles of originating bulk mail are not processed by the sorting and/or sequencing system 127, but are collected for dispatch at outgoing mail 141 and destinating mail 146, respectively.

Further, as shown in FIG. 1B, the exemplary P&DC mail piece flow 125 is divided into a letters flow 132 shown in the upper half of the exemplary processing and delivery center (P&DC) mail piece flow, and a flat mail piece flow 135 shown in the lower half of the exemplary processing and delivery center (P&DC) mail piece flow. However, as can be observed, both the letter mail piece flow 132 and the flat mail piece flow 135 utilize the same facility-wide mail sorting and/or sequencing system 127 in accordance with aspects of the invention.

As shown in FIG. 1B, with the present invention, the processing of originating non-local collection letter mail 137 will follow one of two processing paths, depending on whether the automatic face canceling system (AFCS) is an upgraded system. For example, for a site that does not have an upgraded AFCS, e.g., AFCS-200, facing, canceling and image lift, described further herein below, occurs on the AFCS. Separation of mail into local and outgoing is also performed on the AFCS, but, in embodiments, only for online address recognition results. Both the local and outgoing streams run through a primary sort operation on a delivery bar code sorter input/output subsystem (DIOSS) or combined input/output subsystem (CIOSS), where remote bar code scanning (RBCS) address results are obtained and the Postnet bar code applied. The local mail output of the DIOSS/CIOSS will be fed into the facility-wide mail sorting and/or sequencing system 127 in accordance with aspects of the present invention.

For a site that has an upgraded AFCS, e.g., an AFCS-200, (flow shown with the dashed line), the Postnet bar code is applied by the AFCS-200 for online address recognition results. As shown in FIG. 1B, local mail whose destination address is resolved on an AFCS-200 can be sent directly to the facility-wide mail sorting and/or sequencing system 127. Moreover, RBCS address results are obtained on a DIOSS/CIOSS with the local mail output being fed into the facility-wide mail sorting and/or sequencing system 127.

As further shown in FIG. 1B, in accordance with aspects of the invention, flat mail pieces are processed following a different flow 135. After manual canceling and facing, all flats (local and outgoing) collection mail 140 is inducted directly into the facility-wide mail sorting and/or sequencing system 127. As discussed further herein below, the facility-wide mail sorting and/or sequencing system 127 performs address recognition, applies ID tags, and separates the mail stream into local (or destinating) and outgoing mail. Both mail streams are processed within the facility-wide mail sorting and/or sequencing system 127, with local flats being sequenced with letters to form a local (or destinating) mail output 142 and outgoing flats being sorted and made ready for the outgoing dispatches 145.

Thus, as shown in FIG. 1B, originating and incoming mail 130 for letter and flat mail pieces and originating bulk mail for flats (except for the 5-digit cross dock bundles) is inducted into the sorting and/or sequencing system 127. Moreover, as shown in FIG. 1B and described further herein below, the present invention will with one pass, sort the mail pieces (including letters and flats) and combine the destinating mail 142 into a single stream and pack it in delivery containers. Thus, as described above, by implementing the present invention, letters and flats mail operations at a P&DC may be greatly simplified.

Figure 1C:
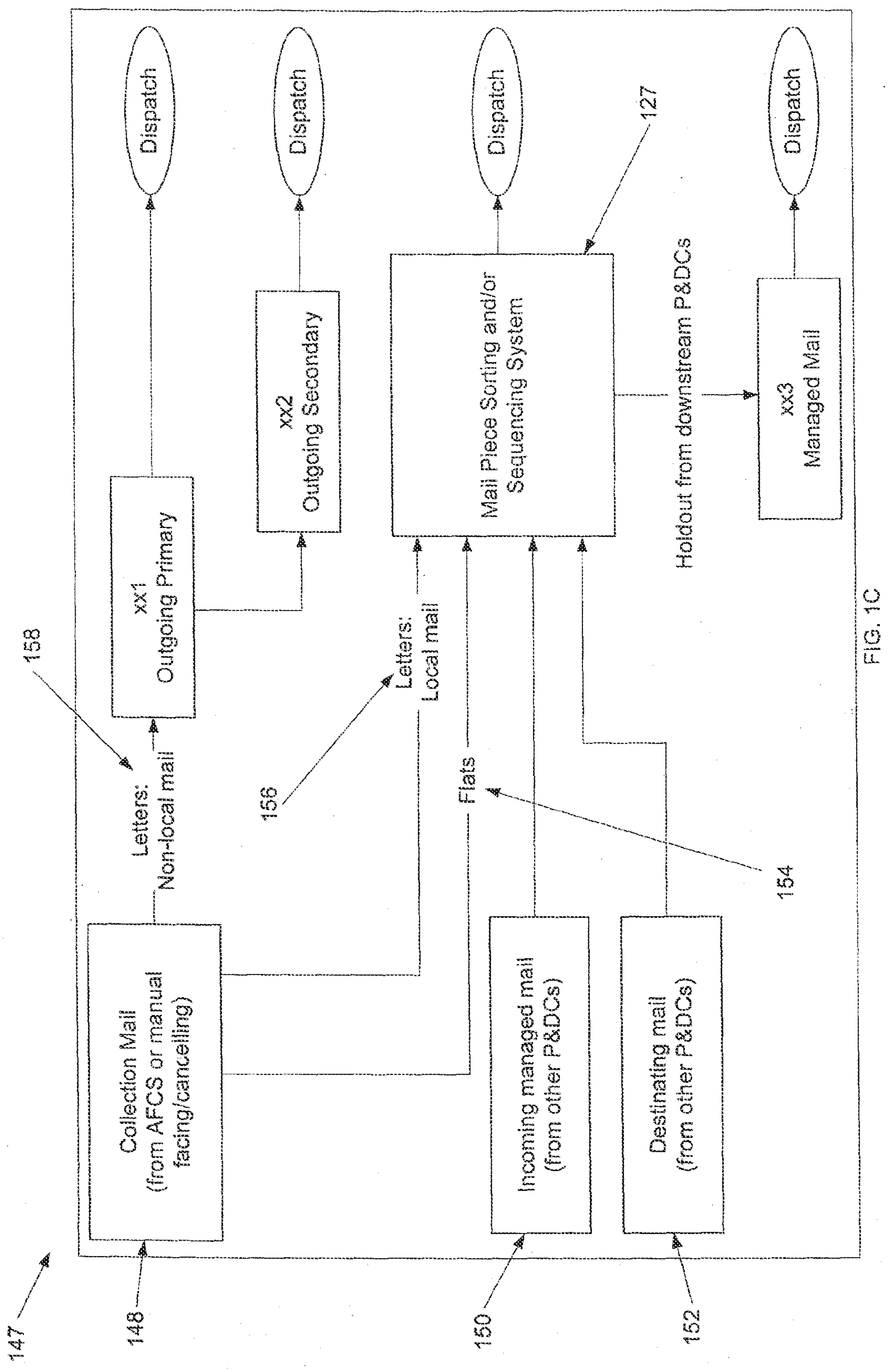
FIG. 1C shows an exemplary mail processing equipment (MPE) operations flow in accordance with aspects of the invention.

FIG. 1C shows an exemplary mail processing equipment (MPE) operations flow 147 in accordance with aspects of the invention. As shown in FIG. 1C, incoming mail pieces may include collection mail 148 (or mail pieces collected locally), managed mail 150 (from other P&DCs) and destinating mail 152 (from other P&DCs). With regard to the collection mail 148, all local letters collection mail 156 from an AFCS (or, in embodiments, a manual facing/canceling) enters the facility-wide mail sorting and/or sequencing system 127 directly. Additionally, all flats collection mail 154 enters the facility-wide mail sorting and/or sequencing system 127 directly, after being cancelled and faced. Further, as discussed above and explained further herein below, flats mail 154 is divided into local flat mail pieces and non-local flat mail pieces, and the local flat mail pieces are sorted and/or sequenced and the non-local flats mail is sorted for dispatch. Moreover, as shown in FIG. 1C, non-local letters collection mail 158 (and FIM mail) are not sent to the facility-wide mail sorting and/or sequencing system 127. Rather, the non-local letters collection mail 158 (and FIM mail) are sent to the outgoing primary and, in embodiments, secondary operations.

As further shown in FIG. 1C, incoming managed mail 150 (from other P&DCs) is inducted directly into the facility-wide mail sorting and/or sequencing system 127. However, managed mail 150 for letters that are destined to downstream P&DCs are held out at induction to the facility-wide mail sorting and/or sequencing system 127 and sent for dispatch to another P&DC. Additionally, as shown in FIG. 3, all incoming destinating mail 152 (or mail destined for local delivery) from other P&DCs is inducted directly into the facility-wide mail sorting and/or sequencing system 127. Thus, as shown in FIG. 1C, in accordance with aspects of the invention, the facility-wide mail sorting and/or sequencing system 127 of the present invention accomplishes all sorting and/or sequencing internally, requiring only a single induction process per mail piece and a single sort plan to be loaded.

Figure 1D:
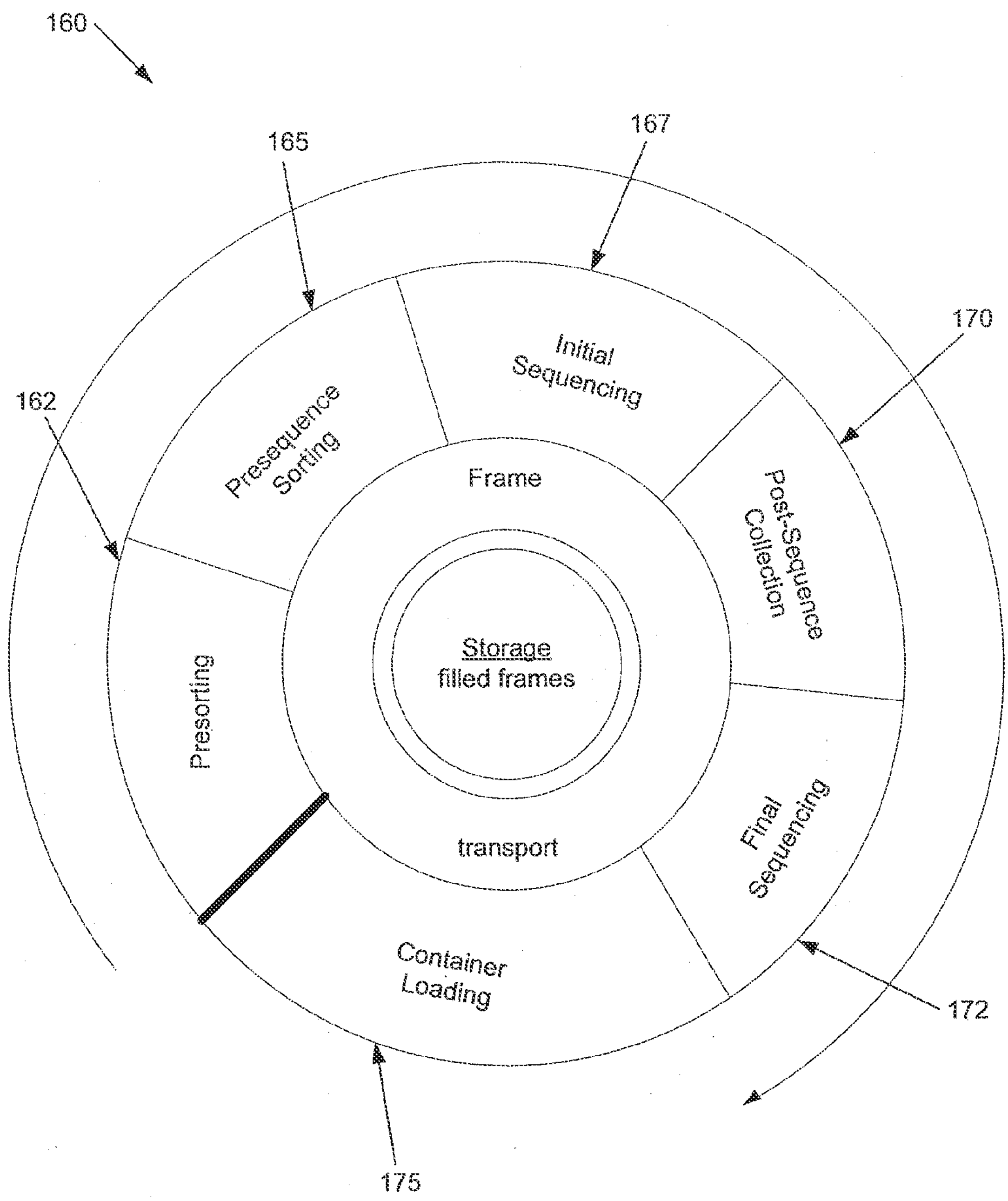
FIG. 1D shows an exemplary illustration of a methodology for sorting and/or sequencing mail in accordance with aspects of the present invention.

FIG. 1D shows an exemplary illustration of a methodology 160 for sorting and/or sequencing mail in accordance with aspects of the present invention. As shown in FIG. 1D, and explained further herein below, the methodology 160 comprises a presorting operation 162, a presequence/sorting operation 165, an initial sequencing operation 167, a post-sequencing collection operation 170 and a final sequencing operation 172. Moreover, a container loading operation 175 occurs after the final sequencing operation 172 has completed.

In accordance with aspects of the invention, all mail (contained in frames, which is explained herein further below) enters the presorting operation 162 after induction. The presorting operation 162 looks up the destination of each mail piece in an allocation plan to determine the correct presort accumulator into which to move the frame. In embodiments, each accumulator is a first-in-first-out buffer area. Accumulator volume is monitored and when an accumulator becomes full, the entire group of frames is loaded onto a transport shuttle, as described further herein below. Additionally, a frame manifest is created that identifies the frames contained within the group.

In embodiments, the allocation plan is received from a system management function in the system of the present invention. The allocation plan provides information that is used to partition the presort accumulators by destination. That is, the accumulator allocation plan defines the presort rules for letters and flats destinating mail and flats outgoing mail. In embodiments, the allocation plan identifies the accumulators allocated for:

- Destinating mail, defined by groupings of ZIP codes;
- Flats managed mail, defined by ZIP code breakouts for the downstream P&DCs;
- Domestic flats outgoing mail, defined by groupings of ADCs;
- Flats outgoing mail for APO/FPO locations, defined by APO/FPO groupings;
- Flats international mail, defined by international groupings; and/or
- If and when required, flats seasonal mail.

In accordance with further aspects of the invention, the pre-sequencing/sorting operation 165 follows the presorting operation 162. The pre-sequencing/sorting operation 165 is a continuous operation that ends shortly after induction is closed and includes a pre-sequencing operation for local (or destinating) letters and flats mail and a sorting operation for non-local (or outgoing) flats mail. The pre-sequencing operation is performed on shuttles containing letters and flats destinating mail. More specifically, frames are unloaded from shuttles, sorted into groups based on assigned storage unit, and reloaded into a new set of shuttles, as described further herein below. Moreover, the shuttles are sent to a frame transport operation.

On the other hand, a sorting operation is performed on shuttles containing outgoing flats mail. More specifically, frames are unloaded from shuttles, sorted into the required separations per the sort plan, and reloaded into a new set of shuttles. These shuttles are sent directly to the container loading operation 175 for immediate dispatch.

In accordance with further aspects of the invention, the initial sequencing operation 167 follows the pre-sequencing/sorting operation 165. The initial sequencing operation 167 is performed on groups of mail frames contained in shuttles within a specific storage unit. In embodiments, as described further herein below, the initial sequencing operation 167 creates a "chain" of e.g., 10 sequenced shuttles based on a sequencing plan, which is received from the system management function. Each chain of shuttles is sent on to the post-sequence collection operation 170. In embodiments, the initial sequencing operation 167 is a continuous operation that completes before the start of dispatch.

The post-sequence collection operation 170 is performed on chains of shuttles within each storage unit. The post-sequence collection operation 170 sequences all mail contained in, e.g., 10 chains to create a "snake" of, e.g., 100 shuttles. In embodiments, the post-sequence collection operation 170 is an ongoing operation that completes before the start of dispatch. Each "snake" is sent to its assigned storage unit and stored until the final sequencing operation 172 begins.

The final sequencing operation 172 is the last sequencing operation, which occurs at the beginning of dispatch. In embodiments, the final sequencing operation 172 receives a trigger from the system management function to begin the dispatch process. In accordance with aspects of the invention, the final sequencing operation 172 sequences all mail contained in the, e.g., 10 snakes located in each storage unit to create a single, sequenced stream of mail. The sequenced stream is sent directly to the container loading operation 175. The container loading operation 175 builds a container load manifest that lists the frame IDs to be unloaded into every delivery container.

Figure 1E:
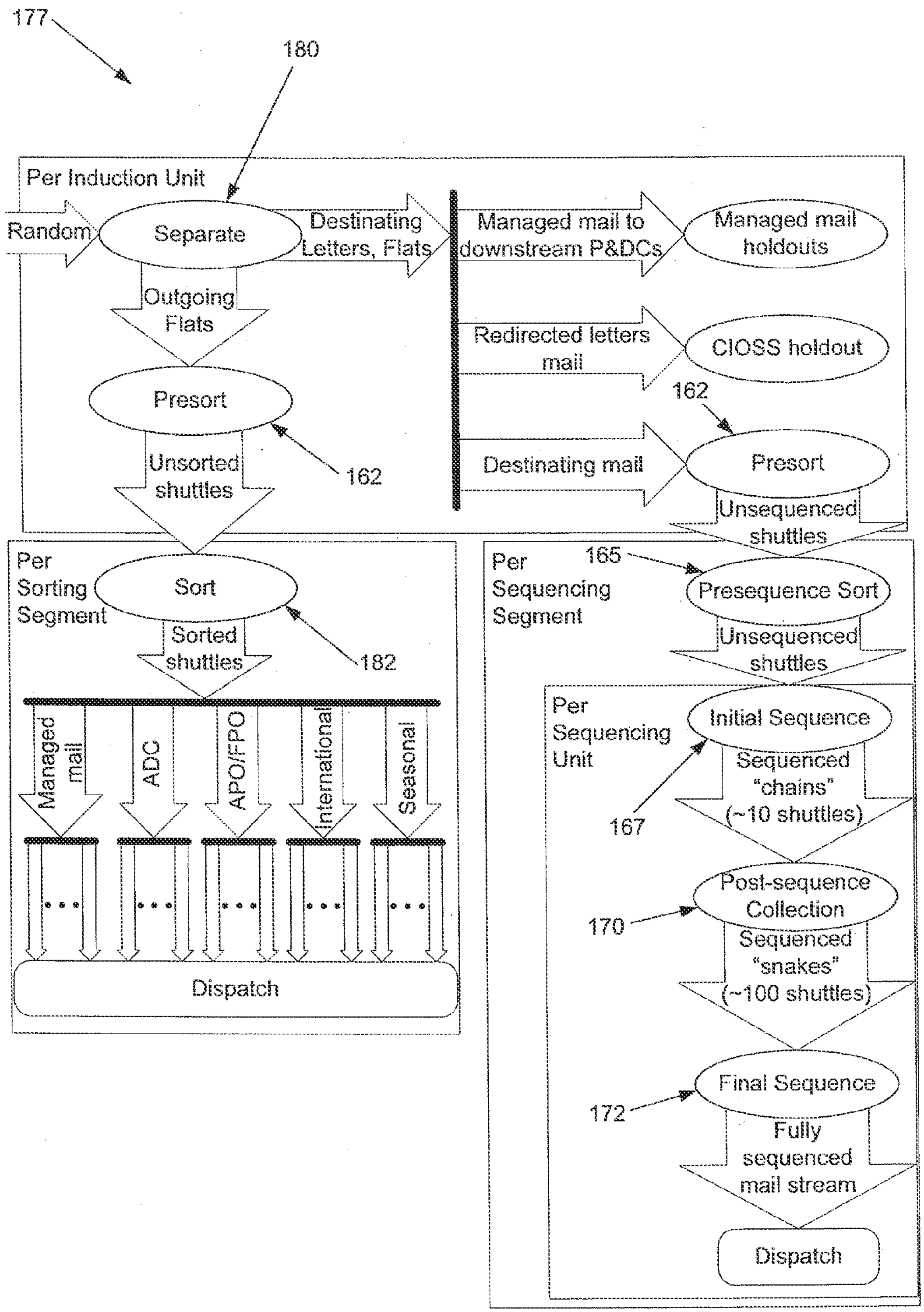
FIG. 1E shows an exemplary mail flow for sorting and/or sequencing in accordance with aspects of the invention.

FIG. 1E shows an exemplary mail flow 177 for sorting and/or sequencing in accordance with aspects of the invention. In embodiments, the system of the present invention views mail induction as a random process. That is, the mail may be inducted into the sorting and/or sequencing system of the present invention in a random order. The inducted mail stream may include destinating mail for letters and flats, outgoing mail for flats, managed mail, amongst other mail piece types.

In accordance with aspects of the invention, letters and flats destinating mail is separated from outgoing flats mail at a separation operation 180. As shown in FIG. 1E, managed mail for letter mail pieces destined to downstream P&DCs is held out to multiple separations. Additionally, redirected letters mail is held out at induction for subsequent processing on a combined input/output subsystem (CIOSS). Local (or destinating) mail enters the presorting operation 162, where it is separated (e.g., sorted) into equitable (substantially equal) segments of mail and loaded into shuttles. The pre-sequence/sorting operation 165 occurs next, where the mail contained in the shuttles for each system segment is further sorted to the storage unit. It should be understood that no sequencing occurs during the presorting operation 162 or the pre-sequencing/sorting operation 165.

The initial sequencing operation 167 creates groups of sequenced shuttles called "chains". In embodiments, each chain contains approximately 10 shuttles or 1,000 mail pieces. The post-sequence collection operation 170 creates a larger group of sequenced shuttles called a "snake", containing, in embodiments, approximately 10 chains or 10,000 mail pieces. In embodiments, the final sequencing operation 172 occurs at about the time of dispatch when all snakes are combined into a single, sequenced stream of, e.g., 100,000 mail pieces. As explained herein further below, this process occurs within every storage unit in the system, with one stream created per storage unit. In accordance with aspects of the invention, all mail pieces of the sequenced stream are sequenced in delivery point sequence (DPS) order per the sequencing plan (or other sort depth).

As additionally shown in FIG. 1E, outgoing flats mail follows a different flow. That is, the presorting operation 162 loads outgoing flats mail onto shuttles, which are destined to a specific system segment. Additionally, a sort operation 182 creates sort separations as defined in the sort plan. In embodiments, this sort plan defines the separations required for managed mail to downstream P&DCs, ADCs, APO/FPO destinations, international mail, and where and when required, seasonal mail, amongst other separations.

Equipment Interface System

Figure 1F:
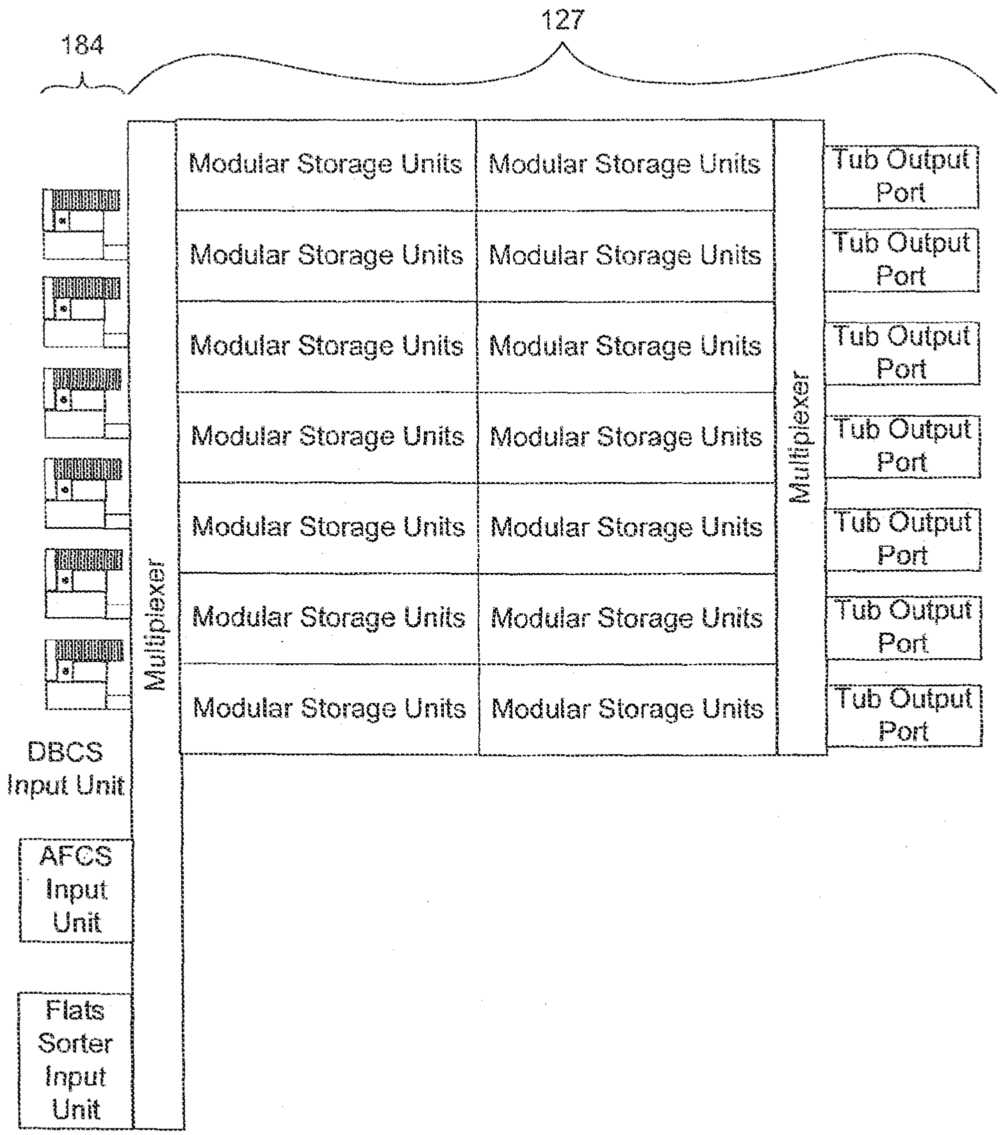
FIG. 1F shows an exemplary illustration of existing equipment interfaced with a facility-wide sorting and/or sequencing system in accordance with aspects of the invention.

FIG. 1F shows an exemplary illustration of existing equipment 184 interfaced with the sorting and/or sequencing system 127 of the present invention in accordance with aspects of the invention. As should be understood, current mail sorting facilities may have existing equipment 184, e.g., bar code sorters, facing canceling machines, flat sorting machines, and parcel sorting machines that essentially perform the same input function as the input portion of the facility wide sorting and/or sequencing system 127, e.g., singulating mail pieces, scanning the mail piece address and/or bar codes, and transporting the mail pieces individually into their individual sorting subsystems. Thus, the invention contemplates that, in order to save money necessary to duplicate this existing capability, in embodiments, the inputs section of existing equipment 184 may be used as the input to the facility-wide mail sorting and/or sequencing system 127. That is, in embodiments, for example, existing mail processing equipment (MPE) and/or mail handling equipment (MHE) may be "retrofitted" in order to interface with the facility-wide mail piece and/or sequencing system 127 of the present invention. Moreover, the remaining elements of the existing equipment 184 (for example, other elements besides the feeder input section of the existing equipment 184, e.g., a multiplexer section and/or an output section) may not be used when a feeder input section of the existing equipment 184 is interfaced with the sorting and/or sequencing system 127.

More specifically, the input to existing equipment 184 (e.g., a flat sorting machine, bar code sorter, facing canceling machine, or parcel sorter) may include a feeder having, e.g., a friction or vacuum feed unit, a scanning device capable of scanning the mail piece identifier (typically a camera or bar code scanner), and a transport consisting of, e.g., pinch belts, that moves the mail into sections of the machine to process the mail. According to aspects of the present invention, if the equipment is separate from the sorting and/or sequencing system 127 of the present invention, e.g., if the equipment is existing equipment 184 (for example, MPE and/or MHE), an existing equipment interface would be necessary to interface the existing equipment 184 with the sorting and/or sequencing system 127.

Figure 1G:
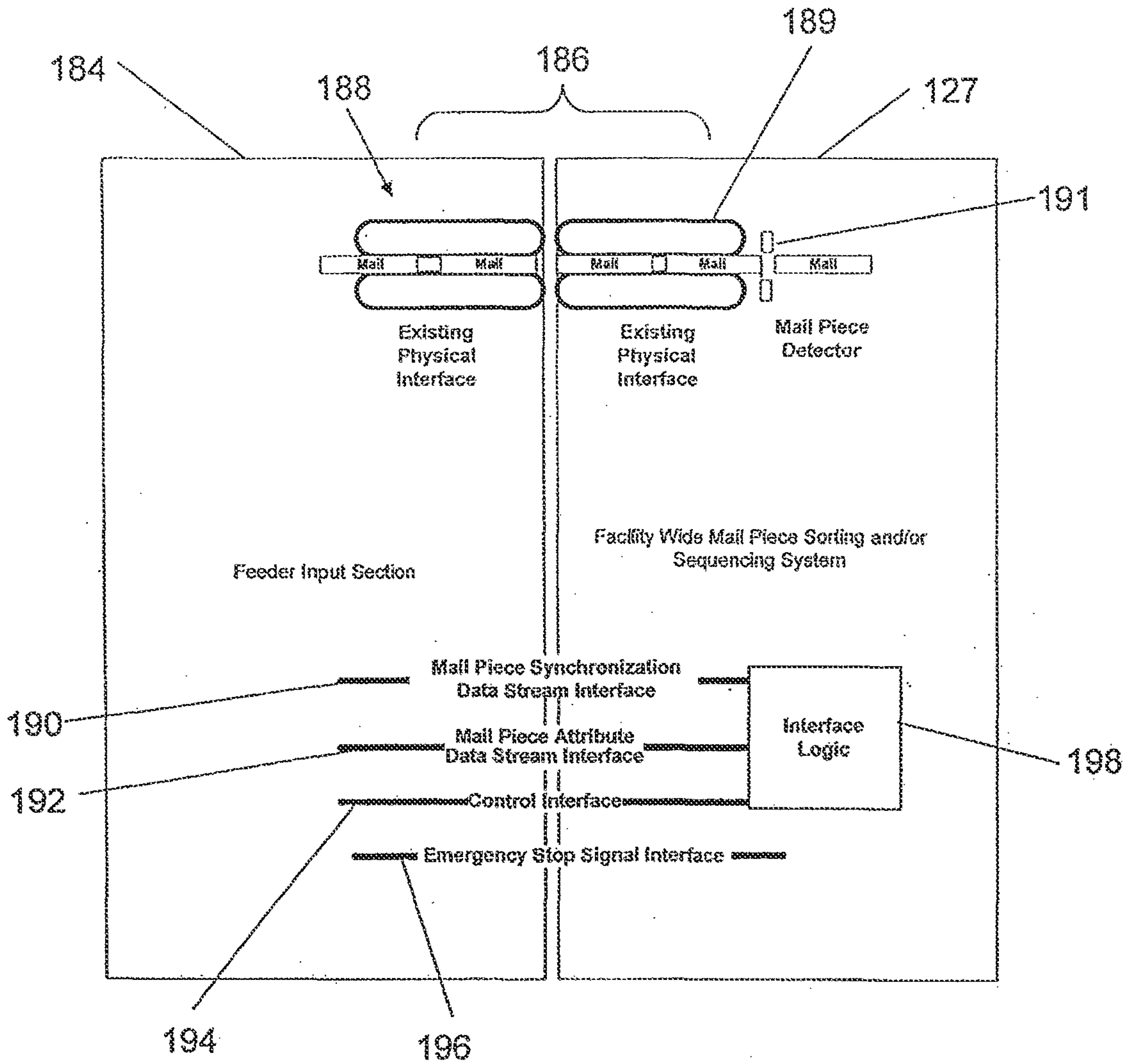
FIG. 1G shows an exemplary existing equipment interface in accordance with aspects of the invention.

FIG. 1G shows an existing equipment interface 186 in accordance with aspects of the invention. In embodiments, the existing equipment interface 186 may include a physical interface 188, a mail piece synchronization data stream interface 190, a mail piece attribute data stream interface 192, a control interface 194, an emergency stop signal interface 196 and interface logic 198, amongst other elements.

The physical interface 186 physically receives the mail pieces from the output of the existing equipment 184 feeder. As shown in FIG. 1G, in embodiments, the physical interface 186 may include a section of pinch belt 189 mounted to receive mail pieces from the existing feeder 184 and a sensor or detector 191 to indicate when a mail piece is present.

The mail piece synchronization data stream interface 190 is a data stream interface that connects to the existing equipment 127 and is used to synchronize or otherwise relate the mail piece attribute data with the position of the physical mail piece being delivered from the physical interface 188. In embodiments, the mail piece synchronization data stream interface 190 may be incorporated into the mail piece attribute data stream interface 192, described further below. In embodiments, the mail piece synchronization data stream interface 190 data stream may comprise, for example, an ordered list of mail pieces (so mail piece identity is assumed by relative position), a indication of arrival position on the transport (for instance a slot number or conveyor position number of a mail piece), a time stamp that corresponds to the mail piece arrival time, or a message that is delivered that is synchronized to corresponding to the time of delivery of the mail piece itself, amongst other data.

The mail piece attribute data stream interface 192 connects to the existing equipment 184 and is used to transmit data consisting of the mail piece identity and any other attributes (such as, for example, mail piece thickness or image data).

The control interface 194 is operable to provide signals from the facility-wide mail sorting and/or sequencing system 127 to the feeder of the existing equipment 184. For example, the facility-wide mail sorting and/or sequencing system 127 may provide a control signal to stop the feeder of the existing equipment 184 from feeding mail pieces to the facility-wide mail sorting and/or sequencing system 127. That is, the control signal transmitted via the control interface 194 may be used, for example, to stop the feeding of mail pieces in case of a jam or another situation that prevents the sequencing of letters. In embodiments, additional control signals may include the following signals: start feeder; pause feeder; message acknowledgement; heartbeat and communication interface monitoring; and/or a command to put feeder into a particular state or diagnostic mode, amongst other signals.

An emergency stop signal interface 196 is operable to route emergency stop signals that remove power from both the feeder of the existing equipment 184 and existing equipment interface 186. In embodiments, the emergency stop signal interface 196 may be electrical and/or mechanical. According to aspects of the invention, the emergency stop signal interface 196 permits one emergency stop switch to stop both the input feeder of the existing equipment 184 and the existing equipment interface 186.

Additionally, in embodiments, the existing equipment interface 186 may include interface logic module 198 to simulate the signals and/or commands to/from the now unused sorting section of the existing equipment 184 (e.g., the multiplexer and/or output sections). Since each type and revision of existing equipment 184 may have different data and control signals, in embodiments, the interface logic module 198 may be modular to support interface to multiple feeders of existing equipment 184 (e.g., each existing equipment feeder would have its own interface module). According to aspects of the invention, the interface logic module 198 allows the input section of the feeder to be disconnected from its output sections and reconnected to the facility wide sequencing interface without requiring changes to the interface logic module 198.

Figure 1H:
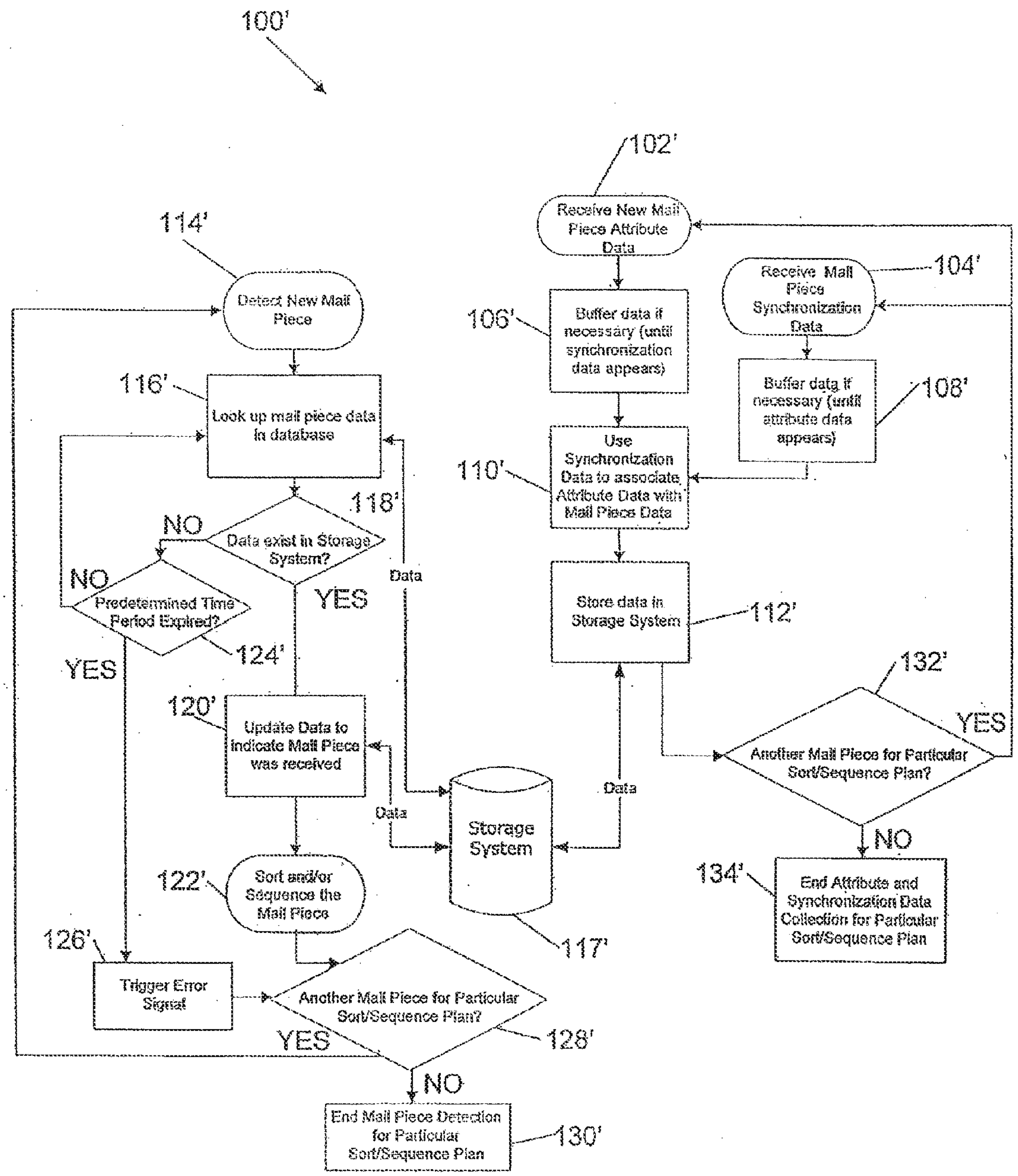
FIG. 1H shows an exemplary flow for performing aspects of the invention utilizing an existing equipment interface in accordance with aspects of the invention.

FIG. 1H shows an exemplary flow 100' for processing mail pieces using the existing equipment interface 186 in accordance with aspects of the invention. The steps of FIG. 1H may be implemented in the environment of FIG. 1A, for example, as with all flows described herein. The flow diagrams described herein may equally represent high-level block diagrams of the invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

As shown in FIG. 1H, at step 102', mail piece attribute data is received by the facility-wide mail sorting and/or sequencing system via the mail piece attribute data stream interface. At step 106', the mail piece attribute data is buffered (if necessary) until the mail piece synchronization data is received. Additionally, at step 104', mail piece synchronization data is received by the facility-wide mail sorting and/or sequencing system via the mail piece synchronization data stream interface. At step 108', the mail piece synchronization data is buffered (if necessary) until the mail piece attribute data is received.

At step 110', the facility-wide mail sorting and/or sequencing system uses the mail piece synchronization data to associate the mail piece attribute data with the mail piece. At step 112', the associated mail piece attribute data is stored in a storage system 117', e.g., a database. It should be understood that, in embodiments, the storage system 117' may be the storage system 117 of FIG. 1A. At step 132', a determination is made as to whether there is an additional mail piece for a particular sort and/or sequence plan. If, at step 132', it is determined that there is an additional mail piece for a particular sort plan, the process proceeds to steps 102' and 104'. If, at step 132', it is determined that there is not an additional mail piece for a particular sort and/or sequence plan, at step 134', the attribute and synchronization data collection for the particular sort and/or sequence plan ends.

At step 114', a mail piece is received by the existing physical interface of the facility wide mail sorting and/or sequencing system and detected by the mail piece detector of the facility wide mail sorting and/or sequencing system. At step 116', the mail piece attribute data may be looked up and retrieved from the storage system 117'. At step 118', a determination is made as to whether the mail piece attribute data exists yet in the storage system 117'. That is, there may be a delay between receiving the mail piece and the mail piece attribute information being available in the storage system 117'. If, at step 118', it is determined that the mail piece attribute data exists in the storage system 117', the process proceeds to step 120'.

At step 120', the facility-wide mail sorting and/or sequencing system updates the record in the storage system 117' to indicate that the mail piece was received by the facility-wide mail sorting and/or sequencing system. At step 122', the mail piece is sorted and/or sequenced by the mail sorting and/or sequencing system. At step 128', a determination is made as to whether there is an additional mail piece for a particular sort plan. If, at step 128', it is determined that there is an additional mail piece for a particular sort plan, the process proceeds to step 114'. If, at step 128', it is determined that there is not an additional mail piece for a particular sort and/or sequence plan, the process proceeds to step 130', where mail piece detection for the particular sort plan is ended.

If, at step 118', it is determined that the mail piece attribute data does not yet exist in the storage system 117', at step 124', a determination is made as to whether a predetermined time period has expired. It should be understood that, in embodiments, the predetermined time period is user-configurable. If, at step 124', it is determined that the predetermined time period has not expired, the process continues at step 116'. If, at step 124', it is determined that the predetermined time period has expired, the process continues at step 126'. At step 126', the mail sorting and/or sequencing system triggers an error signal. That is, as described above, some time may be required for the system to process the mail piece and determine and associate mail piece attribute data to a particular mail piece. However, if this information has not been received in the storage system after expiration of the predetermined time period, there may be some error with respect to that mail piece. Thus, in accordance with aspects of the invention, an alarm signal is issued to indicate that data still does not exist in the storage system for the particular mail piece. Moreover, in embodiments, the particular mail piece may be buffered to wait further processing (e.g., video coding and/or other manual interventions). Subsequent to triggering an alarm signal at step 126', the process proceeds to step 128'.

Letter and Flats Facing and Canceling in a Centralized Flat and Letter Facility-Wide Sorting and/or Sequencing System The present invention provides for the incorporation of automatic culling, facing, and canceling operations into a facility wide flats and letters sorting and/or sequencing system. Although many individual machines currently exist to perform these functions (or a subset of these functions) as a stand alone or independent operation, there is none incorporated into a facility wide flats and letters sortation and/or sequencing system.

The Letter Facer Canceller systems are a series (0 to many) of Letter Facer Canceller systems may be composed of a system that faces the mail, cancels the stamp, an address scanner, a barcode printer, a mechanical interface to convey mail from the output into the facility wide sortation system, and an electrical interface to communicate the associated address information to other components of the facility wide system in accordance with the invention. The Letter Facer Canceller may deliver some mail in a conventional manner (to a single output bin or bins) and some mail to the facility wide mail sorting and/or sequencing system. The Letter Facer Canceller may also communicate other information associated with a mail piece including mail image(s), indicia image(s) or characteristics, dimensions, barcodes, weights, sorter identification, and sortation information in accordance with aspects of the invention to other subsystems of the facility wide mail sorting and/or sequencing system.

Exemplary machines for performing the automatic culling, facing and canceling functions are disclosed in U.S. Patent Publication 2004/0073532, entitled, "Mail Processing Apparatus", by Shimizu, and assigned to NEC Corporation, and U.S. Pat. No. 7,235,791, entitled "Image Inputting Device", by Watanabe et al., and also assigned to NEC Corporation. These references are incorporated by reference in their entireties herein. While the current machines may be capable of performing their automatic culling, facing and canceling functions, the current machines perform these functions independently of the other activities occurring in the facility. Accordingly, if there is a malfunction in the current machines or if there is alternatively a malfunction in the other systems within the facility, there is a possibility that the automatic culling, facing and canceling functions could adversely affect the entire operation of the facility by processing too few flats and letters (malfunction in the automatic culling, facing and canceling machinery), or by processing too many flats and letters (malfunction in the other facility systems) resulting in an inconvenient accumulation of canceled products that require storage. For example, if there is a jam in the automatic culling, facing and canceling machinery, the jam could substantially disrupt the throughput of the entire facility.

Figure 2:
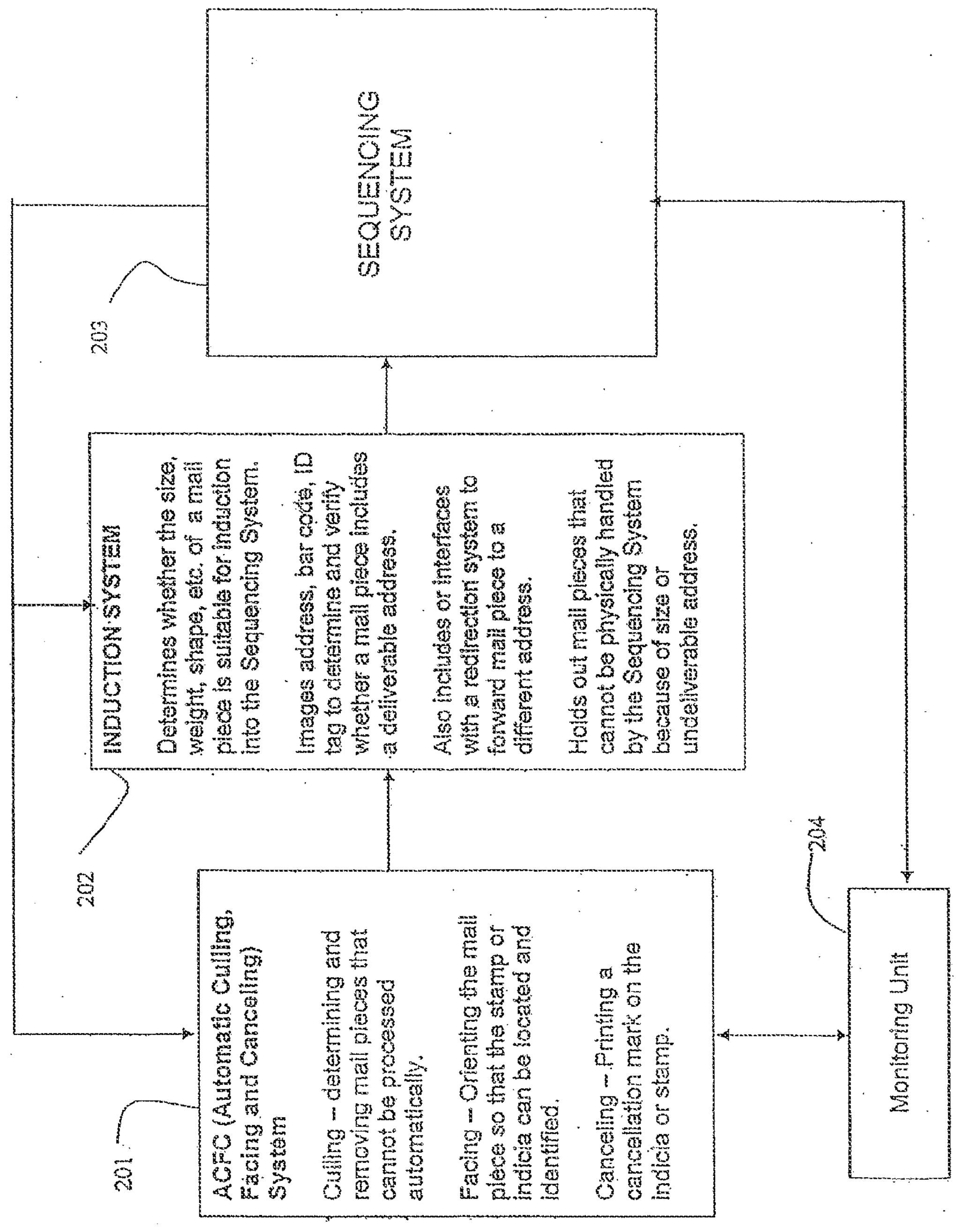
FIG. 2 is a block diagram that illustrates the relationship between an automatic culling, facing and canceling system, an induction system, and a sequencing system.

Referring now to FIG. 2, a block diagram illustrates the relationship between an automatic culling, facing and canceling ("ACFC") system 201, an induction system 202, and a sequencing system 203. (The ACFC is also known as an automatic facer canceler system (AFCS).) The ACFC system 201 is at the front end of facility operations and is configured to include:

- A unit for culling products that are unsuitable for sequencing;
- A unit for facing the products, which have not been culled, by determining the existence and location of a valid indicia and by orienting the products; and
- A unit for canceling the faced products having a valid indicia.

There is an interface between the ACFC system 201 and the sequencing system 203, and it is implemented as described above in the overview. In embodiments, two or more ACFC systems can be implemented by the present invention. The second or more of the ACFC systems can be redundant back up systems for performing the culling, facing and canceling functions when a monitoring unit indicates that the units are not functioning normally.

Once the incoming mail pieces or products have been culled, faced and canceled by the ACFC system 201, the mail pieces are sent to the induction system 202, for inserting into frames as described in another section of the instant application. The canceled mail pieces that are successfully inducted are input to the sequencing system 203. The sequencing system 203 monitors the throughput of the ACFC system 201 with a monitoring unit 204. It should be understood by those of skill in the art that the monitoring unit 204 may be a standalone system or incorporated into the sequencing system or any of its subsystems such as, for example, frame inserters, frame extractors, buffers, etc. If there are any malfunctions in the ACFC system 201, the monitoring unit generates a warning signal and the sequencing system 203 takes appropriate remedial measures. For example, the sequencing system 203 is capable of taking remedial measures such as activating backup ACFC systems 201 or slowing down other facility operations.

Transportable Storage Facilities for Expansion of Facilities without the Need for Additional Building and Easing Transitioning Into a Working Processing & Distribution Center The present invention is directed to a system which provides transportable storage facilities that allow expansion of facilities into external areas, such as parking lots. The present invention also provides the ability to expand facilities without the need for building additional structures, as well as easing the transition to the sorting and/or sequencing system into a working processing and distribution center.

A facility-wide letters and flats sorting and/or sequencing machine requires mail to be sequenced and stored prior to dispatch. This requires storage space for the mail for an entire day. In a modern Processing and Distribution Center (P & DC), this could mean storage in excess of five million mail pieces. To generate the maximum return on investment, the facility-wide sorting and/or sequencing machine of the present invention is preferably space neutral. In other words, the facility-wide machine as contemplated by the present invention preferably does not take up more space than the current manual and semiautomatic processes current in use by the postal facility or other sorting operations. While it is feasible that a single machine could be designed space neutral, the challenge comes when the new facility-wide machine is delivered, and the existing facility must be converted to the new facility-wide machine.

During the time of the transition, existing facilities should continue to process the mail. This means that there is no tolerance for the facility to be completely emptied of its existing machines and then to have the new facility-wide machine installed on the premises. To accomplish this objective, the present invention provides a mechanism of delivering the mail and still allowing new capability to be added to the processing system. This can be accomplished by providing a storage facility or sorting capability external to the existing facility. Since the storage capability in the facility-wide sequencing is the most floor space consuming operation, it is the most cost effective subsystem to locate external to the building.

In embodiments, the additional capability required during converting or "transitioning" to the facility wide sorting and/or sequencing system of the present invention is added through the use of portable storage and main trunk transport units positioned outside the P&DC structure. These portable storage and main trunk transport units can be provided in the P&DC parking lot and connected together to the existing facility, as disused herein. This gives the capability to convert at lowest cost plus giving the capability to add future additional surge capability to any facility as necessary.

Further, in addition to the actual transition time period and period of surges, this capability to sort and store external to the facility such as, for example, within semi-trailers, or packaging this capability into a shipping container, could be used to reduce or eliminate sorting/sequencing/storage within a P&DC or could easily be located at a delivery unit, such as a post office, or even be used to deliver the mail to a facility. For example, the sorting and storage could occur while in the portable storage and main trunk transport units, e.g., shipping container. This can occur while the shipping container is stationary or while moving or traveling, i.e., "en route". Shipping containers naturally may be used as a stand alone unit, typically called temporary trailers, or they can be transported by truck, as in a semi-trailer, or even on a train. This allows much functionality as to where mail sorting and storage of mail pieces occur. In embodiments, each portable storage and main trunk transport unit would be totally automatic and would be unmanned. In addition, they would be built to withstand vibration and temperature extremes, so they could perform sorting operations while moving.

In embodiments, the portable storage and main trunk transport units includes several aisles and levels to move mail pieces in frames or clamps. The frames can be transported to different levels and different storage units using lead screws and right angle diverts. In embodiments, each portable storage and main trunk transport unit includes the following features, as discussed throughout the present disclosure.

- The system automatically sequences mail pieces (defined as USPS letter mail, flats mail, and/or parcels).
- The system is located and/or attached and/or is contained within transportation vehicles.
- The system has a sequencing subsystem that sorts the mail pieces to a predefined sequence.
- The system has an input port for accepting mail pieces and/or frames. This input port, in embodiments, may be designed to accept shuttles.
- The system has an output port for retrieving mail pieces (or frames) in a predefined sequence. This port may be the same as the above noted input port. This outport, in embodiments, may be designed to accept shuttles.
- The system has a port for semi-automatically transferring mail in a predefined sequence from one transportation vehicle to another. This port may be the same as the ports discussed above.
- The system has storage to automatically store mail pieces before, during and after the sequencing operation.
- The system has a conveyance system for internally transferring mail pieces from the ports to the storage and the sequencing subsystems or other subsystems.
- The system has a conveyance system for internally transferring mail pieces from the storage and the sequencing subsystem (or other subsystems) to the output ports.

Figure 3A:
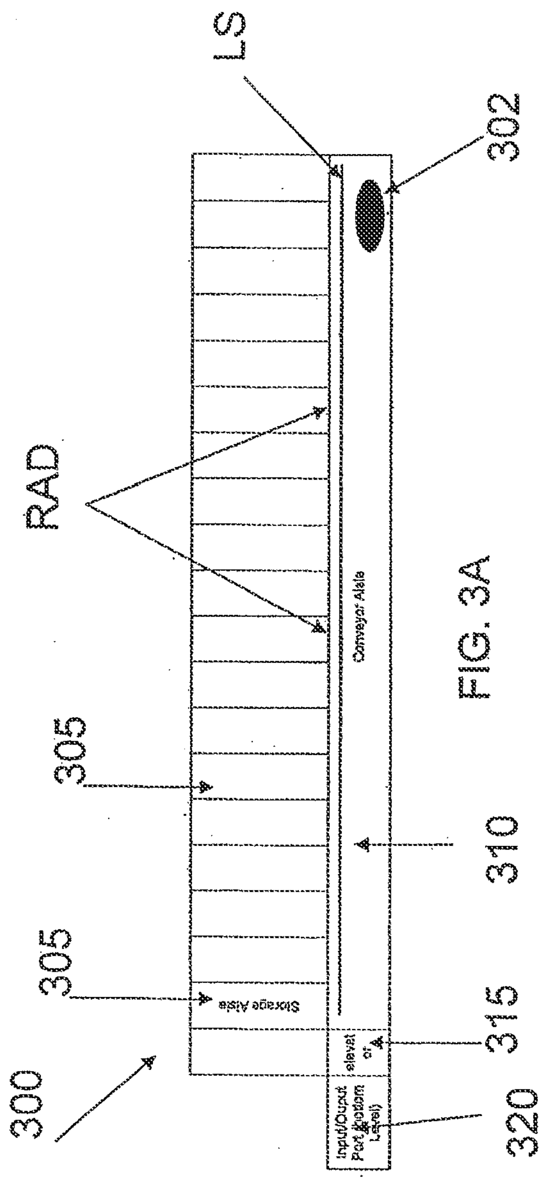
FIG. 3A shows a configuration of a portable storage and main trunk transport unit in accordance with aspects of the invention.

FIG. 3A shows a portable storage and main trunk transport unit, e.g., shipping container storage unit, in accordance with an aspect of the invention. In embodiments, the shipping container storage unit 300 is positioned outside the P&DC structure, such as in the parking lot, and is linked to the P&DC structure via conveying systems through an input/output port 320. In embodiments, the system may include a plurality of shipping container storage units 300, which are linked to each other and linked to the P&DC structure.

The shipping container storage units 300 are all designed to be able to withstand the elements of the outside environment. The elements which prevent vibration may include dampers shown at reference numeral 302 and/or rugged construction that can withstand the vibration during moving, and to sort while transporting. The system may also include encapsulated circuitry to protect the controls from the moisture, vibration, and temperature extremes. This encapsulated circuitry may be embodied in the computing infrastructure of FIG. 1, and may include the encapsulation as discussed in more detail with reference to the S.M.A.R.T. card of the instant application. In embodiments, the computing infrastructure of FIG. 1A may be remote from the shipping container storage units 300 and communication may be provided over a wireless network such as, for example, WiFi, etc.

The shipping container storage units 300 may include semi-trailers that are configured to be connected to a tractor, a truck, or a train. Accordingly, storing and sorting may occur within the shipping container storage unit 300 while the shipping container storage unit 300 is stationary or while it is moving. Each shipping container storage unit 300 is configured to be completely automatic, e.g., to be operated remotely, is constructed to withstand vibration and withstand temperature extremes (e.g., provided with insulation).

Still referring to FIG. 3A, the shipping container storage unit 300 includes a plurality of parallel storage aisles 305 for sorting and/or sequencing operations as should understood in view of other sections of the instant invention. In embodiments, the mail pieces are conveyed to each of the storage aisles 305 by a conveyor aisle 310. The conveyor aisle 310 includes a conveyance system, such as lead screws SL and right angle diverts RAD to move the mail pieces between the conveyor aisle 310 and bin locations in each storage aisle 305. The conveyor aisle 310 can also include compression and/or decompression zones as discussed in the instant application. The storage aisles can be configured to hold the frames in a certain order for sequencing thereof as discussed in the instant invention.

As shown in FIG. 3A, the shipping container storage unit 300 includes one or more input/output port 320. The input/output port 320 provides access from the exterior to the interior of the shipping container storage unit 300. Accordingly, the input/output port 320 provides the link or connection between the shipping container storage unit 300 and the P&DC, or the link or connection to another shipping container storage unit 300. The link or connection may include a conveying device, such as a conveyor belt, lead screws, conveyor belts with cogs, segmented screws, a shuttle docking station or conventional transports. Alternatively, the mail pieces may be moved between the P&DC and the shipping container storage unit 300 manually or via trucks. In such a case, the P&DC and the shipping container storage unit 300 are linked by the manual movement of the mail pieces or by the trucks.

The input/output port 320 is connected to the inside induction system and more specifically to the conveying aisle 310 and/or an elevator 315. This allows the mail pieces to enter and exit from the shipping container storage unit 300. In embodiments, the input/output port 320 may be connected between two or more of the shipping container storage units. Accordingly, mail pieces can be manipulated inside the P&DC or another shipping container storage unit and then transported outside to another of the shipping container storage unit and manipulated therein. Also, the mail pieces can be transported back into the P&DC or another shipping container storage unit for remaining operations.

Figure 3B:
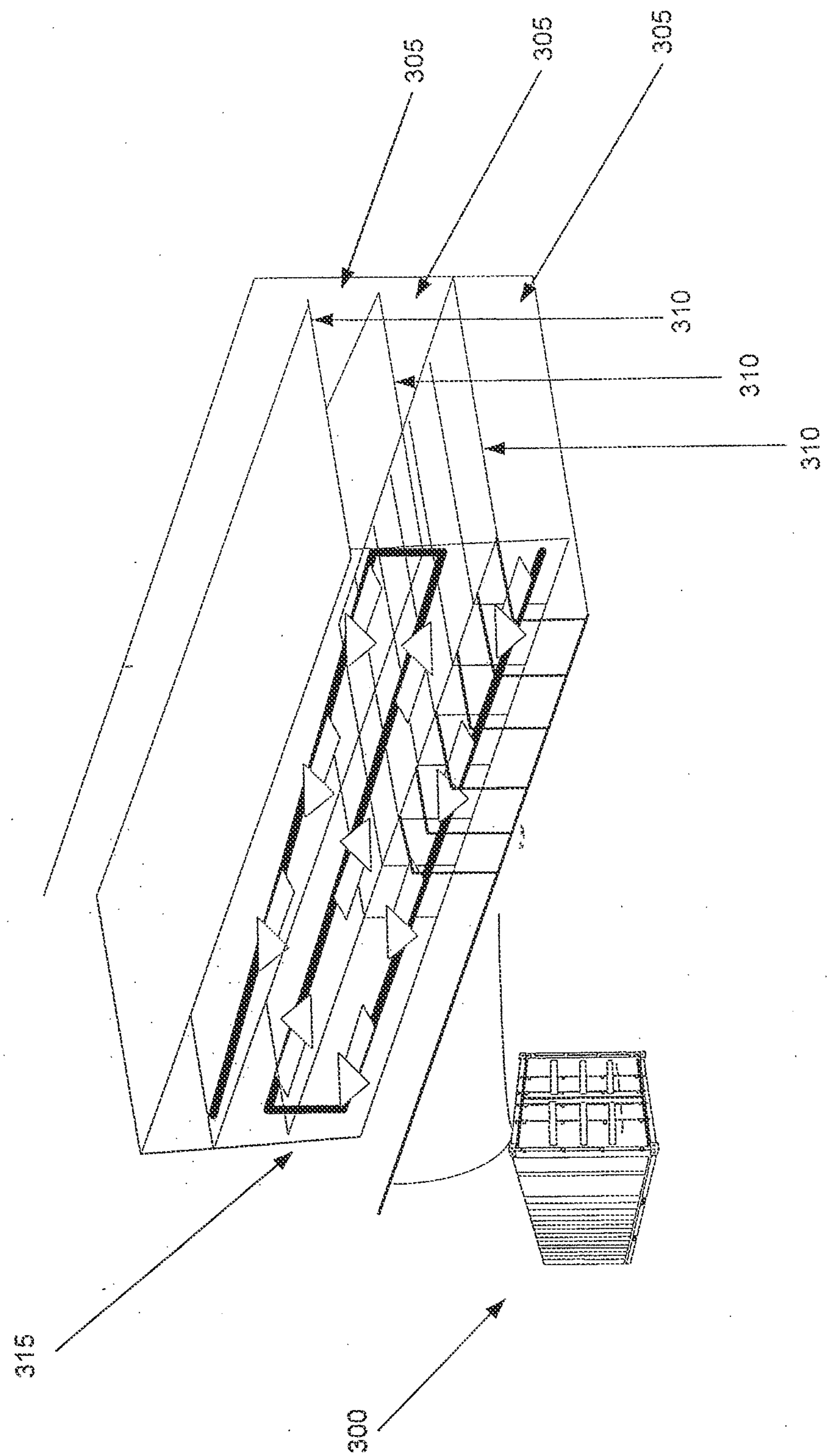
FIG. 3B shows a portable storage and main trunk transport unit in accordance with aspects of the invention.

Additionally, as shown in FIG. 3B, the shipping container storage unit 300 includes a plurality of vertically stacked storage aisles 305. In one contemplated embodiment, an eight foot tall shipping container storage unit 300 will accommodate four layers of storage aisles 305; although other amounts of layers are contemplated by the present invention. Further, each layer includes a conveyor aisle 310 that extends in a direction transverse to the storage aisles 305 and along the length of the shipping container storage unit 300. Mail pieces can be conveyed along the conveyor aisles 310 and stored in the storage aisles 305 on any of the levels. FIG. 3B also shows the elevator 315 that raises and lowers the mail pieces between the layers of storage aisles 305 and conveyor aisles 310.

It should be recognized by those of skill in the art that the shipping container storage unit 300 should not be limiting to a system for storing and sequencing of mail pieces, but may be implemented for any subsystem of the present invention. For example, it is contemplated that the shipping container storage unit 300 can be used for the induction and/or extraction of mail pieces into frames or any other subsystem as the P&DC facility is being dismantled and reassembled with the sorting and/or sequencing machine of the present invention. Illustratively, in the case that the sequencing and storage system is already installed in the facility, it is possible to have the induction of the mail pieces into frames provided in the shipping container storage unit 300. Once the frames are filled, they may be sent to the facility for sorting and/or sequencing operations. After the sequencing operations, the frames may be transported to the same or another of the shipping container storage unit 300 for extraction of the mail pieces. Any of the other processes described in the instant application are also contemplated for use in the shipping container storage unit 300.

Accordingly, the present invention provides a system in which the mail is processed while installing the new system. The system includes portable units including a trailer or a shell located in the parking lot during installation, so as not to be disruptive to the working system. Accordingly, the present invention provides both storage and a working subsystem of the new system, with no significant periods where the mail center is not processing mail. As such, in order to ensure that there is no significant interruption in the mail processing three options can be utilized for transitioning into the system of the present invention: gradual changeover, annex processing, and portable processing as recapped below.

Gradual Changeover

This strategy involves replacing input machines with the capabilities of the system of the present invention and phasing in delivery routes to the present invention until the entire P&DC has implemented the system of the present invention. Although the present system may rely on current sortation machines and storage areas to be replaced with buffers, transport conveyors, and storage units, the system of the present invention is designed to be space neutral. In this way, a partial system can occupy more space than the machine it replaces. Also to phase in output to specific delivery routes to be incorporated into a growing system, additional sortation may be required.

Annex Processing

Annex processing is used in addition to the gradual changeover. This strategy uses an Annex area that is temporarily built (or leased) to maintain a base of system capability to allow enough capability to gradually replace current P&DC processing machines. The Annex may either be a temporary of permanent facility for processing the mail pieces during a change over.

Portable Processing

This concept is again in addition to gradual changeover. In this case, additional capability is added through the use of portable storage and transport units positioned outside the P&DC structure (e.g., P&DC parking lot) and connected together. This gives the capability to transition at lowest cost plus giving the capability to add future additional surge capability to any plant as necessary.

Remote Access and Control of a Facility Wide Mail Piece Sorting and/or Sequencing System Conventionally, the network architecture in a USPS processing and distribution center is segmented into two networks: (1) the Facility network (which is tied to the Postal wide area network (WAN)) to which everyone in the postal service accesses; and (2) the Mail Processing Equipment (MPE) local area network (MPE LAN), which maintenance employees may access, e.g., maintain a MPE. This segmentation is done to accomplish two goals: (1) to prevent normal users on the Postal WAN from attaching to and controlling a MPE and (2) to prevent someone maintaining MPE from accessing the Postal WAN. In this way, the USPS carefully controls who has access to the MPE LAN, for example, typically only providing modem access for remote access to a MPE for troubleshooting purposes.

With a facility-wide mail sorting and/or sequencing system in accordance with the present invention, there are many large subsystems that should communicate simultaneously on a network. For example, a single sequencer may need to process five million mail pieces per day, through twenty feeding stations, and many different sequencing, storage, insertion, extraction and transportation systems. Additionally, each feeder provides high resolution images of each mail piece to subsystem in order to perform address recognition tasks. Also, the transportation, storage, sequencing, insertion and extraction systems use frame identifiers, e.g., bar code, in order to correlate to the mail piece therein and the sequencing plan. Each of these subsystem add to the network congestion. Thus, all motion, data collection, etc. should be coordinated by a system management function; however, such coordination communication also creates much network traffic.

According to an aspect of the invention, to facilitate communication, a discrete communication network or local LAN may be established between some of the individual subsystems for exchanging, for example, high-use data between the individual subsystems. Moreover, a plurality of these discrete networks or local LANs may be established for different groups of the individual subsystems. That is, the system may provide a number of discrete networks between a plurality of subsystems that, for example, share a large amount of data, to prevent too much communication data for a single network, which connects all of the subsystems. This allows for islands of isolation to be created within the facility-wide system to minimize dependence upon, for example, other subsystems or components, and to reduce network congestion on the network that connects all of the subsystems. That is, as discussed further below, in addition to the discrete networks or local LANs, all of the subsystems are connected to one another and the system management subsystem via another network or system management LAN. However, by providing the discrete networks, network traffic on the system management LAN connecting all of the subsystems and the system management subsystem can be reduced.

In embodiments, the above-described discrete networks or local LANs, also allow a remote user access to the system (or many different subsystems), e.g., for troubleshooting or maintenance. That is, according to a further aspect of the invention, in addition to above-described discrete networks or local LANs, a system management network is provided to facilitate communication between all the subsystems and also to allow a remote user to access the system, including all the subsystems, for, e.g., troubleshooting.

Figure 4:
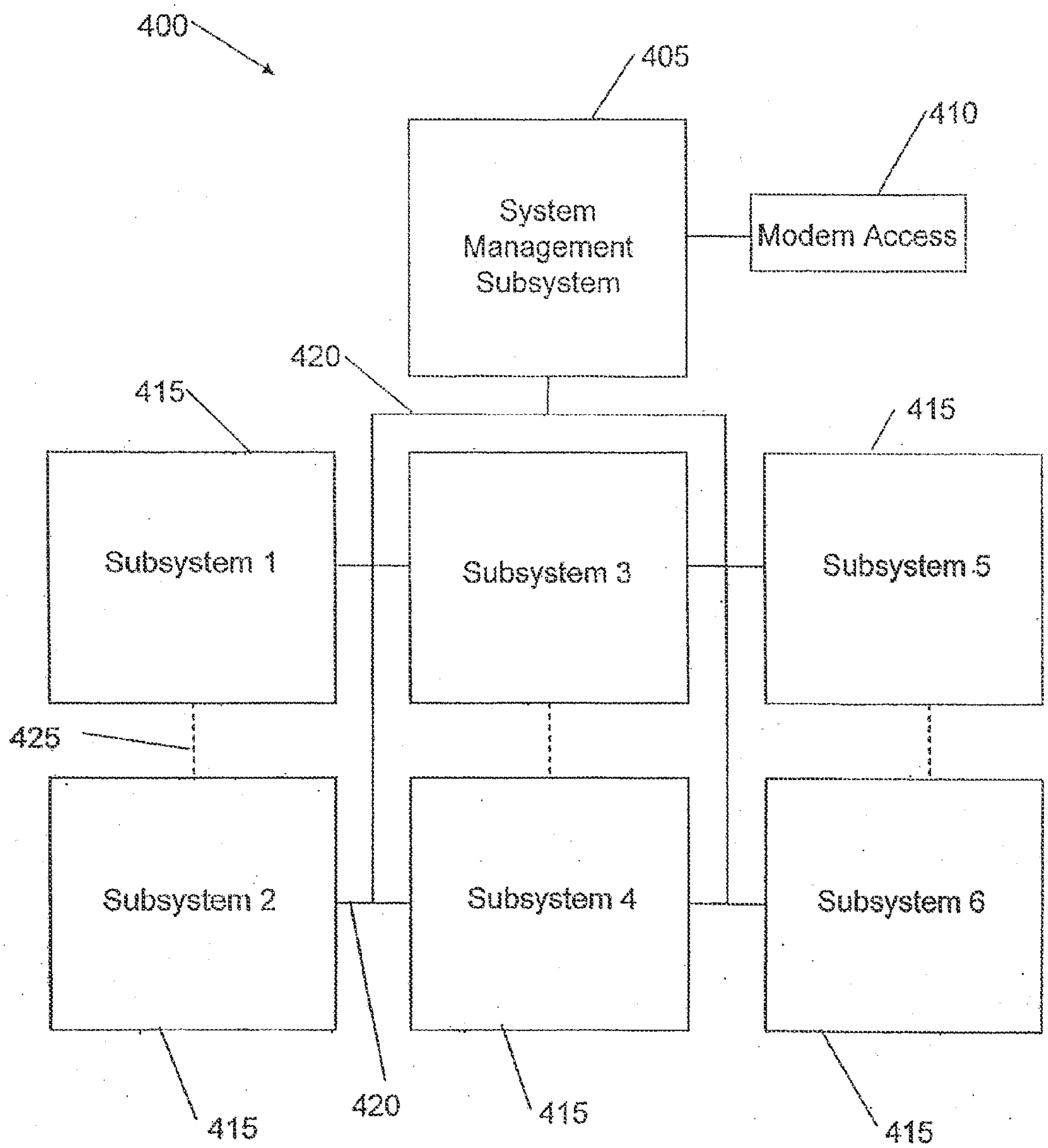
FIG. 4 shows a centralized server (System Management Subsystem) on a centralized network that attaches to all subsystems for the purpose of controlling and remote monitoring in accordance with aspects of the present invention.

FIG. 4 shows a system management subsystem 405. The system management subsystem 405 is a centralized server on a centralized network which communicates with all subsystems 415 in a network via a system management LAN 420 (indicated by the solid line) for the purpose of controlling and remote monitoring of all the subsystems. The system management subsystem 405 may be implemented on the computing infrastructure shown in FIG. 1, for example. The LAN may be a wired or wireless communication link, known to those of skill in the art. The overall system management and control are sent on the separate system management LAN 420, which is also used to allow an authorized and authenticated user to access any other computer (or subsystem) on the network. For example, once a remote user attaches to the system management subsystem 405 via the modem access 410, the user can use any of the utilities, e.g., remote desktop, to access any other subsystem on the network.

Moreover, according to an aspect of the invention, high-use data is routed on the local LANs 425 (indicated by the dashed lines) that are specifically set up between high-use subsystems (for example, those subsystems for address recognition). Thus, as shown in FIG. 4, for example, a local LAN 425 is provided between subsystem 1 and subsystem 2 and another local LAN 425 is provided between subsystem 3 and subsystem 4. The local LANs provide communication paths between the high-use subsystems, thereby alleviating network congestion on other communication paths, e.g., the system management LAN 420.

Thus, for example, using the above-described system management LAN and local LAN arrangement, one subsystem, e.g., an optical character recognition (OCR) scanner, may be on a separate local LAN 425 with a series of recognition subsystems. This allows the OCR scanner and other recognition subsystems to communicate between each other on the local LAN 425. Additionally, the subsystem, e.g., the OCR scanner, may provide status information on the mail, e.g., mail piece dimensions, to the central system, e.g., the system management subsystem 405, to determine, e.g., an appropriate frame size for the mail piece via the system management LAN 420.

Moreover, as shown in FIG. 4, the control and communication of the system and the subsystems of the present invention may be arranged in a hierarchical fashion, wherein a top tier level (e.g., the system management subsystem 410) forwards commands to lower tiers (e.g., the subsystems 415). Additionally, the routing and control is provided within the system itself.

Centralized Address Recognition System and Method for a Facility-Wide Sorting and/or Sequencing Machine The invention relates to a system and method for providing centralized address recognition in a facility-wide mail sorting and/or sequencing system. The invention also provides a system and method for associating video coding returns with mail pieces and frame and/or clamp identification in a facility-wide mail sorting and/or sequencing system. In embodiments, the centralized address recognition system utilizes a centralized address recognition sub-system which communicates and/or interfaces with each of a facing canceling sub-system, a mail piece feeding sub-system, a flats feeding sub-system, and a parcel feeding sub-system.

The ability to recognize addresses is important to all mail sorting and sequencing operations. In typical mail processing systems, video coding is performed such that addresses are read by photographing a face of the mail piece (i.e., the face of the envelop) at one or more machines and locations. For example, addresses can be read at an:

- Automatic Facer Canceller Machine,
- a barcode reader with an input to perform address recognition, i.e., DIOSS (Delivery Barcode Sorter Input/Output Subsystem),
- DBCS/ISS (Delivery Bar-Code Sorter/Information System Services), (if it is not accomplished at presort and translated into a barcode), or
- a dedicated subsystem such as, for example, a MLOCR (Multi Line Optical Character Reader).

Once the photograph is taken, it is forwarded to an "on-board" mail piece recognition system to determine the address or the ZIP code.

An onboard "recognition" engine will resolve a high percentage of addresses (e.g., around 90%); however, about 10% of addresses which are not resolved need to be forwarded to a bank of video terminals that allow operators to resolve the addresses. This is done by a laborious process of keying addresses after viewing the photographs. Since operators along with the required queuing of information and awaiting results takes a considerable amount of time (typically more than the buffer of any current sorting machine), the mail pieces that require address recognition are typically identified with a bar code. In subsequent sorting operations (e.g., performed after the video coding takes place), the bar code can be looked up in a table and the results then placed on the mail pieces.

In a facility wide sequencing system, mail pieces that are not recognized with "on-board" recognition can also be forwarded to manual video coding stations. But in a facility wide system, sorting occurs typically with very little delay and therefore the mail pieces may need to be assigned to a buffer. There are costs associated with having mail pieces stacked up in a buffer, however. As a result, it can be cost effective to put in another layer of machine recognition at the full system level in an attempt to recognize the addresses. This can be accomplished by use of known algorithms for system level recognition.

Presently, some address recognition algorithms are not present on individual machines or sub systems due to their proprietary nature, especially for the recognition engines in the input feeder subsystems (which are very expensive to update). Furthermore, keeping all input feeders and other sub systems (each with different architectures and interfaces) up to date with the same recognition algorithms and ensuring the availability of the input processing power necessary to simultaneously perform multiple algorithms on an individual feeder and other sub systems can be costly. As a result, it is advantageous to have a centralized recognition capability as a subsystem to the facility wide sorting system, itself.

In implementations, using current sorting approaches, identification codes are placed on individual mail pieces. Subsequent sorting operations, which usually take place on different sorting machines and/or subassemblies, read the barcode and look up the address assignment by the barcode on the mail piece, if necessary. However, with a facility wide sortation system, the mail piece is not always available to scan and, therefore, a barcode will identify the individual frames and/or clamps that contain the mail piece. The mail piece can then be sorted and sequenced by associating the bar code with the mail piece address. When video encoding is required, the mail piece information can be updated by updating the information about the mail piece. Of course, the mail piece information is associated with the frames and/or clamps identifier to be effective. Thus, the ability to associate mail piece information with the frames and/or clamps identification (ID) and to use a mail piece recognized result is an advantage of the invention.

Figure 5:
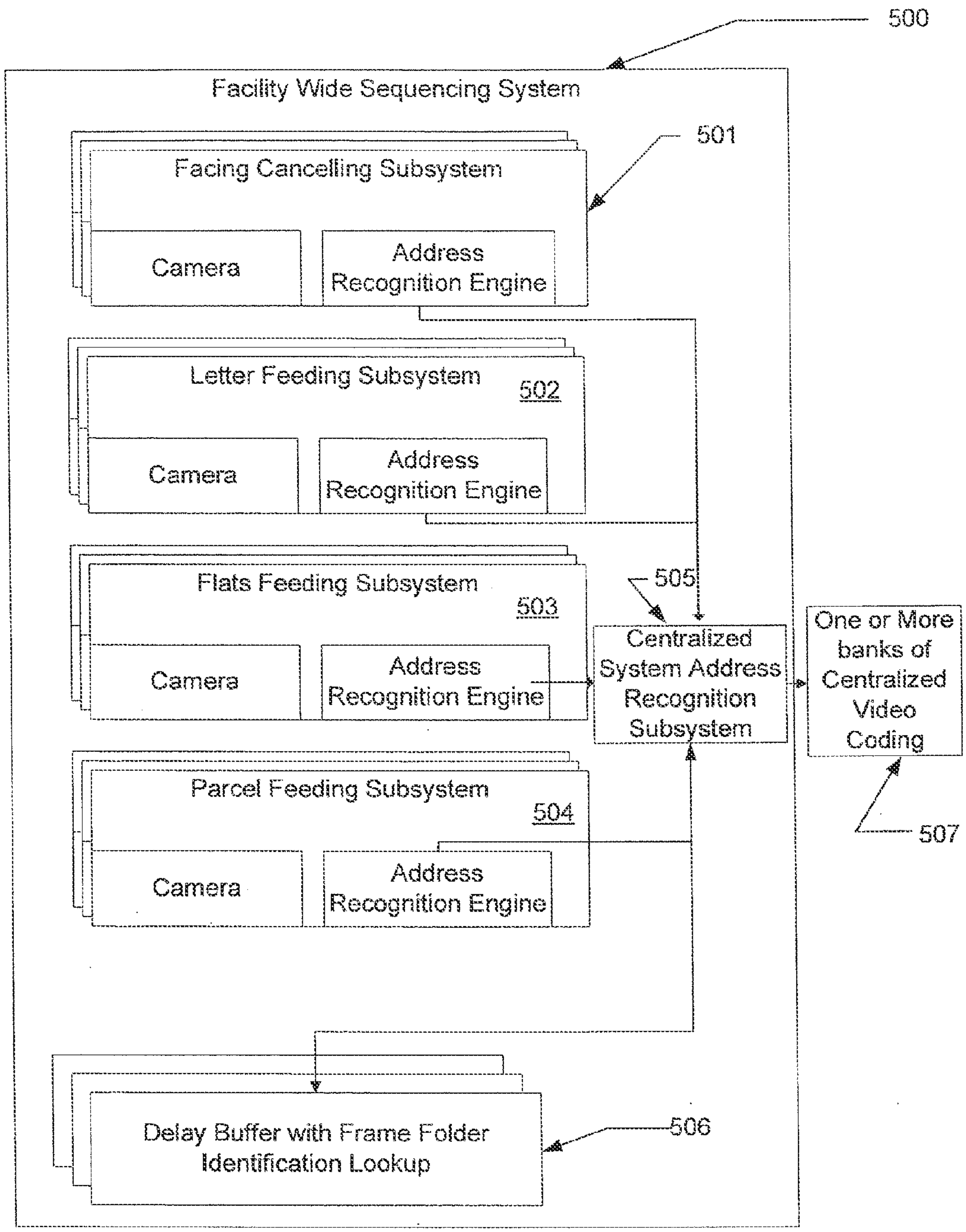
FIG. 5 show a centralized address recognition system in accordance with aspects of the invention.

FIG. 5 shows a system and method for providing centralized address recognition in a facility wide sorting and/or sequencing system with multiple layers of "onboard recognition" in accordance with aspects of the invention. More specifically, FIG. 5 shows a system 500 that includes several subsystems 501, 502, 503, 504, each with the capability to read address information and provide such information to a respective address recognition system. In embodiments, the subsystems 501, 502, 503, 504 provide the address information to a centralized system address recognition sub-system 505 in order to resolve the address information. The centralized system address recognition sub-system 505 can be implemented in the computing infrastructure of FIG. 1A and is capable of reconciling address information with the frame and/or clamp identification and associated mail piece in order to sort and/or sequence the mail pieces. Advantageously, each subsystem 501, 502, 503, 504 can take a picture of the address at different locations and at different sub system levels within the sorting and/or sequencing system, and provide this information to an onboard recognition engine. The onboard recognition engine of each subsystem can then be provided to the centralized address recognition subsystem 505. As such, there are several opportunities to photograph and resolve the address information throughout the system thereby potentially eliminating the need for operator assistance and intervention.

In particular, the system 500 includes one or more facing canceling sub-systems 501. The one or more facing canceling sub-systems 501 each include a camera system and an address recognition engine. The one or more facing canceling sub-systems 501 can be of a conventionally known facing canceling sub-system or specifically configured for use with a facility-wide mail pieces sorting and/or sequencing system disclosed in the instant application.

The system 500 also includes one or more letter feeding sub-systems 502. The one or more letter feeding sub-systems 502 each include a camera system and an address recognition engine. The one or letter feeding sub-systems 502 can be of a conventionally known mail piece feeding sub-system or specifically configured for use with a facility-wide mail pieces sequencing system disclosed in the instant application.

The system 500 additionally includes one or more flats feeding sub-systems 503. The one or more flats feeding sub-systems 503 each include a camera system and an address recognition engine. The one or more flats feeding sub-systems 503 can be a conventionally known type or specifically configured for use with a facility-wide mail pieces mail sequencing system disclosed in the instant application.

The system 500 further includes one or more parcel feeding sub-systems 504. The one or more parcel feeding sub-systems 504 each include a camera system and an address recognition engine. The one or more parcel feeding sub-systems 504 can be a conventionally known type or specifically configured for use with a facility-wide mail pieces sequencing system of the type disclosed in the instant application. Those of skill in the art will appreciate the distinction between letters, flats and parcels and, as such, further explanation is not required herein. The use of mail piece(s), though, should be understood to encompass all types of mail and/or product, regardless of the size and shape of the mail and/or product.

FIG. 5 also shows a centralized system address recognition sub-system 505. This centralized system address recognition sub-system 505 receives information, i.e., photographs of addresses, from the address recognition engines of the sub-systems 501, 502, 503 and 504 via a communications link such as a wireless or wired link known to those of skill in the art. The centralized system address recognition sub-system 505 can utilize one or more known algorithms to resolve the addresses. If the addresses are resolved, the mail pieces can be sent to a buffer system 506. Non-limiting examples of the buffer system 506 include the system described herein with reference to FIG. 21. This is facilitated by a communication link between the buffer system 506 and centralized system address recognition sub-system 505.

If the addresses are not resolved by the centralized system address recognition sub-system 505, the mail pieces can be sent to one or more banks of centralized video coding 507. The one or more banks of centralized video coding 507 can be of a conventionally known type or of specifically configured for use with a facility-wide mail pieces sorting and/or sequencing system disclosed in the instant application.

Facility Management and Inter-Facility Letter and Flat Mail Scheduling

The invention is directed generally to mail handling and processing and, more particularly, to a method and system for facility management and inter-facility letter and mail scheduling. In embodiments, a system management server is provided that receives data from a number of sources that are both internal and external to a mail processing and distribution center (P&DC). Based upon the data, the system management server generates assignments for handling all of the mail within the P&DC, in real time. The assignments may be related to, for example, dock receipt of the mail, scheduled movement of mail within the P&DC, storage of mail at locations in the P&DC, processing of the mail in a facility wide sorting and/or sequencing system, and dispatch of the mail from the P&DC. By continuously updating the various handling assignments as new data is received, the system management server provides a dynamic material management system for a P&DC.

In a typical processing and distribution center (P&DC), mail arrives all day long. However, because of the method in which the mail is sorted, most mail processing occurs in the late evening or early morning. This conventional mail processing profile is not caused by the truck arrival schedule, but by the underlying sorting algorithm. This is due to the fact that in conventional P&DC sort methodologies, a local mail piece is sorted approximately three times (e.g., goes through three passes) to sort to the delivery point sequence, DPS (e.g., delivery address). In such multi-pass systems, the entire first pass is completed before the second pass begins. Since the first pass is typically not completed until late evening, most of the processing occurs in the late evening and early morning. This creates the need for many more machines and operators than would be necessary if mail was more evenly processed all day long.

Figure 6A:
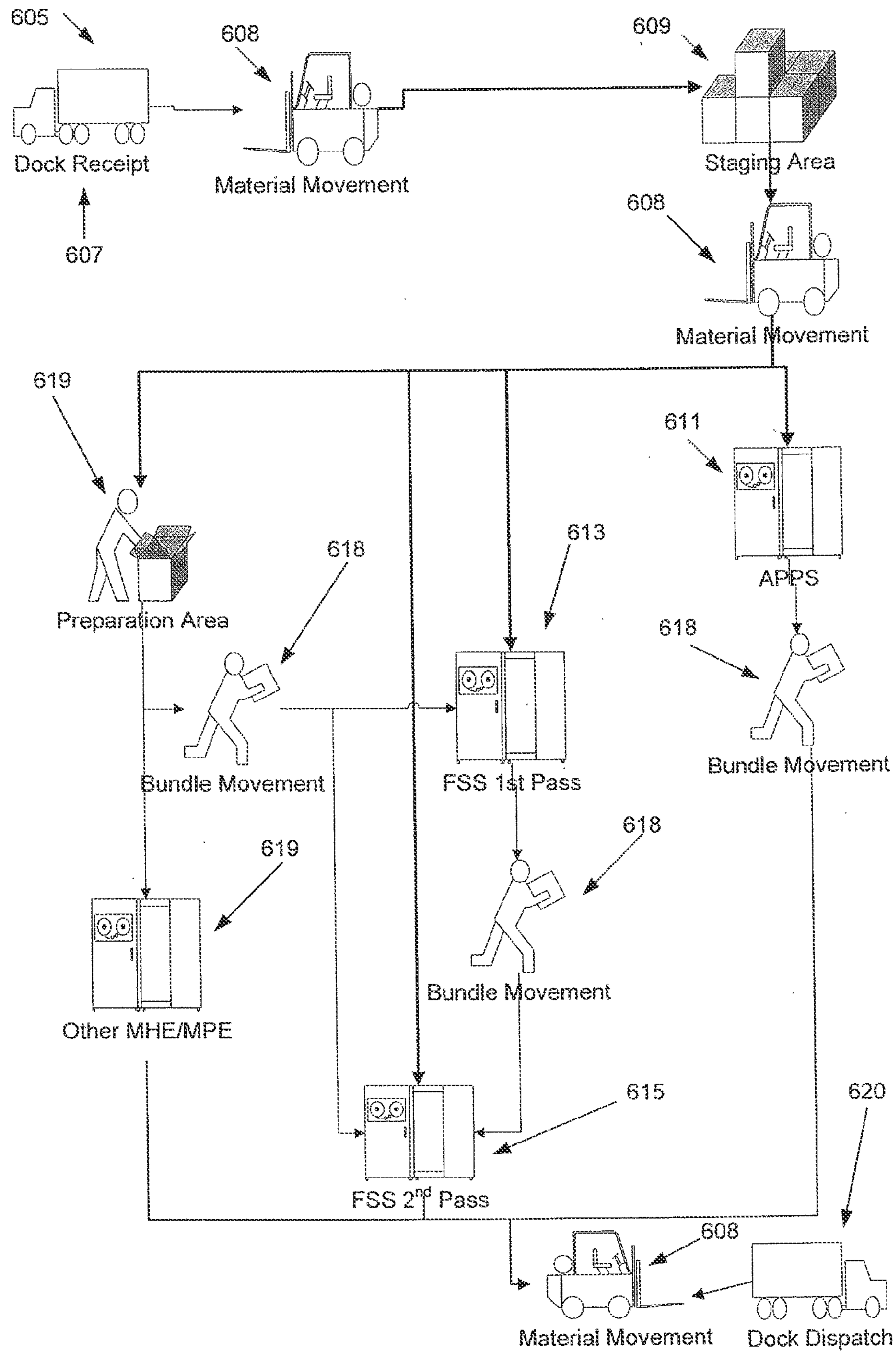
FIG. 6A shows an exemplary P&DC material processing flow for conventional sorting systems.

Moreover, in a conventional P&DC, there is a large amount of manual movement of objects throughout the sorting process. For example, as depicted in FIG. 6A, mail objects arrive at a conventional P&DC 605 at a dock receipt 607 (e.g., loading dock). The mail objects may include letters, flats, parcels, etc., and typically arrive in bulk, such as, for example, on pallets, in bundles, etc. From the dock receipt 607, the mail objects are manually moved via material movement 608 to a staging area 609. The material movement 608 may be a forklift that moves a pallet of mail, and the staging area 609 typically comprises an assigned space where the pallet is temporarily stored before it is processed.

Still referring to the conventional P&DC 605 in FIG. 6A, mail objects are moved from the staging area 609 to one of many different types of processing machines for sorting the mail. For example, parcels may be delivered to an Automated Package Processing System (APPS) 611, flats to a Flats Sorting Sequencer (FSS) 613, as are known such that further explanation is not believed necessary. Other mail may be delivered to a preparation area 617 where, for example, strapping and shrink wrap are removed. From the preparation area, bundles of mail are manually moved (e.g., via bundle movement 618) to other mail handling equipment (MHE), mail processing equipment (MPE), or to the FSS 613. After sorting of the different types of mail on the different machines, different types of that could not be sorted are hand-cased and output from the P&DC 605 at dock dispatch 620. Included in the conventional sorting arrangement shown in FIG. 6A are numerous manual movements of mail (e.g., material movements 608 and bundle movements 618).

In contrast to the conventional sorting arrangement shown in FIG. 6A, the facility wide sorting and/or sequencing system of the present invention uses a different sorting algorithm and a different sorting paradigm as described in the instant application. In embodiments, due to the different paradigm the facility-wide sorting and/or sequencing system comprises a comprehensive system that accepts different types of mail (e.g., letters, flats, etc.), sequences the different types of mail together, and outputs a single stream of sequenced mail. In this manner, much of the manual handling of mail (e.g., bundle movement and hand casing described above with respect to FIG. 6A) is eliminated.

More specifically, in accordance with aspects of the invention, mail arrives at a P&DC all day long and may be temporarily stored or input into a facility-wide sorting and/or sequencing system as it arrives. In embodiments, the facility-wide sorting and/or sequencing system sorts the mail and stores it until it is discharged at dispatch, which allows more judicious use of resources and eliminates the need for many feeders and operators. The facility wide sorting and/or sequencing system has different types of feeders to input the various types of mail (e.g., letters and flats). Additionally, the facility-wide sorting and/or sequencing system includes plural ones of the different types of feeders for capacity and redundancy. In implementations, the facility-wide sorting and/or sequencing system typically operates twenty hours a day and stores all the mail internally until the time of dispatch. In this manner, the facility-wide sorting and/or sequencing system is an automated machine that automatically processes and sequences the mail internally to the machine, whereby the sequencing algorithm is independent of when the mail arrives. This allows mail to be input into the facility-wide sorting and/or sequencing system anytime within the service window, and eliminates the need to complete a first pass before beginning a second pass, as with the conventional multi-pass systems.

As the inventive facility-wide sorting and/or sequencing system is highly automated, scheduling functions within the system allow a supervisor to schedule input of mail into feeders based on the availability of the feeders and personnel to operate the feeders, which allows mail to be more evenly processed all day long. Due to such automation, implementations of the facility-wide sorting and/or sequencing system typically utilize less operators and feeders, resulting in less peak mail processing power than a conventional P&DC. Thus, in the facility-wide sorting and/or sequencing system, there is an increased emphasis on forecasting the arrival of mail at the P&DC, efficiently and precisely handling the mail within the P&DC prior to induction into the feeders, and scheduling the input of mail into the feeders.

Accordingly, in embodiments of the invention, there is provided a material management system that operates to, among other things, obtain data from sources external to the P&DC, obtain data from sources internal to the P&DC, and generate material receipt, storage, movement, and dispatch schedules for material in the P&DC in real time. The material management system may include features of the Dock Management System (DMS) disclosed in U.S. Patent Application Publication Number 2006/0271234, published Nov. 30, 2006, the disclosure of which is hereby incorporated by reference in its entirety.

The material management system is a system and method that integrates various systems to provide an overview of existing containerized mail including but not limited to pallets, trays, tubs, and rolling stock, expected containerized mail, and sortation equipment capacity and predicted throughput in a facility such as a P&DC. The material management system comprises a server that utilizes existing databases to efficiently identify staging area assignments, schedule internal material deliveries, automatically calculate internal plant routing of materials, notify when internal delivery commitments cannot be met, and incorporate internal delivery verification. This information can then be used to perform numerous tasks such as, for example, storing, tracking, and managing pallets on the dock and throughout the sortation process, predicting workload, generating and monitoring sortation schedules. Additionally, the material management system automatically provides staging assignments for incoming pallets, provides staging areas within the existing facility footprint, schedules and tracks pallets from the dock to the point of consumption, assists in scheduling and tracking of sorting operations, alerts personnel when priorities and schedules cannot be met, and generates alternate processing recommendations in the event of exception conditions such as sortation system failures and pallet cancellation.

Figure 6B:
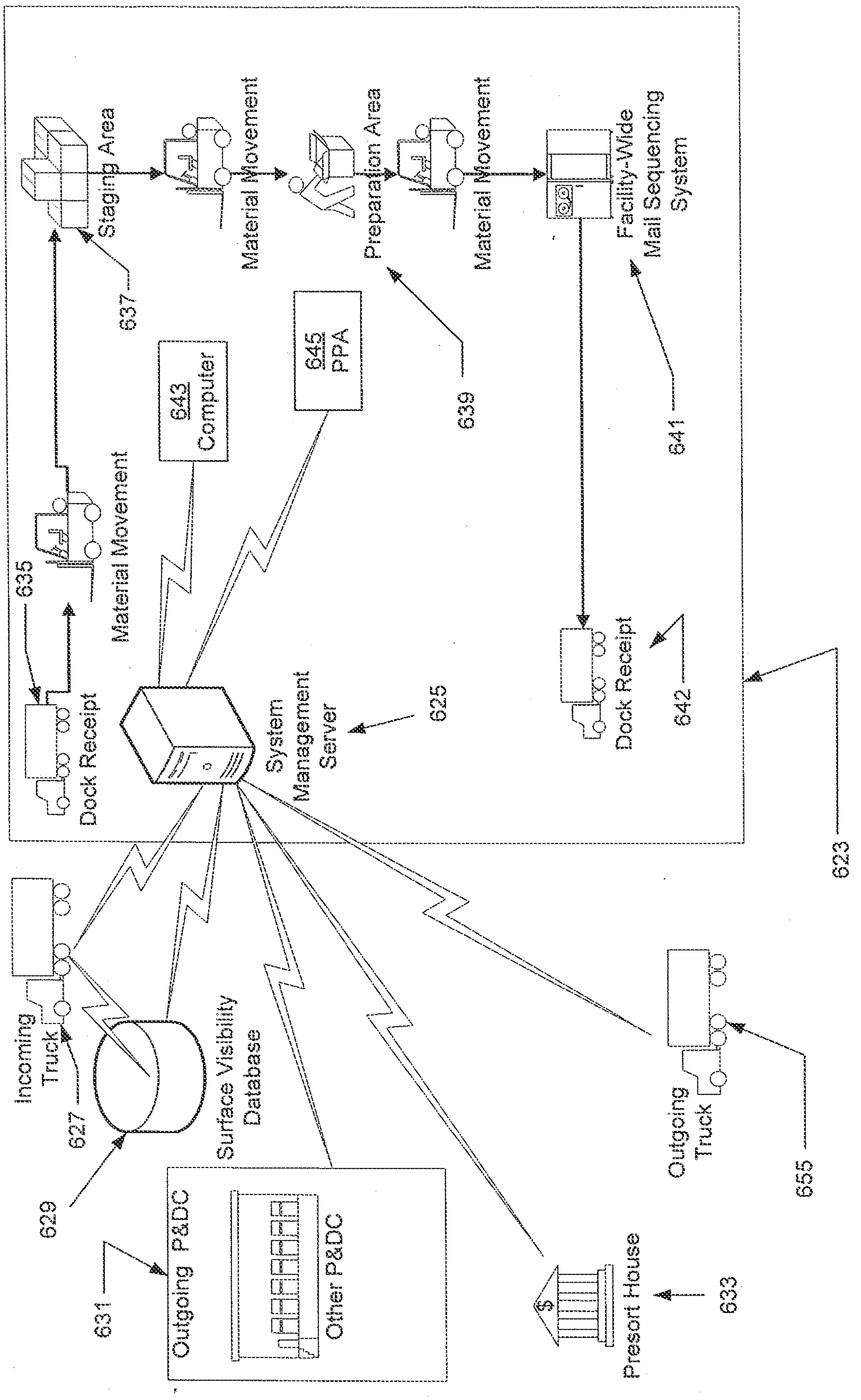
FIG. 6B shows an exemplary P&DC material processing flow for a facility-wide sorting and/or sequencing system in accordance with aspects of the invention.

In further embodiments, the material management system also takes into account data from external sources such as, for example, global positioning system (GPS) and data from other facilities, while applying the methodology to a facility-wide sorting and/or sequencing system. For example, as depicted in FIG. 6B, a P&DC 623 utilizes the facility-wide sorting and/or sequencing system comprises a system management server (SMS) 625. The system management server 625 may be the same as the system manager described in other parts of the instant application. In embodiments, the system management server 625 may be implemented in the computer infrastructure shown in FIG. 1A. In further embodiments, the system management server 625 comprises appropriate programming to provide some or all of the functions of a DMS server (referred to as element "10" in U.S. Pub. No. 2006/0271234), or may be communicatively connected to a DMS server, to perform the processes described herein. For example, the system management server 625 may be programmed with logic and business rules that provide handling assignments (e.g., receipt, movement, storage, processing, and dispatch) for all of the mail in the P&DC 623 in real time based upon data from sources internal and external to the P&DC 623.

According to aspects of the invention, the system management server 625 receives or obtains data regarding incoming mail from at least one external data source including, but not limited to: incoming trucks 627, a surface visibility database 629, another P&DC 631, and a presort house, warehouse or other facility 633. The system management server 625 also receives updates from sources internal to the P&DC 623, including, but not limited to: available pallet storage space within the facility, anticipated future incoming pallets, characteristics of the pallet, time needed to process the pallet, schedules of other pallets, deadline for processing the pallet, operational status of components of the facility-wide sorting and/or sequencing system machines (e.g., input feeders) needed to process the pallet, sort plan of the facility-wide sorting and/or sequencing system, etc.

Based upon the data from both the internal and the external source(s), the system management server 625 generates assignments and schedules for handling mail within the P&DC 623. For example, the system management server 625 may generate handling assignments including, but not limited to: where and when to receive mail (e.g., pallets) at dock receipt 635, where and when to move pallets to the staging area 637, where and when to move pallets to the preparation area 639, where and when to move pallets to the facility-wide sorting and/or sequencing system 641, where and when to dispatch sequenced mail from the facility-wide sorting and/or sequencing system 641 to dock dispatch 642, and what personnel will be utilized to perform such tasks.

As will be apparent to one of ordinary skill in the art, the system management server 625 dynamically updates the handling assignments for all of the mail within the P&DC 623 based upon updates received from the internal and/or external data sources. For example, the act of assigning a pallet to a particular storage location may affect the management and handling of other pallets of the facility. Put another way, when the system management server 625 assigns a pallet to a location, then that location is no longer available for other pallets. This new data (e.g., one less storage location) may affect the results of subsequent operations of staging assignment, scheduling assignment. As another example, if a pallet is moved from location "A" in the staging area 637 to location "B" in a preparation area 639, then the system management server 625 can ascertain that there is now an open storage location at area "A" and may determine that an anticipated incoming pallet may be placed in this location upon receipt of that incoming pallet at the dock 635.

As an example of data received from an external source, a presort house 633 may transmit data to the system management server 625 that a shipment of eight thousand periodicals will be delivered to the P&DC 623 at noon on the next working day. With this data, and based upon already known data of what loading docks will be in use at the expected delivery time, the system management server 625 may generate an assignment to receive the shipment at a particular loading dock, at a particular time, and with particular personnel assigned to the task. Additionally, based upon other data parameters (e.g., due date of the periodicals, availability of storage space within the P&DC 623, availability of input feeders of the facility wide sorting system, etc.), the system management server 625 may generate a movement schedule for the periodicals throughout the P&DC 623. This schedule may include, for example, the schedule to place the periodicals in frames by use of frame inserters, etc.

In another example of external data, the system management server 625 may receive data from another P&DC 631, which is sending mail to the P&DC 623. Particularly, a centralized processor in a facility wide sorting and/or sequencing system at the other P&DC 631 records information of every mail piece in its facility wide sorting and/or sequencing system. The information may include, for example: address information, size weight, and even position in the system. This information is stored in internal databases, reported to postal mail tracking applications, and is available to other authorized systems and users in accordance with the invention. At the other P&DC 631, outgoing mail is input into the system and subsequently output to waiting trucks. As soon as the mail is processed, the information may be recorded to databases. The estimated time of arrival from the other P&DC 631 to the receiving P&DC 623 may be calculated from the daily truck arrival schedule and historical transportation data. This information, amongst other information such as, for example, the type of mail, the sort depth of the mail, etc., is then forwarded to the system management server 625 of the receiving P&DC 623, which may use this information to update its own handling assignments (e.g., receipt, movement, storage, processing, and dispatch) of mail within the P&DC 623.

In another example, GPS data associated with incoming trucks 627 may be utilized by the system management server 625. Particularly, when the system management server 625 receives or obtains data from any one of a surface visibility database 629, another P&DC 631, and a presort house 633, the data may include an indication of a shipment of incoming mail on an incoming truck 627. More specifically, the data may include, but is not limited to: a unique identifier of the incoming truck 627, pallet characteristics (e.g., type of mail, class of mail, due dates, sort depth of the mail, etc.), and expected delivery date and time. Furthermore, the incoming truck 627 may be equipped with a GPS system that gives a real-time location of the truck. The system management server 625 may receive the GPS data, transmitted from either the truck 627 or the GPS service provider. By monitoring the GPS-based location of the incoming truck 627 in real time, the system management server 625 may periodically refine its estimation of when the incoming truck 627 will arrive at the loading dock. Accordingly, the system management server 625 may use this updated arrival time (e.g., based upon the GPS data) to update its handling assignments (e.g., receipt, movement, storage, processing, and dispatch) for all of the mail in the P&DC 623 in real time.

As another example, based upon real-time updated data (from both internal and external sources), the system management server 625 may verify that a previously assigned receiving dock at dock receipt 635 is available for an incoming truck 627, or may assign a different receiving dock to the incoming truck 627. The updated receiving dock assignment may be transmitted to the incoming truck 627 (or the driver told when the incoming truck 627 arrives). Additionally, based upon the totality of the data, the system management server 625 may schedule dock personnel to unload the incoming truck 627, and notify the scheduled personnel via computer 643 and/or PDA 645.

Moreover, data from external sources (e.g., GPS data from an incoming truck 627 or an outgoing truck 655) may be used by the system management server 625 in scheduling the processing of mail in the facility-wide sorting and/or sequencing system and dispatch of mail from the facility-wide sorting and/or sequencing system. For example, based upon data that loading dock space is not available at dock dispatch 642, or if outgoing trucks 655 are not available to receive dispatched mail, the system management server 625 may instruct the facility-wide sorting and/or sequencing system 641 to delay dispatching mail from the facility-wide sorting and/or sequencing system until such dock dispatch 642 and outgoing trucks 655 are available. As mail can be temporarily stored in the facility-wide sorting and/or sequencing system, the system management server 625 may be programmed to delay dispatch until just before dock dispatch 642 and outgoing trucks 655 are available.

In another example, the system management server 625 may delay dispatch from the facility-wide sorting and/or sequencing system 641 to await inclusion of mail that is inbound on an incoming truck 627. In embodiments, the facility-wide sorting and/or sequencing system 641 performs one dispatch per day. Also, as a general rule, first class mail is processed by a P&DC on the day it is received. The system management server 625 may be programmed to delay dispatch by a predefined amount of time if GPS data associated with an inbound truck 627 carrying first class mail indicates that the first class mail will arrive within a predetermined acceptable amount of time. The system management server 625 may also be provided with logic that determines (e.g., based upon GPS data of an inbound truck 627), that the first class mail on incoming truck 627 will arrive too late for inclusion in the current sequencing of the facility-wide sorting and/or sequencing system 641. Accordingly, the system management server 625 would allow the dispatch to occur at the scheduled time, and alert a supervisor that the incoming first class mail needs special handling upon arrival.

In an even further example, the system management server 625 updates handling assignments for mail within the P&DC 623 based upon operation status of the processing machinery. For example, if the system management server 625 ascertains from internal data that a first input feeder of the facility-wide sorting and/or sequencing system 641 is operating at maximum capacity or even behind schedule by a certain amount of time, then the system management server 625 may dictate that no more pallets be moved to that first input feeder until the backlog is cleared, or that pallets be routed to other input feeders that can handle the workload.

Thus, according to aspects of the invention, information from internal and external sources is received by the system management server 625 at the local P&DC 623 and is used to update material handling operations in the P&DC 623 and the planning for processing within the facility wide sequencing machine. In embodiments, the system management server 625 updates the handling assignments (e.g., receipt, movement, storage, processing, and dispatch) for all of the mail in the P&DC 623 in real time when updated data is received. Although particular data may be associated with a subset of mail, the data may have an effect on the handling assignments (e.g., receipt, movement, storage, processing, and dispatch) for potentially all of the mail within the P&DC 623. In this manner, the system management server 625 provides a comprehensive material management system for facilities that utilize a facility wide sorting and/or sequencing system.

In addition to coordination input (receipt) operations from other P&DCs, dispatch operations can be coordinated with incoming trucks delivering mail to local delivery unit (post offices). For example, if trucks arrive late and the mail is dispatched from the system, the result is a need for a staging area until the truck does arrive and the need to transport the mail from the staging area to the actual dock. This extra effort could be reduced by having truck arrivals automatically estimated by GPS. Therefore the mail could remain in the system until right before the truck arrives. If any manual processing is required due to trucks arriving late, this labor can be automatically scheduled and coordinated through the system. The system also can communicate directly with the delivery unit to help with individual scheduling.

Figure 6C:
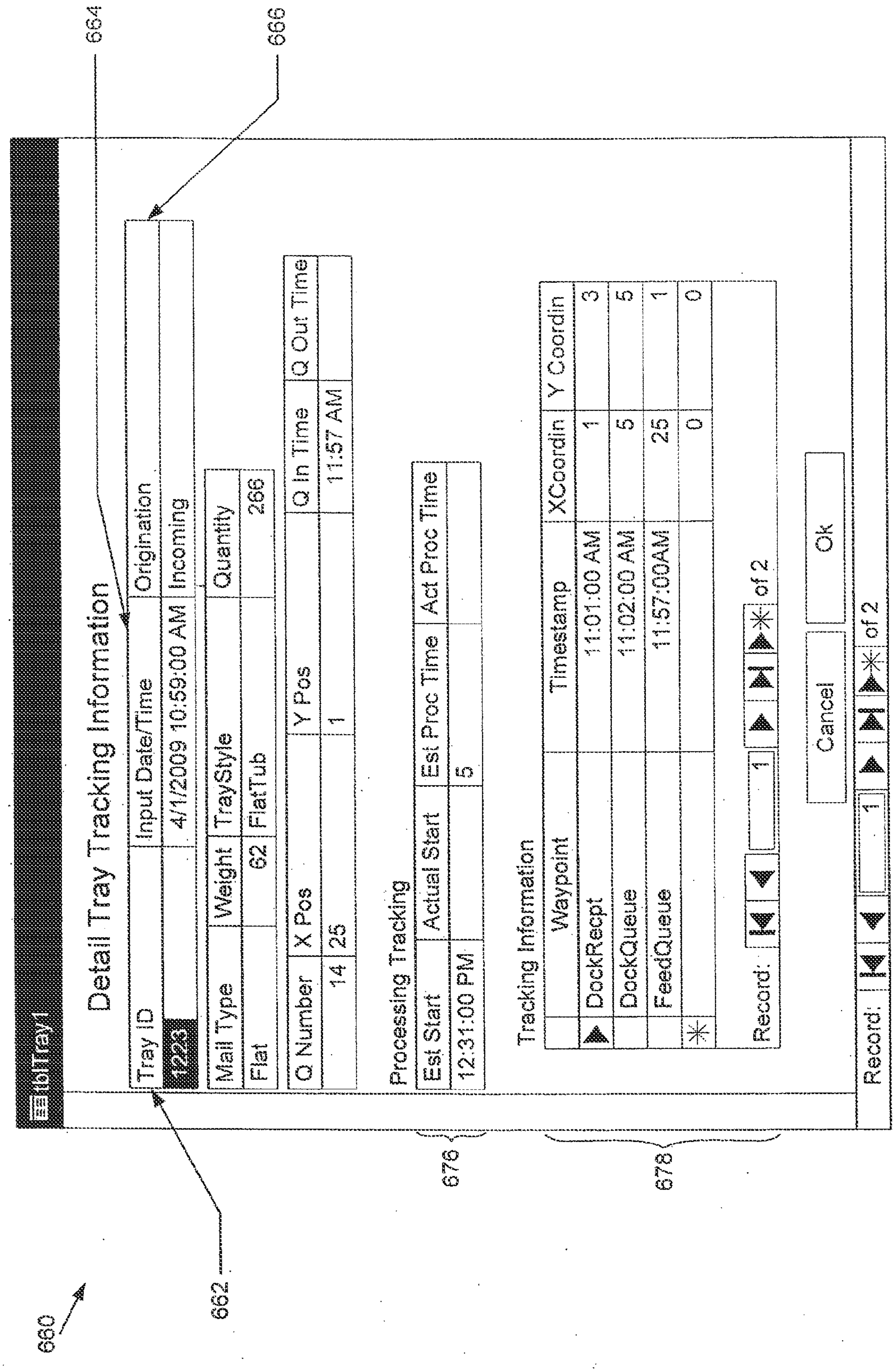
FIG. 6C shows an exemplary interface in accordance with aspects of the invention.

FIG. 6C shows an exemplary interface 660 displaying data from the system management server 625. The interface 660 may comprise, for example, a graphic user interface displayed on the computer 643 and/or PDA 645. As discussed above with respect to FIG. 6B, personnel may utilize a computer 643 and/or PDA 645 to view handling assignments generated by the system management server 625.

In the example shown in FIG. 6C, the interface 660 shows detailed tracking information for a tray in the P&DC 623. For example, when an operator inputs the tray ID number 662 using a PDA 645, the PDA 645 transmits the tray ID to the system management server 625, which accesses stored data associated with the tray ID. The system management server 625 transmits the stored data to the PDA, where the data is displayed via interface 660.

More specifically, the interface 660 shows details of the particular tray, such as: tray ID number 662; date and time the tray was input into the system 664; origination of the mail in the tray 666; type of mail 668; weight of mail in the tray 670; type of tray 672; quantity of mail pieces in the tray 674; current location of tray in the facility 676; and history of locations in the facility 678. The information shown in interface 660 is merely exemplary, and any suitable information may be displayed in accordance with aspects of the invention.

In addition to coordinating facility operations, inter-facility communication can also facilitate mail processing. In conventional system, the first time a mail piece is input into the system a bar code is assigned to the mail piece. It takes far fewer resources to recognize a barcode than to recognize a written address. Therefore, even today, address information (e.g., the ZIP code) is shared between facilities so an address recognized at one facility can be looked up by barcode at another facility. However, a facility wide sorting machine assigns individual mail pieces to individual containers (e.g., folders, frames, etc.). In the individual containers, the mail piece bar code may not be present. Therefore the individual containers have identifiers associated with them. Because of the individual container identifiers, it may not be necessary to track mail pieces by a "sprayed" on barcode on the letter itself. Instead, the mail piece may be tracked through its association with the container, and such information may be shared between respective system management server 625 at respective facilities for planning purposes.

Modular Partitioning and Expansion of a Facility-Wide Sorting and/or Sequencing System and the Use of Redundancy of Parallel Independent Segments, Subsystems, and Components to Improve Reliability of a Facility-Wide Sorting and/or Sequencing Machine

Modular Partitioning and Expansion of a Facility-Wide Mail Sorting and/or Sequencing System The present invention relates to a modular partitioning and expansion system. More specifically, the invention relates to a mail processing system that has a modular design. In this regard, the modular design allows the mail processing system to easily conform to the size of a particular mail processing facility. That is, the system of the invention is modular in nature, so that it may be sized appropriately for the unique mail handling capacity requirements, and size limitations of a particular facility. Sizing for a facility starts with a base module, and adds additional expansion modules to meet the capacity requirements and size limitations.

In embodiments, the modular design may include a base module and one or more expansion module(s). The base module, as well as any of the expansion modules, can include subsystems of the sorting and/or sequencing system discussed in the instant application. These subsystems can be, for example, feeders, sorters, sequencers, conveying or transporting mechanisms such as lead screw modules, storage systems, buffers, induction units, frame inserters, frame extractors, etc. The expansion modules can include any combination of these subsystems in order to increase efficiency of the unique facility. For example, the addition of an expansion module serves to increase a quantity of mail that the system can process daily. It can include all capacity-limited subsystems and functions (such as sequencing and storage), but without the need for the management systems, as this is provided with the base module.

In one illustrative example, the expansion module might increase daily mail handling capacity by 500,000 mail pieces. Therefore, the capacity of a system of the present invention with one base module and one expansion module would be 1 million mail pieces. Similarly, the capacity of the system with one base module and three expansion modules would be 2 million mail pieces. Many expansion modules can be added to a base model, depending on the required scaling.

Figure 7A:
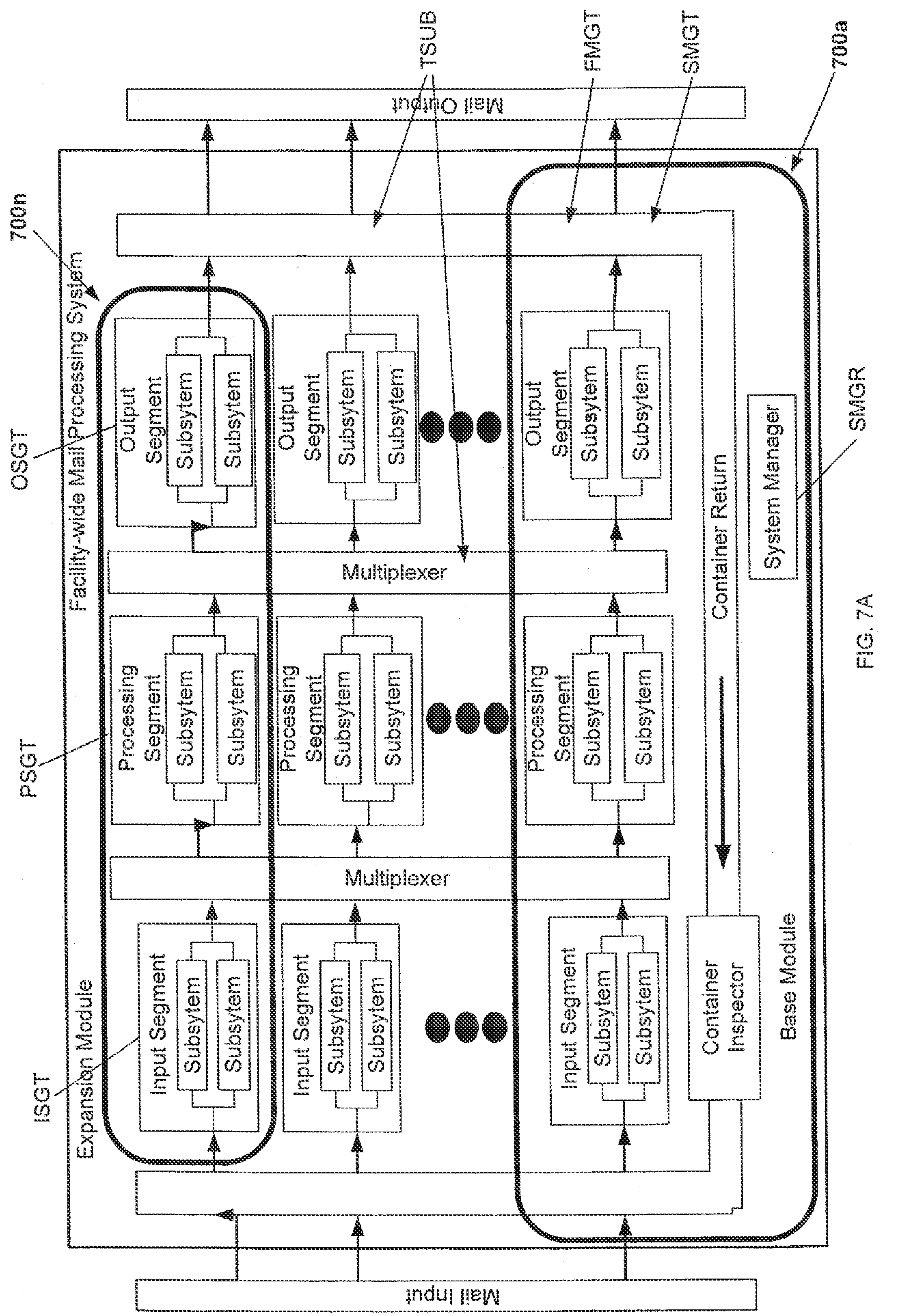
FIG. 7A shows a base module and expansion module in accordance with aspects of the invention.
Figure 7B:
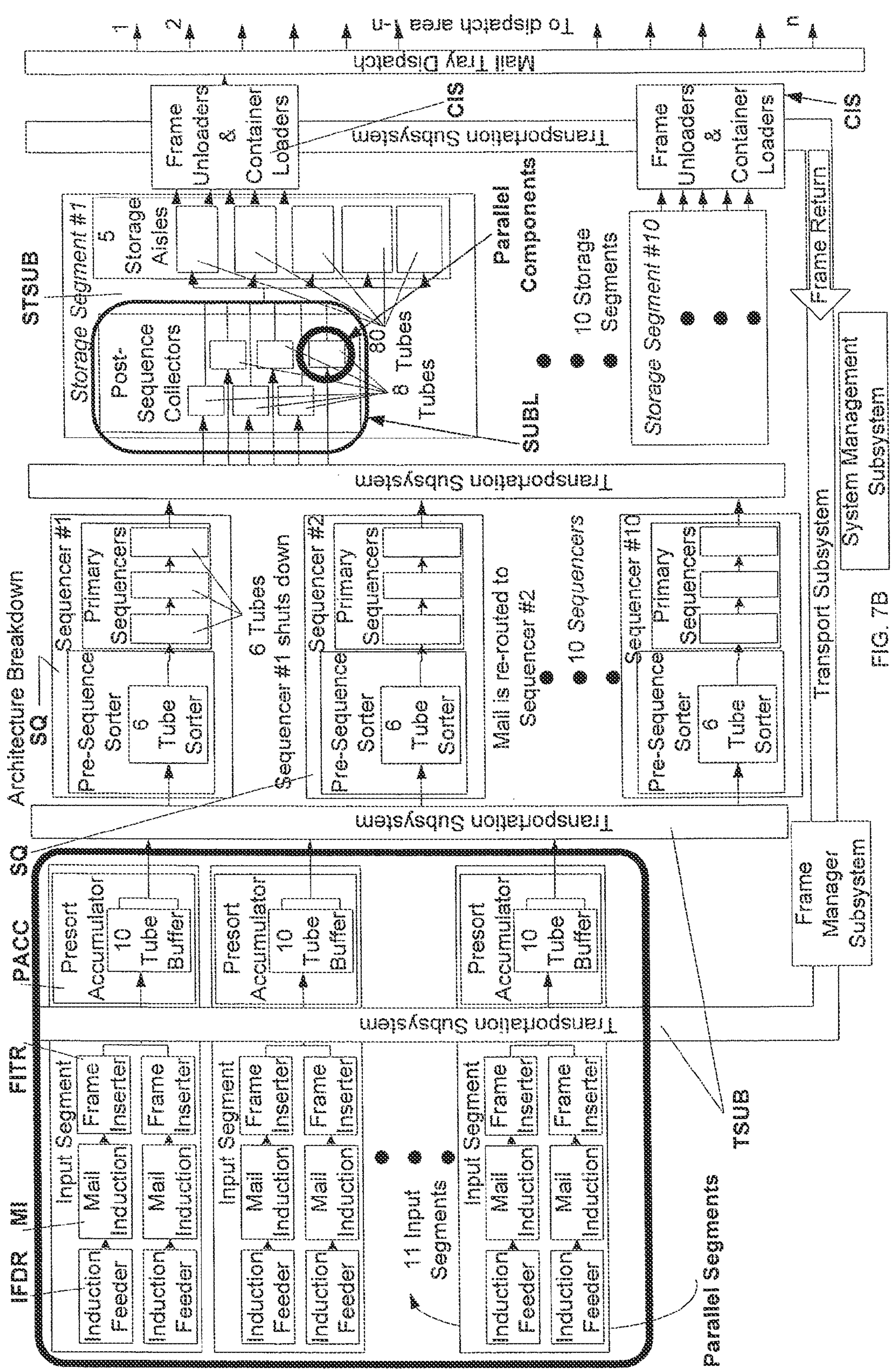
FIGS. 7B and 7C illustratively shows mail pieces being routed through different systems and subsystems in accordance with aspects of the invention.
Figure 7C:
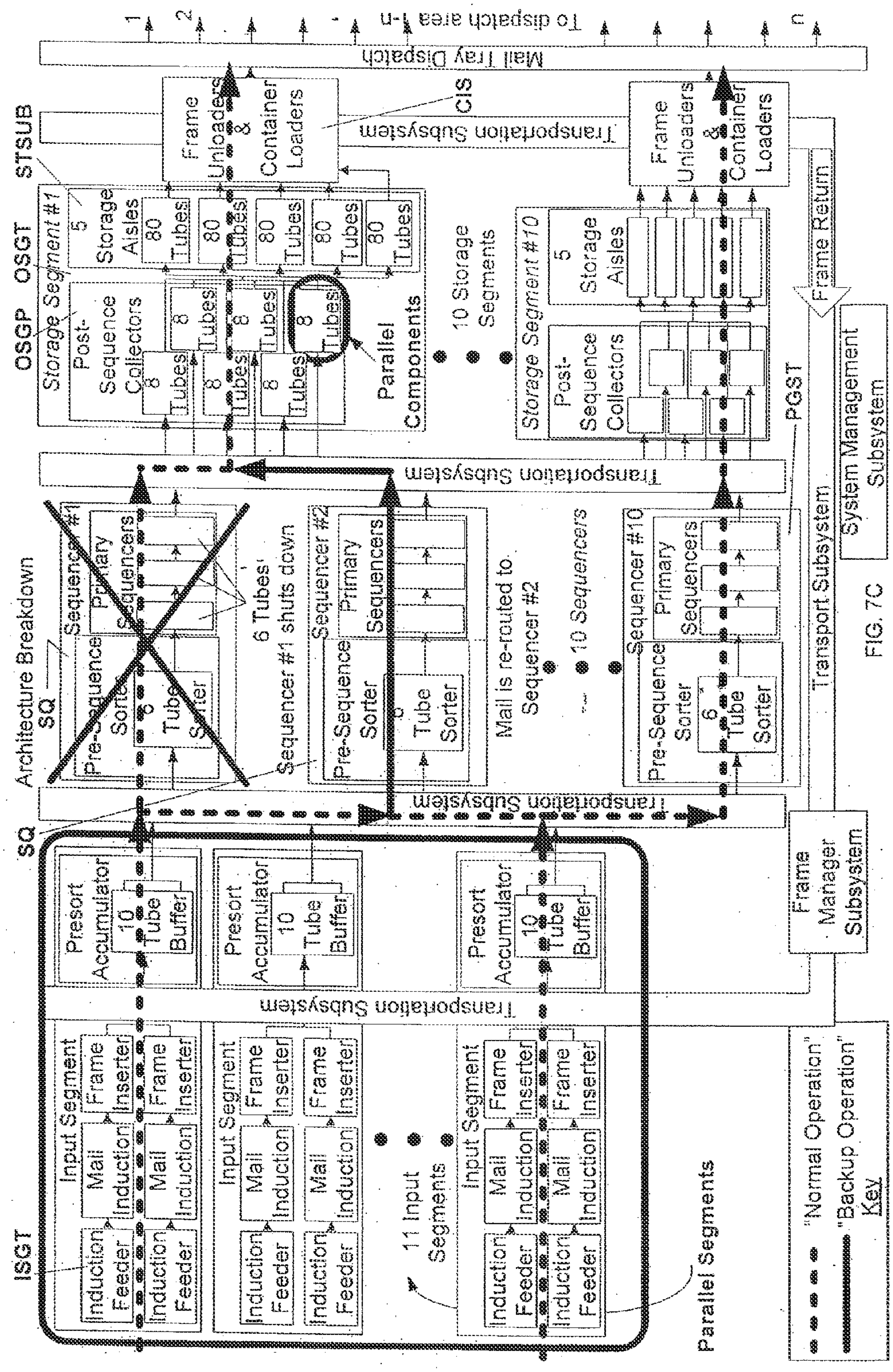

FIGS. 7A-7C illustratively show additional systems of the present invention, which may be included in the base module and/or the expansion module. These figures also representatively shows mail pieces being routed through different systems and subsystems in accordance with aspects of the invention. More specifically, FIG. 7A shows a base module and expansion module in accordance with aspects of the invention. In particular, the base module is shown at reference numeral **700*a* and the expansion module is shown at reference numeral 700*n*. In one illustrative example, the base module 700*a* is capable of handling a daily capacity of, e.g., 500,000 mail pieces, and the expansion module 700*n* can handle the same amount, thereby doubling the mail processing capacity of the entire system. Of course, the expansion module 700*n* can be designed to have a mail processing capacity similar to that of the base module 700*a* or other capacities, depending on the particular application of the system. Thus, it should be appreciated that the base module 700*a* and expansion module(s) 700*n*** can have varying mail processing capacities without departing from the scope of the invention.

The base module **700*a* and expansion module(s) 700*n*** are physically very similar, and designed to be easily integrated together to function as a single system. Therefore the system of the present invention is an easily scalable system. Sizing the system of the present invention to a particular facility requires very little design work. Also, after initial installation, capacity of the system of the present invention could be increased (or decreased) with relative ease (through the addition or removal of expansion modules) by a plug and play system.

The base module **700*a* and expansion module 700*n* may include any and all of the subsystems of the present invention which are required to process mail. These systems may include, for example, feeders, cancellers, frame inserters and mail extractors, transport mechanism, buffers, accumulators, split mail induction devices, split pathway induction unit, docking stations, storage areas, compression and decompression zones, etc. The feeder may include devices such as scanners, sensors, OCRs, printers, BCRs, photo eyes, cameras, and thickness detection mechanisms to identify, monitor, track, and assist in directing mail pieces. However, although possible, it is not necessary that the expansion module(s) 700*n* include all of the subsystems of the base module 700*a***.

The base module **700*a* may also include a system manager SMGR, which can be implemented in the computing infrastructure shown in FIG. 1A. Also, the base module 700*a* may include a frame management FMGT and shuttle (e.g., any suitable type of cart for managing transportation of frames) management SMGT. The frame management FMGT and shuttle management SMGT may be implemented in the computing infrastructure of FIG. 1A. In embodiments, the frame management FMGT and shuttle management SMGT will manage the movement of the frames and shuttles throughout the entire system, knowing the location of the frames and shuttles with respect to other systems and other frames and shuttles. This can be accomplished by use of RFID sensors, photodiodes or other known sensors, for example, placed throughout the system. For the frames, this can also be accomplished by use of encoders placed on the transport systems, which would maintain track and control of the frames as they are sorted, sequenced and/or stored, for example. As the base module 700*a* includes the frame management FMGT and shuttle management SMGT, it may not be necessary to provide such systems on the expansion module(s) 700*n*. Additionally, frame inspectors may be provided in the base module 700*a* and expansion modules 700*n*** to inspect frames for signs of degradation in order to remove frames from the system prior to failure. This may be implemented as a camera system (which detects fatigue cracks), vibration sensors (which detects vibrations above a threshold that may be indicative of a crack or other degradation of the frame), etc.

Further, the base module **700*a* may include a storage manager which may be implemented with the system manager SMGR or as a separate unit. The storage manager manages the storage of mail pieces contained in frames that are awaiting final sorting/sequencing and dispatch. In this regard, it is possible to provide the storage manager in both the base module 700***a* and expansion module(s) 700*n*; although as this function is preferably implemented in the computing infrastructure it is contemplated that only the base module 700*a* would require this feature. As such, when an expansion module 700*n* is plugged into the base module 700*a*, the functionality of the storage manager can automatically detect the base module 700*n* and provide its functionality to the base module 700*n*.

In embodiments, the expansion module(s) 700*n* may be designed for a plug-and-play operation. For example, adding an expansion module(s) 700*n* to the base module 700*a* may be automated such that the system manager SMGR automatically (and immediately) recognizes when an expansion module(s) has been plugged in and added to the system. Thus, the system manager SMGR provided with the base module 700*a* would be fully capable of managing the systems of the newly-added expansion module(s) 700*n* (similar to the FMGT and SMGT).

Additionally, as shown in FIGS. 7A-7C, each of the base module 700*a* and the expansion module(s) 700*n* may include an input segment ISGT for introducing mail pieces into the mail processing system, a processing segment PSGT for processing the mail pieces, and an output segment OSGT which receives processed mail from the processing segment PSGT. In this regard, the input segment ISGT may include, e.g., an induction feeder IFDR, mail induction MI, and frame inserter FITR subsystems, as well as a presort accumulator PACC which may serve as a buffer for mail entering a processing segment PSGT. The processing segment PSGT may include, e.g., a sequencer subsystem SQ which sequences the mail. The output segment OSGT may include, e.g., storage segments STSUB for storing the mail pieces.

In further detail, the presort accumulators PACC of the base module 700*a* and expansion module(s) 700*n* may also perform an initial separation of mail pieces contained in frames and load the frames into shuttles for transport. Similarly, the sequencers of the base module 700*a* and expansion module(s) 700*n* may perform several sorting and/or sequencing steps including (but not limited to) sorting/pre-sequencing, initial sequencing, and post sequencing.

Additionally, each of the base module 700*a* and expansion module(s) 700*n* may include a container loader that extracts mail pieces from frames and loads containers for dispatch. Further, both the base module 700*a* and expansion module(s) 700*n* may include a container dispatcher that transports containers filled with sorted/sequenced mail pieces within the mail center.

Further, the base module 700*a* and/or expansion module(s) 700*n* may include a transport subsystem TSUB (e.g., a multiplexer or transport controller) to transport mail pieces between different subsystems of the base module and expansion module(s), as well as transport mail pieces to other expansion module(s). Additionally, the base module 700*a* and/or expansion modules 700*n* may also include a container dispatch for receiving sorted and sequenced mail. The base module 700*a* and expansion module(s) 700*n* may be interconnected by a transport subsystem TSUB. Additionally, multiplexing may be accomplished by the transport subsystem TSUB. In this regard, mail intended for a particular destination (e.g., ZIP code) may be transported to a corresponding area (e.g., branch) of the mail processing system.

Facility-wide processing of mail in a single system has not previously been accomplished. This solution for facility-wide mail processing is better than a single standardized system design because it allows sizing of the system to the unique space constraints and mail processing capacity requirements of each postal facility. This solution is better than designing a customized system for each facility in that it requires minimal unique design work on a site-by-site basis. Also, it has the additional advantage of being easily scalable after initial installation. This allows flexibility in the event of changing mail flow trends.

Also, the base module 700*a* and expansion module(s) 700*n* of the modular subsystem of the present invention may include any number of the subsystems, in any desirable combination. It is also easy to integrate the modules together as they are plug and play compatible. Therefore the system can be easily scaled to a wide range of capacities e.g., 500,000 to millions of mail pieces. The addition of an expansion module also includes all capacity-limited subsystems and functions (such as sequencing and storage), but does not require functions that do not have a capacity limit. (These functions are already included in the base module, so the base module will perform these functions for the entire system.)

Redundancy of Parallel Independent Segments, Subsystems, and Components to Improve Reliability The invention relates to a system and method of improving the overall reliability and availability of a large, facility-wide machine that sorts and sequences letters and flats mail. This improvement is accomplished by configuring the facility-wide mail processing system as a network of parallel, independent branches, at multiple levels. A parallel configuration has at least two significant advantages. Firstly, when configured in independent, parallel branches, a single point failure in one branch will not affect the other branches. Secondly, being configured in parallel allows the addition of extra parallel branches. For example, if 10 parallel branches are required to be operating at any given time, it is possible to include an $11^{th}$ branch in the design. Therefore it is possible to have any one of the 11 branches offline, and still have the required 10 branches operating. This allows for a cyclic rotation. For example, with the example of 11 parallel branches, operational wear would be evenly distributed across all 11 branches by rotating out one of the branches (for maintenance) during processing. Furthermore, this allows for earlier detection of a fault in any one branch than might occur if a redundant branch were left idle for days or weeks. These advantages of parallel systems can be used to increase the overall availability of the system and can be integrated into the modular design of the present invention.

Figure 7D:
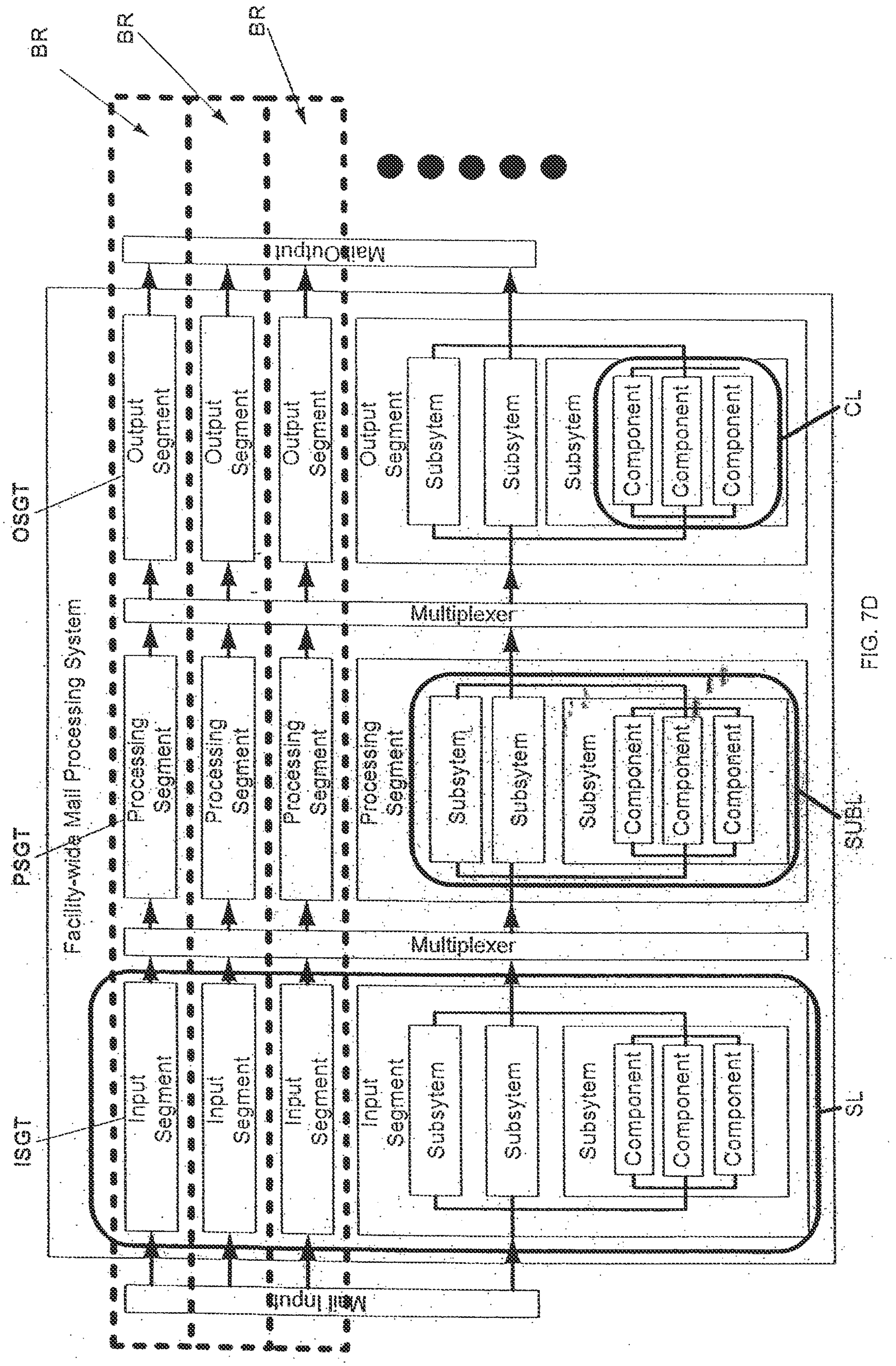
FIG. 7D shows the mail processing system being arranged in independent parallel branches to process mail in accordance with aspects of the invention.

FIG. 7D shows the mail processing system being arranged in independent parallel branches to process mail in accordance with aspects of the invention. More specifically, FIG. 7D illustratively shows mail pieces being re-routed around an inoperative segment, subsystem or component of a branch of the mail processing system in accordance with aspects of the invention. FIG. 7C also shows parallel processing with the addition of subsystems, segments and components discussed above. As such, it should be understood that the present invention can easily be implemented with the subsystems, segments and components of FIG. 7C and/or the subsystems, segments and components as described throughout the instant application.

For example, as shown in FIG. 7D, each branch BR of the mail processing system (i.e., the branches of the base and expansion module(s)) may include components from a base module and expansion module arranged in parallel with components of other branches. Accordingly, if any one of the parallel components of the branches BR are not in operation (e.g., due to maintenance) the other branches BR may continue to operate and take over the processing capabilities for the inoperable component. In this regard, the overall availability of a large, facility-wide machine that sorts and sequences letters and flats mail is improved. In particular, the improvement may be accomplished by configuring the facility-wide mail processing system as a network of parallel, independent branches BR, at multiple levels.

As an illustrative example, a segment level SL may include arranging the same type of components (segments) of the base module or the expansion module in parallel. For example, in the segment level SL, three input segments, processing segments and/or output segments can be arranged in parallel. In this configuration, if any of these segments fail in a branch, another of the segments of a different branch can compensate for such inoperability; that is, a parallel branch BR of the mail processing system having an inoperable segment will not significantly affect operation of the other segments and processing of the mail pieces. In fact, when more than the required segments are provided, an inoperable segment will have no affect on the throughput of the system, as this inoperable segment can simply be cycled out for maintenance. This, of course, increases the availability and efficiency of the overall system. It should be understood by those of skill in the art that more or less than three segments and types of segments can be provided in the segment level, and that these segments should not be considered a limiting feature of the present invention.

In another example, similar in concept to above, a subsystem level SUBL may include arranging subsystems (e.g., the mail induction systems) in parallel. In this illustrative example, each subsystem level SUBL includes two subsystems such as, for example, a buffer or presort accumulator that can be arranged in parallel. In this configuration, if any of these subsystems fail in a branch, another of the subsystems of a different branch can compensate for such inoperability; that is, a parallel branch BR of the mail processing system having an inoperable subsystem will not significantly affect operation of the other subsystems and processing of the mail pieces. In fact, when more than the required subsystems are provided, an inoperable subsystem will have no affect on the throughput of the system, as this inoperable subsystem can simply be cycled out for maintenance. This, of course, increases the reliability and efficiency of the overall system. It should be understood by those of skill in the art that more than two subsystems can be provided in the subsystem level SUBL, and that these subsystems should not be considered a limiting feature of the present invention.

Still referring to FIG. 7D, a component level CL may include arranging components such as transporting systems, e.g., lead screws (for conveying mail pieces) in parallel. In this illustrative example, each component level CL includes three components such as, for example, a sensor, OCR, lead screw, etc. that be arranged in parallel. As shown in FIG. 7C, for example, the components may be a container induction station CIS, that allows empty containers and container labels to be received into the mail processing system. In this configuration, if any of these components fail in a branch, another of the components of a different branch can compensate for such inoperability; that is, a parallel branch BR of the mail processing system having an inoperable component will not significantly affect operation of the other components and processing of the mail pieces. In fact, when more than the required components are provided, an inoperable component will have no affect on the throughput of the system, as this inoperable component can simply be cycled out for maintenance. This, of course, increases the availability and efficiency of the overall system. It should be understood by those of skill in the art that more or less than three components can be provided in the component level CL, and that these components should not be considered a limiting feature of the present invention.

In this regard, a parallel configuration has many significant advantages. Firstly, the parallel branches BR of the present invention are configured to process mail independently of each other. For example, if (for any reason) a presort accumulator PACC provided in one path of the mail processing system is inoperable (e.g., due to mechanical breakage or routine downtime of one of the branches), the other branches BR are still fully capable of processing mail. That is, as the mail processing system can be arranged in parallel it is possible to provide a plurality of independently operational branches BR. In regard to the mail processing system of the present invention being arranged in parallel at the component level CL, by way of non-limiting example, the components of the container induction station CIS, that allows empty containers and container labels to be received into the mail processing system, may also be arranged in parallel and independent of each other.

Secondly, arranging the branches BRs in parallel allows that addition of parallel branches BRs, e.g., in order to increase the mail processing capacity of the mail processing system. For example, if a particular mail processing facility requires ten parallel branches BRs in operation at any given time (i.e., in order to meet the particular mail processing facility mail processing requirement), an additional parallel branch BR (i.e., eleven parallel branches in total) may be included in the mail processing system design. Therefore, it is possible to have any one of a number of the branches BRs off-line and still meet mail processing requirements of a particular facility. Thus, one of ordinary skill in the art would appreciate that each additional branch BR added to the mail processing system increases the reliability and availability of the mail processing system.

Thirdly, the mail processing system of the present invention allows for all of the parallel branches BRs to be rotated in and out of service at any particular time. For example, routine maintenance may be performed on any number of the parallel branches BRs while the remaining parallel branches BRs process mail. Additionally, in order to prevent unnecessary and uneven wear on the mail processing system, branches BRs can be rotated routinely from in-service and out-of-service states while still meeting the mail processing requirements of a particular facility. In other words, operational wear can be evenly distributed across all of the parallel branches BRs of the mail processing system.

Further, it should be appreciated, that any of the subsystems not specifically mentioned in this portion of the detailed description, may also form part of the modular design of the mail processing system and be arranged in parallel. That is, so that independent branches are capable or operating when other branches BRs of the mail processing system are not in service.

Regional and Nationwide System Visibility for a Network of Centralized Flat and Letter Facility-Wide Sorting and/or Sequencing System The invention provides a central management system to monitor facility-wide mail processing machines. In current processing and distribution centers (P&DCs), the United States Postal Service (USPS) mandates the use of a proprietary interface. However, this proprietary interface creates several problems. For example, there are several problems with the architecture including: (1) the underlying transport of the USPS specification does not easily permit sharing of information between facilities (especially, for example, facilities on disparate networks and behind firewalls); (2) the proprietary interface does not easily permit forwarding, aggregating, and/or processing of information in a hierarchical fashion; (3) there is no smart translator on the mail processing equipment (MPE) or mail handling equipment (MHE) that can be updated to extract new data from existing data streams and databases (and thus, vendor equipment should be updated with each new request for data); (4) the proprietary interface does not address system and network management (currently there are a number of commercial products cobbled together to perform these tasks); and (5) the proprietary interface does not address system wide configuration and update of MPE.

Moreover, these problems are compounded when being used with a facility-wide machine that has many subsystems and components that store information in a hierarchal nature. That is, for example, data may be stored in a hierarchal nature where it makes most sense, depending on, for example, where the data is generated and where (and how often) the data is used. With a current approach, for example, all mail piece information is forwarded to a data warehouse when the data itself may be infrequently queried.

Thus, according to an aspect of the present invention, another interface may be used, which is much more extensible than the proprietary USPS interface. In embodiments, the interface uses web services and a service oriented architecture as a basis, which can utilize commercial off-the-shelf (COTS) based business rules engines in hierarchical control and data aggregation centers and COTS based interface modules that reside on the MPE. According to an aspect of the invention, this infrastructure allows for the centralized control and management of one or more of remote and system management functions and equipment specific processing functions, from disparate mail processing machines (e.g., different devices from, e.g., different manufacturers). The infrastructure, e.g., interface, can be implemented in the computer infrastructure of FIG. 1A. Moreover, the present invention allows for data to be stored once, aggregated, where necessary, and queried in the most efficient manner. Additionally, implementing the present invention reduces network bandwidth while maintaining the ability to make fast queries to the data. Also a facility-wide sortation and or sequencing machine may easily obtain data from other sites for scheduling purposes.

Remote and System Management

The remote and system management functions may include:

- Access security and auditing;
- Property management and inventory;
- Software inventory, distribution and configuration management;
- Remote hardware/network/software diagnostics;
- Event and status notification, and escalation;
- Data archiving, backup, purging and management;
- Remote access to MPE/MHE and facility wide mail sorting and/or sequencing subsystems and components; and/or
- Remote restart monitoring, amongst other remote and system management functions.

Equipment Specific Processing

Equipment specific processing functions may include:

- Remote configuration of individual MPE/MHE and/or facility wide mail sorting and/or sequencing subsystems and components;
- Configuration file of MPE/MHEs and/or facility wide mail sorting and/or sequencing subsystems and components;
- Staged storage of images and data;
- Interpreting and reporting MPE/MHE and/or facility wide mail sorting and/or sequencing subsystems and components performance data;
- Remote viewing of MPE/MHE and/or facility wide mail sorting and/or sequencing subsystems and components images;
- Searching, displaying, and managing configuration files and executables over a distributed network;
- Interfacing to existing MPE/MHE units and/or facility wide mail sorting and/or sequencing subsystems and components;
- Update of MPE/MHE libraries;
- Operator performance measurement and efficiency reporting;
- Escalation of detected threats;
- Operator/Supervisor communication;
- Linking of operator training certification between different operator stations;
- Linking other MPE/MHE scans of a specific mail pieces; and/or
- Mail image distribution prior to video coding terminal identification, amongst other equipment specific processing functions.

According to an aspect of the invention, the centralized system uses as its backbone a Service Oriented Architecture. Service-Oriented Architecture (SOA) is a software architecture where functionality is grouped around business processes and packaged as interoperable services. SOA also describes IT infrastructure which allows different applications to exchange data with one another as they participate in business processes. The aim is a loose coupling of services with operating systems, programming languages and other technologies which underlie applications. SOA separates functions into distinct units, or services, which are made accessible over a network in order that they can be combined and reused in the production of business applications. These services communicate with each other by passing data from one service to another, or by coordinating an activity between two or more services. SOA concepts are often seen as built upon, and evolving from older concepts of distributed computing and modular programming. In accordance with aspects of the invention, the SOA architecture may be provided in the computer infrastructure of FIG. 1A.

In embodiments, a Service Oriented Architecture (SOA) of the present invention has the following characteristics:

- Uses XML;
- Uses web services;
- Internet transport (other transports such as e-mail also applicable);
- Has capability for automatic discovery;
- Through-the-firewall messaging;
- Capable of two way communications (either through true asynchronous communication or polling scheme);
- Use of hypertext transfer protocol over secure socket layer (HTTPS) or web services (WS)-security to secure message routing and authentication;
- Can use "open source" business engines and scripting to implement routing, tracking, authentication, message delivery and associated business logic rules. This allows new/updated capabilities to be added with a change of script;
- Allows additional MPE/MHE and/or facility wide mail sorting and/or sequencing subsystems and components to be added to the system by only adding a "plug-in" interface module. In embodiments, this interface module can take the form of a separately programmed application, an agent that resides on the MPE/MHE itself, or a plug in dynamically linked library (DLL) module that plugs into a generic interface module. According to an aspect of the invention, existing MPE/MHE currently communicating in the USPS interoperability format could be seamlessly added to the SOA architecture by the use of a single common communication module;

Additional capabilities can be added to the server by adding MPE/MHE functionality as generic modules and changes to the "open source" business engine script; and/or Allows the partitioning of a system into tiers (for example, the presentation tier containing all graphical user interfaces, a business tier containing business rules, and/or a database tier containing the data layer). The partitioning of the system into tiers prevents software coupling, and therefore increases reuse and decreases costs of software upgrades and modifications.

Furthermore, XML tags of a service oriented architecture facilitate easy grouping, searching, and/or aggregation of data of the raw data stream (e.g., permitting easy aggregation, filtering, and/or forwarding of data for a hierarchical management structure) and easy storage to databases.

In addition, this same interface could be used for mail piece image and data dissemination for video coding purposes. For example, using either SOAP Message Transmission Optimization Mechanism (MTOM), Direct Internet Message Encapsulation (DIME), or Multipurpose Internet Mail Extensions (MIME) or another method of encapsulating binary data into a SOAP message, mail piece images may be routed on the same hierarchy. According to an aspect of the invention, this would allow video coders (personnel that manually key in address information from a mail piece, typically because the address could not be recognized by an automatic recognition software program) to be positioned anywhere that has a network connection, e.g., a high speed connection to the Internet. Moreover, web services can forward any video or results through firewalls, and be encrypted to even use the Internet as a network, which is facilitated by the easy encryption offered for SOAP messages. These encryption possibilities include, for example, HTTPS (the same encryption offered to a secure internet site) or WS-Security, amongst other encryption methods.

Figure 8A:
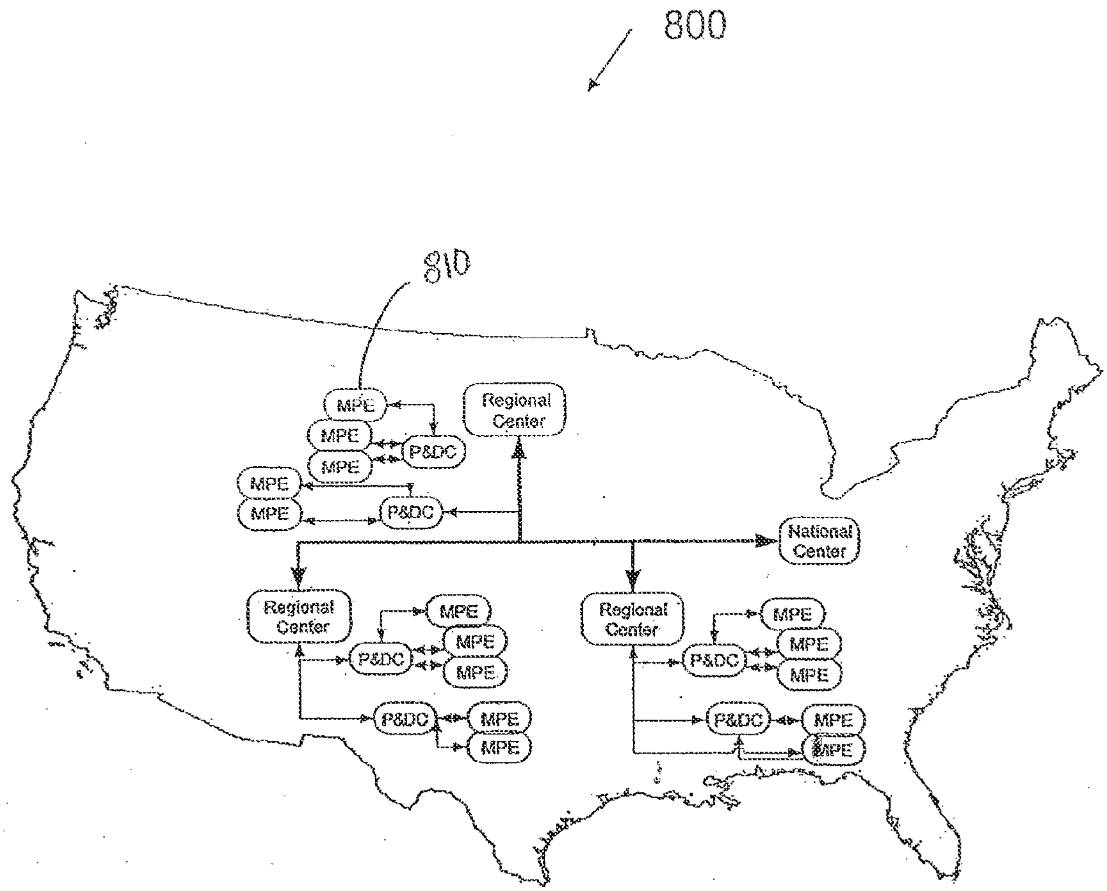
FIG. 8A shows an exemplary central management system implemented in a hierarchical arrangement in accordance with aspects of the present invention.

FIG. 8A shows an exemplary central management structure 800 implemented in a hierarchical structure in accordance with aspects of the present invention. As shown in FIG. 8A, multiple MPE/MHE and/or facility wide mail sorting and/or sequencing subsystems and components 810 (labeled as MPE and referred hereinafter as MPE) are monitored, the data aggregated, and controlled in multiple P&DCs 808 at a regional command center (or regional center) 804. The status of each P&DC 808 and aggregated status of all MPE 810 within each P&DC 808 can be monitored and data stored at regional centers 804. In embodiments, these regional centers 804 may include regional data marts and/or data warehouses. Additionally, the regional centers 804 may be manned to allow an intermediate level of command and control. Likewise, the status of any regional command center 804 and aggregated status of all MPE 810 can be monitored at other regional centers 804 in a hierarchical situation. Thus, according to an aspect of the invention, the present system is able to stage information where it makes sense, either on the MPE 810 itself, centrally within a P&DC 808, elsewhere in a regional data center 804, e.g., a data mart, or in a enterprise wide data warehouse (not shown). A national command center (or national center) 802 may be positioned anywhere with network communication and may also provide all functionality of any P&DC 808. (A hierarchal command center structure is the subject of patent publication US 2005/0251397 which is incorporated herein by reference in its entirety.)

Figure 8B:
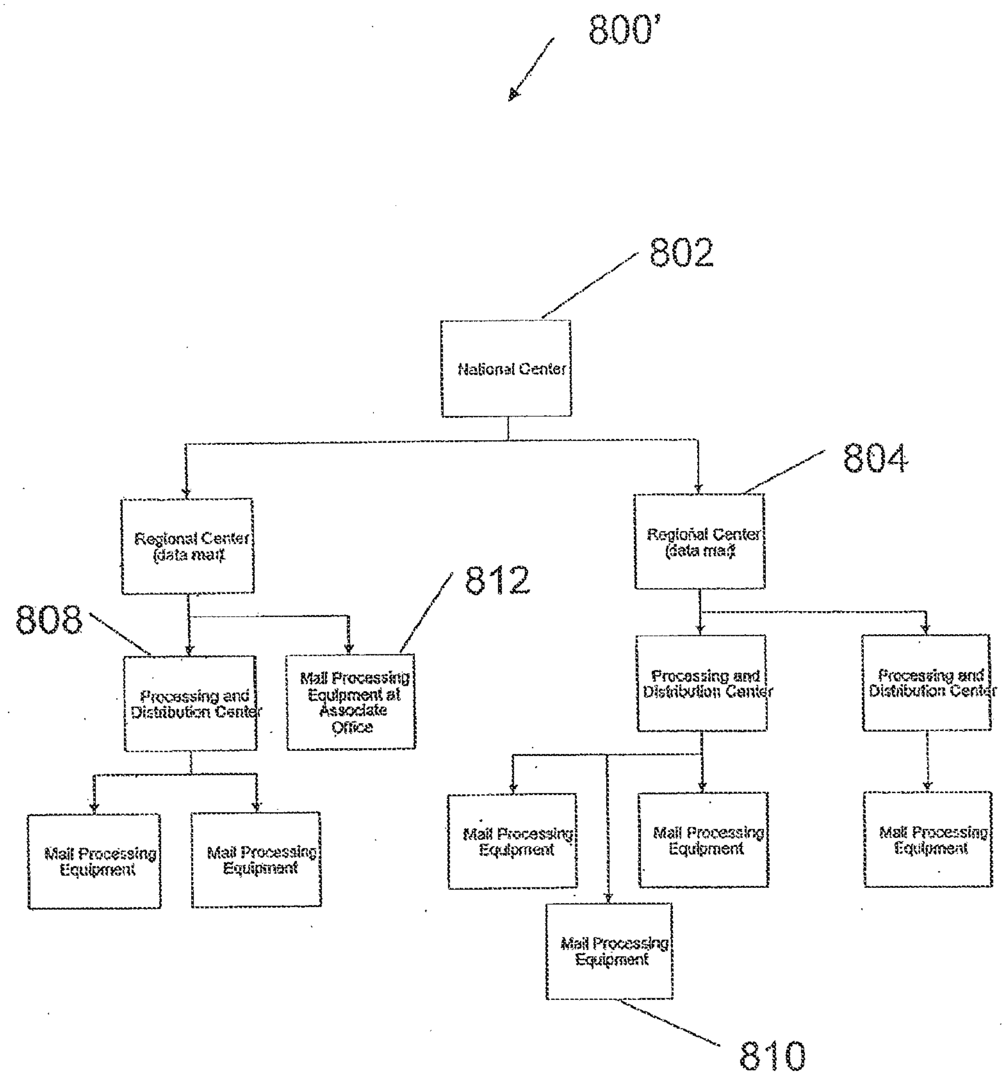
FIG. 8B shows an alternative depiction of an exemplary central management system implemented in a hierarchical arrangement in accordance with aspects of the present invention.

FIG. 8B shows a logical view 800' of the hierarchical relationships shown in FIG. 8A. As shown in FIG. 8B, a national center 802 communicates with and, for example, executes command and control over a plurality of regional centers 804. In embodiments, the regional centers 804 may include data marts. Furthermore, the plurality of regional centers 804 communicate with and, for example, execute command and control over one or more P&DCs 808. Furthermore, the P&DCs 808 communicate with and, for example, execute command and control over one or more MPE 810. Additionally, as shown in FIG. 8B, in embodiments, a regional center 804 may also communicate with and, for example, execute command and control over mail processing equipment at an associate office 812.

Figure 8C:
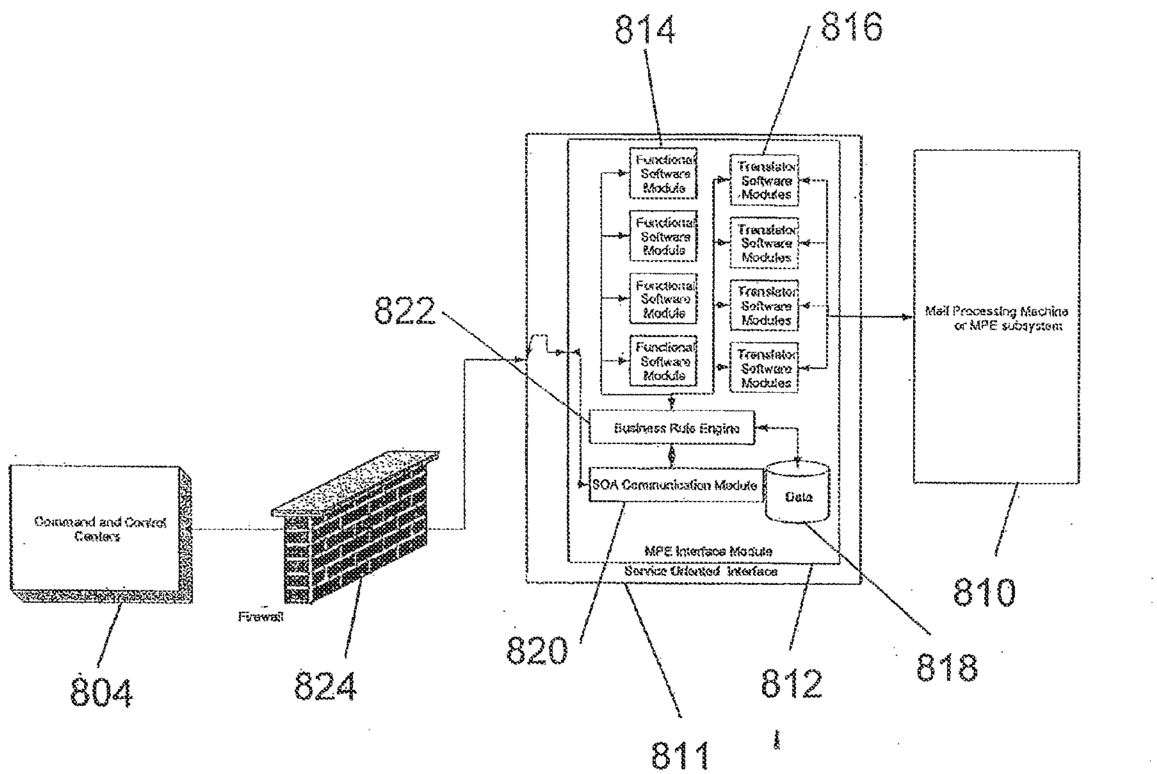
FIG. 8C shows an exemplary illustration of a service oriented interface in accordance with aspects of the present invention.

FIG. 8C shows an exemplary illustration of a service oriented interface 811 including an MPE interface module 812 in accordance with aspects of the present invention. This interface 811 allows a common piece of software to control system access security and message routing. New functionality can easily be added to the interface 811 through plug-in modules. Additionally, the interface 811 can be rapidly configured with changes in script to handle new or modified MPE 810 or changes in monitoring requirements. Moreover, these changes in scripts can be accomplished without a software release to the underlying software. In addition, since the interface 811 uses XML web services as its implementation, messaging readily passes through firewalls 824.

In addition to a centralized reporting system, each facility-wide MPE 810 includes an MPE interface module 812 assigned to it (multiple MPE may be serviced by one MPE interface module 812). The MPE interface module 812 is responsible for the communications, security, connectivity, and control of the messages. The actual implementation of the MPE interface module 812 includes a business rule engine 822 that is operable to control the routing of messages to internal plug-in modules. In embodiments, these plug-in modules may be implemented in a dynamic link library (DLL). In this exemplary implementation, requests may be received from a control center 804 and routed to the business rule engine 822. In embodiments, the business rule engine 822 may be implemented, for example, in custom software or with a COTS Business Rule Engine with scripting to control individual message routing. COTS Business Rule Engines typically also include the communication and security functions to communicate over a web service interface (shown in the SOA communication module 820 in FIG. 8C).

As shown in FIG. 8C, the business rule engine 822 routes the message to the appropriate internal software module. Since the standard USPS MPE interface is the P&DC Interoperability Specification interface (based on ISO 9506 and IEC 61850 international standards), one of the interface module types would facilitate this standard USPS MPE interface which, in embodiments, would communicate to all legacy systems. However, as discussed above, the current USPS interoperability standard is unsatisfactory for inter-facility communication, especially through firewalls and in a hierarchical architecture.

The MPE 810 also has subsystems which would also communicate with the control center 804 over the same architecture. That is, communication may occur using the same software modules hosted on the control center 804 and subsystem controllers. In embodiments, these software modules, for example, may be implemented in Service Oriented Architecture themselves and be based on web services, or they may be software (e.g., agents, plug in DLLs, applications, services, Demons, routines, etc.) that run on the actual MPE, on other computers for the purpose of interfacing between disparate threat scanning machine, and a centralized command and control center 804. Additionally, in embodiments, these interface module functionalities could also be hard-coded within the MPE interface modules 812 themselves.

In embodiments, there are two types of interface software modules: a translator module 816 and a functional module 814. The translator module 816 is responsible for interfacing translating data from the control center 804 to a source of data within the MPE 810. In embodiments, the translator module 816 may include interfaces to:

- MPE specific messages and data buses (even those messages that are not in the interoperability interface);
- MPE (or associate) databases 818; and/or
- MPE file system, system registries, event logs, XML data sources, system resource usage and allocations, and/or system authentication data stores.

The functional module 814 is responsible for capturing, transmitting, commanding, or otherwise communicating to the MPE 810 (through an MPE interface module 812) in relation to a task or a group of tasks. Examples of responsibilities of the functional modules 814 include:

- Property management and inventory;
- Software inventory, distribution, and configuration management;
- Remote hardware/network/software diagnostics;
- Error, warning event and status notification, and escalation;
- Data archiving, backup, purging and management;
- Remote access to MPE/MHE and/or facility wide mail sorting and/or sequencing subsystems and components and command center assets;
- User and system authentication setup;
- Auditing of all actions taken;
- Auditing of all messages received;
- Routing of command signals;
- Remote configuration of individual MPE/MHEs and/or facility wide mail sorting and/or sequencing subsystems and components;
- Scoring the accuracy of MPE/MHE and/or facility wide mail sorting and/or sequencing subsystems and components operators;
- Staged storage of images and data;
- Interpreting and reporting MPE/MHE and/or facility wide mail sorting and/or sequencing subsystems and components performance data;
- Remote viewing of MPE/MHE and/or facility wide mail sorting and/or sequencing subsystems and components images;
- Searching, displaying, and managing threat data over a distributed network;
- Update of MPE/MHE and/or facility wide mail sorting and/or sequencing subsystems and components threat libraries;
- Operator performance measurement and efficiency reporting;
- Escalation of detected threats;
- Operator/Supervisor communication;
- Linking of identification information between remote databases;
- Linking other MPE/MHE scans of specific mail pieces;
- Scheduling update or software/download of files;
- Remote control of operator/user functions;
- Gathering of computer/system/user diagnostic data;
- Remote training of users;
- Storing and queuing of information;
- Configuration of the scanning machine;
- Report generation;
- Remote desktop sharing; and/or
- Remote restart monitoring.

The Control Center

Figure 8D:
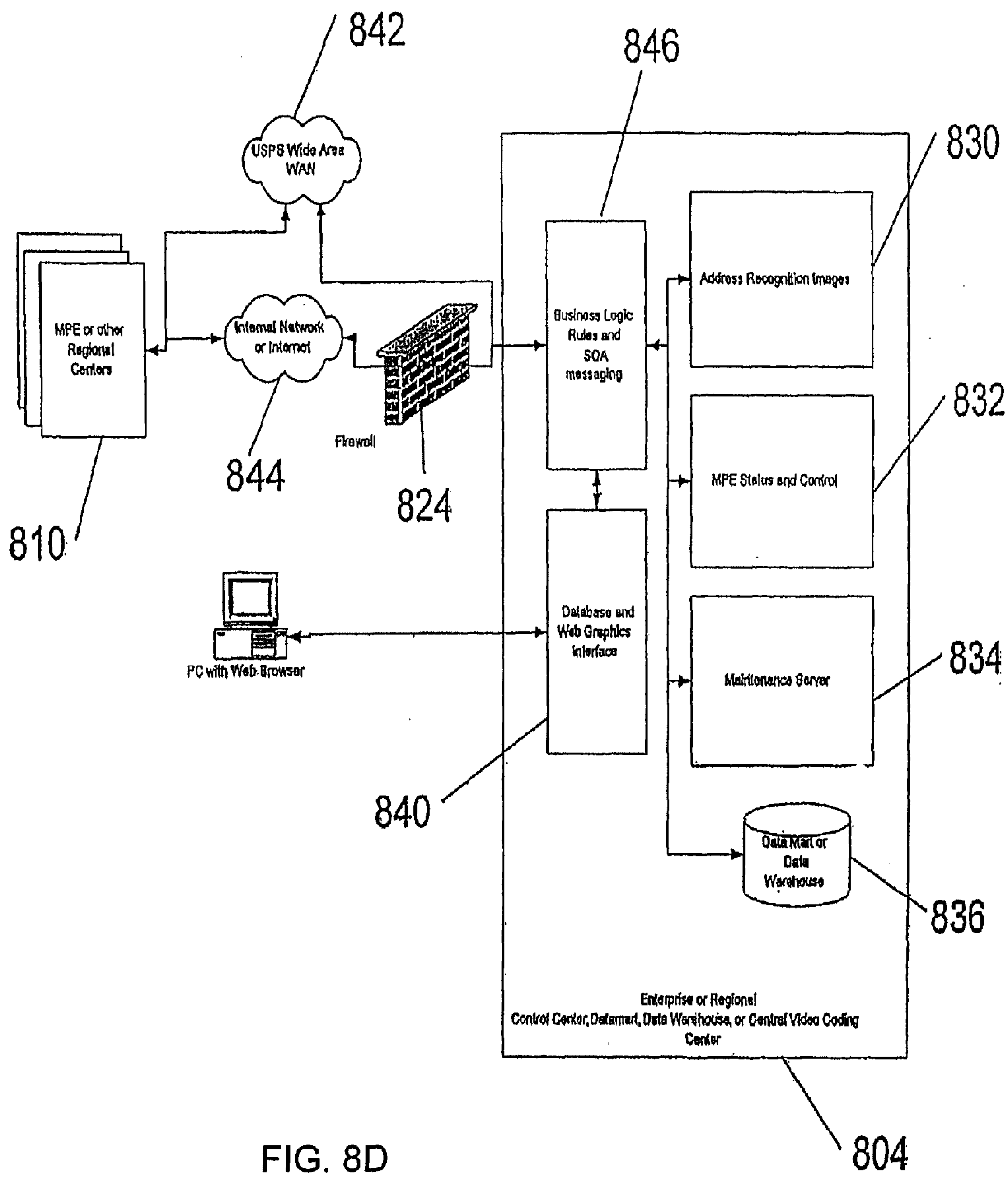
FIG. 8D shows an exemplary high level control center architecture in accordance with aspects of the present invention.

FIG. 8D shows an exemplary high level control center architecture in accordance with aspects of the invention. It should be understood that, in embodiments, the control center 804 may be an enterprise or national control center, a regional control center, a data mart, a data warehouse or a central video coding center.

According to an aspect of the invention, control center geographic location is not important as long as there is an Internet connection 844 to the network (or a connection to a Wide Area Network 842) due to the ability for the Service Oriented Architecture to pass messages to the individual MPE interfaces 811. This Service Oriented Architecture allows the system to be dynamically configurable. For example, if an MPE is not able to process the load or for any reason fails, another control center 804 (or another MPE) can be configured to pick up the load.

In embodiments, messages to and from the MPE 810 and control centers 804 may be composed of XML and composed of Simple Object Access Protocol (SOAP) format messages. Before encryption, these messages are human readable and self-descriptive, thus providing messages that are easy to troubleshoot. Moreover, these messages do not have message translation problems between different operating systems and memory storage formats (as is the case with many binary messaging implementations). Furthermore, the XML tags and available Document Object Model (DOM) processing algorithms allow easy filtering and aggregation of message data.

The architecture of the present invention incorporates XML web services to communicate to and from the MPE 810. These messages may use hypertext transfer protocol (HTTP) to communicate, although the invention contemplates that other transport methods, for example, e-mail or HTTPS may be used with the present invention. This protocol can be routed through firewalls 824. This allows encrypted information to be routed to and from any site with Internet access. Thus, near real-time two-way communications between MPE/MHE 810 and the control center 804 may be achieved, for example, through the use of polling and/or true asynchronous communication.

According to a further aspect of the invention, a Service Oriented Architecture allows commercial off-the-shelf (COTS) software business engines to implement the basic message routing, tracking, authentication, message delivery, and associated business rules, e.g., allowing developers to concentrate on the business object logic. Business engines also use open source scripting languages and web service objects, allowing multiple sourcing. According to an aspect of the invention, new functionality can easily be added later as stand-alone objects with just simple changes to the scripting. Moreover, system administrators may distribute only the new business objects and scripts, thus eliminating the expensive re-compile and re-release cycle of an entire application, traditionally associated with custom software. In addition, new services can be discovered with Universal Description, Discovery and Integration (UDDI) and integrated without human configuration.

As shown in FIG. 8D, the control center architecture consists of a business logic rules and SOA messaging module 846 and includes a number of software modules. In embodiments, the software modules include an address recognition image logic module 830 for transmitting address recognition images, an MPE status and control module 832, and a maintenance server module 834. Additionally, the business logic rules and SOA messaging 846 communicates with local and/or remote databases such as data marts and data warehouses

836. In embodiments, the data warehouses 836 may be implemented in the storage system 120 (shown in FIG. 1).

Figure 8E:
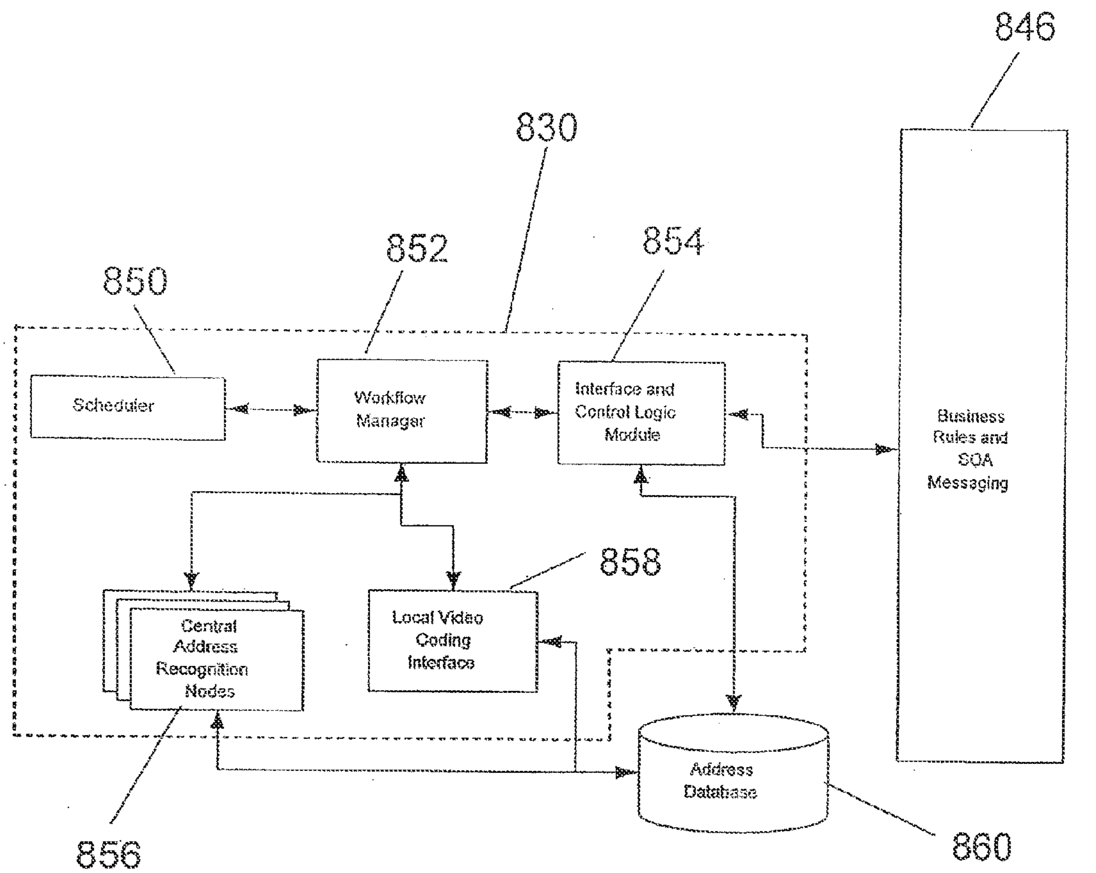
FIG. 8E shows an exemplary control center address recognition image logic module architecture in accordance with aspects of the present invention.

FIG. 8E shows an address recognition image logic module 830 in accordance with aspects of the invention. More specifically, the address recognition image logic module 830 is operable to schedule and manage the workflow of the address recognition systems of the present invention. In embodiments, these address recognition systems include the central address recognition nodes 856, which are operable to automatically detect an address, e.g., via an optical character recognition (OCR) device, and the local video coding interface 858, which interfaces with local video coding machines that allow, e.g., an operator to manually determine an address, for example, when the central address recognition nodes are not able to determine the address.

As shown in FIG. 8E, the address recognition image logic module architecture 830 includes a scheduler 850 in communication with a workflow manager 852. The workflow manager 852 is additionally in communication with a local video coding interface 858 and central address recognition nodes 856. The scheduler 850 and the workflow manager 852 are operable to schedule and manage the workflow for address recognition operations. For example, the workflow manager 852 may be aware of which central address recognition nodes 856 have spare capacity and may, e.g., assign a mail piece to a particular address recognition node for address recognition. Moreover, the workflow manager 852 may provide particular address recognition node with, e.g., fifty-five seconds to determine the address of the mail piece. If the fifty-five seconds expire without the particular address recognition node determining an address for the mail piece, the workflow manager 852 is operable to reassign the mail piece address recognition task to a local video coding machine via the local video coding interface 858.

Further, as shown in FIG. 8E, the local video coding interface 858 and central address recognition nodes 856 are both in communication with an address database 860. In embodiments, the address database 860 contains, for example, every mailing address in the United States. Additionally, in embodiments, the address database 860 may be a single database or a plurality of databases. Moreover, the address database 860 may be local to, e.g., MPE, or may be a remotely located database. Further, in embodiments, the address database 860 may be implemented in the storage system 120 (shown in FIG. 1).

The workflow manager 852 is also in communication with an interface control logic module 854. Moreover, the interface and control logic module 854 is in communication with the address database 860 and the business rules and SOA messaging module 846. The business rules and SOA messaging module 846 is operable to control where messages are routed. For example, the business rules and SOA messaging module 846 is operable to route a message, e.g., a request for resolution message, to the address recognition images module 830. Additionally, the interface and control logic module is operable to interface the business rules and SOA messaging module 846 with elements of the address recognition images module 830.

Additionally, according to aspects of the invention, address recognition image communication allows images that are not detected locally (for example, at local video coding machines connected via the local video coding interface 858) to be communicated elsewhere for, e.g., manual video coding. Since these messages are already in Internet-ready format, the messages can be forwarded to, for example, many distributed video coders (making their efforts virtually independent of location). Thus, it is possible to take advantage of video coders in disparate places, such as, for example, within many different USPS facilities, distributed locations (such as video coders operating from their homes) or even the ability to take advantage of cheaper labor from foreign labor pools. The images themselves can be encoded within SOAP messages through use of binary extension such as, for example, Message Transmission Optimization Mechanism (MTOM), Direct Internet Message Encapsulation (DIME), or Multipurpose Internet Mail Extensions (MIME).

Figure 8F:
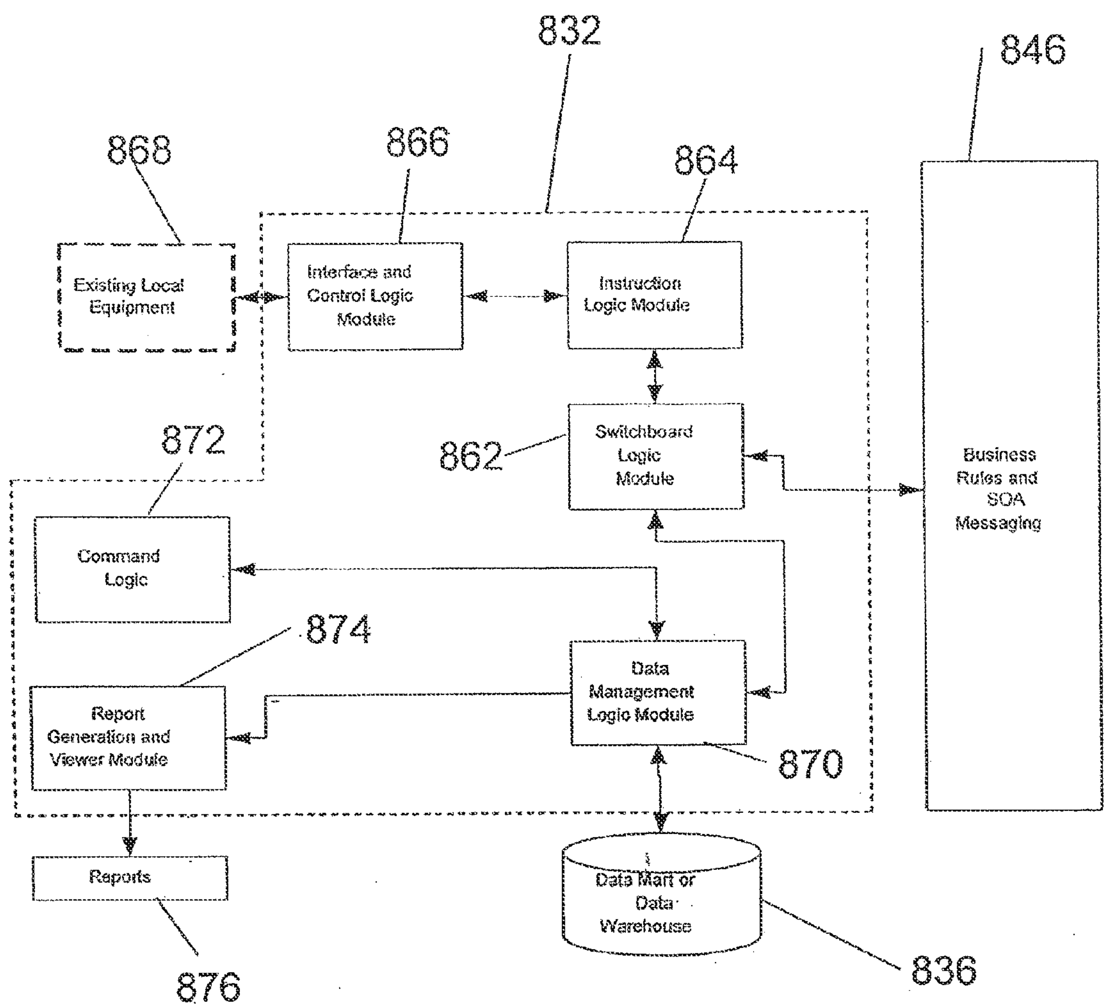
FIG. 8F shows an exemplary control center MPE status and control logic module architecture in accordance with aspects of the present invention.

FIG. 8F shows a control center MPE status and control logic module 832 in accordance with aspects of the invention. As shown in FIG. 8F, the control center MPE status and control logic module 832 includes a switch logic module 862 in communication with an instruction logic module 864 and a data management logic module 870. As discussed above, the business rules and SOA messaging module 846 is operable to route a message, e.g., a status message, to the MPE status and control logic module 832. In embodiments, the switch logic module 862 is operable to route the message to either the instruction logic module 864 or the data management logic module 870, as discussed further below.

As further shown in FIG. 8F, the instruction logic module 864 is in communication with existing local equipment 868 via an interface and control logic module 866. That is, existing local equipment 868 may not be capable of SOA communications (indicated by the dashed lines), for example, using Web-based communication protocols, e.g., extensible markup language (XML). As such, the interface and control logic module 866 is operable to interface with existing local equipment 868 such that SOA communications may be utilized. It should be understood that while the existing local equipment is shown as a single element in FIG. 8F, the existing local equipment 868 can be any number of existing local equipment. Moreover, the invention contemplates that local equipment may be operable to interface with the instruction logic module 864 without the interface and control logic module 866. That is, the invention contemplates that local equipment may be capable of SOA communications. Thus, in embodiments, some local equipment (not shown) may be directly in communication with the instruction logic module 864.

Additionally, as shown in FIG. 8F, the data management logic module 870 is in communication with command logic 872, the data mart or data warehouse 836 and a report generation and viewer module 874. The command logic 872 is operable to provide, for example, separate controls for some commands, which, e.g., cannot be routed through existing equipment. For example, the command logic 872 may provide a power-down command.

In embodiments, the data mart or data warehouse 836 is a database (or a plurality of databases) containing, for example, data from multiple MPE/MHE and/or facility wide mail sorting and/or sequencing subsystems and components (hereinafter referred to as MPE in the instant section) from multiple locations. That is, a particular MPE may process a number of mail pieces. Upon processing these mail pieces (or during processing, e.g., in real-time), the MPE may send a record of the processing to the data mart or data warehouse 836. Thus, the data mart or data warehouse 836 contains records of the status of the MPE. However, the invention contemplates that some data may be stored locally to the MPE, and thus, in embodiments, this data may not be sent to the data mart or data warehouse 836. In embodiments, the data warehouses 836 may be implemented in the storage system 120 (shown in FIG. 1A).

The report generation and viewer module 874 is operable to generate reports. For example, at the end of a mail piece processing run, e.g., an operator may want to know how many of each type of mail pieces (e.g., flats, letters, etc.) were processed. According to aspects of the invention, the report generation and viewer module 874, is operable to access, e.g., the data mart or data warehouse 836 or MPE, and determine how many of each type of mail pieces (e.g., flats, letters, etc.) were processed. Moreover, the report generation and viewer module 874 is operable to output a report 876.

The MPE status and control logic module architecture controls the data transmitted to and from the MPE. In embodiments, this data may include:

Mail piece messages detailing the mail piece ZIP and bar code information;
MPE state;
Data point (snap shot of key state and data variables on the MPE);
Mail piece location information (path and container information);
End-Of-Run, Start-Of-Run;
Command interface;
Sort plan information;
Operator information;
Throughput information;
Fault information;
Communication network heartbeat status; and/or
End-of-run summary information, amongst other data.

Additionally, remote management includes the functionality to remotely manage the hardware platform the system is running on.

Figure 8G:
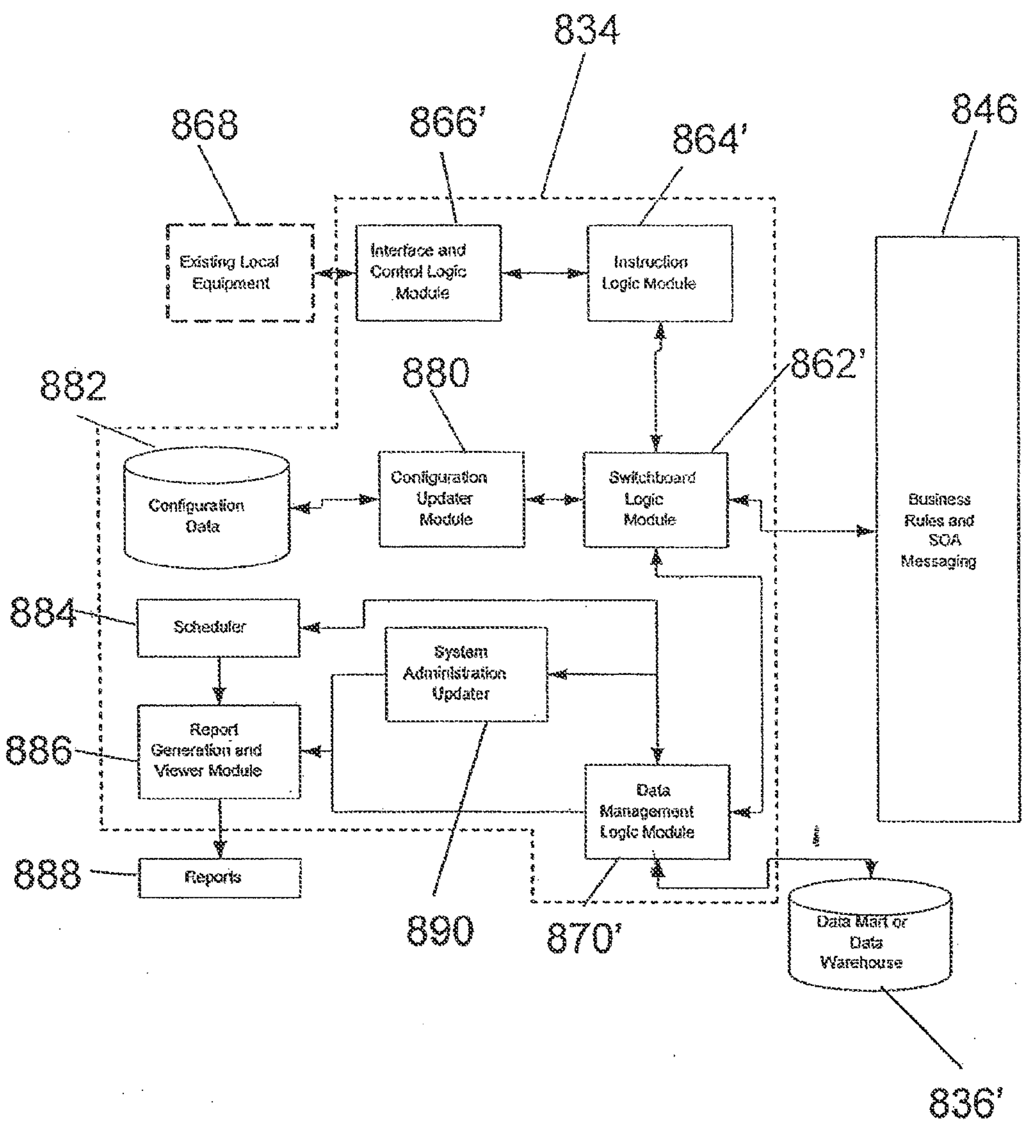
FIG. 8G shows an exemplary control center maintenance server software module architecture in accordance with aspects of the present invention.

FIG. 8G shows a control center maintenance server software module 834 in accordance with aspects of the invention. Generally, the maintenance server software module 834 is operable to perform remote and/or local configuration of MPE, software loading, maintenance and network troubleshooting, amongst other operations. As shown in FIG. 8G, the maintenance server software module 834 includes a switch logic module 862 in communication with an instruction logic module 864', a configuration updater module 880 and a data management logic module 870'. As discussed above, the business rules and SOA messaging module 846 is operable to route a message, e.g., a maintenance message, to the maintenance server software module 834. In embodiments, the switch logic module 862' is operable to route the message to the instruction logic module 864', the configuration updater module 880 or the data management logic module 870', as discussed further below.

As further shown in FIG. 8G, the instruction logic module 864' is in communication with existing local equipment 868 via an interface and control logic module 866'. That is, as discussed above, existing local equipment 868 may not be capable of SOA communications (indicated by the dashed lines), for example, using Web-based communication protocols, e.g., extensible markup language (XML). As such, the interface and control logic module 866' is operable to interface with existing local equipment 868 such that SOA communications may be utilized. It should be understood that while the existing local equipment is shown as a single element in FIG. 8G, the existing local equipment 868 can be any number of existing local equipment. Moreover, the invention contemplates that local equipment may be operable to interface with the instruction logic module 864' without the interface and control logic module 866'. That is, the invention contemplates that local equipment may be capable of SOA communications. Thus, in embodiments, some local equipment (not shown) may be directly in communication with the instruction logic module 864'.

As shown in FIG. 8G, the configuration updater module 880 is in communication with a configuration data database 882. In accordance with aspects of the invention, the configuration updater module 880 is operable to configure, for example, local MPE. Moreover, the configuration updater module 880 is operable to access the configuration data database 882 to, e.g., retrieve configuration data for configuring MPE and store the configuration data for MPE.

Furthermore, as shown in FIG. 8G, the data management logic module 870' communicates with the data mart or data warehouse 836', a system administration updater 890, a scheduler 884 and a report generation and viewer module 886. The scheduler 884 is operable to schedule, e.g., maintenance, remote configuration, software loading, etc. For example, consider a task of updating configuration data for a number, e.g., five hundred, servers. If all of these servers attempted to access, e.g., the configuration data database 882, at the same time, network traffic could be adversely affected. Thus, the scheduler 884 is operable to schedule the updates of configuration data so to prevent, for example, network traffic congestion. In embodiments, the data mart or data warehouse 836 may contain, for example, a current configuration version for each MPE. That is, as an MPE is updated with, e.g., a new configuration, this may be stored in the data mart or data warehouse 836'. In embodiments, the data mart or data warehouse 836' may be implemented in the storage system 120 (shown in FIG. 1).

The system administration updater 890 is operable to provide system administration update. For example, the system administration updater 890 may be used to change users of a system and/or configure an operating system, amongst other operations.

The report generation and viewer module 886 is operable to produce reports 888. For example, consider a situation where a software configuration is to be performed on a particular type of existing local equipment, e.g., updating to version 6.0. The report generation and viewer module 886 is operable to access, e.g., the data mart or data warehouse 836', and determine, for example, which local equipment is already running version 6.0 (and thus, does not need to be updated) and which local equipment is running an older version (and thus, should be updated).

In embodiments, the maintenance server software modules 834 are operable to perform the following tasks:

System time sync;
Reboot MPE machinery;
Gather and report machine status (MPE machines);
Support of backup and recovery, for example, both at the control center and MPE;
Provide system administration (including system user IDs and passwords);
Provide ability to schedule tasks;
Log all actions taken;
Ability to view all systems log files;
Ability to connect to (send & receive data to/from) “Parent” and “Child” control center;
Receive files (updated signature & code) and send the to the MPE for installation/update;
Provide configuration management (CM) of data deployed or schedule for deployment;
Provide ability to schedule distribution;
View download schedule;
View versions deployed; and/or
View configuration management of stored files.

Thus, as described above, the present invention provides the following functions and advantages, amongst other functions and advantages:

1. A system that monitors status and collects information for disparate Mail Processing/Handling Equipment (e.g., machines from different manufacturers) from one of more processing centers using a Service Oriented Architecture (e.g., SOAP messages) to implement the communications between the control center and MPE. In embodiments, the system is composed of three parts:

- Software modules that are local (for example, either on threat scanning machines themselves or on machines that have network access to threat scanning machines);
- A network interface between the MPE and central control centers; and
- Central control centers, which perform centralized management of the MPE.

2. A system in which the centralized management functions include separately or in combination:

- Property management and inventory;
- Software inventory, distribution and configuration management; and/or
- Remote hardware/network/software diagnostics.

Additionally, the present invention is operable to perform the following tasks:

- Alarm, error, warning event and status notification, and escalation;
- Data archiving, backup, purging and management;
- Remote access to MPE and/or command center assets;
- User and system authentication setup;
- Auditing of all actions taken;
- Auditing of all messages received;
- Routing of command signals;
- Remote configuration of individual MPE;
- Scoring the accuracy of MPE operators;
- Staged storage of images and data;
- Interpreting and reporting MPE performance data;
- Remote viewing of MPE images;
- Searching, displaying, and managing threat data over a distributed network;
- Update of MPE libraries/software;
- Operator performance measurement and efficiency reporting;
- Operator/Supervisor communication;
- Linking of identification information (e.g., mail piece and frame identification) between a remote database and an MPE;
- Linking other MPE scans of to specific mail pieces;
- Scheduling update or software/download of files;
- Remote control of operator/user functions;
- Command and control of MPE machine;
- Gathering of computer/system/user diagnostic data;
- Remote training of users;
- Storing and queuing of information;
- Configuration of the scanning machine;
- Report generation;
- Remote desktop sharing;
- Report MPE utilization;
- Report machine performance;
- Communication of data, image, training, configuration, audit, database registry to a central control center for centralized management, archiving, and/or temporary storage;
- Capturing and reporting of technical performance measurement (TPM) operator keystroke information;
- Remote restart monitoring;
- Operator user tracking and time keeping;
- Identification information gathering, comparing to existing databases of MPE and correlating to mail pieces; and/or
- Security encryption of data stream.

3. Additionally, the present invention allows for centralized collection of mail processing status information and control of MPE including:

- Mail piece messages detailing the mail piece ZIP and bar code information;
- MPE statuses;
- Data point (snap shot of key state and data variables on the MPE);
- Mail piece location information (e.g., path and frame information);
- End-of-run and/or start-of-run information;
- Command interface information;
- Sort plan information;
- Operator information;
- Throughput information;
- Fault information;
- Communication network heartbeat status; and/or
- End-of-run summary information.

4. Additionally, the present invention allows the decentralized processing (e.g., automatic address recognition and/or manual video coding) through the use of a Service Oriented Architecture (for example, SOAP messages) to implement the communications between the mail processing equipment and decentralized equipment and operators that recognize the addresses.

Transportation and Conveying of Containerized Mailpieces

The present invention is directed to a conveyance or transport system designed and structured to transport frames in a sorting and/or sequencing system. The frames can be filled with mail pieces of different sizes, shapes and types, such as, for example, flats and letters. The present invention is also directed to a method of controlling and coordinating the movement of a high volume of mail pieces held within individual frames through the system for efficient sorting and/or sequencing. The present invention also provides related mechanisms to sense, monitor, and control, e.g., divert, high volumes of individual frames independently of other frames along a given conveyance path within the conveyance system. The system of the present invention provides advantages over known systems in that it is now possible to sort and/or sequence different types of object types or mail pieces, i.e., letters, flats, parcels, etc. effectively and efficiently in a single facility-wide letters/flats mail sorting and/or sequencing system.

In embodiments, conveyance mechanisms are configured to transport the frames through the system at a canted angle of about 45 degrees (with relation to the stream of travel) and in a front-to-back orientation (as compared to a lengthwise orientation). This orientation allows for a dense and efficient way to transport the frames in volume, and allows the frames to efficiently be diverted along different paths, e.g., at right angles, without slowing the speed of transport. Also, as the mail pieces are in a front-to-back orientation, more mail pieces can be carried on the conveyance mechanism in less amount of floor space, in a faster manner than conventional lengthwise conveyances. That is, angling the frames at 45 degrees allows for more efficient transporting and diverting of the frames in less space from one conveyance path to another. The conveyance mechanisms may be, but are not limited to, lead screw mechanisms, tooth belt mechanisms, pinch belt mechanisms, individual roller mechanisms, chain mechanisms or any combination of the different conveyance mechanisms.

In various embodiments, as described below, mail pieces in frames are sorted and sequenced using right angle diverts (RADs), merges, compression zones, decompression zones, and shuttles. For example, RADs split a stream of frames into different streams, e.g., at right angles, by diverting individual frames. Due to the 45 degree angle orientation of the frames through the system, RADs can divert the frames without stopping either stream by sliding them from between adjacent frames. Merges merge two streams of frames into a single stream, again using RADS. Again, due to the 45 degree orientation angle, two streams of frames can be merged without stoppage. Compression zones remove gaps from between frames within a stream and decompression zones insert gaps between frames within a stream. When individual handling of frames is not required, frames are moved as batches contained in shuttles. After mail pieces have been sorted and sequenced, they are extracted from the frames and inserted into trays for delivery. The process of extracting mail pieces from frames is referred to as “extraction”.

In embodiments, the conveyance mechanisms transport the frames forward, backward, up, down, or divert the frames from one conveyance path to another provided throughout the sorting and/or sequencing system. In an aspect of the present invention, the conveyance mechanisms also allow the frames to be compressed or decompressed for more efficient movement of sorted (and/or sequenced) frames through the sorting and sequencing system. More specifically, e.g., the compression zone mechanisms are structured to compress frames closer together as they move throughout the system, thereby increasing overall usable space on the conveyance mechanisms.

In embodiments, movement (e.g., diversion and compression) of the frames is controlled by a control unit (i.e., also known as a Frame Routing Agent) which coordinates the movements of individual frames using real-time location notifications from a plurality of sensors communicating with the control unit. In other words, best-path routing of the frames through the sorting and sequencing system is determined by a series of request and response messages between the plurality of sensors and the control unit monitoring each individual frame as discussed in the instant invention.

Based on the foregoing, the present invention provides a conveyance system for efficiently and reliably transporting a high volume of individual frames carrying mail pieces through a sorting and/or sequencing system in less space. It is also contemplated that the present invention may be implemented in any type of postal service or company mail center that needs to presort, sort or sequence mail pieces.

Right Angle Diverts

In sorting millions of mail pieces a day, mail pieces are conveyed at high rates from many inputs (e.g., a conveyance path) and may be selectively diverted to one of many outputs (e.g., branched conveyance paths). Effective diversion (i.e., re-routing) of an individual frame (carrying a mail piece) from one conveyance path to another, as provided by the present invention, does not affect the position or velocity of a neighboring frame on either conveyance path, does not require space on the path (in addition to its own dimensions), and does not require either conveyance path to slow or stop the frames to accomplish the diversion.

Figure 9A:
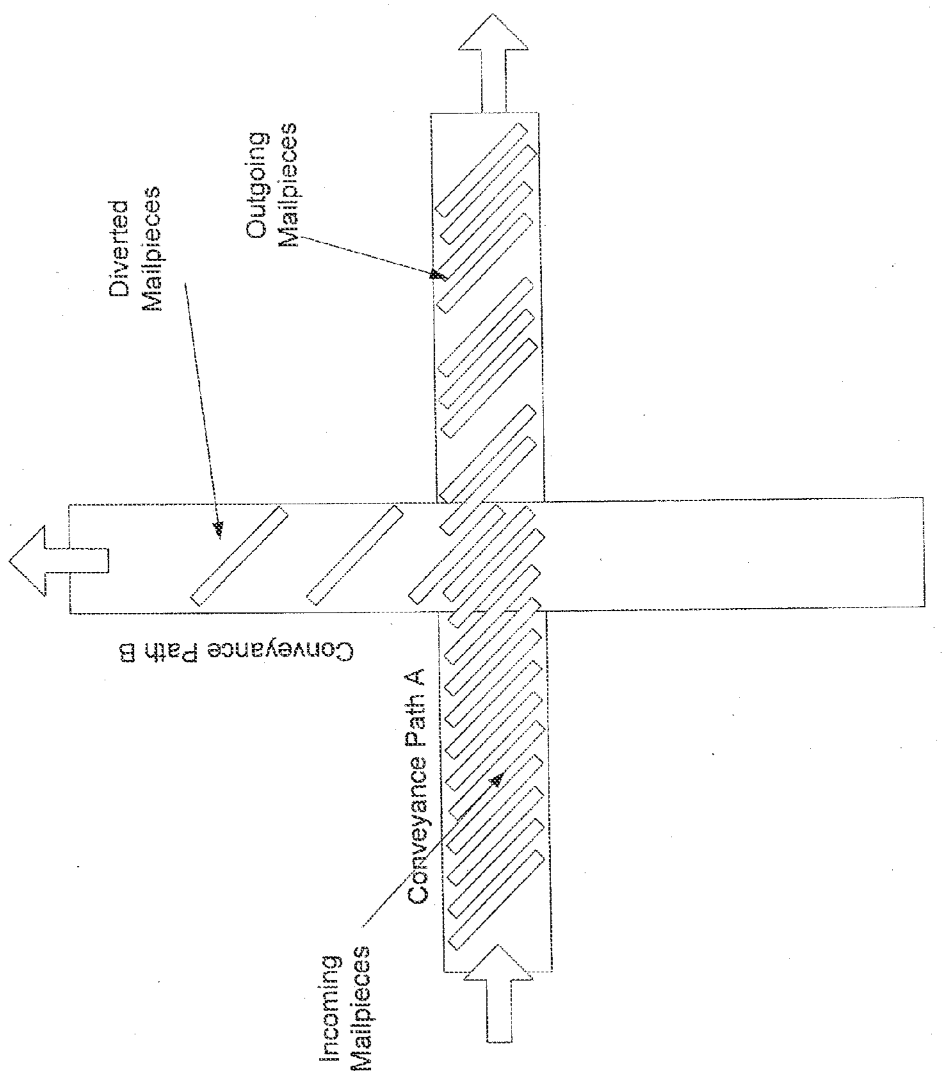
FIG. 9A shows a schematic of a non-limiting embodiment of a right angle divert in accordance with aspects of the invention.
Figure 9B:
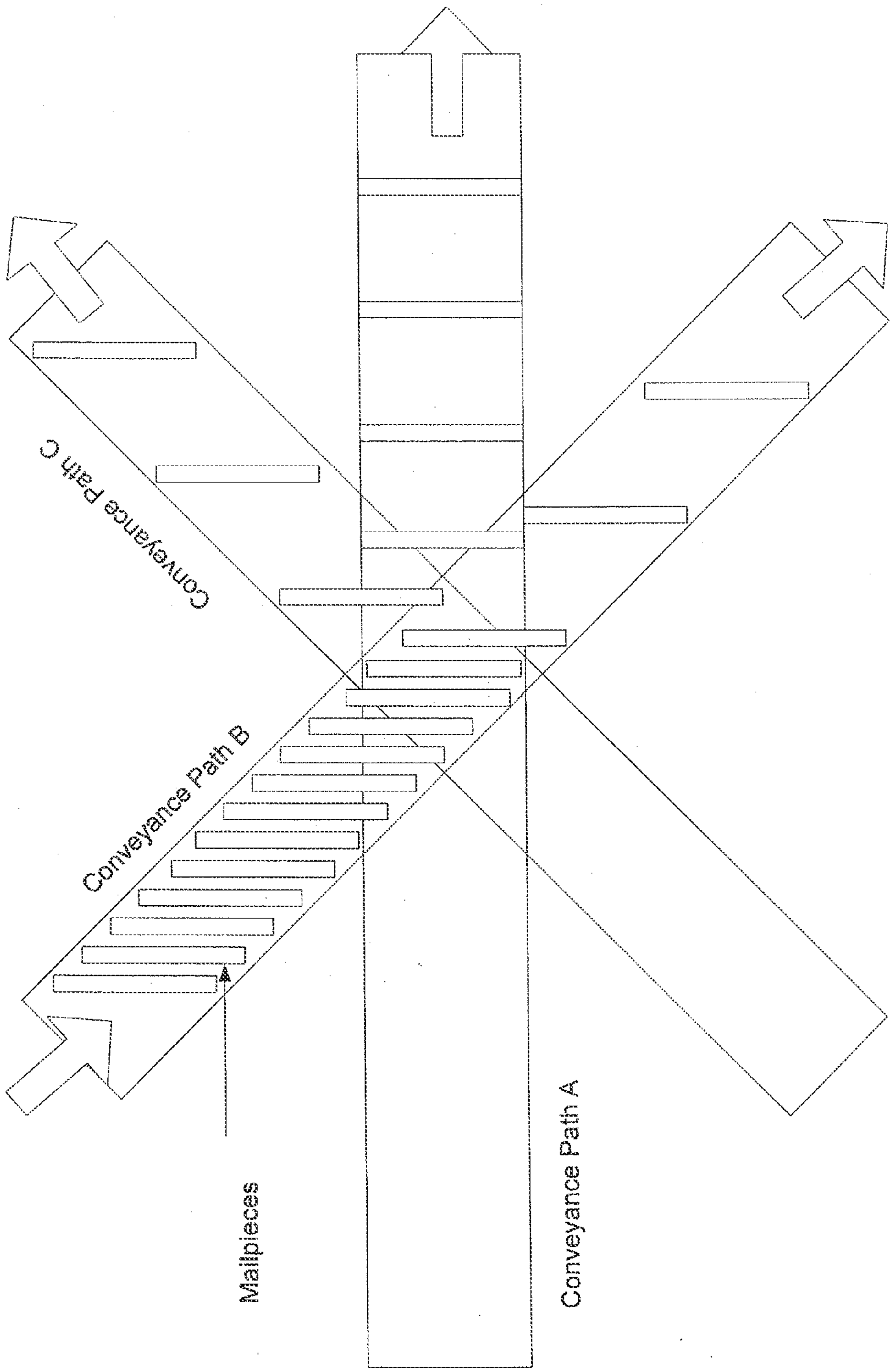
FIG. 9B shows a schematic of another non-limiting embodiment of a right angle divert in accordance with aspects of the invention.
Figure 9C:
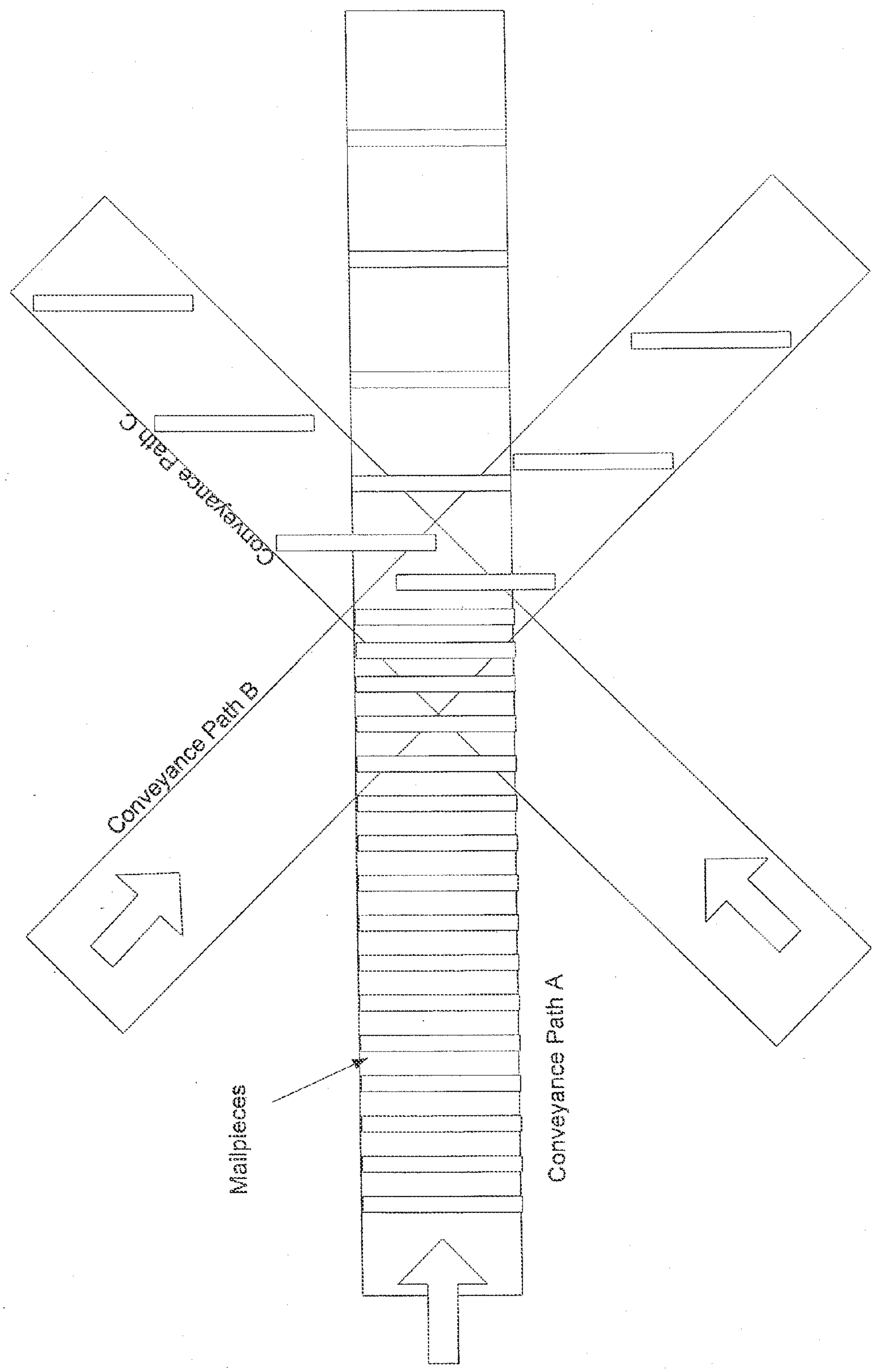
FIG. 9C shows a schematic of yet another non-limiting embodiment of a right angle divert in accordance with aspects of the invention.

In this regard, FIG. 9A-FIG. 9C generally show various right angle diverts along the conveyance system in accordance with aspects of the present invention. For example, as shown in FIGS. 9A and 9C, initially frames having a leading edge and a trailing edge are conveyed along the (linear) conveyance path “A” at a 45 degree angle with respect to direction of travel. In the example of FIG. 9B, the initial conveyance path is conveyance path “B”. Referring specifically to FIG. 9A, at a point of diversion (where the input conveyance path “A” converges with conveyance path “B”, e.g., at a location where the frame intersect with an output conveyance path “B”), the frame’s forward motion is redirected at a right angle down the output conveyance path “B” starting at its trailing edge.

In the example of FIG. 9B, interestingly, the frames can be diverted from conveyance path “B” to either of conveyance path “A” or “C”, depending on the sorting scheme. In the example of FIG. 9C, interestingly, the frames can be diverted from conveyance path “A” to either of conveyance path “B” or “C”, depending on the sorting scheme. In both of the examples of FIGS. 9B and 9C, the frames will remain in a 45 degree angle when transported to a conveyance path that is at a right angle; whereas, the frames will be reoriented onto the output conveyance paths when they are not at a right angle. However, in any scenario, the frames will remain in a front-to-back orientation. That is, the frames (and their respective mail pieces) are oriented such that the front of one mail piece is laterally stacked (at the 45 degree angle) next to the back of a neighboring mail piece, thereby enabling mail pieces to easily move from one conveyance path to another.

In any of the embodiments shown in FIGS. 9A-9C, the frame transitions from the input conveyance path to the output conveyance path without slowing conveyance path speed and without disturbing any adjacent frames. That is, the frames can be merged into streams and removed from streams at full transport speed, without interruption to the processing. In embodiments to accomplish this advantage, forward motion of the leading edge of the frame stops at the point of diversion and the trailing edge of the frame initiates the diversion to the output conveyance path (i.e., the trailing edge becomes the leading edge down the diversion pathway).

Additionally, the following is contemplated by the present invention:

- The conveyance paths operate at a fixed speed;
- A diversion operation performs at a set input speed of the input conveyance path;
- Since all conveyance paths operate at the fixed speed, it is possible to reduce the number of required conveyance motors, thus eliminating the need for each frame or mail piece (slot) to have an independent motor (such as implemented in some existing diversion technologies);
- Since mail pieces are stacked front-to-back, throughput limitations of conveying mail pieces end-to-end is eliminated;
- Divert mechanisms may act like filters. That is, divert mechanisms may be controlled to intentionally divert certain mail pieces on to a path based on a sorting or sequencing algorithm;
- Although up to three divert paths are shown in FIG. 9A-9C, more divert paths at other angles are also contemplated by the present invention;
- Mail pieces do not need to originate on a path that has them at 90 degrees to the output conveyance path (see e.g., FIG. 9A). An example of this is shown in FIG. 9B and FIG. 9C; and
- The diversion operations may be reversed. That is, as long as there is an opening for a frame available, multiple paths can be combined into a single stream.

Figure 9D:
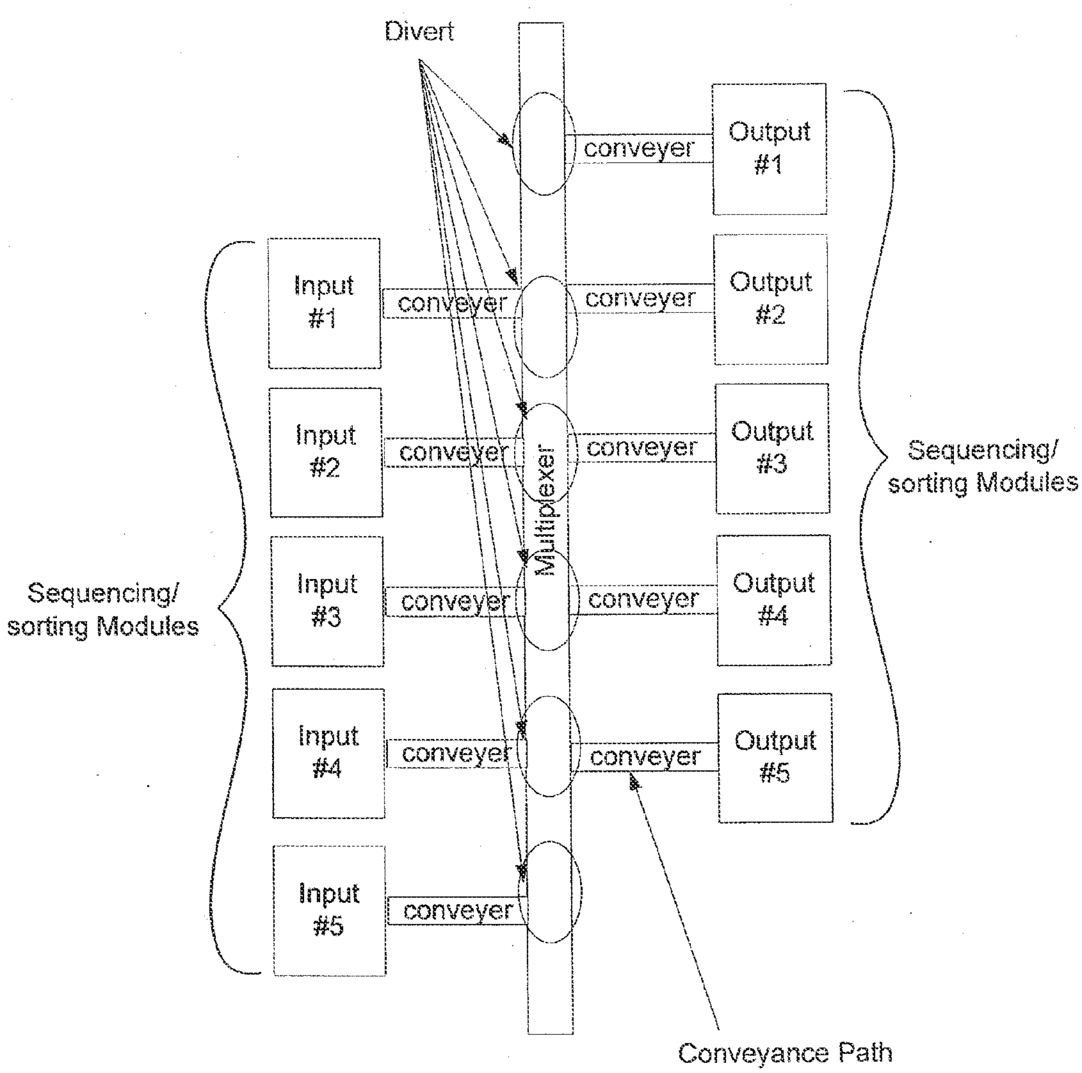
FIG. 9D shows a schematic of a non-limiting embodiment of a multiplexer in accordance with aspects of the invention.

Diverts may be implemented in a variety of machines within the mail sorting and/or sequencing system. For example, diverts may form the basis for a mail stream multiplexer as shown in FIG. 9D. In particular, the multiplexer is located between sections of large sorting and/or sequencing machines which are capable of routing mail pieces (frames)

from one of many input conveyance paths to one of many output conveyance paths. The multiplexer may, for example, route mail pieces to paths that will process, store, package, unpackage, and deliver the mail pieces to their appropriate destinations within the mail sorting and/or sequencing system.

Figure 9E:
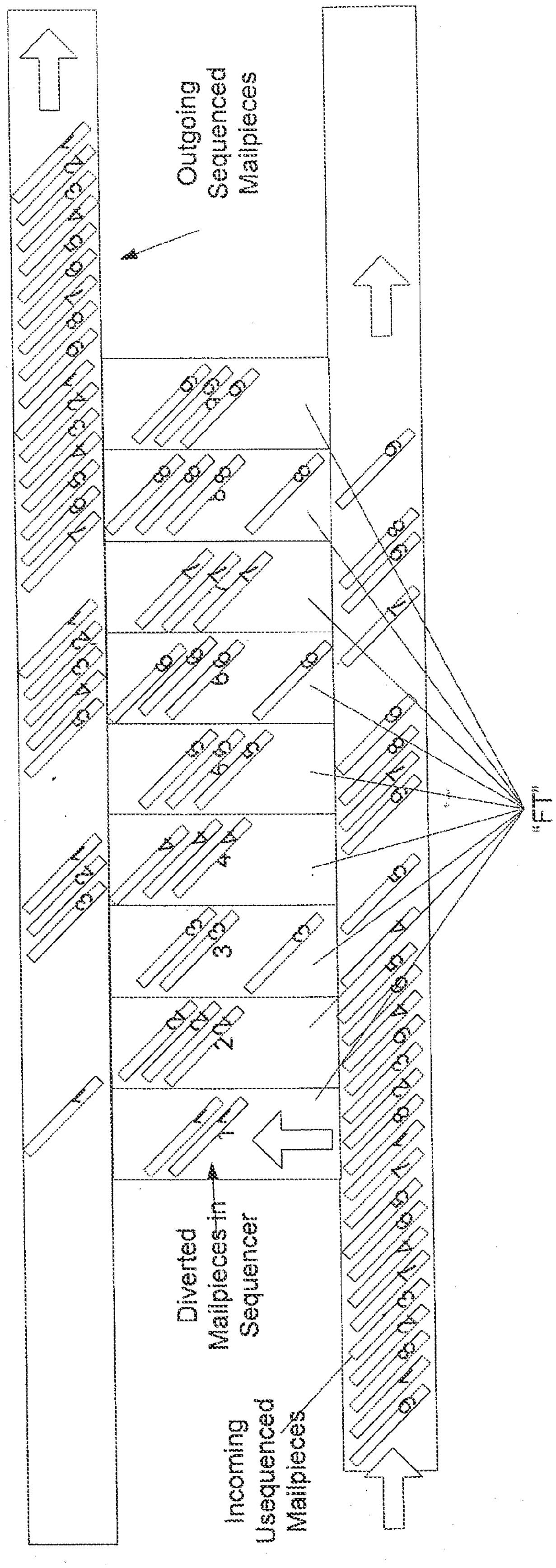
FIG. 9E shows a schematic of a non-limiting embodiment of a mail section sequencer in accordance with aspects of the invention.

By way of further example, diverts may also be implemented in a mail sorter and/or sequencer, itself. As shown in FIG. 9E, frames can be streamed through an input conveyance path in an un-sequenced order and divided into a plurality of divert paths (or "sections") corresponding to the number of diverts associated with the sequencer (e.g., nine diverts). As the frames are streamed to the different divert sections, a sorting process can begin. For example, in the example of FIG. 9E, each frame is designated with a number from 1 to 9, as there are nine different diverts. Numbers 1-9 also represent the order of each mail piece in the group of nine. These incoming unsequenced mail pieces are diverted into the sorting "aisles" based on that sequence number. The sequence number only refers to the position within that group of 9 (and does not have any relation to the position of letters in other groups). In this example, all mail frames designated with "1" will be diverted to the first divert, all mail pieces designated with a "2" will be diverted to a second divert, and so on. In this way, each divert will handle a certain designated mail frame. As the frames are diverted to the outgoing transport, they are placed in a numerical order, e.g., 1, 2, 3, 4, 5, 6, 7, 8, 9. This numerical order can be a first sorting of the mail pieces. In this way, the frames (mail pieces) can begin the process in a random order and end a first segment of the process in a numerical order indicative of a first level type sort. The sequence itself, as should be understood by those of skill in the art, may be a configurable algorithm that corresponds to a mail piece destination, a delivery sequence, a mail carrier preference, or other criteria. It should be noted that the numbers in FIG. 9E show a mail sequence of mail pieces relative to other mail pieces in the same "section' for illustrative purposes. For example, a number 5 mail piece in one "section" of mail has no relationship to the sequence of a number 5 mail piece in another "section" of mail.

It should further be noted that each mail piece includes a designated sequencing number and each frame transport "FT" includes a frame transport number. As shown, as each individual mail piece arrives at its designated frame transport "FT", the RAD diverts the mail piece into the designated frame transport "FT".

As further shown in FIG. 9E, the mail pieces travel along their respective frame transports "FT" (also referred to as frame transport tubes) are merged via a respective RAD (not labeled) onto the outgoing path or main branch. Moreover, as can be observed in FIG. 9E, upon being diverted to the main branch, the mail pieces are in a sequenced order with relation to one another. This may be considered a first stage of sorting and/or sequencing. For example, mail pieces are numbered 1-9, which is representative of nine diverts (frame transports FT). In embodiments, these numbers do not represent mail addresses, ZIP codes, etc. but are numbers relating to the number of transports FT. Each respective numbered mail piece will be diverted to its respective frame transport FT, e.g., mail pieces numbered 1 will be transported to a transport 1, etc. As the mail pieces exit each of the frame transports FT, they will be placed in a sequence, e.g., 1-9 for further processing. So, in the example shown in FIG. 9E there are a plurality of groups of mail pieces in a sequence 1-9.

Figure 9F:
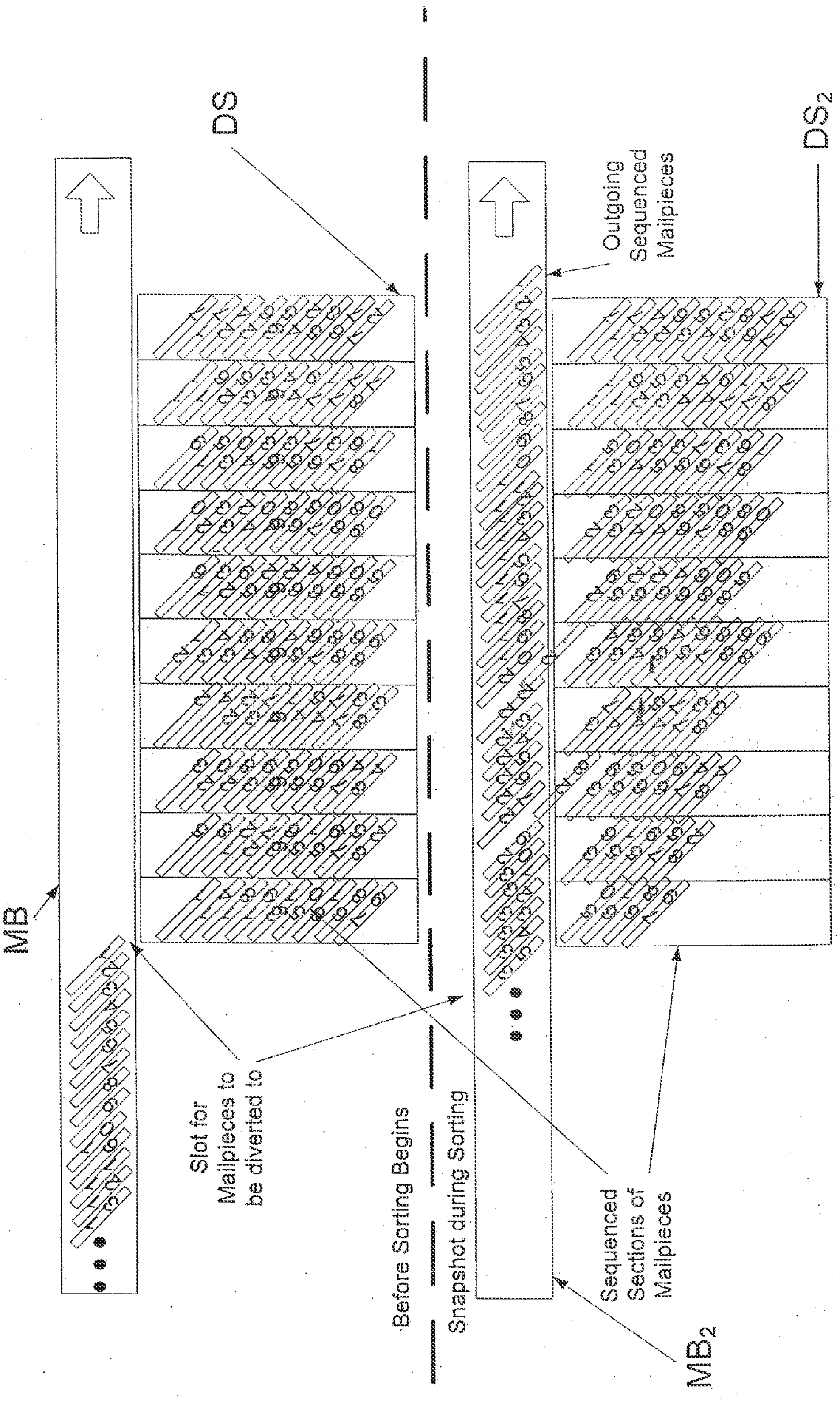
FIG. 9F shows a schematic of a non-limiting embodiment of a mail sequencer in accordance with aspects of the invention.

Similarly, diverts may further be implemented in cascading sections of a mail sorting and/or sequencing system. FIG. 9F illustrates how smaller batches of mail pieces which are themselves in relative sequenced order may be grouped together to form larger batches of sequenced mail pieces, in accordance with aspects of the present invention. In this exemplary embodiment, upon being merged, the mail pieces are within groups of nine, as there were nine frame transport tubes in the first stage of sequencing.

As further shown in FIG. 9F, the output of the first stage is cascaded to a second stage. In the second stage of the sequencing/sorting, the mail pieces are diverted via RADs (not labeled) into respective frame transports. It should be noted that the numbers on the mail pieces in the second stage reflect the second stage group ordering. Additionally, it should be noted that with this exemplary embodiment, upon being merged, the mail pieces are within groups of ninety, as there were nine frame transports in the first stage of sequencing and ten frame transport tubes in the second stage of sequencing. It should be appreciated that the output of the second stage can be cascaded to a third stage, etc. As such, additional stages and frame transports may be added to sequence any size group of mail pieces. Thus, with this exemplary embodiment, the third stage can be an intermediate or a final stage. Moreover, in embodiments, as each frame transport in sequenced order in a final stage the output may be retrieved at full conveyor speed.

More particularly, FIG. 9F shows frames being diverted from a main branch MB into different divert sections DS. From these divert sections, the frames can then be further diverted into a second main branch $MB_2$ and thereafter into additional divert sections $DS_2$. Although only two main branches and divert sections are shown, those of skill in the art will realize that more than two cascading sections are contemplated by the present invention. In this example, the main branch MB includes some frames that may have been sequenced to a certain depth with relation to other mail pieces in the group. The frames are diverted to the diverts DS and, depending on the sorting algorithm, are diverted in a certain order to the main branch $MB_2$. Positions on an output conveyance path, e.g., main branch $MB_2$, that mail pieces will occupy after sequencing are shown with dashed lines. Thereafter, the frames are diverted into the diverts $DS_2$ in a certain order based on the sorting algorithm. This cascading process can continue until all of the mail pieces with a frame are sorted to a certain depth or sequenced. As such, the bottom of the figure representatively shows a snapshot of on-going sequencing operations.

As should be recognized, the input stream brings in a continual stream of mail pieces. For the sortation to work, the conveyor does not have to slow down or stop but just continually sort the mail. For this sortation, it does not matter about the sequence of future or past mail pieces; just the mail pieces in the group. Therefore, there is no need to know the destination of every mail piece before sorting can begin (as with current "n-pass" sorting used by the USPS). All the sorting requires knowing is the order within the group. However, it should be recognized that using the ZIP code, it is possible to use a sort scheme or plan to always determine the order of a group of mail pieces. Second, all mail pieces are sequenced in relation to all other mail pieces. So another sorting stage is introduced with reference to FIG. 9F, for example. In this stage the sequence groups are each diverted to a separate tray. For illustration purposes, 10 sort trays are used for this sorter. As should be understood, mail pieces are diverted out in sequence, e.g., groups of 90 mail pieces in sequence order. Additional stages can be added to have any group size.

Figure 9G:
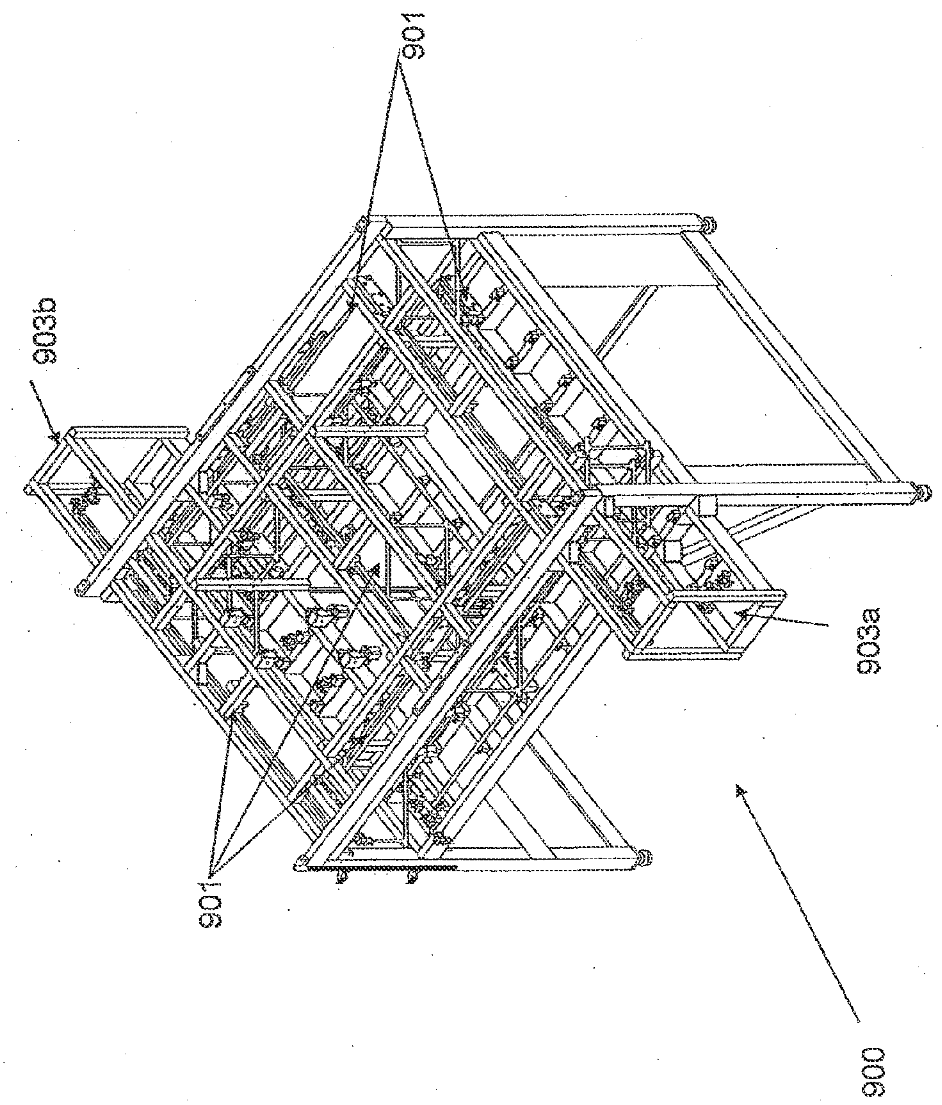
FIG. 9G shows a perspective view of a non-limiting embodiment of a conveyance module in accordance with aspects of the invention.

FIG. 9G shows a non-limiting example of a perspective view of a sorting and/or sequencing module 900 that may be implemented within a sorting and sequencing system. The module 900 includes a plurality of conveyance paths 901, at right angles to one another. These conveyance paths 901 may be representative of the conveyance paths shown in, for example, any one of FIGS. 9A-9E. The sequencing module also includes docking stations 903*a* and 903*b*, designed to dock with shuttles. The docking stations 903*a* and 903*b* can be an input docking station and an output docking station, respectively. That is, the docking station 903*a* can be provided for shuttles to input frames into the module and the docking station 903*b* can be provided for shuttles to receive frames from the module.

It should also be understood by those of skill in the art that the module 900 is configurable; that is, the modules are designed in such a way that the two or more modules can be interconnected to one another at the docking stations, for example, or at any of the conveyance paths 901. This makes the system flexible for enlarging or minimizing the processing capabilities of the system by simply adding or subtracting modules from the system. Also, it should be understood by those of skill in the art that any of the conveyance paths may also be eliminated or added, depending on the particular application. For example, the middle conveyance path can be eliminated or an additional middle conveyance path can be added to the system. As such, it is contemplated that the module provided in FIG. 9G may be reconfigured to accomplish any necessary filtering of mail pieces required by being expanded, multiplied, reduced, or otherwise reconfigured so as to accommodate the various needs of a given sorting and/or sequencing system. The module 900 also forms the basis for various machines including, but not limited to, multiplexers, sequencers, induction units, and presort accumulators.

Figure 9H:
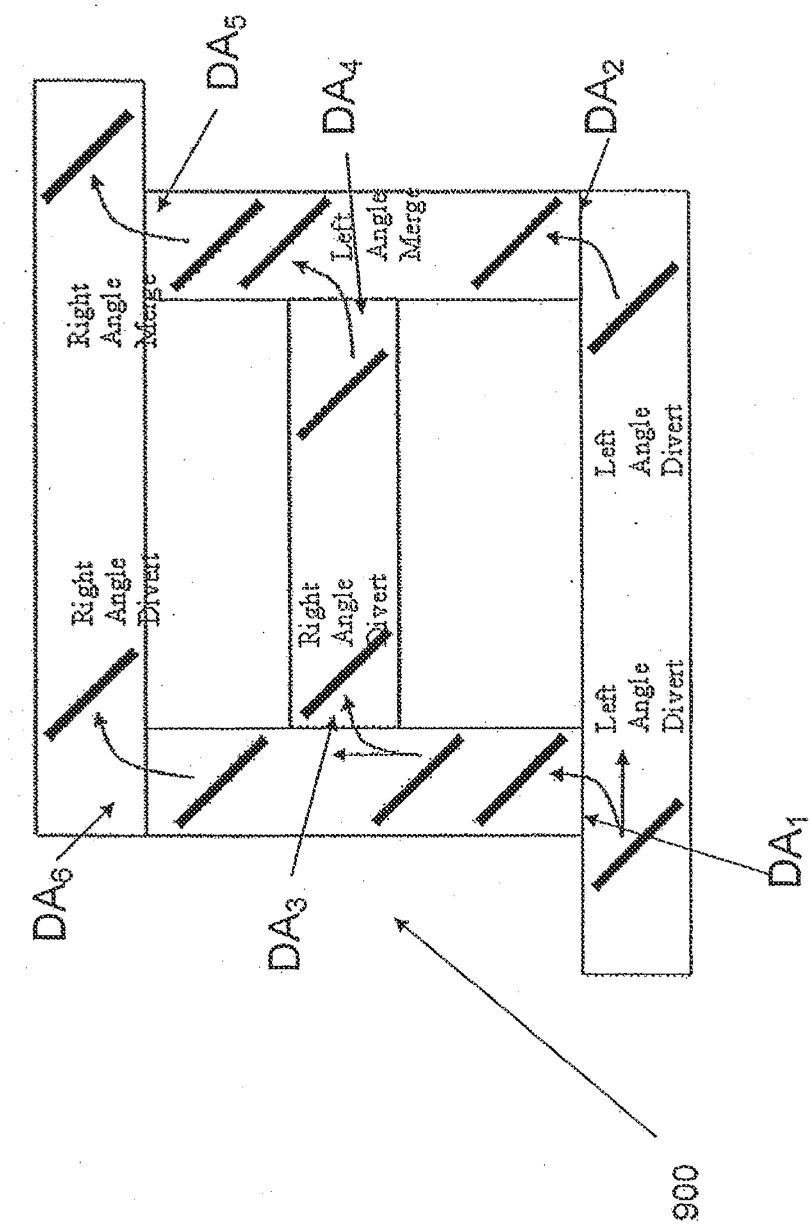
FIG. 9H shows a schematic of a non-limiting embodiment of right angle diverts in the conveyance module of FIG. 9G in accordance with aspects of the invention.

More particularly, FIG. 9H shows various conveyance paths and diversion options of a frame conveyed through the module of FIG. 9G, from an entrance to an exit. In embodiments, at the point of any diversion, the trailing edge of the frame (in the input conveyance path) will direct the frame to the divert direction. That is, the frame will be diverted into an alternative path by its trailing edge. In an active divert area, frames may either be diverted or they may bypass the point of diversion to continue along the input conveyance path to some subsequent output conveyance path (depending on the specified algorithm controlling movement of the frames). Frames may also be merged with other frames as they are diverted.

By way of illustration, at induction, the frame can perform an active left angle divert or a passive left angle divert. More specifically, the frame can be actively diverted leftward at divert area $DA_1$. This is an active divert because the frame has the option of traveling in a straight path. Alternatively, the frame can be passively diverted leftward at divert area $DA_2$. This is a passive divert, as the frame must be diverted at this position.

Taking the flow path from the active divert area $DA_1$, the frame can travel to either divert area $DA_3$ or divert area $DA_6$. At divert area $DA_3$, the frame can be actively diverted rightward and then passively diverted left at divert area $DA_4$. At this left angle divert, the frames are merged in the conveyance path with frames that were passively diverted at divert area $DA_2$. In a merge, the input conveyance path runs into an output conveyance path carrying a plurality of frames and extending in perpendicular to the direction of the input conveyance path. Again, there is an active divert because the frame has the option of traveling in a straight path. The frames from divert area $DA_2$ and divert area $DA_4$ would then merge at divert area $DA_5$ with frames passively diverted at $DA_6$ to the exit.

Taking the flow path from divert area $DA_3$, the frame can be passively diverted through right angle divert at divert area $DA_6$ to the exit. Similar to the diverting process at divert area $DA_4$, the frames are merged in the conveyance path with frames that were passively diverted at divert area $DA_2$.

As thus described, utilizing diverts allows mail to be continuously processed to various locations throughout the mail sorting and/or sequencing system without compromising the speed of the conveyance system. Diverting of the mail pieces improves sorting, sequencing, and storing mail pieces for delivery to predetermined destinations. Processing of mail pieces is further enhanced because slot spaces for frames need not be fixed (e.g., during a merge) for a given diverted mail piece. That is, since the overall system knows the thickness and monitors the position of the mail pieces at all times, only the space necessary for the mail piece may be reserved for increased efficiency during conveyance. Using the diverts in this manner is also an improvement over existing mail systems in that waiting for all the mail to arrive to start processing is eliminated, as is having to manually run the mail through many different passes to properly sort, sequence, store, and deliver the mail.

Divert Mechanisms and Related Conveyances

The right angle divert advantageously achieves a high throughput of frames (i.e., frames per second) at low transport speeds (i.e., inches per second). Achieving the high throughput is accomplished by orienting the frames in the front-to-back stacked manner as discussed above such that the distance between frames (or "pitch") is as small as possible. In embodiments, each frame is provided with at least one pin (e.g., at a top end of the frame) or other mechanism in order to effectuate diversion. Also, in embodiments, the distance between pins of stacked frames will be the same as the distance between the frames, respectively. Therefore, since the distance between frames should be small, the distance between pins should also be minimized.

Active diverts are accomplished by a divert mechanism. The divert mechanism selectively diverts any, all, or none of the frames that cross its path. Thus, the divert mechanism is capable of acting on each individual pin such that the divert mechanism may switch from the input conveyance path to the diverted output conveyance path and back to the input conveyance path between each approaching pin (i.e., frame). This requires fast switching times to accommodate the high throughput and small frame pitch. Alternatively, the divert mechanism may allow a plurality of frames to be diverted before switching back to the input conveyance path to allow other frames to bypass the divert. Thus, the present invention contemplates a variety of divert mechanisms used in conjunction with the various conveyance mechanisms to efficiently move mail pieces throughout the mail sorting and sequencing system.

Rotating Cam Divert Mechanism and Lead Screw Conveyance

Figure 9I:
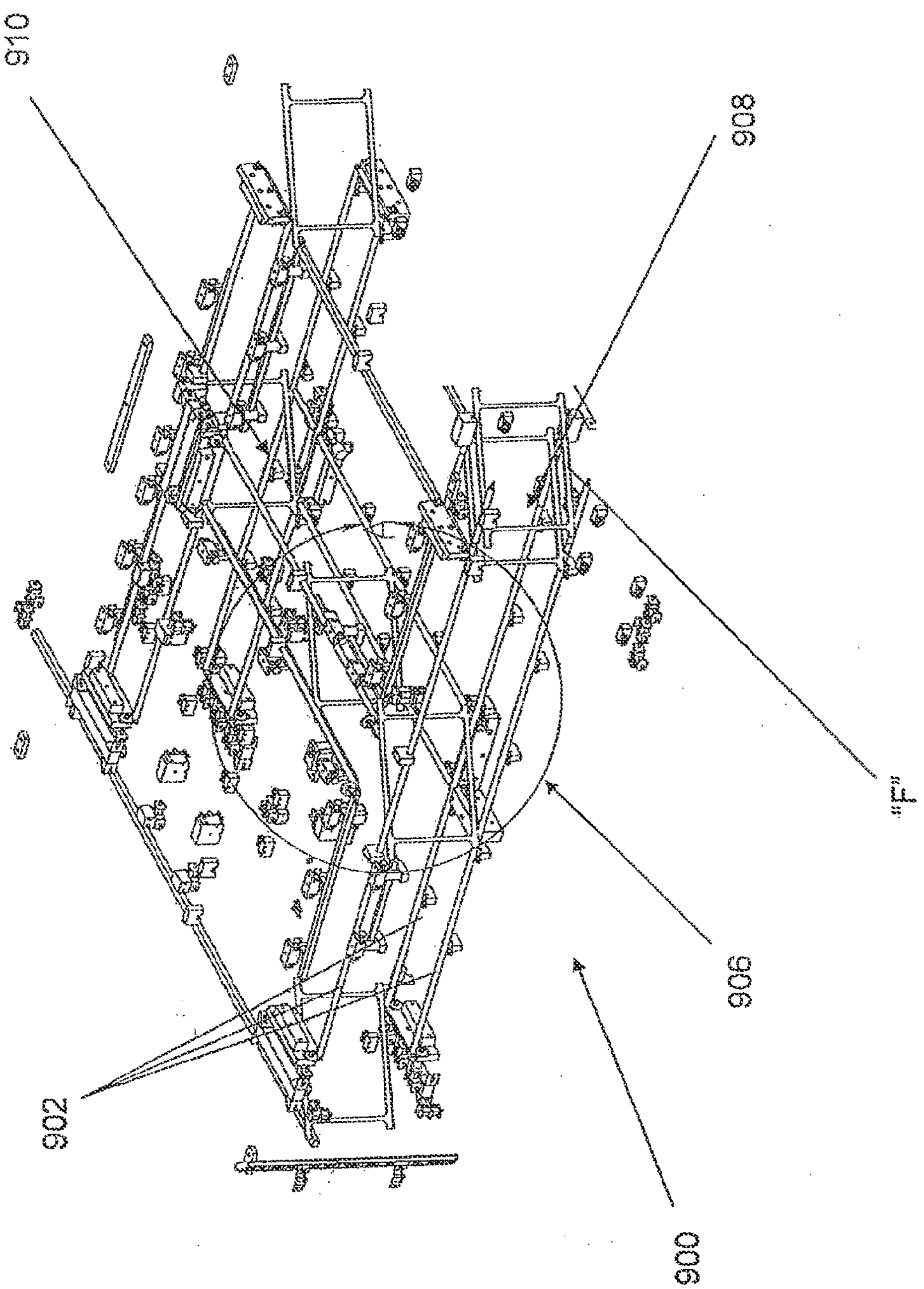
FIG. 9I (A) shows a perspective view of the non-limiting embodiment of the conveyance module of FIG. 9G without support frames of the module in accordance with aspects of the invention.
Figure 9I:
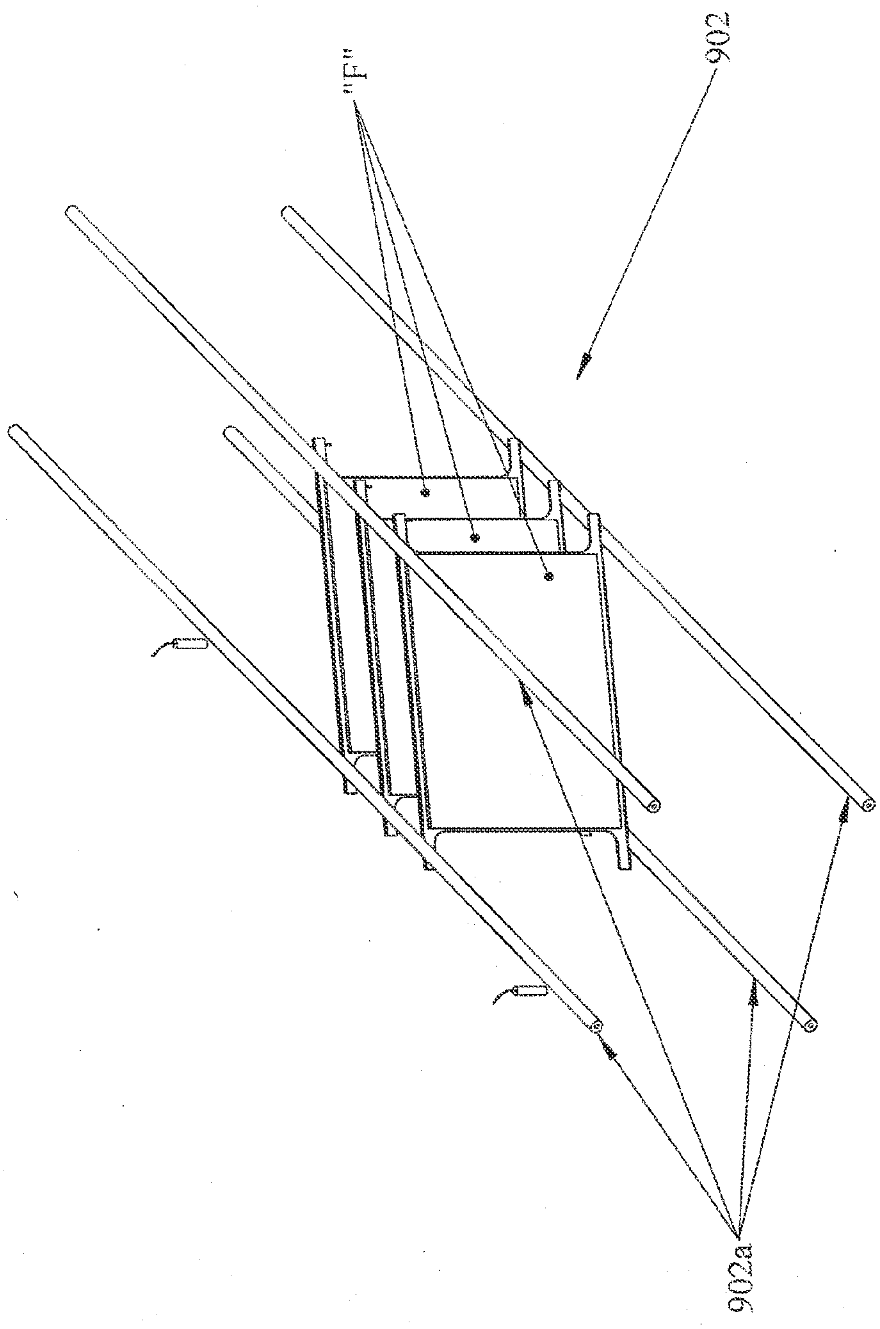

FIG. 9I (A) shows a perspective view of the non-limiting embodiment of the conveyance module of FIG. 9G without support frames of the module in accordance with aspects of the invention. More specifically, FIG. 9I(A) shows a perspective view of the module 900 as discussed above without the support framing to show a four lead screw conveyance system 902 which conveys frames F within the module 900. In embodiments, diverts in a lead screw conveyance system may be accomplished by a rotating cam divert mechanism, as discussed further below. As shown in FIG. 9I(A), the circled area labeled (A) depicts the area of an active right angle divert. That is, a rotating cam divert mechanism 906 interacts with a given frame F (or plurality of frames) to divert the frames F from an input conveyance path 908 to an output conveyance path 910, e.g., divert the frame at a right angle.

Figure 9J:
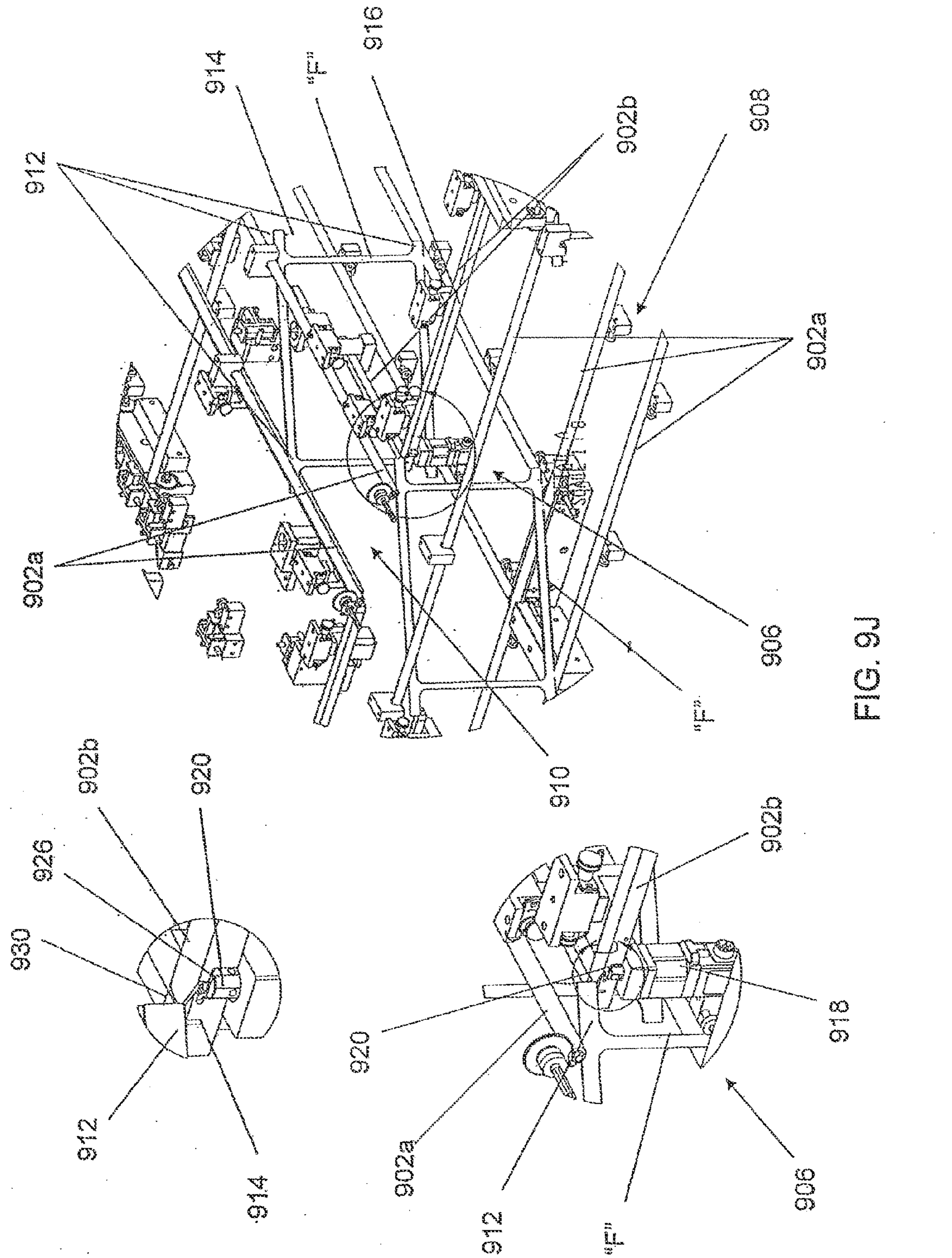
FIG. 9J shows perspective views of a rotating cam divert mechanism in accordance with aspects of the invention.
Figure 9K:
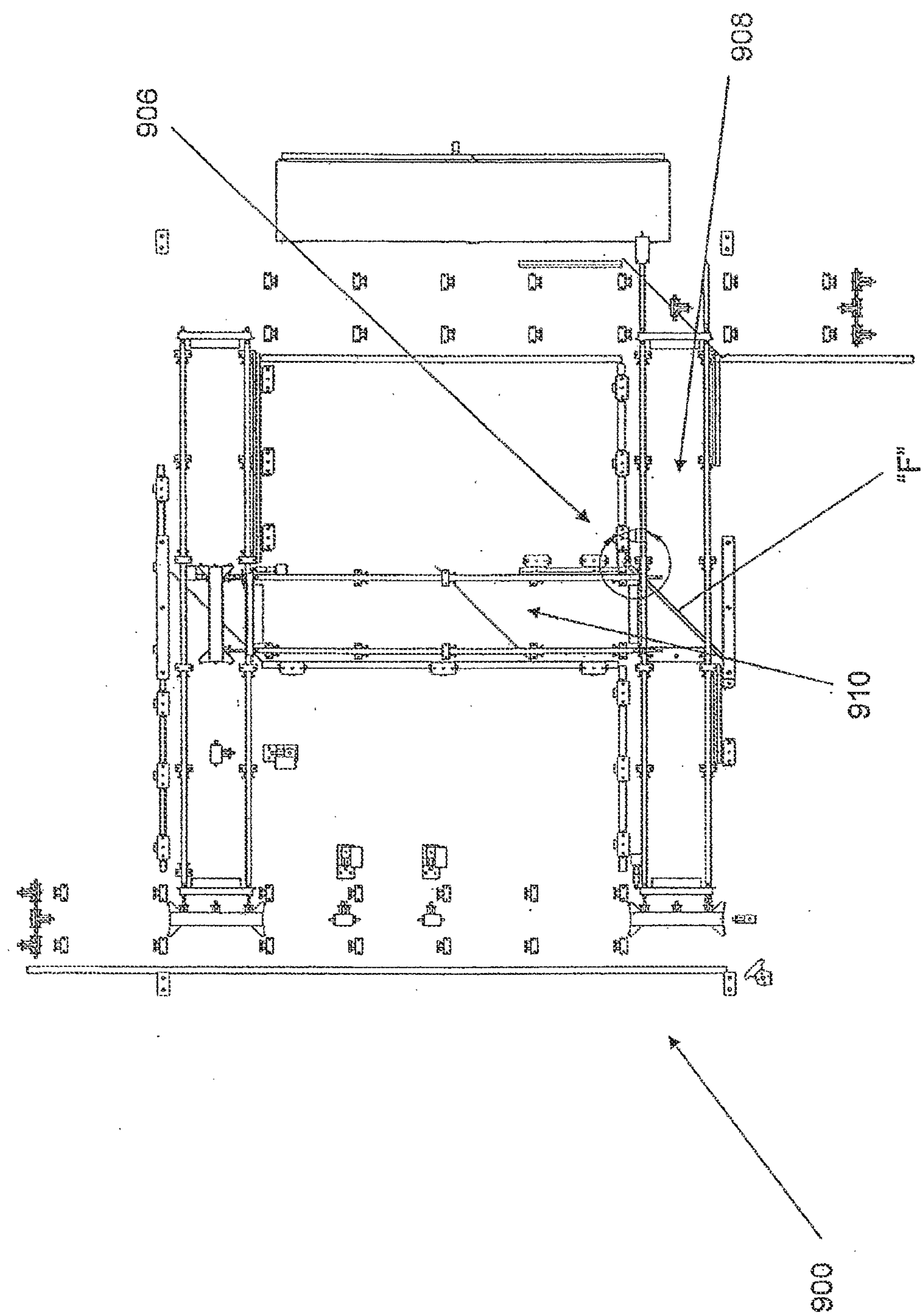
FIG. 9K shows a top view of the non-limiting embodiment of the conveyance module of FIG. 9G without the support frames of the module in accordance with aspects of the invention.
Figure 9L:
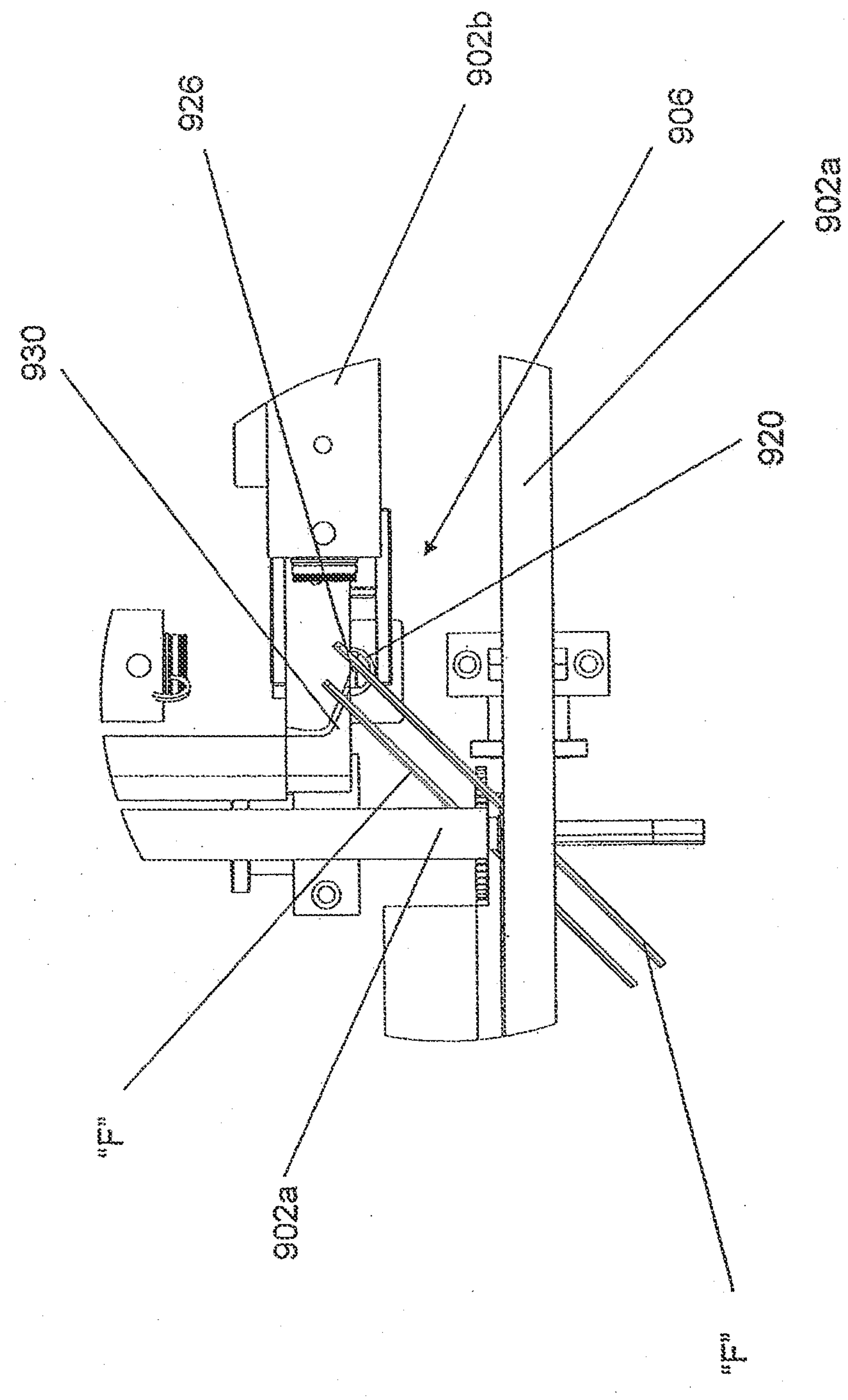
FIG. 9L shows an exploded view of FIG. 9K showing a top view of the rotatable cam divert mechanism in accordance with aspects of the invention.
Figure 9M:
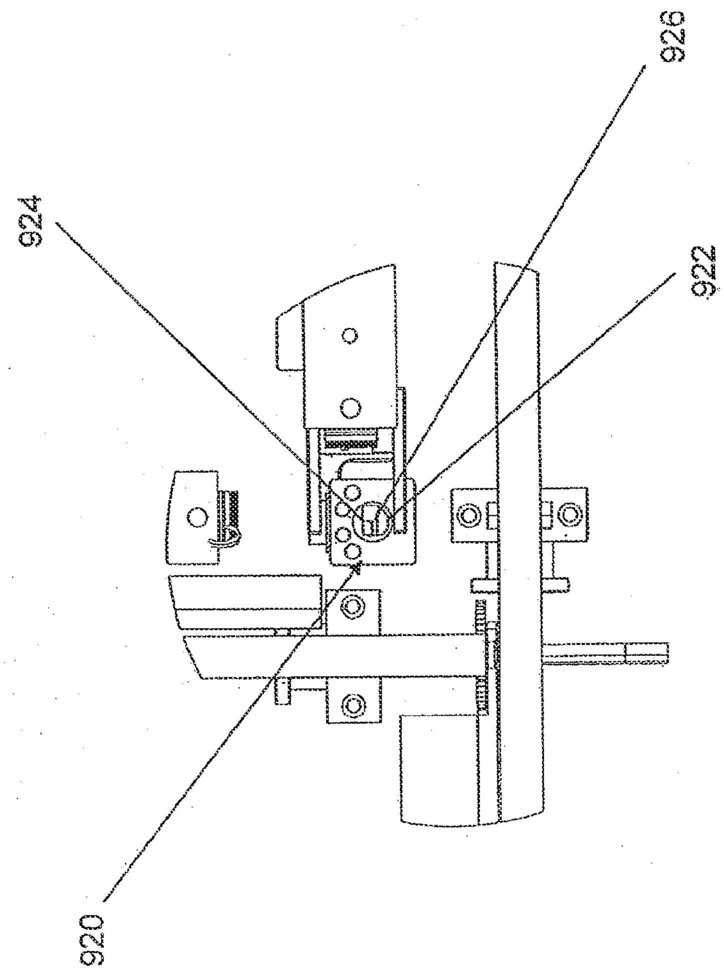
FIG. 9M shows a top view of a rotatable cam in a bypass setting in accordance with aspects of the invention.
Figure 9N:
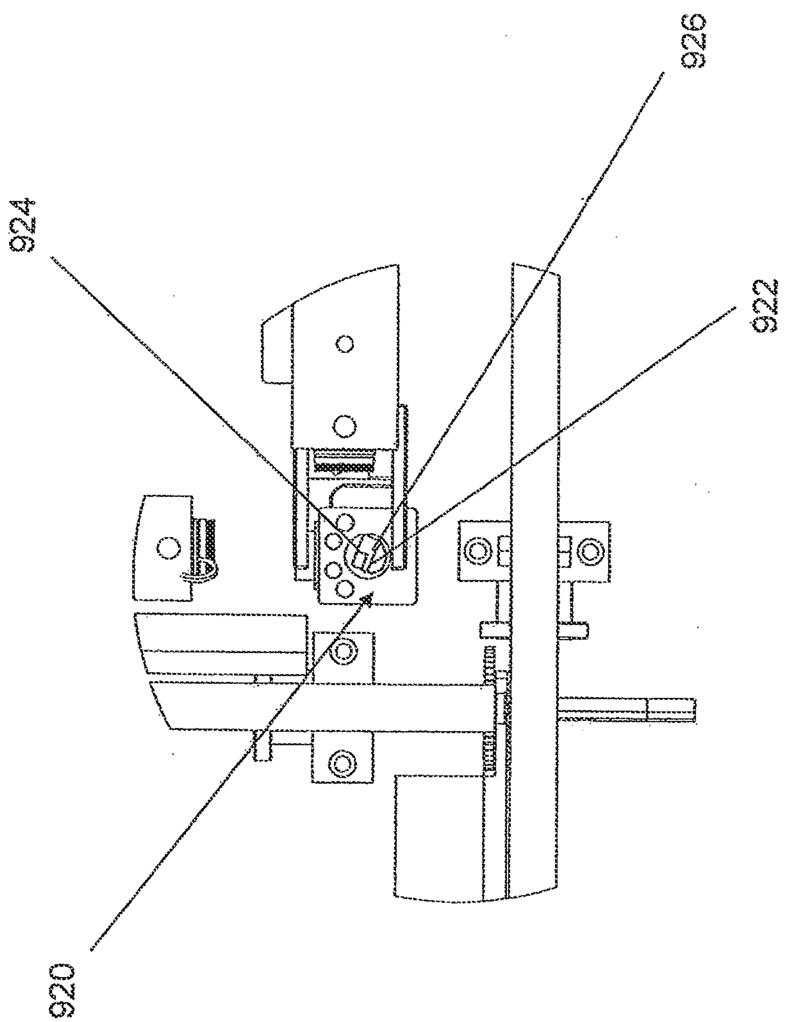
FIG. 9N shows a top view of a rotatable cam in a divert setting in accordance with aspects of the invention.
Figure 9O:
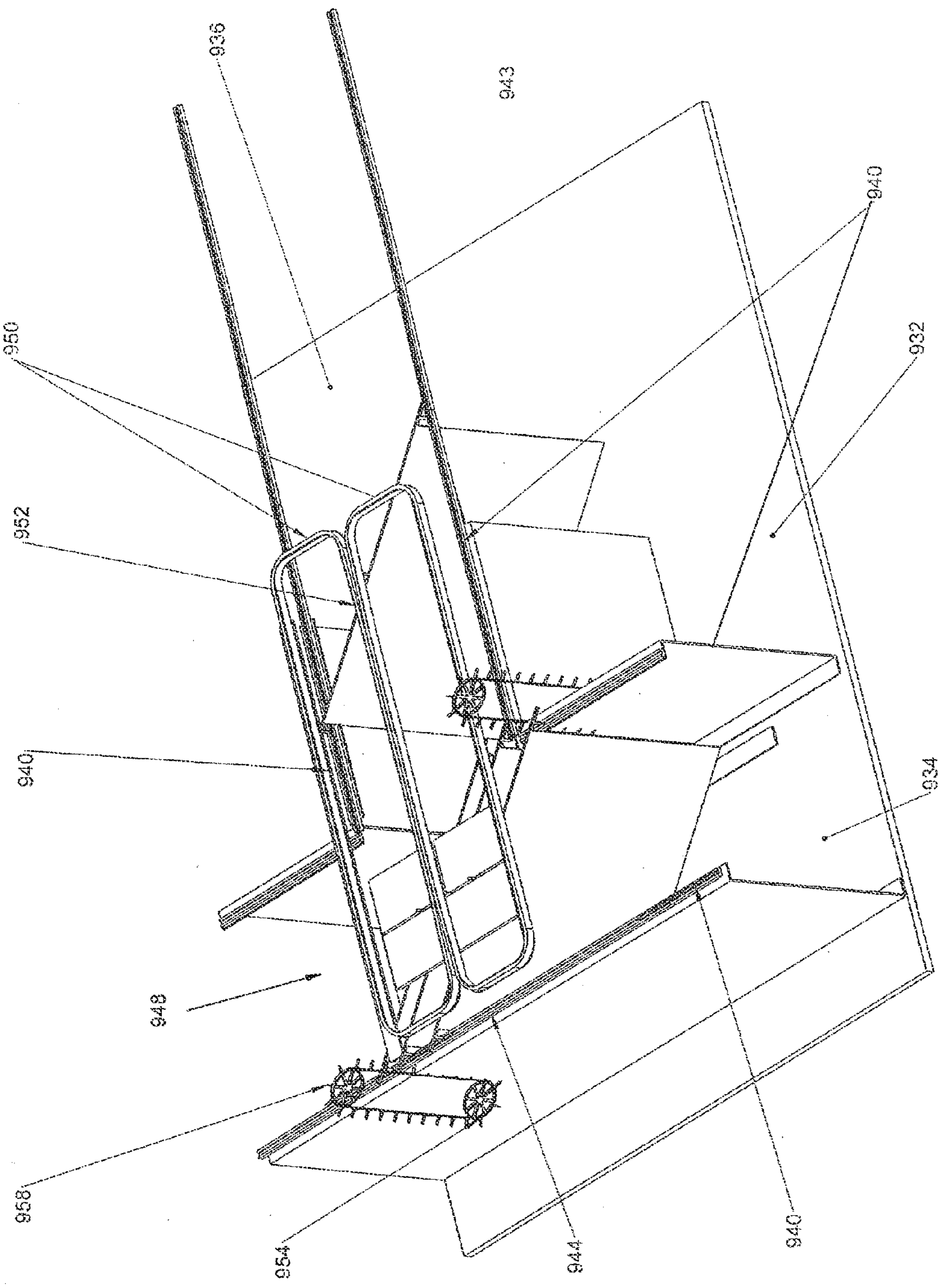
FIG. 9O shows perspective view of a pinch belt divert mechanism in accordance with aspects of the invention.
Figure 9P:
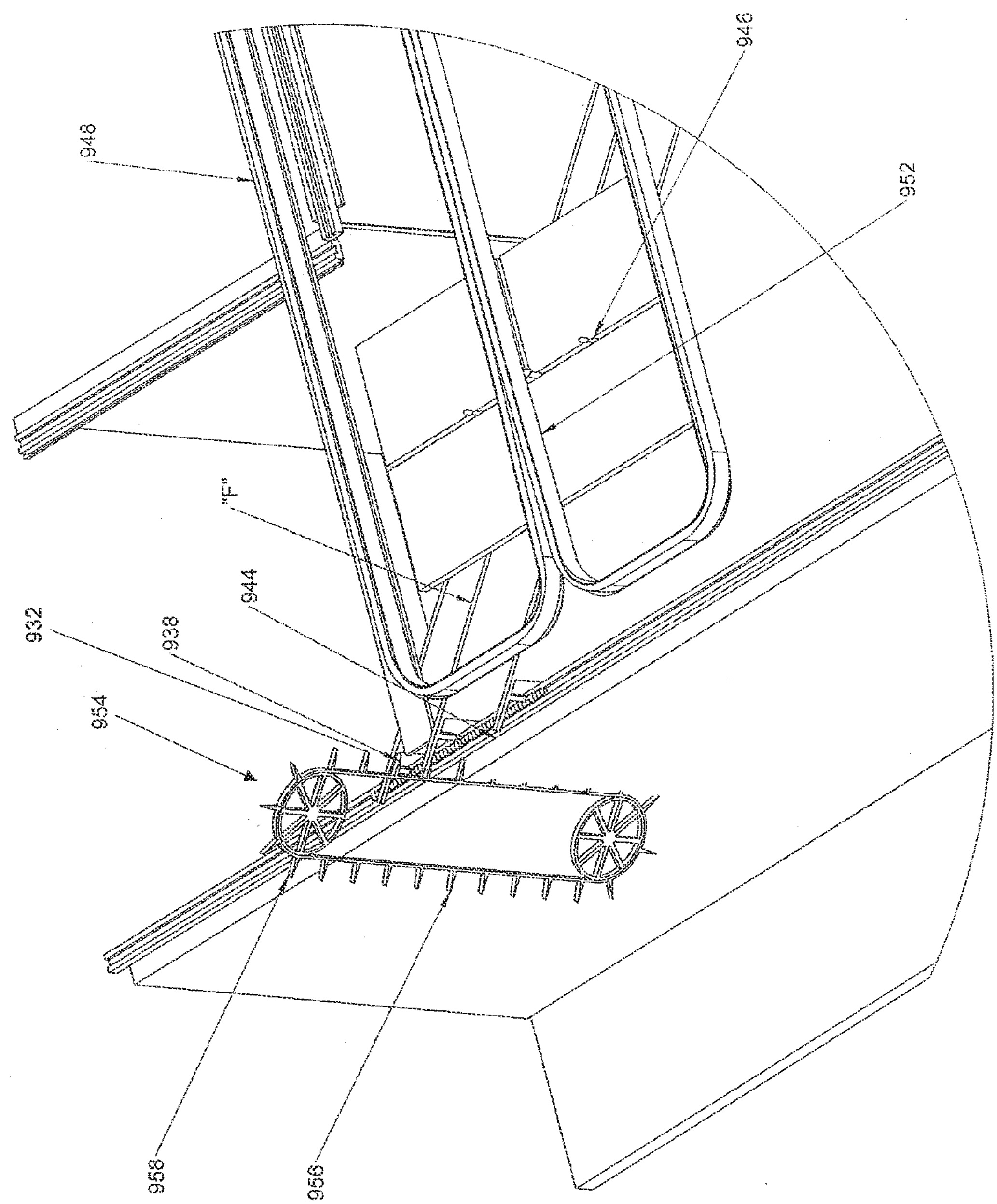
FIG. 9P shows an exploded view of FIG. 9O showing lift mechanisms in accordance with aspects of the invention.
Figure 9Q:
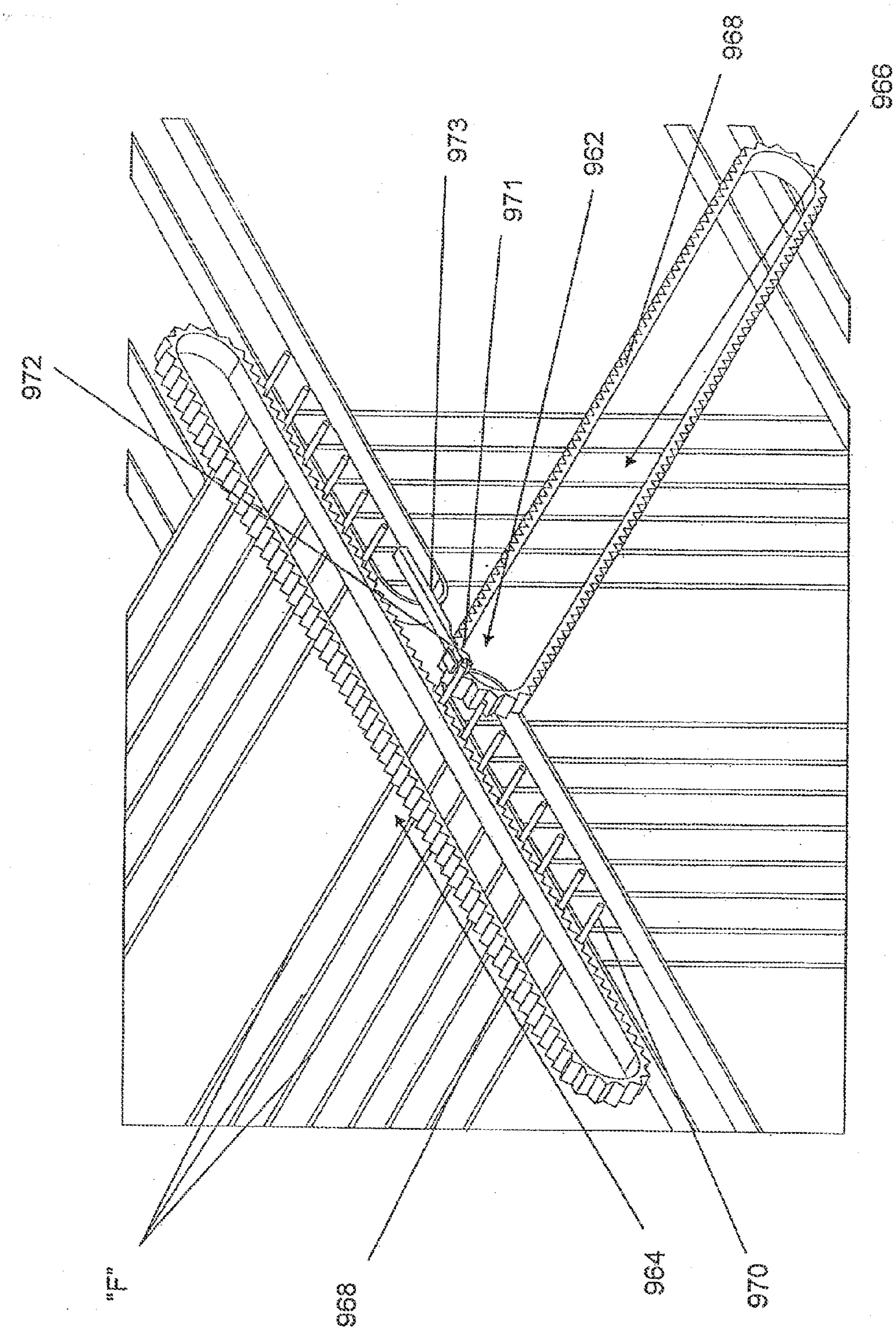
FIG. 9Q shows a perspective view of a non-limiting embodiment of a vertical divert mechanism in a bypass setting in accordance with aspects of the invention.
Figure 9R:
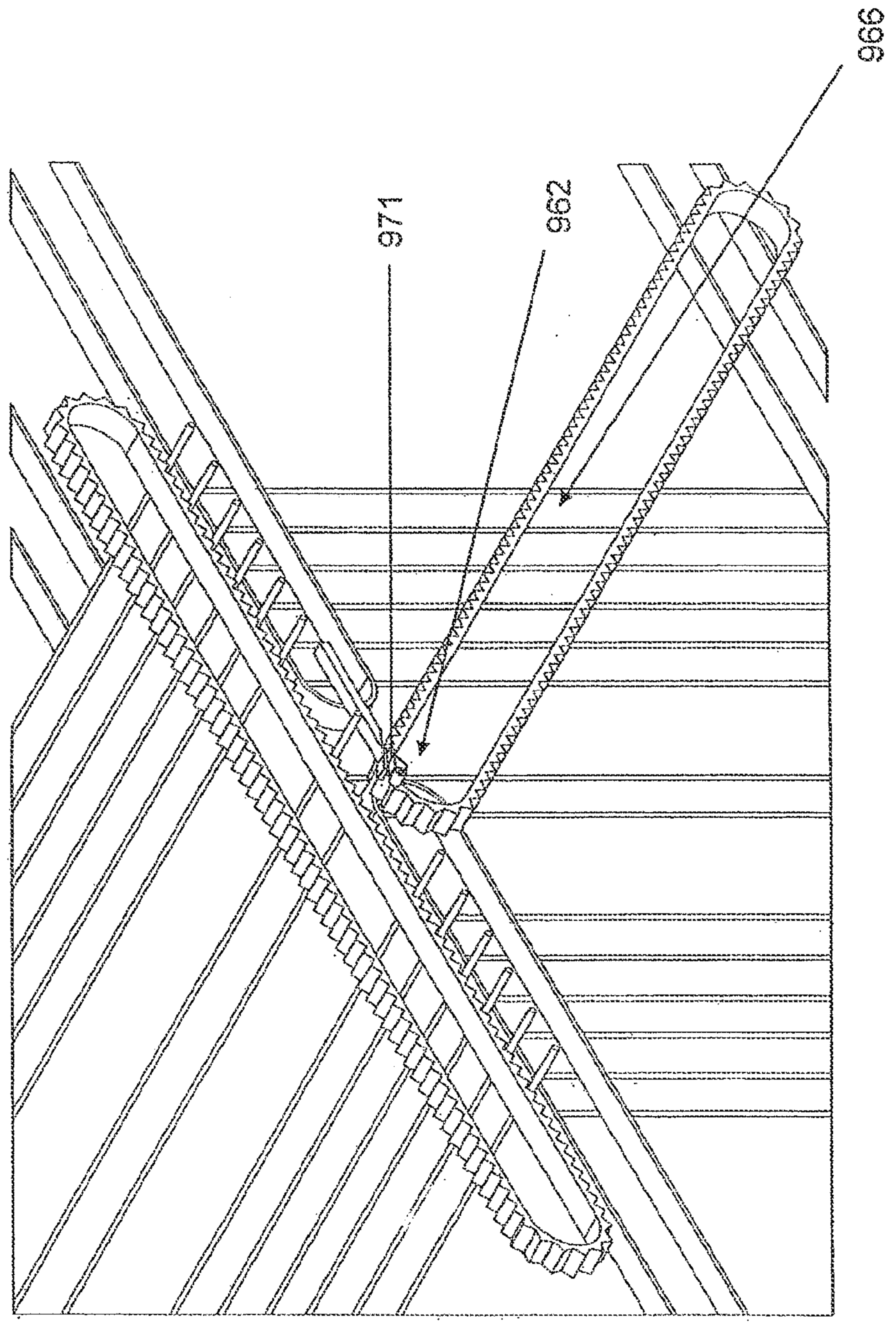
FIG. 9R shows a perspective view of the vertical divert mechanism of FIG. 9Q in a divert setting in accordance with aspects of the invention.
Figure 9S:
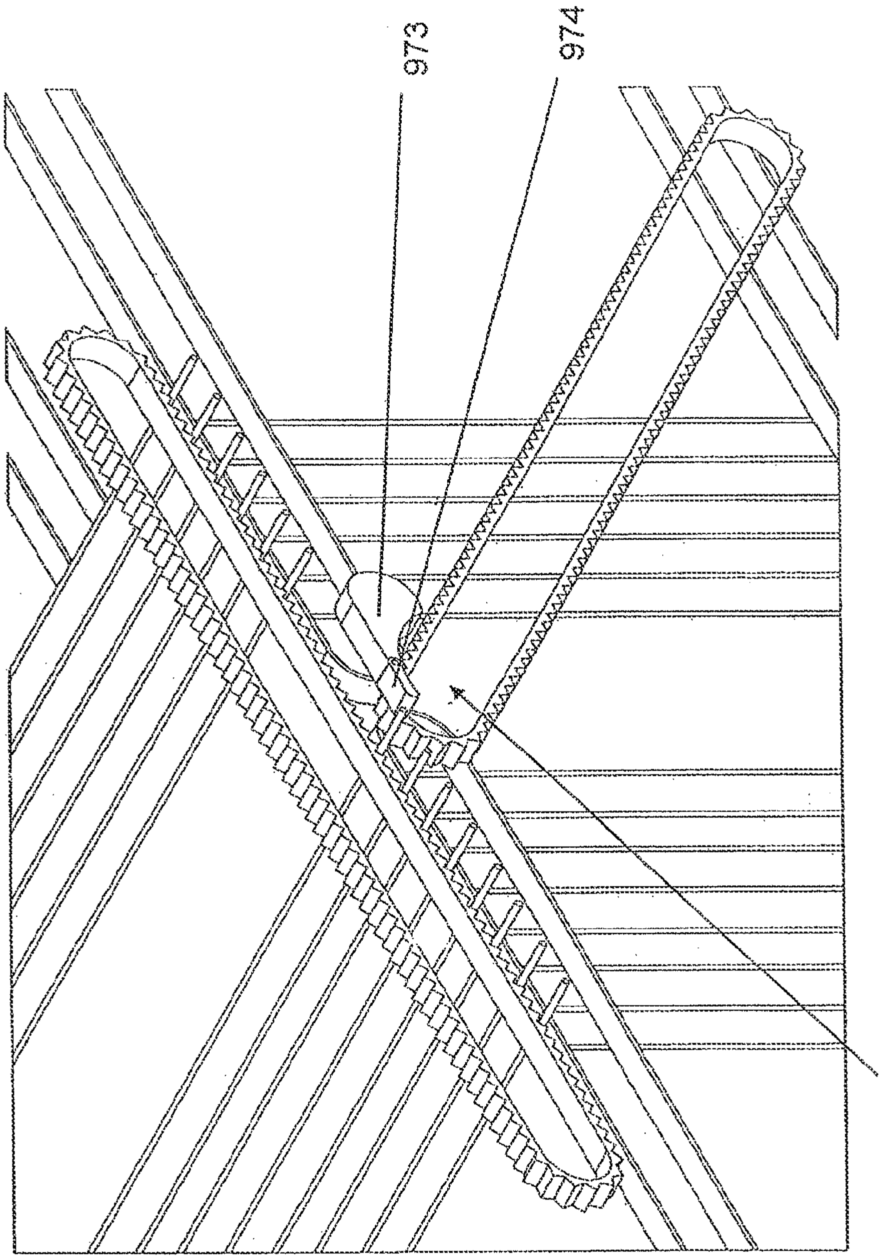
FIG. 9S shows a perspective view of another non-limiting embodiment of a vertical divert mechanism in a bypass setting in accordance with aspects of the invention.
Figure 9T:
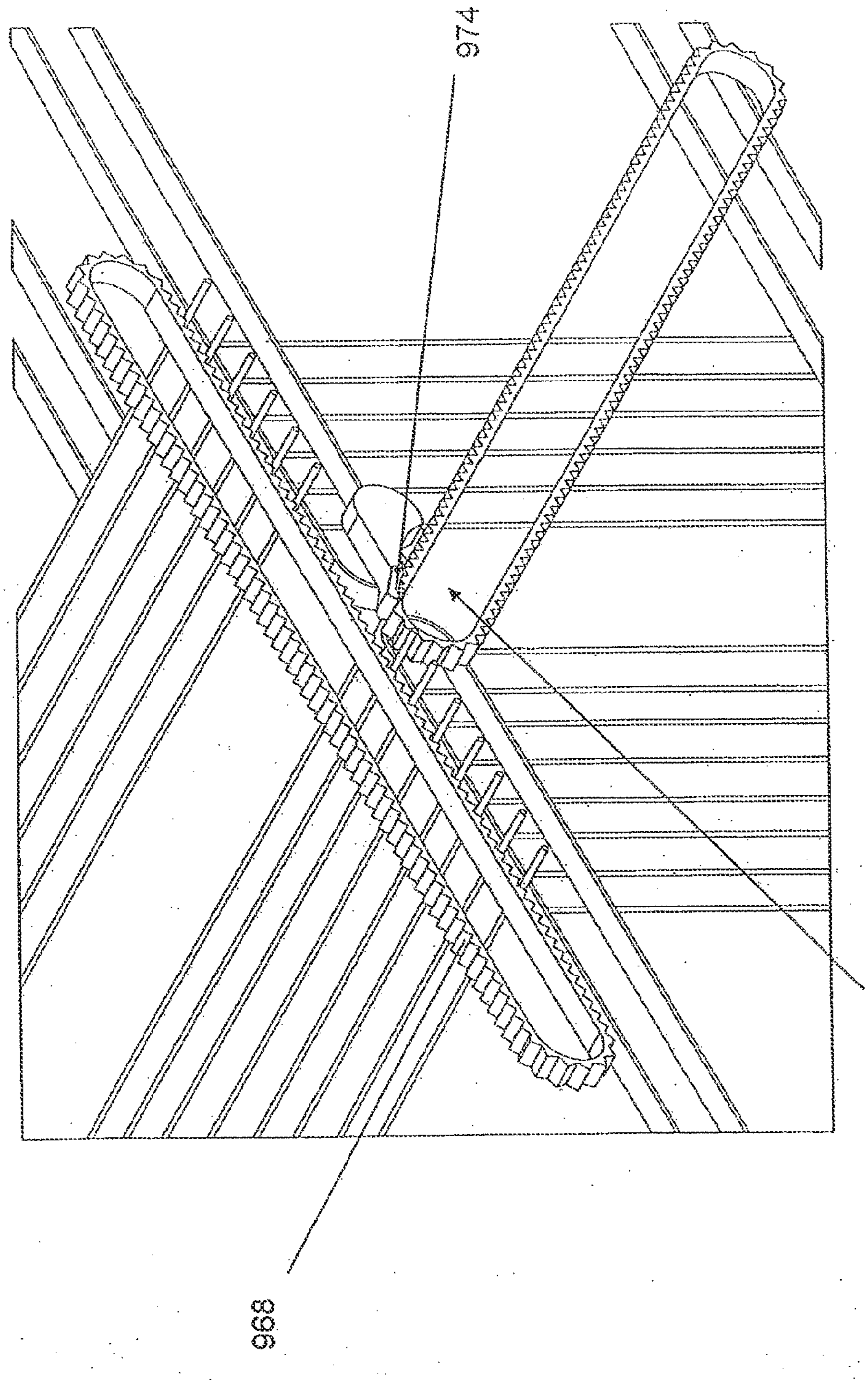
FIG. 9T shows a perspective view of the vertical divert mechanism of FIG. 9S in a divert setting in accordance with aspects of the invention.
Figure 9U:
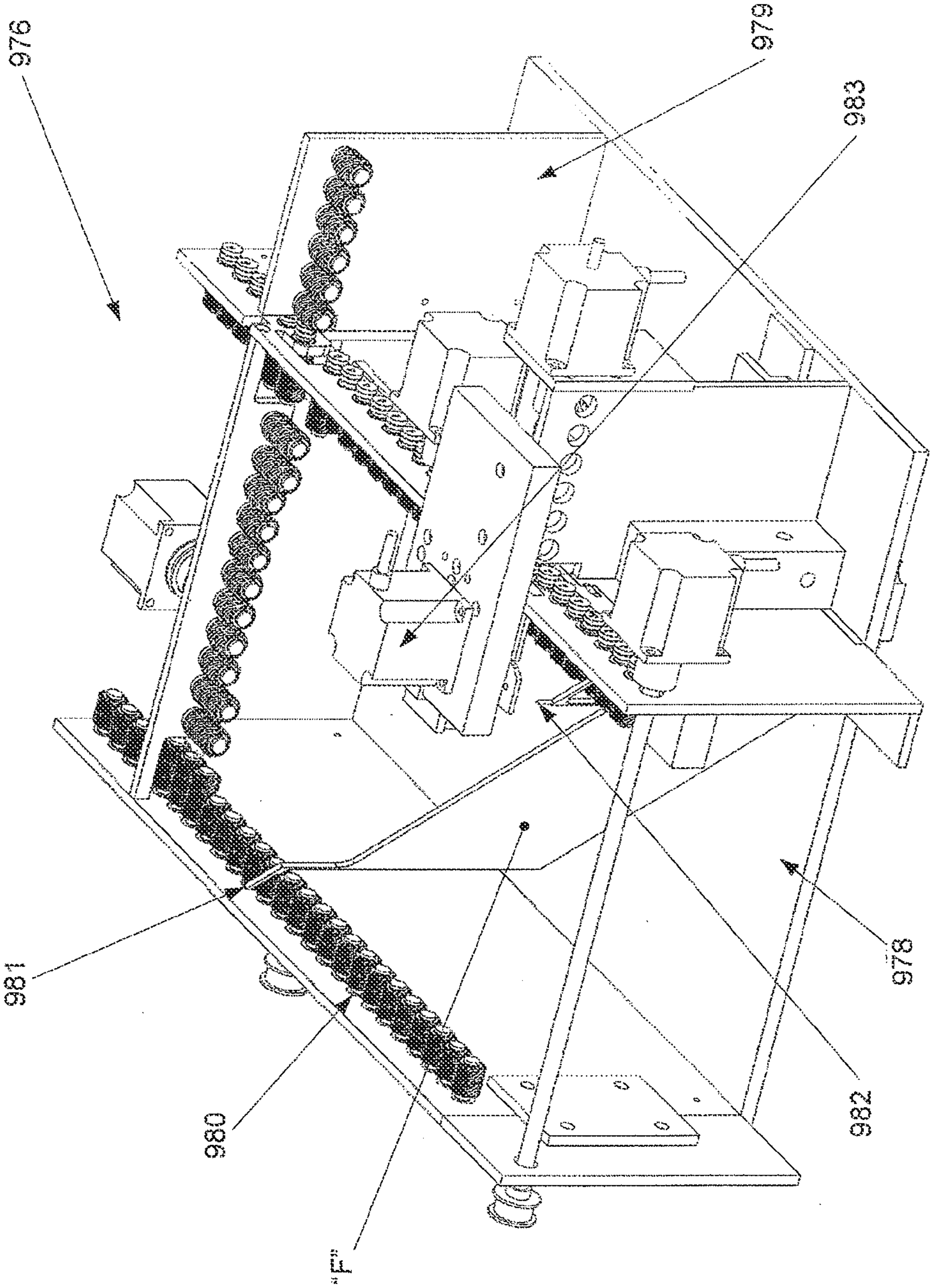
FIG. 9U shows a perspective view of a threaded roller conveyance system having a rotatable slotted cam divert mechanism in accordance with aspects of the invention.
Figure 9V:
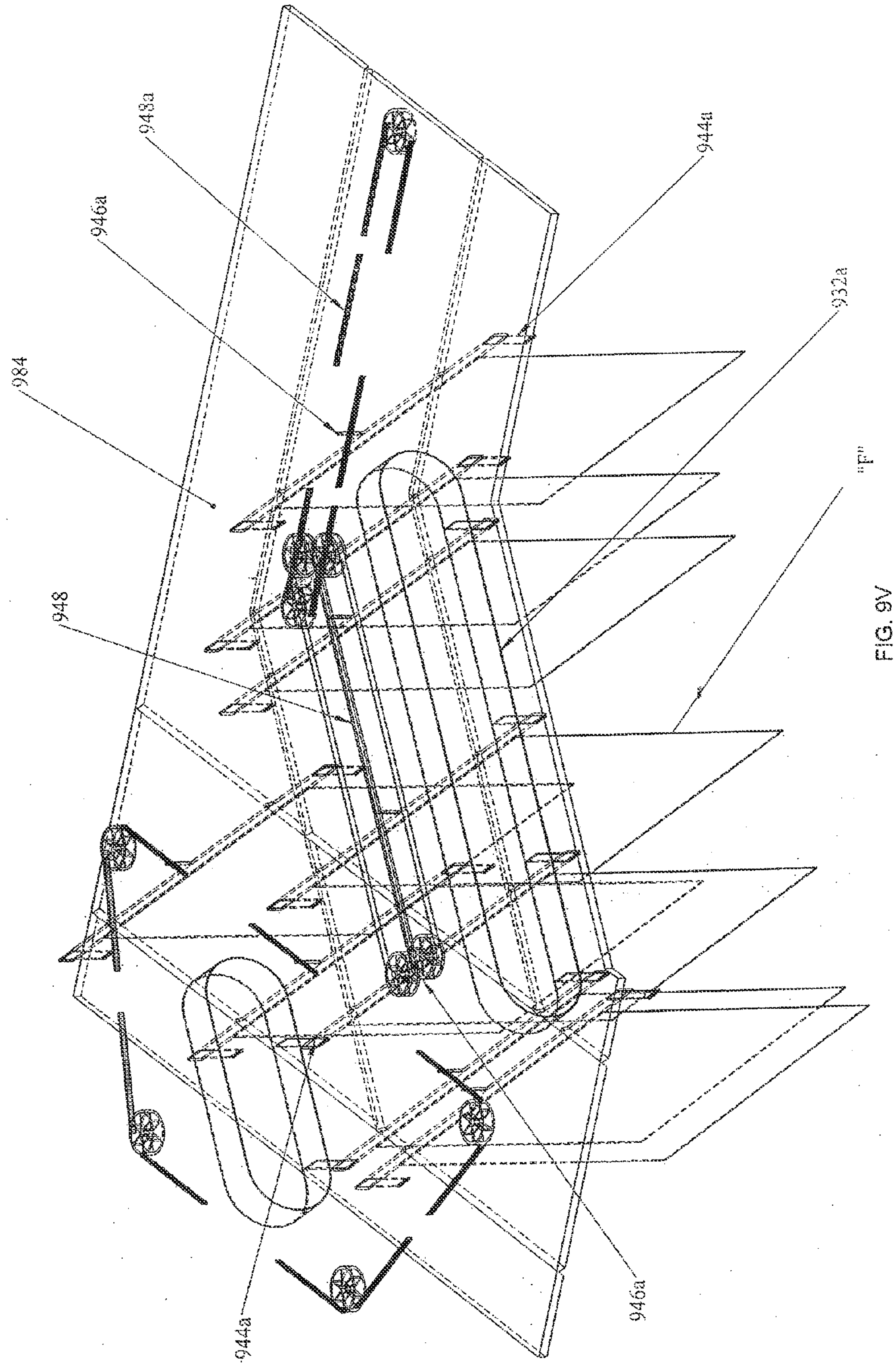
FIG. 9V shows a perspective view of a non-limiting example of a 45 degree divert mechanism within a tooth belt conveyance system in accordance with aspects of the invention.
Figure 9W:
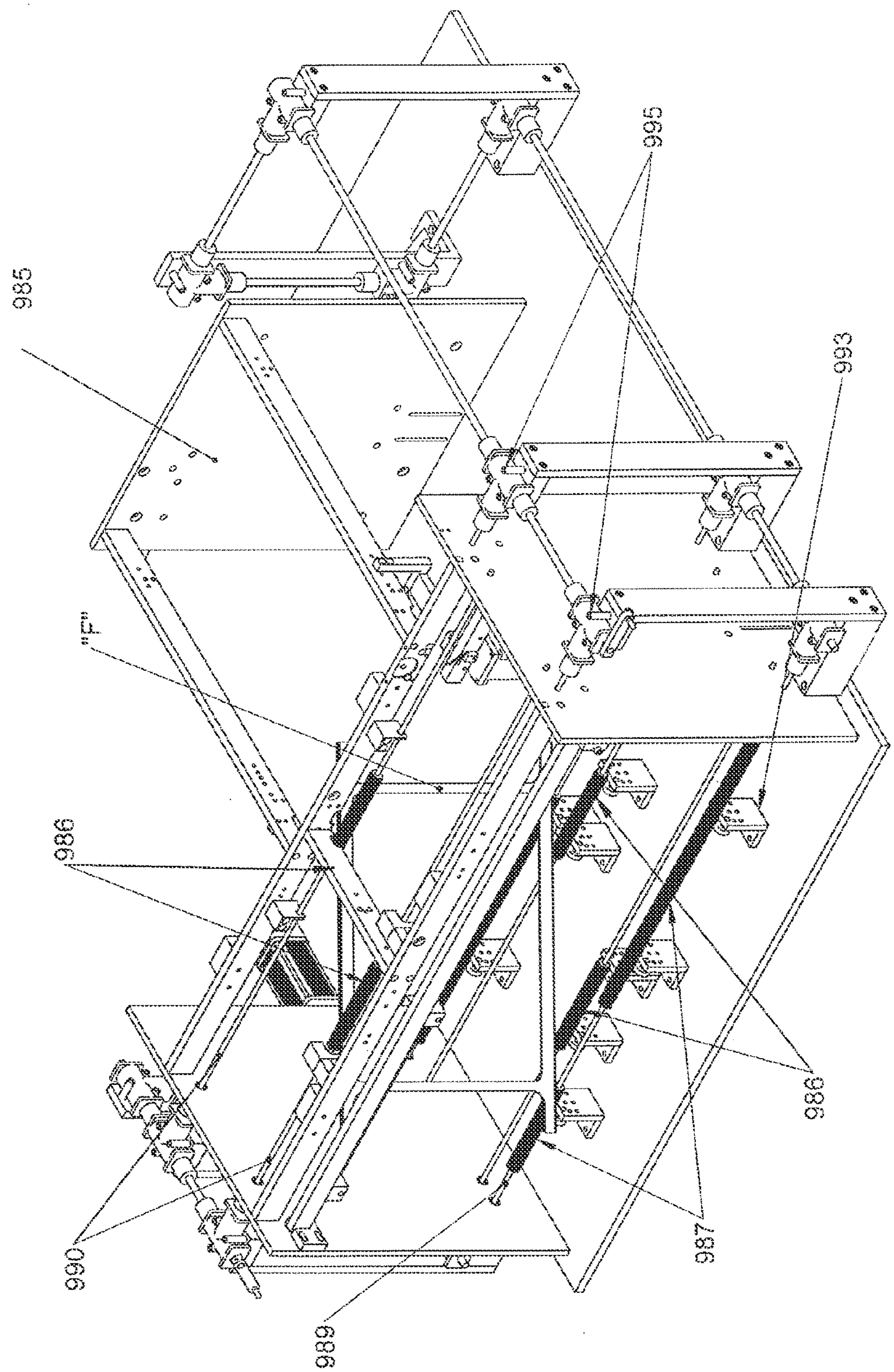
FIG. 9W shows a perspective view of a non-limiting example of an inset compression zone in accordance with aspects of the invention.
Figure 9X:
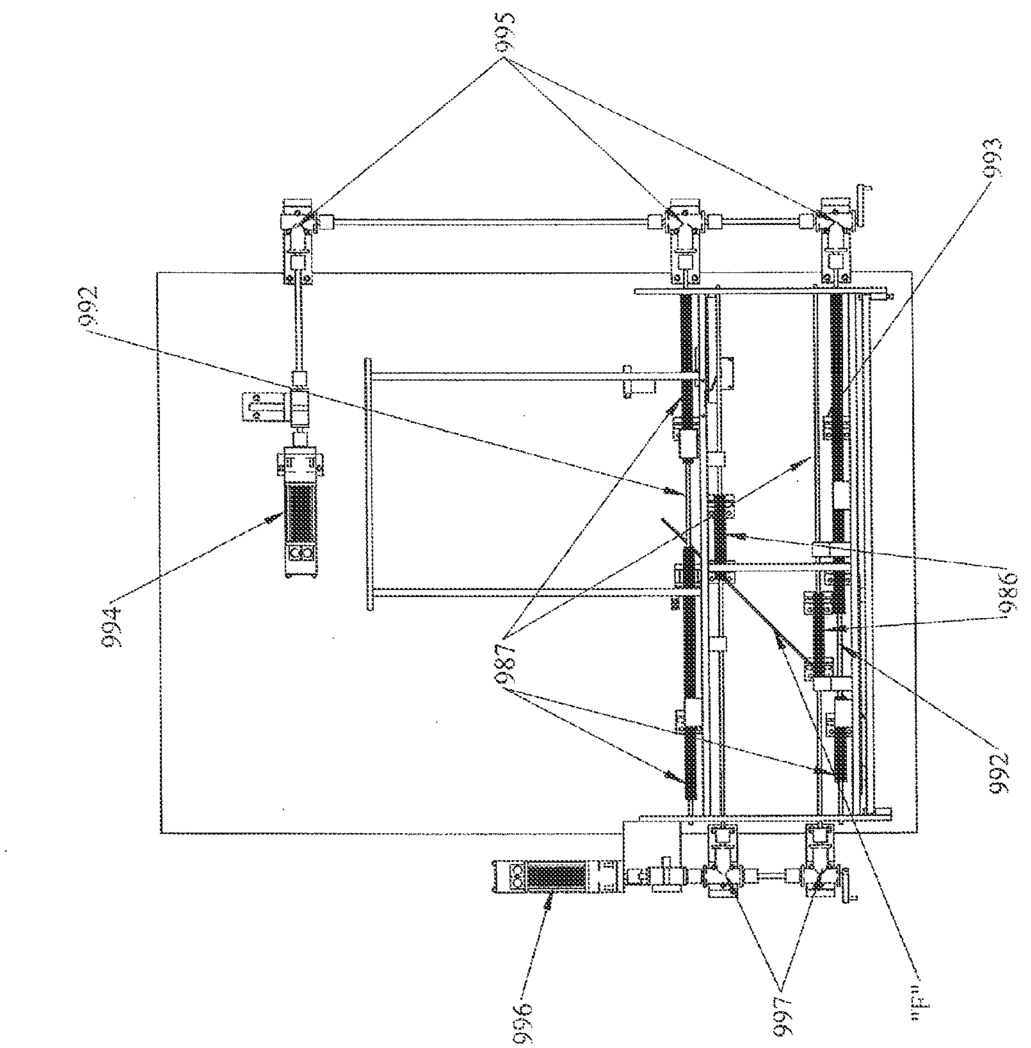
FIG. 9X shows a top view of the inset compression zone of FIG. 9W in accordance with aspects of the invention.

FIG. 9I(B) shows the four lead screw conveyance system as further described with respect to FIG. 9W and FIG. 9X. The four lead screw conveyance system includes a set of at least four lead screws **902*a* (two provided at a lower portion of the conveyance path and two provided at an upper portion of the conveyance path). The upper lead screws 902*a* are parallel to each other in a width direction and parallel to the lower pair in the height direction as both ends extend along the length of the main conveyance path. The lead screws 902*a* are designed and structured to support the frames F at upper and lower edge ends thereof. The lead screws 902*a*** also rotate parallel to each other.

Threads of the lead screws **902*a* have a pitch such that the frames F are angled at 45 degrees to the direction of travel of the lead screws 902*a* and are transported along the lead screws 902*a* to readily and easily engage various divert sections and compression zones without compromising the conveying speed of the system. In this regard, and referring to FIGS. 9I(B) and 9X, the lead screws 902*a* may be powered by an independent motor 994. More specifically, lead screw drive shafts 989 are driven by the motor 994 (which in turn drives the lead screws 902*a*) and may include at least one, one-to-one right angle gear box 995 to provide uniform synchronized rotation of the lead screws 902*a* during operation based upon the output of the motor 994. The right angle gear box 995 is provided so as not to limit the configuration of the system, and may be utilized in an unlimited number of possible configurations for the motor 994, drive shafts 989, and lead screws 987** depending on spacing constraints, etc.

Using the one-to-one gear ratio, it is ensured that all of the lead screws in a given conveyance system rotate at the same speed. This includes main conveyance paths, as well as any divert sections or compression zones the main conveyance path may encounter. As such, the uniform rotation speed of the lead screws **902*a* ensures, e.g., that during a divert bypass, even though the frame F contacts lead screws 902*a*** of the diverted conveyance path, the contact will not impede the forward progress (or constant speed) of the frame along the main conveyance path. However, during a divert, the speed of the diverted frame F is also not affected because of the 45 degree orientation the frame F has with respect to the a direction of travel. That is, the frame F has a natural tendency to move in the direction of the divert and transition of the trailing edge does not impede the speed of the diverted frame F, or does it slow subsequent frames traveling down the main conveyance path.

Referring to FIGS. 9I(B), 9W and 9X, the lead screws **902*a* are supported at a lower surface thereof by a plurality of roller cam brackets 993. The roller cam brackets 993 also maintain the lead screws 902*a* level with a floor surface. In alternative embodiments, the roller cam brackets 993 may also provide the driving force to rotate the lead screws 902*a*, in lieu of, or in conjunction with the motor 994. The present invention further contemplates that the motor 994 may be set to rotate the lead screw shafts 989** at about 110 rpm and tolerances may allow for about a 10% variance in performance.

FIG. 9J shows perspective views of the rotating cam divert mechanism 906 and related components. In particular, FIG. 9J shows a plurality of support members **902*b* that form conveyance paths such as, for example, conveyance path 908 and conveyance path 910. In embodiments, conveyance path 908 is at a right angle with respect to conveyance path 910. The support members 902*b* are also structured to support components such as, for example, the lead screws 902*a*, roller cam brackets 993 (FIG. 9X), one-to-one right angle gear box 995 (FIG. 9X), motor 918 (FIG. 9L), rotating cam 920 (FIG. 9**L), in addition to sensors and other components that require mounting and support.

As further shown in FIG. 9J, frames F are conveyed along the conveyance path 908 and conveyance path 910 (via the lead screws). In embodiments, the frames F include a plurality of projections 912 that engage the lead screws. As the lead screws are at the same pitch and at the same speed, the lead screws in the conveyance path 910 will not interfere with the movement of the frames F as they are being transported along the conveyance path 908, past the intersection of the conveyance path 910. However, when the frames F are to be diverted, the lead screws of the conveyance path 910 will engage the frames F to divert them to the conveyance path 910, by use of the rotating cam divert mechanism 906.

As shown in the exploded views of FIG. 9J, the rotating cam divert mechanism 906 includes a motor 918 and a rotating cam 920 for diverting the frame F. The rotating cam divert mechanism 906 is provided adjacent the intersection of the conveyance path 908 and the conveyance path 910, and is preferably mounted to a support member **902*b* located outside and below an upper lead screw (not shown) of the conveyance path 908. This ensures that the rotating cam divert mechanism 906** will not interfere with the movement of a bypassing frame F.

In operation, the rotating cam 920 may rotate (or switch) between a bypass setting (as seen in FIG. 9M) and a divert setting (as seen in FIG. 9N). By activating the motor, the rotating cam 920 will rotate such that the pin 914 will engage a channel or slot 926 of the rotating cam 920, and be diverted into an angled groove 930 of the support member thereby directing the frame F to the conveyance path 910. In a deactivated position (i.e., a bypass setting), the rotating cam 920 will block the pin 914 from entering into the angled groove 930 such that the frame F will continue along its original path.

In embodiments, the rotating cam 920 should not commence a switching action until the previous pin 914 is clear of the rotating cam 920. However, if several adjacent frames are to be diverted, the rotating cam 920 can remain in divert setting so that multiple frames can be diverted to the conveyance path 910. This would minimize the need to constantly rotate the rotating cam 920. Also, due to the high throughput and small pitch of the frames F, the length of the rotating cam 920 should be longer than the pitch between pins 914. Therefore, one or more pins 914 can enter the rotating cam 920 prior to the switching event, and start down the path of the previous pin 914.

In the process of switching to the divert setting, the rotating cam 920 may have to push the pin(s) 914 within the rotating cam 920 back to the conveyance path 908. The pushing of pins 914 should be minimized, though. To minimize the pushing of pins 914 (without reducing throughput or increasing pin pitch) the point of cam rotation 920 can be extended. By extending the point of cam rotation, the channel length of the rotating cam 920 may be shortened. Therefore, only one of the pins will enter the inlet of the rotating cam 920 prior to the switching action. This reduces the torque required of the rotating cam 920, and the frictional wear on the frames F.

FIG. 9K shows the module of FIG. 9G from a top view without the support frames to show the active right angle divert described above. More specifically, it is shown in FIG. 9K that frames can either pass through the intersection of the conveyance paths 908 and 910, or be diverted from the conveyance path 908 to the conveyance path 910.

FIG. 9L shows an exploded view of the circled area of FIG. 9K. More Specifically, FIG. 9L shows a frame F in the act of being diverted from the conveyance path 908 to the conveyance path 910. As seen, the frame F (via the pin 914 not shown) has entered into the channel 926 of the rotating cam 920 and engaged with the angled groove 930 as it is diverted to the conveyance path 910. A subsequent frame F is also shown; however, the rotating cam 920 is in its bypass position and thus, the subsequent frame F will not follow the preceding frame F. Rather as the angled groove 930 is blocked by the rotating cam 920, the subsequent frame F will continue down the conveyance path 908.

Thus, in operation, as the frame F travels down the input conveyance path 908, the pin 914 extending from the upper end projection 912 passes into the channel 926 of the rotating cam 920. At the point of insertion into the channel 926 a sensor, e.g., photodiode or encoder, communicates with a computing infrastructure or with the rotating cam divert mechanism 906 to actuate the motor 918 to rotate (or switch) the rotating cam 920. This will divert the frame F down the output conveyance path 910. In embodiments, the sensors can determine the particular frames that need to be diverted using the sorting methodologies as discussed in the instant application. At this time, the pin 914 is guided through the angled groove 930, and the projection 912 engages the upper lead screw 902*a* of the conveyance path 910 to complete the diversion of the frame F.

In this regard and as shown in FIGS. 9M and 9N, the rotating cam 920 includes a front wall 922 and an outwardly tapered back wall 924 which defines the channel 926. As noted above, the channel 926 accommodates pins 914 either bypassing the conveyance path 910 or being diverted to the conveyance path 910. The front wall 922 is generally flat such that it is parallel to the support member 902*b* when in the bypass setting. The tapered back wall 924 is angled at a receiving end of the channel 926 (i.e., the point of cam rotation). The tapered back wall 924 may be angled, for example, at 22 degrees, so that in the divert setting it allows pins 914 to continually be fed into the angled groove 930 and hence towards the conveyance path 910. This will eliminate the need for the rotating cam 920 to be switched back and forth even though successive, adjacent, frames F are to be diverted to the same conveyance path. Thus, many successive frames F can be efficiently diverted into the angled groove 930 and hence to a right angle transport lane, e.g., conveyance path 910, by only turning the rotating cam 920 one time. In other words, the tapered back wall 924 allows the rotating cam divert mechanism 906 to quickly divert frames F, while reducing wear on components and minimizing pin pushing. In embodiments, the rotating cam 920 will rotate about 22 degrees, in the divert setting such that the tapered back wall 924 will be flush or substantially flush with a surface of the frame, e.g., does not extend beyond the support member 902*b*, in the divert setting.

Pinch Belt Divert Mechanism and Tooth Belt Conveyances

In embodiments, diverts in a tooth belt conveyance system may be accomplished by a pinch belt divert mechanism. To this end, FIG. 9O shows perspective view of a pinch belt divert mechanism in accordance with aspects of the invention. FIG. 9P shows an exploded view of FIG. 9O showing lift mechanisms in accordance with aspects of the invention.

Referring to FIGS. 9O and 9P, a non-limiting example of a tooth belt conveyance system 932 includes an input conveyance path 934 and an intersecting output conveyance path 936. The tooth belt conveyance system 932 includes a plurality of teeth 938 at spaced intervals extending along at least two outer sides 940 of the conveyance path such that frames F are supported at upper edge ends by the teeth 938. The frames F include projections 944 at lower surfaces of the upper edge ends so as to engage spaces in between the teeth 936, and thus allow the frames F to be suspended (i.e., to hang) as they are transported along the conveyance path. The frames F also include upward projecting pins 946 provided at a center portion of a top end of the frame F for use during a diversion.

The tooth belt conveyance system 932 further includes a pinch belt conveyance system 948 provided for diversion of the frames F to conveyance path 936. The pinch belt conveyance system 948 is provided at the intersection of the conveyance systems 934, 936. In embodiments, the pinch belt conveyance system 948 is positioned above the input and output conveyance systems 934, 936 to provide clearance for frames F (and upward projecting pins 946). This also prevents interference during a bypass operation (i.e., when the frames F are not diverted to the output conveyance path 936). The pinch belt conveyance system 948 includes at least two parallel horizontal belts 950 continuously running in a loop. The horizontal belts 950 provide a guide path 952 therebetween such that the upward projecting pins 946 may be engaged between the two horizontal belts 950. In engagement, the horizontal belts 950 carry the frames F from the input conveyance path 934 down the output conveyance path 936.

Lifting mechanisms 954 having vertically disposed belts 956 are provided along the tooth belt conveyance system 932. The vertically disposed belts 956 include horizontal indexes 958. At the point of diversion, the lifting mechanisms 952 may engage the frames F and push them upward (disengaging the frames F from the input conveyance path 936). That is, the horizontal indexes 958 engage upper edge ends of the frames F and push the upward projecting pins 946 into the pinch belt conveyance system 948. In this regard, the upward projecting pins 946 are securely inserted into the guide path 952 between the horizontal belts 950. The horizontal belts 950 may then carry the diverted frames F to the conveyance path 936, from conveyance path 934.

The horizontal belts 950 may also carry the diverted frames F until they clear the input conveyance path 934. More particularly, after the frames F clear the input conveyance path 936, the frames F may be placed on another tooth belt conveyance system until diversion or other action is required. It is contemplated that several different belts in series may be provided along the tooth belt conveyance system 932 such that frame F may be compressed or decompressed for more efficient sorting and sequencing of the mail pieces.

In operation, the frames F (suspended by the projections 944 at either side of the upper edge ends of the frames F along the tooth belt conveyance system 932) are driven down the input conveyance path 934. At the point of diversion (intersection of the input and output paths), a timing sensor detects the approaching frames F to determine whether or not the at least two lifting mechanisms 954 are activated for diverting a given frame F. During a diversion, the frames F are vertically lifted such that the upward projecting pin 946 becomes wedged between the two horizontal belts 950. The horizontal belts 950 divert the frames F from the input conveyance path 934 by capturing the pin 946 in the guide path 952. As this happens, the frame F disconnects from the teeth 938 of the input conveyance path 934 and the trailing edge of the frame F becomes a new leading edge of the frame F. The new leading edge of the frame F may engage a guide channel (not shown) to keep the frame on track. At an end of the pinch belt conveyance system 948, the leading edge of the frame F (more specifically at the projection 944) engages teeth on another tooth belt conveyance path and the tooth belt conveyance path drives the leading edge of the frame F down the output conveyance path 936. As the frame F begins to engage the other tooth belt conveyance system, the upward projecting pin 946 disengages the pinch belt conveyance system 948 allowing the new tooth belt conveyance system to continue the progress of the frame F through the module 900.

Vertical Divert Mechanism

In embodiments, diverts may also be accomplished with a vertical divert mechanism. Specifically, referring to FIG. 9Q-FIG. 9T vertical diverts may be implemented, e.g., when facility space is limited. The vertical divert mechanism allows selected frames F to vertically divert and serves as a bridge to guide bypassing frames F (i.e., frames not diverted) across a gap 962 at an intersection of an input conveyance path 964 and an output conveyance path 966 (i.e., a point of diversion). The conveyance paths 964, 966 move the frames F via timing belts 968. The timing belts 968 engage the frames F by pins 970 extending at upper edge ends of the frames F and move the frames F along the conveyance path. The pins 970 support the weight of the frames F.

In embodiments and as shown in FIGS. 9Q and 9R, a slotted cam 971 is provided at the point of diversion. FIG. 9Q shows the vertical divert mechanism in a bypass setting (i.e., the frame F is not diverted). Here, the pin 970 of the approaching frame F passes through a slot 972 in the slotted cam 971. In a divert setting (shown in FIG. 9R), the slotted cam 971 rotates so as to direct the pin 970 (and the frame F) down the diverted output conveyance path 966. In operation, as the frame F approaches the slotted cam 971, a sensor detects the frame such that system controls and frame tracking software indicate whether the frame F should be diverted or not. If the frame F is to be diverted, the slotted cam 971 will actuate (i.e., rotate) so as to allow the frame F to engage the vertical timing belts 968. If consecutive frames F are to be diverted, the slotted cam 971 will remain actuated open until such time a frame F is detected that should travel across the gap 962 and remain on the input conveyance path 964. An advantage of this cam-style actuation is that fewer actuations will be needed for a batch of frames F that need to travel in any given direction. The mechanism only needs to actuate open or closed once for a large batch of frames F to pass either along the input conveyance path 964 or down the output conveyance path 966 instead of having to continually rotate for each individual frame 960.

The vertical divert mechanism also includes a guide 973 to bridge the gap for the frames F bypassing the divert from the slotted cam 971. The guide 973 can be integral to the vertical divert mechanism itself, or a separate boom that extends from the slotted cam 971 to the next area of horizontal support.

In embodiments and as shown in FIG. 9S and FIG. 9T, the vertical divert mechanism may alternatively include a latch or gate 974 (pivotally attached to guide 973) that is actuated to divert the frames F down a vertical descent (or up a vertical ascent) of the diverted timing belt 968. In a bypass setting (as shown in FIG. 9S), the gate 974 is closed and the frames F travel across a top end of the gate 974 past the guide 973 to continue along the input conveyance path 964. In a divert setting (as shown in FIG. 9T), the gate 974 is open such that the frame F is directly transferred from the input conveyance path timing belt 968 to the output conveyance path timing belt 968.

In embodiments, gravity assists in pulling the frames F downward; however indexes may be used if necessary to maintain separation or orientation of the frames. Using gravity to propel frames reduces complexity of the vertical divert mechanism (e.g., reduces the dependency on motors, belts, pulleys, chains, rollers, etc.). Frames may also simply slide on rails to their next destination. At the bottom of the timing belt 968, frames F may be gated for merging into a subsequent conveyance path, which may travel in any direction.

Rotatable Slotted Cam Device

In yet another embodiment, diverts may be accomplished in a roller conveyance system. Referring to FIG. 9U, the roller conveyance system 976 includes adjacent threaded rollers 980 that transport frames F along an input conveyance path 978 and selectively divert the frames F to a diverted path or output conveyance path 979 that intersects input conveyance path 978. The frames are oriented at 45 degrees to both paths 978, 979 as they are carried along the plurality of adjacent threaded rollers 980.

In embodiments, the frames have horizontal tabs 981 at top corners thereof. The bottoms of these tabs are "knife-edged." The tabs 981 hang from tops of the threaded rollers 980. Thus, the weight of the frames F is carried by the threaded rollers 980, and the frames F can be moved and positioned by controlled rotation of the threaded rollers 980. The frames F also include vertical pins 982 in at least the upper edge end of the trailing edge of the frame F. The vertical pin 982 controls whether the frame F travels down the input conveyance path 978 or the output conveyance path 979. In this regard, the pin 982 passes through a rotatable slotted cam device 983, similar to that described with respect to the rotating cam divert mechanism 906 discussed above. However, the rotatable slotted cam device 983 is positioned above a support member and the pin 982 passes through a lower portion of the slotted cam. The present invention contemplates either orientation for both embodiments.

The rotatable slotted cam device 983 rotates to engage and direct the pin 982 (and the frame F) either along the input conveyance path 978 or down the output conveyance path 979. If the pin 982 is diverted to the output conveyance path 979, e.g., by turning the slotted cam device 983 towards the output conveyance path 979, the frame F will travel around a smooth, e.g., 90 degree curve and be diverted to the output conveyance path 979 (this is similar to the concept of providing an angled groove as discussed with regard to the rotating cam divert mechanism). In this manner, a single stream of frames F may be smoothly separated into a diverted stream and the original stream, with both streams moving at constant speed.

45 Degree Divert Mechanism

Diverts in a tooth belt conveyance system (as discussed above) may also be accomplished with a 45 degree divert mechanism. Referring to FIG. 9V, the 45 degree divert mechanism 984 provides a tooth belt conveyance system 932*a*, a pinch belt conveyance system 948, and a slotted flat drive belt conveyance system 932*a*. The conveyance systems are provided above a top plate to transport the frames "F, which are provided below the top plate. In this regard, the operation of the 45 degree divert will be described. The frames F have movable pins 944*a* at upper edge ends thereof and a center pin 946*a* provided at a center top end. The movable pins 944*a* and the center pin 946*a* are engaged in the tooth belt conveyance system 932*a*, i.e., the input conveyance path. The movable pins 944*a* are in a home position (positioned downward) while traveling along the tooth belt conveyance system 932*a*.

The frames F approach a point of diversion, and the movable pins 944*a* activate up (from the home position) so as to engage slotted flat drive belts (at 932*a*) to drive the frames into a 45 degree divert. Simultaneously, the center pin 946*a* is engaged to the pinch belt conveyance system 948 which also pulls the frame F at a 45 degree angle away from the initial tooth belt conveyance path (at 932*a*).

At an approximate midway point of the 45 degree divert (also termed the "transition area") one of the slotted flat drive belts 932*a* will disengage one of the movable pins 944*a* of the frame F, which will drop down and return to the home position on the frame F so as not to interfere with movement of the frame F along the divert path. That is, at the transition area the frame F is driven via two contact points, the center pin 946*a* (engaged with the pinch belt conveyance system 948) and the other movable pin 944*a* (engaged to the slotted flat drive belt 932*a*). At an end of the transition area, the frame F engages a center top drive belt 948*a* to further transition the frame F onto another tooth belt conveyance path (not shown) for continued movement through the mail sorting and sequencing system.

Removing Gaps Between Containers Containing Mail Pieces

Compression Zones

In the course of conveying millions of mail pieces through the conveyance systems of a mail sorting and sequencing system, it is oftentimes necessary to be able to adjust gaps between the frames that carry the mail pieces. Reasons for adjusting the gap between frames may include, but are not limited to, reducing the required amount of conveyance space being used, machine availability, facility space restrictions, machine efficiency, or utilization of storage space. Additionally, it is contemplated that adjusting the gaps may also aid in more efficiently and reliably merging various conveyance paths, or aid in positioning the frames in such a way as to match work station spacing.

Adjusting the gaps may be defined as compressing the gaps or decompressing the gaps. Compressing of the gaps includes reducing the spacing between frames traveling through the conveyance system. Decompressing of the gaps includes adjusting the frames to provide additional spacing between frames. Compressing and decompressing may be done independently, or simultaneously, depending on the desired throughput configuration of the frames through the conveyance system.

It is further contemplated that adjusting gaps between frames in a conveyance system can be accomplished using a compression zone. The compression zone may be provided at a segregated section of the conveyance path, and includes an independent drive system. The compression zone, while it may include similar conveying structures as the conveyance system leading to it, may alternatively include different structures to accomplish the task of adjusting the gaps. The compression zone may include, but is certainly not limited to, belts, power rollers, wheels, ball screws, lead screws, linear motors or even robotic arms to adjust the gaps between frames.

Sensors at the compression zone monitor the flow of frames approaching from the conveyance path and the compression zone is configured to receive the frames such that subsequent approaching frames can be held back, slowed down, backed up, or sped up as needed for purposes of spacing the frames to be transitioned to additional locations in the mail sorting and sequencing system. The output result of the frames that are sent through the compression zone may include, but is not limited to, frames that are evenly spaced, frames that contact one another, frames grouped by quantity or characteristic (e.g., thickness, state, city, ZIP code, street, dimension), or gapped in any specific desired configuration for transitioning to other locations throughout the mail sorting and/or sequencing system.

The compression zone operates efficiently such that it does not slow down the overall mail system for sorting, transporting and conveying mail pieces. In embodiments, the mail sorting and/or sequencing system may process five million mail pieces in a twenty four hour period, compared to current systems in operation that process approximately one million mail pieces in a given 24 hour period. It is also contemplated that even without a compression zone, the present mail sorting and/or sequencing system including the main conveyance paths are capable of conveying up to 80,000 mail pieces per hour, double the current handling ability of existing conveyance systems. To accomplish this end, the compression zone works fluidly, integrally, and reliably with main conveyance paths leading to the compression zone such that frames (and mail pieces) are conveyed to their appropriate destinations within a specified time period.

Inset Compression Screws

FIG. 9W shows a perspective view of a non-limiting example of an inset compression zone in accordance with aspects of the invention. FIG. 9X shows a top view of the outset compression zone of FIG. 9W in accordance with aspects of the invention. In embodiments, a compression zone 985 is positioned within, e.g., a four lead screw conveyance system as shown in FIG. 9W and FIG. 9X. However, it is contemplated that the compression zone may be integral with a variety of alternative conveying systems such as, but not limited to, a pulley belt system, chain driven system, and a tooth belt system.

In the embodiment of FIG. 9W and FIG. 9X, the compression zone includes a set of at least four compression screws 986 (two provided at a lower portion of the conveyance path and two provided at an upper portion of the conveyance path) inset from main conveyance lead screws 987. That is, the compression screws 986 are positioned between the main conveyance lead screws 987 in a parallel relationship along the length of the main conveyance path. The lead screws 987 and compression screws 986 also rotate parallel to each other.

At a point of compression, compression screws 986 engaging the leading edge of the frames F are positioned parallel to the main conveyance lead screws 987 such that an end portion of the main conveyance lead screws 987 extends along side receiving ends of the compression screws 986. This provides a smooth transition between the lead screws 987 and the compression screws 986. Compression screws 986 engaging the trailing ends of the frames F are positioned such that a gap is created between the end portion of the main conveyance lead screws 987 and the receiving end of the compression screws 986. This ensures that the lead screws 987 do not interfere with the compression operation. Additionally, the compression screws 986 are offset from each other to accommodate approaching frames F angled at 45 degree to the direction of the conveyance path.

The lead screws 987 and the compression screws 986 are positioned along parallel lead screw drive shafts 989 and compression drive shafts 990, respectively. Because the compression zone 985 is provided at a segregated section of the conveyance path, break points 992 separate the lead screws 987 from the compression screws 986. At the break points 992, no lead screw portion is provided along the lead screw drive shaft 989. Instead, only the lead screw drive shaft 989 continues to extend along the conveyance path such that the lead screws 987 do not interfere with the frames F making the transition between the lead screws 987 and the compression screws 986 during a compression operation.

The lead screws 987 and the compression screws 986 are supported at a lower surface thereof by a plurality of roller cam brackets 993. The roller cam brackets 993 maintain the lead screws and compression screws level with a floor surface. In an alternative embodiment, these roller cam brackets may also provide the driving force to rotate the compression screws 986 and the lead screws 987.

The lead screw drive shafts 989 are driven by a single motor 994 and may include at least one, one-to-one right angle gear box 995 to provide uniform synchronized rotation of the lead screws 987 during operation based upon the output of the motor 994. The right angle gear box 995 is provided so as not to limit the configuration of the system, and may be utilized in an unlimited number of possible configurations for the motor 994, drive shafts 989, and lead screws 987 depending on spacing constraints, etc. In embodiments, the compression screw drive shafts 990 are driven by an independent motor 996 and also include one-to-one right angle gear boxes 997 for at least the same reasons as provided for above in the description of the lead screw drive shafts 989. The motor 994 rotating the lead screw shafts 989 may be set to operate at about 110 rpm and tolerances allow for about a 10% variance in performance.

The compression screws 986 of the compression zone 985 adjust gaps between frames being sorted/sequenced through the mail sorting and sequencing system. In this regard, the compression screws 986 can either compress the gaps between a predetermined number of frames F having varying or uniform thickness, or decompress the gaps, and create larger gaps between adjacent frames F. It is contemplated that the lead screws 987 have the capability of compressing from about 11 frames a second (i.e. about 2 inches a second) up to about 22 frames a second (i.e., about 4 inches of mail a second). To achieve this end, the compression screw threads are preferably designed having a pitch range (distance between frames F on the compression screws 986) from about 0.177 inches to about 0.25 inches in the direction of the rotation. Tolerances for the pitch characteristic of the compression screws 986 allow for about a 10% acceptable variance range.

The compression screws 986 also easily and readily accept frames F from the lead screws 987. In this regard, it is contemplated that the compression screws 986 are beveled at 60 degrees at ends interfacing with ends of the lead screws 987 (i.e., at the break point 992). The bevel allows frames F to easily transition from the lead screws 987 to the compression screws 986 (and vice versa) without interrupting the flow or speed of approaching or departing frames F.

In operation, the frames F are transported along the lead screws 987 at a 45 degree angle. As the frames F approach the compression zone 985, a sensor monitors and detects the position of individual frames F (and information logged in the control unit about the individual piece of mail attached thereto, e.g. thickness) on the lead screws 987. The sensor communicates with the compression screw motor 996 to begin rotation of the compression screws 986 such that the entire frame 988 (including the mail piece) is positioned in the compression zone 985. Once the frame 988 is securely positioned on the compression screws 986 at the desired position, the compression screw motor 996 is shut-off and rotation of the compression screws 986 stop. The frame 988 is suspended from movement along the conveyance path. The sensors continue to monitor the lead screws 987 for new approaching frames F containing mail pieces. When a new frame 988 reaches the compression zone 985, the sensors communicate with the compression screw motor 996 such that additional frames F are either compressed or spaced according to a predetermined configuration with the frame already provided in the compression zone 985. When a predetermined number of frames F are compressed or spaced, the compression screws 986 rotate until the compressed/spaced load is transitioned back online to the lead screws 987 to continue through the conveyance system. The sensors used for compressing may include, but are not limited to, laser sensors, optical sensors, diffuse lasers, magnetic proximity sensors, or encoders.

Outlying Compression Screws

In embodiments, the compression screws 986 may be positioned along the conveyance path outside the lead screws 987 in the parallel relationship similar to that discussed above with respect to the inset compression screws. That is, the lead screws 987 are positioned between the compression screws 986. The lead screws 987 and the compression screws 986 rotate parallel to each other such that the frames F of individualized mail pieces can be transported along the same for purposes of compression or decompression, and for continued efficient conveyance through the mail sorting and sequencing system.

Inline Compression Screws

Figure 9Y:
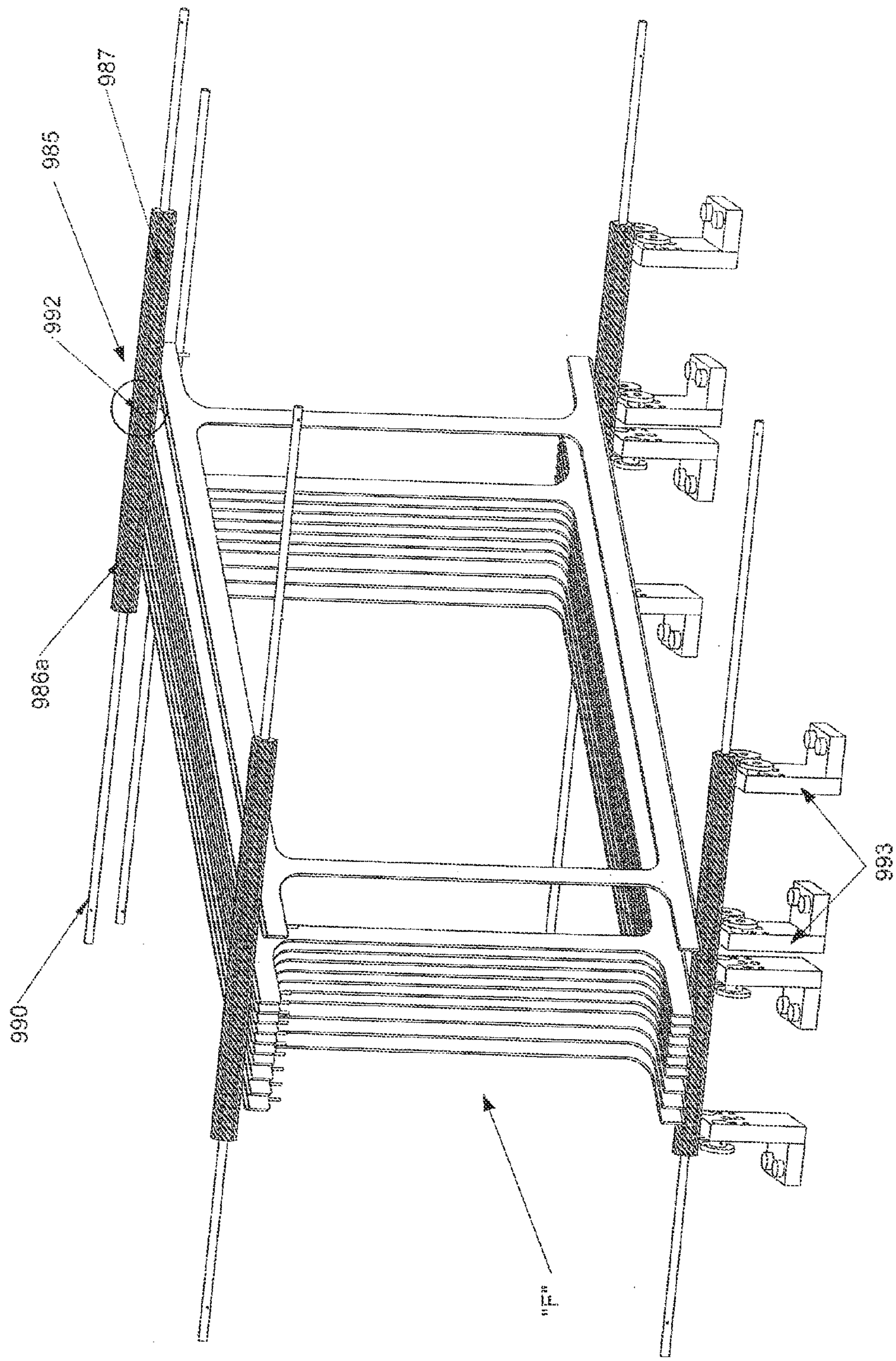
FIG. 9Y shows a perspective view of a non-limiting example of an inline compression zone in accordance with aspects of the invention.
Figure 9Z:
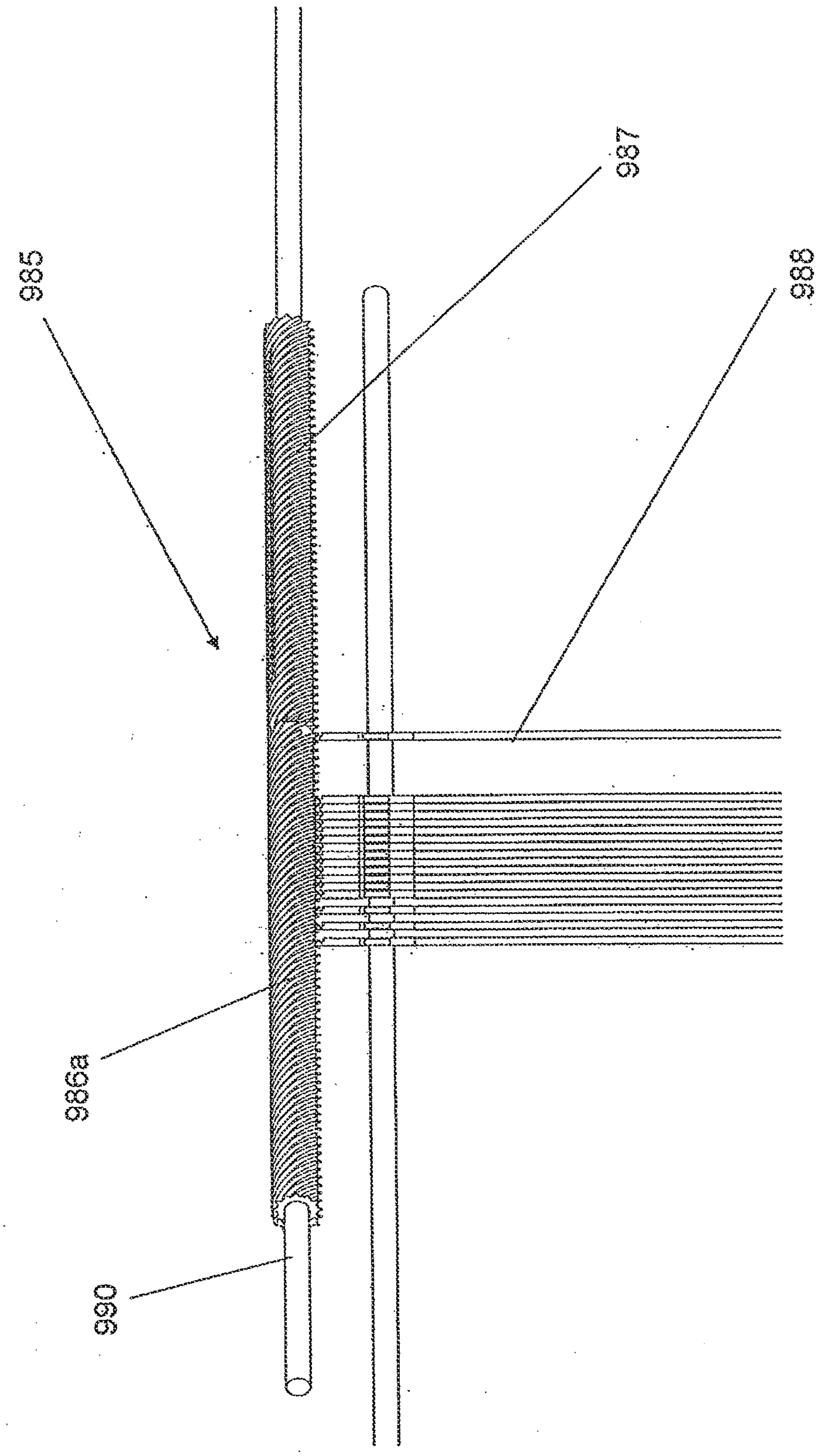
FIG. 9Z shows an exploded top view of the inline compression zone of FIG. 9Y in accordance with aspects of the invention.

FIG. 9Y shows a perspective view of a non-limiting example of an inline compression zone in accordance with aspects of the invention. FIG. 9Z shows an exploded top view of the inline compression zone of FIG. 9Y.

As shown in FIGS. 9Y and 9Z, in embodiments, the compression zone 985 is in-line with the lead screws 987. In-line compression screws 986*a* are provided along the same path (as opposed to a parallel path) with lead screws 987. More particularly, at the break point 992 of the lead screws 987 where the compression zone 985 initiates operation, the compression screws 986*a* and lead screws 987 extend along the same horizontal axis.

In embodiments, the lead screws 987 are hollow outer casings having a thread profile at an outer surface. The hollow outer casing also serves as the drive shaft for rotation of the lead screws 987. An inner surface of the hollow casing includes a plurality of ball bearings (or alternatively spur gears) to support compression drive shafts 990 extending from the compressions screws 986*a* through the inner surface of the lead screws 987. An independent servo motor (as discussed above) drives the hollow casing. The ball bearings also allow the lead screws 987 to rotate independently of the compression screws 986*a* which are rotated by the compression drive shafts 990 driven from another independent motor (not shown). Thus, the compression screws 986*a* rotate at a different rate than the lead screws 987 along the same axis to aid in compressing or decompressing frames F depending on the desired operation.

The ends of the lead screws 987 leading to the break point before the point of compression cooperate with a cutback thread mechanism located on the compression screws 986*a* at the break point 992. The cutback thread mechanism includes an end thread design configured such that every other thread is machined back. That is, the cutback thread mechanism includes a full thread, followed by a cut back thread, followed by a full thread, etc. The full thread engages the frames F from the ends of the lead screws 987. Thus, the compression screws 986*a* may accept a frame F from the lead screws 987 to increase the spaced intervals between frames F or to reduce spaced intervals between frames. The spacing created is dependent on the competing rotation speeds of the screws 986*a*, 987, respectively.

It is noted that the last thread of the lead screws 987 may be beveled at, e.g., 60 degrees. The bevel profile does not impede the cutback thread mechanism as it accepts frames from the lead screws 987 at the break point 992.

The lead screws 987 and the compression screws are supported by roller cam brackets 993. The roller cam bracket may also be a mesh profile gear that mates the screw threads with the gear teeth such that the gear teeth drive the screws. In embodiments, the roller cam brackets may function as the independent servo motors to start and stop the rotation of the screws based on input received from the sensors at the break point 992 of the lead screws 987 for the approaching frame F.

Thus, the present invention provides a conveyance system for efficiently and reliably transporting a high volume of individual frames carrying mail pieces through a sorting and sequencing system using a variety of conveyance mechanisms. The conveyance mechanisms may include divert mechanisms and compression zone mechanisms to deliver frames from one conveyance path to another without compromising speed of the conveyance path and enhancing the efficiency of the sorting and sequencing system.

Extraction of Mail Pieces from Individually Containerized Mail Pieces

The present invention relates to extraction of mail pieces, such as letters and flats, from individually containerized frames, particularly with regard to such mail pieces being part of a facility-wide automated mail processing system. In addition to mail pieces, the invention encompasses the transportation and processing of other articles, such as, but not limited to, sheets of paper, metal, wood, plastics, etc., as well as CD's, DVD's, and/or their jewel cases, books, photographs, etc. More specifically, the present invention is directed to the extraction of individual mail pieces, such as letters, flats and small parcels, from their individualized frames, particularly with regard to such mail pieces being part of a facility-wide automated mail processing system.

Described elsewhere herein are various types of mail extraction methods and apparatus which generally rely upon a force initiated adjacent, but outside the processing stream of frames and mail pieces. As described in greater detail below, mail piece extraction can alternatively be accomplished by an apparatus, in the form of so-called "extractor frames," which move along the processing stream itself and which act upon the individually containerized mail pieces via right-angle-diverts (RADS).

As a brief summary before describing details and particular embodiments of the extractor-frame extraction of mail pieces, a facility-wide mail processing system according to the invention relates to individualized frames for mail pieces, such as letters and flats, for use in moving such mail pieces in a facility-wide mail sorting and/or sequencing system. Such frames are herein referred to as a "frame," a "folder," or a "frame/folder." Each frame is constructed for the purpose of containing a single mail piece as the mail piece is sorted and sequenced with other such containerized mail pieces, or as they are stored for subsequent processing. Each mail piece is inserted into a frame when inducted into the system, and extracted from its frame during preparation for dispatch.

Within a given system, frames of different types can be utilized to accommodate letters and flats, e.g., which can vary in size and shape. However, the frames within a system have a standard shape-factor, which makes automated handling easier; although different shapes are also contemplated by the present invention.

A frame, occasionally referred to as a "frame/folder," includes (1) a frame portion that is transported along a processing path by a driving mechanism, such as lead screws, e.g., which driving mechanism drives a plurality of successive frames within the mail processing system, and (2) a folder portion having at least one portion movably connected to the frame portion, the folder portion having at least a portion movable or deformable relative to the frame between a first position for facilitating selective insertion and extraction of a single mail piece within the container, and a second position, wherein the folder portion is empty of any mail piece.

According to a particular aspect, the engageable portions of the frame are positioned to orient the frame during travel within the mail processing system other than in a direction along the length of the frame. In this manner, a stack of successive frames occupies a minimal length along the travel direction relative to known systems. More particularly according to that aspect of the invention, the aforementioned orientation of the frame is an angle of 45° with respect to the direction of travel.

According to various embodiments according to the invention, in the first position of the folder, insertion and extraction of the mail piece is facilitated. In the second position of the folder, no mail piece is contained in the folder and the folder has a minimized width. In embodiments, the folder can additionally include other positions such as, for example, an intermediate or partially open state to accommodate different sizes of mail pieces.

The frame part of the frame/folder, or "frame," is rigid, whereas the movable portion of the folder is movable/deformable away from the rigid frame to the first position. The frame is generally rectangular. In the particular embodiments described below, extraction of mail pieces is accomplished through a side opening of the frame.

Mail pieces in frames are sorted and sequenced using Right Angle Diverts (RADs), merges, compression zones, decompression zones, and shuttles. RADs split a stream of frames into two streams, moving at an equal speed, by diverting individual frames. Because of the 45° orientation of the frames, RADs can divert frames without stopping either stream by sliding frames out from between adjacent frames. This results in a sliding or shearing relative motion between adjacent frames.

Merges, or merge areas, merge two streams of frames into a single stream. Again, because of the 45° orientation, such merging is accomplished without requiring the streams to stop. A merge also results in a sliding or shearing movement between adjacent frames.

Compression zones remove gaps from between frames within a stream. Decompression zones insert gaps between frames within a stream. When individual handling of frames is not required, frames are moved as batches contained in shuttles. After mail pieces have been sorted and sequenced, they are extracted from the frames and inserted into trays for delivery.

As described elsewhere herein, mail pieces are individually contained in a frame/folder, generally referred to as a "frame," as the mail pieces are sorted, sequenced, and otherwise processed in the mail processing system. While it may be possible to leave the mail pieces in their respective frames for delivery to the customer, the additional weight and package size, in addition to potential waste/recycling cost or reuse of the individual frame would be generally prohibitive. Therefore, the better approach is to utilize the individual containers, or frames, for sorting and transport within the mail processing system and to remove the mail pieces from their frames prior to placement into a delivery container.

The present invention, therefore, relates to the removal, or extraction, of flat articles from the individual frames for placement into delivery containers. The invention is applicable to any system that transports flat or mail piece-like articles, including single or multi-sheet documents in individual frames, and requires the removal of such articles from their individually containerized containers, or frames, prior to further processing internally within the system, or externally thereof.

To these and other ends, the invention relates to apparatus and methods of extracting individually containerized flat articles from respective frames during transport of a succession of such containerized mail pieces along a transport path. Extraction of mail pieces can be accomplished by any of a variety of apparatus and methods. For example, an end effecter, such as a vacuum extractor which operates with a perforated belt can engage and extract the mail piece from its frame, while another device, such as a driven friction wheel, withdraws or diverts the emptied container from the transport path.

In an alternative embodiment, end effecters in the form of articulating pushers engage mail pieces by sliding into their respective opened frames to move the mail pieces toward respective grippers for extraction and subsequent handling of the mail pieces. In accordance with alternative embodiments, extraction is accomplished by mechanisms integrated within the mail piece frames, such as a pinch-belt extractor or a slider-in-folder extractor. In other alternative embodiments, the extraction is accomplished by gravity.

In alternative embodiments of methods and apparatus for extracting mail pieces, the mail pieces are extracted from frames being transported via lead screws through the utilization of an extractor frame (or pusher-frame) in conjunction with RADs, merges, compression zones, and decompression zones.

The extractor frame is similar to the mail frame in that it engages lead screws and it can function with RADs, merges, compression zones, and decompression zones. It is diverted into a decompressed stream of frames. This results in a sliding motion between it and the adjacent frames. A particular mechanism (described further below) of the extractor frame engages the mail frame, and uses the sliding motion to slide the mail piece out of the frame. In one embodiment, the mechanism is a "pop-up pusher" that engages the frame and the mail piece via a slot in the side of the frame. The extractor frames are then diverted out of the stream of mail frames, for subsequent reuse.

Figure 10A:
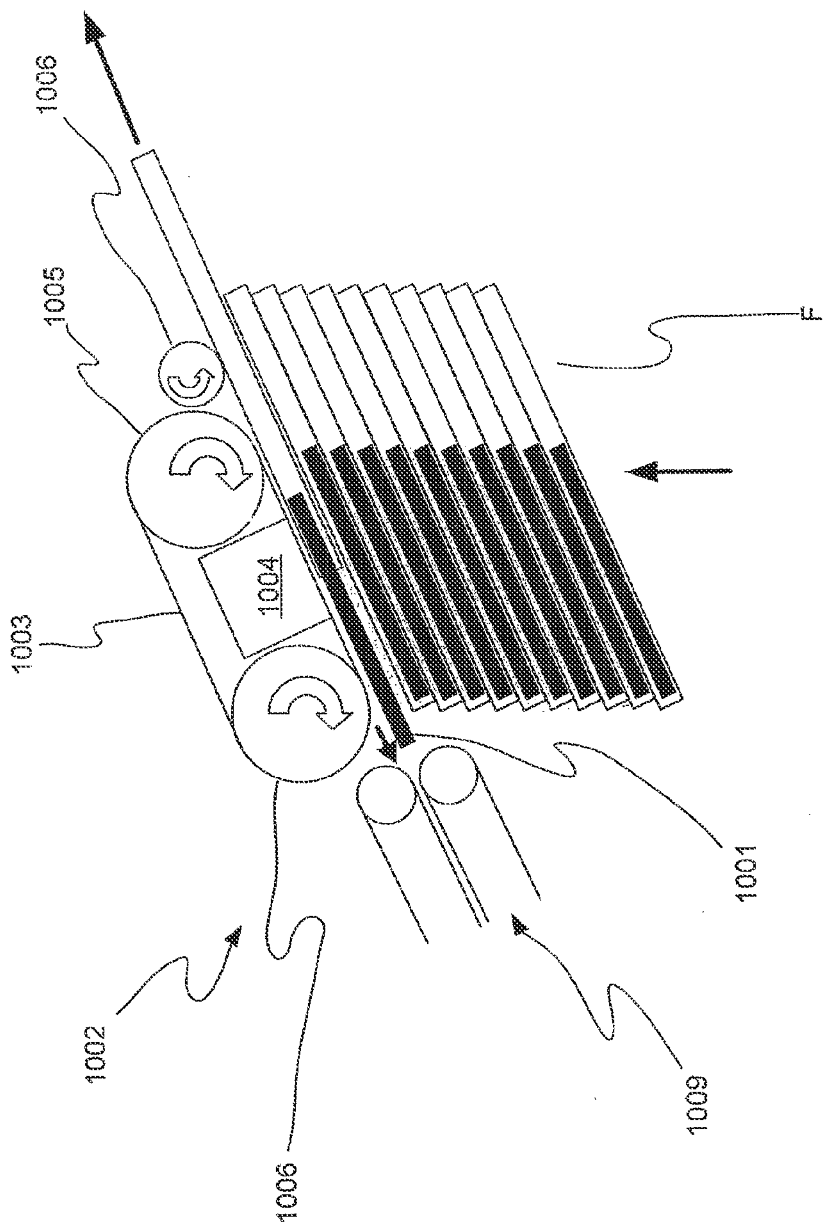
FIG. 10A shows a mail piece extraction apparatus in accordance with certain aspects of the invention and, more particularly, via lateral slide and in-line vacuum extraction point in accordance with aspects of the invention.

FIG. 10A schematically shows a mail piece extraction apparatus in accordance with the invention. More particularly, FIG. 10A illustrates a top view of an apparatus that includes a vacuum extractor 1002 which is shown at a point of extraction of mail pieces 1001 from their respective frames F. As shown in the drawing, a stack of successive frames F are conveyed along a direction of travel toward the extractor 1002, each carrying a single mail piece 1001. As described elsewhere herein, the frames F can be driven toward the extractor by a plurality of lead screws or other means of conveyance including, but not limited to conveyor belts, chains, ball screw drives, paddles, or other conveyance apparatus, such as magnetic propulsion, cables and hooks, air drive, pneumatic or hydraulic rams, etc.

The vacuum extractor includes a stationary vacuum chamber 1004 positioned within the course of a perforated endless belt 1003, the belt being driven by at least one of the cylindrical drums 1005, 1006. More particularly, a vacuum is pulled through the perforated belt as the containerized mail pieces approach.

Figure 11A:
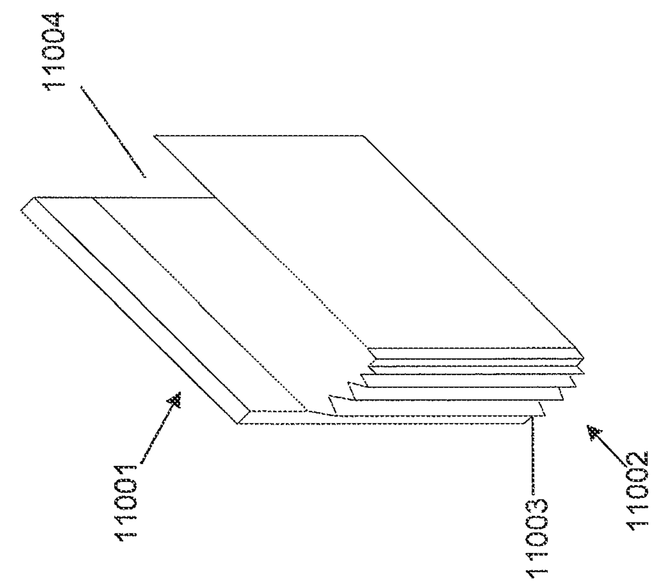
FIGS. 11Aa-11Ad show a particular type of frame, i.e., a frame having an accordion-type structure, in accordance with aspects of the invention.
Figure 11A:
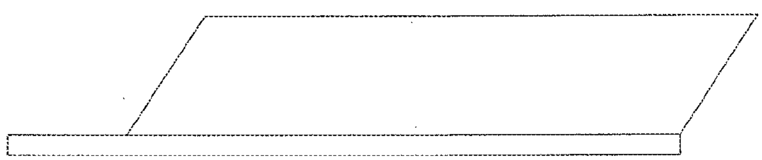
Figure 11A:
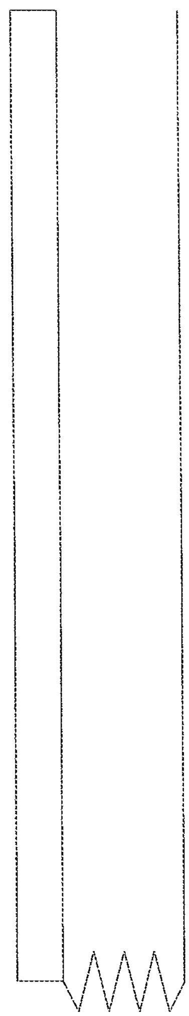
Figure 11A:
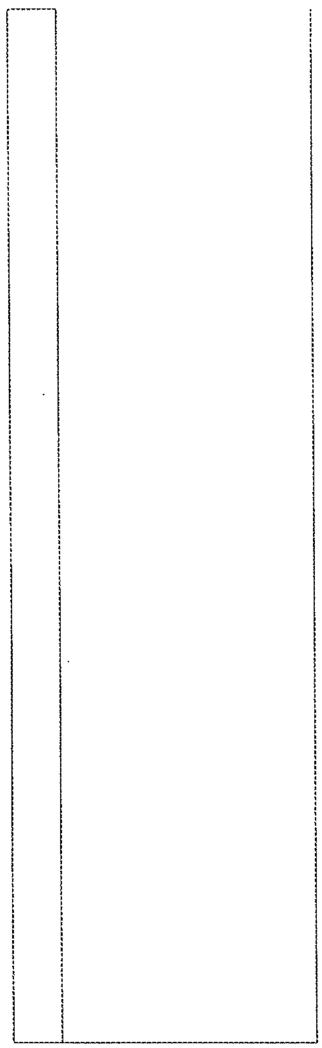
Figure 11B:
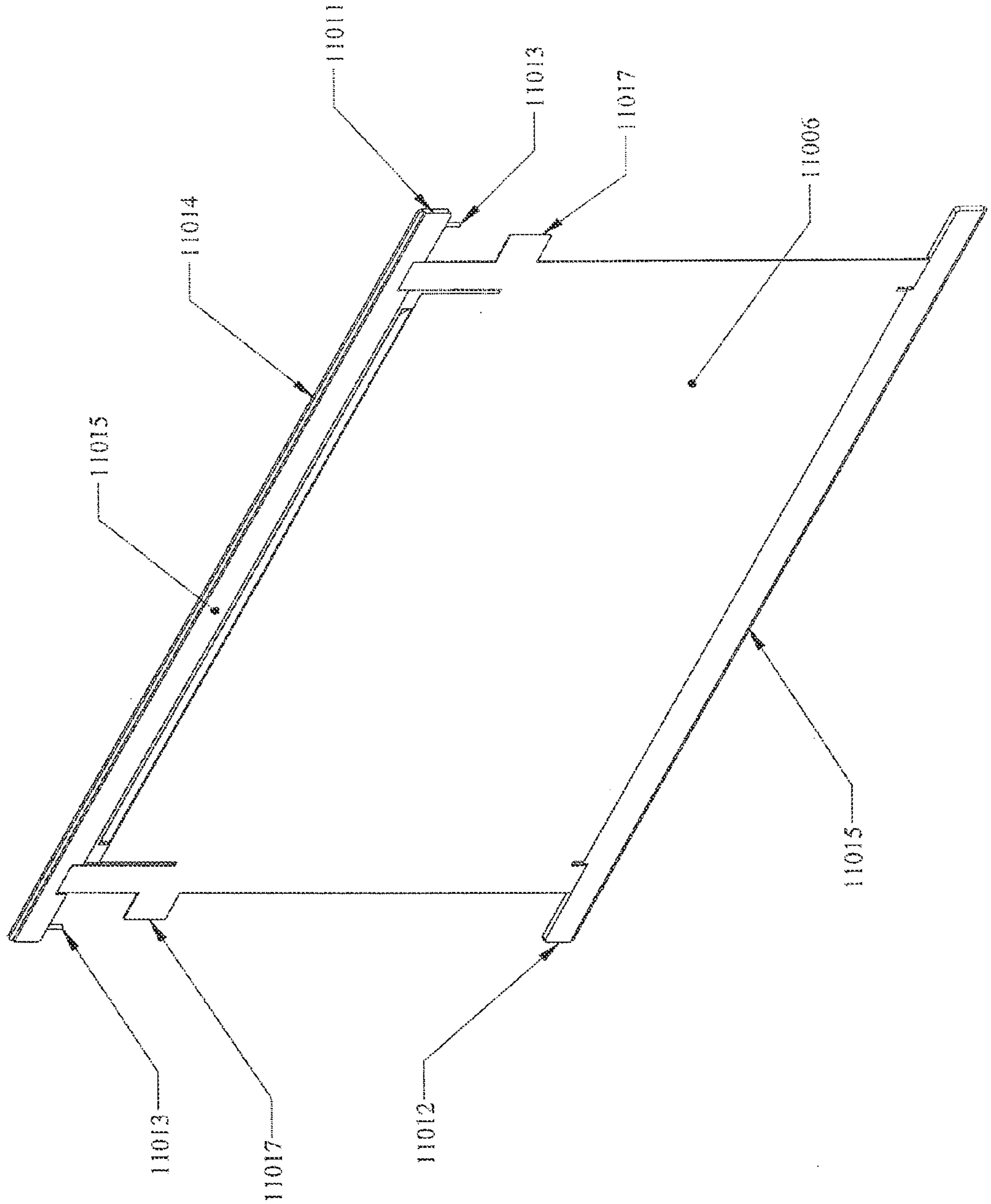
FIGS. 11Ba-11Bf show various views of frames in accordance with aspects of the invention.
Figure 11B:
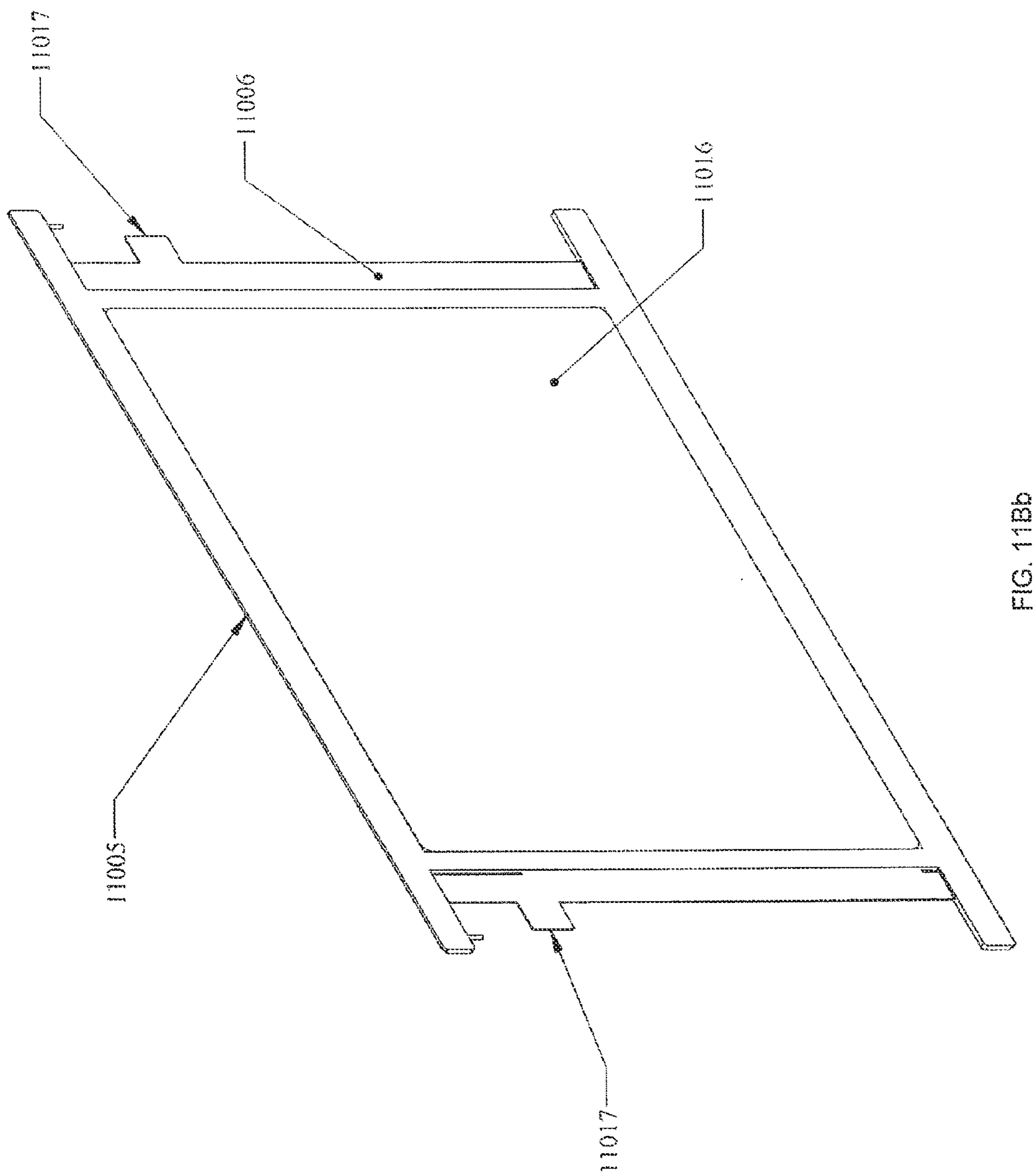
Figure 11B:
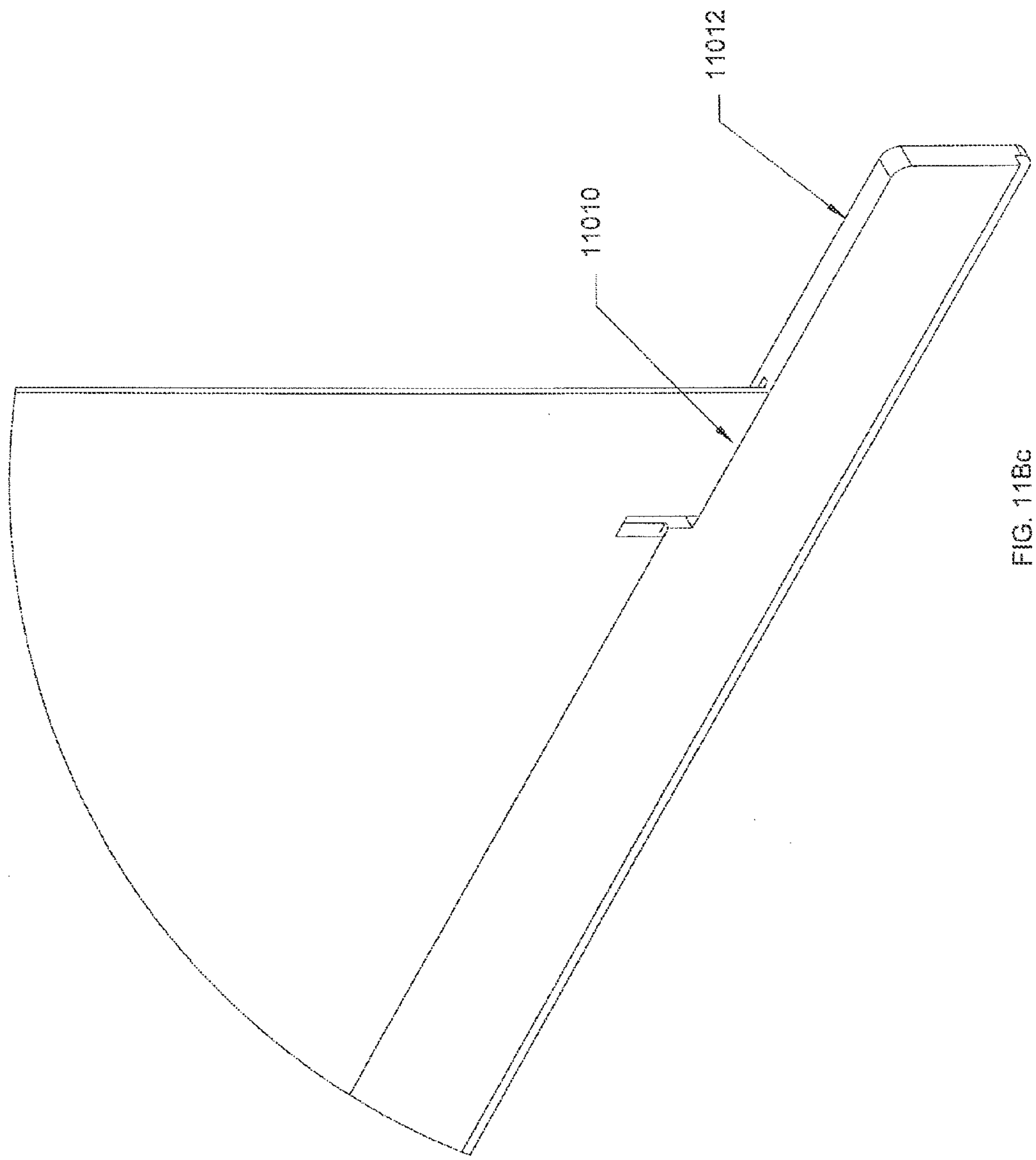
Figure 11B:
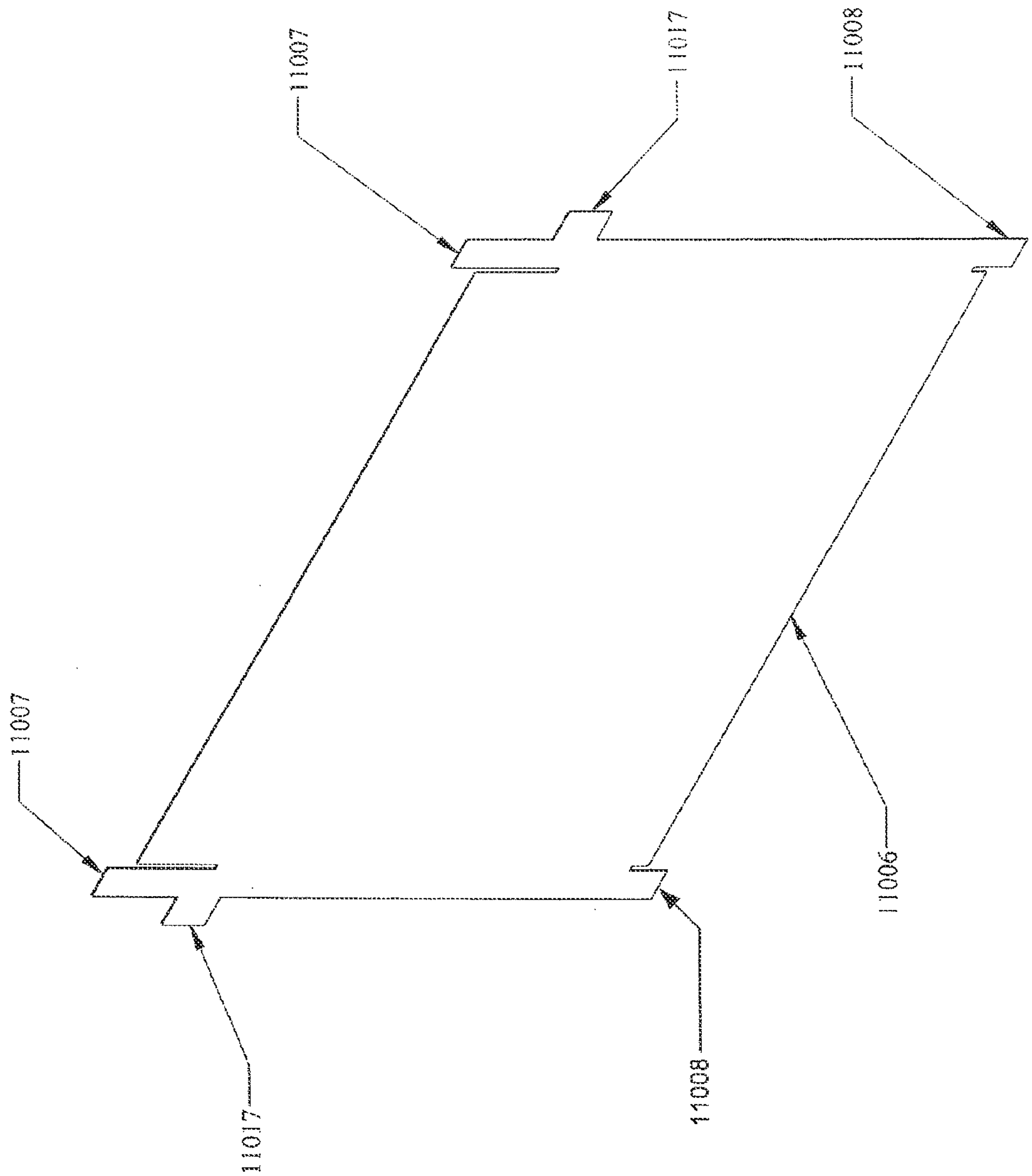
Figure 11B:
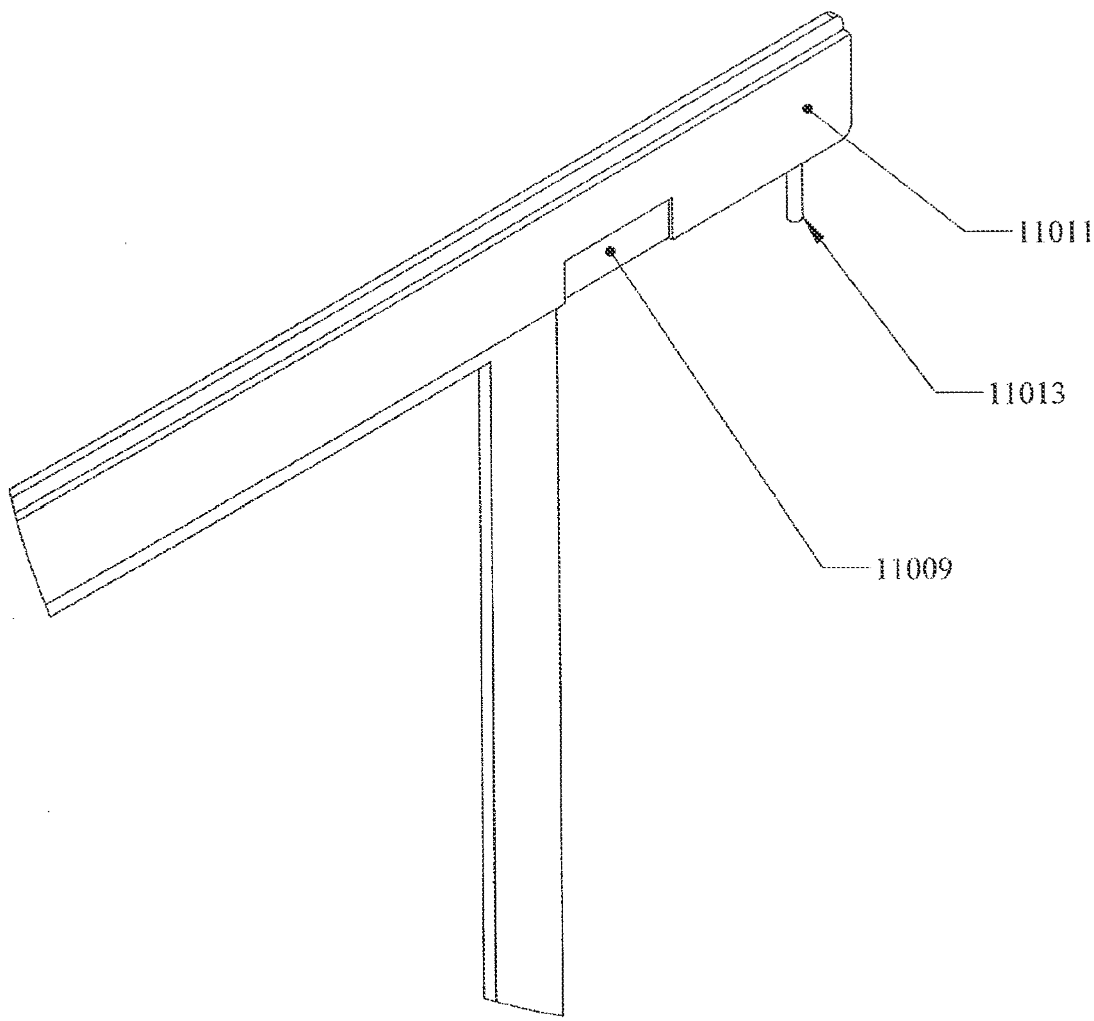
Figure 11B:
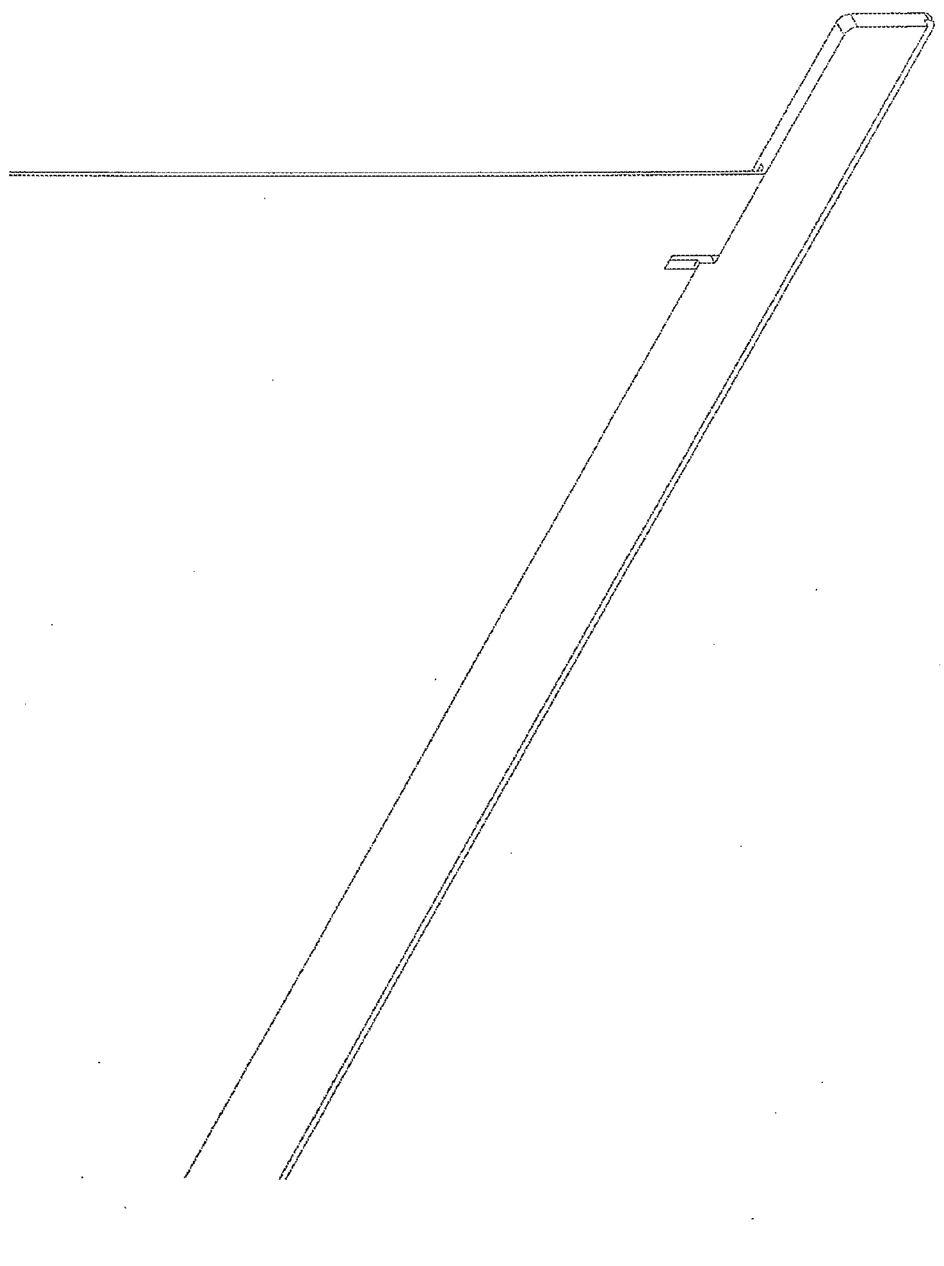
Figure 11C:
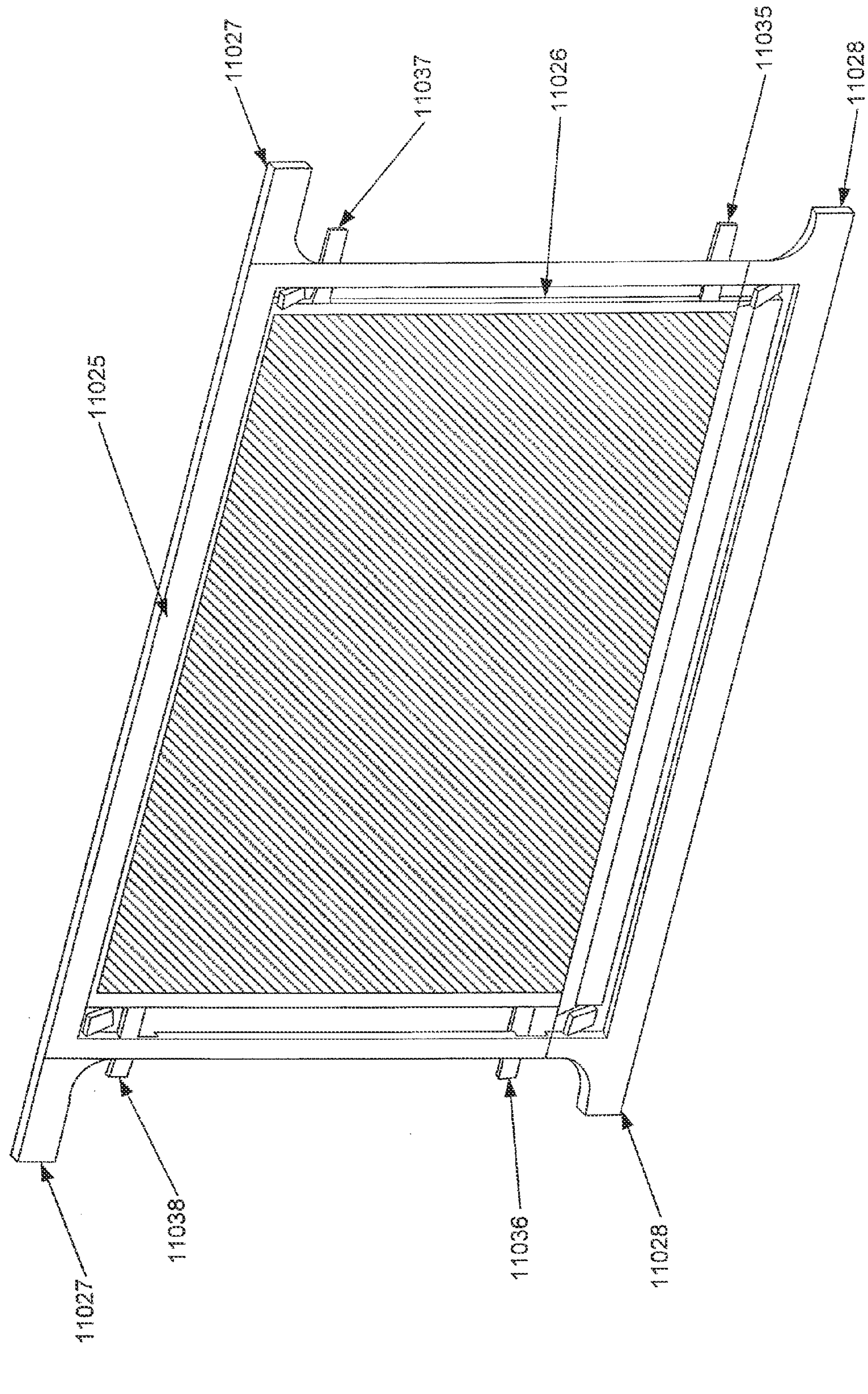
FIGS. 11Ca-11Cd show various views of frames in accordance with aspects of the invention.
Figure 11C:
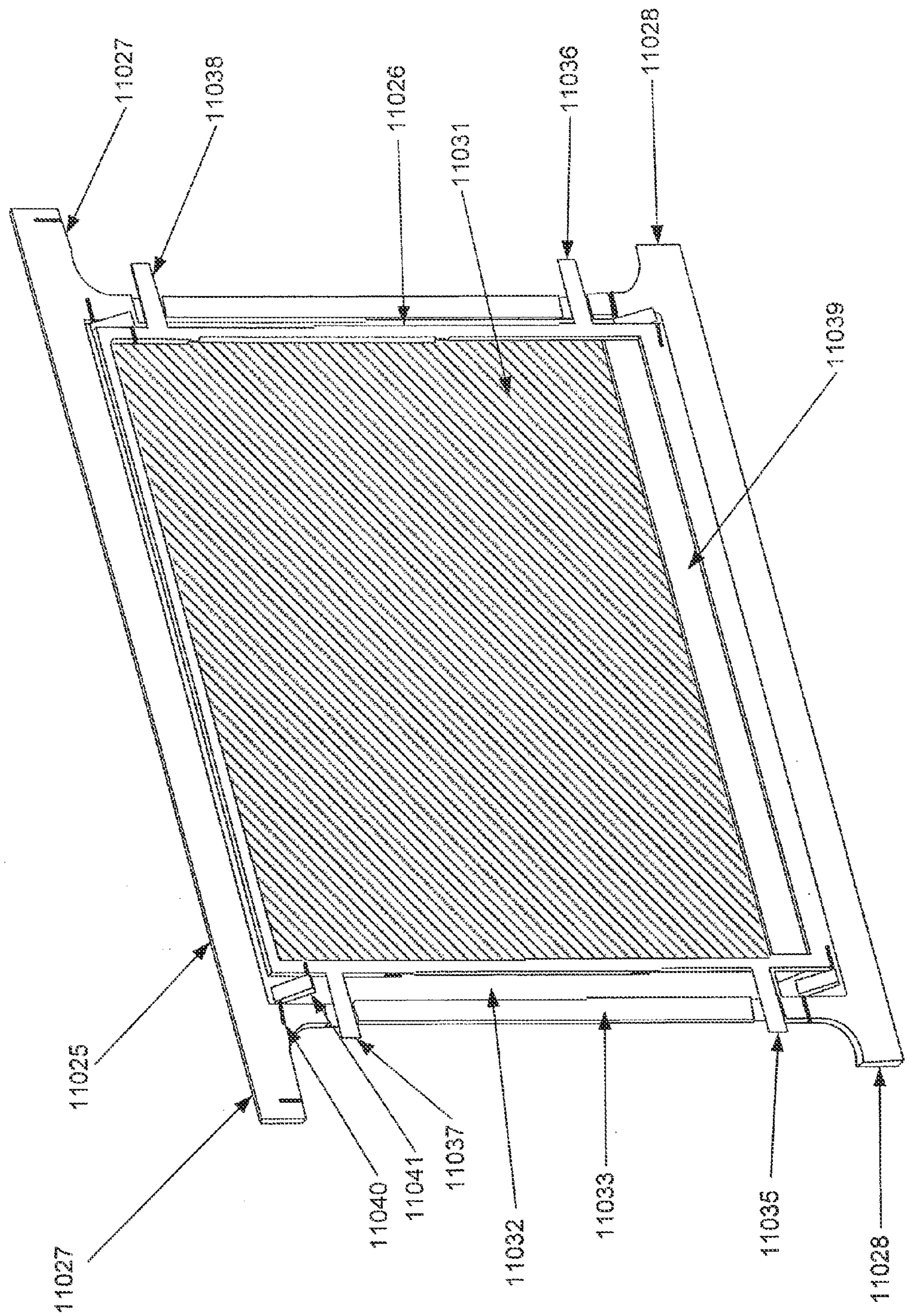
Figure 11C:
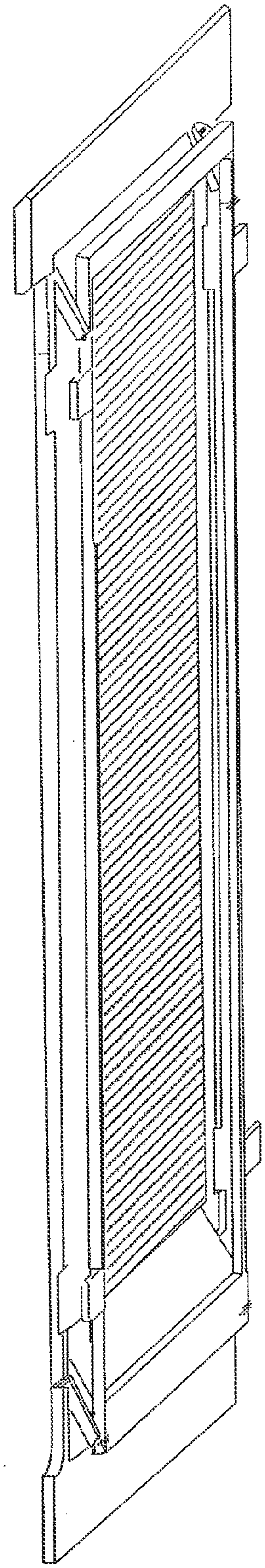
Figure 11C:
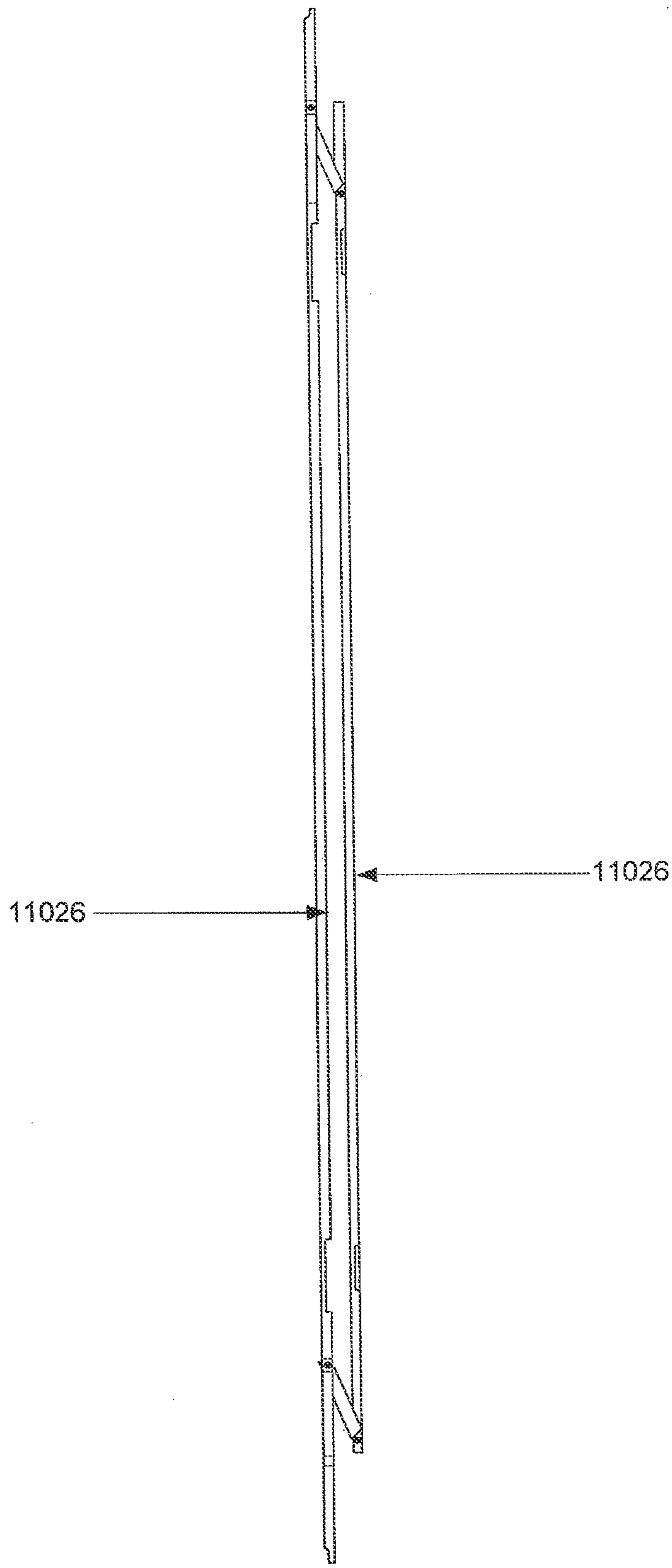
Figure 11D:
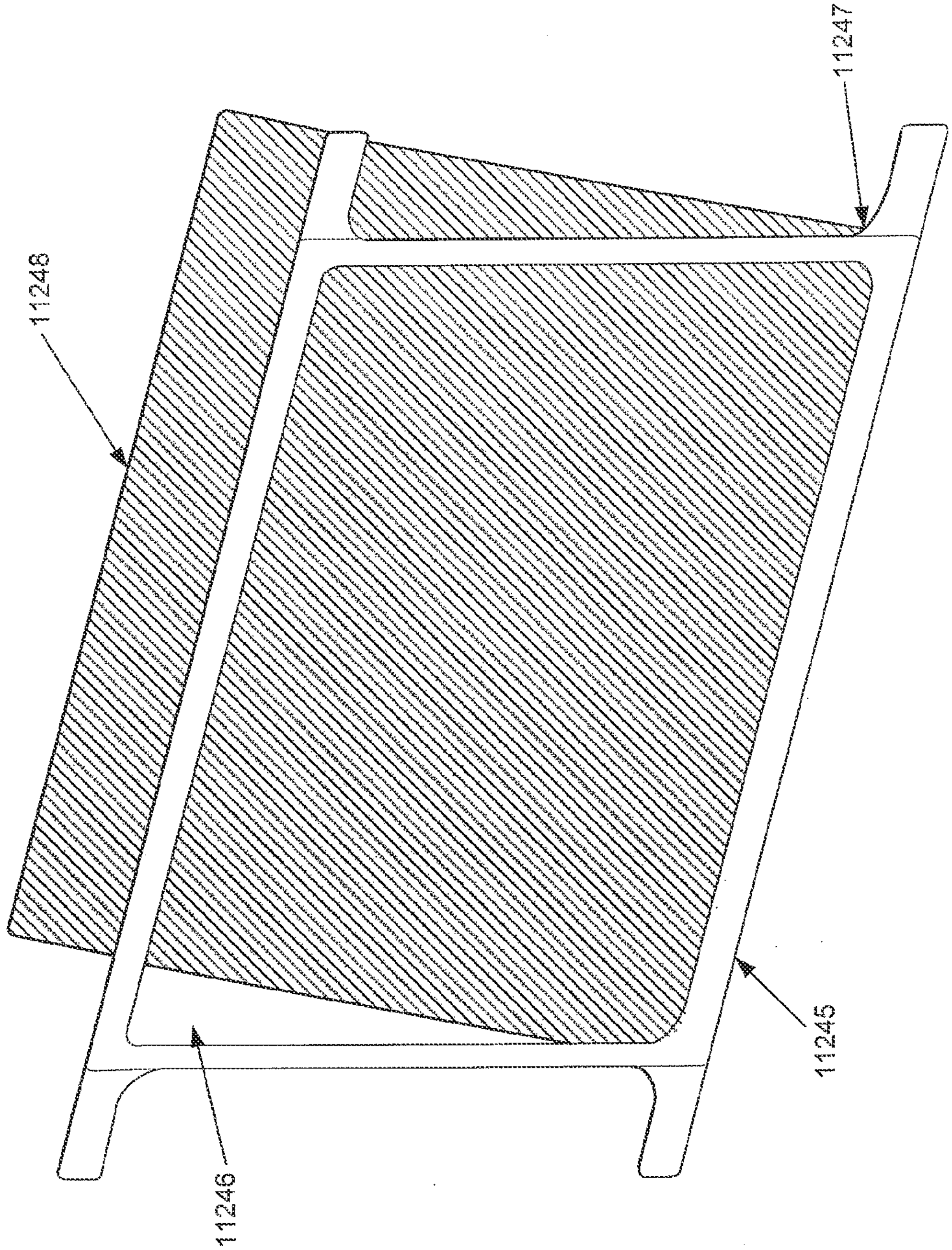
FIG. 11D shows a frame in accordance with aspects of the invention.
Figure 11E:
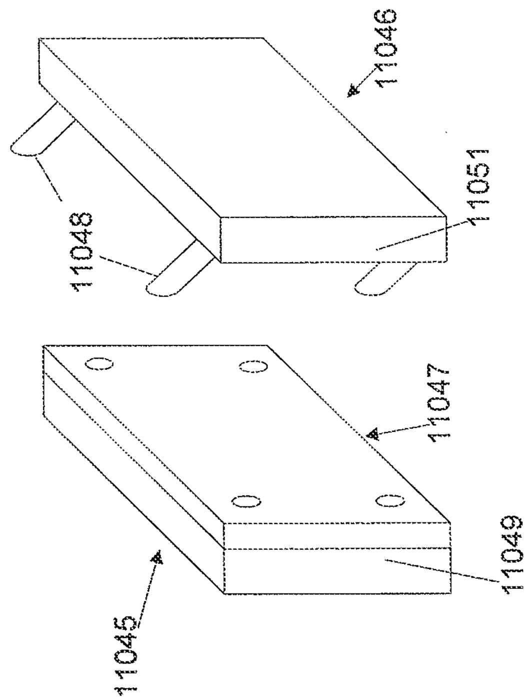
FIGS. 11Ea-11Ec show a frame design with a two part frame in accordance with aspects of the invention.
Figure 11E:
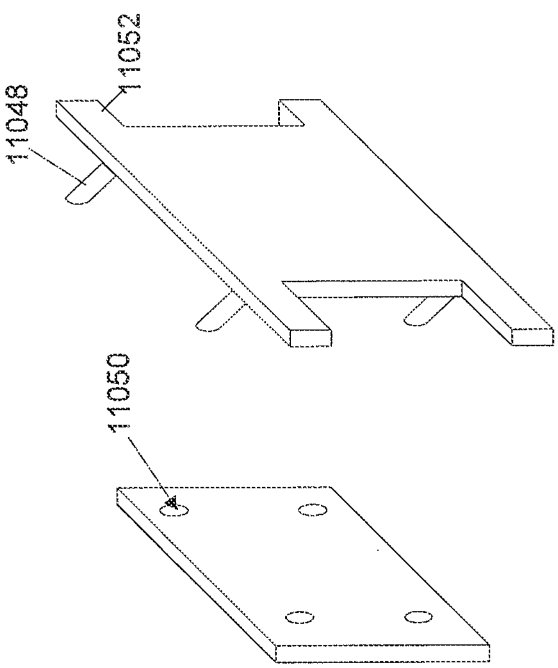
Figure 11E:
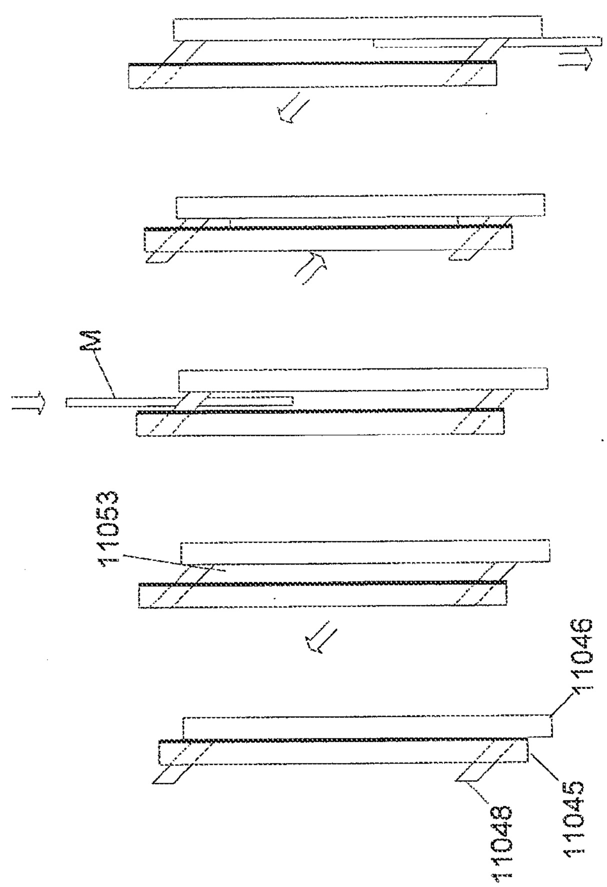
Figure 11F:
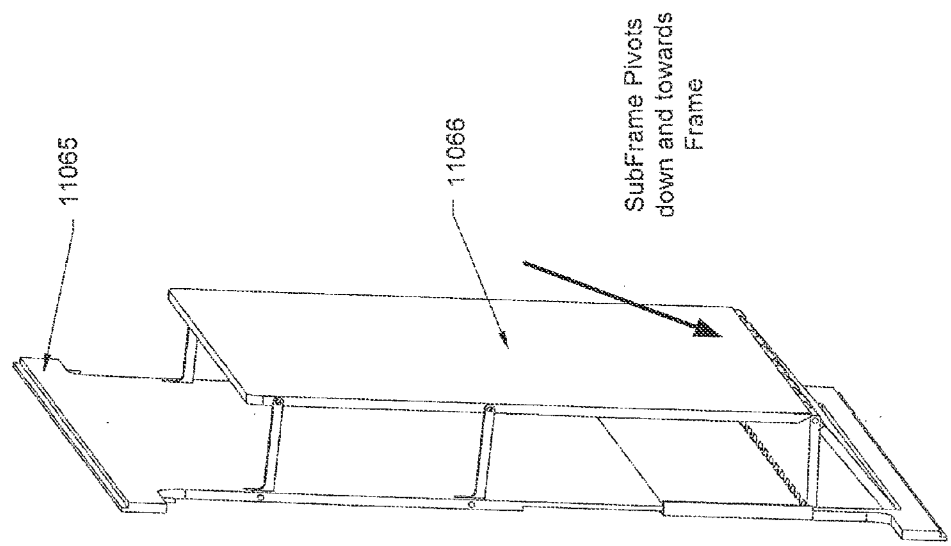
FIGS. 11Fa-11Fd show an alternative frame design which accommodates top or side insertion and bottom extraction of mail pieces in accordance with aspects of the invention.
Figure 11F:
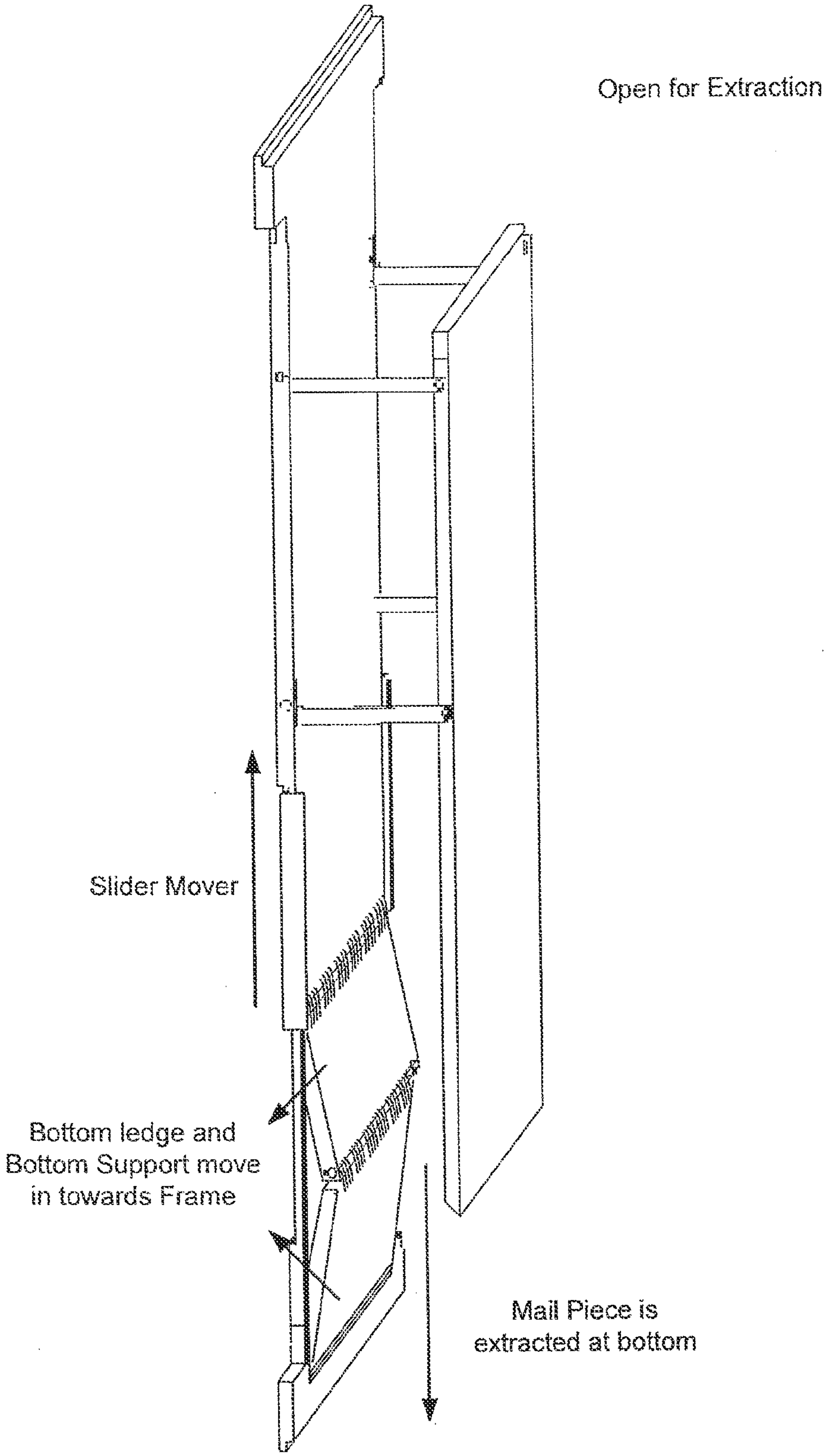
Figure 11F:
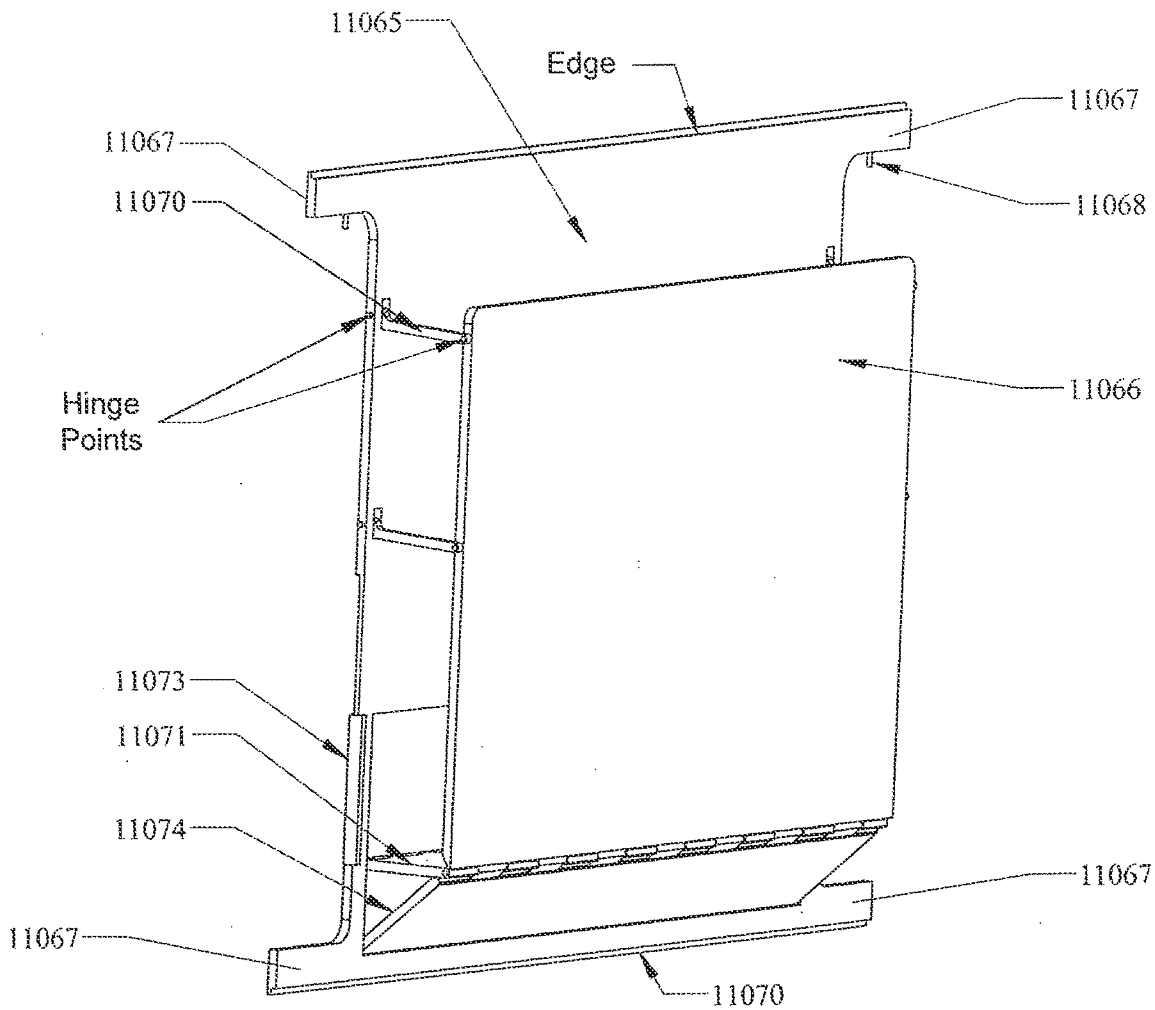
Figure 11F:
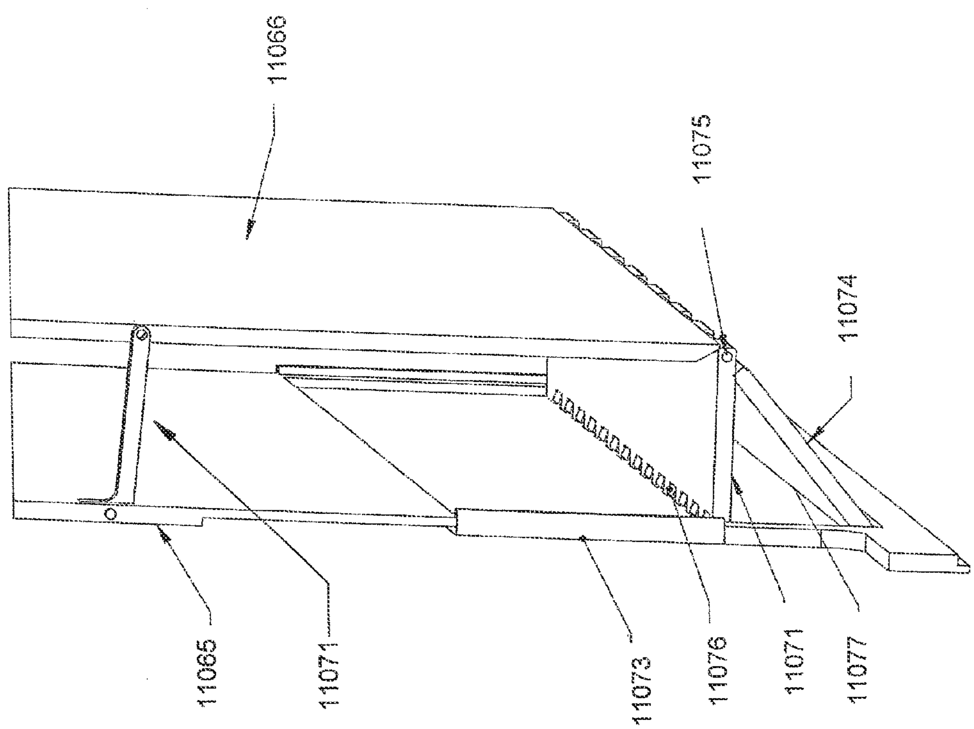
Figure 11G:
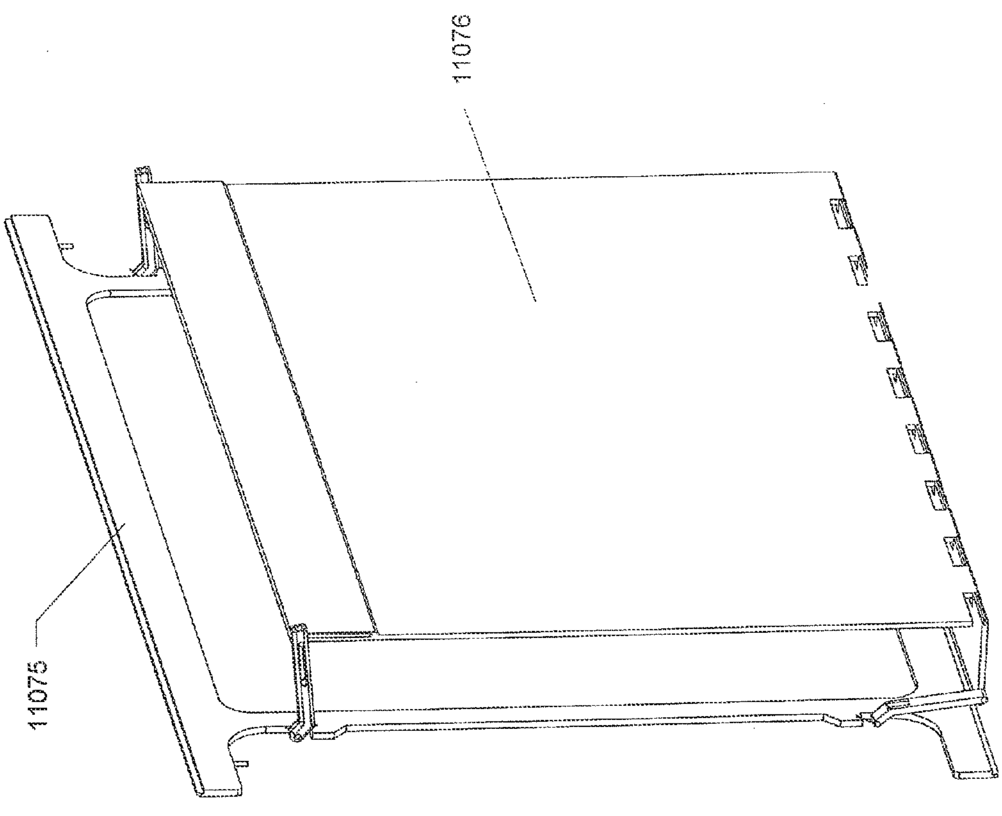
FIGS. 11Ga-11Gc show an alternative frame design which accommodates top or side insertion and side extraction of mail pieces in accordance with aspects of the invention.
Figure 11G:
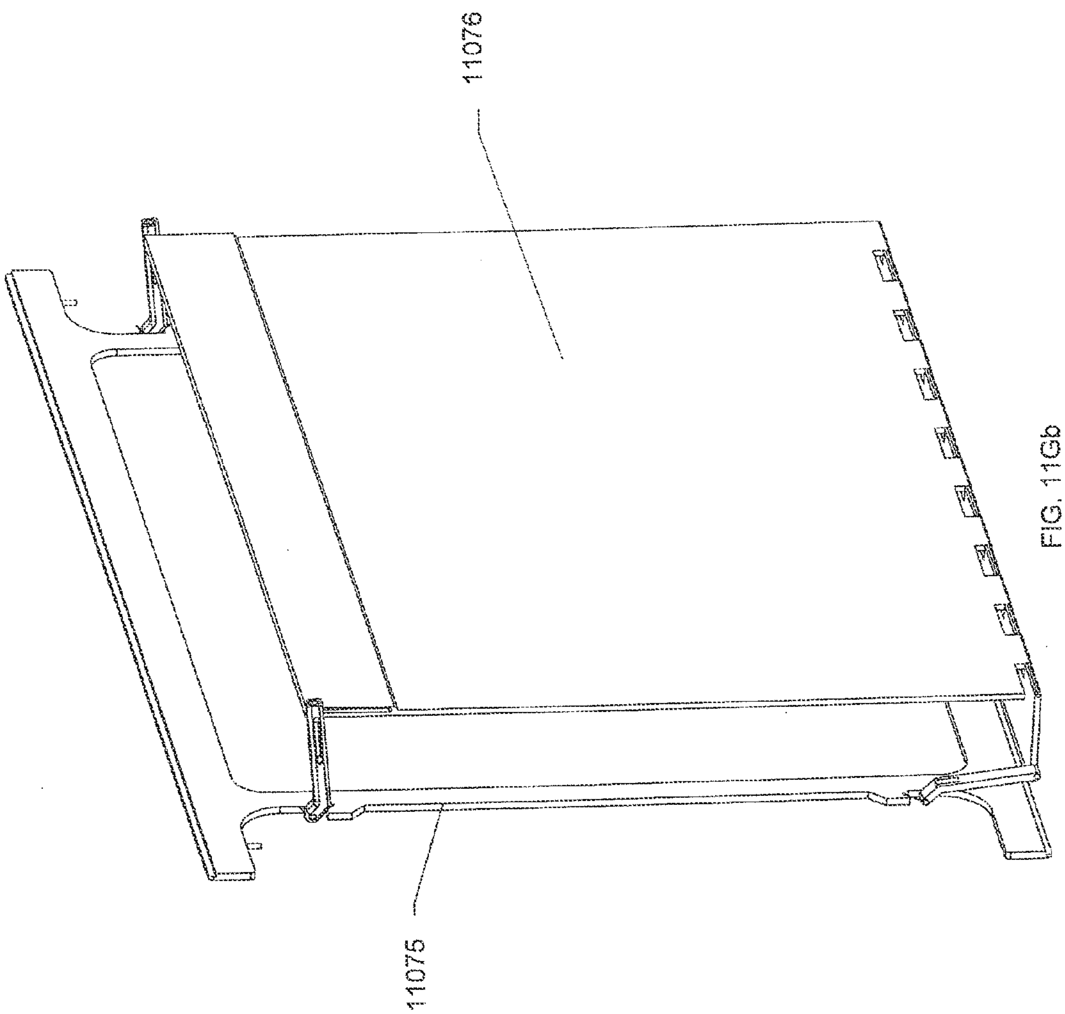
Figure 11G:
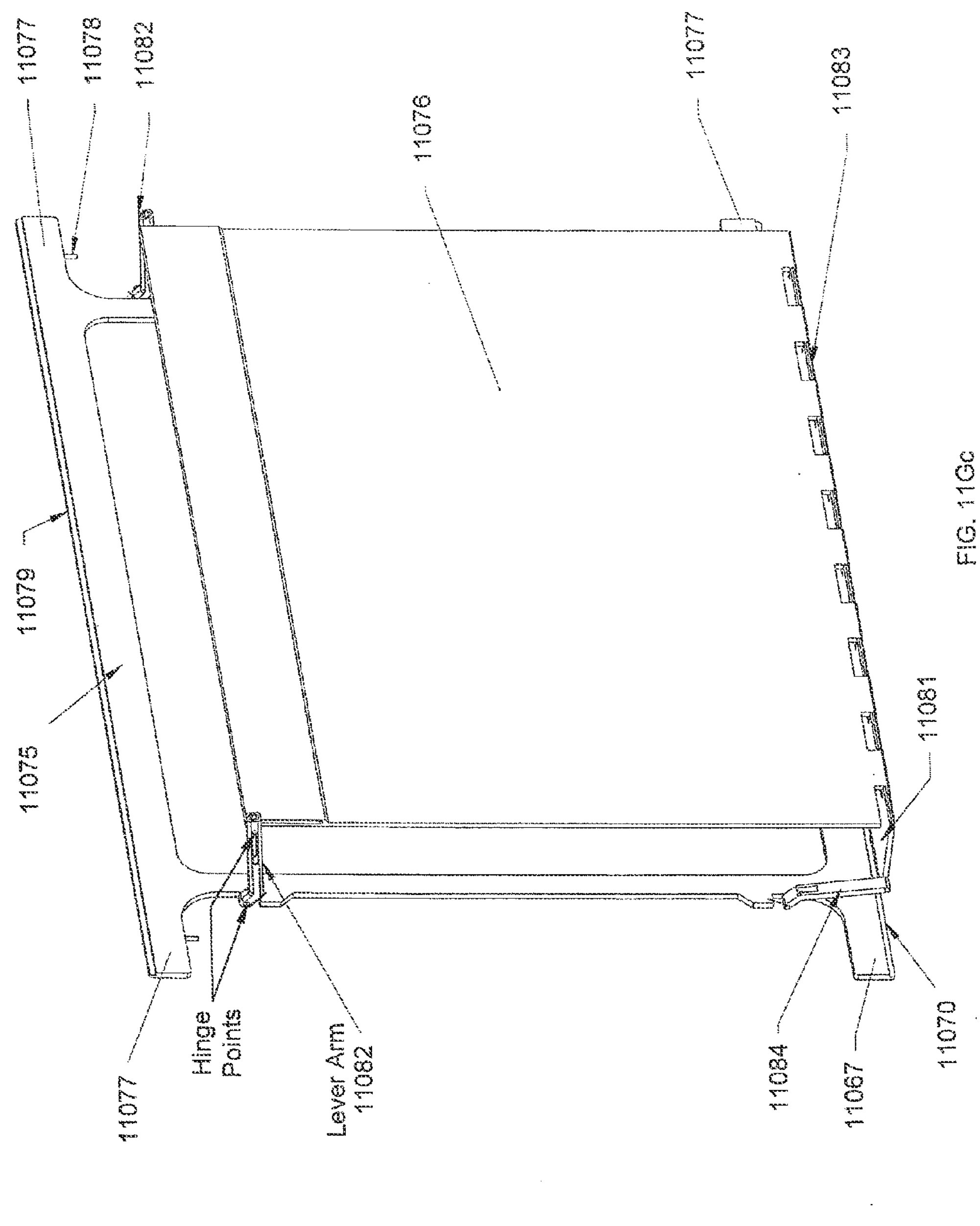
Figure 11H:
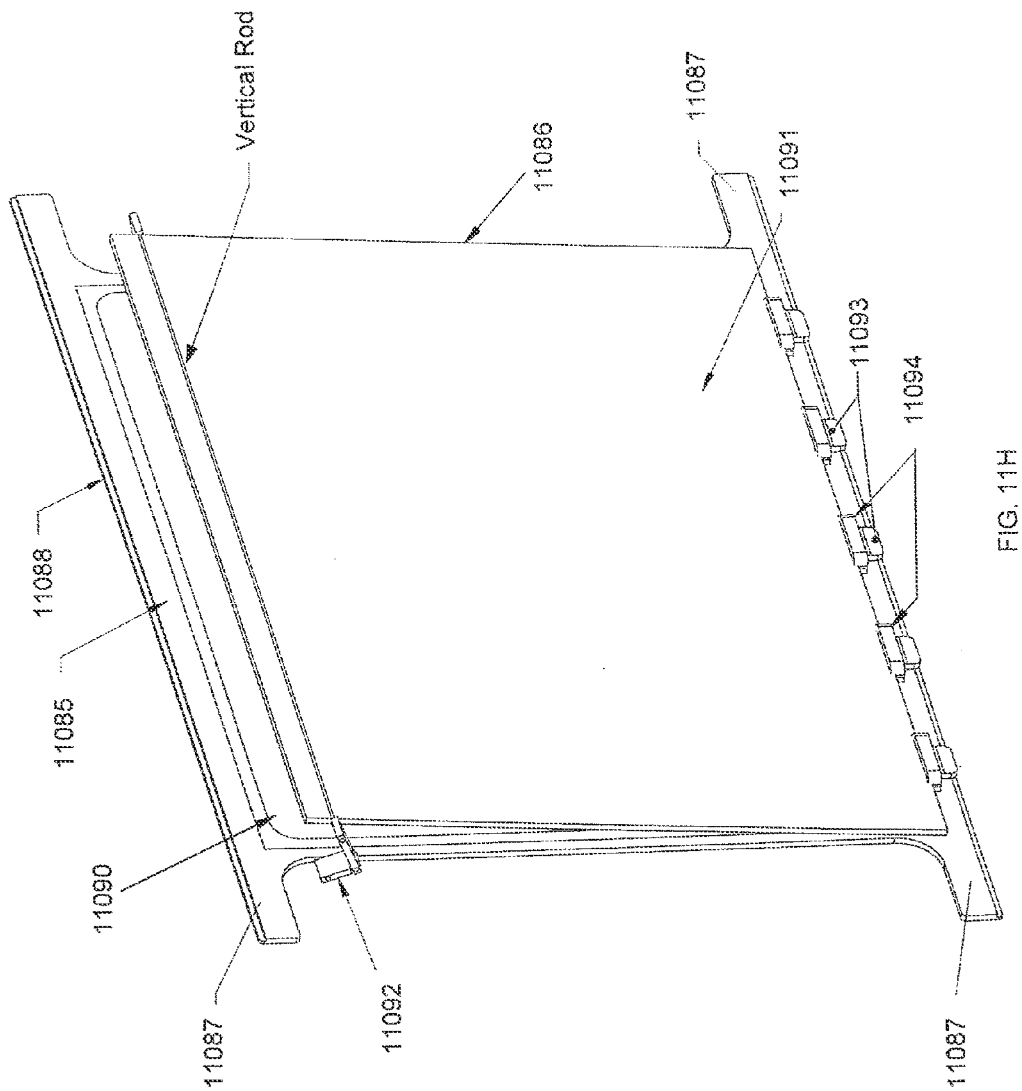
FIG. 11H shows an alternative frame design in accordance with aspects of the invention.
Figure 111:
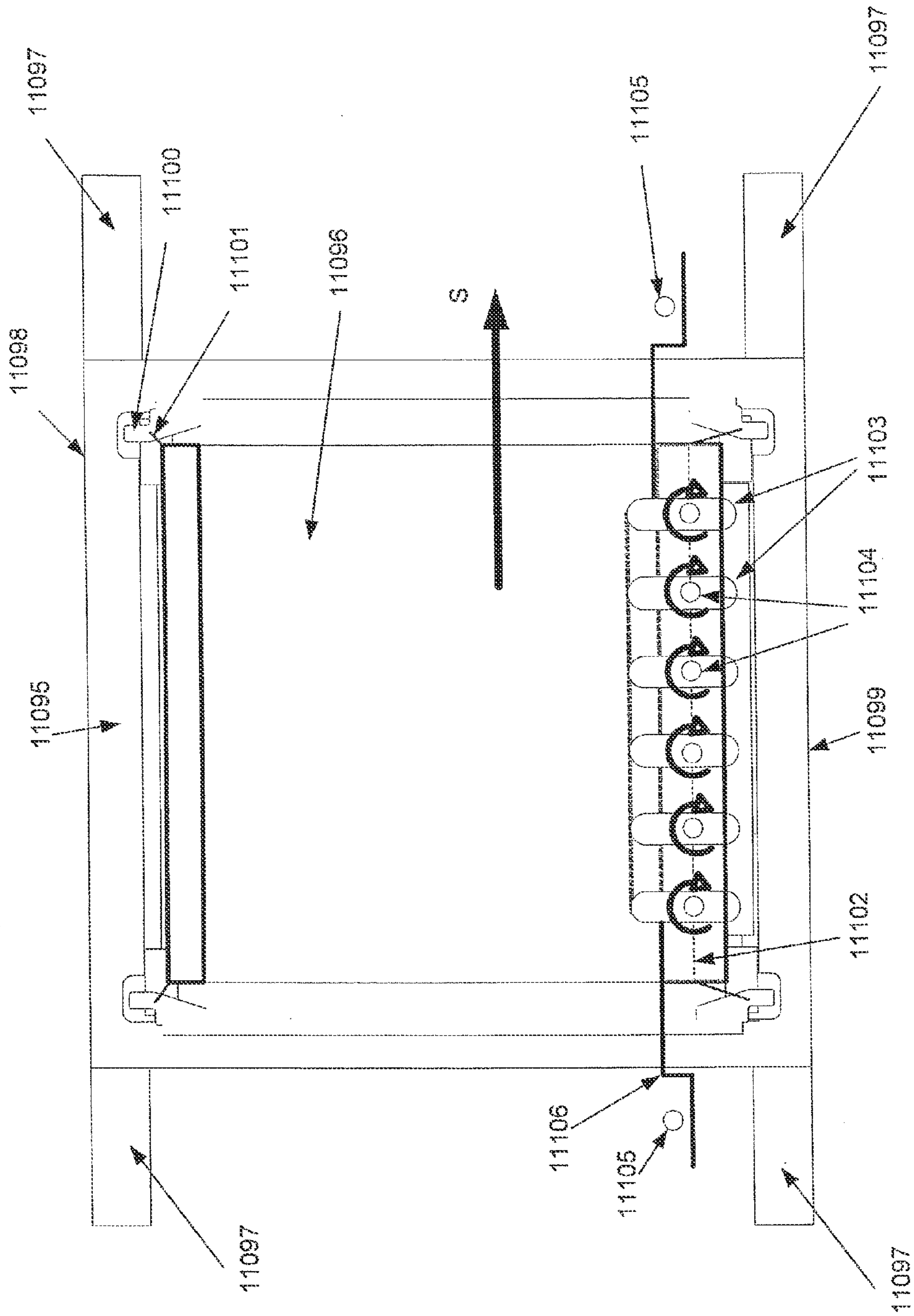
Figure 11J:
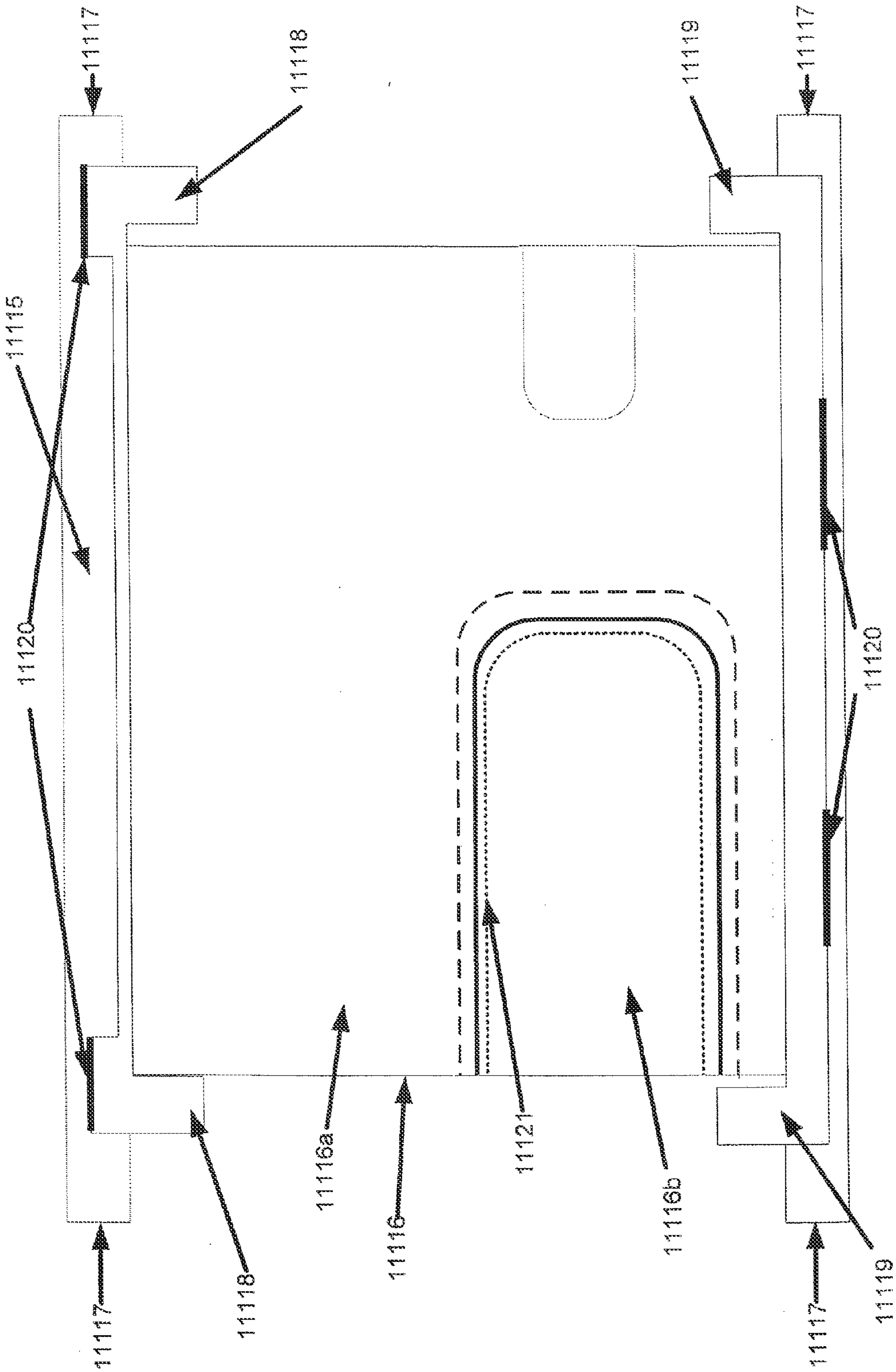
FIG. 11J shows an alternative frame design in accordance with aspects of the invention.

The frame F can take the form of the frame/folder described elsewhere herein and shown in, for example, FIG. 11J, whereby the folder maintains the mail piece 1001 between a pair of membranes, one of which includes a C-shaped cutout on the side facing the vacuum extractor 1002. The cut-out exposes a portion of the mail piece for engagement by the vacuum.

As each containerized mail piece, i.e., mail piece 1001 within a frame F, approaches the vacuum extractor 1002, the mail piece itself is acquired by the negative pressure of the vacuum chamber 1004. While so acquired, the perforated belt drives the mail piece through a side opening of the frame (i.e., in the direction of the opening of the "C" of the C-shaped cutout of the folder), thereby extracting the mail piece 1001 from its frame F. As the mail piece is extracted from its frame, or after such extraction, it is engaged by another transport mechanism, such as a pair of pinch-belts 1009 for further processing into a delivery container.

While the mail piece 1001 is being extracted by means of the vacuum extractor, the emptied frame F is driven in a direction opposite of the direction of the extraction of the mail piece by a friction contact wheel 1008 for example, as shown in FIG. 10A. Such emptied frames can thereafter be driven by means of the aforementioned lead screws or other means of conveyance to a frame inserter for insertion of another mail piece.

The extraction apparatus of the embodiment shown in FIG. 10A allows for the vacuum chamber to be as large as necessary to be able to acquire mail pieces accurately within the individual frame and remain in a fixed location. Instead of moving the vacuum head in and out between the individual frames and thereby increasing the gap needed between successive frames, the frames are moved laterally allowing each one to be presented to the vacuum chamber. This eases the mechanical design by not requiring vacuum lines to move with the chamber and sizing the chamber for weight and space constraints between containers. In addition, moving the individual frames is achieved more quickly and consistently because they are of a common form factor. Additionally, mail pieces may be moved directly into a pinch belt transport allowing for a multiplicity of further operations to be performed upon the mail piece including, but not limited to, detection and validation of mail piece extraction, mail piece dimensional characteristic measurements, mail piece orientation correction, mail piece reorientation, hazardous material detection, optical recognition of external markings and identifiers, including indicia marks, addresses, ZIP codes, or other of the like as discussed in the instant application.

Figure 10B:
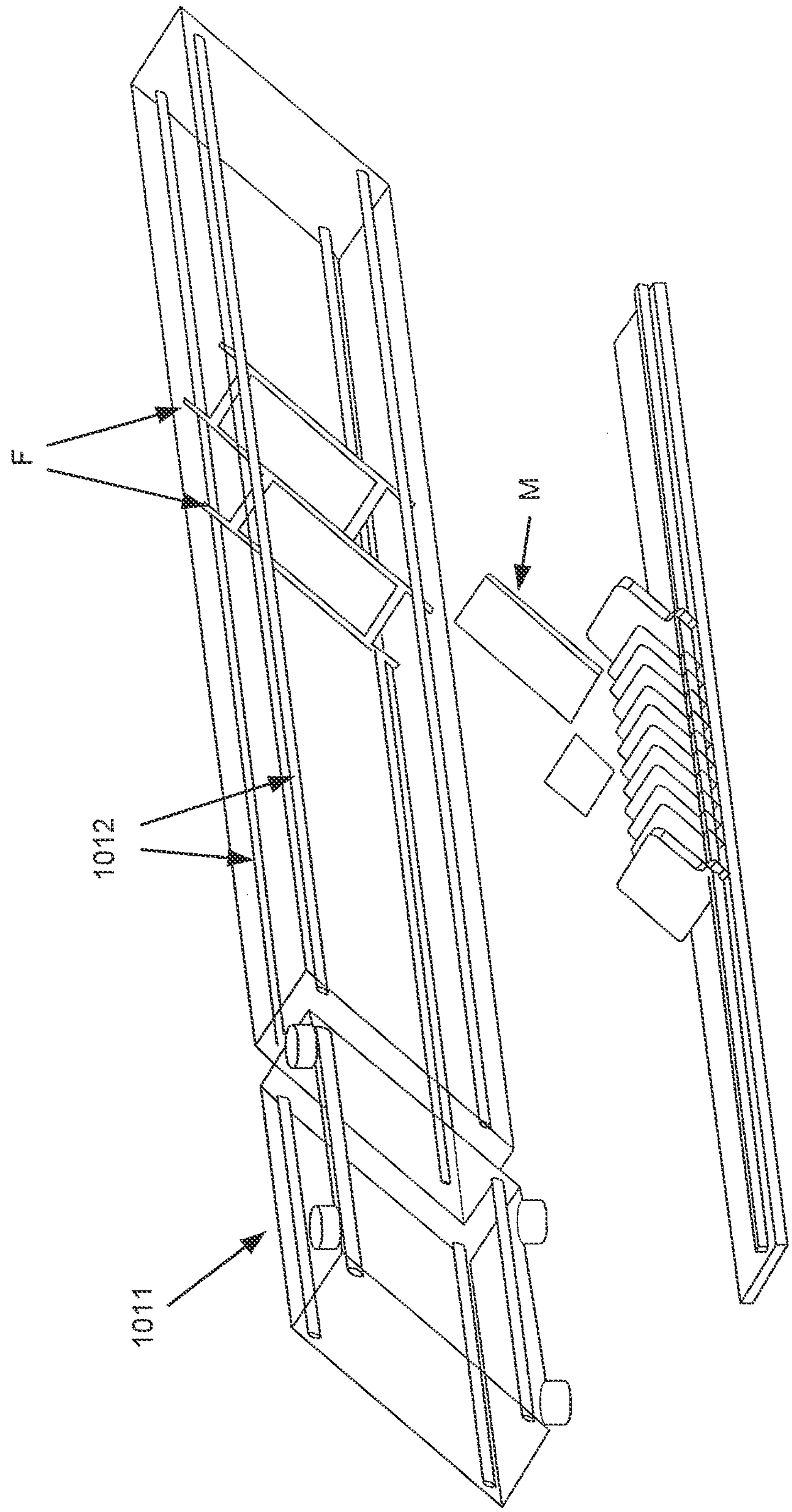
FIGS. 10B-10D show an alternative mail piece extraction apparatus in accordance with certain aspects of the invention and, more particularly, via force-of-gravity utilizing a rotated shuttle in accordance with aspects of the invention.
Figure 10C:
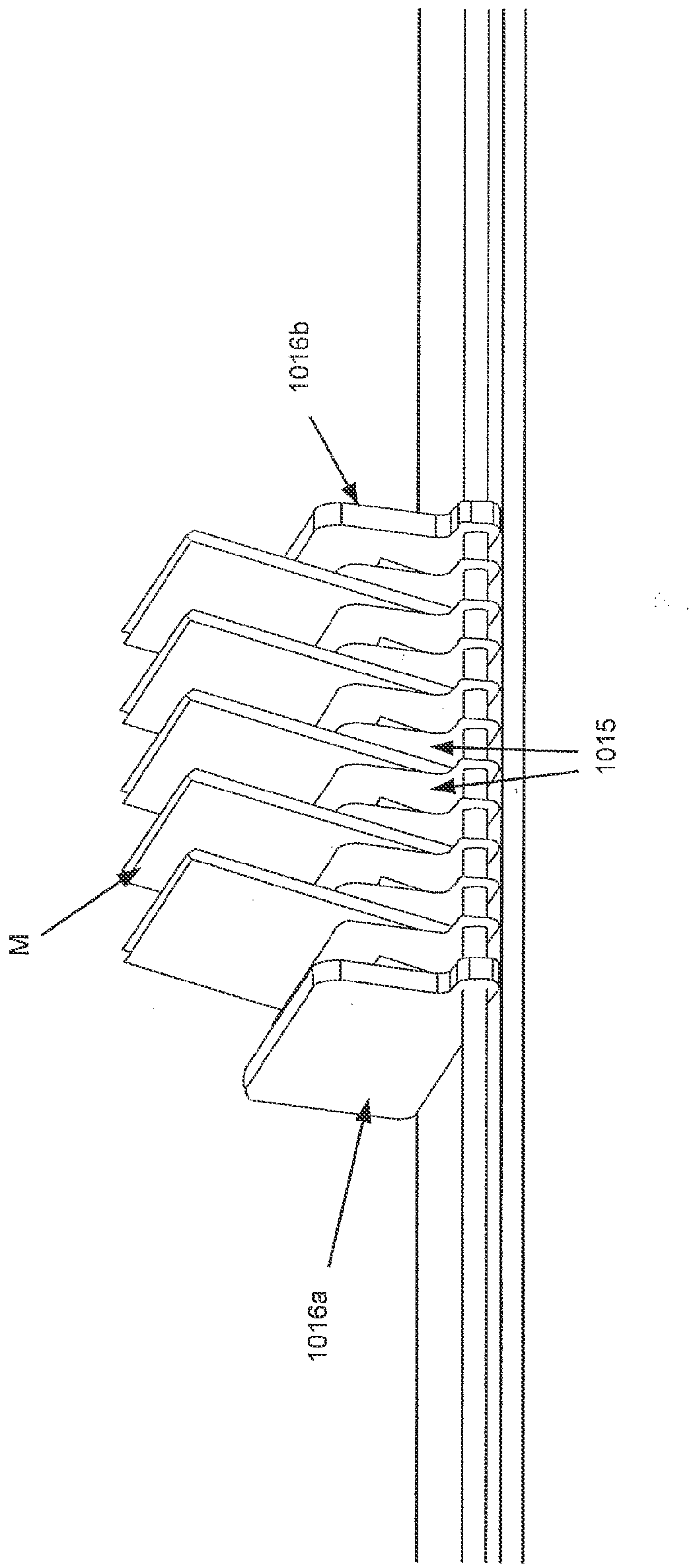
Figure 10D:
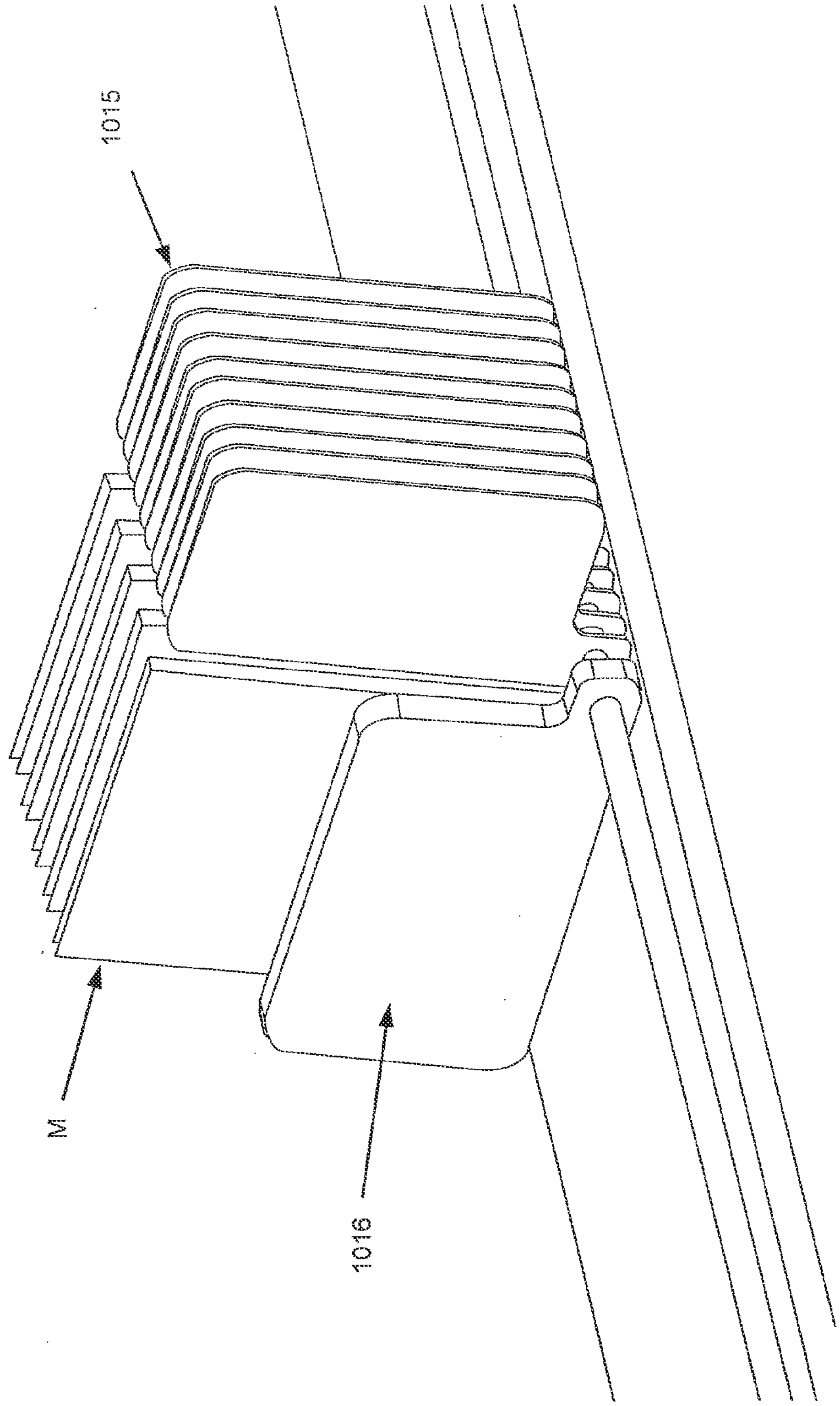

FIGS. 10B, 10C, and 10D show an alternative arrangement for extracting mail pieces M from their respective frames F. More particularly, FIGS. 10B-10D show mail piece extraction via gravity utilizing a rotatable shuttle 1011.

The apparatus of FIGS. 10B-10D, under command of the computing infrastructure shown in FIG. 1, operates in the following manner.

The shuttle 1011 is rotated by 90° by means of a "shuttle flipper" mechanism which is, in exemplary embodiments, provided by way of a gear system structured to rotate the shuttle. More particularly, such a mechanism is configured to capture the shuttle and rotate it 90° and then release it. For example, it could capture the shuttle via a pin-in-hole arrangement, traction belts, gripper paddles, or by design of the shape, such as, but not limited to a 90° angle iron type shape that allows the shuttle to be driven onto it at an orientation of 0° and then rotated 90° and then driven off. To accommodate operating while on its side, the apparatus requires a shuttle structured and arranged to include, for example, a mechanism such as a clamp used with the shuttle described elsewhere herein, for holding the shuttles or frames on the shuttle while the shuttle is rotated.

The rotated shuttle 1011 docks with lead screws 1012, which to convey the frames F along the processing path at the 45° angle, as shown. Frames F are extracted, with expanded pitch, from the rotated shuttle 1011 onto the rotated lead screws 1012.

The mail pieces are extracted via gravity force through the bottom of the frames. More specifically, the mail pieces drop via gravity into available spaces between a plurality of separation paddles 1015. Separation paddles 1015 are positionable relative to the frames F, to ensure the mail pieces are released directly over respective spaces between separation paddles 1015. This position can be accomplished by the movement of the frames F versus the movement of the available spaces between separation paddles 1015. Additionally, a sensor or an array of sensing apparatus such as, for example, a photodiode, weight sensor, etc., can be used to verify that each mail piece is collected within the available spaces between separation paddles.

The separation paddles 1015 reorient from a less than 90° to 90° (perpendicular) to the bottom reference edge or deck. The slots are to be oriented at, or approximately at, 45° to accommodate the angle of the mail piece while it is falling out of the frames. According to a particular embodiment, a requirement can be made for the slots/paddles to be able to rotate/change angles. The paddles can either rotate individually or rotate together.

The separation paddles 1015 can withdraw by means of various possible arrangements of linear or radial movement via a solenoid or other driving mechanism known to those skilled in the art. The separation paddles 1015 are to move in a direction that will not lose the edge reference of the mail pieces. Thus, if the edge reference is the bottom right corner of the mail pieces, then the separation paddles 1015 are to be moved in a direction that would not lose the edge reference, i.e., a downward or a rightward, or a down and rightward movement would be optimal. Separation paddles 1015 may withdraw simultaneously or slightly out of time from each other to aid in the reduction of adhesion of mail pieces to the separation paddles.

A final compression of mail pieces is made via compression paddles 1016*a* and 1016*b*. The compression paddles 1016*a* and 1016*b* move toward one another to close up gaps created when the separation paddles 1015 are withdrawn, and to create a tighter mail stack that can be moved or conveyed or dropped into a transportable container. Compression paddles can move by means of various possible arrangements, e.g., via a solenoid or other driving mechanism known to those skilled in the art.

In an alternative embodiment, a self-sweeping frame can be utilized for extraction. For example, based upon the need for a mechanical assist to the force of gravity, it is contemplated within the scope of the invention to use rotation of one frame side, or an accordion-like folding side, to sweep against the other frame side and extract the contents. Hinges are integral components of the frame, allowing the frame to fold and recover during an extraction cycle. Clips or latches are incorporated in a frame with symmetrical sides, allowing one side to detach, rotate 180 degrees and reattach the next side after sweeping, as discussed with reference to the frames.

Alternative arrangements for extracting mail pieces from their respective frames are described elsewhere herein in connection with a description of particular embodiments of frames. For example, the embodiment shown in FIGS. 11Ea-11Ec, which provides for a gravity extraction of a mail piece as the movable part 11045 of the frame/folder moves away from the static part 11046, thereby releasing mail piece which had been gripped therebetween.

Similarly, the embodiment shown in FIGS. 11Fa-11Fd also provides for a gravity extraction of the mail piece as the bottom ledge 11074, supporting the mail piece, is pulled toward the frame, thereby eliminating the support for the mail piece and allowing the mail piece to be extracted from the bottom of the frame.

Arrangements for extracting mail pieces, other than via gravity extraction, have been described in connection with the description of frames. For example, the embodiment shown in FIG. 11I allows simultaneous extraction from a batch of frames by means of rotatable rods that extend through the folders and move the mail pieces out a side opening of the respective frame/folders. Likewise, the embodiment shown in FIGS. 11Ka-11Kd of a pinch-belt folder and the embodiment shown in FIGS. 11La-11Ld of a slider-in-folder enable mail piece extraction by means of mechanisms integrated within the folder for extracting mail pieces from their respective frame/folders.

Figure 10E:
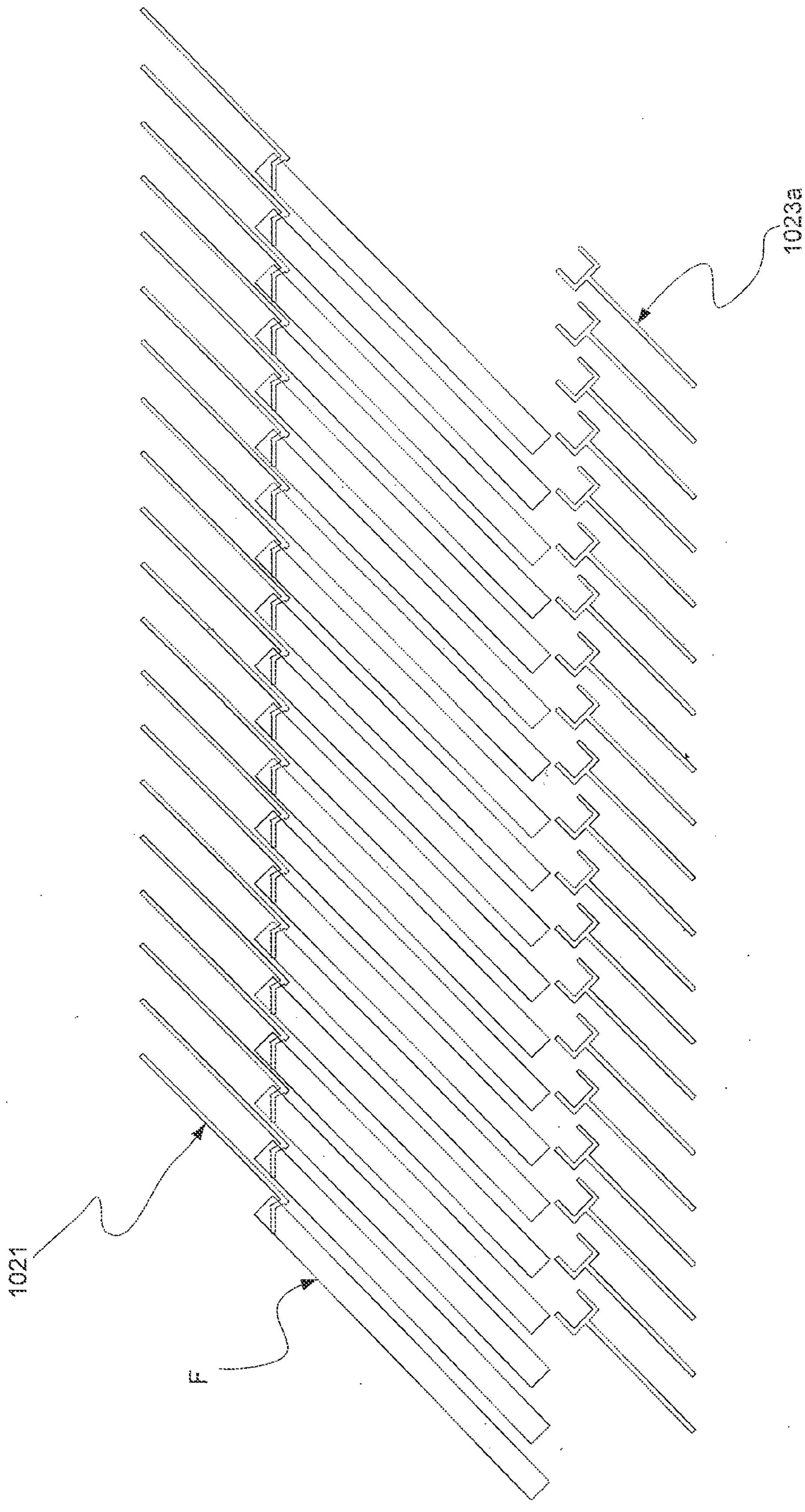
FIGS. 10E-10G show an additional alternative mail piece extraction apparatus in accordance with certain aspects of the invention and, more particularly, via robotic pushers and grippers, being friction or vacuum assisted in accordance with aspects of the invention.
Figure 10F:
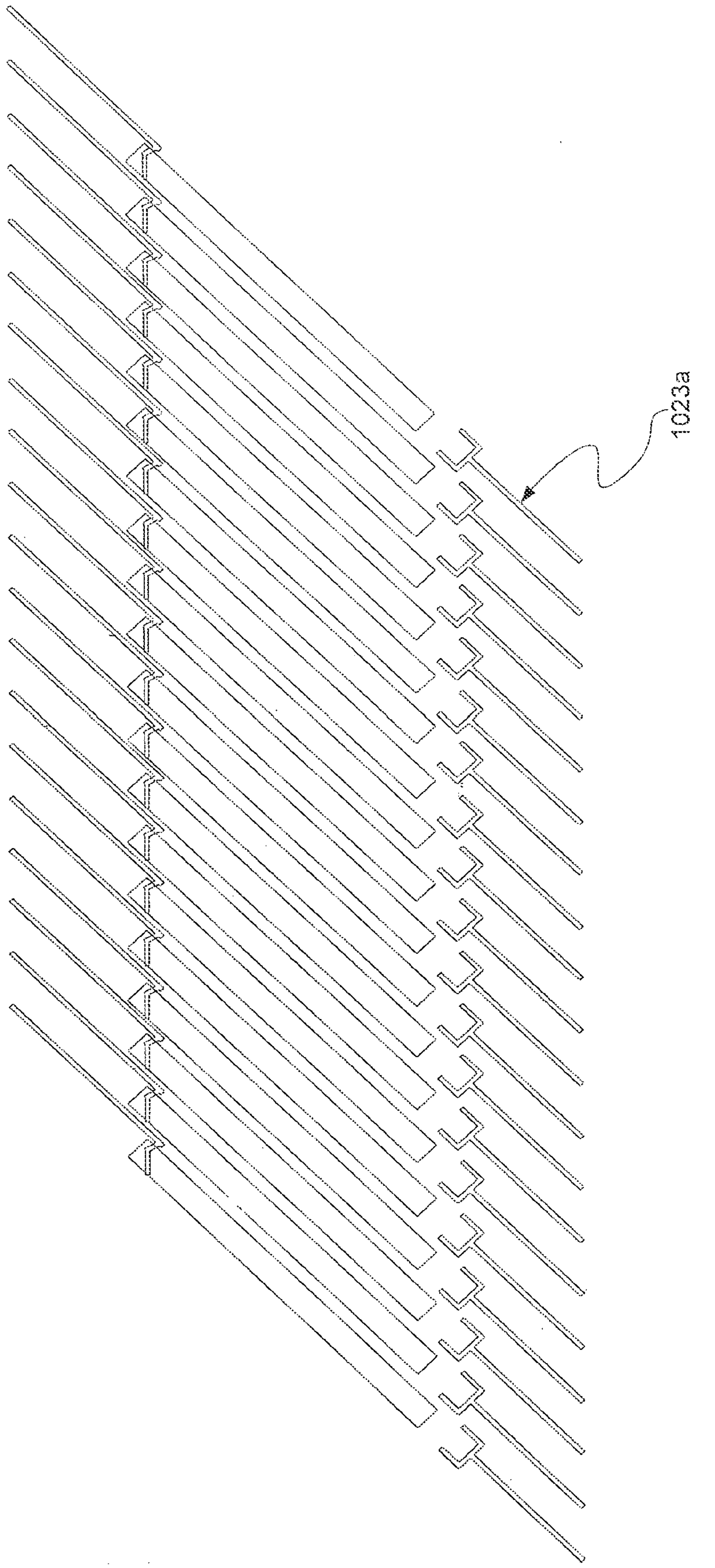
Figure 10G:
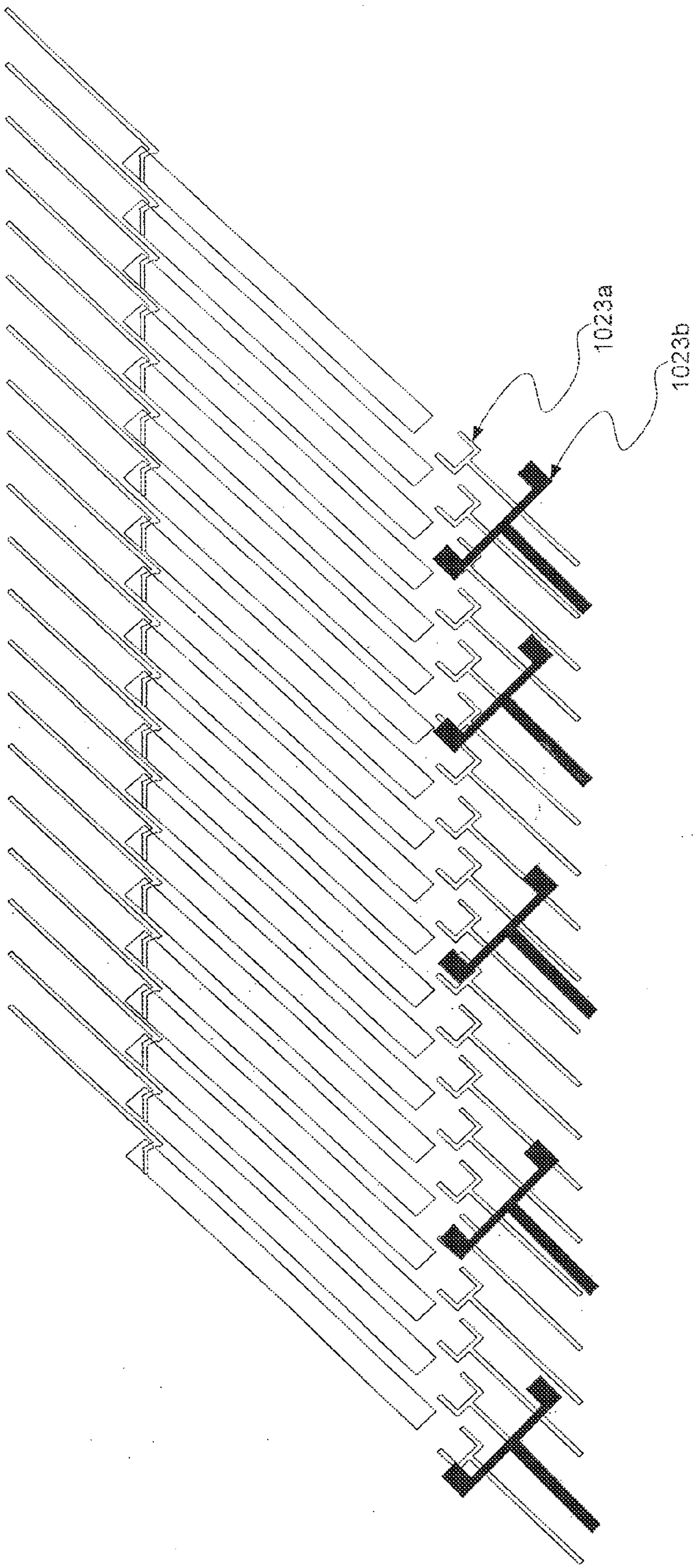

FIGS. 10E, 10F, and 10G show another alternative arrangement for extracting mail pieces from their respective frames. More particularly, FIGS. 10E-10G show mail piece extraction via a robotic pusher and gripper arrangement.

The apparatus of FIGS. 10E-10G, under command of the computing infrastructure shown in FIG. 1, operates in the following manner. As shown in FIG. 10E, articulating pushers 1021 slide into opened frame F to begin moving mail pieces toward waiting articulating robotic grippers 1023*a* and/or 1023*b*.

As shown in FIG. 10F, the articulating pushers 1021 continue to move until an appropriate amount of each of the respective mail pieces is exposed on the opposing side of the frame for the awaiting articulating robotic grippers 1023*a* and/or 1023*b* can acquire the mail pieces. A sensor such as, for example, a photodiode, may be used to determine the position of the mail piece as it is exposed from the frame.

The articulating pushers 1021 may be purely linear on a rotational head or may be independently articulatable via various joints allowing 360 degrees of freedom of movement in X, Y, and Z axes, moveable by a solenoid as would be known by those skilled in the art. The articulating pushers 1021 may be controlled independently for mail pieces or articles of various lengths but may also be unitarily controlled for mail pieces or articles of like lengths. The articulating pushers may act internal to the frame by slipping completely inside and pushing the mail piece via an end effecter, or it may act external to the frame with an appendage of the end effecter acting internal to the frame via pressure, force, or direct contact through an assortment of possible openings in the folder's surface.

As shown in FIG. 10G, articulating robotic grippers 1023*a* and/or 1023*b* acquire the mail pieces and move them off to a staging area for preparation in the next process of automation, i.e., transportable container loading. The articulating grippers may be a large plurality of small sized grippers 1023*a* capable of acquiring a large quantity of common or less thicknesses of mail pieces. The articulating grippers may also have a smaller plurality of large sized grippers 1023*b* staged that may intercede and replace a quantity of small sized grippers 1023*a* for acquiring mail pieces of a greater than common thickness of mail pieces.

Figure 10H:
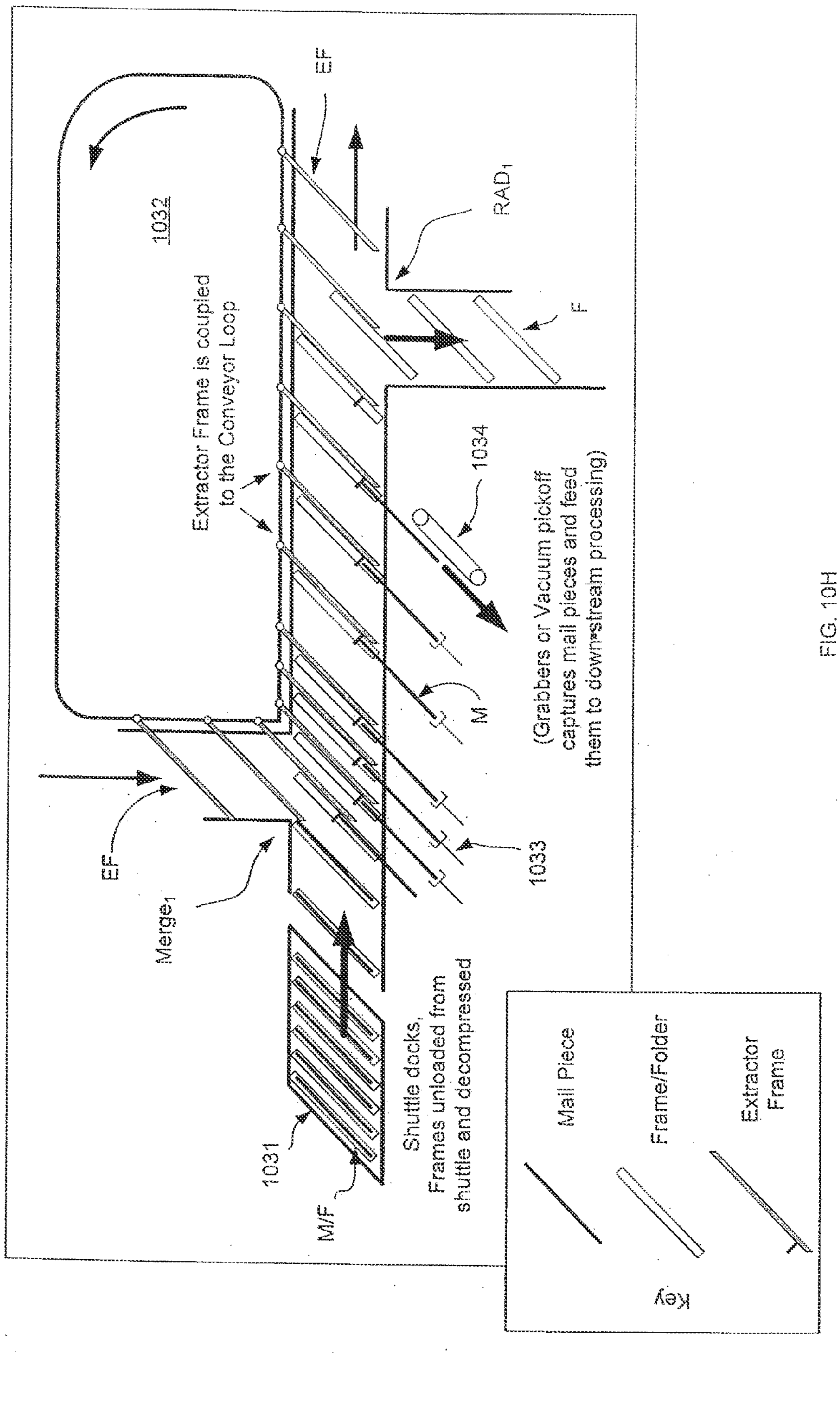
FIG. 10H schematically illustrates, in a plan view, a unidirectional mail piece extraction apparatus in accordance with aspects of the invention.

In the extraction arrangement and method depicted in FIG. 10H, movement along various processing streams is unidirectional and, more particularly, such movement is along the arrows shown therein. As shown, a shuttle 1031 carrying mail-loaded frames M/F is docked at a docking port of the processing stream that moves from left to right in the figure.

The frames F are unloaded from the shuttle 1031 and decompressed as they are taken-up by the processing stream.

An endless belt conveyor 1032 drives a plurality of extractor frames EF along the processing streams in the counterclockwise direction as indicated in the figure. Movements of the extractor frames EF and the processing streams are synchronized such that, as the extractor frames EF, driven by the lead screws LS described elsewhere herein, approach $Merge_1$, they merge with the succession of mail-loaded frames.

In a particular embodiment, the extractor frames EF are driven by the lead screws, the conveyor 1032 not providing motive force for driving the extractor frames ER. In such embodiment; the belt itself is powered by the lead screws.

In an alternative embodiment, the extractor frames EF are driven by the conveyor 1032, and do not engage the lead screws, with the conveyor and the lead screws being synchronized such that the frames F and extractor frames EF can accurately merge and divert.

In succession, each such extractor frame EF of the series of frames associated with the conveyor belt 1032 engages the mail piece m within a respective one of the frames F. As such movement continues (rightward in FIG. 10H), each extractor frame EF pushes its respective mail piece m out the side of the frame F. When a sufficient extent of the mail piece is exposed as a result of the pushing of the extractor frame, the mail piece is acquired by a gripper or a vacuum head, e.g., (exemplarily illustrated as 1033, 1034, respectively, although typically one or the other mechanism would likely (although not necessarily) be used in a given implementation), as the mail piece becomes separated from its respective frame F.

The grippers/vacuum head may or may not be moving along the processing line. Both are fast-acting, as compared to the speed of the frames F moving in the lead screws.

After extraction of mail pieces from the frames, the objective is to stack the mail pieces in a tray. The tray full of mail is then transported to a post office, and taken by the mail carrier on his/her delivery route.

This advantage can be accomplished in a variety of ways within the scope of the invention. Accomplishing this objective would include the following: stacking the mail, and placing it in a tray (and any intermediate transport between steps). It could be accomplished using some combination of the following technologies: Pinch belts, rollers, bottom belts, stackers, linear-actuated paddles, pick-and-place robotics. The vacuum head and gripper are described herein in further detail.

As the empty frames F and extractor frames EF continue their movement (left-to-right in FIG. 10H), they reach $RAD_1$, where their respective directions of movement diverge. The extractor frames EF continue their movement along the endless path defined by the conveyor 1032 and the mail frames F are accumulated in a shuttle, stored, and redeployed as necessary. For example, during a successive day of processing, new mail pieces are inserted into the frames, and the mail processing cycle is then repeated.

Figure 10I:
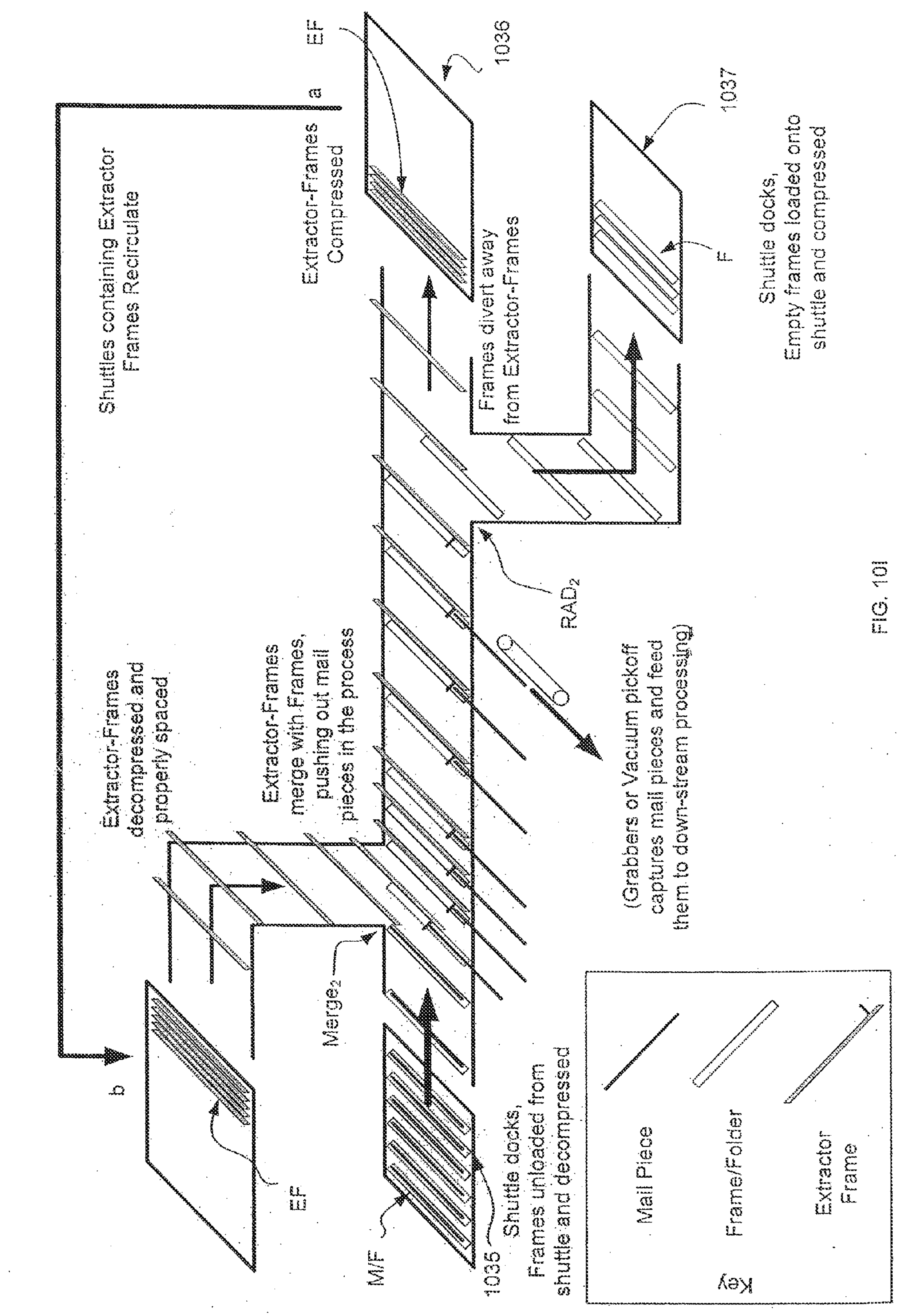
FIG. 10I schematically illustrates an alternative unidirectional mail piece extraction apparatus in accordance with aspects of the invention.

The unidirectional alternative shown in FIG. 10I replaces the endless belt for recirculating the extractor frames EF with shuttles, which can be moved from an extractor frame receiving point "a" to an extractor frame feeding point "b" in the direction shown by the arrows at the top of the figure. In other respects, the operation of the unidirectional extraction embodiment of FIG. 10I is much like that of FIG. 10H. Accordingly, as the extractor frames EF approach $Merge_2$, they merge with the succession of mail-loaded frames M/F being unloaded and fed from the shuttle 1035. In succession, each such frame EF of the series of frames engages the mail piece M within a respective one of the frames F. As such movement continues (rightward in FIG. 10I), each extractor frame EF pushes its respective mail piece M out the side of the frame. When a sufficient extent of the mail piece is exposed as a result of the pushing of the extractor frame, the mail piece is acquired by a gripper, a vacuum head, or other mechanism.

As the empty frames F and extractor frames EF continue their movement (left-to-right in FIG. 10I), they reach $RAD_2$, where their respective directions of movement diverge. The extractor frames EF continue their movement to the shuttle 1036 at point "a" and the mail frames F continue their movement to the shuttle 1037 and are redeployed as necessary.

Figure 10J:
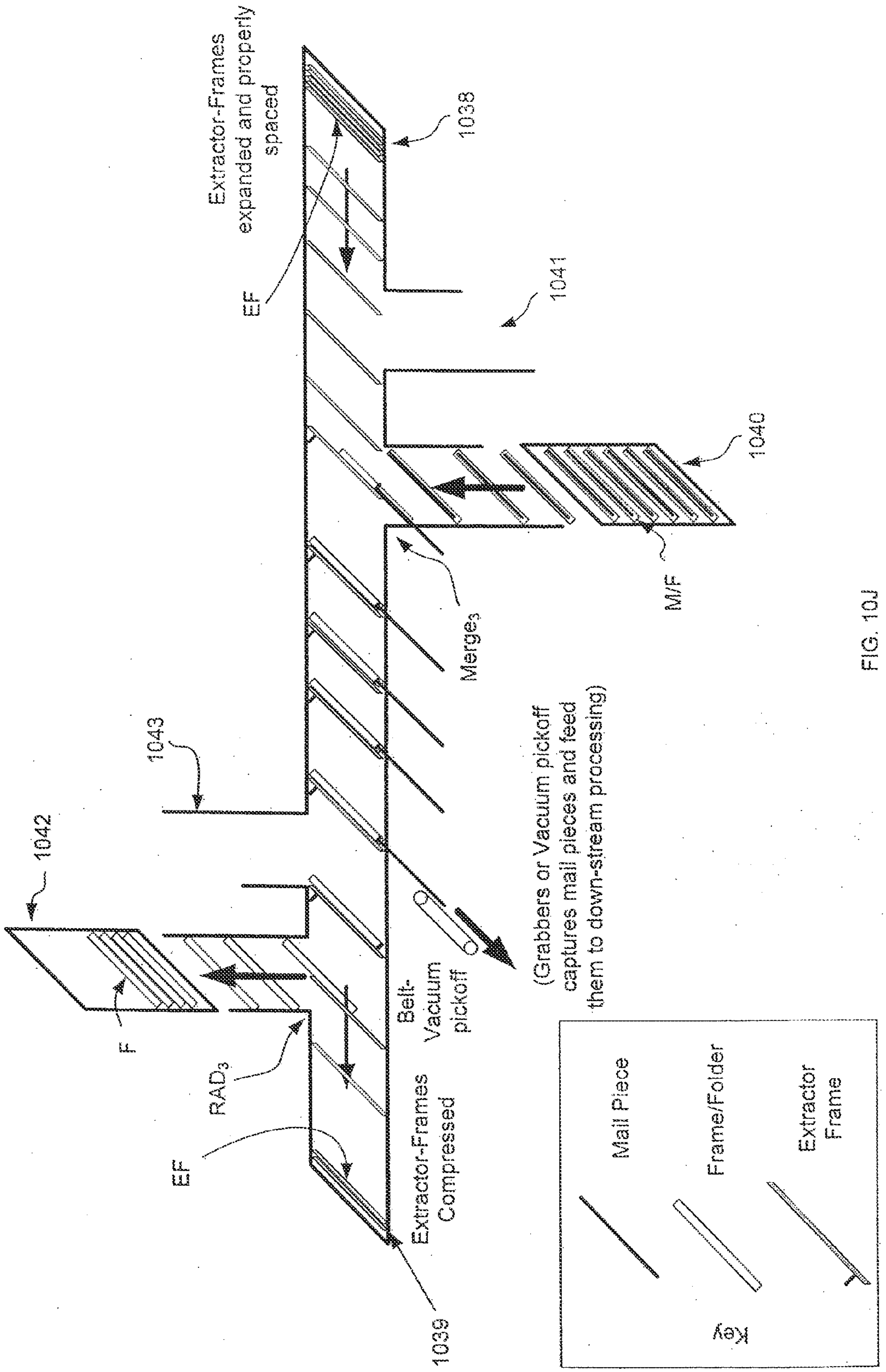
FIG. 10J schematically illustrates a bi-directional mail piece extraction apparatus operating in a first direction in accordance with aspects of the invention.
Figure 10K:
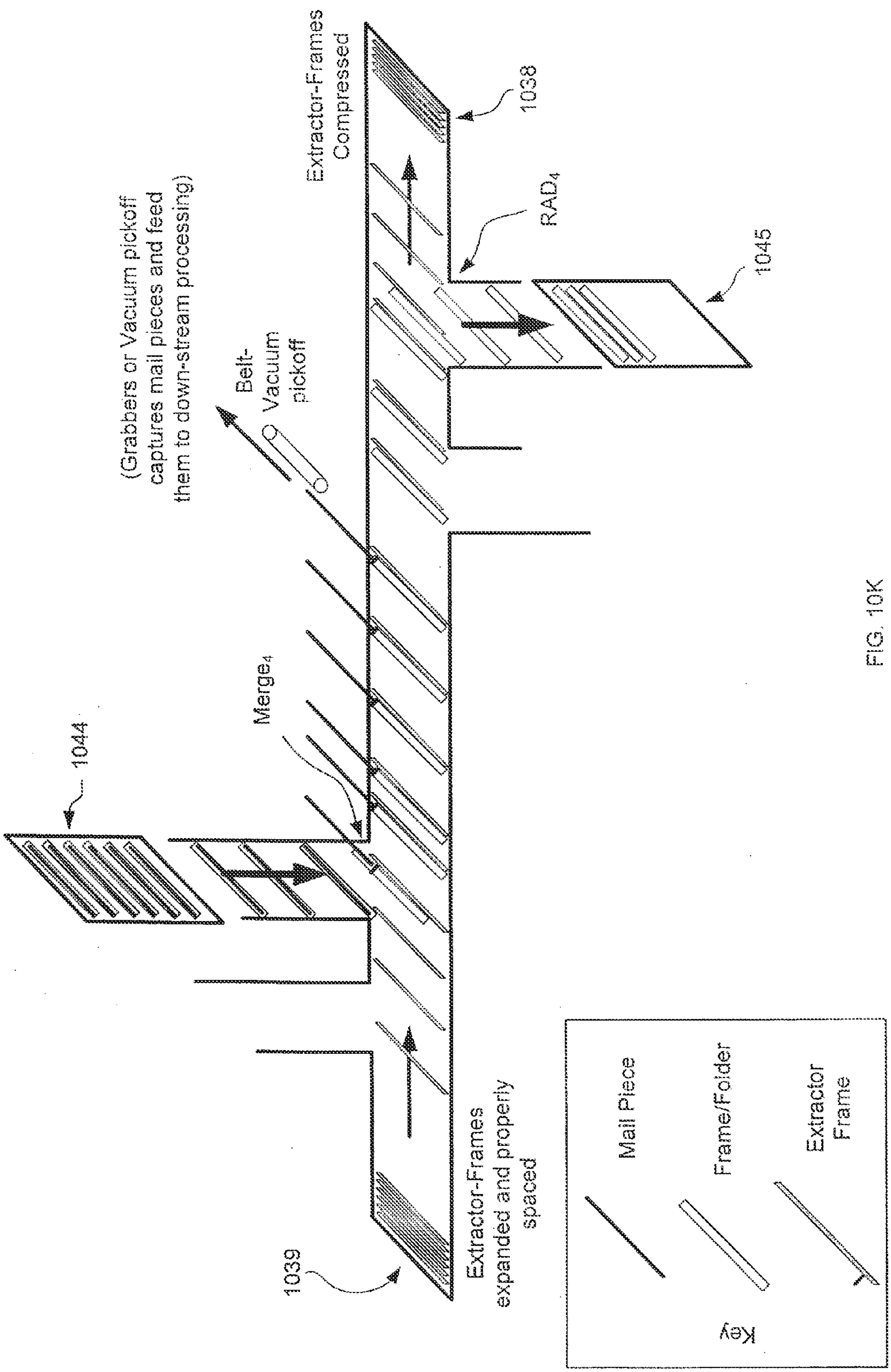
FIG. 10K schematically illustrates the bi-directional mail piece extraction apparatus of FIG. 10J operating in a second direction, i.e., opposite to the direction of FIG. 10JC in accordance with aspects of the invention.

The embodiment for mail extraction shown in FIGS. 10J and 10K represents an alternative to the unidirectional extraction arrangements of FIGS. 10H and 10I. More specifically, the embodiments of FIGS. 10J and 10K provide a bi-directional extractor arrangement, which eliminates the aforementioned need to recirculate extractor frames.

With initial reference to FIG. 10J, a plurality of extractor frames EF is shown in a buffer storage area 1038. Another plurality of extractor frames EF is shown in a buffer storage area 1039. A shuttle 1040 carrying mail-loaded frames M/F is docked at a docking port, where the frames F are unloaded and decompressed as they are then driven toward $Merge_3$. Additional docking ports, such as docking port 1041, could be added, as needed or desired.

As the extractor frames EF approach $Merge_3$, they merge with the succession of mail-loaded frames being unloaded and fed from the shuttle 1040. In succession, each such frame EF of the series of frames engages the mail piece within a respective one of the frames F. As such movement continues (leftward in FIG. 10J), each extractor frame EF pushes its respective mail piece out the side of the frame. When a sufficient extent of the mail piece is exposed as a result of the pushing of the extractor frame, the mail piece is acquired by a gripper, a vacuum head, or other mechanism.

As the empty frames F and extractor frames EF continue their movement (right-to-left in FIG. 10J), they reach $RAD_3$, where their respective directions of movement diverge. The extractor frames EF continue their movement to the buffer storage 1039 and the mail frames F continue their movement to the shuttle 1042 and are redeployed as necessary. If desired or needed, an additional discharge path 1043 can be utilized.

FIG. 10K illustrates the bi-directional extractor arrangement operating in a reverse mode, with respect to FIG. 10J, thereby eliminating a need to recirculate extractor frames. More specifically, after extractor frames EF accumulate in the buffer storage 1039 during processing in the direction shown in FIG. 10J, the apparatus can be reversed, so that the extractor frames travel from left to right, as shown in FIG. 10K, accumulating in buffer storage 1038. The shuttle 1044 carrying mail-loaded frames M/F is docked at the indicated docking port, where the frames F are unloaded and decompressed as they are then driven toward $Merge_4$.

As the mail-loaded frames are transported to $Merge_4$, the mail pieces are extracted, as shown, and the empty frames F and extractor frames EF continue their movement (left-to-right in FIG. 10K), they reach $RAD_4$, where their respective directions of movement diverge. The extractor frames EF continue their movement to the buffer storage 1038 and the mail frames F continue their movement to the shuttle 1045 and are redeployed as necessary.

In summary, regarding the embodiment of FIGS. 10J, 10K, the extractor frames alternately move right-to-left to extract mail pieces from frames of one shuttle and then left-to-right to extract mail pieces from frames of the next shuttle. In such a bidirectional configuration, overall throughput is improved and there is no need to recirculate extractor frames to the beginning.

Figure 10L:
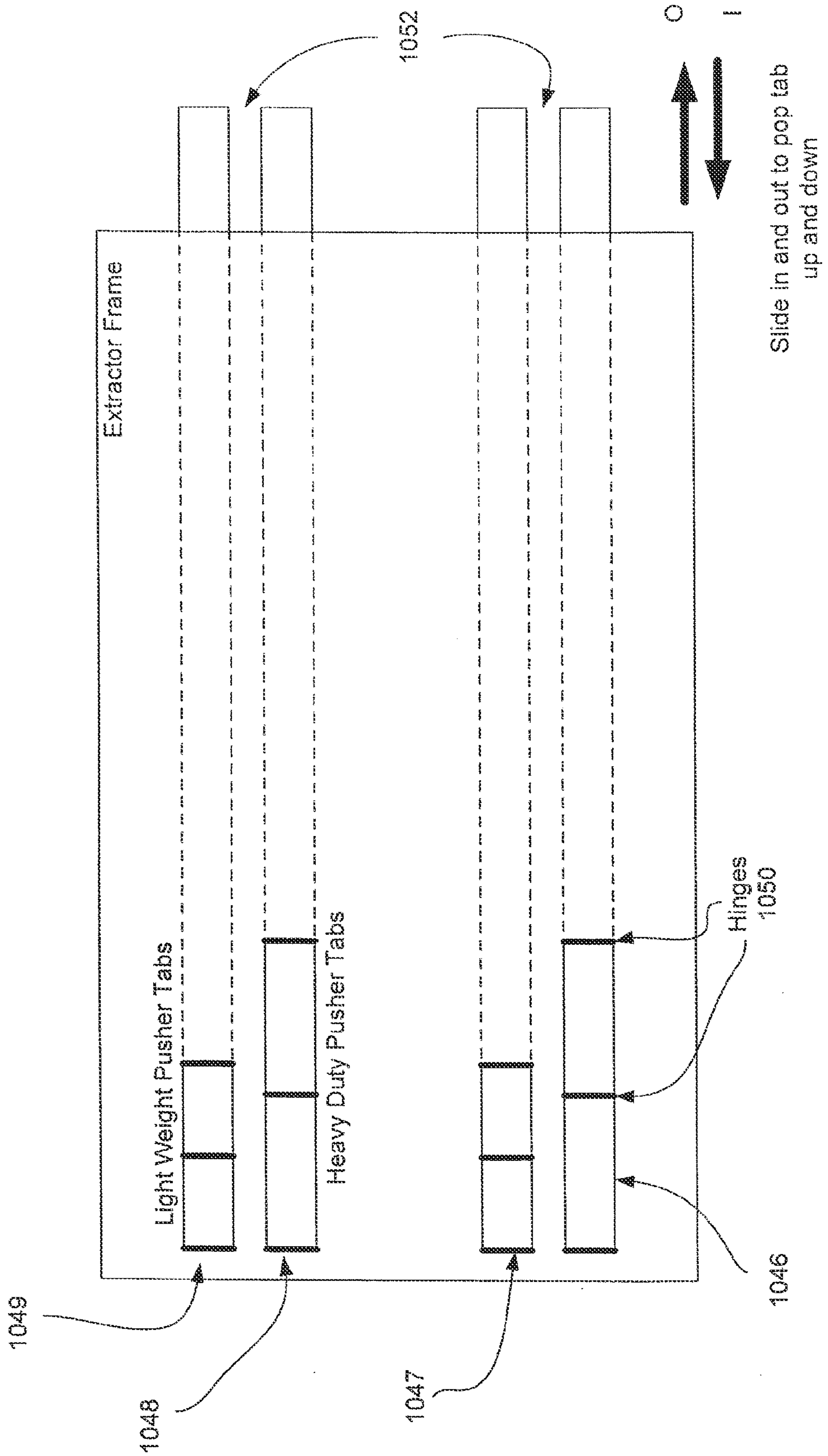
FIG. 10L illustrates a side view of an extractor frame having pop-up pusher tabs for engaging a mail piece within a mail frame for extracting the mail piece from the frame in accordance with aspects of the invention.
Figure 10M:
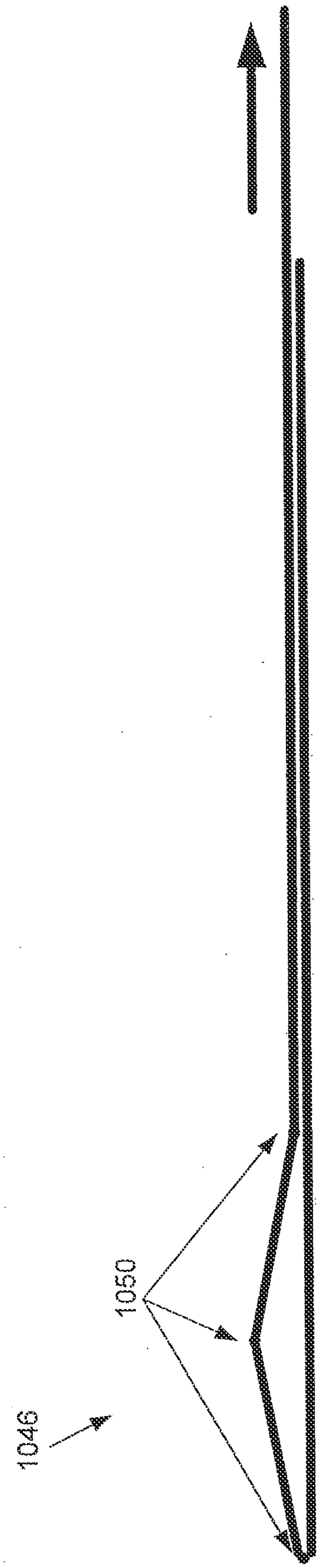
FIGS. 10Ma and 10Mb are bottom views of FIG. 10L, showing the pusher tabs in two different operable positions in accordance with aspects of the invention.
Figure 10M:
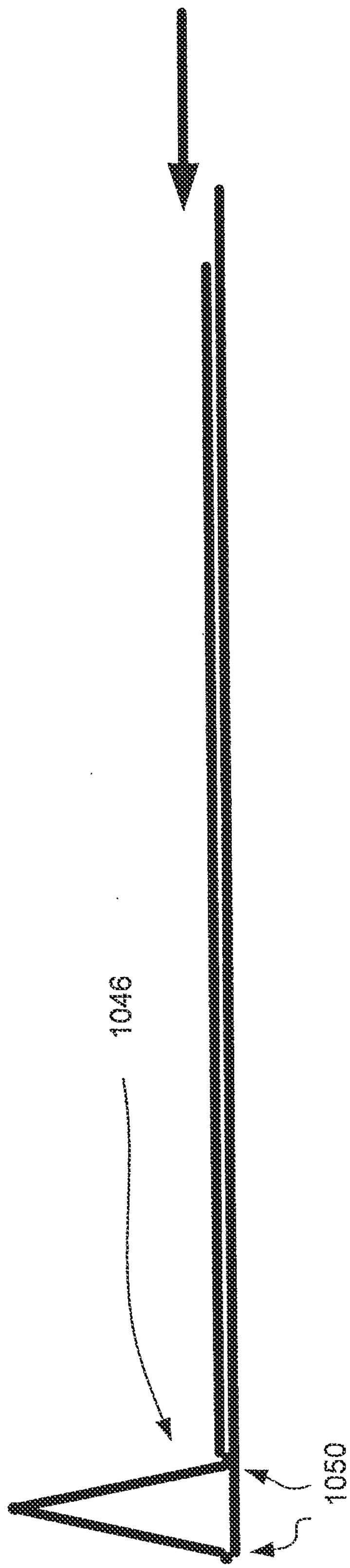

During the extraction of a mail piece from its respective mail frame F in the aforementioned methods and apparatus, the extractor frames EF must slide within the frame F, engage the mail piece, and push the mail piece out. FIGS. 10L, 10Ma, 10Mb, and 10N illustrate one arrangement for accomplishing such an extraction of mail.

More specifically, the extractor frame EF, shown in a side view in FIG. 10L, includes "pop-up" pusher tabs 1046-1049. Because the invention encompasses the possibility of using two types of mail frames, i.e., a heavy-duty frame and a light-weight frame, the extractor frame EF shown in FIGS. 10L, 10M include two sets of pusher tabs for effecting mail piece extraction from either of the two types of mail frames. More specifically, FIG. 10L shows two sets of pusher tabs, viz., tabs 1046, 1047 and tabs 1048, 1049 positioned at different heights. The higher set, e.g., could be used for extracting flats and the lower set, e.g., could be used for extracting letters. Other variations are also possible.

Figure 10N:
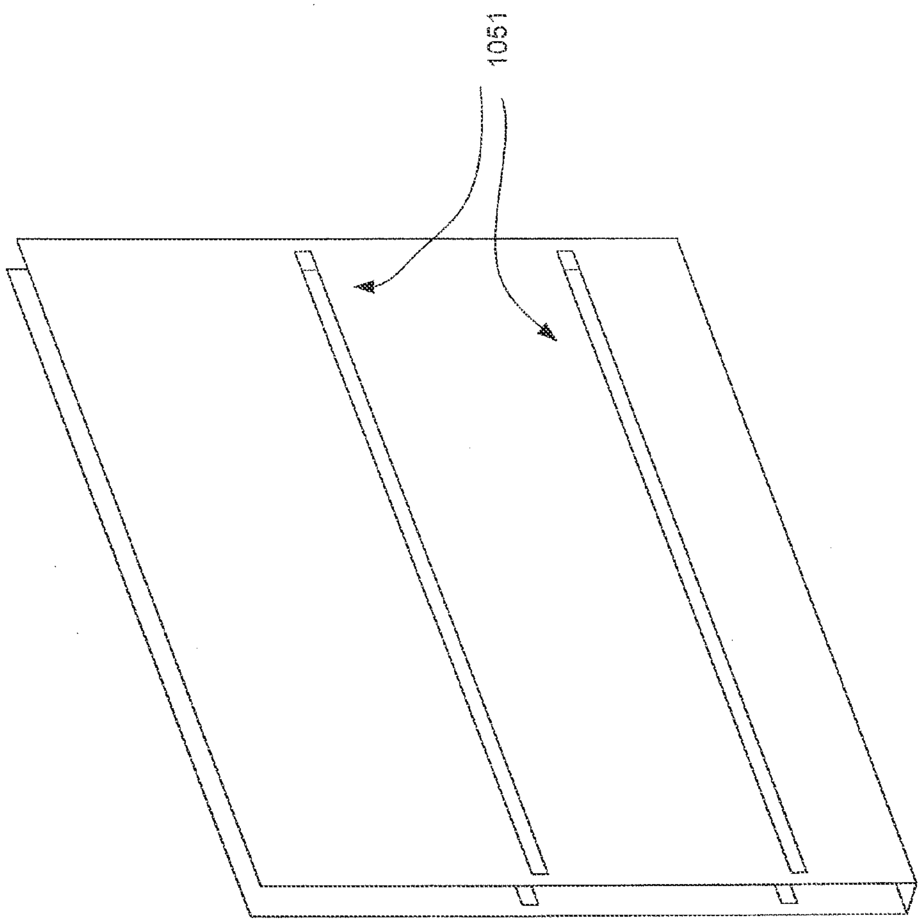
FIG. 10Na shows a perspective view and FIG. 10Nb shows a side view of the mail frame constructed with slots 1051 for use with the extractor frame shown in FIGS. 10L, 10Ma and 10Mb.
Figure 10N:
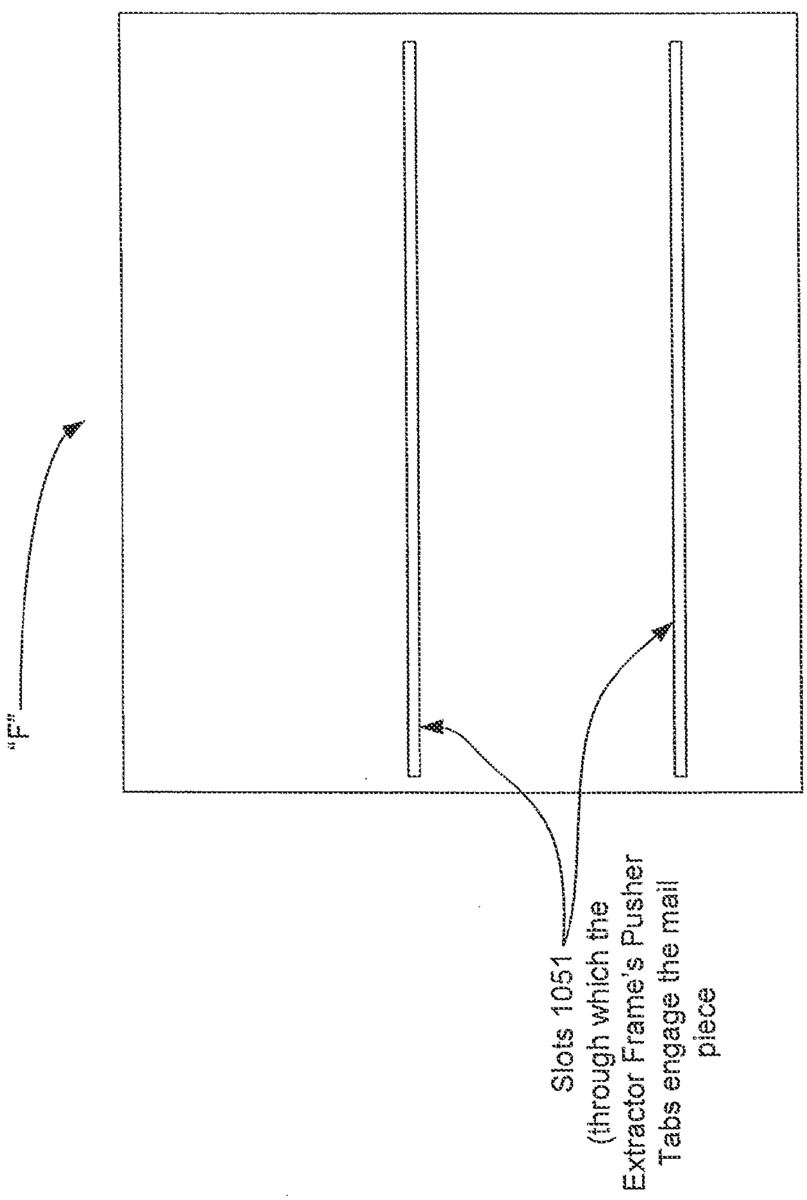

FIG. 10Na shows a perspective view of a mail frame constructed with slots 1051 for use with the extractor frame shown in FIGS. 10L, 10Ma and 10Mb. FIG. 10Nb shows a side view of the mail frame constructed with slots 1051 for use with the extractor frame shown in FIGS. 10L, 10Ma and 10Mb.

The pop-up pusher tabs have two positions. In one position, shown in the upper view of FIG. 10Ma, they lay flat to the extraction frame, allowing the extraction frame to be very thin. In the second position, shown in the lower view of FIG. 10Mb, the pusher tabs pop up. As the extractor frame EF slides along the mail frame F, the pusher tabs 1046, 1047 are caused to pop up, by appropriate manipulation of the ends of the slides 1052, when aligned with the slots 1051 of the mail frame, to engage the mail piece and push it out of the frame. As can be seen from FIG. 10Ma, when the slides 1052 are pulled outward in the direction O, the tabs lie flat. When the slides are pushed inward in the direction I, the tabs pop up, as the various sections pivot at hinges 1050, facilitating engagement with the mail piece within the frame.

Figure 10O:
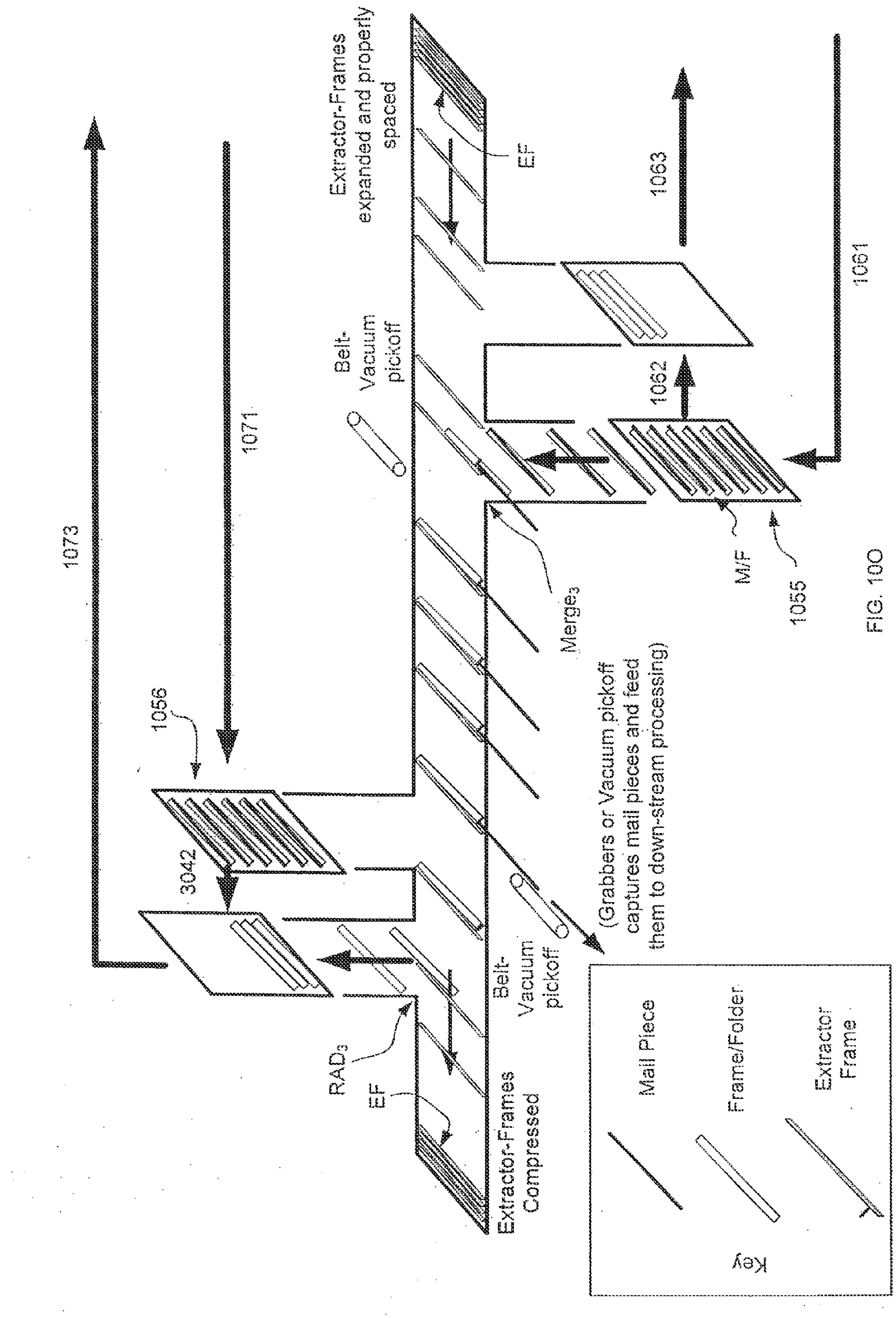
FIG. 10O schematically illustrates a bi-directional mail piece extraction apparatus, such as that shown in FIGS. 10J and 10K, more particularly with regard to shuttle traffic in accordance with aspects of the invention.

In the bi-directional extractor arrangement, such as that described above with reference to FIGS. 10J and 10K, movement of the shuttles, i.e., shuttle traffic, would occur in the following pattern. With reference to FIG. 10O, a shuttle 1055 containing frames with mail pieces docks and unloads its frames in the manner described above in connection with FIG. 10J. The mail pieces M are extracted from the frames F, as the mail-loaded frames are merged at $MERGE_3$ with the extractor frames EF. After the shuttle 1055 is emptied and the extraction process is completed, the shuttle 1055 subsequently receives emptied frames F in the next extraction process, as illustrated in FIG. 10K. In this regard, during the next extraction process in this bi-directional extractor arrangement, the shuttle 1056 (containing frames F, each with a mail piece M) docks and unloads its frames as does the shuttle 1044 in FIG. 10K. Extraction of mail is accomplished as described above in connection with FIG. 10K.

A particular advantage in the arrangement described above in connection with FIG. 10O is that each shuttle 1055, 1056 can perform two functions, namely, (1) delivering frames F containing mail pieces M, and (2) subsequently receiving empty frames F.

The shuttles 1055, 1056 can perform both functions while docked at the same docking station. Alternatively, after delivering its frames containing mail pieces, each of the shuttles can move to an adjacent docking station (i.e., to the right for shuttle 1055, such as to docking station 1041 of FIG. 10J, and to the left for shuttle 1056, such as to docking station 1043 of FIG. 10J), and then receive empty frames F. This configuration (with two adjacent docking stations on each side of the bi-directional transport path of the extractor frames) is advantageous in that it allows a shuttle at one of the adjacent docking stations to finish receiving empty frames and undocking as another shuttle begins delivering frames containing mail pieces at the other adjacent docking station. Because simultaneous receiving and delivering of frames can occur, the overall frame throughput is increased. In FIG. 10O, arrows 1061, 1062, 1063 show exemplary movement of the shuttle 1055 and arrows 1071, 1072, 1073 show exemplary movement of the shuttle 1056. Arrows 1063 and 1073 depict the movement of the shuttles 1055, 1056, respectively, each containing empty frames F, as they are transported for insertion of new mail pieces and redeployment in the automated mail processing system.

Mail Frames

The present invention relates to individualized frames for mail pieces, such as letters and flats, for use in moving such mail pieces in a facility-wide mail processing system. Such frames are herein referred to as a "frame," a "folder," or a "frame/folder." Each frame is constructed for the purpose of containing a single mail piece as the mail piece is sorted and sequenced with other such containerized mail pieces, or as they are stored for subsequent processing. Each mail piece is placed/inserted into a frame when inducted into the system, and removed/extracted from its frame during preparation for dispatch.

It is beneficial to be able to singulate, divert, sort, and sequence mail in the same format orientation that the mail is conveyed. Without this capability, the orientation of the mail may need to be changed or the mail piece stack may need to be "opened up" to perform mail operations. Since mail comes in all shapes and sizes, a reliable way to handle mail in a stack is to temporarily attach or encase each mail piece (e.g., letter, flat or parcel) to a frame to maintain singulation and facilitate the conveying and sorting of mail in a stack. This frame could be an individual mail piece container that follows the mail piece around through many processes (possibly even through transportation) or an individual clamp or clasp (as discussed in another section herein). The handling mail packaged in separate frames in a stack has the following advantages.

- Every packaged mail piece has the same dimensions, e.g., the same form factor, regardless of the size of mail. The form factor is also optimized to ensure that mail of many sizes can be efficiently stored therein. Therefore, the frame provides the sortation/conveying equipment the same form factor thus preventing jams and providing other advantages as discussed herein.
- Mail pieces can be conveyed in a stack (less speed and greater throughput with fewer jams).
- Mail pieces can be sorted, filtered, and diverted efficiently, e.g., allows control of one mail piece in a stack.
- The frames maintain mail piece singulation, position and identification and provides protection for the mail pieces.

Within a given system, frames of different types can be utilized to accommodate letters and flats, e.g., which can vary in size and shape. However, the frames within a system have a standard shape-factor, which makes automated handling easier; although different shapes are also contemplated by the present as discussed in the instant application. A frame can be considered as a file folder. Its use as containerizing mail pieces prevents jams, eliminates mail damage, and maintains a reduced sorting speed vis-à-vis conventional systems which transport mail pieces along their lengths. According to a particular embodiment, frames can be vacuum-packed to detect/contain/minimize biohazards. Each frame has a unique identifier, i.e., an ID, such as a bar code, that is physically located on the frame.

To these and other ends, the invention relates to a mail piece frame adapted to maintain a single mail piece in a mail processing system, the frame including (1) a frame portion that includes at least a pair of portions adapted to be engaged by a driving mechanism, e.g., lead screws, belts, etc. for transporting a plurality of successive frames within the mail processing system, and (2) a folder portion having at least one portion movably connected to the frame portion, the folder portion having at least a portion movable relative to the frame between a first position for facilitating selective insertion and extraction of a single mail piece within the container, and a second position, wherein the folder portion is empty of any mail piece.

According to a particular aspect, the engageable portions of the frame are positioned to orient the frame during travel within the mail processing system other than in a direction along the length of the frame. In this manner, a stack of successive containers occupies a minimal length along the travel direction relative to known systems. More particularly according to that aspect of the invention, the aforementioned orientation of the frame is an angle of 45° with respect to the direction of travel.

According to various embodiments according to the invention, in the first position of the folder, insertion and extraction of the mail piece is facilitated. In the second position of the folder, no mail piece is contained in the folder and the folder has a minimized width.

According to another aspect of a mail container according to the invention, the frame is rigid and the movable portion of the folder is movable away from the rigid frame to the first position. According to a further aspect of a mail container according to the invention, the frame is generally rectangular and the folder is generally rectangular. In a particular embodiment, the movable portion of the folder portion is pivotable away from the rigid frame to contain a mail piece at a common connection between the frame and the folder.

According to another aspect, the frame includes at least one actuator tab adapted to be manipulated by a mechanism for moving the folder to the first position. According to a particular embodiment, the movable portion of the folder is slidable relative to the frame, the movable portion of the folder being maintained generally parallel to the frame during movement to the first position. According to another aspect of the invention, at least one opening is maintained between the frame and the folder for insertion and extraction of a mail piece relative to the frame. Such an opening is located at a top and/or at a side of the container.

The individualized frame for each piece of mail (i.e., a letter or a flat), generally referred to herein as a frame (alternatively, as a folder or a frame/folder), can take any of various forms, including those further described herein and depicted in various drawing figures. As described elsewhere herein, the system sorts and sequences such containerized mail pieces, ultimately resulting in the placement of the mail pieces into trays for delivery by a postal carrier.

As described elsewhere herein, each mail piece is inserted into a frame. The process of inserting a mail piece into a frame is called "insertion".

In a particular embodiment, in which the frame has a generally rectangular shape, the frame is conveyed via four lead screws, one positioned at each of the corners of the rectangle, as shown elsewhere herein. The lead screws turn synchronously to move the frames through the system. As mentioned above, successive frames are oriented at 45° to the direction of travel. Due to this stack orientation, the spacing between frames (center to center) can be very small. Therefore, high mail piece throughput can be achieved at low transport speeds, particularly relative to known mail transport systems, whereby the mail pieces are conveyed by pinch belts along their lengths, rather than at 45°. Although the invention encompasses transporting the frames at angles other than 45°, advantages are realized within the system, as explained elsewhere herein, with that angle.

As the thickness of the frame increases, or as spacing between frames increases, the transport speed can also be increased in order to achieve constant throughput. Furthermore, increased frame thickness requires an increased storage space. For these reasons, the thickness of individual frames should be as thin as possible.

Further, the invention encompasses a system containing multiple, e.g., millions, of frames. Therefore, in order to minimize the cost and weight of the system, the cost and weight of individual frames should be minimized. The physical dimensions of mail pieces handled by a system according to the invention can vary widely. Exemplary ranges of dimensions for letters and flats are the following:

| | Type | Height (inches) | Length (inches) | Width (inches) | Weight |
|---|---|---|---|---|---|
| Maximum | Letter | 6.125 | 11.5 | 0.25 | 3.5 oz. |
| dimensions | Flat | 12 | 15.75 | 1.25 | 6 lbs. |
| Minimum | Letter | 3.5 | 5 | 0.007 | N/A |
| dimensions | Flat | 4 | 4 | 0.007 | N/A |

Because of this wide dimensional range of mail pieces, the system can be implemented with the simultaneous use of multiple frame designs or structures, i.e., non-identical frames. For example, the system can use frames of both a "heavy-duty" design as well as frames of a "light-weight" design. In such a scheme, all letters and some thin light flats can be transported/processed in light-weight frames, and the remaining heavy, thick flats can be transported/processed in heavy-duty frames. In addition to mail pieces, the invention encompasses the transportation and processing of other articles, such as, but not limited to, sheets of paper, metal, wood, plastics, etc., as well as CD's, DVD's, and/or their jewel cases, books, photographs, etc.

The simultaneous use of multiple frame designs has a number of advantages. For example, a heavy-duty design can be more robust, to handle the relatively larger flats. A light-weight frame could be employed only to carry small mail pieces and, therefore, it can be constructed thinner and less expensively than the heavier frame design, while still reliably performing its intended function. The relatively thin and inexpensive light-weight frame offsets the more robust and expensive heavy-duty frame, such that the average cost, size, and weight of the frames can be reduced and within limits specified by the user.

The thickness of an empty frame, i.e., one carrying no mail piece, and the distance between immediately successive threads, i.e., adjacent threads, on the lead screws can be sized such that empty frames can occupy successive threads with no gap. The thickness (e.g., front to back) of a frame containing a mail piece can be greater than that of an empty frame. According to particular embodiments, described in greater detail below, such increase in thickness can be manifested on only one side of the frame, rather than on both sides. Therefore, such increased thickness can thereby only require one successive empty thread, e.g., on the side to which the thickness expands, rather that requiring a successive empty thread on both sides of the frame.

Many alternative configurations and embodiments for the system are described herein. This includes various configurations for both insertion and extraction. In some configurations, mail pieces are inserted into the frames from the side. In other configurations, they are inserted from above. Similarly, in some configurations mail pieces are extracted from the frame from the side. In other configurations, they are extracted from the folder through the bottom.

The term "frame," as generally used herein, can be considered an abbreviated version of the term "frame/folder," the latter term implying a two-part construction that includes both a "frame" part and a "folder" part. In this context, the frame part gives the frame/folder its structural rigidity and engages the lead screws. The folder part can be generally regarded as that part of the frame/folder that captures and carries the mail piece, albeit, in certain embodiments, in conjunction with the frame part. Generally, the frame of a frame/folder is the more rigid of the two parts and the folder of a frame/folder can be generally regarded as the movable part of the two parts, such movement facilitating insertion and extraction of a mail piece with respect to the frame/folder. Movement of the folder part can be manifested as any of various forms of movement, such as pivoting movement in the form of a hinged connection, pivoting in the form of a parallelogram linkage connection, and movement by virtue of movable components within the folder. Still further, movement of the folder can be manifested by merely the deformability of the material of which the folder is composed.

All frames within a system use a similar design, or shape. In some embodiments, described in greater detail below, the frame is rectangular with tabs extending horizontally from each of four corners. A pin extends vertically from one or each of two top tabs. These pins facilitate the diverting and merging of the frames while engaged with the lead screws. The top and bottom of the frame can be knife-edged (or has a rectangular edge) in order to ensure positive engagement with the lead screws. It is contemplated that such edges might incur frictional wear due to their movement on the lead screws. Therefore, the edges can be made to be easily removable and replaceable, such that as wear occurs the edges can be replaced, rather than disposing of the entire frame.

A frame, according to particular embodiments according to the invention is approximately ⅛" thick (0.125 in.; 3.18 mm) A rectangle is cut out of the center of the frame, such that the material remaining on all four sides of the cutout is approximately 0.5-1.0 in. (12.7-25.4 mm) in width. This cutout reduces the overall weight of the frame; although other dimensions and sizes, etc. are contemplated by the present invention. It also allows the mail piece to nest inside the frame, such that the overall thickness is minimized. In some designs, the folder part also nests inside the frame part, thus further reducing the overall thickness. As an alternative to creating the frame by cutting out a rectangular center, the four sides can be constructed by welding or otherwise connecting them together at the four joints.

To ensure that the frame/folder expands in only one direction, many of the designs incorporate a piece of thin, inflexible material, attached to one side of the frame and covering the entire area of the cutout. This thin, inflexible material is referred to as a backer. In the following description, reference is made to exemplary embodiments of frames, folders, and frame/folder combinations illustrated in the various drawing figures.

FIGS. 11Aa-11Ad show an accordion type of frame, having a frame part 11001 and a folder part 11002. FIG. 11Aa shows the frame in perspective; FIG. 11Ab shows the frame in side view, in an open state; and FIGS. 11Ac and 11Ad show, in top views, the frame in a closed state and in an open state, respectively. The perspective view of FIG. 11Aa shows a pleated or accordion hinge side 11003 of the folder part and an opposite side 11004, which can be used for insertion or extraction of a mail piece, which can be made of a lightweight material, such as aluminum or cardboard, for example. This construction aids in insertion and extraction of a mail piece, whereby the folder part 11002 ensures that each mail piece is justified and does not protrude outside the folder part and into the frame part on the far side of the folder/frame. This construction also allows the folder to collapse to the ⅛-inch dimensional requirement, when empty and/or closed, as depicted in FIG. 11Ac.

FIGS. 11Ba-11Bf show various views of a frame/folder according to certain aspects of the invention. In various alternative embodiments, the frame/folder design in these views accommodates mail piece insertion and extraction in any direction. In one embodiment, the frame/folder includes a rectangular frame 11005 and a sub-frame, or folder, 11006. FIG. 11Bd shows the sub-frame 11006 removed from any attachment to the frame, and FIG. 11Ba shows a front view of the frame/folder, with the sub-frame 11006 assembled onto the frame 11005. The sub-frame of the frame/folder could be completely removed during insertion and/or extraction of mail pieces. Alternatively, the top of the sub-frame could be disconnected and opened, while the bottom remains fixed to the frame. In another alternative, the bottom of the sub-frame could be disconnected and opened, while the top remains fixed to the frame. In yet another alternative, both the top and bottom could remain fixed to the frame, but due to the flexibility of the spring steel, the sides could be opened. All of these options are made possible by the configuration of the spring-steel closure tabs on the sub-frame, such as upper closure tabs 11007 and lower closure tabs 11008, and their associated closure slots on the frame, such as upper closure slots 11009 and lower closure slots 11010 (as discussed below).

The frame 11005 is rectangular, or generally rectangular, with tabs extending horizontally from all four corners, such as tabs 11011 and 11012. A pin 11013 depends vertically from each of the top tabs 11011. These pins facilitate the diverting and merging of the frame/folders while being transported via the lead screws. The top 11014 and bottom 11015 of the frame 11005 are knife-edged (or have rectangular edges) for ensuring positive engagement with the lead screws. These edges might incur frictional wear due to their movement on the lead screws. Therefore, one option is to make the top and bottom edges 11014, 11015 easily removable and replaceable, such that as wear occurs the edges can be replaced, rather than disposing of the entire frame/folder.

The frame 11005 has a thickness of approximately ⅛ inch (0.125 in.; 3.18 mm); although other dimensions are contemplated by the invention. The frame can be made by cutting out the center of the frame, such that the material remaining on all four sides of the cutout has a width of approximately 0.5-1.0 inch (12.7-25.4 mm); although other dimensions are contemplated by the invention. The cutout reduces the overall weight of the frame/folder. It also allows the mail piece to "nest" inside the frame, within the thickness of the aforementioned material, such that the overall thickness of the frame/folder, while carrying a mail piece, is minimized. In this design, the edges of the sub-frame do not nest within the frame. Rather the edges are positioned flush against the frame and, therefore, they add to the overall thickness.

To ensure that the frame/folder expands in only one direction, by virtue of movement of the sub-frame (i.e., movement of the folder part of the frame/folder), the frame 11005 of this embodiment incorporates a piece of thin inflexible material 11016, attached to one side of the frame, which covers the entire area of the cutout. This thin, inflexible material 11016 is referred to as a backer. In a particular embodiment, the sub-frame 11006 (see FIG. 11Bd, e.g.) is made of a thin, generally rectangular piece of spring steel. Actuation tabs, such as tabs 11017, protrude from the sub-frame 11006. They facilitate the opening and closing of the frame/folder. The sub-frame 11006 also has four closure tabs, i.e., upper tabs 11007 and lower tabs 11008, which extend vertically from each corner of the sub-frame. The frame 11005 has four closure slots, i.e., upper closure slots 11009 (see FIG. 11Be) and lower closure slots 11010 (see FIG. 11Bc), i.e., one in each of the horizontal tabs. As shown in FIGS. 11Ba, 11Bb, and 11Bf, the closure tabs 11007, 11008 of the sub-frame are inserted and captured in the closure slots 11009, 11010 of the frame 11005. When a mail piece is contained within the frame/folder and the frame/folder is being processed through the system, all four closure tabs of the sub-frame are captured within their respective closure slots of the frame.

The frame/folder can be opened for mail piece insertion in at least three possible ways. In one embodiment, the actuation tabs 11017 on the sub-frame 11006 are caused to be moved away from the frame 11005 some small distance. The spring steel of the sub-frame flexes, thereby opening a gap for side insertion of the mail piece. All four closure tabs remain in their respective closure slots. Alternatively, this actuation may also be configured to open a gap at the top, allowing for top insertion of the mail piece.

In another embodiment, the top two closure tabs 11007 are caused to slide out of, and completely disengage from, their respective closure slots 11009. This allows top or side insertion of the mail piece. After mail piece insertion, the closure tabs are caused to be re-inserted into their respective closure slots.

In a further embodiment, all four closure tabs 11007, 11008 are caused to slide out of, and completely disengage from, their respective closure slots 11009, 11010. The frame 11005 and the sub-frame 11006 are thus completely disconnected and handled separately during the insertion process. This allows for insertion of the mail piece from any direction. After the mail piece is inserted, the closure tabs are re-inserted into their respective closure slots.

The frame/folder can be opened for mail piece extraction in three possible ways. In one embodiment, the actuation tabs 11017 on the sub-frame 11006 are moved away from the frame 11005 some small distance. The spring steel of the sub-frame flexes, opening a gap for side extraction of the mail piece. All four closure tabs 11007, 11008 remain in their respective closure slots 11009, 11010.

In another embodiment, the bottom two closure tabs 11008 are caused to slide out of, and completely disengage from, the closure slots 11010. This allows bottom extraction of the mail piece. After mail piece extraction, the closure tabs are re-inserted into their respective closure slots.

In a further embodiment, all four closure tabs are caused to slide out of, and completely disengage from, the closure slots. The frame and the sub-frame are thus completely disconnected and handled separately during the extraction process. This allows for extraction of the mail piece from any direction. After the mail piece is extracted, the closure tabs are re-inserted into their respective closure slots.

With reference to FIGS. 11Ba-11Bf, the frame/folder design accommodates top or side insertion and side extraction of mail pieces. The frame 11005 is rectangular with tabs 11012 projecting horizontally from all four corners. A pin 11013 projects vertically downward from each of the two top tabs 11011. These pins facilitate the diverting and merging of frame/folders while being driven by lead screws. The top 11014 and bottom 11015 of the frame is knife-edged (or has a rectangular edge) to ensure positive engagement with the lead screws. Because these edges might incur frictional wear due to their movement on the lead screws, the edges can be made easily removable and replaceable, such that, as wear occurs, the edges can be replaced, rather than disposing of the entire frame/folder.

FIGS. 11Ca-11Cd show an alternative frame/folder in accordance with aspects of the invention. FIG. 11Ca depicts a front view of the frame/folder and FIG. 11Cb depicts a rear view. This frame/folder shares certain attributes with other designs. For example, with reference to FIG. 11Cb, it includes a rectangular frame 11025, with horizontal tabs 11027, 11028 and a large center cutout area. Similar to other designs, the sub-frame 11026, or folder, has a thin flexible membrane 11031, which allows for expansion to accommodate the mail piece. The membrane 11031 of the sub-frame is connected to the frame 11025 on all sides. The frame 11025 also has a thin backer 11032. The backer could be made of a flexible material to allow for smooth bending for opening of the frame/folder, creating the bottom shelf 11039 as part of the whole of 11031, 11032, and 11039. The backer is fixed to the frame 11025 on all four frame pieces. Alternatively, the backer 11032 could be made of an inflexible material to prevent protrusion into the negative direction by an included mail piece. A bottom shelf 11039 could be made of a similar or different inflexible and rigid material such as to support an included mail piece.

The thickness of the frame 11025 is approximately ⅛ inch (0.125 in.; 3.18 mm); although other dimensions are contemplated by the invention. A rectangle is cut out of the center of the frame 11025, such that the material remaining on all four sides of the cutout has a width of approximately 0.5-1.0 inch (12.7-25.4 mm); although other dimensions are contemplated by the invention. The cutout reduces the overall weight of the frame/folder. It also allows the mail piece to nest inside the frame, such that the overall thickness is minimized. In this design, the sub-frame nests in the frame. Therefore, it does not add to the overall thickness. The left and right vertical members 11033, 11034 of the frame 11025 have two thinned areas. These areas, in a particular embodiment, can be thinned to approximately 1/16 inch. They are positioned where the actuation tabs 11035-11038 of the sub-frame 11026 (discussed below) lay across the frame 11025 when the frame/folder is closed. The actuation tabs can also have a thickness of approximately 1/16 inch. Therefore, the actuation tabs can nest in the thinned areas, and the resulting thickness of the tabs upon the vertical members is about ⅛ inch. Alternatively, the tabs may not be a necessary attribute as the opening operation of the folder may be accomplished via a vacuum or suction cup gripping the folder's flat and smooth surface of 11031 or 11026 and moving in an opposite and upward direction.

For ensuring that the frame/folder expands in only one direction, this design incorporates a piece of thin, inflexible material 11032, attached to one side of the frame 11025, which covers the entire area of the cutout. This thin, inflexible material is referred to as a backer of the frame.

The folder can include a rigid rectangular sub-frame 11026 and a flexible membrane 11031. The flexible membrane can flex to allow expansion to accommodate the thickness of a mail piece being inserted. The flexible membrane 11031 can be transparent. This provides the advantage of allowing an optical determination of the presence of a mail piece within a frame/folder. Actuation tabs 11035, 11036, 11037, 11038 protrude from the sub-frame 11026. They facilitate the opening and closing of the frame/folder. The flexible membrane 11031 can also form the bottom U-shaped pocket 11039 of the folder by extending from the bottom of the sub-frame 11026 to the bottom of the frame 11025 (or the bottom of the backer 11032).

Alternatively, the sub-frame 11026 can be made of a non-flexible material. The sub-frame 11026 is connected to the frame 11025 at all four corners. It is connected at each corner via hinges 11040, 11041. These hinges create a parallelogram linkage to allow for the sub-frame 11026 to extend away from the frame 11025, or to collapse towards the frame, while remaining generally parallel to the frame. See, e.g., the perspective view of FIG. 11Cc and the side view of FIG. 11Cd, which shows the sub-frame positioned parallel to the frame, relative movement of which being controlled by manipulation of the actuation tabs of the sub-frame. This movement allows the opening of the frame/folder for mail piece insertion and extraction.

In an alternative embodiment of a frame/folder according to the invention, FIG. 11D illustrates a so-called "back door" opening folder. In this embodiment, the backer piece 11248 is attached only at the bottom edge 11247 of the frame 11245 and retains its normal vertical and tight to the frame orientation based on its spring properties. This backer allows spring flex along its vertical length but prevents conformance to include mail piece articles. A thin, conforming membrane 11246 comprises the folder area. This membrane is attached at all four sides of the frame. The folder membrane allows compliance for protrusion of mail piece to be in the positive direction as it is resisted upon by the non-conforming backer. Insertion and extraction may occur via side or top as the backer may be flexed away from the frame based upon its lower mounting and justification.

In a further embodiment, FIGS. 11Ea-11Ec show a frame design with a two-part frame, one being a movable, sliding component 11045 and one being a static component 11046. A mail piece is inserted from the top of the frame and extracted from the bottom. This frame enables an active insertion and semi-passive extraction operation. A feature of this frame design is that once the mail piece is gripped by the two components 11045, 11046, it is does not slide or alter its orientation within the frame due to gravity. When the mail piece is acted upon by gravity, it wants to move down, but because the sliding component 11045 has a rubbery surface 11047, the mail piece will want to pull it down with it. Because the sliding component 11045 is mounted upon slanted sliding guides 11048, the downward pull will also give the sliding component 11045 an additional clamping force to hold the mail piece.

The sliding component 11045 has a metallic frame structure 11049. One side of the structure has a plate with a rubbery surface 11047 mounted thereon to maintain an inserted mail piece in position. Four holes 11050 are drilled at a downward angle through the frame structure and rubbery plate of the sliding component. The placement and angles of the holes correspond to those of the sliding guides 11048 on the static component.

The static component 11046 also has a metallic frame structure. However, it does not contain a rubbery surface like that of the sliding component. Instead, the static component 11046 has four sliding guides 11048 projecting from a surface thereof at an angle. These guides support the sliding component 11045, and allow it to slide between open and closed positions. The static component 11046 has flanges 11052 so that it can travel between a set of four lead screws that lie above and below the frame.

FIG. 11Ec schematically shows, with five successive illustrations, the operation of the frame of this embodiment. The frame begins closed, in the left-most illustration, with the sliding component 11045 resting on the sliding guides 11048 and pressed up against the static component's frame structure 11051. An actuation from a bottom mounted plunger-like device or cam pushes the sliding component 11045 so that it slides upwardly along the sliding guides until the open position is reached and is maintained by the plunger or cam, as depicted in the second illustration from the left. In the open position, a gap 11053 has been created between opposing faces of the two components 11045, 11046. A mail piece M is inserted from above into the gap 11053, as shown in the center illustration of FIG. 11Ec, and removal of the plunger or cam allows the sliding component 11045 to a position forcing the mail piece against the static component 11046, as shown in the next successive illustration. Because the sliding component is mounted on the angled sliding guides 11048, the weight of the sliding component 11045 creates a horizontal force as well, holding the mail piece in place. As gravity pulls on the mail piece, it wants to move downward, but the sliding component has a rubbery or high friction surface so the mail piece wants to drag that down with the mail piece. The angled sliding guides 11048 convert this force into additional clamping force, ensuring that the mail piece does not slide away. Finally, when the mail piece needs to be extracted, another actuation opens the sliding component, as shown in the right-most illustration, and the mail piece m is free to fall out. The weight of the sliding component 11045 causes it slowly slide back into the closed position as the frame is made ready for the insertion of another mail piece.

FIGS. 11Fa-11Fd show an alternative frame/folder design which accommodates top or side insertion and bottom extraction of mail pieces. As further described below, FIG. 11Fa shows the frame/folder in an empty, collapsed position and FIGS. 11Fb, 11Fc and 11Fd show the frame/folder in an open position.

With reference to FIG. 11Fc, the frame 11065 of the frame/folder has a generally rectangular shape with tabs 11067 extending horizontally from all four corners. A pin 11068 extends vertically from each of the two top tabs; although in a contemplated embodiment, the pin can extend upwards from one or more of the corners and more preferably from an upper corner on a trailing edge of travel (which is contemplated by each of the embodiments). These pins facilitate the diverting and merging of frame/folders while in lead screws. The top 11069 and bottom 11070 of the frame 11065 is knife-edged (or has a rectangular edge) to ensure positive engagement with the lead screws. In the event the edges 11069, 11070 incur frictional wear due to their movement on the lead screws, one option is to have the edges easily removable and replaceable, such that as wear occurs the edges can be replaced, rather than disposing of the entire frame/folder.

The frame 11065 has a thickness of approximately ⅛ inch; although other dimensions are contemplated by the invention. The frame can be solid, with no cutout (as in embodiments described above), or it could be cutout with a thin inflexible material (i.e., a backer) positioned over the cutout. In this design, the folder does not nest in the frame. Rather, it is positioned flush against the frame and, therefore, it adds to the overall thickness of the frame/folder. The folder part of the frame/folder takes the form of a rigid rectangular sub-frame 11066 and a bottom ledge 11071.

The sub-frame 11066 is connected to the frame 11065 on the left and right sides, as shown in FIGS. 11Fa-11Fd, by one or more hinged lever-arms 11072. These hinged lever-arms allow the sub-frame 11066 to be extended away from, or to be collapsed toward, the frame 11065. This movement allows the opening of the frame/folder for mail piece insertion. The bottom ledge 11071 is the surface on which the mail piece rests. At its upper edge (in the collapsed position), the bottom ledge 11071 is connected to a slider 11073 and, at its lower edge, it is connected to a bottom support 11074. Both of these connections are made via long hinges 11075, 11076, running the length of the bottom ledge 11071. The bottom support 11074 is also hinged to the frame 11065, via a long hinge 11077, at its lower edge.

The slider 11073 is also fixed to the frame 11065, such that it slides up and down along the frame. As the slider slides up, it pulls the bottom ledge 11071 and the bottom support 11074 toward the frame 11065. This movement opens the bottom of the folder, such that the mail piece can be extracted. As the slider 11073 slides downward, the bottom ledge 11071 and the bottom support 11074 are pushed outward, to close the bottom of the folder. At their fully closed positions, the bottom ledge 11071 is horizontal and the bottom support 11074 is below the bottom ledge at approximately a 45° angle. In this position, the bottom support 11074 supports the bottom ledge 11071 and carries the weight of the mail piece.

In the closed position, the bottom ledge 11074 and the bottom support 11071 push upward on the sub-frame 11066, and keep the sub-frame in its extended position. After the folder has been opened and the mail piece has been extracted, the sub-frame 11066 is allowed to collapse downward, due to gravity. In this empty, collapsed condition, the frame-folder is thinner. Therefore, it takes up less space in storage.

FIGS. 11Ga-11Gc show an alternative frame/folder design which accommodates top or side insertion and side extraction of mail pieces. As further described below, FIG. 11Ga shows the frame/folder in an empty, collapsed position and FIG. 11Gb shows the frame/folder in an open position.

With reference to FIG. 11Gc, the frame 11075 is rectangular with tabs 11077 projecting horizontally from all four corners. A pin depends vertically from each of the two top tabs 11077 (which can be extending upward from a single upper corner). These pins facilitate the diverting and merging of frame/folders while in lead screws. The top 11079 and bottom 11080 of the frame is knife-edged (or has a rectangular edge) to ensure positive engagement with the lead screws. In the event the edges were to incur frictional wear due to their movement on the lead screws, one option is to have the edges easily removable and replaceable, such that as wear occurs the edges can be replaced, rather than disposing of the entire frame/folder.

The frame has a thickness of approximately ⅛ inch; although other dimensions are contemplated by the invention. It could be solid, with no cutout, or it could be cut out with a thin inflexible material (backer) in place of the cutout. In this design, the folder does not nest in the frame. Instead, it is positioned flush against the frame, and therefore adds to the overall thickness.

The folder includes a rigid rectangular sub-frame 11076 and a bottom ledge 11081. The sub-frame 11076 is connected to the frame 11075 at the top two corners via hinged upper lever-arms 11082. These hinged lever-arms allow the sub-frame 11076 to be extended away from, or be collapsed towards, the frame 11075. This movement allows the opening of the frame/folder for mail piece insertion. The bottom ledge 11081 is the surface on which the mail piece rests. The bottom ledge 11081 is connected to the sub-frame 11076 via a long hinge 11083, running along the lower edge of sub-frame. The bottom ledge 11081 is also connected to the frame, via two hinged lower lever-arms 11084.

The configuration of the lower lever-arms 11084 is such that, when the frame-folder is open, i.e., in the position depicted in FIGS. 11Gb and 11Gc, the bottom ledge 11081 is horizontal and at the same level as the bottom lead screws. An advantage of having the bottom ledge at that level allows it to be externally supported during insertion of the mail piece. At the point of insertion, a robust, flat surface could be positioned between the bottom lead screws, such that the bottom ledge 11081 slides across the surface, and is supported by the surface. Therefore, as the mail piece is inserted, the momentum of the mail piece is absorbed by the surface, and does not have to be absorbed by the bottom ledge alone. When the frame-folder does not contain a mail piece, the frame-folder can be folded into its closed position, as depicted in FIG. 11Ga. The hinged lever arms 11082, 11084, allow the sub-frame 11076 and the bottom ledge 11081 to be collapsed upwards, toward the frame 11075. In this empty, collapsed condition, the frame-folder is thinner, and therefore it takes up less space in storage.

FIG. 11H shows an alternative frame/folder design in accordance with aspects of the invention. This frame/folder design accommodates top or side insertion and bottom extraction of mail pieces. The frame 11085 is rectangular with tabs 11087 projecting horizontally from all four corners. A pin may depend vertically from each of the two top tabs (or a single tab), as illustrated and described in prior embodiments. The pins facilitate the diverting and merging of frame/folders while engaged with lead screws. The top and bottom of the frame 11085 is knife-edged (or has a rectangular edge) to ensure positive engagement with the lead screws. In the event these edges were to incur frictional wear due to their movement on the lead screws, one option is to make the edges easily removable and replaceable, such that as wear occurs the edges can be replaced, rather than disposing of the entire frame/folder.

The frame 11085 has a thickness of approximately ⅛ inch (0.125 in; 3.18 mm); although other dimensions are contemplated by the invention. A rectangle is cut out of the center of the frame, such that the material remaining on all four sides of the cutout has a width of approximately 0.5-1.0 inches (approximately 12.7-25.4 mm); although other dimensions are contemplated by the invention. This cutout reduces the overall weight of the frame/folder. It also allows the mail piece to nest inside the frame, such that the overall thickness is minimized. Although it has been noted with many embodiments that a cutout is provided, those of skill in the art should realize that the cutout may also be eliminated. In this design, the edges of the folder do not nest in the frame. Instead, the folder is positioned flush against the frame and, therefore, adds to the overall thickness. Alternatively, the folder could be constructed that it lays within the frame construct when closed and therefore does not add to the overall thickness.

To ensure that the frame/folder expands in only one direction, this design incorporates a piece of thin, inflexible material 11090 (such as spring steel), attached to one side of the frame and covering the entire area of the cutout. This thin, inflexible material is referred to as a backer.

The folder can include a rigid rectangular sub-frame 11086 and a flexible membrane 11091. The flexible membrane can be flexible to allow expansion to accommodate the thickness of the mail piece. The flexible membrane 11091 can be transparent. This would have the advantage of allowing for optical determination of the presence of a mail piece within the frame/folder. Actuation tabs can be provided to protrude from the sub-frame 11086. They would facilitate the opening and closing of the frame/folder. Alternatively, the sub-frame could be made of a non-flexible material.

The sub-frame 11086 is connected to the frame 11085 at the top-left and top-right corners via hinges 11092. In a particular embodiment, two or three hinges are provided at each of the corners, such that the top of the sub-frame can be extended away from, or collapsed toward, the frame. This movement allows the opening of the frame/folder for mail piece insertion. The bottom of the sub-frame 11086 has multiple bottom tabs 11093. The bottom of the frame has a matching number of catches 11094. The bottom tabs 11093 are normally positioned inside the catches 11094, such that the bottom of the frame/folder normally stays closed. For example, the bottom would be closed during insertion and as the frame/folder and mail piece travel throughout the system. At extraction, the bottom tabs are disengaged from the catches, to allow bottom extraction of the mail piece (such as by gravity). This disengagement occurs via lifting of the sub-frame 11086, such that the bottom tabs 11093 are lifted up and out of the catches 11094.

FIG. 11I shows, in a front view, an alternative frame/folder design in accordance with aspects of the invention. This frame/folder design accommodates top or side insertion and side extraction of mail pieces. The frame 11095 is rectangular with tabs 11097 projecting horizontally from all four corners. A pin may depend vertically from each of the two top tabs. The pins facilitate the diverting and merging of frame/folders while engaged in lead screws. The top 11098 and bottom 11099 of the frame is knife-edged (or has a rectangular edge) to ensure positive engagement with the lead screws. In the event the edges were to incur frictional wear due to their movement on the lead screws, one option is to make these edges easily removable and replaceable, such that as wear occurs the edges can be replaced, rather than disposing of the entire frame/folder.

The frame has a thickness of approximately ⅛ inch (0.125 in; 3.18 mm); although other dimensions are contemplated by the invention. A rectangle is cut out of the center of the frame, such that the material remaining on all four sides of the cutout has a width of approximately 0.5-1.0 inch (12.7-25.4 mm); although other dimensions are contemplated by the invention. This cutout reduces the overall weight of the frame/folder. It also allows the mail piece to nest inside the frame, such that the overall thickness is minimized. In this design, the sub-frame nests in the frame. Therefore it does not add to the overall thickness.

On the inside corners of the cutout are four hooks 11100. The folder 11096 has four elastic bands 11101, one on each corner. The folder's elastic bands are wrapped, or looped, around the hooks to couple the folder 11096 to the frame 11095. This elastic mounting is advantageous in that the folder may be vibrated, without the vibration being transferred to the frame 11095. Other elastic constructions are encompassed for connecting the folder 11096 and the frame 11095 together for the same purpose.

The folder 11096 of the frame/folder of the illustrated embodiment is a V-shaped membrane, similar to a standard file cabinet folder. The folder is open along the top and along the sides. Therefore, insertion of mail pieces into the folder can be accomplished through the top or side. The mail piece is then retained in the bottom 11102 of the V-shaped membrane. A series of holes 11103 extend through the bottom region of the folder. They are positioned such that they extend above and below the bottom 11102 of the folder's "V".

In the design of the frame/folder of FIG. 11I, mail pieces can be simultaneously extracted from a batch of frame/folders. Extraction of the mail pieces is accomplished in the following manner. Rods 11104 extend through the holes 11103. More particularly, the rods 11104 are inserted at the bottom of the holes such that the top of the rods are below the bottom of the "V" and, therefore, below the bottoms of the mail pieces within the multiple frame/folders of the batch from which the mail pieces are extracted.

The rods 11103 are then moved slightly upwards, such that they lift the mail pieces out of the bottom of the "V". In that position, the mail pieces rest upon the top of the rods 11104. The rods 11104 are connected to a rotating mechanism, such that the rods are rotated around their longitudinal axes.

All of the rods 11104 rotate in the same direction. This rotation, occurring while the mail pieces are positioned upon the rods, pushes the mail pieces to one side, i.e., in the direction S, to the right in FIG. 11I, and out the side of the folder. In this manner, the mail pieces are extracted from the folder. The rods 11104 can have a circular cross section and extend straight along their lengths (i.e., extend perpendicularly of FIG. 11I). In alternative embodiments, the rods can be differently shaped. For example, they can have a twisted shape along their lengths and/or they can have cam-shaped cross sections, which could impose a jostling action to the mail pieces. In any event, such shapes encompassed by the invention have the purpose of further facilitating the extraction of the mail piece by helping to push the mail piece to the side and out of the folder 11096.

In an alternative embodiment, mechanical vibration of the folder 11096 can be utilized to assist in extracting the mail pieces from the folder. Such vibration would ensure that the mail pieces do not stick or adhere to the folder, if such were found to occur for any of a variety of reasons, such as humidity or the presence of a foreign substance on any of the mail pieces. Vibration could be accomplished in any of a number of ways. For example, the shape of the rotating rods and their associated holes can be such that when the rods rotate, they rub against the side of the holes, creating a vibration in the folder. Alternatively, additional rods, such as rods 11105, can be employed to engage the folder 11096 in a different configuration, with the sole purpose of vibrating the folder. For example, such rods 11105 can be positioned to engage an arm 11106 that projects outside the frame and extends into folder 11096 and through the side of the frame 11095.

FIG. 11J shows an alternative frame/folder design in accordance with aspects of the invention. This frame/folder design accommodates top or side insertion and side extraction of mail pieces.

The frame 11115 of the frame/folder is rectangular with tabs 11117 extending horizontally from all four corners. As in previously described embodiments, a pin may depend vertically from each of the two top tabs or a single tab on a trailing edge of travel. The pin(s) facilitate the diverting and merging of frame/folders while in lead screws. Also as in previously described embodiments, the top and bottom of the frame is knife-edged (or has a rectangular edge) to ensure positive engagement with the lead screws. In the event the edges were to incur frictional wear due to their movement on the lead screws, one option is to make the edges easily removable and replaceable, such that as wear occurs the edges can be replaced, rather than disposing of the entire frame/folder.

The folder 11116 of the frame/folder includes a front membrane 11116*a* and a back membrane 11116*b*. The membranes are connected to each other all along their common bottom edge. They are also connected at both top corners by means of glue or by means of other fasteners. For the purpose of allowing insertion of a mail piece from the top, the membranes are not connected along the majority of the length of the top edge. In addition, they are not connected along at least a side from which a mail piece is to be extracted. They may or may not be connected along the opposite side.

The frame/folder has four actuation tabs 11118, 11119, one at each corner. When the frame/folder is closed, the top actuation tabs 11118 point downwards, and the bottom actuation tabs 11119 point upwards. The actuation tabs are coupled to the frame via "living" hinges 11120. In addition to the front and back membranes being connected to each other along a bottom edge, as mentioned above, the back membrane 11116*b* is connected to the frame 11115. The front membrane 11116*a* is connected to the actuation tabs 11118, 11119, i.e., at both the top and bottom.

The frame/folder is opened via the actuation tabs. More specifically, the actuation tabs 11118, 11119 are caused to flip from their vertical (closed) position to a horizontal (open) position. By moving from the closed to the open position, the actuation tabs cause the front membrane 11116*a* of the folder to be moved away from the back membrane due to the lever-action of the actuation tabs and the living hinges 11120. The front membrane 11116*a* of the folder 11116 has a C-shaped cutout 11121 on one side. Through the C-shaped cutout 11121, a vacuum pick-head engages an exposed portion the mail piece and extracts the mail piece in a direction out the side of the frame/folder. As explained elsewhere herein, such extraction can be accomplished by means of movement of the vacuum head itself or by the movement of the frame-folder by means of the lead screws while the vacuum head remains stationary but maintains the mail piece with vacuum engagement.

In an alternative embodiment, the C-shaped cutout continues through the back membrane 11116*b* and the frame, rather than merely through the front membrane 11116*a*. In this manner, a plurality of frame/folders can travel by a stationary vacuum pick-head, with the pick-head passing through the C-shaped cutouts.

Figure 11K:
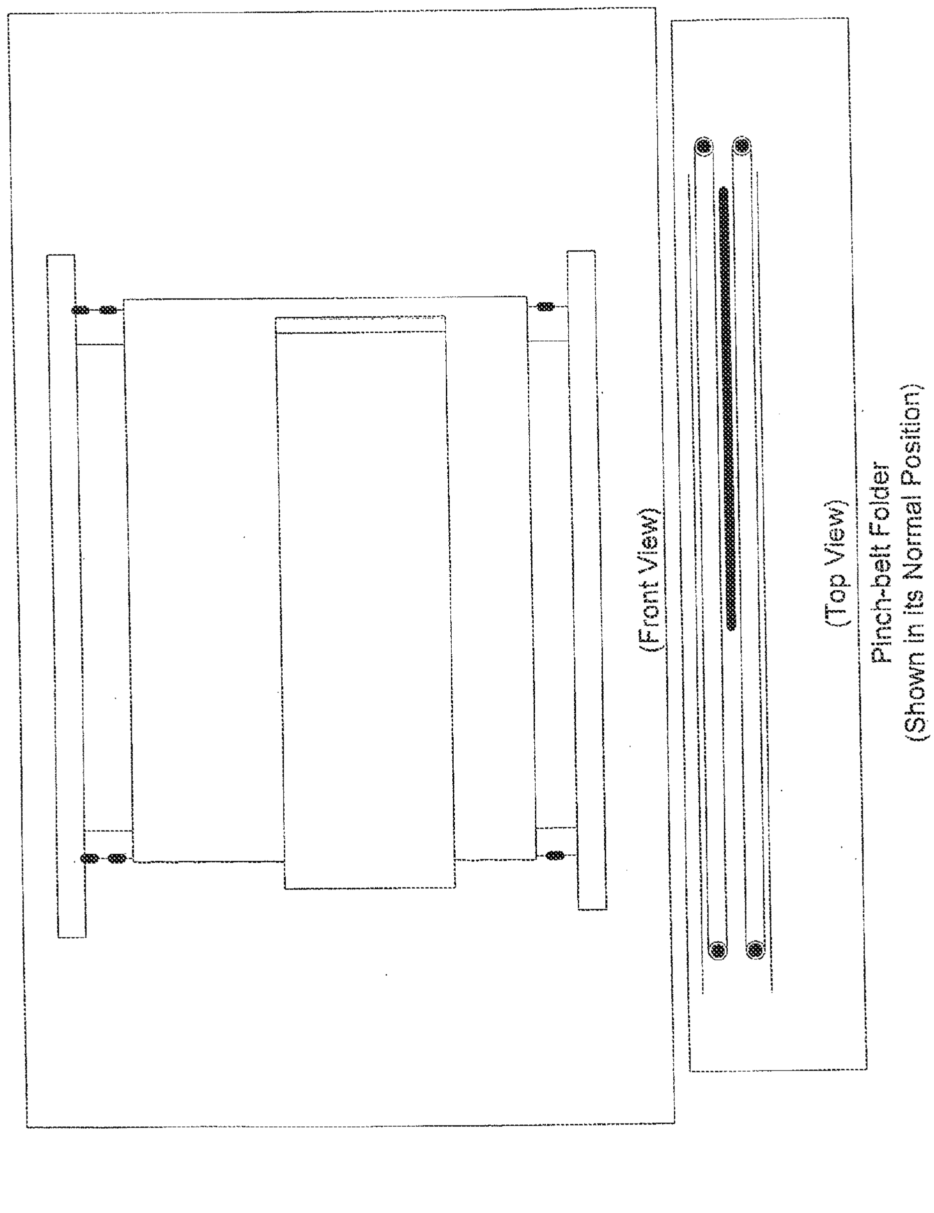
FIGS. 11Ka-11Kd show an alternative frame design in accordance with aspects of the invention.
Figure 11K:
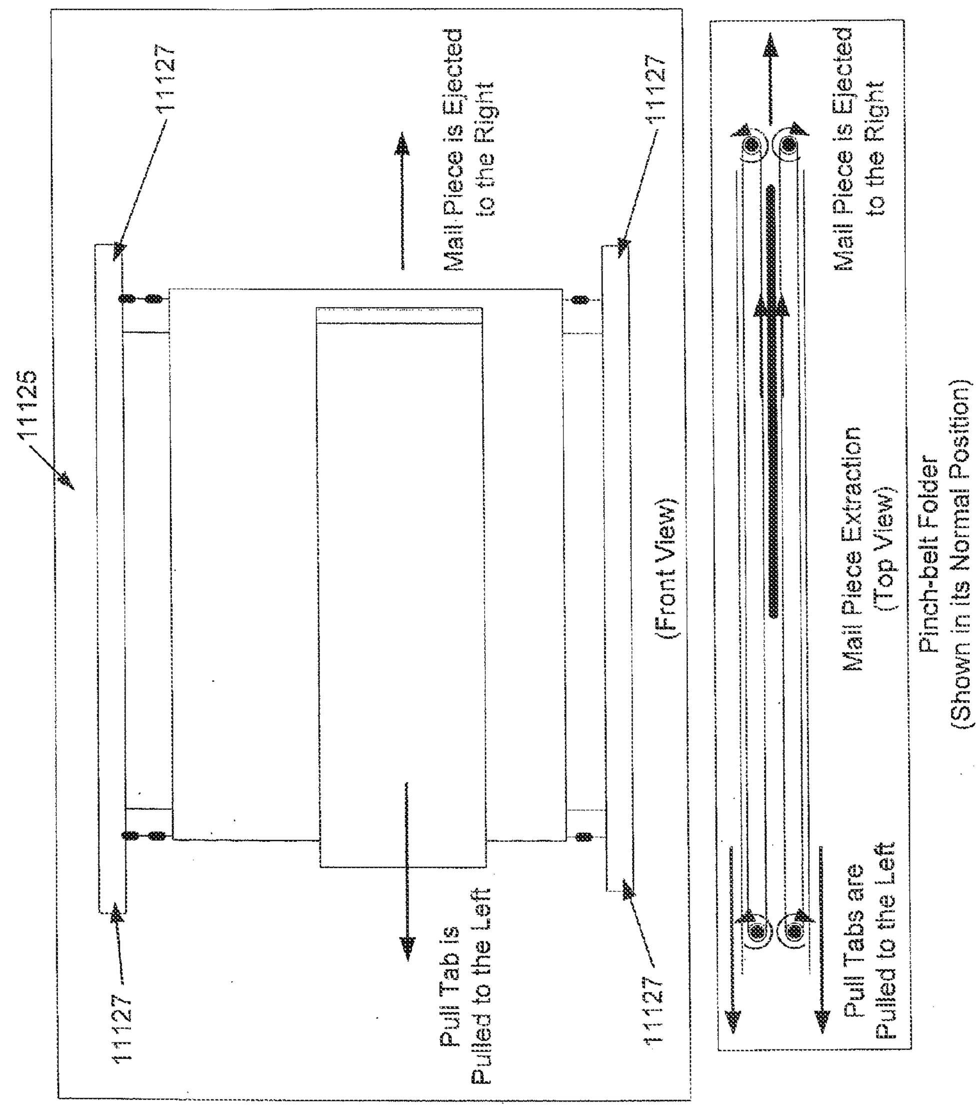
Figure 11K:
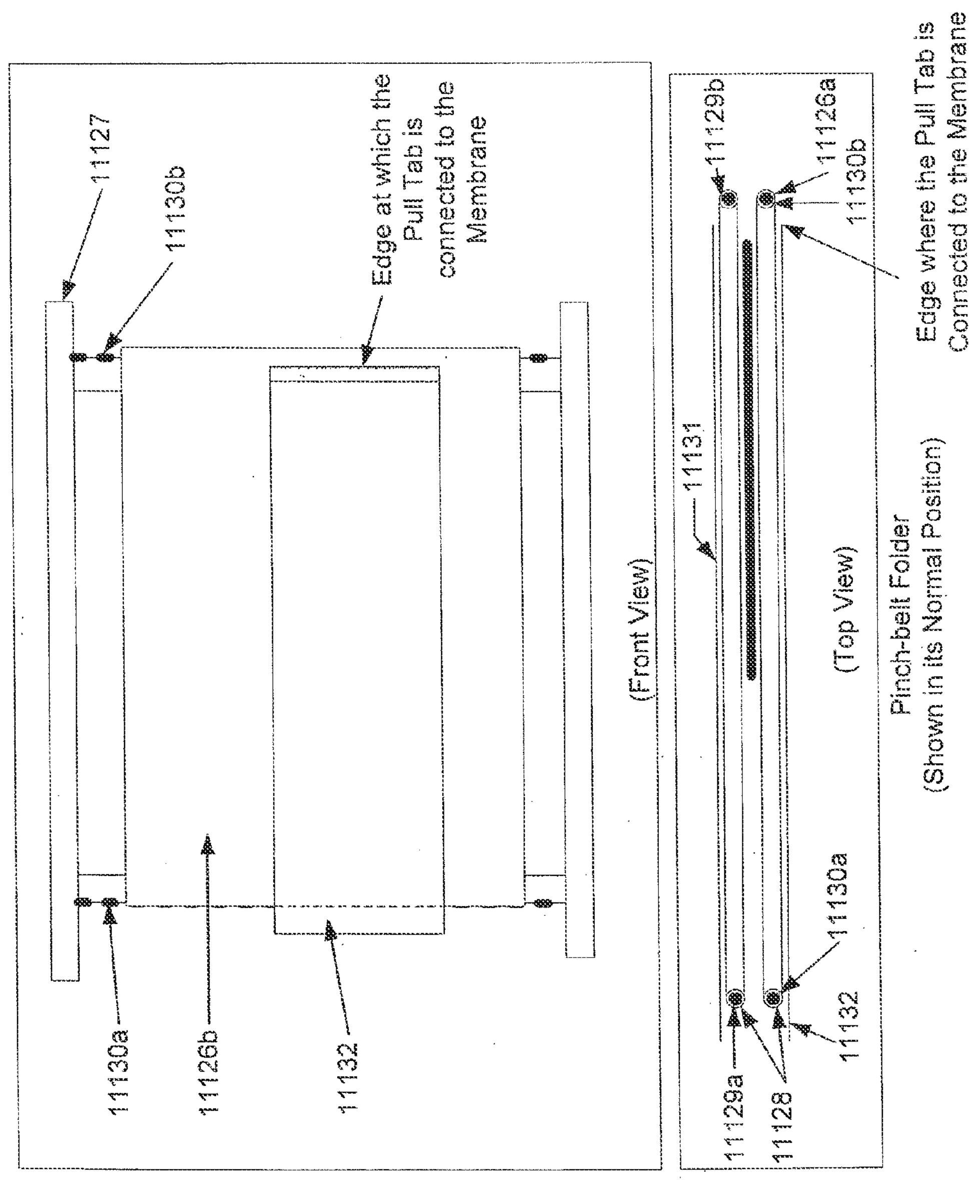
Figure 11K:
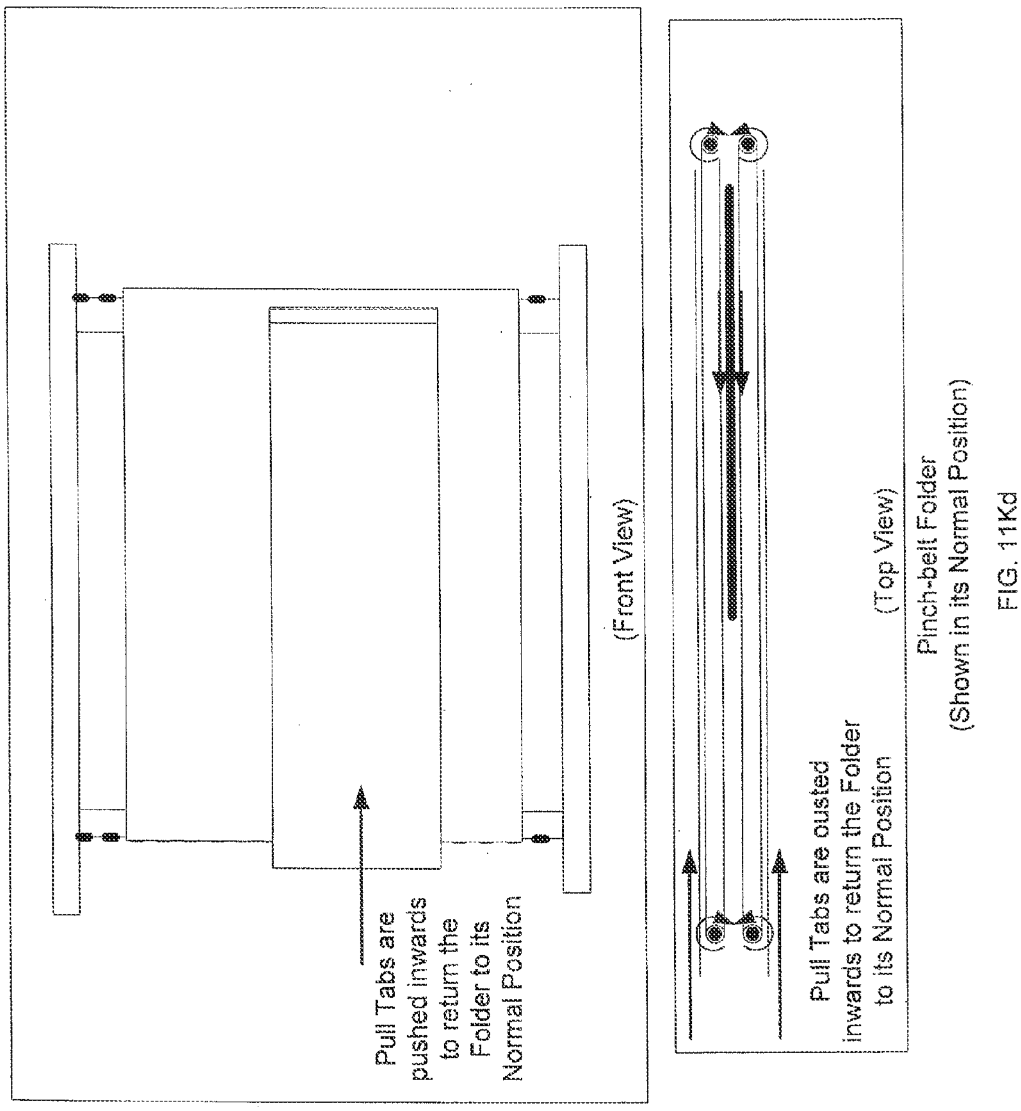

FIGS. 11Ka-11Kd show an alternative frame/folder design in accordance with aspects of the invention. This frame/folder design accommodates side insertion and side extraction of mail pieces.

The frame 11125 of the frame/folder is rectangular with tabs 11127 extending horizontally from all four corners. As in previously described embodiments, a pin may depend vertically from each of the two top tabs. These pins facilitate the diverting and merging of frame/folders while in lead screws. As in previously described embodiments, the top and bottom of the frame is knife-edged (or has a rectangular edge) in order to ensure positive engagement with the lead screws. In the event the edges were to incur frictional wear due to their movement on the lead screws, one option is to make the edges easily removable and replaceable, such that as wear occurs the edges can be replaced, rather than disposing of the entire frame/folder.

The folder of the frame/folder includes two continuous, conveyor-style membranes, i.e., a pair of endless belts 11126*a*, 11126*b*, thereby forming a so-called "pinch-belt" folder. Membrane 11126*a* forms the front of the folder and membrane 11126*b* forms the back of the folder. Each of the membranes wraps around a pair of vertical, rotating rods; i.e., one rod on the left, and one rod on the right. As seen in the drawings, membrane 11126*a* wraps around rods 11129*a*, 11129*b* and membrane 11126*b* wraps around rods 11130*a*, 11130*b*. Attached to the outside of each membrane is a pull tab. Pull tab 11131 is attached to membrane 11126*a* and pull tab 11132 is attached to pull tab 11132 is attached to membrane 11126*b*. The pull tabs are made of an inflexible material. As a result of this configuration, as the pull tabs 11131, 11132 are moved in a direction in or out relative to the frame/folder, and the membranes rotate about the rods, in the form of a pair of conveyor belts.

The membranes and their respective pull tabs can be in either of two positions, namely, a normal position and an extended position. The membranes and their pull tabs are in the normal position throughout most of the system's daily operations, such as during mail piece sequencing and storage. In the normal position, the pull tabs project just beyond one side of the frame/folder. In this normal position, the pull tabs are accessible to be engaged via mechanization, but do not stick out excessively, to minimize the risk of unintended snagging. The membranes and their pull tabs are in the extended position for a few moments during extraction and, in some embodiments, during insertion, to facilitate transfer of the mail pieces from (and, in some embodiments, to) the folder, as described below.

In certain embodiments, in preparation for mail piece insertion, the pull tabs 11131, 11132 are engaged via mechanization and are pulled outward, so that they project relatively far from the folder. Then, as the mail piece is inserted into the folder, the membrane is rotated in the opposite direction, and the pull tabs move inward, as shown in the top view of FIG. 11Kd, i.e., back to the normal position. The movement of the membrane is in the same direction as mail piece insertion, so that, during insertion, there is no relative motion or slip between the mail piece and the inside of the membrane.

In an alternative embodiment, the membranes and their pull tabs stay in the normal position throughout the insertion process. Thereby, in such embodiment, there is relative motion or slip between the mail piece and the inside of the membranes.

During extraction, the pull tabs are pulled from their normal position to their extended position. This movement serves to rotate the membranes about their rotator rods. The insides of both membranes, i.e., the sides contacting the mail piece, move in the same direction. Due to frictional forces between the mail piece and the insides of the membranes, the mail piece, thereby engaged, also moves in this direction. Thus, the mail piece is ejected from the folder, where it is then captured by other mechanization. After the mail piece is removed from the folder, the pull tabs are pushed back, i.e., inward, returning them to their normal positions, as depicted in the front and top view of FIG. 11Kd.

Figure 11L:
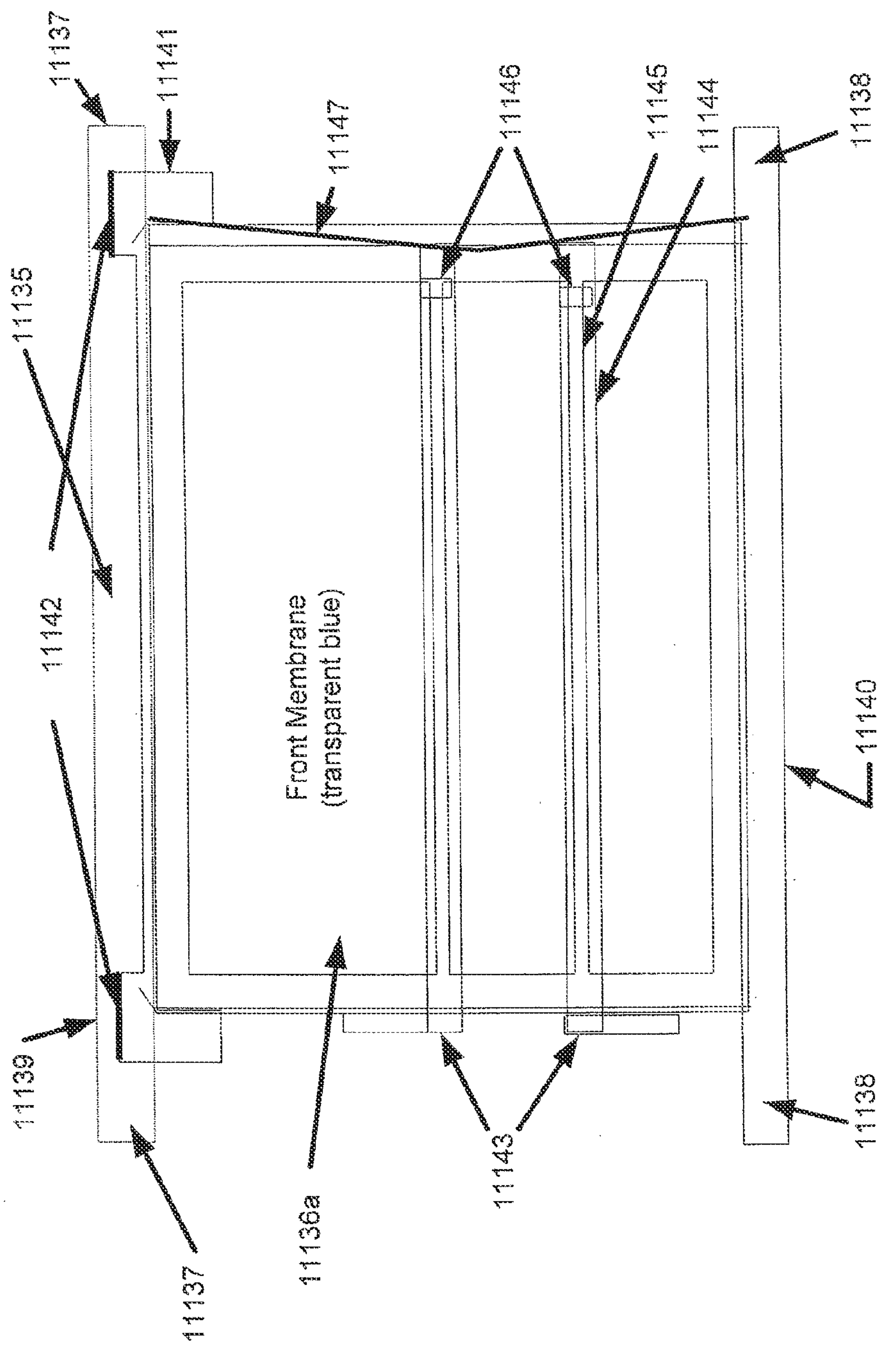
FIGS. 11La-11Ld show an alternative frame design in accordance with aspects of the invention.
Figure 11L:
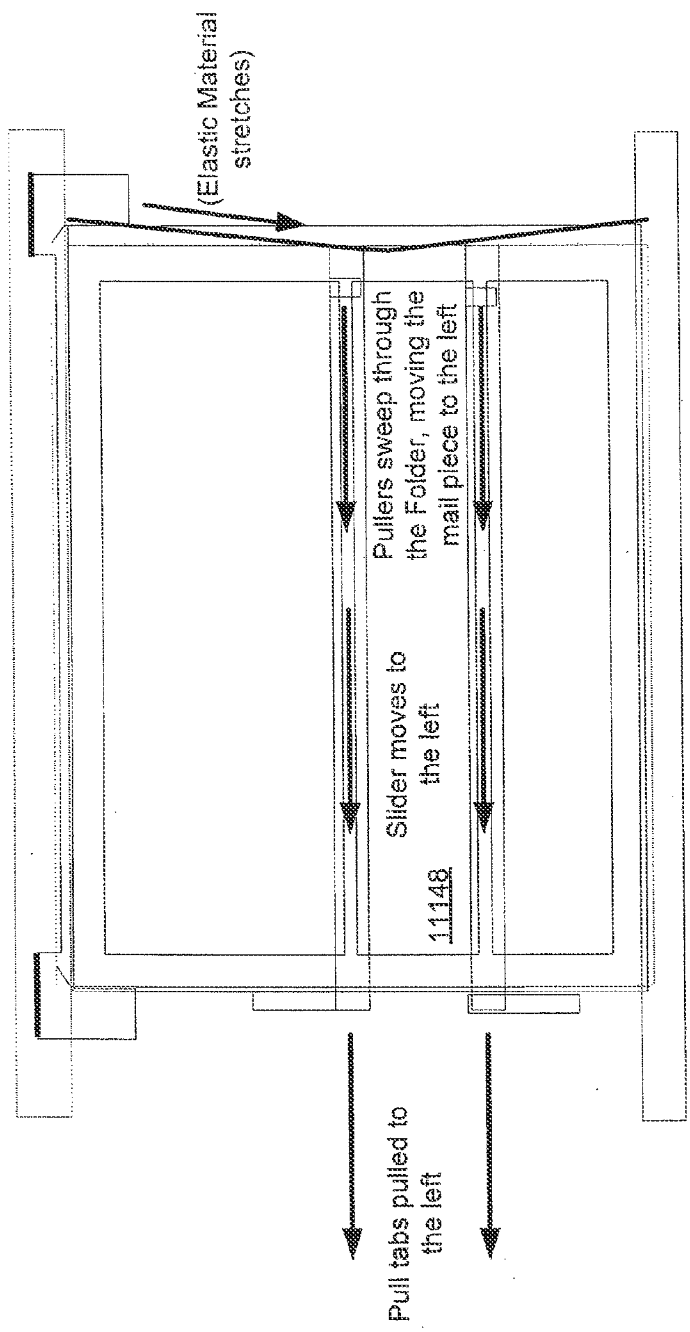
Figure 11L:
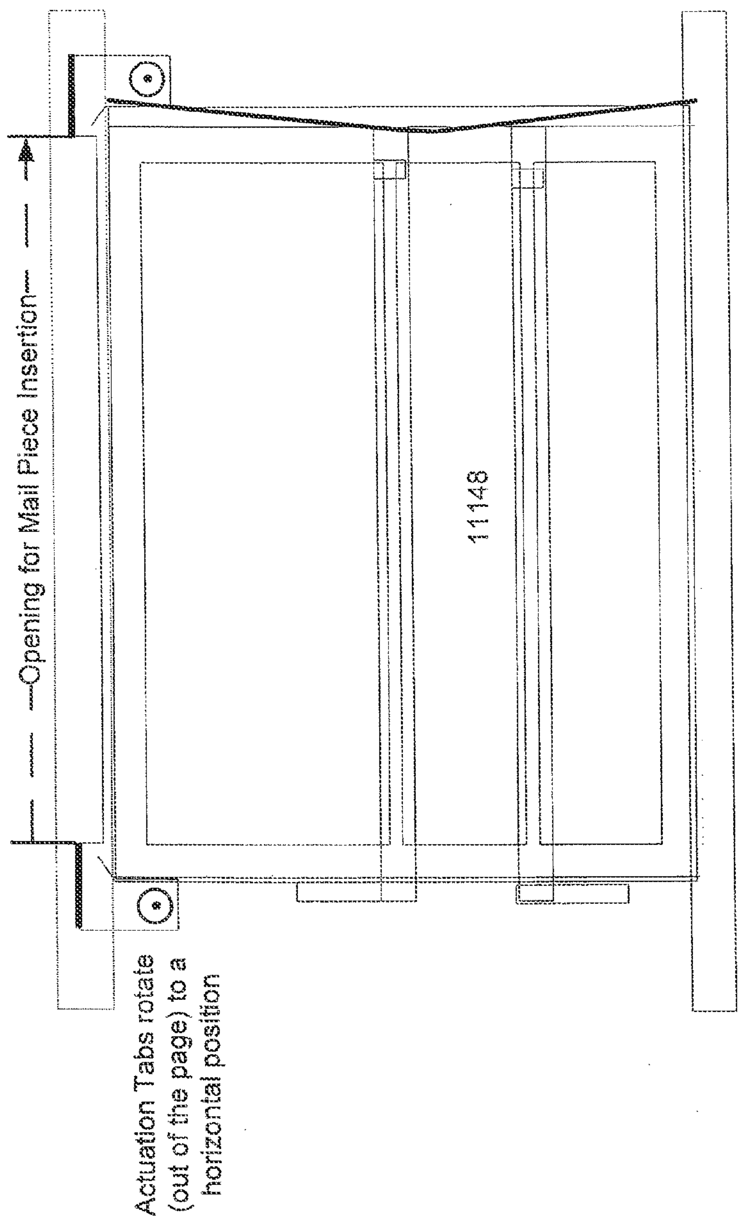
Figure 11L:
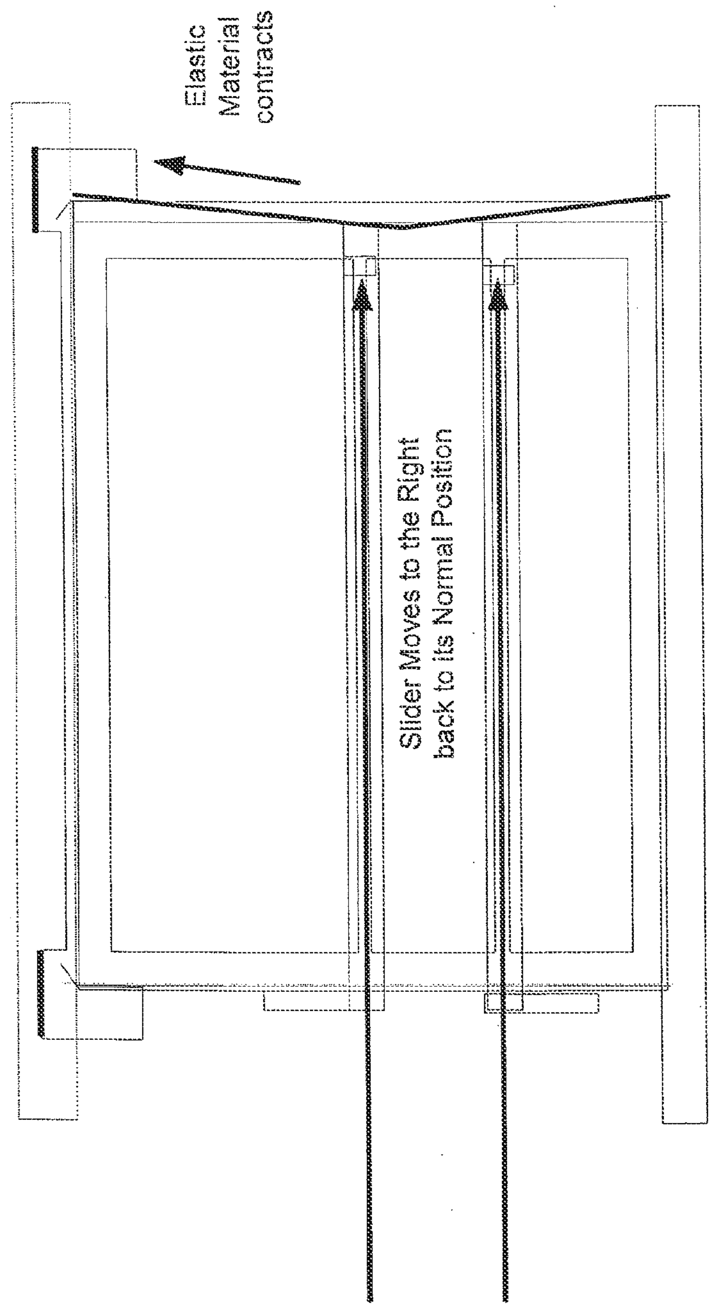

FIGS. 11La-11Ld show an alternative frame/folder design in accordance with aspects of the invention. This frame/folder design accommodates top insertion and side extraction of mail pieces.

The frame 11135 of the frame/folder is rectangular with tabs 11137, 11138 extending horizontally from all four corners. As in previously described embodiments, a pin may depend vertically from each of the two top tabs 11137. The pins facilitate the diverting and merging of frame/folders while in lead screws. The top 11139 and bottom 11140 of the frame is knife-edged (or has a rectangular edge) to ensure positive engagement with the lead screws. In the event the edges were to incur frictional wear due to their movement on the lead screws, one option is to make the edges easily removable and replaceable, such that as wear occurs the edges can be replaced, rather than disposing of the entire frame/folder.

The folder 11136 of the frame/folder includes a front membrane 11136*a* and a rear membrane (similar to the front membrane). The membranes are connected to each other throughout the extent of a common bottom edge. They are also connected at both top corners by means of glue or by means of other fasteners. For the purpose of allowing insertion of a mail piece from the top, the membranes are not connected along the majority of the length of the top edge. In addition, they are not connected along at least a side from which a mail piece is to be extracted. They may or may not be connected along the opposite side.

The frame/folder has two actuation tabs 11141, one in each of the top corners. When the frame/folder is closed, the actuation tabs extend downward. The actuation 11141 tabs are coupled to the frame via living hinges 11142. In addition to the front and back membranes 11136*a*, 11136*b* being connected to each other, the back membrane 11136*b* is connected to the frame. The front membrane 11136*a* is connected to the actuation tabs 11141 at the top and at the bottom of the frame.

The frame/folder is opened via the actuation tabs 11141. More specifically, the actuation tabs are caused to flip from the vertical (closed) position to a horizontal (open) position. Thus, the front membrane of the folder moves away from the back membrane (at the top) due to the lever-action of the actuation tabs and the living hinges.

The inside of the folder has a slider 11148 built into it. The slider facilitates the extraction process. The slider can be in two positions, namely, a normal position and an extraction position. The slider is in its normal position throughout most of the daily operations, such as during mail piece insertion, sequencing, and storage. FIG. 11Ld shows the slider moving to the normal position. During mail piece extraction, the slider is moved from its normal position to the extracted position, as depicted in FIG. 11Lb. As the slider is moved to the extraction position, it pulls the mail piece out of the folder.

The slider has one or more pull tabs 11143. When the slider is in its normal position, the pull tab(s) 11143 protrude slightly from the folder, on the extraction side. Thus, during extraction, the pull tabs can be engaged by mechanization, and pulled to move the slider into the extraction position.

The pull tab(s) 11143 are attached to one or more “horizontals” 11144. The horizontals are housed by, and move within, tracks 11145. The tracks are built into the inside of the folder. The horizontals are also attached to “pullers” 11146. As the slider is moved to the extraction position, the pullers sweep through the folder, engaging the mail piece and moving it out the open side of the folder. The pullers and/or the horizontals are attached to the frame via an elastic material 11147. After extraction of the mail piece is complete, the pull tab(s) 11143 is(are) released. The elastic material 11147 then serves to pull the slider back into the folder, from the extraction position to the normal position.

Variations of the frame/folders thus far described are also encompassed by the invention. For example, the frame can be made of plastic with metal and strip magnets and a soft membrane center for expansion. Further, the frame could be constructed with pins on the side in a downward fashion to support the folder, and a center pin in an upward fashion for driving the folder from the mid-point. Still further, the frame could be made rigid with a spring steel frame having a mid point restraint on each side, with a flexible membrane center, a stiff backer material, and actuation tabs on either side. As a still further variation, the frame could be made rigid with a spring steel frame, side and bottom restraint, flexible membrane center, a stiff backer material, and actuation tabs on one side.

Further still, the frame/folder could have a folder with living hinges all around. The top of the folder is opened using side tabs and living hinges on the top to drive the opening to its full open position via pressure between side tabs and top hanging mechanism. The folder bottom is opened via a mechanism that separates the bottom flaps and let the mail fall. The bottom flaps are held closed via memory in the living hinge material and also via small springs. Further, replaceable wear strips can be fitted at the top and bottom of the frames.

Figure 11M:
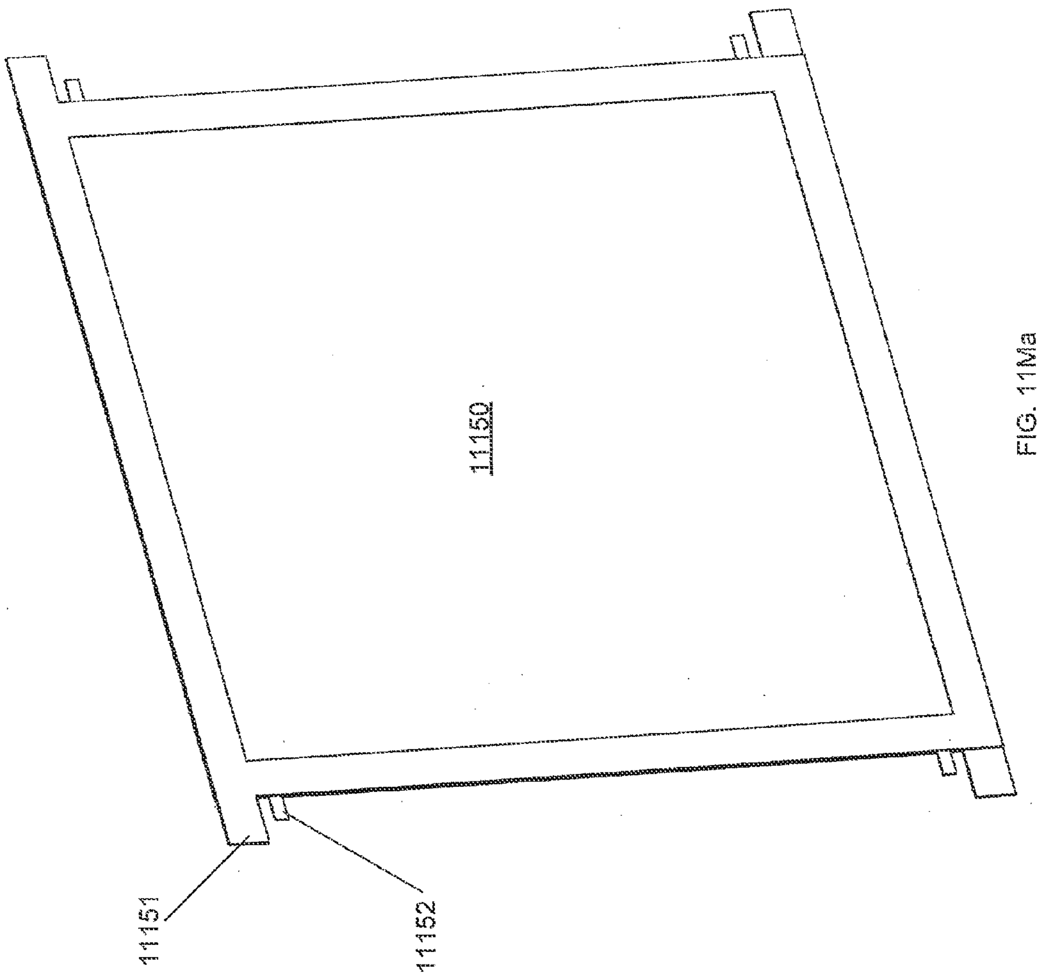
FIGS. 11Ma and 11Mb show embodiments of individual frames for sorting mail in accordance with aspects of the invention.
Figure 11M:
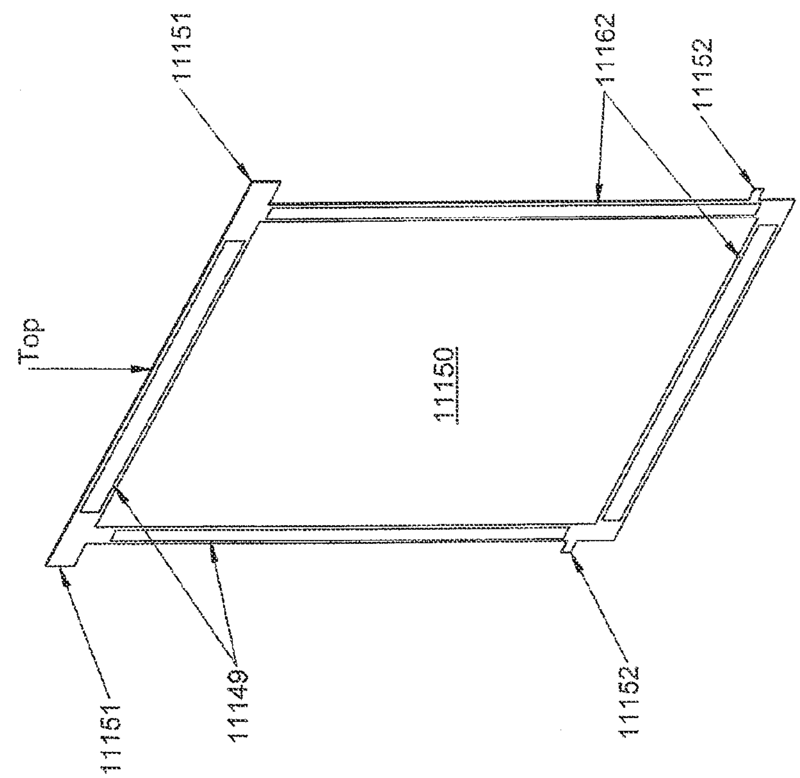

FIGS. 11Ma and 11Mb show a plastic frame with metal strips 11162 and magnet strips 11149, with a soft membrane 11150 center for expansion. This frame/folder design accommodates insertion and extraction of mail pieces in any direction, i.e., such as at the top or either side. It includes two identical halves, which are not permanently coupled to each other, as shown in FIG. 11Ma, and can therefore be separated from each other as necessary. In order to hold the mail piece, the two halves are combined and held together by magnets, such that one half is the front side of the frame/folder, and the other half is the back side.

Each half, one of which is shown in FIG. 11Mb, is rectangular (or other shape) with tabs 11151 extending horizontally from two adjacent corners. The edges with these two horizontal tabs can be where the frame/folder engages the lead screws. The edge might be knife-edged (or have a rectangular edge) to ensure positive engagement with the lead screws. In the event the edges were to incur frictional wear due to their movement on the lead screws, one option is to make the edges easily removable and replaceable, such that as wear occurs the edges can be replaced, rather than disposing of the entire frame/folder. As noted above, one or more pins can extend upward from the tabs in order to facilitate the diverting of the mail pieces.

Each half can have a thickness of approximately 1/16 inch (0.0625 in.; 1.59 mm), such that the frame/folder has a thickness of about 1/8 inch (approximately 0.125 in; 3.18 mm); although other dimensions are contemplated by the invention. A rectangle is cut out of the center of each half, such that the material remaining on all four sides of the cutout has a width of approximately 0.5-1.0 inch (approximately 12.7-25.4 mm); although other dimensions are contemplated by the invention. This cutout reduces the overall weight of the frame/folder. It also allows the mail piece to nest inside the frame, such that the overall thickness is minimized. Instead, it is positioned flush against the frame and, therefore, adds to the overall thickness.

The cutout in each half is covered by a thin material 11150, in order to contain the mail piece while adding minimal thickness. Either both halves could have an inflexible material, or both could have a flexible material, or one could have a flexible material and the other could have an inflexible material. The thin material can be transparent. This would have the advantage of allowing for optical determination of the presence of a mail piece within a frame/folder.

Two actuation tabs 11152 protrude from each half. They are parallel to the horizontal tabs and are located near the other end of the half. They facilitate the opening and closing of the frame/folder.

Each half has two magnetic strips 11149 and two ferrous metal strips 11162 fixed on the side that will face the other half (or other count). The four strips form a rectangle around the cutout. The magnetic strips 11149 are on adjacent sides to each other (i.e. they are at 90° to each other). Similarly, the metal strips 11148 are on adjacent sides to each other. The remainder of the half is made of plastic, or some other non-ferrous material, such that the magnets do not interact with it. One advantage of this type of frame is that the two halves can be mated together as a part of the mail insertion process.

Two halves are combined to form the frame/folder, as shown in FIG. 11Ma. They are combined with one of the halves upside-down from the other; such the horizontal tabs from one half are on top, and the horizontal tabs from the other half are on bottom. They are combined with the magnets and metal strips facing each other, such that the attraction between them holds the two halves together. In an alternative embodiment, the metal strips are replaced with magnetic strips, with their polarity in the opposite direction of the original magnetic strips. Therefore, when the halves are combined, the polarity of the original magnetic strips and the new magnetic strips are aligned such that they will be attracted to each other, thus holding the two halves together.

Figure 11N:
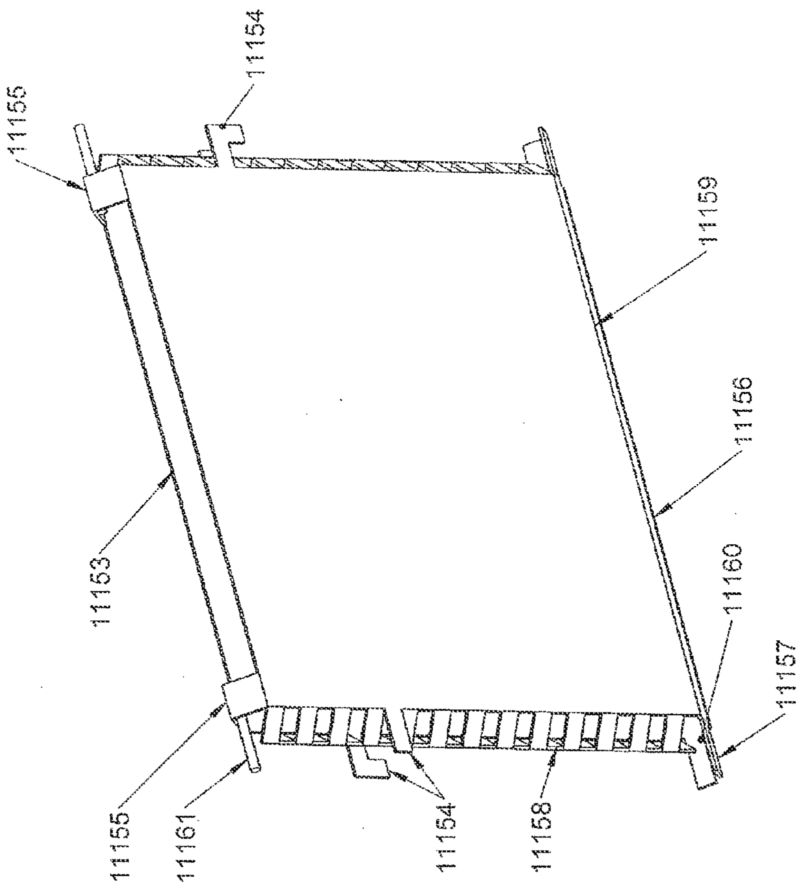
FIG. 11N shows an embodiment of individual frames for sorting mail in accordance with aspects of the invention.

FIG. 11N illustrates an embodiment of a folder according to the invention. A specific frame is not shown, but a wide variety of possible frame designs can be utilized with the folder. This folder design accommodates top insertion and bottom extraction of mail pieces. More specifically, FIG. 11N shows an embodiments of an individual container, i.e., folder, for sorting mail in accordance with aspects of the invention (without the frame). The folder design includes living hinges all around. The top 11153 of the folder is moved to an open position using side tabs 11154. Living hinges 11155 on the top drive the opening to its full open position via pressure between side tabs 11154 and a top hanging mechanism. The folder bottom includes doors 11156 opened via a mechanism that separates the bottom flaps 11157 and allows the mail fall from within the folder. The bottom flaps are held closed via memory in the living hinge material, i.e., elastic, and also via small springs.

Most of the folder is made from a single piece of molded plastic. Two thin, flat, rectangular portions form the front and back sides of the folder. Since both sides of this folder are made of relatively rigid molded plastic, the thickness of the folder expands with the width of the mail piece, and both sides remain straight, flat, and in parallel planes (neither side deforms with the mail piece).

Each of the left and right edges of the folder is formed with a living hinge (expanding and contracting flaps or a fold line throughout) 11158. There are also living hinges 11153, 11155 on the top of the folder, i.e., at the far left edge and the far right edge. The space between the living hinges 11153, 11155 serves as the top opening to allow top insertion of a mail piece. As the living hinges flex back and forth, the front and back sides of the folder move nearer or farther from each other.

The bottom of the folder is formed by two doors 11156, one attached to the front side of the folder, one attached to the back side of the folder. The bottom doors are attached to the front and back sides via living hinges 11159. These living hinges are biased to be maintained in a closed position. The doors may also be kept closed by springs 11160 connecting the doors to each other at the far right and far left. Therefore, the doors normally stay closed, and open only when actuated by the actuation tabs 11157.

The folder has two top actuation tabs 11161, four side actuation tabs 11154, and four bottom actuation tabs 11157. The folder is opened via the top and side actuation tabs to allow top insertion of a mail piece into the folder. To allow for bottom extraction of the mail piece, the bottom of the folder is opened via the four bottom actuation tabs. The folder can also include pins as noted above.

Figure 11O:
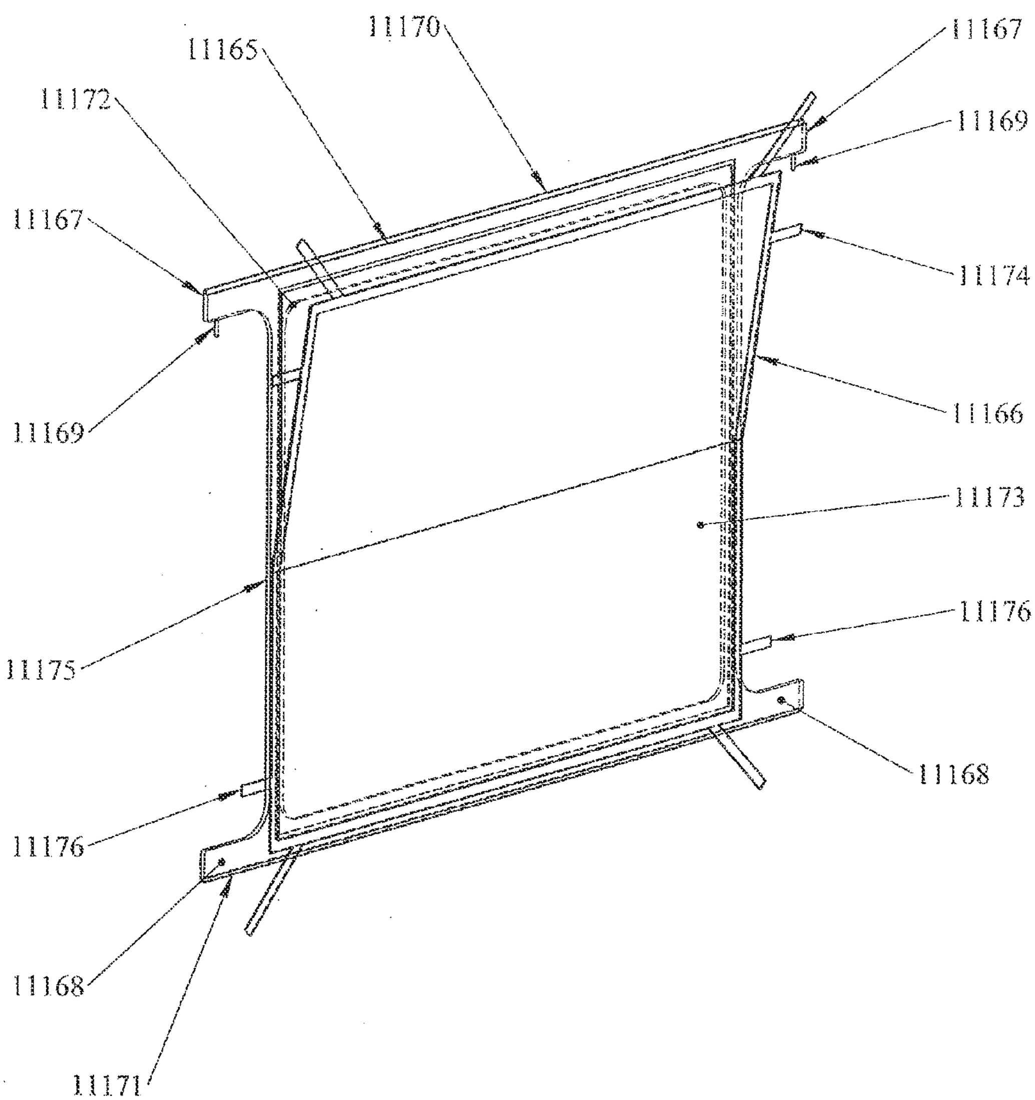
FIG. 11O shows embodiments of individual frames for sorting mail in accordance with aspects of the invention.

FIG. 11O shows embodiments of individual containers for sorting mail in accordance with aspects of the invention. A rigid frame 11165 is shown with spring steel folder 11166, mid point restraint on each side, flexible membrane center, stiff backer material, and actuation tabs on either side.

This frame/folder design accommodates top insertion and bottom extraction of mail pieces. The frame 11165 is rectangular with 11167, 11168 tabs extending horizontally from all four corners. A pin 11169 depends vertically from each of the two top tabs 11167. The pins facilitate the diverting and merging of frame/folders while in lead screws. Again, this may also be a single pin which extends upward from a trailing edge of direction, as well as any combination of embodiments noted above. The top 11170 and bottom 11171 of the frame is knife-edged (or has a rectangular edge) to ensure positive engagement with the lead screws. In the event the edges were to incur frictional wear due to their movement on the lead screws, one option is to make the edges easily removable and replaceable, such that as wear occurs the edges can be replaced, rather than disposing of the entire frame/folder.

The frame 11165 has a thickness of approximately ⅛ inch (0.125 in; 3.18 mm); although other dimensions are contemplated by the invention. A rectangle is cutout of the center of the frame, such that the material remaining on all four sides of the cutout has a width of approximately 0.5-1.0 inch (12.7-25.4 mm); although other dimensions are contemplated by the invention. This cutout reduces the overall weight of the frame/folder. It also allows the mail piece to nest inside the frame, such that the overall thickness is minimized. In this design, the edges of the folder do not nest in the frame. Instead, it is positioned flush against the frame and, therefore, adds to the overall thickness.

To ensure that the frame/folder expands in only one direction, this design incorporates a piece of thin, inflexible material 11172, for example but not limited to spring steel, attached to one side of the frame and covering the entire area of the cutout. This thin, inflexible material is referred to as a backer. The folder includes a semi-flexible, for example but not limited to spring steel sub-frame 11166 and a flexible membrane 11173. The flexible membrane can be transparent. This has the advantage of allowing for optical determination of the presence of a mail piece within the frame/folder. Actuation tabs 11174 protrude from the sub-frame. They facilitate the opening and closing of the frame/folder.

The membrane 11173 is flexible for allowing expansion to accommodate the thickness of the mail piece. The sub-frame 11166 hinges at two hinge points 11175. These hinge points are located approximately half way down the vertical sides of the subfolder 11166. These hinge points are also the points at which the sub-frame 11166 is connected to the folder. The top of the sub-frame is hinged open via the top actuation tabs 11174 to allow top insertion of a mail piece into the frame/folder. The bottom of the sub-frame is hinged open via the bottom actuation tabs 11176 to allow bottom extraction of a mail piece from the frame/folder.

The sub-frame 11166 can be made of spring steel, such that after being opened, as the actuation tab is released, the subfolder automatically closes by the elasticity of the sub-frame. Alternatively, the frame/folder can be held closed by magnets mounted on the frame and/or the sub-frame. The magnets could be thin, long strip magnets.

Figure 11P:
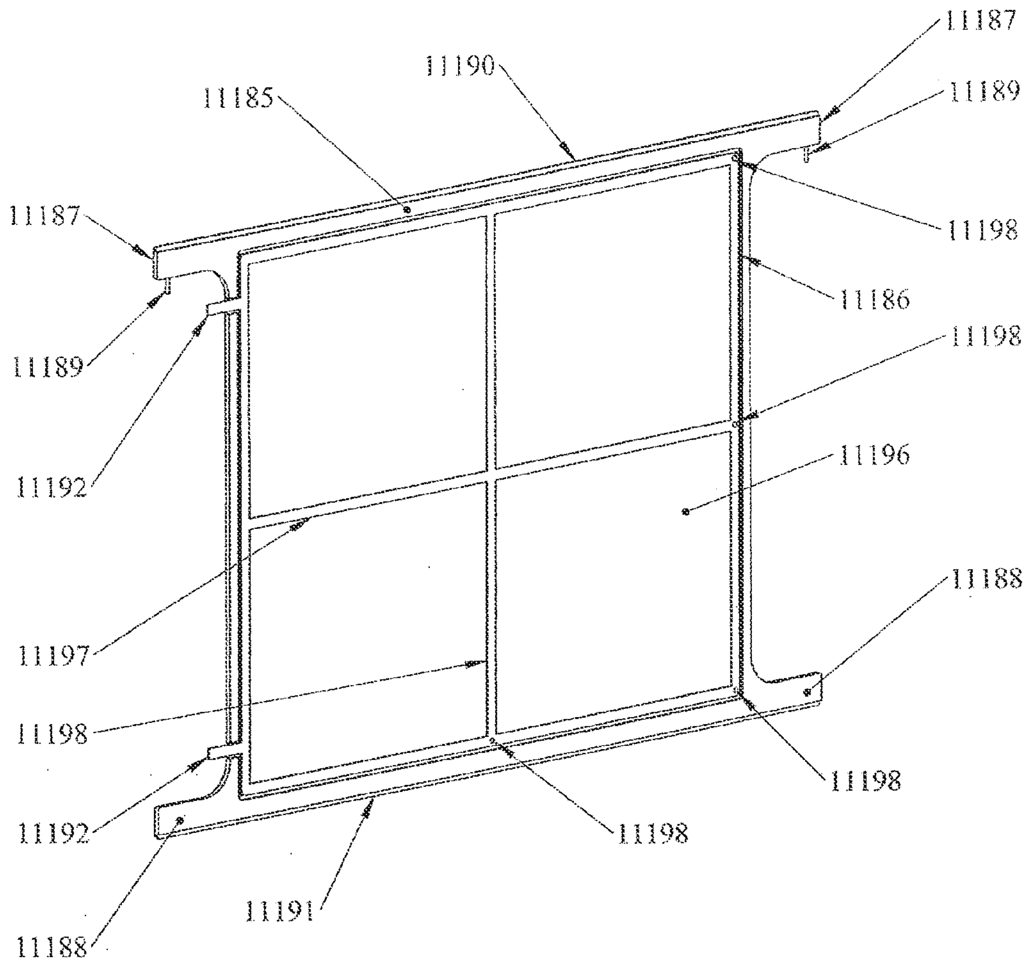
FIGS. 11Pa-11Pd show embodiments of individual frames for sorting mail in accordance with aspects of the invention.
Figure 11P:
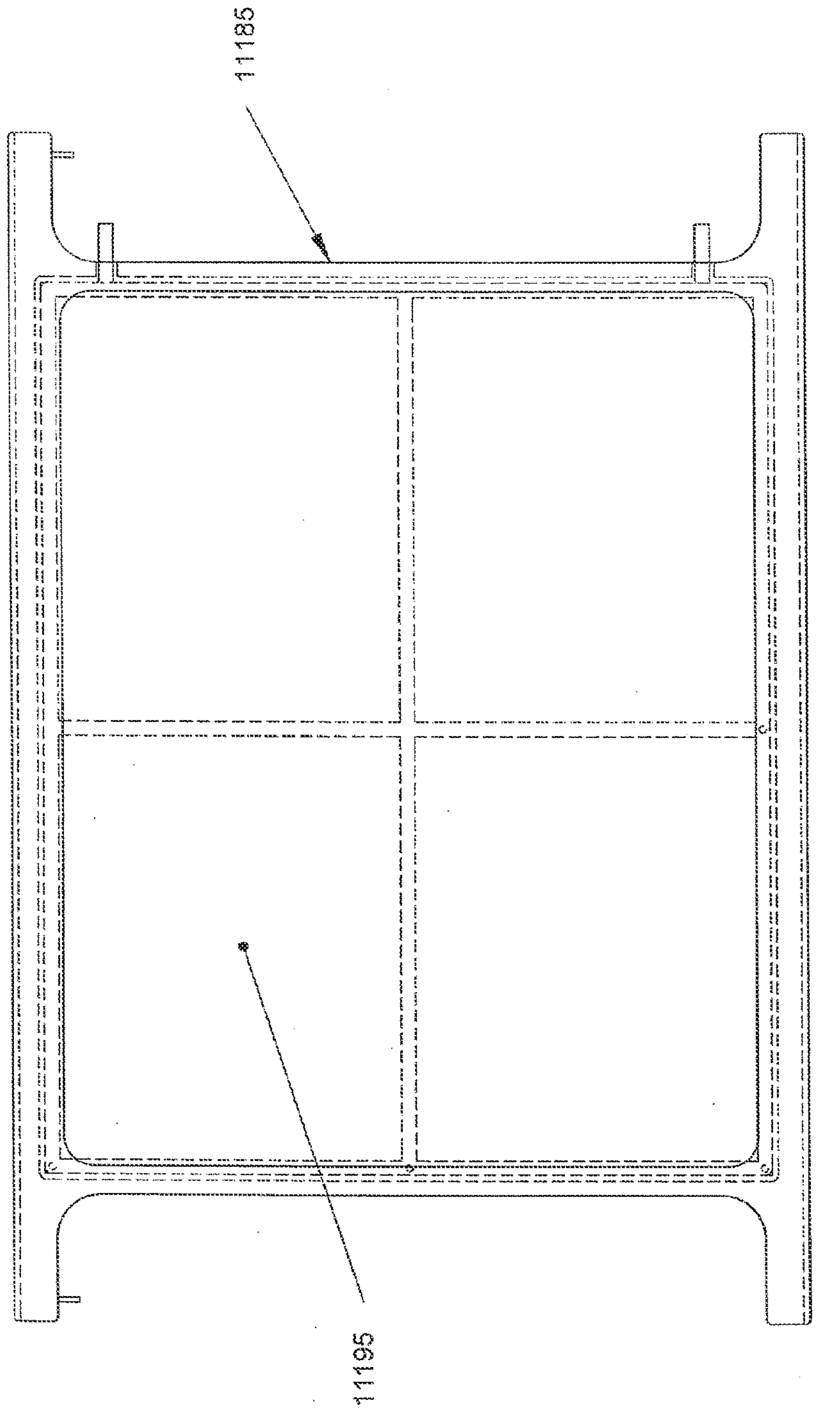
Figure 11P:
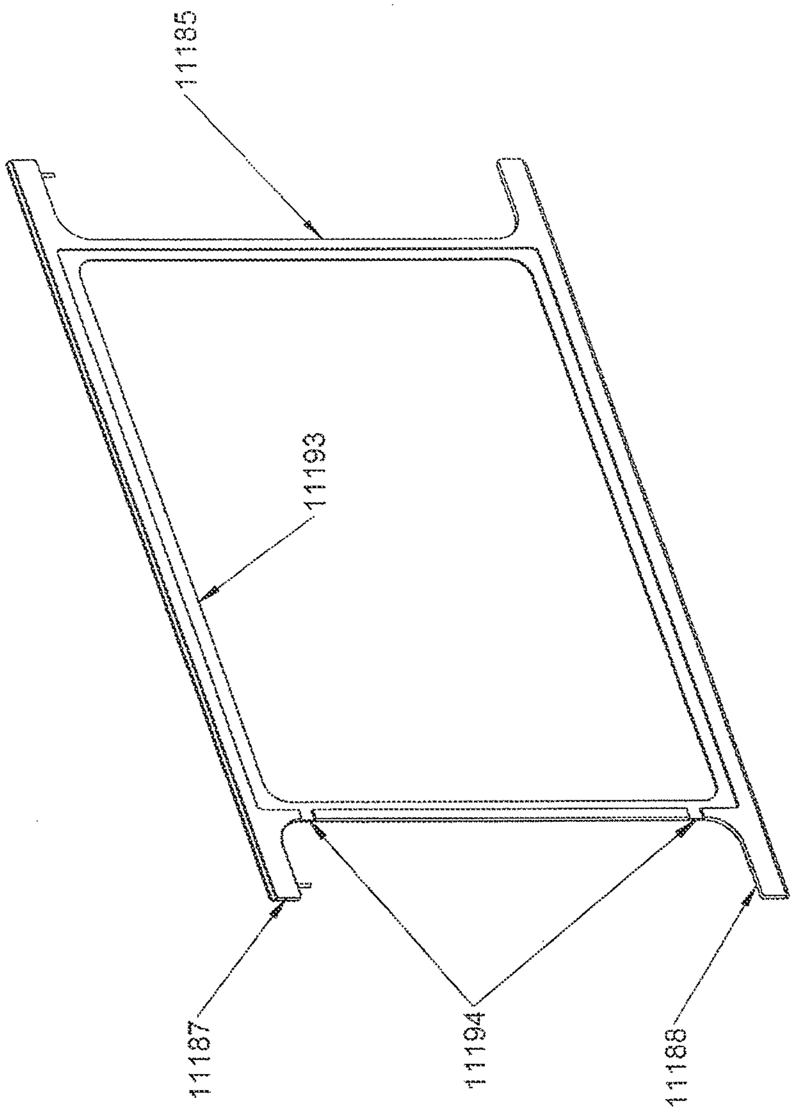
Figure 11P:
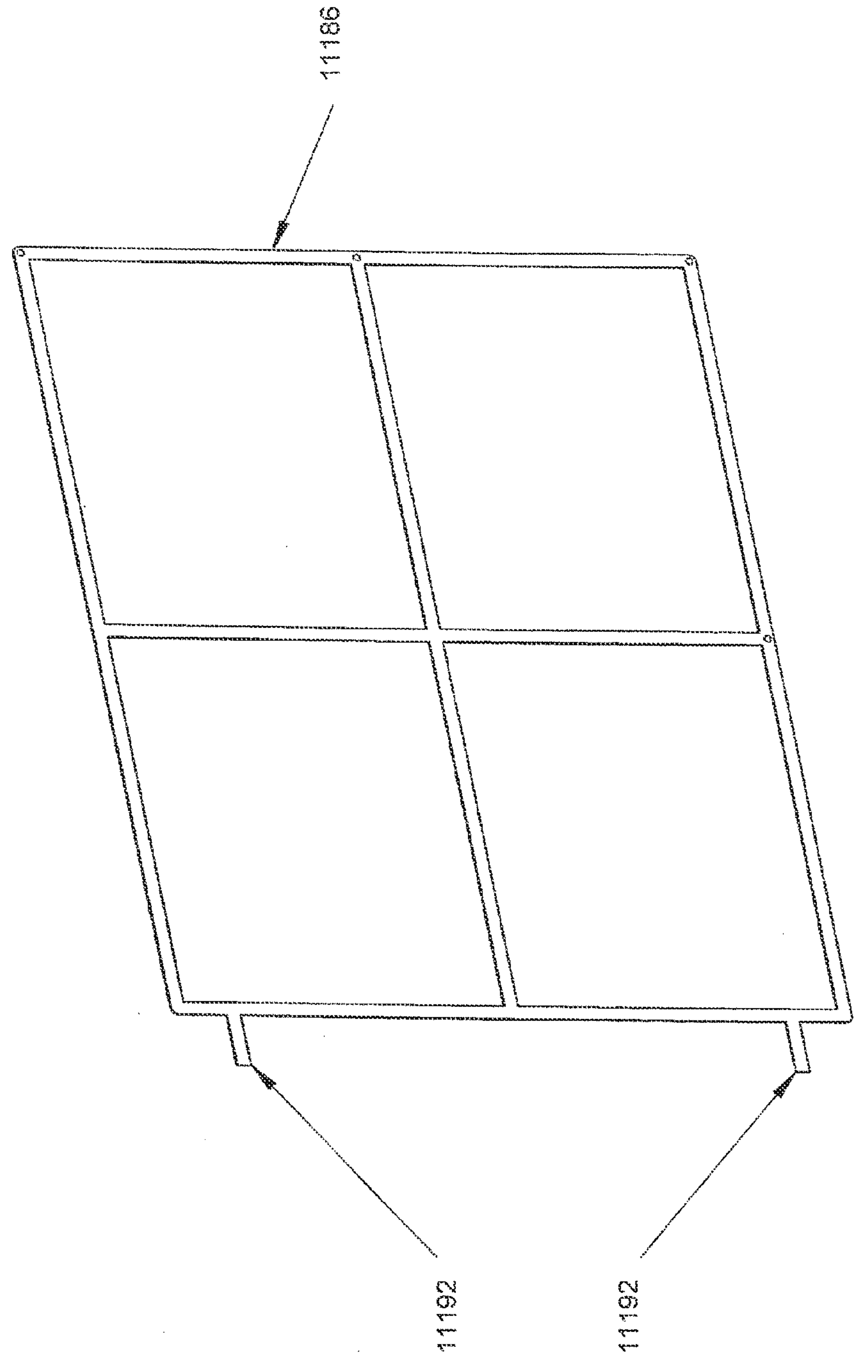

FIGS. 11Pa-11Pd show an alternative embodiment of a frame/folder in accordance with aspects of the invention. The rigid frame 11185, shown in FIG. 11Pc removed from the sub-frame 11186 of FIG. 11Pd, is made of steel, has side and bottom restraint, a flexible membrane center, stiff backer material, and actuation tabs on one side.

This frame/folder design, shown in FIG. 11Pa (in a front view) and in FIG. 11Pb (in a rear view), accommodates top or side insertion and side extraction of mail pieces, from one side only. The frame 11185 is rectangular with tabs 11187, 11188 extending horizontally from all four corners. A pin 11189 depends vertically from each of the two top tabs 11187. The pins facilitate diverting and merging of frame/folders while in lead screws. The top 11190 and bottom 11191 of the frame is knife-edged (or has a rectangular edge) to ensure positive engagement with the lead screws. In the event the edges were to incur frictional wear due to their movement on the lead screws, one option is to make these edges easily removable and replaceable, such that as wear occurs the edges can be replaced, rather than disposing of the entire frame/folder.

The frame 11185 has a thickness of approximately ⅛ inch (0.125 in; 3.18 mm); although other dimensions are contemplated by the invention. A rectangle is cutout of the center of the frame, such that the material remaining on all four sides of the cutout has a width of approximately 0.5-1.0 inch (12.7-25.4 mm); although other dimensions are contemplated by the invention. The cutout reduces the overall weight of the frame/folder. It also allows the mail piece to nest inside the frame, such that the overall thickness is minimized. For this design, on the inside edge of the frame, portions 11193 of the frame are thinner, having a thickness of approximately 1/16 inch (0.0625; 1.59 mm); although other dimensions are contemplated by the invention. The sub-frame 11186, shown removed from the frame in FIG. 11Pd, is mounted flush against the thinner portions of the frame 11185. See FIG. 11Pa. The sub-frame is also approximately 1/16" thick; although other dimensions are contemplated by the invention. Therefore, the total thickness where the frame and sub-frame meet is only about ⅛" thick; although other dimensions are contemplated by the invention. There are also two thin (1/16" thick) regions 11194, or cutouts, on the frame to accommodate the (1/16" thick) actuation tabs 11192, such that the frame/folder is only ⅛" thick where the actuation tabs cross the frame; although other dimensions are contemplated by the invention.

To ensure that the frame/folder expands in only one direction, this design incorporates a piece of thin, inflexible material (possibly spring steel), attached to the back side of the frame and covering the entire area of the cutout. This thin, inflexible material is referred to as a backer. The backer can be transparent. This has the advantage of allowing for optical determination of the presence of a mail piece within a frame/folder.

The folder of the frame/folder includes a rigid rectangular sub-frame 11186 and a flexible, stretchable membrane 11196. The sub-frame 11186 also has a horizontal member 11197 and a vertical member 11198 that form a cross. This cross gives the sub-frame additional rigidity, and helps support the flexible membrane 11196. The sub-frame is constructed of a flexible, springy material, such as spring steel. The flexible membrane can be transparent. This has the advantage of allowing for optical determination of the presence of a mail piece within a frame/folder. Actuation tabs 11192, 11192 protrude from the sub-frame on one side. They facilitate the opening and closing of the frame/folder.

The stretchable, flexible membrane is elastically deformable for allowing expansion to accommodate the thickness of a mail piece. The sub-frame 11186 is fastened to the frame 11185 at connection points 11198 along the bottom and on one side. Any of a variety of connection methods and fastening types could be used. For example, such fasteners include screws, nuts and bolts, high strength adhesives, or spot welds. The connections can be made at discrete points (such as spot welds) or continuous strips (such as a linear continuous weld). The connections could extend across the entire bottom and entire side, or they could connect only some portion of the bottom or side. The frame/folder is opened via the actuation tabs to allow top or side insertion of a mail piece into the frame/folder. It is opened in the same manner to allow side extraction of the mail piece. The sub-frame is flexible and springy (and could be made of spring steel), so that after being opened, as the actuation tab is released, the subfolder automatically closes by the elasticity of the subfolder.

Figure 11Q:
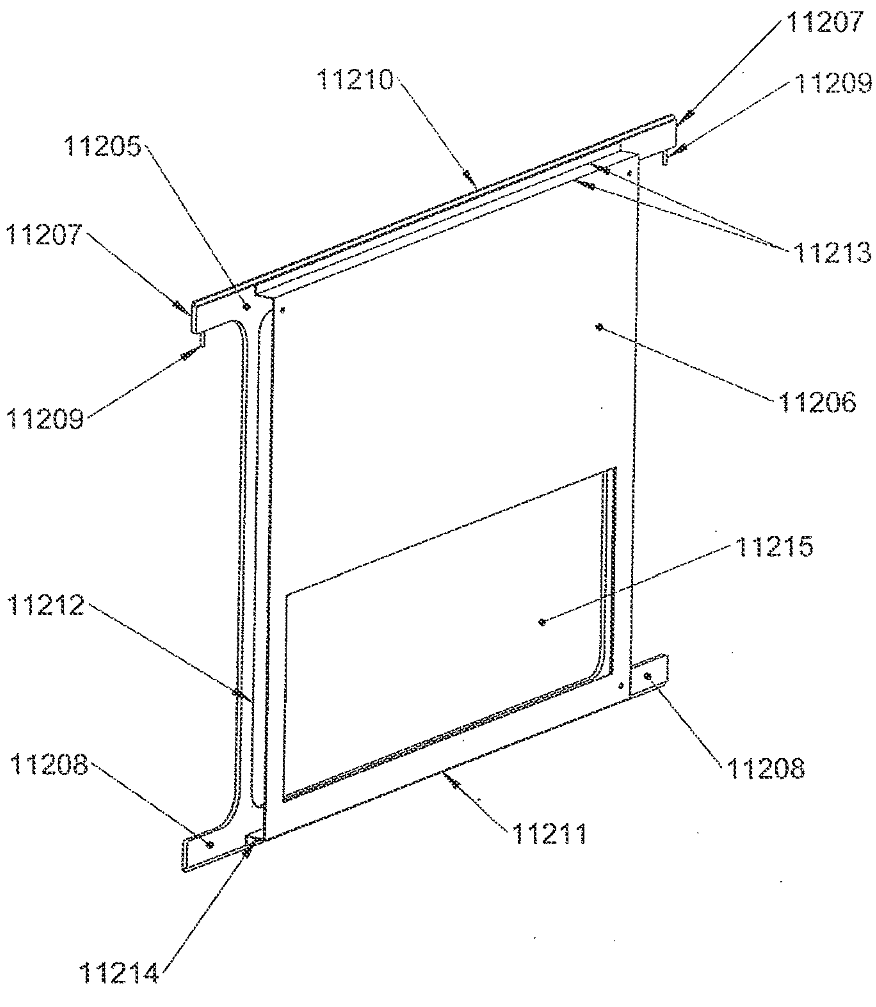
FIG. 11Q shows an embodiment of individual frames for sorting mail in accordance with aspects of the invention.

FIG. 11Q shows an embodiment of a frame/folder in accordance with aspects of the invention. This frame/folder design accommodates side insertion and side extraction of mail pieces.

The frame 11205 of the frame/folder is rectangular with tabs 11207, 11208 extending horizontally from all four corners. A pin 11209 depends vertically from each of the two top tabs 11207. The pins facilitate diverting and merging of frame/folders while in lead screws. The top 11210 and bottom 11211 of the frame is knife-edged (or has a rectangular edge) to ensure positive engagement with the lead screws. In the event the edges were to incur frictional wear due to their movement on the lead screws, one option is to make these edges easily removable and replaceable, such that as wear occurs the edges can be replaced, rather than disposing of the entire frame/folder.

The frame 11205 has a thickness of approximately ⅛ inch (0.125 in; 3.18 mm); although other dimensions are contemplated by the invention. A rectangle is cut out of the center of the frame, such that the material remaining on all four sides of the cutout has a width of approximately 0.5-1.0 inch (12.7-25.4 mm); although other dimensions are contemplated by the invention. This cutout reduces the overall weight of the frame/folder. It also allows a mail piece to nest inside the frame, such that the overall thickness is minimized. In this design, the edges of the folder do not nest in the frame. Instead, the folder is positioned flush against the frame, and therefore adds to the overall thickness.

To ensure that the frame/folder expands in only one direction, this design incorporates a piece of thin, inflexible material 11212 (such as spring steel) attached to one side of the frame and covering the entire area of the cutout. This thin, inflexible material is referred to as a backer.

The folder includes a rigid rectangular sub-frame 11206. The sub-frame may be made out of plastic. The sub-frame has two long, horizontal hinges 11213 at the top, and two more hinges 11214 at the bottom. These hinges can be living hinges. The very top and the very bottom of the sub-frame are mounted flush to the frame. In this hinge configuration, weight of the mail piece and the sub-frame tends to hang downwards and moves the sub-frame closer to the frame. Therefore, the frame/folder is biased closed by gravity and is thinnest in this closed position.

A portion of the sub-frame 11206 has a cutout 11215. The area of the cutout allows an "end-effecter" or vacuum pick-off head to act through the sub-frame on the mail piece. Such action can be that for extracting a mail piece from the frame/folder. The end-effecter can utilize vacuum, friction, or some other means to extract the mail piece. Alternatively, such end-effecter could serve to push and/or pull the mail piece.

The cutout 11215 can have any of a variety of patterns in accordance with the invention. For example, it could be rectangular, circular, an elongated slot, be oval shaped, diamond shaped, or triangular. It could also be a pattern of multiple shapes. For example, the cutout could comprise multiple horizontal slots. The cutout could also be in any of a variety of positions. For example, the cutout could be in a bottom corner, with all the mail pieces justified to that corner of the frame/folders. It could also be across the entire bottom of the sub-frame. This cutout would have the additional advantage of allowing for optical determination of the presence of a mail piece within a frame/folder.

In certain embodiments, this frame/folder design would open for extraction via vacuum suction serving to pull the sub-frame and/or the mail piece away from the frame. In other embodiments, the sliding motion of the mail piece will sufficiently wedge open the folder for extraction. In other embodiments, actuation tabs can be connected to the sub-frame to allow opening the frame/folder for extraction.

Figure 11R:
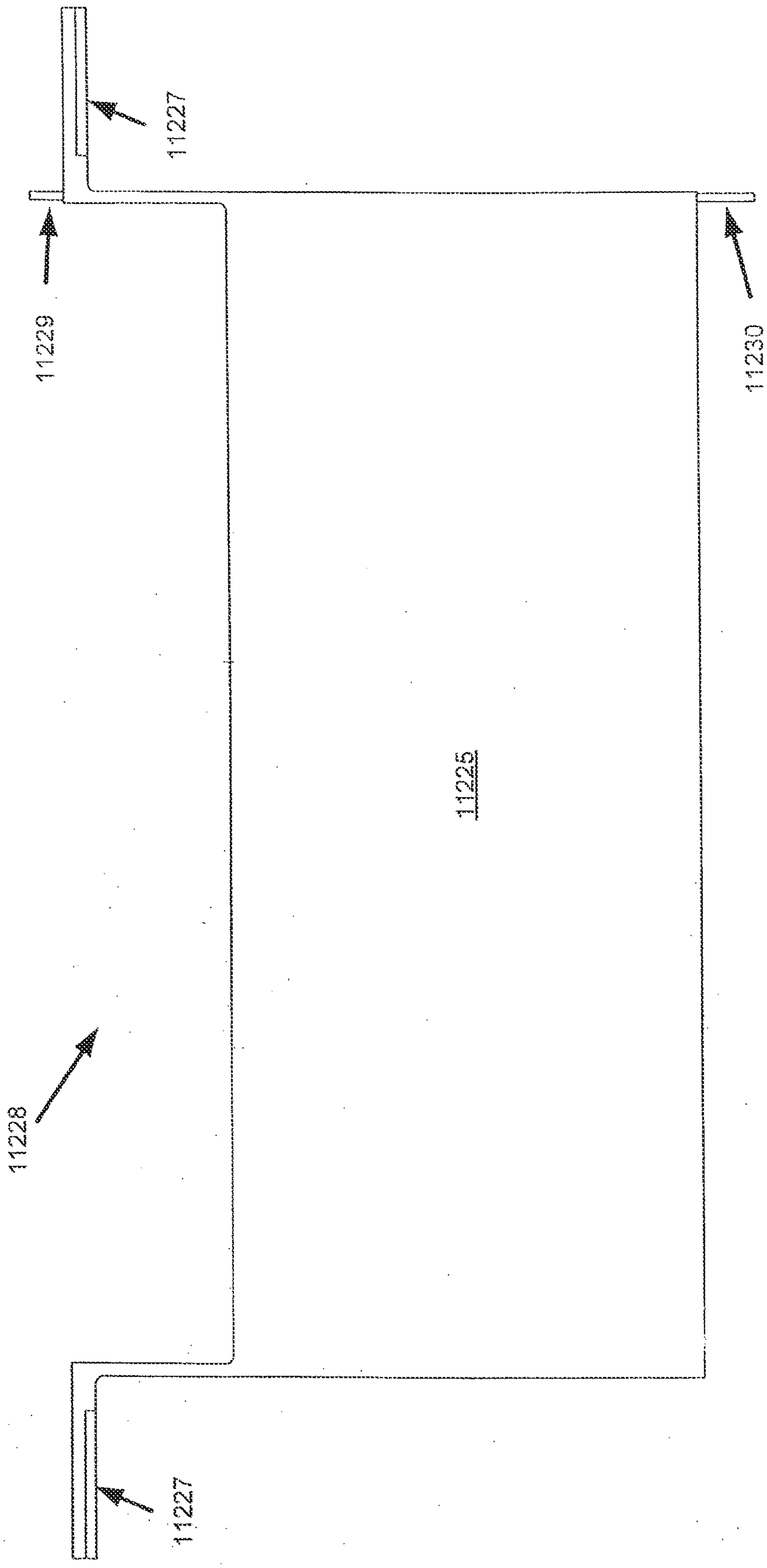
FIG. 11R shows an embodiment of individual frames for sorting mail in accordance with aspects of the invention.

FIG. 11R shows, in a front view, an alternative frame/folder in accordance with aspects of the invention. This frame/folder 11225 can be configured to share certain attributes with other designs, but it is particularly adapted to be used with a right angle divert (RAD) of a roller conveyance system, shown in FIG. 9U, where a frame/folder F, like that of 11225, is depicted. The frame hangs from horizontal tabs 11227, which tabs are supported on respective sets of rollers. Between the tabs 11227, the top of the frame is recessed at 11228 to prevent interference with rollers as the frame passes through the divert, as shown in FIG. 9U. One or both of the horizontal tabs may have a vertical pin 11229 protruding upward. One or more vertical pins 11230 may protrude downward. While the frame passes through a divert, the pins travel in guide tracks. The guide tracks include a cam-diverting mechanism. The cam directs the pin down either the divert track or the main track, thus causing the frame to either divert or go straight.

Figure 11S:
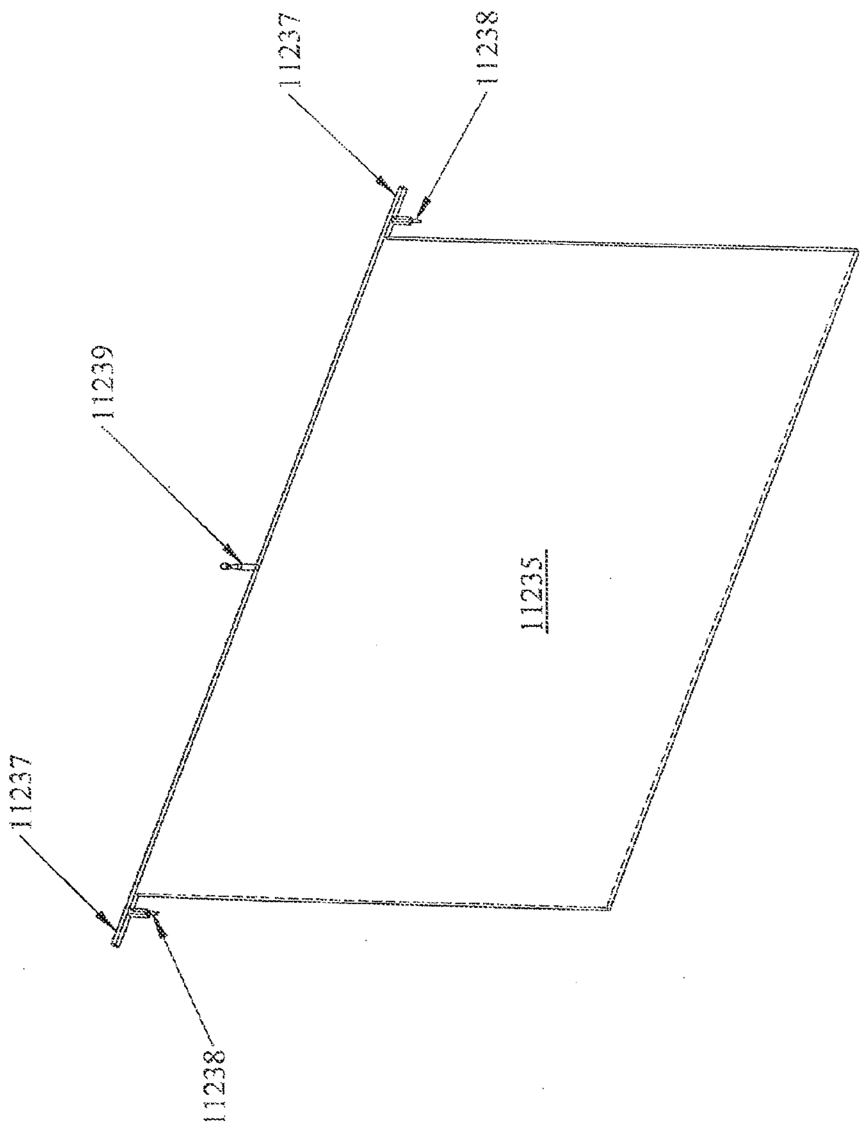
FIG. 11S shows an embodiment of individual frames for sorting mail in accordance with aspects of the invention.

FIG. 11S shows an alternative frame/folder in accordance with aspects of the invention. This frame/folder 11235 can be configured to share certain attributes with other designs, but it is particularly adapted to be used with a right angle divert (RAD) of a pinch belt divert mechanism and tooth belt conveyance system, shown in FIGS. 9O and 9P, where a frame/folder F, like that of 11235, is depicted. The frame 11235 includes horizontal tabs 11237, each of which having a downwardly projecting vertical pin 11238 which engage the toothed belts on each side, which support and transport the frame. As explained in connection with FIGS. 9O and 9P, when the frame is to be diverted, it is lifted out of the toothed belts and engaged by intermediate friction belts via a center top pin 11239. The friction belts support the frame and transport it until it is above the toothed belts of the new pathway. When the vertical downward pins are over the toothed belts of the new pathway, the friction belts release the center pin 11239, such that the frame drops into the toothed belts, and commences to travel along the new pathway.

Figure 11T:
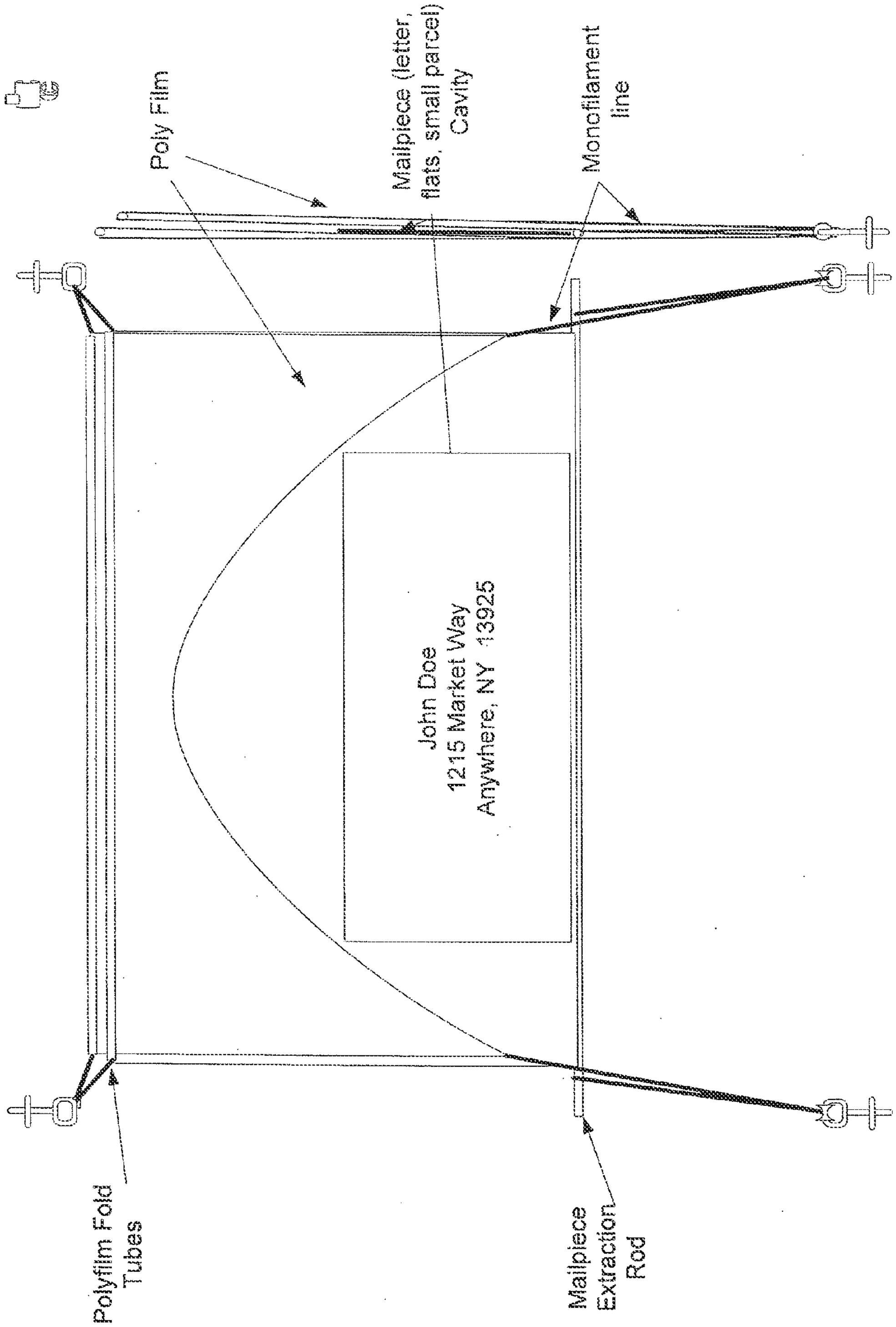
FIG. 11T shows an embodiment of individual frames for sorting mail in accordance with aspects of the invention.

As shown in FIG. 11T, the mail piece frame is made of thin plastic film (e.g., polyfilm), monofilament line and several hooks. It also would be large enough to contain (length of 15" and height of 12") the largest flat mail piece. Its overall thickness of the empty frame should be negligible to minimize storage space. Because of the way the frame is folded, as the extraction rod shown in FIG. 11T is raised, the mail piece is also raised. The mail piece is extracted when the extraction rod is fully raised. A mail piece holder is constructed to hold many frames side by side. The extraction rod can be raised to about an inch of the top when the mail is to be delivered by a postal carrier. This is enough to still hold the mail piece captive, but will allow the carrier to thumb through the addresses. Therefore the mail piece frame does not need extensive machinery to extract the mail piece.

Figure 11U:
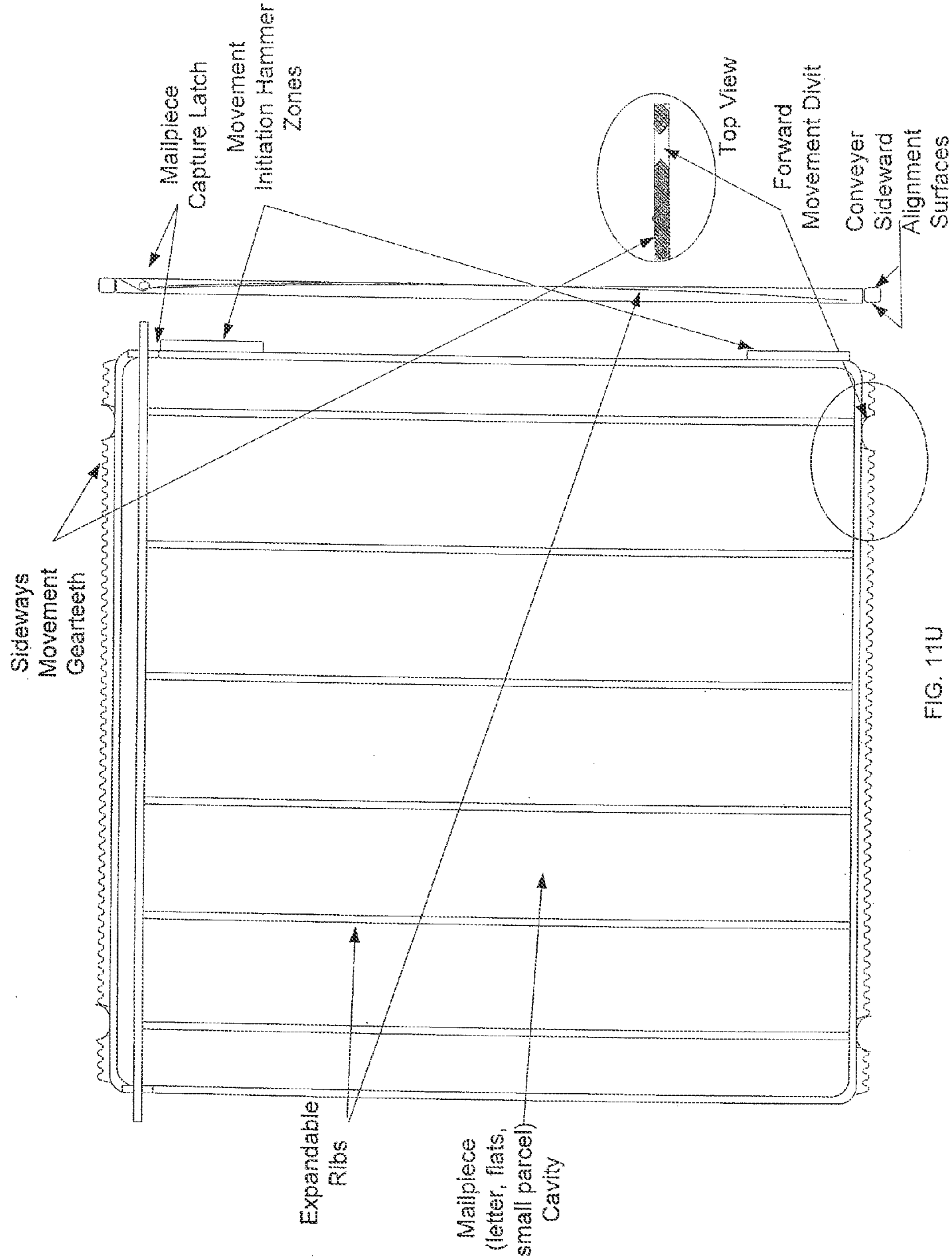
FIG. 11U shows an embodiment of individual frames for sorting mail in accordance with aspects of the invention.

FIG. 11U shows an alternative embodiment of the frame. As shown in FIG. 11U, the frame has expandable ribs running up and down that are spaced to allow a device to vacuum unload the mail from the frame. As such, the frame should be expandable to hold the largest width of mail piece (1.3"). Mail pieces that are thicker than 0.25 inches on the transport or 0.125 in the storage area would use the same expandable container, but the system would allocate more than one slot to prevent interference with the container on the next slot on the conveyor.

As also shown in FIG. 11U, the frame includes alignment tabs, sidewall alignment surfaces and sideway movement gear teeth. The alignment tabs, sidewall alignment surfaces provide for alignment in the container and on the conveyor, respectively. The gear teeth allow for sideway movement, e.g., for movement onto other conveyors, using a gear and worm system, known to those of skill in the art. The frame additionally includes a capture latch and movement initiation mechanisms. The capture latch may be conveying on the conveyor or holding in the container.

Figure 11V:
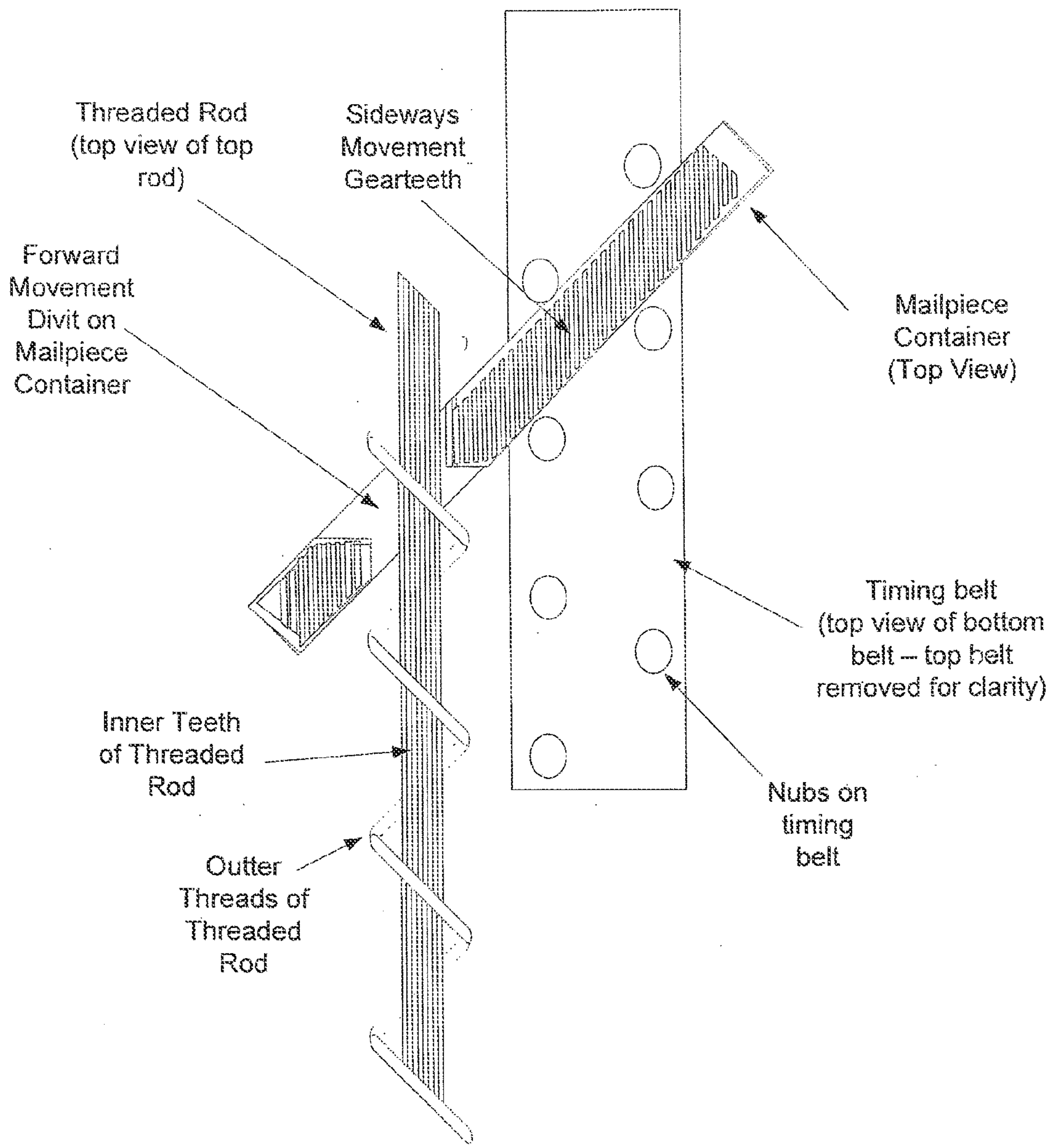
FIG. 11V shows the frame of FIG. 11U being transported on a transportation device in accordance with aspects of the invention.

Using the frame embodiment of FIG. 11U, for example, the mail piece frame can ride on a conveyor at 45 degrees. The frame of FIG. 11U can be transported on two conveyors at right angles, with a threaded rod and a belt with timing nubs. As such, the frame can be conveyed primarily with a Teflon timing belt (cogged belt) with nubs designed to keep the containers in alignment. Assisting also in keeping the alignment is a designed threaded rod. When the mail piece is being conveyed down the conveyor, threaded rods are over the "forward movement divots" in the container (See, FIG. 11V). The outer threads on the rods only the frame when it gets slightly out of alignment. Because of the divots the inner teeth on the rod do not touch the frame. When the frame needs to be conveyed sidewards, a solenoid initiated pin contacts the "movement initiated hammer zone" on the side of the container. This stops the forward motion of the frame and initiates the sideward motion. As the frame moves sidewards, the inner teeth of the threaded rods contact the "sidewards movement gear teeth". The movement of the threaded rod mates with the gear teeth and reliably diverts the container off the conveyor. A similar threaded rod and timing belt is waiting to capture and move the container.

Output Packaging of Mixed Mail Pieces

The present invention relates to an apparatus for the output packaging of mixed mail pieces. More particularly, the invention provides for the collection of mail pieces into one homogenous mass for handling and/or transportation after such mail pieces, such as letters and flats, have completed processing within a mail processing system. In this regard, the invention allows mail pieces of mixed dimensions to be collected into a uniform stack and then be moved into a transportable container. Moreover, the apparatus of the invention provides for mixed mail pieces to be intermixed and handled automatically into a transportation container or packaging.

To these and other ends, the invention relates to an apparatus for output packaging of mixed mail pieces after the mail pieces have completed processing in a mail processing system. More particularly, the apparatus includes a staging area for receiving a stream of stacked mixed mail pieces, a stream of empty containers, each of the empty containers being adapted to contain a predetermined segment of the mixed mail pieces, and a plurality of stack-segmenting elements movable selectively and individually from outside the stream of stacked mail pieces to within the stream, whereby a containerable stack segment is created at the staging area by at least a downstream one of the stack-segmenting elements and an upstream one of the stack-segmenting elements. The apparatus further includes a slide panel for receiving, from the staging area, the containerable stack segment held by the upstream and downstream stack-segmenting elements, the slide panel being movable from a receiving position to a releasing position, whereby movement of the slide panel to the releasing position exposes the containerable stack segment held by the upstream and downstream stack-segmenting elements to one of the empty containers. The stack segment is then released by the stack-segmenting elements and the stack segment is positioned within the one of the empty containers.

According to a particular embodiment, the plurality of stack-segmenting elements takes the form of a plurality of paddles selectively positionable within the stream of mixed mail pieces. The paddles are effective for maintaining the perpendicularity of the mail pieces relative to a reference support surface. More particularly, according to such embodiment, the plurality of paddles includes three such paddles. A first of the constitutes a downstream paddle for engaging a downstream end of the containerable stack segment, whereas second and third paddles are upstream paddles which are movable alternately to replace one another in positions for (1) retaining the stream of mixed mail pieces, and (2) creating the containerable stack segment with the downstream paddle.

According to another aspect of the invention, the stream of empty containers is positioned along a path lower than a height of the slide panel. Thereby, successive ones of the empty containers are positionable directly beneath the slide panel, whereby the release of the containerable stack segment by the stack-segmenting elements allows the stack segment to fall by means of gravity into the one of the successive ones of the empty containers. In a particular embodiment, the slide panel is movable to the release position in a direction away from containers containing respective mixed mail stack segments.

According to a particular embodiment, each of the empty containers has a volume substantially equal to a volume of respective ones of the containerable stack segments formed by the apparatus. Further according to a particular embodiment, the containerable stack segment is held by the upstream and downstream stack-segmenting elements by means of pressure applied toward each other to compress the stack segment. Further, the stack segment is released by means of the upstream and downstream stack-segmenting elements releasing the pressure.

The present invention contrasts with conventional mail-processing systems, in which mail pieces are not processed and outputted in a mixed mail stream having a variety of dimensional characteristics. Rather than requiring human intervention to containerize the processed and outputted mixed mail pieces, the present invention provides an automated apparatus for receiving and containerizing such mixed mail stream.

Figure 12:
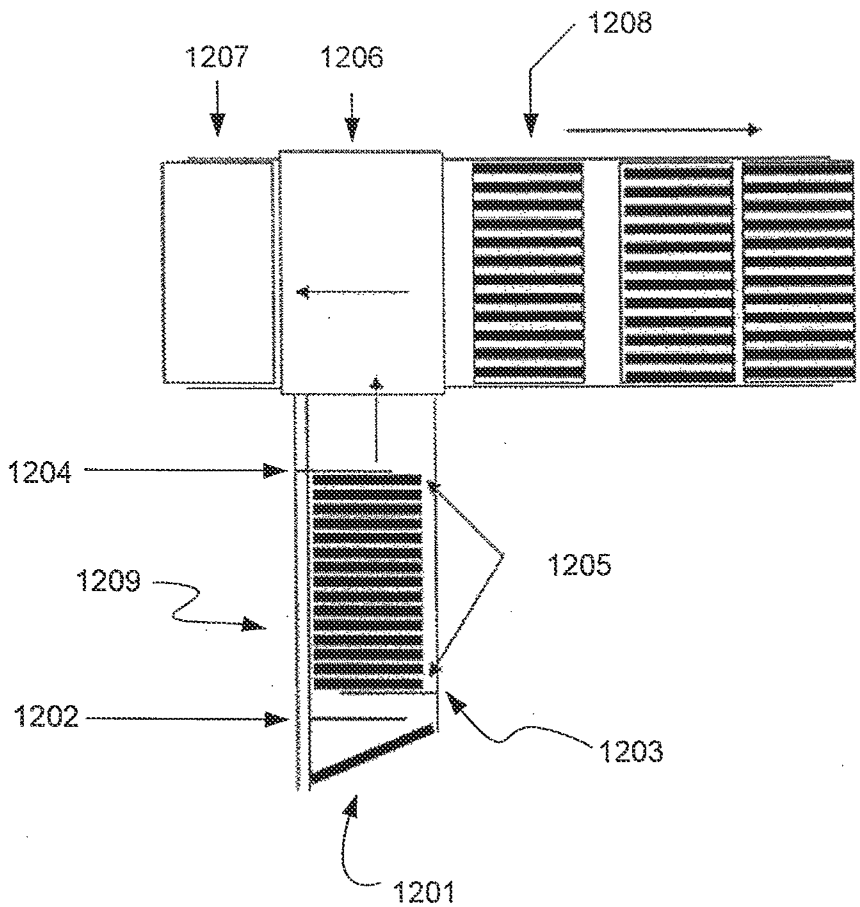
FIG. 12 is a schematic top view of an apparatus for outputting packaging of mixed mail pieces in accordance with aspects of the invention.

In this regard, and with reference to FIG. 12, a stream of mixed mail pieces 1201 enters a staging area 1209 of the conveyor apparatus, such mail pieces having been stacked by means of a mixed mail stacker arrangement (not shown), which is well-known to those skilled in the art and common in the mail processing industry. According to the invention, through the use of a plurality of stack-segmenting elements, here in the form of three paddles 1202, 1203, and 1204, the mail stack 1205 is managed to a size that can be accommodated by the transportable container 1207 to which it is advanced. That is, the paddles create a containerable stack segment having a volume substantially equal to a volume of respective ones of the transportable containers. In addition, the paddles 1202, 1203, and 1204 maintain perpendicularity of the mail pieces with reference to a reference support surface, such as the mail stacker's bottom plate or deck. The paddles can be driven, e.g., rotated, by use of a solenoid or a gear system, both known to those of ordinary skill in the art.

When the process according to the invention is initiated, the paddle 1204 can be considered a downstream paddle and is positioned just beyond the upstream paddle 1202. As the stream of mixed mail pieces 1201 advances and the mail stack 1205 has reached a predetermined size for the transportable container 1207, paddle 1203 is moved down into place in the front of the mail stack 1205, thereby separating the desired mail stack 1205 from the influx of new mail pieces 1201. The sized mail stack 1205 is conveyed to a slide panel 1206 between the paddles 1202 and 1204. The paddles 1202 and 1204 slightly compress the mail stack 1205 by being moved closer together and they move in unison towards the slide panel 1206 with the sized stack 1205.

A stream of empty transportable containers 1207 is fed by means of a conveyance such as, for example, driven rollers or a belt drive, slightly below the level of the slide panel 1206. An empty transportable container 1207 is in direct vertical position under the slide panel 1206 so that the mail stack 1205 can be dropped into the container. The slide panel 1206 is made to slide in the direction of required mail edging. This action ensures that mail pieces are maintained justified to the desired edge. Additionally, the direction of travel of the slide panel 1206 is such that it becomes positioned over the empty transportable container 1207. That is, the slide panel is not moved in the direction of filled transportable containers 1208, so that the slide panel 1206 does not compete for space occupancy with mail pieces in the filled transportable containers 1208, exposing the compressed mail stack 1205 to the empty transportable container that is in direct vertical position beneath the slide panel 1206. The paddles 1202 and 1204, which have maintained the stack 1205 in position, are then driven slightly away from each other, thereby releasing the compression force on the mail stack 1205 and allowing the force of gravity to drop the homogenous mass into the awaiting empty transportable container 1207.

Once the mail stack 1205 has dropped into the transportable container 1207, the slide panel 1206 is returned to its original position to receive a successive stack of mail pieces. The filled transportable container 1208 is moved in the same direction of travel as the empty transportable container 1207 had been directed by the conveyance. The paddle 1204 is moved to slip in place behind the upstream paddle 1203 that retains the new influx of mail, thereby creating a new mail stack 1205, while the other upstream paddle, i.e., paddle 1202, rotates up and moves forward into a position in preparation of separating the newly created mail stack 1205 from the continuing influx of new mail pieces 1201.

During the above-mentioned output packaging of mixed mail pieces, the paddles are moved in the following manner. Paddle 1204 waits behind paddle 1202 or 1203. Paddle 1202 or 1203 then separates the new influx of mail pieces from the desired mail stack. The upstream paddles 1202 and 1203 then alternately replace one another as the operation of a paddle that separates the influx of new mail 1201 from the desired mail stack 1205, and the operation of a paddle that compresses, conveys, and decompresses/drops the desired mail stack 1205 in conjunction with paddle 1204.

According to an additional embodiment, in place of the tray insertion and take-away conveyor system, a shrink sleeve bagging device can be installed at the end of the stacker. The shrink sleeve bagging device would then accept mail pieces directly into it, and use heat to shrink a thin plastic material around the mail stack, thereby packaging the mixed mail pieces into one homogenous mass package, similar to the means by which flat mail pieces are bundled or hay is baled.

The design of the apparatus here described allows for automatic sweeping of a filled mail stacker and transportable container filling. The apparatus here described can be utilized by any system that packages or containerizes mail piece-like articles, including single or multi-sheet documents, and has need to handle the multiplicity of pieces as one homogenous mass. This system can be used with any combination of mail pieces such as, for example, flats and letters, or can be used with folders/frames as described in the instant application.

Receiving Sort Plans and Configuration Information from a Centralized Sever in a Facility-Wide Sorting and/or Sequencing System The invention is directed generally to mail handling and processing and, more particularly, to a method and system for receiving sort plans and configuration information from a centralized server in a facility-wide mail sorting and/or sequencing system. As the facility-wide mail and flats sequencing system may contain numerous interrelated subsystems having redundant components, a fault in any one component may cause any (or all) subsystems to route mail differently throughout the system. Accordingly, in embodiments, a sort plan server is provided to modify and distribute a sort plan to various subsystems. FIG. 1A may be representative of the sort plan server and subsystems in accordance with aspects of the invention.

For example, in accordance with aspects of the invention, a sort plan server may obtain a system-wide sort plan, determine the consequences of a path within the system being unavailable based upon system data from a system manager, compose individual subsystem specific versions of the sort plan based on the system data, and distribute the subsystem specific versions of the sort plan to the respective subsystems. In this manner, implementations of the invention provide the system manager the ability to acquire a system level sort plan, modify it as necessary for individual subsystems, and then forward it to the subsystems. Accordingly, in implementations, each subsystem server is directed to sequence mail pieces according to the sort plan and also to route mail pieces based upon system availabilities (or non-availabilities).

Within the conventional postal service paradigm, there is a centralized server for each processing and distribution center (P&DC) where all sort plans reside. This centralized server acts as a centralized repository for all sort plans for the P&DC, and distributes sort plans to individual Mail Processing Equipment (MPE) or Mail Handling Equipment (MHE) of the P&DC via a wide area network (WAN). These sort plans determine how mail will be sorted. For example, a sort plan controls the sorting and sequencing of the processed mail in a particular MPE or MHE. More specifically, in current mail processing systems, a sort plan determines which mail is forwarded to which pocket or holdout bin of a particular MPE or MHE.

In conventional systems, all sorting is done in independent islands of automation. Therefore all machines are independent, and each MPE or MHE retrieves its sort plans from the centralized server directly. Put another way, what is happening on one MPE or MHE does not affect the sorting taking place on another MPE or MHE. Moreover, in conventional systems, the postal service (e.g., USPS) creates sort plans for a specific machine (MPE or MHE) based upon addresses of mail that will be sorted using the specific machine. Once the postal service creates a sort plan for a particular machine for a particular group of addresses, the sort plan is run on the machine without modification and without regard to what is happening on other machines (MPE or MHE) in the P&DC.

However, in next generation sequencing systems, the sorting and sequencing of the mail may be accomplished by the paths in which the mail follows as it is processed, rather than by merely routing a mail piece into a designated output bin. For example, in the inventive facility-wide mail sorting and/or sequencing system described in this application, mail pieces may go through many subsystems, components, and paths before it is output as sequenced mail. For example, according to aspects of the invention, mail pieces may travel through any one of many presort accumulators, sequencing segments, storage segments, etc., while being arranged in a sequenced stream of mail pieces.

Moreover, in accordance with aspects of the invention, flats and letter feeders and sequencing elements are combined into machines as many subsystems, where each of these subsystems utilizes a sort plan. In embodiments, these machines may have many different sorting and sequencing subsystems, each with individual controllers running a sort plan that is distributed to the machine. Due to network topology, some subsystems are located physically on segregated data networks and may not have access to the facility WAN. For example, in embodiments of the facility-wide mail sorting and/or sequencing system, network flow of traffic is partitioned for efficiency reasons. Also, to control accessibility, some subsystems and/or components might be partitioned from the WAN. In such cases where access to the WAN is not available to a subsystem and/or component, the subsystem will not be able to access the centralized sort plan server to receive a sort plan. However, according to aspects of the invention, a sort plan server that does have access to the WAN can obtain the sort plan and distribute the sort plan to the various subsystems and/or components.

Furthermore, subsystem and component availability is a significant operational parameter in the facility-wide mail sorting and/or sequencing system. For example, in embodiments of the invention, the facility-wide mail sorting and/or sequencing system comprises many redundant paths, components, and subsystems. According to aspects of the invention, this redundancy allows mail to be routed to a different path, component, or subsystem when a particular path, component, or subsystem is unavailable (e.g., due to a jam, bottleneck, scheduled maintenance, etc.). Accordingly, in embodiments of the invention, in order to provide sort plans to remote components, and to coordinate sorting between the various interrelated subsystems and components, a sort plan server function is provided within the facility-wide mail sorting and/or sequencing system that obtains, controls, and forwards sort plans to the subsystems and/or components within the system.

Figure 13:
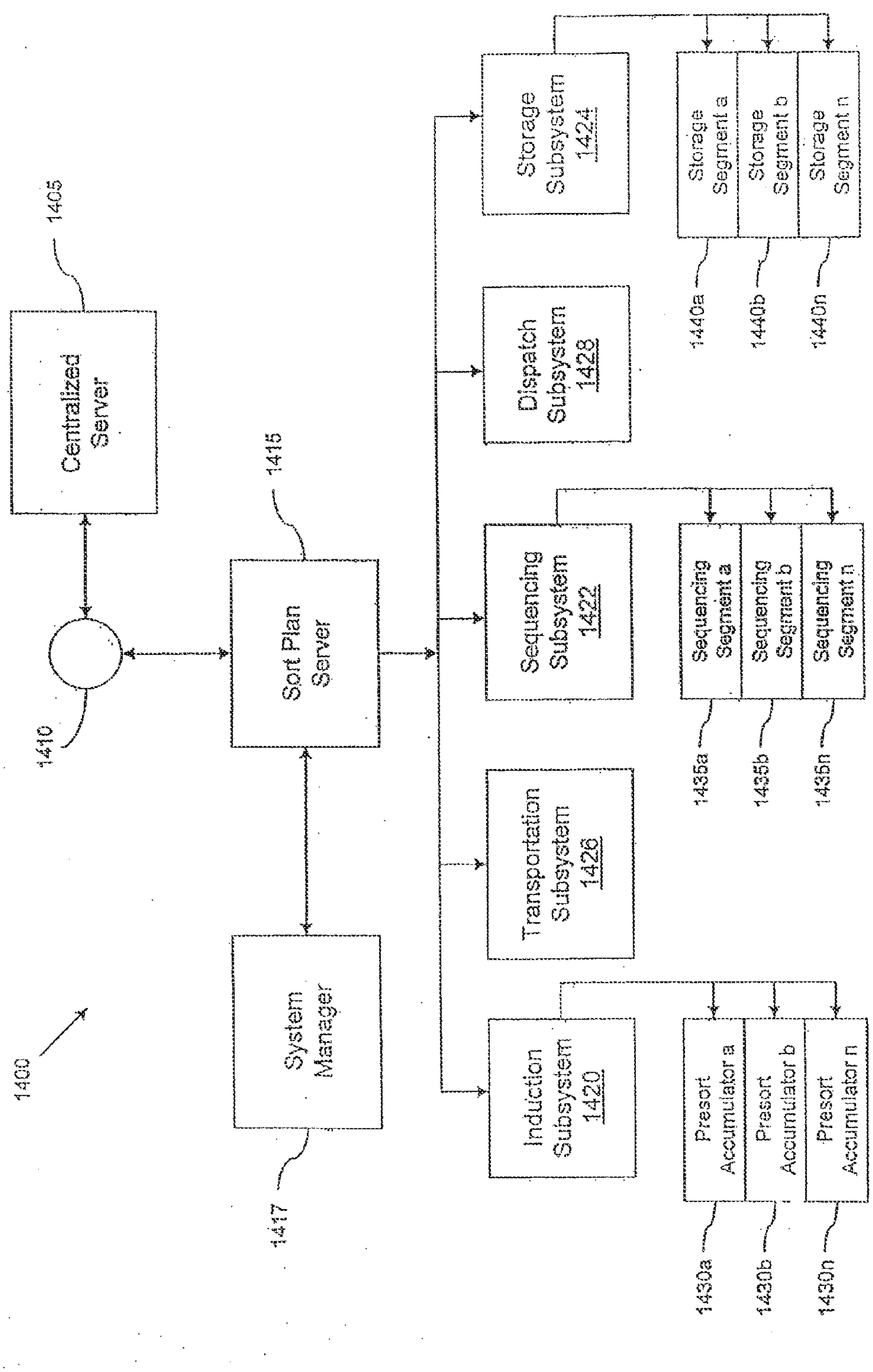
FIG. 13 shows a block diagram of a system according to aspects of the invention.

FIG. 13 shows a block diagram of a system 1400 for implementing sort plans according to aspects of the invention. A centralized server 1405 is operated and maintained by the postal service (e.g., the USPS) and may be relied upon to create sort plans. The centralized server 1405 is available to plural P&DC via the WAN 1410, as is known such that further explanation is not believed necessary.

According to aspects of the invention, a facility-wide mail sorting and/or sequencing system includes a sort plan server 1415 (e.g., system level sort plan server)_that has access to the centralized server 1405 via the WAN 1410. The sort plan server 1415 may be implemented on the computing infrastructure of FIG. 1A. In this manner, the sort plan server 1415 can obtain a system-wide sort plan from the centralized server 1405. In embodiments, the sort plan server 1415 is implemented in a computing infrastructure, such as that described with respect to FIG. 1A. For example, the sort plan server 1415 may comprise software and/or hardware arranged to perform the functions described herein. The sort plan server 1415 may be comprised in or communicatively connected to a system manger 1417, as described in greater detail below and in other sections of this application.

In embodiments, the sort plan server 1415 is communicatively connected to subsystems of the facility-wide mail sorting and/or sequencing system, including one or more of the following subsystems, but not limited to, induction subsystems 1420, sequencing subsystems 1422, storage subsystems 1424, transportation subsystems 1426, and dispatch subsystems 1428. The subsystems 1420, 1422, 1424, 1426 and 1428 are described in detail in other portions of the application, such that further explanation beyond what is described below is not believed necessary. For clarity purposes only, the subsystems are described with reference numerals that may not be consistent with other sections of the application. This is done merely to place these subsystems in context with the present section and related components. However, those of skill in the art should realize that the subsystems described herein may be interchanged with the subsystems described in other sections of the instant application. The sort plan server 1415 may be connected to the subsystems 1420, 1422, 1424, 1426 and 1428 in any suitable manner, including, but not limited to: Internet, intranet, LAN, wireless, etc.

In implementations of the facility-wide mail sorting and/or sequencing system, each subsystem may comprise a plurality of individual components. For example, the induction subsystem 1420 may comprise a plurality of presort accumulators 1430*a* . . . *n*, the sequencing subsystem 1422 may comprise a plurality of sequencer segments 1435*a* . . . *n*, and the storage subsystem 1424 may comprise a plurality of storage segments 1440*a* . . . *n*. Although three components are shown, each subsystem 1420, 1422, 1424, 1426 and 1428 may have any number of components. Moreover, the invention is not limited to the specific components shown (e.g., presort accumulators 1430*a* . . . *n*, sequencer segments 1435*a* . . . *n*, and storage segments 1440*a* . . . *n*); instead, it is contemplated that the subsystems will comprise other types of components besides those shown.

According to aspects of the invention, the system manager 1417 is operatively connected to each of the components such that the system manager 1417 can receive and/or gather data regarding the operation status of each component. For example, the system manager 1417 is configured and structured to detect or determine when a particular component is operating normally, is offline for any reason (e.g., maintenance), or is experiencing a problem (e.g., a jam). In embodiments, the sort plan server 1415 receives or obtains such system data from the system manager 1417. In this manner, the sort plan server 1415 may operate to customize the system wide sort plan received from the centralized server 1405, and to distribute the customized sort plan (or appropriate portions of it) to the various subsystems and/or components. The customization and distribution may be based upon the system data received from the system manager 1417.

In embodiments, each subsystem 1420, 1422, 1424, 1426, and 1428 comprises a respective subsystem server (as represented in FIG. 1), which may receive the sort plan from the sort plan server 1415 and communicate appropriate control signals to the components included in the respective subsystem. Additionally or alternatively, each subsystem server may deliver a sort plan (instead of control signals) to one or more of its respective components. For example, in very large systems, sort plans may be delivered to both subsystems and components. The subsystem server(s) may also be implemented on the computing infrastructure of FIG. 1A.

Figure 14A:
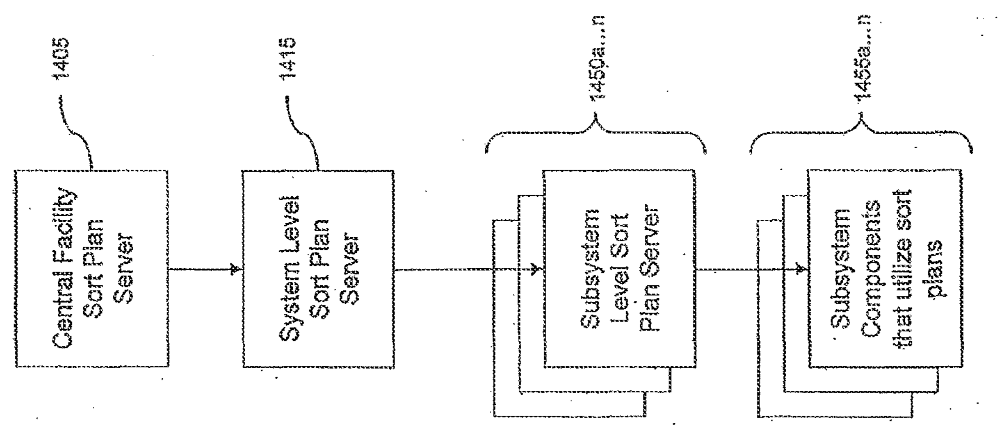
FIG. 14A shows a block diagram of a system according to aspects of the invention.

FIG. 14A shows a block diagram of a hierarchical sort plan system within the inventive facility-wide mail sorting and/or sequencing system. Similar to the manner described in FIG. 13, the sort plan server 1415 receives a system wide sort plan from centralized sort plan server 1405. Also, similar to FIG. 13, the sort plan server 1415 may modify the system wide sort plan based upon system data obtained from the system manager. However, the sort plan server 1415 need not modify the system sort plan if modification is not necessary.

Still referring to FIG. 14A, the sort plan server 1415 transmits the sort plan or respective portions of the sort plan, in modified or unmodified form, to subsystem level sort plan servers 1450*a* . . . *n* associated with the various subsystems (e.g., 1420, 1422, 1424, 1426, 1428). In the hierarchical implementation shown, each subsystem level sort plan server may further modify the sort plan and distribute the sort plan to the respective components 1455*a* . . . *n* associated therewith. In this manner, a top level sort plan server receives (and possibly modifies) the sort plan, and distributes it to individual subsystems, which in turn receive (and again possibly modify) and distribute it to subsystem components 1455*a* . . . *n*. The invention is not limited to the particular number of levels of the hierarchy shown; instead, more levels of granularity of modification may be utilized. Also, the sort plan servers 1415 may be combined with other elements such as, for example, system controllers, processors, etc.

Figure 14B:
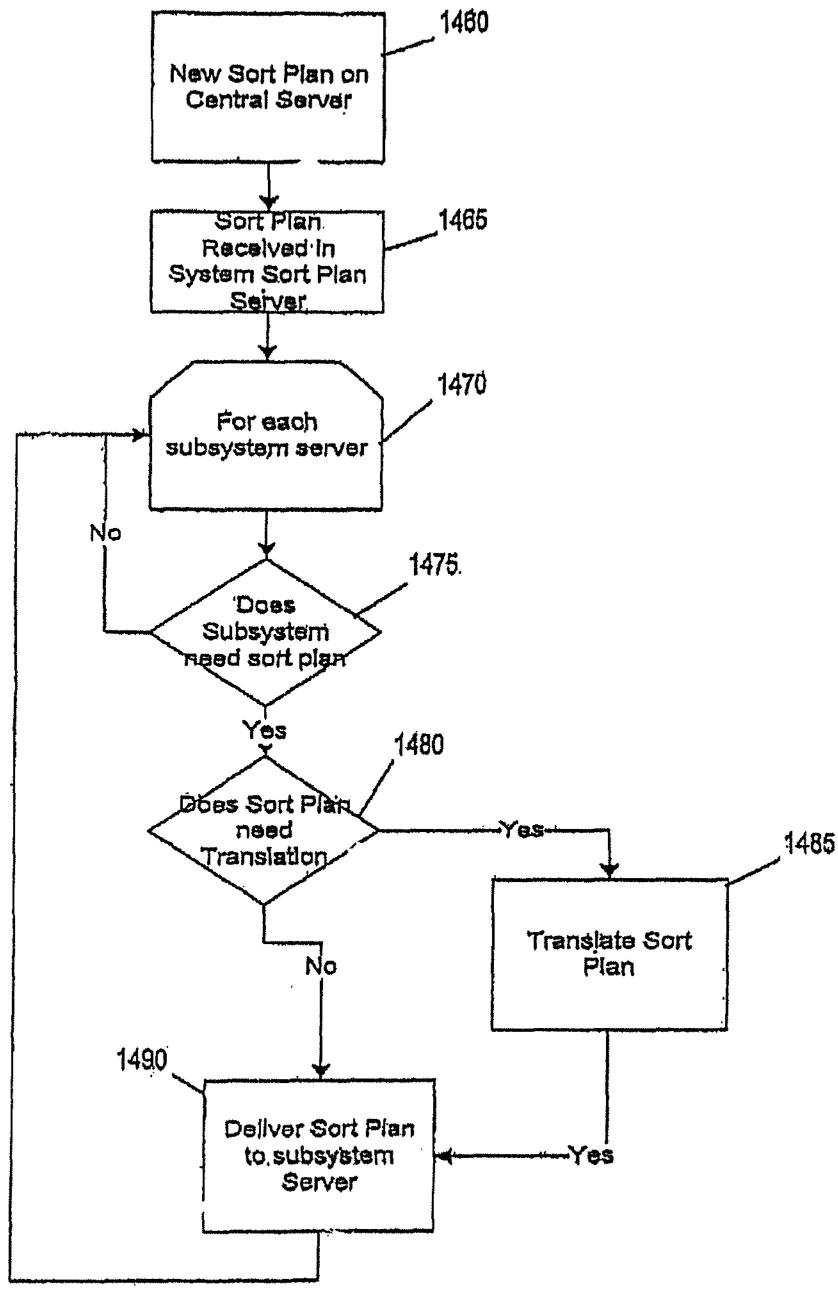
FIG. 14B shows a flow diagram depicting steps of a method according to aspects of the invention.

FIG. 14B shows a flow diagram depicting steps of a method according to aspects of the invention. The method steps may be implemented, for example, in the environments of FIGS. 13-14A. At step 1460, a system-wide sort plan is created at the central server (e.g., centralized server 1405). At step 1465, the system wide sort plan is received at the sort plan server (e.g., sort plan server 1415). At step 1470, an iterative process is begun where the sort plan server identifies the next subsystem (e.g., similar to subsystems 1420, 1422, 1424, 1426 and 1428). This may be performed using a program control, such as that described above with respect to FIG. 1A.

At step 1475, the sort plan server determines whether the subsystem needs the sort plan. Not all subsystems require sort plan information. Accordingly, if the determination at step 1475 is no, then the process returns to step 1470, where the next subsystem is identified. However, if the determination at step 1475 is yes, then at step 1480 the sort plan server determines whether the sort plan needs customization for this subsystem. This may be performed using the program control and based upon system data received from the system manager (e.g., similar to that described above with respect to FIGS. 13-14A). For example, the sort plan server may determine that the sort plan needs modified based upon system data indicating that a path utilized by this subsystem is unavailable.

If the determination at step 1480 is yes, then at step 1485 the sort plan server modifies the sort plan. In embodiments, this is performed by the program control using system data from the system manager. For example, based upon the exemplary determination from step 1480 that a path utilized by this subsystem is unavailable, at step 1485 the sort plan server may alter portions of the sort plan to re-route mail pieces to avoid the unavailable path. For example, the sort plan server may re-route mail pieces to a different (e.g., redundant) path.

From step 1485, or when the determination at step 1480 is negative, the process proceeds to step 1490 where the sort plan server transmits the sort plan to the subsystem server. At this point, the subsystem server may execute the sort plan as is by transmitting the sort plan or control signals to components. Additionally or alternatively, the subsystem server may modify the sort plan (e.g., also based upon system data) before passing it to components.

Associating Mail Piece Identifiers with Individual Frame Identifiers and Associating Mail Piece Attributes to Either the Mail Piece Identifiers or the Frame Identifiers The invention is related to associating mail piece identifiers and mail piece attribute information with frame identifiers associated with individual frames. That is, in an aspect of the invention, each individual mail piece is associated with an individual frame used to transport the mail piece through the mail piece sortation and/or sequencing system. Thus, according to an aspect of the invention, the mail piece identifier of each individual mail piece is associated with the frame identifier into which the mail piece is loaded. As the mail piece travels through the system and is processed, e.g., sorted and/or sequenced, the mail piece and its related attribute information may be identified by the associated frame identifier.

It should be understood that the frame identifier may be, for example, a numeric code, an alphanumeric code, a bar code, radio frequency identification (RFID), etc. or any combination thereof, that may be scanned as the frame moves through the system. Moreover, in embodiments, each frame identifier may be permanently associated with a particular frame. As such, for a particular sorting or sequencing process, a particular mail piece is associated with a particular frame. However, upon completion of the sorting process, and the emptying of the particular mail piece from its associated frame, the frame may be used to contain a new mail piece for a new sorting process. As such, upon commencement of the new sorting process, the association between the particular frame and the first associated mail piece would be disregarded, and the new mail piece would be associated with the particular frame. In this way, a particular frame identifier may remain permanently associated with a particular frame, and the association between the frames and the individual mail piece they carry may be dynamically changed and maintained in a storage unit, e.g., a database.

In embodiments, the frame itself is identified with a frame identifier. However, in further embodiments, the frames may include a transparent portion and an individual mail piece may be mounted such that the mail piece identifier (e.g., barcode or address) is visible. In this later scenario, a mail piece identifier may serve as the frame identifier.

Figure 15A:
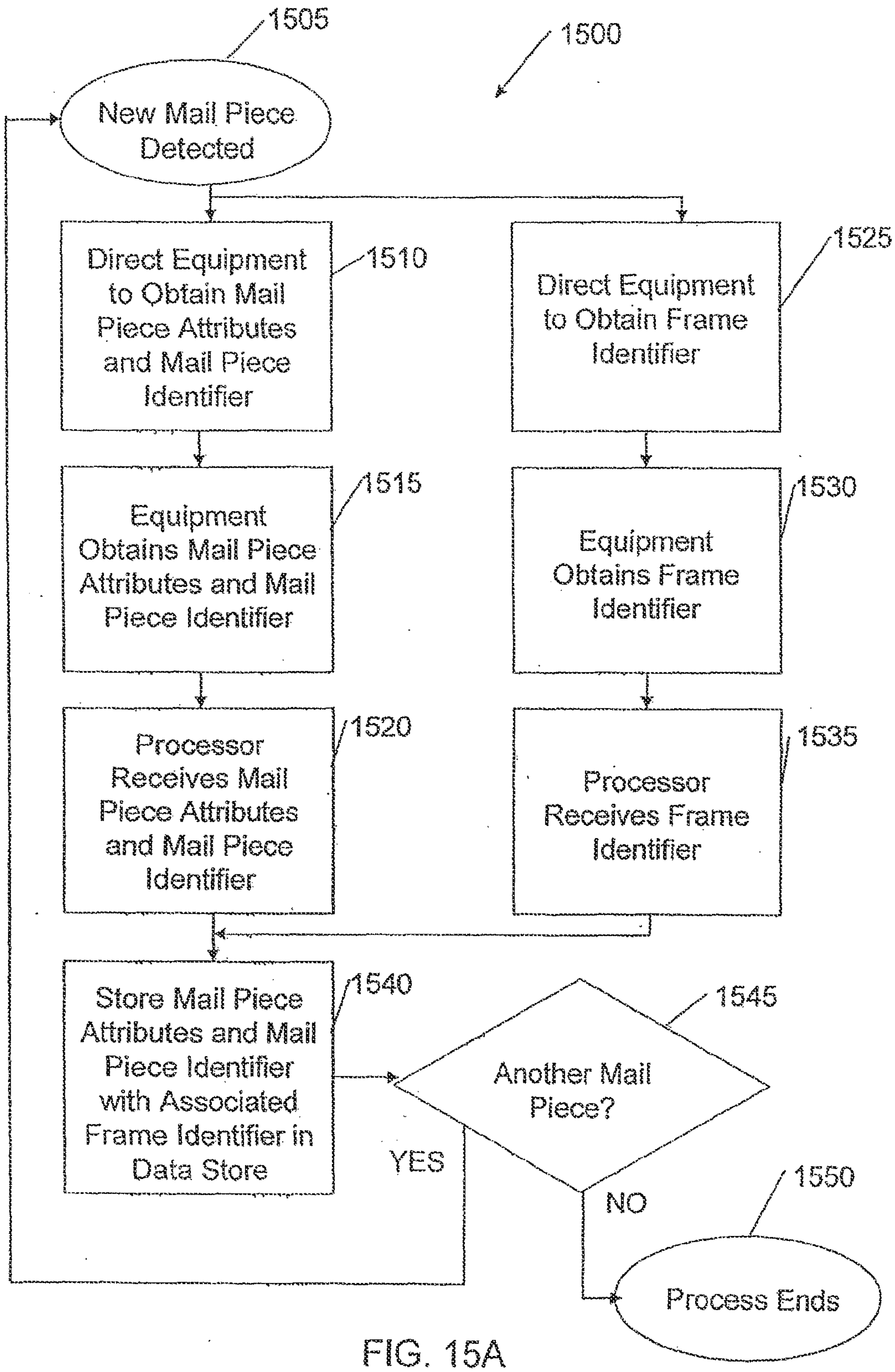
FIG. 15A shows processes for associating mail piece identifiers with individual frame identifiers and associating mail piece attributes to either the mail piece identifiers or the frame identifiers in accordance with aspects of the present invention.

FIG. 15A shows an exemplary flow 1500 for associating mail piece identifiers with individual frame identifiers and associating mail piece attributes to either in accordance with aspects of the present invention. As shown in FIG. 15A, at step 1505, a new mail piece is detected by a mail processing equipment (MPE), for example, an induction station. At step 1510, the MPE is directed to obtain at least one mail piece attribute and a mail piece identifier. In embodiments, this step may be automatically performed upon detection of the mail piece at step 1505.

At step 1515, the MPE obtains at least one mail piece identifier and at least one mail piece attribute. In embodiments, the mail piece identifiers may include one or more of: one or more bar codes; addresses; ZIP codes; RFID tags; and Indicia (Stamp) Identifier, amongst other mail piece identifiers. In embodiments, the MPE may detect mail piece attributes or may otherwise determine mail piece attributes (e.g., by retrieving determined mail piece attributes from a database via the mail piece identifiers). Furthermore, in embodiments, the at least one mail piece attribute may include: weight; length; width; height; address; return address; destination information; and data contained in the indicia (e.g., cost), amongst other mail piece attributes. At step 1520, a processor (for example, the computing device discussed in the instant application shown in FIG. 1) receives the mail piece attributes and the mail piece identifier. The mail piece identifiers and attributes may be obtained by the many systems and processes discussed in the instant application.

At step 1525, the MPE is instructed to obtain a frame identifier. In embodiments, this step may be automatically performed upon detection of the mail piece at step 1505. At step 1530, the MPE obtains the frame identifier. For example, in embodiments, a bar code reader may read the frame identifier on an individual frame used to facilitate sorting and/or sequencing. At step 1535, the processor receives the frame identifier. It should be noted that, while steps 1525-1535 are shown in FIG. 15A as occurring in parallel with steps 1510-1520, the invention contemplates that, in embodiments, steps 1525-1535 may occur after steps 1510-1520 or may occur before steps 1510-1520.

At step 1540, the mail piece identifier and/or the mail piece attributes of a particular piece of mail are associated with the frame identifier of the frame containing that particular piece of mail, and the association is stored in a storage unit, for example, a database (shown in FIG. 1). For example, the database may contain a record associating frame "n" with mail piece identifier "x" and/or may contain a record associating frame "n" with the mail piece attributes of the mail piece having the mail piece identifier "x." It should be understood that the exemplary frame identifier "n" and the exemplary mail piece identifier "x" are for explanation purposes and that the mail piece identifiers and the frame identifiers may take other formats, as described above.

At step 1545, a determination is made as to whether there are additional mail pieces for a particular sequencing/sorting process. If, at step 1545, there are no additional mail pieces, the process proceeds to step 1550, where the process ends. If, at step 1545, it is determined that there are additional mail pieces, then the process continues at step 1505.

Figure 15B:
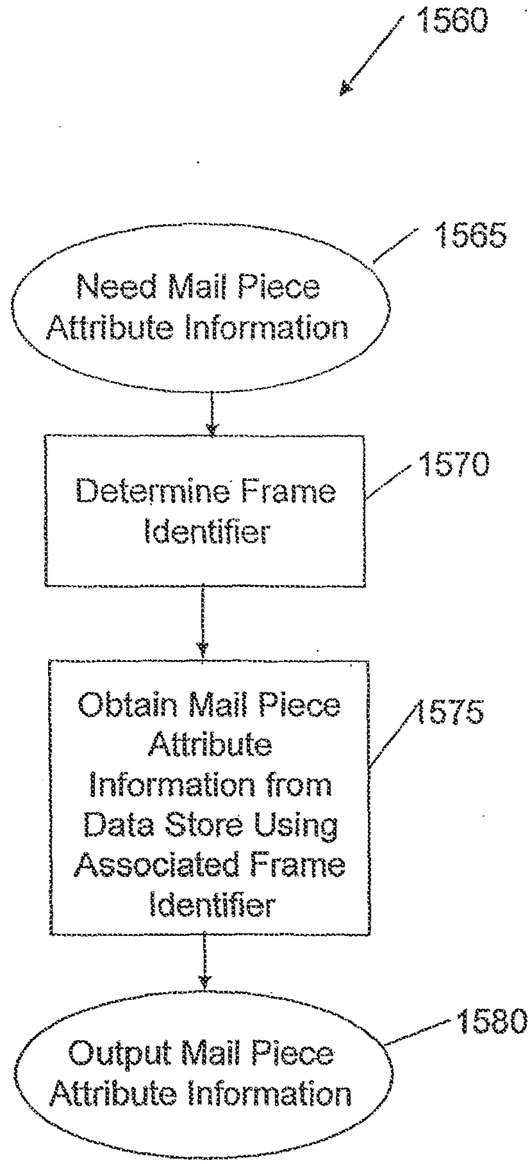
FIG. 15B show processes for obtaining associated mail piece attribute information from a storage unit using individual frame identifiers in accordance with aspects of the present invention.

FIG. 15B shows an exemplary flow 1560 for obtaining the associated mail piece attribute information from a storage unit using the individual frame identifiers in accordance with aspects of the present invention. At step 1565, a mail piece attribute information attainment process is commenced by, for example, a MPE requesting mail piece attribute information. At step 1570, the frame identifier is determined, e.g., by bar code scanning the frame identifier. At step 1575, the mail piece identifier and/or mail piece attribute information is retrieved from the data store, e.g., database, using the associated frame identifier. At step 1580, the retrieved mail piece attribute information is output (e.g., visually displayed).

According to aspects of the invention, in embodiments, mail piece attributes associated with frame identifiers may be utilized for the following advantages:

- Determining the correct size of an individual frame. This can be accomplished by knowing the size of the mail piece (e.g., an attribute) and matching the mail piece to an appropriately sized frame;
- Allocating and assigning space for the mail piece (and the mail piece in the frame) in transports, buffers, storage, and to determine capacities of transportation frames. This can be accomplished by, again, knowing the attributes of the mail piece, e.g., size, weight, etc., and appropriately matching the mail piece to a frame. Also, knowing the size of the frame will assist in determining the required space needed for storage, buffering, etc.;
- Calculating sequencing and sorting positions. For example, the invention allocates space in the sorting equipment of the frame prior to the mail piece actually being placed therein. As such, each mail piece can take up a variable amount of space in the sorting equipment;
- Routing mail pieces to hold out and reject bins. For example, mail pieces can be routed to different areas in the case of over or under size or weight of the mail pieces;
- Determining how many mail pieces fit in delivery containers. This can be accomplished by determining the weight and size of mail pieces and determining how many or which mail pieces can fit into a known size container; and/or Determining machine volumes per mail piece attribute for maintenance purposes. For example, since mail piece identifiers may not be readily accessible while contained in a temporary individualized frame, the mail piece information can be "looked up" by association with frame identifier.

It should also be realized that there is a distinct advantage to putting each mail piece within a temporary individual frame (used only in the sequencing/sortation machine) prior to sequencing/sortation for the sequencing/sortation process. For example, the frame provides a common handle for automation for mail processing. Moreover, the frame facilitates transporting and sorting of the frames in a stack, which reduces speed while increasing throughput.

Coordination and Control of Path Flows in a Facility-Wide Sorting and/or Sequencing System The invention relates generally to transportation of objects within a facility and, more particularly, to a method and system to control and coordinate the movement of mail containers (e.g., frames) through a transport of redundant paths in a facility-wide letters/flats mail sorting and/or sequencing system (also referred to herein as a facility wide sorting and/or sequencing system). According to aspects of the invention, a Frame Routing Agent (FRA) coordinates movement of mail pieces between components of subsystems of the facility wide sorting and/or sequencing system by maintaining a system transport map of data that defines transportation paths between the components of subsystems of the facility wide sorting and/or sequencing system. The FRA routinely updates the system transport map based upon notifications about the status of paths received from the subsystems. When a shuttle of frames is to be moved from one component to another, the FRA determines a best path based upon the available paths as set forth in the data of the system transport map. In this manner, the movement of letters and flats mail pieces contained in frames in a facility wide sorting and/or sequencing system is controlled to perform best-path routing, avoid bottlenecks, and re-route due to jams and offline path segments. The FRA provides an improvement over mail sequencing machines in use today that do not provide multi-path routing capability for redundancy.

Figure 16A:
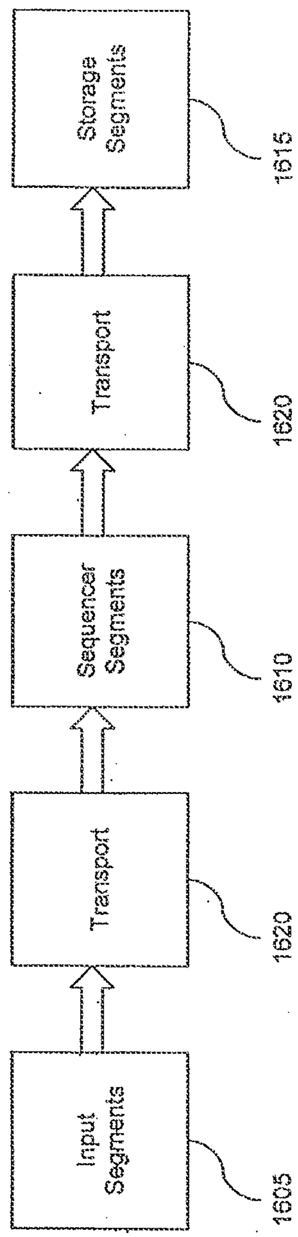
FIG. 16A shows a block diagram of a system in accordance with aspects of the invention.

FIG. 16A depicts a block diagram of movement of mail pieces through a facility wide sorting and/or sequencing system according to aspects of the invention. In embodiments, the facility wide sorting and/or sequencing system comprises subsystems including input segments 1605, sequencer segments 1610, and storage segments 1615 (all of which are described in greater detail in other portions of this instant application). Each subsystem 1605, 1610, 1615 comprises various components (e.g., machinery) that are structured and arranged to perform various processes that cooperate to ultimately produce a stream of sequenced mail pieces (e.g., letters and flats) after only a single induction of each mail piece into the system. In further embodiments, each subsystem has plural redundant components to provide necessary capacity for peak processing times, and also to provide redundancy in the event of machine failure. Moreover, although particular subsystems are shown in FIG. 16A, the invention is not limited to use with these subsystems, but rather, could be used with any subsystems of the facility wide sorting and/or sequencing system.

In embodiments, the facility wide sorting and/or sequencing system also includes at least one transport controller 1620 that coordinates the movement of mail pieces between components of the subsystems 1605, 1610, 1615. For example, the transport controller 1620 operates to control and/or coordinate the loading of frames into a shuttle from a component "A" (e.g., a presort accumulator), the movement of the shuttle from component "A" to component "B" (e.g., a sequencing segment), and the unloading of the frames from the shuttle into component "B" (e.g., via a frame extractor).

Figure 16B:
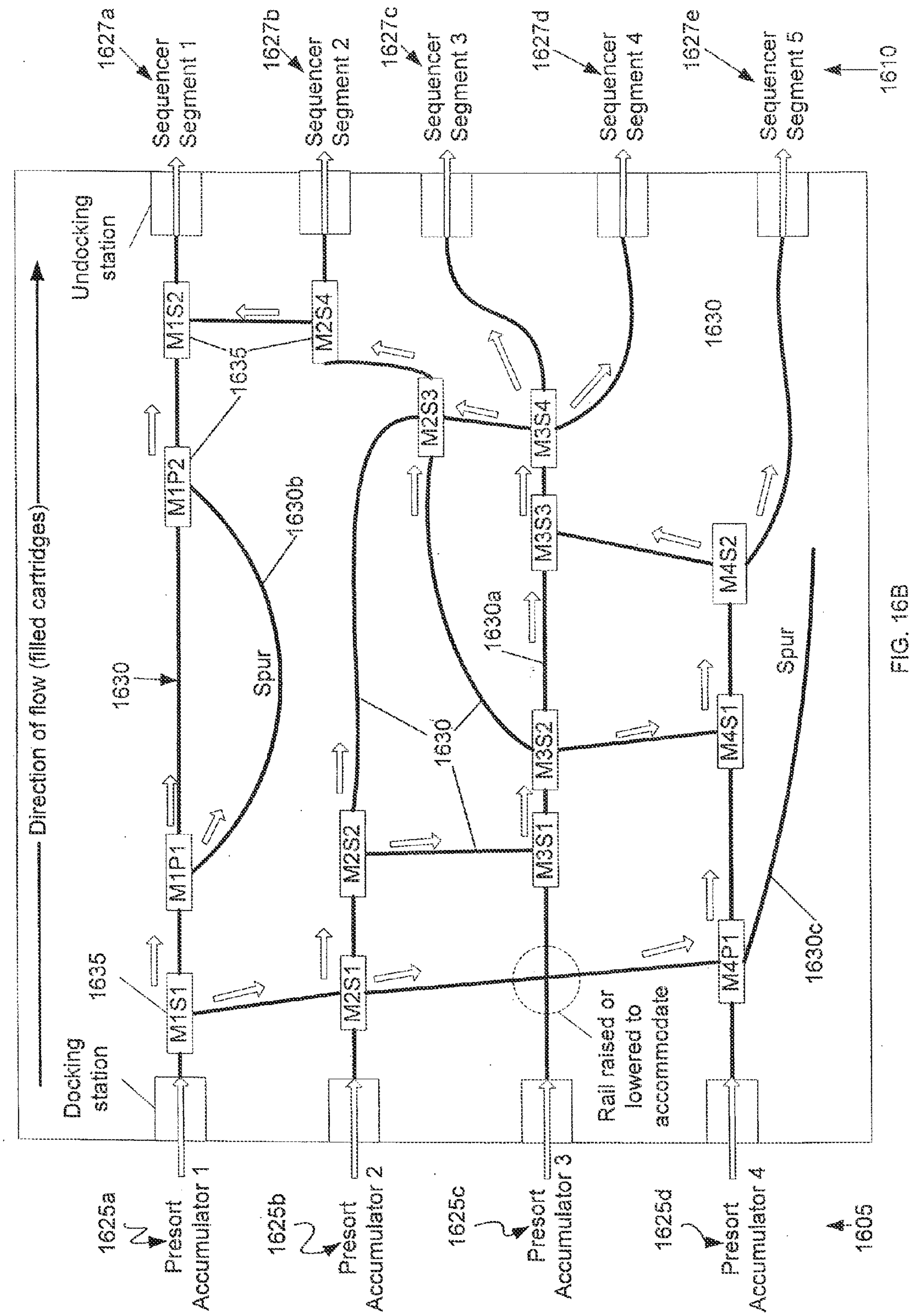
FIG. 16B shows an exemplary transport network in accordance with aspects of the invention.

FIG. 16B shows an exemplary embodiment of a transport segment between input segment subsystem 1605 and sequencer segment subsystem 1610. In the exemplary depiction, input segment subsystem 1605 comprises four components: first presort accumulator 1625*a*, second presort accumulator 1625*b*, third presort accumulator 1625*c*, and fourth presort accumulator 1625*d*. Also, sequencer segment subsystem 1610 comprises five components: first sequencer segment 1627*a*, second sequencer segment 1627*b*, third sequencer segment 1627*c*, fourth sequencer segment 1627*d*, and fifth sequencer segment 1627*e*. The invention is not limited to the specific number of components shown, but rather, each subsystem of the facility wide sorting and/or sequencing system may contain any number of components depending on the size and requirements of the facility.

In FIG. 16B, the black lines between the components 1625*a-d* and 1627*a-e* represent transport lanes 1630 for moving shuttles. The transport lanes 1630 may comprise, for example, powered roller conveyors, belt conveyors, overhead conveyors, etc., which are arranged to physically transport a shuttle from one location to another. Moreover, the boxes at intersecting transport lanes 1630 represent switches 1635 that are structured and arranged to divert a shuttle from one transport lane to another. Conveyors and switches are well known, such that further explanation of their basic operation is not believed necessary. It is noted that the network of lanes and switches shown in FIG. 16B is merely exemplary, and the invention is not limited to this example. Instead, any suitable combination of lanes and switches may be used between components of subsystems.

As can be seen from FIG. 16B, there are multiple redundant paths between the components 1625*a-d* of the input segment subsystem 1605 and the components 1627*a-e* of the sequencer segment subsystem 1610. In this manner, for example, when a particular transport lane 1630*a* is inoperative for any reason (e.g., jammed, broken, scheduled maintenance, etc.), a shuttle may still be transported from third presort accumulator 1625*c* to fourth sequencer segment 1627*d* by utilizing an alternate route. Similarly, when a particular component is inoperative (e.g., second sequencer 1627*b*), then a shuttle may be routed to an alternate component (e.g., first sequencer 1627*a*) that is capable of performing the same processing operations.

In embodiments, the transport controller 1620 is operatively connected to various sensors throughout the transport network (e.g., that shown in FIG. 16B). These sensors may include, for example, photo-diodes that indicate the passage of shuttles past a predefined point. These sensors may also include, for example, encoders that indicate the amount of travel of a transport lane. These sensors may also include, for example, position sensors that indicate the output position of switches. These sensors may also include, for example, broken or inoperative machinery. By utilizing data from such sensors, the transport controller may determine the state of the switches and lanes in the network, including when a particular transport lane is congested or inoperative, or the location of any of the shuttles throughout the system.

As seen in FIG. 16B, some transport lanes 1630 may be arranged as spurs for shuttle buffering. For example, lane 1630*b* represents a loop-through spur (e.g., first in first out), while lane 1630*c* represents a dead-end spur (e.g., last in first out). Shuttles may be temporarily directed into such spurs to relieve congestion over the transport network.

In implementations of the invention, the switches 1635 are highly reliable mechanisms that have an extremely low probability of malfunctioning. Nevertheless, some sections of transport may be unavailable due to conditions such as unavailable destination segments, jams, or planned maintenance. Accordingly, the configuration and operating status of each switch 1635 are maintained in a data structure, so that paths for routing shuttles between components may be determined, as described in greater detail herein.

Figure 16C:
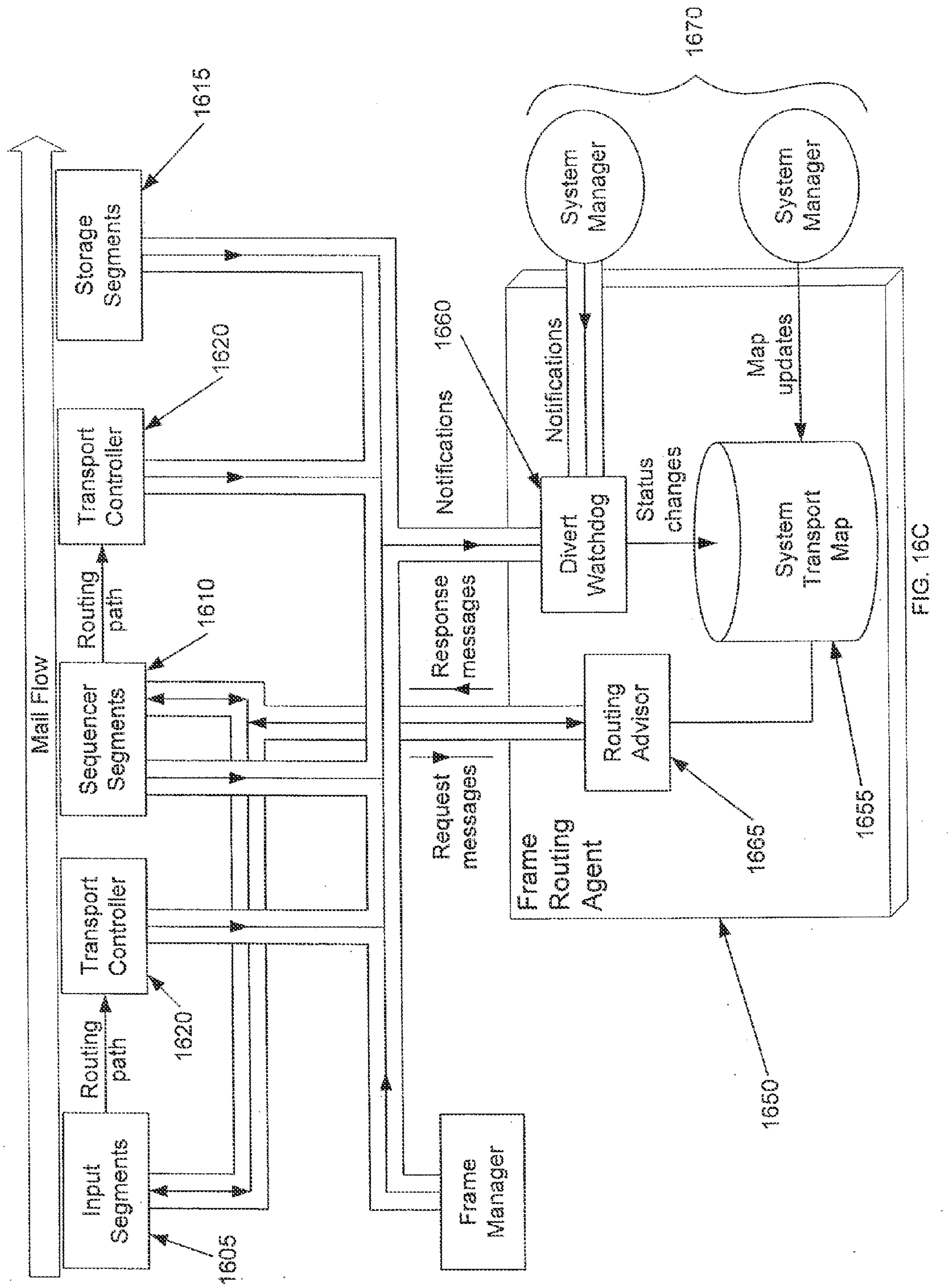
FIG. 16C shows a block diagram of a system in accordance with aspects of the invention.

FIG. 16C shows a block diagram of aspects of a facility wide sorting and/or sequencing system according to aspects of the invention. The facility wide sorting and/or sequencing system includes the input segment subsystem 1605, sequencer segment subsystem 1610, storage segment subsystem 1615, and transport controllers 1620, as already described herein. In embodiments, the facility wide sorting and/or sequencing system also includes a frame routing agent (FRA) 1650 that communicates with the various subsystems 1605, 1610, 1615 and transport controller 1620 to coordinate the movement of shuttles between components of the facility wide sorting and/or sequencing system. In embodiments, the FRA 1650 comprises a real-time, high availability server, which may be implemented, for example, in the computer infrastructure shown in FIG. 1A.

According to aspects of the invention, the FRA 1650 comprises a system transport map 1655, a divert watchdog 1660, and a routing advisor 1665. The system transport map 1655 comprises an updatable data structure that defines a relationship between facility wide sorting and/or sequencing system components, transport lanes, and switches, while the routing advisor 1665 determines paths for transporting shuttles based upon the information in the system transport map 1655.

In embodiments, the system transport map 1655 is a tabular representation of the transport network, which is comprised of the transport lanes, switches, and spurs. The system transport map 1655 identifies the physical interconnections that exist so that routing paths can be determined. The system transport map 1655 also maintains the operational status of each switch position. The system transport map 1655 is described in greater detail with particular reference to the exemplary system depicted in FIG. 16B.

In the exemplary embodiment shown in FIG. 16B, each switch 1635 provides one, two, or three switched output positions, which are referred to as Left, Center, and Right. The available output positions for each switch 1635 are dictated by the architecture of the transport network. Each switch position has a status (e.g., enabled or disabled) associated with it. According to aspects of the invention, an enabled status for a switch position means the switch may be set in that position, while a disabled status for a switch position means the switch may not be set in that position. If all positions are enabled, the switch is fully available. If a position is disabled, then the switch is only partially available and may only be capable of providing limited switching or just a single path. If all positions are disabled, then the switch is completely unavailable. Switches may also have one or more inputs.

In embodiments, each switch 1635 is assigned a unique identifier, and this identifier is stored in the system transport map 1655 (as shown in FIG. 16C). For example, referring still to FIG. 16B, "M" denotes a switch on a main line, "S" denotes a switch off a main line to another main line, and "P" denotes a spur switch. Table 1 shows an exemplary system transport map 1655 that represents the network shown in FIG. 16B. The system transport map 1655 of Table 1 contains a list of every switch in FIG. 16B, and the configuration and current operational status of each switch position.

TABLE 1

| System Transport Map | | | | | | |
|---|---|---|---|---|---|---|
| Switch | Destination Left | Status Left | Destination Center | Status Center | Destination Right | Status Right |
| M1S1 | 0 | | M1P1 | Enabled | M2S1 | |
| M1P1 | 0 | | M1P2 | Enabled | M1P2 | Enabled |
| M1P2 | 0 | | M1S2 | Enabled | 0 | |
| M1S2 | 0 | | SEQ1 | Enabled | 0 | |
| M2S1 | 0 | | M2S2 | Enabled | M4P1 | Enabled |
| M2S2 | 0 | | M2S3 | Disabled | M3S1 | Enabled |
| M2S3 | 0 | | M2S4 | Enabled | 0 | |
| M2S4 | M1S2 | Enabled | SEQ2 | Enabled | 0 | |
| M3S1 | 0 | | M3S2 | Enabled | 0 | |
| M3S2 | M2S3 | Disabled | M3S3 | Enabled | M4S1 | Enabled |
| M3S3 | 0 | | M3S4 | Enabled | 0 | |
| M3S4 | M2S3 | Enabled | SEQ3 | Enabled | SEQ4 | Enabled |
| M4P1 | 0 | | M4S1 | Enabled | END | Enabled |
| M4S1 | 0 | | M4S2 | Enabled | 0 | |
| M4S2 | M3S3 | Enabled | 0 | | SEQ5 | Enabled |

As described above, in embodiments, a switch provides a path to one, two, or three destinations (e.g., any combination of left, right, and center). In the system transport map, columns are provided for "Destination Left," "Destination Center," and "Destination Right," which correspond to the possible output positions for each switch. A destination that is not valid for a particular switch (e.g., based upon the transport network architecture) is represented by a "0" in the system transport map, while a destination that is valid is represented by the name of the switch or component that is downstream in that direction. So, for example, referring to FIG. 16B and Table 1, switch "M1S1" has a center destination of switch "M1P1," a right destination of switch "M2S1," and no left destination (indicated by "0" in the system transport map). Similarly, switch "M1S2" has a center destination of first sequencer segment 1627*a* (represented by "SEQ1" in the system transport map), but does not have a left destination or a right destination.

The system transport map 1655 also includes a value of "enabled" or "disabled" for each switch, which represents whether the particular switch output position is currently operative, as described in greater detail herein. In embodiments, the system transport map is initially populated through data communication with the system manager 1670 of the facility wide sorting and/or sequencing system. For example, the physical layout (e.g., configuration) of the components, transport lanes, and switches is provided to the FRA 1650 via the system manager 1670 (e.g., via user input).

As further depicted in FIG. 16C, the FRA 1650 also includes a divert watchdog 1660, which monitors and updates the status of every switch in the system transport map 1655. In embodiments, notification messages may be sent by the various subsystems 1605, 1610, 1615 and transport controller 1620 to the divert watchdog 1660 whenever a situation is detected that could result in a routing change within the transport or between system segments. The notification may be a message that identifies the situation which may impact the system transport map 1655.

For example, the transport controller 1620 may send a notification message to the divert watchdog 1660 indicating that the status of a particular switch should be changed due to some activity (e.g., jam, broken, etc.). In embodiments, the notification message indicates the ID of the switch (e.g., "M3S2"), the affected switch positions (e.g., "destination left"), and a status of "Disabled" for the affected switch position. Upon receipt of the notification, the divert watchdog 1660 updates the status of the identified switch position(s) in the system transport map. At some later point, another notification message maybe sent by the transport controller 1620 to the divert watchdog 1660 to change the status to "Enabled", once the condition is resolved.

In another example, the sequencer segment subsystem 1610 may send a notification to the divert watchdog 1660 indicating that the availability of a component (e.g., one of 1627$a$-$e$) has changed due to maintenance activity or a jam. The notification message indicates the sequencer segment ID and a status of "Unavailable". The divert watchdog looks up the sequencer segment ID in the system transport map and changes the status of all transport switches that direct shuttles to that sequencer segment. The status change disables switch positions so that the shuttles are directed to another sequencer segment. When the original sequencer segment becomes available, another notification message is sent that indicates sequencer segment ID is "Available", upon which the divert watchdog updates the status of the applicable switch positions to "Enabled".

In yet another example, the storage segment subsystem 1615 may send a notification to the divert watchdog 1660 indicating that a component of a storage segment is not available for use. The divert watchdog 1660 changes the status of the system transport map based upon the notification.

According to aspects of the invention, when a major section of storage is unavailable, frames cannot simply be diverted into a different storage area. This would cause two potential issues: overflow of a storage area that is allocated to a different portion of the destinating mail stream and fragmentation of the diverted mail stream given that some mail is most likely already in the unavailable storage area.

Accordingly, in embodiments, if the estimated time for storage to become available is short, it may be possible to buffer shuttles on the transport by placing them into spurs. A timer would be activated after the notification of unavailability is received and would allow enough time for some simple event, such as a machine restart, to be completed. Once the timer expires, and if storage is still unavailable, then shuttles would be directed down a special output path to be manually handled.

In another example, the system manager 1670 may send a notification to the divert watchdog 1660 indicating some change in the system. For example, in the event that a system segment loses power or is unable to communicate for any reason, the system manager 1670 sends a notification to the divert watchdog 1660 that indicates the segment is unavailable. In embodiments, the system manager 1670 determines that a segment is unavailable when the segment does not respond to a heartbeat message sent by the system manager 1670. The notification message indicates the segment ID and a status of "Unavailable". The divert watchdog 1660 then looks up the segment ID in the system transport map and changes the status of all transport switches that direct shuttles to that segment. The status change disables switch positions so that the shuttles are directed to another segment. When the original segment becomes available, another notification message is sent that indicates the segment ID is "Available", upon which the divert watchdog updates the status of the applicable switch positions to "Enabled".

As should be apparent to the skilled artisan from the description herein, the divert watchdog 1660 updates the data in the system transport map 1655 based upon notification received from various parts of the facility wide sorting and/or sequencing system. In embodiments, only the switch status values are changed in the system transport map in response to notifications, while the switch identifications and destinations are fixed. This is because the switch identifications and destinations are based on the physical network, not the current status of each destination. However, the switch identifications and destinations may be altered by the system manager 1670 (e.g., via user data entry).

As depicted in FIG. 16C, the FRA 1650 also includes a routing advisor 1665, which determines a path through the transport to the next destination segment. In embodiments, a subsystem initiates a move of frames to another subsystem by sending a request to the FRA 1650. Based upon the target subsystem and the data in the system transport map 1655, the routing advisor determines a best path for the frames to travel to the target subsystem. The determination of the best path may be made using logic and business rules pre-programmed in the FRA 1650.

Figure 16D:
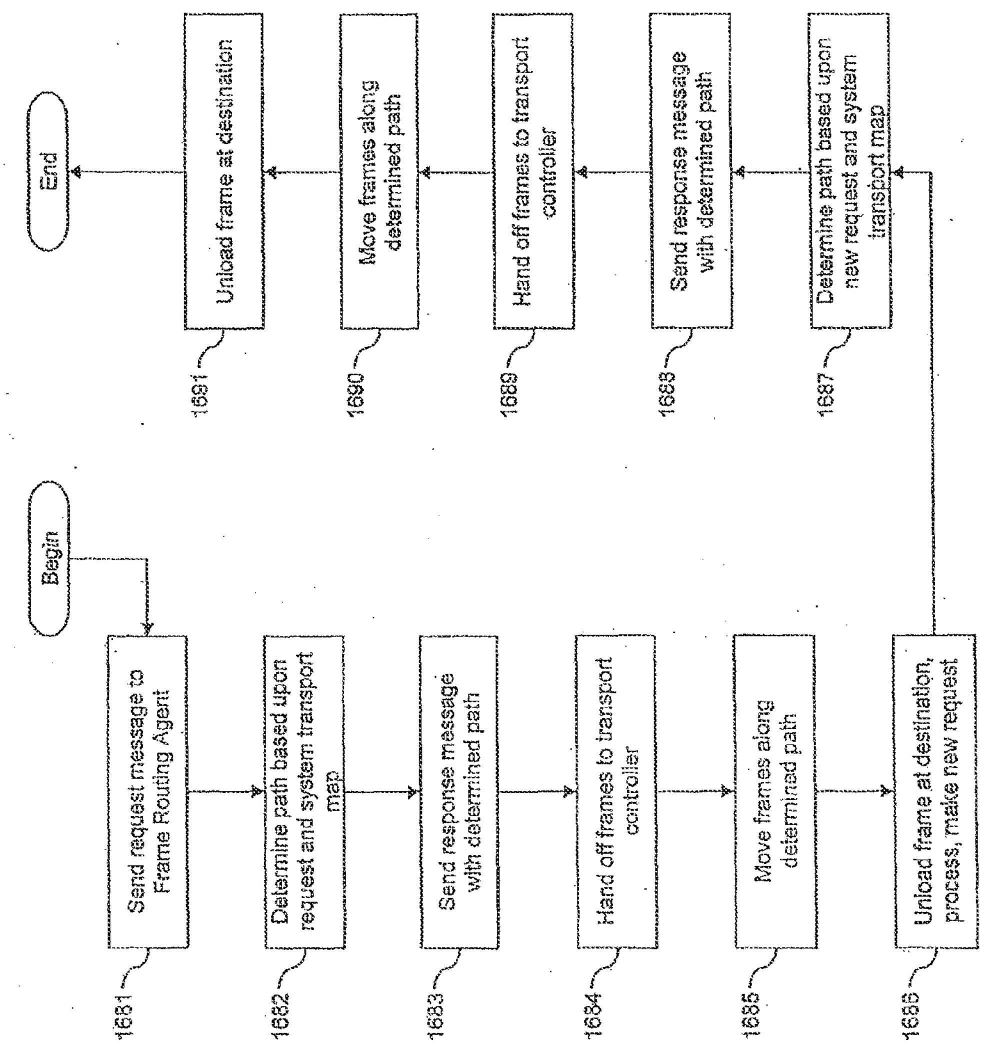
FIG. 16D shows a flow diagram of steps of a method in accordance with aspects of the invention.

The operation of the routing advisor is demonstrated by the following example, the steps of which are depicted in the flow chart shown in FIG. 16D. The steps of FIG. 16D may be performed by a program application, such as that described with respect to FIG. 1A. At step 1681, starting with the presort accumulator, when frames are ready to be sent to a sequencer segment, the presort accumulator sends a request message to the Frame Routing Agent. The message identifies the ID of the sequencer segment to which the frames will be sent. The message requests that the routing path to the sequencer segment be returned. The message may be sent using any suitable communication protocol, such as, for example, the Internet, intranet, LAN, wireless, etc.

At step 1682, the routing advisor receives the request message and looks up the sequencer segment ID in the system transport map. Based upon the target sequencer segment ID, the available transport lanes and switches defined in the system transport map, and any predefined decision rules and/or logic, the routing advisor determines one of two unique routing paths: a path to the target (e.g., specified) sequencer segment, if that sequencer segment is available, as determined by the status of the routing switches; or a path to a different available sequencer segment, as determined by the status of the routing switches.

At step 1683, the routing advisor returns a response message that includes the selected routing path. For example, the routing path that a shuttle would travel from the first presort accumulator 1625$a$ to the second Sequencer segment 1627$b$ in FIG. 16B is represented by the following data sequence, in which the switch ID is followed by a "/" followed by the switch position (R, C, or L for right, center, or left):

M1S1/R-M2S1/C-M2S2/R-M3S1/C-M3S2/C-M3S3/C-M3S4/L-M2S3/C-M2S4/C-SEQ2

At step 1684, the presort accumulator hands off the frames and frame manifest to the transport controller subsystem, and also provides the determined routing path to the transport controller.

At step 1685, the transport controller receives the frames, manifest, and routing path. The group of frames enters the collection point into which the frames are put into a frame transport shuttle. The transport controller subsystem uses the routing path to direct the shuttle through the transport. The routing path defines the switches to move the shuttle through and the switch positions that should be thrown for the routing to occur. The transport controller manages the traffic of shuttles throughout the transport, including, for example: moving each shuttle independently, staging each shuttle through the network of switches, and temporarily directing shuttles into spurs to alleviate bottlenecks.

At step 1686, once the shuttle reaches the end of the routing path, the shuttle is docked and the frames unloaded. The frames enter the sequencer segment and after initial sequencing of the frames is completed, the sequencer segment sends a request message to the Frame Routing Agent, which identifies the ID of the Storage Segment to send the frames to. The message requests the routing path to the Storage Segment be returned.

At step 1687, the routing advisor receives the request message and looks up the Storage Segment ID in the system transport map. The routing advisor then determines the path to the specified Storage Segment, as determined by the status of the routing switches.

At step 1688, the routing advisor returns a response message that includes the selected routing path. At step 1689, the sequencer segment hands off the frames and frame manifest to the transport controller subsystem. It also provides the selected routing path to the transport controller.

At step 1690, the transport controller receives the frames, manifest, and routing path. The group of frames enters the collection point into which they are again put into a frame transport shuttle. As in step 1685, the transport controller uses the routing path to direct the shuttle through the transport. At step 1691, once the shuttle reaches the end of the routing path, the shuttle is docked and the frames unloaded into the Storage Segment.

In embodiments, after a shuttle is emptied at an undocking station, the empty shuttle may be returned to a docking station to receive another group of frames. Shuttles are returned on a dedicated set of transport lanes, which may be located in a plane at a different height from the transport that delivers filled shuttles. Additionally, the system transport map may also contain the routing paths for the return of empty shuttle returns, although the transport network for shuttle returns may be much simpler (i.e., fewer switches and spurs) than the main transport.

In implementations, the lanes of the transport network of the entire facility wide sorting and/or sequencing system move generally in one of two directions. Lanes operating in the first direction transport loaded shuttles (e.g., containing frames) from one component to the next, while lanes operating in the second direction return empty shuttles to their collection points. Each direction of transport provides at least two paths to each destination for redundancy.

In accordance with aspects of the invention, the movement of mail pieces within a facility wide sorting and/or sequencing system having plural redundant paths and components places emphasis on determining where each mail piece is destined and how each mail piece should reach its intended destination. In embodiments, the process is controlled by the Frame Routing Agent and coordinated by real-time location notifications from each system segment to the Frame Routing Agent, and the interchange of request/response messages between each system segment and the Frame Routing Agent to determine best-path routing.

Optionally, as shuttles are moved through the transport, it may be necessary to stage a shuttle into a spur. Spurs provide a short-term buffer area that helps relieve congestion through the transport and at undocking stations. Spurs could either be "dead end" spurs, which would operate as a "last in first out" (LIFO) buffer, or as a "through loop" that would operate as a "first in first out" (FIFO) buffer.

Although this invention describes a method for controlling and coordinating the transport of mail pieces contained in frames that are contained in shuttles, the invention is not limited to the use of shuttles. Instead, methods described herein may alternatively be used to control and coordinate the transport of individual mail pieces (without frames or shuttles) or mail pieces contained in frames (without shuttles) through multiple paths.

Splitting Individual Mail Pieces into Separate Streams to Increase Throughput The present invention relates to a split pathway induction unit used in a presorting unit and a method to control and coordinate the movement of products, e.g., mail pieces (letters and flats), into frames via a conveyance system having a plurality of split pathways. In embodiments, products (hereinafter referred to as mail pieces) are directed into one of many different split pathways towards a respective frame inserter for induction into frames and for entry into, e.g., a mail sorting and/or sequencing system. In embodiments, the split pathway induction unit can feed mail pieces at about a rate of 40,000 mail pieces per hour, and with the use of the present invention, each of these mail pieces can be inserted reliably into a frame at a frame inserter mechanism. This can be performed without bottlenecks occurring at the frame inserter, as the mail pieces are split into different pathways such that more than one frame inserter can be used for a single induction unit. Thus, the present invention provides an apparatus and a related method to allow for an efficient and reliable mail induction operation, thereby ensuring that the mail pieces can be properly inserted into frames regardless of the output of the induction unit.

Processing restraints of existing induction systems may include, inter alia, limits on the amount of time given to process a predetermined volume of mail pieces, and structural limitations (e.g., due to vibration, weight, etc.) of the system for processing a given volume of mail pieces in a given amount of time. As a result of these restraints, the existing systems are unable to keep up with the demands of, e.g., the U.S. Postal System, to process and deliver mail pieces to mail recipients in an acceptable amount of time. A solution is to provide the induction unit with split pathways of the present invention.

In embodiments, the split pathway induction unit increases the amount of time allotted for inducting the mail pieces into the frames and thus allows for reliable frame insertion of mail pieces. This is accomplished by diverting mail pieces from a single induction unit (e.g., input feeder) to separate pathways. These pathways, in turn, feed the mail pieces to a respective frame inserter. Thus, it is now possible to use two or more frame inserters for each induction unit, thereby permitting ample time for the frame inserters to insert mail pieces into its respective frame. The induction unit of the present invention also reduces kinetic energy build-up by allowing more time for opening frames and reliably and stably inserting the mail pieces within the frame for entry into the mail sorting and/or sequencing system.

The present invention also contemplates best-path routing of the mail pieces. That is, movement of the mail pieces before, during, and after induction is controlled by the present invention to perform best-path routing, such that throughput of the mail pieces through any given pathway is reduced and bottlenecking is avoided. For example, in the configuration of the present invention, the induction unit is provided with additional operational time to perform desired functions such as an induction of the mail pieces into the frame and then into the mail sorting and/or sequencing system, respectively.

The best-path routing may be controlled by a control unit (as implemented in the computing infrastructure shown in FIG. 1) and is coordinated by real-time location notifications from a plurality of sensors and monitors (discussed throughout the instant application) to the control unit (also referred to as a Frame Routing Agent). The plurality of sensors and monitors are provided at various locations along the induction unit to detect and monitor the products (hereinafter referred to as mail pieces) traveling through the induction unit. The plurality of sensors and monitors communicate data regarding the mail pieces (e.g., location within the induction unit, destination outside the induction unit, speed, mailing information (e.g., state, ZIP code, etc.) back to the control unit. Thus, an exchange of requests from the control unit and responses from the plurality of sensors and monitors aids in the determination of best-path routing through the induction unit.

Figure 17A:
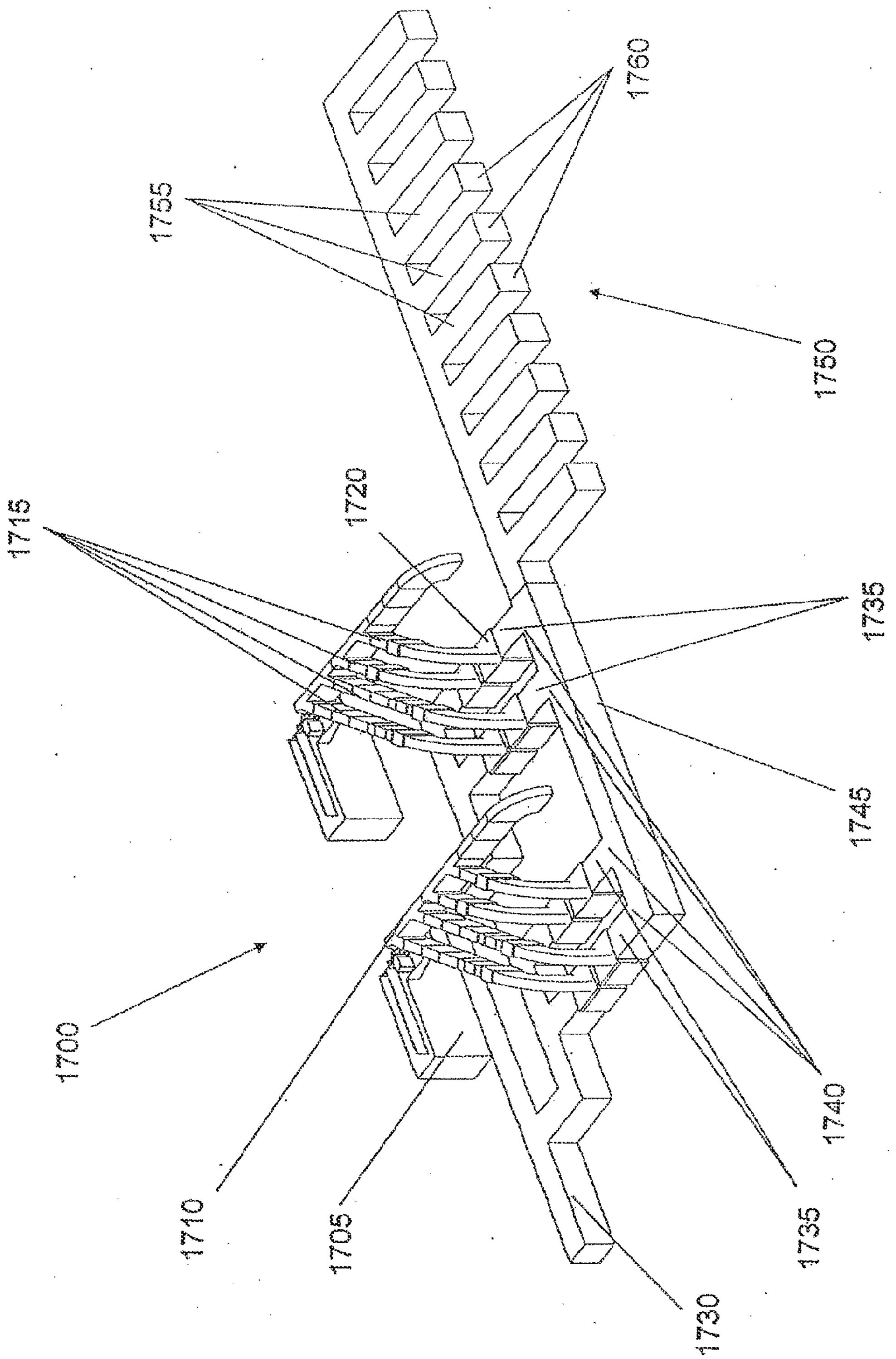
FIG. 17A shows a perspective view of an exemplary embodiment of a presorting unit of a mail sorting and sequencing system in accordance with aspects of the invention.
Figure 17B:
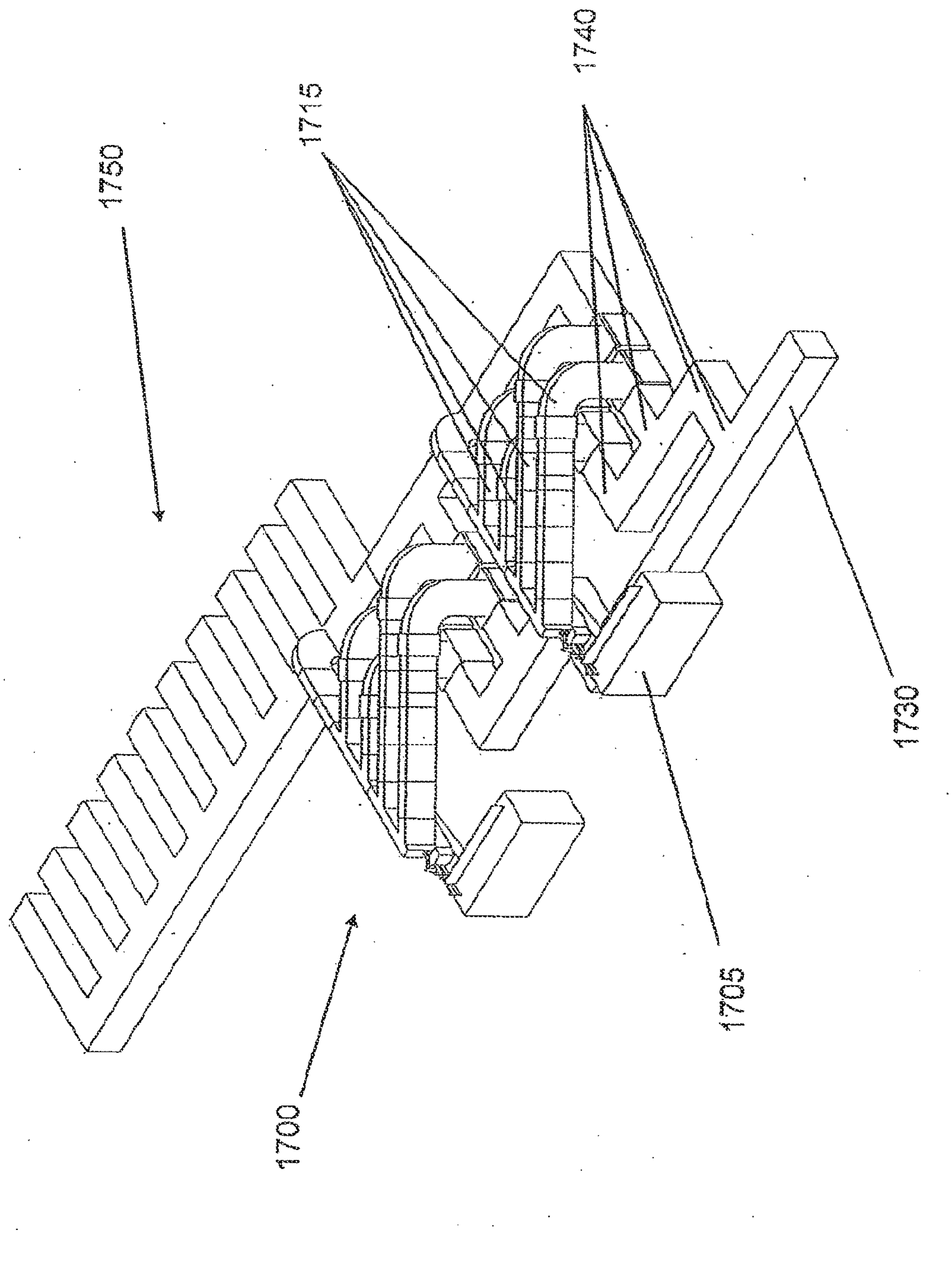
FIG. 17B shows another perspective view of the presorting unit of FIG. 17A.
Figure 17C:
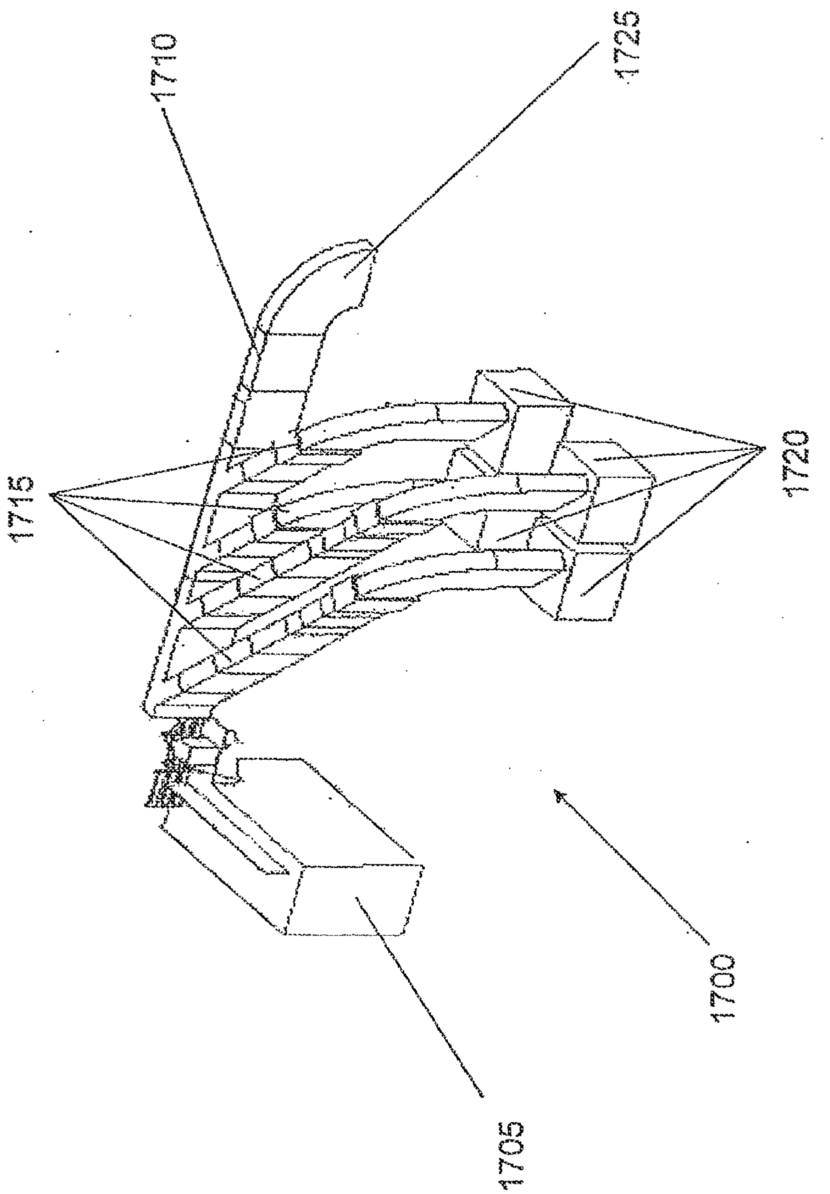
FIG. 17C shows an exploded partial perspective view of an induction unit of the presorting unit in accordance with aspects of the invention.

FIGS. 17A-17C show a split pathway induction unit in accordance with aspects of the present invention. The split pathway induction unit 1700 may be used to presort mail pieces prior to being inserted into a mail sorting and/or sequencing system. In embodiments, the split pathway induction unit 1700 includes at least one or more feeders 1705. In operation, individual mail pieces are loaded into the feeder 1705 and are given unique identifiers such that each mail piece can be monitored and tracked throughout the system. In this regard, the unique identifier may be photographic images of the mail piece, a bar code, an RFID tag, or any other source identifier known to those having ordinary skill in the art. The feeder 1705 may include devices such as scanners, sensors, OCRs, printers, BCRs, photo eyes, cameras, weigh scales, and thickness detection mechanisms to identify, monitor, track, and assist in directing the mail pieces to a pathway 1710 for induction into the mail sorting and/or sequencing system. It is contemplated that the feeders 1705 can be "flats" feeders and "letter" feeders, or any combination of the two types of feeders because the frames are configured to accommodate both types of mail pieces.

The mail pieces are fed from the feeder 1705 to the pathway 1710 which, in turn, feeds mail pieces to a plurality of split pathways 1715 extending from the pathway 1710 and towards a respective frame inserter 1720. The pathway 1710 and plurality of split pathways 1715 may be pinch belts, rollers, or any conveyance system known to those having ordinary skill in the art. Additionally, mail pieces not directed to one of the plurality of split pathways 1715 may be directed to a reject unit 1725 (FIG. 17C) of the pathway 1710, wherein it may be re-entered into the system at a later time to be re-processed for induction or extraction.

The plurality of frame inserters 1720 are configured to receive individual mail pieces from the plurality of split pathways 1715 and to place the individual mail pieces into frames, which were provided from multiple frame induction pathways 1730. The frame induction pathways 1730 may include lead screws or cogged belts, for example, for transporting the frames. The lead screws or cogged belts are also contemplated for a transport pathway 1745 and other pathways throughout the system for transporting the frames.

In operation, it is contemplated that the volume of frames being introduced into the frame inserters 1720 match the volume of mail pieces being fed into the frame inserters 1720 from the split pathways 1715. That is, the streaming of frames into the frame inserters 1720 may be increased or decreased depending on the volume of mail pieces being streamed into the induction unit 1700. This can be accomplished using compression zones, or alternatively, decompression zones (hereinafter referred to as compression zones, collectively) to be placed into the lead screw conveyance system. In embodiments, the frame induction pathways 1730 have compression zones prior to the frame inserters 1720 to queue the frames for receiving the mail pieces being streamed from the plurality of split pathways 1715.

Although four split pathways 1715 are shown and described with each feeder 1705, it should be understood by those of skill in the art that two or more split pathways are contemplated by the invention. It should further be understood by those of skill in the art that more mail pieces can be processed, e.g., reliably inserted into frames, with an increase in the number of split pathways 1715; although, it is preferred to optimally match the number of split pathways 1715 with the throughput of the feeder 1705 and the frame inserters 1720. Illustratively, four split pathways 1715 may be optimal when the feeder 1705 is capable of feeding 40,000 letters per hour and each frame inserter 1720 is capable of inserting 10,000 letters into frames per hour.

More specifically, in order to provide the induction unit 1700 with more processing time to frame the letters, the four split pathways 1715 are configured to divert and induct mail pieces into the four frame inserters 1720 at a rate of about 10,000 letters an hour. Accordingly, the induction operation to frame letters is approximately 330 milliseconds per split pathway 1715. Thus, it is contemplated that the induction operation will likely have more time to process the same volume of letters due to the increase in frame inserters 1720.

Four split pathways 1715 may also be optimal when the feeder 1705 is capable of feeding 10,000 flats (e.g., magazines) per hour and each frame inserter 1720 is capable of inserting 2,500 flats into frames per hour. More specifically, in order to provide the induction unit 1700 with more processing time to frame the flats, the four split pathways 1715 are configured to divert and induct flats into the four frame inserters 1720 at a rate of about 2,500 flats an hour. Accordingly, the induction operation to frame flats is approximately 694 milliseconds per split pathway 1715. Thus, it is contemplated that the induction operation will likely have more time to process the same volume of flats due to the increase in frame inserters 1720.

Still referring to FIGS. 17A-17C, in embodiments, once the mail pieces are placed (or secured) in the respective frames, the frames are directed from the frame inserters 1720 to the transport pathway 1745 via lanes 1735 and divert mechanisms 1740. The divert mechanisms 1740 are preferably right angle divert mechanisms as discussed in the instant application, which are structured to merge the frames into the transport pathway 1745 and to a pre-sort accumulator 1750.

In embodiments, the presort accumulator 1750 performs an initial separation of "framed" mail pieces and prepares the frames for loading into shuttles to be conveyed to a predetermined destination within the mail sorting and/or sequencing system. The presort accumulator 1750 may include frame storage areas 1755 to store frames and docking stations 1760 to assist in the loading and unloading of frames from the presort accumulator 1750. The docking stations 1760 are discussed in further detail in the instant application.

In operation, the frames are conveyed along the transport pathway 1745 for placement into the presort accumulator 1750. Frames directed to the presort accumulator 1750 are diverted into the frame storage areas 1755 depending on the frame's destination, and are prepared for being loaded onto shuttles at a respective docking station 1760 for entry into (or exit from) the mail sorting and/or sequencing system. Compression zones may also be provided at the pre-sort accumulator 1750, at docking stations 1760 for loading and unloading shuttles of frames, before and/or after each frame storage area 1755, as well as any other location within the mail sorting and/or sequencing system where queuing (in any manner) of the frames is desired.

Figure 18:
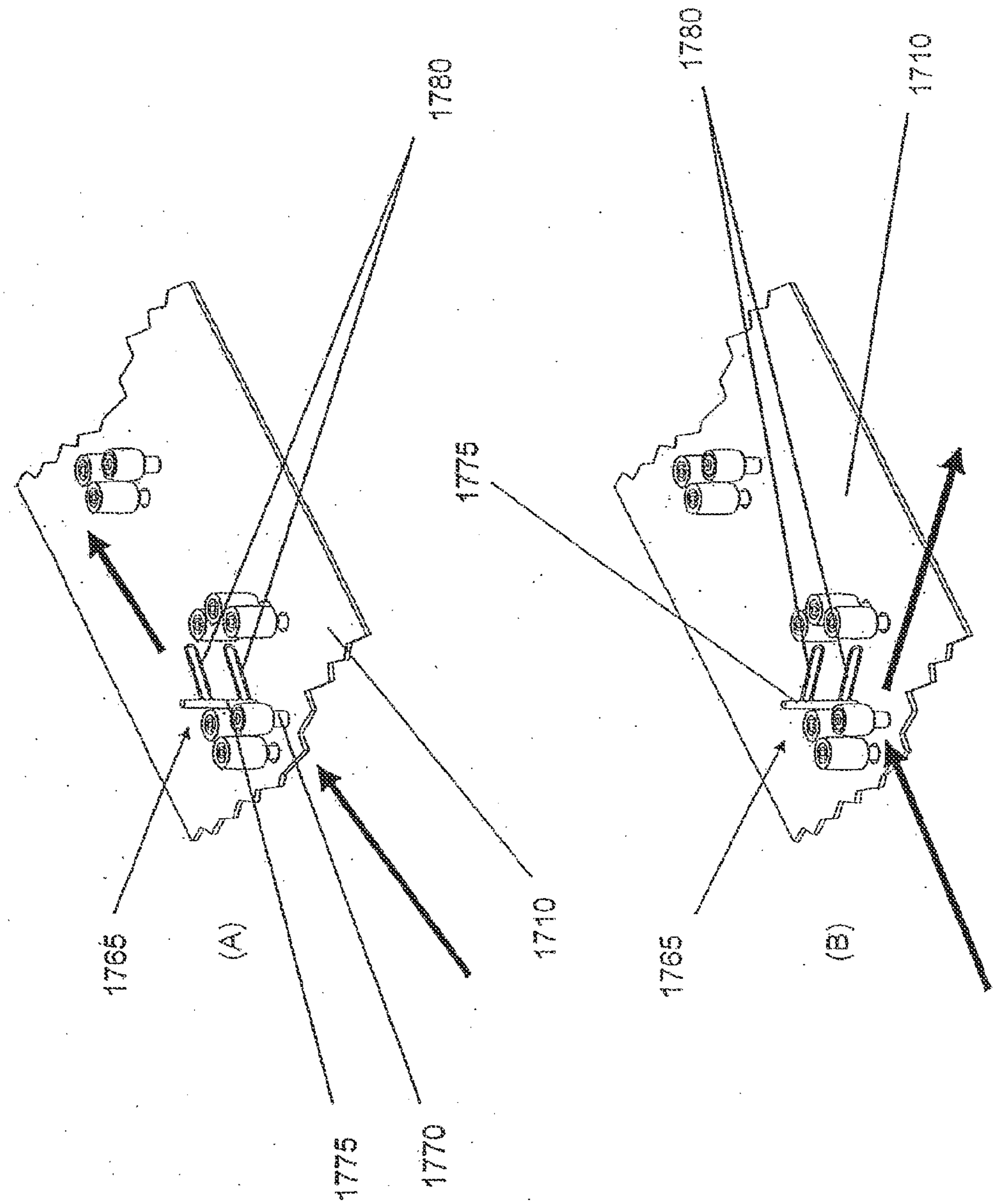
FIG. 18 shows a perspective view of the diverter gate in an activated position and a deactivated position in accordance with aspects of the invention.

FIG. 17D shows a top view of the pathway 1710 having a plurality of diverter gates 1765. FIG. 18 shows a perspective view of the diverter gate 1765 in an activated and a deactivated position. More specifically, as shown in FIG. 17D, the split pathways 1715 are provided at spaced intervals at least along the side of the pathway 1710, and extend (i.e., divert) from the pathway 1710 towards the frame inserters 1720. In embodiments, the pathway 1710 may include a plurality of diverter gates 1765 (e.g., four) for redirecting certain of the mail pieces into one of the plurality of split pathways 1715. The diverter gates 1765 are provided at spaced intervals at least along the side of the pathway 1710 adjacent a corresponding one of the plurality of split pathways 1715. In embodiments, the mail pieces are diverted from the feeders 1705 to the split pathways 1715 by the diverter gates 1765.

As shown in FIG. 17D and FIG. 18, the diverter gate 1765 includes a rotary solenoid 1770 that rotates a diverter gate shaft 1775 for diverting mail pieces from the pathway 1710 to one of the plurality of split pathways 1715. More specifically, the diverter gate shaft 1775 includes at least one deflection finger 1780 for redirecting the route of a specified mail piece within the induction unit 1700. As the mail piece contacts the at least one deflection finger 1780, the mail piece is diverted to one of the plurality of split pathways 1715 for induction at one of the plurality of frame inserters 1720.

In operation, the mail pieces are streamed from the feeder 1705 to the pathway 1710, and depending on the particular algorithm communicated from a control unit (implemented in the computer infrastructure of FIG. 1), the diverter gate 1765 rotates the at least one deflection finger 1780 into the path of an approaching mail piece. In embodiments, the diverter gates 1765 may be configured with any number of algorithms such that the mail pieces being processed are evenly distributed among the plurality of split pathways 1715. In one such algorithm, each of the diverter gates 1765 will be activated in an alternate manner such that every fourth mail piece (nth number) will be directed to a respective split pathway 1715. In this way, the split pathways 1715 are synchronized to facilitate orderly movement of the mail pieces to the frame inserters 1720. More specifically, the algorithm may follow an "a, b, c, d, a, b, c, d" pattern, wherein the letters "a, b, c, and d" correspond to the four split pathways 1715 and every fourth mail piece will be diverted into its designated split pathway 1715 such that a proportionate share of the volume of mail pieces streaming in from the feeder 1705 are evenly distributed to each frame inserter 1720 to reduce throughput through any given pathway and to allow more time for induction per mail piece.

As shown in FIG. 18 (A), the diverter gate 1765 is in a deactivated state. In the deactivated state, the mail pieces stream unimpeded through the diverter gate 1765 to a subsequent diverter gate 1765 for diversion into one of the plurality of split pathways 1715. FIG. 18 (B) shows the diverter gate 1765 in the activated state. That is, in the activated state the diverter gate shaft 1775 rotates the at least one deflection finger 1780 to redirect the streaming route of the mail pieces from the pathway 1710 to one of the plurality of split pathways 1715 until the diverter gate 1765 is directed to return to its deactivated state.

The induction unit of the present invention provides many advantages including improving the operating efficiency of a presorting unit. More particularly, the splitting of individual mail pieces for induction into frames and ultimately into, e.g., a mail sorting and sequencing system enables the presorting unit to keep up with volume demands of delivering mail. Thus, the configuration of the present invention enables the presorting unit to reliably and securely process a high volume of mail pieces in less time than conventional processing systems.

Mail Piece Container Induction, Inspection, and Replenishment in a Facility-Wide Sorting and/or Sequencing System The invention provides for a system and method for inducting, inspecting, and replacing individual mail containers called "frames" in a facility-wide letters/flats mail sorting and/or sequencing system. Frames are configured to support and/or contain mail pieces in a letters/flats mail sorting and/or sequencing system and are to be used extensively day-to-day. In order to ensure the reliability of frames, a system and method is required to induct and inspect the frames, and also to periodically replace worn frames as necessary.

The present invention is also directed to a system that includes a frame manager system comprising an empty frame receiving system, a frame inspection system, and a system for loading frames onto transports. In embodiments, the transports may comprise shuttles which transport the frames to one or more locations in a facility-wide letters/flats mail sorting and/or sequencing system. In embodiments, the frame manager system may communicate with and/or send and receive data to and from at least one of a transport controller system, a storage manager system, a shuttle manager system, and a system manager system, any of which can be embodied in a control unit of the present invention. In embodiments, the frame manager system may further comprise at least one of a frame identification table, a frame induction controller, a machine control operational interface, and a frame manager operator console.

The present invention is also directed to a method of managing frames in a facility-wide letters/flats mail sorting and/or sequencing system. In embodiments, the method comprises utilizing at least one system discussed herein to at least one of induct frames, manage frames, inspect frames, and load frames.

The present invention is also directed to a shuttle manager system comprising an empty shuttle receiving system and a shuttle reading system. In embodiments, the shuttle transports frames to one or more locations in a facility-wide letters/flats mail sorting and/or sequencing system. In embodiments, the shuttle manager system may communicate with and/or send and receive data to and from at least one of a frame manager system and a system manager system. In embodiments, the shuttle manager system may further comprise at least one of a shuttle identification table, a shuttle induction controller, a machine control operational interface, and a shuttle manager operator console. The present invention is also directed to a method of managing shuttles in a facility-wide letters/flats mail sorting and/or sequencing system, wherein the method comprises utilizing at least one system recited above to at least one of induct shuttles, manage shuttles, inspect shuttles, and read shuttles.

In embodiments, a frame manager function is provided to induct frames into facility-wide letters/flats mail sorting and/or sequencing system, to inspect frames at the time of induction, and to periodically inspect a sampling of frames during their useful life. Frames are rejected if they fail inspection from the system. A shuttle manager function is provided to induct frame transport shuttles into the system, which will receive frames that pass inspection. Such systems provide a controlled and reliable approach to manage frames in a facility-wide letters/flats mail sorting and/or sequencing system.

In a facility-wide letters/flats mail sorting and/or sequencing system, the frame manager function can be specifically configured to handle the inducting and inspecting of empty frames in the system while the shuttle manager function can be specifically configured to handle the inducting of shuttles into the system. Frames that pass inspection are loaded onto the shuttles and conveyed throughout the system.

Frame Manager System

Figure 19A:
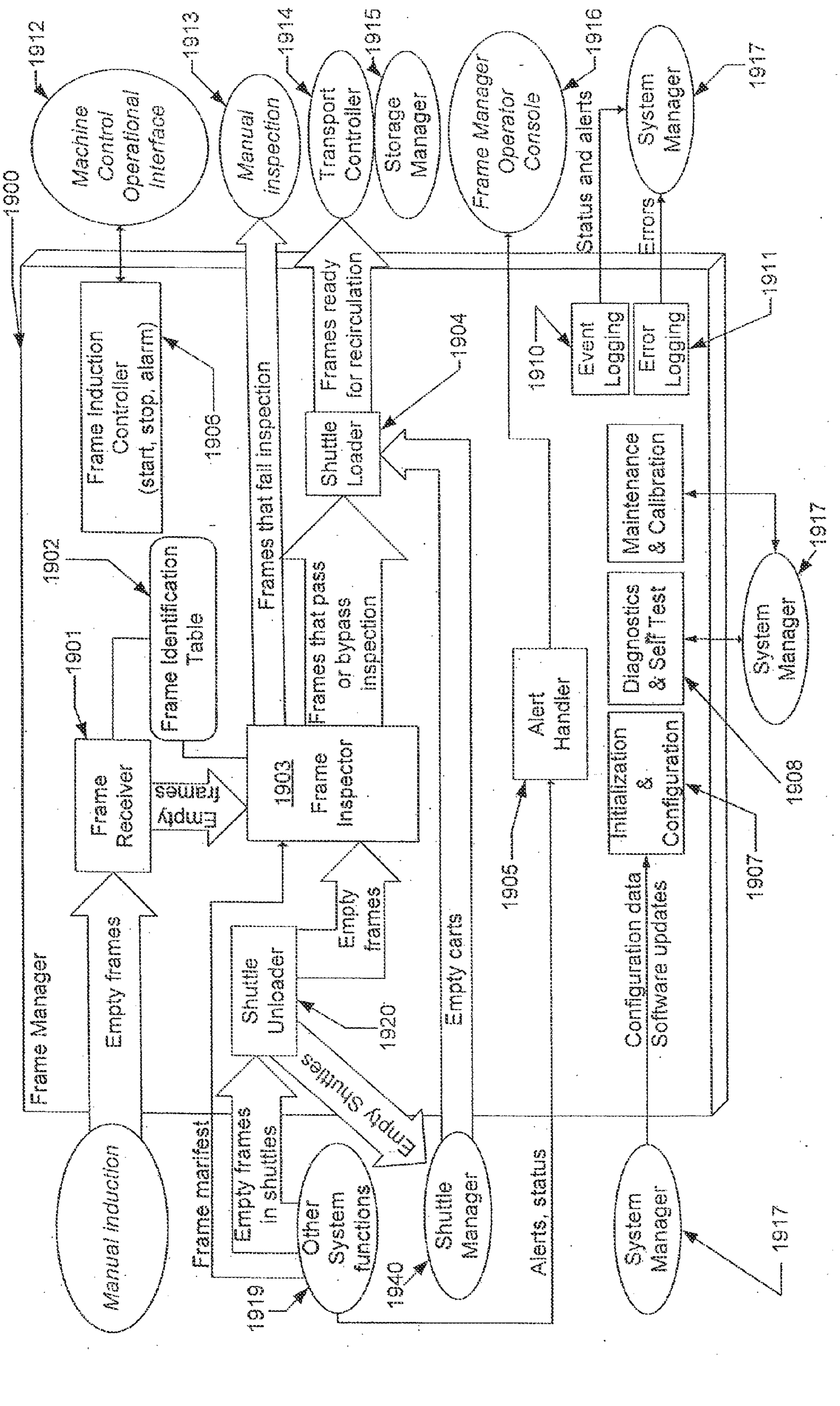
FIG. 19A shows a frame manager system architecture in accordance with aspects of the invention.

FIG. 19A shows a frame manager system architecture 1900 in accordance with one aspect of the invention. Those of skill should recognize that any of the subsystems of the present invention which require control or computing can be implemented or can use the computing infrastructure of FIG. 1A.

The system 1900 includes a number of sub-systems such as a frame receiver 1901 which receives empty frames, e.g., new frames. The empty frames can be received in a variety of ways including manual induction or via lead-screws, belts, or other drive mechanisms. The frame receiver 1901 includes a frame reader which reads a frame identification (ID) and compares the ID to data in a frame identification table 1902. The frame reader can be, for example, an optical recognition system or a bar-code reader. A frame inspector 1903 receives empty frames from the frame receiver 1901 as well as data from the frame identification table 1902. Additional empty frames, e.g., used frames, are received from other system functions 1919 via a shuttle unloader 1920. The shuttle unloader 1920 removed empty frames from the shuttles and forwards the empty frames to the frame inspector 1903. Once the empty frames are removed from the shuttles in the shuttle unloader 1920, the empty shuttles are forwarded to the shuttle manager 1940 discussed in detail below.

The frame inspector 1903, like the frame receiver 1901, includes a frame reader which reads a frame identification (ID) and compares the ID to data in the frame identification table 1902. The frame reader can be, for example, an optical recognition system or a bar-code reader. Frames that fail inspection are tagged and/or are forwarded to a manual inspection station or location 1913. Frames that pass inspection, or are otherwise caused to bypass inspection, are forwarded to a shuttle loader 1904 which loads the frames onto shuttles. The details of the frame inspection process are described below. The shuttles with the frames loaded thereon are then transferred to a transport controller 1914 (see also, e.g., FIG. 38H). The transport controller 1914 communicates and/or interfaces with a storage manager 1915 (see, e.g., FIG. 38J). The shuttle loader 1904 receives empty shuttles, i.e., empty shuttles, from a shuttle manager 1940 which is discussed in detail below. An alert handler 1905 receives alerts, status information, etc., from the other system functions 1919 and forwards the information to a frame manager operator console 1916.

The system 1900 also utilizes a frame induction controller 1906 (which is described with reference to FIG. 38D) which can be controlled by an operator via a machine control operational interface 1912. The frame induction controller 1906 provides a dedicated machine control interface that allows the operator to start and stop the induction unit within the frame manager 1900. The start operation sounds an alarm for safety. An initialization and configuration sub-system 1907 receives configuration data and software updates for the system 1900 from a system manager 1917 (see, e.g., FIG. 38N). The system manager 1917 also communicates with a diagnostics and self test sub-system 1908 and a maintenance and calibration sub-system 1909. The diagnostics and self test sub-system 1908 provides functions for trouble-shooting and checking the proper operation or functioning of the components of the system 1900. The maintenance and calibration sub-system 1909 provides functions for implementing maintenance procedures on each of the system components and performs alignment procedures on key functions such as, e.g., shuttle unloading, frame transport, frame diversion, and shuttle loading. An event logging sub-system 1910 provides status and alerts to the system manager 1917 while an error logging sub-system 1911 provides error data to the system manager 1917.

The operation of the system 1900 shown in FIG. 19A will now be described. In a facility-wide letters/flats mail sorting and/or sequencing system, frames normally contain or support inducted mail pieces throughout all sequencing operations and within storage. In this regard, mail pieces typically remain in their frames until dispatch preparation begins. Many different frames are contemplated by the invention. For example, the present invention contemplates light duty use frames and heavier mail pieces frames. All letters mail pieces can be inserted into the light duty frames. Flats mail pieces can be placed into either light duty or heavy duty frames, depending on their thickness and weight. The details of frames and the mail induction process are described in other sections of the instant application.

The frames are provided with a frame ID. This can be in the form of a bar code which is, e.g., applied to or stamped into the frame. Every frame within the system should have a unique identification. Since frames do not intentionally leave a mail processing facility, all frames in the entire universe do not necessarily require a unique ID. However, it is desirable to establish a frame labeling convention that uses a facility's identification as part of the label. This approach will circumvent any conflict of frame ID duplication if, e.g., a frame somehow ends up at the wrong facility.

The frame induction controller 1906 can utilize a dedicated machine control interface 1912 that allows the operator to start and stop the induction of the frames within the frame manager system 1900. The start operation can, e.g., sound an alarm for safety. Once the frame induction has been started, it is ready to receive empty frames.

The frame receiver 1901 accepts empty frames into the system via, e.g., a manual induction process. The frames can be new frames (i.e., never used) or frames that were rejected and sent to manual inspection 1913, but were determined to be fit for recirculation. Other frames can be received from other system functions via a shuttle unloader 1920. All frames that are inducted into the system 1900 are sent to the frame inspector 1903. Empty frames are also returned to the frame manager 1900 for inspection by other system functions 1919.

The frame inspector 1903 can preferably run an automated process of frame verification on all frames that are inducted into the system 1900, frames that have been "flagged" for inspection due to some exception in the system 1900, and on a sampling of frames that have circulated through the system. The frame inspector 1903 can also set the status of every frame that passes inspection to, e.g., "In Use", and the status of every frame that fails inspection to, e.g., "Expired". Frames can be discarded or sent to a manual inspection bin if any of the following are true; the frame is damaged or worn, the frame is missing a frame ID, the frame ID cannot be read successfully, the frame ID is not recorded in the frame identification table 1902, and every Nth frame has circulated through the system for a configurable number of loops. The frame Inspector 1903 can preferably maintain a recirculation counter for every frame in the frame identification table 1902. The counter can be incremented whenever a frame is received by the frame receiver 1901 and/or frame inspector 1903, regardless of how far through the system the frame advanced before it was returned to the frame manager 1900.

All discarded frames, i.e., frames which fail inspection in frame inspector 1903, should be manually inspected in manual inspection 1913 and any frames determined to be acceptable should be re-inducted into the system 1900. When a frame is re-inducted, its frame ID is located in the frame identification table 1902 and its status can be changed to, e.g., "In Use".

The frame manager 1900 also preferably maintains an audit trail of frame re-induction. An induction counter is maintained for every ID in the frame identification table 1902, for example. The counter can be set to, e.g., "1", when a new ID is assigned. The counter can then be incremented whenever a frame's status is changed from "Expired" to "In Use".

Frames that pass or bypass automated inspection in the frame inspector 1903 are placed into a shuttle by the shuttle loader 1904. Shuttles are received from the shuttle manager 1940 which will be described in detail below. Loaded shuttles are then sent to the storage manager 1915 via the transport controller 1914. The storage manager 1915 preferably provides the storage space for all frames (loaded and empty) and arranged in shuttles in the system.

Other system functions 1919, i.e., any of the system functions shown in FIGS. 38A and 38B, can also send alerts and status information to the frame manager 1900, which is received by an alert handler 1905 and displayed on a frame manager operator console 1916. Typical alert conditions may include a depletion of empty frames at a mail induction location or within a storage location. The other system functions 1919 can also provide shuttles with empty frames to the system 1900 whereby a shuttle unloader 1920 removes the empty frames and transfers them to the frame inspector 1903 and transfers the empty shuttles to the shuttle manager 1940.

Shuttle Manager

Figure 19B:
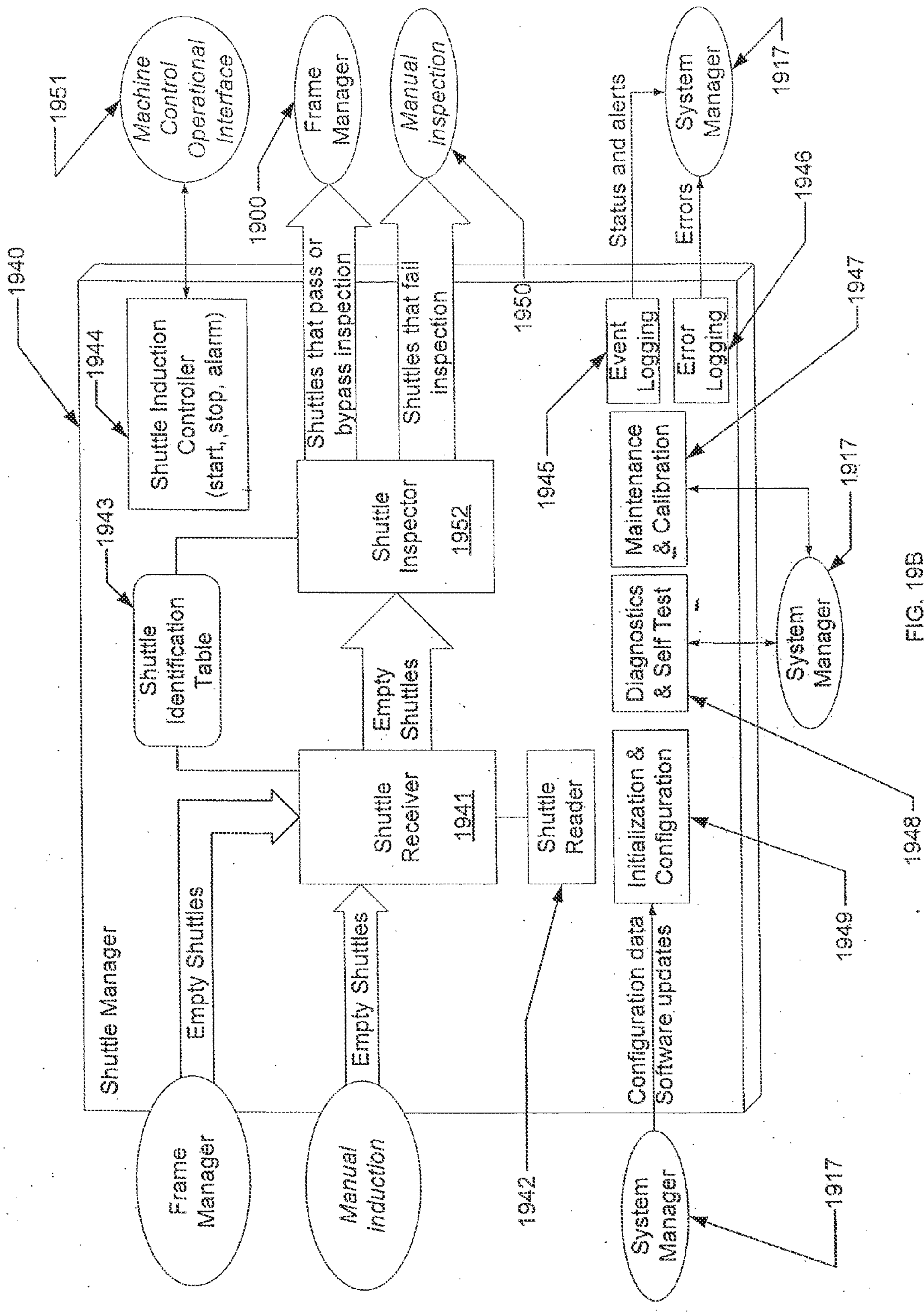
FIG. 19B shows a shuttle manager system architecture in accordance with aspects of the invention.

FIG. 19B shows a shuttle manager system architecture 1940 in accordance with one aspect of the invention (see, e.g., FIG. 38E). The system 1940 includes a number of sub-systems such as a shuttle receiver 1941 which receives empty shuttles, e.g., shuttles with no frames. The empty shuttles can be received in a variety of ways including manual induction or via lead-screws, belts, or other drive mechanisms. The shuttle receiver 1941 includes a shuttle reader 1942 which reads a shuttle's identification (ID) and compares the ID to data in a shuttle identification table 1943. The shuttle reader 1942 can be, for example, an optical recognition system or a bar-code reader. A frame manager, discussed in detail above, receives empty shuttles which have been successfully read from the shuttle receiver 1941. A shuttle inspector 1952 receives empty shuttles from the shuttle receiver 1941 and data from the shuttle identification table 1943. Shuttles that fail to be read or fail inspection are tagged and/or are forwarded to a manual inspection station or location 1950. Shuttles that pass inspection, or are otherwise caused to bypass inspection, are forwarded to a shuttle loader 1904 (see FIG. 19A) of frame manager 1900 which loads the frames onto the shuttles.

The system 1940 also utilizes a shuttle induction controller 1944 which can be controlled by an operator via a machine control operational interface 1951. An initialization and configuration sub-system 1949 receives configuration data and software updates for the system 1940 from a system manager 1917. The system manager 1917 also communicates with a diagnostics and self test sub-system 1948 and a maintenance and calibration sub-system 1947. The diagnostics and self test sub-system 1948 provides functions for trouble-shooting and checking the proper operation or functioning of the components of the system 1940. The maintenance and calibration sub-system 1947 provides functions for implementing maintenance procedures on each of the system components and performs alignment procedures on key functions such as, e.g., shuttle unloading, frame transport, frame diversion, and shuttle loading. An event logging sub-system 1945 provides status and alerts to the system manager 1917 while an error logging sub-system 1946 provides error data to the system manager 1917.

The operation of the system 1940 shown in FIG. 19B will now be described. The shuttle induction controller 1944 utilizes a dedicated machine control interface 1951 to allow the operator to start and stop the induction of shuttles within the shuttle manager 1940. The start operation can preferably sound an alarm for safety. Once the induction has been started, it is ready to receive shuttles. The shuttle receiver 1941 accepts empty shuttles into the system through a manual induction process via lead-screws, belts, or other drive mechanisms. The shuttle reader 1942 ensures the identification on the shuttle (i.e., the shuttle ID) can be read successfully and is unique. The shuttle reader can be, for example, an optical recognition system, RFID reader or a bar-code reader. All shuttle IDs are checked in the shuttle identification table 1943 for uniqueness. Shuttles which pass inspection in shuttle inspector 1952 (or are otherwise allowed to bypass inspection) and/or whose ID is read successfully and are unique are immediately sent to the frame manager 1900 to be loaded with empty frames. The shuttle reader 1942 also records the shuttle ID in the shuttle identification table 1943. Shuttles which fail inspection in shuttle inspector 1952 and/or whose ID cannot be read or whose ID is not unique are diverted to a manual inspection line or station 1950. An induction status is displayed on a machine control operational interface 1951.

Vertical and Horizontal Transportation of Batches of Mail

The present invention is directed to a system for vertical and horizontal transportation of batches of mail and storage thereof. More specifically, the invention relates to a mast-less Automated Storage/Retrieval System (ASRS) that transports shuttles via, for example, platforms by use of a rack and pinion system. The system enables full random access of shuttles that contain frames of mail pieces while allowing for maintenance access without concern for crossing masts.

The present invention also provides buffers to buffer or prevent several minutes of surge inputs from effecting system operation. In implementation, the assignment of destination locations to layers, and deciding when to process mail that is presorted to one destination (or that has a large percentage to a certain destination), should prevent frequent input shutdowns.

In embodiments, the transports (platforms) are independent units with a cross belt conveyor that loads mail (e.g., shuttles) onto and off of itself. The platforms travel through a grid or matrix of tracks that allows each platform access to every buffering cell or bin. The system can be used to sort and/or sequence mail pieces and can be used, for example, to transport mail pieces in shuttles (as described in other sections of the instant invention). In further embodiments, the system of the present invention can also be used as a buffer for sorting and/or sequencing of mail pieces (such as flats and letters simultaneously).

In embodiments of the present invention, the platforms operate on a plurality of tracks that allow them to move along storage aisles or locations in the ASRS. In embodiments, the platforms attach to tracks that allow them to move vertically and/or horizontally. For example, the system is designed to allow a platform to stop at locations to receive and dispatch shuttles from either a front or rear of cells. Illustratively, in embodiments, the platform can deliver a shuttle to the front while another platform receives a shuttle from the rear.

The system is also designed to provide maintenance access of the tracks and mechanisms when an area is cleared of platforms and/or shuttles. Special transports could be used to troubleshoot platforms that are, for some reason, not able to move or have some other detected problems. The servicing transport could move in proximity, above or below, to the failed platform, attach to it, and retract the failed platform from the system, e.g., detach the pinion wheels via a spring loaded mechanism in a manner known to those of skill in the art. The platform and other components of the present invention are structured to handle shuttles that can weigh in excess of over one hundred pounds.

Figure 20A:
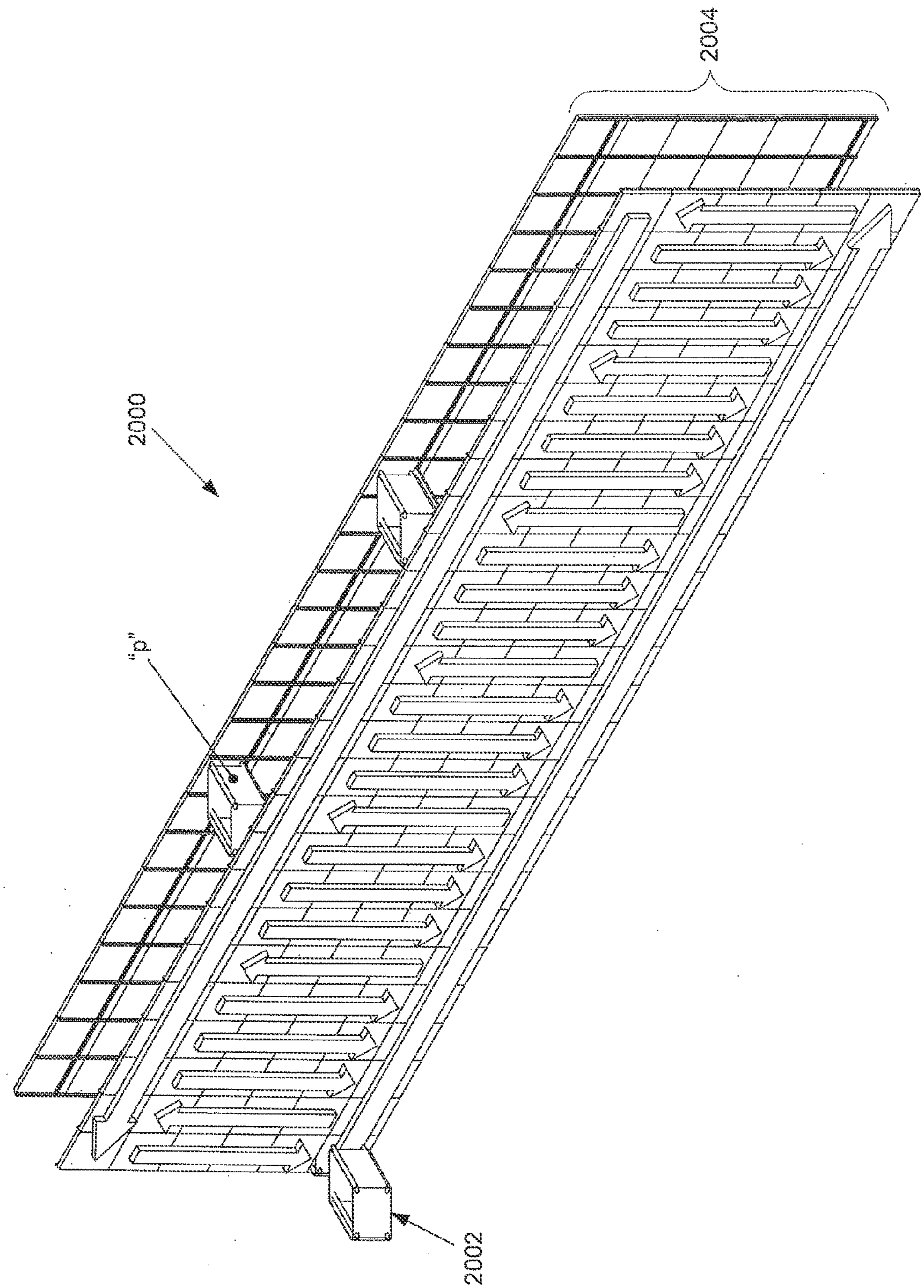
FIG. 20A show a transportation system in accordance with aspects of the invention.

FIG. 20A shows a transportation system in accordance with aspects of the invention, generally shown at reference numeral 2000. In embodiments, as shown in FIG. 20A, the transport system 2000 includes a receiving and/or discharge station 2002 which is designed to receive and discharge shuttles in accordance with the invention. For example, the receiving and/or discharge station 2002 can receive empty shuttles for temporary storage and discharge these empty shuttles to a presort accumulator where they are filled with frames. The receiving and/or discharge 2002 can then be used to receive the filled shuttles from the presort accumulator or other subsystems as described in the instant application for processing in the system of the present invention (e.g., in the system shown in FIGS. 20A and 20B). In embodiments, the shuttles include a plurality of mail pieces stored in frames such as, for example, letters and flats. The receiving and/or discharge station 2002 can be provided at other locations of the system and is shown at a lower portion of the transportation system 2000 for illustrative purposes only, which should not be considered a limiting feature of the present invention.

Still referring to FIG. 20A, the transportation system 2000 includes multiple levels 2004. In the embodiment shown in FIG. 20A, there are six levels 2004; although, more or less levels are contemplated by the present invention. As discussed in more detail with reference to FIGS. 20D-G, the transportation system includes a plurality of platforms “P” and related transportation mechanisms designed to transport the shuttles to each of the different levels and throughout the system (as shown in FIG. 20B, for example).

Figure 20B:
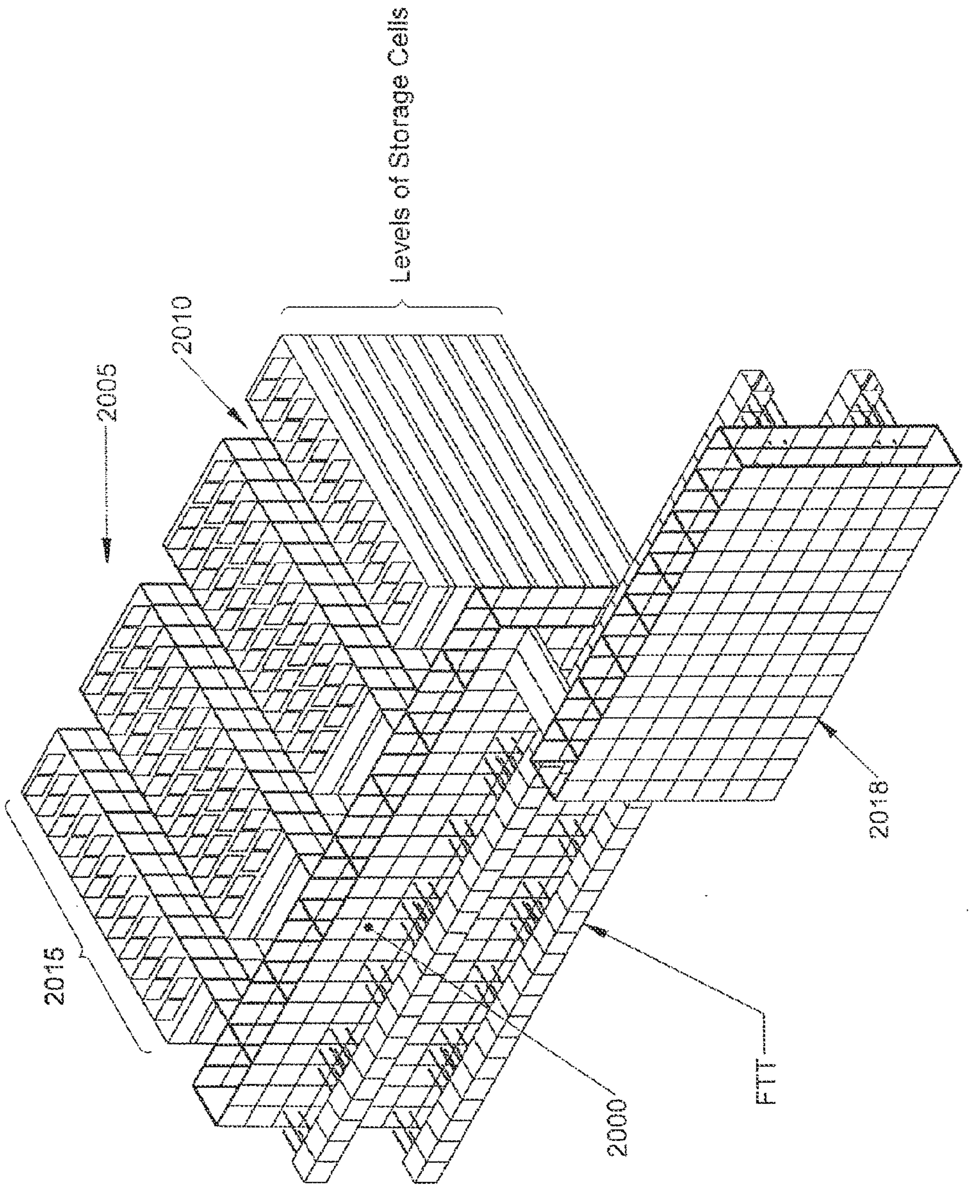
FIG. 20B show a buffering system in accordance with aspects of the invention.

FIG. 20B shows a related buffer system in accordance with aspects of the invention. Those of skill in the art should recognize that the two or more buffer systems as well as transportation systems shown in FIGS. 20A and 20B can work in conjunction with one another, e.g., be bridged to work as a single unit. In embodiments, the transportation system 2000 is connected to a plurality of storage aisles 2010 in the buffer system depicted generally as reference numeral 2005. In embodiments, the shuttles which were received in some order (e.g., random order) may be transported to any of the storage aisles 2010 for storage into individual storage cells 2015, from the transportation system 2000.

The storage cells 2015 can be on either or both side of the storage aisles 2010, and preferably adjacent to the platforms “P” such that the shuttles can be moved from the platforms to either side of the aisles 2010 to any of the storage cells 2015. The storage cells 2015 are structured and configured to store at least one shuttle. In embodiments, as shown in FIG. 20B, the buffer system includes six levels of storage cells 2015 with an equal number of rows as in the transportation system 2000. This allows the shuttles to be transported from the transportation system 2000 to any of the individual storage cells 2015 at any level of the buffer system 2005. In this way, the present system may be used to transport shuttles in a random access fashion.

In embodiments, the transportation system includes a buffer system 2005 for storing shuttles prior to the mail being sorted in accordance with aspects of the invention. In the present embodiment, the buffer system 2005 may include cells for one thousand shuttles; although, more or less cells for shuttles in the buffer system 2005 are contemplated by the present invention. The buffer system 2005 may be used for temporarily storing shuttles during the sorting and/or sequencing processes. The collection grid 2018 is used to refill the empty shuttles, in embodiments of the invention. In particular, frames filled with mail pieces may be transported in shuttles from storage aisles 2010 of the buffer system 2005 to the distribution grid 2000. The frames filled with mail pieces may then be removed from the shuttles and transported down the frame transport tube (FTT) for sorting or sequencing. Accordingly, while the frames filled with mail pieces are being sorted or sequenced, the empty shuttles are moved to the collection grid 2018. After the frames filled with mail pieces are sorted or sequenced, they are then loaded into the empty shuttles at the collection grid 2018. These shuttles, filled with sorted frames, may then be stored at the buffer system 2005 for a length of time. Additionally, the shuttles, filled with sorted frames at the buffer system 2005, may be transported to the storage aisles 2010 in a particular order, for storage and for subsequent removal from the storage aisles 2010 in a particular order.

In embodiments, the shuttles can be removed from the system shown in FIGS. 20A and 20B for sorting and sequencing processes. For example, the system can be used to transport shuttles (loads) to the storage aisles 2010 and storage cells 2015 in a random access fashion, with numerous platforms choreographed to pick up shuttles, deposit shuttles, as well as position shuttles for docking to processing stations or staging the mail pieces for in line processing. This can be accomplished by tracking and/or monitoring the position and/or location and contents of each of the shuttles as they enter the system, are stored throughout the system and are removed from the system. This can be performed under commands received from the computing infrastructure shown in FIG. 1A and more particularly from the FTA 2740, as the shuttles are transported throughout the transportation and buffer systems shown in FIGS. 20A and 20B. The contents of the shuttles can be recorded in a database, for example as shown in FIG. 1A, as they are placed on the shuttles, and the shuttles tracked as they enter and exit into and out of the system. Upon demand, the shuttles may be removed from the cells and brought to the storage area 2018, where the frames may be removed for sorting and/or sequencing at downstream processes. After the frames are sorted, they can be placed back into the shuttles and stored again in the system of FIG. 20B, for example. A dispatch manager and related controls, subsystems, and function as described in other sections of the instant application can be used, for example, to determine locations and positions of the shuttles, loading areas, etc., as well as monitor for jams, failures, or obstructions and if detected, dynamically select an alternative path.

Figure 20C:
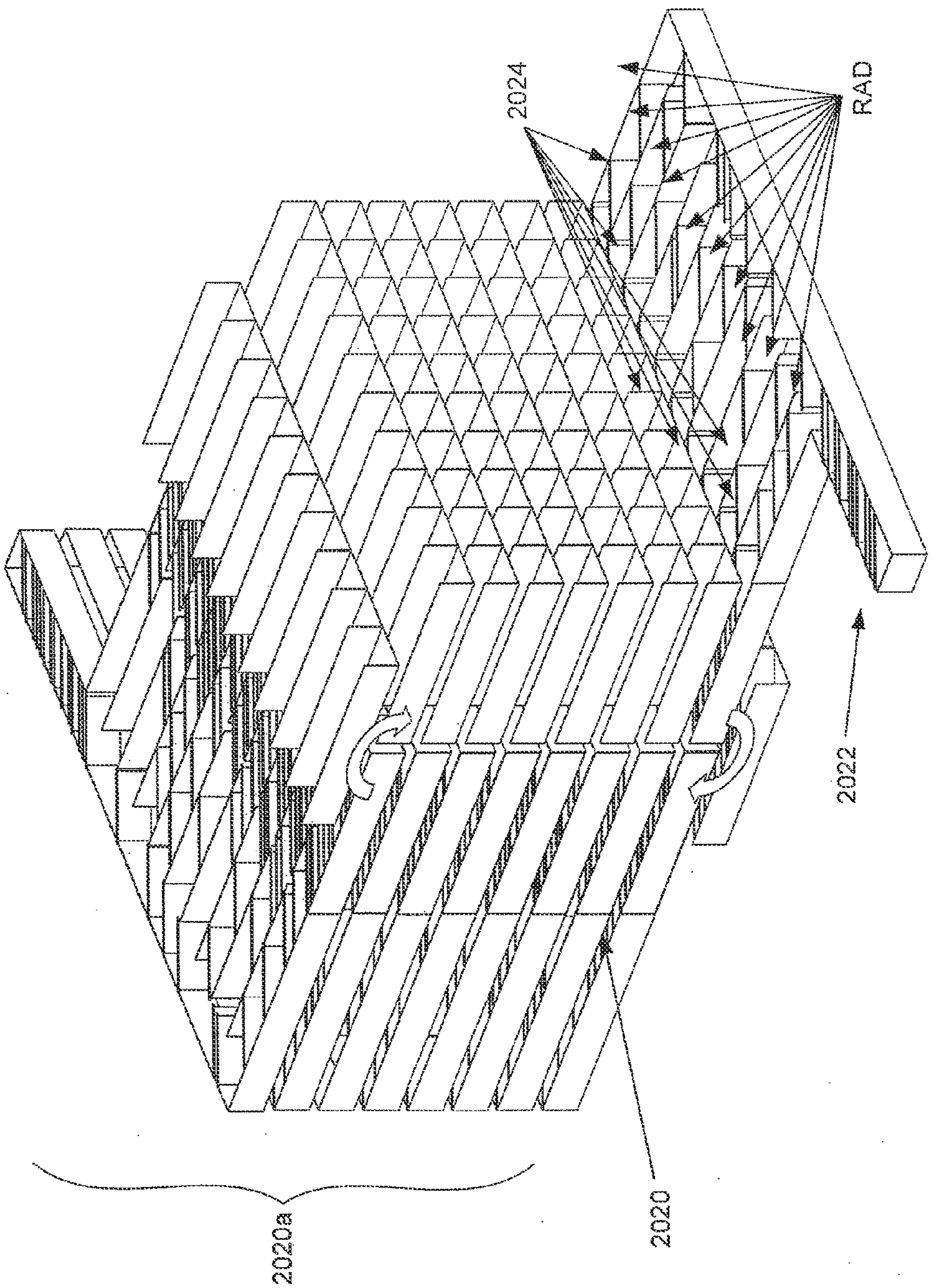
FIG. 20C shows an alternate transportation system in accordance with aspects of the invention.
Figure 20D:
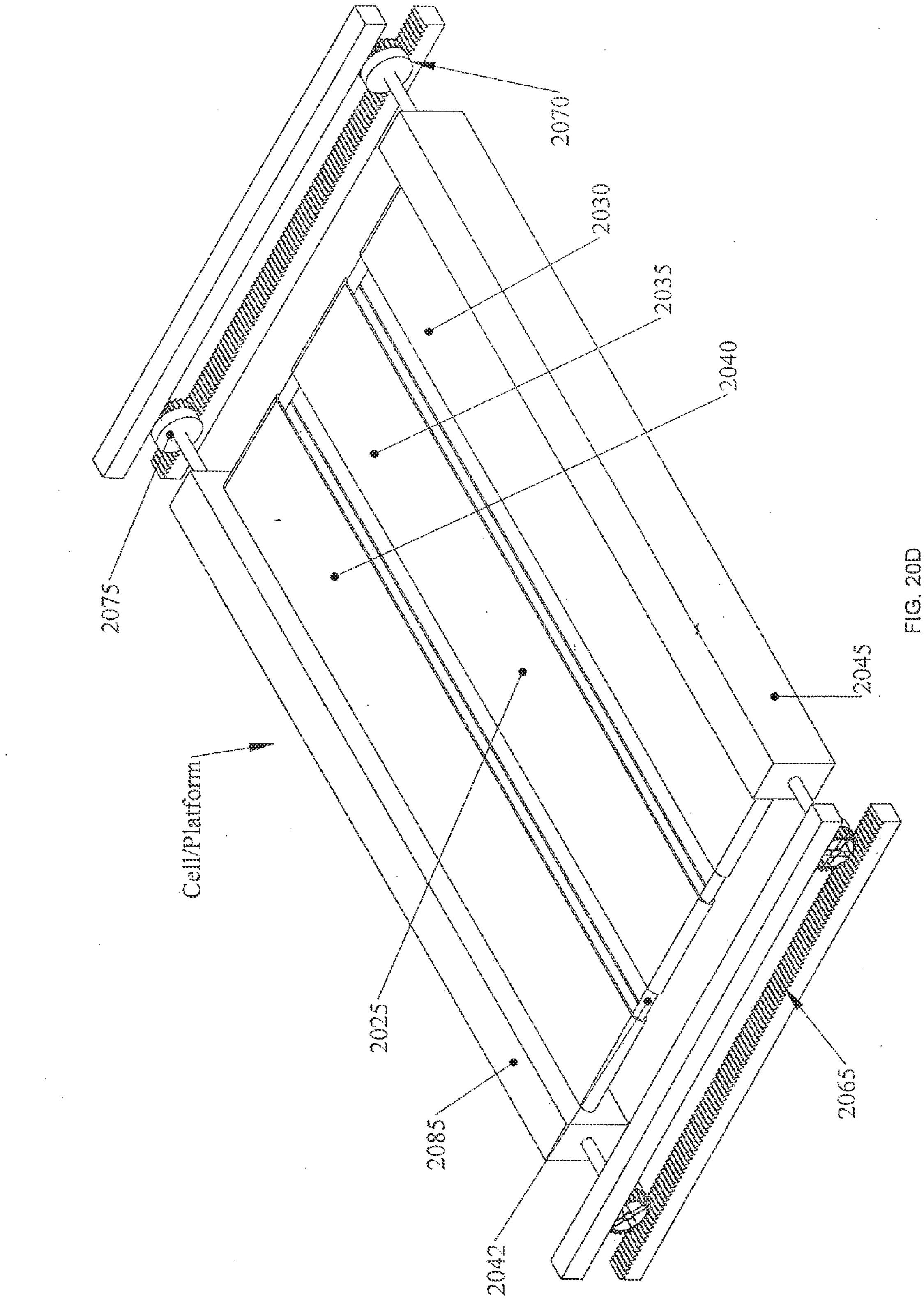
FIG. 20D shows details of a cell having a rack and pinion track system in accordance with aspects of the invention.
Figure 20E:
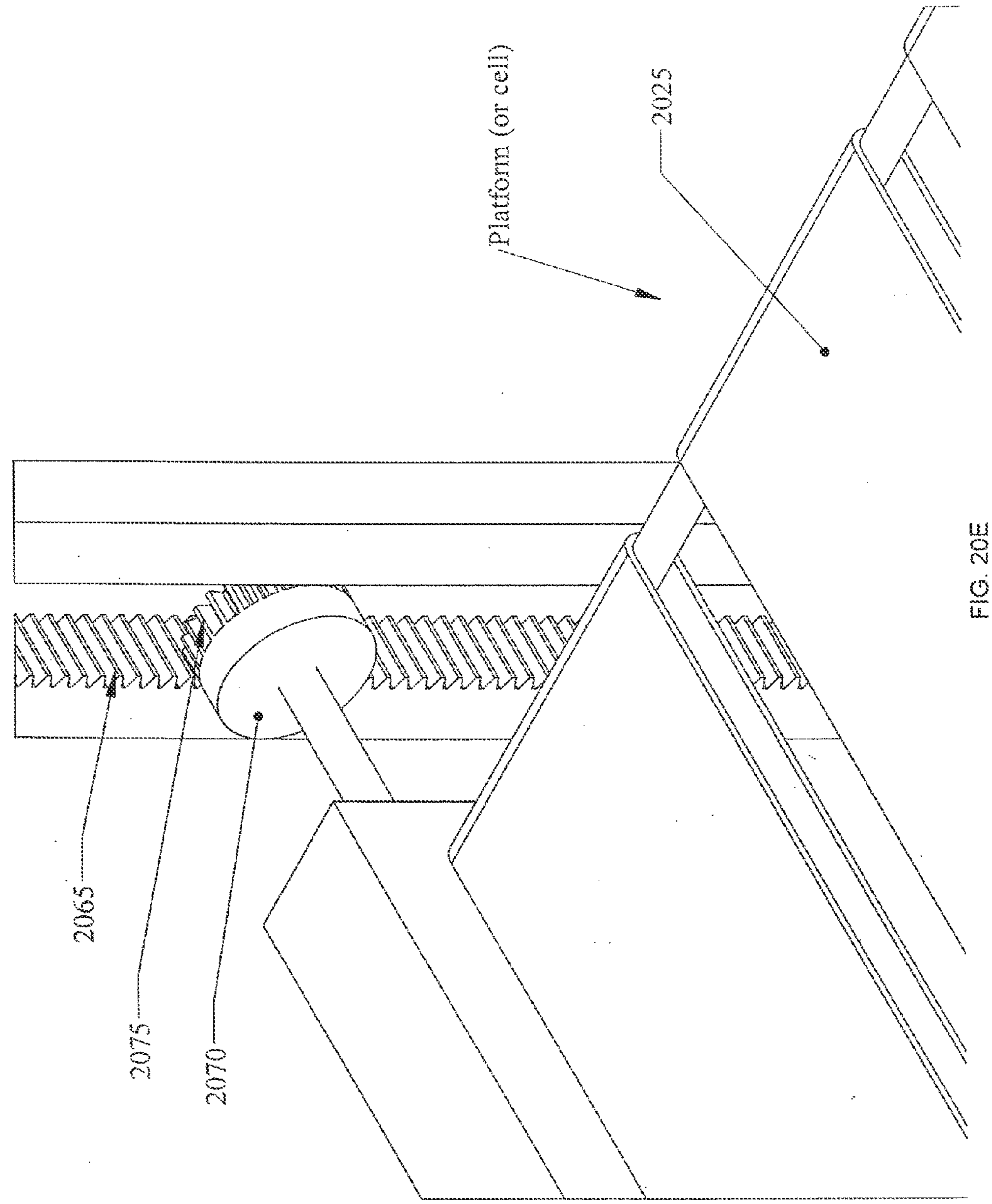
FIG. 20E is an enlarged view showing details of a platform and its gear mechanism that operate in accordance with aspects of the invention.
Figure 20F:
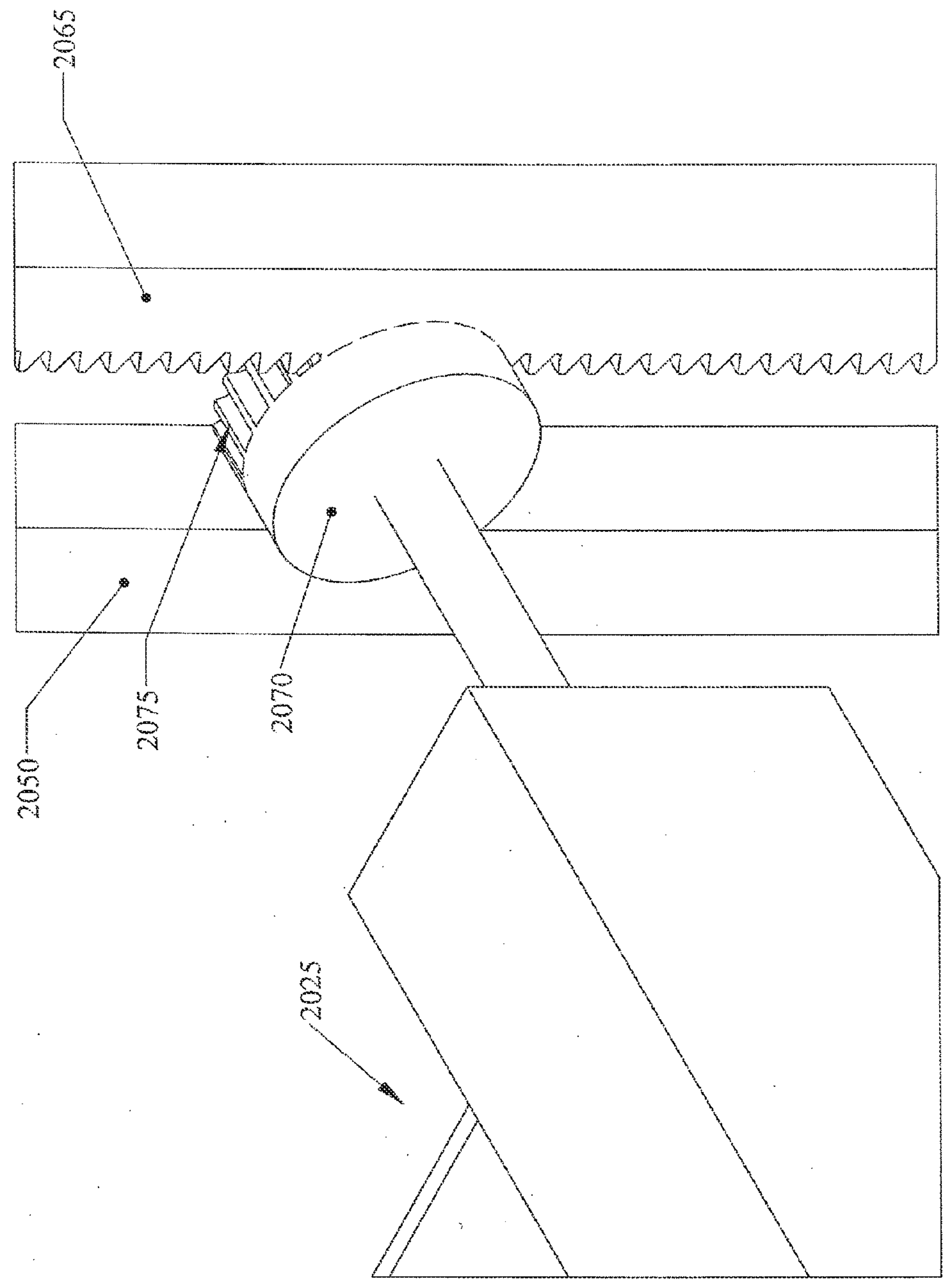
FIG. 20F is an enlarged view showing details of the platform and its gear mechanism that operate in accordance with aspects of the invention.
Figure 20G:
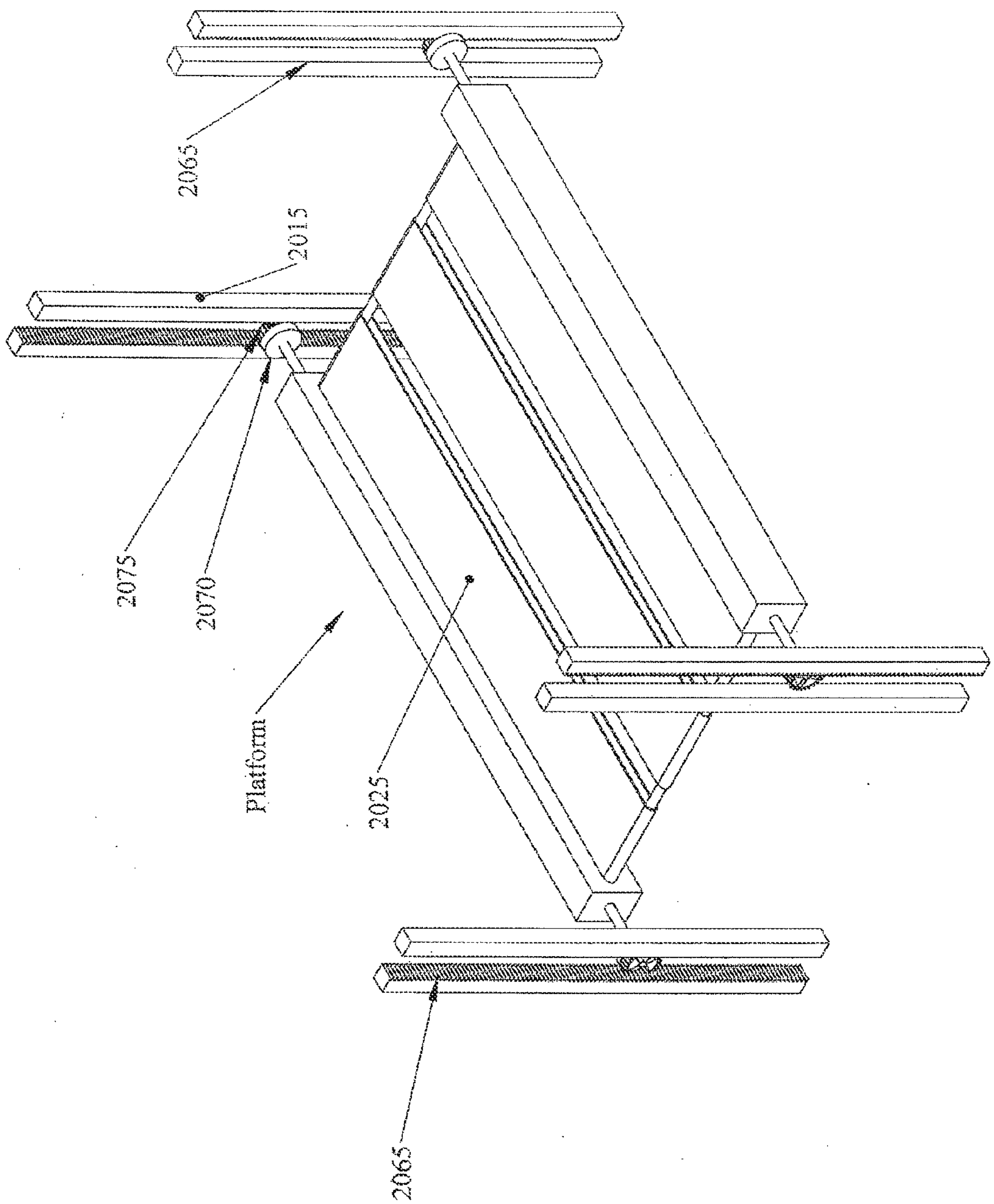
FIG. 20G shows details of the platform and its gear mechanism that operate in accordance with aspects of the invention.

FIG. 20C shows another embodiment in accordance with the invention. In this embodiment, the mail pieces can be provided within an elevating system shown generally as reference numeral 2020. The elevating system 2020 includes a plurality of levels 2020*a*, fed from a transportation path 2022. As should be understood by those of skill in the art, the transportation path 2022 is structured and configured to transport mail pieces that are stored in frames. This can be accomplished by use of lead screws (LS), cogged belts or other transportation system as discussed in the instant application. The transportation path 2022 also includes a plurality of right angle diverts (RAD) in order to move the frames to different transportation paths 2024. The transportation paths also can include compression and/or decompression zones as discussed in the instant application. The different levels also include transportation paths structured and configured to transport mail pieces that are stored in frames. Again, this can be accomplished by use of lead screws (LS), cogged belts or other transportation system, as well as right angle diverts (RAD). Although the vertical carousel shown in FIG. 20C is used for transporting mail pieces in frames, between a lower level and higher levels, it can equally be adapted for mail stored in shuttles using platforms as described herein.

In embodiments, FIG. 20C can be used as a buffer subsystem. As one exemplary illustration, the system can be contained in a space of 200 foot long×20 foot wide×20 foot high, and can accept input from all input devices and output on, e.g., 10 conveyors, each having a maximum throughput of 80,000 mail pieces per hour. The transportation paths 2024 are configured to hold the frames, e.g., having side rails for holding hooks of the frame. As the frame passes a certain conveyor, from the input section, it can be ejected there from by ejection mechanisms such as vacuums, pusher arms, etc. Once on the adjacent conveyor, the frames can be vertically transported.

FIGS. 20D-20G show details of a platform used with respect to the embodiment shown in FIGS. 20A and 20B. Generally, in either embodiment, the platform includes a rack and pinion track system for moving the platform between positions. The platform may be moved toward and away from any of the cells in a vertical or horizontal plane, depending on whether the platform is transporting shuttles in an aisle (reference 2010 of FIG. 20B) or between different levels. Also, in embodiments, as the platform is moveable, the cell is stationary.

More specifically, the platform may include an independent transport surface 2025 that may be, for example, one or more conveyor belts 2030, 2035, 2040 attached to a frame member 2045. The transport surface 2025, in such a configuration, may be an independent unit that is designed to transport shuttles onto and off of itself. The conveyor belts 2030, 2035 and 2040 may be driven belts, driven from a central pulley system shown generally at reference numeral 2042. This allows the conveyor belts 2030, 2035 and 2040 to be driven in two different directions, for loading and unloading shuttles. Conveyor belts 2030, 2035 and 2040 can alternatively be rollers.

As shown in FIGS. 20D-20G, the platform may be, for example, transported throughout the system of FIGS. 20A and 20B by a rack and pinion system in a horizontal and vertical direction. The rack and pinion system includes respective racks 2065 and a pinion 2070 that includes a gear 2075 cooperating with the racks 2065. The racks 2065, as should be understood by those of skill in the art, will define the track that leads the platforms throughout the system (to different levels, e.g., vertically) and to different aisles (e.g., horizontally) and cells. The tracks can also be used to define the cells, e.g., a grid or matrix of tracks comprising a substantially cube shaped space defined by the intersections of the horizontal and vertical racks.

The gears 2075 may be driven by any known mechanism such as, for example, a motor housed on the platform, itself. The platforms may be powered by a bus bar, or by a power storage device, such as a battery or capacitor. Alternatively or additionally, the platforms may also be charged by a charging device and thus able to move under their own power along the horizontal and vertical paths. By using the rack and pinion system it is thus possible to move the platforms along the tracks and throughout the entire system of FIGS. 20A and 20B.

In further embodiments, a wireless device 2085 may be used to send commands to each of the platforms and/or cells. These commands can originate from the computing infrastructure shown in FIG. 1A, for transporting shuttles to and from certain locations within the system, into the system and out of the system, for example. In this way, it is possible to prepare the mail pieces for sorting and/or sequencing and/or storage.

In use and under control of the computing infrastructure (master server) of FIG. 1, for example, initially, shuttles containing empty frames are temporarily stored in the storage subsystem of FIG. 20B. As the shuttles are needed, they are discharged to the transportation system and sent to an induction subsystem, to provide empty frames. Then, shuttles loaded with filled frames of mail pieces are sent back to storage subsystem via the transportation system. The shuttles containing filled frames may now be positioned in the buffer system, e.g., in the cells, via the use of the platforms, in a predetermined position. More specifically, the shuttles are put onto the platforms via the cross belt mechanism and transported to an appropriate cell via the rack and pinion system.

To obtain a particular order of the shuttles within the system, the storage area may be used to temporarily store some of the shuttles to permit rearranging of the shuttles. Also, the mail frames may be sorted and sequenced, placed back on the shuttles and replaced in the system of FIG. 20B for future retrieval. In this regard, mail frames filled with mail pieces may be removed from the shuttles at the distribution grid 2000 for sorting or sequencing and reinserted into shuttles at the collection grid 2018.

In particular, sorting at a segment level is performed as follows. Shuttles filled with frames (containing mail pieces) are transported to the distribution grid 2000. Frames are removed from the shuttles and onto frame transport conveyances, e.g., lead screws, for sorting and/or sequencing. In embodiments, the sequencing operation is preferably utilized with 10 shuttles, initially. As the sequencing commences, the sequencing operation is repeated, in embodiments, three times with ten shuttles so that $10^3$ mail pieces are sorted on the first run; sorting includes one hundred shuttles on the second run; and sorting includes one thousand shuttles on the third run. The filled shuttles can be transported to the cells for buffering, intermittently throughout the sorting and/or sequencing process, and/or all removed and transported as a stream, for example, for mail piece extraction.

Even more specifically, in embodiments, a plurality of shuttles, e.g., 10 shuttles, are removed from the storage cells 2015 in order to sequence the mail pieces. The shuttles are transported to docking stations where the mail pieces, in frames, are removed from the shuttles in order to begin the sequencing process for these mail pieces. In embodiments, each shuttle will accommodate an average of about 100 mail pieces (although more or less mail pieces per shuttle are also contemplated by the invention depending on the sizes of the mail pieces). In a contemplated embodiment, the mail pieces will be run through the sequencer three times in order to place them in sequence in relation to each other. For each pass, the mail pieces are removed from the shuttles at the distribution grid 2000 and transported through the frame transport tube FTT and reloaded back into the shuttles at the collection grid 2018, all of which constitute the sequencer. This results in a chain of 10 shuttles. The distribution grid 2000 and the collection grid 2018 can each include 10 docking stations, for example.

After a sequencing process, the chain of shuttles is brought back to the buffer 2005 for storage in respective storage cells 2015. The location and content of these shuttles are recorded, for example, by the computing infrastructure of FIG. 1A, for later retrieval. In one contemplated embodiment, this process will be repeated 10 times, e.g., until 100 shuttles are processed. Once the contemplated amount of shuttles is processed, e.g., 100 shuttles, the mail pieces in each of the processed shuttles are returned for the post sequence collection process to build a snake of shuttles (e.g., 100 shuttles) such that all of the mail pieces in the snake, e.g., about 10,000, are now in a sequence.

After the post sequence collection process, the snake of shuttles is brought back to the buffer 2005 for storage in respective storage cells 2015. The location and content of these shuttles are recorded, for example, by the computing infrastructure of FIG. 1A, for later retrieval. In embodiments, this post sequence collection process can be repeated 10 times to produce 10 snakes of shuttles for final sequencing and dispatch. Once the contemplated amount of shuttles is processed, e.g., 1000 shuttles or when all of the mail pieces are received for the day, the mail pieces in each of the processed shuttles are returned for the dispatch process to build a stream of shuttles (e.g., 1000 shuttles) such that all of the mail pieces in the stream, e.g., about 100,000 mail pieces, are now in a final sequence and sent to the frame extractor for extraction of the mail pieces.

In further embodiments, the system is capable of providing its own maintenance. In this regard, certain platforms (e.g., transport elements) may be dedicated to be special, or service, transport elements. These special transport elements troubleshoot other platforms that are unable to move or have failed in other ways. In embodiments, a special transport element moves in proximity to a failed platform, attaches to it by a conventional latching mechanism, and retracts the pinions of the failed platform by use of a robotic arm or activating a spring loaded pinion mechanism. The special transport element then transports the failed platform from the system for servicing.

In embodiments of the invention, the sequencing process is performed as follows: (1) a grid transport unit (GTU) or platform, in an ASRS aisle extracts a shuttle from a storage rack cell; (2) the ASRS GTU transports the shuttle to the distribution grid interface; (3) the shuttle is driven off of the ASRS GTU and on to a turntable; (4) the turntable rotates the shuttle ninety degrees; (5) a distribution grid GTU extracts the shuttle from the turntable; (6) the distribution grid GTU transports the shuttle to an input frame transport tube (FTT) docking station; (7) the distribution grid GTU shuttle partially ejects the shuttle into the input docking station so it can be engaged; (8) the frames are driven from the shuttle into the input of the FTT; (9) when the shuttle is empty, the docking station disengages and the distribution grid GTU pulls the shuttle back on board; (10) the distribution grid GTU transports the empty shuttle to the grid crossover conveyor; (11) the distribution grid GTU ejects the shuttle onto the grid crossover conveyor; (12) a collection grid GTU receives the empty shuttle from the grid crossover conveyor; (13) the collection grid GTU transports the empty shuttle to an output FTT docking station; (14) the collection grid GTU shuttle partially ejects the shuttle into the output docking station so it can be engaged; (15) the frames are received by the shuttle from the output of the FTT; (16) when the shuttle is full, the docking station disengages and the collection grid GTU pulls the shuttle back on board; (17) the collection grid GTU transports the filled shuttle to the grid crossover conveyor; (18) the collection grid GTU ejects the shuttle onto the grid crossover conveyor; (19) a distribution grid GTU receives the filled shuttle from the grid crossover conveyor; and (20) the distribution grid GTU either takes the shuttle to an input docking station for continued sequencing or to an ASRS interface to go back into storage.

According to aspects of the invention, additional processing may be performed as follows: (1) shuttles with empty frames are sent to induction; (2) empty frames are fed into the inserter systems so that mail pieces can be placed into them; (3) the shuttles that have emptied their frames into the inserters, now go to the presort accumulator; (4) the now filled and presorted frames are loaded into the shuttles; (5) the full shuttles are transported back to the appropriate segment; and (6) once in the segment, the frames are sorted again to the unit level, with five units per segment. The invention is not limited to any particular order of the above-described processing steps, and it is to be understood that steps may be performed in a different order than described herein. Moreover, steps may be omitted and/or other steps may be added within the scope of the invention.

Mail Piece Buffering for Address Recognition Completion in a Facility-Wide Sorting and/or Sequencing System The invention provides a system and method for buffering mail pieces for address recognition completion in a facility-wide sorting and/or sequencing system. The invention also provides a system and method for buffering mail pieces contained in or supported in individual mail frames or clamps in a facility-wide mail sorting and/or sequencing system during completion of address recognition (in particular, video encoding).

Letters and flats mail pieces (generally referred to as mail pieces), when inducted into a sorting system, may require address recognition be performed to obtain address information. These mail pieces should be temporarily buffered until address recognition operations (e.g., automatic address resolution and/or video encoding) are completed. Mail sequencing machines within the USPS provide no buffering capability or limited buffering capability. For example, letter-sequencing machines immediately hold out mail pieces for which an address is not yet determined. These mail pieces are typically re-fed by an operator at a later time. Flats machines (e.g., an AFSM-100 machine), on the other hand, are capable of buffering mail pieces for about two minutes, after which they are dumped into a container to be later re-fed into the machine or manually sorted.

The invention advantageously utilizes a component or system referred to as a "frame buffer" which buffers mail pieces contained in frames or clamps for which the address result is not currently known. The system of the present invention is particularly useful in a facility-wide mail sorting and/or sequencing system capable of sorting and sequencing letters, flats, parcels, etc. (all of which are referred to as mail pieces)

According to the invention, frames and/or clamps are staged in a storage area until either, for example, an address result becomes available or a configurable time threshold has elapsed. If an address result becomes available, the frame and/or clamp can be immediately located and removed from the buffer storage area and sent to sorting/sequencing operations. If the configurable time threshold has elapsed, the mail pieces can be extracted from the frames and/or clamps and removed from the system. This solution is advantageous because, among other things, it precludes the need to reject and re-feed mail pieces while waiting for an address result. Buffering mail pieces thus saves operational time and work force labor.

The frame buffer function of the present invention provides a staging area for frames (and/or clamps) containing a mail piece for which address results are not yet available (i.e., the image is being video encoded). In embodiments, although the frame insertion process is complete, the frames are not sent to sorting and sequencing until the address result is received. As a result, frames are temporarily stored in the frame-staging buffer. This buffer is preferably of sufficient size to contain a number of mail pieces without overflowing.

The present invention also comprises a frame receiving system and a buffer controller system. In embodiments, the frame receiving system may receive frames from a frame inserter as described in other sections of the instant application. In embodiments, the frame buffer system may comprise a frame reader which is configured to read information such as, for example, bar code information, from the frame. In embodiments, the frame buffer system may further comprise a mail piece extractor as described in other sections of the instant application, in addition to a frame staging buffer, a frame locator and an address receiver. In embodiments, the frame buffer system further comprises a frame and mail piece association table which is provided in a database, for example.

The invention also provides, in embodiments, a method of buffering frames comprising utilizing at least one system recited above to at least receive frames with mail pieces, read frames with mail pieces, buffer frames, and/or extract mail pieces from the frames. The invention additionally provides the method of buffering frames in a facility-wide mail sorting and/or sequencing system. This method includes, for example,

- receiving and accepting frames and reading identification (ID) information from the frames,
- placing the frames into at least one frame staging buffer,
- retrieving address results,
- comparing a frame ID to a mail ID,
- locating a frame in the at least one frame staging buffer,
- providing ID and position data to a buffer controller,
- identifying and removing frames, and
- sending the frames to a mail piece extractor.

Those of skill should recognize that any of the subsystems of the present invention which require control or computing can be implemented or can use the computing infrastructure of FIG. 1A.

Figure 21A:
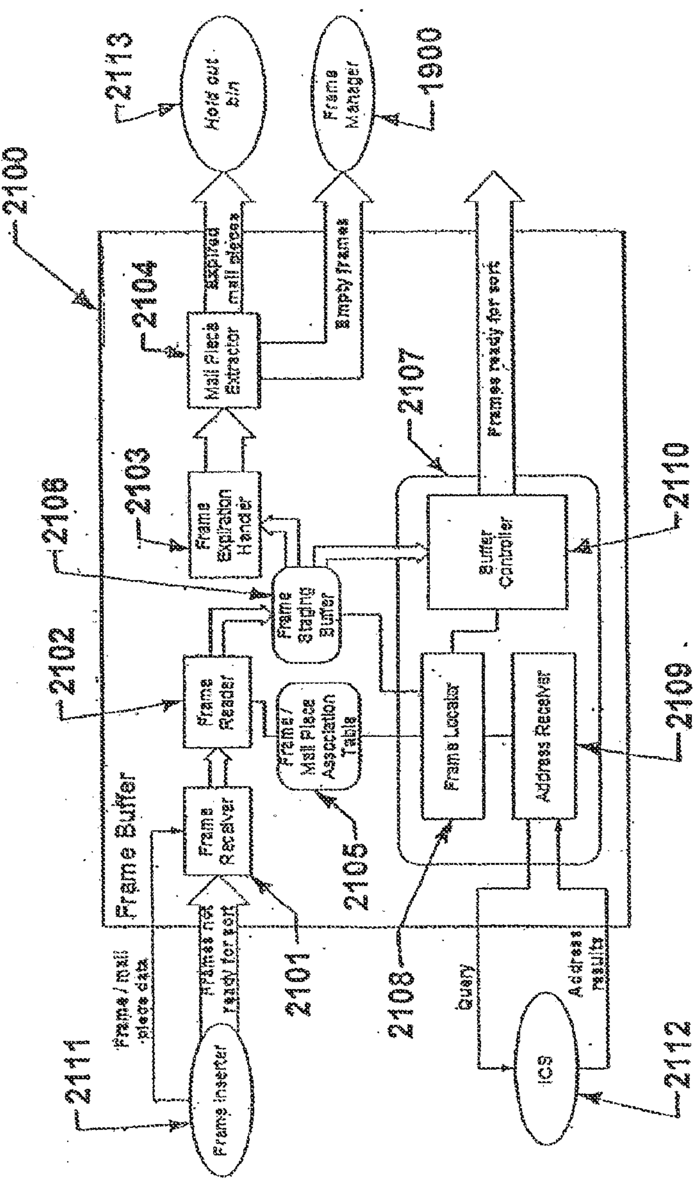
FIG. 21A shows a frame buffer system architecture in accordance with aspects of the invention.

FIG. 21A shows a frame buffer system architecture 2100 in accordance with aspects of the invention. The frame buffer system architecture 2100 includes a number of sub-systems such as a frame receiver 2101 which receives frames each having a mail piece held or stored therein. The frames can be received in a variety of ways including manual induction, but are preferably received from a frame inserter 2111 of the instant invention. The frame receiver 2101 includes a frame reader 2102 configured to read a frame identification (ID) placed on or associated with the frame. The frame reader 2102 communicates with a frame/mail piece association table 2105 via a wireless or wired communication link.

A frame staging buffer 2106 receives the frames from the frame reader 2102 and communicates with the frame locator 2108 via a wireless or wired communication link. The frame locator 2108 is configured to locate the frames in the frame staging buffer using, for example, a frame ID and last known position of the frame. Frames leave the frame staging buffer 2106 and pass to either a frame expiration handler 2103 or a buffer controller 2110. Frames which are determined to have expired are passed to the expiration handler 2103, and move to the mail piece extractor 2104 whereupon the mail pieces are removed from the frames using the methods described in the instant application. The empty expired frames are then transferred to a frame manager 1900; the removed mail pieces are transferred to a hold out bin 2113.

The sub-system 2107 includes the buffer controller 2110 and frame locator 2108, as well as an address receiver 2109. The functionality of the frame locator 2108 and the address receiver 2109 is described in more detail with reference to FIG. 21B. The address receiver 2109 communicates with the frame locator 2108, sends query information to an identification code sort (ICS) system 2112, and receives address results from the ICS 2112. The buffer controller 2110 and the frame staging buffer 2106 utilize information from the frame locator 2108 and the address receiver 2109. Frames that exit the buffer controller 2110 are deemed ready for sorting.

The operation of the system 2100 shown in FIG. 21A will now be described with reference to FIGS. 21A and 21B. The processes of FIGS. 21A and 21B can be implemented using the computing infrastructure of FIG. 1A. In a facility-wide mail sorting and/or sequencing system, the frame buffer 2100 provides one or more staging areas for frames containing a mail piece for which address results are not yet available (i.e., the image is being video encoded). Although the frame insertion process is completed by the frame inserter 2111, frames cannot be sent to sorting and sequencing until the address results are received. Frames can thus be temporarily stored in one or more frame staging buffers 2106. The staging buffers 2106 are of sufficient size to contain a number of frames without overflowing. The frame staging buffers 2106 are preferably utilized in a facility-wide mail sorting and/or sequencing systems to handle video encoding volumes experienced at a mail processing facility.

Figure 21B:
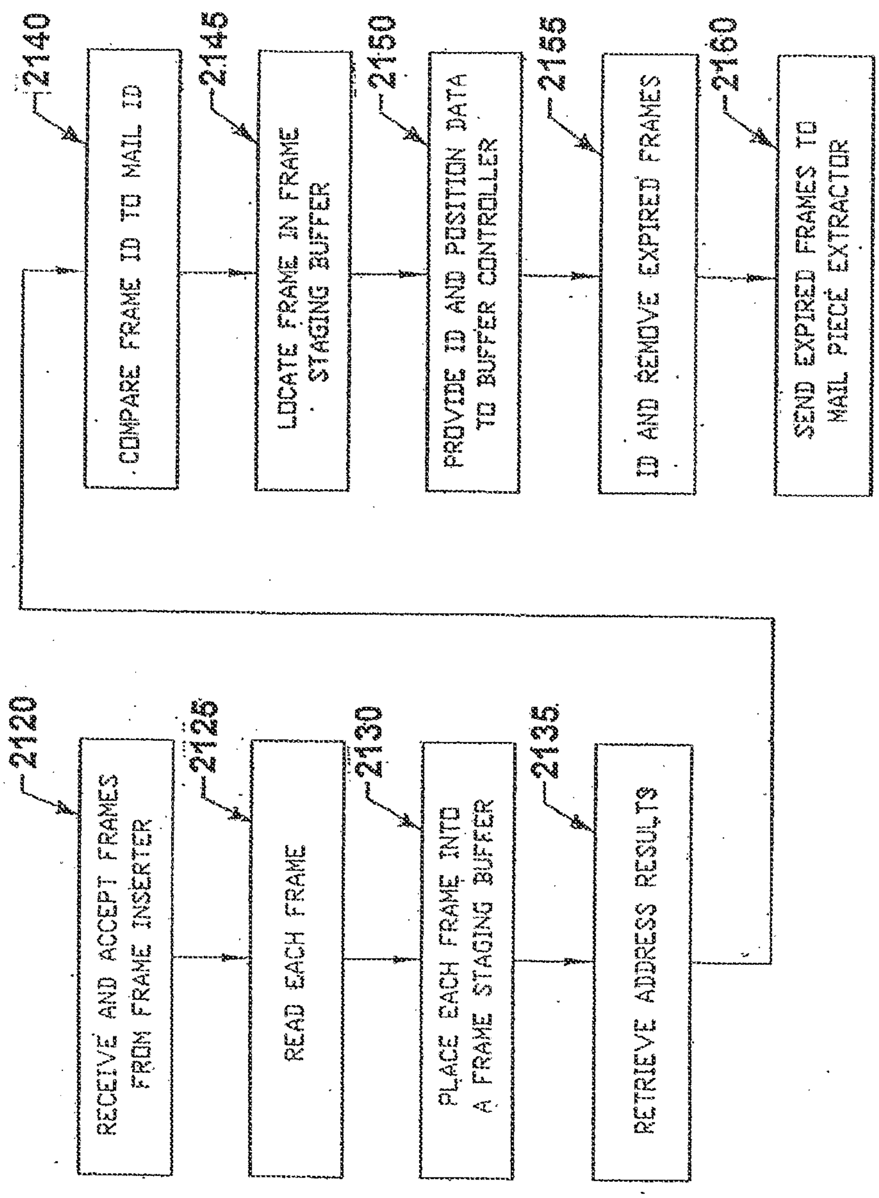
FIG. 21B shows a frame buffer method in accordance with aspects of the invention.

FIG. 21B shows a frame buffer method in accordance with aspects of the invention. In step 2120, the frame receiver receives frames from the frame inserter 2111 shown in FIG. 21A (see also sections 23, 35 and 38). Information is also received that identifies the mail piece that is contained in each frame by a unique identification (ID) tag. Note that within USPS mail processing facilities, ID tags are applied to all letters and flats mail pieces that require video encoding to resolve the address.

In step 2125, the frame reader 2102 reads the unique ID of the frame and creates a relationship of each frame ID and mail piece ID tag in a frame/mail piece association table 2105, which may be stored in a database known to those of skill in the art. In step 2130, the frame reader 2102 places the frame into the frame staging buffer 2106. In step 2135, when address results become available, the results are entered by the video encoding system (described elsewhere in more detail on other sections of the instant application) into the ICS system 2112. The address receiver 2109 periodically queries the ICS system 2112 using the mail piece ID tag to retrieve results as they become available. When an address result is found, the address receiver 2109 provides the address and ID tag to the frame locator 2108.

In step 2140, the frame locator 2108 looks up the mail piece ID tag in the frame/mail piece association table 2105. In this way it is possible to determine the frame ID that the mail piece is contained in the frame. In step 2145, the frame locator 2108 uses the frame ID to locate the frame in the frame staging buffer 2106.

In step 2150, once the frame is located, the frame locator 2108 provides the ID and position of the frame in the frame staging buffer 2106 to the buffer controller 2110. The buffer controller 2110 manages the physical movement of the frame out of the frame staging buffer 2106 and onto the next sorting operation.

The remaining steps can occur in parallel with the above-noted steps 2135-2150. In step 2155, the frame expiration handler 2103 periodically checks all frames in the frame staging buffer 2106. If any frame has been staged for an amount of time that exceeds a predetermined threshold, then the frame expiration handler 2103 removes the frame from the frame staging buffer 2106. In step 2160, the frame expiration handler 2103 sends the frame to the mail piece extractor 2104 which extracts the mail piece from the frame and sends or transfers the mail piece to a hold out bin 2113. The mail piece can be extracted in numerous ways as described in the instant invention. The empty frame can then be sent to the frame manager 1900.

The invention also contemplates alternative methods or systems of buffering. For example, mail piece buffering could occur before the mail piece is placed into a frame or clamped in a clamp. In this case, the buffer could be a stack of mail pieces that is automatically re-fed. A re-feeding of the mail pieces can occur periodically. During re-feed, the ICS system 2112 would be queried for an address. If the address is still not available at the time of the request, then the mail piece would either be re-fed (again) or rejected. Alternatively, instead of periodically querying the ICS system 2112, the address in ICS system 2112 is only requested at the expiration time of the mail piece. If the address is still not available at the time of the request, then the mail piece is rejected.

Machine to Merge Separated Flats and Letters (Each in Delivery Point Sequence (DPS)) into a Single DPS Stream or Group of Mixed Mail Pieces The present invention relates to a mail-merger processing system (MMPS) for delivery point sequenced (DPS) letters and DPS flats together. In this regard, the mail-merger processing system (MMPS) of the present invention provides for the merging of DPS letters and DPS flats, which previously had to be separately sorted and sequenced by different machines (i.e., due to differences in size and shape). This increases the efficiency of the postal system by reducing the manual effort required to process and deliver mail of different types. More simply put, the mail-merger processing system (MMPS) is capable of accepting DPS letters and DPS flats, and merging the DPS letters and DPS flats together into a single stream of mail pieces for delivery.

Currently, the United States Postal Service (USPS) sorts a large percentage of mail to DPS using multiple passes on Delivery Bar Code Sorters (DBCSs). USPS is also in the process of deploying a Flats Sequencing System (FSS) which sorts flats to DPS using multiple passes. The separated DPS flats and DPS letters are then manually merged by a postal employee (e.g., mail carrier) prior to delivery at the delivery point.

Figure 22:
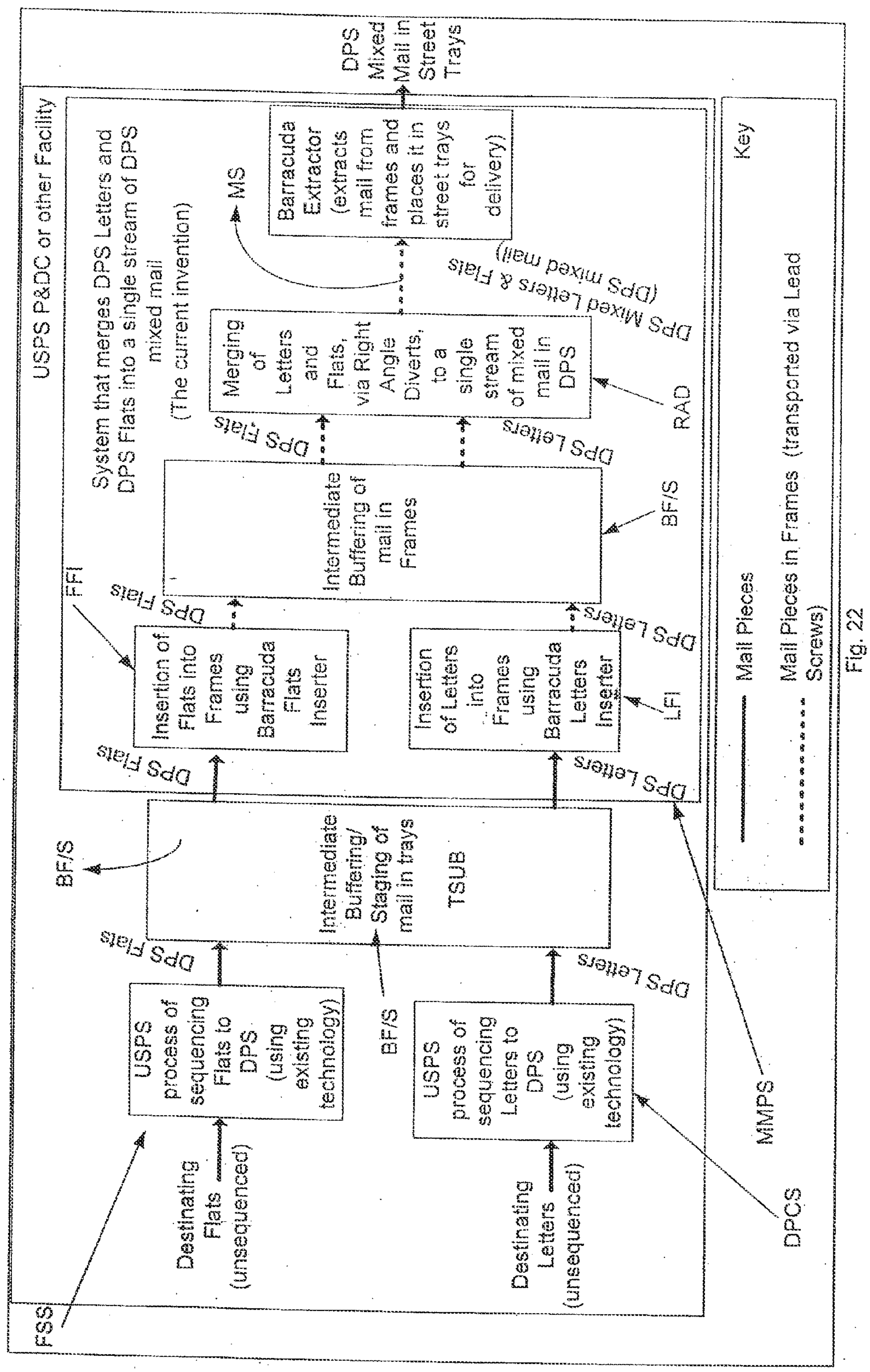
FIG. 22 shows a mail-merger processing system (MMPS) in accordance with aspects of the invention.

FIG. 22 shows a mail-merger processing system (MMPS) of the present invention. The mail-merger processing system (MMPS) of the present invention incorporates several subsystems for transporting and conveying mail pieces, i.e., as described in various portions of the instant application. In this regard, the mail-merger processing system (MMPS) includes induction systems, mail frame inserting systems, conveyance systems for conveying the frames with mail pieces therein in a stack by orienting the frames at 45 degrees to their direction of travel and diverting and merging systems using, for example, lead screws or other transportation and diverting mechanisms described in the instant application. The inserting of individual mail pieces into frames provides the individual mail pieces with a substantially uniform shape and/or size; thereby making handling and removal of mail pieces from the easier.

Additionally, the mail-merger processing system (MMPS) of the present invention may utilize the technologies described herein for meeting only a smaller part of the facility's mail processing requirements. In this regard, U.S. Patent Publication No. 2004/0211709 is incorporated herein by reference in its entirety.

In further detail, still referring to FIG. 22, in the mail-merger processing system (MMPS) of the present invention, letters mail may be sequenced to DPS using existing technology, e.g., DBCS. Similarly, flats mail may be sequenced to DPS using existing technology, e.g., Advanced Flats Sortation Machines (AFSM 100s), Upgraded Flats Sorting Machines (UFSM 1000s), or the Flats Sequencing Systems (FSS machines), known to those of skill in the art. Subsequent to the separate sequencing of DPS letters and DPS flats by existing technology, the mail-merger processing system (MMPS) accepts the previously separated DPS letters and DPS flats in batches of some number of mail pieces. In this regard, each batch may be contained in, e.g., a container or tray (or any other suitable holding area).

In embodiments, the separated DPS letters and DPS flats are inserted into an induction system of the mail-merger processing system (MMPS) and merged together by inserting individual mail pieces (i.e., DPS letters and DPS flats) into frames. This provides the individual mail pieces with a substantially uniform shape and/or size. The frame induction system as well as the transporting and/or merging systems are described in the instant application and are incorporated into the present invention.

In yet another non-limiting embodiment, the invention may accept DPS letters and DPS flats in separate continuous streams from the upstream machines (e.g., DBCSs and AFSMs). Thus, in this embodiment, the separated DPS letters and DPS flats may be continuously inserted into the induction system of the mail-merger processing system (MMPS) and merged together by inserting individual mail pieces (i.e., DPS letters and DPS flats) into frames. In other words, in the aforementioned embodiment, DPS letters and DPS flats may be introduced directly into (e.g., from the DBCSs and AFSMs by a transportation subsystem (TSUB) which connects an output end of the DBCSs and AFSMs to the system of the present invention) the system of the present invention without any manual intervening steps.

For example, an inductor of the mail-merger processing system (MMPS) of the present invention may be provided with letter frame inserter(s) (LFI) appropriately sized for introducing DPS letters into the mail-merger processing system (MMPS) and flats frame inserter(s) (FFI) appropriately sized for introducing DPS flats into the mail-merger processing system (MMPS). Accordingly, the frame inserter(s) (LFI and FFI) may insert the DPS letters and flats into the frames. Subsequently, the DPS letters and the DPS flats may be introduced into a portion of the mail processing system which may include the right angle divert (RAD) and other conveying mechanisms in order to merge the DPS flats and letters together in a DPS order. Therefore, after the DPS letters and the DPS flats have been merged into a mixed stream (MS) (i.e., a stream including both DPS letters and the DPS flats) they may be extracted from the frames for delivery to an appropriate destination.

It should be appreciated that the DPS letters and DPS flats may be merged into any number of mixed stream (MS), and extracted from the frames for delivery to any number of destinations. For example, it is contemplated that the DPS letters and flats may enter the system downstream from unsequenced mail pieces. More specifically, the DPS letters and DPS flats may be inserted into the sequenced mixed mail stream at a location where the other mail pieces (which are being sequenced in the system of the invention) is at the same sequencing stage. This ensures that the DPS letters and DPS flats do not have to needlessly be sequenced and thereby increasing the efficiency of the MMPS.

In further embodiments, saturation mail may be inserted into the sequenced mixed mail at any stage of the sequencing process. In one example, the saturation mail may be inserted into the mixed mail at a final sequencing stage or at a stage prior to the mail, in sequence, being extracted from the frames. Saturation mail can also be sequenced with the mixed mail as the mail pieces are being extracted from the frames. In this example, the saturation mail would not need to be inserted into a frame, but instead would be injected directly from a hopper into the sequenced mail as the mail is extracted from each frame. This can be done by way of a pinch belt feeding mechanism, for example. It is further contemplated by the invention to include an address printer or address label printer to print addresses on the saturation mail prior to it being inserted into the sequenced mixed mail. In any of these embodiments, the insertion of the saturation mail advantageously allows for less storage requirements for the saturation mail and, in embodiments, provides additional facility floor space for other operations (other than the storage of the saturation mail).

In further embodiments, residual mail may be inserted into the sequenced mixed mail at any stage of the sequencing process. In one example, the residual mail, in a sequenced order, may be inserted into the mixed mail at a final sequencing stage or at a stage prior to the mail, in sequence, being extracted from the frames. In this case, the residual mail may also be placed in frames prior to the insertion. Residual mail can also be sequenced with the mixed mail as the mixed mail pieces are being extracted from the frames. In this example, the residual mail, which is in a sequenced order, would not need to be inserted into a frame, but instead would be injected directly into the stream of the sequenced mixed mail by way of a pinch belt feeding mechanism, for example. Prior to the insertion of the residual mail, an address or other identification of the residual mail is read or manually keyed by an operator such that the residual mail can be inserted into the proper location of the sequenced mixed mail.

In any of these embodiments, the insertion of the residual mail will eliminate the need to manually sequence (intermix) the residual mail with already sequenced mail, or have the residual mail placed in a separate bin for a postal carrier. Advantageously, in any of the embodiments, manual processing steps can be eliminated or reduced, as well as eliminating the need for a separate bin for the residual mail for the postal carrier.

Additionally, the mail-merger processing system (MMPS) may be provided with buffering and storage (BF/S) capabilities. For example, buffering and/or storage (BF/S) may be provided between outputs of the DPS letters and DPS flats and frame inserter(s) (LFI and FFI). Further, buffering and/or storage (BF/S) may also be provided between an output of the frame inserter(s) (LFI and FFI) and an input of the right angle divert (RAD) or other portion of the system. In this regard, since the present invention is useful in automatically merging DPS letters and DPS flats, DPS letters and DPS flats (as they become available) may be input into the present system and buffered and/or stored (BF/S) until it is determined that sufficient DPS letters and DPS flats are present and should be merged, sequenced, sorted, etc.

Additionally, after the DPS letters and DPS flats are merged the mail pieces may be extracted from the frames and placed in a tray(s) intended for any number of desirable destinations (e.g., for delivery to any number of street addresses).

Further, it should be appreciated that, upon extraction, the frames may remain within the mail-merger processing system so that the frames may be re-used by returning the frames to a beginning of a cycle (e.g., a point in the mail-merger processing system where insertion of the mail pieces occur). In this regard, the frames may be cycled continuously from a point in the system where mail piece insertion occurs, to a point in the system where buffering occurs, to a point in the system where merging of the DPS letters and DPS flats occur, to a point in the system where mail piece extraction occurs, and returning the frames back to the point in the system where mail piece insertion occurs.

Further, it should be appreciated that the mail processing system of the present invention may be employed as an intermediary transitional system while transitioning to a facility-wide solution of the present invention. In this regard, the mail processing system of the present invention may be scaled to a certain size, e.g., a scaled system containing only the subsystems required for processing mail such as, for example, a base module, a scaled down base module, or a modular system including an expansion module, as described in other aspects of the facility wide mail processing system.

Operator Performance Monitoring, Training, and Publication Interface in a Centralized Flat and Letter Facility-Wide Sorting and/or Sequencing System The invention is directed generally to a user interface for mail handling equipment and, more particularly, to a methods and systems utilizing a user interface to perform plural functions in a centralized flat and letter facility-wide mail sorting and/or sequencing system. In embodiments of the invention, a user interface is provided on at least one of: a console associated with a unit of mail handling equipment (MHE); a networked computer of a mail handling facility; a personal data assistant; and a smart telephone. According to aspects of the invention, the user interface is employed to provide at least one of the following functions: operator training; system monitoring, including statistics and notifications; problem diagnosis and resolution; logging of maintenance actions; parts ordering; help requests; and personnel monitoring. In this manner, implementations of the invention provide a user interface that facilitates plural tasks and multiple functions and is available at multiple locations within a mail handling facility.

In a conventional mail processing and distribution center (P&DC), each unit of mail handling equipment (MHE) comprises a console with an operator interface. Typically, the operator interface associated with a particular MHE machine is confined to the console of the particular MHE machine and is confined to controlling the particular MHE machine. For example, a conventional operator interface may be used to start and stop a machine, change modes of operation, and possibly display some rudimentary information such as running statistics, end of run reports, and simple diagnostics. Such an interface provides the operator with the facility to run and understand how his or her individual machine is operating. However, as already noted, such interfaces are confined both physically and functionally to a single machine.

Implementations of the invention, on the other hand, provide a user interface that is available on plural computing devices throughout a mail handling facility. For example, in embodiments, a user interface is accessible on at least one of: a console associated with a unit of mail handling equipment (MHE); a networked computer of a mail handling facility; a personal data assistant; and a smart telephone. Moreover, implementations of the invention also provide a user interface that is employed in providing greatly enhanced functionality. For example, in embodiments, a user interface is provided that performs at least one of the following functions: operator training; system monitoring, including statistics and notifications; problem diagnosis and resolution; logging of maintenance actions; parts ordering; help requests; and personnel monitoring.

Figure 23:
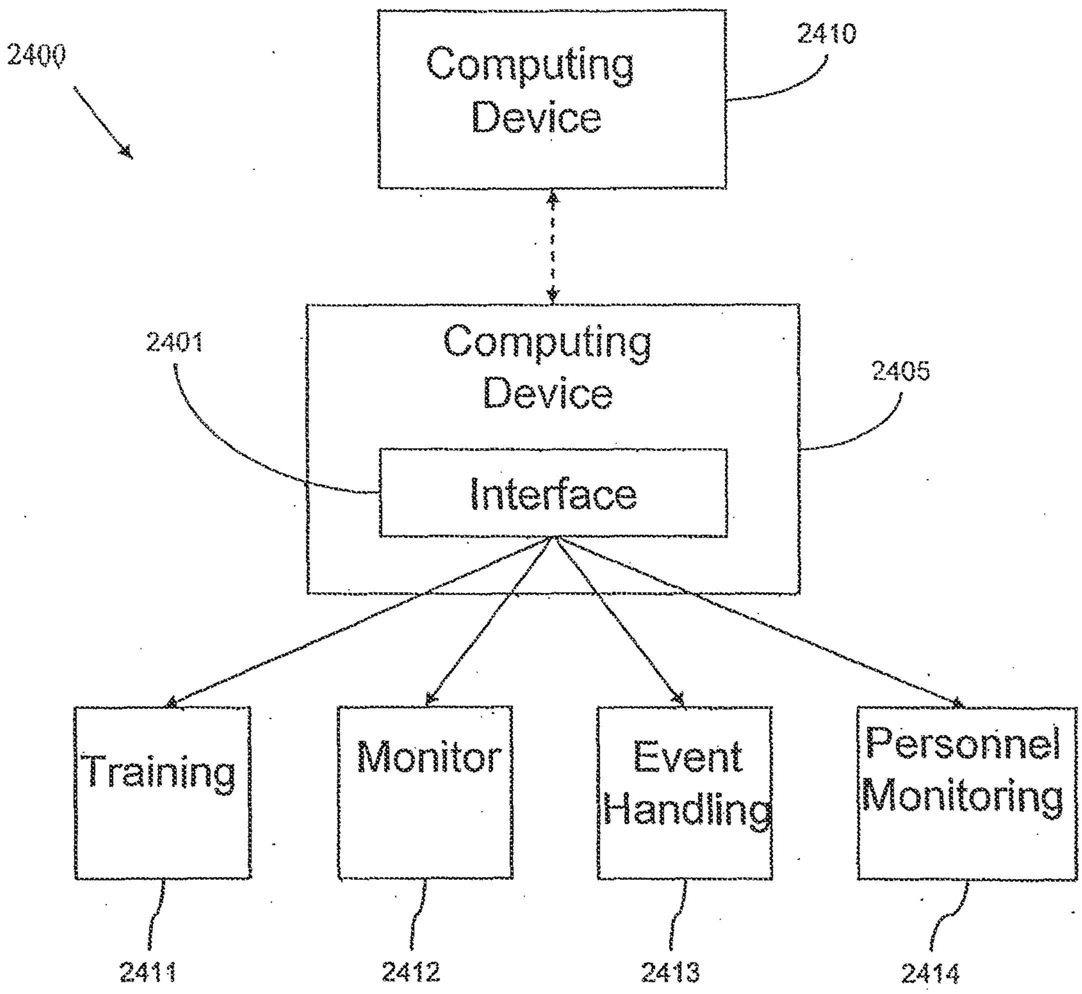
FIG. 23 shows a block diagram of a system in accordance with aspects of the invention.

FIG. 23 shows a block diagram of a system 2400 according to aspects of the invention. In embodiments, a user interface 2401 is provided on a computing device 2405. The user interface 2401 may comprise, for example, a graphical user interface that provides information to, and optionally receives input from, a human operator.

In embodiments, the computing device 2405 is associated with or comprises a computer infrastructure such as that shown and described with respect to FIG. 1A. For example, the computing device 2405 may comprise at least one of: a networked computer of a mail handling facility; a personal data assistant; and a smart telephone, where the computing device 2405 includes software arranged to provide the functionality of the user interface 2401 described herein. The software may be stored as a computer program product on tangible storage medium of the computing device 2405 such as that shown and described with reference to FIG. 1A.

According to further aspects of the invention, the computing device 2405 is communicatively connected to other computing device(s) 2410 of a mail handling facility, such as, for example, a system manager, controllers of individual mail handling machines, etc. For example, the computing device 2405 may be communicatively connected to other devices using Internet, intranet, LAN, WAN, wireless communication, etc. In embodiments, the connectivity may be segmented in order to increase the efficiency of the communication without providing needless congestion as described in the instant application. Alternatively, the computing device 2405 on which the user interface 2401 is provided may comprise or be comprised in a system manager or a controller of an individual mail handling machine, any of which can be implemented in the computing infrastructure of FIG. 1A.

As depicted in FIG. 23, the user interface is utilized to provide functionality associated with at least one of: training 2411, system monitoring 2412, event handling 2413, and personnel monitoring 2414, described in greater detail herein. However, the user interface 2401 is not limited to these functions, and other functions may be facilitated through the user interface 2401.

Training

It is common practice to require an operator to be trained on a particular mail processing machine before allowing the operator to actually operate the machine. Such training usually takes place at a centralized site (e.g., a regional mail center). However, because of high turn-over rates in the employment of operators, it is relatively difficult and expensive to keep operators trained. Moreover, this difficulty is compounded by updates to existing equipment, which may require retraining.

According to aspects of the invention, the user interface 2401 provided a fast, flexible, and relatively inexpensive way to train operators. In embodiments, this training can take the form of determining if an operator has taken the training when he or she first logs on to the system, and if not, giving the training on-line before the operator is permitted to run the machine. The training may also include periodic retraining, on-line tests, and safety training (e.g., lock-out/tag out, conveyor safety, etc).

By providing training through the user interface 2401, an operator may be trained using any suitable computing device 2405 such as that shown an described with reference to FIG. 1A. This allows the operator to be up to date without having the high expense of instructor-led off-site training. Moreover, this allows for cost effective training assuring only certified operators run the equipment, and thus limiting the liability associated with assuring training requirements are up to date. Additionally, incorporating the training with the user interface 2401 prevents the unauthorized and/or untrained person from using the system.

Figure 24A:
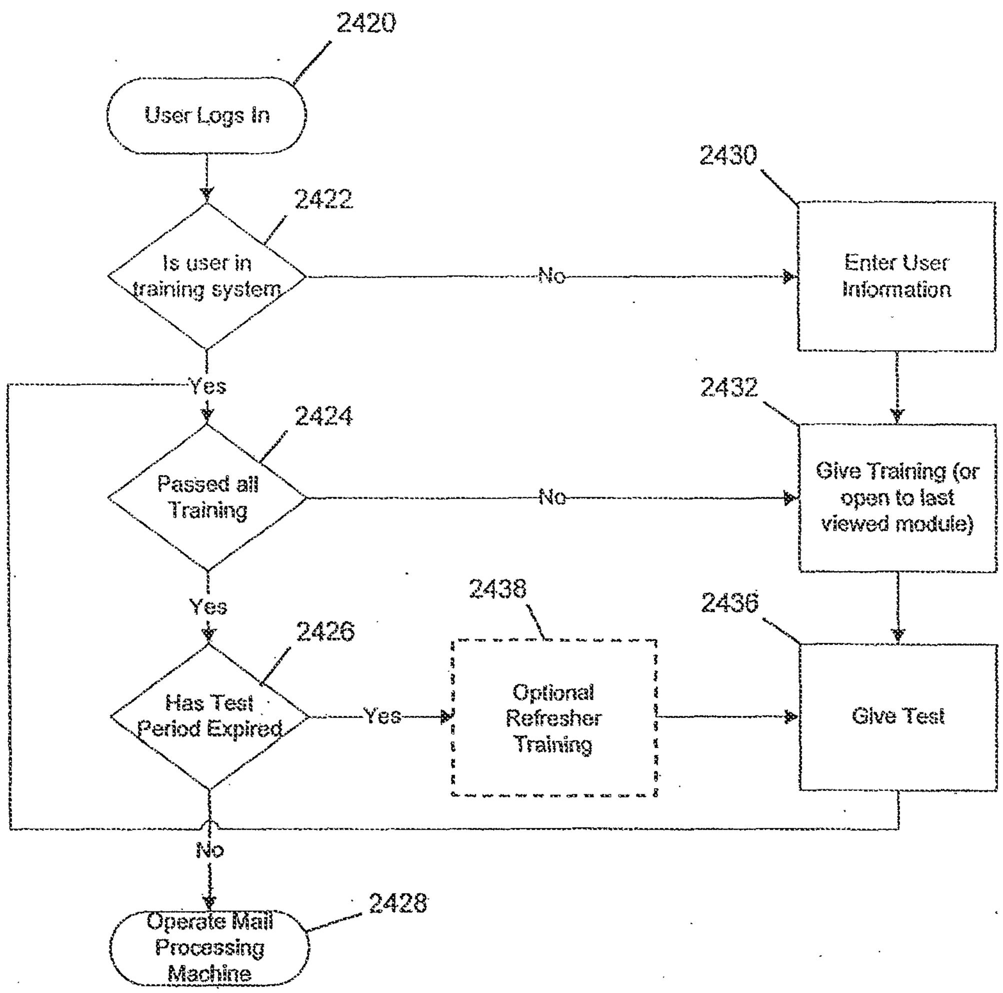
FIG. 24A shows a flows diagram depicting steps of a method in accordance with aspects of the invention.

FIG. 24A shows a flow diagram depicting steps of a method according to aspects of the invention. It should be understood that the processes described with reference to FIG. 24A (and FIGS. 24B and 24C) implemented on the computing infrastructure shown in FIG. 1A. At step 2420, a user logs in to a system (e.g., system 2400). This may be accomplished, for example, by entering a unique user identification (e.g., username, password, etc.) into the user interface (e.g., user interface 2401). In this particular example, the user is attempting to access the computer-based controls of a mail processing machine in order to operate a mail processing machine. However, the invention is not limited to this example.

At step 2422, the system determines whether the user is already associated with a training portion of the system. For example, the system, via program control, may examine stored data (e.g., in a database or data store) to determine whether the user identification entered at step 2420 or user group or associated alias is associated with an existing entry in the training portion of the system. The program control may be stored on a same computing device as the user interface (e.g., computing device 2405) or may be stored on another computing device of the facility (e.g., other computing devices 2410). If the determination at step 2422 is yes (e.g., the user is already in the system), then the process proceeds to step 2424.

At step 2424, the system determines whether the user from step 2420 has passed the appropriate training for the mail processing machine the user is attempting to operate. For example, the system, via program control, may examine stored data to determine whether the user has taken and passed the requisite training to operate the particular machine. If the determination at step 2424 is yes (e.g., the user has passed the training for this machine), then the process proceeds to step 2426.

At step 2426, the system determines whether the test period for the test from step 2424 has expired. In embodiments, the system, via program control, examines stored data regarding when the test was passed, a predetermined time period for which the test is valid, and the current date. If the current date is within the predetermined time period for which the test is valid based on when the user passed the test, then the user is authorized to operate the machine, and the process proceeds to step 2428.

At step 2428, the user operates the mail processing machine. In embodiments this may be performed by the user inputting data (e.g., commands) into the user interface, and the computing device on which the user interface resides communicating these commands to the machine. For example, once it is determined in step 2426 that the user is authorized to operate this machine, the user interface may be utilized to display an appropriate control screen for this machine, from which control screen the user may make selections and/or input other data in order to control the machine.

If, at step 2422, the determination is negative, this indicates that the user is not yet associated with the training portion of the system. Accordingly, the process proceeds to step 2430, where the user interface prompts the user for their pertinent information. Step 2430 also includes the user interface receiving the information from the user. The information may include, but is not limited to, data that is stored in a training profile of the user.

From step 2430, the process proceeds to step 2432, in which the user is given training for the particular machine. In embodiments, the training is provided to the user via the user interface, for example, using visual displays of information. Alternatively, if the user has previously begun this training and stopped without completing the training, the user interface may display the last viewed module of the training, so that the user does not have to repeat modules that have already been viewed. In embodiments, the training for any given machine may be predetermined and stored in the system.

If the determination at step 2424 is negative, then the process also proceeds to step 2432, described above. From step 2432, the process proceeds to step 2436, in which the user is given a test associated with the particular machine. In embodiments, the test is provided via the user interface. For example, the system, via program control, may read stored test data associated with the machine, present this data to the user via the user interface, and receive inputs (e.g., answers) from the user via the user interface.

In embodiments, step 2436 further includes a determination of whether the user passed the test or not. This may be performed, for example, by the system comparing the user answers to predetermined correct answers, and by comparing a number of correct user answers to a predetermined threshold value associated with passing the test. The determination of whether user passed the test may be stored and utilized in step 2424, as described above.

If the determination at step 2426 is yes, then the user interface prompts the user to take the test again (e.g. return to step 2436). Optionally, at step 2438, the user may view a refresher course (e.g., an abbreviated version of the training from step 2432) before taking the test again. By providing training using the inventive user interface, implementations of the invention provide a flexible and efficient way to ensure that only authorized personnel operate machinery.

System Monitoring

According to further aspects of the invention, the user interface (e.g., user interface 2401) may also be used to provide enhanced system monitoring that may be utilized, for example, for continuous improvement activities. Such data can be utilized to determine cause and effect for process improvement activities. For example, process improvement efforts, such as continuously improving the throughput of an operation, are more robust when they are based upon timely valid metrics. Accordingly, in embodiments, of the invention, data associated with operator actions, maintenance actions, throughputs of machines, and system statuses can be captured to a database in a cost effective way. For example, the user interface may be used to present running statistical data (e.g., processing volumes, jams, system unavailability, etc.) to the user in real time as on-going status. Moreover, the user interface may be utilized to present notification of remarkable situations (such as going above or below two sigma control lines (e.g., standard deviations from a mean)) to a user to initiate an analysis to investigate and eliminate the variation of the process.

Figure 24B:
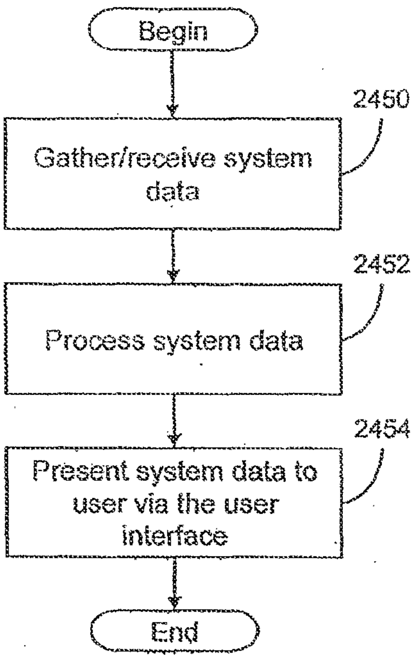
FIG. 24B shows a flows diagram depicting steps of a method in accordance with aspects of the invention.

FIG. 24B shows a flow diagram depicting steps of a method according to aspects of the invention. At step 2450, the system gathers and/or receives system data. In embodiments, this includes, but is not limited to: operator actions, maintenance actions, throughputs of machines, and system statuses obtained from a system manager.

At step 2452, the system processes the data from step 2450. The processing may be performed according to any suitable pre-defined analysis, such as, for example, statistical analysis. At step 2454, the system data is presented to one or more users via one or more user interfaces. In this manner, one or more users may be provided with system monitoring data via their user interface.

Event Handling

According to further aspects of the invention, the user interface (e.g., user interface 2401) may also be utilized to provide event handling functionality. For example, when the system manager detects a machine jam, system error, or other detected problem, the system manager may cause an online user manual to be displayed on a user interface. The display of the manual may be hyperlinked on the user interface, so that a user can navigate through the user manual using the user interface.

Moreover, the user interface may be arranged to accept annotations (e.g., input) from a user, and communicate this input to the system manager for storing the annotations with a particular portion of the user manual. The stored annotations may be associated with a particular portion of the user manual, such that when the particular portion of the user manual is displayed via the user interface, the annotations are also displayed. The entry of annotations may be required in some predefined conditions (e.g., corrective actions taken), and the user interface may be used to prompt the user to enter annotations is such situations. In embodiments, the annotations may be communicated, e.g. via the system manager, to appropriate personnel for update into the publication itself and for notification of the original equipment manufacturer. In further embodiments, when particular events occur, the system records the symptoms, any corrective actions, and when maintenance needed to be called.

Still referring to event handling, the user interface may also be used to view maintenance procedures, log maintenance actions, order parts, and request help from help desks of the postal service or the original equipment provider. For example, when a problem occurs in the system, the user interface may be used to present a visual screen to a user to help diagnose the problem. More specifically, the system may be provided with artificial intelligence (e.g., using Bayesian Analysis techniques) that is utilized to associate machinery problem symptoms to maintainer actions. As maintenance actions occur, the program incorporates repair actions into its database, and the system updates its fault troubleshooting procedures based on the most relevant repair issues in the database.

When a subsequent event (e.g., problem) occurs and is detected by the system manager, the system determines symptoms of the event and searches its database for similar symptoms. When matching symptoms are found, the system presents to the user, via the user interface, an option to look up all other relevant maintenance issues of similar symptoms. Through the user interface, the maintainer can review system status and sensor reading prior to the fault to determine if prognostics are possible to determine the cause of the problem. According to further aspects of the invention, the system managers of plural facilities are networked to a central database, where each system manger stores pertinent symptom and maintenance data in the central database. In this manner, a lesson learned at one facility is available (and a part of the artificial intelligence diagnostic) to all other facilities.

Figure 24C:
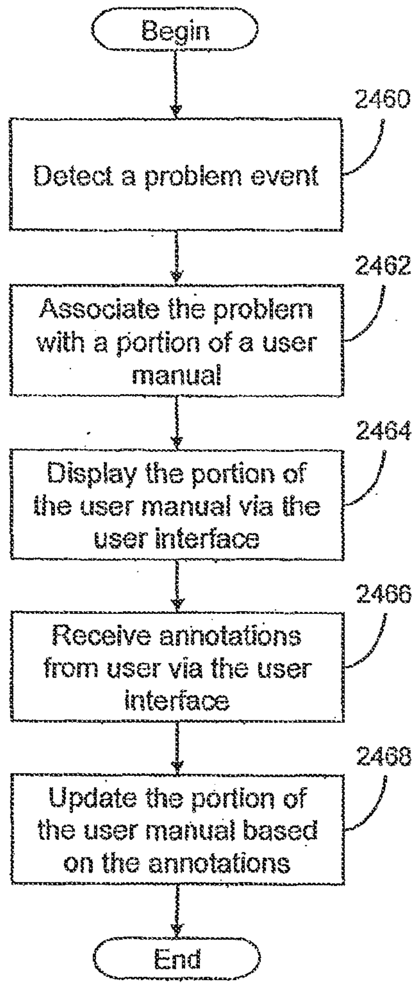
FIG. 24C shows a flows diagram depicting steps of a method in accordance with aspects of the invention.

FIG. 24C shows a flow diagram depicting steps of a method according to aspects of the invention. At step 2460, the system detects a problem with a machine. This may be performed by a system manager receiving data from sensors such as that described with reference to the S.M.A.R.T. card implemented and discussed in the instant application, and comparing the data to predetermined acceptable thresholds. The system may comprise a facility-wide system manager, or a controller of a particular machine. At step 2462, the system associates the problem with a portion of a user manual. In embodiments, this is performed by comparing data from step 2460 to a look-up table of user manual sections.

At step 2464, the system displays the portion of the user manual, determined at step 2462, on a user interface (e.g., user interface 2401). The user interface may be presented in a computing device (e.g., computing device 2405). At step 2466, the system receives annotations from the user regarding the portion of the user manual. In embodiments, the user enters annotations via the user interface. At step 2468, the system stores the annotations and associates the annotations with the portion of the user manual. In this manner, when that portion of the user manual is displayed in the future, the annotations may be displayed with it.

Personnel Monitoring

According to further aspects of the invention, the user interface may be employed to display data regarding personnel attendance, compliance with training, personnel performance on a machine (e.g., throughput, time on station, amount of mail feed starvation, amount of mail processed), and machine performance. Data associated with such parameters may be collected by the system and displayed using the user interface. Such data may be collected and presented at any desired level of granularity, including, but not limited to: a machine operator, machine, facility, or enterprise wide. In this manner, efficiency of personnel and systems may be monitored.

Comprehensive Mail Piece Induction Process in a Facility-Wide Sorting and/or Sequencing System The invention is directed to a method and system for accommodating a comprehensive process for mail induction in a facility-wide letters/flats mail sorting and/or sequencing system, which is described in other sections of the instant application. The method and system for induction can accommodate mixed mailings such as, for example, letters and flats and advantageously includes, in embodiments, mail profiling and profile size rejection; combined letter and flats address recognition, including application of ID tags; address recognition rules for letters and flats; use of "on-board" address recognition and/or a centralized address recognition system; automatic processing of delayed address recognition results; internalized Identification Code Sort System (ICS) within a mail processing machine; barcode/metered mail indicia verification; and address forwarding interception of letters and flats.

Currently, there is no system or machine that performs all of these features as part of the induction process, and including these feature in a single system or machine is particularly advantageous for a facility-wide system for sequencing letters and flats.

A more complete induction process for a facility-wide letters/flats mail sequencing system preferably performs the above identified functions, as well as, including image lift, optical character recognition (OCR), address bar code decoding, identification (ID) tag decoding, automatic address resolution, remote encoding system interfacing, automated address reconciliation, ICS interfacing, indicia verification, and address redirection interception, and provide the necessary holdouts for unaccepted mail pieces.

Letter and flats mail pieces (generally referred to as mail pieces) that are fed into a facility-wide mail sorting and/or sequencing system require several operations and points of verification to determine if the mail piece may be accepted for induction. Ultimately, two pieces of information should be known: (1) the delivery point address of the mail piece, and (2) an indication as to whether the address should be redirected to a different address. Knowing the delivery point of the mail piece allows the mail piece to be sequenced for delivery; whereas, knowing the redirection status allows a mail piece to be held out from sequencing, so that it may be funneled into an external process for redirection handling. Today, the functions of mail induction require operations to be run on multiple mail processing machines. The method and system of the present invention, however, provide a better solution, since these functions are combined into a single induction system, which increases mail handling and processing efficiency.

Figure 25A:
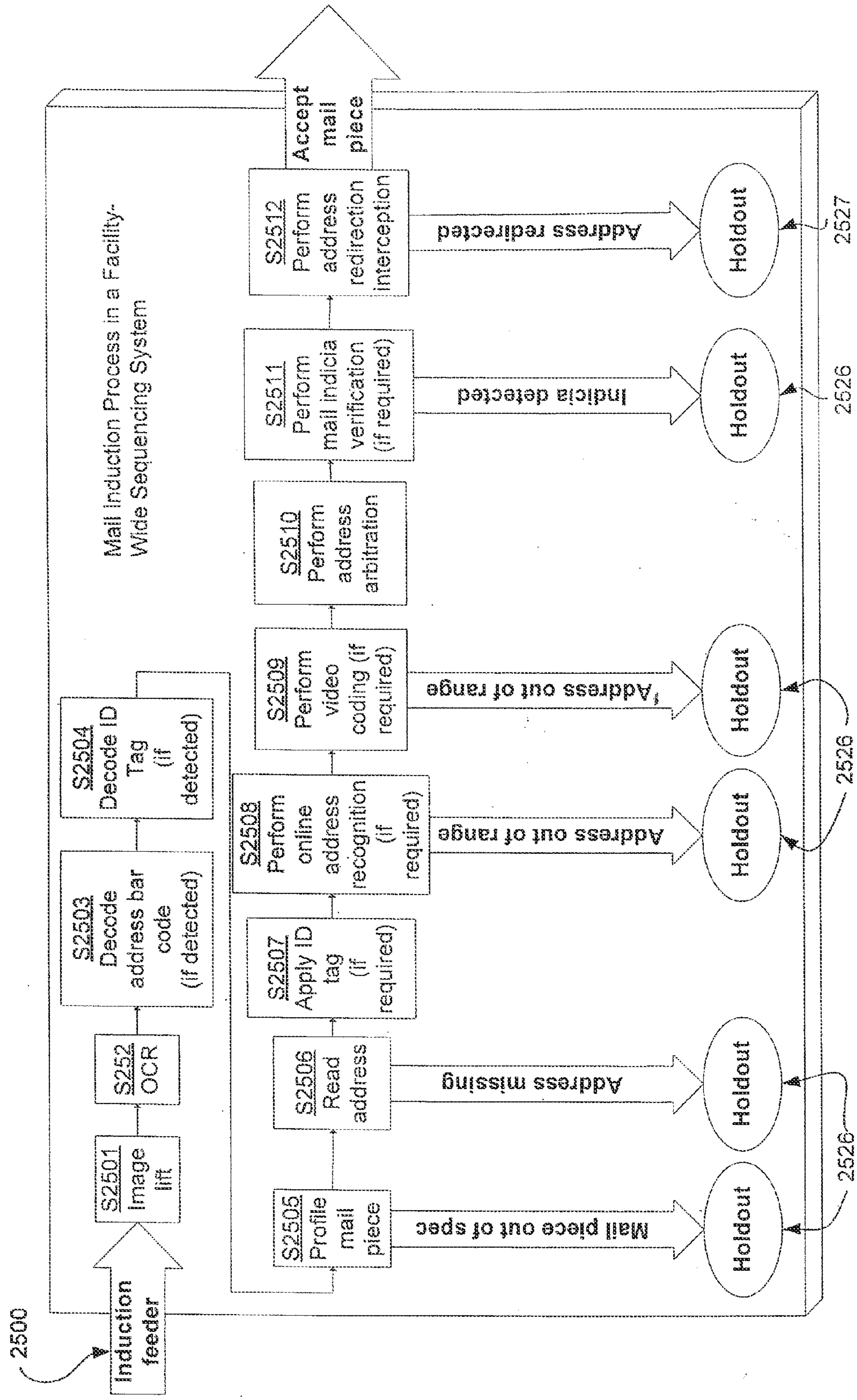

FIG. 25A provides a flow diagram of the mail induction process for a facility wide sequencing system. The system includes at least a first induction feeder 2500 for inducting mail into the facility-wide sorting and/or sequencing system, and individual or separate induction feeders 2500 preferably used for letters and flats mail. Separate induction feeders 2500 allow for the differences in size of each mail type. At the beginning of the induction process, mail is entering the system, and a mail piece is not yet inserted into a frame. After a mail piece is physically fed into the system, the induction process of the invention includes several sequential steps which are controlled by a control unit which can be implemented in the computer infrastructure of the present invention. Once these sequential steps are complete for a particular mail piece, the mail piece is either accepted and inserted into a frame, as described in other sections of the instant application, for further sequencing, or it is held out from the system and manually placed into a holdout bin 2526 or 2527.

In step S2501, a camera captures or lifts an image of the mail piece to provide image data related to a barcode, identification (ID) tag, address, text, stamp, postage meter, physical dimensions, etc. In step S2502, optical character recognition (OCR) is performed on the image to identify pertinent regions of interest. In step S2503, if an address bar code is present, the address bar code is decoded. In step S2504, if an ID tag is present, it is decoded. In step S2505, the mail piece is profiled to determine mail piece characteristics. Characteristics include basic physical attributes (e.g., width, height, and weight) and shape (e.g., odd-shaped or non-uniformly shaped pieces), all of which can be determined by the use of probes, sensors, detectors, encoders, etc., all of which are discussed in other sections of the instant application and applicable herein. The mail piece is held out and placed in a holdout bin 2526, if any mail piece characteristic is outside the tolerance specification of the system.

In step S2506, the address on the mail piece is read. An address is preferably either encoded into a bar code on the mail piece (decoded in step S2503) or is retrieved from ICS using an ID tag (decoded in step S2504) on the mail piece. If no bar code or ID tag is detected, the system may choose to either hold out the mail piece from further processing and place it in a holdout bin 2526, or apply the next step in the induction process.

In step S2507, if a mail piece does not already have an ID tag or an address result, an ID tag is applied to the mail piece. The ID tag provides a lookup key into the ICS for address results. At this point in the process, all mail pieces must have either an ID tag or address result.

In step S2508, any known engine performs automatic address recognition to determine whether the address is a recognizable address. The engine is either an "on-board" (i.e., directly encapsulated within the induction process) or part of a centralized address recognition system under the control of a centralized control unit in, for example, the computer infrastructure of the invention. Either way, an address result is returned from the engine. The address result can be either (1) a finalized address, (2) a partial address, or (3) no address. A mail piece may be held out from further processing and placed in a holdout bin 2526, if for example, the address is outside of the local delivery area.

In step S2509, the image may be sent to a remote encoding (i.e., video coding) system, if the automatic address recognition can not achieve a finalized address. Personnel, who are referred to as video coders, work at manual keying stations, and they attempt to resolve the address. Again, a mail piece may be held out from further processing and placed in a holdout bin 2526 if the address cannot be finalized or, for example, the address is outside of the local delivery area. Address results from video coding are retrieved from the ICS.

In step S2510, an arbitration process or address selection (of a known type) determines which address result (automatic address recognition or remote encoding) should be selected. An example of these rules is depicted in FIG. 25C. For example, a determination is made whether there is a barcode in step S2531, and if there is no barcode, a determination is made in step S2532 whether there is an ICS result. If there is no barcode result and no ICS result, then a determination is made in step S2533 that there should be no sorting of the mail piece. However, if there is a ICS result in step S2532, then the address selection is based in step S2534 on the ICS alone. If there is a barcode result in step S2531, then a determination is also made in step S2535 whether there is an ICS result. If there is no ICS result and only a barcode result, then the address is based on the barcode alone in step S2536. If there is both an ICS result and a barcode result, then a determination is made in step S2541 regarding the length of the results. In step S2542, a determination is made whether the results are the same. If the results are the same, then it is determined in step S2543 that the barcode and ICS ZIP code agree, and an address selection is made based on the ICS and barcode results. If the results are the not same, then it is determined in step S2544 that the barcode and ICS ZIP code differ, and that address selection should be based on the barcode result. If the results of step S2541 are not the same, then it is determined in step S2547 whether the barcode is longer. If the barcode is longer, an address selection is made in step S2548 based on the barcode result. If the barcode is not longer, a determination is made in step S2545 whether the first five digits of the results agree. If the first five digits of the results do not agree, then an address selection is made in step S2544 based on the barcode result. If the first five digits of the results agree, then an address selection is made in step S2546 based on the ICS result Referring back to FIG. 25A, in step S2511, if required, detection and verification of mail indicia, including metered mail, is performed. Mail pieces may be held out from sequencing and placed in a holdout bin 2526, if specific indicia can be detected or verified.

In step S2512, the address result and image are sent to an external system that checks for address redirection. The external system currently used by the U.S. Postal Service is the Postal Automated Redirection System (PARS), which uses a National Change of Address (NCOA) database. For mail pieces that have an address bar code, PARS returns a redirection status directly. For mail pieces that have only an ID tag, PARS sets the redirection status in the ICS. Mail pieces that are flagged for redirection are held out from acceptance into the system, and placed in a holdout bin 2527.

Embodiments of the present invention either provide an integrated address redirection system or provide an interface to the existing PARS system. If the PARS system determines that a mail piece needs to be redirected, the system of the present invention is notified, and the mail piece is moved to the redirection holdout bin 2527.

Figure 25B:
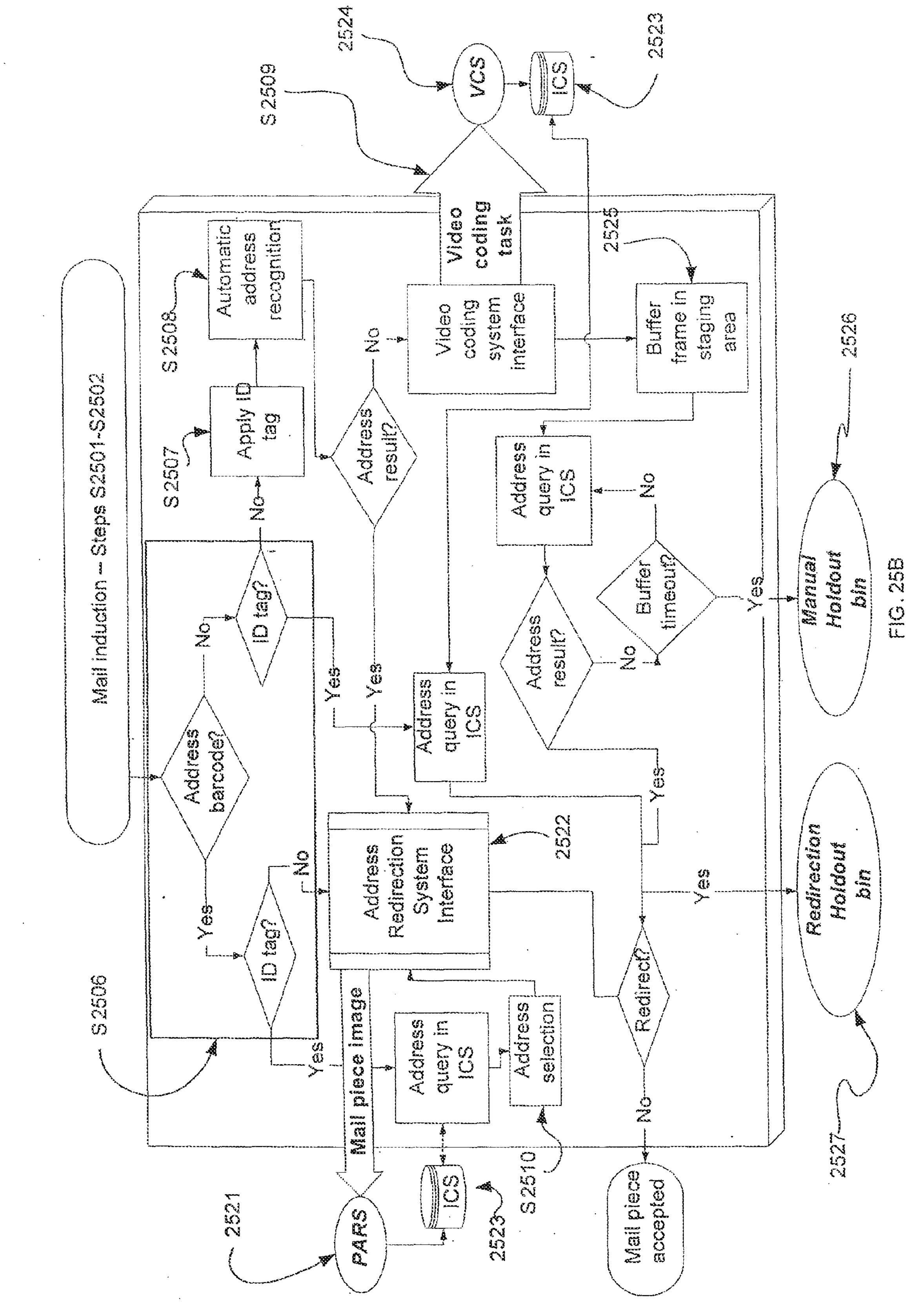
Figure 25C:
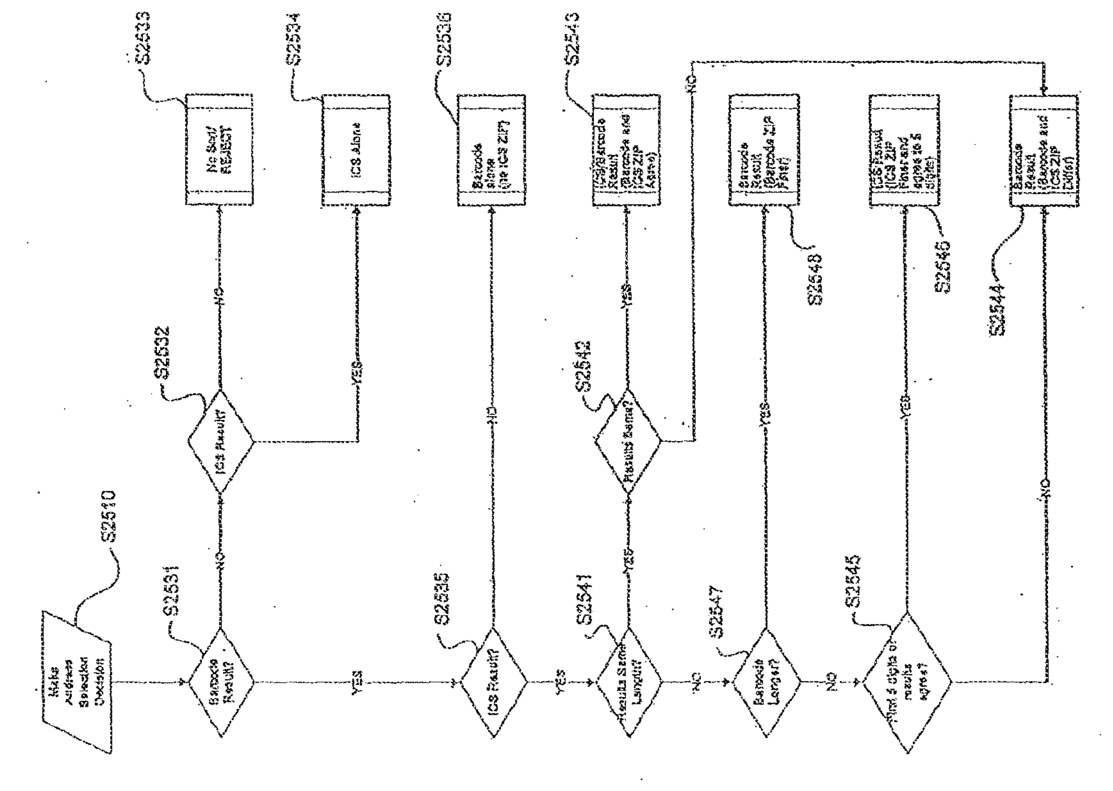

Referring now to FIG. 25B, a more detailed flow chart illustrates steps S2506-S2510. In step S2506, if only an address bar code is found on the mail piece, the address is sent to the address redirection system 2521 to determine if the mail piece should be held out for redirection via an address redirection system interface 2522. In step S2506, if only an ID tag is found on the mail piece, the ID tag is queried in the ICS 2523 to retrieve the address. Address redirection status is retrieved from the ICS 2523 to determine if the mail piece should be accepted or held out for redirection in the redirection holdout bin 2527. In step S2506, if both an address bar code and an ID tag are found on the mail piece, a selection or arbitration process at step S2510 is followed to select the best address to use (i.e., the address on the mail piece or the address in the ICS 2523). The selected address is sent to the address redirection system 2521 via the interface 2522 to determine if the mail piece should be held out for redirection in the redirection holdout bin 2527 or accepted.

If no address bar code or ID tag is found on the mail piece, then in step S2507 an ID tag is applied to the mail piece and then automatic address recognition is attempted in step S2508. If a finalized address result is returned at step S2511, then the address is sent to the address redirection system 2521 to determine if the mail piece should be held out for redirection in the redirection holdout bin 2527 or accepted. If the address is not finalized, in step S2509, a video coding task is initiated to attempt to resolve the non-finalized address via a video coding system 2524. While the video coding task is being performed, mail pieces are buffered in a staging area 2525. The ICS 2523 is checked for an address result by looking up the ID tag on the mail piece. The ICS 2523 is checked periodically until either an address result is found or a configurable video coding time threshold is exceeded. If an address result is found, redirection status is retrieved from the ICS 2523 to determine if the mail piece should be held out for redirection. If no address result is found or the timeout is exceeded, the mail piece is held out from further processing in manual holdout bin 2526.

Buffering mail pieces in the staging area 2525, while the addresses of the mail pieces are being determined or verified, provides a significant advantage over current systems. Such buffering allows substantially more time to determine or verify an address on the mail pieces which are potential holdouts from the system. Accordingly, this additional opportunity substantially increases the number of mail pieces which can be sequenced automatically, and reduces the number of mail pieces which must be processed manually or redirected to other external systems.

Process and Mechanisms for Mail Piece Insertion into Sequencing Frames, while Maintaining Transportation Leading Edge The process of inserting letters and flats mail pieces into individualized transport devices (frames) for sorting, after having been singulated and fed, has a long history of problems, particularly with regard to article insertion jams. In this regard, mail sorting/sequencing machines, within the United States Postal Service (USPS) and other organizations, frequently use an insertion process whereby each article is initially synchronized to an adjacent individualized transport device, after which it is inserted into the transport device, but only after a required change of travel direction. Sorting/sequencing machines, such as the AFSM-100 (Automated Flats Sorting Machine) used by the USPS, utilize such a method by transporting mail pieces to a position directly above its targeted transport device, at which time the successive mail pieces come to a complete stop, changing direction 90 degrees, and then being inserted into the targeted transport device.

Within the facility-wide letters/flats sequencing system, the invention utilizes a component in the form of an "inserter" to provide the function of removing the mail piece variability from sorting/sequencing considerations by placing the mail pieces into individualized transport devices, i.e., frames, described in greater detail elsewhere in the instant application. In embodiments, the inserter includes pinch belts that are synchronized with the frames at a certain position in order to insert mail pieces therein. These frames/folders, referred to generally as "frames," have common physical attributes, i.e., they have a common form factor, which make them suitable for automated manipulation, while containing individual mail pieces (with their inherent variability in size and shape) within their common perimeter.

To improve insertion process performance, the invention maintains the leading edge of the singulated mail pieces, thereby eliminating the need to stop and re-accelerate the article for insertion, as is done in the prior art. Thus, the invention improves upon the prior art by not requiring the mail pieces to stop and re-accelerate just prior to insertion. The smoother transition of the singulated article into the transport device, i.e., into the frame improves the overall performance of the insertion process. Particularly, the invention would reduce the prevalence of mail piece jams which are a source of concern with apparatus such as the aforementioned AFSM-100.

FIG. 26A schematically illustrates a characteristic of mail processing equipment over which the invention is an improvement. A mail piece, in the form of a flat, is shown in three sequential positions 1, 2, 3. In position 1, the mail piece m, after having been singulated, is fed in the direction of the arrow to position 2. At position 2, the mail piece must be completely stopped so that it can be re-directed 90° and inserted into the transport device, at position 3, which moves along a travel path below the travel path of the singulated articles. The change of speed of the mail piece, moving from position 1 to position 3, i.e., the deceleration and acceleration moving into and out of position 2, typically causes a certain percentage of the mail pieces to become jammed within the apparatus.

FIG. 26B illustrates two examples of mail pieces M, in the forms of a letter (in an upper view) and a flat (in a lower view), respectively, inserted through the side of a common sized frame F moving along a mail stream within a stream of successive frames, according to the invention. As described and illustrated elsewhere herein, frames of the invention include openings on one or both sides for insertion and/or extraction of mail pieces.

FIGS. 26C and 26D illustrate, in perspective and in plan, respectively, two frames F which represent a portion of a stream of successive frames into which mail pieces m are inserted through side openings of the frames F in the manner represented in FIG. 26B, mentioned above. As described elsewhere herein, the frames are driven along the transport path by four lead screws LS while maintained at an orientation, relative to the transport path, of 45°. Following insertion of the mail pieces within respective frames F, the containerized mail pieces are transported to sorting and sequencing processes, described elsewhere herein.

FIG. 26E shows an exemplary arrangement of inserters synchronized with the movement of a succession of empty mail frames along a transport path, for inserting mail pieces into respective ones of the frames. As the empty frames F travel along the lead screw transport path 2614, the mail pieces m (within a moving stream of mail pieces) move from a mail induction unit 2601, such as via pinch-belt conveyances 2604, 2605, to a mail/frame synchronization arrangement 2602, by means of which the mail pieces m are synchronized with respective targeted ones of the frames F and inserted within such frames. The arrangement 2602 includes a target frame synchronizer 2611 and a frame opener/closer and anticipated mail piece synchronizer.

Because the processing system of the invention encompasses the use of so-called heavy-duty frames as well as the use of light-duty frames, as described elsewhere herein, the pre-synchronizer transport section 2603 depicts separate pathways 2604, 2605 for letters and flats, respectively, and the stream 2614 of empty frames is depicted in FIG. 26E as a mixed stream of empty frames.

As the mail pieces travel within the pre-synchronizer transport section 2603, their mail piece data (i.e., address destination, size, weight, and current position along the pinch belt path) is identified by a plurality of mail piece data collection devices 2606, which effects subsequent diversion by one of the diverters 2607, 2608 (for letters and flats, respectively) into one of the light-duty or heavy-duty pathways 2609, 2610 of the mail/frame synchronization arrangement 2602.

As each mail piece is synchronized by the target frame synchronizer 2611 of the arrangement 2602, as it approaches the stream of empty frames, one of the inserters 2612, i.e., a pinch belt arrangement, e.g., inserts it into a respective one of the frames F. The insertion can be accomplished by simply "shooting" the mail piece into the frame, while maintaining the original direction of the mail piece at the frame opener/closer 2613, which is one of a plurality of frame openers and closers, which synchronizes the position of the empty frames F with the incoming mail pieces M. This synchronization can be performed by the main control system implemented in the computing infrastructure of FIG. 1, generally represented in FIG. 26E as 2620. As an illustrative example, after each mail piece is read, by means of OCR or BCR, e.g., it is inserted into a respective frame by synchronizing the placement of the frame and the position of the mail piece, such as, e.g., by use of encoders, photodiodes, etc. The placement of the frame, in a particular embodiment, is in the path of the mail piece, e.g., aligned with the pinch belt mechanism.

With the apparatus and method of the invention, there is no need to stop and reaccelerate the mail pieces just prior to insertion, particularly inasmuch as the inserter maintains the leading edge of the singulated mail piece. The smoother transition of the mail piece into the frame improves the overall performance of the insertion process. In this regard, rather than being a fixed-piece arrangement, such as a prior art carousel into which pieces are stopped and dropped from above, the transport path 2614 can present empty frames F to the inserters 2612 by variable movement of the frames (by means of compression and decompression according to methods and apparatus described elsewhere herein). In addition to variable movement of frames F within path 2614 and/or instead of such variable movement, synchronization of the mail pieces m with the empty frames F can be accomplished by relative movement of the inserters 2612. Such movement of the inserters 2612 is depicted in FIG. 26E, by arrows, as a pivoting or slewing movement. Because the leading edge of each of the mail pieces is maintained and the mail pieces are not decelerated, stopped, and then accelerated to accomplish insertion into the frames, insertion jams are greatly reduced.

Further, the leading edge of the mail pieces can be maintained whether insertion is through a side opening of a frame or whether insertion is from above into a top opening of a frame. In this regard, FIG. 26F shows an alternate method of insertion in accordance with aspects of the invention. As schematically shown therein, the mail piece M is inserted into a frame F by means of an inserter from above, while maintaining leading edge orientation. Despite top insertion of the mail pieces, there is no stopping of the mail piece prior to insertion. As in the previously described embodiment, the respective movements of the mail pieces and frames are synchronized and the insertion of the mail pieces within frames is then accomplished without stopping either the mail pieces or the stream of frames.

FIG. 26G illustrates an alternative inserter arrangement. As with the arrangement illustrated in FIG. 26E, mail frames moved through the system of the invention can be either heavy-duty or light-duty. For example, the two types of frames can be configured in different sizes, i.e., a half-height frame for mail pieces less than six inches and a full frame for those that have greater height (although other sizes are also contemplated by the invention). The appropriate size mail frame is selected and mail is inserted, in either of the embodiments disclosed herein, by using, e.g., optical recognition technology, photodiodes, or other known technologies all of which are capable of being implemented by one of skill in the art.

As shown in FIG. 26G, a rotary inserter 2621 can be used to insert mail, such as letters and flats, into respective frames. By way of example, the rotary inserters include two pinch belts 2622, 2623. As the mail passes between the pinch belts, it is inserted within the frames as the empty frames F are automatically expanded about a radius of the frame, before continuing along the transport path 2624 carrying respective mail pieces M. (The frames open as they revolve around a carousel.) The rotary inserter, in embodiments, has the capability of about 35,000 insertions per hour. In implementation, it is contemplated that there would be one inserter for every DBCS or every two FSM machines.

Following insertion, as explained elsewhere herein, the successful insertion of the specific mail piece into the specific frame is reported to the main control system for subsequent tracking and processes. The main control system can then coordinate the movement of the frames throughout the system. Additionally, the control system can also match the ID of the mail with the frame, maintain track of the frames in the system, as well as perform other functions described herein.

Mail Frame Tracking in a Facility-Wide Sorting and/or Sequencing System

The invention relates generally to transportation of objects within a facility and, more particularly, to a method and system to track the movement of mail containers (e.g., frames) throughout a facility-wide letters/flats mail sequencing system (also referred to herein as a facility wide sorting and/or sequencing system). According to aspects of the invention, a Frame Tracking Agent (FTA) maintains a data structure that defines a location for each frame in the facility wide sorting and/or sequencing system. Through communication with subsystems of the facility wide sorting and/or sequencing system when frames are moved from one subsystem to the next, the FTA continuously updates a data structure, such that a location history of every frame (and, therefore, mail piece) in the facility wide sorting and/or sequencing system can be provided.

More specifically, in embodiments, when a subsystem of the facility wide sorting and/or sequencing system physically moves a bundle of frames to another subsystem, the sending subsystem creates and transmits a manifest of the frames to the FTA. In embodiments, the manifest is a data structure that contains various information associated with the frames (e.g., frame ID, sending location, receiving location, timestamp, etc.). The FTA receives the manifest and updates a location repository that contains a location history for each frame currently within the facility wide sorting and/or sequencing system. By creating manifests at each sending and receiving location for each move of frames between subsystems, and by storing the manifest data in the location repository, the movement of each frame throughout the facility wide sorting and/or sequencing system may be tracked. Moreover, the data stored in the location repository can be used to detect missing frames and to perform validation metrics and mail flow metrics.

FIG. 27A shows a block diagram of a facility wide sorting and/or sequencing system 2700 according to aspects of the invention. In embodiments, the facility wide sorting and/or sequencing system 2700 includes a number of subsystems 2702 that comprise various components (e.g., machinery) that are structured and arranged to perform various processes that cooperate to ultimately produce a stream of sequenced mail pieces (e.g., letters and flats) after only a single induction of each mail piece into the system. In further embodiments, each subsystem 2702 has plural redundant components to provide necessary capacity for peak processing times, and also to provide redundancy in the event of machine failure.

For example, in embodiments, the induction manager subsystem 2705 operates to induct mail pieces (e.g., letter and flats) into the facility wide sorting and/or sequencing system 2700. Induction may include, among other things, reading address information from each mail piece and transmitting that address information (e.g., address result) to a system manager 2707. The induction may also include, for example, sending each mail piece to a frame inserter subsystem 2710 after address capture.

In embodiments, the frame inserter subsystem 2710 inserts each single mail piece into a container, referred to throughout this disclosure as a frame. According to aspects of the invention described elsewhere in the instant application, each frame has a unique identification (e.g., frame ID), and the mail piece inserted into the frame is associated with that frame ID while the mail piece is processed in the facility wide sorting and/or sequencing system.

Still referring to FIG. 27A, after mail pieces are inserted into and associated with frames, the frame is passed to a presort accumulator subsystem 2715. In embodiments, the presort accumulator subsystem 2715 groups frames together in bundles according to predetermined criteria, and sends the bundles to the sequencer subsystem 2720 where the frames are sequenced into a delivery point sequence. The bundles of frames are moved from the from the sequencer subsystem 2720 to a storage subsystem 2725, and ultimately to a container loader 2730. Presort accumulators, sequencers, storage, and container loaders are described in greater detail elsewhere in the instant application, such that further explanation is not believed necessary here.

In embodiments, the facility wide sorting and/or sequencing system also includes at least one transport controller 2735 that coordinates the movement of mail pieces between components of at least the presort accumulator, sequencer, storage subsystems 2715, 2720, 2725. For example, the transport controller 2735 operates to control the loading of frames into a shuttle from component "A" (e.g., a presort accumulator), the movement of the shuttle from component "A" to component "B" (e.g., a sequencer segment), and the unloading of the frames from the shuttle into component "B" (e.g., via a shuttle unloader).

According to further aspects of the invention, the facility wide sorting and/or sequencing system 2700 includes a Frame Tracking Agent (FTA) 2740. In embodiments, the FTA 2740 is a real-time, high availability server that manages location data of frames and checks for missing frames. The FTA 2740 may be implemented in the environment of FIG. 1A.

In implementations, when a mail piece is inserted into a frame at the frame inserter subsystem 2710, the mail piece ID and frame ID are transmitted to the FTA 2740. The transmission of the mail piece ID and frame ID, and all other data transmissions described herein, may take place using any suitable communication protocol, including, but not limited to: the Internet, an intranet, LAN, WAN, and wireless. In embodiments, the LAN or WAN, for example, can be segmented between subsystems in order to minimize overall congestion on the network, as discussed in the instant application. In embodiments, based upon the transmitted mail piece ID and frame ID, the FTA 2740 creates an association between the mail piece and frame in a location repository 2745, which also may be a database shown in FIG. 1A. In particular embodiments, this association identifies the mail piece, the frame the mail piece is contained in, and the address result of the mail piece destination.

As described above, frames containing mail pieces are moved in groups or bundles throughout the system (e.g., between presort accumulator 2715 and sequencer 2720). In embodiments, when a group of frames is loaded into a shuttle and moved between subsystems, the sending subsystem creates (or updates) a frame manifest and sends the manifest to both the receiving subsystem and the FTA 2740. The frame manifest may include various information, including, but not limited to: the frame ID of each frame in the shuttle; the shuttle ID; the order that the frames are loaded into (e.g., arranged in) the shuttle; a timestamp of when the manifest is created; an ID of the subsystem that created the manifest; and the address result associated with each frame ID.

When a shuttle arrives at the receiving subsystem, the receiving subsystem creates (or updates) a manifest of the frames received and transmits the manifest to the FTA 2740. In embodiments, the FTA 2740 updates the location repository 2745 each time it receives a manifest. In this manner, the location of each frame is recorded as the frame travels throughout the facility wide sorting and/or sequencing system. Since frames are re-used in the facility wide sorting and/or sequencing system, when a mail piece is removed from a frame, data associated with the frame ID is deleted from the location repository 2745. In this manner, when the frame is used again in the future, a new entry may be created for the frame ID in the location repository 2745. Accordingly, the location repository 2745 may be considered to be a transient data store.

According to aspects of the invention, the FTA 2740 also includes a data integrity module 2750 and a data aggregation module 2755. In embodiments, the data integrity module 2750 comprises a programming module (e.g., a program control, such as that described with respect to FIG. 1) that analyzes data in the location repository 2745 to detect missing frames. Generally speaking, a missing frame may be defined as a frame whose actual (physical) location does not match the expected location of the frame via the manifest and location repository. For example, a missing frame might include a frame that does not arrive at its intended destination (as defined by a manifest). Similarly, a missing frame might include a frame that arrives unexpectedly at a location (e.g., not on a manifest). The data integrity module 2750 analyzes the data of the location repository 2745 to detect such situations, which indicate that the frame either did not show up where expected or showed up somewhere unexpected. Missing frames may be caused, for example, by conditions where a frame or set of frames are removed from the system to fix a jam, and then not re-entered into the system or are re-entered into another portion of the system.

In embodiments, the data integrity module 2750 performs a missing frame analysis on a periodic basis, as defined by a timer 2757 (e.g., clock) programmed in the FTA 2740. The period of time between each missing frame analysis may be defined by a user who defines the time period in the timer 2757 (e.g., via user input and/or appropriate programming).

In embodiments, when the data integrity module 2750 detects a missing frame, data associated with the missing frame (e.g., frame ID, date detected, location history, etc.) is stored in persistent memory in a validation metrics data store 2760. Data from the validation metrics data store 2760 may be pushed or pulled to a user interface 2762. The interface 2762 may be implemented on any suitable computing device, such as, for example, a computer, personal digital assistant, the I/O device of FIG. 1A, etc. Data provided by the FTA 2740 and displayed with the interface may include, for example: immediate notification of a number of missing frames exceeding a threshold; periodic reports associated with missing frames over a predetermined period of time; user requested reports associated with missing frames over a user-defined period of time, etc. Such reports may be used by facility personnel to analyze trends including, but not limited to: data associated with a group of missing frames, data associated with a subsystem where missing frames are frequently detected, etc.

Still referring to FIG. 27A, the FTA 2740 may also include a data aggregation module 2755. In embodiments, the data aggregation module 2755 comprises a programming module (e.g., a program control, such as that described with respect to FIG. 1) that utilizes data in the location repository 2745 to aggregate data about the flow of frames throughout the system. For example, by accessing the location and time history of how frames move throughout the system (as stored in the location repository 2745), the data aggregation module 2755 may generate reports that indicate: processing rate of the entire system; processing rate of particular subsystems; and processing rate of particular components, just to name a few. It should be noted that the data aggregation module 2755 is not limited to these specific types of reports, and any suitable aggregation of the data stored in the location repository 2745 may be performed by the data aggregation module 2755.

Similar to the data integrity module 2750, the data aggregation module 2755 may also be run periodically as controlled by the timer 2757. However, the data integrity module 2750 and the data aggregation module 2755 need not run on the same schedule, and timer 2757 may be programmed to actuate the two modules 2750, 2755 on different schedules (e.g., at different predetermined intervals).

In embodiments, data aggregated by the data aggregation module 2755 may be stored in persistent memory in a mail flow metrics data store 2765. Similar to the validation metrics data store 2760, data from the mail flow metrics data store 2765 may be pushed or pulled to a user interface 2762.

As discussed supra, the location of a frame is described by a location ID that is stored in the location repository 2745. In embodiments, depending on where a frame is currently located within the system, the location ID describes the specific subsystem unit and may even describe more refined information, such as a storage tower or tube. An exemplary format for the location ID is set forth in the Table 2.

TABLE 2

| Subsystem | Location ID | Description |
|---|---|---|
| Frame Inserter | FI_nn | "nn" identifies specific Frame Inserter |
| Presort Accumulator | PA_nn_tt | "nn" identifies specific Presort Accumulator<br>"tt" identifies Presort Accumulator tube |
| Transport Controller | 2SQ<br>2ST | Frame in transport to a Sequencer<br>Frame in transport to a Storage Unit |
| Sequencer | SQ_nn | "nn" identifies specific Sequencer |
| Storage Unit | ST_nn_ww_tt | "nn" identifies specific Storage Unit<br>"ww" identifies specific storage tower<br>"tt" identifies specific storage tube |
| Container Loader | LD_nn | "nn" identifies specific Container Loader |
| Container Dispatcher | DS_nn | "nn" identifies specific dispatch area |

According to aspects of the invention, every location snapshot of a frame is recorded as it moves through the system. This provides a useful historical flow of each frame from one subsystem to the next. As an example, based upon the format set forth in Table 2, the entry for a frame in the location repository 2745 that has been sequenced and dispatched might appear as follows in Table 3:

TABLE 3

| Frame ID | Address Result | Location ID |
|---|---|---|
| ABCD1234567890 | 33141209657 | FI_02, PA_01_03, 2SQ, SQ_01, 2ST, ST_01_04_36, LD_03, DS_02 |

In embodiments, the interface 2762 and/or system manager 2707 may be arranged to allow a user to submit queries to the FTA 2740. Available queries may be predefined in the programming of the FTA 2740, and may include:

- Location queries (e.g., by frame ID) that retrieve the location of a frame in the system;
  - Location queries (e.g., by subsystem and/or component ID) that retrieve a list of frames contained within a subsystem and/or component;
  - Path queries (e.g., by frame ID) that retrieve the entire path (i.e., segments) that a frame has been routed through; and
  - Throughput queries (e.g., by subsystem and/or component ID) that return summations of frame counts through various segments over defined time periods.

The invention is not limited to the specific examples of queries described above. Instead, other types and formats of queries may be employed within the scope of the invention. For example, in embodiments, a query function may not pinpoint the specific location (i.e., slot) of a frame, but rather may indicate the subsystem and in some cases, the storage tower or tube, in which a frame is currently contained in.

FIG. 27B shows a block diagram depicting steps of a process according to aspects of the invention. The steps may be implemented in the environment of FIG. 27A. Particularly, FIG. 27B shows an example of the steps involved in passing a bundle of frames from a presort accumulator 2715 to a transport controller 2735. At step 2770, the presort accumulator 2715 receives the frames from a frame inserter. At step 2771, the presort accumulator 2715 reads the frame ID of each frame received at step 2770, which may be accomplished in a manner described in detail in other areas of the instant application.

At step 2772, the presort accumulator 2715 creates a manifest of the frames. In embodiments, this may be performed in a manner similar to that described above with respect to FIG. 27A. For example, the manifest may contain information, including, but not limited to: the frame ID of each frame in the shuttle; the shuttle ID; the order that the frames are loaded into (e.g., arranged in) the shuttle; a timestamp of when the manifest is created; an ID of the subsystem that created the manifest. At step 2773, the presort accumulator 2715 sets the address result associated with each frame ID in the manifest. In embodiments, this step is performed in a manner similar to creating the manifest at step 2772, in that the data structure of the manifest is updated with appropriate data (e.g., the address result for each frame ID).

At step 2774, the presort accumulator 2715 sends the manifest to the next destination (i.e., the transport controller 2735, in this example). Also, at step 2775, the presort accumulator 2715 sends the manifest to the FTA 2740. Additionally, at step 2776, the presort accumulator 2715 sends the frames to the next destination (i.e., the transport controller 2735, in this example).

At step 2777, the FTA 2740 receives a manifest (e.g., the manifest from step 2775). At step 2778, the FTA 2740 determines whether each frame in the manifest is already in the location repository 2745. In embodiments, this is accomplished by examining the frame ID of each frame in the manifest against each frame ID stored in the location repository 2745. If the determination at step 2778 is no, then at step 2779 the FTA 2740 enters the frame ID (and data associated with the frame ID in the manifest) into the location repository 2745. If the determination at step 2778 is yes, then at step 2780 the FTA 2740 updates the location repository 2745 by adding the current location of the frame to the location repository 2745.

Still referring to FIG. 27B, at step 2781, the transport controller 2735 receives the frames from the presort accumulator 2715. At step 2782, the transport controller 2735 reads the frame ID of the frames received in step 2781. In embodiments, at step 2782, the transport controller 2735 may either: read the shuttle ID and assume that all frames are still in the associated shuttle, or may read the frame ID of each frame in the shuttle.

At step 2783, the transport controller 2735 receives the manifest from the presort accumulator 2715. At step 2784, the transport controller 2735 updates the received manifest by adding a data value (e.g., a check) to each frame entry in the manifest for which the transport controller 2735 read a frame ID in step 2782. At step 2785, the transport controller 2735 sends the manifest to the FTA 2740. In this manner, the FTA 2740 can compare the manifest from step 2775 to the manifest from step 2785. Also, the FTA 2740 may update the location repository 2745 based upon the new location of the frames as indicated by the manifest from step 2785.

At step 2786, the transport controller 2735 optionally creates a new manifest if the contents of the shuttle have changed for any reason. This may be performed in a manner similar to step 2772. At step 2787 the transport controller 2735 sends the manifest to the next destination, while at step 2788 the transport controller 2735 sends the frames to the next destination.

Still referring to FIG. 27B, at step 2789, the timer sends an actuation signal to the data integrity module. At step 2790, the data integrity module runs the missing frame detector analysis, as described above with respect to FIG. 27A. At step 2791, the data integrity module records any exceptions (e.g., missing frames) in the validation metrics data store 2760. At step 2792, data integrity module sends a notification of any found exceptions (e.g., missing frames) to the system manager 2707 and/or interface (e.g., 2762).

As described herein, the operation of the frame tracking agent (FTA) enables frame identification data to be compiled by one subsystem in a facility-wide sorting and/or sequencing system and handed off to the next subsystem. In this manner, implementations of the invention provide an efficient, near real-time method of tracking frame data in a timely fashion with the transfer of the actual frames. Moreover, embodiments of the invention may be used to provide a detailed audit trail of the specific movement of every mail piece throughout the system.

Nestable Mail Transport Cart

The invention is directed generally to carts, and, more particularly, to nested (also referred to as stackable) mail transport carts. In embodiments of the invention, the cart is provided that has a substantially trapezoidal footprint (e.g., in plan view) and a tapered front end (e.g., in side view), such that plural carts may be nested together when not in use. According to aspects of the invention, the stackable cart has a hinged bottom that is biased to an intermediate position. When an object, such as a mail tray, is placed on the bottom, the bottom pivots downward to a horizontal position and supports the object. On the other hand, when empty stackable carts are nested together, a first cart inserted into a second cart causes the bottom to pivot upward to an almost vertical position, to facilitate compact stacking of the carts. In this manner, substantial space savings may be obtained by nesting carts that are not in use. When utilized in a mail processing center, stackable carts according to aspects of the invention will save significant space on the plant floor, the dock areas, and the delivery trucks.

In conventional mail processing centers, mail carts are commonly used to hold trays of mail for delivery to other processing centers or post offices. FIG. 28A shows a top view and FIG. 28B shows a side view of a plurality of a known type of cart 2805, generally known as a General Purpose Mail Container (GPMC). These carts 2805 are typically used to transport mail (e.g., sacks, trays, bundles, etc.) by rolling across the floor from operation to operation and to and from the loading docks. The carts 2805 have a fixed bottom panel for holding mail and a generally rectangular shape in plan view. Owing to their rigid design and rectangular shape, these carts 2805, when empty, consume a substantial amount of floor space.

FIG. 28C shows a top-down view of a plurality of stackable carts 2810*a-e* according to aspects of the invention. In embodiments, the stackable cart, generally referred to as 2810, provides a rolling transportation cart that can be stacked together with other carts when empty, while retaining the existing benefits of strength, rigidity, containment, and towing. For example, in FIG. 28C, empty carts 2810*b-e* are shown as nested together. In this manner, considerable plant floor space, dock space, and truck space can be saved by nesting the empty stackable carts 2810.

In embodiments, the stackable cart 2810 comprises a frame 2812 having a substantially trapezoidal shape when viewed from the top (e.g., in plan view). For example, each cart 2810 has a back 2815, front 2820, and sides 2825 extending in a tapered manner between the front 2820 and back 2815. In embodiments, the front 2820 has a width "WF" of about 44 inches, and the back 2815 has a width "WB" of about 40 inches. However, the invention is not limited to these specific values, and any suitable dimensions may be used within the scope of the invention.

FIG. 28D shows a side view of the plurality of carts 2810*a-e*. As depicted, the back 2815 has a smaller vertical dimension than the front 2820. For example, the front 2820 may have a height "HF" of about 70 inches, while the back may have a height "HB" of about 66 inches. Because the carts 2810 taper from larger to smaller from front to back in both the top view and side view, a plurality of carts 2810*b-e* may be nested together when empty. Particularly, as depicted in FIG. 28D, the back of cart 2810*b* is inserted into the front of cart 2810*c*, the back of cart 2810*c* is inserted into the front of cart 2810*d*, and the back of cart 2810*d* is inserted into the front of cart 2810*e*. In embodiments, each cart may have a depth "D" of about 29 inches. However, the invention is not limited to the specifically described values of "HF," "HB," and "D," and any suitable dimensions may be used within the scope of the invention.

Still referring to FIG. 28D, each cart 2810 may have a plurality of rollers 2830. In embodiments, each roller 2830 may comprise any conventional rolling mechanism, such as a caster or wheel that is rotatable about an axis that is generally parallel to a surface 2835 on which the cart 2810 rests. Moreover, each roller 2830 may be connected to a frame of the cart 2810 in a manner such that the roller 2830 can pivot about an axis that is generally orthogonal to the surface 2835, to provide directional mobility to the cart 2810. Even further, one or more of the rollers 2830 of a cart 2810 may be provided with a brake mechanism, such as a friction brake that selectively slows or prevents rolling.

Still referring to FIG. 28D, in embodiments, each cart 2810 also comprises a bottom 2840. For example, the bottom 2840 may be hingedly attached to the frame 2812 near the lower end of the back 2815. The bottom 2840 may be biased to an intermediate position arranged at an angle θ relative to vertical. In embodiments, θ may be about 45°, although the invention is not limited to this angular value and other intermediate positions may be employed. Moreover, the bias may be provided by at least one spring or other conventional bias element operatively arranged between the bottom 2840 and the frame 2812. As seen in FIG. 28D, when the back of a first cart (e.g., 2810*b*) is nested into the front of a second cart (e.g., 2810*c*), the bottom 2840 of the second cart rotates generally upwardly, e.g., from the intermediate position to an almost vertical position. In embodiments, this upward rotation of the bottom 2840 is caused by the frame of the first cart coming into contact with the bottom of the second cart. As the first cart is pushed into the second cart, the bias of the bottom 2840 is overcome, and the bottom 2840 rotates toward vertical. The cart is not limited to a single bottom. For example, several bottoms may be combined to make shelves.

FIG. 28E shows a side view of a cart 2810 onto which an object 2845 has been loaded. In embodiments, when the mass of the object 2845 is sufficient to overcome the bias of the bottom 2840, the bottom rotates generally downwardly, e.g., from the intermediate position to a substantially horizontal position. In this manner, the cart 2810 may be used to hold, store, and/or transport the object 2845.

FIG. 28F shows an isometric view of an unloaded cart 2810 according to aspects of the invention, and FIG. 28G shows an isometric view of a loaded cart 2810 according to aspects of the invention. For example, as depicted in FIG. 28F, the bottom 2840 is biased to the intermediate position. In embodiments, the cart 2810 comprises pins 2860 extending upwardly from the frame 2812, and the bottom 2840 includes holes 2865 structured and arranged to engage the pins 2860.

More particularly, as shown in FIG. 28G, when an object 2845 is placed on the bottom 2840 and the bottom rotates downward, the holes 2865 engage the pins 2860 to define a limit stop for the rotation of the bottom 2840. In embodiments, the pins 2860 and holes 2865 are structured and arranged to stop downward rotation of the bottom 2840 when the bottom reaches a substantially horizontal position. However, the invention is not limited to this configuration, and the pins 2860 and holes 2865 may be structured and arranged to stop rotation of the bottom 2840 at any desired angle.

According to aspects of the invention, structural components of the cart 2810 may be made of any suitable material. For example, the frame 2812 may be composed of tubular or solid metal (steel, aluminum, etc.) or plastic. Similarly, the bottom 2840 may be composed of solid or lattice-type metal or plastic. However, the invention is not limited to these materials; but rather, any suitable materials can be used within the scope of the invention. Moreover, although five carts 2810*a-e* are described, any number of carts 2810 may be used within the scope of the invention.

Mail Tray Dispatch System and Method in a Facility-Wide Sorting and/or Sequencing System The invention is directed to a system and method for distributing filled trays of destination mail in a facility-wide letters/flats mail sorting and/or sequencing system. The invention also provides a container dispatch distributor (CDD) system for a facility-wide letters/flats mail sorting and/or sequencing system. The CDD can be an automated CDD that manages and controls an entire process of distributing filled trays of destination mail to assigned dispatch lanes and loads the trays onto mail transport equipment (MTE) carts.

In embodiments, the CDD can complement a facility-wide letters/flats mail sorting and/or sequencing system of the type described in the instant application by handling system dispatch volume and throughput. However, it should be understood by those of skill in the art that the disclosed system can also be utilized on any to mail sorting and/or sequencing systems and can specifically be adapted to any mail processing equipment (MPE) or groups of mail processing equipment that dispatch trays of mail.

The CDD can also be used in other mail processing systems and need not be limited to handling destinating mail. It is also contemplated that originating non-local mail can be handled by the CDD, as well. However, the CDD is particularly well suited to handling destinating mail due to the short dispatch window and high tray volume for this mail flow.

During the dispatch window for destinating mail, multiple trays filled with sequenced letters and flats mail (which may be referred hereinafter as mail pieces) will leave the facility-wide letters/flats mail sorting and/or sequencing system to be loaded onto mail transport carts for transfer to other facilities. When this is required, a controlled and automated method and system, as presented herein, can be provided to ensure that:

Dispatch throughput maintains the rate of filled trays as they leave the facility-wide letters/flats mail sorting and/or sequencing system;

Trays destined to the same facility are loaded onto the same set of mail transport carts; and Multiple trays for a delivery route are loaded onto the same cart in an ordered fashion.

The invention thus provides a system and method which can control the complete dispatch process of destinating mail from Mail Processing Equipment (MPE) currently in use and/or in a facility-wide letters/flats mail sorting and/or sequencing system of the type described in the instant patent application.

The CDD system utilizes four components: a mail tray transport conveyor which includes a transport backbone that feeds “n” number of dispatch loading lanes; a cart loader which includes a vertical tray lift and a sliding lift shelf mechanism for positioning and unloading carts; a rolling cart conveyor that advances empty carts along an entrance aisle to be filled and advances filled carts along an exit aisle; and a configurable dispatch allocation plan that allocates every dispatch loading lane to specific truck dispatch runs.

The following are several benefits realized by the CDD system of the invention.

Dispatch handling is automated so as to greatly reduce or eliminate much manual labor effort expended in conventional systems;

Dispatch operations are more efficient due to the greatly improved routing of the transport conveyor and placement of the conveyor loading lanes;

The number of cart loading lanes can be virtually unlimited and can complement dock bay usage;

Lanes can be reconfigured for daily dispatch changes with no impact on the actual equipment;

Automatic cart loading allows one layer (e.g., 4 trays) to be loaded at once;

Automatic printing and affixing of cart placards eliminates manual effort; and

Automatic securing of tray restraining net on cart eliminates manual effort.

FIG. 29A shows a number of sequencing units feeding filled mail trays to a conveyor transport backbone which in turn transports the mail trays to a number of dispatch loading lanes in accordance with aspects of the invention. In FIG. 29A, it can be seen that the system includes a backbone transport conveyor 2900, a plurality of identification reads 2902 (e.g., RFID readers, bar code readers, etc.), and a plurality of dispatch loading lane units 2903. The conveyor 2900 receives filled mail trays from multiple sequencing units 2904 via transport units 2905. The conveyor transport backbone 2900 preferably accepts all of the filled mail trays from each mail processing equipment or sequencing unit 2904. As each tray merges onto the backbone conveyor 2900 via transport units 2905, a bar code reader 2902 reads the destination bar code on the tray label. The destination bar code is looked up in a dispatch allocation plan 2901 (which is stored in a database as discussed with reference, for example, to the computing infrastructure) to determine the assigned dispatch loading lane 2903 that the tray should be transported to.

With reference to FIGS. 29B and 29C, there is shown one of the dispatch loading lane units 2903 shown in FIG. 29A. As is apparent from FIG. 29C, the dispatch lane 2903 diverts filled trays 2907 from the backbone conveyor 2900 via an input feed lane 2906. The input feed lane 2906 feeds the trays 2907 to a multi-lane lane section 2909 having plural lanes 2910, e.g., 4 lanes. Although four lanes are shown, fewer or more lanes can be utilized depending on, among other things, the size of the mail carts. The trays 2907 are directed into one of the four lanes 2910 by a directional paddle system 2908, for example. The trays 2907 advance down each lane 2910 until they reach a vertical tray lift 2911.

Each lane 2910 provides linear space for multiple trays 2907. In this way, as trays 2907 are received, they can either be fed in parallel down each of the lanes 2910, or staged into a single lane 2910, or any combination thereof, depending on the destination and mail content of each tray 2907. Empty carts 2912 which will carry the trays 2907 are fed into an entrance aisle 2915 until they abut the vertical tray lift 2911. After a cart 2912 is loaded with the filled trays 2907, it is shifted laterally into an exit aisle 2916.

The trays 2907 are preferably loaded onto the carts 2912 in a controlled and/or predetermined or automated manner. For example, it may be desirable to co-locate multiple trays 2907 for the same postal route either on the same level in the cart 2912 or vertically stacked in the cart 2912. The dispatch allocation plan 2901 may be configured to handle any organizational method of cart loading.

The carts 2912 are preferably advanced in an automated manner along a u-shaped unidirectional aisle system made up of aisles 2915 and 2916. According to one non-limiting embodiment, empty carts 2912 are manually pushed into the entrance aisle 2915 until they engage with an automated advancement feeder. As the carts 2912 are pushed into the entrance aisle 2915 (e.g., by a mail handler), a tray restraining net (not shown) is lowered and secured to a bottom of the cart 2912 to allow the cart 2912 to receive trays 2907. When each cart 2912 reaches a filling position adjacent the lift 2911, it is docked and filled singularly with trays 2907. Once filled, the cart 2912 is undocked and advanced to the exit aisle 2916.

When a cart 2912 is moved into the exit aisle 2916, two operations can occur in parallel and/or at substantially the same time. First, a cart placard or identification can be printed and affixed to the cart 2912 with a printer and ID attachment device 2914, known to those of skill in the art. The placard can preferably identify the cart contents and destination with a unique code. Second, a tray restrainer 2913 can raise the tray restraining net and secure it to the top of the cart 2912. The net prevents trays 2907 from falling out of the cart 2912 during transit. Of course, other mechanisms for retaining the trays 2912 can also be utilized such as, for example, lids, etc. The filled carts 2912 can then be moved down the exit aisle 2916 and thereafter loaded onto transport vehicles.

FIGS. 29D-30 show a non-limiting way in which the carts 2912 can be loaded with trays 2907. As can be seen in FIG. 29D-29F, the carts 2907 are loaded from bottom to top, with each layer of trays resting on the lower layer. Loading of the trays 2907 onto the carts 2912 proceeds as follows: once the trays enter the tray lift 2911 so as to fill up the lift shelf 2917 (with up to 4 trays), the lifter 2917 is raised or lowered to the appropriate level. The lifter can, for example, include a rack and pinion gear system, scissor jack mechanism, linear motor, etc. Since trays are stacked on top of each other, all levels other than the top level should be completely filled with trays.

After the lift shelf 2917 is positioned to the correct vertical height as shown in FIG. 29E, the lift shelf 2917 slides towards the cart 2912 and extends into the cart 2912 as shown in FIGS. 29F, 29G and 29H. A retraction bar 2918 is then lowered in back of the trays to a height less than the tray height as shown in FIG. 29F. The retraction bar can be moved via any known type of motor, etc. The lift shelf 2917 is then retracted as shown in FIG. 30 leaving the trays 2907 on the cart 2912. The retraction bar 2918 prevents the trays 2907 from sliding back with the lift shelf 2917. In this way, the trays 2907 are gently dropped onto the lower level of trays already in the cart 2912. This process repeats itself until the cart 2912 is fully loaded with mail trays or until all of the mail trays destined or desired to be on the cart 2912 are so loaded.

During the dispatch process, tray throughput can be maintained or controlled using several approaches. In one example, the CDD system can be sized or configured for the highest volume day of the week, excluding specific peak days throughout the year (mostly during holiday mailings). In this case, the volume profile would determine the length of the dispatch lanes 2903. In another example, tray compression is utilized as trays 2907 are merged onto the transport backbone 2900. Compression reduces the amount of space between the trays 2907 so as to maximize the capacity of the backbone conveyor 2900. In still another example, the dispatch lanes 2903 may be dynamically reconfigured to accommodate unanticipated volume skew for offices that may receive a higher mailing volume on a given day. Multiple lanes can be assigned to a single dispatch area in these circumstances, whereas normally only a single dispatch lane would be allocated.

Sequencing of Individually Containerized Mail Pieces Inside of a Storage Unit The invention relates to a method and system for sequencing products or mail pieces within a storage unit. The storage unit cycles the products through the storage unit in at least a first cyclic path and a second cyclic path. Selected products are diverted from the first cyclic path to the second cyclic path. The products are diverted between the first cyclic path and the second cyclic path, in accordance with a sequencing control or algorithm which places all the products in a predetermined delivery point sequence within the storage unit. Finally, the mail pieces from multiple storage units are diverted into a final sequencing lane that places all the products in a delivery point sequence within the entire system.

Delivery Point Sequence

A delivery point is a unique identification for each deliverable address for the United States Postal Service (USPS). For each section of a route such as a city block, numbers 00 to 99 (or other designations) are assigned to each delivery point. The order of delivery points that the mail carrier delivers to is commonly referred to as the "delivery point sequence" (DPS).

Sequence vs. Sort

The DPS order creates a distinction between sequencing and sorting, where sorted mail is not concerned with the order of delivery, but sequenced mail is arranged in the preferred order of delivery. In addition to the mail being sequenced, a mail carrier must currently sift through at least two mail streams before delivering mail. Typically, a mail carrier is provided with at least a first container of sequenced letters and a second container of sorted or sequenced flats. As the mail carrier delivers mail to a home or delivery point, the mail carrier typically has to retrieve letters from the first container and the flats from a second container. A mail carrier's productivity, therefore, is greatly increased, if a single, mixed mail stream of both flats and letters is sequenced to the mail carrier's delivery or "walk" order.

Automation of Individual Mail Frames

Automation of the sequencing process preferably involves a system that handles both flats and letters simultaneously, as described in the present application. The resolution of sequenced mail is an individual mail piece for a specific delivery point, whereas the resolution for sorted mail is a batch of mail pieces for a group of delivery points. The automation of sequenced mixed mail dictates that an individual mail piece, e.g., a letter or flat, be placed in individual folders attached to frames, which are described in more detail in the instant application. Since flats and letters vary greatly in physical dimensions, the invention contemplates a frame to process the flats and letters, such that the dimensions of the individual frame will facilitate automation. It should be understood, though, that frame size can also be matched to the size of the mail piece in order to increase the carrying capacity of the system.

45 Degrees & Right Angle Divert (RAD)

According to the system and method of the invention, each individual mail piece is placed in an individual frame that moves through a machine or group of machines. These machines and frames of mail, however, can quickly occupy floor space. To keep the frames in a dense configuration and to facilitate the diversion of mail pieces while being transported through a machine, the frames are normally kept at a 45 degree angle. This orientation allows any frame to be extracted out of or inserted into a moving stream of frames without having to change the speed of the stream. The preferred technique for diverting a frame from the stream is to use a "Right Angle Divert" (RAD) as discussed in embodiments of the instant application. In embodiments, the RAD can divert frames out of a stream in the perpendicular direction of the trailing edge with respect to its current heading.

Vertical Divert

RAD's work on the horizontal plane, but many facilities also have vertical space to occupy. To best utilize the available vertical space, there is a need to divert, move, and store mail vertically. The use of vertical diverting solves this problem by allowing frames to travel up or down inside the embodiment of the invention, which is described in the instant application. Accordingly, diverting the mail in a vertical direction allows mail pieces to be stored in a vertical location, and vertical diverting increases the available storage locations where the mail can be sequenced.

General Concept

The sequencing of mail pieces while in storage, conserves floor space and minimizes the need for additional storage and sequencing units. Since storage takes up the most space relative to other processes in the sequencing system, the method and system of the invention utilizes vertical space for both storage and sequencing. Accordingly, the invention includes the use of a plurality of storage units which accept mail pieces including presorted mail pieces, and then sequence the mail pieces within the storage unit, which is described in the instant application. The sequenced mail pieces from each storage unit are released out to a final sequencing process that outputs from each storage unit into a final DPS order. The sequencing process preferably includes vertically recirculating mail pieces which are sequenced in either small blocks or in progressive increments. It should be understood that the term mail piece is used very broadly to include letters, flats and other objects of various different sizes.

Flow

Referring now to FIG. 31A, the general flow of frames begins at the input of mail or an input lane 3110. Preferably, the mail to be sequenced in accordance with the invention has already been inducted into individual frames which are angled at 45 degrees. FIG. 31A includes an exemplary frame F, which may be any one of several different types or embodiments of frames described in the instant invention. As depicted in FIG. 31A, the mail pieces may be presorted, and are on lead screws or other conveyances described herein for transportation. As frames travel down the input lane 3110, the frames fill up storage units 3112 on a first come first served basis. RADs 3113 divert the frames from the input lane 3110 into individual storage units 3112. Therefore, before entering the storage/sequencing unit 3112, frames go through a mechanism 3114 for reorienting the frames to a perpendicular position to allow vertical diverts inside the storage units 3112 to handle them properly in various embodiments. Once a storage/sequencing unit 3112 is full of frames, it begins to sequence the frames which are described in general terms within this section, but which may have several different embodiments that are described in more detail in other sections of the instant application.

When the sequencing is complete, the frames in each storage/sequencing unit 3112 should be in DPS order with respect to the other frames in the same unit 3112. After the frames are sequenced, the frames are re-oriented from a perpendicular orientation back into a 45 degree position by orientation mechanism 3115, thereby enabling the frames to be diverted into the stream of a final sequencing lane 3116. The orientation mechanism 3115 can be a mechanical system such as the RAD. The frames from each storage unit 3112 are sequenced with those from other storage units 3112 to create the final DPS order of mail.

The reason for a final pass is that mail pieces flow into the facility throughout the entire day and not all at once. If a machine begins sorting and/or sequencing with the first batch of mail input, any additional input would make that sequence out of date and it would have to be redone. Although a machine can wait until the end of the day to commence sequencing, it would be an inefficient use of time. Therefore, batches of mail pieces are sequenced throughout the day, and a final sequencing pass is conducted near the dispatch time as described herein.

Sequencing Logic: Numbering

A control unit "C" controls the hardware components 3110-3116 and associated software via a bus "B". The control unit can be implemented in the computer infrastructure described in FIG. 1A, or can be provided in any of the subsystems described herein, depending on the particular architecture of the system. During sequencing, the control unit "C" keeps track of each frame and its relative order in the sequence. Control numbers are assigned to each frame, and the first frame in DPS order inside a storage/sequencing unit 3112 is assigned number 1 or other designation known to be a first frame. The numbers increment upward to the last frame in DPS order or other alphanumeric order. This scheme is repeated for each storage/sequencing unit 3112 where the first frame in DPS order with respect to the other frames in that storage unit is designated as the first frame. When the frames come out of the storage units 3112 and into final sequencing, the invention renumbers the frames in all of the units using the same scheme. At this time all the frames are available for sequencing (e.g., numbering), such that the control unit "C" can assign the final DPS order to each mail piece.

Recirculation Zones

Referring now to FIGS. 31B and 31C, embodiments of the invention include a recirculation zone 3120 where the actual sequencing is accomplished within the storage units 3112. Preferred embodiments of the storage units 3112 are illustrated in FIGS. 31B and 31C, and the storage units 3112 include at least one storage area 3121 and one recirculation zone 3120. Other storage units can also be used herein, as described in other sections of the instant application.

FIG. 31B illustrates a storage/sequencing unit 3112 having a single recirculation zone 3120, and FIG. 31C illustrates a storage/sequencing unit 3112 having multiple recirculation zones 3120. More recirculation zones 3120 can be added in a given storage/sequencing unit 3112 to increase effectiveness. An example of a storage/sequencing unit 3112 having two recirculation zones is illustrated in FIG. 31C in which there are recirculation zones 3120 at each end of the storage unit.

Although there are different approaches for sorting and/or sequencing within the storage units 3112, the different approaches include the frames cycling inside each storage/sequencing unit 3112 and sequencing frames until all the frames are sequenced. The sequencing preferably occurs by having the frame at the bottom of the recirculation path merge between the frames on the upper level. A more detailed illustration of the sequencing within a storage/sequencing unit 3112 is depicted in FIG. 31D. From FIG. 31C, it can be appreciated that a plurality of frames cycle within the storage/sequencing unit 3112 in a counterclockwise direction; although the flow can be clockwise when the frames are oriented in a direction opposite to that shown. A vertical divert at point A causes selected frames to be diverted from the bottom path and to be sequenced into a desired location on the upper path. By diverting selected frames from the lower path to the upper path at the appropriate times, the frames can be sequenced in accordance with the desired DPS.

The embodiments of the invention include at least three different approaches for recirculating the mail pieces with the storage/sequencing unit 3112 in order to sequence the mail pieces. These different approaches are referred to as the "hold", "push back", or "floating divert" approaches.

Hold Approach

The "hold" approach includes collecting and sequencing a predetermined number of consecutive mail frames in the recirculation zone 3120 and then attaching the sequenced frames to the growing chain of sequenced frames cycling inside the storage/sequencing unit 3112. As an example, the recirculation zone 3120 could hold five mail pieces (e.g., frames), and the five mail pieces could be assigned numbers 11-15. As these mail pieces pass by the recirculation zone 3120, they are captured and sequenced. In order to sequence these mail pieces, the captured mail pieces cycle inside the recirculation zone until the appropriate next lowest number of the chain is near the top of the recirculation path. If numbers 11, 12, 14 and 15 were captured and 13 was approaching, the frames inside would cycle until number 12 was at the top of the recirculation path so that number 13 could be accepted into the recirculation zone in relative order. Now mail pieces 11-15 wait for the already sequenced pieces 1-10 to pass by, and the recirculation zone 3120 releases numbers 11-15 in order for them to be attached to the passing chain. Once attached, pieces 1-15 are sequenced and cycling throughout the storage/sequencing unit 3112.

Referring now to FIG. 31E, a flow diagram illustrates the steps of the "hold" approach. In step S3141, the presorted mail pieces, which are assigned numbers or other designations such as alphanumeric designations (hereinafter referred to as numbers), enter the storage/sequencing unit 3112. In step S3142, the control unit "C" determines the first block of consecutive numbers to be sequenced. In step S3143, each consecutive number of the selected block of numbers is captured from the flow of cycling frames and stored in the recirculation zone 3120. At step S3144, the control unit "C" makes a determination whether the block of predetermined consecutive numbers has been captured. Once the control unit "C" determines in step S3144 that all the consecutive numbers in the selected block have been captured, the flow continues to step 3145.

At step 3145, the block of selected frames is released back in the appropriate location within the flow of cycling frames. In step S3146, the control unit determines whether there are any other blocks of consecutive numbers which need to be sequenced. If so, the flow continues to step S3147. At step S3147, the control unit "C" determines the next block of consecutive numbers and the flow returns to step S3144 where the control unit determines when the block of predetermined consecutive numbers has been captured, and the control unit releases the captured frames back into the flow in step S3145. The flow continues to step S3146, and if the control unit "C" determines in step S3146 that all the blocks of consecutive numbers have been correctly sequenced, the sequencing within the storage/sequencing unit 3112 is terminated.

Push Back Approach

The second approach for sequencing within the storage/sequencing unit 3112 is the "push back" approach which sequences mail pieces in progressive increments. The mail piece at the bottom of the recirculation path will be "pushed back" behind another piece inside the recirculation zone 3120. The concept is to push back mail pieces behind another mail piece with the next lowest DPS order. For example, numbers 10, 50, 20, 44, and 21 are inside a recirculation zone. Number 21 happens to be at the bottom of the recirculation path, so it gets moved behind 20. Now, the order is 10, 50, 21, 20, and 44. 44 is at the bottom and gets moved behind 21, making the order: 10, 50, 44, 21, and 20. 20 is now at the bottom and gets pushed behind 10, making the order 20, 10, 50, 44, 21. This continues . . . 21, 20, 10, 50, 44 . . . 44, 21, 20, 10, 50 . . . 50, 44, 21, 20, 10. Now that number 10 cannot be pushed back, it leaves the recirculation zone and a new number enters the recirculation zone 3120.

Referring now to FIG. 31F, a flow diagram illustrates the steps of the "push back" approach. In step S3151, the presorted mail pieces, which are assigned numbers, enter the storage unit/sequencing machine 3112. In step S3152, the control unit "C" causes a group of numbered and unsequenced mail pieces to be captured in the recirculation zone 3120 for sequencing. In step S3153, the control unit "C" determines whether the bottom mail piece in the recirculation zone 3120 can be pushed behind the next lowest number mail piece. If the bottom mail piece can be pushed behind, it is pushed behind in step S3154. If the bottom mail piece cannot be pushed behind the next lowest number mail piece, it is released back into the cycling flow of frames in step S3156. In step S3157, the control unit "C" makes determination whether all the mail pieces are sequenced in the correct numerical order. If all the mail pieces are not in the correct numerical order, then a new numbered mail piece enters the recirculation zone 3120 in step S3155. Steps S3153 to S3156 are repeated until the control unit "C" determines in step S3157 that all the mail pieces have been correctly sequenced. The sequencing within the storage/sequencing unit 3112 is then terminated.

Floating Divert Approach

The third approach for sequencing within the storage/sequencing unit 3112 is the "floating divert" which causes the recirculation zone 3120 to grow with the chain of sequenced mail pieces. If a storage/sequencing unit 3112 is fixed in size, then the vertical divert mechanism 3115 used for the recirculation path is allowed to "float" inside the unit, expanding the recirculation zone 3120 as needed. Instead of letting the chain cycle around the storage/sequencing unit 3112, the chain stays contained in the recirculation zone 3120. When the number that is one greater than the highest number in the chain approaches the recirculation zone 3120, the frames already in the zone cycle (if necessary) until the highest number in DPS order is at the top of the recirculation zone.

Then, the divert would "float" over one so that the number which previously approached the chain is now a part of the chain. This allows the size of the cycling mail pieces that are not in the chain to decrease as the chain grows, making search times smaller. For example, if numbers 1-5 are in a storage/sequencing unit 3112 and no numbers were in the recirculation zone 3120, then it would take up to 5 cycles for the number 1 to enter the recirculation zone 3120. However, it would only take up to 4 cycles for the number 2 to enter, etc. This sequencing scheme can be enhanced with multiple recirculation zones 3120 that merge in the end.

Referring now to FIG. 31G, a flow diagram illustrates the steps of the "floating divert" approach. In step S3161, the presorted mail pieces, which are assigned numbers, enter the storage unit/sequencing machine 3112. In step S3162, the control unit "C" allows the lowest numbered mail piece to enter the recirculation zone 3120. In step S3163, the control unit "C" allows mail pieces to approach the recirculation zone 3120 and determines whether an approaching mail piece is the next lowest numbered mail piece. If the approaching mail piece is not the next lowest numbered mail piece, another mail piece is allowed to approach the recirculation zone 3120 in step S3164. When the next lowest mail piece approaches the recirculation zone 3120, it is allowed to enter the recirculation zone 3120 in step S3165. In step S3166, the control unit "C" determines whether there are any unsequenced mail pieces which have not entered the recirculation zone 3120. If there any unsequenced mail pieces, steps S3163-S3166 are repeated until all the mail pieces have been allowed to enter the recirculation zone 3120. Once the control unit "C" determines in step S3166 that all the mail pieces have been correctly sequenced, the sequencing within the storage/sequencing unit 3112 is terminated.

Clamps for Clamping Mail Pieces and Storage Units for Storing the Mail Pieces

The invention is directed to a system for transporting mail in a sequencing system using clamps. In embodiments, mail pieces hang on clamps which are transported on the conveyance system of the invention. The clamps are configured to handle various types of mail (e.g., letters, flats, postcards, periodicals, odd shaped mail pieces, and even parcels up to a specified thickness) in a single sorting operation. The clamps are able to be efficiently sorted into carrier delivery sequence in a single or more pass, and then be dropped into a mail tray or packaged. Each clamp can include a unique identification for matching with an identification of a mail piece in order to sort and sequence the mail pieces as discussed throughout the disclosure and specifically with reference to the discussion of the frames.

In embodiments, the clamps are designed to accommodate known system operations such as measuring the dimensions of the mail piece, weighing the mail piece, printing information such as bar code information, reading information from the mail piece, etc. Additionally, as discussed herein, the clamps are configured to be conveyed on one or more lead screws or timing belts (e.g., cogged belts or other driving mechanisms) in order to process mail pieces and other objects. In particular, the present invention is geared to large scale mail sorting and sequencing systems in order to sort and sequence the mail for an entire facility. Mail or mail piece as described herein may be letters, flats or other objects or products, depending on its size.

As discussed herein, the present invention also provides a storage system for the mail. This includes an area (or several areas) with a matrix of multiple tracks to hold mail pieces (with the clamp still attached). These tracks hold rows of mail pieces within the clamps in both the vertical and horizontal directions. These storage areas buffer mail pieces between processing steps and also hold mail pieces prior to dispatch. This allows the ability to accept mail pieces into the system at any time and to dispatch when a mail truck is at the dock of the facility. The storage area(s) needs to be sized to hold a quantity, e.g., day's worth of mail. Additional benefits of the storage area in accordance with the invention include the following.

- Allowing the mail to be fed and read once (eliminating the presorting operations necessary for WO 2006-063125 and any subsequent sorting).
- Allowing true sequencing of the mail including sequencing for size in addition to delivery point (instead of sorting to just the delivery point) which facilitates in the mail carrier delivering the mail.
- Allowing any buffering between sequencing operations (instead of having multiple dedicated buffers within the system).
- When combined with a linear sequencer, allowing many different sortation and sequencing operations to occur on the same subsystem (each time feeding between the storage area and sequencer—versus the linear flow).

In embodiments, the clamps of the invention can vary in size including thickness, e.g., a minimum size clamp has a thickness of 0.2 inches or more, depending on the size of the mail piece. These clamps and accompanying mail pieces can be stored in the storage areas in a serial track or more preferably, two tracks in close proximity to each other to create areas that almost double the capacity of the storage area.

FIG. 32A shows a mail clamp in accordance with one aspect of the invention. As shown in FIG. 32A, the mail clamp is generally depicted as reference numeral 3200. The mail clamp 3200 includes a backing 3202, which is preferably larger than a piece of mail that is to be clamped to the mail clamp 3200. This ensures that the mail clamp 3200 can be conveyed throughout the conveyance system without jamming due to the mail piece getting caught on any of the mechanisms. As discussed in further detail below, the backing 3202 also ensures that the mail piece stays flat and will not extend beyond the backing 3202, itself.

Advantageously, the configuration of the clamps thus makes it easier to control the entire mail piece during the sorting and sequencing operations. That is, by controlling a single side of the mail piece per clamp, it is possible to control the entire mail piece from curling, etc. which would otherwise potentially interrupt and/or disrupt sorting and sequencing operations. More specifically, and as discussed in greater detail below, the backing 3202 of two adjacent mail clamps 3200 will control the mail piece when they are in a face to end orientation, e.g., squeeze the mail pieces between two adjacent clamps 3200.

Still referring to FIG. 32A, a grasping or holding device 3204 extends over a portion of the backing 3202. The grasping device 3204 may be spring loaded or be made of a resilient material such as, for example, a plastic or metal or metal alloy. In this configuration, the grasping device 3204 naturally rests against and is in contact with the backing 3202. In this way, the grasping device 3204 is capable of grasping and exerting sufficient force to hold mail pieces as small as a single thickness of paper or thicker mail pieces or parcels. This enables intermixing almost the entire mail stream within the sorter. Thus, the grasping device 3204 is configured to hold one or more types of mail pieces firmly against the backing 3202 (see, e.g., FIG. 32B) in order to sort and sequence both mail and flats within a single system. Also, in embodiments, the grasping device 3204 will ensure that the mail piece is firmly clamped to the backing 3202, and does not extend beyond edges of the backing 3202.

The grasping device 3204 is attached or connected to an upward extending arm 3206. The upward extending arm 3206 extends from the backing 3202. The upward extending arm 3206 includes a rail system 3208 which is configured to interact with a channel and screw or belt system for transporting the clamp 3200 throughout a sorting and sequencing system. More specifically, the rail system 3208 includes a vertical member **3208*a* and two horizontal members 3208*b* and 3208*c*. The horizontal members 3208*b* and 3208*c* may be parallel to one another. As discussed in further detail below, in operation the upper horizontal member 3208*b* will interact or travel within a channel section of the sorting and sequencing system; whereas, the lower horizontal member 3208*c* will interact with a lead screw, belt or other driving system for moving the clamp 3200 in either the forward or reverse direction. In embodiments, a lead screw, belt, etc., can be placed on both sides of the vertical member 3208*a* and interact with opposing portions of the lower horizontal member 3208*c*, where each will move the clamp 3200** in opposite directions or at different angles.

The clamp 3200 also includes a gap 3210 or notch in the backing 3202. The gap 3210 is sized and structured to accommodate the placement of a grasping device 3204 of an offset adjacent clamp (See, FIG. 32D). This allows nesting of two adjacent clamps 3200. The gap 3210 is preferably placed as close as possible to the upward extending arm 3206 thereby minimizing the overall lengthwise dimension of two nested clamps.

Additionally, the clamp 3200 includes an ear 3212 and an upward extending divert pin 3214. As discussed with reference to the right angle divert mechanism, the divert pin 3214 is configured to interact with the diverting mechanism in order to divert the clamp 3200 at right angles. As this feature of the right angle divert is discussed in other sections, no further explanation is required herein for an explanation of this feature. Suffice it to say, though, that the divert pin 3214 is designed to interact with the disclosed mechanism that can accommodate a right angle divert, which is also discussed with reference to the frames.

FIG. 32B shows a clamp 3200 holding or grasping a mail piece in accordance with the invention. As shown in FIG. 32B, the grasping device 3204 is holding the mail piece "M", against the backing 3202. The mail piece M does not extend past the edges of the backing 3202. This will ensure proper control of the mail pieces.

FIG. 32C shows the clamp 3200 interacting with components of the sorting and sequencing system in accordance with aspects of the invention. As shown in FIG. 32C, the divert pin 3214 is shown interacting with the lead screw and cam mechanism (discussed in the instant application) for diverting the clamp 3200 at a 90 degree angle. As discussed herein, this embodiment should not be a limiting feature of the present invention, and other embodiments are also contemplated for diverting the clamp 3200. The divert pin 3214 can also be used to control the angle of the clamp 3200 on the conveying system relative to the path of travel via a pitch of the lead screw.

FIG. 32C also shows the rail system 3208 interacting with a channel "CH" and lead screw "LS" (or other driving mechanism such as, for example, a belt). More particularly, in operation the upper horizontal member **3208*b* engages and travels within a channel "CH" and is moved by a lead screw "LS". In the embodiments shown in FIG. 32C, the lower horizontal member 3208*c* engages with the lead screw "LS" (or belt or other driving system) for moving the clamp 3200 in either the forward or reverse direction. As discussed above, the lead screw, belt, etc., can be placed on both sides of the lower horizontal member 3208*c*, where each will move the clamp 3200** at different angles.

Also, the clamp velocity and the angle of the clamp (in relation the forward direction of travel) can be controlled with lead screws "LS" or other driving mechanism. For example, one lead screw (or other driving mechanism such as a belt, for example) can be used to move the clamp 3200 (with mail piece) forward, while a second lead screw "LS" (or other driving mechanism such as a belt, for example) can control the angle. For example, changing the pitch of the lead screw will change the angle of the mail piece and clamp 3200. Having this feature enables the system to easily divert the mail piece from a storage area to the transfer lane.

FIG. 32D shows two clamps in a nested position in accordance with aspects of the invention. More specifically, two clamps 3200A and 3200B are illustratively shown in a nested position. As shown, the grasping device 3204 of the clamp 3200A is nested within the gap 3210 of the clamp 3200B. This ensures that the thickness of the two clamps 3200A and 3200B is minimized, and that the grasping device 3204 does not interfere with the control of the mail pieces. Also, the placement of the gap 3210 close to the upward extending arm 3200 ensures that the lengthwise dimensions of the nested clamps is also minimized.

FIG. 32E shows two clamps in a nested position with mail pieces held thereon in accordance with aspects of the invention. In this configuration, it is shown that the mail piece M on clamp 3200A is controlled by the backing 3202 of the clamp 3200A and clamp 3200B. That is, the mail piece M on clamp 3200A is squeezed between the clamps 3200A and 3200B in order to control both sides of the mail piece. The nesting of the two clamps especially facilitates this advantageous feature as it ensures that the two clamps can be placed as close as possible to one another without the grasping device 3204 interfering with the control of the mail pieces.

Thus, as described herein, by using the nesting feature of the present invention, the storage and transportation of the mail pieces can be effectively doubled by offsetting the mail piece by a small distance. This configuration also controls the mail pieces, thereby being able to transport a mail piece that would otherwise curl. This also helps with diverting process with non-uniform mail pieces.

FIGS. 32F and 32G show sectional views of storage units in accordance with aspects of the invention. Although the storage units are discussed with reference to the clamps, it should be realized by those of skill in the art that the storage units can equally work well with the frames as discussed in previous sections. For example, the storage units can provide the same functionality, safety measures and dimensions, equally well for the clamps and the frames.

The storage units are generally depicted as reference numeral 3220A and 3220B, respectively. The storage unit 3220A is configured to hold two levels 3220$A_1$ and 3220$A_2$ of offset clamps 3200. The storage unit 3220B is configured to hold a single level 3220B1 of offset clamps 3200.

In embodiments, the storage unit 3220A is configured to hold smaller pieces of mail, whereas, the storage unit 3220B is configured to hold larger pieces of mail. In this way, flats and letter mail pieces can be segregated into different storage units. As should be understood by those of skill in the art flats and letters have different dimensions and, as such, it is easy to segregate them in the different storage areas. Also, since flat mail takes up nearly twice the storage volume as regular mail, this configuration will create additional storage savings.

Although not to be considered a limiting feature of the invention, the storage unit 3220A is about 32 inches in width (as measured end to end relating to the mail pieces) and the storage unit 3220B is about 38 inches in width.

In embodiments, the storage units 3220A and 3220B are designed as pull out drawers, in order to gain easy access to the mail pieces therein. The configuration of pull out storage units 3220A and 3220B, for example, also facilitates maintenance. That is, the storage areas have easy maintenance access to clear jams, and repair or replace subassemblies and components.

In the view of FIGS. 32F and 32G, the storage units 3220A and 3220B are moveable left and right via sliding mechanisms 3221. These sliding mechanisms 3221 can be a rail and bearing system used for drawers and which are well known to those of skill in the art such that further explanation is not required herein for an understanding thereof.

FIG. 32H shows sectional views of two storage units in the direction of travel in accordance with aspects of the invention. In this configuration, it is seen that the lead screws LS and track (CH) of the storage units $\mathbf{3220}_1$ and $\mathbf{3220}_2$ are at a slight downward incline with respect to one another. More specifically, the lead screws LS and track (CH) of storage unit $\mathbf{3220}_2$ are inclined lower than that of storage unit $\mathbf{3220}_1$, in the direction of travel. Those of skill in the art will realize that additional storage units (and channels CH or other conveyance mechanisms) in the direction of travel will continue to be at this same incline as shown in FIG. 32I, for example.

The incline of the respective storage units ensures that mail clamps passing between the two adjacent storage units $\mathbf{3220}_1$ and $\mathbf{3220}_2$ will not become "jammed" or remain in the space 3222 between the storage units $\mathbf{3220}_1$ and $\mathbf{3220}_2$. This ensures that no clamps 3200 and hence no mail pieces will be in the space 3222 when a maintenance personnel opens one of the storage units $\mathbf{3220}_1$ and $\mathbf{3220}_2$. Said otherwise, this incline will ensure that all of the clamps 3200 and hence mail pieces remain within one of the storage units $\mathbf{3220}_1$ and $\mathbf{3220}_2$ when a maintenance personnel opens one or both of the storage units $\mathbf{3220}_1$ and $\mathbf{3220}_2$ for maintenance. Thus, by pulling out the storage units $\mathbf{3220}_1$ and $\mathbf{3220}_2$ no clamps will drop from the storage units or jam the storage units $\mathbf{3220}_1$ and $\mathbf{3220}_2$ or other components. In the contemplated embodiment, the channel CH from the first storage unit $\mathbf{3220}_1$ will overlap the channel CH of the second storage unit $\mathbf{3220}_2$ to prevent mail piece from completely falling out during maintenance.

In further embodiments, the driving mechanism (e.g., lead screw, belt, etc.) could automatically be advanced to a position to prevent any jams upon the storage units $\mathbf{3220}_1$ and $\mathbf{3220}_2$ being opened. This can be accomplished by using proximity or other physical type sensor "P", known to those of skill in the art. A sensor may be, for example, a photodiode that gets interrupted upon the opening of the storage units $\mathbf{3220}_1$ and $\mathbf{3220}_2$. The sensor "P" will provide a signal to the control unit (as discussed herein) which, in turn, will provide a signal to the driving mechanism to advance the clamps a predetermined distance.

In still further embodiments, the storage units $\mathbf{3220}_1$ and $\mathbf{3220}_2$ can include a lever 3224 to ensure that the clamps 3200 and hence the mail pieces remain within the storage units $\mathbf{3220}_1$ and $\mathbf{3220}_2$ when opened. For example, the sensor "P" detecting that a storage unit is opening, will send a signal to the control unit (as discussed herein) which, in turn, will provide a signal to the lever to swing in a down position to prevent the clamps 3200 from moving between storage units. Similarly, when the sensor "P" detects that a storage unit is closing, it will send a signal to the control unit (as discussed herein) which, in turn, will provide a signal to the lever to swing in an up position to allow the clamps 3200 to move between storage units. The lever 3224 can be driven by a servomotor for example.

FIG. 32I shows the different storage units shown in, for example, FIGS. 32F and 32G. In this configuration, the storage units $\mathbf{3220}_A$ can be stacked on top of one another effectively providing two rows of clamps 3200 to be stored and conveyed. Alternatively, the storage units $\mathbf{3220}_B$ are provided in a single row. As further shown, the storage units, in the direction of travel, are at a different inclination to ensure that mail pieces do not drop from the storage units or become jammed between the storage units, as discussed above.

FIG. 32J shows a side view of stacked storage units in accordance with the invention. FIG. 32K shows a top view of the storage units in accordance with the invention. It is contemplated that the storage units 3220 for letters can be stacked 12 wide by 12 high in accordance with the configuration discussed above; although other configurations are contemplated by the invention. For example, storage units 3220 for flats can be double the height of letters such that they may have a matrix of 6 high by 12 wide. As such, as shown in FIG. 32K, the present invention contemplates using different rows of storage units 3220 for flats and mail pieces, as these types of mail pieces may be segregated prior to being sequenced.

In any scenario, the storage units 3220 are preferably stacked side by side to form aisles 3226 there between (e.g., rack, aisle, rack configuration). This creates a more densely packed storage facility and also a maintenance aisle 3226 so that maintenance personnel can gain access to any of the storage units 3220. The aisles 3226 are configured in such dimensions to allow the storage units 3220 to be pulled out (e.g., the letters on the left would be pulled out toward the left, the flats on the right would be pulled out toward the right) into the maintenance aisle 3226 to resolve a jam or otherwise maintain the components of the storage units. For serious problems, the entire storage unit 3220 can be removed and replaced with an empty storage unit 3220. The faulted storage unit 3220 can be manually transported to a maintenance area for troubleshooting. As the system automatically resolves missing mail pieces (for the sequencing algorithm as discussed herein), after troubleshooting the mail pieces can easily be refed into the system, which creates a system which is modular and fault tolerant.

FIG. 32K also shows a diverter 3228 at the ends of the rack. This diverter 3228 takes mail from both offset tracks and combines them into one track or channel or other driving mechanism. This provides the benefit of nearly doubling the storage space, while only having one output for each double track to the external of the rack.

FIG. 32L shows a front view of the storage rack in accordance with aspects of the invention. As shown, the storage rack includes 12 levels of storage units 3220A for letters and six levels of storage units 3220B for flats. As noted above, though, other configurations are also contemplated by the invention. Also, as there are twice as many horizontal rows for storage units 3220A of letters than there are for storage units 3220B for flats, a movable ramp 3232 external to the diverter assembly diverts the letters to and from a transfer lane 3234. The ramp 3232 allows two letter rows to be serviced by one transfer lane 3234. As the storage units are stacked upwards of 12 feet, for example, the present invention also contemplates the use of a mezzanine level 3230 (floor) in order to ensure that there is safe access to all of the storage units. For example, in one implementation, the mezzanine level 3230 may be at the level of 6 feet. This allows the servicing of the unit without having to use ladders to access individual storage drawers.

FIG. 32M shows a shuttle in accordance with an aspect of the invention. For sorting within a small sorting and storage area, it is acceptable to route mail pieces in tracks and use lead screws. However, there may be relatively long distances between feeders (where mail pieces are loaded on clamps) and storage areas. In these scenarios, mail pieces are loaded on shuttles for transport, which is a movable track that is quickly transferred from one part of the system to another.

In embodiments, the shuttle is generally depicted at reference numeral 3236. The shuttle 3236 can be configured to hold and transport a plurality of clamps 3200 between subsystems. The shuttle 3236 can include a channel 3238 to hold each of the clamps 3200. The channel 3230 can mate with a driving mechanism, generally shown at reference 3240. The driving mechanism 3240 can be, for example, a monorail, a chain, or a cable to name a few types of driving mechanisms.

In one contemplated implementation, a track is attached to a chain (although more traditional methods like a track attached to a box that is routed on roller conveyor can be used). This allows long distance transport to occur much faster than the normal transport speed of track of about 10 inches per second. Mail pieces are loaded into the shuttle by the traditional mechanism and then the lead screw(s) (or other driving mechanisms) are moved away from the shuttle. Chain drives are commercially available and could be modified to facilitate this movement. Also, there are known commercial chain drives that transfer items from one chain drive to another to permit selectively routing shuttles from input to output. Shuttle capacity efficiency could also be extended by using the same dual track method of offsetting mail pieces in the shuttles.

FIG. 32N shows a container for transporting clamps in accordance with an aspect of the invention. Another advantage of the clamp is that it is relatively lightweight, especially if made from plastics or other lightweight material. This allows mail pieces that were loaded into the clamps and partially sorted at one mail processing facility to be automatically transferred into the sortation system of another facility through the use of a transfer container, generally shown at reference numeral 3250.

In embodiments, the container 3250 includes sidewalls 3252, a bottom wall or surface 3254 and a locking bar 3256. One or more of the sidewalls may be hinge mounted to allow mail pieces into and out of the container. The locking bar 3256 may be pivotally attached to the sidewalls for pivoting between a down, locked position, and an upward, open position. Alternatively, the locking bar 3256 may also be part of the lid, itself. In this case, when the lid is removed, the locking bar will disengage and when the lid is placed on the container, the locking bar 3256 will lock the contents therein, as discussed below.

The locking bar 3256 includes a wedge shaped downward projecting portion 3256A, which interacts with the clamps 3200 positioned within the container 3250. The container 3250 additionally includes offsetting channels "CH" or other holding mechanism designed to mate with the upward extending arms 3208 of the clamps 3200. In embodiments, the clamps 3200 will be loaded in an upside down position into the container 3250 in order to mate or otherwise slide within the channels CH.

An upward extending substantially centrally located locking tab 3258 is positioned along a center of the container 3250, between the channels CH. The locking tab 3258 is designed to interact with the upward extending arms 3206 of the clamps 3200. That is, in use, when the locking bar 3256 is lowered, the wedge shaped downward projecting portion 3256A will contact the backings 3202 of the clamps 3200, pushing the clamps 3200 towards the center of the container 3250. As the clamps 3200 are pushed towards the center of the container 3250, the upward extending arms 3208 of the clamps 3200 will frictionally engage with the locking tab 3258, effectively holding the clamps 3200 in a stationary position.

The container 3250 also includes openings 3260 which allow a portion of the upward extending arms 3206 of the clamps 3200 to extend outside of the container 3250. To load or unload the container 3250, the upward extending arms 3206 of the clamps 3200 will engage with a lead screw LS which will move the clamps 3200 into and out of the container, depending on whether the container is being loaded or emptied. The lead screw LS can be moved and replaced by a bracket "B" that locks each clamp 3200 in place for transportation. When the container is received the bracket B is removed and replaced by the lead screw. In embodiments, the bracket "B" can be hinge mounted to the bottom of the container.

By using the container 3250, the mail pieces can be forwarded to other facilities for sorting and/or sequencing without having to unload them from the clamps 3200. At the incoming facility the clamps 3200 can be removed and the contents automatically removed at the docking station. Since this can be an automated process it can occur with very little operator interface. It also saves in having to feed, read, and process mail pieces through pinch belts of mail feeders. The container 3250 could also be used by presort houses for receiving discounted rates from the postal service (since it eliminates processing center labor).

The following advantages are provided by this invention:

Long term storage of clamps to permit facility wide sorting;

Offsetting mail in dual tracks within storage and transportation containers to double storage space;

Using a backer board to the clamp to facilitate sorting non-uniform or dog eared mail;

Using a pin feature to the clamp to control clamp angle relative to direction of travel to facilitate diverting in multiple directions;

Using two lead screws (one that controls velocity, one that controls angle);

Storing letters two high versus flats one high in a storage area;

Storing mail pieces in removable storage units to allow for maintenance room and for easy removal for troubleshooting;

Sloping the tracks in storage units to allow for easy removal without jamming or dropping mail pieces;

Using a diverter at the end of dual offset mail piece rows to combine two outputs to one;

Using a movable ramp to combine two letter rows into one (at the same altitude as the flats storage);

Using mezzanines to storage areas to allow for easy and safe maintenance;

Sequencing in the transfer lane that leads from the beginning of output of storage to the input of storage;

Transporting mail piece in batches in clamps using a shuttle; and

Transporting mail pieces in clamps between facilities in a transport container (with a lock clamp feature).

Automatic Identification of Individually Containerized Mail Pieces

Overview

The invention is directed to automatically identify individually containerized mail pieces which are inserted into frames. The frame identification (frame ID) of each individual mail frame associates the contained mail piece with its physical and logical attributes such as size, destination, weight, etc. By automatically identifying each mail piece, a greater sorting efficiency and depth can be achieved based on one or more of those mail piece's attributes. The present invention also provides for automated tracking of mail pieces throughout any distribution technology process. A distribution system, with strategically placed frame ID readers, can track the progress of the mail pieces as they move through various phases of distribution. As in other embodiments, the components described herein such as, for example, the system manager, Architectures, etc, can be implemented in the computing infrastructure of FIG. 1A.

The invention includes a unique frame ID and an associated ID reader. In the preferred embodiment, a barcode acts as an identifier, and a barcode reader is the associated ID reader. The frame ID is attached to the mail frame, and as the frame moves past the reader, the reader picks up a signal from the frame ID to identify the frame. In the preferred embodiment, the frame ID is not only attached to the frame, but etched directly onto it. Alternatives to a barcode identification system include compact disk (CD) reading technology, radio frequency identification (RFID), smart cards or a magnetic stripe. For example, using a CD reading head as an ID reader and a linear strip of a CD track as the frame ID, unique containers can be identified by reading the data on the CD track. An RFID system can transmit signals between the ID tag and a reader through radio frequency signals, eliminating the need for them to be in line of sight of each other. Smart cards can store the unique frame ID on a chip which is activated by a contact or a wireless reader to retrieve the frame ID.

The system of the present invention is unique because it allows for the identification and tracking of individually containerized mail pieces, and it allows for a finer resolution of sort depth. Each identification technology has its own benefits. The technologies and specific embodiments for each technology are discussed below. A first identification technology is barcode technology, which is a proven and relatively simple technique that adds little cost, weight, or complexity to the mail container, e.g., frame. A second identification technology is CD reading technology, which has the potential of high data density, read/write capabilities, and error correction algorithms. A third identification technology is RFID technology which includes the flexibility of not requiring line of sight between the tag and reader. A fourth identification technology is smart card technology that allows for additional security and high data storage in the ID tags. A fifth identification technology is a magnetic stripe technology. These identification technologies are hereafter described in greater detail.

Automation of the sequencing process as described herein involves a system that preferably handles both flats and letters simultaneously. The resolution of sequenced mail is an individual mail piece, where the resolution for sorted mail is a batch of mail pieces. Therefore, sequenced mail calls for an individual mail piece container which is referred to herein as a "frame". Flats and letters vary greatly in physical dimensions, so the individual frame preferably includes uniform dimensions for easier automation; although, different dimensions of the frames are also contemplated for use with the present invention.

A mail sequencing system with millions of individual frames is difficult to manage unless the system includes automatic identification of each mail piece. The present invention, therefore, preferably includes a reader and tag system for identification. The tag includes a unique identifier for each frame. A networked computer system such as that shown in FIG. 1A tracks the frame and inserted mail piece or product or other object. The reader identifies the tag, decodes the information associated with the tag, and sends the decoded information to the computer system or system manager.

The unique identifier, or tag, in this case is a set of numbers or other indicia that will identify not only the frame, but potentially the postal facility, lot number, manufacturer number, batch number, etc. Tags can also include letters and symbols. Usually, these identifiers are attached to the product that is to be tracked. Direct part marking, however, allows the product to become the identifiers themselves particularly in the case of barcode technology. There are many different part marking methods, and the quality of some of these methods depend on the type of material used. For example, part marked barcodes can be laser etched on metal.

A reader is usually specific to the type of tag technology. For example, in the case of a barcode having a one-dimensional (1D) symbology, a 1D reader can usually only identify 1D barcodes. Readers for use in the automation of individual mail pieces inserted into frames are strategically placed before key diverting points or common travel points so that the control system is able to verify the mail piece it is about to divert or verify the receiving of a group of frames. With an automatic identification system, a mail processing machine can efficiently sort and sequence mixed mail with accuracy. A deeper resolution of sort is achieved by sequencing mail for a particular mail carrier's route, according to any of the mail piece attributes. For example, mail can be sequenced by delivery point and within each delivery point can be ordered by size or weight, as the size and weight of the mail pieces can be determined as discussed in the instant application using sensors, etc.

Frame Identification Architecture

The system is designed to sort, store, sequence and dispatch all letters and flats mail processed at a United States Postal Service (USPS) Processing and Distribution Center (P&DC) or warehouse or other sorting facility on a daily basis. This requires handling streams of mail at high throughputs on the order of twenty-two mail pieces per second. A throughput of twenty-two mail pieces per second equates to one mail piece passing a stationary point every 45.5 milliseconds. At least two aspects of the system design allow it to accomplish these high throughputs. These aspects include capturing each mail piece in a "frame", and handling the frames in a "stacked" or "compressed" configuration. Capturing each mail piece in a frame allows each mail piece to have a common "shape factor" and common handling accessories (such as hooks, pins, etc). Handling the frames in a compressed configuration places their smallest dimensions (their thickness and height) in the direction of travel. This allows a high throughput (frames per unit time) for a given line speed (distance per unit time).

A hardware component of the system of the present invention is the "Right Angle Divert" (RAD), which is explained in detail in other sections of the instant invention. The RAD allows individual mail pieces to be diverted out of a "main" mail stream and into a "diverted" mail stream, with both mail streams moving at a constant speed. It also allows two mail streams to be merged into a single mail stream (again, with all mail streams moving at a constant speed). The RAD requires that all frames passing through it be oriented at a 45° angle. Therefore all frames in the system of the present invention are preferably conveyed in a stacked configuration at a 45° angle.

The space limitations of a P&DC dictate that the frames must be at a pitch of about ⅛" (center to center) while in a storage unit. Therefore, the frames should only be an average of, e.g., ⅛" thick, although other dimensions are also contemplated by the present invention. While being transported or conveyed, the spacing of the frames may be increased (say for example, to ¼" center to center). However, the twenty-two frame per second throughput (one frame every 45.5 milliseconds) are contemplated by embodiments of the present invention. Therefore, any increase in frame spacing should be accompanied by increasing the conveyor speed (distance per unit time).

An objective of the system is to accurately sort and sequence the mail. This requires tracking the location and identity of each mail piece. Functionally, this is accomplished by matching each mail piece with the specific frame in which it is contained. Each frame will contain a unique identifier, such that each frame (and therefore mail piece) can be periodically identified and tracked by reading the frame identifier ("frame ID"). The system will make decisions about how to handle a mail piece (whether or not to divert it down a certain path, for example) based on the results of frame identification.

Referring now to FIG. 33A, a functional flow block diagram illustrates the operation of a frame ID reader system for frame identification which is controlled by a system manager. In step 3301, the frame reader inducts a frame to be identified into a frame reading sub-system. The frame reader then reads the frame ID in step 3302, which involves step 3303 of capturing the data on the frame, followed by step 3304 of decoding and step 3305 of processing the data. After the frame ID has been read, the reader will in step 3306 expel the frame from the sub-system and in step 3307 send an update to the system manager or frame monitor.

For the frame ID reader structure, various types of structures are capable of capturing and reading the frame ID data. FIG. 33B is a block diagram illustrating a frame ID reader system 3310 and five possible types of readable data, which include barcode data 3311, CD reader data 3312, magnetic stripe data 3313, smart card data 3314 and RFID data 3315. If the frame ID reader is to capture either barcode data 3311 or CD reader data 3312, then a camera/visual sub-system should be included in the frame ID reader system 3310. The readable data 3311, 3312, 3313, 3314 or 3315 is input to a physical assembly 3317 where the data is actually captured, such as that described with reference to FIG. 33A.

The general structure for the frame ID reader 3310 sub-system involves three main components: the transport system 3319, the tracking software 3318, and the physical reader assembly 3317. The transport system 3319 is responsible for inducting and expelling the frame into and out of the frame reader. The manipulation of the data obtained from the frames and communication with the system manager is handled by the tracking software 3318. The tracking software 3318 is responsible for decoding the data, processing the data, and sending/updating information. The physical assembly 3317 allows the sub-system to capture the data.

Referring now to FIGS. 33C to 33F, generalized block diagrams are provided for each type of reading system. Each type of reader has its own set of functions and sub-structures to accomplish the frame ID reader function of "capture data".

FIG. 33C illustrates the barcode reader 3320 in accordance with aspects of the invention. The barcode reader embodiment includes a reader 3321 which detects data on a barcode 3322. The barcode 3322 stores data within its alternating light and dark areas.

FIG. 33D illustrates the CD reader 3323 in accordance with aspects of the invention. The CD reader includes a read/write laser 3324 which emits laser illumination. The laser illumination impinges on a CD strip 3325 that stores data, and the CD strip reflects the laser illumination. A detector 3326 detects the reflected illumination or light signal.

FIG. 33E illustrates the RFID reader 3330 in accordance with aspects of the invention. The RFID reader 3332 reads an RFID tag or transponder 3331. The reader 3332 broadcasts a signal to the RFID device and causes the RFID device to reflect/transmit a signal including the ID information. The RFID reader 3332 detects the reflected/transmitted signal from the RFID transponder 3331.

FIG. 33F illustrates the smart card reader 3333 in accordance with aspects of the invention. The smart card includes an integrated circuit/microprocessor 3334 that is configured to reflect/transmit a signal and store data. A smart card reader 3335 activates the smart card and extracts data from the smart card.

FIG. 33G illustrates the magnetic stripe reader 3336 embodiment. A magnetic stripe 3337 stores data. A reader 3338 extracts data from the magnetic stripe 3337. A magnetizer 3339 writes data to the magnetic stripe 3337.

The three most preferable embodiments include the barcode, CD and RFID readers, with a barcode reader currently being preferred. The technology candidates for the frame ID reader are listed in a section below.

Barcode Technology

A barcode is a machine-readable code used for storing data and information. The information is coded into a barcode symbol using a pattern of light and dark shapes. These areas of light and dark result in a pattern of high and low reflectance. When inspected by a barcode reader, the pattern can be interpreted as a binary sequence of 1's and 0's based on the sequence of the light and dark shapes.

The most common form of barcode symbol includes a black ink printed on a white background. Other forms of barcode symbols include laser-etched, chemical-etched, dot-peen, and thermal transfer barcode symbols. They can be applied on a variety of materials, including metal, plastic, rubber, and glass. There are a variety of considerations when choosing the proper form of barcode to use for a particular application. These considerations include cost, size, the type of material to be marked, and required permanence of the symbol. Barcode systems are widely used in a broad spectrum of industries today. Major benefits include high-speed, high-accuracy data entry to allow efficient identification and tracking, while being extremely low cost.

Barcodes may be classified as 1-Dimensional (1D), stacked, or 2-Dimensional (2D). 1D barcodes includes a pattern of parallel lines, and information is contained in the sequence and width of the lines. For example, extending the symbol in the dimension parallel to the lines does not allow for any more data to be stored in the symbol. However it does make the symbol easier to read by allowing a reader to obtain multiple scans of the symbol, and by compensating for symbol defects and less-than-perfect reader placement. 1D barcodes may be read with both laser-scanner and CCD barcode readers.

A stacked barcode is a 2D modification of the concept of the 1D barcode, with the goal of allowing more data storage. Functionally it is the same as several 1D barcodes stacked on each other in the direction parallel to their lines. Similar to 1D code, stacked barcodes may be read with both laser-scanner and CCD barcode readers.

2D barcodes store information in the pattern of light and dark symbols (usually circles or squares) in 2 dimensions. This allows for much greater data storage in a smaller symbol. It also allows for extensive error correction and the use of code words to verify proper symbol reads.

As shown in FIG. 33H, a barcode 3341 can be fixed on an individual mail frame F either by direct part marking such as laser etching or by labeling. Each frame F contains a mail piece "M". Each barcode 3341 contains a set of characters that uniquely identifies the frame F. The barcode 3341 is positioned in the same place on each frame F so that a reader 3343 can automatically identify each one as it passes by.

A fixed mount barcode reader 3343 will attempt to read the encoded information in the barcode 3341 on each moving mail frame F that passes the barcode reader. Each read of a barcode 3341 can then indicate to a mail processing system that the location of a certain mail piece "M" has been verified and following the appropriate path.

Barcode readers may be broken into two major categories: laser-scanners and CCD (charge-coupled device) readers. Additionally, CCD readers may be divided into linear CCD readers and video-camera CCD readers.

Laser-scanners use a moving mirror or prism to scan in some defined pattern. As the laser beam passes over the barcode, a portion of the laser beam is reflected back to the reader. A photodiode, tuned to capture only that frequency of light, generates a voltage proportional to the amount of light reflected by the symbol.

Linear CCD readers include a largely one-dimensional array of photodiodes. Each photodiode captures light from whatever object is directly in front of the reader, and generates a proportional voltage. Therefore, across an array of photodiodes, a pattern of high and low voltages is generated, which matches the light and dark barcode pattern placed in front of the array.

Video-camera CCD readers include a two-dimensional array of photodiodes. The array captures an image of the barcode in the same manner as a digital camera captures a picture.

The preferred barcode embodiment envisioned for frame reading includes either a relatively thin 1D or 2D barcode symbol 3341 placed on each frame F in the sorting and/or sequencing system. This positioning of barcodes symbols 3341 is such that a line of sight is available to the barcode symbols when the frames F are configured in a 45° stack. Stationary barcode readers 3343 are mounted in strategic positions along the conveyance path. In this manner, as the frames F move past the barcode reader 3343, the barcode reader can read each barcode 3341 (and associated frame ID).

The system of the present invention includes a throughput of about 22 frames/second. Therefore, frame ID or barcode 3341 should be read at this rate.

Some of the primary benefits of using a barcode 3341 to track frames F include a relatively low cost, and a proven, relatively simple technology. Furthermore, it adds little weight or complexity to the frame F, and requires no mechanical or magnetic interaction between the frame F and the reader 3343.

Compact Disk Technology

Referring now to FIGS. 33I(i)-(iii), illustrations are provided of compact disk (CD) technology and a mail frame that can be identified by CD technology. CD is a technology based on translating the reflective differences of a disk into a digital signal. The acronym CD refers to a CD on which data is pressed at the time of manufacture. CD-R refers to a CD on which a user can write data once and then read many times. CD-RW refers to a CD with no information initially, but which can be written and read many times.

FIG. 33I(iii) illustrates a CD 3345 having a plastic layer 3346, an aluminum layer 3347, an acrylic layer 3348 and a label 3349. The reflective and non-reflective surfaces of the aluminum layer 3347 correlate very well into 1's and 0's, enabling the CD's to store data.

Referring to FIG. 33I(ii), two of the main components of a CD reader include a laser diode 3351 to emit the reading laser and an optical sensor 3352 which is preferably a photocell. The CD reader also includes a motor to drive the disk. The CD 3345 includes bumps or opacities to reflect the laser from the laser diode 3351. The laser diode 3351 emits a laser that will reflect off of the aluminum layer 3347 of the CD 3345. Lasers with higher powers can be used to change the phases of compounds on a rewritable disk which is known as CD-RW.

FIG. 33I(i) includes illustrations of a CD 3345, a modified linear CD track 3353 and frames which include the modified linear CD track 3353 for identifying the frames. In order to implement a linear CD track, the normally spiral track of a CD 3345 is modified into the linear track 3353 which is affixed to the frames F. The linear CD track 3353 includes a linear path of micron sized bumps for storing data. When the laser light from the laser diode 3351 passes over a flat on the path, the light reflects back into the optical sensor 3352, registering a "1". When the laser passes over a bump, the light is reflected elsewhere, registering as a "0". Not all disks have bumps, however. CD-R and CD-RW have additional layers of dye or phase changing compound that are either transparent or opaque. When a layer is transparent, the laser light passes through and reflects off the aluminum layer 3347 like on a flat. When a layer is opaque, the laser will not be able to reflect onto the optical sensor 3352. This layered technology, therefore performs the same function as the bumps, but allows for rewriting with an appropriately powered laser.

A CD reading system operates similarly to a barcode system. While a barcode reader picks up the differences between the bars and spaces on a barcode, a CD reader picks up the light reflected off the lands and bumps on a CD. The operation of the CD 3345 involves reflecting light off the aluminum layer 3347 of the disk onto the photocell 3352. The bumps reflect light differently than the lands, which encodes the information that the photocell 3352 picks up.

CDs hold their data on a single track of information, which is spiraled outwards from the center. As shown in FIG. 33I(i), individual mail frames F of the present invention are identified by moving the linear CD track 3353 past the reader 3353, instead of rotating a conventional spiral past a read head. As information capacity needed to identify an individual frame F is relatively small, a small strip of CD track is sufficient in accordance with the present invention. The frame IDs 3353 are attached to the frame F with the readable side facing outward towards the reader 3355. As frames F pass by the reader 3355, the reader will pick up the optical reflections and identify them. Typically, the motor in a conventional CD reader changes speed as the laser reads different parts of the CD to keep a constant linear speed. With the embodiment of FIG. 33I(i), the linear speed is kept constant by the constant speed at which the frames F move past the reader 3355.

The automatic identification of frames F throughout the system preferably involves attaching a strip of rewritable CD material 3353 onto the top or side of the frames F and placing CD reader/writer assemblies 3355 at strategic decision points. Instead of a spiral track of a conventional CD, the track is straightened into a line so that frames F can be read as they move. Information including a unique identification number can be written and rewritten onto the linear CD material 3353 as a frame F passes under or by a laser assembly of the reader 3355. The benefits of the CD technology include high information density, low cost for both readers 3355 and linear CD material 3353, and read/write capability.

RFID Technology

Radio frequency identification (RFID) represents a set of technologies that utilize radio waves for automatic identification. An RFID system is based on wirelessly accessing data devices which are commonly referred to as transponders or tags, and these terms are used interchangeably herein. Tags usually include antennas for receiving and transmitting a signal, and an integrated circuit for storing data and processing RF signals. Readers receive the data on the tags and send the data to tracking software for decoding. The tracking software correlates the data with the physical hardware to determine the location of the tag. Components of an RFID system include tags that hold unique information, readers to collect this information, and software to associate or integrate this information with physical hardware.

There are three types of tags: passive, active, and semi-passive. Passive tags do not have an internal power supply, and generate power from induced currents that RF signals in its vicinity produce. Active tags have an attached power supply to power the integrated circuit and broadcast a signal to the RF reader. Because of this additional power, active tags are able to transmit stronger signals which can make them effective even in environments unfriendly to RF signals. Semi-passive tags also have a power source, which is used to power the integrated circuit, but which is not used to broadcast signals. Semi-passive tags rely on induced current to broadcast signals in the same manner as passive tags.

The type of storage for RFID tags includes three different types: read only, write once read many (WORM), and read/write. A read only tag has its identification embedded as part of its manufacture, and it cannot be changed. WORM tags can be programmed with more information than simply an ID number, but the programmed information cannot change. Finally, read/write tags can have information overwritten numerous times.

RFID readers collect information from the tags. Some readers power an antenna to generate an RF field which passive or semi-passive tags utilize as a power source. The current induced by the RF field activates these tags causing them to transmit the information stored onboard their chips. If the tag is an active type of tag, onboard power is used to transmit this information. The readers send the tag information to a software system to be decoded and processed such as those used with reference to FIG. 1A.

In order to use the information that the readers obtain from the tags, a software system must correlate the signals from the readers with physical hardware. The tracking software provides real-time interaction with the tagged materials, such as sending a box to be shipped down the appropriate conveyor.

An RFID system is an alternative to a barcode system, and unlike a barcode system, an RFID system does not require line of sight. RFID technology relies on the transmission of radio waves to detect whether a product is nearby. As illustrated in the embodiment of FIG. 33J, passive tags 3361 are placed on the frames F for containing mail pieces "M", and the frames are identified by a reader 3363 as the frames pass by the reader.

The range of an RFID tag varies according to its type. Very Short Range Passive RFID can communicate a distance up to around 60 centimeters. Short Range RFID communicates a distance up to around 3.5 meters. This increased checkpoint distance accommodates a greater variety of scenarios such as identifying assets that are moved by forklifts through a warehouse or crates that are transported from one slot to another. Active Beacon Long Range RFID communicates a distance of around 50 to 100 meters. Two-Way Active RFID tags have long range communication at a distance of around 50 to 100 meters. Real-Time Location Systems (RTLS) have long range communication of around 50 to 100 meters. RTLS has the ability to locate tags to within 10 feet but resolution decreases in crowded environments, and it is difficult to translate the data information to a logical location such as the specific parking slot a trailer might be located.

The automatic identification of frames F using RFID tags in the system preferably involves placing passive tags 3361 on each frame, and placing readers 3363 at strategic decision points. As a frame F passes through one of these checkpoints, tracking software processes the signal that the RF reader 3363 receives from the RFID tag 3361 and verifies that a frame is at its appropriate position in the system. The benefits of RFID include no required line of sight, read/write capability, tag resilience to environment, relatively long read range, multiple tag identification and increased data storage.

Smart Cards Technology

Smart cards provide another alternative embodiment to a barcode system, and a smart card embodiment is illustrated in FIGS. 33K(i) and 33K(ii). In the embodiment of FIG. 33K(i), smart cards 3365 are placed on frames F for containing mail pieces "M", and the frames are identified by a reader 3368 as the frames pass by the reader. Smart cards are of the contact and contactless type, and typically have more capabilities than magnetic stripe cards or memory cards.

As illustrated in FIG. 33K(ii), a typical smart card 3370 is capable of storing relatively large amounts of data on an embedded integrated circuit 3371 that is in the form of a secure microcontroller. The embedded integrated circuit 3371 allows smart cards to have encryption and authentication for keeping personal identification secure. Smart cards transmit their data to card readers either through a physical connection such as a contact 3372 on the typical smart card or wirelessly through a radio frequency interface. Smart cards are categorized by various communication types, such as direct contact, contactless, dual-interface, and hybrid designs. Contact cards are the size of a conventional credit or debit card with a single embedded integrated circuit chip that contains just memory or memory plus a microprocessor.

Referring now to FIG. 33L, an exploded view depicts a larger view of the contact smart card 3370. The contact smart card 3370 includes a card body 3373, the contact plate 3372 and the integrated circuit or chip 3371. The smart card 3370 transmits its information through the contact plate 3372 which is located over the integrated circuit chip 3371. The reader 3368 must make a physical connection to this conductive plate to retrieve information. Since a contactless smart card would function similarly to an RFID embodiment, a contact smart card embodiment may be more preferable than contactless smart card embodiment. In FIG. 33K(i), a group of frames F with contact smart cards 3365 are illustrated as passing by the reader 3368, and the smart cards 3365 make physical contact with the reader 3386, thereby transferring information between the chip and the reader.

Referring now to FIG. 33M, an exploded view depicts a contactless card smart 3374. The contactless smart card 3374 includes a front card body 3375, a rear card body 3376, an antenna 3377 and an integrated circuit or chip 3378. A contactless smart card uses radio frequencies to send information. Instead of a physical contact plate, the contactless smart card 3374 and its readers have an antenna to communicate with each other. The contactless smart card 3374 usually includes an embedded antenna 3377 instead of contact pads attached to the chip 3378 for reading and writing information contained in the memory of the chip. Like the passive RFID tags, some contactless smart cards use the RF field to generate power for the chip 3378.

Referring now to FIG. 33N, an exploded view depicts a dual interface or "combi" smart card 3380. A dual interface smart card 3380 has one chip 3381 with both a contact plate 3382 and a contactless communication interface including an embedded antenna 3383. The dual interface smart card 3380 also includes a front body 3384 and a rear body 3385.

Referring now to FIG. 33O, an exploded view depicts a hybrid smart card 3386. A hybrid smart card has two chips 3387, 3388, and one chip typically includes a contact interface, and the other includes a contactless interface having embedded antenna 3389. Accordingly, hybrid cards may include two or more embedded chip technologies such as a "prox chip" with its antenna and a contact smart chip with its contact pads.

Referring now to FIG. 33P, an exploded view depicts a proximity card or "prox card" 3390. A prox card 3390 has one chip 3391 with a contactless communication interface including an embedded antenna 3392. The prox card 3390 also includes a front body 3393 and a rear body 3394. A prox card 3390 communicates through its antenna 3392 similar to contactless smart cards except that they are read-only.

For each smart card connection type, there are also different types of integrated circuit chips. A microcontroller smart card can perform operations on the information stored in its memory. The microcontroller can not only hold larger amounts of data, but can perform functions on the data such as encryption, or authentication. A memory chip is capable of reading and writing data into memory, but has less security than a microcontroller. Usually, these chips rely on the security of the reader.

The solution envisioned for the automatic identification of frames throughout the system involves placing a contact or contactless memory chip on the frame where the structure of the frame would replace the card backing. Readers would be placed strategically at critical decision points and extract the information on the chips in order to verify the location of the frames. The benefits of smart card technology include security of information, the ability to do on-board operations such as encryption, large amounts of data and multiple interface methods.

There are emerging card technologies which are referred to as electronic cards or simply "e-cards." These cards contain from one to three different types of embedded chip technologies: contact smart chip, contactless smart chip and proximity chip. E-cards that contain two or more chip technologies are referred to as hybrid cards or "combi" cards, as described above, all of these different types of cards are contemplated for use with the present invention.

Magnetic Stripe Technology

Magnetic stripe is a well established technology commonly used in applications such as credit cards and automatic badge readers. The stripe includes fine magnetic particles in a thin bed of resin. In one method, the magnetic stripe is encased in a plastic film, and then affixed to a more rigid, often plastic card or surface. In a somewhat less expensive, less resilient method, magnetic slurry is applied directly to a (cardboard or plastic) card. The magnetic stripe may then be encoded with binary information, and is read by passing over a magnetic card reader, which reads and decodes the magnetic pattern encoded on the stripe.

Most common magnetic stripe applications conform to industry standards (ISO/IEC 7811) and use 2 or 3 lines or "tracks" of information. These standards dictate that track 1 and 3 contain a bit density of 210 bits per inch, and track 2 contains a lower density of 75 bits/inch. However some applications require and utilize higher information densities. Information on the stripe is commonly encoded as 5-bit numeric characters or 7-bit alpha-numeric characters.

Magnetic stripes are often categorized based on their coercivity. Coercivity is a measure of how hard it is to erase or change the information stored on the magnet stripe. High coercivity stripes are used in applications where the data is not often changed and maintaining readability and data integrity is important. Low coercivity stripes are used in applications where the data stored is often intentionally erased or rewritten.

The magnetic stripes are typically thin and made of soft materials, and therefore susceptible to wear and damage. Only limited protection of the stripe can be achieved by applying protective coatings, since extensive coatings interfere with reading the magnetic pattern. A magnet stripe passes over a card reader at a close proximity in a linear direction. This allows the reader to discriminate the magnetic signal of individual bits of the stripe.

To be read, a magnetic stripe must pass in a linear direction, in close proximity to a magnetic reader. This is hard to accomplish for frames moving in a 45° stack of at a small pitch. The following is one possible configuration for using a magnetic stripe for frame reading and identification. A magnetic stripe can be affixed horizontally along the top of the frame on the leading side (with regard to the 45° orientation). While moving at constant speed in the conveying direction, each frame can be partially "pulled out" of the stack at 45° in the direction of the leading edge. A magnetic reader can be positioned a long this 45° "pull out" path such that the magnetic stripe passes by the reader. The frame can be then slid back into its position within the stack. In order to read the magnetic stripe on each frame, the speed of the "pulling out" movement must be much faster than the speed of frame travel down the conveyance path.

The advantages of magnetic stripes for frame ID are is that it is a well developed, widely used technology. Both the magnetic stripes and the magnetic readers are also relatively inexpensive.

Barcode System Criteria

Automatic identification of frames in the system involves assigning unique numbers to frames. These numbers should not be reused when frames are removed from circulation, so the number of digits in the unique IDs should be able to accommodate all the frames that will ever be used internationally on all the systems of the present invention.

Number of Digits

Choosing the right number of digits for the ID may determine other aspects of the barcode system. For example, if many digits are needed for global coverage of the system of the invention, a 2D symbology may be desirable to fit the necessary data density of the barcode on the limited frame thickness. Another aspect that may be affected is the barcode reader selection. Readers have limits as to how many digits they can decode. If more digits are chosen than the selected reader can handle, the system will not be able to identify the frame. Therefore, proper selection of number of digits ensures that the frame ID barcode system can support enough frames for international coverage throughout the lifetime of the system of the present invention.

The calculation of the number of digits is based on the assumption that there could be up to approximately five million frames per system at any one time. If there are approximately 300 P&DC facilities in the U.S. there can be about 1.5 billion active frames in the country. Although each frame will be designed to last the lifetime of the system, multiplying 1.5 billion by a safety factor of 100 allows every facility to replace each frame ninety-nine times during the lifetime of the facilities' system. The result is 150 billion numbers, or twelve digits for national coverage. If the system of the invention system expands to ten nations, assuming they process equivalent volumes of mail, the result is 1.5 trillion unique numbers, or 13 digits for international coverage.

The number of digits necessary for worldwide coverage is at least thirteen digits. Barcodes having at least sixteen digits should be sufficient to provide unique frame IDs for future expansion of the system of the present invention within the United States or other countries. It may also be desirable to reserve a few digits at the front of the barcode for uniquely identifying a country's system or facility. A barcode of up to twenty-four digits should be adequate for accommodating such a country/facility identifier. Examples of a unique country/facility identifier include: 001=USA, 002=Canada, with numbers afterward to identify facilities.

After exploring the capabilities of potential linear barcode readers, it appears that both 16 and 24 digit barcodes can be relatively easily read. As such sixteen digit barcodes with the potential for expansion of up to twenty-four digits, should there be a need to uniquely identify countries or facilities, are suitable for use with the present invention.

Twenty-four digits were chosen mostly as a baseline, conservative number to begin narrowing down potential barcode reader candidates. Since all reader candidates could read approximately 32-40 digits, the issue of reader capability should no longer exist. The number of digits chosen should accommodate all the frames in the system of the present invention, while keeping in mind that more digits will require more physical space on frames.

Code Size/Dimension Limitations

Frames are designed to travel at 45 degree slants to maximize density and allow in-motion diverting. As such, the placement of Frame ID barcodes to the top, bottom, and side edges of frames are preferred with other locations also contemplated by the present invention. Assuming the number of digits required for the frame identification is twenty-four, a 1D barcode should fit in the allowable frame space. If a twenty-four digit, 1D code is too large to fit on the frame, then 2D codes will have to be used for frame identification.

Knowing the dimensional limitations of a frame plays a role in deciding if 1D or 2D barcodes will be the most feasible option for identification; whereas the number of mail pieces and facilities determine the number of digits each code has on a frame. However, the frame dimensions determine the physical code size allowed. If an acceptable 1D barcode can fit on the sides of the frames, then 1D barcode reader is preferred over a 2D reader, because 1D readers are less expensive, simpler to setup, etc.

Exemplary frames can be about ⅛" thick and approximately 14.5" by 21" in width and height. If the barcodes are oriented in ladder fashion, then the width of the code no longer becomes an issue, and only the bar heights remain a consideration. Linear CCD barcode readers can read code heights as short as about 0.3 cm, and ⅛"=0.3175 cm. Therefore, ⅛" is still in the readable range, and the thickness of the part of the frames that have codes on them should not be any smaller than about 0.3 cm. This was verified when testing sample barcodes with candidate readers. There is enough space on the side of the frame to handle many more digits than barcode readers can read. Also, code size will not be an issue for a 1D reader when the thickness of frames is greater than or equal to about 0.3 cm.

Physical code size limitations for linear barcodes should not be in an issue. The width of a code is not limited by the physical dimensions of the frame, only by the reader. However, the height of a code should preferably be at least 0.3 cm, or about ⅛"; although other dimensions are contemplated by the invention. Also, it should be understood that if the frame thickness is reduced down, there will be less machining required for frame manufacturing, but there still needs to be 0.3 cm for the barcode height. This can be allowed, if there is an accommodation at a frame edge to flare out or chamfer to 0.3 cm (0.118 in.) for barcode placement. Additionally, the 0.3 cm barcode height was determined from an average of linear CCD barcode reader specification limits, as well as, testing with a reader candidate. Unless the tradeoff of manufacturing ease with thinner frames outweighs using 2D readers, it is preferable to maintain a ⅛" frame edge for Frame IDs.

1D or 2D Type of Readers

Choosing a 1D or 2D reader type is a decision point for reader selection. This choice influences reader selection, along with the symbology used, and how small the codes can be. This decision also influences the cost of the reader, and may determine whether the barcodes are printed onto labels or part marked because 1D readers tend to require higher contrast and light reflection. As such, both types of readers should be considered for use with the present invention. Most 2D readers can read 1D codes as well, but the majority of 1D readers can only read 1D codes. Therefore, if a 2D reader is chosen, almost any kind of code can be read, especially if there is a need to read low contrast part marks. However, if a 1D reader is chosen, then the reader capabilities may be limited.

Since 1D readers provide most of the functionality needed with the exception of low contrast part marks, a 1D reader is the preferred choice in accordance with aspects of the invention. The system of the present invention does not require the added flexibility provided by laser readers, so a CCD type reader is a suitable type of 1D reader for selection. However, if reading low contrast codes becomes a necessary task, then the readers should also include a few entry level 2D smart cameras.

Symbology

Two effectiveness measures for symbology selection include a high data density symbology and a widely used symbology. It is preferable for the code to be both dense, and also capable of being easily read by many different readers.

The barcode does not have to hold any special kind of information and acts only as an identifier throughout the system of the present invention. As a result, the code could be composed of only numbers and function similar to a license plate tag. For 1D barcodes, CODE 128-C has the highest density for barcodes made up of numbers only. Normally, a character is made up of a set of bars and spaces. In other 1D symbologies, for example, the number "10" would have a set of bars and spaces for "1" and another set for "0". In CODE 128-C, whenever there are double digit numbers, only one set of bars and spaces are necessary to represent both digits. CODE 128 also has more stringent standards for bar widths, making it stronger against random patterns of bars and spaces. These standard bar widths make the symbology less forgiving in regards to low quality bars, but depending on the printing or marking technology used, detecting these differences should not be a problem. Also, after comparing some common 1D symbology such as CODE 39, CODE 93, ITF, CODABAR, and CODE 128, CODE 128-C was chosen for its density, encoding strength, and commonality.

Candidate symbologies were printed on both a label printer and a standard laser jet printer in varying narrow bar widths. The codes were examined to determine which narrow bar widths had artifacts on the laser jet but not the label printer since the latter can produce higher quality prints. Although codes with narrow widths of around 9.8 mils were printed well on laser jet, the next highest setting of about 14.8 mils on the barcode generating software may be more preferably as it includes more margin for error. In terms of narrow bar width, about 14.8 mils was selected because of its generous size for reliable reading against low quality codes.

Mounting Position

Reader position is another factor in the barcode system that needs some consideration. The catalyst for investigating this came from tests. The goal is to have a convenient place for mounting readers that will not interfere with the operation of the components.

The position of the reader will affect maintenance access and maintenance time. The reader should not get in the way of folder/frame maintenance, and be easily accessed for its own maintenance. It is less of a performance issue for the barcode system, and more of a maintenance/housekeeping issue. Mounting is also affected by the frame design and any other components along the four screws that may affect the operation or maintenance of the readers.

Discovering a suitable mount position was done during reader tests on a breadboard RAD. Referring now to FIG. 33Q, there are four basic positions relative to the frame 3395 that the readers 3300*a*, 3300*b* and 3300*c* can be located in embodiments of the invention. The readers 3300*a*, 3300*b* and 3300*c* are illustrated as square boxes having trapezoidal fields of view. These locations include the top, sides, or bottom. Although placing the reader 3300*a*/3300*c* on top/bottom of the frame 3395 may interfere with the RAD/transport mechanization and motors, the present invention contemplates such location placement if carefully and properly positioned as to not interfere with such mechanisms. Also, since leads screws (e.g., transport mechanisms) are on the top and bottom of the system of the present invention, the reader 3300*b* can fit well on the side of the system, remote from the lead screws. The readers 3300*a*, 3300*b* and 3300*c* need to be only an inch or so away from the reader, so it does not take up much space. Frame maintenance also happens on the side so care must be taken to not impede the maintenance sections. It is possible to place the readers on the "guide" side near guide 3396 so that the maintenance occurs on the other side of the screws.

Mounting the readers on the "guide" side of the screws appears to be the most preferable. Since the guide allows for maintenance on the other side of the screws, the reader will not interfere with frame/folder maintenance. Possible barcode readers from various manufacturers contemplated for use with the present invention include, for example, Opticon NFT 7375B; Densei USA (NEC) BCR 5342H; Wenglor FIS-0003-0136; Cognex DataMan 100Q; Microscan Quadrus Mini Velocity; Microscan MS-3 Laser; and Keyence BL-180.

Part Marking Vs. Labels

As to the medium for the barcode labels, it should be understood that choosing the medium for the barcode labels affects the life of the ID on the frame. The goal is to have the ID last as long as the lifetime of the frame. Therefore, the barcode medium should be resistant to environmental wear, yet inexpensive and easy to make in mass quantities. The barcode medium may also affect the frequency of folder repair, reader selection, and folder material. The approach for discovering what medium works best has been a combination of testing and finding examples of labelling/marking techniques. Labels and laser etch on metal techniques have been tested because they were recommended as reliable methods with respect to the application of the invention.

Various types of other labelling and part marking may be incorporated into embodiments of the present invention. A number of different barcode system marking methods and recommendations are provided in a white paper published by Microscan on its website www.microscan.com. The white paper which is entitled, "Review and Selection of Direct Part Marking Methods" identifies various marking methods and describes the advantages and disadvantages of each marking method. The marking methods include, ink jet on substrate, pre-printed packaging, thermal transfer label stock, laser etch on silk screen, ink jet on plastic, thermal print on foil packaging, ink jet on glass, laser etch on metal, laser etch on glass epoxy, laser etch on rubber, chemical etch on metal, chemical etch on silicon, dot peen on smooth highly reflective metal, and dot peen on textured metal. Different marking methods may be used in designing different embodiments of the present invention; although the present invention should not be limited to such marking methods and recommendations found in the referenced white paper.

Buffering Mail Pieces to Prevent Input Overflow in a Facility-Wide Letters/Flats Mail Sequencing System The invention is directed to a system and method for buffering frames containing mail pieces in a facility-wide letters/flats mail sorting and/or sequencing system. The invention also is directed to a system and method for buffering mail pieces contained in or supported in individual mail containers, e.g., "frames", in a facility-wide letters/flats mail sorting and/or sequencing system utilizing a presort accumulator. The invention also provides a method of buffering frames in a facility-wide letters/flats mail sorting and/or sequencing system while the mail pieces are being presorted and batch loaded onto transport shuttles.

Presorting and batch loading mail pieces into transport shuttles requires buffering mail pieces to prevent induction bottlenecks and maintain induction throughput. The current state of mail sorting and/or sequencing machines do not require buffering because they send mail pieces to pre-allocated output bins, which are re-fed into the machine multiple times to achieve sequencing.

According to one non-limiting aspect of the invention, a presort accumulator can be utilized which has "n" presort tubes into which containerized mail pieces, i.e., letters and/or flats in frames, are placed. Each accumulator tube can be segmented into a collector segment and a buffer segment. When frames fill the collector segment, they are loaded onto transport shuttles while subsequent frames begin filling the buffer segment. Once the collector segment is emptied of frames, the frames in the buffer segment are advanced to the collector segment and the process repeats itself. This solution can far exceed the state of mail processing equipment in use today because it provides a systematic and automatic pipeline within a facility-wide letters/flats mail sorting and/or sequencing system to ensure that mail induction bottlenecks are avoided. Furthermore, the present invention reduces the number of mail handling operations and associated labor required.

In a facility-wide letters/flats mail sorting and/or sequencing system, the function of "presort accumulation" enables frames containing mail to be buffered as they await the first step of sequencing known as "presorting". Presorting the mail flow results in a division of the mail flow into multiple streams of equal or nearly equal volume based on predetermined criteria. The primary criterion for presorting mail is mail piece destination. Buffering the mail flow during presort accumulation prevents mail piece overflow during heavy induction periods.

The function of presort accumulation is preferably performed in a presort accumulator. A presort accumulator includes multiple accumulator tubes into which the mail flow, i.e., frames containing mail, is divided or presorted. The presort accumulator utilizes a multiplexer that feeds an array of accumulator tubes. All frames containing mail are received through a single input feed and can be directed to the correct accumulator tube via, e.g., a right-angle divert.

FIG. 34A shows a presort accumulator system architecture 3400 in accordance with one aspect of the invention. The system 3400 includes a number of sub-systems such as a frame reader 3401 which receives frames generally described at reference F (see FIG. 34C) that each have a mail piece from one or more mail induction units 3411. As will be described in detail below and with reference to FIG. 34C, these induction units can have the form of, e.g., a first letters induction unit 3460A, a second letters induction unit 3460B, and a flats induction unit 3460C.

Again with reference to FIG. 34A, the frame reader 3401 reads a frame identification (ID) and communicates with a control function sub-system 3406 which includes a multiplex controller 3407, an accumulator controller 3408, and an accumulator selector 3409. The control function sub-system 3406 and its components may be implemented on the computing infrastructure shown in FIG. 1A of the instant application. The accumulator selector 3409 interfaces with an accumulator allocation plan 3410. A system of accumulator tubes 3402 receives the read frames from the frame reader 3401 and places the frames into a buffer segment of one or more of the accumulator tubes 3402. In embodiments, this transfer can be via a right-angle divert as discussed in more detail in the instant application.

Each accumulator tube 3402 has an arrangement for moving the frames within the tubes such as, e.g., a lead screw system in which screws engage each of the corners of the frame so as to cause its movement. The details of exemplary moving systems are described in greater detail in other sections of the instant application. The frames then move from the buffer segment 3403 to the collector segment 3404 in each tube 3402, and are then loaded onto shuttles by shuttle loaders 3405. The accumulator controller 3408 controls movement of the frames in the accumulator tubes 3402 to ensure that there are no bottlenecks, etc. by the use of, for example, encoders or sensors such as, e.g., photodiodes or other types of sensors discussed throughout the instant application. Furthermore, the control function system 3406 communicates with the induction units 3411 in order to coordinate the presorting of the frames leaving the induction units 3411.

The operation of the system 3400 shown in FIG. 34A will now be described with reference to FIG. 34B. In step 3420, predetermined criteria for dividing the mail flow, i.e., frames containing mail, are specified in an accumulator allocation plan 3410. This data determines the allocation of mail piece destinations to each accumulator tube 3402. One or more destinations can be allocated to a single accumulator tube 3402.

In step 3430, as each frame is received, the frame reader 3401 reads the frame ID and communicates the frame ID to the multiplex controller 3407. The multiplex controller 3407 manages the process of directing frames to the correct accumulator tube 3402.

In step 3440, a decision is made by the accumulator selector 3409 as to which accumulator tube 3402 to place the frame in. The accumulator selector 3409 searches for the address of the mail piece using the frame ID in the accumulator allocation plan 3410. The accumulator allocation plan 3410 may not contain every specific and unique address, but can instead include segments or ranges of addresses. The address can therefore be located based on making the best (i.e., most detailed) match possible. Once a match is found, an allocated accumulator tube identifier can be retrieved from the accumulator allocation plan 3410.

In step 3450, the accumulator controller 3408 is utilized to control the movement of frames into and out of each accumulator tube 3402. Each accumulator tube 3402 is preferably, in embodiments, a FIFO (first in first out) buffer space that is logically divided into two main segments: a buffer segment 3403 and a collector segment 3404. The collector segment 3404 accumulates mail piece frames until enough frames have been collected to fill a transport shuttle. Once collected, the frames are loaded into a shuttle for transfer to another function in the mail sorting and/or sequencing system. Given that the process of loading a collection of frames into a shuttle consumes a small amount of time, the buffer segment 3403 within the accumulator tube 3402 allows subsequent mail piece frames to be staged until the collector segment 3404 is emptied. Once the collector segment 3404 is emptied, the frames in the buffer segment 3403 can be advanced into the collector segment 3404 and the process repeated.

In the event that a particular accumulator tube 3402 is only partially filled and no further frames containing mail pieces are inducted, the accumulator controller 3408 can utilize a configurable timeout threshold. Once the timeout threshold has elapsed, the accumulator controller 3408 can load the remaining frames in an accumulator tube 3402 onto a shuttle.

FIGS. 34C-34E show a presort accumulator system 3400 receiving frames from an induction system utilizing a number of induction units 3460A-3460C in accordance with one aspect of the invention. In particular, the induction system can utilize a first letters induction unit 3460A, a second letters induction unit 3460B, and a flats induction unit 3460C. Each induction unit 3460A-3460C has a feeder section which feeds mail pieces to various paths leading to an insertion tube 3463. At a location where each path interfaces with a respective insertion tube 3463 is arranged a frame inserter generally referred to as "FI", discussed in greater detail in other sections of the instant invention. The frame inserter inserts a mail piece into each frame as the frames move inside the insertion tubes 3463. The frames arrive empty on shuttles via an entrance area 3465 and travel down a main grid path 3466. The shuttles are generally depicted at reference "SH" and discussed in greater detail in other sections of the instant invention. The grid path 3466 allows the shuttles to move horizontally and vertically along a grid (i.e., over or under other docked shuttles) so as to allow the shuttles to move to the section 3467 as well as to each of multiple levels of insertion tubes 3463 even when other shuttles are docked to entrance areas of the insertion tubes 3463.

The shuttles stop and dock to one of the insertion tubes 3463 (a docking location indicated by "D" in FIG. 34E) so that the empty frames can be inserted into the respective insertion tube 3463. Once all of the frames are transferred to the insertion tube 3463, the empty shuttle travels down the path 3466 and then transfer onto an inlet section 3467 of the presort accumulator 3400. The empty shuttles can then move to the grid path system 3471 of the presort accumulator 3400 whereupon they can receive frames containing mail exiting the accumulator tubes 3402, and then onto other sections of the mail system.

As can be seen in FIG. 34E, the grid path 3471 allows the shuttles to move horizontally and vertically along a grid (i.e., over or under other docked shuttles) so as to allow the shuttles to move through each of multiple levels of accumulator tubes 3402 even when other shuttles are docked to exit areas of the accumulator tubes 3402, and then out of the presort accumulator 3400. The grid path 3471 thus includes upper horizontal path 3472, lower horizontal path 3473, as well as vertical paths connecting the paths 3472 and 3473. In embodiments, two horizontal paths for shuttle movement in the grid are utilized. The first path is the top-most horizontal level in FIG. 34E. The other path is the 2nd level up from the bottom (labeled "Empty shuttles"). The bottom-most path is preferably a half-height path in which GTUs (grid transport units) move. A GTU is a component of the grid and preferably resembles a shelf that moves through the grid on which a shuttle will rest. In embodiments, the grid can preferably contain several GTUs.

Again with reference to FIGS. 34C-34E, other empty shuttles SH can enter another grid path 3468 so as to receive frames containing mail which exit an end of the insertion tubes 3463. The grid path 3468 allows the shuttles to move horizontally and vertically along a grid (i.e., over or under other docked shuttles) so as to allow the shuttles to move to the section 3469. These shuttles loaded with filled frames proceed down grid path 3468 and dock to section 3469 of the presort accumulator system 3400. The frames containing mail are then transferred into the section 3469 via, e.g., right-angle divert, and proceed horizontally down one of plural main transport tubes 3470 (FIG. 34E shows two tubes 3470), which can be arranged one above the other. The frames containing mail are then transferred to a respective accumulator tube 3402 via, e.g., right-angle divert, where they pass into the buffer segment 3403 and then the collector segment 3404, and eventually are loaded onto empty shuttles 3464 docked to exit ends of the tubes 3402 within the grid path section 3471. A filled shuttle in the grid then moves up to the highest level of the grid and then travels horizontally to dock section 3569. In this way, the filled shuttles can exit the grid while other upstream shuttles remain docked.

The presort accumulation process can also handle volume skew during mail induction. Specifically, the induction of presorted mail (e.g., large groups of pre-barcoded mail that a mailer sends to the same destination area) may cause an allocated accumulator tube 3402 for the intended destination to overflow, despite the buffering capability within the tube. In this case, additional empty accumulator tubes 3402 can be dynamically allocated to the presorted mail flow to mitigate the possibility of overflow. During the induction of presorted mail, there will naturally be empty accumulator tubes 3402 available. In the event that no tubes are available due to, e.g., residue of mail that was inducted prior to the induction of presorted mail, then the presort accumulator 3400 can eject the mail frames in those tubes into shuttles, thus emptying the tubes 3402 to handle the volume skew.

A non-limiting advantage of using the presort accumulator 3400 relates to preventing the mail induction units from going off line. If there is a bottleneck, or if a path or shuttle is not available for incoming mail, it will accumulate. When a buffer in the accumulator nears overflow, feedback can be provided back to one or more induction units to stop or pause their input. The system can thus prevent this accumulation when using random mail distributions. However, multiple units inducting presorted mail will, at times, cause the buffer to fill up, and thus cause the feedback which causes the induction units to stop. The presort accumulator 3400 should thus be sized to allow a certain time period of all induction units running worse case presorted mail, before the induction units must be suspended.

Profiling Mail Pieces and Algorithm to Determine Container Size

The present invention is related to matching mail pieces with an appropriately sized frame. The matching of mail pieces and frames may be performed prior to sequencing/sortation processes and, more specifically, used in a sequencing/sortation system as described in the instant application. In embodiments, the frames may provide a common handle for automating mail processing, and facilitate the transportation and sorting of one or more mail pieces in a stack, which reduces speed while increasing throughput. As an example, and discussed in more detail in the instant application, the frames may be transparent or opaque and include an identifier such as a barcode, RFID, alphanumeric and/or numeric code, etc. In embodiments, an identifier may be provided for each frame. In embodiments, the frame may be transparent in which case the mail piece mounted therein can include a visible identifier. The frames may instead be a clamp.

The frames may be ridged, elastic or partially elastic, and can encompass many different sizes for different mail pieces. As there are many sizes of mail pieces, the frames may be used to fit the largest size of mail piece designated for the frame in order to increase the efficiency of the system. The partially elastic frames may be used to allow frames to expand and contract in one or more directions to save space when placing one or more pieces of mail into the frame. For example, the back end of a frame may be partially elastic to allow a piece of mail to fit into the frame without unneeded protrusions.

As discussed herein, several frame sizes may be used for different mail pieces such that profiling or measuring the mail piece is necessary to match mail pieces with an appropriate size frame. Advantageously, the invention provides for such profiling to ensure that the sorting and/or sequencing system maximizes the use of as many frames as possible in order to increase sorting and/or sequencing throughput.

FIG. 35A is a flow diagram depicting steps of a method for profiling mail pieces and determining a frame size according to aspects of the invention. More specifically, FIG. 35A shows a method for profiling one or more mail pieces and determining which frame to match with the mail pieces to provide for an efficient mixed mail sortation system having various sizes of temporary individual frames to facilitate sorting. In embodiments, any number of the frames may be expanded to facilitate various sizes of mail pieces.

The steps of FIG. 35A may be implemented in the computer infrastructure discussed in the instant application. More specifically, at step 3500, the control detects mail pieces on a transport. The transport may comprise pinch belts or other known conveyance mechanisms configured to move mail pieces through a sorting and/or sequencing system. At step 3505, a profiler will be directed to automatically or semi-automatically measure attributes of the detected mail piece. These attributes may be used to assign a mail piece to a correctly sized frame based on measurements and attributes obtained about the mail piece. Exemplary attributes may include, e.g., height, length, width, weight, stiffness, projections, and/or an indication of a delivery area (such as a ZIP code), etc., of a piece of mail. The projections may include non-uniform thicknesses, dog eared pages of magazines, etc. One or more of these measurements are made by the profiler, at step 1310, using known systems as discussed herein.

In embodiments, the profiler may be comprised of one or more elements configured to measure at least one attribute. Exemplary mechanisms for detecting one or more of these attributes may include, e.g., one or more cameras, an array of light-emitting diodes (LEDs) or charge-coupled devices (CCDs), weight sensors, photodiodes, encoders, etc. Any number of mechanisms may be used individually, or in combination with one another, to determine one or more mail piece attributes. Moreover, while examples of mechanisms are provided herein, it should be understood that the examples are non-exhaustive and should not be used to limit the present invention.

Illustratively, in embodiments, one or more cameras may be used to determine the height, thickness, and/or projections of a mail piece. An array of LEDs or CCDs may be used to calculate height and/or width attributes of a mail piece. The thickness of a mail piece may also be determined, e.g., by measuring the distance between pinch rollers while the mail piece is being transported. The stiffness of a mail piece may be measured, e.g., using a mechanical probe, which is configured to contact the mail piece and, based on an electrical resistance, determine the stiffness of the mail piece. Additionally, barcode or address information may be obtained, e.g., from a barcode scanner and/or camera.

The weight of a mail piece can be determined by a weight sensor, such as a scale. However, in embodiments, the weight of a mail piece may be estimated using one or more calculations based on the dimensions of the mail piece. For example, the weight may be calculated using the height, width, and length information to determine an area, which may be multiplied by the average density of the mail piece to obtain the weight of the mail piece. In embodiments, the average density may be obtained, e.g., by a probe, much like discussed above. The weight of a mail piece may also be estimated by, e.g., determining the inertia of a mail piece by observing how the mail piece is deflected while it is moved on the transport.

At step 3515, the computer infrastructure receives the attributes, such as height, length, and/or width, etc., from the profiler. The received attributes may be stored in a database or data storage unit, represented at 3520. Exemplary data storage units may comprise any type of digital storage location where values can be recalled by frame type or by frame attributes, such as size. The data storage units may be any known databases detailed herein and well known to those of skill in the art.

At step 3525, configuration information relating to the mail piece limits may be obtained by the computer infrastructure. This information may be obtained from a configured database or data storage unit, represented at 3530. The data storage unit may be a database or other storage unit that is discussed with reference to the computing infrastructure described with reference to FIG. 1A. In embodiments, the configuration data storage unit (3530) may be the same as or different from the data storage unit (3520) used to store the mail piece's attribute data.

The configuration information obtained from the configuration data storage unit (3530) may include information on the maximum dimensions of mail pieces that can be placed in a frame or clamp. In embodiments, the maximum dimensions may be the dimensions of the largest frame used by the sequencing/sortation machine. As the maximum dimensions may change as frame sizes are added or taken out of use, the present invention allows a configuration data storage unit to be updated with frame sizes. By using a configuration data storage unit to store frame size, instead of hard coding frame sizes into a software program, the invention allows frame sizes to be easily changed without the need to recompile the entire software program that performs the frame assignment.

At step 3535, a determination is made as to whether the dimensions of a mail piece are larger than the maximum dimensions. This determination may be performed by comparing the dimensions of the mail piece from the data storage unit (3520) with the maximum dimensions obtained from the configuration data storage unit (3530). If the mail piece exceeds the maximum dimensions, the computer infrastructure instructs the mail piece conveyance to route the mail piece to a holdout, such as a hold bin or a reject bin, at step 3540. The mail piece may be held in the holdout until it is manually sorted and/or re-inserted into the sequencing/sortation system, at step 3545.

If the mail piece is within the maximum dimensions, configuration assignment parameters may be obtained regarding one or more of the frames, at step 3550. The configuration assignment parameters may be obtained from the configuration data storage unit (3530) and include the maximum dimensions of one or more of the frames. In embodiments, information related to the dimensions of one or more frames may be obtained from one or more subsystems, such as the control unit.

At step 3555, a determination is performed as to which frame should be matched with the mail piece. In embodiments, this may include a comparison of the dimensions (or other attributes) of the mail piece and that of the one or more frames obtained at step 3550. This determination is used to find the smallest available frame that can accommodate the mail piece. In embodiments, additional factors may also be included in determining what size frame to use with the mail piece. For example, the elasticity of a frame may be considered when determining the maximum dimensions of one or more of the frame. That is, if the mail frame is flexible, it may be able to accommodate a larger size mail piece and, as such, an initially smaller size frame may be selected to be used with the mail piece. Weight also may be a consideration in selecting a frame, due to its insertion force.

At step 3560, the determinations may be used to direct an inserter to insert the mail piece into the next available properly sized frame, at step 3560. The next available properly sized frame may be determined using a barcode reader or RFID, etc., or based on the known positions of one or more frames in the system. At step 3565, the inserter selects the properly sized frame and routes the mail piece to the insertion area. At step 3570, the mail piece is inserted into the frame by the inserter. Once inserted, additional attributes may be collected by the profiler and compared to the original mail piece and/or frame attributes to assure that the mail pieces were inserted correctly. In embodiments, the process of frame insertion using the correct types of frames can be determined by the frame type selector 3818.

Once the mail piece is inserted into a frame, at step 3575, the frame identifier and the mail piece identifier may be stored in a database or data storage unit. This data storage unit may be an existing data storage unit, such as data storage unit (3520) or (3530), or a separate data storage unit as discussed in the instant application. The frame identifier and the mail piece identifier may be associated with one another in the data storage unit in order to allow the mail piece and associated frame to be tracked throughout the sequencing/sortation machine. The process ends, at step 3580.

FIG. 35B is an exemplary illustration of profiling a mail piece using an LED array and a CCD detector array in accordance within the invention. More specifically, FIG. 35B shows a mail piece "M", which may be moved through the system in a direction of travel via a transport. The transport may be comprised of one or more pieces of mail processing equipment, such as pinch rollers 3585.

While the mail piece is transported through the system, an LED array 3590 and CCD detector array 3595 may be used to profile the mail piece by obtaining one or more attributes about the mail piece 3582. These attributes may include, e.g., the height, length, and/or width of a mail piece 3582. The process of obtaining one or more of these attributes may include emitting light toward the mail piece 3582 using an LED array 3590 and collecting any light that has been emitted through the mail piece 3582 and/or light that goes around the mail piece 3582 using a CCD detector array 3595.

The light captured by the CCD detector array 3595 may also be indicative of the boundaries of the mail piece. These boundaries may be analyzed to determine, e.g., the height and/or length of the mail piece. Moreover, in embodiments, the amount of light emitted through the mail piece 3582 may be analyzed to determine the width and weight of the mail piece 3582.

Self Monitoring and Remote Testing Unit

The present invention relates to a self monitoring and remote testing unit (i.e., a S.M.A.R.T. unit). The S.M.A.R.T. unit is a ruggedized, portable processing unit with sensors, detectors, etc. configured to be introduced as a piece of flat mail or a small package into a frame that is directed through a processing system (which includes various processing, conveying, and transport systems) to monitor the system's performance. Besides being fixed to a frame, the S.M.A.R.T. unit may alternatively free float through the system as if it were a mail piece being conveyed for sorting. It may also be configured to be conveyed via pinch belts, tooth belts, or any other known system for conveying mail and related packages. The S.M.A.R.T. unit is configured to thoroughly diagnose the operating conditions of the processing system having a variety of conveyance and transport equipment incorporated into the same.

Processing systems are becoming more complicated and may include, e.g., individual processing machines (i.e., modules) interconnected with other like modules, to create very large integral processing systems including a variety of conveyance and transport equipment for mail sorting and sequencing systems. Monitoring and diagnosing the operating conditions of these systems has become complicated. To monitor such systems, currently software is developed to monitor, inter alia, sensors for jams, motors for overloads, power supplies for outages, and other catastrophic failures within the machine or system. A limitation of these known monitoring systems is that they cannot adequately predict a machine or system failure until after it has occurred, and the machine or system has failed. As a result of this limitation the machine or system may be damaged, the product being conveyed through the machine or system may be damaged, and valuable production time is lost.

A solution is to provide the S.M.A.R.T. unit that is configured to travel along a plurality of conveyance paths connecting the various processing modules of the system in a manner similar to a path that flat mail, flat letters, and small packages would travel during a mail sorting and sequencing operation. In embodiments, the S.M.A.R.T. unit contains at least a rugged single board personal computer including wireless communication such as infrared, WI-FI, or other wireless communication. The S.M.A.R.T. unit is preferably equipped with, but not limited to, sensors such as accelerometers, strain gauges, infrared thermometers, hygrometers, static detectors, cameras, and lights.

The S.M.A.R.T. unit is also configured with initial base line operating conditions data (e.g., optimal operating data of various components recorded at installation or an initial run of the module and/or system). The S.M.A.R.T. unit compares readings from subsequent runs through the system with the initial base line operating conditions data. In this way, the S.M.A.R.T. unit can diagnose a problem prior to it becoming a catastrophic machine failure, and can alert the appropriate party so as to prevent any potential failures from occurring during operation. As a result, the operation is more efficient, and the life of the machine and/or system is extended.

The S.M.A.R.T. unit senses and records operating conditions data at various points throughout the system and reports the data back to a central control, personal computer, or control unit, as disclosed. Preferably, the S.M.A.R.T. unit is battery powered with a small footprint. It is contemplated that the batteries may be as large and powerful as can possibly fit within the S.M.A.R.T. unit.

The SMART unit also includes an onboard personal computer board, with many electronics. The onboard personal computer as well as the other components are ruggedized to handle extreme vibrations and impacts such that data collection is not altered, and communication with the control unit is not interrupted. For example, circuitry of the unit can be encapsulated in an epoxy to provide stabilization and toughness when experiencing vibrations and impacts during operation. The personal computer board also has a very low power usage to optimize battery life.

The S.M.A.R.T. unit also includes physical connections such as video output, keyboard, mouse, USB, Ethernet, serial port, sound and other connectors known to those having ordinary skill in the art. The S.M.A.R.T. unit also utilizes solid state device(s) for bulk memory storage like solid state hard drives, flash cards, or similar devices. Inputs and outputs may also be part of the P.C., or may be supplied via an auxiliary board.

More specifically, referring to FIG. 36, the S.M.A.R.T. unit 3600 includes a plurality of detection sensors and other components, e.g., components that are configured to monitor and communicate various system functions. These components may include, but are not limited to:

Cameras 3605;
Lights 3610;
Microphones 3615;
Infrared Thermometers 3620;
Static Charge Measuring Sensors 3625;
Force and Strain Gauges 3630;
Accelerometers 3635;
Humidity Sensors (e.g., Hygrometers) 3640;
Solid State Memory 3645;
One or more Processors 3650;
Wireless Communications Systems 3655;
Batteries 3660;
Charge Pads 3665;
Input/Output Boards 3670; and
Connectors 3675: Monitor, Keyboard, Mouse, Ethernet, USB, etc.

Those of skill will understand that the present invention can include any combination of the above components, depending on the specific application. For example, although four cameras are shown herein, any number of cameras can be used, in combination with any other components.

In embodiments, cameras 3605 are used to photograph or video the conveyance and other related equipment, e.g., compression zone components, diverters, or other pieces of hardware that would otherwise require down time for maintenance personnel to inspect (e.g., inspect via physically entering the inside of the system). The cameras 3605 are secured to the S.M.A.R.T. unit 3600 and monitor various areas that may otherwise be difficult to monitor through the conveying system, as well as monitor as large a coverage area as possible for more accurate diagnosing and trouble-shooting of potential machine component failures.

In embodiments, at least four cameras 3605 are provided in order to provide a picture or video of all aspects of the system, including the conveyance equipment, e.g., lead screws, as well as components attached to or associated with the lead screws. The captured information is relayed to a control unit that can analyze the information, and quickly diagnose a problem. The cameras 3605 are generally provided at the four corners of the generally rectangular S.M.A.R.T. unit 3600. For example, the cameras 3605 may be aimed at four lead screws or threads directly in front of and behind the S.M.A.R.T. unit 3600 so as to monitor the mechanical condition of the threads (e.g., monitoring for signs of warping, and broken or fragmented sections), and to monitor intersections between the conveying system and other subsystems (e.g., a compression zone or a right angle divert section). The cameras 3605 may also monitor conveying systems such as belt systems including, but not limited to, pinch belts and tooth belt systems. The cameras 3605 preferably are capable of providing both still images and/or video images for transmission to the control unit.

In embodiments, four lights 3610 are provided in close proximity to the cameras 3605, preferably just below or just above, to provide illumination for better quality images and videos. The lights 3610 are preferably LED lights, but can be any light capable of illuminating the area to be photographed or videoed.

In embodiments, two microphones 3615 are provided just below the upper cameras 3605 and lights 3610. That is, microphones 3615 are provided at outer upper ends just below the upper corners of the generally rectangular S.M.A.R.T. unit 3600; although other locations are contemplated by the invention. The microphones 3615 are provided to record audible noises throughout the system that may suggest excessive vibration, wear, and potential component failure. For example, the microphones 3615 are intended to pick up audio signals such as bearing squeal, mechanical impacts (e.g., clicking, banging, or frictional rubbing that should be absent from the system), etc. Audible noises recorded by the microphones 3615 are transmitted to the control unit for analysis and diagnosis of any problem. However, it is also contemplated that the analysis may be performed in the S.M.A.R.T. unit 3600, itself.

In embodiments, infrared thermometers 3620 are provided just below the microphones 3615 at the outer upper edges of the generally rectangular S.M.A.R.T. unit 3600; although the infrared thermometers 3620 may be located at other positions in the S.M.A.R.T. unit 3600. The infrared thermometers 3620 detect hot spots throughout the system. Hot spots are areas of concentrated heat as compared to the surrounding environment. Generally, the infrared thermometers 3620 can aid in detecting when and where a motor, a drive shaft, a gearbox, a bearing, a roller cam bracket, etc., is deteriorating to the point that the component may fail and impair system operation. The S.M.A.R.T. unit 3600 records and stores information feedback from the infrared thermometers 3620 and transmits the data back to the control unit for analysis and diagnosis of any potential problem. As with other components of the S.M.A.R.T. unit 3600, it is contemplated that the analysis and diagnosis may be performed in the S.M.A.R.T. unit 3600 and the results sent to the control unit for verification and responsive action, if required.

At least one static sensor 3625 is provided just below one of the infrared thermometers 3620 at about a middle outer edge portion of the S.M.A.R.T. unit 3600. It is contemplated though, that the static sensor 3625 can be positioned at other locations on the S.M.A.R.T. unit 3600. In mail sorting and sequencing systems, the equipment and many of the components conveying the mail through the system generate static electricity. The static sensor 3620 monitors buildup of static electricity that could potentially damage circuit boards, WI-FI transmitters, motors, sensors, and gauges, etc. The S.M.A.R.T. unit 3600 records and stores information feedback from the static sensor 3625 and transmits the data back to the control unit for analysis and diagnosis of any potential problem. It is contemplated that the analysis of the data and diagnosis of the problem may be performed at the S.M.A.R.T. unit 3600 and the results sent to the control unit for verification and responsive action, if required.

In embodiments, a plurality of force and strain gauges 3630 are provided at an upper interior portion of the S.M.A.R.T. unit 3600, positioned adjacent at least one of the upper cameras 3605 and lights 3610 and below a plurality of connectors 3675. The plurality of force and strain gauges 3630 can also be positioned at other locations on the S.M.A.R.T. unit 3600. The force and strain gauges 3630 are provided for measuring forces and strains on parts of the frame that interact with the conveying system. That is, the force and strain gauges 3630 measure the force and strain of opening and closing the frame, the force and strain of any levers or arms engaged or acted on in connection with a conveyed frame, the force and strain of the frame at diverter switches (i.e., at directional changes of the frame), or the force and strain of any other components that require force to open, close, push, pull, or move the frame along the conveyance path. In this manner, the structural integrity of the containers at various points along the mail sorting and sequencing system can be determined, recorded, stored, and transmitted to the control unit for analysis and diagnosis of any potential problem. It is contemplated that the analysis of the data and diagnosis of any problem may be performed at the unit and the results sent to the control unit for verification and responsive action, if required.

In embodiments, a plurality of accelerometers 3635 are provided at an upper middle portion of the S.M.A.R.T. unit 3600 just below the plurality of connectors 3675 and adjacent the force and strain gauges 3630 and wireless communication transmitter 3655, as well as at a lower outer edge portion of the S.M.A.R.T. unit 3600, adjacent the static sensor 3625 and humidity sensor 3640. The present invention also contemplates other locations for placement of the accelerometers 3635. Although six accelerometers are shown, the present invention contemplates the use of more accelerometers placed on the S.M.A.R.T. unit 3600, which will provide additional monitoring to reliably diagnose the source of the vibration. In embodiments, the accelerometers 3635 include x, y, and z accelerometers, allowing measurements in all axes.

Accelerometers 3635 detect vibrations, shocks, and accelerations experienced by the frames during, inter alia, conveying, diverting, and compressing. Generally, it is important to detect vibration as it is typically the first sign of component failure. The S.M.A.R.T. unit 3600 records and stores information feedback from the accelerometers 3635 and transmits the data back to the control unit for analysis and diagnosis of any problem. It is contemplated that the analysis of the data and diagnosis of the problem may be performed at the unit and the results sent to the control unit for verification and responsive action, if required.

In embodiments, one or more humidity sensor 3640 is provided below one of the infrared thermometers 3620 at about a middle outer edge portion of the S.M.A.R.T. unit 3600. Although, the present invention contemplates other locations for placement of the humidity sensors 3640. The humidity sensor 3640 monitors humidity in and around the system. Detected sources of humidity may come from fluid leaks from various equipment or generally from the building in which the system operates. A humidity reading outside the base line operating conditions may indicate, e.g., a building air conditioning unit with drainage leaks or that a dryer for a compressed air-line is not operating properly. Once a humidity reading is taken, the S.M.A.R.T. unit 3600 records and stores information feedback from the humidity sensor 3640 and transmits the data back to the control unit for analysis and diagnosis of the problem. It is contemplated that the analysis of the data and diagnosis of the problem may be performed at the unit and the results sent to the control unit for verification and responsive action, if required.

A solid state memory 3645 is provided at a middle inner section of the S.M.A.R.T. unit 3600 or other locations depending on the placement of other components. The solid state memory 3645 stores data from all of the various monitors, sensors and gauges on the S.M.A.R.T. unit 3600. It is contemplated that the solid state memory 3645 may also store data from remote monitors, sensors, and gauges located through the system. The solid state memory 3645 is preferably chosen for purposes of having properties suitable to withstand harsh operating conditions such as shocks and vibrations experienced while the unit travels through the mail system. In embodiments, data is stored in the solid state memory 3645 until a request for transmission to the control unit is received.

In embodiments, a processor 3650 is provided at a central section of the S.M.A.R.T. unit 3600; although other locations are contemplated by the present invention. All recorded data is collected in the processor 3650 and transmitted via the wireless communication transmitter 3655 to the control unit. The processor 3650 collects the recorded data and organizes it into a readable format such as a spreadsheet, etc. It is also contemplated that the processor 3650 may perform a comparative analysis of the collected data and the base line operating conditions data, and may generate a recommendation to be sent via wireless communication to the control unit to alert proper personnel of potential system failures such that they can be prevented. Alternatively, the analysis results may be downloaded at the control unit via one of the connectors 3675 after the S.M.A.R.T. unit 3600 has run through the system.

The S.M.A.R.T. unit 3600 communicates the collected data to the control unit via infrared, WI-FI, or other wireless communications correspondence through the wireless communication transmitter 3655. The S.M.A.R.T. unit 3600 may also have data, updates, and other information uploaded to or downloaded from the unit via the connectors 3675. That is, the collected data may also be downloaded from the S.M.A.R.T. unit 3600 by hard wire.

In embodiments, a battery 3660 provides power to the system components. Preferably, a lithium ion battery is used to minimize the power usage of the S.M.A.R.T. unit 3600 and to maximize the life of the S.M.A.R.T. unit 3600 without having to be recharged. In the event the battery 3660 requires recharging, a charge pad 3665 is located adjacent the battery 3660 to recharge the battery 3660 for its next run through the system. The charge pad 3665 may energize the battery 3660 during its run through the system via various contacts located along the conveyance path, or the charge pad 3665 may be connected to a remote recharging station when the S.M.A.R.T. unit 3600 is not in operation.

In embodiments, the S.M.A.R.T. unit 3600 is placed within a frame and securely attached thereto during a run through the system to perform diagnostics to prevent failures in the system. The S.M.A.R.T. unit 3600 can be fixed to any frame by any fixing mechanism (see reference numeral 3680), preferably at upper or lower outer ends of the unit so as to stably support it to the frame. This will aid in resisting the effects of vibrations from the conveying system. The S.M.A.R.T. unit 3600 may be screwed, glued, clamped, welded, or secured by any other securing mechanisms known to one having ordinary skill in the art.

In operation, when the sorting and sequencing system is operating, the S.M.A.R.T. unit 3600 is directed through the system to collect and record data to be stored and transmitted to the control unit. The S.M.A.R.T. unit 3600 may be used to base line the system's handling characteristics and compare those characteristics to characteristics observed on subsequent runs through the system or module. If variations in handling are detected, the S.M.A.R.T. unit 3600 may be configured to perform a more detailed examination of the area in question on its next pass through.

An initial run is intended to set the base line operating conditions data (i.e., parameters), as discussed above, for the optimal operating conditions for the system including, e.g., the appropriate manner in which components were designed to interact, how the components should sound, and the appropriate component operating speeds. In subsequent passes, the data collected by the S.M.A.R.T. unit 3600 is compared to the base line operating conditions data collected during the initial run. The control unit can detect any parameters or characteristics that fall outside the base line operating conditions data, and the appropriate correction can be made before a failure occurs. It is contemplated that the system is configured to provide a tolerable range of acceptable recorded data (that would be considered within the optimal operating conditions range) before alerting maintenance to a potentially catastrophic failure. In this manner, the proper personnel can take appropriate action such as ordering necessary parts and scheduling down time when it is least disruptive to the operation of processing mail. The S.M.A.R.T. unit 3600 may also detect false positive readings.

The S.M.A.R.T. unit 3600 provides many advantages to improving the operating efficiency of a processing system. More particularly, any changes in the system's base line operating conditions data can be used to help the proper personnel plan repairs before a catastrophic event impairs the system. In embodiments, the S.M.A.R.T. unit 3600 can alert the operator to a failure or potential failure such that the operator can re-route products away from such problematic areas to continue operating with minimized disruption. In this regard, the S.M.A.R.T. unit 3600 prevents products from getting damaged, lowers the opportunity for costly repairs, and also provides the benefit of reducing the amount of software needed to monitor the machine or system, freeing up valuable control unit processor time.

Transportation Device for Frames

The present invention relates to a shuttle mechanism and a method of controlling and coordinating the movement of at least one item (e.g., a mail piece secured in a frame) through a conveyance system between a plurality of machines. It is desirable to have a mechanism configured to transport at least one item (hereinafter referred to as a frame) through the conveyance path to be loaded and unloaded for movement through a plurality of machines, e.g., a mail sorting and/or sequencing system. In embodiments, the present invention provides for a shuttle that may transport, load, and unload frames among various destinations in the mail sorting and sequencing system.

To accomplish these tasks, the shuttle may be configured with a shuttle braking system and shuttle docking connectors. That is, the shuttle may be configured to engage docking stations at machine entrances and exits so as to securely load or unload the frames, respectively. The shuttle may also be configured to receive a shuttle clamping mechanism. The present invention contemplates that the shuttles may be implemented, for example, in any postal service or company mail center that presorts, sorts, and/or sequences mail pieces or other products. Shuttle implementation provides a low cost solution to transportation needs for items stored singularly or in bulk amounts.

More specifically, FIG. 37A, generally shows an embodiment of a shuttle 3700 configured to transport at least one frame F. In embodiments, the shuttle 3700 includes a generally parallel piped construction having e.g., at least two side walls 3704, at least two open end walls 3706, a bottom wall 3708, and a top wall 3710 to allow the at least one frame F to be loaded and unloaded from the shuttle 3700. The at least two open end walls 3706 are open to provide a pathway for frames to enter and exit the interior of the shuttle 3700. The at least two side walls 3704, bottom wall 3708, and top wall 3710 may also be open, or have a closed or partially closed surface. The present invention contemplates that the shuttle 3700 may be constructed of injection molded plastic, or a machined aluminum, or any suitable material known to those having ordinary skill in the art so as to provide a sturdy, lightweight and cost effective material suitable for conveying items singularly or in bulk amounts.

In embodiments, the at least two open end walls 3706 of the shuttle 3700 are generally angled (e.g., at 45 degrees with respect to the direction of a conveyance path) such that open end walls 3706 of subsequent shuttles 3700 may nest with each other, as generally shown in FIG. 37B. It is noted that the frames are also provided at a generally 45 degree angle with respect to the direction of a conveyance path in the shuttle interior. This configuration minimizes constraints on storage space and maximizes use of shuttle 3700 interior space so as to provide additional interior room within the shuttle for transporting a higher volume of frames F. The present invention also contemplates that the shuttles 3700 may also be square in configuration, or any shape conducive to the transport of frames along the conveyance path.

The shuttle 3700 further includes at least four non-powered (e.g., driven) lead screws 3712 provided at upper and lower sides of the shuttle 3700 extending along the length of the shuttle 3700 in a direction parallel with the conveyance path. The non-powered lead screws 3712 support the frames F during conveyance, and assist in the loading and unloading of the frames F into and out of the shuttle 3700. In embodiments, the non-powered lead screws 3712 are configured to hold frames at a 45 degree angle (with respect to the direction of a conveyance path). In embodiments, the non-powered lead screws 3712 are provided with a plurality of threads (i.e., a minimum pitch) such that about 110 frames F may be securely loaded on the shuttle 3700 at any given time; however more or less threads and frames are also contemplated by the present invention depending on the requirements of the mail sorting and sequencing system. The non-powered lead screws 3712 are configured to mate with corresponding powered (e.g., driving) lead screws 3714 extending from an entrance (or exit) of a machine for purposes of docking the shuttle 3700 in preparation of loading and unloading of frames F.

In this regard and as shown in FIG. 37C and FIG. 37D, the non-powered lead screws 3712 of the shuttle 3700 align and engage with powered lead screws 3714 extending from the machine 3716 at a docking station 3718. The docking station 3718 ensures a secure engagement between the shuttle 3700 and the machine 3716 for efficient movement of the frames F on and off the shuttle 3700. The non-powered lead screws 3712 may be any non-powered conveyance mechanism so long as the mechanism is compatible with any known conveying system in any machine 3716 to which it is docked. Further, the non-powered conveyance mechanism is designed to support the frames F during movement of the shuttle 3700, properly align and securely engage the shuttle 3700 to the docking station 3718, and assist in the loading and unloading of frames F onto or off of the shuttle 3700 after engagement with the machine 3716.

In embodiments, each shuttle 3700 may also include a unique identifier such that an exact location of a given shuttle 3700 is known at all times as the shuttle 3700 is conveyed from machine to machine. In this regard, the shuttle 3700 may be transported through the conveyance path on COTS equipment (i.e., commercial off-the-shelf conveyance equipment) or carts, or any specialized conveyance equipment known to those having ordinary skill for conveying items singularly or in bulk. This may include standard cots material handling equipment or carts as discussed in the instant application to transport the frames F in volume to various machines 3716 for sorting and sequencing. Transportation along these conveyance paths allow the shuttle 3700 to carry bulk batches of frames F between machines 3716 in an efficient (i.e., best path routing) manner.

As further shown in FIG. 37G, the shuttle 3700 also includes side posts 3736. The side posts 3736 define outer corner edges of the side walls 3704 and the open end walls 3706. In embodiments, each side post 3736 includes at least two notches 3738; one of the at least two notches 3738 is provided at an inner upper portion of the side post 3736 and a second of the at least two notches is provided at an inner lower portion of the side post 3736. The at least two notches 3738 define upper and lower inner edges of the open end walls 3706 to provide clearance for projections (e.g., wings) extending from upper and lower edges of the frames F being loaded and unloaded. The at least two notches 3738 further provide clearance for lead end portions of the non-powered lead screws 3712 and lead end portions of guide rods 3740 connected to a braking mechanism 3734 (which is described in more detail below).

Shuttle Docking System

As shown in FIG. 37C and FIG. 37D, shuttle 3700 may dock at either an entrance or an exit of the machine 3716 to transfer or receive frames F. The docking station 3718 may be provided at each entrance and exit of the machine 3716. In embodiments, each docking station 3718 includes the powered lead screws 3714, which extend outward from the machine 3716 entrance or exit along the length of the conveyance path to engage a corresponding non-powered lead screw 3712 from an approaching shuttle 3700.

As shown in FIG. 37D and FIG. 37E a docking joint 3720 is provided where lead end portions of the non-powered lead screw 3712 engage lead end portions of the powered lead screws 3714. In embodiments, the lead end portions may be either a male connector or a female connector such that the female connector mates with a corresponding male connector. For example, lead end portions of the non-powered lead screws 3712 may be female connectors that mate with corresponding male connectors provided at the lead end portions of the powered lead screws 3714 extending from the docking station 3718.

FIG. 37E shows a non-limiting example of the docking joint 3720. The docking joint 3720 includes a male connector 3722 provided at the lead end portion of the powered lead screw 3714 (extending from the entrance or exit of the machine 3718) and a corresponding female connector 3724 provided at the lead end portion of the non-powered lead screw 3712 of the shuttle 3700. The male connector 3722 is mated to the female connector 3724. The male connector 3722 and the female connector 3724 are configured to support self alignment of the threads between the powered lead screws 3714 and non-powered lead screws 3712. That is, as the powered lead screws 3714 and the non-powered lead screws 3712 begin to engage one another, the male connector 3722 and the female connector 3724 ensure proper alignment and a secure connection. In this regard, the docking joint 3720 provides a smooth conveyance path transition for frame F loading and unloading.

The male connectors 3722 and the female connectors 3724 are also self orienting. That is, even if the male connector 3726 and the female connector 3728 are misaligned as the shuttle 3700 approaches the docking station 3718, the error in alignment can be corrected such that the threads of the non-powered lead screws 3712 and the threads of the powered lead screws 3714 align for a smooth transition of the frames F on and off the shuttles 3700.

In embodiments and as shown in FIG. 37F, the male connector 3722 is provided with a four sided tapered square tang 3726 extending from a center portion of the lead end portion of the powered lead screws 3714. The tapered square tang 3726 allows the powered lead screws 3714 to securely rotate the corresponding non-powered lead screws 3712 having the female connectors 3724. The tapered portions of the tapered square tang 3726 assist in compensating for misalignment with the non-powered lead screws 3712 of the shuttle 3700 at the point of engagement with the female connector 3724 and allow for an acceptable range of engagement points to complete the docking joint 3720 when the shuttle 3700 is docked. It is contemplated that the tapered square tang 3726 may include any number of sides so long as it is able to engage the female connector 3724 and drive the non-powered lead screws 3712 to load and unload the frames F. It is further contemplated that the tapered square tang 3726 may also include a retainer having spring loaded bearings at the tapered portions of the tapered square tang 3726 for a more secure connection with the female connector 3724.

In embodiments, the female connector 3724 includes a broached hole 3728 at lead end portion of the non-powered lead screws 3712. The broached hole 3728 further includes a countersunk rim 3730 to allow the tapered square tang 3726 of the male connector 3722 to self align at the point of engagement with the female connector 3724. In this regard, the countersunk rim 3730 compensates for errors in alignment with the male connector 3722. The countersunk rim 3730 includes a plurality of countersunk notches 3732 that extend into the broached hole 3728. The countersunk notches 3732 further aid in aligning and securing the lead screws 3712, 3714 such that the powered lead screws 3714 can drive the non-powered lead screws 3712 for purposes of loading and unloading frames F. The countersunk rim 3730 provides a self aligning lead-in for the male connector 3722 such that registration of the tapered square tang 3726 within the broached hole 3728 corresponds to an alignment of the phase or peak of the mating lead screw threads. The present invention further contemplates that generally, as long as the lead ends of the lead screws are flat against each other in the docking joint 3720, alignment is always achieved.

In operation, the shuttle 3700 is directed towards the entrance or exit of the machine 3716. The powered lead screws 3714 are shut-off to receive the approaching shuttle 3700. The non-powered lead screws 3712 are aligned with the powered lead screws 3714. More particularly, the female connector 3724 is guided over the male connector 3722. The female connector 3724 engages the male connector 3722 (via registration of the square tapered tang 3726 with the broached hole 3728) to complete the docking joint 3720. The powered lead screws 3714 are turned on and rotate the non-powered lead screws 3712. The frames F are loaded onto or unloaded from the docked shuttle 3700. The powered lead screws 3714 are turned off. Loaded or empty shuttles 3700 are deployed from the docking station 3718. The male connector 3722 and the female connector 3724 are disengaged and the shuttle 3700 is directed to a predetermined destination within the mail sorting and sequencing system.

Shuttle Braking System

During transit from one machine 3716 to another, shuttle 3700 may experience vibrations and external forces acting on shuttle components; however, the non-powered lead screws 3712 supporting the frames F, should not be negatively affected by the vibrations such that frames F are shifted, misaligned or disengaged from the non-powered lead screws 3712 during transit on the shuttle 3700. That is, the frames may prevent the non-powered lead screws 3712 from rotating during conveyance. Additionally, preventing the non-powered lead screws 3712 from rotating during transit ensures elimination of potential problems at the docking joint 3720 during loading and unloading of the frames F. However, as an added measure to prevent accidental movement of the non-powered lead screws 3712 during transit of the frames F, the shuttle 3700 may include at least one braking mechanism 3734. This ensures that the frames F remain secured and stabilized until arrival at the machine 3716 docking station 3718.

As shown in FIG. 37G, each non-powered lead screw 3712 has at least one corresponding braking mechanism 3734. In embodiments, at least four braking mechanisms 3734 are provided on the body of the shuttle 3700, but less braking mechanisms 3734 are contemplated by the present invention. The braking mechanism 3734 generally includes at least two guide rod support blocks 3742 secured to the shuttle 3700 at the bottom wall 3708 and/or the top wall 3710. A guide rod 3740 is supported by and extending through the at least two guide rod support blocks 3742. Each guide rod support block 3742 includes an aperture for receiving a portion of the guide rod 3740 to slidably pass through.

The guide rods 3740 are provided adjacent an interior side of the non-powered lead screws 3712. In this regard, the at least two guide rod support blocks 3742 also rotatably support at least a lower side of the non-powered lead screws 3712. The height and/or position of the guide rod 3740 and the guide rod support blocks 3742 with respect to the bottom wall 3708 of the shuttle 3700 is generally lower than the height at which the non-powered lead screws 3712 are mounted to the guide rod support blocks 3742. This position and dimension ensures that the braking mechanism 3734 does not interfere with the loading and unloading of the frames F traveling along an upper side of the non-powered lead screws 3712. Similarly, the non-powered lead screws 3712 provided along the top surface of the shuttle 3700 are mounted on the guide rod support blocks 3742 to hang lower than the height of the guide rod 3740 extending from the top wall 3710 to provide sufficient clearance for frames entering and exiting the shuttle 3700 interior. The braking mechanisms 3734 are also provided at either a front end or back end of the shuttle; however the present invention contemplates the braking mechanism 3734 being provided at any location along the length of the non-powered lead screws 3712.

As shown in FIG. 37H and FIG. 37 I, the braking mechanism 3734 also includes a cam 3744 provided along the guide rod 3740 in between the at least two guide rod support blocks 3742. The cam 3744 is generally cylindrical in shape, wherein the diameter is gradually narrowed towards the center creating an indented curvature through the middle of the cylinder (i.e., similar to an hour-glass shape). At least first and second elastic members 3746 (e.g., helical springs) are provided along the length of the guide rod 3740 between an inner side of each guide rod support block 3742 and an end surface of the cam 3744. A third elastic member (e.g., spring) 3752 urges a brake arm 3748 in an opposing direction.

In embodiments, and as shown in FIG. 37H, the braking mechanism 3734 is in an activated position when cam 3744 is urged into a rest or center position. That is, the at least first and second elastic members 3746 effect a force on each end surface of the cam 3744 and each inner side of the guide rod support blocks 3742 such that the cam 3744 rests in a center position between the guide rod support blocks 3742. In the activated position, the braking mechanism 3734 prevents the non-powered lead screws 3712 from rotating or becoming out of phase during transit of the frames F. While elastic members are shown, it is contemplated that a magnetic system could also be implemented for urging the cam 3744 into its rest position.

The braking mechanism 3734 also includes a brake arm 3748 operatively connected to the guide rod 3740 for frictionally engaging the non-powered lead screws 3712. The brake arm 3748 is provided between the guide rod support blocks 3742 and below the cam 3744 and the guide rod 3740. The brake arm 3748 extends from a lower surface of the cam 3744 to a lower surface of the non-powered lead screw 3712. The brake arm 3748 is pivotally engaged with a brake arm mount 3750 to allow vertical movement of the brake arm 3748. When the braking mechanism 3734 is in the activated position, the brake arm 3748 is urged towards its active position, i.e., the brake arm 3748 engages the lower end of the non-powered lead screw 3712. That is, the brake arm 3748 is urged upward via a third elastic member 3752 positioned below a lower surface of the brake arm 3748 such that the brake arm 3748 frictionally engages the non-powered lead screw 3712 and prevents the non-powered lead screws 3712 (and the frames F if loaded on the shuttle 3700) from moving during transit.

The brake arm 3748 also includes a deflectable roller cam 3754 (or domed protrusion), or any cam surface provided at an upper surface of the brake arm 3748 such that the roller cam 3754 is aligned beneath the indented curvature of the cam 3744 in its activated position. When the braking mechanism 3734 is in its active position, the roller cam 3754 does not interfere with the central positioning of the cam 3744, and the non-powered lead screws 3712 are frictionally engaged with the brake arm 3748.

FIG. 37I shows the braking mechanism 3734 in a deactivated position. That is, when the shuttle 3700 is docked at the machine 3716 for loading or unloading, the lead end portion of the guide rod 3740 (extending from the notches 3738 of the side posts 3736 of the shuttle 3700) contacts a stationary stopper (not shown) positioned opposite the lead end portion of the guide rod 3740 at the docking station 3718. In the deactivated position the guide rod 3740 slides in a direction opposite of the contact with the stationary stopper such that the cam 3744 is displaced from its center rest position to one of two sides, depending on the docking side of the shuttle. In this regard, one of the first and second elastic members 3746 is in a compressed state, and the other of the first and second elastic members 3746 is in an extended state. When the cam 3744 is displaced, a side end of the cam 3746 (having a diameter larger than the center of the cam 3744) deflects the roller cam 3754 downward such that the cam 3744 places a downward force on the roller cam 3754. The force on the roller cam 3754 opposes the upward elastic force of the third elastic member 3752 and urges the brake arm 3748 downward into an active position, thereby disengaging the brake mechanism 3734 from the non-powered lead screws 3712.

Simultaneous with the deactivation of the braking mechanism 3734 during docking of the shuttle 3700, the non-powered lead screws 3712 engage the powered lead screws 3714 and are freely rotatable for purposes of loading and unloading of the frames F. Thus, the frames F are conveyed on and off the docked shuttle 3700, and the brake mechanism 3734 is disengaged from the non-powered lead screws 3712 until deployment of the shuttle 3700 from the docking station 3718. During deployment, the first and second elastic members 3746 return the cam 3744 to its rest position, thereby activating the brake mechanism 3734 for transit between machines 3716. It is also contemplated that the weight of the frames may also serve as a brake on the non-powered lead screws 3712.

Shuttle Clamping System

To ensure alignment of the male connector 3722 and the female connector 3724 and accurate deactivation of the braking mechanism 3734, a swing clamp mechanism 3756 is provided at the docking station 3718, as shown in FIG. 37J. In this regard, a BCR, or any sensor known to those having ordinary skill in the art, monitors the approaching shuttle 3700, and at a position in close proximity to the docking station 3718, the swing clamp mechanism 3756 extends and rotates (or swings) to engage the shuttle 3700 and pull it towards the docking station 3718 to align the powered lead screws 3714 with the non-powered lead screws 3712 and to deactivate the braking mechanism 3734 (via the interaction between the guide rod 3740 and the stationary stopper) for loading and unloading of the frames F. The swing clamp mechanism 3756 prevents detachment of the engaged lead screws 3712, 3714 and activation of the braking mechanism 3734 during loading and unloading (and thus prevents disengagement of the shuttle 3700 from the docking station 3718) to ensure that all of the frames F are properly transported to their predetermined destination.

More specifically, as shown in FIG. 37J, the swing clamp mechanism 3756 is provided at an outer side of the docking station 3718 of the machine 3716 that receives shuttles 3700. The swing clamp mechanism 3756 is provided to properly align and/or securely engage the powered lead screws 3722 of the machine 3716 with the non-powered lead screws 3710 of the shuttle 3700.

In embodiments and as shown in FIG. 37K, the swing clamp mechanism 3756 includes a servomotor 3758, a telescoping arm 3760 having at least a base arm 3762 and an extension arm 3764, and a rotatable swing clamp arm 3766. The swing clamp mechanism 3756 is configured to retract from an extended position to a retracted position (as shown in FIG. 37L) to engage an approaching shuttle 3700 at the docking station 3718. The present invention contemplates that the swing clamp mechanism may alternatively be configured with a pneumatic rotary screw actuator for actuating engagement of the shuttle 3700 with the docking station 3718.

In embodiments, the swing clamp arm 3766 is pivotally attached to a front end of the extension arm 3764 and extends in a direction transverse to a telescoping direction of the telescoping arm 3760. In the retracted position, the extension arm 3764 retracts into an interior portion of the base arm 3762 such that the swing clamp arm 3766 is provided at a front end of the base arm 3762. In the extended position, the extension arm 3764 extends from the base arm 3762 such that the extension arm 3764 is provided between the base arm 3762 and the swing clamp arm 3766. The swing clamp arm 3766 may also provide a grasp element 3768 configured to securely engage a portion of the shuttle 3700 with the swing clamp mechanism 3756. In embodiments, the grasp element 3768 may be provided at a side end of the swing clamp arm 3766 opposite the portion of the swing clamp arm 3766 pivotally attached to the front end of the extension arm 3764. The grasp element 3768 may include, but is not limited to a robotic arm, a magnet, a suction cup, a latch hook, a male or female connector, or any other element for grasping known to those having ordinary skill.

In embodiments, the swing clamp arm 3766 may be provided in a deactivated position or in an activated position. In the deactivated position, the swing clamp arm 3766 is in an initial upright position. That is, the swing clamp arm 3766 may be in any position in which it does not interfere with the docking station 3718, the conveyance path, and the approaching shuttle 3700. In the activated position, the swing clamp arm 3766 may be rotated to engage a portion of the approaching shuttle 3700.

In embodiments and when the swing clamp mechanism 3756 is in the extended position, the swing clamp arm 3766 may be rotated from the deactivated position to the activated position to engage a portion of the approaching shuttle 3700. For example, the swing clamp arm 3766 may swing into the conveyance path to engage an inner front side edge of a front frame member of the shuttle 3700 and guide the shuttle 3700 into engagement position with the docking station 3718. That is, the swing clamp mechanism 3756 ensures that the male connector 3722 and the female connector 3724 are securely aligned for smooth engagement, as well as ensuring that the braking mechanism 3734 is deactivated so as to allow free rotation of the non-powered lead screws 3712. It is also contemplated that the swing clamp arm 3766 may be provided in a deactivated position when the swing clamp mechanism 3756 is in the retracted position.

In embodiments and as shown in FIG. 37L (when the swing clamp mechanism 3756 is in the retracted position), the swing clamp arm 3766 is in the activated position. That is, the swing clamp arm 3766 engages the approaching shuttle 3700 and pulls it towards the docking station 3718 to securely align the shuttle 3700 with the docking station 3718 for loading and unloading of frames F.

In operation, the docking station 3718 provides the swing clamp mechanism 3756 in an extended position and a sensor detects an approaching shuttle 3700 on the conveyance path at a predetermined distance. The swing clamp mechanism 3756 actuates the servomotor 3758. The swing clamp arm 3766 rotates into the conveyance path. The grasp element 3768 engages a portion of the shuttle 3700. The swing clamp mechanism 3756 retracts the telescoping arm 3760 and pulls the shuttle 3700 such that the powered lead screws 3714 extending from the docking station 3718 align and securely engage with the non-powered lead screws 3712 of the shuttle 3700. The braking mechanism 3734 is also deactivated in this state. The shuttle 3700 is securely docked when the swing clamp mechanism is in its retracted position and the swing clamp arm 3766 and grasp element 3768 are operatively connected to the shuttle 3700. That is, as the shuttle 3700 approaches and the grasp element 3768 makes contact with the shuttle 3700, the extension arm 3764 retracts towards the base arm 3762 to guide and secure the shuttle 3700 to the docking station 3718 (and prevent detachment) for loading and unloading of the frames F. It is also contemplated that the docking station 3718 provides the swing clamp mechanism 3756 in a retracted position such that when an approaching shuttle 3700 is detected, the telescoping arm 3760 having the swing clamp arm 3766 extends outwardly in a direction parallel to the conveyance path for engagement with the approaching shuttle 3700.

The swing clamp mechanism 3756 releases contact with the shuttle 3700 so that the shuttle 3700 can be deployed to another machine 3716. More specifically, in embodiments, a sensor may detect the last frame F either loaded onto or unloaded from the shuttle 3700. The servomotor 3758 actuates the telescoping arm 3760 to extend from the retracted position to the extended position. In other words, the extension arm 3764 is extended from the retracted position within the base arm 3762 and the swing clamp arm 3766 releases its hold on the shuttle 3700. In the extended position, the swing clamp arm 3766 rotates out of the conveyance path into its deactivated position until a subsequent shuttle 3700 approaches. The present invention also contemplates that during deployment of the shuttle 3700 from the docking station 3718, the swing clamp mechanism 3756 may also be in the retracted position until actuated.

While not limited by the abovementioned embodiments, the shuttle mechanism, including the components related to shuttle docking, shuttle braking, and shuttle clamping, ensures secure transportation of frames between machines, as well as the loading and unloading of the frames into the machines. The shuttle mechanism provides low cost components that are reliable and enable a mail sorting and sequencing system to efficiently process bulk amounts of mail therethrough.

System Architecture for a Facility-Wide Sorting and/or Sequencing System

The invention provides, in embodiments, a system architecture for a facility-wide letters/flats mail sorting and/or sequencing system. The mail sorting and/or sequencing system of the present invention combines and sequences both letters and flats together which provides a major benefit and cost savings to the postal industry. As such, the present invention contemplates the architecture for sequencing letters and flats throughout an entire mail processing facility using the facility-wide letters/flats mail sorting and/or sequencing system.

Prior to the present invention, no known system has yet successfully achieved a combined letters/flats sequenced mail stream. For example, DBCS (Delivery Bar Code Sorter) systems sequence letters mail for the USPS today. FSS (Flats Sequencing System) provide the USPS with a system for sequencing flats mail only. DPP (Delivery Point Packaging) was a prior attempt by the USPS to solicit a letters/flats sequencing machine, but this effort was abandoned. Thus, any type of postal service or mail center that needs to sequence letters and flats mail can benefit by utilizing the systems and methods of the instant application.

A fundamental strategy of the architecture is to provide a facility-wide system that performs one continuous mail operation, which requires significantly reduced human labor than is required by the multiple operations that must be performed on the individual letters/flats sorting/sequencing machines in use today. As such, according to non-limiting aspects of the invention, the system architecture includes a plurality of inter-related functions. For example, the following system architecture and inter-related functions are contemplated by the present invention.

- An induction manager function that manages letters and flats mail induction into the system.
- A frame inserter function then that assigns each mail piece to a “frame”.

A presort accumulator function that loads frames into frame transport shuttles and allocates each shuttle to one of "n" sequencing segments.

A transport controller function moves shuttles to their allocated sequencing segment.

A sequencer function performs the task of sequencing the frames into delivery point order by unloading and then reloading shuttles.

A storage manager function manages the buffering and staging of shuttles/frames in storage.

A container loader function extracts mail pieces from the frames and loads delivery containers.

A container dispatcher function prepares the containers for delivery.

A system manager function provides data management tasks.

A frame tracking agent function manages real-time location tracking of frames.

A frame manager function manages induction, inspection, and replenishment of frames.

A shuttle manager function manages induction and inspection of shuttles.

An error and other logging functions.

FIG. 38A shows a system 3800 comprised of several functions that interact to form the architecture. Each function performs several related tasks that are characterized as input, processing, output, or management tasks. In particular, the system 3800 utilizes an input function 3801 which includes an induction manager. The induction manager is primarily responsible for feeding mail pieces into the system 3800, capturing the address result, and profiling the mail piece to determine mail piece attributes. A frame inserter packages individual mail pieces into frames. The details of these sub-systems will be described in detail below.

The system 3800 also utilizes processing functions 3802 which include a presort accumulator that performs an initial quick sort and buffers frames prior to transport to a storage segment. A transport controller includes numerous conveyors which transport the mail frames internally to storage segments and container loading operations. A sequencer controls all sorting and sequencing operations. The details of these sub-systems will be described in detail below.

The system 3800 further utilizes output functions 3803. For example, a container loader packs the mail pieces into delivery containers and labels the containers. A container dispatcher moves the delivery containers from the loader to the dispatch preparation areas. The details of these sub-systems will be described in detail below.

The system 3800 further utilizes management functions 3804. These functions include, for example, a frame manager that receives frames into the system, inspects frames, and recirculates empty frames in the system for subsequent use. A shuttle manager receives shuttles into the system. A storage manager provides a massive storage facility for daily sequencing operations and stages mail for final sorting and sequencing. A frame tracking agent provides real-time tracking of the location and contents of all filled frames. A system manager maintains system status, authenticates access to system resources, provides tables containing operational data, manages configuration data and software updates, and provides self test and diagnostics capabilities for all system functions. The details of these sub-systems will be described in detail below.

The description that follows presents and describes a logical architecture of the complete system (level 1). Another section will provide a further decomposition (level 2) and description of each function in the logical architecture.

The logical architecture for the system is shown in FIG. 38B. This is the highest level (Level 1) decomposition of the architecture, which shows the major functions that comprise the system and their primary interactions. The level 1 system 3805 thus includes a plurality of inter-related functions, beginning with an induction manager 3810 that manages letters and flats mail induction into the system. A frame inserter 3815 assigns each mail piece to a "frame" containment device. A presort accumulator 3830 loads frames into frame transport shuttles and allocates each shuttle to one of "n" sequencing segments. A transport controller 3835 moves shuttles to their allocated sequencing segment. Then, a sequencer 3840 performs the task of sequencing the frames into delivery point order by unloading and then reloading shuttles.

A storage manager 3845 manages the buffering and staging of shuttles/frames in storage. Then, a container loader 3850 extracts mail pieces from the frames and loads delivery containers. A container dispatcher 3860 then prepares the containers for delivery. A system manager 3870 provides data management tasks. A frame tracking agent 3865 manages real-time location tracking of frames and a frame manager 3820 manages induction, inspection, and replenishment of frames. A shuttle manager 3825 manages induction and inspection of shuttles.

Table 4 shows non-limiting tasks which are preferably performed by the induction manager 3810 shown in FIG. 38B. It should be understood that other tasks can be performed by this subsystem and described in other sections of the instant application.

TABLE 4

| Induction Manager<br>Primary tasks: |
|---|
| Receive mail pieces via induction feeders |
| Read and record address result |
| Determine and record mail piece attributes |
| Perform flats address recognition |
| Query ID tags in PICS/FICS |
| Record flats address result in FICS |
| Apply flats ID tags |
| Select correct address result (arbitration) |
| Start/stop induction unit |
| Operate start up alarm |
| Reject mail pieces that require manual handling |
| Perform address redirection interception |
| Maintain mail piece orientation |
| Maintain audit trail |

Table 5 shows non-limiting tasks which are preferably performed by the frame inserter 3815 shown in FIG. 38B. It should be understood that other tasks can be performed by this subsystem and described in other sections of the instant application.

TABLE 5

| Frame Inserter<br>Primary tasks: |
|---|
| Request/receive empty frames |
| Send alerts for empty frame inventory depletion |
| Select frame size |
| Open frames |
| Load mail into frames |
| Assign mail piece to frame (ID mapping) |
| Close frames |
| Return empty frames to inspection |
| Maintain mail piece orientation |
| Maintain frame assignment |
| Maintain audit trail |

Table 6 shows non-limiting tasks which are preferably performed by the frame manager 3820 shown in FIG. 38B. It should be understood that other tasks can be performed by this subsystem and described in other sections of the instant application.

TABLE 6

| Frame Manager Primary tasks: |
|---|
| Induct frames |
| Inspect frames |
| Discard frames |
| Service frame inventory alerts |
| Provide operator console |
| Start/Stop manual induction process |
| Operate start up alarm |
| Maintain audit trail |

Table 7 shows non-limiting tasks which are preferably performed by the shuttle manager 3825 shown in FIG. 38B. It should be understood that other tasks can be performed by this subsystem and described in other sections of the instant application.

TABLE 7

| Shuttle Manager Primary tasks: |
|---|
| Induct shuttles |
| Validate shuttles |
| Divert shuttles for manual inspection |
| Provide shuttles to frame induction |
| Provide operator console |
| Start/Stop manual induction process |
| Operate start up alarm |
| Maintain audit trail |

Table 8 shows non-limiting tasks which are preferably performed by the presort accumulator 3830 shown in FIG. 38B. It should be understood that other tasks can be performed by this subsystem and described in other sections of the instant application.

TABLE 8

| Presort Accumulator Primary tasks: |
|---|
| Receive frames from frame inserter |
| Presort to destination (per System Operating Plan) |
| Place frame in correct accumulator buffer |
| Buffer mail for transport to sequencer |
| Create frame manifest |
| Maintain frame assignment |
| Maintain mail piece orientation |
| Maintain audit trail |

Table 9 shows non-limiting tasks which are preferably performed by the transport controller 3835 shown in FIG. 38B. It should be understood that other tasks can be performed by this subsystem and described in other sections of the instant application.

TABLE 9

| Transport Controller Primary tasks: |
|---|
| Transport frames between system functions |
| Validate frame manifests |
| Divert frames |
| Maintain frame assignment |
| Maintain mail piece orientation |
| Adjust conveyor speed |
| Monitor transport and select alternate conveyor path |
| Maintain audit trail |

Table 10 shows non-limiting tasks which are preferably performed by the sequencer 3840 shown in FIG. 38B. It should be understood that other tasks can be performed by this subsystem and described in other sections of the instant application.

TABLE 10

| Sequencer Primary tasks: |
|---|
| Perform sequencing tasks per the SOP (pre-sequencing, initial sequencing, post-sequencing) |
| Sort outgoing flats |
| Meet arrival/dispatch profiles per the SOP |
| Update frame manifest |
| Divert frames |
| Monitor transport and select alternate path |
| Maintain frame assignment |
| Maintain mail piece orientation |
| Maintain audit trail |

Table 11 shows non-limiting tasks which are preferably performed by the storage manager 3845 shown in FIG. 38B. It should be understood that other tasks can be performed by this subsystem and described in other sections of the instant application.

TABLE 11

| Storage Manager Primary tasks: |
|---|
| Assign frame to enabled storage buffer |
| Meet arrival/dispatch profiles per the SOP |
| Store mail for final sequencing and dispatch |
| Buffer flats mail for address recognition completion |
| Retrieve flats address results from FICS |
| Hold out unresolved flats mail after configurable timeout |
| Create frame manifest for dispatch |
| Manage empty frame storage |
| Provide empty frames to induction |
| Initiate alert for empty frame inventory depletion |
| Monitor transport and select alternate path |
| Maintain frame assignment |
| Maintain mail piece orientation |
| Maintain audit trail |

Table 12 shows non-limiting tasks which are preferably performed by the container loader 3850 shown in FIG. 38B. It should be understood that other tasks can be performed by this subsystem and described in other sections of the instant application.

TABLE 12

| Container Loader Primary tasks: |
|---|
| Extract mail pieces from frames |
| Load delivery containers in sequenced order |
| Manage container induction process |

TABLE 12-continued

| Container Loader<br>Primary tasks: |
|---|
| Maintain mail piece orientation |
| Maintain frame assignment |
| Update frame manifest |
| Print container labels |
| Apply container labels |
| Send empty frames to storage for recirculation |
| Provide container metrics for reporting |
| Start/stop induction unit |
| Operate startup alarm |
| Maintain audit trail |

Table 13 shows non-limiting tasks which are preferably performed by the container dispatcher 3860 shown in FIG. 38B. It should be understood that other tasks can be performed by this subsystem and described in other sections of the instant application.

TABLE 13

| Container Dispatcher<br>Primary tasks: |
|---|
| Track and status containers for dispatch |
| Select dispatch prep area |
| Move filled containers to dispatch prep area |
| Meet mail dispatch profiles per the SOP |
| Provide dispatch console |
| Maintain audit trail |

Table 14 shows non-limiting tasks which are preferably performed by the system manager 3870 shown in FIG. 38B. It should be understood that other tasks can be performed by this subsystem and described in other sections of the instant application.

TABLE 14

| System Manager |
|---|
| Primary tasks: |
| Manage system and subsystem configuration |
| Establish storage pre-assignments per the SOP |
| Trigger critical system events |
| Create End of Run report |
| Track mail pieces and mail piece attributes |
| Track anomalies/errors |
| Authenticate users |
| Authenticate access to system resources |
| Transmit data/reports to IDS |
| Create/transmit dispatch report to Surface Visibility. |
| Configure (enable/disable) storage aisles |
| Provide system console |
| Provide remote console |
| Select sort plan |
| Provide sort plan editor |
| Receive sort plans from NDSS |
| Receive software updates from IDS |
| Manage software update process to all subsystems |
| Backup, restore system data |
| Machine control (start, stop, restart, alarms) |
| Maintain audit trail |
| Secondary tasks: |
| Provide maintenance service access (web interface) |
| Provide off-line maintenance mode |

Table 15 shows non-limiting tasks which are preferably performed by the frame tracking agent 3865 shown in FIG. 38B. It should be understood that other tasks can be performed by this subsystem and described in other sections of the instant application.

TABLE 15

| Frame Tracking Agent<br>Primary tasks: |
|---|
| Track frame contents (mail piece association) |
| Provide data integrity validation (missing frames) |
| Provide data aggregation (metrics collection) |
| Manage frame tracking repository |

Table 16 shows non-limiting tasks which are preferably performed by all of the above-noted functions shown in FIG. 38A. It should be understood that other tasks can be performed by this subsystem and described in other sections of the instant application.

TABLE 16

| All functions<br>Secondary tasks: |
|---|
| Perform according to configuration parameters |
| Perform self-test diagnostics |
| Perform periodic health check (automated) |
| Provide maintenance/calibration/diagnostics tasks |
| Detect jams, failures, and obstructions |
| Perform periodic diagnostic tests |
| Isolate errors to FRUs |
| Report errors to system console |
| Record errors to system log |

Level 2 of the logical architecture provides a further level of decomposition in which each function is presented and described in more detail. All system functions are architected to meet the mail arrival profiles and dispatch profiles as determined by the system sequencing plan. Some general mail handling capabilities transcend throughout all or nearly all functions within the system. In embodiments, these capabilities are as follows.

The orientation of all mail pieces as inducted into the System can be preserved;

Once a mail piece is inserted into a frame, it remains in that frame until dispatch. A mail piece will never switch frames while within the System;

All functions provide status and performance metrics to the System Manager for trend analysis. This data also allows for the creation of an audit trail for problem analysis; and All functions are configurable. The System Manager maintains all configuration data and sends updates to each function.

FIG. 38C shows the details of the induction manager function. Additional details of this function are discussed in other sections of the instant application in addition to the following description. The induction manager's primary responsibility is to feed mail into the system through an input segment. By definition, an input segment is a logical entity that encompasses the induction manager and frame inserter functions. Separate feeders are used for letters and flats mail. The induction manager 3810 is controlled via a dedicated machine control interface, i.e., an induction unit controller 3811, that allows the operator to start and stop an input segment. The induction unit controller 3811 can be implemented in the computing infrastructure of FIG. 1A.

The start operation sounds an alarm for safety. Once an input segment has been started, it is ready to receive mail A mail receiver 3812 handles the actual receipt of all mail pieces from the induction feeders and reads the address bar code and/or ID tag on the mail piece. A mail profiler 3813 measures physical characteristics of mail pieces and attempts to obtain length, height, and thickness measurements as well as mail piece weight. These physical attributes can be measured by known sensors such as, for example, weight sensors, light emitting diodes, etc. as discussed in further detail in other sections of the instant application. All physical attributes are validated by a mail inspector 3814. The mail inspector 3814 rejects exception mail pieces that are determined to be oversize, overweight, or non-machinable (i.e., the mail piece has a high probability of causing a jam).

The mail inspector 3814 also performs address validation. The mail inspector 3814 first verifies if an address result is available by analyzing the address bar code (i.e., Postnet) and/or ID tag on each mail piece.

- For letters having no ID tag and no barcode, the letter is immediately sent to a holdout.
- For letters having only an ID tag, the ID tag is queried in the Postal Identification Code Sort (PICS) system to retrieve the address. Letters for which the address is not a destinating address are sent to an outgoing holdout. Otherwise the letter is retained in the System.
- For letters having only a bar code address, if the address is not a destinating address, the letter is sent to an outgoing holdout. Otherwise the letter is retained in the System.
- If letters having both an address bar code and ID tag for a destinating address, an arbitration process determines which address should be used. The address in PICS is only selected in the case where PICS has a finer depth than the bar code address and both addresses have the same 5-digit ZIP. In all other cases, the bar code address is selected.
- For flats having no ID tag or bar code, Flats Reco performs onboard address recognition, applies ID tags, and updates FICS with the tag and address result. If an address result cannot be determined through onboard address recognition, then a task is sent to the remote videocoding system (VCS) and the mail piece is sent on to the Frame Inserter.
- For flats having an ID tag, the ID tag is queried in the Flats Identification Code Sort (FICS) system to retrieve the address. If the address result in FICS is not to a delivery point depth, then Flats Reco performs onboard address recognition and updates FICS with a higher depth address result if available. If an address result cannot be determined through onboard address recognition, then a task is sent to the remote videocoding system (VCS) and the mail piece is sent on to the Frame Inserter.
- For flats having a bar code address, if the address is not to a delivery point depth then Flats Reco performs onboard address recognition. If an address result cannot be determined through onboard address recognition, then a task is sent to the remote videocoding system (VCS) and the mail piece is sent on to the Frame Inserter.
- For flats that have an address result, if the address is not a destinating address and the address is not valid as determined by the System Sort Plan, then the mail piece is held out as exception mail.

The mail inspector 3814 also interfaces with the Postal Address Redirection System (PARS) (for letters without ID tags) or PICS (for letters with ID tags) to determine if a letter mail piece is a candidate for forwarding or return to sender. All addresses that PARS or PICS indicates should be redirected are held out to a special bin for downstream processing on a CIOSS. The induction manager 3810 also sends all accepted mail pieces and associated data to the frame inserter 3815, and sends all mail piece attributes and address results to the system manager 3860 (which may be a frame tracking agent (FTA)) to be recorded. The ID tag of the mail piece identifies the mail piece data. If the mail piece does not contain an ID tag, then the mail inspector 3814 creates a unique ID tag. The induction manager also includes self diagnosis and testing software as well as maintenance and calibration, both of which can be communicated to the system manager.

FIG. 38D shows the details of the frame manager function. Additional details of this function are discussed in other sections of the instant application as well as in the following description. The frame manager 3820 handles the process of inducting and inspecting empty frames in the system. Frames that pass inspection are loaded onto transport shuttles and conveyed throughout the system. Frames contain inducted mail pieces throughout all sequencing operations and within storage. Mail pieces remain in their frames until container loading begins for dispatch. Many different types of frames are contemplated by the present invention, as discussed in the instant application. For example, letter mail pieces can be inserted into the light duty frames and flats mail pieces can be placed into either light duty or heavy duty frames, depending on their thickness and weight. For example, mail pieces having a thickness of approximately 13/64 of an inch or more, or mail pieces weighing approximately 12 ounces or more are placed into a heavy duty frame. Frames are labeled with a frame ID. Frame labels will be in the form of a bar code or other indicia as discussed herein. Every frame within the system will have a unique identification. In one contemplated aspect of the invention, since frames are not leaving a P&DC, all frames in the entire postal universe do not necessarily require a unique ID. However, it is desirable to establish a frame labeling convention that uses a P&DCs identification as part of the label. This approach will circumvent any conflict of frame ID duplication if a frame somehow ends up at the wrong facility.

A frame induction controller 3821 provides a dedicated machine control interface that allows the operator to start and stop the induction unit within the frame manager 3820. The start operation sounds an alarm for safety. Once the induction unit has been started, it is ready to receive empty frames. A frame receiver 3822 accepts empty frames into the system through a manual or automated induction process. The frames could be new (i.e., never used) frames or frames that were rejected to manual inspection but were determined to be fit for recirculation. Empty frames in shuttles are also forwarded to the frame inspector 3823 via a shuttle unloader which removes the empty frames from the shuttles, forwards the frames to the frame inspector, and forwards the empty shuttles to a shuttle manager (see FIG. 38E). All frames that are inducted are sent to a frame inspector 3823 for inspection. This inspection is preferably completely automated. Empty frames are returned to the frame manager 3820 for inspection by several system functions. The frame inspector 3823 runs an automated process of frame verification on (1) all frames that are inducted into the system, (2) frames that have been "flagged" for inspection due to some exception (e.g., a "no read" of the frame ID; frame open failure; frame close failure), and (3) on a sampling of frames that have circulated through the system. The frame inspector 3823 sets the status of every frame that passes inspection to "In Use" and the status of every frame that fails inspection to "Expired". Frames are discarded to a manual inspection bin if any of the following are true:

- The frame is damaged or worn;
- The frame is missing a frame ID;
- The frame ID cannot be read successfully;
- The frame ID is not recorded in the Frame Identification Table; and Every nth frame has circulated through the system for a configurable number of loops. The Frame Inspector maintains a recirculation counter for every frame in the Frame Identification Table. The counter is incremented whenever a frame is received, regardless of how far through the system the frame advanced before it was returned to the Frame Manager.

All discarded frames should be manually inspected and any good frames should be re-inducted into the system. When a frame is re-inducted, its label ID is located in a frame identification table and its status is changed to "In Use". The frame manager 3820 keeps an audit trail of frame re-induction. An induction counter is maintained for every ID in the frame identification table. The counter is set to "1" when a new ID is assigned. The counter is incremented whenever a frame's status is changed from "Expired" to "In Use".

Frames that pass or bypass automated inspection are placed into a transport shuttle by the shuttle loader 3824. Shuttles are received from the shuttle manager function 3825 (see FIG. 38E). Loaded shuttles are sent to the storage manager 3845 (see FIG. 38J) via the transport controller 3825 (see FIG. 38H). The storage manager 3845 provides the storage space for all frames (loaded and empty) in the system. Other system functions may send alerts and status information to the frame manager 3820, which is received by an alert handler and displayed on a frame manager operator console. Typical alert conditions may include a depletion of empty frames at a mail induction unit or within a storage unit. The frame manager also includes self diagnosis and testing software as well as maintenance and calibration, both of which can be communicated to the system manager.

FIG. 38E shows the details of the shuttle manager function. Additional details of this function are discussed in other sections of the instant application, as well as in the following description. The shuttle manager 3825 handles the process of inducting shuttles into the system. Shuttles that pass inspection are sent to the frame manager 3820 (see FIG. 38D) to receive empty frames. A shuttle induction controller 3826 provides a dedicated machine control interface that allows the operator to start and stop the induction unit within the shuttle manager 3825. The start operation sounds an alarm for safety. Once the induction unit has been started, it is ready to receive shuttles. The shuttle receiver 3827 accepts empty shuttles into the system through a manual induction process and from the frame manager (see FIG. 38D). All shuttles are sent to a shuttle inspector 3828. The shuttle inspector 3828 runs an automated process of shuttle verification on (1) all shuttles that are inducted into the System, (2) shuttles that have been "flagged" for inspection due to a "no read" of the shuttle ID, and (3) on a sampling of shuttles that have circulated through the system.

The shuttle inspector 3828 sets the status of every shuttle that passes inspection to "In Use" and the status of every shuttle that fails inspection to "Expired". Shuttles are sent down a manual inspection line if any of the following are true:

The shuttle's rollers or lead screws are not operating satisfactorily;

The shuttle is missing a shuttle ID;

The shuttle ID cannot be read successfully;

The shuttle ID is not recorded in the Shuttle Identification Table; or

Every nth shuttle has circulated through the system for a configurable number of loops. The Shuttle Inspector maintains a recirculation counter for every shuttle in the Shuttle Identification Table. The counter is incremented whenever a shuttle is received.

All discarded shuttles should be manually inspected and any good shuttles should be re-inducted into the system. When a shuttle is re-inducted, its label ID is located in a shuttle identification table and its status is changed to "In Use".

The shuttle manager 3825 keeps an audit trail of shuttle re-induction. An induction counter is maintained for every ID in the shuttle identification table. The counter is set to "1" when a new ID is assigned. The counter is incremented whenever a shuttle's status is changed from "Expired" to "In Use". Shuttles that pass or bypass automated inspection are sent immediately to the frame manager 3820 (see FIG. 38D). The shuttle manager also includes self diagnosis and testing software as well as maintenance and calibration, both of which can be communicated to the system manager.

FIG. 38F shows the details of the frame inserter function. Additional details of this function are discussed in other sections of the instant application as well as in the following description. The frame inserter 3815 is responsible for loading mail pieces into the correct type of frames and send them on to the presort accumulator 3830 (see FIG. 38G). All mail pieces are provided by the induction manager 3810 (see FIG. 38C) and all frames are supplied by the frame manager 3820 (see FIG. 38D). Empty frames are received from the storage manager 3845 (see FIG. 38J) via the transport controller 3835 (see FIG. 38H) and placed into a frame induction queue by the frame queue manager 3816 (see FIG. 38F). Frame types are managed separately within the queue. As the frame induction queue is depleted, the frame queue manager 3816 makes periodic requests to the storage manager 3845 to send more frames.

If the quantity of frames in the frame induction queue falls below a configurable threshold, the frame queue manager 3816 sends an alert to the system manager 3870 (see FIG. 39). As mail pieces are received by the mail receiver 3817, a frame type selector 3818 makes the decision as to which type of frame to place the mail piece into. The frame type selector 3818 uses the available attributes about the mail piece, such as mail type, dimensions, and weight, to select the best frame type as discussed in further detail in the instant application. For example, as described in the instant application, the mail size can be determined in order to correlate with an appropriately sized frame. All types and sizes of machinable mail that can be processed on any letters or flats MPE, including jacketed mail and mail containing loose inserts, can be inserted into at least one type of frame within the System. Empty frames are requested from the frame queue manager 3816 by a frame requestor, based on the type of frame determined by the frame type selector 3818.

A frame reader reads the frame ID bar code on the frame. If by some chance the frame reader does not locate the bar code or the bar code cannot be read, the frame is placed into a shuttle and returned to the frame manager 3820 via the transport controller 3835 (see FIG. 38H). A frame loader 3819 (See FIG. 38F) performs the actual process of opening the frame, inserting the mail piece, and then closing the frame, which is described in further detail in other sections of the instant application. For example, the process of frame insertion is to first load a group of empty frames of the correct types as determined by the frame type selector 3818, then pull in the mail pieces from the mail receiver 3817 and load each frame in the order received while maintaining the correct mail piece to frame association. After mail piece insertion, the group is ejected for transfer. The frame loader 3819 sends frame and mail piece identification data to a frame tracking agent to be recorded. Any frames that could not be loaded are placed into a shuttle and returned to the frame manager 3820 via the transport controller 3835 for inspection. In this case, an empty frame of the correct type is loaded into the same position that the empty frame occupied. A frame dispatcher sends the frames and associated mail piece data to the presort accumulator 3830 (see FIG. 38G). The frame inserter function also includes self diagnosis and testing software as well as maintenance and calibration, both of which can be communicated to the system manager.

FIG. 38G shows the details of the presort accumulator function. Additional details of this function are discussed herein in the instant application, as well as in the following description. The presort accumulator 3830 begins the process of presorting mail. The presort accumulator 3830 is generally a multiplexer that feeds an array of accumulator tubes 3831, which can be loaded into shuttles as already noted herein. In embodiments, all frames are received through a single input feed and are directed to the correct accumulator tube through a sorting algorithm as discussed in the instant application. Any type of frame may be placed into any accumulator tube. Preferably, each accumulator tube is a FIFO (first in first out) buffer space that is logically divided into two segments, e.g., a collector segment and a buffer segment. The collector segment accumulates mail piece frames until enough frames have been collected to fill a frame transport shuttle. Once collected, the frames are loaded onto a transport shuttle for transfer to another function in the system. Given that the process of loading a collection of frames onto a shuttle consumes a small amount of time, the buffer segment within the accumulator tube allows subsequent mail piece frames to be staged until the collector segment is emptied. Once the collector segment is emptied, the frames in the buffer segment are advanced into the collector segment and the process repeats itself.

A system manager provides an accumulator allocation plan to the presort accumulator 3830. This data determines the allocation of mail piece destinations (i.e. ZIP codes) to each accumulator. One or more destinations can be allocated to a single accumulator tube. As each frame is received, a frame reader 3832 quickly reads the frame ID and passes the frame on to multiplex controller of a control system 3833 along with the mail piece data. The frame reader 3832 may be a BCR or RF reader, for example.

The control system 3833 includes an accumulator controller and an accumulator selector. Also, a multiplex controller manages the process of directing frames to the correct accumulator tube of the accumulator tubes 3831. The decision as to which accumulator tube to place the frame in is made by the accumulator selector by looking up the address result in the accumulator allocation plan. A match to the specified criteria locates the correct accumulator tube. The accumulator controller handles the movement of frames into and out of each accumulator tube. Once the collector segment of an accumulator tube is filled or a configurable amount of time has passed since the accumulator tube was first loaded, the accumulator controller loads all the frames in the collector segment onto a frame transport shuttle and hands them off to the transport controller 3835 (see FIG. 38H). The accumulator controller also creates a frame manifest, which includes all the frame IDs of the frames contained in the accumulator tube, and provides this to the transport controller 3835. The manifest is also sent to a frame tracking agent 3865 (See FIG. 38M) to update frame location information. The presort accumulator also includes self diagnosis and testing software as well as maintenance and calibration, both of which can be communicated to the system manager.

FIG. 38H shows the details of a transport controller function. Additional details of this function are discussed in other sections of the instant application, as well as in the following description. The transport controller 3835 manages the entire process of moving frame transport shuttles containing frames between system functions. In general, all frames are transported between system functions in frame transport shuttles. Frames are maintained in their frame transport shuttles until they reach their next destination in the system. For example, shuttles with loaded frames are moved between the presort accumulator 3830, sequencer 3840, and storage manager 3845 functions. Shuttles containing empty frames are transferred between the frame inserter 3815, storage manager 3845, frame manager 3820, and container loader 3850 (See FIG. 38K) functions. The transport network provides point-to-point movement of shuttles with at least one alternate path available using switches, etc. as discussed in the instant application.

Upon entry to a main transport, a shuttle reader 3836 reads the shuttle ID of the shuttle. As each shuttle is read, the shuttle reader 3836 provides the shuttle ID to a frame monitor 3837. The frame manifest received from the presort accumulator 3830 (see FIG. 38G) lists the frame IDs of the frames that are loaded in the frame transport shuttle and provides the destination of the frames. The frame monitor 3837 updates the frame manifest to indicate each frame ID that is received and sends the updated manifest to the frame tracking agent 3865 (see FIG. 38M) to update frame location data. A sequencer 3840 (see FIG. 38I) creates a new manifest of frames that is sent to the storage manager 3845 (see FIG. 38J).

The transport controller system 3835 (see FIG. 38H) includes a group or control system 3838 of components that work together to manage frame transport, i.e., a transport controller, a divert controller, and a transport router. In one embodiment, these components use frame thickness to determine the space required for transport. The transport controller controls the conveyors that move the frames in shuttles. The divert controller controls all diverts that switch frames from one conveyor to another. Frames containing mail pieces are destined to a specific sequencer or storage area based on address. The transport router determines the destination of each mail piece using mapping data in a system configuration. The transport router locates the sequencer or storage unit to transport the frame to and determines the appropriate path to route the frame to its destination. In particular, the transport router handles the transport of empty frames to the function provided in the frame manifest. The transport router also monitors the overall state of the transport and dynamically switches to an alternate transport path if a jam, obstruction, or failure is detected. The transport controller also includes self diagnosis and testing software as well as maintenance and calibration, both of which can be communicated to the system manager.

FIG. 38I shows the details of a sequencer function. Additional details of this function are discussed in other sections of the instant application, as well as in the following description. In embodiments, the sequencer 3840 performs all steps of the system sequencing strategy with the exception of presorting. Final sequencing of destinating mail is performed at the start of dispatch by removing and combining the frames from each storage unit into a single sequenced stream. Outgoing flats are dispatched directly on a continuous basis as shuttles of outgoing flats accumulate. Upon entry to the sequencer 3840, frames are unloaded from shuttles via a shuttle unloader 3841, e.g., lead screws at docking stations. The frame reader 3842 reads the frame ID off each frame and provides the frame ID to a frame monitor 3843. The frame monitor 3843 updates the frame manifest to indicate each frame ID that is received and sends the updated manifest to a frame tracking agent 3865 (see FIG. 38M) to update frame location data.

A controller system 3844 includes a sequence controller and a divert controller. The sequence controller performs the logic to execute a specific sequencing step using a sort allocation plan and a sequence plan. The sort allocation plan subdivides frames into logical groups for sequencing destinating mail and sorting outgoing flats mail. The sequence plan identifies the sequence order of the delivery points of destinating mail for every route. Both plans are provided by the system manager 3870 (see FIG. 39). The sequence controller interacts with the divert controller to manage frame transport and diversion with the sequencer 3840 to perform the physical movement of frames during sequencing and to select alternate paths to avoid jams and obstructions, for example. The sequencer 3840 creates a new frame manifest after each sequencing step is completed. The shuttle loader 3841, e.g., docking station, loads the frames back into a transport shuttle and sends the shuttle and frame manifest to the next sequencing step or storage, or to the container loader 3850 (see FIG. 38K) for dispatch. In embodiments, the sequencer 3840 does not provide any frame buffering or storage space, other than transient space for the sequencing process. The sequencer also includes self diagnosis and testing software as well as maintenance and calibration, both of which can be communicated to the system manager.

FIG. 38J shows the details of a storage manager function. Additional details of this function are discussed in other sections of the instant application, as well as in the following description. The storage manager 3845 provides the storage facility for the buffering of loaded frames throughout the sequencing process and for the storage of empty frames throughout the system. The storage facility is logically comprised of several storage units, each of which contains multiple storage towers that are comprised of multiple storage tubes that include a platform for transporting with the facility, as discussed in the instant application. Frames are contained in frame transport shuttles with the storage units and always remain in the shuttles while in storage. Final sequencing of destinating mail is performed at the start of dispatch when shuttles are removed from storage and sent to the sequencer 3840 (see FIG. 38I).

Several components cooperate to control the primary tasks of the storage manager 3845. Loaded frames are received into the storage manager 3845 from a transport controller 3835 (see FIG. 38H). Each frame ID is read by the frame reader 3846, which provides the frame ID to a frame monitor 3847. The frame monitor 3847 updates the frame manifest to indicate each frame ID that is received and sends the updated manifest to a frame tracking agent 3865 (see FIG. 38M) to update frame location data.

A controller system 3848 utilizes a conveyor controller, a flats expiration handler, a dispatch manager, a divert controller, a storage tube selector, and an empty frame dispatcher. The storage tube selector determines which storage unit the frames should be placed in and which enabled storage tube within the storage unit the frames should be placed. The storage tube selector also determines the target storage unit by looking up the mail piece address in the sort allocation plan. The storage allocation plan determines the tubes that are available within each storage unit. A system manager 3870 (see FIG. 39) provides both of these plans, which were created from a system operating plan (SOP). Updates to the storage allocation plan may occur dynamically in the event that specific storage tubes are enabled or disabled for use.

The dispatch manager of system 3848 receives a trigger from the system manager 3870 when it is time to begin final sequencing for dispatch. Shuttles are pulled from storage and sent directly to the sequencer 3840 (see FIG. 38I) function. The conveyor controller and divert controller manage the fundamentals of shuttle movement within the storage by, for example, determining locations and positions of the shuttles, loading areas, etc. These components of the storage manager 3845 also monitor the function for jams, failures, or obstructions and if detected, dynamically select an alternative path within the storage manager 3845. Empty frames that pass or bypass automated inspection in the frame manager 3820 (see FIG. 38D) are sent to the storage manager 3845 via the transport controller 3835 (see FIG. 38H).

The storage manager 3845 provides the storage space for all empty frames in the system. Requests for empty frames are received from each input segment. The empty frame dispatcher of system 3848 handles the process of sending the correct quantity and type of empty frames to the frame inserter 3815 (see FIG. 38F). Frames are sent to the input segment via the transport controller 3835 function. In the event that the volume of empty frames in a storage unit is depleted below a configurable threshold, the empty frame dispatcher sends an alert to the frame manager 3820.

The flats expiration handler of system 3848 checks for buffered frames containing flats mail pieces that are awaiting an address result. The flats ID tag is periodically queried in the FICS system to locate the address. If an address is found, the address is validated against the sort allocation plan and if valid, the address is assigned to the mail piece attributes and the frame is sent out via the transport controller 3835 to be sorted/pre-sequenced. If no address is found within a configurable timeout threshold or the address is found but is determined to be invalid, then a mail piece extractor can remove the mail piece from the frame and into a hold out bin from further processing. The empty frame is retained in storage. Also, the storage manager function includes self diagnosis and testing software as well as maintenance and calibration, both of which can be communicated to the system manager.

FIG. 38K shows the details of a container loader function. Additional details of this function are discussed in other sections of the instant application, as well as in the following description. The container loader 3850 extracts mail pieces from frames and loads containers for dispatch. In embodiments, a common container type is utilized for all destinating mail. Outgoing flats mail is loaded into standard flats delivery trays. Mail for each route or outgoing destination is placed into separate containers. Frames are received in shuttles in a continuous stream for loading. Each container is either filled with mail pieces for one delivery route or mail pieces for a set of post office boxes at an AO or DU. Containers are filled completely, other than the last container for a route or set of post office boxes.

Shuttles are received from the sequencer 3840 (see FIG. 38I) along with the frame manifest. The frame manifest identifies the destination of the frames that are listed in the manifest. A shuttle unloader 3851, e.g., docking station, removes the frames from each shuttle. Each frame passes through the frame reader 3852, which reads the frame ID and provides it to a frame monitor 3853. The frame monitor 3853 updates the frame manifest to indicate each frame ID that is received and sends the updated manifest to a frame tracking agent 3865 (see FIG. 38M) to update frame location data. A mail piece extractor 3854, e.g., frame extractor, performs the process of automatically removing the mail pieces from the frames. Empty frames are placed back into the empty shuttles by a shuttle loader 3859 and returned to the frame manager 3820 (see FIG. 38D) via the transport controller 3835 (see FIG. 38H).

A container load handler 3855 performs the task of filling the correct containers with mail pieces and determines when to start loading a new container. The sequence of all mail is maintained during the extraction and load process. Mail piece orientation is also maintained. The container load handler 3855 requests each type of container from a container storage unit controller 3856, when needed. After each container is loaded, the container load handler 3855 creates, prints, and applies a container label that identifies the container contents. Rolls of blank label stock are periodically loaded by an operator.

The container load handler 3855 also sends the container ID along with every container to a container dispatcher. The container ID is also sent to the system manager 3870 (see FIG. 39) to be recorded in preparation for transfer to the USPS Surface Visibility System. Status and alerts are displayed on a container loader operator console.

The container loader 3850 function also manages the manual induction process of empty containers. The induction process is controlled via a dedicated machine control interface, i.e., an induction unit controller 3857, that allows the operator to start and stop the container induction unit. The start operation sounds an alarm for safety. A container receiver 3858 pulls in empty containers at the container induction station and the container storage unit controller 3856 manages the storage of containers in a container storage unit and provides empty containers to the container load handler 3855. In the event that the volume of containers in the container storage unit is depleted below a configurable threshold, the container storage unit controller 3856 sends an alert to the container loader operator console. Also, the container loader includes self diagnosis and testing software as well as maintenance and calibration, both of which can be communicated to the system manager.

FIG. 38L shows the details of a container dispatcher function. Additional details of this function are discussed in other sections of the instant application as well as in the following description. The container dispatcher 3860 transports each container to its designated dispatch preparation area within the P&DC. Containers are received from a container loader 3850 (see FIG. 38K). The ID of each container is also received, although not necessarily at the same time as the container (due to transport time). The container IDs are tracked by a container monitor 3861, which sets the status of the container to "Not Received". As each container is received, the container ID is read by a container reader 3862 and provided to the container monitor 3861, which updates the status of the container to "Received". A dispatch console displays the status of all containers to the mail handler. A controller system 3863 includes a dispatch selector and a conveyor controller. The dispatch selector accesses a dispatch plan to determine which dispatch preparation area the container should be sent to. Updates to the dispatch plan are sent by the System Manager 3870 (see 39). In embodiments, all container movement to the dispatch preparation area is handled by the conveyor controller. Also, the container dispatch function includes self diagnosis and testing software as well as maintenance and calibration, both of which can be communicated to the system manager.

FIG. 38M shows the details of a frame tracking agent function. Additional details of this function are discussed in other sections of the instant application, as well as in the following description. The frame tracking agent 3865 keeps track of the location of every filled frame within the system and performs validation checking for missing frames. When a mail piece is inserted into a frame, the frame tracking agent 3865 receives the identification data from a frame inserter 3815 (see FIG. 38F) and creates an association of mail piece to frame in a location repository 3866. As frames are moved through the system, each subsystem provides a manifest to the frame tracking agent 3865, which is used to update location information in the location repository 3866. Periodically, a timer function elapses to trigger two tasks, e.g., data integrity 3867 and data aggregation 3868. The timer will be set to elapse during a window of low activity, possibly during system maintenance. The data integrity 3867 task will be triggered first, followed by the data aggregation 3868 task.

The data integrity 3867 task is handled by a missing frame detector, which performs a validation of the location repository 3866 to check for missing frames. Validation metrics are recorded in a validation metrics persistent data store. Missing frame metrics help provide insight into trends on the causes of frame transport failures. Alerts are sent to the system manager 3870 (see FIG. 39) for each missing frame detected. The data aggregation 3868 task is handled by a metrics recorder, which accumulates counts of mail pieces and frames through the various functions within the system and records the results in a mail flow metrics persistent data store. The metrics recorder also purges all records from the location repository 3866 for all frames that were counted during the aggregation task. Metrics collected by the frame tracking agent 3865 are provided to the system manager 3870 for inclusion in an end of run (EOR) report.

FIG. 39 shows the details of a system manager function, which can be implemented on the computing infrastructure of FIG. 1A. Additional details of this function are discussed in other sections of the instant application, as well as in the following description. In embodiments, the system manager 3870 controls the scheduling of all system activity, keeps track of all mail piece identification, collects data from other system functions, interacts with human operators, and interfaces to certain USPS systems. In particular, the system manager performs several groups of tasks or sub-systems, including audit trail 3872 utilizing a mail profile repository 3871, control 3973, reporting 3874, security 3875 and end user utilities 3876.

The system manager 3870 maintains all mail piece attributes in a mail profile repository 3871. The repository 3871 associates all address results with the inducted mail pieces. The system manager 3870 maintains an audit trail of system events and errors. Most events are posted by other system functions, although the system manager 3870 may directly record its own events. A subset of the event data is reported to an integrated data system (IDS). All system errors are reported to a system console and recorded in a system log. Several control 3873 tasks are performed by the system manager 3870, including the following:

- An event timer runs asynchronously to trigger critical system events, such as preparing mail for dispatch. All scheduling data ultimately comes from the system operating procedure (SOP).
- A storage tube manager maintains state data on all storage tubes within all storage units. Either systematic or manually initiated commands may direct the storage tube manager to enable or disable specific storage tubes within a storage unit. Whenever a tube is disabled, updates to a storage allocation plan are sent to the storage manager 3845 (see FIG. 38J). The storage manager 3845 applies these updates to its local table. When a tube is later re-enabled, updates to the plan are again distributed.
- System operating plans are received from the National Data Support System (NDSS). A system plan builder creates several tables that are used by other System functions for sorting, sequencing and dispatching. The presort table is the accumulator allocation plan, used by the presort accumulator 3830 (see FIG. 38G). A sort destination plan is used by the sequencer 3840 (see FIG. 38I) to determine how routes are sorted just prior to initial sequencing. A sequence plan is used by the induction manager 3810 (see FIG. 38C) for address filtering and the sequencer 3840 for all sequencing operations. A storage allocation plan defines which storage areas may be used by the storage manager 3845. A dispatch plan is used by the container dispatcher 3860 (see FIG. 38L) for sending loaded containers to the correct dock staging area. A system plan editor allows limited changes to be made to some of these plans. Plan updates are distributed dynamically to these System functions.

A system configuration manager distributes software updates from IDS to each System function and also provides for the central management and distribution of all configuration data.

The reporting capabilities within the system manager 3870 include the creation of an end of run (EOR) report by a report generator of the reporting system 3874 on a configurable frequency, as required from all USPS mail processing equipment. Other reports may be created from the report generator as well. A dispatch reporter of the system 3874 produces a daily report at the end of every sequencing session that identifies containers and container content. A container dispatcher 3860 (see FIG. 38L) provides the IDs of the containers to the system manager 3870 as they are dispatched. This data is sent to the USPS surface visibility system for overall enterprise tracking of containers.

The system manager 3870 also provides a central point of access to all system functions. A system access manager of the security system 3875 ensures that all access credentials, whether supplied by a user or an external system, are validated. Data protection utilities of the system 3875 provide the capabilities to backup and recover data systematically. A system console, or remote console if available, e.g., I/O shown in FIG. 1, communicates with the system 3876 and displays real-time operational data, alerts, and status and provides several end user utilities. Manual operations allow any GUI selectable commands to be sent to the applicable System function(s). Manual operations of the system 3876 also provide machine control capability to start and stop different components of the System and sound appropriate safety alarms. A diagnostics and self test system of the system 3876 encompasses a suite of capabilities centric to system.

System Configuration Design Analysis in a Facility-Wide Mail Sorting and/or Sequencing System The invention provides, in embodiments, a system configuration for a facility-wide letters/flats mail sorting and/or sequencing system. More specifically, the present invention provides a system configuration design analysis in a facility-wide letters/flats mail sorting and/or sequencing system. Preferably, each system or sub-system utilized therein provides a modular, distributed solution within a USPS mail center, and that is sized and built to handle the anticipated volumes while fitting into the available space throughout the plant floor. Operationally, the system should be configured to ensure that the mail for each route is properly sequenced into a single stream that can be loaded into containers for delivery. The following table 17 lists numerous non-limiting functions for such a system.

TABLE 17

| # | System or sub-system |
|---|---|
| | The system may allocate each Storage Segment to a unique group of destinating ZIP codes based on the daily estimated volume of mail for each ZIP code and the size of each Storage Segment. |
| | A unique group of ZIP codes may be allocated to each Presort Accumulator tube. |
| | ZIP codes may be allocated to Presort Accumulator tubes based on the Storage Segment they are destined to, as determined by the System Configuration Plan. |
| | Every group of ZIP codes may be allocated to one Presort Accumulator tube. |
| | Additional Presort Accumulator tubes may be dynamically allocated for a group of ZIP codes to accommodate mail volume skew or presorted mail. |
| | The system may allow the accumulated mail in any Presort Accumulator tube to be transported to any Sequencer Segment. |
| | The system may require that any single accumulation of mail in a Presort Accumulator tube be sent to one Sequencer Segment. |
| | The group of ZIP codes allocated to each Presort Accumulator tube may be allocated across all tubes within a Pre-Sequence Sorter. |
| | Pre-Sequence Sorter tubes may be allocated to achieve a uniform distribution of mail volume and number of routes, as determined by the System Configuration Plan. |
| | Every route may be allocated to one Pre-Sequence Sorter tube. |
| | Additional Pre-Sequence Sorter tubes may be dynamically allocated to accommodate mail volume skew or presorted mail. |
| | The system may allow mail in any Sequencer Segment to be transported to any Storage Segment. |
| | The system may require that mail in a Sequencer Segment be sent to the Storage Segment that is allocated to the ZIP codes contained in that mail, as determined by the System Configuration Plan. |
| | All mail for a single ZIP code may be stored in the same Storage Segment. |
| | Routes within a ZIP code may be stored in multiple aisles within the same Storage Segment if necessary. |
| | All mail for a single route may be stored in the same aisle. |
| | Mail for each route may be placed into its own container(s). |
| | A single container may hold mail for one carrier delivery route. |
| | A single container may hold mail for one or more routes that serve post office boxes within a single delivery unit. |
| | The system may allow containers to be transported from any Container Loader to any dispatch area. |

TABLE 17-continued

| # | System or sub-system |
|---|---|
| | The system may require that mail for all ZIP codes that dispatch from the same dock stall may be sent to the assigned dispatch area, as determined by the System Configuration Plan. |
| | The system may track all mail flow volume daily by ZIP code and route. |
| | The system may send alerts (i.e., notifications) to the induction feeders to temporarily suspend induction as one method to avoid system bottlenecks. |
| | The system may allow prioritization of ZIP codes to accommodate dispatch schedules. |

It is also desirable to provide a system configuration design analysis in a facility-wide mail piece sorting and/or sequencing system which takes into consideration deliverables such as; volume metrics—volume metrics include the mail volume for each route in each ZIP code; DPS order—the delivery order of every delivery point for every route in every ZIP code includes the complete list of 11-digit (or 9-digit or 5-digit) ZIP codes in DPS order for each route; and a dispatch plan—the P&DC will define the dispatch areas and dock/stall assignments.

In embodiments, the configuration of the system can be provided through several features that are explained in the sections that follow. These features include:

Configuration Plans;
Volume Tracking and Learning;
ZIP Code Prioritization; and
Volume Management, which includes the concepts of ZIP Code Monitoring and Dynamic Allocation.

In embodiments, the system configuration plan can define the strategy and approach for configuring the system to efficiently and systematically handle the sequencing of destinating mail. The system configuration can be comprised of a set of individual configuration plans wherein each configuration plan defines the allocation or use of a specific group of system resources. The name and description of each configuration plan is described in the table 18 below.

TABLE 18

| | |
|---|---|
| Master Configuration | Defines the broad configuration of a system in terms of subsystem quantity and configuration, subsystem mapping, and network (IP) addresses. |
| Accumulator Allocation Plan | Allocates the destinating mail flow to each tube within a Presort Accumulator. |
| Sort Allocation Plan | Allocates the mail flow within each Presort Accumulator tube to each tube within a Sorter and each storage aisle within a Storage Segment. |
| Sequence Plan | Defines the delivery point sequence (DPS) for every delivery point in every route for the mail flow allocated to each Sequencer. |
| Storage Allocation Plan | Allocates the tubes within each aisle of a Storage Segment for mail storage, empty frame storage, and spares. |
| Dispatch Plan | Defines the dispatch areas to send containers to. |

FIG. 40A graphically depicts where each configuration plan can fit within the system configuration. The system configuration 4000 utilizes information provided by an accumulator allocation plan 4001. The information from the plan 4001 is utilized in input segment 1 which utilizes, among other things, a presort accumulator having a number of presort accumulator tubes. The details of this presort accumulator system 3400 are described above in the instant application. A number of input segments 2, 3, n, are also utilized. These input segments 4002 and 4003 feed mail to a main transport 4004. From here, the mail is sequenced. In this regard, some mail will transfer from main transport 4004 to the sequencer segment 1 4005 while other mail will be transferred to sequencer segments 2, 3, . . . n, 4006. The details of sequencing in systems 4005 and 4006 are discussed above in the instant application. These sequencing segments 4005 and 4006 then feed the mail to another main transport 4007. From here, the mail is stored. In this regard, some mail will transfer from main transport 4007 to the storage segment 1 4008 while other mail will be transferred to storage segments 2, 3, . . . n, 4009. The details of storing in systems 4008 and 4009 are discussed above in the instant application. These storage segments 4008 and 4009 then feed the mail to container loaders 4010. From here, the mail is moved to a container transport 4011 and then to a number of dispatch areas 4012. A dispatch plan 4013 is utilized to determine which mail is moved to which particular dispatch area of the dispatch areas 4012. The details of container loader systems 4010 and dispatch system 4012/4013 are discussed above in the instant application. A master configuration control system 4014 interfaces with each of the systems described above in FIG. 40A. The configuration control system 4014 can be implemented as the computing infrastructure of FIG. 1A. Also, the allocation plan discussed herein can be stored in the database shown in FIG. 1A.

FIG. 40B shows a configuration plan build process or system which can be utilized in embodiments. The configuration build process entails using the data received from the P&DC along with the master configuration as input to the process which creates the accumulator allocation plan, sort allocation plan, sequence plan, storage allocation plan, and the dispatch plan shown in FIG. 40A. The build process is performed by an automated system plan builder and validated by a system plan verifier. A system plan editor allows a supervisor to make limited updates to some configuration plans. More specifically, the system or process shown in FIG. 40B utilizes USPS plan 4015 which includes a system operating plan and a dispatch schedule. Information from the system 4015 is provided to a system manager 4016 which includes the system plan builder, the system plan verifier, the master configuration and the system plan editor. Information from the system 4016 is provided to a system configuration plan 4017 which includes an accumulator allocation plan, sort allocation plan, a master configuration, sequence plan, a storage allocation plan, and a dispatch plan.

The configuration plans which can be utilized in embodiments will now be described. These plans include a master configuration plan which can be utilized to define the individual components and quantity of those components. This plan is created during the installation and setup of the system and may be modified as the system hardware is changed or reallocated. In embodiments, the master configuration plan can be created during the installation and setup of the system and may be modified as the hardware is changed or re-allocated. The master configuration plan can preferably utilize several types of information as follows:

System Segment configuration data;

IP Address configuration data;

Mapping configuration data; and

Storage Segment configuration data.

The configuration plans can also include system segment configuration data which lists the overall quantities of system segments and where applicable, the number of tubes per segment in input segment 1 4002, for one contemplated embodiment. The system is not limited to such configuration, though, as different configurations are also applicable depending on customer requirements and needs. The system configuration data can include the listed items in the following table 19.

TABLE 19

| | | | |
|---|---|---|---|
| # Input Segments | 11 | # Tubes per Presort Accumulator | 10 |
| # Sequencer Segments | 10 | # Tubes per Pre-Sequence Sorter | 5 |
| # Stages per Sequencer Segment | 3 | # Tubes per Sequencer Stage | 6 |
| # Post-Sequence Collectors per Sequencer Segment | 5 | # Tubes per Post-Sequence Collector | 8 |
| # Storage Segments | 10 | # Aisles per Storage Segment | 5 |
| # Container Loader Segments | 50 | # Dispatch Areas | 6 |

The configuration plans can also include IP address configuration data. The IP address configuration data provides, in embodiments, the IP address of every system segment. This information is needed for communication between segments. The IP address configuration data can include the listed items in table 20.

TABLE 20

| Input Segment | IP Addr | Sequencer Segment | IP Addr | Storage Segment | IP Addr | Container Loader Segment | IP Addr |
|---|---|---|---|---|---|---|---|
| Presort1 | x.x.x.x | Seq1 | x.x.x.x | Stor1 | x.x.x.x | Ldr1 | x.x.x.x |
| Presort2 | x.x.x.x | Seq2 | x.x.x.x | Stor2 | x.x.x.x | Ldr2 | x.x.x.x |

The configuration plans can also include mapping configuration data which preferably defines the preferred mapping between system segments for the transfer of mail pieces and frames. Utilizing the architecture, each system will have n storage segments based on its storage needs. In embodiments, the presort accumulator will have as many accumulator tubes as there are storage segments. In embodiments, the pre-sequence sorter will have as many sorter tubes as there are aisles within each storage segment. Each presort accumulator tube feeds one of the storage segments as defined in the accumulator allocation plan. The accumulator mapping configuration data lists the preferred sequencer segment that is to receive each tube's frames. However, any available sequencer segment can serve any accumulator tube. The accumulator and sequencer mapping configuration data can include the following data in table 21 below.

TABLE 21

| Presort Accumulator tube | # mail pieces per tube | Sequencer Segment | Sequencer Segment | # mail pieces per tube | Storage Segment |
|---|---|---|---|---|---|
| 1 | 200 | Seq1 | Seq1 | 200 | Stor1 |
| 2 | 200 | Seq2 | Seq2 | 200 | Stor2 |
| 3 | 200 | Seq3 | Seq3 | 200 | Stor3 |
| 4 | 200 | Seq4 | Seq4 | 200 | Stor4 |
| 5 | 200 | Seq5 | Seq5 | 200 | Stor5 |
| . . . | | . . . | . . . | | . . . |
| 10 | 200 | Seq10 | Seq10 | 200 | Stor10 |

The storage segment mapping configuration data can include the following data in table 22 below.

TABLE 22

| Storage Segment | Storage Aisle | Container Loaders |
|---|---|---|
| Stor1 | 1 | Ldr1, Ldr2, Ldr3, Ldr4, Ldr5, Ldr6, Ldr7 |
| Stor1 | 2 | Ldr8, . . . , Ldr14 |
| Stor1 | 3 | Ldr15, . . . , Ldr21 |
| Stor1 | 4 | Ldr22, . . . , Ldr28 |
| Stor1 | 5 | Ldr29, . . . , Ldr35 |
| Stor2 | 1 | Ldr36, . . . , Ldr42 |
| Etc. | | |

The configuration plans can also include storage segment configuration data which defines the size of every storage segment in the system. Each storage segment may contain a different volume of mail depending on its size, but the size of each tube within a storage segment should be identical and the number of tubes per storage aisle within a storage segment can be identical. It is also assumed that the number of aisles within each storage segment can be identical, although other numbers are also contemplated by the invention.

The following describes an exemplary storage aisle tube calculation that can be utilized in the present invention. The number of mail pieces per storage tube is based on 50.4 mail pieces per foot, with 2 feet used on top for the travel lane and 2 feet on the bottom for the frame height. If tubes are inclined at a 30° angle, then an 8 feet high aisle has 8 feet tubes, 12 feet high aisles have 16 feet tubes, and 16 feet high aisles have 24 feet tubes. Note that these numbers are based on mail pieces of average thickness: mail feet/tube=Height of storage aisle−2 feet top−2 ft bottom)/sin 30°; and mail pieces/tube=(Height of storage aisle−2 feet top−2 feet bottom)/sin 30°)*50.4 mail pieces/foot.

Ex. 8 ft high aisles:

$$((8-4)/\sin 30°)=8 \text{ mail feet/tube}$$

$$((8-4)/\sin 30°)*50.4=403.4 \text{ mail pieces/tube}$$

12 ft high aisles:

$$((12-4)/\sin 30°)=16 \text{ mail feet/tube}$$

$$((12-4)/\sin 30°)*50.4=806.4 \text{ mail pieces/tube}$$

16 ft high aisles:

$$((16-4)/\sin 30°)=24 \text{ mail feet/tube}$$

$$((16-4)/\sin 30°)*50.4=1209.6 \text{ mail pieces/tube.}$$

Table 23 shows an example of the configuration of all storage segments and shows storage segment configuration data. The data in this example is the basis for the configuration plan examples that are described in the sections that follow.

TABLE 23

| Storage Segment | # aisles per segment | Storage aisle height | # tubes per aisle | # mail feet per tube | # mail pieces per tube | # mail pieces per segment |
|---|---|---|---|---|---|---|
| Stor1 | 8 | 16 | 80 | 24 | 1210 | 774,144 |
| Stor2 | 8 | 16 | 60 | 24 | 1210 | 580,608 |
| Stor3 | 8 | 12 | 80 | 16 | 806 | 516,096 |
| Stor4 | 8 | 12 | 60 | 16 | 806 | 387,072 |
| Stor5 | 8 | 12 | 60 | 16 | 806 | 387,072 |
| Stor6 | 8 | 12 | 60 | 16 | 806 | 387,072 |
| Stor7 | 8 | 8 | 80 | 8 | 403 | 258,048 |
| Stor8 | 8 | 8 | 80 | 8 | 403 | 258,048 |
| Stor9 | 8 | 8 | 60 | 8 | 403 | 193,536 |
| Stor10 | 8 | 8 | 60 | 8 | 403 | 193,536 |
| | | | | | Total volume: | 3,935,232 |

The configuration plans can also include an accumulator allocation plan. The purpose of the accumulator allocation plan is to allocate each tube of a presort accumulator to a unique subset of the entire domain of destinating mail. In embodiments, every input segment within the system has its own presort accumulator and every presort accumulator has the same number of tubes. Each presort accumulator is comprised of n accumulation tubes, where n is defined in the system master configuration plan. All tubes within a presort accumulator have the same length. However, tube length may vary from one presort accumulator to another. The length of a tube does not affect the accumulator allocation plan, because once an accumulator tube fills up to a configurable threshold, its contents are immediately sent to a Sequencer Segment.

The domain of destinating mail is preferably divided into subsets that are comprised of unique groups of ZIP codes. Each group of ZIP codes is allocated to a different accumulator tube. The grouping of ZIP codes is preferably based on two criteria: (1) the average daily mail volume of the ZIP codes in each group; and (2) the volume of mail that can be contained by the Storage Segment assigned to each group of ZIP codes. During presorted mail induction, additional accumulator tubes may be dynamically allocated as needed to maintain induction throughput. Additional information on dynamic allocation is discussed below.

As shown in FIG. 40C, the output of each accumulator tube of input segment 4019 follows a path through the rest of the system. Specifically, input segment 1 4019 sends mail through sequencer segment 1 4021 and on to storage segment 1 4024. However, any sequencer segment 4021/4022 can serve the needs of any input segment 4019; therefore, alternate paths are available to reach a storage segment 4024/4025. Furthermore, multiple sequencer segments may serve a specific input segment at any one time, which can help alleviate congestion due to mail volume skew and presorted mail induction. Note that only one input segment is shown in the figure; however, each input segment can have the same configuration. As with the configuration shown in FIG. 40A, the exemplary configuration 4018 of FIG. 40C utilizes main transports 4020 and 4023, as well as container loader segments 4026, a container transport 4027, and dispatch areas 4028.

Table 24 shows an exemplary plan creation process which utilizes a five-step process to create the accumulator allocation plan.

TABLE 24

| | |
|---|---|
| Step 1 | Determine the number of docks for dispatch<br>It is assumed that a P&DC has at most two docks for dispatch, but it really doesn't matter to the overall process. The Master Configuration will provide the number of docks for dispatch. |
| Step 2 | Count the total Average Daily Mail Volume of all ZIP codes that dispatch from each dock<br>The Dispatch Schedule (for destinating mail) provides the assignment of each ZIP code to each dock and truck stall. The Dispatch Schedule is new for the system and a necessary input to the Configuration Plan build process.<br>It is assumed that mail volume data by ZIP code is available from the mail facility. This data is needed because mail volume cannot be predicted by the number of routes or delivery points.<br>It is also assumed that a specific ZIP code will dispatch from only one dock.<br>The total mail volume for each dock may be represented as $VOL_{D1}$ and $VOL_{D2}$ |
| Step 3 | Determine the number of accumulator tubes to allocate for each dock<br>If the P&DC only has one dock, then all accumulator tubes may be allocated to the one dock. Otherwise, a calculation is performed to determine the number of accumulator tubes to allocate for each dock. The number of tubes to allocate is based on the average daily mail volume of all ZIP codes that dispatch from the dock.<br>The calculation is rounded up or down to the nearest whole number:<br>$ACC_{D1} = (VOL_{D1}/(VOL_{D1} + VOL_{D2})) \times \#Tubes$<br>$ACC_{D2} = \#Tubes - ACC_{D1}$ |
| Step 4 | Order all ZIP codes within each dock by the estimated daily mail volume in descending order<br>Volume metrics will ultimately be provided by the P&DC. The data will be provided in a look-up table that can be accessed by the System Manager. The data should include the mail volume for each ZIP code. |
| Step 5 | Assign ZIP codes to accumulator tubes<br>ZIP codes are assigned to accumulator tubes in a round-robin fashion. Volume totals by tube are maintained while working through the list of ZIP codes. The combined total daily mail volume for each ZIP code assigned to an accumulator tube may not exceed the maximum volume for the assigned Storage Segment. |

Using data from a city P&DC, as an example, the dock and stall assignments for each ZIP code, as defined in the dispatch schedule, are shown in the following table 25 (illustrating an accumulator allocation plan worksheet) for a non-limiting example. The example is based on a presort accumulator that has 10 tubes. Note that these mail volumes are estimates.

Per Step 1, city has two docks for dispatches.

Per Step 2, $VOL_{South}$=1,156,439 and $VOL_{North}$=1,199,899.

Per Step 3, the number of tubes assigned to each dock yields an even split, with $ACC_{South}$=(1,156,439/(1,156,439+1,199,899))×10=4.9 rounded up to 5 and $ACC_{North}$=10−5=5.

Per Step 4, the ZIP codes are grouped by dock and ordered by descending volume, as shown in the table below.

Per Step 5, all ZIP codes are allocated to accumulator tubes in round-robin fashion, which are color-coded by tube number. This is also shown in table 25 below.

TABLE 25

| Dispatches | | | Avg Daily | |
|---|---|---|---|---|
| 1 Zone | Total Zones Dock | Stall | Volume 1,156,439 | Presort Tube |
| 33170 | South | 4 | 7,323 | 1 |
| 33177 | South | 4 | 59,889 | 1 |
| 33187 | South | 4 | 24,256 | 1 |
| 33156 | South | 5 | 86,641 | 1 |
| 33158 | South | 5 | 22,650 | 1 |
| 33159 | South | 5 | 186 | 1 |
| 33256 | South | 5 | 5,040 | 1 |
| 33155 | South | 6 | 57,055 | 2 |
| 33245 | South | 6 | 1,334 | 1 |
| 33157 | South | 7 | 103,458 | 2 |
| 33189 | South | 7 | 27,667 | 2 |
| 33190 | South | 7 | 11,444 | 1 |
| 33197 | South | 7 | 8,825 | 1 |
| 33165 | South | 8 | 51,049 | 3 |
| 33175 | South | 8 | 74,866 | 3 |
| 33185 | South | 8 | 30,983 | 2 |
| 33265 | South | 8 | 5,300 | 1 |
| 33116 | South | 9 | 10,695 | 2 |
| 33176 | South | 9 | 99,042 | 3 |
| 33101 | South | 10 | 7,143 | 3 |
| 33102 | South | 10 | 1,533 | 4 |
| 33111 | South | 10 | 393 | 4 |
| 33128 | South | 10 | 2,408 | 4 |
| 33129 | South | 10 | 27,356 | 4 |
| 33130 | South | 10 | 9,693 | 4 |
| 33131 | South | 10 | 44,512 | 4 |
| 33132 | South | 10 | 7,978 | 4 |
| 33136 | South | 10 | 5,336 | 4 |
| 33152 | South | 10 | 1,287 | 4 |
| 33231 | South | 10 | 1,215 | 4 |
| 33114 | South | 11 | 8,481 | 4 |
| 33134 | South | 11 | 74,653 | 4 |
| 33234 | South | 11 | 2,091 | 4 |
| 33143 | South | 12 | 58,721 | 5 |
| 33243 | South | 12 | 2,400 | 4 |
| 33257 | South | 13 | 2,472 | 4 |
| 33296 | South | 13 | 2,034 | 4 |
| 33154 | South | 14 | 26,947 | 4 |
| 33280 | South | 14 | 2,430 | 4 |
| 33109 | South | 15 | 613 | 4 |
| 33119 | South | 15 | 1,288 | 4 |
| 33139 | South | 15 | 48,939 | 5 |
| 33239 | South | 15 | 576 | 4 |
| 33142 | South | 16 | 19,016 | 5 |
| 33242 | South | 16 | 482 | 4 |
| 33266 | South | 16 | 4,050 | 4 |
| 33299 | South | 16 | 2,328 | 5 |
| 33144 | South | 17 | 15,799 | 5 |
| 33127 | South | 18 | 9,221 | 5 |
| 33137 | South | 18 | 24,481 | 5 |
| 33151 | South | 18 | 1,155 | 5 |
| 33153 | South | 18 | 2,898 | 5 |
| 33149 | South | 19 | 48,809 | 5 |

| Dispatches | | | Avg Daily | |
|---|---|---|---|---|
| 1 Zone | Total Zones Dock | Stall | Volume 1,199,899 | Presort Tube |
| 33166 | North | 30 | 56,173 | 6 |
| 33140 | North | 31 | 50,823 | 6 |
| 33172 | North | 32 | 29,822 | 6 |
| 33222 | North | 32 | 1,294 | 6 |
| 33180 | North | 33 | 76,607 | 6 |
| 33173 | North | 34 | 61,375 | 7 |
| 33183 | North | 34 | 50,548 | 7 |
| 33193 | North | 34 | 41,532 | 7 |
| 33125 | North | 35 | 17,239 | 6 |

TABLE 25-continued

| | | | | |
|---|---|---|---|---|
| 33135 | North | 35 | 14,358 | 7 |
| 33122 | North | 36 | 8,078 | 6 |
| 33178 | North | 36 | 85,412 | 8 |
| 33147 | North | 37 | 14,116 | 7 |
| 33247 | North | 37 | 1,357 | 7 |
| 33167 | North | 40 | 9,559 | 7 |
| 33168 | North | 40 | 11,426 | 7 |
| 33186 | North | 41 | 114,722 | 8 |
| 33196 | North | 41 | 54,348 | 9 |
| 33161 | North | 42 | 22,405 | 7 |
| 33181 | North | 42 | 14,864 | 7 |
| 33261 | North | 42 | 1,632 | 8 |
| 33169 | North | 43 | 31,276 | 8 |
| 33179 | North | 43 | 41,745 | 9 |
| 33269 | North | 43 | 4,362 | 8 |
| 33141 | North | 44 | 26,070 | 9 |
| 33138 | North | 45 | 36,067 | 9 |
| 33150 | North | 45 | 10,414 | 9 |
| 33238 | North | 45 | 1,276 | 8 |
| 33133 | North | 46 | 59,451 | 9 |
| 33233 | North | 46 | 2,805 | 9 |
| 33160 | North | 47 | 49,360 | 10 |
| 33162 | North | 47 | 21,057 | 10 |
| 33163 | North | 47 | 1,488 | 9 |
| 33164 | North | 47 | 2,427 | 9 |
| 33174 | North | 48 | 20,929 | 10 |
| 33182 | North | 48 | 20,387 | 10 |
| 33184 | North | 48 | 20,296 | 10 |
| 33194 | North | 48 | 2,684 | 9 |
| 33145 | North | 49 | 17,957 | 10 |
| 33245 | North | 49 | 1,334 | 9 |
| 33124 | North | 50 | 2,170 | 10 |
| 33146 | North | 52 | 63,134 | 10 |
| 33126 | North | 53 | 25,520 | 10 |

Total volumes:

| | | |
|---|---|---|
| Tube | 1 | 232,888 |
| | 2 | 229,858 |
| | 3 | 232,100 |
| | 4 | 230,227 |
| | 5 | 231,366 |
| | 6 | 240,037 |
| | 7 | 241,540 |
| | 8 | 238,680 |
| | 9 | 238,833 |
| | 10 | 240,810 |

As a result of applying this process, the accumulator allocation plan for an exemplary city would conceptually look as follows in table 26 below.

TABLE 26

| Accumulator tube | ZIP codes |
|---|---|
| 1 | 33136, 33144, 33149, 33152, 33153, 33154, 33157, 33177, 33197, 33242, 33299 |
| 2 | 33111, 33114, 33131, 33137, 33143, 33176, 33190, 33231, 33234, 33257, 33265 |
| 3 | 33116, 33132, 33151, 33155, 33156, 33159, 33185, 33187, 33256, 33280, 33296 |
| 4 | 33102, 33109, 33128, 33130, 33158, 33165, 33170, 33175, 33189, 33266 |
| 5 | 33101, 33119, 33127, 33129, 33134, 33139, 33142, 33239, 33243, 33255 |
| 6 | 33124, 33133, 33150, 33160, 33163, 33172, 33174, 33181, 33186, 33222, 33269 |
| 7 | 33135, 33141, 33166, 33167, 33178, 33179, 33182, 33233, 33247 |
| 8 | 33122, 33126, 33147, 33180, 33184, 33193, 33194, 33196, 33238, 33245, 33261 |
| 9 | 33138, 33140, 33145, 33146, 33161, 33164 |
| 10 | 33125, 33162, 33168, 33169, 33173, 33183 |

Applying the data in this example to the overall configuration, the system configuration diagram would have the configuration accumulator allocation plan 4030 shown in FIG.

40D, which includes input segment 4031, sequencer segments 4033 and 4034, storage segments 4036 and 4037, container loader segments 4038, and dispatch areas 4040. As with the configuration shown in FIG. 40A, the exemplary configuration 4030 of FIG. 40D utilizes main transports 4032 and 4035, as well as a container transport 4039.

The system also utilizes a sort allocation plan which can preferably define which pre-sequence sorter tube a mail piece frame should be placed in. In embodiments, the pre-sequence sorter is the first of two components of a sequencer segment, which also includes the sequencer stages. Just as a presort accumulator provides a breakdown of the total destinating mail flow, a sorter can provide a further breakdown of the mail flow allocated to a specific accumulator tube. Each sequencer segment may receive mail from any accumulator tube of any presort accumulator. Therefore, each sequencer segment should be capable of sequencing different subsets of destinating mail as determined by the ZIP codes contained in each group of received mail. The group of ZIP codes will preferably always match one of the tubes in the accumulator allocation plan.

Each pre-sequence sorter is preferably comprised of n tubes, as defined in the master configuration plan. The length of tubes may vary across each sequencer segment, but all tubes within a single segment will have the same length. Pre-sequence sorter tubes will fill depending on the flow of mail. Once a tube fills to a configurable threshold, the tube contents are sent to the sequencer stages. During presorted mail induction, additional pre-sequence sorter tubes may be dynamically allocated as needed to maintain induction throughput. Additional details on dynamic allocation are discussed below.

The sort allocation plan attempts to balance the estimated volume of mail and number of routes across pre-sequence sorter tubes. Balancing the volume of mail minimizes the possibility that a specific tube could become overloaded. Balancing the number of routes helps to balance the quantity of containers to load for dispatch across the loaders in each container segment. To achieve this balance, all routes are preferably ordered by volume (highest to lowest) and assigned in a round-robin fashion to each pre-sequence sorter tube. The sort allocation plan also defines which aisle of a storage segment to place the frames in. The groups defined in the sort allocation plan, one per pre-sequence sorter tube, are directly mapped to each aisle in the destination storage segment.

Table 27 shows an exemplary plan creation process illustrating a five-step process used to create the sort allocation plan.

TABLE 27

| | |
|---|---|
| Step 1 | Determine the number of tubes in the Pre-Sequence Sorter ($N_S$)<br>This value is contained in the Master Configuration Plan. |
| Step 2 | Determine the groups of ZIP codes to allocate to the Pre-Sequence Sorter<br>This information is contained in the Accumulator Allocation Plan. Since any accumulator tube can send mail to any Sequencer Segment, the remaining steps should be repeated for each group of ZIP codes per accumulator tube. |
| Step 3 | Calculate the mail volume allocation per Pre-Sequence Sorter tube<br>Volume metrics will ultimately be provided by the P&DC. Volume per tube is determined by totaling the daily estimated volume of each ZIP code and dividing by the number of Pre-Sequence Sorter tubes.<br>$VOL_S = (\Sigma_1^N VOL_Z)/N_S$<br>The allocation process is made more flexible by deriving a volume range, using the average volume as the minimum volume and +8% of the average volume as the maximum volume. This percentage is configurable and is adjusted on a site-by-site basis to ensure each route gets allocated to a tube and mail volume is evenly distributed.<br>Range = $VOL_S$ to $VOL_S$ * 1.08 |
| Step 4 | Order all routes for the set of ZIP codes by the estimated daily mail volume for each route in descending order<br>Volume metrics will ultimately be provided by the P&DC. The data will be provided in a look-up table that can be accessed by the System Manager. The data should include the mail volume for each route in each ZIP code. |
| Step 5 | Allocate the ZIP codes by routes to the Pre-Sequence Sorter tubes<br>Routes are assigned to tubes by working through the list of ordered routes in a round-robin fashion and maintaining a total volume accumulation. The total volume per tube should be within the range calculated in Step 3. |

Using data from the P&DC, the volume metrics (estimated) by route for all ZIP codes allocated to presort accumulator tube 1 are shown in the table (sort allocation plan worksheet) below.

Per Step 1, there are 5 tubes in the Pre-Sequence Sorter, as defined in the Master Configuration Plan.

Per Step 2, each Presort Accumulator tube contains a unique group of ZIP codes and each group should be allocated separately per Steps 3-5. For this example, only accumulator tube 1 will be allocated. There are 11 ZIP codes in accumulator tube 1 to allocate to the Pre-Sequence Sorter, as determined by the Accumulator Allocation Plan.

Per Step 3, the average daily volume of mail to allocate per Sorter tube is:

$$VOL_S=(\Sigma_1^N VOL_Z)/N_S=276{,}057/5=55{,}212$$

$$\text{Range}=VOL_S \text{ to } VOL_S*1.08=55{,}212 \text{ to } 59{,}629$$

Per Step 4, the volume data is ordered by route as shown in the table below.

Per Step 5, all routes are allocated to tubes in a round-robin fashion, which may be color-coded by tube number.

After allocation is complete, the total volume and number of routes allocated to each pre-sequence sorter tube is:

| | | | | | |
|---|---|---|---|---|---|
| Tube | 1 | Vol | 59,628 | Routes | 96 |
| | 2 | | 57,903 | | 103 |
| | 3 | | 56,635 | | 103 |
| | 4 | | 55,545 | | 103 |
| | 5 | | 54,260 | | 103 |

TABLE 28

| Zone | Route | Vol. | Tube |
|---|---|---|---|
| 33149 | C081 | 6300 | 1 |
| 33149 | C074 | 5018 | 2 |
| 33149 | C073 | 4755 | 3 |
| 33177 | C019 | 4505 | 4 |
| 33157 | C050 | 4440 | 5 |
| 33149 | C085 | 4343 | 1 |
| 33177 | C011 | 4223 | 2 |
| 33177 | C010 | 3975 | 3 |
| 33157 | C015 | 3560 | 4 |
| 33149 | C079 | 3698 | 5 |
| 33157 | C036 | 3668 | 1 |
| 33177 | C008 | 3625 | 2 |
| 33157 | C013 | 3610 | 3 |
| 33177 | C022 | 3535 | 4 |
| 33157 | C053 | 3330 | 5 |
| 33157 | C041 | 3315 | 1 |
| 33177 | C017 | 3280 | 2 |
| 33177 | C018 | 3140 | 3 |
| 33157 | C008 | 3053 | 4 |
| 33154 | C014 | 3008 | 5 |
| 33157 | C020 | 3000 | 1 |
| 33157 | C025 | 2963 | 2 |
| 33157 | C039 | 2960 | 3 |
| 33157 | C002 | 2950 | 4 |
| 33149 | C089 | 2940 | 5 |
| 33177 | C015 | 2811 | 1 |
| 33177 | C023 | 2781 | 2 |
| 33144 | C038 | 2738 | 3 |
| 33157 | C012 | 2730 | 4 |
| 33157 | C035 | 2715 | 5 |
| 33157 | C047 | 2710 | 1 |
| 33177 | C014 | 2675 | 2 |
| 33157 | C046 | 2610 | 3 |
| 33157 | C022 | 2570 | 4 |
| 33154 | C002 | 2558 | 5 |
| 33177 | C013 | 2526 | 1 |
| 33157 | C045 | 2510 | 2 |
| 33157 | C019 | 2505 | 3 |
| 33157 | C011 | 2470 | 4 |
| 33157 | C034 | 2453 | 5 |
| 33177 | C020 | 2421 | 1 |
| 33157 | C049 | 2385 | 2 |
| 33177 | C024 | 2382 | 3 |
| 33154 | C005 | 2364 | 4 |
| 33157 | C007 | 2318 | 5 |
| 33154 | C018 | 2307 | 1 |
| 33154 | C009 | 2298 | 2 |
| 33177 | C021 | 2295 | 3 |
| 33157 | C017 | 2290 | 4 |
| 33154 | C003 | 2259 | 5 |
| 33149 | C088 | 2250 | 1 |
| 33157 | C029 | 2250 | 2 |
| 33157 | C037 | 2213 | 3 |
| 33149 | C080 | 2205 | 4 |
| 33149 | C071 | 2085 | 5 |
| 33157 | C016 | 2085 | 1 |
| 33149 | C086 | 2063 | 2 |
| 33154 | C004 | 2048 | 3 |
| 33149 | C078 | 2025 | 4 |
| 33154 | C011 | 2007 | 5 |
| 33177 | C025 | 1938 | 1 |
| 33149 | C072 | 1928 | 2 |
| 33157 | C014 | 1875 | 3 |
| 33157 | C054 | 1818 | 4 |
| 33177 | C009 | 1734 | 5 |
| 33157 | C021 | 1731 | 1 |
| 33154 | C008 | 1695 | 2 |
| 33157 | C042 | 1686 | 3 |
| 33144 | C048 | 1683 | 4 |
| 33157 | C003 | 1677 | 5 |
| 33157 | C043 | 1629 | 1 |
| 33177 | C001 | 1614 | 2 |
| 33177 | C006 | 1575 | 3 |
| 33149 | C076 | 1449 | 4 |
| 33149 | C075 | 1425 | 5 |
| 33144 | C046 | 1416 | 1 |
| 33177 | C003 | 1416 | 2 |
| 33157 | C051 | 1401 | 3 |

TABLE 28-continued

| Zone | Route | Vol. | Tube |
|---|---|---|---|
| 33157 | C023 | 1395 | 4 |
| 33177 | C002 | 1347 | 5 |
| 33157 | C040 | 1293 | 1 |
| 33157 | C031 | 1260 | 2 |
| 33157 | C025 | 1239 | 3 |
| 33157 | C024 | 1221 | 4 |
| 33157 | C018 | 1188 | 5 |
| 33149 | C077 | 1182 | 1 |
| 33157 | C009 | 1170 | 2 |
| 33157 | C032 | 1116 | 3 |
| 33154 | C001 | 1056 | 4 |
| 33177 | C004 | 865 | 5 |
| 33157 | C038 | 848 | 1 |
| 33177 | C012 | 830 | 2 |
| 33157 | C005 | 774 | 3 |
| 33136 | C079 | 747 | 4 |
| 33144 | C030 | 743 | 5 |
| 33154 | C010 | 717 | 1 |
| 33157 | C030 | 708 | 2 |
| 33136 | C080 | 683 | 3 |
| 33157 | C048 | 680 | 4 |
| 33157 | C026 | 663 | 5 |
| 33136 | C078 | 634 | 1 |
| 33136 | C082 | 633 | 2 |
| 33144 | C037 | 570 | 3 |
| 33154 | C006 | 565 | 4 |
| 33157 | C010 | 564 | 5 |
| 33157 | C006 | 550 | 1 |
| 33136 | C081 | 550 | 2 |
| 33144 | C047 | 549 | 3 |
| 33144 | C043 | 534 | 4 |
| 33144 | C032 | 529 | 5 |
| 33157 | C052 | 519 | 1 |
| 33154 | C012 | 515 | 2 |
| 33144 | C042 | 513 | 3 |
| 33144 | C040 | 509 | 4 |
| 33144 | C045 | 502 | 5 |
| 33144 | C044 | 502 | 1 |
| 33144 | C041 | 489 | 2 |
| 33157 | C044 | 486 | 3 |
| 33144 | C033 | 479 | 4 |
| 33154 | C007 | 479 | 5 |
| 33154 | C016 | 479 | 1 |
| 33144 | C035 | 475 | 2 |
| 33136 | C083 | 467 | 3 |
| 33136 | C085 | 458 | 4 |
| 33177 | C005 | 454 | 5 |
| 33144 | C034 | 441 | 1 |
| 33157 | C033 | 439 | 2 |
| 33144 | C036 | 436 | 3 |
| 33136 | C077 | 424 | 4 |
| 33157 | C004 | 402 | 5 |
| 33144 | C039 | 400 | 1 |
| 33157 | C001 | 397 | 2 |
| 33157 | C027 | 389 | 3 |
| 33144 | C031 | 369 | 4 |
| 33136 | C084 | 329 | 5 |
| 33197 | B100 | 305 | 1 |
| 33154 | C013 | 302 | 2 |
| 33149 | B001 | 285 | 3 |
| 33149 | B008 | 285 | 4 |
| 33149 | B002 | 278 | 5 |
| 33149 | B004 | 278 | 1 |
| 33149 | B005 | 263 | 2 |
| 33157 | C056 | 256 | 3 |
| 33152 | B047 | 249 | 4 |
| 33149 | B006 | 248 | 5 |
| 33149 | B007 | 240 | 1 |
| 33152 | B013 | 240 | 2 |
| 33197 | B002 | 240 | 3 |
| 33136 | C076 | 237 | 4 |
| 33197 | B017 | 235 | 5 |
| 33197 | B003 | 230 | 1 |
| 33197 | B001 | 225 | 2 |
| 33197 | B005 | 225 | 3 |
| 33152 | B031 | 222 | 4 |
| 33197 | B006 | 220 | 5 |
| 33152 | B038 | 219 | 1 |

TABLE 28-continued

| Zone | Route | Vol. | Tube |
|---|---|---|---|
| 33149 | B010 | 210 | 2 |
| 33197 | B004 | 210 | 3 |
| 33197 | B012 | 205 | 4 |
| 33197 | B021 | 205 | 5 |
| 33197 | B043 | 205 | 1 |
| 33149 | B003 | 203 | 2 |
| 33197 | B013 | 200 | 3 |
| 33197 | B015 | 200 | 4 |
| 33149 | B009 | 195 | 5 |
| 33197 | B009 | 195 | 1 |
| 33197 | B014 | 195 | 2 |
| 33197 | B018 | 195 | 3 |
| 33197 | B020 | 195 | 4 |
| 33197 | B007 | 190 | 5 |
| 33197 | B044 | 190 | 1 |
| 33197 | B045 | 190 | 2 |
| 33152 | B005 | 189 | 3 |
| 33149 | B016 | 188 | 4 |
| 33149 | B020 | 188 | 5 |
| 33152 | B027 | 186 | 1 |
| 33197 | B010 | 185 | 2 |
| 33197 | B042 | 185 | 3 |
| 33152 | B022 | 183 | 4 |
| 33149 | B017 | 180 | 5 |
| 33152 | B014 | 180 | 1 |
| 33154 | B004 | 180 | 2 |
| 33197 | B011 | 180 | 3 |
| 33197 | B041 | 180 | 4 |
| 33152 | B034 | 177 | 5 |
| 33136 | H314 | 176 | 1 |
| 33197 | B008 | 175 | 2 |
| 33152 | B001 | 174 | 3 |
| 33149 | B011 | 173 | 4 |
| 33149 | B019 | 173 | 5 |
| 33152 | B003 | 171 | 1 |
| 33152 | B032 | 171 | 2 |
| 33197 | B023 | 170 | 3 |
| 33197 | B024 | 170 | 4 |
| 33197 | B035 | 170 | 5 |
| 33197 | B037 | 170 | 1 |
| 33149 | B014 | 165 | 2 |
| 33149 | B015 | 165 | 3 |
| 33149 | B022 | 165 | 4 |
| 33149 | B023 | 165 | 5 |
| 33152 | B043 | 165 | 1 |
| 33152 | B035 | 162 | 2 |
| 33153 | B026 | 162 | 3 |
| 33299 | B003 | 162 | 4 |
| 33299 | B005 | 162 | 5 |
| 33197 | B025 | 160 | 1 |
| 33152 | B023 | 159 | 2 |
| 33299 | B006 | 159 | 3 |
| 33149 | B012 | 158 | 4 |
| 33152 | B002 | 158 | 5 |
| 33154 | B002 | 156 | 1 |
| 33197 | B022 | 155 | 2 |
| 33197 | B034 | 155 | 3 |
| 33197 | B036 | 155 | 4 |
| 33197 | B038 | 155 | 5 |
| 33152 | B026 | 153 | 1 |
| 33154 | B003 | 153 | 2 |
| 33149 | B018 | 150 | 3 |
| 33153 | B020 | 150 | 4 |
| 33197 | B016 | 150 | 5 |
| 33197 | B026 | 150 | 1 |
| 33197 | B028 | 150 | 2 |
| 33152 | B006 | 147 | 3 |
| 33152 | B015 | 147 | 4 |
| 33154 | B005 | 147 | 5 |
| 33299 | B001 | 147 | 1 |
| 33197 | B030 | 145 | 2 |
| 33197 | B031 | 145 | 3 |
| 33197 | B032 | 145 | 4 |
| 33197 | B046 | 145 | 5 |
| 33152 | B016 | 144 | 1 |
| 33153 | B022 | 144 | 2 |
| 33152 | B030 | 141 | 3 |
| 33152 | B033 | 141 | 4 |

TABLE 28-continued

| Zone | Route | Vol. | Tube |
|---|---|---|---|
| 33152 | B062 | 141 | 5 |
| 33299 | B008 | 141 | 1 |
| 33197 | B027 | 140 | 2 |
| 33197 | B033 | 140 | 3 |
| 33154 | B001 | 138 | 4 |
| 33299 | B002 | 138 | 5 |
| 33149 | B021 | 135 | 1 |
| 33153 | B018 | 135 | 2 |
| 33153 | B019 | 135 | 3 |
| 33197 | B029 | 135 | 4 |
| 33299 | B009 | 135 | 5 |
| 33152 | B017 | 132 | 1 |
| 33152 | B044 | 132 | 2 |
| 33153 | B007 | 132 | 3 |
| 33299 | B004 | 132 | 4 |
| 33197 | B019 | 130 | 5 |
| 33152 | B039 | 129 | 1 |
| 33152 | B063 | 129 | 2 |
| 33152 | B025 | 126 | 3 |
| 33152 | B060 | 126 | 4 |
| 33153 | B003 | 126 | 5 |
| 33153 | B004 | 126 | 1 |
| 33153 | B017 | 126 | 2 |
| 33152 | B065 | 123 | 3 |
| 33153 | B015 | 123 | 4 |
| 33157 | C055 | 123 | 5 |
| 33149 | B013 | 120 | 1 |
| 33152 | B040 | 120 | 2 |
| 33152 | B041 | 120 | 3 |
| 33152 | B045 | 120 | 4 |
| 33152 | B061 | 120 | 5 |
| 33152 | B071 | 120 | 1 |
| 33153 | B016 | 120 | 2 |
| 33153 | B021 | 120 | 3 |
| 33152 | B012 | 117 | 4 |
| 33152 | B019 | 117 | 5 |
| 33152 | B067 | 117 | 1 |
| 33152 | B018 | 114 | 2 |
| 33152 | B066 | 114 | 3 |
| 33153 | B005 | 114 | 4 |
| 33153 | B023 | 114 | 5 |
| 33149 | B024 | 113 | 1 |
| 33149 | B025 | 113 | 2 |
| 33152 | B028 | 111 | 3 |
| 33152 | B036 | 111 | 4 |
| 33152 | B037 | 111 | 5 |
| 33152 | B042 | 111 | 1 |
| 33153 | B024 | 111 | 2 |
| 33153 | B025 | 111 | 3 |
| 33177 | B008 | 111 | 4 |
| 33177 | B022 | 111 | 5 |
| 33177 | B024 | 111 | 1 |
| 33177 | B007 | 108 | 2 |
| 33177 | B011 | 108 | 3 |
| 33177 | B021 | 108 | 4 |
| 33177 | B023 | 108 | 5 |
| 33152 | B064 | 105 | 1 |
| 33153 | B002 | 105 | 2 |
| 33177 | B001 | 105 | 3 |
| 33177 | B002 | 105 | 4 |
| 33177 | B004 | 105 | 5 |
| 33177 | B009 | 105 | 1 |
| 33197 | B039 | 105 | 2 |
| 33197 | B040 | 105 | 3 |
| 33197 | B047 | 105 | 4 |
| 33152 | B029 | 102 | 5 |
| 33152 | B046 | 102 | 1 |
| 33152 | B048 | 102 | 2 |
| 33153 | B006 | 102 | 3 |
| 33154 | B020 | 102 | 4 |
| 33154 | B022 | 102 | 5 |
| 33177 | B003 | 102 | 1 |
| 33177 | B015 | 102 | 2 |
| 33177 | B018 | 102 | 3 |
| 33177 | B020 | 102 | 4 |
| 33197 | B049 | 100 | 5 |
| 33152 | B024 | 99 | 1 |
| 33152 | B068 | 99 | 2 |

TABLE 28-continued

| Zone | Route | Vol. | Tube |
|---|---|---|---|
| 33154 | B006 | 99 | 3 |
| 33154 | B008 | 99 | 4 |
| 33177 | B006 | 99 | 5 |
| 33177 | B010 | 99 | 1 |
| 33177 | B012 | 99 | 2 |
| 33177 | B013 | 99 | 3 |
| 33177 | B014 | 99 | 4 |
| 33177 | B017 | 99 | 5 |
| 33177 | B019 | 99 | 1 |
| 33177 | B025 | 99 | 2 |
| 33152 | B049 | 96 | 3 |
| 33153 | B001 | 96 | 4 |
| 33153 | B014 | 96 | 5 |
| 33154 | B007 | 96 | 1 |
| 33177 | B005 | 96 | 2 |
| 33177 | B016 | 96 | 3 |
| 33177 | B026 | 96 | 4 |
| 33197 | B050 | 95 | 5 |
| 33152 | B051 | 93 | 1 |
| 33152 | B069 | 93 | 2 |
| 33154 | B009 | 93 | 3 |
| 33154 | B021 | 93 | 4 |
| 33154 | B025 | 93 | 5 |
| 33177 | B028 | 93 | 1 |
| 33177 | B029 | 93 | 2 |
| 33299 | B013 | 93 | 3 |
| 33152 | B008 | 90 | 4 |
| 33152 | B010 | 90 | 5 |
| 33152 | B052 | 90 | 1 |
| 33154 | B010 | 90 | 2 |
| 33154 | B023 | 90 | 3 |
| 33299 | B014 | 90 | 4 |
| 33152 | B004 | 87 | 5 |
| 33152 | B050 | 87 | 1 |
| 33152 | B070 | 87 | 2 |
| 33153 | B008 | 87 | 3 |
| 33153 | B012 | 87 | 4 |
| 33154 | B011 | 87 | 5 |
| 33299 | B010 | 87 | 1 |
| 33152 | B007 | 84 | 2 |
| 33177 | B027 | 84 | 3 |
| 33177 | B030 | 84 | 4 |
| 33177 | B036 | 84 | 5 |
| 33177 | B039 | 84 | 1 |
| 33153 | B013 | 81 | 2 |
| 33154 | B024 | 81 | 3 |
| 33177 | B032 | 81 | 4 |
| 33177 | B034 | 81 | 5 |
| 33177 | B035 | 81 | 1 |
| 33177 | B037 | 81 | 2 |
| 33299 | B007 | 81 | 3 |
| 33299 | B016 | 81 | 4 |
| 33197 | B048 | 80 | 5 |
| 33154 | B012 | 78 | 1 |
| 33154 | B013 | 78 | 2 |
| 33177 | B031 | 78 | 3 |
| 33177 | B038 | 78 | 4 |
| 33299 | B012 | 78 | 5 |
| 33299 | B017 | 78 | 1 |
| 33299 | B019 | 78 | 2 |
| 33177 | B033 | 75 | 3 |
| 33153 | B009 | 72 | 4 |
| 33153 | B011 | 72 | 5 |
| 33152 | B009 | 69 | 1 |
| 33299 | B011 | 69 | 2 |
| 33149 | B026 | 68 | 3 |
| 33299 | B015 | 68 | 4 |
| 33299 | B020 | 66 | 5 |
| 33152 | B020 | 63 | 1 |
| 33144 | B040 | 56 | 2 |
| 33144 | B027 | 54 | 3 |
| 33152 | B021 | 54 | 4 |
| 33242 | B029 | 54 | 5 |
| 33242 | B031 | 54 | 1 |
| 33242 | B033 | 53 | 2 |
| 33242 | B034 | 53 | 3 |
| 33242 | B035 | 53 | 4 |
| 33242 | B037 | 52 | 5 |

TABLE 28-continued

| Zone | Route | Vol. | Tube |
|---|---|---|---|
| 33144 | B041 | 52 | 1 |
| 33242 | B032 | 51 | 2 |
| 33242 | B036 | 51 | 3 |
| 33144 | B042 | 51 | 4 |
| 33153 | B010 | 51 | 5 |
| 33299 | B026 | 51 | 1 |
| 33242 | B005 | 50 | 2 |
| 33242 | B030 | 50 | 3 |
| 33144 | B026 | 50 | 4 |
| 33144 | B035 | 50 | 5 |
| 33144 | B049 | 50 | 1 |
| 33242 | B006 | 50 | 2 |
| 33144 | B022 | 49 | 3 |
| 33144 | B024 | 49 | 4 |
| 33144 | B038 | 49 | 5 |
| 33144 | B014 | 48 | 1 |
| 33144 | B037 | 48 | 2 |
| 33299 | B018 | 48 | 3 |
| 33144 | B038 | 47 | 4 |
| 33144 | B015 | 46 | 5 |
| 33144 | B025 | 46 | 1 |
| 33144 | B043 | 46 | 2 |
| 33144 | B039 | 45 | 3 |
| 33149 | B027 | 45 | 4 |
| 33242 | B017 | 44 | 5 |
| 33144 | B001 | 43 | 1 |
| 33144 | B028 | 43 | 2 |
| 33242 | B019 | 42 | 3 |
| 33144 | B023 | 42 | 4 |
| 33154 | B015 | 42 | 5 |
| 33154 | B018 | 42 | 1 |
| 33154 | B019 | 42 | 2 |
| 33242 | B021 | 41 | 3 |
| 33144 | B002 | 41 | 4 |
| 33144 | B003 | 41 | 5 |
| 33144 | B004 | 41 | 1 |
| 33144 | B007 | 41 | 2 |
| 33144 | B008 | 41 | 3 |
| 33144 | B044 | 41 | 4 |
| 33242 | B018 | 41 | 5 |
| 33242 | B022 | 41 | 1 |
| 33144 | B005 | 40 | 2 |
| 33144 | B009 | 40 | 3 |
| 33197 | B051 | 40 | 4 |
| 33144 | B021 | 39 | 5 |
| 33154 | B016 | 39 | 1 |
| 33144 | B006 | 38 | 2 |
| 33242 | B001 | 38 | 3 |
| 33242 | B015 | 38 | 4 |
| 33149 | B030 | 38 | 5 |
| 33242 | B016 | 37 | 1 |
| 33154 | B014 | 36 | 2 |
| 33154 | B017 | 36 | 3 |
| 33177 | B040 | 36 | 4 |
| 33242 | B020 | 36 | 5 |
| 33299 | B021 | 36 | 1 |
| 33299 | B022 | 36 | 2 |
| 33242 | B013 | 35 | 3 |
| 33242 | B002 | 34 | 4 |
| 33242 | B003 | 33 | 5 |
| 33242 | B014 | 33 | 1 |
| 33144 | B018 | 33 | 2 |
| 33144 | B029 | 33 | 3 |
| 33177 | B042 | 33 | 4 |
| 33177 | B043 | 33 | 5 |
| 33177 | B044 | 33 | 1 |
| 33299 | B023 | 33 | 2 |
| 33299 | B024 | 33 | 3 |
| 33242 | B012 | 32 | 4 |
| 33242 | B025 | 32 | 5 |
| 33144 | B030 | 32 | 1 |
| 33144 | B045 | 32 | 2 |
| 33242 | B023 | 32 | 3 |
| 33242 | B027 | 32 | 4 |
| 33242 | B028 | 32 | 5 |
| 33144 | B019 | 31 | 1 |
| 33144 | B031 | 31 | 2 |
| 33144 | B032 | 31 | 3 |

TABLE 28-continued

| Zone | Route | Vol. | Tube |
|---|---|---|---|
| 33144 | B033 | 31 | 4 |
| 33144 | B034 | 31 | 5 |
| 33242 | B026 | 31 | 2 |
| 33144 | B016 | 30 | 3 |
| 33144 | B020 | 30 | 4 |
| 33149 | B028 | 30 | 5 |
| 33149 | B029 | 30 | 2 |
| 33149 | B031 | 30 | 3 |
| 33149 | B032 | 30 | 4 |
| 33152 | B011 | 30 | 5 |
| 33177 | H370 | 30 | 2 |
| 33242 | B024 | 30 | 3 |
| 33242 | B004 | 29 | 4 |
| 33177 | B041 | 27 | 5 |
| 33144 | B047 | 25 | 2 |
| 33242 | B007 | 24 | 3 |
| 33144 | B050 | 24 | 4 |
| 33144 | B052 | 24 | 5 |
| 33299 | B025 | 24 | 2 |
| 33299 | B027 | 24 | 3 |
| 33242 | B008 | 23 | 4 |
| 33149 | B033 | 23 | 5 |
| 33149 | B034 | 23 | 2 |
| 33242 | B011 | 22 | 3 |
| 33242 | B010 | 21 | 4 |
| 33144 | B010 | 20 | 5 |
| 33144 | B012 | 19 | 1 |
| 33144 | B046 | 19 | 2 |
| 33242 | B009 | 19 | 3 |
| 33144 | B011 | 18 | 4 |
| 33144 | B013 | 18 | 5 |
| 33144 | B017 | 15 | 2 |
| 33144 | B053 | 9 | 3 |
| 33144 | B100 | 8 | 4 |
| 33144 | B051 | 6 | 5 |
| 33144 | B048 | 2 | 1 |
| 33144 | B054 | 1 | 2 |
| 33144 | B056 | 1 | 3 |
| 33144 | B058 | 1 | 4 |
| 33242 | B100 | 1 | 5 |

A partial sort allocation plan for an exemplary city would conceptually look as follows, as shown in table 29, for pre-sequence sorter tube 1, as determined by the group of ZIP codes allocated to presort accumulator tube 1.

TABLE 29

| Tube | ZIP codes | Routes |
|---|---|---|
| 1 | 33136 | C078, H314 |
| | 33144 | B001, B004, B012, B014, B019, B025, B030, B041, B048, B049, C034, C039, C044, C046 |
| | 33149 | B004, B007, B013, B021, B024, C077, C081, C085, C088 |
| | 33152 | B003, B009, B014, B016, B017, B020, B024, B026, B027, B038, B039, B042, B043, B046, B050, B051, B052, B064, B067, B071 |
| | 33153 | B004 |
| | 33154 | B002, B007, B012, B016, B018, C010, C016, C018 |
| | 33157 | C006, C016, C020, C021, C036, C038, C040, C041, C043, C047, C052 |
| | 33177 | B003, B009, B010, B019, B024, B028, B035, B039, B044, C013, C015, C020, C025 |
| | 33197 | B003, B009, B025, B026, B037, B043, B044, B100 |
| | 33242 | B014, B016, B022, B031 |
| | 33299 | B001, B008, B010, B017, B021, B026 |

Applying the example above to the system configuration sort allocation plan is illustrated in FIG. 40E which includes input segment 1 4042, sequencer segment 1 4044, storage segment 1 4046, container loader segments 4047, and dispatch areas 4049. As with the configuration shown in FIG. 40A, the exemplary configuration 4041 of FIG. 40E utilizes main transports 4043 and 4045, as well as a container transport 4048.

The system also includes a sequence plan. In embodiments, the sequence plan is used by the sequencer and the storage manager when receiving mail from the transport controller to determine the DPS order for every route. The first column can be the 11-digit ZIP codes, all listed in numerical ascending order. This is the column the look-up would be performed on. Column 2 can be the route. Column 3 can be the order or position of this delivery point within the overall sequence. Since a single table for all delivery points would be quite large, there can be one table for each storage segment (i.e., for each group of ZIP codes/routes assigned to that storage segment). The following table 30 shows an example of a sequencer plan utilizing a plan creation process having plural steps described below used to create the sequence plan.

Step 1 Determine the set of ZIP codes by routes used by the Storage Segment This information is contained in the Sort Allocation Plan for the Sequencer Segment that feeds this Storage Segment.

Step 2 Order all routes for the set of ZIP codes by 11-digit ZIP code in ascending order ZIP code and route metrics will ultimately be provided by the P&DC. The order of the routes may be prioritized using the Configuration Build Editor.

TABLE 30

| 11-digit ZIP | Carrier Route | DP Position |
|---|---|---|
| 33144-2072-23 | C013 | 1 |
| 33152-9600-13 | C005 | 2 |
| 33155-3208-00 | C001 | 3 |
| 33155-3208-01 | C001 | 4 |
| 33155-3208-02 | C001 | 5 |
| 33155-3208-03 | C001 | 6 |
| 33155-3208-04 | C001 | 7 |
| 33155-3208-05 | C001 | 8 |
| 33155-3208-06 | C001 | 9 |
| 33155-3208-07 | C001 | 10 |
| 33155-3510-29 | C037 | 11 |
| 33155-5707-34 | C025 | 12 |
| 33157-1461-65 | C034 | 13 |
| Etc. | | |

The system also includes a storage allocation plan which can determine which tubes are allocated for use in each storage aisle. The storage allocation plan is used by the storage manager when receiving mail from the sequencer to determine which frames can be placed into which tubes. A separate storage allocation plan will define the allocation for each storage segment, given that all storage segments will not necessarily have the same physical configuration. Each system will have n storage segments based on its storage needs. Each storage segment will have a configurable number of m storage aisles. Each storage aisle will have a configurable number of t storage tubes. A configurable percentage of tubes in each aisle will be reserved as spares (e.g., 10%). The spare tubes will be rotated amongst the t storage tubes for reliability reasons. This plan will list the allocated tubes for each storage aisle.

Table 31 shows an example of a storage allocation plan.

TABLE 31

| Storage Segment | Aisle | Tubes Allocated |
|---|---|---|
| 1 | 1 | 1-72 |
| 1 | 2 | 1-72 |

TABLE 31-continued

| Storage Segment | Aisle | Tubes Allocated |
|---|---|---|
| 1 | 3 | 1-72 |
| 1 | 4 | 1-72 |
| 1 | 5 | 1-72 |
| 2 | 1 | 9-80 |
| 2 | 2 | 9-80 |
| 2 | 3 | 9-80 |
| 2 | 4 | 9-80 |
| 2 | 5 | 9-80 |

The storage allocation plan is preferably created daily using the storage aisle tubes listed in the master configuration. The tubes allocated for each storage aisle will be rotated on a daily basis in a round robin fashion.

Applying the data in this example to the configuration storage allocation plan 4050 shown in FIG. 40F, which includes input segment 4051, sequencer segment 1 4053, storage segment 1 4055, container loader segment 1 4056, and dispatch areas 4058. As with the configuration shown in FIG. 40A, the exemplary configuration 4050 of FIG. 40F utilizes main transports 4052 and 4054, as well as a container transport 4057.

The system also utilizes a dispatch plan. When mail is prepared for dispatch from the system, frames are unloaded and containers are filled with sequenced mail. Each container is transported to a dispatch area on the plant floor. Dispatch areas are "holding" areas for filled containers of mail. Mail handlers at each dispatch area pull the containers off the conveyor as they arrive and load them onto mail carts that can be transported to each dock. The number of dispatch areas will vary by mail facility. The purpose of the dispatch plan for the system is to identify the dispatch areas and the docks and stalls that they hold the mail for. The P&DC will define the dispatch areas and dock/stall assignments. In embodiments, it is anticipated that each dispatch area will hold mail for a consecutive set of dock stalls, which will increase efficiency of cart transportation. Table 32 shows what an exemplary dispatch plan for an exemplary city might look like.

TABLE 32

| Dispatch Area | Dock | Stalls | ZIP codes |
|---|---|---|---|
| 1 | South | 4, 5, 6, 7, 8 | 33170, 33177, 33187, 33156, 33158, 33159, 33256, 33155, 33245, 33157, 33189, 33190, 33197, 33165, 33175, 33185, 33265 |
| 2 | South | 9, 10, 11, 12, 13 | 33116, 33176, 33101, 33102, 33111, 33128, 33129, 33130, 33131, 33132, 33136, 33152, 33231, 33114, 33134, 33234, 33143, 33243, 33257, 33296 |
| 3 | South | 14, 15, 16, 17, 18, 19 | 33154, 33280, 33109, 33119, 33139, 33239, 33142, 33242, 33266, 33299, 33144, 33127, 33137, 33151, 33153, 33149 |
| 4 | North | 30, 31, 32, 33, 34, 35, 36 | 33166, 33140, 33172, 33222, 33180, 33173, 33183, 33193, 33125, 33135, 33122, 33178 |
| 5 | North | 37, 40, 41, 42, 43, 44, 45 | 33147, 33247, 33167, 33168, 33186, 33196, 33161, 33181, 33261, 33169, 33179, 33269, 33141, 33138, 33150, 33238 |
| 6 | North | 46, 47, 48, 49, 50, 52, 53 | 33133, 33233, 33160, 33162, 33163, 33164, 33174, 33182, 33184, 33194, 33145, 33245, 33124, 33146, 33126 |

Using data from an exemplary P&DC, table 33 shows an exemplary dispatch plan worksheet.

TABLE 33

| Dispatches | | | Avg Daily | |
|---|---|---|---|---|
| 53 Zone | Total Zones Dock | Stall | Volume 1,156,439 | Dispatch Area |
| 33170 | South | 4 | 7,323 | 1 |
| 33177 | South | 4 | 59,889 | 1 |
| 33187 | South | 4 | 24,256 | 1 |
| 33156 | South | 5 | 86,641 | 1 |
| 33158 | South | 5 | 22,650 | 1 |
| 33159 | South | 5 | 186 | 1 |
| 33256 | South | 5 | 5,040 | 1 |
| 33155 | South | 6 | 57,055 | 1 |
| 33245 | South | 6 | 1,334 | 1 |
| 33157 | South | 7 | 103,458 | 1 |
| 33189 | South | 7 | 27,667 | 1 |
| 33190 | South | 7 | 11,444 | 1 |
| 33197 | South | 7 | 8,825 | 1 |
| 33165 | South | 8 | 51,049 | 1 |
| 33175 | South | 8 | 74,866 | 1 |
| 33185 | South | 8 | 30,983 | 1 |
| 33265 | South | 8 | 5,300 | 1 |
| 33116 | South | 9 | 10,695 | 2 |
| 33176 | South | 9 | 99,042 | 2 |
| 33101 | South | 10 | 7,143 | 2 |
| 33102 | South | 10 | 1,533 | 2 |
| 33111 | South | 10 | 393 | 2 |
| 33128 | South | 10 | 2,408 | 2 |
| 33129 | South | 10 | 27,356 | 2 |
| 33130 | South | 10 | 9,693 | 2 |
| 33131 | South | 10 | 44,512 | 2 |
| 33132 | South | 10 | 7,978 | 2 |
| 33136 | South | 10 | 5,336 | 2 |
| 33152 | South | 10 | 1,287 | 2 |
| 33231 | South | 10 | 1,215 | 2 |
| 33114 | South | 11 | 8,481 | 2 |
| 33134 | South | 11 | 74,653 | 2 |
| 33234 | South | 11 | 2,091 | 2 |
| 33143 | South | 12 | 58,721 | 2 |
| 33243 | South | 12 | 2,400 | 2 |
| 33257 | South | 13 | 2,472 | 2 |
| 33296 | South | 13 | 2,034 | 2 |
| 33154 | South | 14 | 26,947 | 3 |
| 33280 | South | 14 | 2,430 | 3 |
| 33109 | South | 15 | 613 | 3 |
| 33119 | South | 15 | 1,288 | 3 |
| 33139 | South | 15 | 48,939 | 3 |
| 33239 | South | 15 | 576 | 3 |
| 33142 | South | 16 | 19,016 | 3 |

TABLE 33-continued

| | | | | |
|---|---|---|---|---|
| 33242 | South | 16 | 482 | 3 |
| 33266 | South | 16 | 4,050 | 3 |
| 33299 | South | 16 | 2,328 | 3 |
| 33144 | South | 17 | 15,799 | 3 |
| 33127 | South | 18 | 9,221 | 3 |
| 33137 | South | 18 | 24,481 | 3 |

| | Dispatches | | Avg Daily | |
|---|---|---|---|---|
| 43 Zone | Total Zones Dock | Stall | Volume 1,199,899 | Dispatch Area |
| 33166 | North | 30 | 56,173 | 4 |
| 33140 | North | 31 | 50,823 | 4 |
| 33172 | North | 32 | 29,822 | 4 |
| 33222 | North | 32 | 1,294 | 4 |
| 33180 | North | 33 | 76,607 | 4 |
| 33173 | North | 34 | 61,375 | 4 |
| 33183 | North | 34 | 50,548 | 4 |
| 33193 | North | 34 | 41,532 | 4 |
| 33125 | North | 35 | 17,239 | 4 |
| 33135 | North | 35 | 14,358 | 4 |
| 33122 | North | 36 | 8,078 | 4 |
| 33178 | North | 36 | 85,412 | 4 |
| 33147 | North | 37 | 14,116 | 5 |
| 33247 | North | 37 | 1,357 | 5 |
| 33167 | North | 40 | 9,559 | 5 |
| 33168 | North | 40 | 11,426 | 5 |
| 33186 | North | 41 | 114,722 | 5 |
| 33196 | North | 41 | 54,348 | 5 |
| 33161 | North | 42 | 22,405 | 5 |
| 33181 | North | 42 | 14,864 | 5 |
| 33261 | North | 42 | 1,632 | 5 |
| 33169 | North | 43 | 31,276 | 5 |
| 33179 | North | 43 | 41,745 | 5 |
| 33269 | North | 43 | 4,362 | 5 |
| 33141 | North | 44 | 26,070 | 5 |
| 33138 | North | 45 | 36,067 | 5 |
| 33150 | North | 45 | 10,414 | 5 |
| 33238 | North | 45 | 1,276 | 5 |
| 33133 | North | 46 | 59,451 | 6 |
| 33233 | North | 46 | 2,805 | 6 |
| 33160 | North | 47 | 49,360 | 6 |
| 33162 | North | 47 | 21,057 | 6 |
| 33163 | North | 47 | 1,488 | 6 |
| 33164 | North | 47 | 2,427 | 6 |
| 33174 | North | 48 | 20,929 | 8 |
| 33182 | North | 48 | 20,387 | 6 |
| 33184 | North | 48 | 20,296 | 6 |
| 33194 | North | 48 | 2,684 | 6 |
| 33145 | North | 49 | 17,957 | 6 |
| 33245 | North | 49 | 1,334 | 6 |
| 33124 | North | 50 | 2,170 | 6 |
| 33146 | North | 52 | 63,134 | 6 |
| 33126 | North | 53 | 25,520 | 6 |

| | |
|---|---|
| # Stalls South 16 | # Stalls North 21 |
| # Areas 3 | # Areas 3 |
| Total Volume South 1,156,439 | Total Volume North 1,199,899 |
| Avg Vol per Area 385,480 | Avg Vol per Area 399,966 |

Total volumes:

| | | |
|---|---|---|
| Dispatch Area | 1 | 577,965 |
| | 2 | 369,442 |
| | 3 | 209,031 |
| | 4 | 493,262 |
| | 5 | 395,639 |
| | 6 | 310,998 |

The system can also utilize volume tracking and learning. In embodiments, the system keeps metrics on daily mail volume per ZIP code and per route. These metrics will be used by the configuration build process to create allocation plans that reflect accurate and up-to-date data. When the system is initially used at a mail center, volume metrics are indirectly provided from other databases and reports, most of which only track to the ZIP code level. Over time, volume metrics collection within the system will provide more accuracy. For example, after the first week, the system can have metrics that define volume trends by day of week. After the first month, the system will have more refined metrics that identify heavier volume days during a monthly cycle. And after the first year, the collection of volume metrics will ultimately provide a system SPLY (Same Period Last Year) metrics database. Effectively over time, the system learns how to configure itself to anticipate volume trends within a mail center.

The system can also utilize ZIP code prioritization. In embodiments, the process of sequencing mail creates a mail stream that is inherently ordered first by ZIP codes, then by routes within each ZIP code, and finally by delivery point within each route. It is possible that a P&DC may wish to place a higher priority on some ZIP codes to ensure those ZIP codes are sequenced and dispatched ahead of lower priority ZIP codes. The system allows a mail center to select specific ZIP codes for prioritization using the configuration editor. When the configuration builder creates the sequence plans for the system, it can ensure that all high priority ZIP codes are ordered ahead of all other ZIP codes. In embodiments, only two prioritization levels can be utilized, e.g., normal priority and high priority. Within each priority level, ZIP codes are included in the sequence plan in ascending order.

The system can also utilize volume management. Although the estimated average daily volume of mail for every ZIP code and route is predictable and learned over time, fluctuations in actual mail flow can and will vary. Mail volume fluctuations fall primarily into two categories, e.g., general volume fluctuations and volume spikes. Of particular concern are volume spikes, which are mostly the result of saturation mail based on sales timings and do not have to be sorted every day. Most ad mail fluctuations will affect entire ZIP codes that serve affluent areas or routes within ZIP codes that serve affluent areas. Mail facilities currently manage volume spikes by monitoring the volume of mail inducted for each ZIP code. A limited amount of ad mail is inducted and the excess is held over for the next day. Unexpected volume skew can result in volume distribution inequities in the system, causing potential bottlenecks or overflow of specific buffers or storage areas. In embodiments, volume fluctuations, and in particular volume skew, can be mitigated in the system using two approaches:

ZIP code monitoring; and

Dynamic allocation.

Each of these approaches will be discussed in detail, but first, the general process of managing mail volume is described with reference to FIG. 40G. By way of non-limiting example, the process of FIG. 40G can be implemented in the computing infrastructure of FIG. 1A. The process 4060 utilizes a system volume section 4061 and a volume skew section 4062. The process of mail volume management is handled within the system. Volume management is a continual process that occurs throughout mail induction. The system provides configurable thresholds for total mail volume and total mail feet. These are included in the master configuration plan. During induction, the total volume and total feet of all inducted mail is counted in steps 4061A and 4061B. If either of these system thresholds is exceeded in steps 4061C and 4061D, the system immediately alerts all induction units to shut down their operations in step 4061E. If the answer to steps 4061C and 4061D is no, then the process continues to volume skew 4062.

Also included in the master configuration plan are a maximum volume capacity and volume cap threshold percentage for every ZIP code and every route. As mail is inducted, every mail piece is counted by ZIP code and route in step 4062A.

Each induction unit forwards the counts to the system manager, where the counts from all induction units are accumulated and tracked. If and when the volume for a group of ZIP codes reaches the volume cap threshold percentage of the maximum volume capacity of the storage segment allocated to that group of ZIP codes in step 4062B, the system manager sends a notification to all induction units to begin ZIP code monitoring for that ZIP code in step 4062D. If and when the rate of induction for a particular ZIP code or route exceeds (after measurement in step 4062C) an expected rate of induction in step 4062E, then dynamic allocation is used in step 4062G to assign the groups of ZIP codes/routes defined in the base configuration to presort accumulator tubes and pre-sequence sorter tubes. If the answer to step 4062E is no, tubes are assigned as per the configuration plan.

The system can also utilize ZIP code monitoring. During ZIP code monitoring in step 4062D, induction is necessarily limited to First Class Mail (FCM) for a monitored ZIP code in step 4062H. The system manager alerts each induction unit to begin monitoring a specific ZIP code. The system manager sends an alert notification to the induction unit console that informs the operator that FCM should be inducted for a monitored ZIP code. Each induction unit checks each mail piece address result against the monitored ZIP code. If a mail piece for that ZIP code is found, the induction unit checks the mail class of the mail piece. If the mail class indicates the mail piece is First Class Mail, then the induction unit sends the mail piece to the frame inserter. Otherwise, the induction unit sends the mail piece directly to its holdout bin. If detection of mail class (e.g., FCM) is not possible, then all mail for a monitored ZIP code should be rejected.

The system can also utilize dynamic allocation. The configuration plans that are created and distributed by the system manager can represent the base configuration for any given day. The base configuration defines the grouping of mail pieces by ZIP codes and routes, and the default assignment of each group to tubes within each segment. As volume fluctuations are detected, adjustments to the default assignment may be necessary to even out volume skew. Changes to the default assignments can be handled through dynamic allocation. Dynamic allocation does not alter the base configuration plans themselves; it simply overrides the default assignment with a new, dynamic assignment.

Thus, in embodiments, the system can utilize dynamic allocation for presorting and/or presort accumulators. During induction, if the rate of mail pieces destined to a specific presort accumulator tube is higher than expected, it may be necessary to begin dynamic allocation for presorting. The concept of dynamic allocation does not affect the grouping of ZIP codes to allocate to each accumulator tube, but it does relax the assignment to a specific accumulator tube. First, each accumulator tube may contain two equally sized groups of mail. The buffering mechanism allows the first filled group to be sent onto the transport while the second group is filling up.

With reference to FIGS. 40H-41, mail that is inducted randomly (see FIG. 40H) can be assigned to accumulator tubes per the accumulator allocation plan. As per the plan, the ZIP code of the mail piece determines which group, and hence which tube, the mail piece is placed in. When the mail stream comprises presorted mail (see FIG. 40I), specific accumulator tubes will fill up faster than others. In this case, the mail pieces for those groups can be placed into any available empty accumulator tube. For this example, both Group 1 and Group 4 are experiencing a higher rate of mail flow. More realistically, the filling of accumulator tubes during presorted mail induction may not allow equal groups of mail pieces to be accumulated. FIG. 41 shows a more realistic view of filling tubes. In this example, every mail piece should be placed into an accumulator tube when it is received, regardless of the group. This may necessitate buffering a new group behind a different group that may not have accumulated the intended number of mail pieces.

The system can also utilize dynamic allocation for pre-sequence sorters. In embodiments, the pre-sequence sorter base configuration can allocate the ZIP codes for a specific presort accumulator tube to the sorter tubes by individual routes. ZIP codes and routes are distributed across tubes to achieve an equitable volume of mail in each tube. Some routes may receive an exceptional increase in mail volume, particularly if the route serves an institution or an affluent area. If a higher rate of mail for a specific route is received (e.g., pre-sorted mail), then dynamic allocation within the pre-sequence sorter can be started. Similarly to dynamic allocation within the presort accumulator, the process within the sorter can use a free sorter tube to handle the additional mail flow. If a sorter tube is not free, then the contents of the sorter tube that is most full can be moved on to the sequencer stages.

The system can also utilize dynamic allocation for storage segments. The movement of the mail frames into post-sequence collector tubes and storage aisles and tubes is controlled entirely by the software. Since the system does not pre-configure storage segments by ZIP code or route, the re-allocation of mail across Sorter tubes causes no impact in this area of the system.

The system can also utilize dynamic allocation for dispatch. In such an embodiment, dispatch areas are assigned to specific docks and stalls and are considered "fixed" assignments. Quite possibly, a mail facility may hang signs over each dispatch area to indicate the docks and stalls that they serve. All containers should be sent to their intended dispatch area.

It is possible that volume skew could result in a larger number of containers being sent to a dispatch area. Therefore, each dispatch area should be properly resourced to keep up with the volume flow of containers. The system can help this situation by providing status of volume flow and notifications of higher than normal volume flow to the system console and consoles located throughout the plant floor. Supervisors can react to these notifications by making resource adjustments to accommodate the increase in volume.

Sorting and/or Sequencing Methodologies

The invention is directed to sorting and sequencing methodologies using the facility-wide sorting and/or sequencing system of the present invention. In accordance with aspects of the invention, mail pieces may be sorted and/or sequenced in a one pass sort. With a one pass sort, each mail piece flows through the system once with only two manual operations: (1) one to place the mail piece into the system; and (2) one to remove the mail piece after it is has been sorted and/or sequenced. Accordingly, by implementing a one pass sort, the need for manual operations is reduced or eliminated.

The one pass sorting/sequencing methodologies allow for a build up of smaller sequenced packets or slugs of mail pieces. Then, in accordance with aspects of the invention, in the final dispatch of all of the mail pieces, the largest of the packets are sequenced together to create a large stream of sequenced mail pieces that can be divided into smaller deliverable segments of sequenced mail pieces. That is, in embodiments, each group of mail pieces is sequenced within its group. Then several groups may be shuffled together in shuttles in sequenced order. These larger chains of mail pieces are stored. Then at dispatch, multiple chains of mail pieces are shuffled together again in sequenced order to form a sequenced dispatch stream of mail pieces.

In embodiments, the sequencing function can be handled, for example, in three stages. Additionally, in embodiments, each stage may use the same sorting/sequencing methodology, as described further below. Since, in embodiments, the mail is continually in a sorting/sequencing process, delays in the process may be needed to buffer enough mail to be sequenced together, which can be provided in buffers as described in the instant application. Moreover, as described further below, at each process of the sorting/sequencing operation a greater number of mail pieces are buffered to sort or sequence these mail pieces.

With the present invention, the sequencing/sorting methodologies utilize sequencing hardware comprised mainly of frame transport tubes and stages. That is, as described above, a frame transport tube is a frame transportation lane that, in embodiments, includes an accumulation section, RADs, right angle merges and/or docking stations. This frame transport tube is a conveyance system such as, for example, lead screws, belts, etc. as described in the invention, which may also include transitions between diverts and merges. As further discussed below, a tube or bucket as described herein refers to a segment of the transport system, conveyance system or the like used in the sorting/sequencing methodologies described below. Moreover, a stage of the present invention is a set of tubes placed together for the function of diverting, accumulating and merging mail together to create a group of mail in a specific order. As further discussed below, a stage is equivalent to a pass in the sorting/sequencing methodologies described below. Moreover, items are mail pieces such as, for example, flats, letters, parcels, etc., to which there is a desired final sequence.

Multi-pass sequencing refers to the number of times or passes through sequencing hardware that items need be subjected to for group sequencing. As described above, single pass sequencing is defined by a series of sequencing hardware, wherein an item can pass through and become sequenced with the other items in the group in one pass. As should be understood, utilizing a single pass sequencing methodology may increase a required space for the hardware. That is, in general, with a single pass methodology, more hardware, e.g., tubes, storage, etc., may be required to sort and/or sequence the mail pieces in a single pass. However, utilizing a single pass sorting/sequencing methodology and system of the present invention can have a small footprint due to the methodology, e.g., face-to-back, sorting of the mail pieces in frames, and reduces the time needed to sequence the group of items. Additionally, utilizing a single pass sorting/sequencing methodology eliminates the need for a return path. That is, as mail pieces are in a sequenced order upon exiting the system after a single pass, a return path is not required to re-induct the mail pieces for, e.g., a second pass through the system.

The sequencing methodologies described below utilize a set of rules that dictate the final order of pieces. Each sequencing methodology has different rules for determining the number of passes and the number of buckets necessary to sequence a maximum group of items in a specific order. Once the hardware layout is determined, e.g., conveying modules, frame inserters, feeders, etc., as it is configurable, the methodologies utilize the available hardware to sequence and/or sort the items.

N×N Sorting/Sequencing Methodology

According to further aspects of the invention, an N×N sorting/sequencing methodology may be implemented to sequence mail pieces. With an N×N sequencing/sorting methodology, when a group of items are to be sequenced through an N stage sequencer, the $N^{th}$ root can be taken of the number of pieces in the group. The resultant is the number of sequencing tubes necessary for sequencing that batch of items. For example, consider that there are thirty-six mail pieces to be sequenced/sorted using two stages. The Nth root of thirty-six or the square root of thirty-six is six. Thus, with this example, six frame transport tubes would be required to perform the sequencing in two stages. Thus, batches of items equal to the maximum can optimize use of the sequencing hardware. However, it should be understood that batches of items of lesser size than the maximum may also utilize the sequencing hardware.

This N×N sequencing process may be applied to multi-input multi-output systems. The term N×N is used to describe how many buckets are utilized in the sequencing and how many items can be sequenced overall, or the capacity of the particular sequencing arrangement using N buckets. That is, N is the number of buckets required for input buckets and output buckets for each of the passes or stages. Moreover, as described above, N multiplied by N (for any value of N) provides the total number of items that can be sequenced together with this particular N×N sorting/sequencing arrangement.

FIG. 42A shows an exemplary flow 4200 for performing an N×N sorting/sequencing in accordance with aspects of the present invention. The steps of the flow diagrams described herein can be implemented in the computing infrastructure of FIG. 1A. As shown in FIG. 42A, at step 4202, the sorting/sequencing process commences. At step 4205, the system receives the input items, e.g., a batch of mail pieces. At step 4207, the items, e.g., mail pieces, are loaded evenly into the input buckets, as described herein. It should be understood that with this inputting step, the order of the items does not matter. Additionally, it should be understood that mail pieces are loaded as evenly as possible. That is, in embodiments, it may not be possible to attain a completely even loading of the input buckets.

At step 4210, a number $N^{pass\#-1}$ of items are added from each input bucket from lowest to highest as a group transport. That is, for example if N=3, with a first pass, $3^0$ or one item is added from each input bucket. With a second pass, $3^1$ or three items are added from each input bucket. Additionally, with a third pass, $3^2$ or nine items are added from each input bucket. It should be understood that, while the above step determines a number of items based on a pass number, and discusses three passes, with the above-described system, the passes may describe the stages of the system (e.g., in a cascading arrangement). As such, even though multiple passes are discussed, these can be considered as multiple stages of a single pass sorting/sequencing.

At step 4212, a determination is made as to whether there are additional items remaining in the input buckets. If, at step 4212, it is determined that there are additional items remaining in the input buckets, the process returns to step 4210. If, at step 4212, it is determined that there are no additional items remaining in the input buckets, the process proceeds to step 4217. Additionally, at step 4212, the input list data 4215 is stored in a storage system, e.g., a database shown in FIG. 1A.

At step 4217, the groups of items are loaded into a next available bucket. At step 4220, where each input bucket is now in order from lowest to highest, the absolute lowest item is added to the first output and this is continued until the highest item is added. At step 4222, the sequenced items are output.

FIGS. 42B-42Q illustrate exemplary intermediate steps in an N×N sequencing methodology and FIG. 42R shows an exemplary final sequenced output in accordance with aspects of the invention. As should be understood, each bucket shown in FIGS. 42B-42Q is representative of parallel transport lanes or segments in the transportation paths of the facility wide letters/flats sortation and/or sequencing system, meaning that sorting and/or sequencing of the items, e.g., frames, can be processed in parallel. Also, each bucket that is shown at a different level in FIGS. 42B-42Q is representative of a different stage of sorting and/or sequencing in the facility wide letters/flats sortation and/or sequencing system, e.g., different transport lanes or segments which receive mail pieces from an upstream portion of the system. For example, these different stages can be equivalent to downstream transport lanes or segments in the transportation paths for further processing of the mail pieces into a certain sort depth or sequence. Also, as should be understood, the use of the term "pass" refers to processing of the mail pieces through different transport lanes or segments of the present invention, e.g., different stages of a cascading arrangement, and does not necessarily mean that the mail pieces have to be unloaded and reloaded into the system as is conventional in a multiple pass sort algorithm.

As shown in FIG. 42B, in the first pass, the items (represented by numerals 1-18) are distributed in any order across the N buckets (in this example, three buckets). As discussed above, the N×N methodology substantially or completely evenly balances the number of items (N×N) across the buckets for each pass (N). As further shown in FIG. 42B, a group of N items are selected to compile a current list. That is, as this is the first pass, $N^{pass\#-1}=3^{1-1}$, or one item is selected from each input bucket. Moreover, as shown in FIG. 42B, the current list is built by sequentially ordering the three selected items (as shown in FIG. 42B from right to left). Thus, as shown in FIG. 42B, the current items 10, 11 and 17 have been identified as part of the current list.

As shown in FIG. 42C, those items shown in the current list are moved together into the first output bucket. More specifically, utilizing, for example, the right-angle diverts, frame transport tubes and stages of the present invention, described above, item 10 is removed from the third input bucket (or frame transport tube) and moved to the first output bucket (or frame transport tube). Subsequently, item 11 is removed from the second input bucket (or frame transport tube) and moved to the first output bucket behind item 10. Furthermore, item 17 is removed from the first input bucket (or frame transport tube) and moved to the first output bucket behind item 11.

As shown in FIG. 42D, a new current list is compiled by sequentially ordering the next three items (one from each input bucket). Thus, as shown in FIG. 42D, items 1, 4 and 18 have been added to the current list. Moreover, as shown in FIG. 42E, the items in the current list are transported to the second output bucket.

As shown in FIG. 42F, a new current list is compiled by sequentially ordering the next three items (one from each input bucket). Thus, as shown in FIG. 42F, items 9, 14 and 15 have been added to the current list. Moreover, as shown in FIG. 42G, the items in the current list are transported to the third output bucket.

As shown in FIG. 42H, a new current list is compiled by sequentially ordering the next three items (one from each input bucket). Thus, as shown in FIG. 42H, items 2, 6 and 7 have been added to the current list. Moreover, as shown in FIG. 42I, the items in the current list are transported to the first output bucket behind items 10, 11 and 17.

FIG. 42J shows the output buckets after a first pass. That is, while not shown, using the methodology described above, the remaining items in the input buckets have been placed in the output buckets to end the first pass or stage of the sequencing.

FIG. 42 K shows the input buckets at the beginning of the next pass. As such, the items shown as in the output buckets in FIG. 42J are now shown in FIG. 42K in the input buckets in the same order. However, as should be understood, in embodiments, these items have not been manually unloaded from the output buckets and placed into input buckets, as may occur in a multi-pass sort. Rather, with the present invention, as described above, each "pass" of the sorting/sequencing methodologies correlates with a stage in the present invention. As such, with each subsequent stage in the present invention, an output bucket becomes an input bucket. Thus, in embodiments, the present invention eliminates the need to manually remove items from an output bucket and manually place them in an input bucket, while preserving the order of the items, for additional passes.

As shown in FIG. 42K, a new current list is compiled. However, as this is now the next "pass," three items are removed from each input bucket to compile the new current list. That is, as this is the second pass, $N^{pass\#-1}=3^{2-1}$, or three items are selected from each input bucket. Thus, as shown in FIG. 42K, the next three items from each input bucket are selected and placed into numerical order (as shown from right to left) in the current list. More specifically, as shown in FIG. 42K, items 1, 4, 9, 10, 11, 14, 15, 17 and 18 have been added to the current list. Moreover, as shown in FIG. 42L, the items in the current list are transported to the first output bucket.

As shown in FIG. 42M, a new current list is compiled by sequentially ordering the next nine items (three from each input bucket). Thus, as shown in FIG. 42M, items 2, 3, 5, 6, 7, 8, 12, 13 and 16 have been added to the current list. Moreover, as shown in FIG. 42N, the items in the current list are transported to the second output bucket. FIG. 42O shows the output buckets at the end of the second pass. As can be observed in FIG. 42O, only the first two output buckets have been utilized.

FIG. 42P shows the input buckets at the beginning of the third pass. As discussed above, the second pass output buckets are now designated as the third pass input buckets. As shown in FIG. 42P, a new current list is compiled. However, as this is now the third "pass," nine items are removed from each input bucket to compile the new current list. That is, as this is the third pass, $N^{pass\#-1}=3^{3-1}$, or nine items are selected from each input bucket. Thus, as shown in FIG. 42P, the next nine items from each input bucket are selected and placed into numerical order (as shown from right to left) in the current list. Moreover, as shown in FIG. 42P, the current list includes the entire list of items now in proper numerical sequence (from right to left).

As shown in FIG. 42Q, the items are transferred from the two input buckets to the first output bucket in accordance with the sequence set forth in the current list. Moreover, as shown in FIG. 42R, which shows an exemplary final sequenced output, upon transferring these items to the first output bucket, the items are in sequenced order.

It should be understood that while the above described FIGS. 42B-42R illustrate the compiling of the list, and are shown with items removed from an input bucket and placed in a current list before being moved to the output buckets, the items are actually not physically moved to the current list. That is, the current list is compiled and, for example, stored in a memory, e.g., a database, followed by the moving of items from an input bucket to an output bucket in an order as indicated by the current list.

Additionally, it should be understood that the exemplary numerals 1-18 are representative of a determined sequence for a particular batch of mail pieces. Furthermore, it should be understood that this may not be a carrier walk sequence (CWS). Rather, the numerals represent the proper sequence for items 1-18 relative to one another. For example, items 1-18 may be sequenced into a proper order as described above. Later in the day, additional mail pieces may be received in a processing and delivery center (P&DC) that need to be merged with the previously sequenced items (designated as 1-18 for their particular sequencing) to place all of the items in proper sequence relative to one another, e.g., CWS. As such, further sequencing would occur wherein the previously sequenced items and the new items would be assigned new sequence numbers indicative of their relative order to one another, such that upon sequencing, all of these items would be in proper sequence relative to one another, e.g., CWS. That is, in embodiments, as described above, the invention contemplates that batches of items may be sequenced as they are received in a P&DC. Moreover, these batches may be grouped into larger batches, e.g., throughout the day, until they are merged into a single chain of items that are in a proper sequence, e.g., CWS.

N×M Sorting/Sequencing Methodology

According to further aspects of the invention, an N×M sorting/sequencing methodology may be implemented to sequence mail pieces. An N×M sequencing methodology may be applied to a system with single or multiple inputs and with single or multiple outputs. That is, in contrast to an N×N sorting/sequencing methodology, where the number of input buckets equals the number of output buckets, with an N×M sorting/sequencing methodology, differing numbers of input buckets and output buckets may be utilized. As such, with an N×M sorting/sequencing, a lower number of input and/or output buckets may be utilized, thus allowing input and/or output buckets to be utilized elsewhere in the system, e.g., to sequence/sort a different batch of items.

Similar to the above-described N×N sequencing methodology, the N×M sequencing methodology selects items from the inputs, then places them into a current list of items and outputs the current list. That is, the N×M sequencing methodology compiles temporary current lists of items before transporting the items to an output bucket. Additionally, the current lists of the separate input stages are kept independent of each other and stored in a memory, e.g., a database. Moreover, the input buckets most accurately behave like queues, wherein only the head item can be selected. In accordance with aspects of the invention, the temporary lists that are formed are guaranteed to be sequenced, by the selection process.

FIG. 42S shows an exemplary flow 4230 for performing an N×M sorting/sequencing in accordance with aspects of the present invention. As shown in FIG. 42S, at step 4232, the sorting/sequencing process commences. At step 4235, the system receives the input items, e.g., a batch of mail pieces. At step 4236, the items, e.g., mail pieces, are loaded, e.g., as evenly as possible into the input buckets. It should be understood that with this inputting step, the order of the items does not matter.

At step 4237, a determination is made as to whether the input is empty. If, at step 4237, it is determined that the input is not empty, then at step 4240, a determination is made as to whether there is a current list. If, at step 4240, it is determined that there is not a current list, then at step 4257, a new current list is established and the lowest numbered available item is selected from any of the input buckets. It should be understood, however, that only the head items (e.g., bottom-most in this exemplary illustration) in the buckets at any time are available for selection. At step 4247, the selected item number is inserted at the end of the current list, and the process proceeds to step 4237.

If, at step 4240, it is determined that there is a current list, the process proceeds to step 4242, where a determination is made as to whether there is an available item in any of the input buckets having a higher item number than the last item number in the current list. If, at step 4242, it is determined that there is an available item in any of the input buckets having a higher item number than the last item number in the current list, then, at step 4245, the lowest available item that is higher than the last item number of the current list is "removed" from its input bucket and, at step 4247, is added to the end of the current list. That is, it should be understood that, similar to the N×N sequencing methodology described above, when the lists are compiled, in embodiments, the items are not actually removed from the input buckets. However, in order to illustrate the compiling of the current list and the availability of a next item in the bucket (exposed as being the head item in the bucket) in the methodology described above and the figures described below, upon being added to a current list, these items are shown as removed from the input buckets. Furthermore, contemporaneously with (or subsequent to) either of steps 4245 and 4257, at step 4250 the current list is updated in a storage system, e.g., a database.

Put another way, the N×M sorting/sequencing methodology looks through the available inputs for all items that are larger than the last item in the current list being built. The lowest item among them is selected. Alternatively, the N×M sorting/sequencing methodology may also simply look through the available inputs and select the lowest item that is higher than the last item in the current list. The next higher item means that the sequence number associated with the item is greater than or equal to the sequence number associated with the last item in the current list. That is, the invention contemplates that, in embodiments, items may be given equivalent sequencing numbers if it is determined, for example, that each of those items could come before or after any of the other(s) items.

If, at step 4242, it is determined that there is not an available item in any of the input buckets having a higher item number than the last item number in the current list, then at step 4252, the items in the current list are loaded into a transport and, at step 4255, these items are loaded into a next available output bucket. That is, if no such item exists, then the current list is sent to transport and moved into an output bucket. Additionally, if, at step 4237, it is determined that the input is empty, then the process continues at step 4252.

The output bucket, to which a current list is moved into, is preferably empty. However, it is possible, in embodiments, that the number of current lists built exceeds the number of output buckets. In this situation, a scheme for placing those current lists is necessary. As discussed further below, in order to sequence when the number of current lists built exceeds the number of output buckets, the system of the present invention is operable to delineate between discrete groups of mail pieces placed in a same output bucket from different current lists. After completion of a pass, the buckets will be emptied and sent to the next pass.

At step 4260, a determination is made as to whether the sequencing is complete. If, at step 4260, it is determined that the sequencing is not complete, the process continues at step 4237. If, at step 4260, it is determined that the sequencing is complete, at step 4262 the sequenced items are output.

For final sequencing, the N×M sorting/sequencing methodology simply repeats the sequencing process until it is determined that all the items are in the proper final sequence.

It should be noted that, while in the example below, items are numbered 1 through 16, it is not necessary for the items to be numbered in consecutive order. That is, the N×M sorting/sequencing methodology is operable to process any combination of numbering of the items.

Additionally, in embodiments, the N×M sorting/sequencing methodology may be used in either a cascading or looping physical layout. In embodiments, the system of transport may be a determinant factor in determining a cascading or looping physical layout. Furthermore, passes through the overall N×M sorting/sequencing methodology's process should be kept separate. For example, if a looping layout is applied and the N×M sorting/sequencing methodology sends the current list to the 1st input bucket, then that input should not be used in the same input for the ongoing 1st pass.

Furthermore, because the N×M sorting/sequencing methodology selects the next highest item to place at the end of the list, the current list is at least the number of inputs, available at that time, long. This reduces the number of buckets and/or the number of passes necessary to sequence the same number of items by increasing the density of the lists that fill each individual output bucket. In a looping layout, the only buckets necessary may be the input buckets (depending on the system of recirculation for the transport).

FIGS. 42T-42EE illustrate exemplary intermediate steps in an N×M sequencing methodology and FIG. 42FF shows an exemplary final sequenced output in accordance with aspects of the invention. More specifically, the following is an example of an N×M sequencing methodology using a 3-input 2-output system. That is, with the example of FIGS. 42T-42FF, N=3 and M=2.

As discussed above, each bucket shown in FIGS. 42T-42FF is representative of parallel transport lanes or segments in the transportation paths of the facility wide letters/flats sortation and/or sequencing system, meaning that sorting and/or sequencing of the items, e.g., frames, can be processed in parallel. Also, each bucket that is shown at a different level in FIGS. 42T-42FF is representative of a different stage of sorting and/or sequencing in the facility wide letters/flats sortation and/or sequencing system, e.g., different transport lanes or segments which receive mail pieces from an upstream portion of the system. For example, these different stages can be equivalent to downstream transport lanes or segments in the transportation paths for further processing of the mail pieces into a certain sort depth or sequence. Also, as should be understood, the use of the term "pass" refers to processing of the mail pieces through different transport lanes or segments of the present invention, e.g., different stages of a cascading arrangement, and does not necessarily mean that the mail pieces have to be unloaded and reloaded into the system as is conventional in a multiple pass sort algorithm.

Figure 42U:
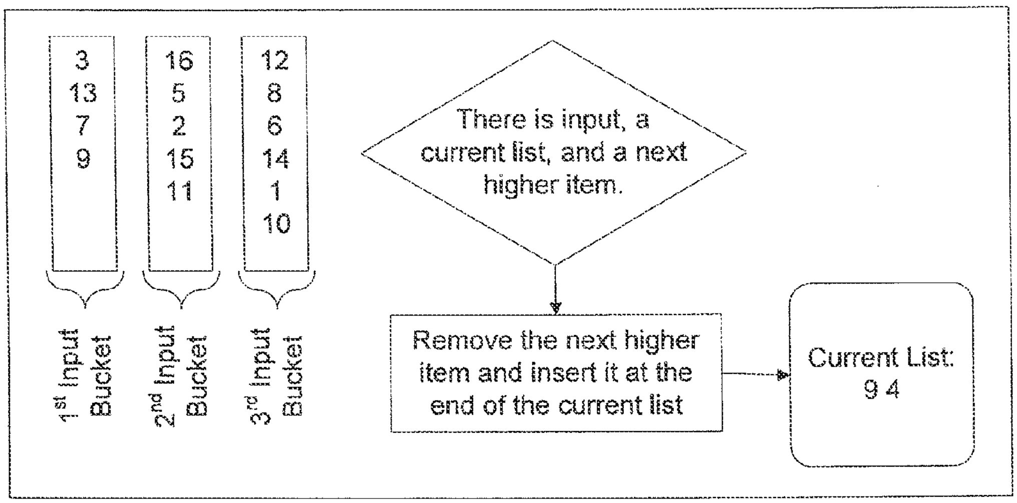

As shown in FIG. 42T, the items are input into the input buckets as evenly as possible. However, it should be noted that, with this example, there are sixteen items, and as such, an even distribution is not possible with three input buckets. Moreover, as shown in FIG. 42T, as there is no current list, a new current list is established and the lowest item, item 4, is moved to the current list. As explained above, while item 4 is shown in the example as being "removed" from the first input bucket (as shown in FIG. 42U) it should be understood that item 4 is not actually moved from the input bucket to an output bucket until a current list is completed. However, in order to illustrate the N×M sequencing methodology, whereupon once item 4 is compiled in the current list, a new item (in this example, item 9) is next in line at the head of the input bucket, upon being added to the current list these items are shown as removed from their respective input buckets.

As shown in FIG. 42U, as there is input, there is a current list and there is a next higher item, the next highest item is removed and placed at the end of the current list. Thus, item 9 is moved to the end of the current list. That is, once item 4 is "removed" from the 1st input bucket, item 9 is now exposed. Moreover, item 9 is the next higher item as compared to item 10 and item 11.

Figure 42V:
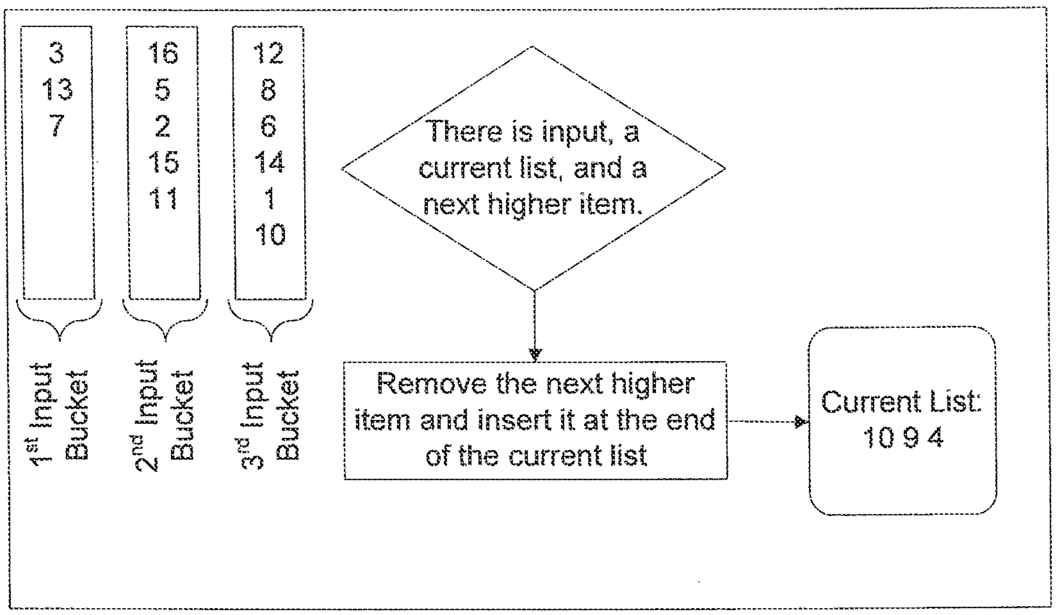
Figure 42W:
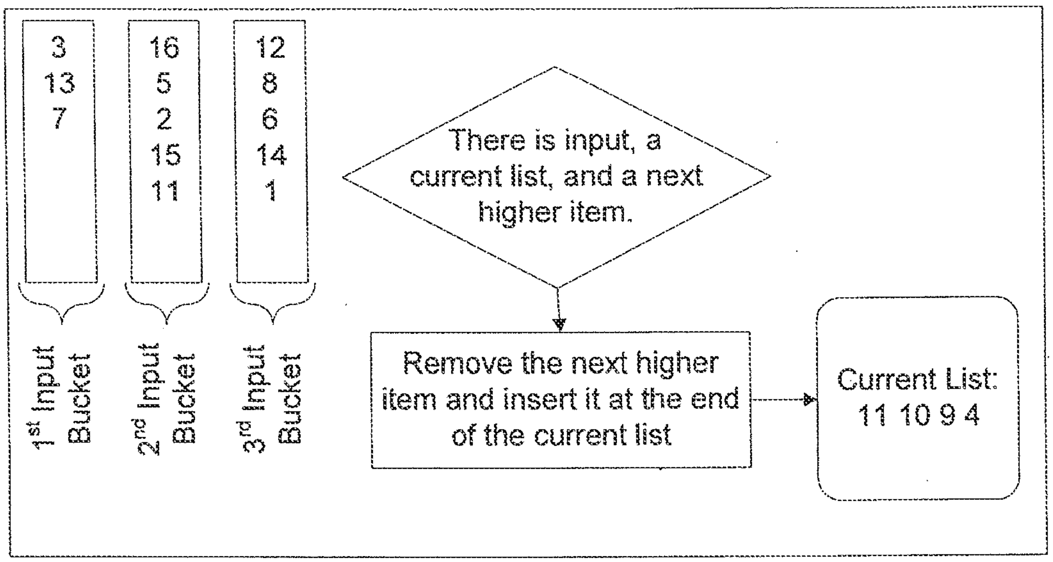
Figure 42X:
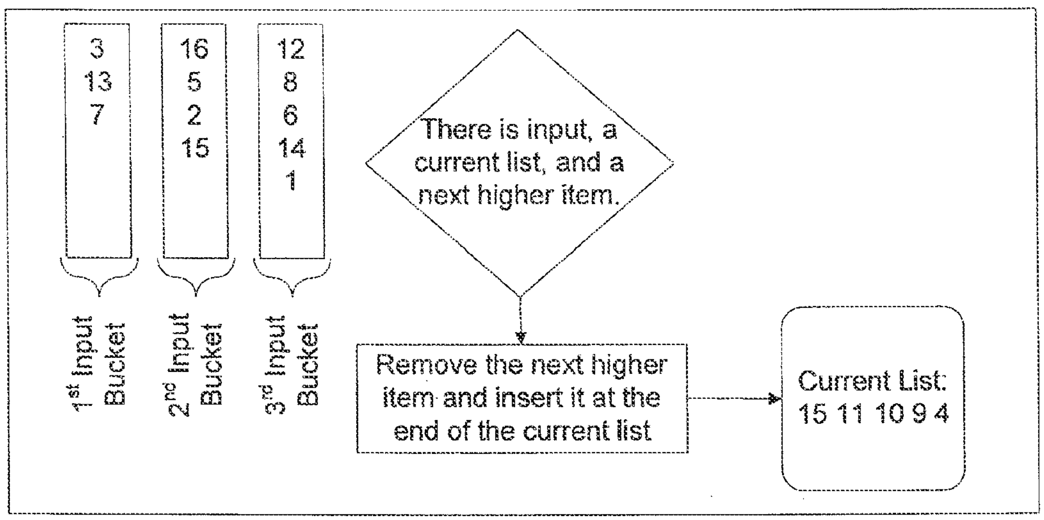

As shown in FIG. 42V, as there is input, there is a current list and there is a next higher item, the next highest item is removed and placed at the end of the current list. Thus, item 10 is moved to the end of the current list. Further, as shown in FIG. 42W, as there is input, there is a current list and there is a next higher item, the next highest item is removed and placed at the end of the current list. Thus, item 11 is moved to the end of the current list. Additionally, as shown in FIG. 42X, as there is input, there is a current list and there is a next higher item, the next highest item is removed and placed at the end of the current list. Thus, item 15 is moved to the end of the current list.

Figure 42Y:
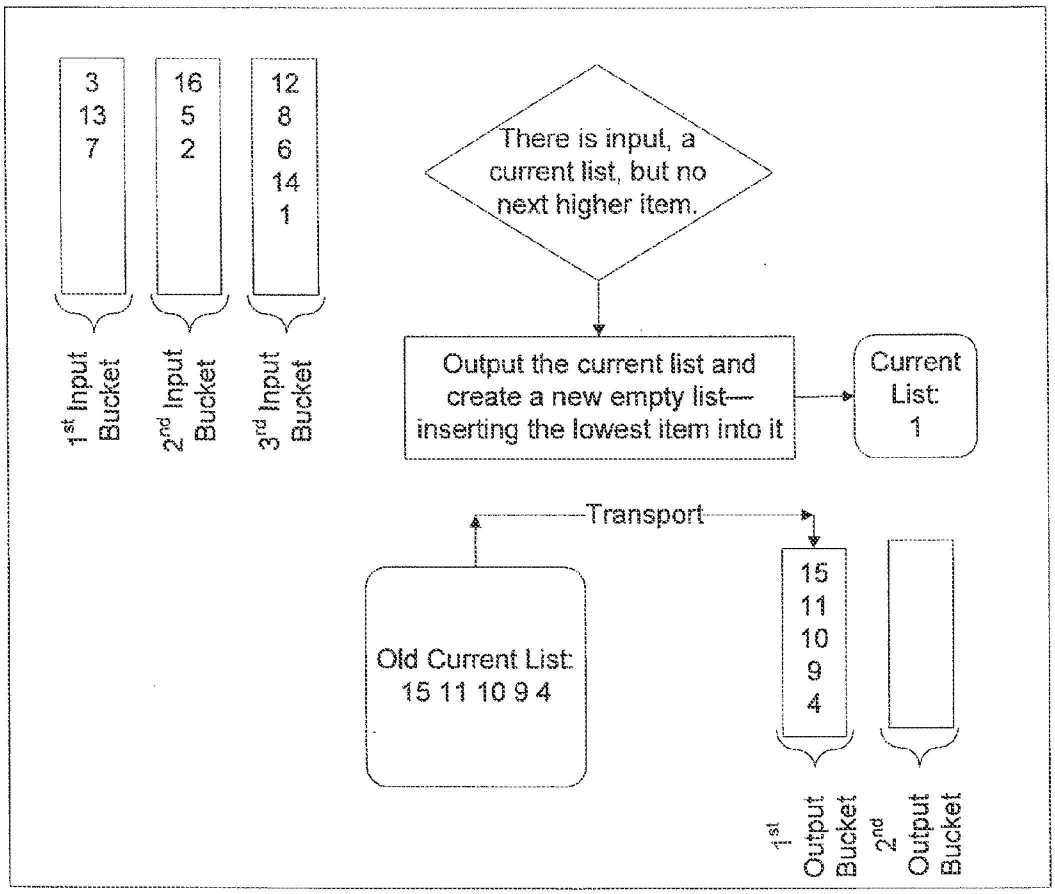

As shown in FIG. 42Y, there is input and a current list. However, there is no next higher item. That is, items 1, 2 and 7 are all less than 15. As such, the current list is output into the 1st output bucket and a new current list is started. Thus, as shown in FIG. 42Y, item 1 is added to the new current list.

Figure 42Z:
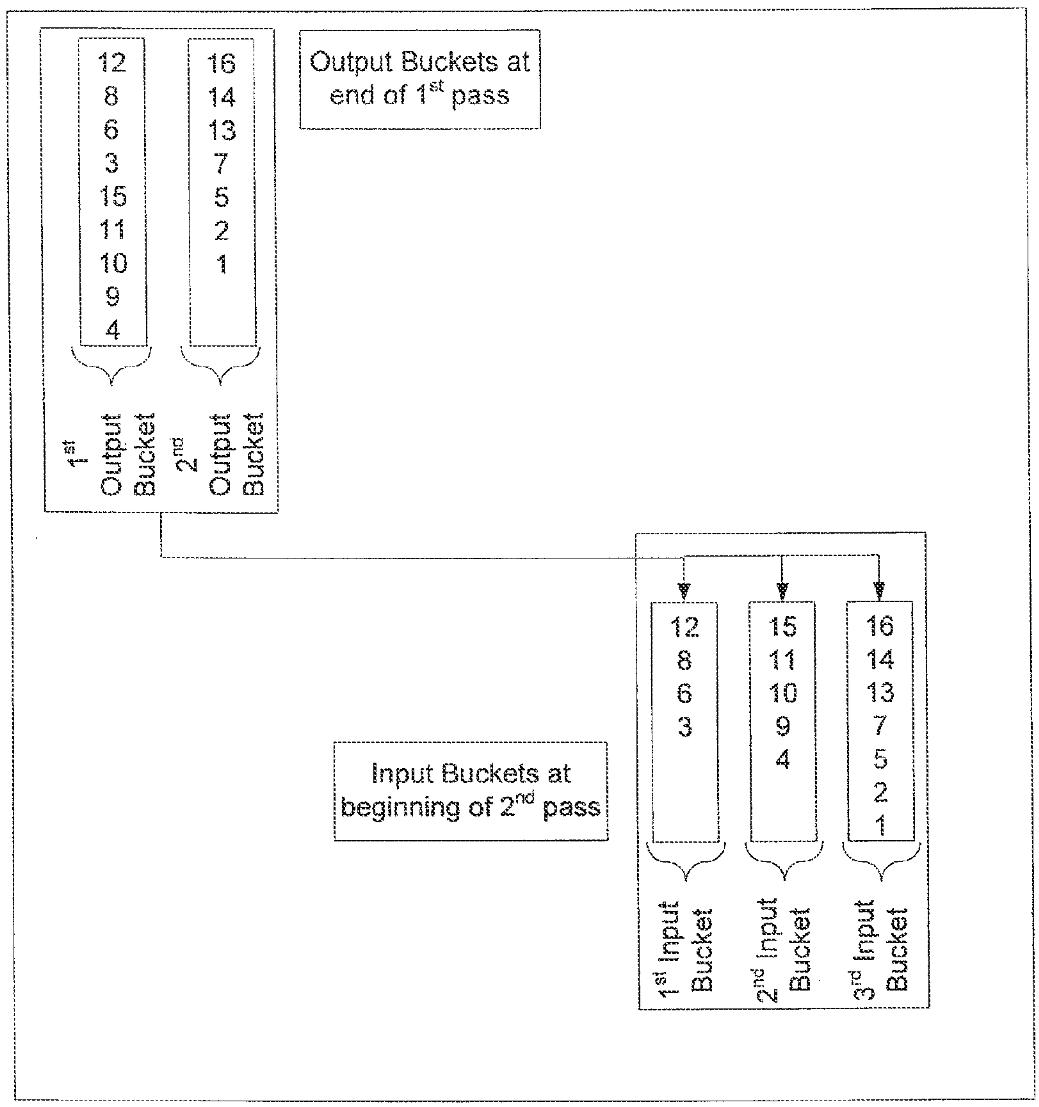
Figure 42A:
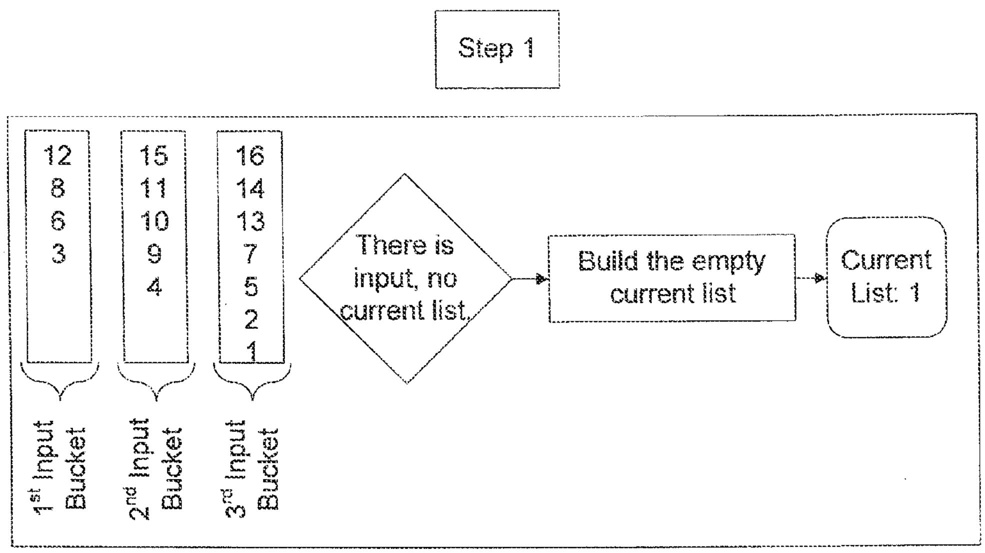
Figure 42B:
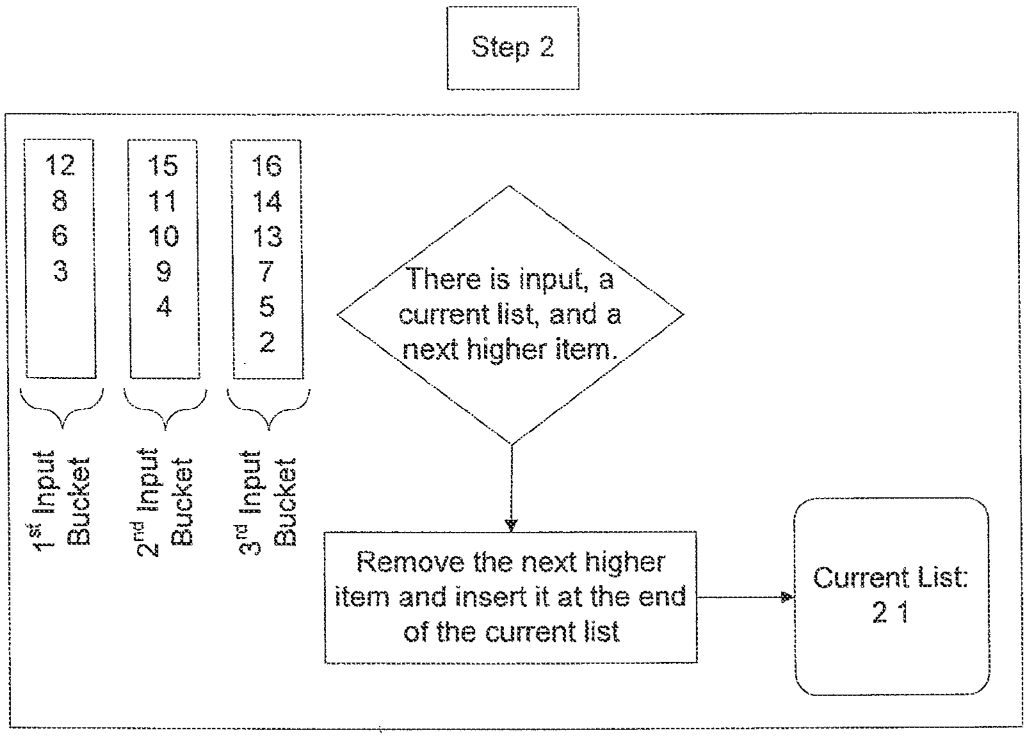
Figure 42C:
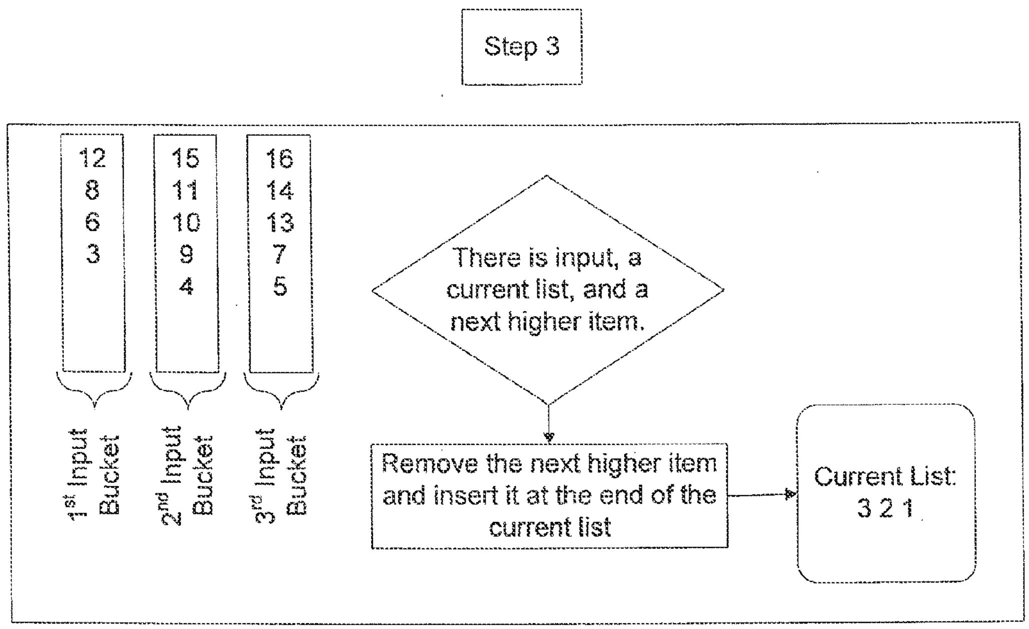
Figure 42D:
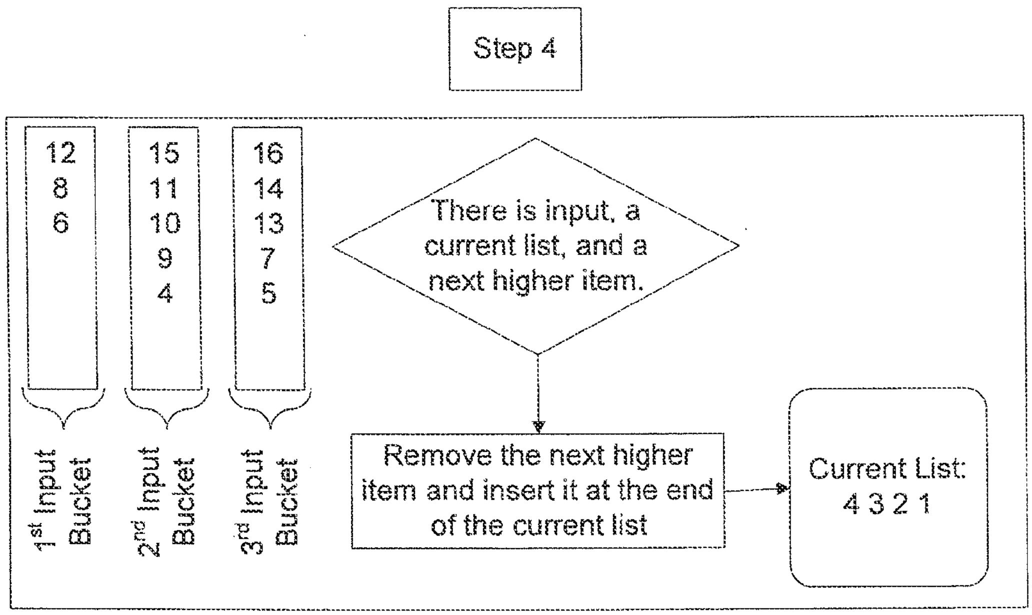
Figure 42E:
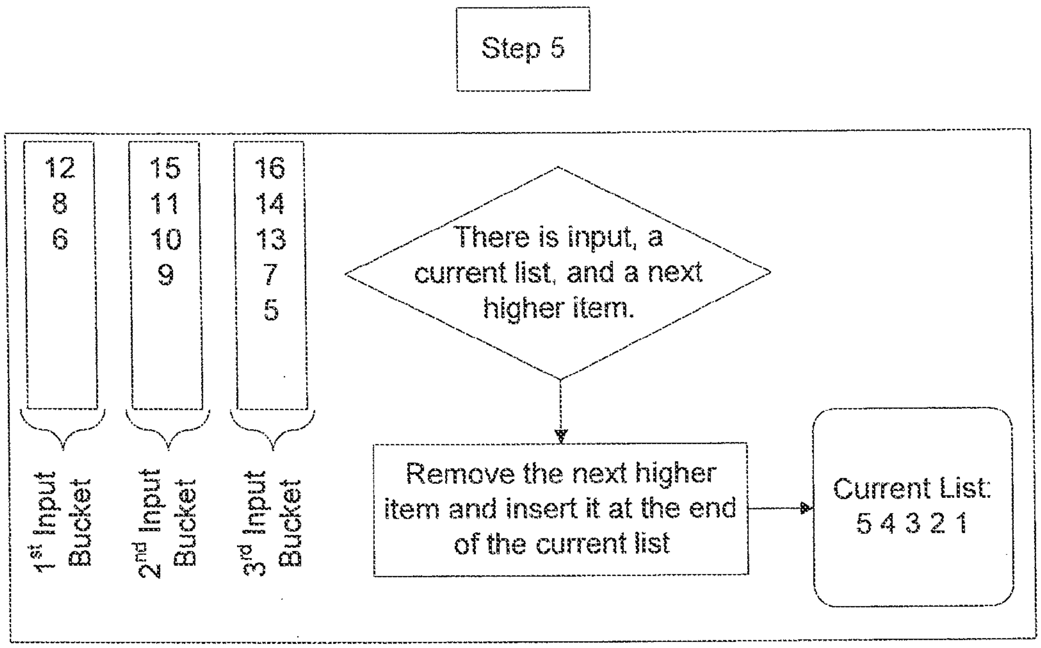
Figure 42F:
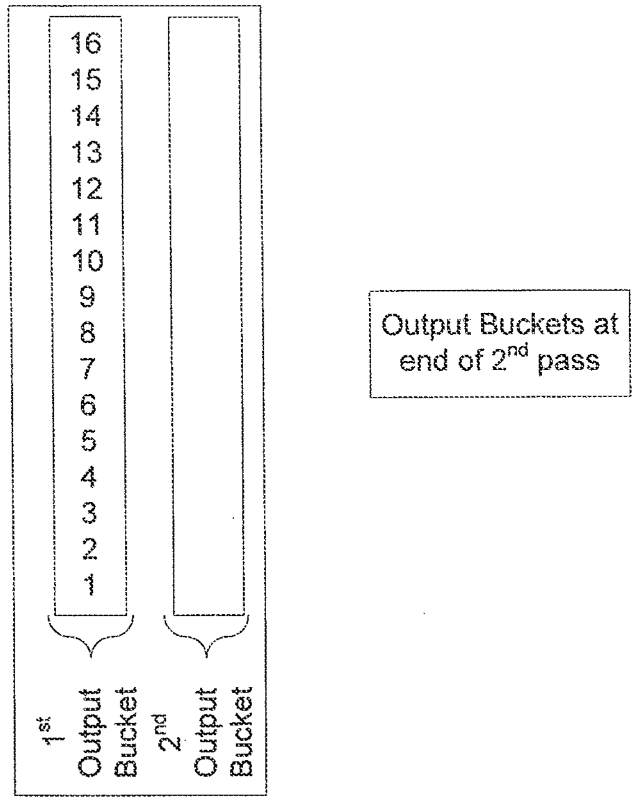
Figure 42H:
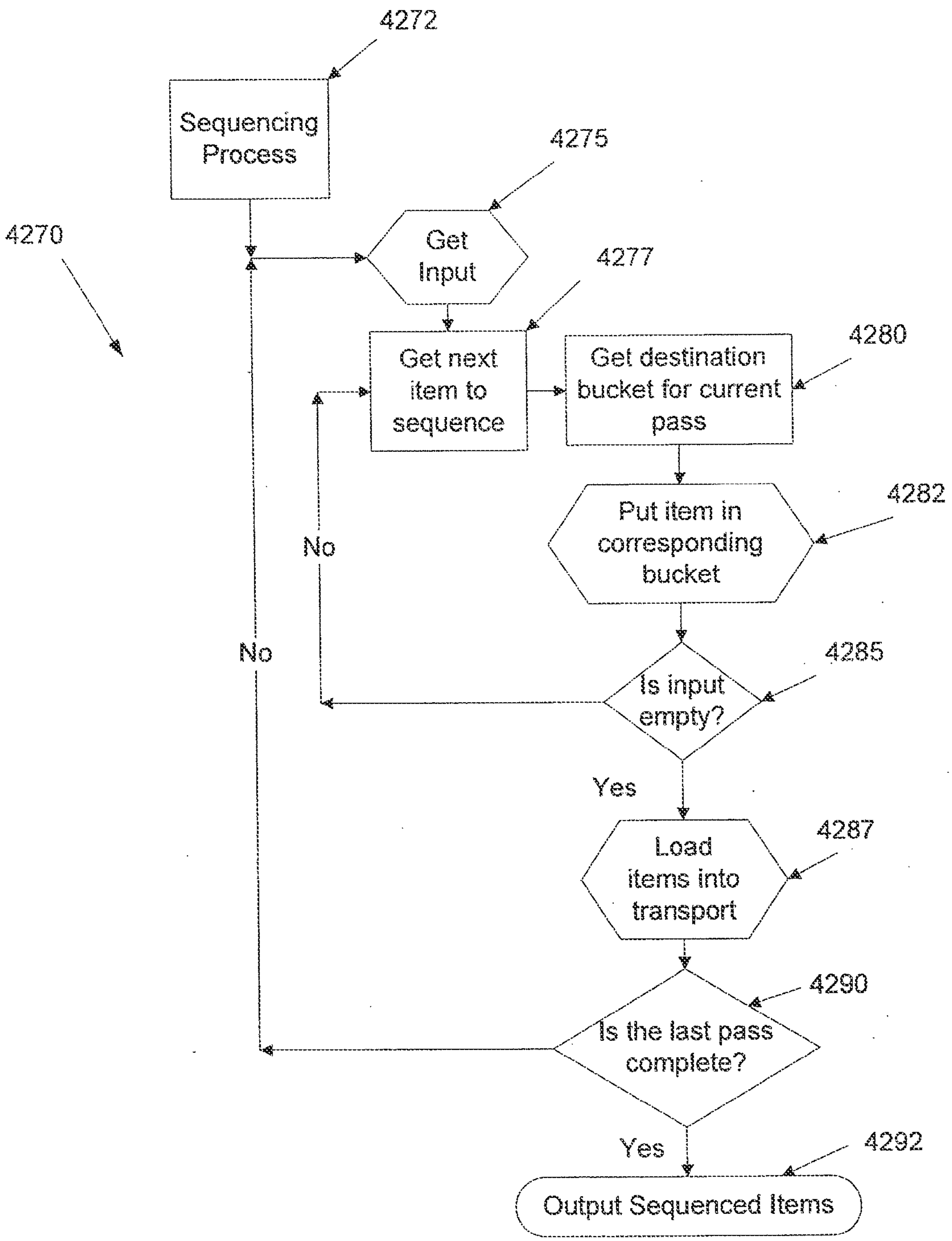
Figure 42I:
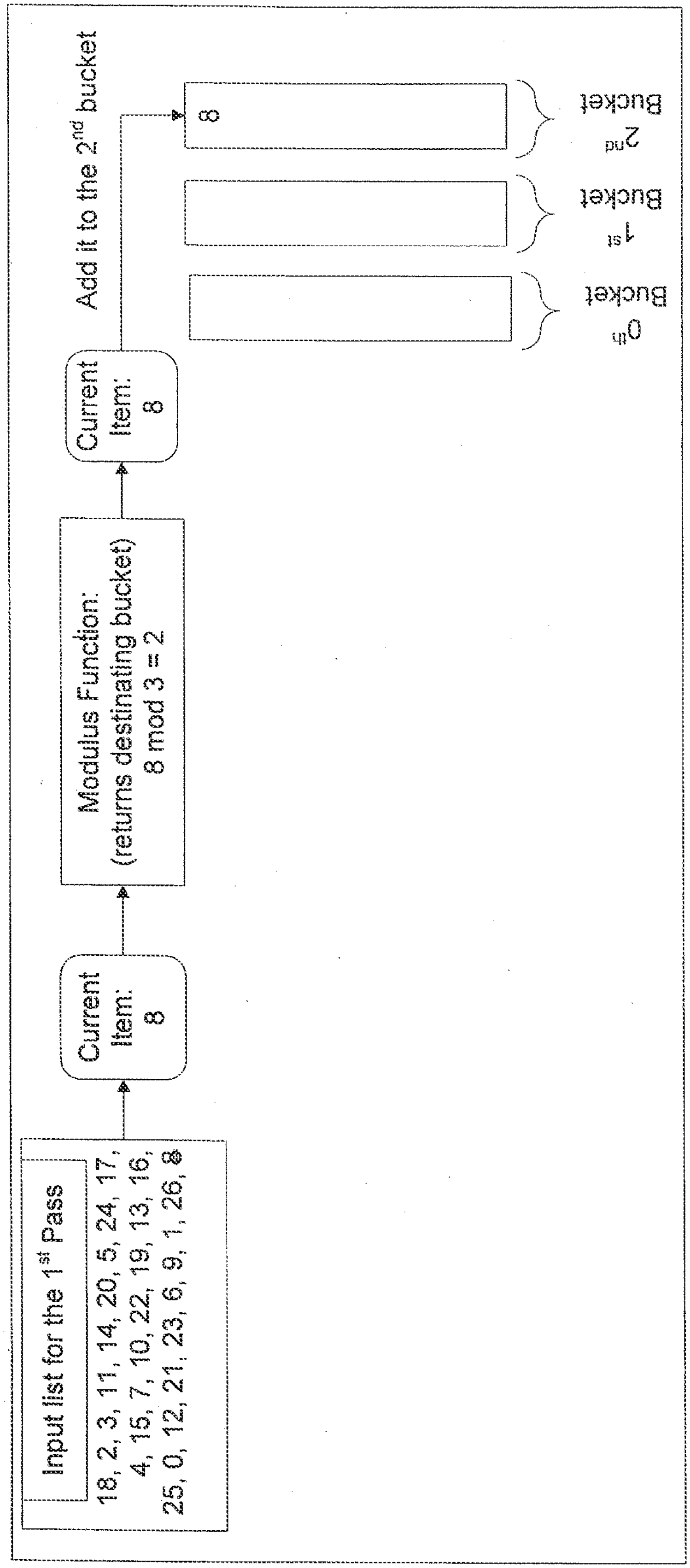
Figure 42J:
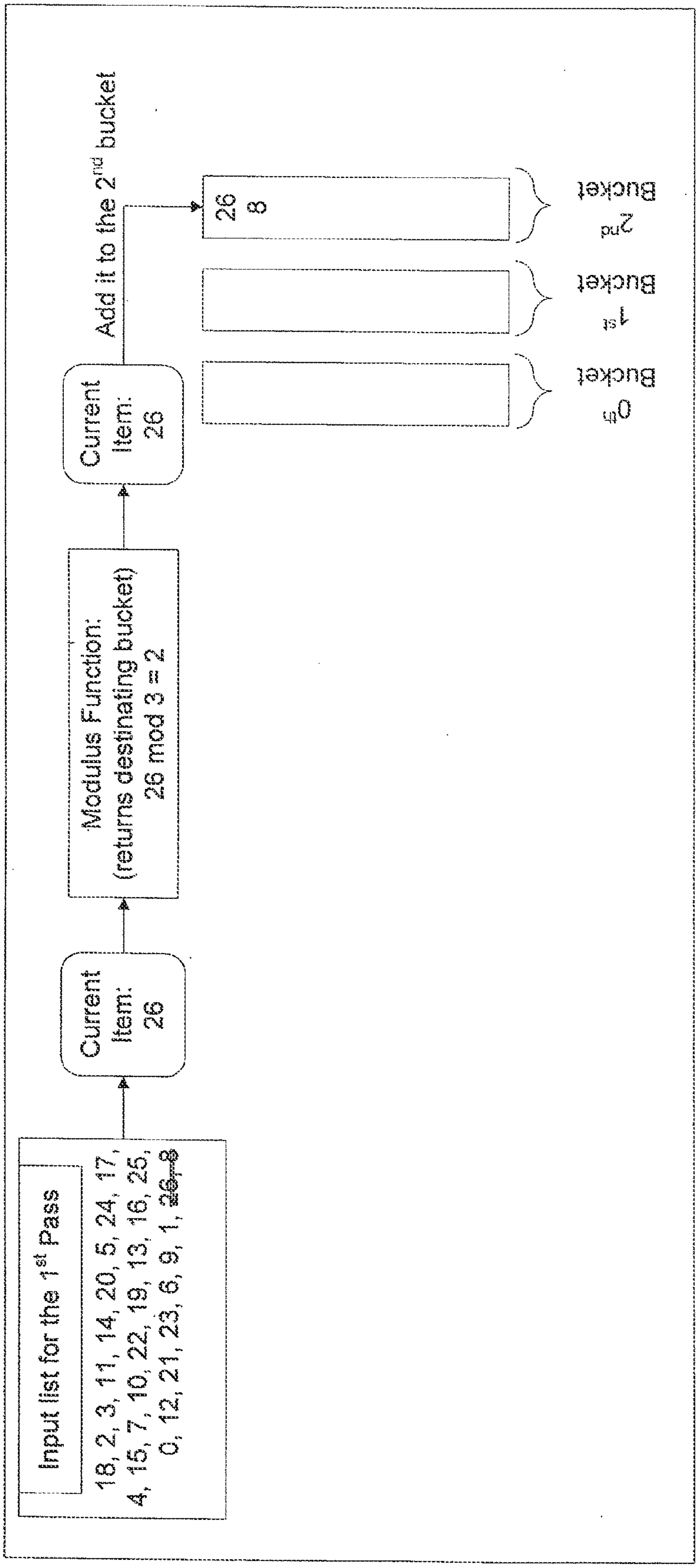
Figure 42K:
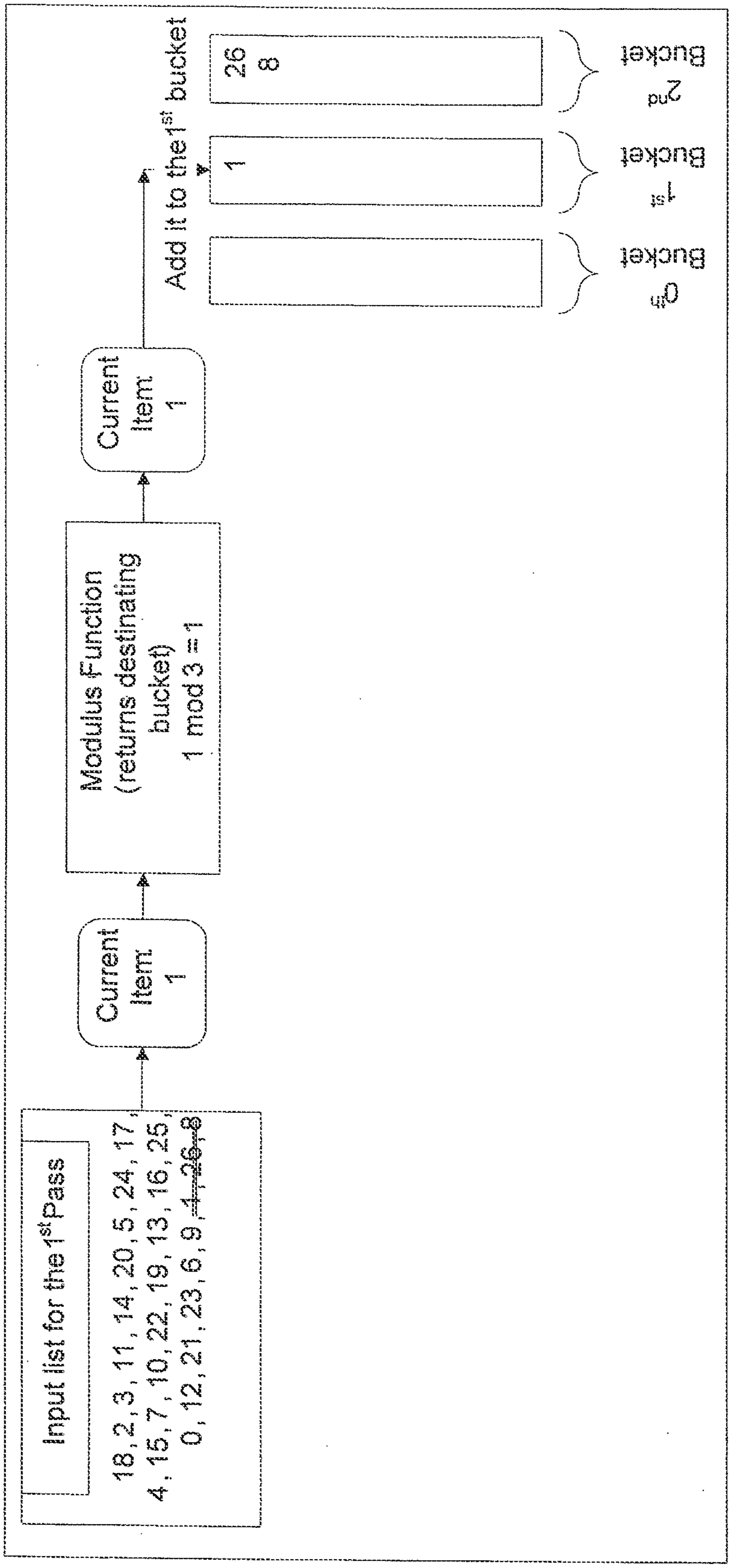
Figure 42L:
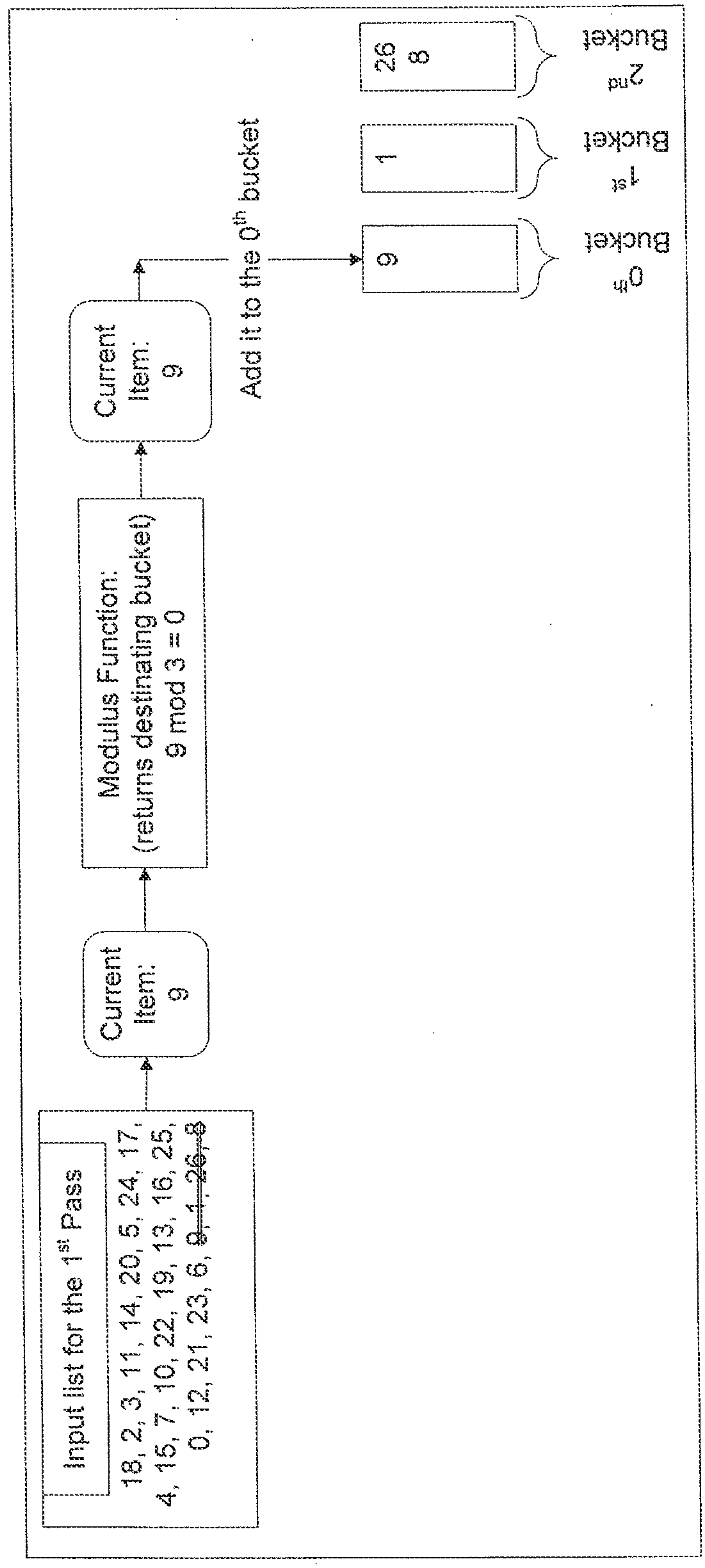
Figure 42M:
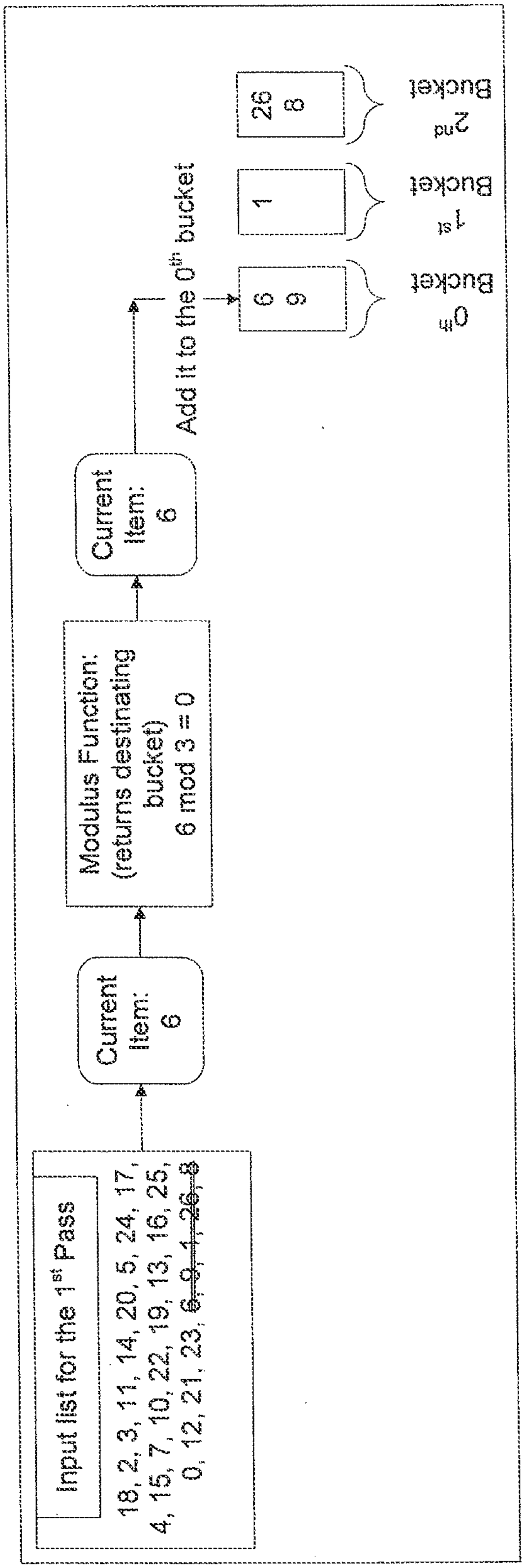
Figure 42N:
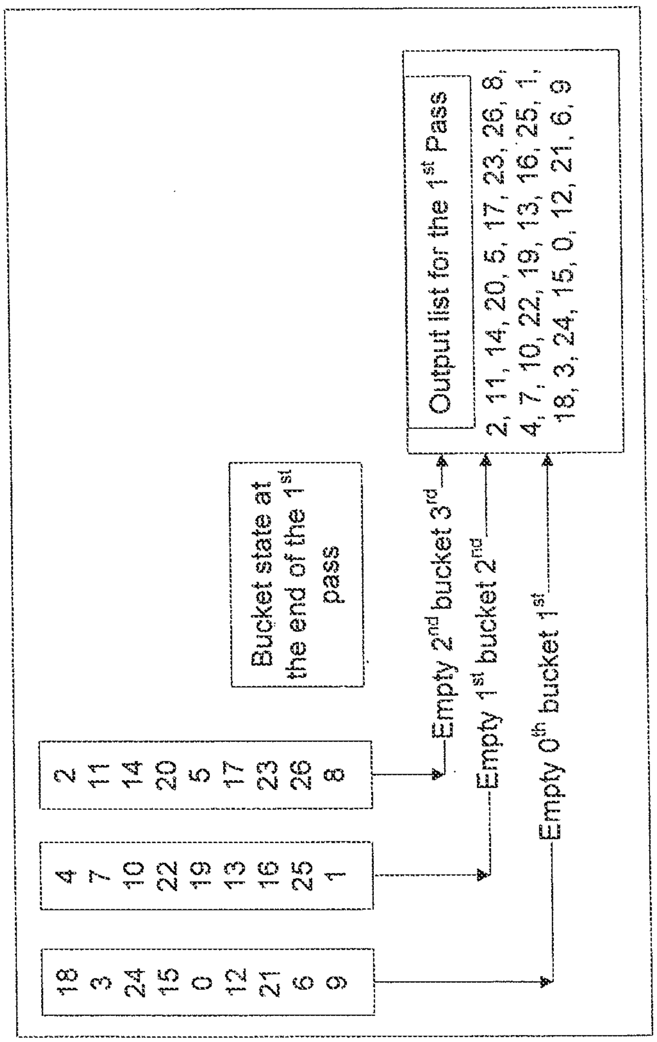
Figure 42O:
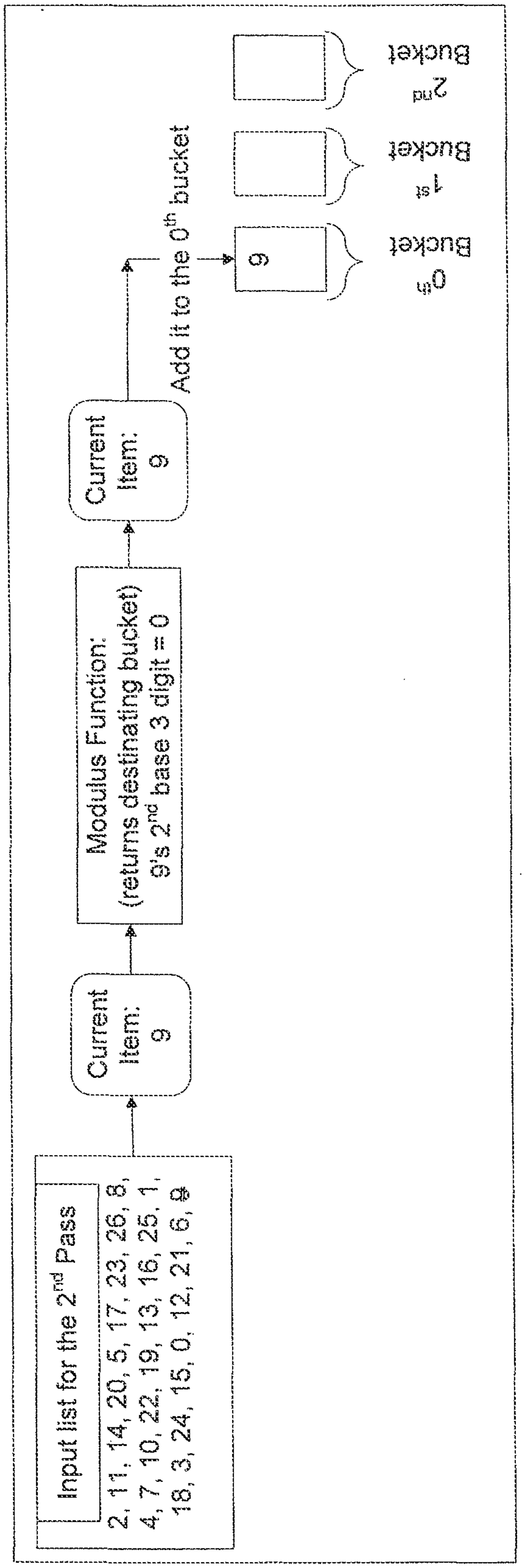
Figure 42P:
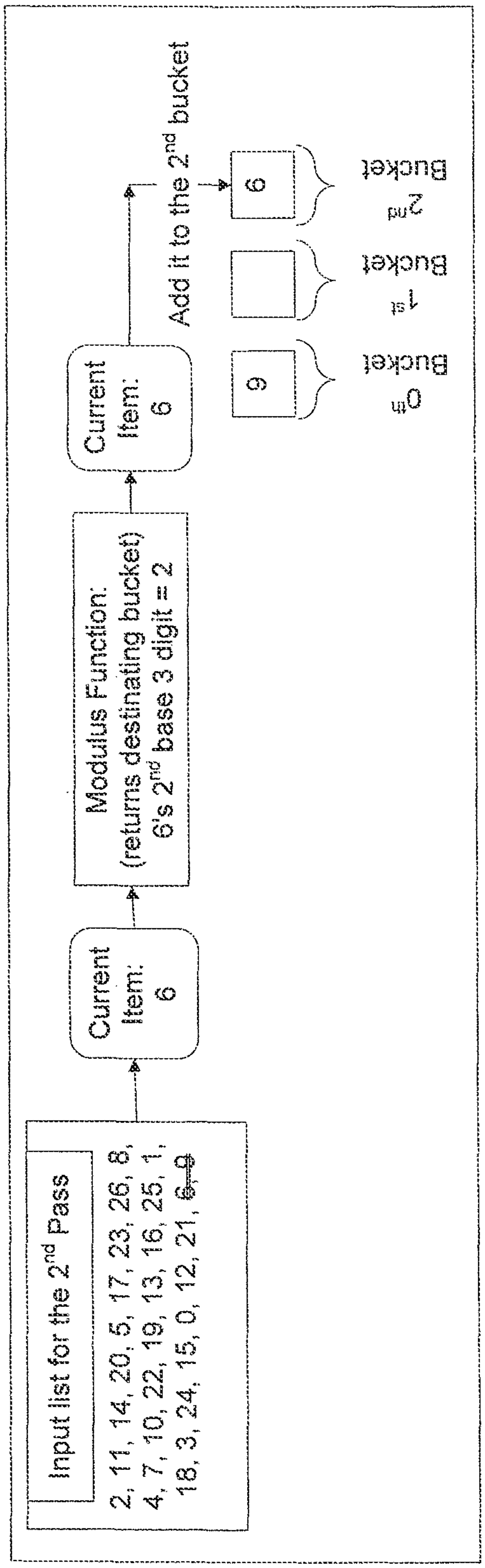
Figure 42Q:
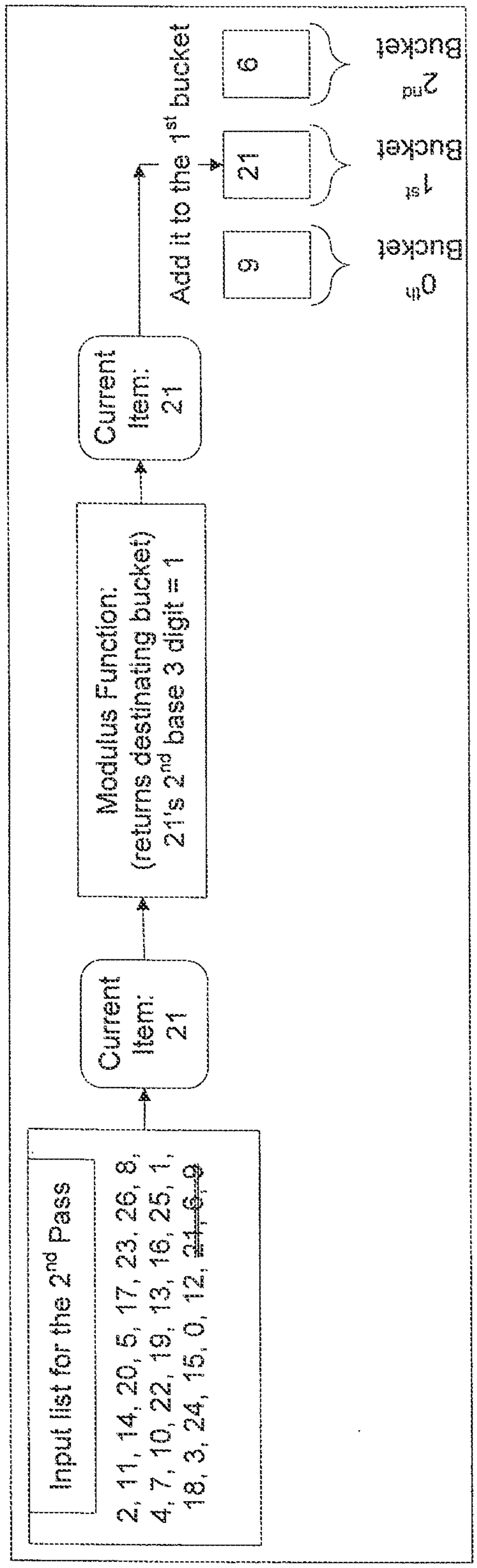
Figure 42R:
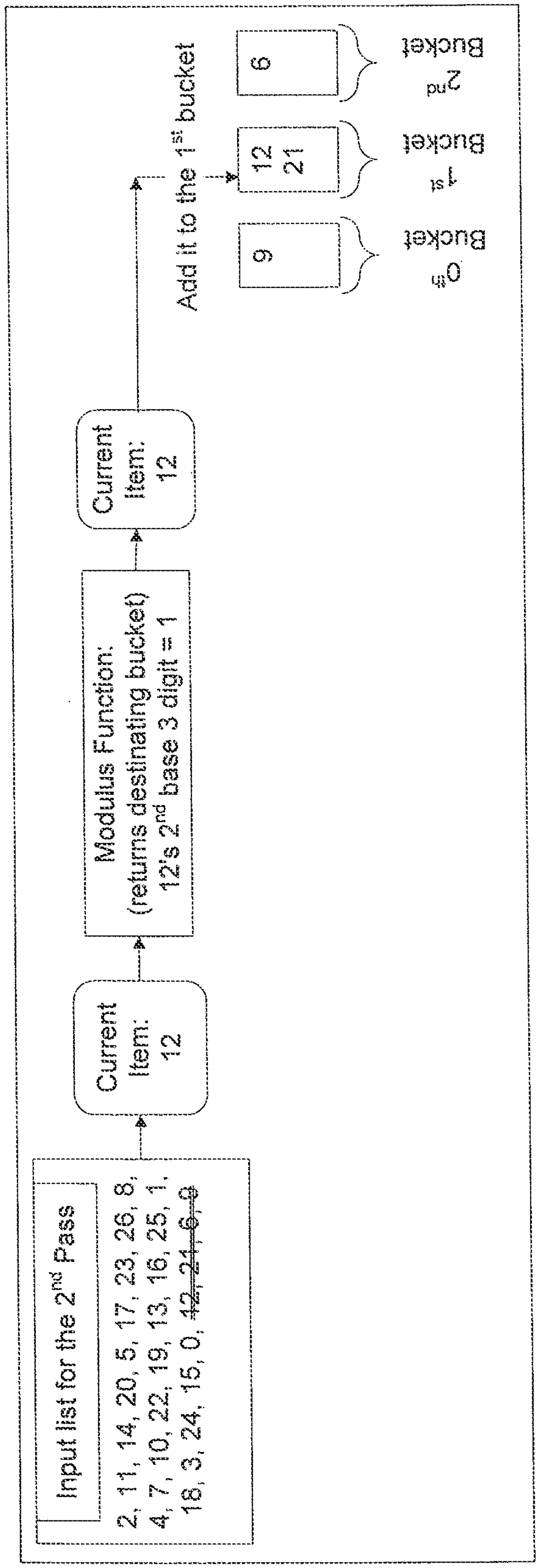
Figure 42S:
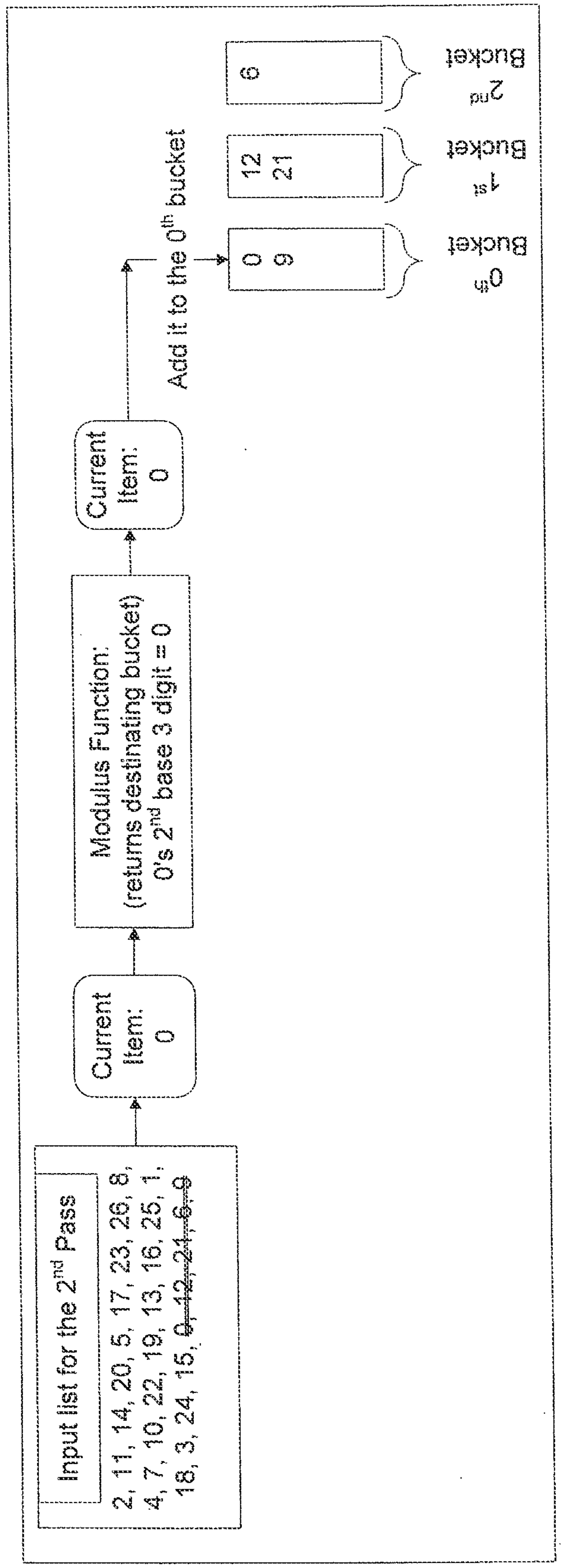
Figure 42T:
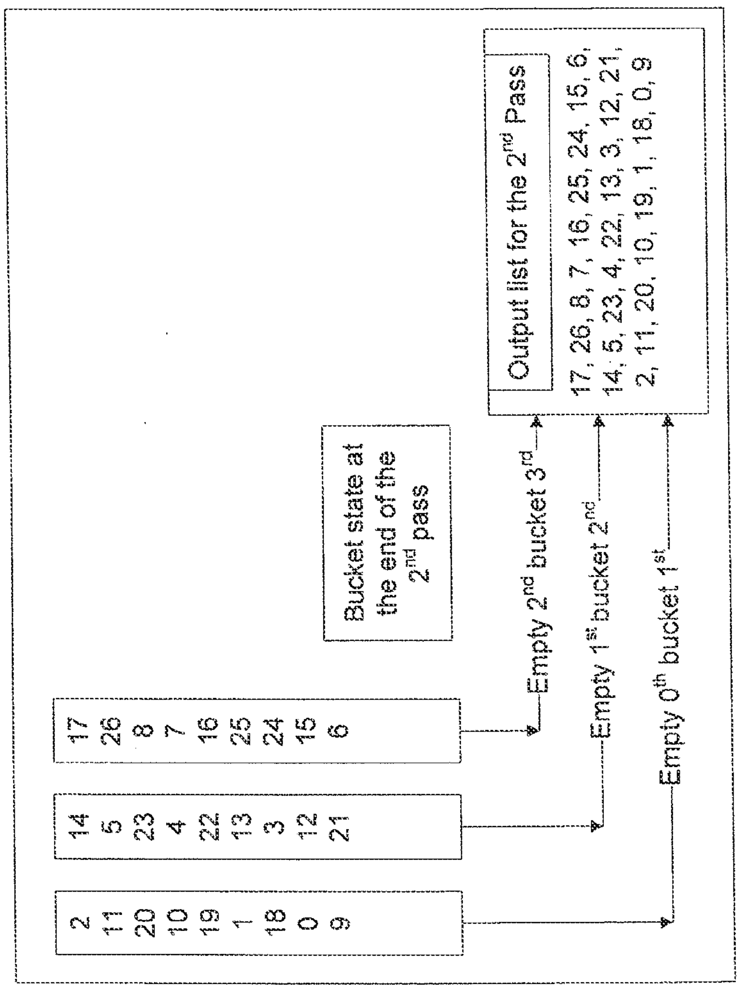
Figure 42U:
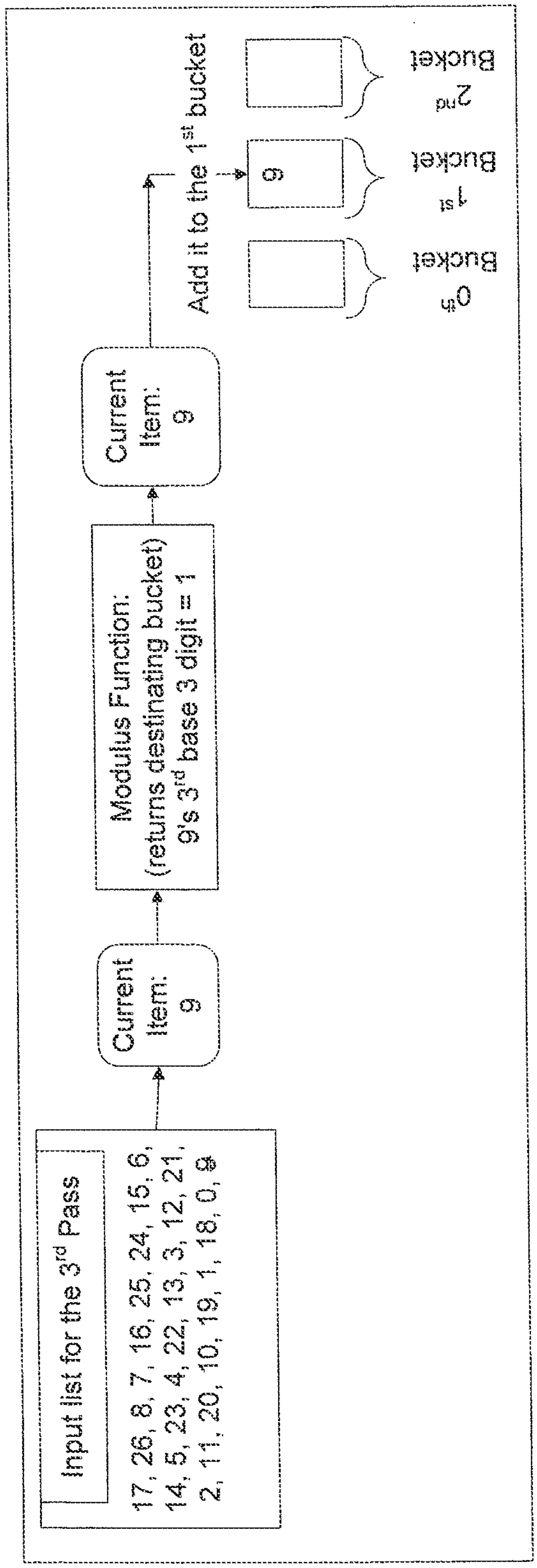
Figure 42V:
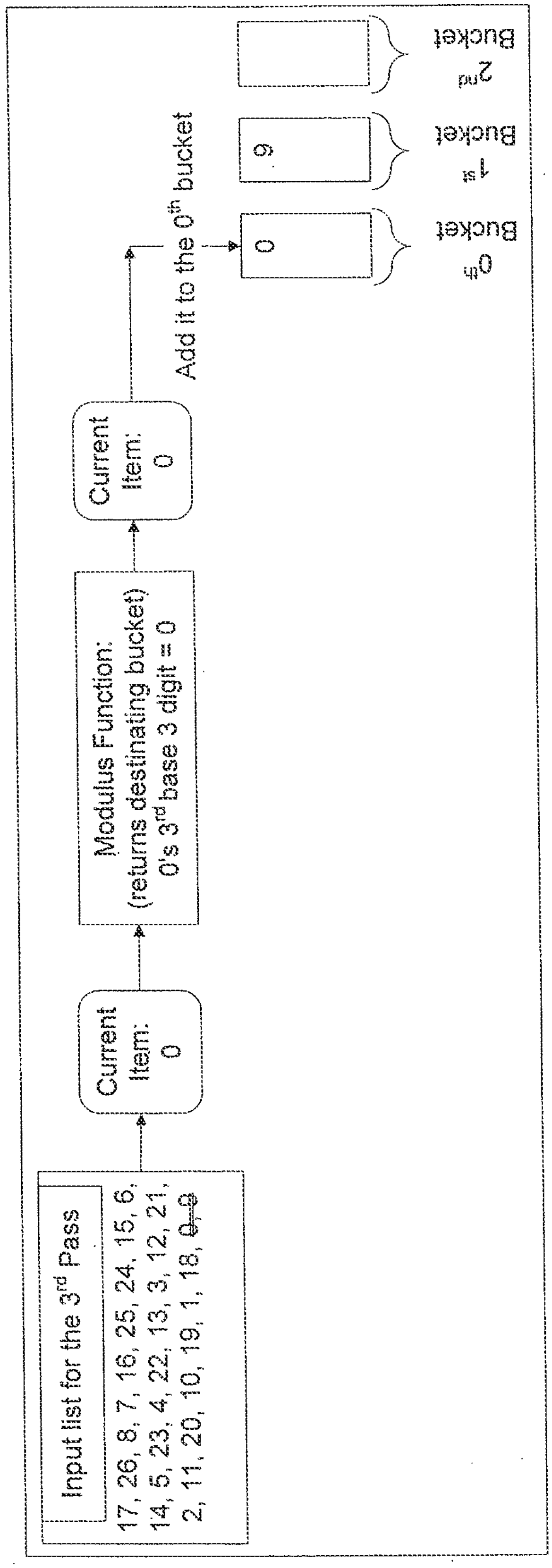
Figure 42W:
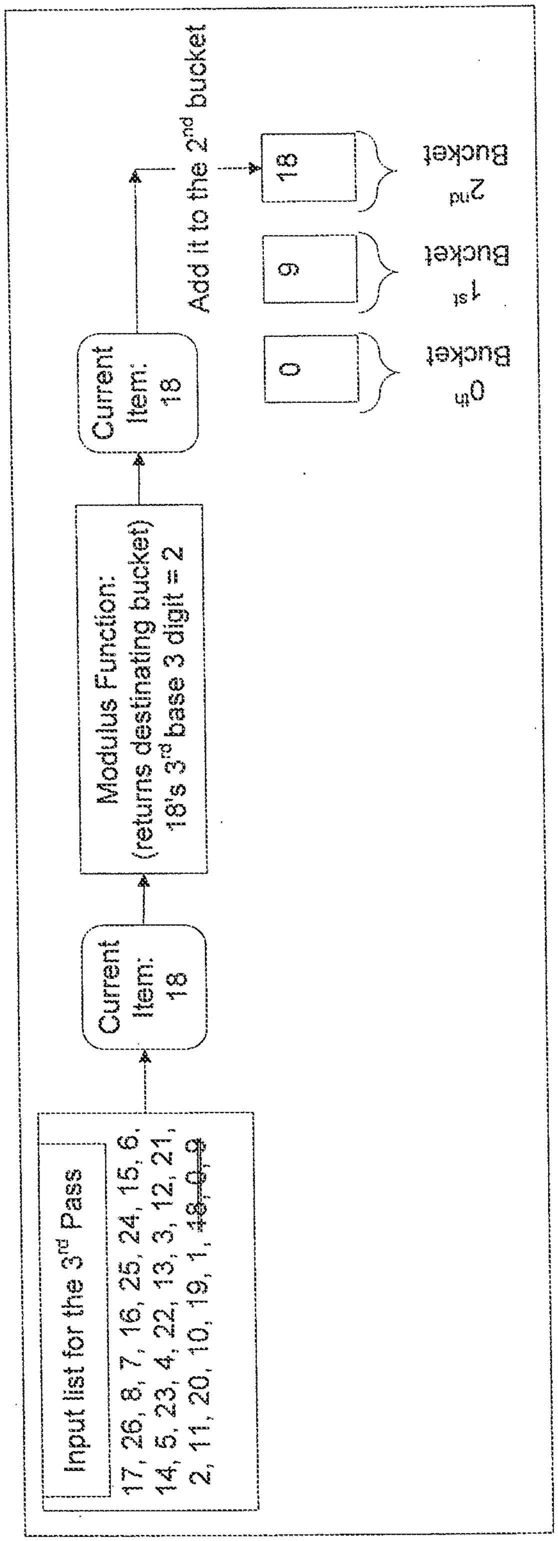
Figure 42X:
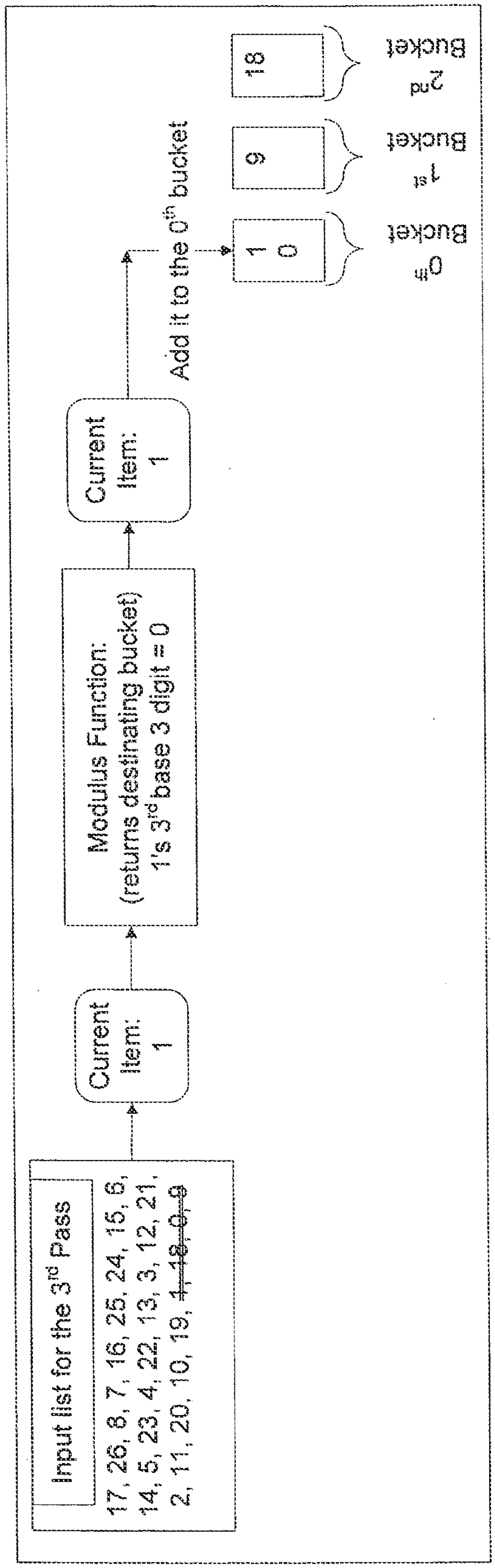
Figure 42Y:
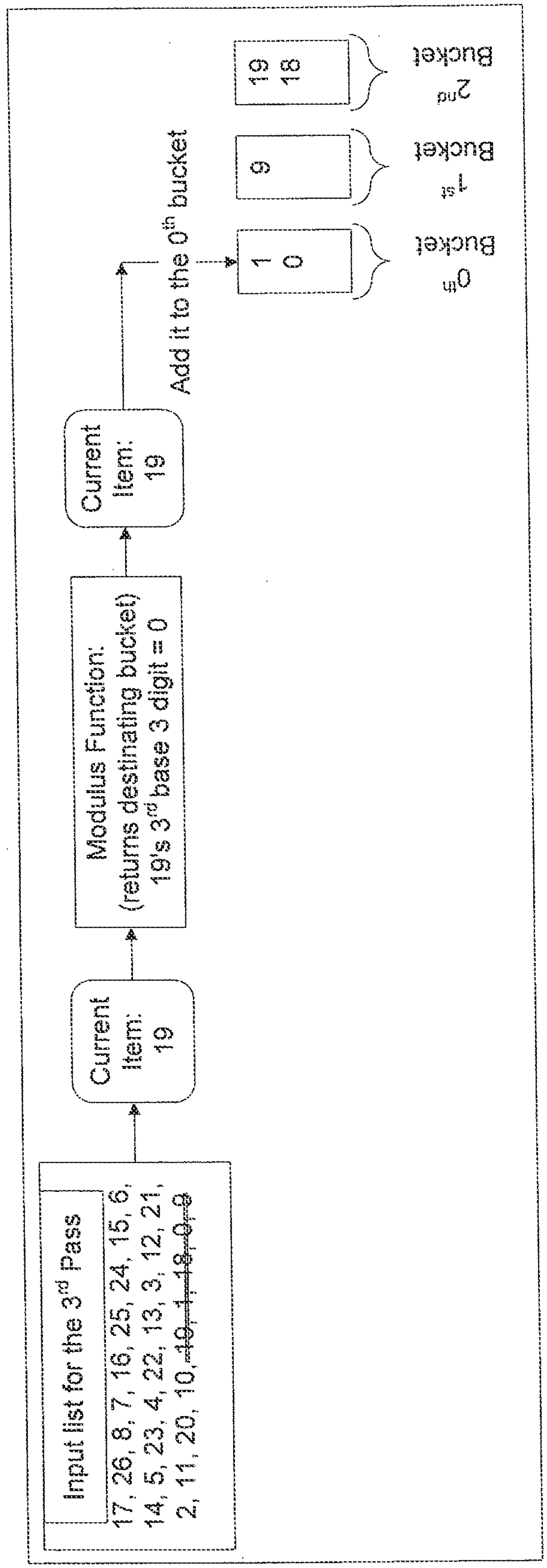
Figure 42Z:
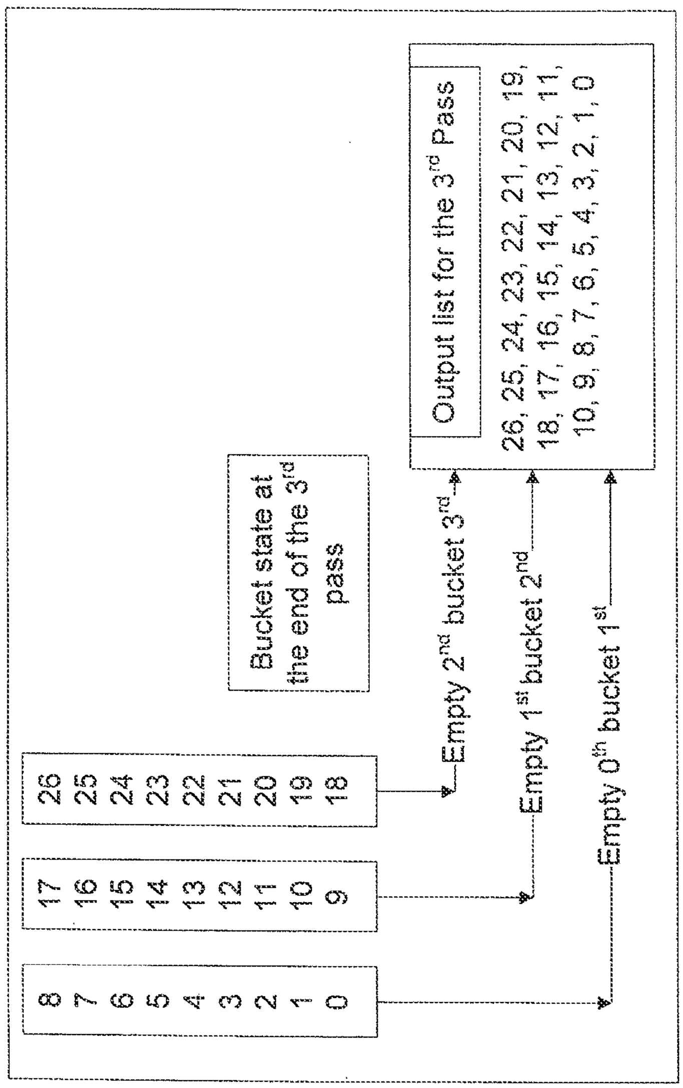

FIG. 42Z shows the output buckets at the end of the first pass. Thus, as shown in FIG. 42Z, the second current list was built of items 1, 2, 5, 7, 13, 14 and 16. Moreover, the items of the second current list have been moved to the 2nd output bucket. Moreover, while not shown, as there is input and a current list, but there is no next higher item, a new current list was established and items 3, 6, 8 and 12 have been added to the new current list. Upon adding item 12 to the new current list, there is no more input. Thus, as shown in FIG. 42Z, the new current list has been added to the output buckets. However, as there are only two output buckets in this exemplary N×M sorting/sequencing methodology, the new current list is added to the 1st output bucket behind the previously loaded current list(s) of the 1st output bucket. Moreover, the system is operable to delineate the divisions between the discrete current lists that are placed into a single output bucket, such that, upon transfer to input buckets for the beginning of the second pass, the discrete current lists may be placed into separate input buckets. Thus, as shown in FIG. 42Z, the three current lists established in the first pass have been placed into the three input buckets.

FIG. 42AA shows the buckets at the beginning of a second stage or pass. As shown in FIG. 42AA, as there is input there is a current list and there is no current list, a current empty list is started. Moreover, as item 1 is the lowest available item, item 1 is moved to the current list. As shown in FIG. 42BB, as there is input, there is a current list and there is a next higher item, the next highest available item is removed and placed at the end of the current list. Thus, item 2 is moved to the end of the current list. As shown in FIG. 42CC, as there is input, there is a current list and there is a next higher item, the next highest item is removed and placed at the end of the current list. Thus, item 3 is moved to the end of the current list. As shown in FIG. 42DD, as there is input, there is a current list and there is a next higher item, the next highest item is removed and placed at the end of the current list. Thus, item 4 is moved to the end of the current list. As shown in FIG. 42EE, as there is input, there is a current list and there is a next higher item, the next highest item is removed and placed at the end of the current list. Thus, item 5 is moved to the end of the current list.

FIG. 42FF shows the output buckets at the end of the second pass or stage. As shown in FIG. 42FF, all of the items have been moved to the first output bucket. Moreover, all of the items have been properly sequenced in numerical order. Furthermore, as shown in FIG. 42FF, in embodiments each of the output buckets may not be necessary for subsequent passes (e.g., cascades or loops), and thus, the output buckets may be utilized to perform other sequencing/sorting processes. For example, as shown in FIG. 42FF, as all of items have been moved to the first output bucket, the second output bucket is not needed for the second pass, and may thus, be utilized for other sequencing/sorting processes.

Applied Radix Sorting/Sequencing Methodology

According to further aspects of the invention, an applied radix sorting/sequencing methodology may be implemented to sequence mail pieces in accordance with the present invention. With an applied radix sort, each item is selected from a list of inputs. For each pass that the sort goes through, the output of the previous pass is the input to the next pass. After the final pass, the items form a list of items sequenced based on the order in which they were desired. The number of items that can be sequenced using a radix sorting/sequencing methodology may be determined by the product of the number of buckets N in each pass m. In embodiments, radix sorts use a constant number of buckets (keeping the base for each pass the same). Thus, the total number of items that can be sequenced $N^m$ where N is the number of buckets and m is the number of passes.

Thus, in accordance with aspects of the invention, values are assigned to the items in such a way that the bases for each item obey the base value of that pass while preserving the final order that is desired (the lower the value, the earlier it is in the final order). FIG. 42GG shows an exemplary table of value assignments 4265 for an exemplary N=3, m=2 radix sequencing, where the item base ten values are converted into item base three values. Moreover, the item base three values are broken down to indicate an output bucket for each pass. Thus, for example, as shown in FIG. 42GG, item three is to be placed in the "0" or first output bucket on the first pass, the "1" or second output bucket on the second pass and the "0" or first output bucket in the third pass. In contrast, item twenty-four is placed in the "0" or first output bucket on the first pass, the "2" or third output bucket on the second pass and the "2" or third output bucket in the third pass.

FIG. 42HH shows an exemplary flow 4270 for performing a radix sequencing/sorting methodology in accordance with aspects of the invention. As shown in FIG. 42HH, at step 4272, the sequencing process commences. At step 4275, the input is received. At step 4277, the next available item is processed. At step 4280, the destination bucket is determined for the next item by looking up the bucket number indicated by the table of value assignments (an example of which is shown in FIG. 42GG) corresponding to the item number. At step 4282, the item is placed into the bucket indicated by the table of value assignments.

At step 4285, a determination is made as to whether the input is empty. If, at step 4285, it is determined that the input is not empty, the process continues at step 4277. If, at step 4285, it is determined that the input is empty, at step 4287, the items are loaded into a transport. At step 4290, a determination is made as to whether the last pass is complete. If, at step 4290, it is determined that the last pass is not complete, then the process continues at step 4275. If, at step 4290, it is determined that the last pass is complete, at step 4292 the items are output in sequenced order.

FIGS. 42II-42ZZ illustrate exemplary intermediate steps in an applied radix sorting and/or sequencing methodology. Again, as discussed above, each bucket shown in FIGS. 42II-42ZZ is representative of parallel transport lanes or segments in the transportation paths of the facility wide letters/flats sortation and/or sequencing system, meaning that sorting and/or sequencing of the items, e.g., frames, can be processed in parallel. Also, each bucket that is shown at a different level in FIGS. 42II-42ZZ is representative of a different stage of sorting and/or sequencing in the facility wide letters/flats sortation and/or sequencing system, e.g., different transport lanes or segments which receive mail pieces from an upstream portion of the system. For example, these different stages can be equivalent to downstream transport lanes or segments in the transportation paths for further processing of the mail pieces into a certain sort depth or sequence. Also, as should be understood, the use of the term "pass" refers to processing of the mail pieces through different transport lanes or segments of the present invention, e.g., different stages of a cascading arrangement, and does not necessarily mean that the mail pieces have to be unloaded and reloaded into the system as is conventional in a multiple pass sort algorithm.

FIG. 42II shows items at the beginning of a first pass. It should be noted that the output buckets are labeled $2^{nd}$ output bucket, $1^{st}$ output bucket and $0^{th}$ output bucket to correspond with the table of value assignments. However, it should be understood that, in embodiments, the output buckets may be respectively labeled $3^{rd}$ output bucket, $2^{nd}$ output bucket and $1^{st}$ output bucket.

As shown in FIG. 42II, item 8 is the next item in the input list for the first pass. As this exemplary sequencing is a three output bucket sequencing, the output bucket may be determined from the table of value assignments 4265. Additionally, as shown in FIG. 42II, a modulus function may be used to determine the appropriate output bucket by determining the $1^{st}$ base three digit. Thus, as shown in FIG. 42II, item 8 is moved to the $2^{nd}$ output bucket for the first pass. Additionally, it should be noted that upon being placed into an output bucket, this is indicated in the input list by that item being struck-through.

As shown in FIG. 42B, the output bucket for item 26 is determined and item 26 is moved to the $2^{nd}$ output bucket. As shown in FIG. 42KK, the output bucket for item 1 is determined and item 1 is moved to the $1^{st}$ output bucket. As shown in FIG. 42LL, the output bucket for item 9 is determined and item 9 is moved to the $0^{th}$ output bucket. As shown in FIG. 42MM, the output bucket for item 6 is determined and item 6 is moved to the $0^{th}$ output bucket.

FIG. 42NN shows the items in the output buckets after the first pass. Moreover, as shown in FIG. 42NN, the buckets are emptied sequentially (i.e., the $0^{th}$ bucket first, the $1^{st}$ bucket second and the $2^{nd}$ bucket third) while maintaining the order of the mail pieces in each bucket to create the output list for the first pass. Moreover, as shown in FIG. 42OO, the output list for the first pass is the input list for the second pass. Additionally, the output bucket for the first item in input list for the second pass, the item 9, is determined and item 9 is moved to the $0^{th}$ output bucket. Again, the output bucket may be determined by accessing the table of value assignments, or determining the $2^{nd}$ base three digit.

As shown in FIG. 42PP, the output bucket for item 6 is determined and item 6 is moved to the $2^{nd}$ output bucket. As shown in FIG. 42QQ, the output bucket for item 21 is determined and item 21 is moved to the $1^{st}$ output bucket. As shown in FIG. 42RR, the output bucket for item 12 is determined and item 12 is moved to the $1^{st}$ output bucket. As shown in FIG. 42SS, the output bucket for item 0 is determined and item 0 is moved to the $0^{th}$ output bucket.

FIG. 42TT shows the bucket state at the end of the second pass. As shown in FIG. 42TT all of the items have been moved into their respective output bins. Additionally, the output list for the second pass is created by emptying the output buckets sequentially (i.e., the $0^{th}$ bucket first, the $1^{st}$ bucket second and the $2^{nd}$ bucket third) while maintaining the order of the mail pieces in each bucket. Moreover, as shown in FIG. 42UU, the output list for the second pass is the input list for the third pass. Additionally, as shown in FIG. 42UU, the output bucket for the first item, item 9, is determined and item 9 is placed in the $1^{st}$ output bucket. The appropriate output bucket may be determined by accessing the table of value assignments, or determining the $3^{rd}$ base three digit.

As shown in FIG. 42VV, the output bucket for item 0 is determined and item 0 is moved to the $0^{th}$ output bucket. As shown in FIG. 42WW, the output bucket for item 18 is determined and item 18 is moved to the $2^{nd}$ output bucket. As shown in FIG. 42XX, the output bucket for item 1 is determined and item 1 is moved to the $0^{th}$ output bucket. As shown in FIG. 42YY, the output bucket for item 19 is determined and item 19 is moved to the $2^{nd}$ output bucket.

FIG. 42ZZ shows the bucket state at the end of the third pass. As shown in FIG. 42ZZ all of the items have been placed in their appropriate output bucket. Additionally, the output list for the third pass is created by emptying the output buckets sequentially (i.e., the $0^{th}$ bucket first, the $1^{st}$ bucket second and the $2^{nd}$ bucket third) while maintaining the order of the mail pieces in each bucket. Moreover, as shown in FIG. 42ZZ, the output list for the third pass contains each of the items in sequenced order.

According to aspects of the invention, the value for N in each pass of the radix sequencing operation is flexible. For example, if 24 items need to be sequenced together a combination of 4 buckets, 3 buckets, and 2 buckets (in any order) would accomplish the sequencing. That is, the sequencing operation may utilize four buckets for one of the passes, three buckets for another of the passes and two buckets for the last of the passes. This can be verified by multiplying the bases of each pass together, e.g., 4×3×2=24. As long as the product remains greater than or equal to the number of items to be sequenced, the operation will succeed for the pass and number of output buckets.

However, in this scenario of changing the number of output buckets between subsequent passes for a sequencing/sorting of a group of items, the numbering of the digits may become very complex. For example, when there are changes in the number of buckets in each pass, the base value of one pass' digit differs from the previous one. The most significant digit of an item's value is the digit to be used for the last pass while the least significant digit of an item's value is the digit to be used for the first pass with everything in between reflecting the passes that occur between those two.

FIG. 42AAA shows an exemplary table indicating output buckets for three different sequencing scenarios. More specifically, the $1^{st}$ three columns show the digit breakdown of 16 values for a 4-bucket $1^{st}$ pass, 3-bucket $2^{nd}$ pass, and a 2-bucket $3^{rd}$ pass. The $2^{nd}$ three columns show the digit breakdown of 16 values for a 2-bucket $1^{st}$ pass, 3-bucket $2^{nd}$ pass, and a 4-bucket $3^{rd}$ pass. The $3^{rd}$ three columns show the digit breakdown of 16 values for a 3-bucket $1^{st}$ pass, 2-bucket $2^{nd}$ pass, and a 3-bucket $3^{rd}$ pass.

As should now be understood, one of the many advantages of this applied radix sorting/sequencing over other sorting/sequencing methodologies is the scalability of the applied radix sorting/sequencing methodology. That is, for example, it is possible to sort the same number of items in multiple configurations, as shown with the above different sequencing scenarios. As a further example to illustrate this point, say thirty items need to be sequenced. This can be accomplished with N=2 and m=5 which will sequence $2^5$=32 items or less. Alternatively, N=6 and m=2 will be able to sequence $6^2$=36 items or less. In a cascade layout, the first proposed solution of N=2 and m=5 will require 10 buckets (2×5) while the second proposed solution of N=6 and m=2 will require 12 buckets (6×2). In a looping (or reusable) layout, the first proposed solution of N=2 and m=5 will require 2 buckets while the second proposed solution of N=6 and m=2 will require 6 buckets.

The tradeoff associated with buckets versus the number of passes should be noted. That is, in a cascade layout, the first scenario saves two buckets, but requires five passes while the second scenario accomplishes the sequencing in two passes, but requires additional buckets. In the looping (or reusable) layout, the first scenario saves four buckets, but requires five passes while the second scenario accomplishes the sequencing in two passes, but requires additional buckets.

In the physical application of the sequencing/sorting methodology, another benefit is that it simplifies the hardware. This is accomplished because most sort algorithms need to "shuffle" out, i.e., meaning when the output of one pass forms the list for the next input it requires the ability to select the next item from any of the available buckets. However, with the applied Radix sort, the contents of a bucket are emptied in its entirety. When moving items into a stream, this greatly reduces the chance for jamming to occur. Also, if a latch is used to hold the items in the bucket, the number of times the latch must open and close will also be reduced. This increases the reliability of the hardware.

Cascading and Looping Arrangements

According to further aspects of the invention, the present invention may be utilized with a cascading arrangement, a looping arrangement and/or combinations of the two arrangements. In a cascading arrangement, with a series of sequencing hardware, a mail piece can pass through and become sequenced with the other pieces in the group using a single pass through the entire system. This cascading method reduces the time needed to sequence other groups of mail pieces. Additionally, the cascading method eliminates the need for a return path.

In contrast, with a looping arrangement, mail pieces pass through a same piece of sequencing hardware a number of times to become sequenced with the other pieces in the group. The looping method decreases the space the hardware occupies, but may increase the time needed to sequence groups of mail pieces, i.e., requires multiple passes. Additionally, the looping method requires a return path to loop the output back to the input.

Sequencing/Sorting Using Right-Angle Diverts and Frame Transport Tubes

In accordance with aspects of the invention, right-angle diverts (RADs) and frame transports, e.g., lead screws, cogged belts, etc. may be used with any of the above-discussed sequencing/sorting methodologies, e.g., an N×N sequencing/sorting methodology, an N×M sequencing/sorting methodology and the applied radix sequencing/sorting methodology, amongst other sequencing/sorting methodologies. As discussed above, the buckets, e.g., the input buckets and output buckets described in the sequencing/sorting methodologies correspond to the frame transports or segments of the facility-wide sorting and/or sequencing system.

Delivery Container

FIG. 43 shows a container in accordance with aspects of the invention. Mail is delivered to the delivery unit or local post office in a container. This allows the postal carrier to easily pick up multiple mail pieces. It also assures that transportation vibration does not affect the order of individual mail pieces. Delivery containers are designed to function much like a section of conveyor to be easily loaded. Also, the delivery container allows all mail frame extraction rods (also referred to as bars) to be lifted simultaneously to extract the mail pieces. If the extraction bar is raised to about an inch before extraction, the mail pieces will be elevated but still captivated in the frame. This allows the postal carrier to easily finger through the addresses.

In embodiments, the container is shown at reference numeral 4300 and includes side walls 4302. The container 4300 also includes an open end 4304. In embodiments, frames F with mail pieces "M" stored therein can be stored in the container 4300. The frames F can be stored using hooks 4300 or other mechanisms, depending on the type of frame positioned within the container 4300. For example, the mechanism can be a lead screw and braking system, similar to that discussed with reference to the shuttles. Alternatively, the mechanism can be a rail which is provided to support a projection of the frame. The container 4300 is configured to:

- eject mail from full-height and half-height frames;
- hold frames in sequenced order;
- prevent the spilling of frames and or mail pieces whenever mail pieces are not being extended;
- stacked when empty or full in order to conserve space. In embodiments, the containers can have sidewalls 4302 which are slightly angled to allow a nesting feature; and
- maintain singulation of individual mail pieces without normal transportation vibration.

In operation, diversion of mail pieces into the containers can be accomplished by use of a similar mechanism to the loading of the shuttle, for example. The mail pieces can also be manually inserted within the containers.

INDUSTRIAL APPLICABILITY

In sum, and amongst other advantages, functions, usages components and/or tasks, the present invention is capable of providing the following in a centralized flat and letter facility-wide mail sorting and/or sequencing system:

- Facing and canceling of mail pieces;
- Providing transportation storage facilities which allow expansion of facilities into external areas such as parking lots to thus allow facilities to expand without building, and easing transitioning of the system into a working P&DC;
- Providing remote access and control to any system, component or subsystem, etc. including, for example, ultra and inter facility management capabilities;
- Providing combined letter and flat mail piece scheduling;
- Providing regional and nationwide system visibility for a network of the centralized flat and letter facility-wide mail system including at least one of: remote and system management; equipment specific processing; and control center;
- Providing frames of many different configurations including, for example, heavy-duty or lightweight frame, a frame with a 45° support ledge; a frame with a hinged (e.g., piano hinge) top, bottom or side to allow for the induction and extraction of the mail pieces, rolling fingers; c-shaped frame; pinch-belt type frame; a frame with a slider within a folder; a frame with a magnetic strip or other identification such as, for example, bar code, etc.; a soft center folder; and vacuum pocket folder, e.g., a folder with an open window on a sidewall, etc. Since mail pieces reside in a frame, the system can process anything that can fit in the frame. This includes letter mail, flat mail, and even small parcels;
- Providing the capability to split frames into different paths to reduce throughput, as well as to split mail pieces into different paths for more efficient induction into the frames;
- Associating mail piece identifiers with individual frame identifiers. This may include, for example, automatic identification of individually containerized mail pieces comprising at least one of: barcode technology; compact disc technology; RFID technology; and smart cards technology;
- Profiling mail pieces to determine appropriate frame size for each mail piece;
- Providing unique transportation systems including, for example, right angle divert including at least one of: vertical divert; diverting and filtering mail pieces at right angles; lift and shift design; 45 degree diverting; and removing gaps and creating gaps between frames. This also includes providing redundancy of parallel independent segments, subsystems, and components to improve reliability;
- Providing coordination and control of path flows;
- Merging separated flats and letters (each in delivery point sequence (DPS)) into a single DPS stream or group of mixed mail pieces. This may include, for example, comprehensive mail piece induction processes for presorted mail pieces arriving from other facilities;
- Providing operator performance monitoring, training, and publication interface;
- Mail frame tracking in a facility-wide letters/flats mail sequencing system, e.g., tracking of mail pieces by position, thereby only requiring to read or scan/singulate and perform barcode or address recognition for the mail piece once. Also, the system is capable of continuously sorting of mail pieces to any level of sortation using a single pass;
- Inputting mail pieces into the system continuously until retrieval starts. In this way, it is possible to start inputting mail for the next day (or other time period) as soon as retrieval stops thus allowing the USPS to utilize the entire day for processing;
- Providing a high throughput using a stacked mail piece configuration, even through a relatively slow conveyor speeds may result in such a configuration;
- Eliminating casing of the mail by the mail carrier, except for exception mail. Also, if exception mail is one of the special bundles, no casing should be necessary;
- Buffering mail pieces to prevent input overflow in a facility-wide letters/flats mail sequencing system;
- Providing a system configuration design analysis;
- Processing containerized mail, containing loose inserts, and other mail at the margins of the flat machinable size range at full transport speed through diverts and merging areas to insert or extract the mail pieces into different streams for sorting and/or sequencing;
- Providing maintenance diagnostic functions to enable the maintenance personnel to troubleshoot and maintain the system. The system is addressable on a Web interface that provides all necessary maintenance diagnostic functions in a maintenance menu of the workstation or separate maintenance terminal. The system can also track subsystem failures through a common maintenance console or web interface such as implemented with the computing infrastructure of FIG. 1A;
- Providing all subsystems report data, status, and faults necessary to determine that maintenance service is necessary or to troubleshoot the system;

Automatically inspecting mail frames prior to insertion and rejects those that have mechanical wear capable of causing jams;

Providing the capability of emptying frames at full bus speed;

Detecting and preventing jams, as well as detecting failures or obstructions that would prevent mail movement by the use of sensors, detectors, etc. The system is capable of switching to redundant paths after detecting jams, failures or obstructions by using alternative paths in the diversions. Also, the induction areas are capable of refeeding jammed mail pieces;

Providing a modular configuration capable of switching out any failed subsystem that has been temporarily replaced by a redundant unit. The components, modules or parts that are field replaceable are plug and play, designed to be removed and replaced, including any alignment, adjustment, software loading, restoring software configuration and any activity required to bring the system to operational readiness;

Conducting configurable, periodic, automatically executed diagnostic tests to find problems and escalate the problem, if the need arises, to designated support personnel;

Gathering maintenance and audit trail information continuously, in order to provide immediate awareness of any failures or exceptions in any subsystem/component and to allow remote management support personnel to coordinate timely resolution of any issues reported. This can be performed by the SMART unit, for example, as discussed;

Using the computing infrastructure, each of the subsystems can perform self-test diagnostics at power up and include a health check during run-time processing. The system can provide necessary maintenance/calibration and diagnostic functions that will enable the maintenance personnel to troubleshoot and maintain the system;

Providing Offline maintenance mode that is comprised of the diagnostics required to isolate a run-time error to a field replaceable unit;

Providing a utility to predict future failures based on trend and prediction analysis;

Providing software written to control all of the base modules that will be in every system and also is configurable to accept new modules into the system via an initialization file;

Incorporating virus protection to all or select computer components. The system computers support firewalls, audit trial, protection of internal information, and backup and restore. Also, the system provides control access between users and system resources (e.g., files and programs) and requires authentication before access to applicable standards. The system also provides protection to prevent unauthorized persons from mechanically altering mail piece positions on a conveyor;

Providing simulation having mail flow, arrival and dispatch timelines, volume, mail types, percent bar-coded, percent not bar-coded, system design parameters (throughput, encode rates, speed, jams, jam clearance time, sweeping time, sort plan change times, container types, container volumes, etc.);

Providing lockouts, interlocks, emergency stops, and guarding and other conventional safety equipment at appropriate locations such as at operator accessible locations;

Providing an interface with the National Directory Support. The interface (as shown in FIG. 1A) also allows for viewing, modifying and saving system and subsystem configuration parameters. It is possible to enable/disable sorting to a bin or set of bins using the interface. The system shall report mail piece data, sortation, status, and error data over the interoperability interface;

Automatically generating an end of run report, which includes all the items used by mail processing, and delivery to manage the operation. The system also displays real time information;

Providing an uninterruptible power supplies and safe shut off procedures;

A utility to create, edit, plan, maintain and select sortation schemes;

Automatically recovering from system stops, loss of power, or from when mail pieces are manually removed due to maintenance;

Determining that a mail piece cannot fit into the frame, the mail piece shall be redirected to an appropriate output as determined by the sort plan; and The parts and equipment, including, without limitation, computers, peripherals, and electronic subsystems, e.g., computing infrastructure shown in FIG. 1A, are capable of continuous operation under any combination of the conditions specified in U.S. Provisional Application No. 60/960,050 filed on Sep. 13, 2007 and U.S. Provisional Application No. 61/071,860 filed on May 22, 2008.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

It is claimed:

1. A facility wide sorting and/or sequencing system, comprising:

a centralized address recognition system comprising a centralized address recognition subsystem located communicates and/or interfaces with each of a facing cancelling sub-system, a product feeding sub-system, a flats feeding sub-system, and a parcel feeding sub-system;

at least one server which (i) one of receives and obtains external data from at least one external source associated with product inbound to a facility utilizing the facility-wide sorting and/or sequencing system, and based upon the external data, the server generates assignments for handling the product within the facility, (ii) comprises a frame routing agent that operates to: store a system transport map of a transportation network associated with a facility wide sorting and/or sequencing system, and determine a path for transporting a product through a portion of the transportation network based upon the system transport map; and (iii) comprises a frame tracking agent that tracks locations of a plurality of frames throughout the facility-wide sorting and/or sequencing system based upon data received from subsystems of the facility-wide sorting and/or sequencing system;

a processing system comprising: a base module capable of performing all processes of the processing system; and at least one expansion module configured to be connected to the base module so as to increase a processing capacity of the processing system; and at least one processing module having a plurality of parallel branches configured to independently process the products; and a system comprising: one or more regional command centers; at least one processing and delivery center hierarchically arranged below each of the one or more regional centers; and at least one mail processing/handling equipment (MPE/MHE) or facility wide sorting and/or sequencing sub systems or components hierarchically arranged below the at least one processing and delivery center, wherein the one or more regional centers, the at least one processing and delivery center and the at least one mail processing/handling equipment or facility wide sorting and/or sequencing sub systems or components utilize a service oriented architecture.

2. The system of claim 1, further comprising:

equipment interfaces for interfacing with the facility-wide product sorting and/or sequencing system;

a unit for culling products that are unsuitable for sequencing;

a unit for facing the products, which have not been culled, by determining the existence and location of a valid indicia and by orienting the products;

a unit for canceling the faced products having a valid indicia; and a unit for monitoring whether the culling, facing and canceling are functioning normally and to provide a warning signal to the sequencing system when the units are not functioning normally;

a transportable facility comprising: a unit including: a plurality of parallel adjacent aisles; an aisle conveyor provided in each storage aisle to transport products along a respective storage aisle; a conveyor aisle extending in a direction transverse to the parallel storage aisles; a conveyor aisle conveyor provided in the conveyor aisle to transport products along the conveyor aisle; a transport device that transfers the products between the conveyor aisle conveyor and the storage aisle conveyors; and a port that provides access between the exterior and the interior of the unit; and a conveyance system for transporting a plurality of product containers comprising: a plurality of input conveyance paths; a plurality of output conveyance paths which are at right angles and the product containers at least travel at a 45 degree angle with reference to a transport direction; and at least one conveyance mechanism, wherein the plurality of product containers are directed through the plurality of input and output conveyance paths, where each of the product containers are configured to contain a single product during processing including sorting and sequencing; each of said product containers having an extraction opening through which said single product is adapted to be extracted; and an extraction arrangement to extract said single products from said succession of product containers for subsequent placement in delivery containers; the product container further comprising: a frame comprising at least a pair of engageable portions adapted to be engaged by a driving mechanism for transporting a plurality of successive containers within the mail processing system; a folder having at least one portion movably connected to the frame, the folder having at least a portion movable relative to the frame between: a first position for facilitating selective insertion and extraction of a single product within the container; and a second position, wherein the folder is empty of any product.

3. The system of claim 1, further comprising:

a product identifier tool configured to determine at least one product identifier of the product;

a frame identifier tool configured to determine a frame identifier of the frame to contain the product;

an association tool configured to create an association between the at least one product identifier and the frame identifier; and a data store configured to store the association so that the product is identifiable by the frame identifier.

4. The system of claim 3, further comprising:

a presorting unit comprising: at least one induction unit configured to split products into a plurality of split pathways for placement into the frames, the induction unit comprising: at least one feeder; a first pathway having a plurality of diverter gates, wherein the at least one feeder is configured to direct products into the first pathway, and the products are given a source identifier at the at least one feeder, and wherein the plurality of split pathways having spaced intervals adjacent a side of the first pathway; and a plurality of frame inserters provided adjacent second ends of the plurality of split pathways, wherein the plurality of diverter gates selectively divert products from the first pathway to one of the plurality of split pathways, and wherein the plurality of frame inserters are configured to place the products into the frames.

5. The system of claim 1, further comprising:

a frame manager system comprising: an empty frame receiving system; a frame inspection system; and a system for loading frames onto transports; a shuttle manager system comprising an empty shuttle receiving system; and a shuttle reading system; a frame buffer system comprising: a frame receiving system receiving frames with the product; and a buffer controller system buffering frames prior to sorting the frames; and a merger processing system for merging different types of products together, comprising: a frame inserter which receives a first type of product and inserts the first type of product into the frames; a frame inserter which receives a second type of product and inserts the second type of products into the frames; and a conveying system for the products to be combined into a mixed stream containing both types of products.

6. The system of claim 5, further comprising:

a system for automatically identifying the frames containing individual products associated with delivery destinations comprising: machine readable unique frame identification data associated with each frame; product profile data associated with the identification data of the frame is stored; a plurality of readers for reading and decoding the unique frame identification data at predefined locations within the sequencing system; and a processing unit for providing tracking information, as the frames move through the sequencing system past the plurality of readers; wherein the tracking information is utilized to place the frames into a delivery point sequence and the product profile data is utilized to place the frames into greater levels or sort in addition to the delivery point sequence.

7. The system of claim 5, further comprising:

a system for automatically identifying the frames containing individual products associated with delivery destinations comprising: machine readable unique frame identification data associated with each frame; product profile data associated with the identification data of the frame is stored; a plurality of readers for reading and decoding the unique frame identification data at predefined locations within the sequencing system; and a processing unit for providing tracking information, as the frames move through the sequencing system past the plurality of readers; wherein the tracking information is utilized to place the frames into a delivery point sequence and the product profile data is utilized to place the frames into greater levels or sort in addition to the delivery point sequence.

8. The system of claim 1, further comprising:

a computer implemented system for a handling facility, comprising: a user interface on at least one of: a console associated with a unit of mail handling equipment (MHE), a networked computer of the handling facility, a personal data assistant, and a smart telephone;

an induction system for inducting the products into a sequencing system comprising: a feeder for conveying the products into the induction system; an optical imaging unit for capturing an image of the products being conveyed into the system; a unit for decoding barcodes on the products; a unit for decoding ID tags on the products; a unit for profiling physical attributes of the products including dimensions, shape and weight of the products; a unit for recognizing the addresses or redirected addresses on the products and for verifying whether the recognized addresses are deliverable addresses; a staging area for buffering products that include an address that cannot be immediately recognized or verified; and at least one holdout bin for receiving products that cannot be inducted into the sequencing system;

a system for distributing filled trays of destination product comprising at least one dispatch lane unit receiving mail trays loading carts with the mail trays; and a system for sequencing products within a storage unit comprising: an input lane for transporting unsequenced products to an input of the storage unit; a conveyor for cycling the products through the storage unit in at least a first cyclic path and a second cyclic path which includes the plurality of input conveyance paths and output conveyance paths; a diverter for diverting selected products from the first cyclic path to the second cyclic path which is at a right angle to one another; and an output lane for transporting sequenced products from an output of the storage unit; wherein the products are diverted between the first cyclic path and the second cyclic path, in accordance with a sequencing control which places all the products in a predetermined delivery point sequence within the storage unit.

9. The system of claim 1, further comprising:

a clamp system for holding the products comprising: a first clamp comprising: a backing having a gap or notch at an upper edge thereof; a divert pin extending upward from the backing and configured to interact with a divert mechanism or angle compensating mechanism; and an upward extending arm from the backing and at a side of the gap or notch.

10. The system of claim 1, further comprising:

a container comprising: sidewalls and a bottom surface; a locking bar extending from at least the sidewalls and configured to pivot between a locked position and an open position, the locking bar including wedge shaped protections configured to interact and contact with a backing of clamps; offsetting channels or other holding mechanism projecting upwards from the bottom surface and configured to mate with upward extending arms of the clamps; an upward extending substantially centrally located locking tab positioned between the channels, the locking tab being configured to interact with the upward extending arms of the clamps such that when the locking bar is lowered, the wedge shaped projections contact the backing of the clamps, pushing the upward extending arms of the clamps into frictional engagement with the locking tab, effectively holding the clamps in a stationary position.

11. The system of claim 1, further comprising:

a storage unit comprising: a drawer having a sliding mechanism to allow access to the drawer; and a channel or transport mechanism for holding clamps therein, wherein a channel or transport mechanism of a first storage unit is at an incline with respect to a channel or transport mechanism of a second storage unit;

a buffer system comprising a frame receiving system and a buffer controller system; and a presort accumulator system architecture comprising: a frame reader which receives the frames that each have the product from one or more mail induction units, the frame reader reads a frame identification (ID) and communicates with the server which functions as a control function sub-system and which comprises: a multiplex controller; an accumulator controller, and an accumulator selector, the accumulator selector interfaces with an accumulator allocation plan; and a system of accumulator tubes receives the read frames from the frame reader and places the frames into a buffer segment of one or more of the accumulator tubes, wherein each accumulator tube has an arrangement for moving the frames within the tubes including a buffer segment and a collector segment.

12. The system of claim 1, further comprising:

a computer implemented system embodied on a tangible storage medium, operable to: ascertain attributes on at least one product using a profiler; determine dimensional data for the at least one product based on the attributes; determine whether the dimensional data is within predefined dimensions; identify a frame having dimensions larger than the dimensional data; and match the at least one product with the frame that has dimensions larger than the dimensional data.

13. The system of claim 1, further comprising:

a self monitoring and testing unit comprising: a ruggedized, portable processing unit configured to pass through a machine comprising a plurality of sensors and monitors configured to detect and monitor changes in operating conditions of the machine, and wherein the plurality of sensors and monitors collect data along a conveyance path including the at least a first cyclic path and a second cyclic path and transmits the collected data to the server.

14. The system of claim 1, further comprising:

a shuttle mechanism for conveying a plurality of the frames to a subsystem, the shuttle comprising: a frame member comprising at least two open end walls; a plurality of non-powered transport screws extended between the two open end walls; and side posts having at least two notches to accommodate portions of the plurality of non-powered transport screws.

15. The system of claim 1, further comprising:

a system for performing a sequencing/sorting process of the products comprising: a tool operable to determine a proper sequence for a batch of mail pieces using one of an N×N sequencing/sorting methodology, an N×M sequencing/sorting methodology and an applied radix sequencing/sorting methodology; and a plurality of right-angle diverts and a plurality of frame transport tubes operable to rearrange the batch of the mail pieces into the proper sequence.

* * * * *